US007461691B2

(12) United States Patent
Vinegar et al.

(10) Patent No.: US 7,461,691 B2
(45) Date of Patent: *Dec. 9, 2008

(54) IN SITU RECOVERY FROM A HYDROCARBON CONTAINING FORMATION

(75) Inventors: Harold J. Vinegar, Bellaire, TX (US); Ronald Marshall Bass, Houston, TX (US)

(73) Assignee: Shell Oil Company, Houston, TX (US)

( * ) Notice: Subject to any disclaimer, the term of this patent is extended or adjusted under 35 U.S.C. 154(b) by 28 days.

This patent is subject to a terminal disclaimer.

(21) Appl. No.: 11/657,442

(22) Filed: Jan. 23, 2007

(65) Prior Publication Data

US 2007/0209799 A1 Sep. 13, 2007

Related U.S. Application Data

(62) Division of application No. 10/279,288, filed on Oct. 24, 2002, now Pat. No. 7,165,615.

(60) Provisional application No. 60/374,995, filed on Apr. 24, 2002, provisional application No. 60/374,970, filed on Apr. 24, 2002, provisional application No. 60/337,136, filed on Oct. 24, 2001, provisional application No. 60/334,568, filed on Oct. 24, 2001.

(51) Int. Cl.
*E21B 36/04* (2006.01)

(52) U.S. Cl. .......... 166/60

(58) Field of Classification Search .......... 166/60
See application file for complete search history.

(56) References Cited

U.S. PATENT DOCUMENTS

| | | | |
|---|---|---|---|
| 48,994 | A | 7/1865 | Parry |
| 94,813 | A | 9/1869 | Dickey |
| 326,439 | A | 9/1885 | McEachen |
| 345,586 | A | 7/1886 | Hall |
| 760,304 | A | 5/1904 | Butler |
| 1,269,747 | A | 6/1918 | Rogers |
| 1,342,741 | A | 6/1920 | Day |
| 1,510,655 | A | 6/1924 | Clark |
| 1,634,236 | A | 6/1927 | Ranney |
| 1,646,599 | A | 10/1927 | Schaefer |
| 1,666,488 | A | 4/1928 | Crawshaw |

(Continued)

FOREIGN PATENT DOCUMENTS

CA 983704 2/1976

(Continued)

OTHER PUBLICATIONS

U. S. Patent and Trademark Office, "Office Communication," for U.S. Appl. No. 10/693,820 mailed Jul. 27, 2007; 9 pages; available in PAIR.

(Continued)

*Primary Examiner*—John Kreck

(57) ABSTRACT

An in situ process for treating a hydrocarbon containing formation is provided. The process may include providing heat from one or more heaters to at least a portion of the formation. The heat may be allowed to transfer from the one or more heaters to a part of the formation such that heat from the one or more heat sources pyrolyzes at least some hydrocarbons within the part. Hydrocarbons may be produced from the formation.

19 Claims, 248 Drawing Sheets

U.S. PATENT DOCUMENTS 1,681,523 A 8/1928 Downey et al.
1,913,395 A 6/1933 Karrick
2,244,255 A 6/1941 Looman
2,244,256 A * 6/1941 Looman ..................... 166/60
2,319,702 A 5/1943 Moon
2,381,256 A 8/1945 Callaway
2,390,770 A 12/1945 Barton et al.
2,423,674 A 7/1947 Agren
2,444,755 A 7/1948 Steffen
2,466,945 A 4/1949 Greene
2,472,445 A 6/1949 Sprong
2,481,051 A 9/1949 Uren
2,484,063 A 10/1949 Ackley
2,497,868 A 2/1950 Dalin
2,548,360 A 4/1951 Germain
2,593,477 A 4/1952 Newman et al.
2,595,979 A 5/1952 Pevere et al.
2,630,306 A 3/1953 Evans
2,630,307 A 3/1953 Martin
2,634,961 A 4/1953 Ljungstrom
2,642,943 A 6/1953 Smith et al.
2,670,802 A 3/1954 Ackley
2,685,930 A 8/1954 Albaugh
2,695,163 A 11/1954 Pearce et al.
2,703,621 A 3/1955 Ford
2,714,930 A 8/1955 Carpenter
2,732,195 A 1/1956 Ljungstrom
2,734,579 A 2/1956 Elkins
2,743,906 A 5/1956 Coyle
2,757,739 A 8/1956 Douglas et al.
2,771,954 A 11/1956 Jenks et al.
2,777,679 A 1/1957 Ljungstrom
2,780,449 A 2/1957 Fisher et al.
2,780,450 A 2/1957 Ljungstrom
2,786,660 A 3/1957 Alleman
2,789,805 A 4/1957 Ljungstrom
2,793,696 A 5/1957 Morse
2,794,504 A 6/1957 Carpenter
2,801,089 A 7/1957 Scott, Jr.
2,803,305 A 8/1957 Behning et al.
2,804,149 A 8/1957 Kile
2,819,761 A 1/1958 Popham et al.
2,825,408 A 3/1958 Watson
2,841,375 A 7/1958 Salomonsson
2,857,002 A 10/1958 Pevere et al.
2,889,882 A 6/1959 Schleicher
2,890,754 A 6/1959 Hoffstrom et al.
2,890,755 A 6/1959 Eurenius et al.
2,902,270 A 9/1959 Salomonsson et al.
2,906,337 A 9/1959 Henning
2,906,340 A 9/1959 Herzog
2,914,309 A 11/1959 Salomonsson
2,923,535 A 2/1960 Ljungstrom
2,932,352 A 4/1960 Stegemeier
2,939,689 A 6/1960 Ljungstrom
2,942,223 A 6/1960 Lennox et al.
2,954,826 A 10/1960 Sievers
2,958,519 A 11/1960 Hurley
2,969,226 A 1/1961 Huntington
2,970,826 A 2/1961 Woodruff
2,974,937 A 3/1961 Kiel
2,991,046 A 7/1961 Yahn
2,994,376 A 8/1961 Crawford et al.
2,997,105 A 8/1961 Campion et al.
2,998,457 A 8/1961 Paulsen
3,004,601 A 10/1961 Bodine
3,004,603 A 10/1961 Rogers et al.
3,007,521 A 11/1961 Trantham et al.
3,010,513 A 11/1961 Gerner
3,010,516 A 11/1961 Schleicher
3,016,053 A 1/1962 Medovick
3,017,168 A 1/1962 Carr
3,026,940 A 3/1962 Spitz
3,032,102 A 5/1962 Parker
3,036,632 A 5/1962 Koch et al.
3,044,545 A 7/1962 Tooke
3,048,221 A 8/1962 Tek
3,050,123 A 8/1962 Scott
3,051,235 A 8/1962 Banks
3,061,009 A 10/1962 Shirley
3,062,282 A 11/1962 Schleicher
3,095,031 A 6/1963 Eurenius et al.
3,105,545 A 10/1963 Prats et al.
3,106,244 A 10/1963 Parker
3,110,345 A 11/1963 Reed et al.
3,113,619 A 12/1963 Reichle
3,113,620 A 12/1963 Hemminger
3,113,623 A 12/1963 Krueger
3,114,417 A 12/1963 McCarthy
3,116,792 A 1/1964 Purre
3,120,264 A 2/1964 Barron
3,127,935 A 4/1964 Poettmann et al.
3,127,936 A 4/1964 Eurenius
3,131,763 A 5/1964 Kunetka et al.
3,132,692 A 5/1964 Marx et al.
3,137,347 A 6/1964 Parker
3,139,928 A 7/1964 Broussard
3,142,336 A 7/1964 Doscher
3,149,670 A 9/1964 Grant
3,149,672 A 9/1964 Orkiszewski et al.
3,163,745 A 12/1964 Boston
3,164,207 A 1/1965 Thessen et al.
3,165,154 A 1/1965 Santourian
3,170,842 A 2/1965 Kehler
3,181,613 A 5/1965 Krueger
3,182,721 A 5/1965 Hardy
3,183,675 A 5/1965 Schroeder
3,191,679 A 6/1965 Miller
3,205,942 A 9/1965 Sandberg
3,205,944 A 9/1965 Walton
3,205,946 A 9/1965 Prats et al.
3,207,220 A 9/1965 Williams
3,208,531 A 9/1965 Tamplen
3,209,825 A 10/1965 Alexander et al.
3,221,811 A 12/1965 Prats
3,233,668 A 2/1966 Hamilton et al.
3,237,689 A 3/1966 Justheim
3,241,611 A 3/1966 Dougan
3,246,695 A 4/1966 Robinson
3,250,327 A 5/1966 Crider
3,267,680 A 8/1966 Schlumberger
3,273,640 A 9/1966 Huntington
3,275,076 A 9/1966 Sharp
3,284,281 A 11/1966 Thomas
3,285,335 A 11/1966 Reistle, Jr.
3,288,648 A 11/1966 Jones
3,294,167 A 12/1966 Vogel
3,302,707 A 2/1967 Slusser
3,316,344 A 4/1967 Kidd et al.
3,316,962 A 5/1967 Lange
3,332,480 A 7/1967 Parrish
3,338,306 A 8/1967 Cook
3,342,258 A 9/1967 Prats
3,342,267 A 9/1967 Cotter et al.
3,349,845 A 10/1967 Holbert et al.
3,352,355 A 11/1967 Putman
3,358,756 A 12/1967 Vogel
3,362,751 A 1/1968 Tinlin
3,372,754 A 3/1968 McDonald
3,379,248 A 4/1968 Strange
3,380,913 A 4/1968 Henderson
3,386,508 A 6/1968 Bielstein et al.
3,389,975 A 6/1968 Van Nostrand
3,399,623 A 9/1968 Creed

| | | | |
|---|---|---|---|
| 3,410,977 | A | 11/1968 | Ando |
| 3,412,011 | A | 11/1968 | Lindsay |
| 3,434,541 | A | 3/1969 | Cook et al. |
| 3,455,383 | A | 7/1969 | Prats et al. |
| 3,465,819 | A | 9/1969 | Dixon |
| 3,477,058 | A | 11/1969 | Vedder et al. |
| 3,485,300 | A | 12/1969 | Engle |
| 3,501,201 | A | 3/1970 | Closmann et al. |
| 3,502,372 | A | 3/1970 | Prats |
| 3,513,913 | A | 5/1970 | Bruist |
| 3,515,837 | A | 6/1970 | Ando |
| 3,528,501 | A | 9/1970 | Parker |
| 3,529,682 | A | 9/1970 | Coyne |
| 3,537,528 | A | 11/1970 | Herce et al. |
| 3,542,131 | A | 11/1970 | Walton et al. |
| 3,547,192 | A | 12/1970 | Claridge et al. |
| 3,547,193 | A | 12/1970 | Gill |
| 3,562,401 | A | 2/1971 | Long |
| 3,565,171 | A | 2/1971 | Closmann |
| 3,578,080 | A | 5/1971 | Closmann |
| 3,580,987 | A | 5/1971 | Priaroggia |
| 3,593,789 | A | 7/1971 | Prats |
| 3,595,082 | A | 7/1971 | Miller et al. |
| 3,599,714 | A | 8/1971 | Messman et al. |
| 3,605,890 | A | 9/1971 | Holm |
| 3,614,986 | A | 10/1971 | Gill |
| 3,618,663 | A | 11/1971 | Needham |
| 3,629,551 | A | 12/1971 | Ando |
| 3,661,423 | A | 5/1972 | Garrett |
| 3,675,715 | A | 7/1972 | Speller, Jr. |
| 3,679,812 | A | 7/1972 | Owens |
| 3,680,633 | A | 8/1972 | Bennett |
| 3,700,280 | A | 10/1972 | Papadopoulos et al. |
| 3,757,860 | A | 9/1973 | Pritchett |
| 3,759,328 | A | 9/1973 | Ueber et al. |
| 3,759,574 | A | 9/1973 | Beard |
| 3,766,982 | A | 10/1973 | Justheim |
| 3,770,398 | A | 11/1973 | Abraham et al. |
| 3,779,602 | A | 12/1973 | Beard et al. |
| 3,794,116 | A | 2/1974 | Higgins |
| 3,804,169 | A | 4/1974 | Closmann |
| 3,804,172 | A | 4/1974 | Closmann et al. |
| 3,809,159 | A | 5/1974 | Young et al. |
| 3,853,185 | A | 12/1974 | Dahl et al. |
| 3,881,551 | A | 5/1975 | Terry et al. |
| 3,882,941 | A | 5/1975 | Pelofsky |
| 3,893,918 | A | 7/1975 | Favret, Jr. |
| 3,907,045 | A | 9/1975 | Dahl et al. |
| 3,922,148 | A | 11/1975 | Child |
| 3,924,680 | A | 12/1975 | Terry |
| 3,941,421 | A | 3/1976 | Burton, III et al. |
| 3,947,683 | A | 3/1976 | Schultz et al. |
| 3,948,319 | A | 4/1976 | Pritchett |
| 3,948,755 | A | 4/1976 | McCollum et al. |
| 3,950,029 | A | 4/1976 | Timmins |
| 3,952,802 | A | 4/1976 | Terry |
| 3,954,140 | A | 5/1976 | Hendrick |
| 3,973,628 | A | 8/1976 | Colgate |
| 3,986,349 | A | 10/1976 | Egan |
| 3,986,556 | A | 10/1976 | Haynes |
| 3,986,557 | A | 10/1976 | Striegler et al. |
| 3,987,851 | A | 10/1976 | Tham |
| 3,992,474 | A | 11/1976 | Sobel |
| 3,993,132 | A | 11/1976 | Cram et al. |
| 3,994,340 | A | 11/1976 | Anderson et al. |
| 3,994,341 | A | 11/1976 | Anderson et al. |
| 3,999,607 | A | 12/1976 | Pennington et al. |
| 4,005,752 | A | 2/1977 | Cha |
| 4,006,778 | A | 2/1977 | Redford et al. |
| 4,008,762 | A | 2/1977 | Fisher et al. |
| 4,010,800 | A | 3/1977 | Terry |
| 4,016,239 | A | 4/1977 | Fenton |
| 4,018,280 | A | 4/1977 | Daviduk et al. |
| 4,019,575 | A | 4/1977 | Pisio et al. |
| 4,026,357 | A | 5/1977 | Redford |
| 4,029,360 | A | 6/1977 | French |
| 4,031,956 | A | 6/1977 | Terry |
| 4,042,026 | A | 8/1977 | Pusch et al. |
| 4,043,393 | A | 8/1977 | Fisher et al. |
| 4,048,637 | A | 9/1977 | Jacomini |
| 4,049,053 | A | 9/1977 | Fisher et al. |
| 4,057,293 | A | 11/1977 | Garrett |
| 4,067,390 | A | 1/1978 | Camacho et al. |
| 4,076,761 | A | 2/1978 | Chang et al. |
| 4,083,604 | A | 4/1978 | Bohn et al. |
| 4,084,637 | A | 4/1978 | Todd |
| 4,087,130 | A | 5/1978 | Garrett |
| 4,089,372 | A | 5/1978 | Terry |
| 4,089,374 | A | 5/1978 | Terry |
| 4,091,869 | A | 5/1978 | Hoyer |
| 4,093,025 | A | 6/1978 | Terry |
| 4,093,026 | A | 6/1978 | Ridley |
| 4,096,163 | A | 6/1978 | Chang et al. |
| 4,099,567 | A | 7/1978 | Terry |
| 4,114,688 | A | 9/1978 | Terry |
| 4,119,349 | A | 10/1978 | Albulescu et al. |
| 4,125,159 | A | 11/1978 | Vann |
| 4,130,575 | A | 12/1978 | Jorn et al. |
| 4,133,825 | A | 1/1979 | Stroud et al. |
| 4,138,442 | A | 2/1979 | Chang et al. |
| 4,140,180 | A | 2/1979 | Bridges et al. |
| 4,140,181 | A | 2/1979 | Ridley et al. |
| 4,144,935 | A | 3/1979 | Bridges et al. |
| 4,148,359 | A | 4/1979 | Laumbach et al. |
| 4,158,467 | A | 6/1979 | Larson et al. |
| 4,183,405 | A | 1/1980 | Magnie |
| 4,184,548 | A | 1/1980 | Ginsburgh et al. |
| 4,185,692 | A | 1/1980 | Terry |
| 4,186,801 | A | 2/1980 | Madgavkar et al. |
| 4,193,451 | A | 3/1980 | Dauphine |
| 4,197,911 | A | 4/1980 | Anada |
| 4,199,024 | A | 4/1980 | Rose et al. |
| 4,228,853 | A | 10/1980 | Harvey et al. |
| 4,228,854 | A | 10/1980 | Sacuta |
| 4,243,101 | A | 1/1981 | Grupping |
| 4,248,306 | A | 2/1981 | Van Huisen et al. |
| 4,250,230 | A | 2/1981 | Terry |
| 4,250,962 | A | 2/1981 | Madgavkar et al. |
| 4,252,191 | A | 2/1981 | Pusch et al. |
| 4,256,945 | A | 3/1981 | Carter et al. |
| 4,265,307 | A | 5/1981 | Elkins |
| 4,273,188 | A | 6/1981 | Vogel et al. |
| 4,274,487 | A | 6/1981 | Hollingsworth et al. |
| 4,277,416 | A | 7/1981 | Grant |
| 4,282,587 | A | 8/1981 | Silverman |
| RE30,738 | E | 9/1981 | Bridges et al. |
| 4,299,086 | A | 11/1981 | Madgavkar et al. |
| 4,299,285 | A | 11/1981 | Tsai et al. |
| 4,303,126 | A | 12/1981 | Blevins |
| 4,305,463 | A | 12/1981 | Zakiewicz |
| 4,306,621 | A | 12/1981 | Boyd et al. |
| 4,324,292 | A | 4/1982 | Jacobs et al. |
| 4,344,483 | A | 8/1982 | Fisher et al. |
| 4,353,418 | A | 10/1982 | Hoekstra et al. |
| 4,359,687 | A | 11/1982 | Vinegar et al. |
| 4,363,361 | A | 12/1982 | Madgavkar et al. |
| 4,366,668 | A | 1/1983 | Madgavkar et al. |
| 4,378,048 | A | 3/1983 | Madgavkar et al. |
| 4,380,930 | A | 4/1983 | Podhrasky et al. |
| 4,381,641 | A | 5/1983 | Madgavkar et al. |
| 4,384,613 | A | 5/1983 | Owen et al. |
| 4,384,614 | A | 5/1983 | Justheim |
| 4,385,661 | A | 5/1983 | Fox |
| 4,390,067 | A | 6/1983 | Wilman |
| 4,390,973 | A | 6/1983 | Rietsch |
| 4,396,062 | A | 8/1983 | Iskander |

4,397,732 A 8/1983 Hoover et al.
4,398,151 A 8/1983 Vinegar et al.
4,399,866 A 8/1983 Dearth
4,401,099 A 8/1983 Collier
4,401,163 A 8/1983 Elkins
4,407,973 A 10/1983 van Dijk et al.
4,409,090 A 10/1983 Hanson et al.
4,410,042 A 10/1983 Shu
4,412,124 A 10/1983 Kobayashi
4,412,585 A 11/1983 Bouck
4,417,782 A 11/1983 Clarke et al.
4,418,752 A 12/1983 Boyer et al.
4,423,311 A 12/1983 Varney, Sr.
4,425,967 A 1/1984 Hoekstra
4,428,700 A 1/1984 Lennemann
4,429,745 A 2/1984 Cook
4,437,519 A 3/1984 Cha et al.
4,440,224 A 4/1984 Kreinin et al.
4,442,896 A 4/1984 Reale et al.
4,444,255 A 4/1984 Geoffrey et al.
4,444,258 A 4/1984 Kalmar
4,445,574 A 5/1984 Vann
4,446,917 A 5/1984 Todd
4,452,491 A 6/1984 Seglin et al.
4,455,215 A 6/1984 Jarrott et al.
4,456,065 A 6/1984 Heim et al.
4,457,365 A 7/1984 Kasevich et al.
4,457,374 A 7/1984 Hoekstra et al.
4,458,757 A 7/1984 Bock et al.
4,458,767 A 7/1984 Hoehn, Jr.
4,474,238 A 10/1984 Gentry et al.
4,479,541 A 10/1984 Wang
4,485,869 A 12/1984 Sresty et al.
4,489,782 A 12/1984 Perkins
4,491,179 A 1/1985 Pirson et al.
4,498,531 A 2/1985 Vrolyk
4,498,535 A 2/1985 Bridges
4,499,209 A 2/1985 Hoek et al.
4,501,326 A 2/1985 Edmunds
4,501,445 A 2/1985 Gregoli
4,513,816 A 4/1985 Hubert
4,518,548 A 5/1985 Yarbrough
4,524,826 A 6/1985 Savage
4,524,827 A 6/1985 Bridges et al.
4,530,401 A 7/1985 Hartman et al.
4,537,252 A 8/1985 Puri
4,538,682 A 9/1985 McManus et al.
4,540,882 A 9/1985 Vinegar et al.
4,542,648 A 9/1985 Vinegar et al.
4,545,435 A 10/1985 Bridges et al.
4,549,396 A 10/1985 Garwood et al.
4,552,214 A 11/1985 Forgac et al.
4,570,715 A 2/1986 Van Meurs et al.
4,571,491 A 2/1986 Vinegar et al.
4,572,229 A * 2/1986 Mueller et al. ................ 137/99
4,572,299 A 2/1986 Van Egmond et al.
4,573,530 A 3/1986 Audeh et al.
4,576,231 A 3/1986 Dowling et al.
4,577,503 A 3/1986 Imaino et al.
4,577,690 A 3/1986 Medlin
4,583,046 A 4/1986 Vinegar et al.
4,583,242 A 4/1986 Vinegar et al.
4,585,066 A 4/1986 Moore et al.
4,592,423 A 6/1986 Savage et al.
4,597,441 A 7/1986 Ware et al.
4,597,444 A 7/1986 Hutchinson
4,598,392 A 7/1986 Pann
4,598,770 A 7/1986 Shu et al.
4,598,772 A 7/1986 Holmes
4,605,489 A 8/1986 Madgavkar
4,605,680 A 8/1986 Beuther et al.
4,608,818 A 9/1986 Goebel et al.
4,609,041 A 9/1986 Magda
4,613,754 A 9/1986 Vinegar et al.
4,616,705 A 10/1986 Stegemeier et al.
4,623,401 A 11/1986 Derbyshire et al.
4,623,444 A 11/1986 Che et al.
4,626,665 A 12/1986 Fort, III
4,635,197 A 1/1987 Vinegar et al.
4,637,464 A 1/1987 Forgac et al.
4,640,352 A 2/1987 Van Meurs et al.
4,640,353 A 2/1987 Schuh
4,644,283 A 2/1987 Vinegar et al.
4,645,906 A 2/1987 Yagnik et al.
4,651,825 A 3/1987 Wilson
4,658,215 A 4/1987 Vinegar et al.
4,662,437 A 5/1987 Renfro et al.
4,662,438 A 5/1987 Taflove et al.
4,662,439 A 5/1987 Puri
4,662,443 A 5/1987 Puri et al.
4,663,711 A 5/1987 Vinegar et al.
4,669,542 A 6/1987 Venkatesan
4,671,102 A 6/1987 Vinegar et al.
4,682,652 A 7/1987 Huang et al.
4,691,771 A 9/1987 Ware et al.
4,694,907 A 9/1987 Stahl et al.
4,695,713 A 9/1987 Krumme
4,698,149 A 10/1987 Mitchell
4,698,583 A 10/1987 Sandberg
4,701,587 A 10/1987 Carter et al.
4,704,514 A 11/1987 Van Edmond et al.
4,706,751 A 11/1987 Gondouin
4,716,960 A 1/1988 Eastlund et al.
4,717,814 A 1/1988 Krumme
4,719,423 A 1/1988 Vinegar et al.
4,728,892 A 3/1988 Vinegar et al.
4,730,162 A 3/1988 Vinegar et al.
4,733,057 A 3/1988 Stanzel et al.
4,734,115 A 3/1988 Howard et al.
4,743,854 A 5/1988 Vinegar et al.
4,744,245 A 5/1988 White
4,752,673 A 6/1988 Krumme
4,756,367 A 7/1988 Puri et al.
4,762,425 A 8/1988 Shakkottai et al.
4,766,958 A 8/1988 Faecke
4,769,602 A 9/1988 Vinegar et al.
4,769,606 A 9/1988 Vinegar et al.
4,772,634 A 9/1988 Farooque
4,776,638 A 10/1988 Hahn
4,785,163 A 11/1988 Sandberg
4,787,452 A 11/1988 Jennings, Jr.
4,794,226 A 12/1988 Derbyshire
4,808,925 A 2/1989 Baird
4,814,587 A 3/1989 Carter
4,817,711 A 4/1989 Jeambey
4,818,370 A 4/1989 Gregoli et al.
4,821,798 A 4/1989 Bridges et al.
4,823,890 A 4/1989 Lang
4,827,761 A 5/1989 Vinegar et al.
4,828,031 A 5/1989 Davis
4,848,460 A 7/1989 Johnson, Jr. et al.
4,848,924 A 7/1989 Nuspl et al.
4,849,611 A 7/1989 Whitney et al.
4,856,341 A 8/1989 Vinegar et al.
4,856,587 A 8/1989 Nielson
4,860,544 A 8/1989 Krieg et al.
4,866,983 A 9/1989 Vinegar et al.
4,884,455 A 12/1989 Vinegar et al.
4,885,080 A 12/1989 Brown et al.
4,886,118 A 12/1989 Van Meurs et al.
4,893,504 A 1/1990 OMeara, Jr. et al.
4,895,206 A 1/1990 Price
4,912,971 A 4/1990 Jeambey
4,913,065 A 4/1990 Hemsath
4,926,941 A 5/1990 Glandt et al.
4,927,857 A 5/1990 McShea, III et al.

4,928,765 A 5/1990 Nielson
4,974,425 A 12/1990 Krieg et al.
4,982,786 A 1/1991 Jennings, Jr.
4,983,319 A 1/1991 Gregoli et al.
4,984,594 A 1/1991 Vinegar et al.
4,985,313 A 1/1991 Penneck et al.
4,987,368 A 1/1991 Vinegar
4,994,093 A 2/1991 Wetzel et al.
5,008,085 A 4/1991 Bain et al.
5,011,329 A 4/1991 Nelson et al.
5,020,596 A 6/1991 Hemsath
5,027,896 A 7/1991 Anderson
5,046,559 A 9/1991 Glandt
5,050,386 A 9/1991 Krieg et al.
5,054,551 A 10/1991 Duerksen
5,059,303 A 10/1991 Taylor et al.
5,060,287 A 10/1991 Van Egmond
5,060,726 A 10/1991 Glandt et al.
5,064,006 A 11/1991 Waters et al.
5,065,501 A 11/1991 Henschen et al.
5,065,818 A 11/1991 Van Egmond
5,066,852 A 11/1991 Willbanks
5,073,625 A 12/1991 Derbyshire
5,082,054 A 1/1992 Kiamanesh
5,082,055 A 1/1992 Hemsath
5,085,276 A 2/1992 Rivas et al.
5,097,903 A 3/1992 Wilensky
5,099,918 A 3/1992 Bridges et al.
5,103,920 A 4/1992 Patton
5,126,037 A 6/1992 Showalter
5,145,003 A 9/1992 Duerksen
5,168,927 A 12/1992 Stegemeier et al.
5,182,427 A 1/1993 McGaffigan
5,182,792 A 1/1993 Goncalves
5,189,283 A 2/1993 Carl, Jr. et al.
5,190,405 A 3/1993 Vinegar et al.
5,201,219 A 4/1993 Bandurski et al.
5,207,273 A 5/1993 Cates et al.
5,209,987 A 5/1993 Penneck et al.
5,211,230 A 5/1993 Ostapovich et al.
5,217,076 A 6/1993 Masek
5,226,961 A 7/1993 Nahm et al.
5,229,583 A 7/1993 van Egmond et al.
5,236,039 A 8/1993 Edelstein et al.
5,247,994 A 9/1993 Nenniger
5,255,742 A 10/1993 Mikus
5,261,490 A 11/1993 Ebinuma
5,285,846 A 2/1994 Mohn
5,289,882 A 3/1994 Moore
5,295,763 A 3/1994 Stenborg et al.
5,297,626 A 3/1994 Vinegar et al.
5,305,239 A 4/1994 Kinra
5,305,829 A 4/1994 Kumar
5,306,640 A 4/1994 Vinegar et al.
5,316,664 A 5/1994 Gregoli et al.
5,318,116 A 6/1994 Vinegar et al.
5,332,036 A 7/1994 Shirley et al.
5,339,897 A 8/1994 Leaute
5,339,904 A 8/1994 Jennings, Jr.
5,340,467 A 8/1994 Gregoli et al.
5,349,859 A 9/1994 Kleppe
5,360,067 A 11/1994 Meo, III
5,363,094 A 11/1994 Staron et al.
5,366,012 A 11/1994 Lohbeck
5,377,756 A 1/1995 Northrop et al.
5,388,640 A 2/1995 Puri et al.
5,388,641 A 2/1995 Yee et al.
5,388,642 A 2/1995 Puri et al.
5,388,643 A 2/1995 Yee et al.
5,388,645 A 2/1995 Puri et al.
5,391,291 A 2/1995 Winquist et al.
5,392,854 A 2/1995 Vinegar et al.
5,404,952 A 4/1995 Vinegar et al.
5,409,071 A 4/1995 Wellington et al.
5,411,086 A 5/1995 Burcham et al.
5,411,089 A 5/1995 Vinegar et al.
5,411,104 A 5/1995 Stanley
5,415,231 A 5/1995 Northrop et al.
5,431,224 A 7/1995 Laali
5,433,271 A 7/1995 Vinegar et al.
5,435,666 A 7/1995 Hassett et al.
5,437,506 A 8/1995 Gray
5,439,054 A 8/1995 Chaback et al.
5,454,666 A 10/1995 Chaback et al.
5,456,315 A 10/1995 Kisman et al.
5,497,087 A 3/1996 Vinegar et al.
5,498,960 A 3/1996 Vinegar et al.
5,512,732 A 4/1996 Yagnik et al.
5,517,593 A 5/1996 Nenniger et al.
5,525,322 A 6/1996 Willms
5,541,517 A 7/1996 Hartmann et al.
5,545,803 A 8/1996 Heath et al.
5,553,189 A 9/1996 Stegemeier et al.
5,554,453 A 9/1996 Steinfeld et al.
5,566,755 A 10/1996 Seidle et al.
5,571,403 A 11/1996 Scott et al.
5,579,575 A 12/1996 Lamome et al.
5,621,844 A 4/1997 Bridges
5,621,845 A 4/1997 Bridges et al.
5,624,188 A 4/1997 West
5,632,336 A 5/1997 Notz et al.
5,652,389 A 7/1997 Schaps et al.
5,656,239 A 8/1997 Stegemeier et al.
5,713,415 A 2/1998 Bridges
5,751,895 A 5/1998 Bridges
5,759,022 A 6/1998 Koppang et al.
5,760,307 A 6/1998 Latimer et al.
5,769,569 A 6/1998 Hosseini
5,777,229 A 7/1998 Geier et al.
5,782,301 A 7/1998 Neuroth
5,826,655 A 10/1998 Snow et al.
5,828,797 A 10/1998 Minott et al.
5,861,137 A 1/1999 Edlund
5,862,858 A 1/1999 Wellington et al.
5,868,202 A 2/1999 Hsu
5,899,269 A 5/1999 Wellington et al.
5,899,958 A 5/1999 Dowell et al.
5,911,898 A 6/1999 Jacobs et al.
5,926,437 A 7/1999 Ortiz
5,935,421 A 8/1999 Brons et al.
5,968,349 A 10/1999 Duyvesteyn et al.
5,984,010 A 11/1999 Pias et al.
5,984,582 A 11/1999 Schwert
5,985,138 A 11/1999 Humphreys
5,997,214 A 12/1999 de Rouffignac et al.
6,015,015 A 1/2000 Luft et al.
6,016,867 A 1/2000 Gregoli et al.
6,016,868 A 1/2000 Gregoli et al.
6,019,172 A 2/2000 Wellington et al.
6,023,554 A 2/2000 Vinegar et al.
6,026,914 A 2/2000 Adams et al.
6,035,701 A 3/2000 Lowry et al.
6,039,121 A 3/2000 Kisman
6,056,057 A 5/2000 Vinegar et al.
6,078,868 A 6/2000 Dubinsky
6,079,499 A 6/2000 Mikus et al.
6,084,826 A 7/2000 Leggett, III
6,085,512 A 7/2000 Agee et al.
6,088,294 A 7/2000 Leggett, III et al.
6,094,048 A 7/2000 Vinegar et al.
6,102,122 A 8/2000 de Rouffignac
6,102,137 A 8/2000 Ward et al.
6,102,622 A 8/2000 Vinegar et al.
6,110,358 A 8/2000 Aldous et al.
6,112,808 A 9/2000 Isted
6,152,987 A 11/2000 Ma et al.

| | | | | |
|---|---|---|---|---|
| 6,155,117 | A | 12/2000 | Stevens et al. | |
| 6,172,124 | B1 | 1/2001 | Wolflick et al. | |
| 6,173,775 | B1 | 1/2001 | Elias et al. | |
| 6,192,748 | B1 | 2/2001 | Miller | |
| 6,193,010 | B1 | 2/2001 | Minto | |
| 6,196,350 | B1 | 3/2001 | Minto | |
| 6,269,310 | B1 | 7/2001 | Washbourne | |
| 6,288,372 | B1 | 9/2001 | Sandberg et al. | |
| 6,328,104 | B1 | 12/2001 | Graue | |
| 6,353,706 | B1 | 3/2002 | Bridges | |
| 6,354,373 | B1 | 3/2002 | Vercaemer et al. | |
| 6,357,526 | B1 | 3/2002 | Abdel-Halim et al. | |
| 6,388,947 | B1 | 5/2002 | Washbourne et al. | |
| 6,412,559 | B1 | 7/2002 | Gunter et al. | |
| 6,422,318 | B1 | 7/2002 | Rider | |
| 6,427,124 | B1 | 7/2002 | Dubinsky et al. | |
| 6,467,543 | B1 | 10/2002 | Talwani et al. | |
| 6,485,232 | B1 | 11/2002 | Vinegar et al. | |
| 6,499,536 | B1 | 12/2002 | Ellingsen | |
| 6,540,018 | B1 | 4/2003 | Vinegar | |
| 6,581,684 | B2 | 6/2003 | Wellington et al. | |
| 6,584,406 | B1 | 6/2003 | Harmon et al. | |
| 6,585,046 | B2 | 7/2003 | Neuroth et al. | |
| 6,588,266 | B2 | 7/2003 | Tubel et al. | |
| 6,588,503 | B2 | 7/2003 | Karanikas et al. | |
| 6,588,504 | B2 | 7/2003 | Wellington et al. | |
| 6,591,906 | B2 | 7/2003 | Wellington et al. | |
| 6,591,907 | B2 | 7/2003 | Zhang et al. | |
| 6,607,033 | B2 | 8/2003 | Wellington et al. | |
| 6,609,570 | B2 | 8/2003 | Wellington et al. | |
| 6,679,332 | B2 | 1/2004 | Vinegar et al. | |
| 6,684,948 | B1 | 2/2004 | Savage | |
| 6,688,387 | B1 | 2/2004 | Wellington et al. | |
| 6,698,515 | B2 | 3/2004 | Karanikas et al. | |
| 6,702,016 | B2 | 3/2004 | de Rouffignac et al. | |
| 6,708,758 | B2 | 3/2004 | de Rouffignac et al. | |
| 6,712,135 | B2 | 3/2004 | Wellington et al. | |
| 6,712,136 | B2 | 3/2004 | de Rouffignac et al. | |
| 6,712,137 | B2 | 3/2004 | Vinegar et al. | |
| 6,715,546 | B2 | 4/2004 | Vinegar et al. | |
| 6,715,547 | B2 | 4/2004 | Vinegar et al. | |
| 6,715,548 | B2 | 4/2004 | Wellington et al. | |
| 6,715,549 | B2 | 4/2004 | Wellington et al. | |
| 6,715,550 | B2 | 4/2004 | Vinegar et al. | |
| 6,719,047 | B2 | 4/2004 | Fowler et al. | |
| 6,722,429 | B2 | 4/2004 | de Rouffignac et al. | |
| 6,722,430 | B2 | 4/2004 | Vinegar et al. | |
| 6,722,431 | B2 | 4/2004 | Karanikas et al. | |
| 6,725,920 | B2 | 4/2004 | Zhang et al. | |
| 6,725,921 | B2 | 4/2004 | de Rouffignac et al. | |
| 6,725,928 | B2 | 4/2004 | Vinegar et al. | |
| 6,729,395 | B2 | 5/2004 | Shahin, Jr. et al. | |
| 6,729,396 | B2 | 5/2004 | Vinegar et al. | |
| 6,729,397 | B2 | 5/2004 | Zhang et al. | |
| 6,729,401 | B2 | 5/2004 | Vinegar et al. | |
| 6,732,794 | B2 | 5/2004 | Wellington et al. | |
| 6,732,795 | B2 | 5/2004 | de Rouffignac et al. | |
| 6,732,796 | B2 | 5/2004 | Vinegar et al. | |
| 6,736,215 | B2 | 5/2004 | Maher et al. | |
| 6,739,393 | B2 | 5/2004 | Vinegar et al. | |
| 6,739,394 | B2 | 5/2004 | Vinegar et al. | |
| 6,742,587 | B2 | 6/2004 | Vinegar et al. | |
| 6,742,588 | B2 | 6/2004 | Wellington et al. | |
| 6,742,589 | B2 | 6/2004 | Berchenko et al. | |
| 6,742,593 | B2 | 6/2004 | Vinegar et al. | |
| 6,745,831 | B2 | 6/2004 | de Rouffignac et al. | |
| 6,745,832 | B2 | 6/2004 | Wellington et al. | |
| 6,745,837 | B2 | 6/2004 | Wellington et al. | |
| 6,749,021 | B2 | 6/2004 | Vinegar et al. | |
| 6,752,210 | B2 | 6/2004 | de Rouffignac et al. | |
| 6,758,268 | B2 | 7/2004 | Vinegar et al. | |
| 6,761,216 | B2 | 7/2004 | Vinegar et al. | |
| 6,763,886 | B2 | 7/2004 | Schoeling et al. | |
| 6,769,483 | B2 * | 8/2004 | de Rouffignac et al. | 166/60 |
| 6,769,485 | B2 | 8/2004 | Vinegar et al. | |
| 6,782,947 | B2 | 8/2004 | de Rouffignac et al. | |
| 6,789,625 | B2 | 9/2004 | de Rouffignac et al. | |
| 6,805,194 | B2 | 10/2004 | Davidson et al. | |
| 6,805,195 | B2 | 10/2004 | Vinegar et al. | |
| 6,820,688 | B2 | 11/2004 | Vinegar et al. | |
| 6,854,534 | B2 | 2/2005 | Livingstone | |
| 6,866,097 | B2 | 3/2005 | Vinegar et al. | |
| 6,871,707 | B2 | 3/2005 | Karanikas et al. | |
| 6,877,554 | B2 | 4/2005 | Stegemeier et al. | |
| 6,877,555 | B2 | 4/2005 | Karanikas et al. | |
| 6,880,633 | B2 | 4/2005 | Wellington et al. | |
| 6,880,635 | B2 | 4/2005 | Vinegar et al. | |
| 6,889,769 | B2 | 5/2005 | Wellington et al. | |
| 6,896,053 | B2 | 5/2005 | Berchenko et al. | |
| 6,902,003 | B2 | 6/2005 | Maher et al. | |
| 6,902,004 | B2 | 6/2005 | de Rouffignac et al. | |
| 6,910,536 | B2 | 6/2005 | Wellington et al. | |
| 6,913,078 | B2 | 7/2005 | Shahin, Jr. et al. | |
| 6,913,079 | B2 | 7/2005 | Tubel | |
| 6,915,850 | B2 | 7/2005 | Vinegar et al. | |
| 6,918,442 | B2 | 7/2005 | Wellington et al. | |
| 6,918,443 | B2 | 7/2005 | Wellington et al. | |
| 6,923,257 | B2 | 8/2005 | Wellington et al. | |
| 6,923,258 | B2 | 8/2005 | Wellington et al. | |
| 6,929,067 | B2 * | 8/2005 | Vinegar et al. | 166/302 |
| 6,932,155 | B2 | 8/2005 | Vinegar et al. | |
| 6,948,562 | B2 | 9/2005 | Wellington et al. | |
| 6,948,563 | B2 | 9/2005 | Wellington et al. | |
| 6,951,247 | B2 | 10/2005 | de Rouffignac et al. | |
| 6,953,087 | B2 | 10/2005 | de Rouffignac et al. | |
| 6,958,704 | B2 | 10/2005 | Vinegar et al. | |
| 6,959,761 | B2 | 11/2005 | Berchenko et al. | |
| 6,964,300 | B2 | 11/2005 | Vinegar et al. | |
| 6,966,372 | B2 | 11/2005 | Wellington et al. | |
| 6,966,374 | B2 | 11/2005 | Vinegar et al. | |
| 6,969,123 | B2 | 11/2005 | Vinegar et al. | |
| 6,973,967 | B2 | 12/2005 | Stegemeier et al. | |
| 6,981,548 | B2 | 1/2006 | Wellington et al. | |
| 6,981,553 | B2 | 1/2006 | Stegemeier et al. | |
| 6,991,032 | B2 | 1/2006 | Berchenko et al. | |
| 6,994,160 | B2 | 2/2006 | Wellington et al. | |
| 6,994,168 | B2 | 2/2006 | Wellington et al. | |
| 6,994,169 | B2 | 2/2006 | Zhang et al. | |
| 6,997,255 | B2 | 2/2006 | Wellington et al. | |
| 6,997,518 | B2 | 2/2006 | Vinegar et al. | |
| 7,004,247 | B2 * | 2/2006 | Cole et al. | 166/60 |
| 7,004,251 | B2 | 2/2006 | Ward et al. | |
| 7,011,154 | B2 | 3/2006 | Maher et al. | |
| 7,032,660 | B2 | 4/2006 | Vinegar et al. | |
| 7,036,583 | B2 | 5/2006 | de Rouffignac et al. | |
| 7,040,397 | B2 | 5/2006 | de Rouffignac et al. | |
| 7,040,398 | B2 | 5/2006 | Wellington et al. | |
| 7,040,399 | B2 | 5/2006 | Wellington et al. | |
| 7,040,400 | B2 | 5/2006 | de Rouffignac et al. | |
| 7,055,600 | B2 | 6/2006 | Messier et al. | |
| 7,063,145 | B2 | 6/2006 | Veenstra et al. | |
| 7,066,254 | B2 | 6/2006 | Vinegar et al. | |
| 7,066,257 | B2 | 6/2006 | Wellington et al. | |
| 7,073,578 | B2 | 7/2006 | Vinegar et al. | |
| 7,077,198 | B2 | 7/2006 | Vinegar et al. | |
| 7,077,199 | B2 | 7/2006 | Vinegar et al. | |
| 7,086,465 | B2 | 8/2006 | Wellington et al. | |
| 7,086,468 | B2 | 8/2006 | de Rouffignac et al. | |
| 7,090,013 | B2 | 8/2006 | Wellington et al. | |
| 7,096,941 | B2 | 8/2006 | de Rouffignac et al. | |
| 7,096,942 | B1 | 8/2006 | de Rouffignac et al. | |
| 7,096,953 | B2 | 8/2006 | de Rouffignac et al. | |
| 7,100,994 | B2 | 9/2006 | Vinegar et al. | |
| 7,104,319 | B2 | 9/2006 | Vinegar et al. | |
| 7,114,566 | B2 | 10/2006 | Vinegar et al. | |
| 7,121,341 | B2 | 10/2006 | Vinegar et al. | |

| | | | |
|---|---|---|---|
| 7,121,342 | B2 | 10/2006 | Vinegar et al. |
| 7,128,153 | B2 | 10/2006 | Vinegar et al. |
| 7,147,059 | B2 | 12/2006 | Hirsch et al. |
| 7,156,176 | B2 | 1/2007 | Vinegar et al. |
| 7,165,615 | B2 * | 1/2007 | Vinegar et al. .............. 166/302 |
| 7,170,424 | B2 | 1/2007 | Vinegar et al. |
| 7,204,327 | B2 | 4/2007 | Livingstone |
| 7,219,734 | B2 | 5/2007 | Bai et al. |
| 7,225,866 | B2 | 6/2007 | Berchenko et al. |
| 2001/0049342 | A1 | 12/2001 | Passey et al. |
| 2002/0027001 | A1 | 3/2002 | Wellington et al. |
| 2002/0028070 | A1 | 3/2002 | Holen |
| 2002/0033253 | A1 | 3/2002 | de Rouffignac et al. |
| 2002/0035307 | A1 | 3/2002 | Vinegar et al. |
| 2002/0036085 | A1 | 3/2002 | Bass et al. |
| 2002/0036089 | A1 | 3/2002 | Vinegar et al. |
| 2002/0038069 | A1 | 3/2002 | Wellington et al. |
| 2002/0038709 | A1 | 4/2002 | Wellington et al. |
| 2002/0040779 | A1 | 4/2002 | Wellington et al. |
| 2002/0040780 | A1 | 4/2002 | Wellington et al. |
| 2002/0040781 | A1 | 4/2002 | Keedy et al. |
| 2002/0049360 | A1 | 4/2002 | Wellington et al. |
| 2002/0053431 | A1 | 5/2002 | Wellington et al. |
| 2002/0076212 | A1 | 6/2002 | Zhang et al. |
| 2002/0112890 | A1 | 8/2002 | Wentworth et al. |
| 2002/0112987 | A1 | 8/2002 | Hou et al. |
| 2002/0153141 | A1 | 10/2002 | Hartman et al. |
| 2003/0029617 | A1 | 2/2003 | Brown et al. |
| 2003/0038734 | A1 | 2/2003 | Hirsch et al. |
| 2003/0075318 | A1 | 4/2003 | Keedy et al. |
| 2003/0079877 | A1 | 5/2003 | Wellington et al. |
| 2003/0085034 | A1 | 5/2003 | Wellington et al. |
| 2003/0131989 | A1 | 7/2003 | Zakiewicz |
| 2003/0146002 | A1 | 8/2003 | Vinegar et al. |
| 2003/0157380 | A1 | 8/2003 | Assarabowski et al. |
| 2003/0196789 | A1 | 10/2003 | Wellington et al. |
| 2003/0196810 | A1 | 10/2003 | Vinegar et al. |
| 2003/0201098 | A1 | 10/2003 | Karanikas et al. |
| 2004/0035582 | A1 | 2/2004 | Zupanick |
| 2004/0140096 | A1 | 7/2004 | Sandberg et al. |
| 2004/0144540 | A1 | 7/2004 | Sandberg et al. |
| 2004/0144541 | A1 | 7/2004 | Picha et al. |
| 2004/0145969 | A1 | 7/2004 | Bai et al. |
| 2004/0146288 | A1 | 7/2004 | Vinegar et al. |
| 2005/0006097 | A1 | 1/2005 | Sandberg et al. |
| 2005/0269077 | A1 | 12/2005 | Sandberg |
| 2005/0269088 | A1 | 12/2005 | Vinegar et al. |
| 2005/0269089 | A1 | 12/2005 | Sandberg et al. |
| 2005/0269090 | A1 | 12/2005 | Vinegar et al. |
| 2005/0269091 | A1 | 12/2005 | Pastor-Sanz et al. |
| 2005/0269092 | A1 | 12/2005 | Vinegar |
| 2005/0269093 | A1 | 12/2005 | Sandberg et al. |
| 2005/0269094 | A1 | 12/2005 | Harris |
| 2005/0269095 | A1 | 12/2005 | Fairbanks |
| 2005/0269313 | A1 | 12/2005 | Vinegar et al. |
| 2006/0005968 | A1 | 1/2006 | Vinegar et al. |
| 2006/0213657 | A1 | 9/2006 | Berchenko et al. |
| 2006/0289536 | A1 | 12/2006 | Vinegar et al. |
| 2007/0045265 | A1 | 3/2007 | McKinzie |
| 2007/0045266 | A1 | 3/2007 | Sandberg et al. |
| 2007/0045267 | A1 | 3/2007 | Vinegar et al. |
| 2007/0045268 | A1 | 3/2007 | Vinegar et al. |
| 2007/0095536 | A1 | 5/2007 | Vinegar et al. |
| 2007/0095537 | A1 | 5/2007 | Vinegar et al. |
| 2007/0108200 | A1 | 5/2007 | McKinzie et al. |
| 2007/0108201 | A1 | 5/2007 | Vinegar et al. |
| 2007/0119098 | A1 | 5/2007 | Diaz et al. |
| 2007/0125533 | A1 | 6/2007 | Minderhoud et al. |
| 2007/0127897 | A1 | 6/2007 | John et al. |
| 2007/0131411 | A1 | 6/2007 | Vinegar et al. |
| 2007/0131415 | A1 | 6/2007 | Vinegar et al. |
| 2007/0131419 | A1 | 6/2007 | Roes et al. |
| 2007/0131420 | A1 | 6/2007 | Mo et al. |
| 2007/0131428 | A1 | 6/2007 | den Boestert et al. |
| 2007/0133959 | A1 | 6/2007 | Vinegar et al. |
| 2007/0133960 | A1 | 6/2007 | Vinegar et al. |

FOREIGN PATENT DOCUMENTS

| | | | |
|---|---|---|---|
| CA | 1165361 | | 4/1984 |
| CA | 1196594 | | 11/1985 |
| CA | 1253555 | | 5/1989 |
| CA | 1288043 | | 8/1991 |
| CA | 2015460 | | 10/1991 |
| CA | 1168283 | | 5/1994 |
| EP | 294809 | | 12/1988 |
| EP | 357314 | | 9/1993 |
| EP | 0570228 | B1 | 9/1996 |
| EP | 940558 | A1 | 9/1999 |
| GB | 156396 | | 1/1921 |
| GB | 674082 | | 6/1952 |
| GB | 697189 | | 9/1953 |
| GB | 1010023 | | 11/1965 |
| GB | 1454324 | | 11/1976 |
| GB | 1501310 | | 2/1978 |
| GB | 1588693 | | 4/1981 |
| GB | 2086416 | | 5/1982 |
| RU | 1836876 | | 12/1994 |
| SE | 121737 | | 3/1948 |
| SE | 123136 | | 11/1948 |
| SE | 123137 | | 11/1948 |
| SE | 123138 | | 11/1948 |
| SE | 126674 | | 11/1949 |
| WO | 95/06093 | | 3/1995 |
| WO | 95/12742 | | 5/1995 |
| WO | 95/12743 | | 5/1995 |
| WO | 95/12744 | | 5/1995 |
| WO | 95/12745 | | 5/1995 |
| WO | 95/12746 | | 5/1995 |
| WO | 95/33122 | | 12/1995 |
| WO | 97/01017 | | 1/1997 |
| WO | 98/50179 | | 11/1998 |
| WO | 99/01640 | | 1/1999 |
| WO | 01/81505 | A1 | 11/2001 |
| WO | 01/81723 | A1 | 11/2001 |

OTHER PUBLICATIONS

U. S. Patent and Trademark Office, "Office Communication," for U.S. Appl. No. 10/693,700 mailed Jul. 27, 2007; 8 pages; available in PAIR.

U. S. Patent and Trademark Office, "Office Communication," for U.S. Appl. No. 10/693,840 mailed Jul. 27, 2007; 13 pages; available in PAIR.

U. S. Patent and Trademark Office, "Office Communication," for U.S. Appl. No. 11/112,863 mailed Aug. 20, 2007; 8 pages; available in PAIR.

U. S. Patent and Trademark Office, "Office Communication," for U.S. Appl. No. 10/693,744 mailed Jan. 4, 2006; 14 pages; available in PAIR.

U. S. Patent and Trademark Office, "Office Communication," for U.S. Appl. No. 10/693,840 mailed Jan. 12, 2006; 27 pages; available in PAIR.

U. S. Patent and Trademark Office, "Office Communication," for U.S. Appl. No. 10/693,744 mailed Jul. 18, 2006; available in PAIR.

U. S. Patent and Trademark Office, "Office Communication," for U.S. Appl. No. 11/112,714 mailed May 21, 2007; 14 pages.

U. S. Patent and Trademark Office, "Office Communication," for U.S. Appl. No. 11/112,855 mailed Jul. 20, 2007; 4 pages.

PCT "International Search Report and Written Opinion" for International Application No. PCT/US2006/041122, mailed Mar. 9, 2007; 9 pages.

PCT "International Search Report and Written Opinion" for International Application No. PCT/US2006/041183, mailed Mar. 9, 2007; 7 pages.

Gray, "American Institute of Physics Handbook", McGraw-Hill, Inc. 1963, pp. 5-170 through 5-176.

Lyman et al. "Metals Handbook", American Society For Metals, 1961, p. 291.
Bosch et al. "Evaluation of Downhole Electric Impedance Heating Systems for Paraffin Control in Oil Wells," IEEE Transactions on Industrial Applications, 1991, vol. 28; pp. 190-194.
McGee et al. "Electrical Heating with Horizontal Wells, The Heat Transfer Problem," International Conference on Horizontal Well Tehcnology, Calgary, Alberta Canada, 1996; 14 pages.
"IEEE Recommended Practice for Electrical Impedance, Induction, and Skin Effect Heating of Pipelines and Vessels," IEEE Std. 844-200, 2000; 6 pages.
U.S. Patent and Trademark Office, "Office Communication," for U.S. Appl. No. 10/693,816 mailed Aug. 24, 2005; 14 pages; available in PAIR.
U.S. Patent and Trademark Office, "Office Communication," for U.S. Appl. No. 10/693,700 mailed Aug. 25, 2005; 14 pages; available in PAIR.
U.S. Patent and Trademark Office, "Office Communication," for U.S. Appl. No. 10/693,819 mailed Sep. 22, 2005; 7 pages; available in PAIR.
U.S. Patent and Trademark Office, "Office Communication," for U.S. Appl. No. 10/279,288 mailed Oct. 7, 2005; 13 pages; available in PAIR.
U.S. Patent and Trademark Office, "Office Communication," for U.S. Appl. No. 10/693,820 mailed Dec. 15, 2005; 13 pages; available in PAIR.
U.S. Patent and Trademark Office, "Office Communication," for U.S. Appl. No. 11/112,713 mailed Aug. 20, 2007; 6 pages; available in PAIR.
HT17. U. S. Patent and Trademark Office, "Office Communication," for U.S. Appl. No. 11/112,881 mailed May 18, 2007; 8 pages; available in PAIR.
U.S. Patent and Trademark Office, "Office Communication," for U.S. Appl. No. 10/693,820 mailed Jan. 8, 2008; 8 pages; available in PAIR.
U.S. Patent and Trademark Office, ""Office Communication,"" for U.S. Appl. No. 10/693,700 mailed Jan. 8, 2008; 7 pages; available in PAIR.
U.S. Patent and Trademark Office, "Office Communication," for U.S. Appl. No. 11/112,713 mailed Feb. 12, 2008; available in PAIR.
U.S. Patent and Trademark Office, "Office Communication," for U.S. Appl. No. 11/113,342 mailed Jan. 15, 2008; available in PAIR.
U.S. Patent and Trademark Office, "Office Communication," for U.S. Appl. No. 10/693,840 mailed Jan. 8, 2008; available in PAIR.
U.S. Patent and Trademark Office, "Office Communication," for U.S. Appl. No. 11/112,863 mailed May 16, 2008; available in PAIR.
U.S. Patent and Trademark Office, "Office Communication," for U.S. Appl. No. 11/657,442 mailed Mar. 4, 2008; available in PAIR.
U.S. Patent and Trademark Office, "Office Communication," for U.S. Appl. No. 11/112,878 mailed May 16, 2008; available in PAIR.
U.S. Patent and Trademark Office, "Office Communication," for U.S. Appl. No. 11/112,863 mailed May 23, 2008; available in PAIR.
Some Effects of Pressure on Oil-Shale Retorting, Society of Petroleum Engineers Journal, J.H. Bae, Sep. 1969; pp. 287-292.
New in situ shale-oil recovery process uses hot natural gas; The Oil & Gas Journal; May 16, 1966, p. 151.
Evaluation of Downhole Electric Impedance Heating Systems for Paraffin Control in Oil Wells; Industry Applications Society 37th Annual Petroleum and Chemical Industry Conference; The Institute of Electrical and Electronics Engineers Inc., Bosch et al., Sep. 1990, pp. 223-227.
New System Stops Paraffin Build-up; Petroleum Engineer, Eastlund et al., Jan. 1989, (3 pages).
Oil Shale Retorting: Effects of Particle Size and Heating Rate on Oil Evolution and Intraparticle Oil Degradation; Campbell et al. In Situ 2(1), 1978, pp. 1-47.
The Potential For In Situ Retorting of Oil Shale In the Piceance Creek Basin of Northwestern Colorado; Dougan et al., Quarterly of the Colorado School of Mines, pp. 57-72.
Retoring Oil Shale Underground-Problems & Possibilities; B.F. Grant, Qtly of Colorado School of Mines, pp. 39-46.
Molecular Mechanism of Oil Shale Pyrolysis in Nitrogen and Hydrogen Atmospheres, Hershkowitz et al.; Geochemistry and Chemistry of Oil Shales, American Chemical Society, May 1983 pp. 301-316.
The Characteristics of a Low Temperature in Situ Shale Oil; George Richard Hill & Paul Dougan, Quarterly of the Colorado School of Mines, 1967; pp. 75-90.
Direct Production Of A Low Pour Point High Gravity Shale Oil; Hill et al., I & EC Product Research and Development, 6(1), Mar. 1967; pp. 52-59.
Refining Of Swedish Shale Oil, L. Lundquist, pp. 621-627.
The Benefits of In Situ Upgrading Reactions to the Integrated Operations of the Orinoco Heavy-Oil Fields and Downstream Facilities, Myron Kuhlman, Society of Petroleum Engineers, Jun. 2000; pp. 1-14.
Monitoring Oil Shale Retorts by Off-Gas Alkene/Alkane Ratios, John H. Raley, Fuel, vol. 59, Jun. 1980, pp. 419-424.
The Shale Oil Question, Old and New Viewpoints, A Lecture in the Engineering Science Academy, Dr. Fredrik Ljungstrom, Feb. 23, 1950, published in Teknisk Trdskrift, Jan. 1951 p. 33-40.
Underground Shale Oil Pyrolysis According to the Ljungstroem Method; Svenska Skifferolje Aktiebolaget (Swedish Shale Oil Corp. ), IVA, vol. 24, 1953, No. 3, pp. 118-123.
Kinetics of Low-Temperature Pyrolysis of Oil Shale by the IITRI RF Process, Sresty et al.; 15th Oil Shale Symposium, Colorado School of Mines, Apr. 1982 pp. 1-13.
Bureau of Mines Oil-Shale Research, H.M. Thorne, Quarterly of the Colorado School of Mines, pp. 77-90.
Application of a Microretort to Problems in Shale Pyrolysis, A. W. Weitkamp & L.C. Gutberlet, Ind. Eng. Chem. Process Des. Develop. vol. 9, No. 3, 1970, pp. 386-395.
Oil Shale, Yen et al., Developments in Petroleum Science 5, 1976, pp. 187-189, 197-198.
The Composition of Green River Shale Oils, Glenn L. Cook, et al., United Nations Symposium on the Development and Utilization of Oil Shale Resources, 1968, pp. 1-23.
High-Pressure Pyrolysis of Green River Oil Shale, Burnham et al., Geochemistry and Chemistry of Oil Shales American Chemical Society, 1983, pp. 335-351.
Geochemistry and Pyrolysis of Oil Shales, Tissot et al., Geochemistry and Chemistry of Oil Shales, American Chemical Society, 1983, pp. 1-11.
A Possible Mechanism of Alkene/Alkane Production, Burnham et al., Oil Shale, Tar Sands, and Related Materials, American Chemical Society, 1981, pp. 79-92.
The Ljungstroem In-Situ Method of Shale Oil Recovery, G. Salomonsson, Oil Shale and Cannel Coal, vol. 2, Proceedings of the Second Oil Shale and Cannel Coal Conference, Institute of Petroleum, 1951, London, pp. 260-280.
Developments in Technology for Green River Oil Shale, G.U. Dinneen, United Nations Symposium on the Development and Utilization of Oil Shale Resources, Laramie Petroleum Research Center, Bureau of Mines, 1968, pp. 1-20.
The Thermal and Structural Properties of a Hanna Basin Coal, R.E. Glass, Transactions of the ASME, vol. 106, Jun. 1984, pp. 266-271.
The Thermal and Sturctural Properties of the Coal in the Big Coal Seam, R.E. Glass, In Situ, 8(2), 1984, pp. 193-205.
Investigation of the Temperature Variation of the Thermal Conductivity and Thermal Diffusivity of Coal, Badzioch et al., Fuel, vol. 43, No. 4, Jul. 1964, pp. 267-280.
On the Mechanism of Kerogen Pyrolysis, Alan K. Burnham & James A. Happe, Jan. 10, 1984 (17 pages).
Comparison of Methods for Measuring Kerogen Pyrolysis Rates and Fitting Kinetic Parameters, Burnham et al., Mar. 23, 1987, (29 pages).
Further Comparison of Methods for Measuring Kerogen Pyrolysis Rates and Fitting Kinetic Parameters, Burnham et al., Sep. 1987, (16 pages).
Tests of a Mechanism for $H_2S$ Release During Coal Pyrolysis, Coburn et al., May 31, 1991, (6 pages).
Kinetic Studies of Gas Evolution During Pyrolysis of Subbituminous Coal, J. H. Campbell et al., May 11, 1976, (14 pages).
Excavation of the Partial Seam Crip Underground Coal Gasification Test Site, Robert J. Cena, Aug. 14, 1987, (11 pages).

Evolution of Sulfur Gases During Coal Pyrolysis, Oh et al., Feb. 3, 1988, (11 pages).
Coal Pyrolysis and Methane Decomposition In the Presence of a Hot Char Bed, Peters et al., Aug. 1983, (21 pages).
Pyrolysis Kinetics and Maturation of Coals from the San Juan Basin, John G. Reynolds & Alan K. Burnham, Dec. 1992, (30 pages).
Numerical Model of Coal Gasification in a Packed Bed, A.M. Winslow, Apr. 1976 (27 pages).
LLL In-Situ Coal Gasification Program, Stephens et al., Jun. 14, 1976 (12 pages).
Pyrolysis of Subbituminous Coal as it Relates to In-Situ Coal Gasification, J.H. Campbell, Jan. 17, 1977 (20 pages).
The Historical Development of Underground Coal Gasification, D. Olness & D.W. Gregg, Jun. 30, 1977 (60 pages).
Laboratory Measurements of Groundwater Leaching and Transport of Pollutants Produced During Underground Coal Gasification, V.A. Dalton & J.H. Campbell, Mar. 1, 1978 (21 pages).
The Hoe Creek II Field Experiment of Underground Coal Gasification, Preliminary Results, Aiman et al., Feb. 27, 1978 (26 pages).
Ground-Water and Subsidence Investigations of the LLL In Situ Coal Gasification Experiments, Mead et al, Jul. 17-20, 1978 (31 pages).
Geotechnical Instrumentation Applied to In Situ Coal Gasification Induced Subsidence, Ganow et al. Jun. 21, 1978 (16 pages).
The Use of Tracers in Laboratory and Field Tests of Underground Coal Gasification and Oil Shale Retorting, Lyczkowski et al., Jun. 16, 1978 (19 pages).
Underground Gasification of Rocky Mountain Coal, D.R. Stephens and R.W. Hill, Jul. 18, 1978 (15 pages).
High-BTU Gas Via In Situ Coal Gasification, Stephens et al., Oct. 1978 (41 pages).
A One-Dimensional Model for In Situ Coal Gasification, Thorsness et al., Aug. 25, 1978 (76 pages).
Control Aspects of Underground Coal Gasification: LLL Investigations of Ground-Water and Subsidence Effects, Mead et al., Nov. 10, 1978 (21 pages).
Environmental Controls for Underground Coal Gasification: Ground-Water Effects and Control Technologies, Warren Mead & Ellen Raber, Mar. 14, 1980 (19 pages).
Results from the Third LLL Underground Coal Gasification Experiment at Hoe Creek, Hill et al., May 20, 1980 (12 pages).
Results From the Hoe Creek No. 3 Underground Coal Gasification Experiment, Thorsness et al., May 1980, (11 pages).
Steam Tracer Experiment at the Hoe Creek No. 3 Underground Coal Gasification Field Test, C.B. Thorsness, Nov. 26, 1980 (51 pages).
Computer Models to Support Investigations of Surface Subsidence and Associated Ground Motion Induced by Underground Coal Gasification, R.T. Langland & B.C. Trent, Jul. 1981 (16 pages).
Burn Cavity Growth During the Hoe Creek No. 3 Underground Coal Gasification Experiment, R.W. Hill, Jun. 8, 1981 (28 pages).
The Controlled Retracting Injection Point (Crip) System: A Modified Stream Method for *In Site* Coal Gasification, R.W. Hill & M.J. Shannon, Apr. 15, 1981 (11 pages).
Coal Block Gasification Experiments: Laboratory Results and Field Plans: C.B. Thorsness & R.W. Hill, Jul. 1981 (23 pages).
Laboratory Scale Simulation of Underground Coal Gasification: Experiment and Theory, J.R. Creighton & (27 pages).
Underground Coal Gasification—A Leading Contender in the Synfuels Industry, D.R. Stephens, Oct. 27, 1981 (42 pages).
Computer Models to Support Investigations of Surface Subsidence and Associated Ground Motion Induced by Underground Coal Gasification, B.C. Trent & R.T. Langland, Aug. 1981 (40 pages).
The Hoe Creek Experiements: LLNL's Underground Coal Gasification Project in Wyoming, D.R. Stephens, Oct. 1981 (162 pages).
Technical Underground Coal Gasification Summation: 1982 Status, Stephens et al., Jul. 1982 (22 pages).
Review of Underground Coal Gasification Field Experiments at Hoe Creek (34 pages).
Underground Coal Gasification Using Oxygen and Steam, Stephens et al., Jan. 19, 1984 (37 pages).
Shale Oil Cracking Kinetics and Diagnostics, Bissell et al., Nov. 1983, (27 pages).
Mathematical Modeling of Modified In Situ and Aboveground Oil Shale Retorting, Robert L. Braun, Jan. 1981 (45 pages).
Progress Report on Computer Model for In Situ Oil Shale Retorting, R.L. Braun & R.C.Y. Chin, Jul. 14, 1977 (34 pages).
Analysis of Multiple Gas-Solid Reactions During the Gasification of Char in Oil Shale Blocks, Braun et al., Apr. 1981 (14 pages).
Chemical Kinetics and Oil Shale Process Design, Alan K. Burnham, Jul. 1993 (16 pages).
Reaction Kinetics and Diagnostics For Oil Shale Retorting, Alan K. Burnham, Oct. 19, 1981 (32 pages).
Reaction Kinetics Between Steam and Oil Shale Char, A.K. Burnham, Oct. 1978 (8 pages).
General Kinetic Model of Oil Shale Pyrolysis, Alan K. Burnham & Robert L. Braun, Dec. 1984 (25 pages).
General Model of Oil Shale Pyrolysis, Alan K. Burnham & Robert L. Braun, Nov. 1983 (22 pages).
Pyrolysis Kinetics for Green River Oil Shale From the Saline Zone, Burnham et al., Feb. 1982 (33 pages).
Reaction Kinetics Between $CO_2$ and Oil Shale Char, A.K. Burnham, Mar. 22, 1978 (9 pages front & back).
Reaction Kinetics Between $CO_2$ and Oil Shale Residual Carbon. I. Effect of Heating Rate on Reactivity, Alan K. Burnham, Jul. 11, 1978 (11 pages front and back).
High-Pressure Pyrolysis of Colorado Oil Shale, Alan K. Burnham & Mary F. Singleton, Oct. 1982 (23 pages).
A Possible Mechanism Of Alkene/Alkane Production in Oil Shale Retorting, A.K. Burnham, R.L. Ward, Nov. 26, 1980 (20 pages).
Enthalpy Relations For Eastern Oil Shale, David W. Camp, Nov. 1987 (13 pages).
Oil Shale Retorting: Part 3 A Correlation of Shale Oil 1-Alkene/*n*-Alkane Ratios With Yield, Coburn et al., Aug. 1, 1977 (18 pages).
The Composition of Green River Shale Oil, Glen L. Cook, et al., 1968 (12 pages).
On-line, Mass Spectrometric Determination of Ammonia From Oil Shale Pyrolysis Using Isobutane Chemical Ionization, Crawford et al., Mar. 1988 (16 pages).
Thermal Degradation of Green River Kerogen at 150° to 350° C. Rate of Production Formation, J.J. Cummins & W.E. Robinson, 1972 (18 pages).
Retorting of Green River Oil Shale Under High-Pressure Hydrogen Atmospheres, LaRue et al., Jun. 1977 (38 pages).
A Laboratory Study of Green River Oil Shale Retorting Under Pressure In a Nitrogen Atmosphere, Wise et al., Sep. 1976 (24 pages).
Quantitative Analysis and Evolution of Sulfur-Containing Gases from Oil Shale Pyrolysis by Triple Quadrupole Mass Spectrometry, Wong et al., Nov. 1983 (34 pages).
Quantitative Analysis & Kinetics of Trace Sulfur Gas Species from Oil Shale Pyrolysis by Triple Quadrupole Mass Spectrometry (TQMS), Wong et al., Jul. 5-7, 1983 (34 pages).
Application of Self-Adaptive Detector System on a Triple Quadrupole MS/MS to High Expolsives and Sulfur-Containing Pyrolysis Gases from Oil Shale, Carla M. Wong & Richard W. Crawford, Oct. 1983 (17 pages).
An Evaluation of Triple Quadrupole MS/MS for On-Line Gas Analyses of Trace Sulfur Compounds from Oil Shale Processing, Wong et al., Jan. 1985 (30 pages).
Source and Kinetics of Sulfur Species in Oil Shale Pyrolysis Gas by Triple Quadrupole Mass Spectrometry, Wong et al., Oct. 1983 (14 pages).
The Centralia Partial Seam CRIP Underground Coal Gasification Experiment, Cena et al., Jun. 1984 (38 pages).
Results of the Centralia Underground Coal Gasification Field Test, Hill et al., Aug. 1984 (18 pages).
Excavation of the Partial Seam Crip Underground Coal Gasification Test Site, Cena et al., Aug. 14, 1987 (11 pages).
Assessment of the CRIP Process for Underground Coal Gasification: The Rocky Mountain I Test, Cena et al., Aug. 1, 1988 (22 pages).
Mild Coal Gasification-Products Separation, Pilot-Unit Support, Twin Screw Heat Transfer, and $H_2S$ Evolution, Camp et al., Aug. 9, 1991 (12 pages).
Underground Coal Gasification Site Selection and Characterization in Washington State and Gasification Test Designs, Randolph Stone & R.W. Hill, Sep. 10, 1980 (62 pages).

Proposed Field Test of the Lins Mehtod Thermal Oil Recovery Process in Athabasca McMurray Tar Sands McMurray, Alberta; Husky Oil Company cody, Wyoming.
Appalachian Coals: Potential Reservoirs for Sequestering Carbon Dioxide Emissions from Power Plants While Enhancing CBM Production; C.W. Byer, et al., Proceedings of the International Coalbed Methane Symposium.
The Pros and Cons of Carbon Dioxide Dumping Global Warming Concerns Have Stimulated a Search for Carbon Sequestration Technologies; C. Hanisch, Environmental Science and Technology, American Chemical Society, Easton, PA.
Pilot Test Demonstrates How Carbon Dioxide Enhances Coal Bed Methane Recovery, Lanny Schoeling and Michael McGovern, Petroleum Technology Digest, Sep. 2000, p. 14-15.
In Situ Measurement of Some Thermoporoelastic Parameters of a Granite, Berchenko et al., Poromechanics, A Tribute to Maurice Biot, 1998, p. 545-550.
Conversion characteristics of selected Canadian coals based on hydrogenation and pyrolysis experiments, W. Kalkreuth, C. Roy, and M. Steller. Geological Survey of Canada, Paper 89-8, 1989, pp. 108-114, XP001014535.
Tar and Pitch, G. Collin and H. Hoeke. Ullmann's Encyclopedia of Industrial Chemistry, vol. A 26, 1995, p. 91-127.
Coal, Encyclopedia of Chemical Technology, Kirk, R.E., Kroschwitz, J.I., Othmer, D.F., Wiley, New York, 4th edition, 1991, vol. 6, pp. 423-488.
Cortez et al., UK Patent Application GB 2,068,014 A, Date of Publication: Aug. 5, 1981.
Wellington et al., U.S. Appl. No. 60/273,354, filed Mar. 5, 2001.
The VertiTrak System Brochure, Baker Hughes, INT-01-1307A4, 2001 8 pages.
Thermal, Mechanical, and Physical Properties of Selected Bituminous Coals and Cokes, J. M. Singer and R. P. Tye, US Department of Interior, Bureau of Mines (1979) Government Report No. 8364.
Coalbed Methane: Principles and Practice, Rogers, Rudy E. Prentice-Hall, Inc. 1994, pp. 68-97.
Department of Energy Coal Sample Bank and Database http://www.energy.psu.edu/arg/doesb.htm, Jun. 4, 2002.
Coalbed Methane: Principles and Practice, Rogers, Rudy E. Prentice-Hall, Inc. 1994, pp. 164-165.
Geology for Petroleum Exploration, Drilling, and Production. Hyne, Norman J. McGraw-Hill Book Company, 1984, p. 264.
Modern Petroleum Technology, Hobson, G.D., Halsted Press, Applied Science Publishers LTD. 1973, pp. 786, 787.
Van Krevelen, Coal: Typology-Physics-Chemistry-Constitution, 1993, pp. 27, 42, 52, 322, 323, 324, 325, 326, 526, 527, 726.
Genrich et al.; "A Simplified Performance-Predictive Model for In-situ Combustion Processes", Society of Petroleum Engineers Reservoir Engineering, May 1988, pp. 410-418.
Adegbesan et al.; "Low-Temperature-Oxidation Kinetic Parameters for in-Situ Combustion: Numerical Simulation", SPE Reservoir Engineering, Nov. 1987, pp. 573-582.
"Brief: Magnetostatic Well-Tracking Technique for Drilling Horizontal Parallel Wells" J. Petroleum Technology, 1995, pp. 119-120.
Nekut et al. "Rotating Magnet Ranging-A New Drilling Guidance Technology", Vector Magnetics, Presentation, Jun. 2000, p. 1-24.
Van Krevelen, D. W. *Coal: Typology-Physics-Chemistry-Constitution*, 1993, p. 371.
Burnham, Alan, K. "Oil Shale Retorting Dependence of timing and composition on temperature and heating rate", Jan. 27, 1995, (23 pages).
Burnham et al. A Possible Mechanism of Alkene/Alkane Production in Oil Shale Retorting, (7 pages).
Campbell, et al., "Kinetics of oil generation from Colorado Oil Shale" IPC Business Press, Fuel, 1978, (3 pages).
Cummins et al. "Thermal Degradation of Green River Kerogen at 150° to 350° C.", Report of Investigations 7620, U.S. Government Printing Office, 1972, (pp. 1-15).
Cook, et al. "The Composition of Green River Shale Oils", United Nations Symposium on the Development and Utilization of Oil Shale Resources, Tallinn, 1968, (pp. 1-23).
Hill et al., "The Characteristics of a Low Temperature in situ Shale Oil" American Institute of Mining, Metallurgical & Petroleum Engineers, 1967 (pp. 75-90)..
Dinneen, et al. "Developments in Technology for Green River Oil Shale" United Nations Symposium on the Development and Utilization of Oil Shale Resources, Tallinn, 1968, (pp. 1-20).
De Rouffignac, E. In Situ Resistive Heating of Oil Shale for Oil Production-A Summary of the Swedish Data, (4 pages).
Dougan, et al. "The Potential for in situ Retorting of Oil Shale in the Piceance Creek Basin of Northwestern Colorado", Quarterly of the Colorado School of Mines (pp. 57-72).
Hill et al. "Direct Production of Low Pour Point High Gravity Shale Oil" I&EC Product Research and Development, 1967, vol. 6, (pp. 52-59).
Yen et al., "Oil Shale" Developments in Petroleum Science, 5, Elsevier Scientific Publishing Co., 1976 (pp. 187-198).
SSAB report, "A Brief Description of the Ljungstrom Method for Shale Oil Production," 1950, (12 pages).
Salomonsson G., SSAB report, The Lungstrom In Situ-Method for Shale Oil Recovery, 1950 (28 pages).
"Swedish shale oil-Production method in Sweden," Organisation for European Economic Co-operation, 1952, (70 pages).
SSAB report, "Kvarn Torp" 1958, (36 pages).
SSAB report, "Kvarn Torp" 1951 (35 pages).
SSAB report, "Summary study of the shale oil works at Narkes Kvarntorp" (15 pages).
Vogel et al. "An Analog Computer for Studying Heat Transfrer during a Thermal Recovery Process," AIME Petroleum Transactions, 1955 (pp. 205-212).
"Skiferolja Genom Uppvarmning AV Skifferberget," Faxin Department och Namder, 1941, (3 pages).
"Aggregeringens orsaker och ransoneringen grunder", Av director E.F.Cederlund I Statens livesmedelskonmmission (1 page).
Ronnby, E. "Kvarntorp-Sveriges Storsta skifferoljeindustri," 1943, (9 pages).
SAAB report, "The Swedish Shale Oil Industry," 1948 (8 pages).
Gejrot et al., "The Shale Oil Industry in Sweden," Carlo Colombo Publishers-Rome, Proceedings of the Fourth World Petroleum Congress, 1955 (8 pages).
Hedback, T. J., The Swedish Shale as Raw Material for Production of Power, Oil and Gas, XIth Sectional Meeting World Power Conference, 1957 (9 pages).
SAAB, "Santa Cruz, California, Field Test of the Lins Method for the Recovery of Oil from Sand", 1955 vol. 1, (141 pages) English.
SAAB, "Santa Cruz, California, Field Test of the Lins Method for the Recovery of Oil from Sand-Figures", 1955 vol. 2, (146 pages) English.
"Santa Cruz, California, Field Test of the Lins Method for the Recovery of Oil from Sand-Memorandum re: tests", 1955 vol. 3, (256 pages) English.
Helander, R.E., "Santa Cruz, California, Field Test of Carbon Steel Burner Casings for the Lins Method of Oil Recovery", 1959 (38 pages) English.
Helander et al., Santa Cruz, California, Field Test of Fluidized Bed Burners for the Lins Method of Oil Recovery 1959, (86 pages) English.
SSAB report, "Bradford Residual Oil, Athatbasa Ft. McMurray" 1951, (207 pages), partial translation.
"Lins Burner Test Results-English" 1959-1960.
SSAB "Annual Reports, SSAB Laboratory, Address Annually Issues-Shale and Ash, Oil, Gas, Waste Water, Analytical", 1953-1954, (166 pages). Swedish.
SSAB report, "Financial Matter, Swedish taxes, etc.," 1960-1961 (37 pages). Swedish.
SSAB report, "Cost For Mining," 1959-1979 (13 pages). Swedish.
SSAB report, "Cost Comparison of Mining and Processing of Shale and Dolomite Using Various Production Alternatives", 1960, (64 pages). Swedish.
SSAB report, "Assessment of Future Mining Alternatives of Shale and Dolomite," 1962, (59 pages) Swedish.
SSAB report. "Kartong 2 Shale: Ljungstromsanlaggningen" (104 pages) Swedish.
SAAB, "Photos", (18 pages).

SAAB report, "Swedish Geological Survey Report, Plan to Delineate Oil shale Resource in Narkes Area (near Kvarntorp)," 1941 (13 pages). Swedish.
SAAB report, "Recovery Efficiency," 1941, (61 pages). Swedish.
SAAB report, "Geologic Work Conducted to Assess Possibility of Expanding Shale Mining Area in Kvarntorp; Drilling Results, Seismic Results," 1942 (79 pages). Swedish.
SSAB report, "Ojematinigar vid Norrtorp," 1945 (141 pages).
SSAB report, "Inhopplingschema, Norrtorp II 20/3-17/8", 1945 (50 pages). Swedish.
SSAB report, "Secondary Recovery after LINS," 1945 (78 pages).
SSAB report, "Maps and Diagrams, Geology," 1947 (137 pages). Swedish.
SSAB report, Styrehseprotoholl, 1943 (10 pages). Swedish.
SSAB report, "Early Shale Retorting Trials" 1951-1952, (134 pages). Swedish.
SSAB report, "Analysis of Lujunstrom Oil and its Use as Liquid Fuel," Thesis by E. Pals, 1949 (83 pages). Swedish.
SSAB report, "Environmental Sulphur and Effect on Vegetation," 1951 (50 pages). Swedish.
SSAB report, "Tar Sands", vol. 135 1953 (20 pages, pp. 12-15 translated). Swedish.
SSAB report, "Assessment of Skanes Area (Southern Sweden) Shales as Fuel Source," 1954 (54 pages). Swedish.
SSAB report, "From as Utre Dn Text Geology Reserves," 1960 (93 pages). Swedish.
SSAB report, "Kvarntorps-Environmental Area Asessment," 1981 (50 pages). Swedish.
Rangel-German et al., "Electrical-Heating-Assisted Recovery for Heavy Oil", pp. 1-43.
Kovescek, Anthony R., "Reservoir Engineering analysis of Novel Thermal Oil Recovery Techniques applicable to Alaskan North Slope Heavy Oils", pp. 1-6.
Poerter, H. P., Petroleum Dictionary for Oil, Field, and Factory, The Gulf Publishing Company, 1948, 4th Ed., p. 312.
PCT "International Search Report" for International Application No. PCT/US 02/34272 mailed on May 15, 2003; 9 pages.
PCT "International Preliminary Examination Report" for International Application No. PCT/US 02/34272 mailed on Jan. 23, 2004; 9 pages.
PCT "International Search Report" for International Application No. PCT/US 02/34384 mailed on May 7, 2003; 8 pages.
PCT "International Preliminary Examination Report" for International Application No. PCT/US 02/34384 mailed on Jan. 23, 2004; 6 pages.
PCT "International Search Report" for International Application No. PCT/US 02/34209 mailed on Feb. 19, 2003; 7 pages.
PCT "International Preliminary Examination Report" for International Application No. PCT/US 02/34209 mailed on Jan. 23, 2004; 5 pages.
PCT "International Search Report" for International Application No. PCT/US 02/34212 mailed on Feb. 19, 2003; 8 pages.
PCT "International Preliminary Examination Report" for International Application No. PCT/US 02/34212 mailed on Jan. 23, 2004; 6 pages.
PCT "International Search Report" for International Application No. PCT/US 02/34265 mailed on Feb. 19, 2003; 8 pages.
PCT "International Preliminary Examination Report" for International Application No. PCT/US 02/34265 mailed on Jan. 23, 2004; 6 pages.
PCT "International Search Report" for International Application No. PCT/US 02/34207 mailed on Feb. 28, 2003; 7 pages.
PCT "International Preliminary Examination Report" for International Application No. PCT/US 02/34207 mailed on Jan. 23, 2004; 5 pages.
PCT "International Search Report" for International Application No. PCT/US 02/34266 mailed on May 7, 2003; 12 pages.
PCT "International Preliminary Examination Report" for International Application No. PCT/US 02/34266 mailed on Jan. 23, 2004; 9 pages.
PCT "International Search Report" for International Application No. PCT/US 02/34201 mailed on May 7, 2003; 7 pages.
PCT "International Preliminary Examination Report" for International Application No. PCT/US 02/34201 mailed on Jan. 23, 2004; 5 pages.
PCT "International Search Report" for International Application No. PCT/US 02/34203 mailed on May 7, 2003; 7 pages.
PCT "International Preliminary Examination Report" for International Application No. PCT/US 02/34203 mailed on Jan. 23, 2004; 5 pages.
PCT "International Search Report" for International Application No. PCT/US 02/34274 mailed on Apr. 6, 2003; 9 pages.
PCT "International Preliminary Examination Report" for International Application No. PCT/US 02/34274 mailed on Jan. 23, 2004; 5 pages.
PCT "International Search Report" for International Application No. PCT/US 02/34263 mailed on May 7, 2003; 7 pages.
PCT "International Preliminary Examination Report" for International Application No. PCT/US 02/34263 mailed on Jan. 23, 2004; 5 pages.
PCT "International Search Report" for International Application No. PCT/US 02/34210 mailed on May 7, 2003; 5 pages.
PCT "International Preliminary Examination Report" for International Application No. PCT/US 02/34210 mailed on Jan. 23, 2004; 5 pages.
PCT "International Search Report" for International Application No. PCT/US 02/34533 mailed on May 7, 2003; 7 pages.
PCT "International Preliminary Examination Report" for International Application No. PCT/US 02/34533 mailed on Jan. 23, 2004; 5 pages.
PCT "International Search Report" for International Application No. PCT/US 02/34536 mailed on Feb. 19, 2003; 7 pages.
PCT "International Preliminary Examination Report" for International Application No. PCT/US 02/34536 mailed on Jan. 23, 2004; 5 pages.
PCT "International Search Report" for International Application No. PCT/US 02/34198 mailed on Aug. 7, 2003; 9 pages.
PCT "International Preliminary Examination Report" for International Application No. PCT/US 02/34198 mailed on Jan. 23, 2004; 6 pages.
PCT "International Search Report" for International Application No. PCT/US 02/34385 mailed on Feb. 21, 2003; 6 pages.
PCT "International Search Report" for International Application No. PCT/US 02/34263 mailed on Dec. 2, 2004; 6 pages.

* cited by examiner

IN SITU RECOVERY FROM A HYDROCARBON CONTAINING FORMATION

PRIORITY CLAIM

This application claims priority to Provisional Patent Application No. 60/334,568 entitled "IN SITU RECOVERY FROM A HYDROCARBON CONTAINING FORMATION" filed on Oct. 24, 2001, to Provisional Patent Application No. 60/337,136 entitled "IN SITU THERMAL PROCESSING OF A HYDROCARBON CONTAINING FORMATION" filed on Oct. 24, 2001, to Provisional Patent Application No. 60/374,970 entitled "IN SITU THERMAL RECOVERY FROM A HYDROCARBON CONTAINING FORMATION" filed on Apr. 24, 2002, and to Provisional Patent Application No. 60/374,995 entitled "IN SITU THERMAL PROCESSING OF A HYDROCARBON COATING FORMATION" filed on Apr. 24, 2002. This application is a divisional of U.S. patent application Ser. No. 10/279,288 filed Oct. 24, 2002, now U.S. Pat. No. 7,165,615, which is hereby incorporated by reference.

BACKGROUND

1. Field of the Invention

The present invention relates generally to methods and systems for production of hydrocarbons, hydrogen, and/or other products from various hydrocarbon containing formations. Certain embodiments relate to in situ conversion of hydrocarbons to produce hydrocarbons, hydrogen, and/or novel product streams from underground hydrocarbon containing formations.

2. Description of Related Art

Hydrocarbons obtained from subterranean (e.g., sedimentary) formations are often used as energy resources, as feedstocks, and as consumer products. Concerns over depletion of available hydrocarbon resources and over declining overall quality of produced hydrocarbons have led to development of processes for more efficient recovery, processing and/or use of available hydrocarbon resources. In situ processes may be used to remove hydrocarbon materials from subterranean formations. Chemical and/or physical properties of hydrocarbon material within a subterranean formation may need to be changed to allow hydrocarbon material to be more easily removed from the subterranean formation. The chemical and physical changes may include in situ reactions that produce removable fluids, composition changes, solubility changes, density changes, phase changes, and/or viscosity changes of the hydrocarbon material within the formation. A fluid may be, but is not limited to, a gas, a liquid, an emulsion, a slurry, and/or a stream of solid particles that has flow characteristics similar to liquid flow.

Examples of in situ processes utilizing downhole heaters are illustrated in U.S. Pat. Nos. 2,634,961 to Ljungstrom, 2,732,195 to Ljungstrom, 2,780,450 to Ljungstrom, 2,789,805 to Ljungstrom, 2,923,535 to Ljungstrom, and 4,886,118 to Van Meurs et al., each of which is incorporated by reference as if fully set forth herein.

Application of heat to oil shale formations is described in U.S. Pat. Nos. 2,923,535 to Ljungstrom and 4,886,118 to Van Meurs et al. Heat may be applied to the oil shale formation to pyrolyze kerogen within the oil shale formation. The heat may also fracture the formation to increase permeability of the formation. The increased permeability may allow formation fluid to travel to a production well where the fluid is removed from the oil shale formation. In some processes disclosed by Ljungstrom, for example, an oxygen containing gaseous medium is introduced to a permeable stratum, preferably while still hot from a preheating step, to initiate combustion.

A heat source may be used to heat a subterranean formation. Electric heaters may be used to heat the subterranean formation by radiation and/or conduction. An electric heater may resistively heat an element. U.S. Pat. No. 2,548,360 to Germain, which is incorporated by reference as if fully set forth herein, describes an electric heating element placed within a viscous oil within a wellbore. The heater element heats and thins the oil to allow the oil to be pumped from the wellbore. U.S. Pat. No. 4,716,960 to Eastlund et al., which is incorporated by reference as if fully set forth herein, describes electrically heating tubing of a petroleum well by passing a relatively low voltage current through the tubing to prevent formation of solids. U.S. Pat. No. 5,065,818 to Van Egmond, which is incorporated by reference as if fully set forth herein, describes an electric heating element that is cemented into a well borehole without a casing surrounding the heating element.

U.S. Pat. No. 6,023,554 to Vinegar et al., which is incorporated by reference as if fully set forth herein, describes an electric heating element that is positioned within a casing. The heating element generates radiant energy that heats the casing. A granular solid fill material may be placed between the casing and the formation. The casing may conductively heat the fill material, which in turn conductively heats the formation.

U.S. Pat. No. 4,570,715 to Van Meurs et al., which is incorporated by reference as if fully set forth herein, describes an electric heating element. The heating element has an electrically conductive core, a surrounding layer of insulating material, and a surrounding metallic sheath. The conductive core may have a relatively low resistance at high temperatures. The insulating material may have electrical resistance, compressive strength, and heat conductivity properties that are relatively high at high temperatures. The insulating layer may inhibit arcing from the core to the metallic sheath. The metallic sheath may have tensile strength and creep resistance properties that are relatively high at high temperatures.

U.S. Pat. No. 5,060,287 to Van Egmond, which is incorporated by reference as if fully set forth herein, describes an electrical heating element having a copper-nickel alloy core.

Combustion of a fuel may be used to heat a formation. Combusting a fuel to heat a formation may be more economical than using electricity to heat a formation. Several different types of heaters may use fuel combustion as a heat source that heats a formation. The combustion may take place in the formation, in a well, and/or near the surface. Combustion in the formation may be a fireflood. An oxidizer may be pumped into the formation. The oxidizer may be ignited to advance a fire front towards a production well. Oxidizer pumped into the formation may flow through the formation along fracture lines in the formation. Ignition of the oxidizer may not result in the fire front flowing uniformly through the formation.

A flameless combustor may be used to combust a fuel within a well. U.S. Pat. Nos. 5,255,742 to Mikus, 5,404,952 to Vinegar et al., 5,862,858 to Wellington et al., and 5,899,269 to Wellington et al., which are incorporated by reference as if fully set forth herein, describe flameless combustors. Flameless combustion may be accomplished by preheating a fuel and combustion air to a temperature above an auto-ignition temperature of the mixture. The fuel and combustion air may be mixed in a heating zone to combust. In the heating zone of the flameless combustor, a catalytic surface may be provided to lower the auto-ignition temperature of the fuel and air mixture.

Heat may be supplied to a formation from a surface heater. The surface heater may produce combustion gases that are circulated through wellbores to heat the formation. Alternately, a surface burner may be used to heat a heat transfer fluid that is passed through a wellbore to heat the formation. Examples of fired heaters, or surface burners that may be used to heat a subterranean formation, are illustrated in U.S. Pat. Nos. 6,056,057 to Vinegar et al. and 6,079,499 to Mikus et al., which are both incorporated by reference as if fully set forth herein.

Coal is often mined and used as a fuel within an electricity generating power plant. Most coal that is used as a fuel to generate electricity is mined. A significant number of coal formations are, however, not suitable for economical mining. For example, mining coal from steeply dipping coal seams, from relatively thin coal seams (e.g., less than about 1 meter thick), and/or from deep coal seams may not be economically feasible. Deep coal seams include coal seams that are at, or extend to, depths of greater than about 3000 feet (about 914 m) below surface level. The energy conversion efficiency of burning coal to generate electricity is relatively low, as compared to fuels such as natural gas. Also, burning coal to generate electricity often generates significant amounts of carbon dioxide, oxides of sulfur, and oxides of nitrogen that are released into the atmosphere.

Synthesis gas may be produced in reactors or in situ within a subterranean formation. Synthesis gas may be produced within a reactor by partially oxidizing methane with oxygen. In situ production of synthesis gas may be economically desirable to avoid the expense of building, operating, and maintaining a surface synthesis gas production facility. U.S. Pat. No. 4,250,230 to Terry, which is incorporated by reference as if fully set forth herein, describes a system for in situ gasification of coal. A subterranean coal seam is burned from a first well towards a production well. Methane, hydrocarbons, $H_2$, CO, and other fluids may be removed from the formation through the production well. The $H_2$ and CO may be separated from the remaining fluid. The $H_2$ and CO may be sent to fuel cells to generate electricity.

U.S. Pat. No. 4,057,293 to Garrett, which is incorporated by reference as if fully set forth herein, discloses a process for producing synthesis gas. A portion of a rubble pile is burned to heat the rubble pile to a temperature that generates liquid and gaseous hydrocarbons by pyrolysis. After pyrolysis, the rubble is further heated, and steam or steam and air are introduced to the rubble pile to generate synthesis gas.

U.S. Pat. No. 5,554,453 to Steinfeld et al., which is incorporated by reference as if fully set forth herein, describes an ex situ coal gasifier that supplies fuel gas to a fuel cell. The fuel cell produces electricity. A catalytic burner is used to burn exhaust gas from the fuel cell with an oxidant gas to generate heat in the gasifier.

Carbon dioxide may be produced from combustion of fuel and from many chemical processes. Carbon dioxide may be used for various purposes, such as, but not limited to, a feed stream for a dry ice production facility, supercritical fluid in a low temperature supercritical fluid process, a flooding agent for coal bed demethanation, and a flooding agent for enhanced oil recovery. Although some carbon dioxide is productively used, many tons of carbon dioxide are vented to the atmosphere.

Retorting processes for oil shale may be generally divided into two major types: aboveground (surface) and underground (in situ). Aboveground retorting of oil shale typically involves mining and construction of metal vessels capable of withstanding high temperatures. The quality of oil produced from such retorting may typically be poor, thereby requiring costly upgrading. Aboveground retorting may also adversely affect environmental and water resources due to mining, transporting, processing, and/or disposing of the retorted material. Many U.S. patents have been issued relating to aboveground retorting of oil shale. Currently available aboveground retorting processes include, for example, direct, indirect, and/or combination heating methods.

In situ retorting typically involves retorting oil shale without removing the oil shale from the ground by mining. "Modified" in situ processes typically require some mining to develop underground retort chambers. An example of a "modified" in situ process includes a method developed by Occidental Petroleum that involves mining approximately 20% of the oil shale in a formation, explosively rubblizing the remainder of the oil shale to fill up the mined out area, and combusting the oil shale by gravity stable combustion in which combustion is initiated from the top of the retort. Other examples of "modified" in situ processes include the "Rubble In Situ Extraction" ("RISE") method developed by the Lawrence Livermore Laboratory ("LLL") and radio-frequency methods developed by IIT Research Institute ("IITRI") and LLL, which involve tunneling and mining drifts to install an array of radio-frequency antennas in an oil shale formation.

Obtaining permeability within an oil shale formation (e.g., between injection and production wells) tends to be difficult because oil shale is often substantially impermeable. Many methods have attempted to link injection and production wells, including: hydraulic fracturing such as methods investigated by Dow Chemical and Laramie Energy Research Center; electrical fracturing (e.g., by methods investigated by Laramie Energy Research Center); acid leaching of limestone cavities (e.g., by methods investigated by Dow Chemical); steam injection into permeable nahcolite zones to dissolve the nahcolite (e.g., by methods investigated by Shell Oil and Equity Oil); fracturing with chemical explosives (e.g., by methods investigated by Talley Energy Systems); fracturing with nuclear explosives (e.g., by methods investigated by Project Bronco); and combinations of these methods. Many of such methods, however, have relatively high operating costs and lack sufficient injection capacity.

An example of an in situ retorting process is illustrated in U.S. Pat. No. 3,241,611 to Dougan, assigned to Equity Oil Company, which is incorporated by reference as if fully set forth herein. For example, Dougan discloses a method involving the use of natural gas for conveying kerogen-decomposing heat to the formation. The heated natural gas may be used as a solvent for thermally decomposed kerogen. The heated natural gas exercises a solvent-stripping action with respect to the oil shale by penetrating pores that exist in the shale. The natural gas carrier fluid, accompanied by decomposition product vapors and gases, passes upwardly through extraction wells into product recovery lines, and into and through condensers interposed in such lines, where the decomposition vapors condense, leaving the natural gas carrier fluid to flow through a heater and into an injection well drilled into the deposit of oil shale.

Large deposits of heavy hydrocarbons (e.g., heavy oil and/or tar) contained within relatively permeable formations (e.g., in tar sands) are found in North America, South America, Africa, and Asia. Tar can be surface-mined and upgraded to lighter hydrocarbons such as crude oil, naphtha, kerosene, and/or gas oil. Tar sand deposits may, for example, first be mined. Surface milling processes may further separate the bitumen from sand. The separated bitumen may be converted to light hydrocarbons using conventional refinery methods.

Mining and upgrading tar sand is usually substantially more expensive than producing lighter hydrocarbons from conventional oil reservoirs.

U.S. Pat. Nos. 5,340,467 to Gregoli et al. and 5,316,467 to Gregoli et al., which are incorporated by reference as if fully set forth herein, describe adding water and a chemical additive to tar sand to form a slurry. The slurry may be separated into hydrocarbons and water.

U.S. Pat. No. 4,409,090 to Hanson et al., which is incorporated by reference as if fully set forth herein, describes physically separating tar sand into a bitumen-rich concentrate that may have some remaining sand. The bitumen-rich concentrate may be further separated from sand in a fluidized bed.

U.S. Pat. Nos. 5,985,138 to Humphreys and 5,968,349 to Duyvesteyn et al., which are incorporated by reference as if fully set forth herein, describe mining tar sand and physically separating bitumen from the tar sand. Further processing of bitumen in treatment facilities may upgrade oil produced from bitumen.

In situ production of hydrocarbons from tar sand may be accomplished by heating and/or injecting a gas into the formation. U.S. Pat. Nos. 5,211,230 to Ostapovich et al. and 5,339,897 to Leaute, which are incorporated by reference as if fully set forth herein, describe a horizontal production well located in an oil-bearing reservoir. A vertical conduit may be used to inject an oxidant gas into the reservoir for in situ combustion.

U.S. Pat. No. 2,780,450 to Ljungstrom describes heating bituminous geological formations in situ to convert or crack a liquid tar-like substance into oils and gases.

U.S. Pat. No. 4,597,441 to Ware et al., which is incorporated by reference as if fully set forth herein, describes contacting oil, heat, and hydrogen simultaneously in a reservoir. Hydrogenation may enhance recovery of oil from the reservoir.

U.S. Pat. No. 5,046,559 to Glandt and 5,060,726 to Glandt et al., which are incorporated by reference as if fully set forth herein, describe preheating a portion of a tar sand formation between an injector well and a producer well. Steam may be injected from the injector well into the formation to produce hydrocarbons at the producer well.

Substantial reserves of heavy hydrocarbons are known to exist in formations that have relatively low permeability. For example, billions of barrels of oil reserves are known to exist in diatomaceous formations in California. Several methods have been proposed and/or used for producing heavy hydrocarbons from relatively low permeability formations.

U.S. Pat. No. 5,415,231 to Northrop et al., which is incorporated by reference as if fully set forth herein, describes a method for recovering hydrocarbons (e.g., oil) from a low permeability subterranean reservoir of the type comprised primarily of diatomite. A first slug or volume of a heated fluid (e.g., 60% quality steam) is injected into the reservoir at a pressure greater than the fracturing pressure of the reservoir. The well is then shut in and the reservoir is allowed to soak for a prescribed period (e.g., 10 days or more) to allow the oil to be displaced by the steam into the fractures. The well is then produced until the production rate drops below an economical level. A second slug of steam is then injected and the cycles are repeated.

U.S. Pat. No. 4,530,401 to Hartman et al., which is incorporated by reference as if fully set forth herein, describes a method for the recovery of viscous oil from a subterranean, viscous oil-containing formation by injecting steam into the formation.

U.S. Pat. No. 5,339,897 to Leaute describes a method and apparatus for recovering and/or upgrading hydrocarbons utilizing in situ combustion and horizontal wells.

U.S. Pat. No. 5,431,224 to Laali, which is incorporated by reference as if fully set forth herein, describes a method for improving hydrocarbon flow from low permeability tight reservoir rock.

U.S. Pat. Nos. 5,297,626 Vinegar et al. and 5,392,854 to Vinegar et al., which are incorporated by reference as if fully set forth herein, describe a process wherein an oil containing subterranean formation is heated. The following patents are incorporated herein by reference: U.S. Pat. Nos. 6,152,987 to Ma et al.; 5,525,322 to Willms; 5,861,137 to Edlund; and 5,229,102 to Minet et al.

As outlined above, there has been a significant amount of effort to develop methods and systems to economically produce hydrocarbons, hydrogen, and/or other products from hydrocarbon containing formations. At present, however, there are still many hydrocarbon containing formations from which hydrocarbons, hydrogen, and/or other products cannot be economically produced. Thus, there is still a need for improved methods and systems for production of hydrocarbons, hydrogen, and/or other products from various hydrocarbon containing formations.

U.S. Pat. No. RE36,569 to Kuckes, which is incorporated by reference as if fully set forth herein, describes a method for determining distance from a borehole to a nearby, substantially parallel target well for use in guiding the drilling of the borehole. The method includes positioning a magnetic field sensor in the borehole at a known depth and providing a magnetic field source in the target well.

U.S. Pat. Nos. 5,515,931 to Kuckes and 5,657,826 to Kuckes, which are incorporated by reference as if fully set forth herein, describe single guide wire systems for use in directional drilling of boreholes. The systems include a guide wire extending generally parallel to the desired path of the borehole.

U.S. Pat. No. 5,725,059 to Kuckes et al., which is incorporated by reference as if fully set forth herein, describes a method and apparatus for steering boreholes for use in creating a subsurface barrier layer. The method includes drilling a first reference borehole, retracting the drill stem while injecting a sealing material into the earth around the borehole, and simultaneously pulling a guide wire into the borehole. The guide wire is used to produce a corresponding magnetic field in the earth around the reference borehole. The vector components of the magnetic field are used to determine the distance and direction from the borehole being drilled to the reference borehole in order to steer the borehole being drilled. U.S. Pat. Nos. 5,512,830 to Kuckes; 5,676,212 to Kuckes; 5,541,517 to Hartmann et al.; 5,589,775 to Kuckes; 5,787,997 to Hartmann; and 5,923,170 to Kuckes, each of which is incorporated by reference as if fully set forth herein, describe methods for measurement of the distance and direction between boreholes using magnetic or electromagnetic fields.

SUMMARY

In an embodiment, hydrocarbons within a hydrocarbon containing formation (e.g., a formation containing coal, oil shale, heavy hydrocarbons, or a combination thereof) may be converted in situ within the formation to yield a mixture of relatively high quality hydrocarbon products, hydrogen, and/or other products. One or more heat sources may be used to heat a portion of the hydrocarbon containing formation to temperatures that allow pyrolysis of the hydrocarbons. Hydrocarbons, hydrogen, and other formation fluids may be removed from the formation through one or more production wells. In some embodiments, formation fluids may be removed in a vapor phase. In other embodiments, formation fluids may be removed in liquid and vapor phases or in a liquid phase. Temperature and pressure in at least a portion of the formation may be controlled during pyrolysis to yield improved products from the formation.

In an embodiment, one or more heat sources may be installed into a formation to heat the formation. Heat sources may be installed by drilling openings (well bores) into the formation. In some embodiments, openings may be formed in the formation using a drill with a steerable motor and an accelerometer. Alternatively, an opening may be formed into the formation by geosteered drilling. Alternately, an opening may be formed into the formation by sonic drilling.

One or more heat sources may be disposed within the opening such that the heat sources transfer heat to the formation. For example, a heat source may be placed in an open wellbore in the formation. Heat may conductively and radiatively transfer from the heat source to the formation. Alternatively, a heat source may be placed within a heater well that may be packed with gravel, sand, and/or cement. The cement may be a refractory cement.

In some embodiments, one or more heat sources may be placed in a pattern within the formation. For example, in one embodiment, an in situ conversion process for hydrocarbons may include heating at least a portion of a hydrocarbon containing formation with an array of heat sources disposed within the formation. In some embodiments, the array of heat sources can be positioned substantially equidistant from a production well. Certain patterns (e.g., triangular arrays, hexagonal arrays, or other array patterns) may be more desirable for specific applications. In addition, the array of heat sources may be disposed such that a distance between each heat source may be less than about 70 feet (21 m). In addition, the in situ conversion process for hydrocarbons may include heating at least a portion of the formation with heat sources disposed substantially parallel to a boundary of the hydrocarbons. Regardless of the arrangement of or distance between the heat sources, in certain embodiments, a ratio of heat sources to production wells disposed within a formation may be greater than about 3, 5, 8, 10, 20, or more.

Certain embodiments may also include allowing heat to transfer from one or more of the heat sources to a selected section of the heated portion. In an embodiment, the selected section may be disposed between one or more heat sources. For example, the in situ conversion process may also include allowing heat to transfer from one or more heat sources to a selected section of the formation such that heat from one or more of the heat sources pyrolyzes at least some hydrocarbons within the selected section. The in situ conversion process may include heating at least a portion of a hydrocarbon containing formation above a pyrolyzation temperature of hydrocarbons in the formation. For example, a pyrolyzation temperature may include a temperature of at least about 270° C. Heat may be allowed to transfer from one or more of the heat sources to the selected section substantially by conduction.

One or more heat sources may be located within the formation such that superposition of heat produced from one or more heat sources may occur. Superposition of heat may increase a temperature of the selected section to a temperature sufficient for pyrolysis of at least some of the hydrocarbons within the selected section. Superposition of heat may vary depending on, for example, a spacing between heat sources. The spacing between heat sources may be selected to optimize heating of the section selected for treatment. Therefore, hydrocarbons may be pyrolyzed within a larger area of the portion. Spacing between heat sources may be selected to increase the effectiveness of the heat sources, thereby increasing the economic viability of a selected in situ conversion process for hydrocarbons. Superposition of heat tends to increase the uniformity of heat distribution in the section of the formation selected for treatment.

Various systems and methods may be used to provide heat sources. In an embodiment, a natural distributed combustor system and method may heat at least a portion of a hydrocarbon containing formation. The system and method may first include heating a first portion of the formation to a temperature sufficient to support oxidation of at least some of the hydrocarbons therein. One or more conduits may be disposed within one or more openings. One or more of the conduits may provide an oxidizing fluid from an oxidizing fluid source into an opening in the formation. The oxidizing fluid may oxidize at least a portion of the hydrocarbons at a reaction zone within the formation. Oxidation may generate heat at the reaction zone. The generated heat may transfer from the reaction zone to a pyrolysis zone in the formation. The heat may transfer by conduction, radiation, and/or convection. A heated portion of the formation may include the reaction zone and the pyrolysis zone. The heated portion may also be located adjacent to the opening. One or more of the conduits may remove one or more oxidation products from the reaction zone and/or the opening in the formation. Alternatively, additional conduits may remove one or more oxidation products from the reaction zone and/or formation.

In certain embodiments, the flow of oxidizing fluid may be controlled along at least a portion of the length of the reaction zone. In some embodiments, hydrogen may be allowed to transfer into the reaction zone.

In an embodiment, a natural distributed combustor may include a second conduit. The second conduit may remove an oxidation product from the formation. The second conduit may remove an oxidation product to maintain a substantially constant temperature in the formation. The second conduit may control the concentration of oxygen in the opening such that the oxygen concentration is substantially constant. The first conduit may include orifices that direct oxidizing fluid in a direction substantially opposite a direction oxidation products are removed with orifices on the second conduit. The second conduit may have a greater concentration of orifices toward an upper end of the second conduit. The second conduit may allow heat from the oxidation product to transfer to the oxidizing fluid in the first conduit. The pressure of the fluids within the first and second conduits may be controlled such that a concentration of the oxidizing fluid along the length of the first conduit is substantially uniform.

In an embodiment, a system and a method may include an opening in the formation extending from a first location on the surface of the earth to a second location on the surface of the earth. For example, the opening may be substantially U-shaped. Heat sources may be placed within the opening to provide heat to at least a portion of the formation.

A conduit may be positioned in the opening extending from the first location to the second location. In an embodiment, a heat source may be positioned proximate and/or in the conduit to provide heat to the conduit. Transfer of the heat through the conduit may provide heat to a selected section of the formation. In some embodiments, an additional heater may be placed in an additional conduit to provide heat to the selected section of the formation through the additional conduit.

In some embodiments, an annulus is formed between a wall of the opening and a wall of the conduit placed within the opening extending from the first location to the second location. A heat source may be place proximate and/or in the annulus to provide heat to a portion the opening. The provided heat may transfer through the annulus to a selected section of the formation.

In an embodiment, a system and method for heating a hydrocarbon containing formation may include one or more insulated conductors disposed in one or more openings in the formation. The openings may be uncased. Alternatively, the openings may include a casing. As such, the insulated conductors may provide conductive, radiant, or convective heat to at least a portion of the formation. In addition, the system and method may allow heat to transfer from the insulated conductor to a section of the formation. In some embodiments, the insulated conductor may include a copper-nickel alloy. In some embodiments, the insulated conductor may be electrically coupled to two additional insulated conductors in a 3-phase Y configuration.

An embodiment of a system and method for heating a hydrocarbon containing formation may include a conductor placed within a conduit (e.g., a conductor-in-conduit heat source). The conduit may be disposed within the opening. An electric current may be applied to the conductor to provide heat to a portion of the formation. The system may allow heat to transfer from the conductor to a section of the formation during use. In some embodiments, an oxidizing fluid source may be placed proximate an opening in the formation extending from the first location on the Earth's surface to the second location on the Earth's surface. The oxidizing fluid source may provide oxidizing fluid to a conduit in the opening. The oxidizing fluid may transfer from the conduit to a reaction zone in the formation. In an embodiment, an electrical current may be provided to the conduit to heat a portion of the conduit. The heat may transfer to the reaction zone in the hydrocarbon containing formation. Oxidizing fluid may then be provided to the conduit. The oxidizing fluid may oxidize hydrocarbons in the reaction zone, thereby generating heat. The generated heat may transfer to a pyrolysis zone and the transferred heat may pyrolyze hydrocarbons within the pyrolysis zone.

In some embodiments, an insulation layer may be coupled to a portion of the conductor. The insulation layer may electrically insulate at least a portion of the conductor from the conduit during use.

In an embodiment, a conductor-in-conduit heat source having a desired length may be assembled. A conductor may be placed within the conduit to form the conductor-in-conduit heat source. Two or more conductor-in-conduit heat sources may be coupled together to form a heat source having the desired length. The conductors of the conductor-in-conduit heat sources may be electrically coupled together. In addition, the conduits may be electrically coupled together. A desired length of the conductor-in-conduit may be placed in an opening in the hydrocarbon containing formation. In some embodiments, individual sections of the conductor-in-conduit heat source may be coupled using shielded active gas welding.

In some embodiments, a centralizer may be used to inhibit movement of the conductor within the conduit. A centralizer may be placed on the conductor as a heat source is made. In certain embodiments, a protrusion may be placed on the conductor to maintain the location of a centralizer.

In certain embodiments, a heat source of a desired length may be assembled proximate the hydrocarbon containing formation. The assembled heat source may then be coiled. The heat source may be placed in the hydrocarbon containing formation by uncoiling the heat source into the opening in the hydrocarbon containing formation.

In certain embodiments, portions of the conductors may include an electrically conductive material. Use of the electrically conductive material on a portion (e.g., in the overburden portion) of the conductor may lower an electrical resistance of the conductor.

A conductor placed in a conduit may be treated to increase the emissivity of the conductor, in some embodiments. The emissivity of the conductor may be increased by roughening at least a portion of the surface of the conductor. In certain embodiments, the conductor may be treated to increase the emissivity prior to being placed within the conduit. In some embodiments, the conduit may be treated to increase the emissivity of the conduit.

In an embodiment, a system and method may include one or more elongated members disposed in an opening in the formation. Each of the elongated members may provide heat to at least a portion of the formation. One or more conduits may be disposed in the opening. One or more of the conduits may provide an oxidizing fluid from an oxidizing fluid source into the opening. In certain embodiments, the oxidizing fluid may inhibit carbon deposition on or proximate the elongated member.

In certain embodiments, an expansion mechanism may be coupled to a heat source. The expansion mechanism may allow the heat source to move during use. For example, the expansion mechanism may allow for the expansion of the heat source during use.

In one embodiment, an in situ method and system for heating a hydrocarbon containing formation may include providing oxidizing fluid to a first oxidizer placed in an opening in the formation. Fuel may be provided to the first oxidizer and at least some fuel may be oxidized in the first oxidizer. Oxidizing fluid may be provided to a second oxidizer placed in the opening in the formation. Fuel may be provided to the second oxidizer and at least some fuel may be oxidized in the second oxidizer. Heat from oxidation of fuel may be allowed to transfer to a portion of the formation.

An opening in a hydrocarbon containing formation may include a first elongated portion, a second elongated portion, and a third elongated portion. Certain embodiments of a method and system for heating a hydrocarbon containing formation may include providing heat from a first heater placed in the second elongated portion. The second elongated portion may diverge from the first elongated portion in a first direction. The third elongated portion may diverge from the first elongated portion in a second direction. The first direction may be substantially different than the second direction. Heat may be provided from a second heater placed in the third elongated portion of the opening in the formation. Heat from the first heater and the second heater may be allowed to transfer to a portion of the formation.

An embodiment of a method and system for heating a hydrocarbon containing formation may include providing oxidizing fluid to a first oxidizer placed in an opening in the formation. Fuel may be provided to the first oxidizer and at least some fuel may be oxidized in the first oxidizer. The method may further include allowing heat from oxidation of fuel to transfer to a portion of the formation and allowing heat to transfer from a heater placed in the opening to a portion of the formation.

In an embodiment, a system and method for heating a hydrocarbon containing formation may include oxidizing a fuel fluid in a heater. The method may further include providing at least a portion of the oxidized fuel fluid into a conduit disposed in an opening in the formation. In addition, additional heat may be transferred from an electric heater disposed in the opening to the section of the formation. Heat may be allowed to transfer uniformly along a length of the opening.

Energy input costs may be reduced in some embodiments of systems and methods described above. For example, an energy input cost may be reduced by heating a portion of a hydrocarbon containing formation by oxidation in combination with heating the portion of the formation by an electric heater. The electric heater may be turned down and/or off when the oxidation reaction begins to provide sufficient heat to the formation. Electrical energy costs associated with heating at least a portion of a formation with an electric heater may be reduced. Thus, a more economical process may be provided for heating a hydrocarbon containing formation in comparison to heating by a conventional method. In addition, the oxidation reaction may be propagated slowly through a greater portion of the formation such that fewer heat sources may be required to heat such a greater portion in comparison to heating by a conventional method.

Certain embodiments as described herein may provide a lower cost system and method for heating a hydrocarbon containing formation. For example, certain embodiments may more uniformly transfer heat along a length of a heater. Such a length of a heater may be greater than about 300 m or possibly greater than about 600 m. In addition, in certain embodiments, heat may be provided to the formation more efficiently by radiation. Furthermore, certain embodiments of systems may have a substantially longer lifetime than presently available systems.

In an embodiment, an in situ conversion system and method for hydrocarbons may include maintaining a portion of the formation in a substantially unheated condition. The portion may provide structural strength to the formation and/or confinement/isolation to certain regions of the formation. A processed hydrocarbon containing formation may have alternating heated and substantially unheated portions arranged in a pattern that may, in some embodiments, resemble a checkerboard pattern, or a pattern of alternating areas (e.g., strips) of heated and unheated portions.

In an embodiment, a heat source may advantageously heat only along a selected portion or selected portions of a length of the heater. For example, a formation may include several hydrocarbon containing layers. One or more of the hydrocarbon containing layers may be separated by layers containing little or no hydrocarbons. A heat source may include several discrete high heating zones that may be separated by low heating zones. The high heating zones may be disposed proximate hydrocarbon containing layers such that the layers may be heated. The low heating zones may be disposed proximate layers containing little or no hydrocarbons such that the layers may not be substantially heated. For example, an electric heater may include one or more low resistance heater sections and one or more high resistance heater sections. Low resistance heater sections of the electric heater may be disposed in and/or proximate layers containing little or no hydrocarbons. In addition, high resistance heater sections of the electric heater may be disposed proximate hydrocarbon containing layers. In an additional example, a fueled heater (e.g., surface burner) may include insulated sections. Insulated sections of the fueled heater may be placed proximate or adjacent to layers containing little or no hydrocarbons. Alternately, a heater with distributed air and/or fuel may be configured such that little or no fuel may be combusted proximate or adjacent to layers containing little or no hydrocarbons. Such a fueled heater may include flameless combustors and natural distributed combustors.

In certain embodiments, the permeability of a hydrocarbon containing formation may vary within the formation. For example, a first section may have a lower permeability than a second section. In an embodiment, heat may be provided to the formation to pyrolyze hydrocarbons within the lower permeability first section. Pyrolysis products may be produced from the higher permeability second section in a mixture of hydrocarbons.

In an embodiment, a heating rate of the formation may be slowly raised through the pyrolysis temperature range. For example, an in situ conversion process for hydrocarbons may include heating at least a portion of a hydrocarbon containing formation to raise an average temperature of the portion above about 270° C. by a rate less than a selected amount (e.g., about 10° C., 5° C., 3° C., 1° C., 0.5° C., or 0.1° C.) per day. In a further embodiment, the portion may be heated such that an average temperature of the selected section may be less than about 375° C. or, in some embodiments, less than about 400° C.

In an embodiment, a temperature of the portion may be monitored through a test well disposed in a formation. For example, the test well may be positioned in a formation between a first heat source and a second heat source. Certain systems and methods may include controlling the heat from the first heat source and/or the second heat source to raise the monitored temperature at the test well at a rate of less than about a selected amount per day. In addition or alternatively, a temperature of the portion may be monitored at a production well. An in situ conversion process for hydrocarbons may include controlling the heat from the first heat source and/or the second heat source to raise the monitored temperature at the production well at a rate of less than a selected amount per day.

An embodiment of an in situ method of measuring a temperature within a wellbore may include providing a pressure wave from a pressure wave source into the wellbore. The wellbore may include a plurality of discontinuities along a length of the wellbore. The method further includes measuring a reflection signal of the pressure wave and using the reflection signal to assess at least one temperature between at least two discontinuities.

Certain embodiments may include heating a selected volume of a hydrocarbon containing formation. Heat may be provided to the selected volume by providing power to one or more heat sources. Power may be defined as heating energy per day provided to the selected volume. A power (Pwr) required to generate a heating rate (h, in units of, for example, ° C./day) in a selected volume (V) of a hydrocarbon containing formation may be determined by EQN. 1:

$$Pwr=h*V*C_v*\rho_B. \tag{1}$$

In this equation, an average heat capacity of the formation ($C_v$) and an average bulk density of the formation ($\rho_B$) may be estimated or determined using one or more samples taken from the hydrocarbon containing formation.

Certain embodiments may include raising and maintaining a pressure in a hydrocarbon containing formation. Pressure may be, for example, controlled within a range of about 2 bars absolute to about 20 bars absolute. For example, the process may include controlling a pressure within a majority of a selected section of a heated portion of the formation. The controlled pressure may be above about 2 bars absolute during pyrolysis. In some embodiments, an in situ conversion process for hydrocarbons may include raising and maintaining the pressure in the formation within a range of about 20 bars absolute to about 36 bars absolute.

In an embodiment, compositions and properties of formation fluids produced by an in situ conversion process for hydrocarbons may vary depending on, for example, conditions within a hydrocarbon containing formation.

Certain embodiments may include controlling the heat provided to at least a portion of the formation such that production of less desirable products in the portion may be inhibited. Controlling the heat provided to at least a portion of the formation may also increase the uniformity of permeability within the formation. For example, controlling the heating of the formation to inhibit production of less desirable products may, in some embodiments, include controlling the heating rate to less than a selected amount (e.g., 10° C., 5° C., 3° C., 1° C., 0.5° C., or 0.1° C.) per day.

Controlling pressure, heat and/or heating rates of a selected section in a formation may increase production of selected formation fluids. For example, the amount and/or rate of heating may be controlled to produce formation fluids having an American Petroleum Institute ("API") gravity greater than about 25°. Heat and/or pressure may be controlled to inhibit production of olefins in the produced fluids.

Controlling formation conditions to control the pressure of hydrogen in the produced fluid may result in improved qualities of the produced fluids. In some embodiments, it may be desirable to control formation conditions so that the partial pressure of hydrogen in a produced fluid is greater than about 0.5 bars absolute, as measured at a production well.

In one embodiment, a method of treating a hydrocarbon containing formation in situ may include adding hydrogen to the selected section after a temperature of the selected section is at least about 270° C. Other embodiments may include controlling a temperature of the formation by selectively adding hydrogen to the formation.

In certain embodiments, a hydrocarbon containing formation may be treated in situ with a heat transfer fluid such as steam. In an embodiment, a method of formation may include injecting a heat transfer fluid into a formation. Heat from the heat transfer fluid may transfer to a selected section of the formation. The heat from the heat transfer fluid may pyrolyze a substantial portion of the hydrocarbons within the selected section of the formation. The produced gas mixture may include hydrocarbons with an average API gravity greater than about 25°.

Furthermore, treating a hydrocarbon containing formation with a heat transfer fluid may also mobilize hydrocarbons in the formation. In an embodiment, a method of treating a formation may include injecting a heat transfer fluid into a formation, allowing the heat from the heat transfer fluid to transfer to a selected first section of the formation, and mobilizing and pyrolyzing at least some of the hydrocarbons within the selected first section of the formation. At least some of the mobilized hydrocarbons may flow from the selected first section of the formation to a selected second section of the formation. The heat may pyrolyze at least some of the hydrocarbons within the selected second section of the formation. A gas mixture may be produced from the formation.

Another embodiment of treating a formation with a heat transfer fluid may include a moving heat transfer fluid front. A method may include injecting a heat transfer fluid into a formation and allowing the heat transfer fluid to migrate through the formation. A size of a selected section may increase as a heat transfer fluid front migrates through an untreated portion of the formation. The selected section is a portion of the formation treated by the heat transfer fluid. Heat from the heat transfer fluid may transfer heat to the selected section. The heat may pyrolyze at least some of the hydrocarbons within the selected section of the formation. The heat may also mobilize at least some of the hydrocarbons at the heat transfer fluid front. The mobilized hydrocarbons may flow substantially parallel to the heat transfer fluid front. The heat may pyrolyze at least a portion of the hydrocarbons in the mobilized fluid and a gas mixture may be produced from the formation.

Simulations may be utilized to increase an understanding of in situ processes. Simulations may model heating of the formation from heat sources and the transfer of heat to a selected section of the formation. Simulations may require the input of model parameters, properties of the formation, operating conditions, process characteristics, and/or desired parameters to determine operating conditions. Simulations may assess various aspects of an in situ process. For example, various aspects may include, but not be limited to, deformation characteristics, heating rates, temperatures within the formation, pressures, time to first produced fluids, and/or compositions of produced fluids.

Systems utilized in conducting simulations may include a central processing unit (CPU), a data memory, and a system memory. The system memory and the data memory may be coupled to the CPU. Computer programs executable to implement simulations may be stored on the system memory. Carrier mediums may include program instructions that are computer-executable to simulate the in situ processes.

In one embodiment, a computer-implemented method and system of treating a hydrocarbon containing formation may include providing to a computational system at least one set of operating conditions of an in situ system being used to apply heat to a formation. The in situ system may include at least one heat source. The method may further include providing to the computational system at least one desired parameter for the in situ system. The computational system may be used to determine at least one additional operating condition of the formation to achieve the desired parameter.

In an embodiment, operating conditions may be determined by measuring at least one property of the formation. At least one measured property may be input into a computer executable program. At least one property of formation fluids selected to be produced from the formation may also be input into the computer executable program. The program may be operable to determine a set of operating conditions from at least the one or more measured properties. The program may also determine the set of operating conditions from at least one property of the selected formation fluids. The determined set of operating conditions may increase production of selected formation fluids from the formation.

In some embodiments, a property of the formation and an operating condition used in the in situ process may be provided to a computer system to model the in situ process to determine a process characteristic.

In an embodiment, a heat input rate for an in situ process from two or more heat sources may be simulated on a computer system. A desired parameter of the in situ process may be provided to the simulation. The heat input rate from the heat sources may be controlled to achieve the desired parameter.

Alternatively, a heat input property may be provided to a computer system to assess heat injection rate data using a simulation. In addition, a property of the formation may be provided to the computer system. The property and the heat injection rate data may be utilized by a second simulation to determine a process characteristic for the in situ process as a function of time.

Values for the model parameters may be adjusted using process characteristics from a series of simulations. The model parameters may be adjusted such that the simulated process characteristics correspond to process characteristics in situ. After the model parameters have been modified to correspond to the in situ process, a process characteristic or a set of process characteristics based on the modified model parameters may be determined. In certain embodiments, multiple simulations may be run such that the simulated process characteristics correspond to the process characteristics in situ.

In some embodiments, operating conditions may be supplied to a simulation to assess a process characteristic. Additionally, a desired value of a process characteristic for the in situ process may be provided to the simulation to assess an operating condition that yields the desired value.

In certain embodiments, databases in memory on a computer may be used to store relationships between model parameters, properties of the formation, operating conditions, process characteristics, desired parameters, etc. These databases may be accessed by the simulations to obtain inputs. For example, after desired values of process characteristics are provided to simulations, an operating condition may be assessed to achieve the desired values using these databases.

In some embodiments, computer systems may utilize inputs in a simulation to assess information about the in situ process. In some embodiments, the assessed information may be used to operate the in situ process. Alternatively, the assessed information and a desired parameter may be provided to a second simulation to obtain information. This obtained information may be used to operate the in situ process.

In an embodiment, a method of modeling may include simulating one or more stages of the in situ process. Operating conditions from the one or more stages may be provided to a simulation to assess a process characteristic of the one or more stages.

In an embodiment, operating conditions may be assessed by measuring at least one property of the formation. At least the measured properties may be input into a computer executable program. At least one property of formation fluids selected to be produced from the formation may also be input into the computer executable program. The program may be operable to assess a set of operating conditions from at least the one or more measured properties. The program may also determine the set of operating conditions from at least one property of the selected formation fluids. The assessed set of operating conditions may increase production of selected formation fluids from the formation.

In one embodiment, a method for controlling an in situ system of treating a hydrocarbon containing formation may include monitoring at least one acoustic event within the formation using at least one acoustic detector placed within a wellbore in the formation. At least one acoustic event may be recorded with an acoustic monitoring system. The method may also include analyzing the at least one acoustic event to determine at least one property of the formation. The in situ system may be controlled based on the analysis of the at least one acoustic event.

An embodiment of a method of determining a heating rate for treating a hydrocarbon containing formation in situ may include conducting an experiment at a relatively constant heating rate. The results of the experiment may be used to determine a heating rate for treating the formation in situ. The determined heating rate may be used to determine a well spacing in the formation.

In an embodiment, a method of predicting characteristics of a formation fluid may include determining an isothermal heating temperature that corresponds to a selected heating rate for the formation. The determined isothermal temperature may be used in an experiment to determine at least one product characteristic of the formation fluid produced from the formation for the selected heating rate. Certain embodiments may include altering a composition of formation fluids produced from a hydrocarbon containing formation by altering a location of a production well with respect to a heater well. For example, a production well may be located with respect to a heater well such that a non-condensable gas fraction of produced hydrocarbon fluids may be larger than a condensable gas fraction of the produced hydrocarbon fluids.

Condensable hydrocarbons produced from the formation will typically include paraffins, cycloalkanes, mono-aromatics, and di-aromatics as major components. Such condensable hydrocarbons may also include other components such as tri-aromatics, etc.

In certain embodiments, a majority of the hydrocarbons in produced fluid may have a carbon number of less than approximately 25. Alternatively, less than about 15 weight % of the hydrocarbons in the fluid may have a carbon number greater than approximately 25. In other embodiments, fluid produced may have a weight ratio of hydrocarbons having carbon numbers from 2 through 4, to methane, of greater than approximately 1 (e.g., for oil shale and heavy hydrocarbons) or greater than approximately 0.3 (e.g., for coal). The non-condensable hydrocarbons may include, but are not limited to, hydrocarbons having carbon numbers less than 5.

In certain embodiments, the API gravity of the hydrocarbons in produced fluid may be approximately 25° or above (e.g., 30°, 40°, 50°, etc.). In certain embodiments, the hydrogen to carbon atomic ratio in produced fluid may be at least approximately 1.7 (e.g., 1.8, 1.9, etc.).

In certain embodiments, (e.g., when the formation includes coal) fluid produced from a formation may include oxygenated hydrocarbons. In an example, the condensable hydrocarbons may include an amount of oxygenated hydrocarbons greater than about 5 weight % of the condensable hydrocarbons.

Condensable hydrocarbons of a produced fluid may also include olefins. For example, the olefin content of the condensable hydrocarbons may be from about 0.1 weight % to about 15 weight %. Alternatively, the olefin content of the condensable hydrocarbons may be from about 0.1 weight % to about 2.5 weight % or, in some embodiments, less than about 5 weight %.

Non-condensable hydrocarbons of a produced fluid may also include olefins. For example, the olefin content of the non-condensable hydrocarbons may be gauged using the ethene/ethane molar ratio. In certain embodiments, the ethene/ethane molar ratio may range from about 0.001 to about 0.15.

Fluid produced from the formation may include aromatic compounds. For example, the condensable hydrocarbons may include an amount of aromatic compounds greater than about 20 weight % or about 25 weight % of the condensable hydrocarbons. The condensable hydrocarbons may also include relatively low amounts of compounds with more than two rings in them (e.g., tri-aromatics or above). For example, the condensable hydrocarbons may include less than about 1 weight %, 2 weight %, or about 5 weight % of tri-aromatics or above in the condensable hydrocarbons.

In particular, in certain embodiments, asphaltenes (i.e., large multi-ring aromatics that are substantially insoluble in hydrocarbons) make up less than about 0.1 weight % of the condensable hydrocarbons. For example, the condensable hydrocarbons may include an asphaltene component of from about 0.0 weight % to about 0.1 weight % or, in some embodiments, less than about 0.3 weight %.

Condensable hydrocarbons of a produced fluid may also include relatively large amounts of cycloalkanes. For example, the condensable hydrocarbons may include a cycloalkane component of up to 30 weight % (e.g., from about 5 weight % to about 30 weight %) of the condensable hydrocarbons.

In certain embodiments, the condensable hydrocarbons of the fluid produced from a formation may include compounds containing nitrogen. For example, less than about 1 weight % (when calculated on an elemental basis) of the condensable hydrocarbons is nitrogen (e.g., typically the nitrogen is in nitrogen containing compounds such as pyridines, amines, amides, etc.).

In certain embodiments, the condensable hydrocarbons of the fluid produced from a formation may include compounds containing oxygen. For example, in certain embodiments (e.g., for oil shale and heavy hydrocarbons), less than about 1 weight % (when calculated on an elemental basis) of the condensable hydrocarbons is oxygen (e.g., typically the oxygen is in oxygen containing compounds such as phenols, substituted phenols, ketones, etc.). In certain other embodiments (e.g., for coal) between about 5 weight % and about 30 weight % of the condensable hydrocarbons are typically oxygen containing compounds such as phenols, substituted phenols, ketones, etc. In some instances, certain compounds containing oxygen (e.g., phenols) may be valuable and, as such, may be economically separated from the produced fluid.

In certain embodiments, the condensable hydrocarbons of the fluid produced from a formation may include compounds containing sulfur. For example, less than about 1 weight % (when calculated on an elemental basis) of the condensable hydrocarbons is sulfur (e.g., typically the sulfur is in sulfur containing compounds such as thiophenes, mercaptans, etc.).

Furthermore, the fluid produced from the formation may include ammonia (typically the ammonia condenses with the water, if any, produced from the formation). For example, the fluid produced from the formation may in certain embodiments include about 0.05 weight % or more of ammonia. Certain formations may produce larger amounts of ammonia (e.g., up to about 10 weight % of the total fluid produced may be ammonia).

Furthermore, a produced fluid from the formation may also include molecular hydrogen ($H_2$), water, carbon dioxide, hydrogen sulfide, etc. For example, the fluid may include a $H_2$ content between about 10 volume % and about 80 volume % of the non-condensable hydrocarbons.

Certain embodiments may include heating to yield at least about 15 weight % of a total organic carbon content of at least some of the hydrocarbon containing formation into formation fluids.

In an embodiment, an in situ conversion process for treating a hydrocarbon containing formation may include providing heat to a section of the formation to yield greater than about 60 weight % of the potential hydrocarbon products and hydrogen, as measured by the Fischer Assay.

In certain embodiments, heating of the selected section of the formation may be controlled to pyrolyze at least about 20 weight % (or in some embodiments about 25 weight %) of the hydrocarbons within the selected section of the formation.

Formation fluids produced from a section of the formation may contain one or more components that may be separated from the formation fluids. In addition, conditions within the formation may be controlled to increase production of a desired component.

In certain embodiments, a method of converting pyrolysis fluids into olefins may include converting formation fluids into olefins. An embodiment may include separating olefins from fluids produced from a formation.

In an embodiment, a method of enhancing phenol production from a hydrocarbon containing formation in situ may include controlling at least one condition within at least a portion of the formation to enhance production of phenols in formation fluid. In other embodiments, production of phenols from a hydrocarbon containing formation may be controlled by converting at least a portion of formation fluid into phenols. Furthermore, phenols may be separated from fluids produced from a hydrocarbon containing formation.

An embodiment of a method of enhancing BTEX compounds (i.e., benzene, toluene, ethylbenzene, and xylene compounds) produced in situ in a hydrocarbon containing formation may include controlling at least one condition within a portion of the formation to enhance production of BTEX compounds in formation fluid. In another embodiment, a method may include separating at least a portion of the BTEX compounds from the formation fluid. In addition, the BTEX compounds may be separated from the formation fluids after the formation fluids are produced. In other embodiments, at least a portion of the produced formation fluids may be converted into BTEX compounds.

In one embodiment, a method of enhancing naphthalene production from a hydrocarbon containing formation in situ may include controlling at least one condition within at least a portion of the formation to enhance production of naphthalene in formation fluid. In another embodiment, naphthalene may be separated from produced formation fluids.

Certain embodiments of a method of enhancing anthracene production from a hydrocarbon containing formation in situ may include controlling at least one condition within at least a portion of the formation to enhance production of anthracene in formation fluid. In an embodiment, anthracene may be separated from produced formation fluids.

In one embodiment, a method of separating ammonia from fluids produced from a hydrocarbon containing formation in situ may include separating at least a portion of the ammonia from the produced fluid. Furthermore, an embodiment of a method of generating ammonia from fluids produced from a formation may include hydrotreating at least a portion of the produced fluids to generate ammonia.

In an embodiment, a method of enhancing pyridines production from a hydrocarbon containing formation in situ may include controlling at least one condition within at least a portion of the formation to enhance production of pyridines in formation fluid. Additionally, pyridines may be separated from produced formation fluids.

In certain embodiments, a method of selecting a hydrocarbon containing formation to be treated in situ such that production of pyridines is enhanced may include examining pyridines concentrations in a plurality of samples from hydrocarbon containing formations. The method may further include selecting a formation for treatment at least partially based on the pyridines concentrations. Consequently, the production of pyridines to be produced from the formation may be enhanced.

In an embodiment, a method of enhancing pyrroles production from a hydrocarbon containing formation in situ may include controlling at least one condition within at least a portion of the formation to enhance production of pyrroles in formation fluid. In addition, pyrroles may be separated from produced formation fluids.

In certain embodiments, a hydrocarbon containing formation to be treated in situ may be selected such that production of pyrroles is enhanced. The method may include examining pyrroles concentrations in a plurality of samples from hydrocarbon containing formations. The formation may be selected for treatment at least partially based on the pyrroles concentrations, thereby enhancing the production of pyrroles to be produced from such formation.

In one embodiment, thiophenes production a hydrocarbon containing formation in situ may be enhanced by controlling at least one condition within at least a portion of the formation to enhance production of thiophenes in formation fluid. Additionally, the thiophenes may be separated from produced formation fluids.

An embodiment of a method of selecting a hydrocarbon containing formation to be treated in situ such that production of thiophenes is enhanced may include examining thiophenes concentrations in a plurality of samples from hydrocarbon containing formations. The method may further include selecting a formation for treatment at least partially based on the thiophenes concentrations, thereby enhancing the production of thiophenes from such formations.

Certain embodiments may include providing a reducing agent to at least a portion of the formation. A reducing agent provided to a portion of the formation during heating may increase production of selected formation fluids. A reducing agent may include, but is not limited to, molecular hydrogen. For example, pyrolyzing at least some hydrocarbons in a hydrocarbon containing formation may include forming hydrocarbon fragments. Such hydrocarbon fragments may react with each other and other compounds present in the formation. Reaction of these hydrocarbon fragments may increase production of olefin and aromatic compounds from the formation. Therefore, a reducing agent provided to the formation may react with hydrocarbon fragments to form selected products and/or inhibit the production of non-selected products.

In an embodiment, a hydrogenation reaction between a reducing agent provided to a hydrocarbon containing formation and at least some of the hydrocarbons within the formation may generate heat. The generated heat may be allowed to transfer such that at least a portion of the formation may be heated. A reducing agent such as molecular hydrogen may also be autogenously generated within a portion of a hydrocarbon containing formation during an in situ conversion process for hydrocarbons. The autogenously generated molecular hydrogen may hydrogenate formation fluids within the formation. Allowing formation waters to contact hot carbon in the spent formation may generate molecular hydrogen. Cracking an injected hydrocarbon fluid may also generate molecular hydrogen.

Certain embodiments may also include providing a fluid produced in a first portion of a hydrocarbon containing formation to a second portion of the formation. A fluid produced in a first portion of a hydrocarbon containing formation may be used to produce a reducing environment in a second portion of the formation. For example, molecular hydrogen generated in a first portion of a formation may be provided to a second portion of the formation. Alternatively, at least a portion of formation fluids produced from a first portion of the formation may be provided to a second portion of the formation to provide a reducing environment within the second portion.

In an embodiment, a method for hydrotreating a compound in a heated formation in situ may include controlling the $H_2$ partial pressure in a selected section of the formation, such that sufficient $H_2$ may be present in the selected section of the formation for hydrotreating. The method may further include providing a compound for hydrotreating to at least the selected section of the formation and producing a mixture from the formation that includes at least some of the hydrotreated compound.

In certain embodiments, the fluids may be hydrotreated in situ in a heated formation. In situ treatment may include providing a fluid to a selected section of a formation. The in situ process may include controlling a $H_2$ partial pressure in the selected section of the formation. The H12 partial pressure may be controlled by providing hydrogen to the part of the formation. The temperature within the part of the formation may be controlled such that the temperature remains within a range from about 200° C. to about 450° C. At least some of the fluid may be hydrotreated within the part of the formation. A mixture including hydrotreated fluids may be produced from the formation. The produced mixture may include less than about 1% by weight ammonia. The produced mixture may include less than about 1% by weight hydrogen sulfide. The produced mixture may include less than about 1% oxygenated compounds. The heating may be controlled such that the mixture may be produced as a vapor.

In an embodiment, a method for hydrotreating a compound in a heated formation in situ may include controlling the $H_2$ partial pressure in a selected section of the formation, such that sufficient $H_2$ may be present in the selected section of the formation for hydrotreating. The method may further include providing a compound for hydrotreating to at least the selected section of the formation and producing a mixture from the formation that includes at least some of the hydrotreated compound.

In one embodiment, a method of separating ammonia from fluids produced from an in situ hydrocarbon containing formation may include separating at least a portion of the ammonia from the produced fluid. Fluids produced from a formation may, in some embodiments, be hydrotreated to generate ammonia. In certain embodiments, ammonia may be converted to other products.

Certain embodiments may include controlling heat provided to at least a portion of the formation such that a thermal conductivity of the portion may be increased to greater than about 0.5 W/(m ° C.) or, in some embodiments, greater than about 0.6 W/(m ° C.).

In certain embodiments, a mass of at least a portion of the formation may be reduced due, for example, to the production of formation fluids from the formation. As such, a permeability and porosity of at least a portion of the formation may increase. In addition, removing water during the heating may also increase the permeability and porosity of at least a portion of the formation.

Certain embodiments may include increasing a permeability of at least a portion of a hydrocarbon containing formation to greater than about 0.01, 0.1, 1, 10, 20, or 50 darcy. In addition, certain embodiments may include substantially uniformly increasing a permeability of at least a portion of a hydrocarbon containing formation. Some embodiments may include increasing a porosity of at least a portion of a hydrocarbon containing formation substantially uniformly.

In situ processes may be used to produce hydrocarbons, hydrogen and other formation fluids from a relatively permeable formation that includes heavy hydrocarbons (e.g., from tar sands). Heating may be used to mobilize the heavy hydrocarbons within the formation and then to pyrolyze heavy hydrocarbons within the formation to form pyrolyzation fluids. Formation fluids produced during pyrolyzation may be removed from the formation through production wells.

In certain embodiments, fluid (e.g., gas) may be provided to a relatively permeable formation. The gas may be used to pressurize the formation. Pressure in the formation may be selected to control mobilization of fluid within the formation. For example, a higher pressure may increase the mobilization of fluid within the formation such that fluids may be produced at a higher rate.

In an embodiment, a portion of a relatively permeable formation may be heated to reduce a viscosity of the heavy hydrocarbons within the formation. The reduced viscosity heavy hydrocarbons may be mobilized. The mobilized heavy hydrocarbons may flow to a selected pyrolyzation section of the formation. A gas may be provided into the relatively permeable formation to increase a flow of the mobilized heavy hydrocarbons into the selected pyrolyzation section. Such a gas may be, for example, carbon dioxide. The carbon dioxide may, in some embodiments, be stored in the formation after removal of the heavy hydrocarbons. A majority of the heavy hydrocarbons within the selected pyrolyzation section may be pyrolyzed. Pyrolyzation of the mobilized heavy hydrocarbons may upgrade the heavy hydrocarbons to a more desirable product. The pyrolyzed heavy hydrocarbons may be removed from the formation through a production well. In some embodiments, the mobilized heavy hydrocarbons may be removed from the formation through a production well without upgrading or pyrolyzing the heavy hydrocarbons.

Hydrocarbon fluids produced from the formation may vary depending on conditions within the formation. For example, a heating rate of a selected pyrolyzation section may be controlled to increase the production of selected products. In addition, pressure within the formation may be controlled to vary the composition of the produced fluids.

An embodiment of a method for producing a selected product composition from a relatively permeable formation containing heavy hydrocarbons in situ may include providing heat from one or more heat sources to at least one portion of the formation and allowing the heat to transfer to a selected section of the formation. The method may further include producing a product from one or more of the selected sections and blending two or more of the products to produce a product having about the selected product composition.

In an embodiment, heat is provided from a first set of heat sources to a first section of a hydrocarbon containing formation to pyrolyze a portion of the hydrocarbons in the first section. Heat may also be provided from a second set of heat sources to a second section of the formation. The heat may reduce the viscosity of hydrocarbons in the second section so that a portion of the hydrocarbons in the second section are able to move. A portion of the hydrocarbons from the second section may be induced to flow into the first section. A mixture of hydrocarbons may be produced from the formation. The produced mixture may include at least some pyrolyzed hydrocarbons.

In an embodiment, heat is provided from heat sources to a portion of a hydrocarbon containing formation. The heat may transfer from the heat sources to a selected section of the formation to decrease a viscosity of hydrocarbons within the selected section. A gas may be provided to the selected section of the formation. The gas may displace hydrocarbons from the selected section towards a production well or production wells. A mixture of hydrocarbons may be produced from the selected section through the production well or production wells.

In an embodiment, a method for treating a hydrocarbon containing formation in situ may include providing heat from one or more heaters to at least a portion of the formation. The method may include allowing the heat to transfer from the one or more heaters to a part of the formation. The heat, which transfers to the part of the formation, may pyrolyze at least some of the hydrocarbons within the part of the formation. The method may include selectively limiting a temperature proximate a selected portion of a heater wellbore. Selectively limiting the temperature may inhibit coke formation at or near the selected portion. The method may also include producing at least some hydrocarbons through the selected portion of the heater wellbore. In some embodiments, a method may include producing a mixture from the part of the formation through a production well.

In certain embodiments, a quality of a produced mixture may be controlled by varying a location for producing the mixture. The location of production may be varied by varying the depth in the formation from which fluid is produced relative to an overburden or underburden. The location of production may also be varied by varying which production wells are used to produce fluid. In some embodiments, the production wells used to remove fluid may be chosen based on a distance of the production wells from activated heat sources.

In an embodiment, a blending agent may be produced from a selected section of a formation. A portion of the blending agent may be mixed with heavy hydrocarbons to produce a mixture having a selected characteristic (e.g., density, viscosity, and/or stability). In certain embodiments, the heavy hydrocarbons may be produced from another section of the formation used to produce the blending agent. In some embodiments, the heavy hydrocarbons may be produced from another formation.

In some embodiments, heat may be provided to a selected section of a hydrocarbon containing formation to pyrolyze some hydrocarbons in a lower portion of the formation. A mixture of hydrocarbons may be produced from an upper portion of the formation. The mixture of hydrocarbons may include at least some pyrolyzed hydrocarbons from the lower portion of the formation.

In certain embodiments, a production rate of fluid from the formation may be controlled to adjust an average time that hydrocarbons are in, or flowing into, a pyrolysis zone or exposed to pyrolysis temperatures. Controlling the production rate may allow for production of a large quantity of hydrocarbons of a desired quality from the formation.

Certain systems and methods may be used to treat heavy hydrocarbons in at least a portion of a relatively low permeability formation (e.g., in "tight" formations that contain heavy hydrocarbons). Such heavy hydrocarbons may be heated to pyrolyze at least some of the heavy hydrocarbons in a selected section of the formation. Heating may also increase the permeability of at least a portion of the selected section. Fluids generated from pyrolysis may be produced from the formation.

Certain embodiments for treating heavy hydrocarbons in a relatively low permeability formation may include providing heat from one or more heat sources to pyrolyze some of the heavy hydrocarbons and then to vaporize a portion of the heavy hydrocarbons. The heat sources may pyrolyze at least some heavy hydrocarbons in a selected section of the formation and may pressurize at least a portion of the selected section. During the heating, the pressure within the formation may increase substantially. The pressure in the formation may be controlled such that the pressure in the formation may be maintained to produce a fluid of a desired composition. Pyrolyzation fluid may be removed from the formation as vapor from one or more heater wells by using the back pressure created by heating the formation.

Certain embodiments for treating heavy hydrocarbons in at least a portion of a relatively low permeability formation may include heating to create a pyrolysis zone and heating a selected second section to less than the average temperature within the pyrolysis zone. Heavy hydrocarbons may be pyrolyzed in the pyrolysis zone. Heating the selected second section may decrease the viscosity of some of the heavy hydrocarbons in the selected second section to create a low viscosity zone. The decrease in viscosity of the fluid in the selected second section may be sufficient such that at least some heated heavy hydrocarbons within the selected second section may flow into the pyrolysis zone. Pyrolyzation fluid may be produced from the pyrolysis zone. In one embodiment, the density of the heat sources in the pyrolysis zone may be greater than in the low viscosity zone.

In certain embodiments, it may be desirable to create the pyrolysis zones and low viscosity zones sequentially over time. The heat sources in a region near a desired pyrolysis zone may be activated first, resulting in establishment of a substantially uniform pyrolysis zone after a period of time. Once the pyrolysis zone is established, heat sources in the low viscosity zone may be activated sequentially from nearest to farthest from the pyrolysis zone.

A heated formation may also be used to produce synthesis gas. Synthesis gas may be produced from the formation prior to or subsequent to producing a formation fluid from the formation. For example, synthesis gas generation may be commenced before and/or after formation fluid production decreases to an uneconomical level. Heat provided to pyrolyze hydrocarbons within the formation may also be used to generate synthesis gas. For example, if a portion of the formation is at a temperature from approximately 270° C. to approximately 375° C. (or 400° C. in some embodiments) after pyrolyzation, then less additional heat is generally required to heat such portion to a temperature sufficient to support synthesis gas generation.

In certain embodiments, synthesis gas is produced after production of pyrolysis fluids. For example, after pyrolysis of a portion of a formation, synthesis gas may be produced from carbon and/or hydrocarbons remaining within the formation. Pyrolysis of the portion may produce a relatively high, substantially uniform permeability throughout the portion. Such a relatively high, substantially uniform permeability may allow generation of synthesis gas from a significant portion of the formation at relatively low pressures. The portion may also have a large surface area and/or surface area/volume. The large surface area may allow synthesis gas producing reactions to be substantially at equilibrium conditions during synthesis gas generation. The relatively high, substantially uniform permeability may result in a relatively high recovery efficiency of synthesis gas, as compared to synthesis gas generation in a hydrocarbon containing formation that has not been so treated.

Pyrolysis of at least some hydrocarbons may in some embodiments convert about 15 weight % or more of the carbon initially available. Synthesis gas generation may convert approximately up to an additional 80 weight % or more of carbon initially available within the portion. In situ production of synthesis gas from a hydrocarbon containing formation may allow conversion of larger amounts of carbon initially available within the portion. The amount of conversion achieved may, in some embodiments, be limited by subsidence concerns.

Certain embodiments may include providing heat from one or more heat sources to heat the formation to a temperature sufficient to allow synthesis gas generation (e.g., in a range of approximately 400° C. to approximately 1200° C. or higher). At a lower end of the temperature range, generated synthesis gas may have a high hydrogen ($H_2$) to carbon monoxide (CO) ratio. At an upper end of the temperature range, generated synthesis gas may include mostly $H_2$ and CO in lower ratios (e.g., approximately a 1:1 ratio).

Heat sources for synthesis gas production may include any of the heat sources as described in any of the embodiments set forth herein. Alternatively, heating may include transferring heat from a heat transfer fluid (e.g., steam or combustion products from a burner) flowing within a plurality of wellbores within the formation.

A synthesis gas generating fluid (e.g., liquid water, steam, carbon dioxide, air, oxygen, hydrocarbons, and mixtures thereof) may be provided to the formation. For example, the synthesis gas generating fluid mixture may include steam and oxygen. In an embodiment, a synthesis gas generating fluid may include aqueous fluid produced by pyrolysis of at least some hydrocarbons within one or more other portions of the formation. Providing the synthesis gas generating fluid may alternatively include raising a water table of the formation to allow water to flow into it. Synthesis gas generating fluid may also be provided through at least one injection wellbore. The synthesis gas generating fluid will generally react with carbon in the formation to form $H_2$, water, methane, $CO_2$, and/or CO. A portion of the carbon dioxide may react with carbon in the formation to generate carbon monoxide. Hydrocarbons such as ethane may be added to a synthesis gas generating fluid. When introduced into the formation, the hydrocarbons may crack to form hydrogen and/or methane. The presence of methane in produced synthesis gas may increase the heating value of the produced synthesis gas.

Synthesis gas generation is, in some embodiments, an endothermic process. Additional heat may be added to the formation during synthesis gas generation to maintain a high temperature within the formation. The heat may be added from heater wells and/or from oxidizing carbon and/or hydrocarbons within the formation.

In an embodiment, an oxidant may be added to a synthesis gas generating fluid. The oxidant may include, but is not limited to, air, oxygen enriched air, oxygen, hydrogen peroxide, other oxidizing fluids, or combinations thereof. The oxidant may react with carbon within the formation to exothermically generate heat. Reaction of an oxidant with carbon in the formation may result in production of $CO_2$, and/or CO. Introduction of an oxidant to react with carbon in the formation may economically allow raising the formation temperature high enough to result in generation of significant quantities of $H_2$ and CO from hydrocarbons within the formation. Synthesis gas generation may be via a batch process or a continuous process.

Synthesis gas may be produced from the formation through one or more producer wells that include one or more heat sources. Such heat sources may operate to promote production of the synthesis gas with a desired composition.

Certain embodiments may include monitoring a composition of the produced synthesis gas and then controlling heating and/or controlling input of the synthesis gas generating fluid to maintain the composition of the produced synthesis gas within a desired range. For example, in some embodiments (e.g., such as when the synthesis gas will be used as a feedstock for a Fischer-Tropsch process), a desired composition of the produced synthesis gas may have a ratio of hydrogen to carbon monoxide of about 1.8:1 to 2.2:1 (e.g., about 2:1 or about 2.1:1). In some embodiments (such as when the synthesis gas will be used as a feedstock to make methanol), such ratio may be about 3:1 (e.g., about 2.8:1 to 3.2:1).

Certain embodiments may include blending a first synthesis gas with a second synthesis gas to produce synthesis gas of a desired composition. The first and the second synthesis gases may be produced from different portions of the formation.

Synthesis gases may be converted to heavier condensable hydrocarbons. For example, a Fischer-Tropsch hydrocarbon synthesis process may convert synthesis gas to branched and unbranched paraffins. Paraffins produced from the Fischer-Tropsch process may be used to produce other products such as diesel, jet fuel, and naphtha products. The produced synthesis gas may also be used in a catalytic methanation process to produce methane. Alternatively, the produced synthesis gas may be used for production of methanol, gasoline and diesel fuel, ammonia, and middle distillates. Produced synthesis gas may be used to heat the formation as a combustion fuel. Hydrogen in produced synthesis gas may be used to upgrade oil.

Synthesis gas may also be used for other purposes. Synthesis gas may be combusted as fuel. Synthesis gas may also be used for synthesizing a wide range of organic and/or inorganic compounds, such as hydrocarbons and ammonia. Synthesis gas may be used to generate electricity by combusting it as a fuel, by reducing the pressure of the synthesis gas in turbines, and/or using the temperature of the synthesis gas to make steam (and then run turbines). Synthesis gas may also be used in an energy generation unit such as a molten carbonate fuel cell, a solid oxide fuel cell, or other type of fuel cell.

Certain embodiments may include separating a fuel cell feed stream from fluids produced from pyrolysis of at least some of the hydrocarbons within a formation. The fuel cell feed stream may include $H_2$, hydrocarbons, and/or carbon monoxide. In addition, certain embodiments may include directing the fuel cell feed stream to a fuel cell to produce electricity. The electricity generated from the synthesis gas or the pyrolyzation fluids in the fuel cell may power electric heaters, which may heat at least a portion of the formation. Certain embodiments may include separating carbon dioxide from a fluid exiting the fuel cell. Carbon dioxide produced from a fuel cell or a formation may be used for a variety of purposes.

In certain embodiments, synthesis gas produced from a heated formation may be transferred to an additional area of the formation and stored within the additional area of the formation for a length of time. The conditions of the additional area of the formation may inhibit reaction of the synthesis gas. The synthesis gas may be produced from the additional area of the formation at a later time.

In some embodiments, treating a formation may include injecting fluids into the formation. The method may include providing heat to the formation, allowing the heat to transfer to a selected section of the formation, injecting a fluid into the selected section, and producing another fluid from the formation. Additional heat may be provided to at least a portion of the formation, and the additional heat may be allowed to transfer from at least the portion to the selected section of the formation. At least some hydrocarbons may be pyrolyzed within the selected section and a mixture may be produced from the formation. Another embodiment may include leaving a section of the formation proximate the selected section substantially unleached. The unleached section may inhibit the flow of water into the selected section.

In an embodiment, heat may be provided to the formation. The heat may be allowed to transfer to a selected section of the formation such that dissociation of carbonate minerals is inhibited. At least some hydrocarbons may be pyrolyzed within the selected section and a mixture produced from the formation. The method may further include reducing a temperature of the selected section and injecting a fluid into the selected section. Another fluid may be produced from the formation. Alternatively, subsequent to providing heat and allowing heat to transfer, a method may include injecting a fluid into the selected section and producing another fluid from the formation. Similarly, a method may include injecting a fluid into the selected section and pyrolyzing at least some hydrocarbons within the selected section of the formation after providing heat and allowing heat to transfer to the selected section.

In an embodiment that includes injecting fluids, a method of treating a formation may include providing heat from one or more heat sources and allowing the heat to transfer to a selected section of the formation such that a temperature of the selected section is less than about a temperature at which nahcolite dissociates. A fluid may be injected into the selected section and another fluid may be produced from the formation. The method may further include providing additional heat to the formation, allowing the additional heat to transfer to the selected section of the formation, and pyrolyzing at least some hydrocarbons within the selected section. A mixture may then be produced from the formation.

Certain embodiments that include injecting fluids may also include controlling the heating of the formation. A method may include providing heat to the formation, controlling the heat such that a selected section is at a first temperature, injecting a fluid into the selected section, and producing another fluid from the formation. The method may further include controlling the heat such that the selected section is at a second temperature that is greater than the first temperature. Heat may be allowed to transfer from the selected section, and at least some hydrocarbons may be pyrolyzed within the selected section of the formation. A mixture may be produced from the formation.

A further embodiment that includes injecting fluids may include providing heat to a formation, allowing the heat to transfer to a selected section of the formation, injecting a first fluid into the selected section, and producing a second fluid from the formation. The method may further include providing additional heat, allowing the additional heat to transfer to the selected section of the formation, pyrolyzing at least some hydrocarbons within the selected section of the formation, and producing a mixture from the formation. In addition, a temperature of the selected section may be reduced and a third fluid may be injected into the selected section. A fourth fluid may be produced from the formation.

In some embodiments, migration of fluids into and/or out of a treatment area may be inhibited. Inhibition of migration of fluids may occur before, during, and/or after an in situ treatment process. For example, migration of fluids may be inhibited while heat is provided from one or more heat sources to at least a portion of the treatment area. The heat may be allowed to transfer to at least a portion of the treatment area. Fluids may be produced from the treatment area.

Barriers may be used to inhibit migration of fluids into and/or out of a treatment area in a formation. Barriers may include, but are not limited to naturally occurring portions (e.g., overburden and/or underburden), frozen barrier zones, low temperature barrier zones, grout walls, sulfur wells, dewatering wells, and/or injection wells. Barriers may define the treatment area. Alternatively, barriers may be provided to a portion of the treatment area.

In an embodiment, a method of treating a hydrocarbon containing formation in situ may include providing a refrigerant to a plurality of barrier wells to form a low temperature barrier zone. The method may further include establishing a low temperature barrier zone. In some embodiments, the temperature within the low temperature barrier zone may be lowered to inhibit the flow of water into or out of at least a portion of a treatment area in the formation.

Certain embodiments of treating a hydrocarbon containing formation in situ may include providing a refrigerant to a plurality of barrier wells to form a frozen barrier zone. The frozen barrier zone may inhibit migration of fluids into and/or out of the treatment area. In certain embodiments, a portion of the treatment area is below a water table of the formation. In addition, the method may include controlling pressure to maintain a fluid pressure within the treatment area above a hydrostatic pressure of the formation and producing a mixture of fluids from the formation.

Barriers may be provided to a portion of the formation prior to, during, and after providing heat from one or more heat sources to the treatment area. For example, a barrier may be provided to a portion of the formation that has previously undergone a conversion process.

In some embodiments, migration of fluids into and/or out of a treatment area may be inhibited. Inhibition of migration of fluids may occur before, during, and/or after an in situ treatment process. For example, migration of fluids may be inhibited while heat is provided from heat sources to at least a portion of the treatment area. Barriers may be used to inhibit migration of fluids into and/or out of a treatment area in a formation. Barriers may include, but are not limited to naturally occurring portions and/or installed portions. In some embodiments, the barrier is a low temperature zone or frozen barrier formed by freeze wells installed around a perimeter of a treatment area.

Fluid may be introduced to a portion of the formation that has previously undergone an in situ conversion process. The fluid may be produced from the formation in a mixture, which may contain additional fluids present in the formation. In some embodiments, the produced mixture may be provided to an energy producing unit.

In some embodiments, one or more conditions in a selected section may be controlled during an in situ conversion process to inhibit formation of carbon dioxide. Conditions may be controlled to produce fluids having a carbon dioxide emission level that is less than a selected carbon dioxide level. For example, heat provided to the formation may be controlled to inhibit generation of carbon dioxide, while increasing production of molecular hydrogen.

In a similar manner, a method for producing methane from a hydrocarbon containing formation in situ while minimizing production of $CO_2$ may include controlling the heat from the one or more heat sources to enhance production of methane in the produced mixture and generating heat via at least one or more of the heat sources in a manner that minimizes $CO_2$ production. The methane may further include controlling a temperature proximate the production wellbore at or above a decomposition temperature of ethane.

In certain embodiments, a method for producing products from a heated formation may include controlling a condition within a selected section of the formation to produce a mixture having a carbon dioxide emission level below a selected baseline carbon dioxide emission level. In some embodiments, the mixture may be blended with a fluid to generate a product having a carbon dioxide emission level below the baseline.

In an embodiment, a method for producing methane from a heated formation in situ may include providing heat from one or more heat sources to at least one portion of the formation and allowing the heat to transfer to a selected section of the formation. The method may further include providing hydrocarbon compounds to at least the selected section of the formation and producing a mixture including methane from the hydrocarbons in the formation.

One embodiment of a method for producing hydrocarbons in a heated formation may include forming a temperature gradient in at least a portion of a selected section of the heated formation and providing a hydrocarbon mixture to at least the selected section of the formation. A mixture may then be produced from a production well.

In certain embodiments, a method for upgrading hydrocarbons in a heated formation may include providing hydrocarbons to a selected section of the heated formation and allowing the hydrocarbons to crack in the heated formation. The cracked hydrocarbons may be a higher grade than the provided hydrocarbons. The upgraded hydrocarbons may be produced from the formation.

Cooling a portion of the formation after an in situ conversion process may provide certain benefits, such as increasing the strength of the rock in the formation (thereby mitigating subsidence), increasing absorptive capacity of the formation, etc.

In an embodiment, a portion of a formation that has been pyrolyzed and/or subjected to synthesis gas generation may be allowed to cool or may be cooled to form a cooled, spent portion within the formation. For example, a heated portion of a formation may be allowed to cool by transference of heat to an adjacent portion of the formation. The transference of heat may occur naturally or may be forced by the introduction of heat transfer fluids through the heated portion and into a cooler portion of the formation.

In some embodiments, recovering thermal energy from a post treatment hydrocarbon containing formation may include injecting a heat recovery fluid into a portion of the formation. Heat from the formation may transfer to the heat recovery fluid. The heat recovery fluid may be produced from the formation. For example, introducing water to a portion of the formation may cool the portion. Water introduced into the portion may be removed from the formation as steam. The removed steam or hot water may be injected into a hot portion of the formation to create synthesis gas In an embodiment, hydrocarbons may be recovered from a post treatment hydrocarbon containing formation by injecting a heat recovery fluid into a portion of the formation. Heat may vaporize at least some of the heat recovery fluid and at least some hydrocarbons in the formation. A portion of the vaporized recovery fluid and the vaporized hydrocarbons may be produced from the formation.

In certain embodiments, fluids in the formation may be removed from a post treatment hydrocarbon formation by injecting a heat recovery fluid into a portion of the formation. Heat may transfer to the heat recovery fluid and a portion of the fluid may be produced from the formation. The heat recovery fluid produced from the formation may include at least some of the fluids in the formation.

In one embodiment, a method of recovering excess heat from a heated formation may include providing a product stream to the heated formation, such that heat transfers from the heated formation to the product stream. The method may further include producing the product stream from the heated formation and directing the product stream to a processing unit. The heat of the product stream may then be transferred to the processing unit. In an alternative method for recovering excess heat from a heated formation, the heated product stream may be directed to another formation, such that heat transfers from the product stream to the other formation.

In one embodiment, a method of utilizing heat of a heated formation may include placing a conduit in the formation, such that conduit input may be located separately from conduit output. The conduit may be heated by the heated formation to produce a region of reaction in at least a portion of the conduit. The method may further include directing a material through the conduit to the region of reaction. The material may undergo change in the region of reaction. A product may be produced from the conduit.

An embodiment of a method of utilizing heat of a heated formation may include providing heat from one or more heat sources to at least one portion of the formation and allowing the heat to transfer to a region of reaction in the formation. Material may be directed to the region of reaction and allowed to react in the region of reaction. A mixture may then be produced from the formation.

In an embodiment, a portion of a hydrocarbon containing formation may be used to store and/or sequester materials (e.g., formation fluids, carbon dioxide). The conditions within the portion of the formation may inhibit reactions of the materials. Materials may be stored in the portion for a length of time. In addition, materials may be produced from the portion at a later time. Materials stored within the portion may have been previously produced from the portion of the formation, and/or another portion of the formation.

In an embodiment, a portion of pyrolyzation fluids removed from a formation may be stored in an adjacent spent portion when treatment facilities that process removed pyrolyzation fluid are not able to process the portion. In certain embodiments, removal of pyrolyzation fluids stored in a spent formation may be facilitated by heating the spent formation.

In an embodiment, a portion of synthesis gas removed from a formation may be stored in an adjacent or nearby spent portion when treatment facilities that process removed synthesis gas are not able to process the portion. In certain embodiments, removal of synthesis gas stored in a spent formation may be facilitated by heating the spent formation.

After an in situ conversion process has been completed in a portion of the formation, fluid may be sequestered within the formation. In some embodiments, to store a significant amount of fluid within the formation, a temperature of the formation will often need to be less than about 100° C. Water may be introduced into at least a portion of the formation to generate steam and reduce a temperature of the formation. The steam may be removed from the formation. The steam may be utilized for various purposes, including, but not limited to, heating another portion of the formation, generating synthesis gas in an adjacent portion of the formation, generating electricity, and/or as a steam flood in a oil reservoir. After the formation has cooled, fluid (e.g., carbon dioxide) may be pressurized and sequestered in the formation. Sequestering fluid within the formation may result in a significant reduction or elimination of fluid that is released to the environment due to operation of the in situ conversion process.

In some embodiments, carbon dioxide may be injected under pressure into the portion of the formation. The injected carbon dioxide may adsorb onto hydrocarbons in the formation and/or reside in void spaces such as pores in the formation. The carbon dioxide may be generated during pyrolysis, synthesis gas generation, and/or extraction of useful energy. In some embodiments, carbon dioxide may be stored in relatively deep hydrocarbon containing formations and used to desorb methane.

In one embodiment, a method for sequestering carbon dioxide in a heated formation may include precipitating carbonate compounds from carbon dioxide provided to a portion of the formation. In some embodiments, the portion may have previously undergone an in situ conversion process. Carbon dioxide and a fluid may be provided to the portion of the formation. The fluid may combine with carbon dioxide in the portion to precipitate carbonate compounds.

In some embodiments, methane may be recovered from a hydrocarbon containing formation by providing heat to the formation. The heat may desorb a substantial portion of the methane within the selected section of the formation. At least a portion of the methane may be produced from the formation.

In an embodiment, a method for purifying water in a spent formation may include providing water to the formation and filtering the provided water in the formation. The filtered water may then be produced from the formation.

In an embodiment, treating a hydrocarbon containing formation in situ may include injecting a recovery fluid into the formation. Heat may be provided from one or more heat sources to the formation. The heat may transfer from one or more of the heat sources to a selected section of the formation and vaporize a substantial portion of recovery fluid in at least a portion of the selected section. The heat from the heat sources and the vaporized recovery fluid may pyrolyze at least some hydrocarbons within the selected section. A gas mixture may be produced from the formation. The produced gas mixture may include hydrocarbons with an average API gravity greater than about 25°.

In certain embodiments, a method of shutting-in an in situ treatment process in a hydrocarbon containing formation may include terminating heating from one or more heat sources providing heat to a portion of the formation. A pressure may be monitored and controlled in at least a portion of the formation. The pressure may be maintained approximately below a fracturing or breakthrough pressure of the formation.

One embodiment of a method of shutting-in an in situ treatment process in a hydrocarbon containing formation may include terminating heating from one or more heat sources providing heat to a portion of the formation. Hydrocarbon vapor may be produced from the formation. At least a portion of the produced hydrocarbon vapor may be injected into a portion of a storage formation. The hydrocarbon vapor may be injected into a relatively high temperature formation. A substantial portion of injected hydrocarbons may be converted to coke and $H_2$ in the relatively high temperature formation. Alternatively, the hydrocarbon vapor may be stored in a depleted formation.

In an embodiment, one or more openings (or wellbores) may be formed in a hydrocarbon containing formation. A first opening may be formed in the formation. A plurality of magnets may be provided to the first opening. The plurality of magnets may be positioned along a portion of the first opening. The plurality of magnets may produce a series of magnetic fields along the portion of the first opening.

A second opening may be formed in the formation using magnetic tracking of the series of magnetic fields produced by the plurality of magnets in the first opening. Magnetic tracking may be used to form the second opening an approximate desired distance from the first opening. In certain embodiments, the deviation in spacing between the first opening and the second opening may be less than or equal to about ±0.5 m.

In some embodiments, the plurality of magnets may form a magnetic string. The magnetic string may include one or more magnetic segments. In certain embodiments, each magnetic segment may include a plurality of magnets. The magnetic segments may include an effective north pole and an effective south pole. In an embodiment, two adjacent magnetic segments are positioned with opposing poles to form a junction of opposing poles.

In some embodiments, a current may be passed into a casing of a well. The current in the casing may generate a magnetic field. The magnetic field may be detected and utilized to guide drilling of an adjacent well or wells. A portion of the casing may be insulated to inhibit current loss to the formation. In some embodiments, an insulated wire may be positioned in a well. A current passed through the insulated wire may generate a magnetic field. The magnetic field may be detected and utilized to guide drilling of an adjacent well or wells.

In some embodiments, acoustics may be used to guide placement of a well in a formation. For example, reflections of a noise signal generated from a noise source in a well being drilled may be used to determine an approximate position of the drill bit relative to a geological discontinuity in the formation.

Multiple openings may be formed in a hydrocarbon containing formation. In an embodiment, the multiple openings may form a pattern of openings. A first opening may be formed in the formation. A magnetic string may be placed in the first opening to produce magnetic fields in a portion of the formation. A first set of openings may be formed using magnetic tracking of the magnetic string. The magnetic string may be moved to a first opening in the first set of openings. A second set of openings may be formed using magnetic tracking of the magnetic string located in the first opening in the first set of openings. In one embodiment, a third set of openings may be formed by using magnetic tracking of the magnetic string, where the magnetic string is located in an opening in the second set of openings. In another embodiment, a third set of openings may be formed by using magnetic tracking of the magnetic string, where the magnetic string is located in another opening in the first set of openings.

A system for forming openings in a hydrocarbon containing formation may include a drilling apparatus, a magnetic string, and a sensor. The magnetic string may include two or more magnetic segments positioned within a conduit. Each of the magnetic segments may include a plurality of magnets. The sensor may be used to detect magnetic fields within the formation produced by the magnetic string. The magnetic string may be placed in a first opening and the drilling apparatus and sensor in a second opening.

One or more heaters may be disposed within an opening in a hydrocarbon containing formation such that the heaters transfer heat to the formation. In some embodiments, a heater may be placed in an open wellbore in the formation. An "open wellbore" in a formation may be a wellbore without casing or an "uncased wellbore." Heat may conductively and radiatively transfer from the heater to the formation. Alternatively, a heater may be placed within a heater well that may be packed with gravel, sand, and/or cement or a heater well with a casing.

In an embodiment, a conductor-in-conduit heater having a desired length may be assembled. A conductor may be placed within a conduit to form the conductor-in-conduit heater. Two or more conductor-in-conduit heaters may be coupled together to form a heater having the desired length. The conductors of the conductor-in-conduit heaters may be electrically coupled together. In addition, the conduits may be electrically coupled together. A desired length of the conductor-in-conduit may be placed in an opening in the hydrocarbon containing formation. In some embodiments, individual sections of the conductor-in-conduit heater may be coupled using shielded active gas welding.

In certain embodiments, a heater of a desired length may be assembled proximate the hydrocarbon containing formation. The assembled heater may then be coiled. The heater may be placed in the hydrocarbon containing formation by uncoiling the heater into the opening in the hydrocarbon containing formation.

In an embodiment, a system and a method may include an opening in the formation extending from a first location on the surface of the earth to a second location on the surface of the earth. Heat sources may be placed within the opening to provide heat to at least a portion of the formation.

A conduit may be positioned in the opening extending from the first location to the second location. In an embodiment, a heat source may be positioned proximate and/or in the conduit to provide heat to the conduit. Transfer of the heat through the conduit may provide heat to a part of the formation. In some embodiments, an additional heater may be placed in an additional conduit to provide heat to the part of the formation through the additional conduit.

In some embodiments, an annulus is formed between a wall of the opening and a wall of the conduit placed within the opening extending from the first location to the second location. A heat source may be place proximate and/or in the annulus to provide heat to a portion the opening. The provided heat may transfer through the annulus to a part of the formation.

A method for controlling an in situ system of treating a hydrocarbon containing formation may include monitoring at least one acoustic event within the formation using at least one acoustic detector placed within a wellbore in the formation. At least one acoustic event may be recorded with an acoustic monitoring system. In an embodiment, an acoustic source may be used to generate at least one acoustic event. The method may also include analyzing the at least one acoustic event to determine at least one property of the formation. The in situ system may be controlled based on the analysis of the at least one acoustic event.

In some embodiments, subjecting hydrocarbons to an in situ conversion process may mature portions of the hydrocarbons. For example, application of heat to a coal formation may alter properties of coal in the formation. In some embodiments, portions of the coal formation may be converted to a higher rank of coal. Application of heat may reduce water content and/or volatile compound content of coal in the coal formation. Formation fluids (e.g., water and/or volatile compounds) may be removed in a vapor phase. In other embodiments, formation fluids may be removed in liquid and vapor phases or in a liquid phase. Temperature and pressure in at least a portion of the formation may be controlled during pyrolysis to yield improved products from the formation. After application of heat, coal may be produced from the formation. The coal may be anthracitic.

In some embodiments, a recovery fluid may be used to remediate hydrocarbon containing formation treated by in situ conversion process. In some embodiments, hydrocarbons may be recovered from a hydrocarbon containing formation before, during, and/or after treatment by injecting a recovery fluid into a portion of the formation. The recovery fluid may cause fluids within the formation to be produced. In some embodiments, the formation fluids may be separated from the recovery fluid at the surface.

In some in situ conversion process embodiments, non-hydrocarbon materials such as minerals, metals, and other economically viable materials contained within the formation may be economically produced from the formation. In certain embodiments, non-hydrocarbon materials may be recovered and/or produced prior to, during, and/or after the in situ conversion process for treating hydrocarbons using an additional in situ process of treating the formation for producing the non-hydrocarbon materials.

In an embodiment, hydrocarbons within a kerogen and liquid hydrocarbon containing formation may be converted in situ within the formation to yield a mixture of relatively high quality hydrocarbon products, hydrogen, and/or other products. One or more heaters may be used to heat a portion of the kerogen and liquid hydrocarbon containing formation to temperatures that allow pyrolysis of the hydrocarbons. In an embodiment, a portion of the kerogen in the portion may be pyrolyzed. In certain embodiments, at least a portion of the liquid hydrocarbons in the portion of the formation may be mobilized (e.g., the liquid hydrocarbons may be mobilized after kerogen in the formation is pyrolyzed). Hydrocarbons, hydrogen, and other formation fluids may be removed from the formation through one or more production wells. In some embodiments, formation fluids may be removed in a vapor phase. In other embodiments, formation fluids may be removed in liquid and vapor phases or in a liquid phase. Temperature and pressure in at least a portion of the formation may be controlled during pyrolysis to yield improved products from the formation.

In some embodiments, electrical heaters in a formation may be temperature limited heaters. The use of temperature limited heaters may eliminate the need for temperature controllers to regulate energy input into the formation from the heaters. In some embodiments, the temperature limited heaters may be Curie temperature heaters. Heat dissipation from portions of a Curie temperature heater may adjust to local conditions so that energy input to the entire heater does not need to be adjusted (i.e., reduced) to compensate for localized hot spots adjacent to the heater. In some embodiments, temperature limited heaters may be used to efficiently heat formations that have low thermal conductivity layers.

In some heat source embodiments and freeze well embodiments, wells in the formation may have two entries into the formation at the surface. In some embodiments, wells with two entries into the formation are formed using river crossing rigs to drill the wells.

In some embodiments, heating of regions in a volume may be started at selected times. Starting heating of regions in the volume at selected times may allow for accommodation of geomechanical motion that will occur as the formation is heated.

BRIEF DESCRIPTION OF THE DRAWINGS

Advantages of the present invention may become apparent to those skilled in the art with the benefit of the following detailed description and upon reference to the accompanying drawings in which:

FIG. 118 depicts an embodiment of synthesis gas production in a formation.

FIG. 119 depicts an embodiment of continuous synthesis gas production in a formation.

FIG. 120 depicts an embodiment of batch synthesis gas production in a formation.

FIG. 121 depicts an embodiment of producing energy with synthesis gas produced from a hydrocarbon containing formation.

FIG. 122 depicts an embodiment of producing energy with pyrolyzation fluid produced from a hydrocarbon containing formation.

FIG. 123 depicts an embodiment of synthesis gas production from a formation.

FIG. 124 depicts an embodiment of sequestration of carbon dioxide produced during pyrolysis in a hydrocarbon containing formation.

FIG. 125 depicts an embodiment of producing energy with synthesis gas produced from a hydrocarbon containing formation.

FIG. 126 depicts an embodiment of a Fischer-Tropsch process using synthesis gas produced from a hydrocarbon containing formation.

FIG. 127 depicts an embodiment of a Shell Middle Distillates process using synthesis gas produced from a hydrocarbon containing formation.

FIG. 128 depicts an embodiment of a catalytic methanation process using synthesis gas produced from a hydrocarbon containing formation.

FIG. 129 depicts an embodiment of production of ammonia and urea using synthesis gas produced from a hydrocarbon containing formation.

Figure 130:
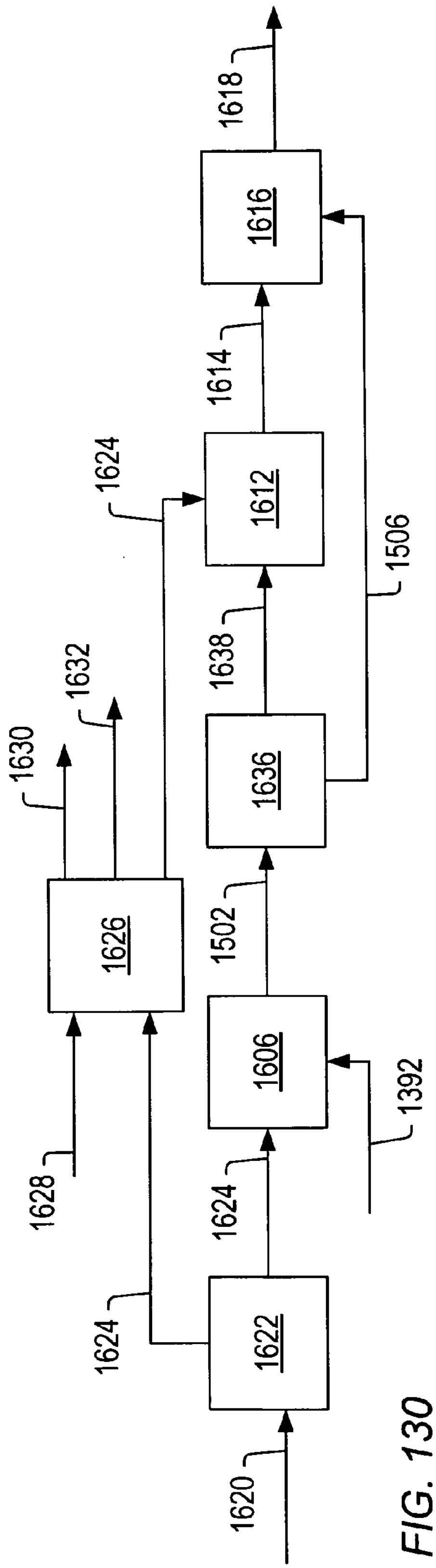

FIG. 130 depicts an embodiment of production of ammonia and urea using synthesis gas produced from a hydrocarbon containing formation.

Figure 131:
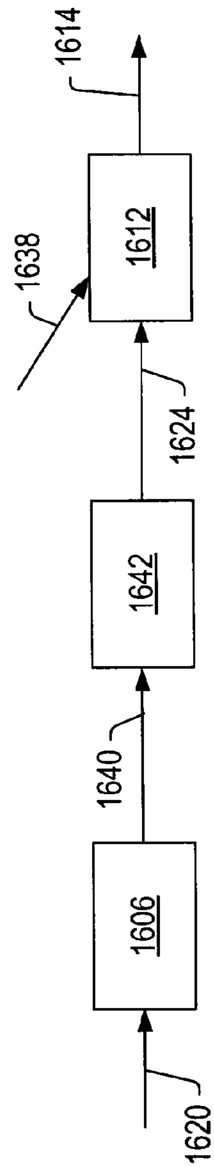

FIG. 131 depicts an embodiment of preparation of a feed stream for an ammonia and urea process.

Figure 132:
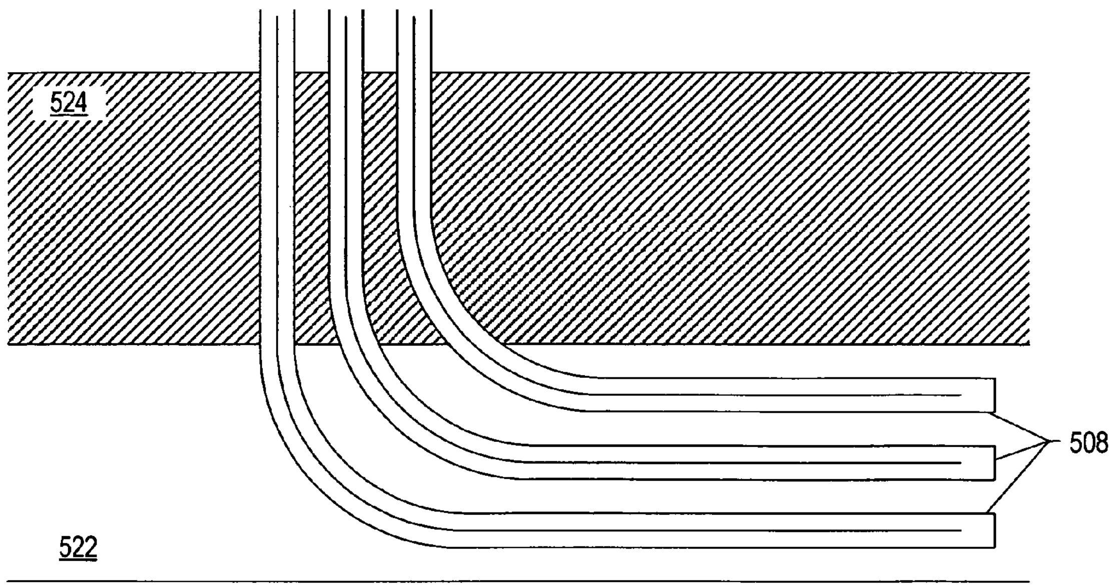

FIG. 132 depicts an embodiment for treating a relatively permeable formation.

Figure 133:
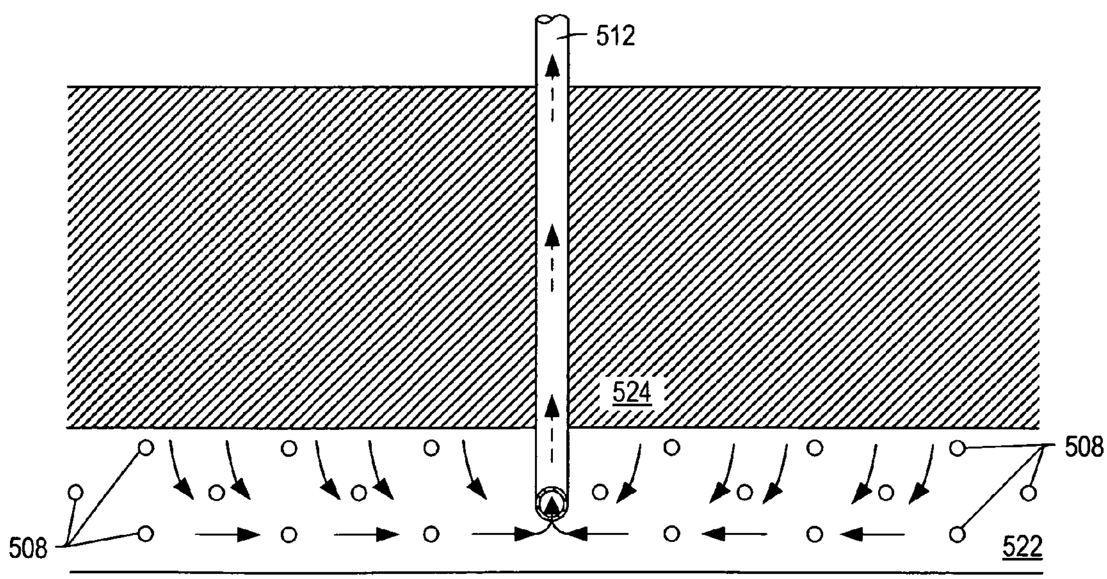

FIG. 133 depicts an embodiment for treating a relatively permeable formation.

Figure 134:
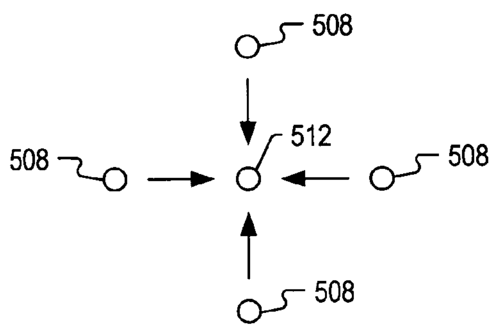

FIG. 134 depicts an embodiment of heat sources in a relatively permeable formation.

Figure 135:
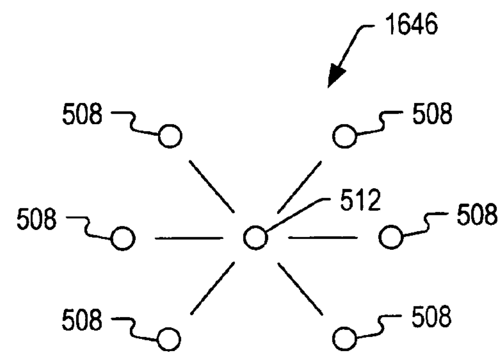

FIG. 135 depicts an embodiment of heat sources in a relatively permeable formation.

Figure 136:
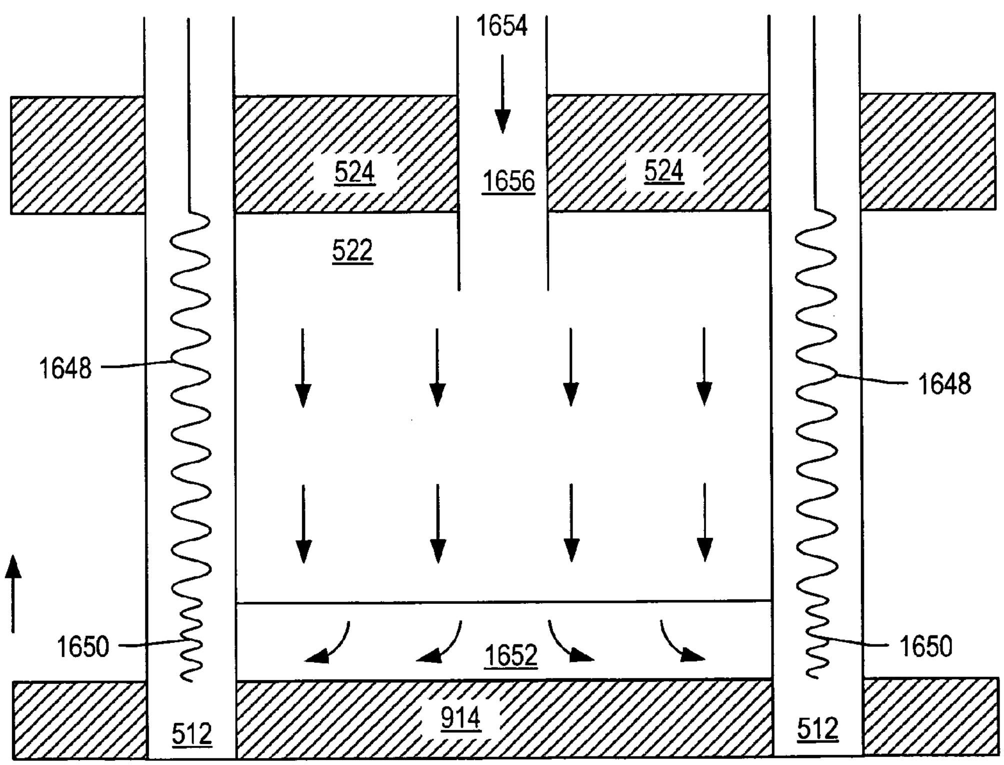

FIG. 136 depicts an embodiment for treating a relatively permeable formation.

Figure 137:
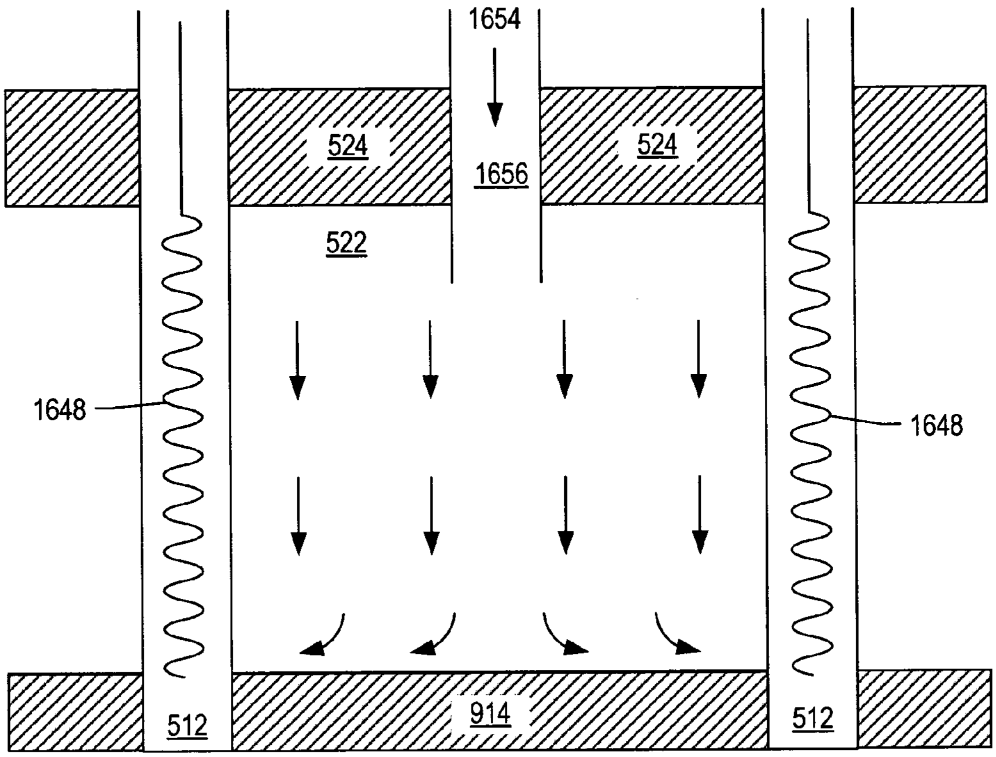

FIG. 137 depicts an embodiment for treating a relatively permeable formation.

Figure 138:
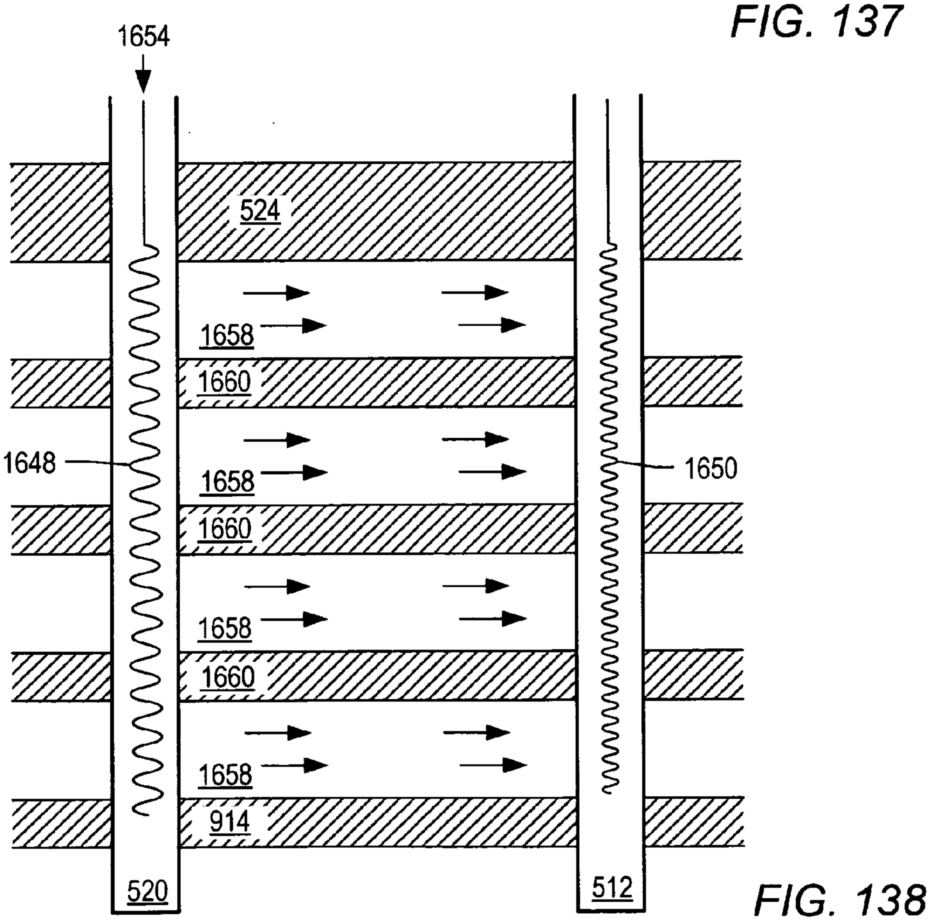

FIG. 138 depicts an embodiment for treating a relatively permeable formation.

Figure 139:
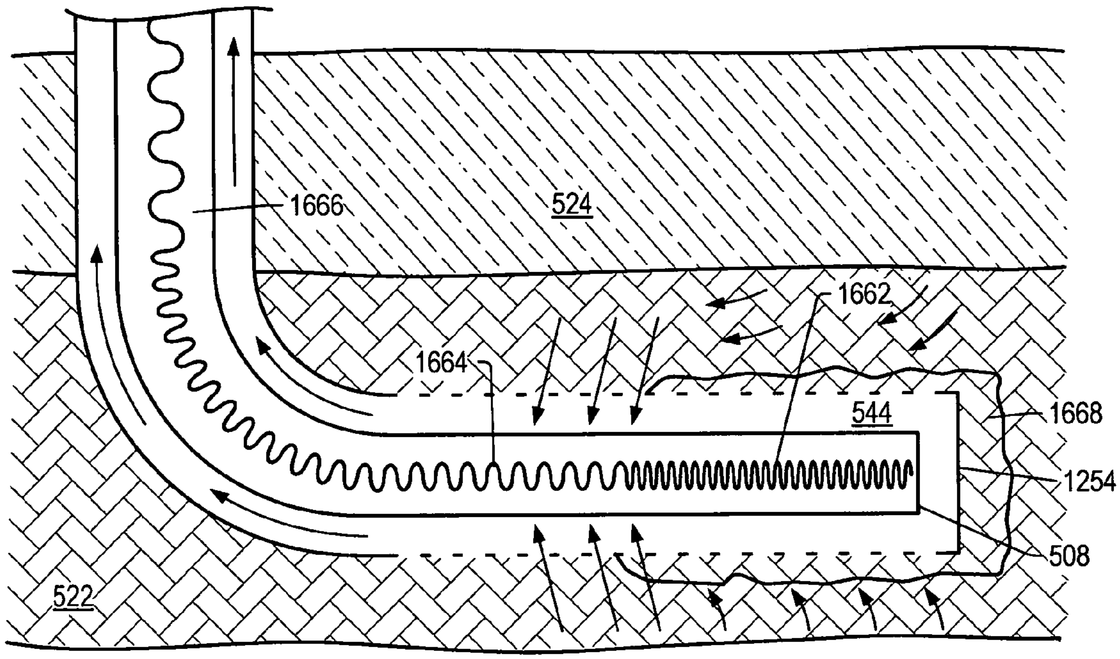

FIG. 139 depicts an embodiment of a heater well with selective heating.

Figure 140:
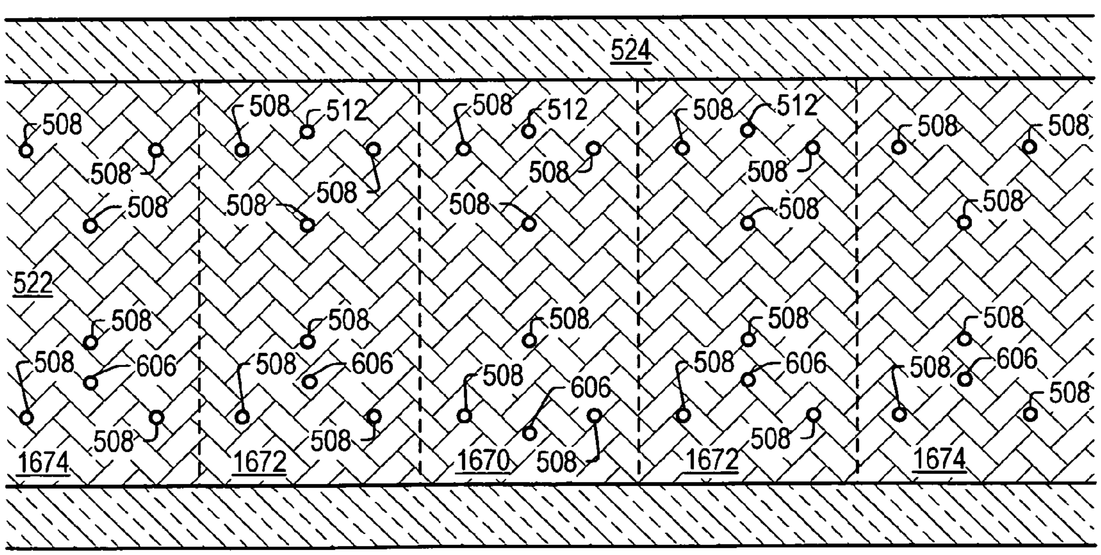

FIG. 140 depicts a cross-sectional representation of an embodiment for treating a formation with multiple heating sections.

Figure 141:
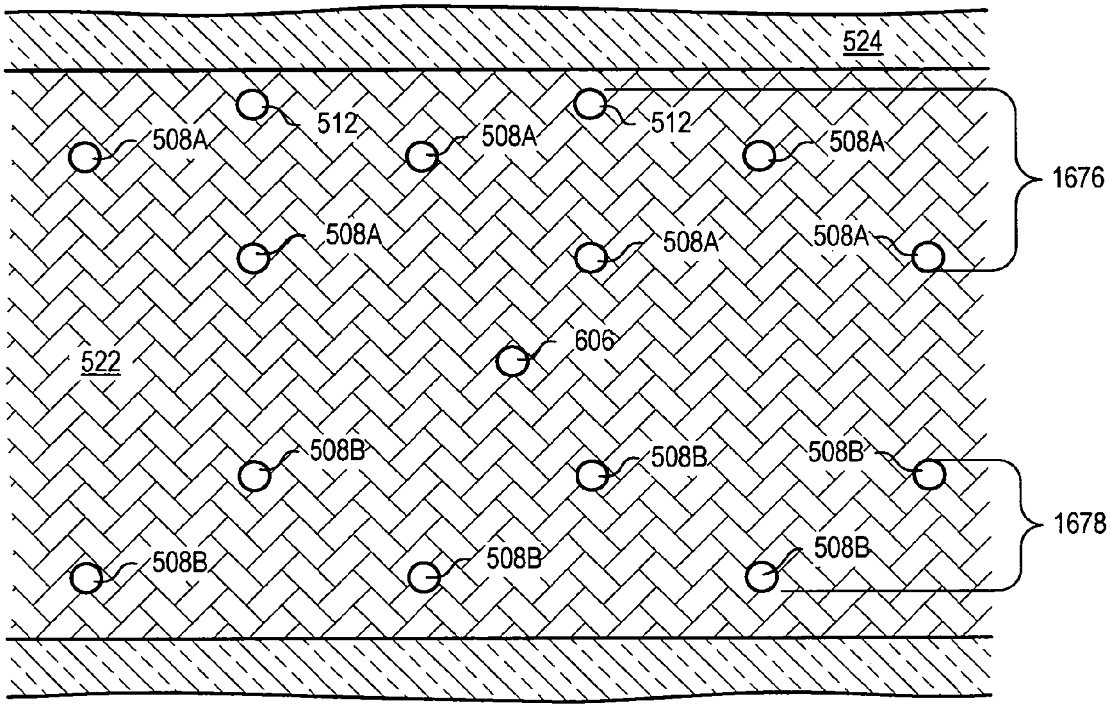

FIG. 141 depicts an end view schematic of an embodiment for treating a relatively permeable formation using a combination of producer and heater wells in the formation.

Figure 142:
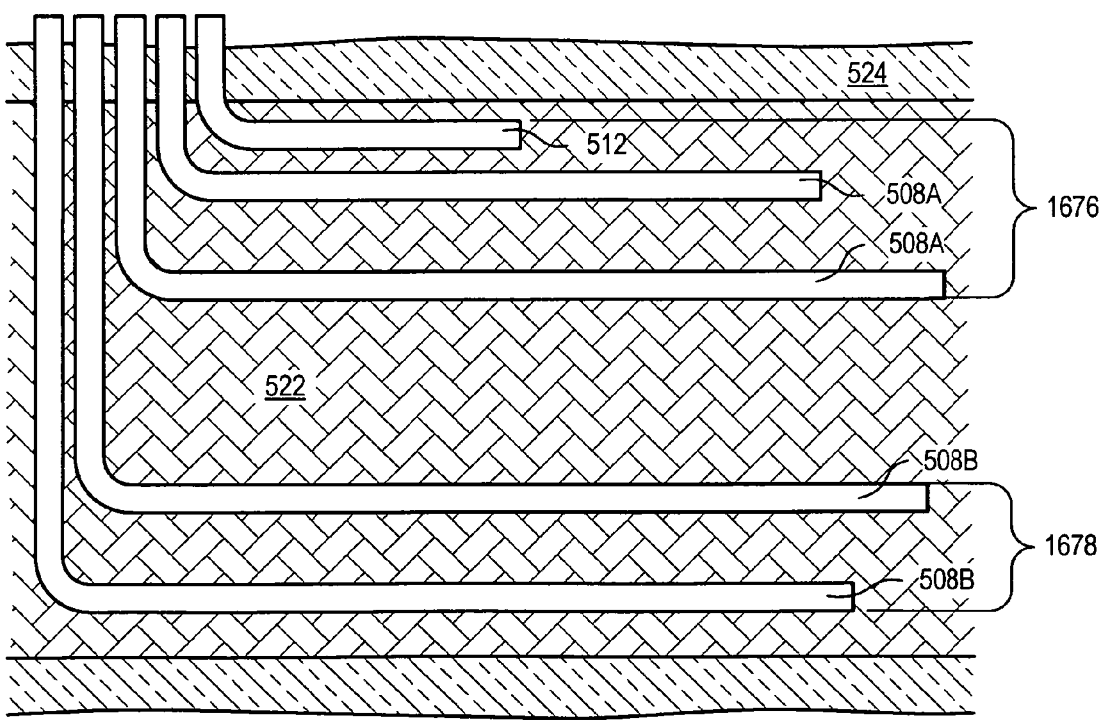

FIG. 142 depicts a side view schematic of the embodiment depicted in FIG. 141.

Figure 143:
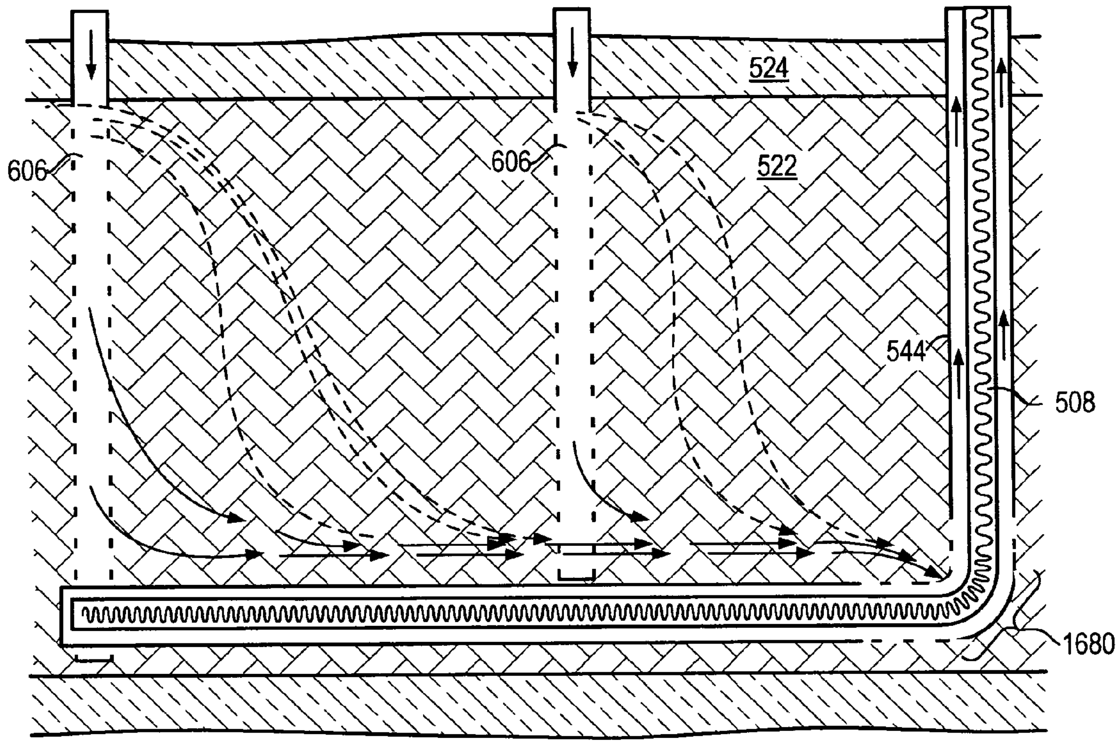

FIG. 143 depicts a schematic of an embodiment for injecting a pressurizing fluid in a formation.

Figure 144:
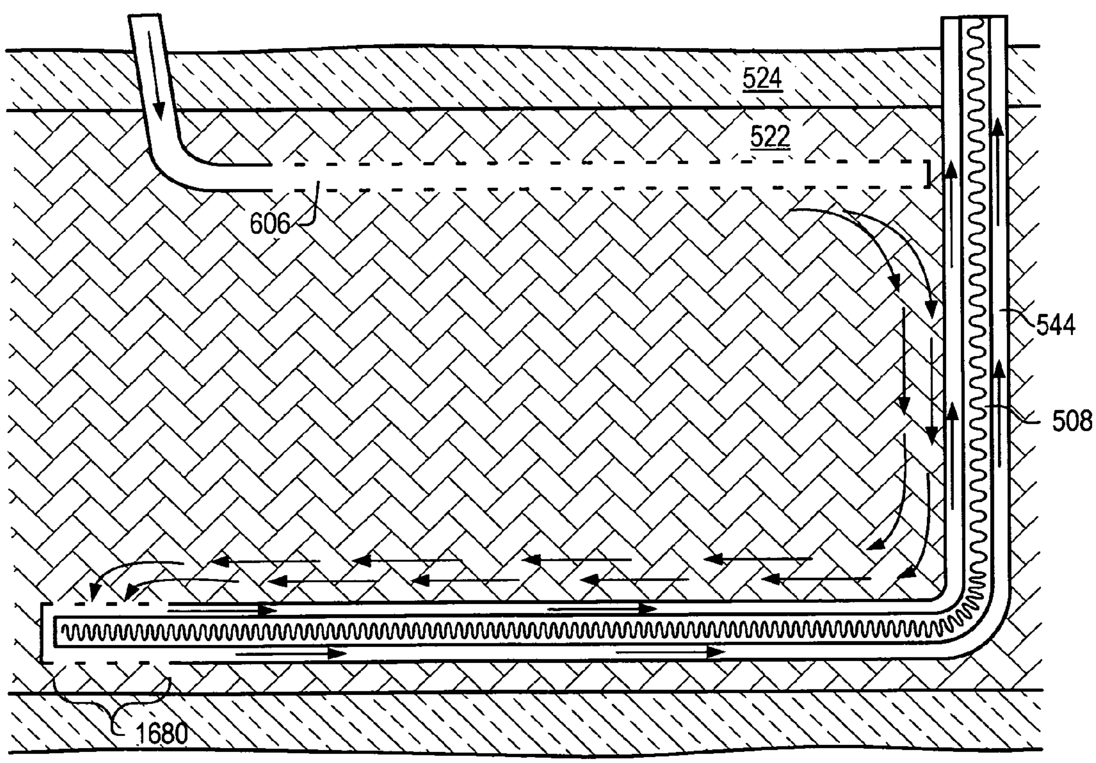

FIG. 144 depicts a schematic of an embodiment for injecting a pressurizing fluid in a formation.

Figure 145A:
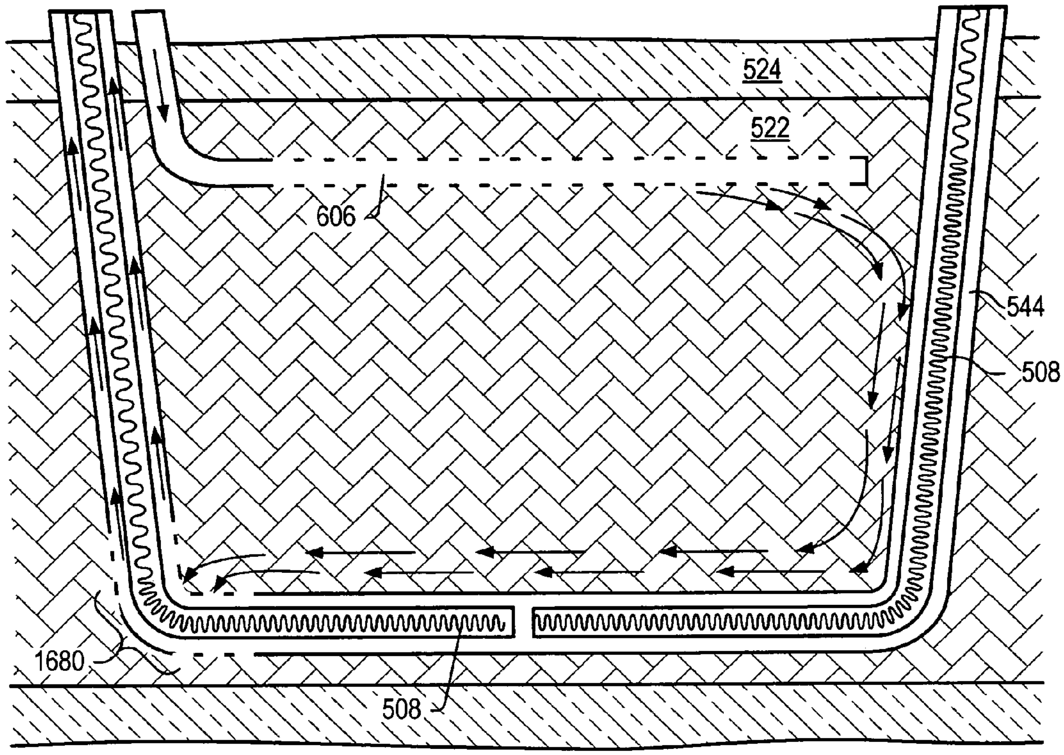

FIG. 145A depicts a schematic of an embodiment for injecting a pressurizing fluid in a formation.

Figure 145B:
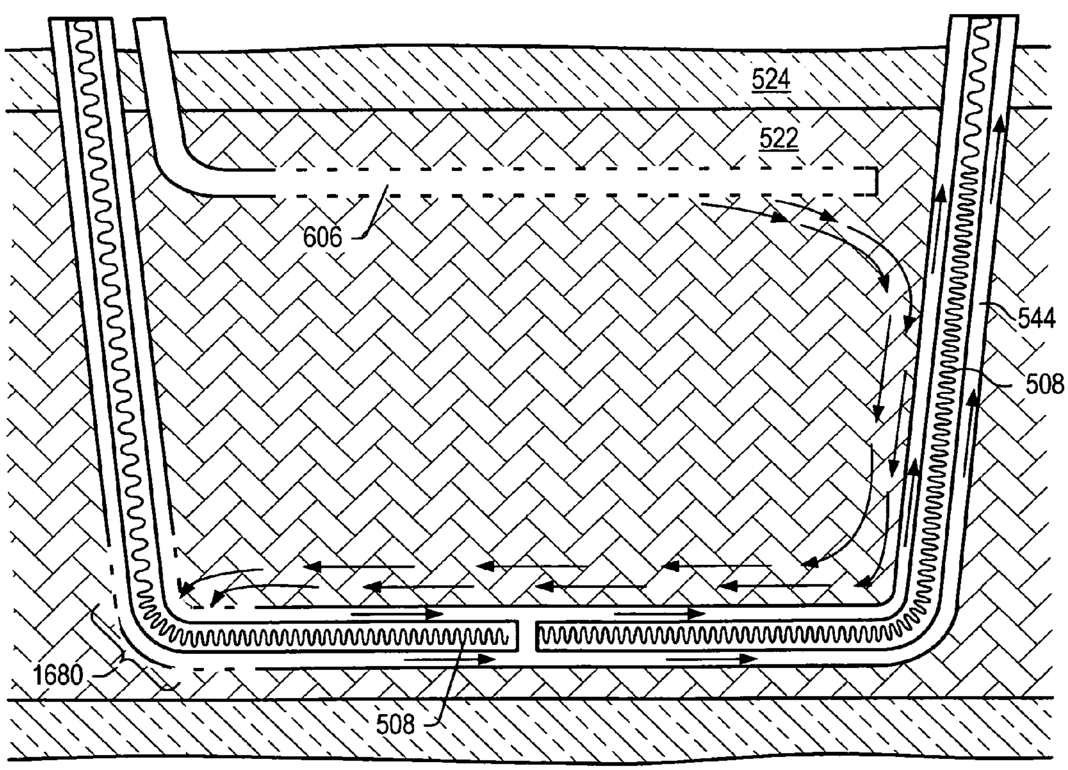

FIG. 145B depicts a schematic of an embodiment for injecting a pressurizing fluid in a formation.

Figure 146:
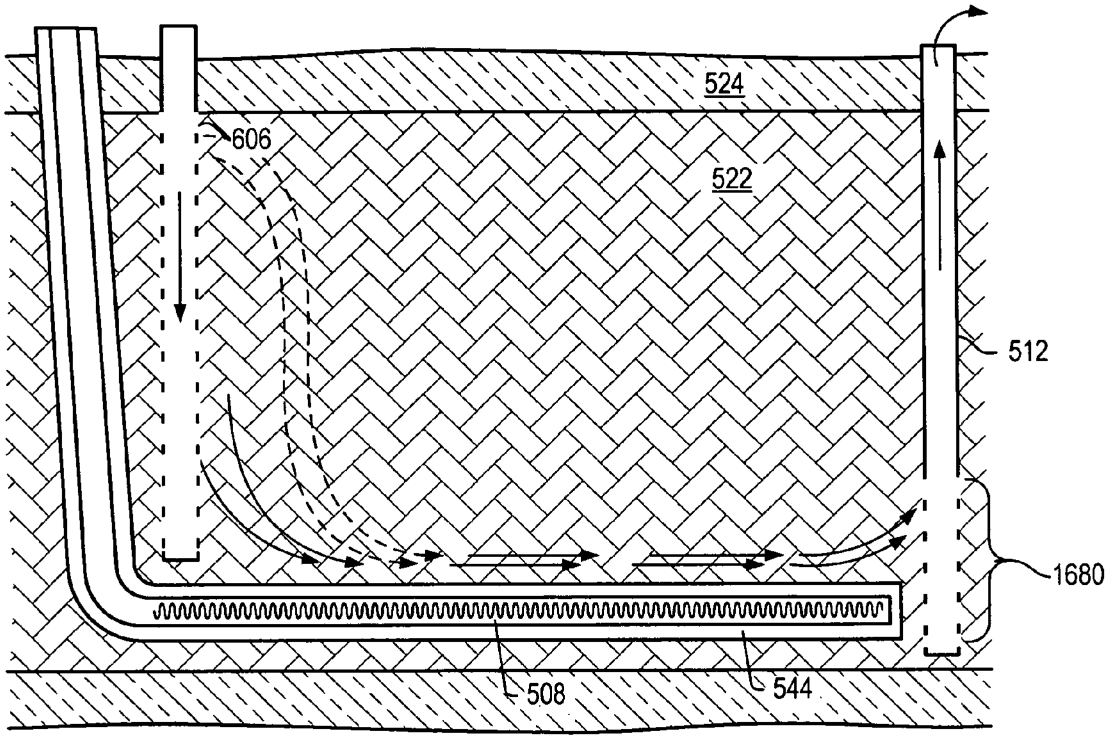

FIG. 146 depicts a schematic of an embodiment for injecting a pressurizing fluid in a formation.

Figure 147:
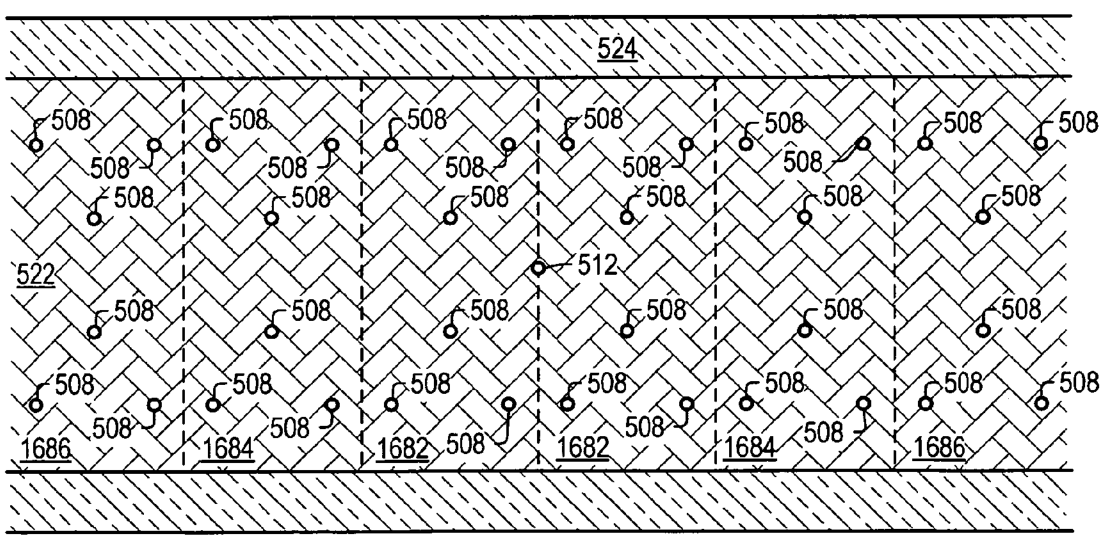

FIG. 147 depicts a cross-sectional representation of an embodiment for treating a relatively permeable formation.

Figure 148:
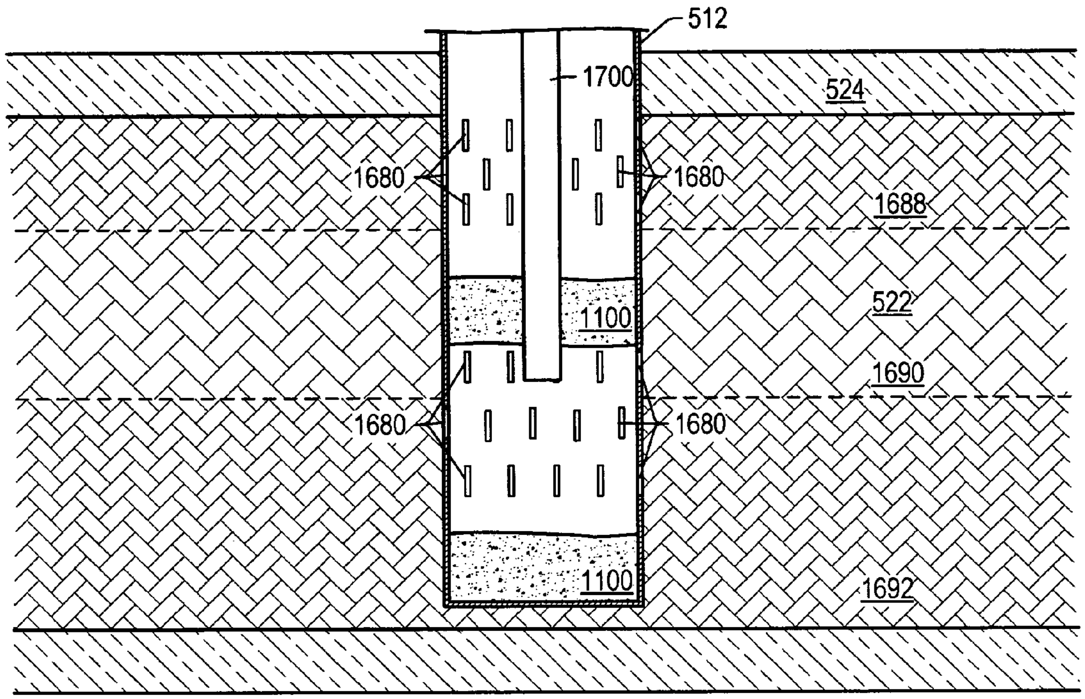

FIG. 148 depicts a cross-sectional representation of an embodiment of production well placed in a formation.

Figure 149:
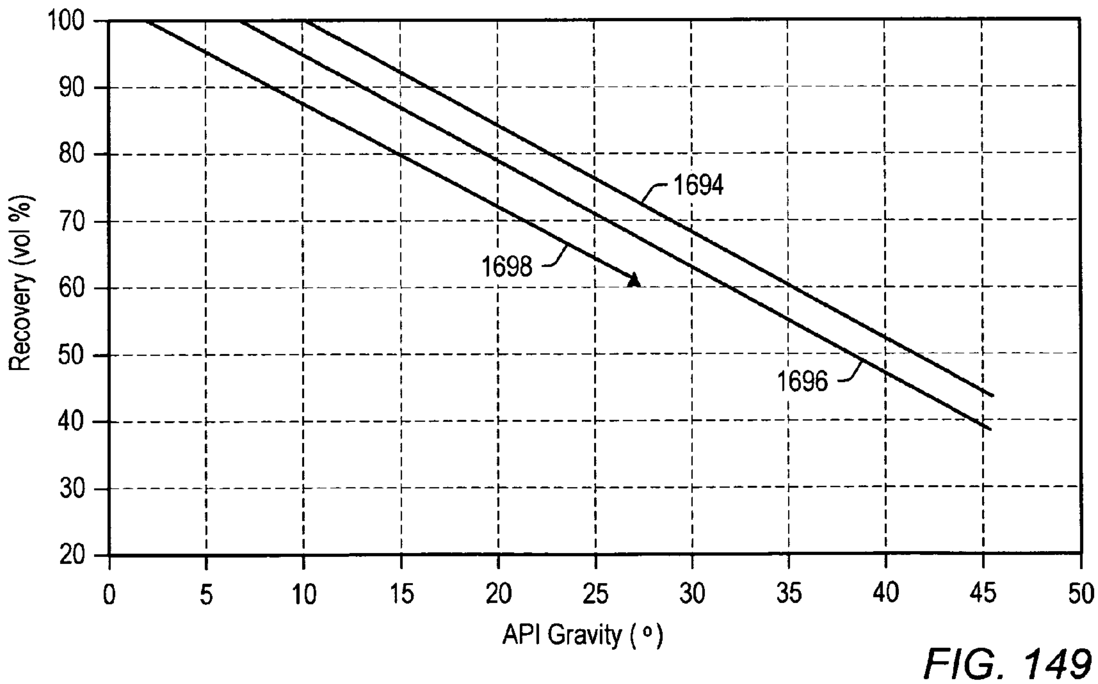

FIG. 149 depicts linear relationships between total mass recovery versus API gravity for three different tar sand formations.

Figure 150:
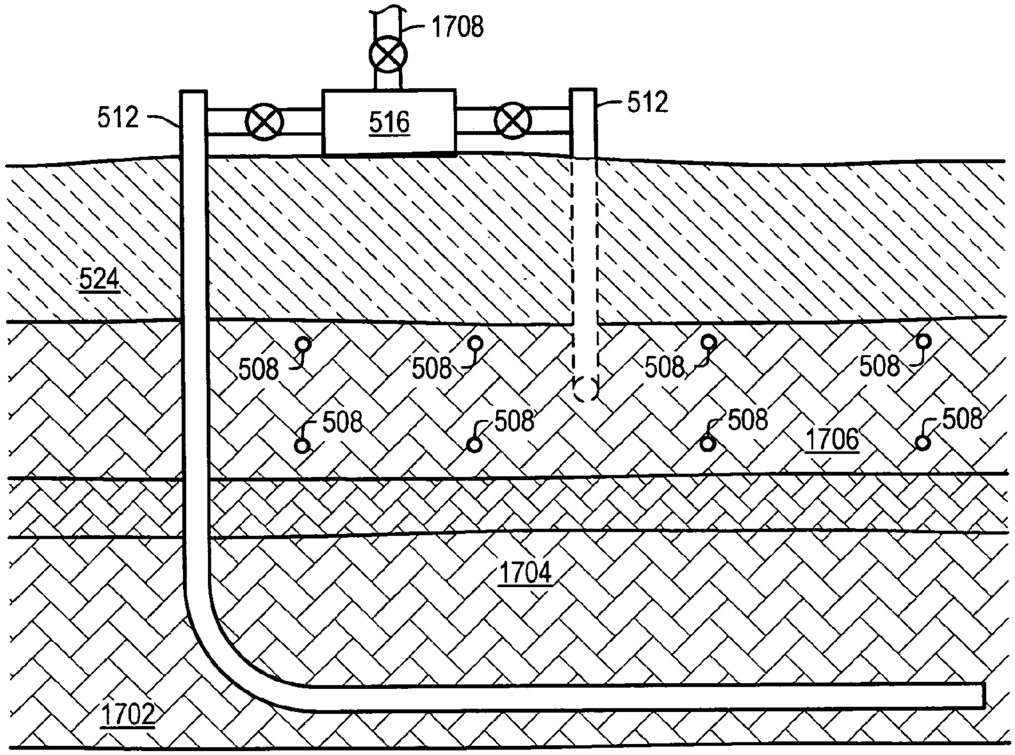

FIG. 150 depicts schematic of an embodiment of a relatively permeable formation used to produce a first mixture that is blended with a second mixture.

Figure 151:
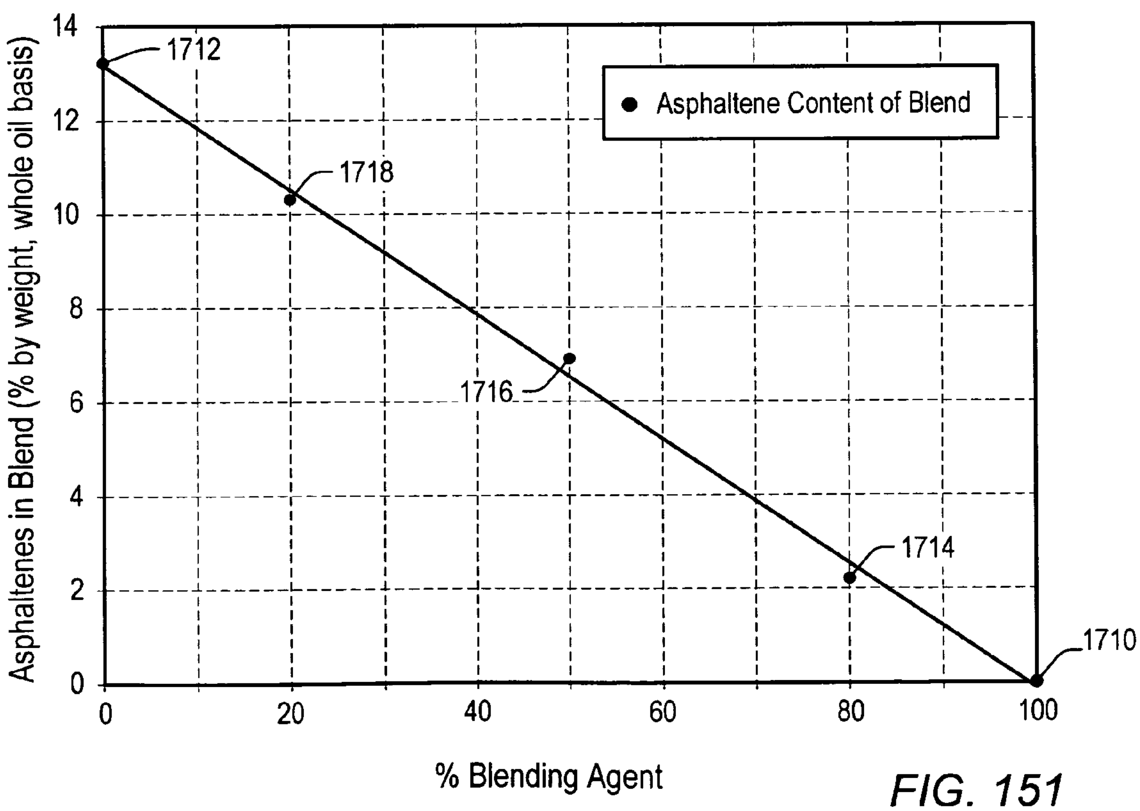

FIG. 151 depicts asphaltene content (on a whole oil basis) in a blend versus percent blending agent.

Figure 152:
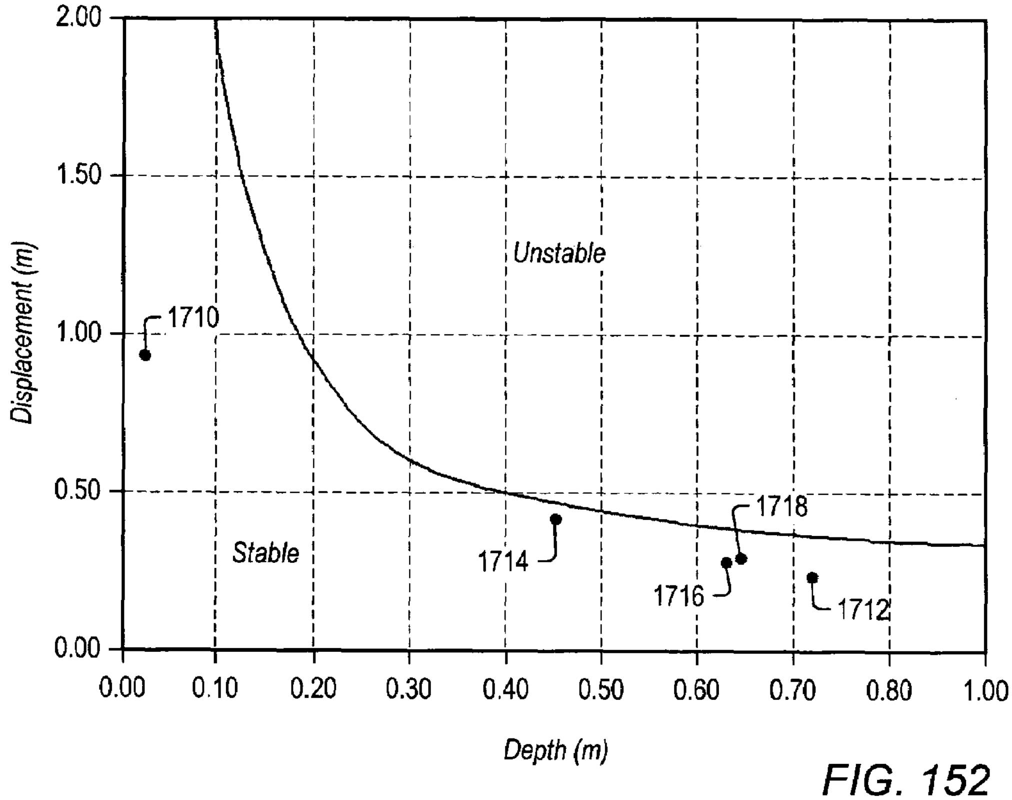

FIG. 152 depicts SARA results (saturate/aromatic ratio versus asphaltene/resin ratio) for several blends.

Figure 153:
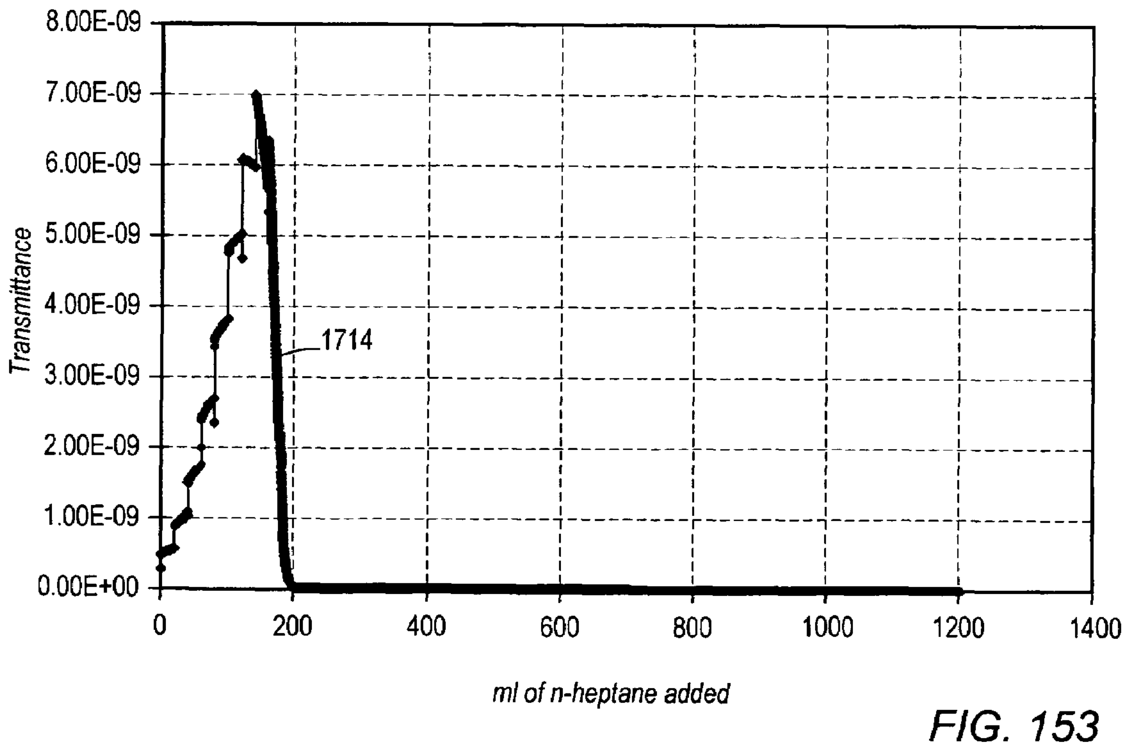

FIG. 153 illustrates near infrared transmittance versus volume of n-heptane added to a first mixture.

Figure 154:
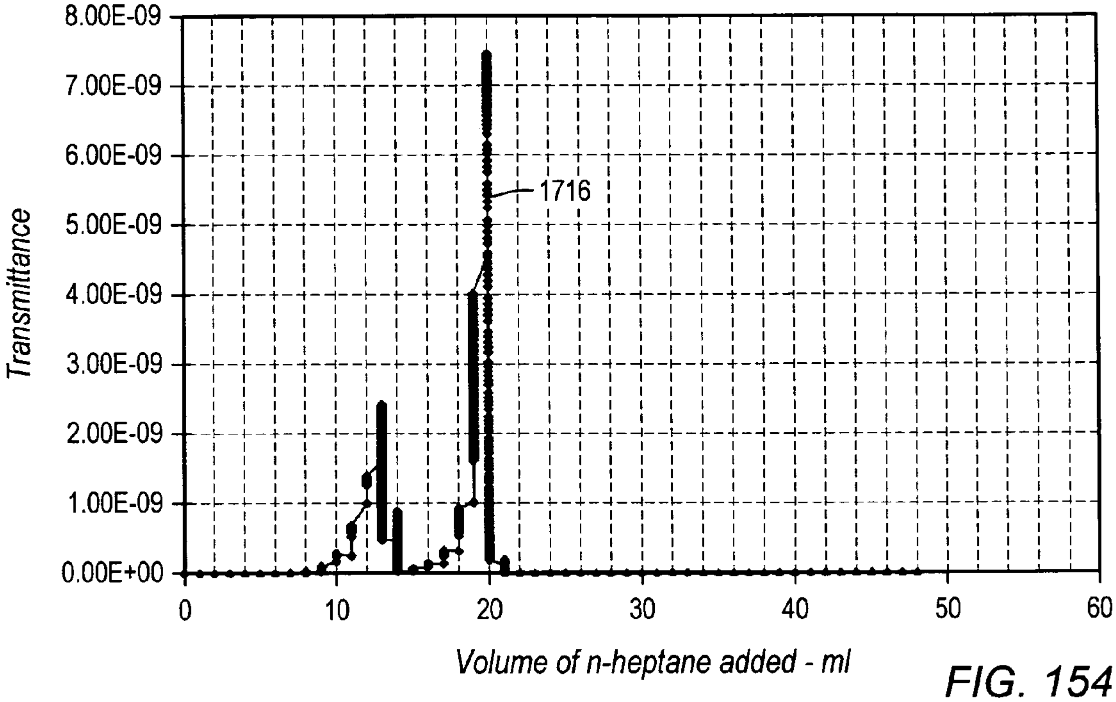

FIG. 154 illustrates near infrared transmittance versus volume of n-heptane added to a second mixture.

Figure 155:
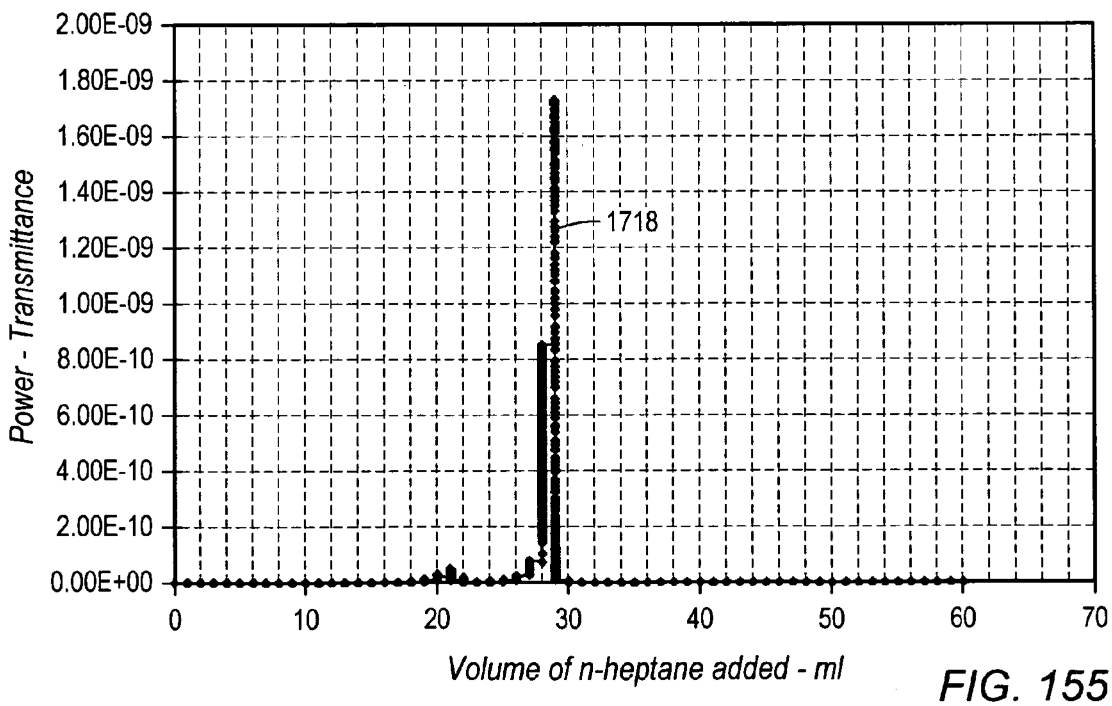

FIG. 155 illustrates near infrared transmittance versus volume of n-heptane added to a third mixture.

Figure 156:
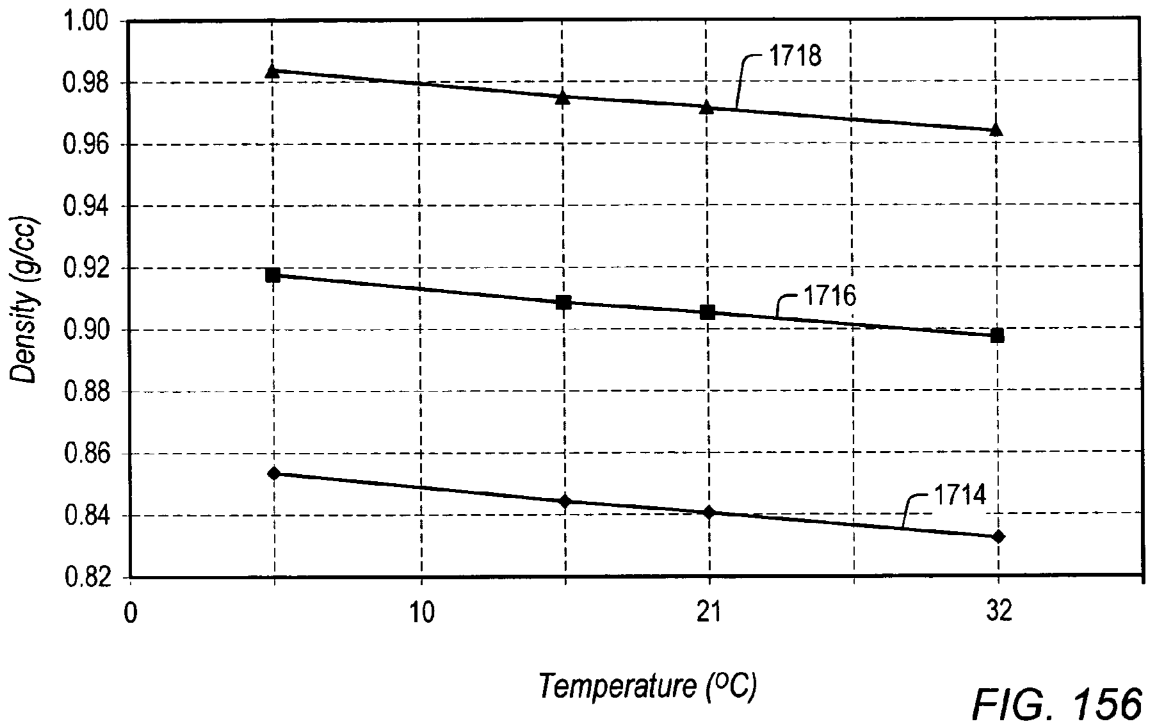

FIG. 156 depicts changes in density with increasing temperature for several mixtures.

Figure 157:
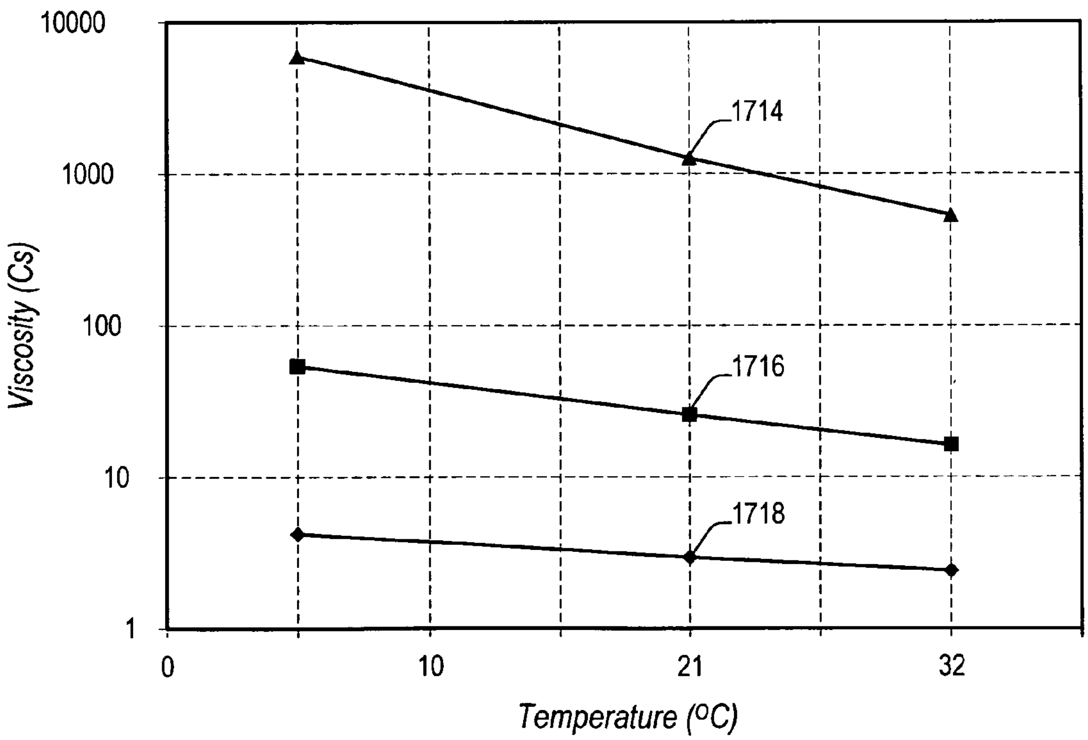

FIG. 157 depicts changes in viscosity with increasing temperature for several mixtures.

Figure 158:
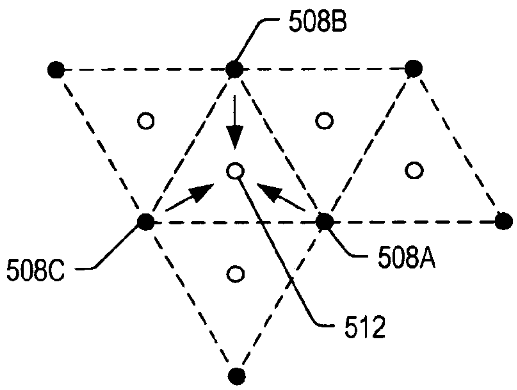

FIG. 158 depicts an embodiment of heat sources and production wells in a relatively low permeability formation.

Figure 159:
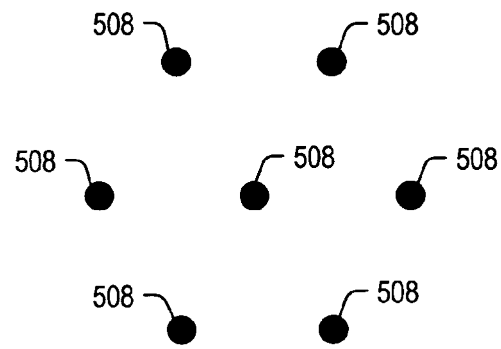

FIG. 159 depicts an embodiment of heat sources in a relatively low permeability formation.

Figure 160:
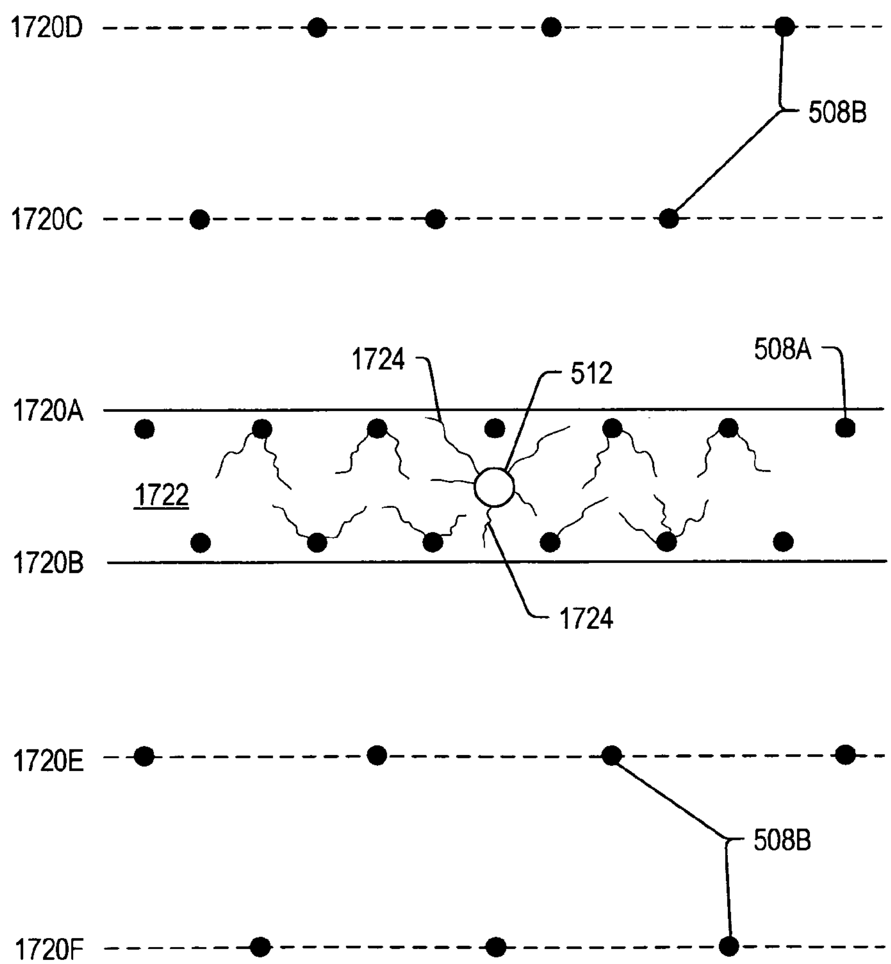

FIG. 160 depicts an embodiment of heat sources in a relatively low permeability formation.

Figure 161:
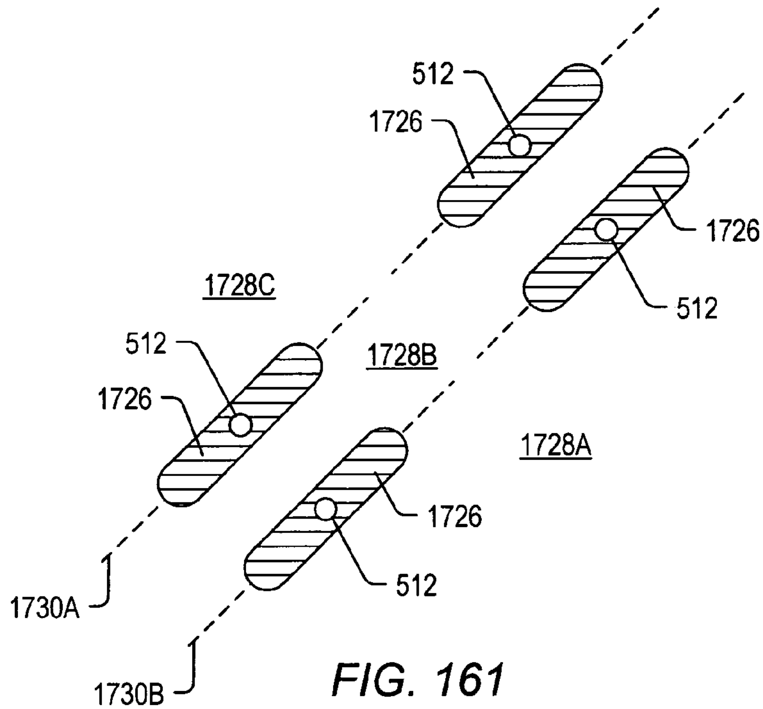

FIG. 161 depicts an embodiment of heat sources in a relatively low permeability formation.

Figure 162:
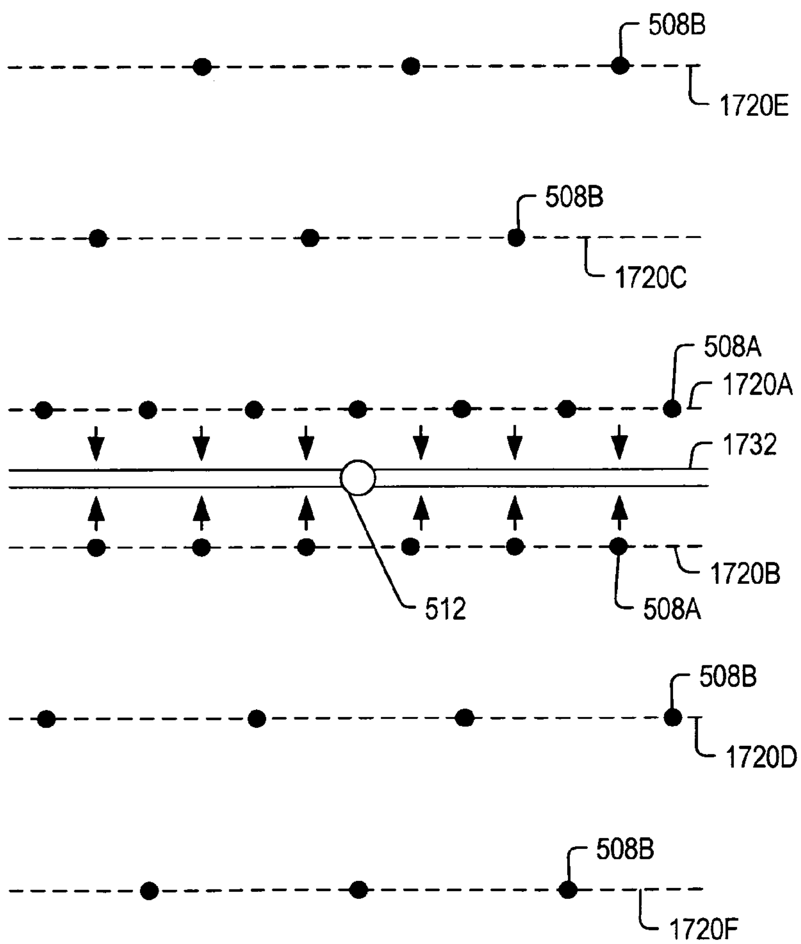

FIG. 162 depicts an embodiment of heat sources in a relatively low permeability formation.

Figure 163:
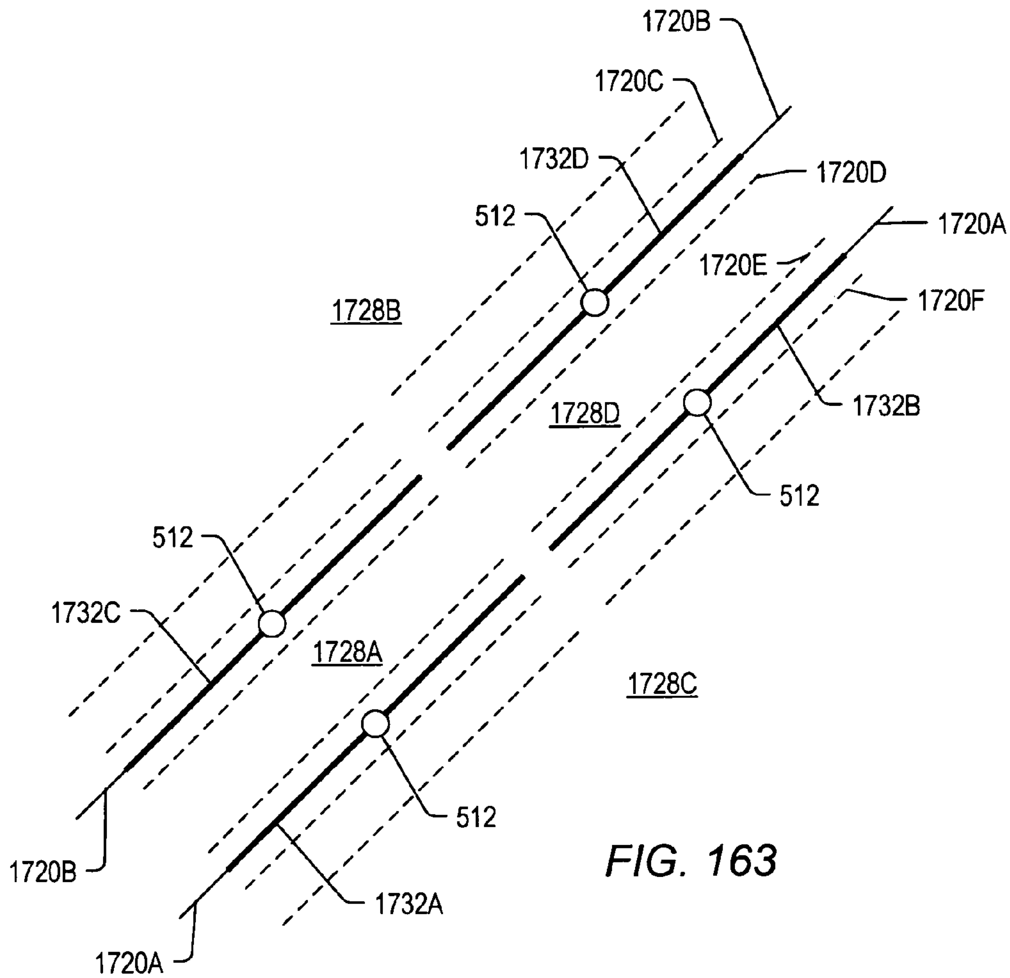

FIG. 163 depicts an embodiment of heat sources in a relatively low permeability formation.

Figure 164:
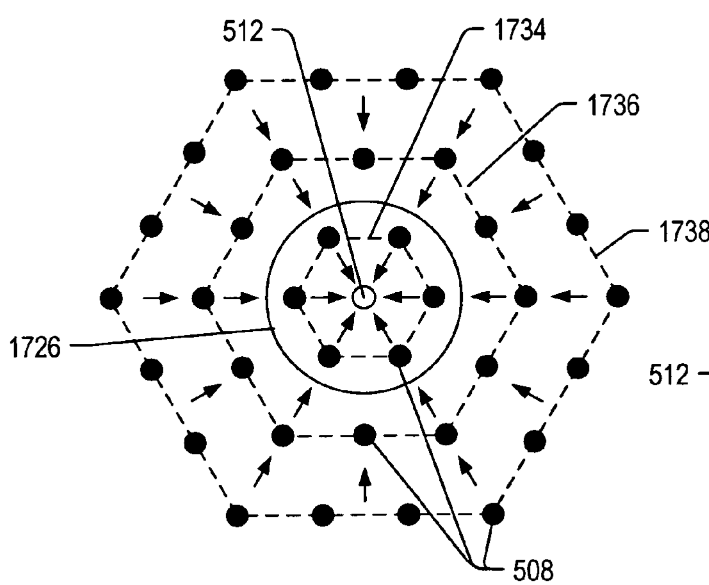

FIG. 164 depicts an embodiment of a heat source and production well pattern.

Figure 165:
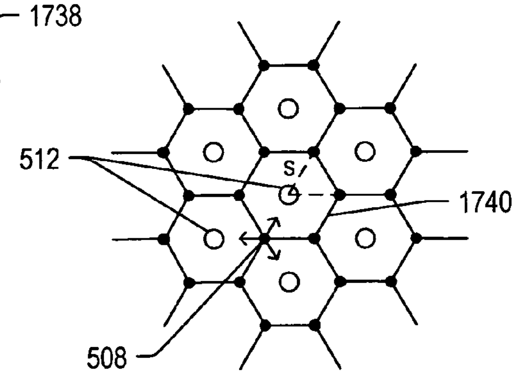

FIG. 165 depicts an embodiment of a heat source and production well pattern.

Figure 166:
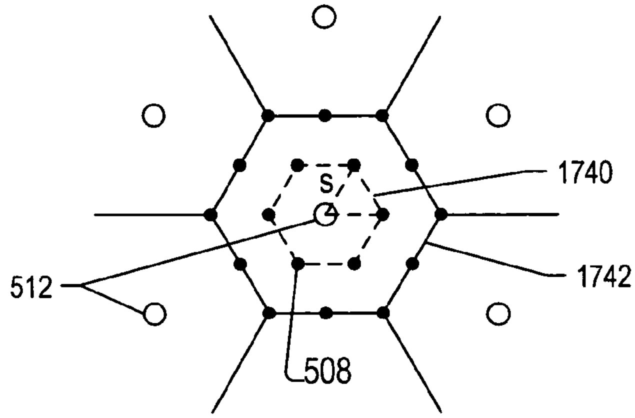

FIG. 166 depicts an embodiment of a heat source and production well pattern.

Figure 167:
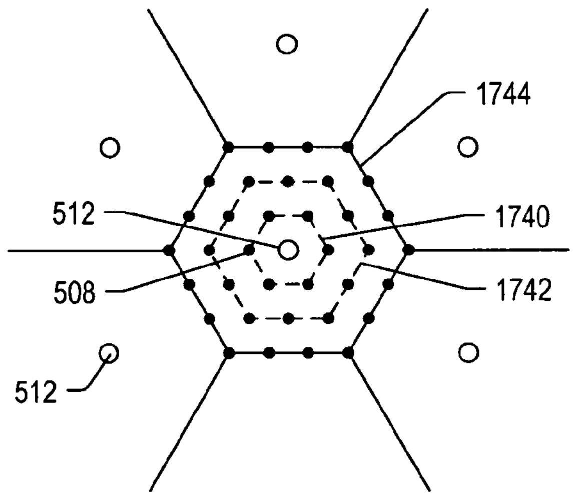

FIG. 167 depicts an embodiment of a heat source and production well pattern.

Figure 168:
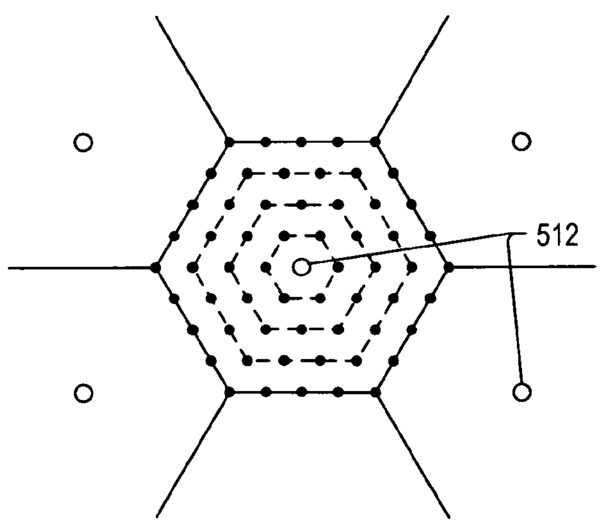

FIG. 168 depicts an embodiment of a heat source and production well pattern.

Figure 169:
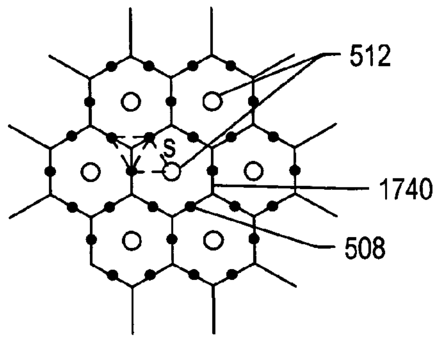

FIG. 169 depicts an embodiment of a heat source and production well pattern.

Figure 170:
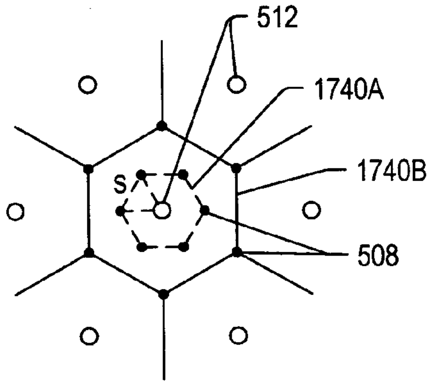

FIG. 170 depicts an embodiment of a heat source and production well pattern.

Figure 171:
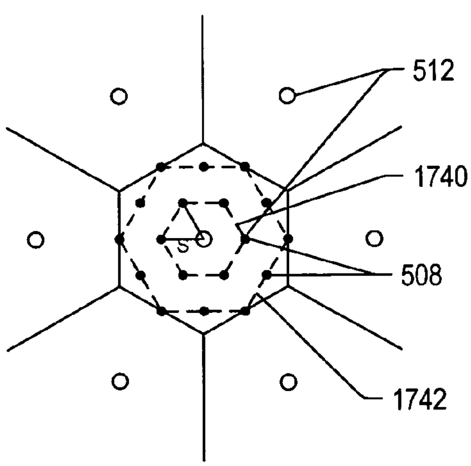

FIG. 171 depicts an embodiment of a heat source and production well pattern.

Figure 172:
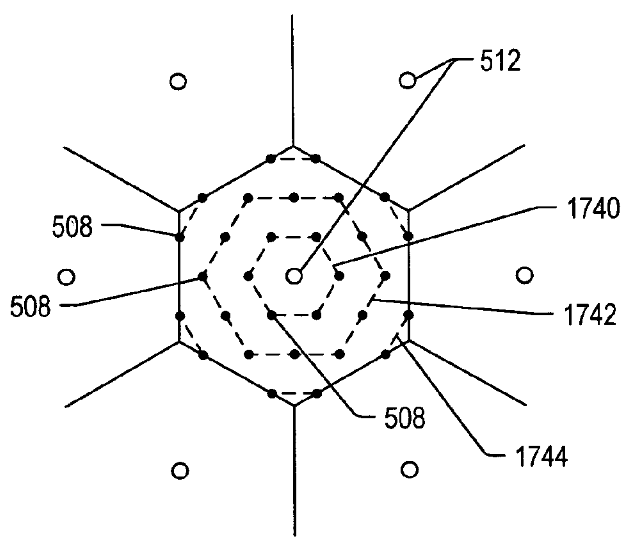

FIG. 172 depicts an embodiment of a heat source and production well pattern.

Figure 173:
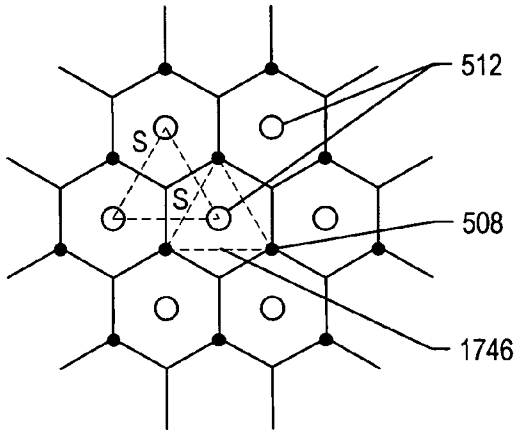

FIG. 173 depicts an embodiment of a heat source and production well pattern.

Figure 174:
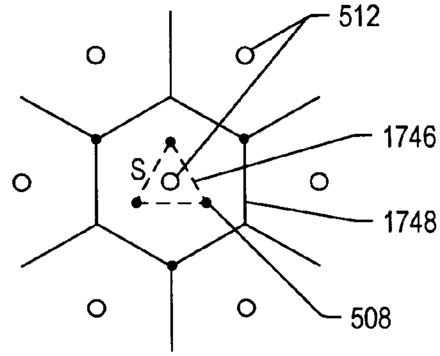

FIG. 174 depicts an embodiment of a heat source and production well pattern.

Figure 175:
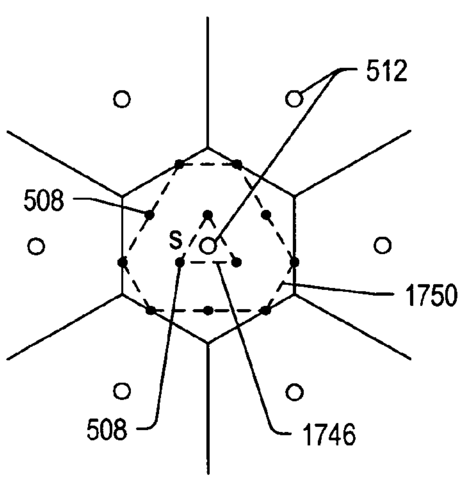

FIG. 175 depicts an embodiment of a heat source and production well pattern.

Figure 176:
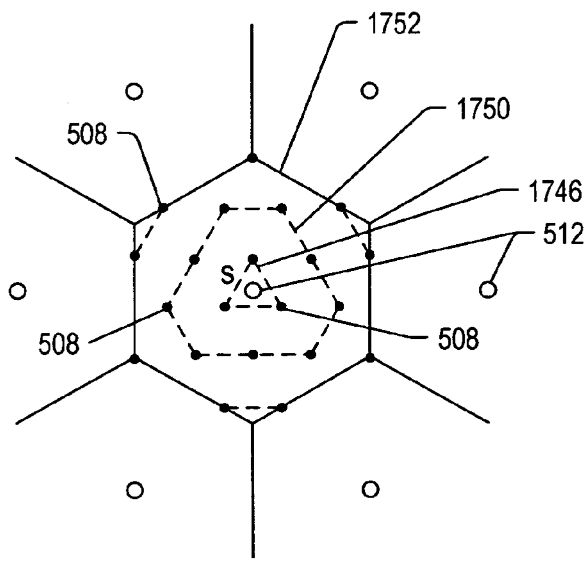

FIG. 176 depicts an embodiment of a heat source and production well pattern.

Figure 177:
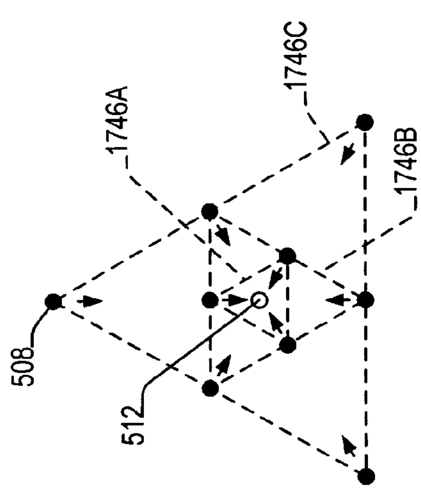

FIG. 177 depicts an embodiment of a heat source and production well pattern.

Figure 178:
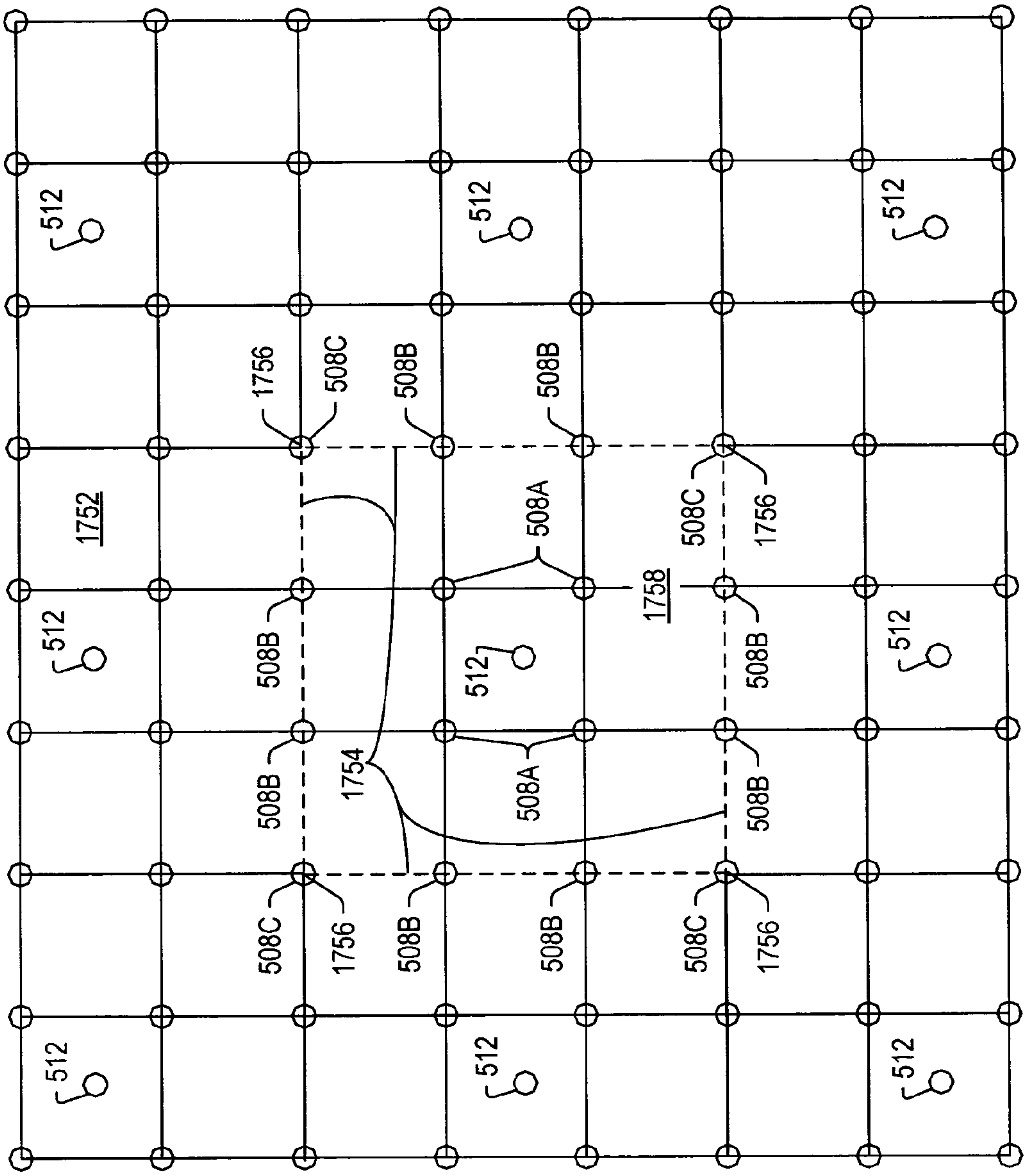

FIG. 178 depicts an embodiment of a square pattern of heat sources and production wells.

Figure 179:
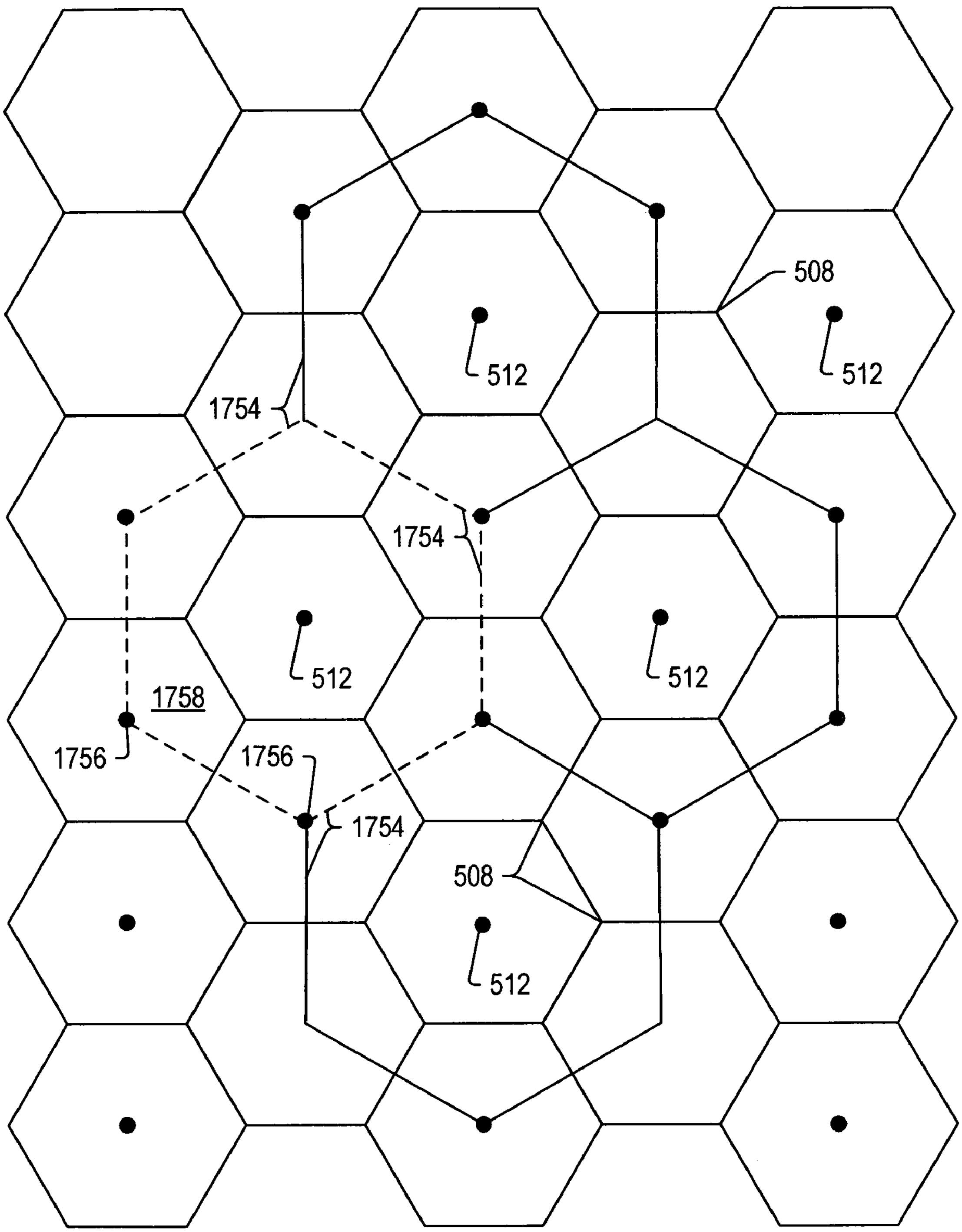

FIG. 179 depicts an embodiment of a heat source and production well pattern.

Figure 180:
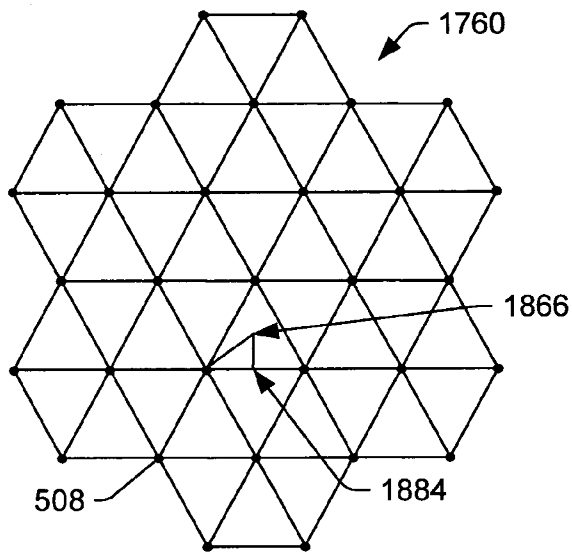

FIG. 180 depicts an embodiment of a triangular pattern of heat sources.

Figure 181:
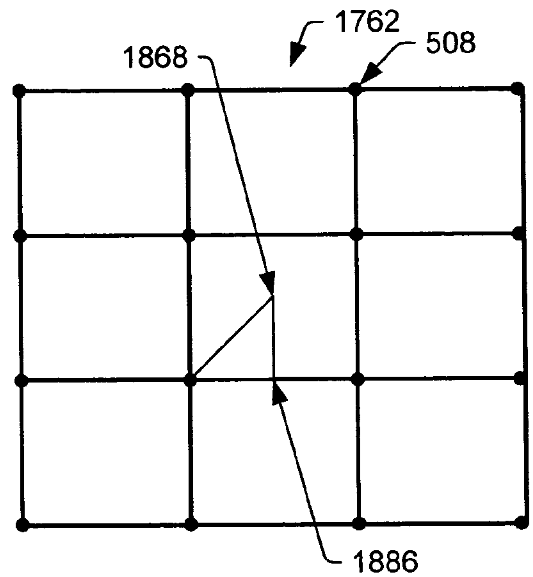

FIG. 181 depicts an embodiment of a square pattern of heat sources.

Figure 182:
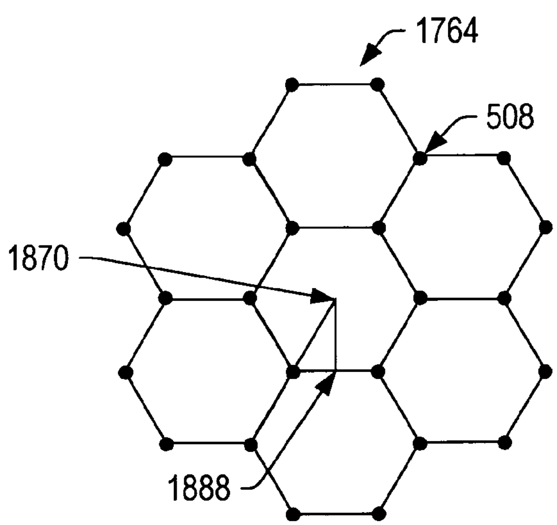

FIG. 182 depicts an embodiment of a hexagonal pattern of heat sources.

Figure 183:
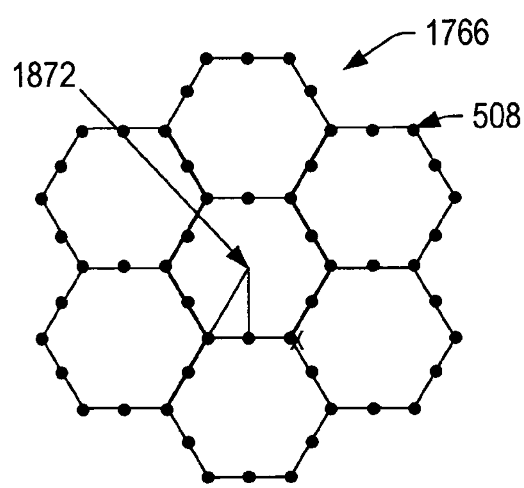

FIG. 183 depicts an embodiment of a 12 to 1 pattern of heat sources.

Figure 184:
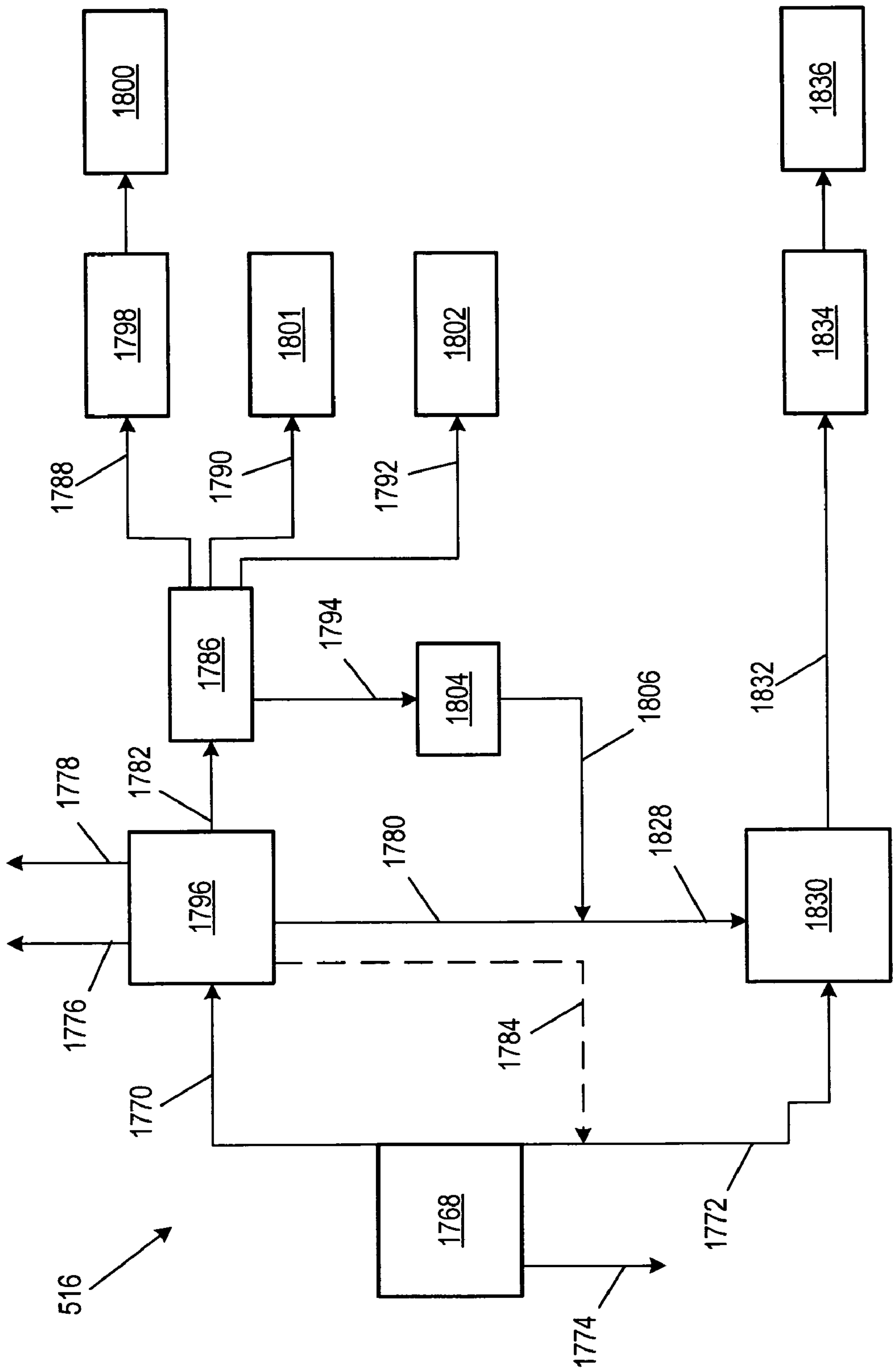

FIG. 184 depicts an embodiment of treatment facilities for treating a formation fluid.

Figure 185:
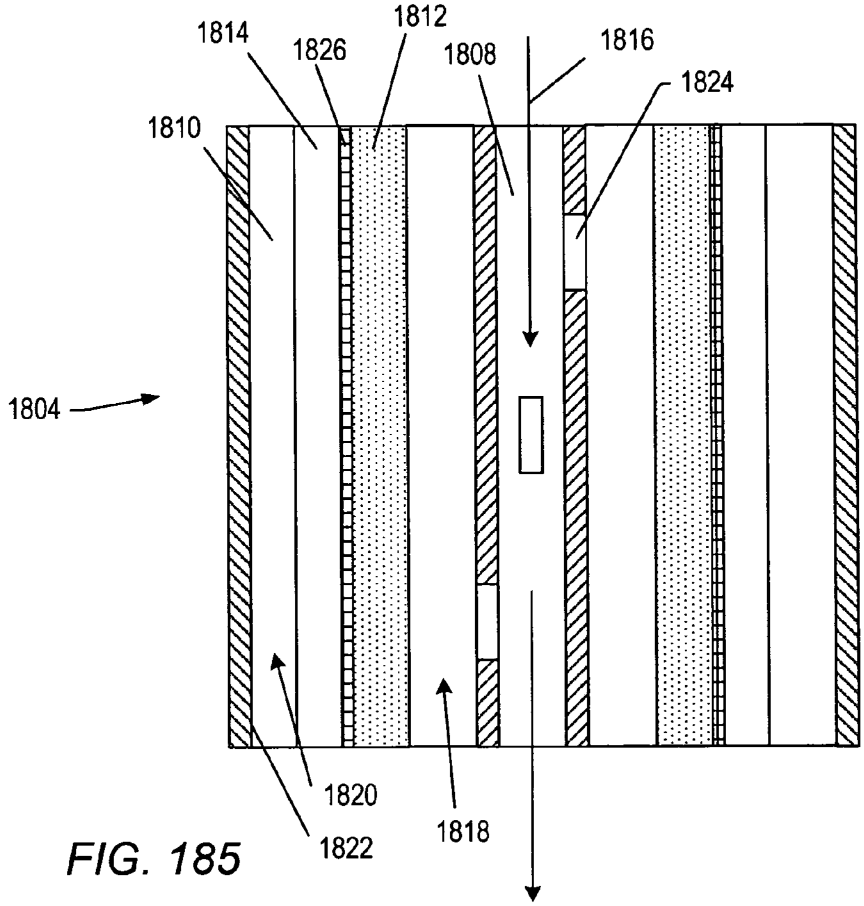

FIG. 185 depicts an embodiment of a catalytic flameless distributed combustor.

Figure 186:
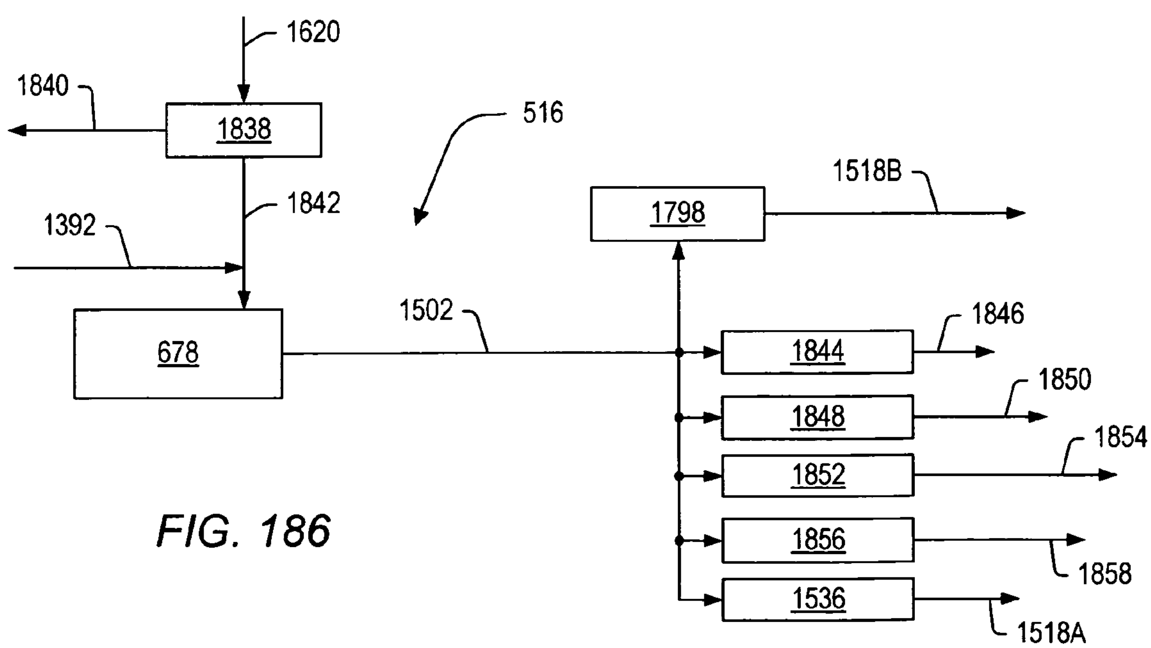

FIG. 186 depicts an embodiment of treatment facilities for treating a formation fluid.

Figure 187:
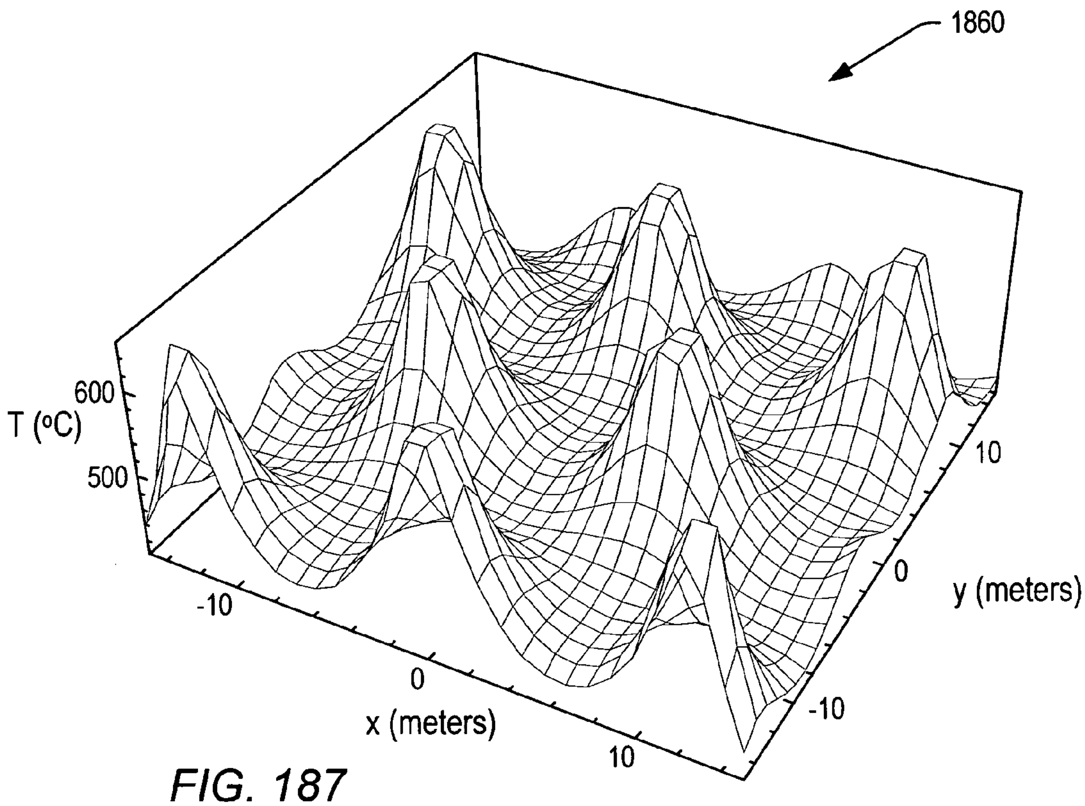

FIG. 187 depicts a temperature profile for a triangular pattern of heat sources.

Figure 188:
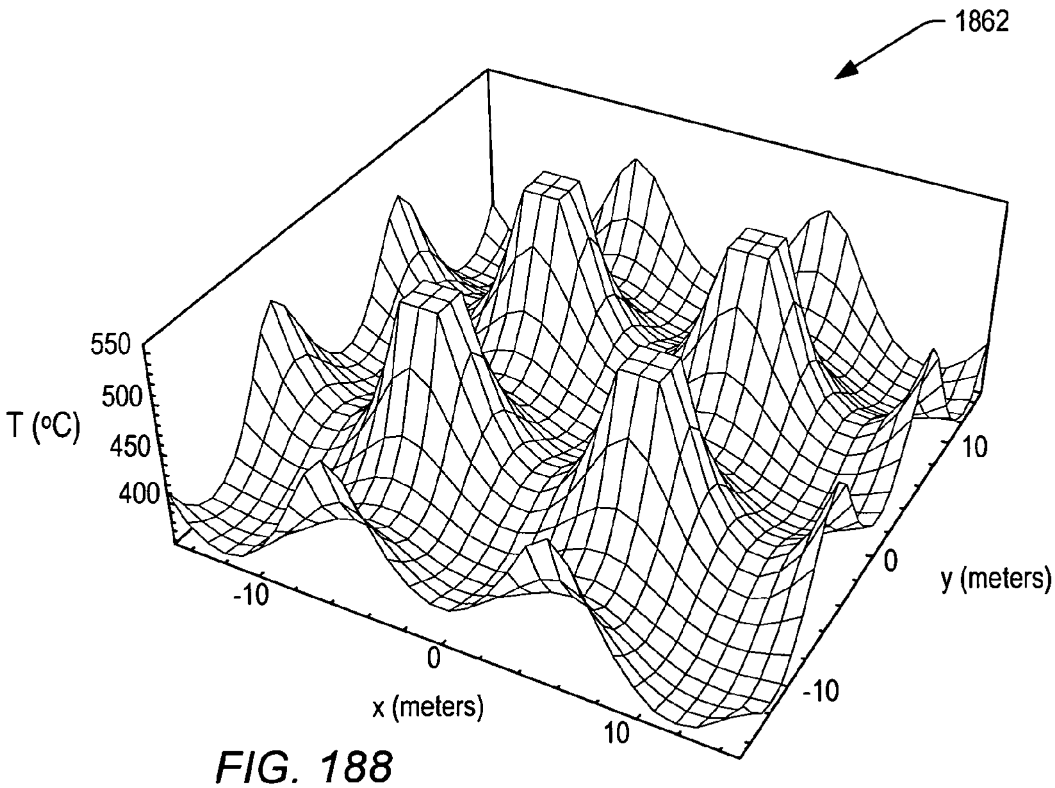

FIG. 188 depicts a temperature profile for a square pattern of heat sources.

Figure 189:
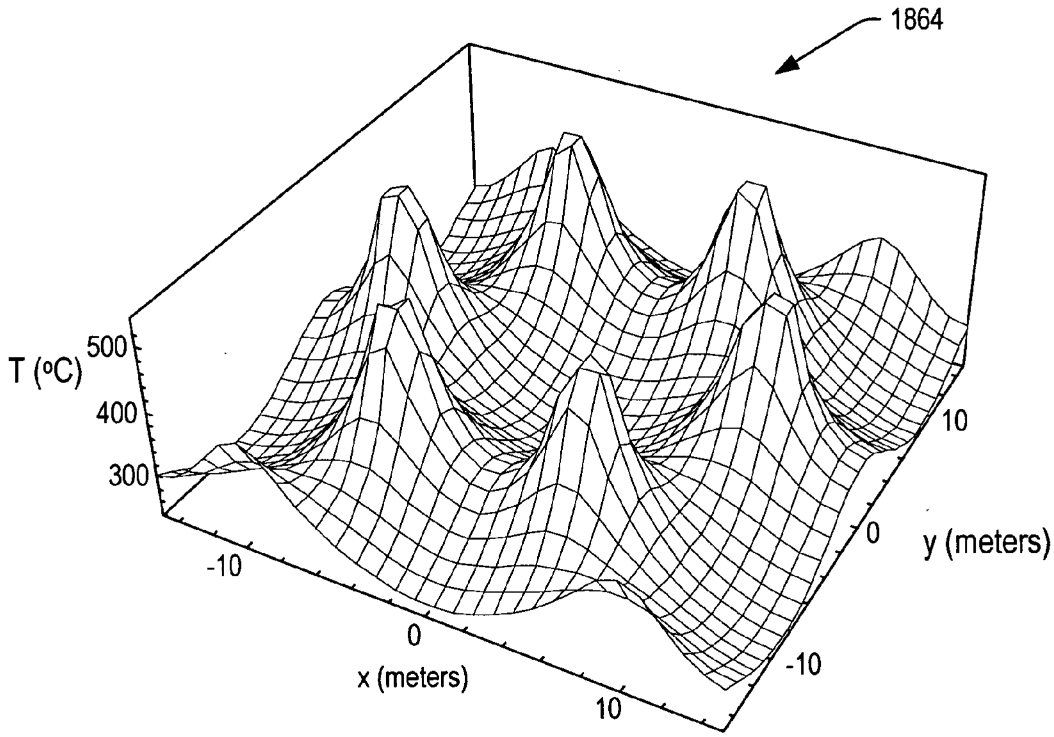

FIG. 189 depicts a temperature profile for a hexagonal pattern of heat sources.

Figure 190:
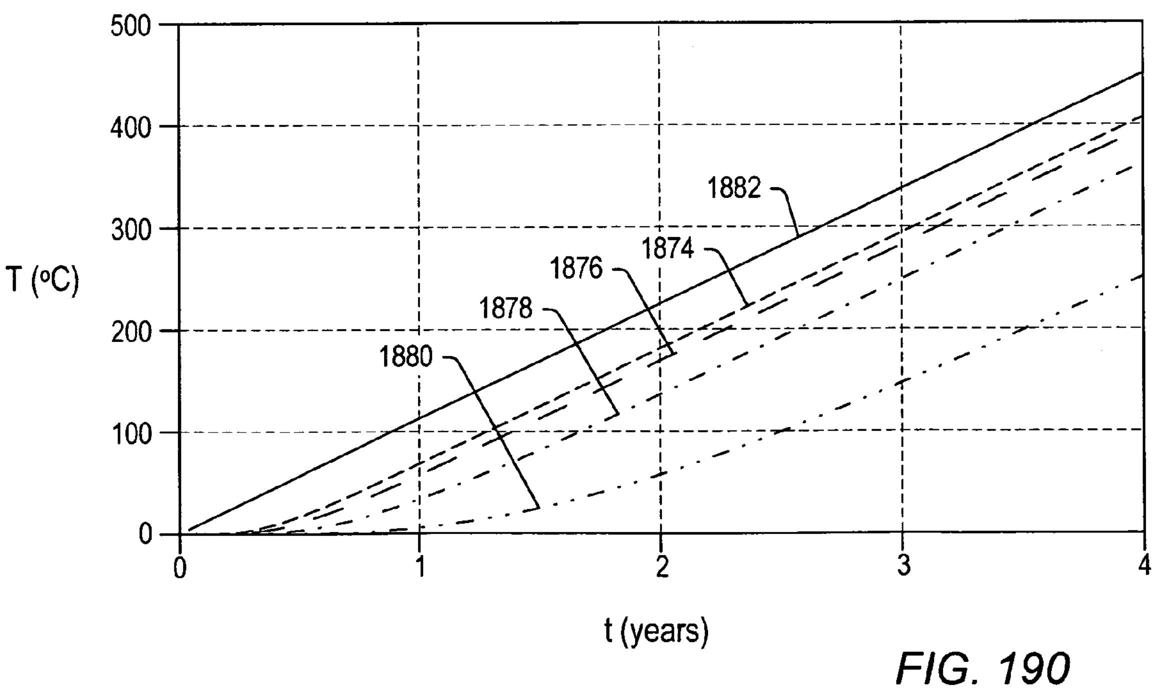

FIG. 190 depicts a comparison plot between the average pattern temperature and temperatures at the coldest spots for various patterns of heat sources.

Figure 191:
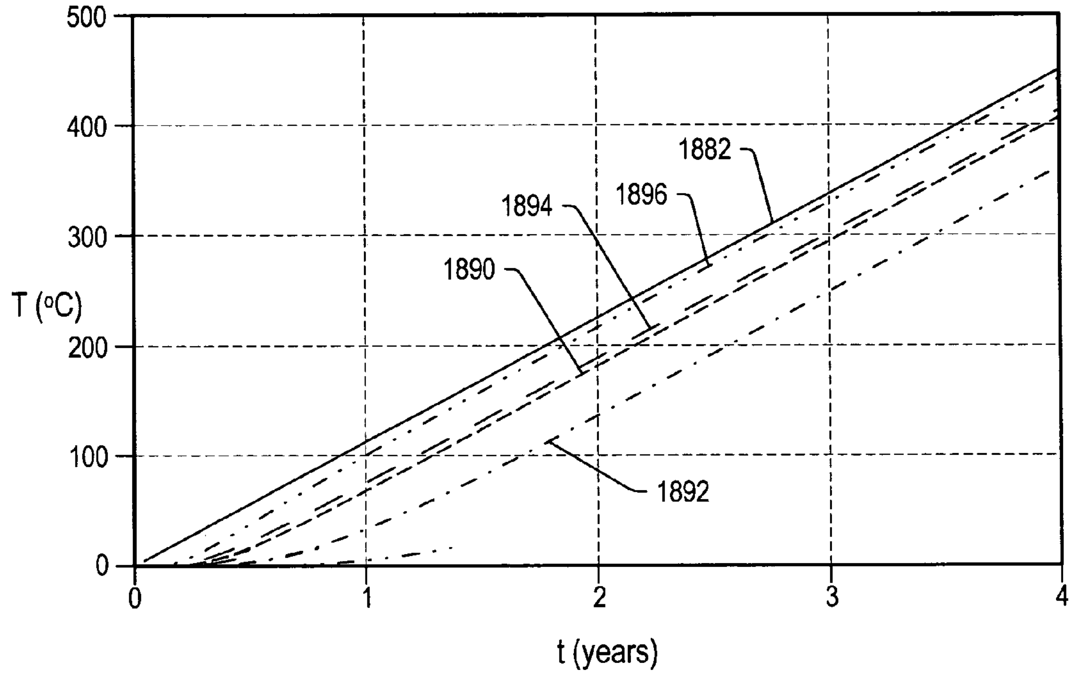

FIG. 191 depicts a comparison plot between the average pattern temperature and temperatures at various spots within triangular and hexagonal patterns of heat sources.

Figure 192:
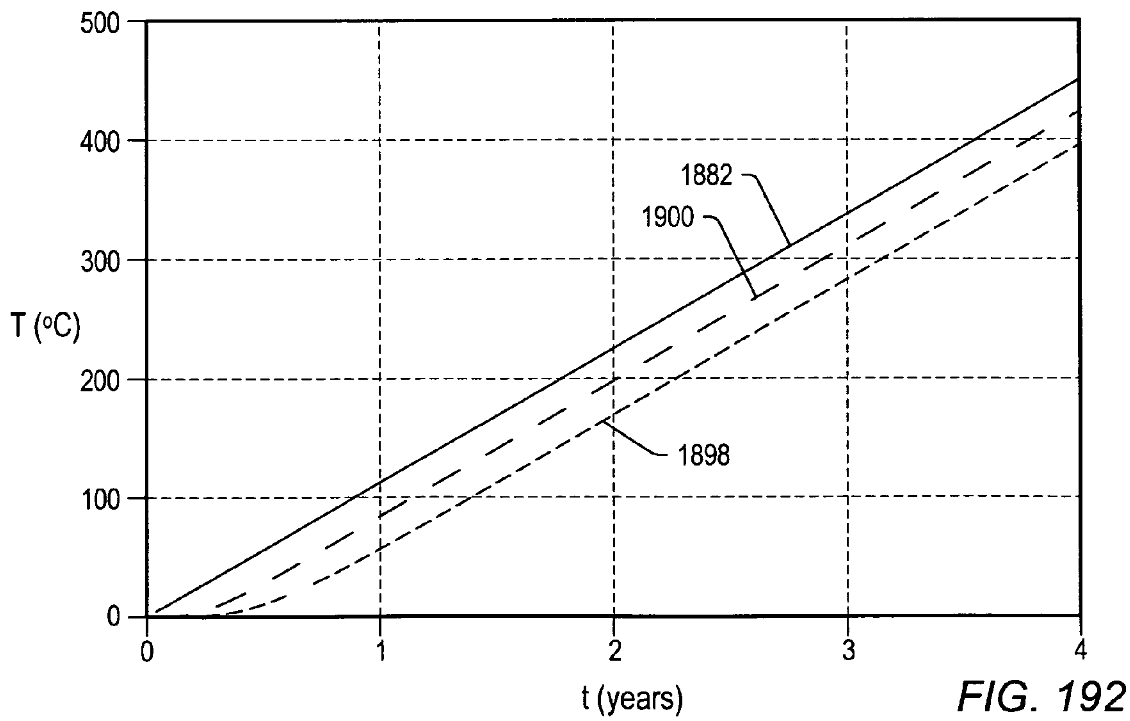

FIG. 192 depicts a comparison plot between the average pattern temperature and temperatures at various spots within a square pattern of heat sources.

Figure 193:
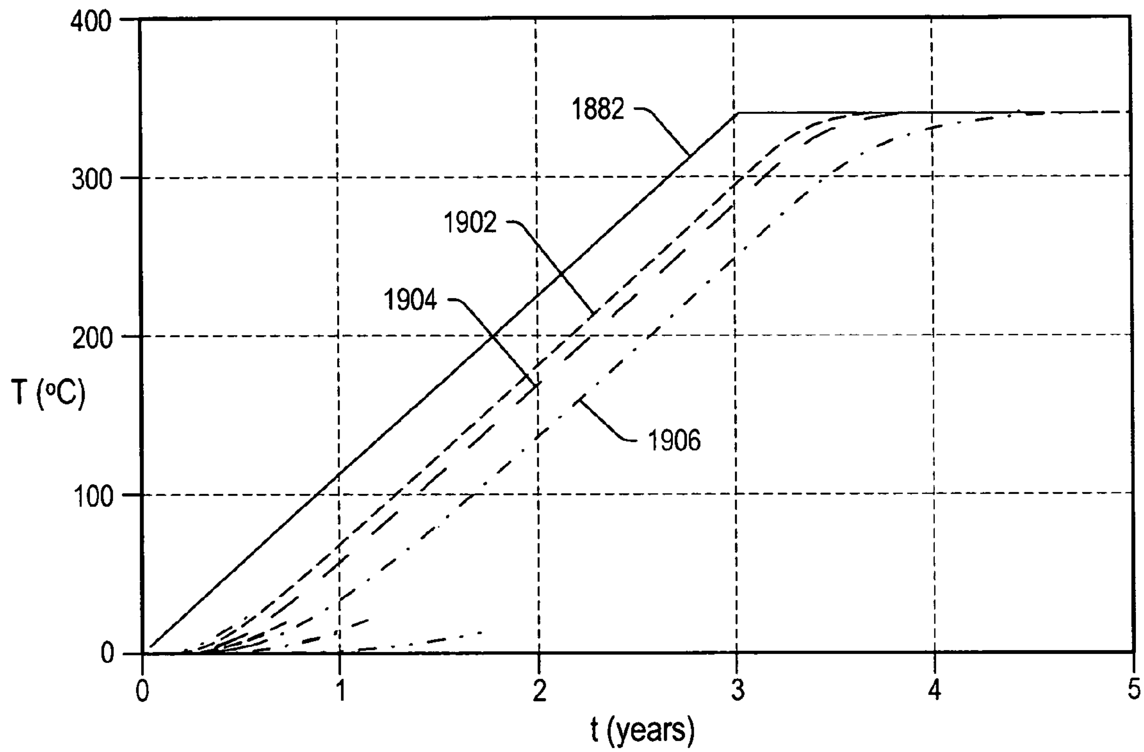

FIG. 193 depicts a comparison plot between temperatures at the coldest spots of various patterns of heat sources.

Figure 194:
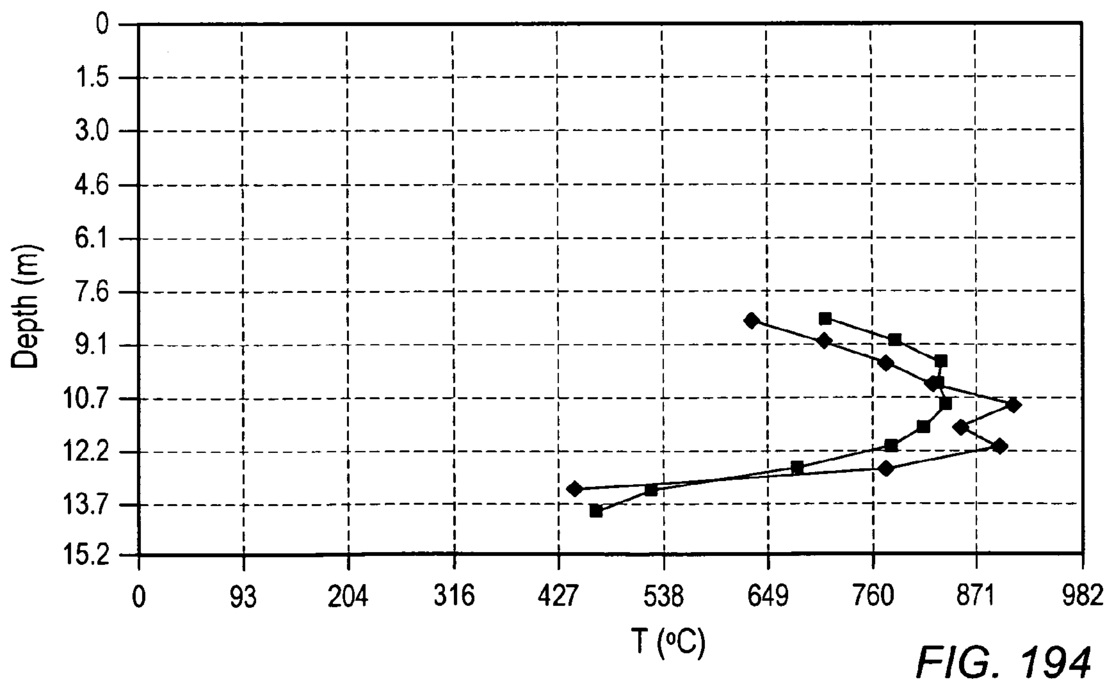

FIG. 194 depicts in situ temperature profiles for electrical resistance heaters and natural distributed combustion heaters.

Figure 195:
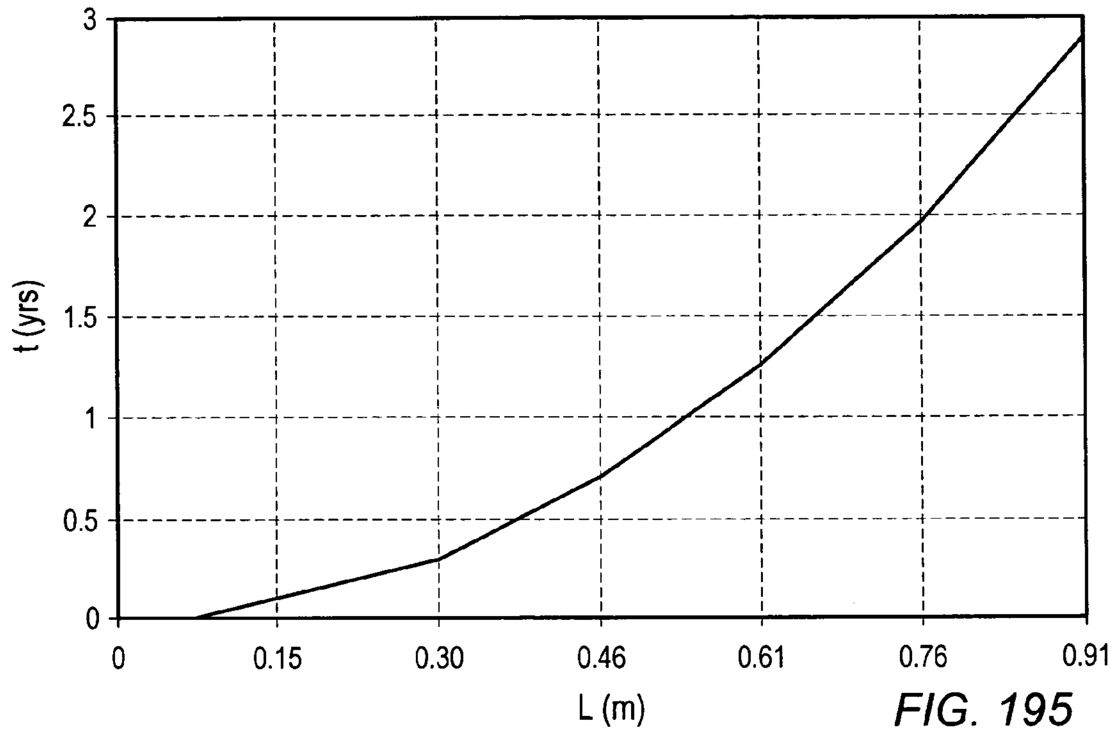

FIG. 195 depicts extension of a reaction zone in a heated formation over time.

Figure 196:
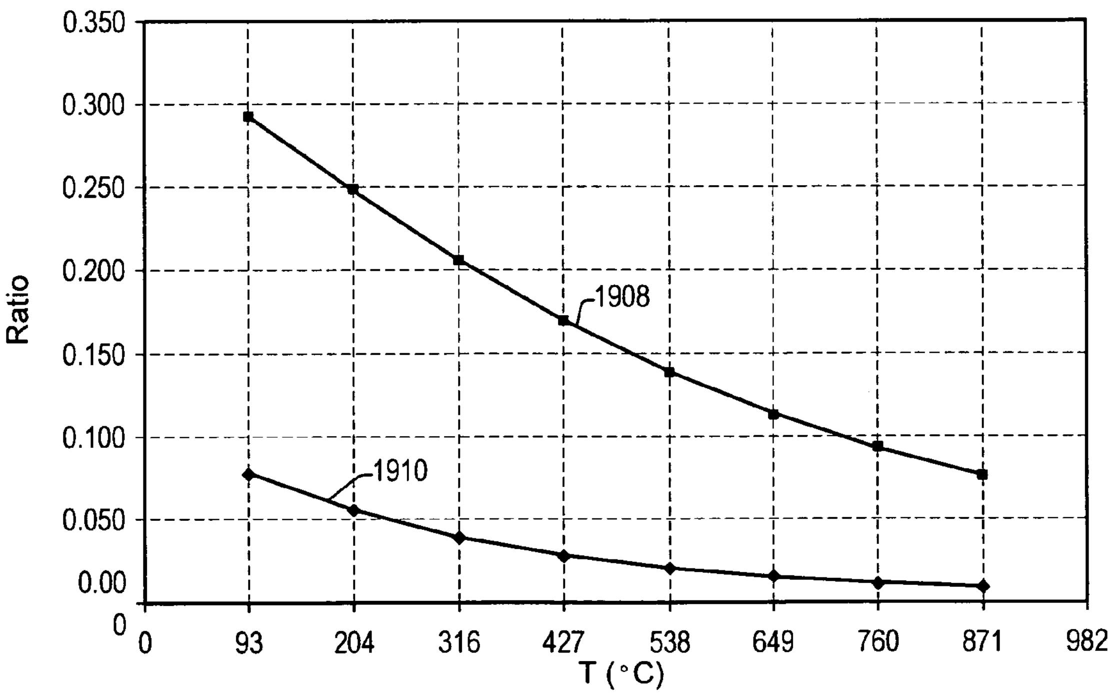

FIG. 196 depicts the ratio of conductive heat transfer to radiative heat transfer in a formation.

Figure 197:
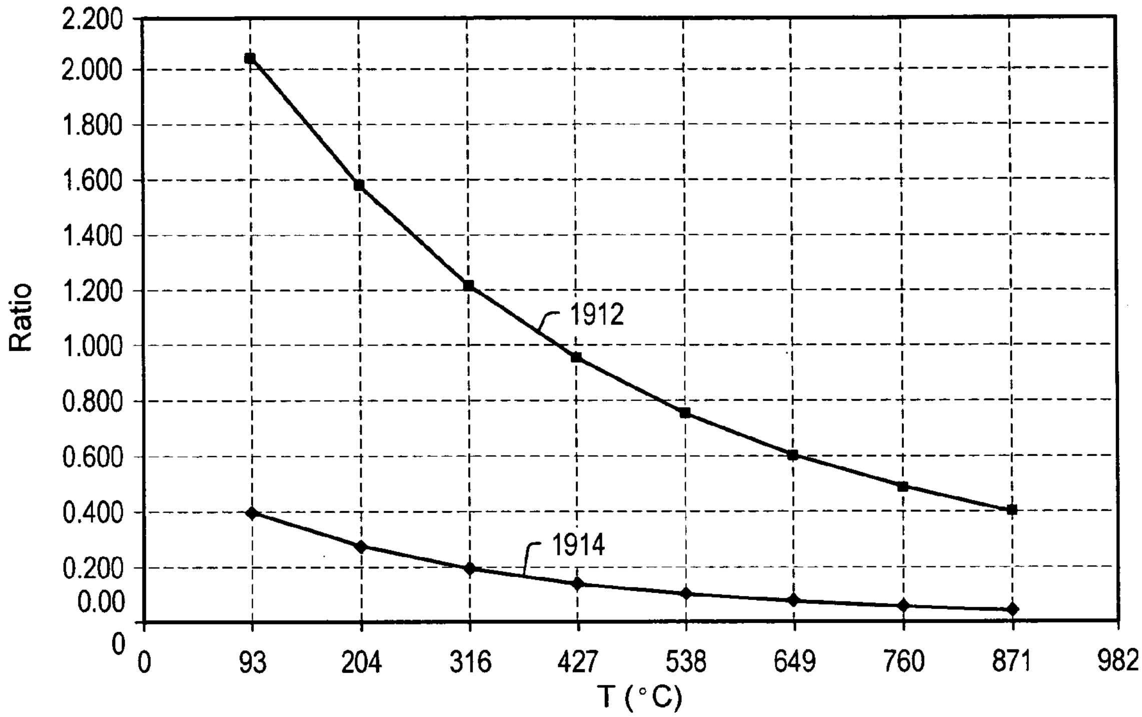

FIG. 197 depicts the ratio of conductive heat transfer to radiative heat transfer in a formation.

Figure 198:
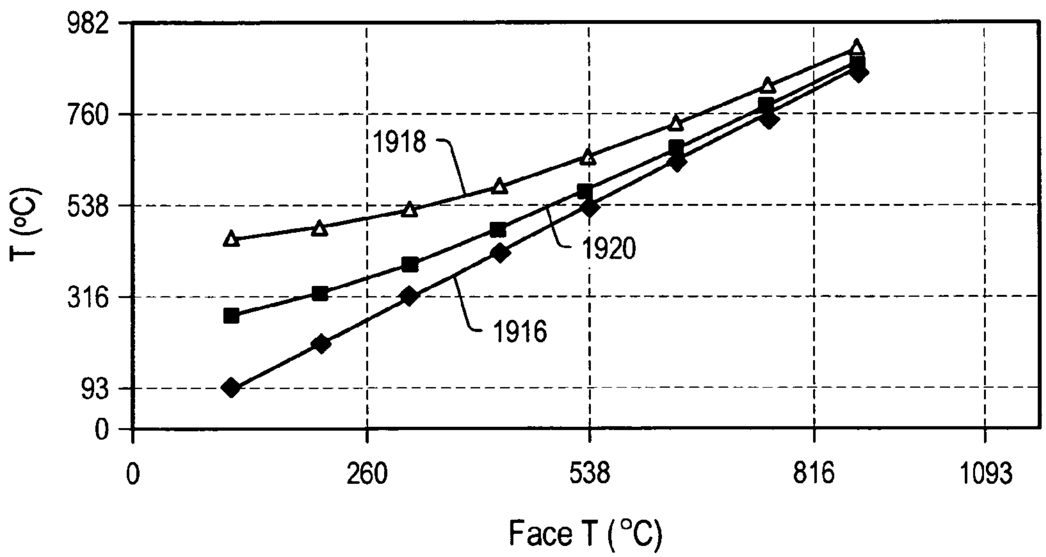

FIG. 198 depicts temperatures of a conductor, a conduit, and an opening in a formation versus a temperature at the face of a formation.

Figure 199:
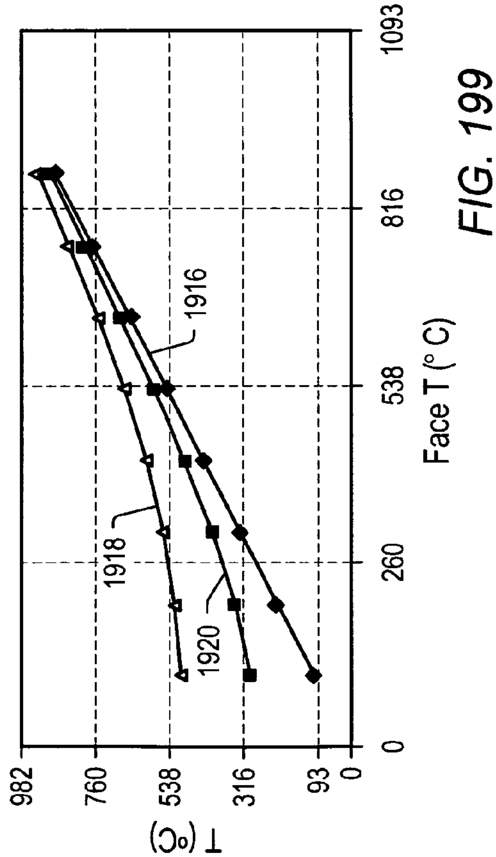

FIG. 199 depicts temperatures of a conductor, a conduit, and an opening in a formation versus a temperature at the face of a formation.

Figure 200:
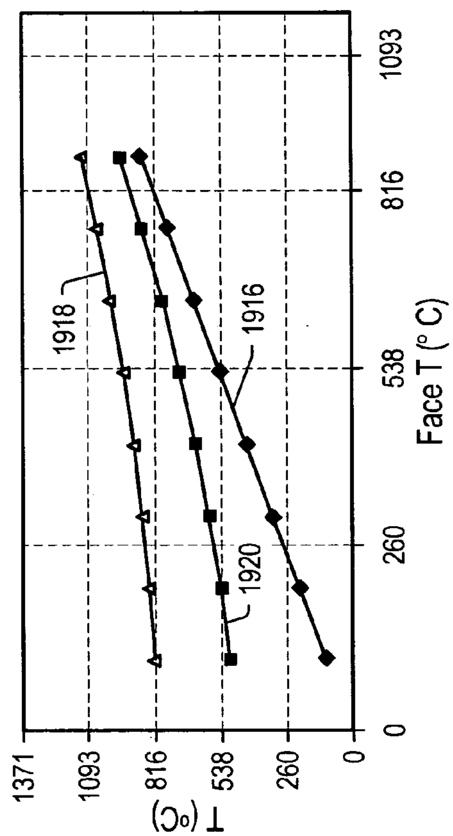

FIG. 200 depicts temperatures of a conductor, a conduit, and an opening in a formation versus a temperature at the face of a formation.

Figure 201:
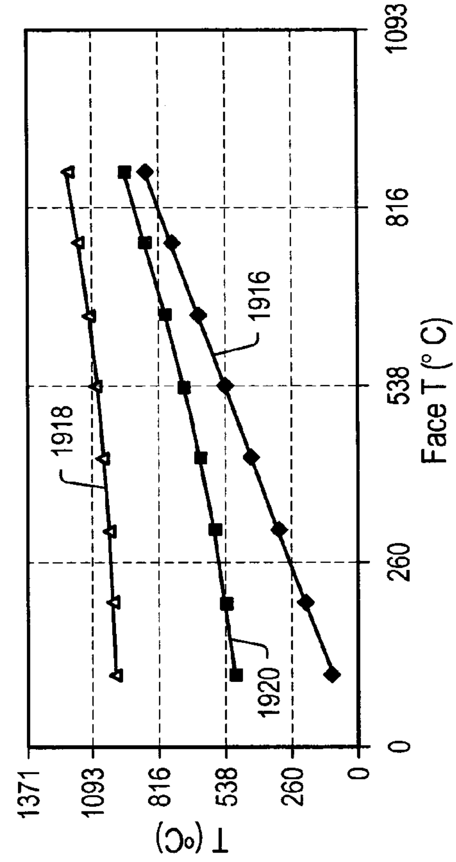

FIG. 201 depicts temperatures of a conductor, a conduit, and an opening in a formation versus a temperature at the face of a formation.

Figure 202:
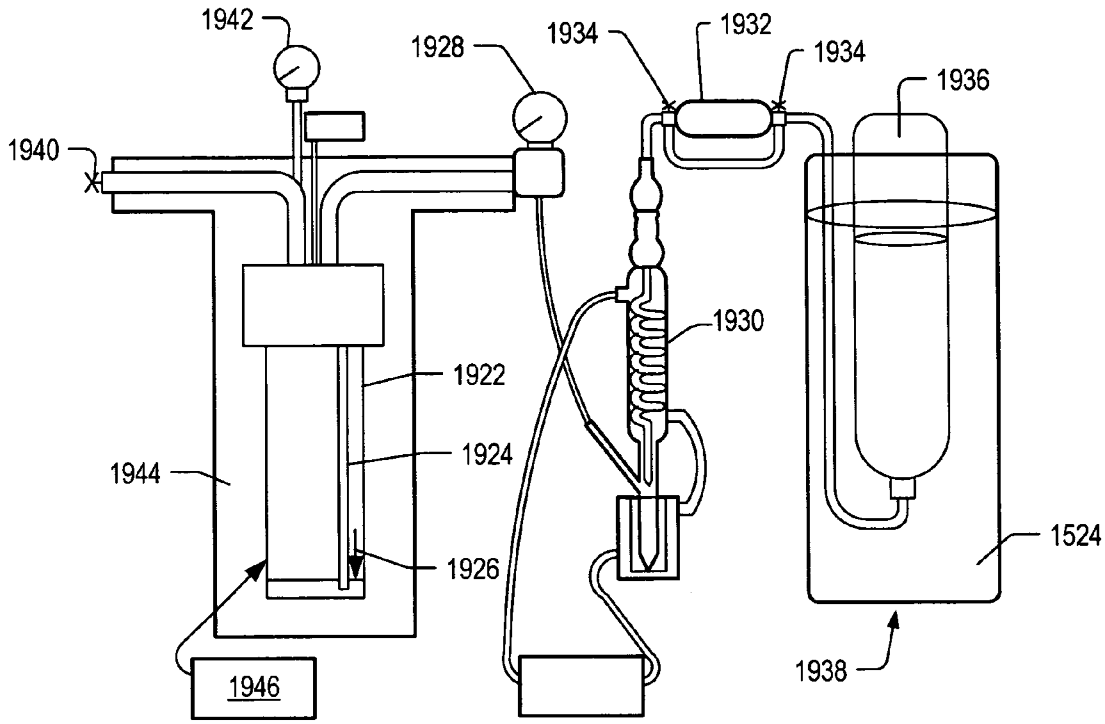

FIG. 202 depicts a retort and collection system.

Figure 203:
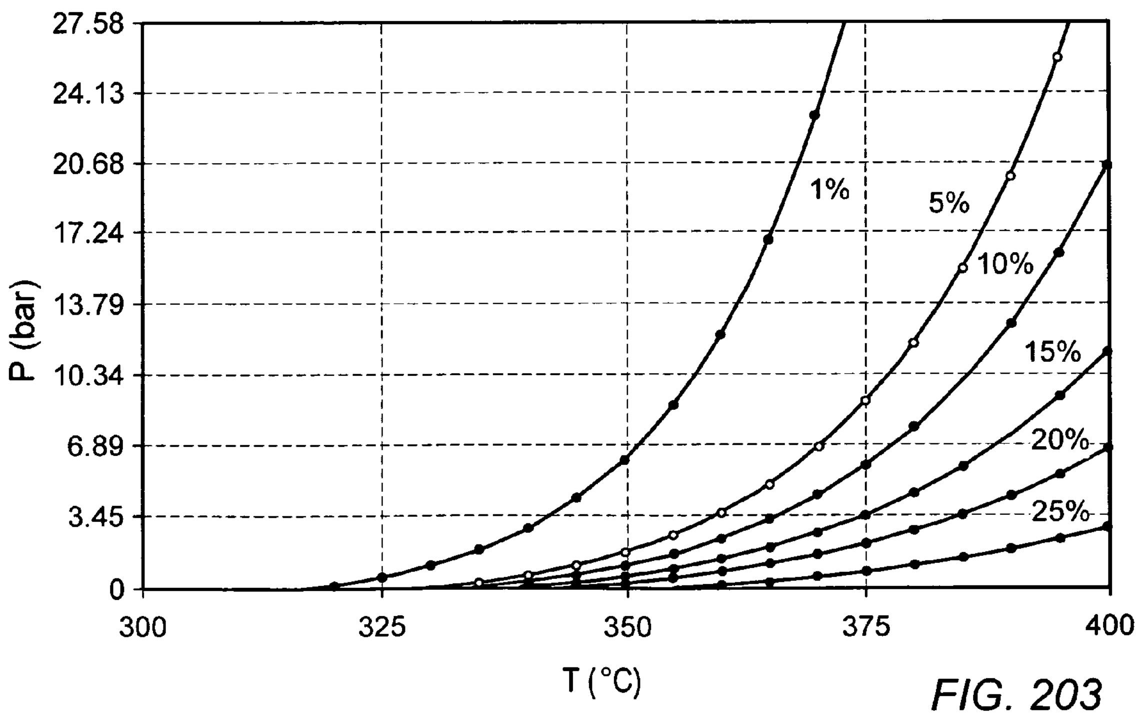

FIG. 203 depicts percentage of hydrocarbon fluid having carbon numbers greater than 25 as a function of pressure and temperature for oil produced from an oil shale formation.

Figure 204:
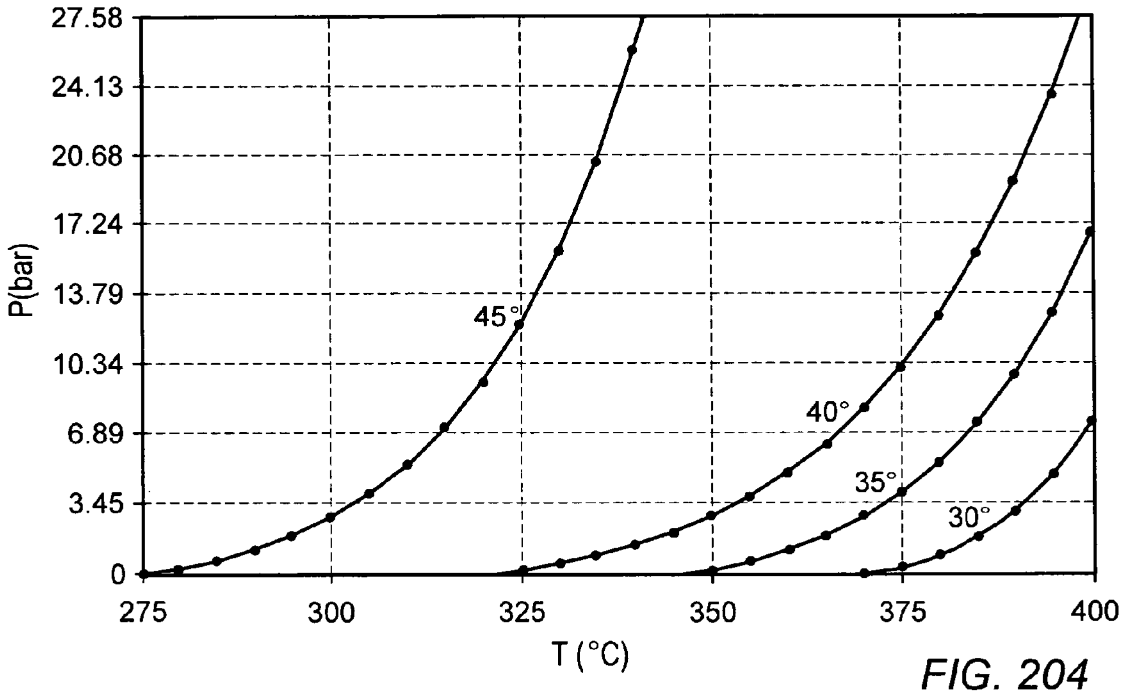

FIG. 204 depicts quality of oil as a function of pressure and temperature for oil produced from an oil shale formation.

Figure 205:
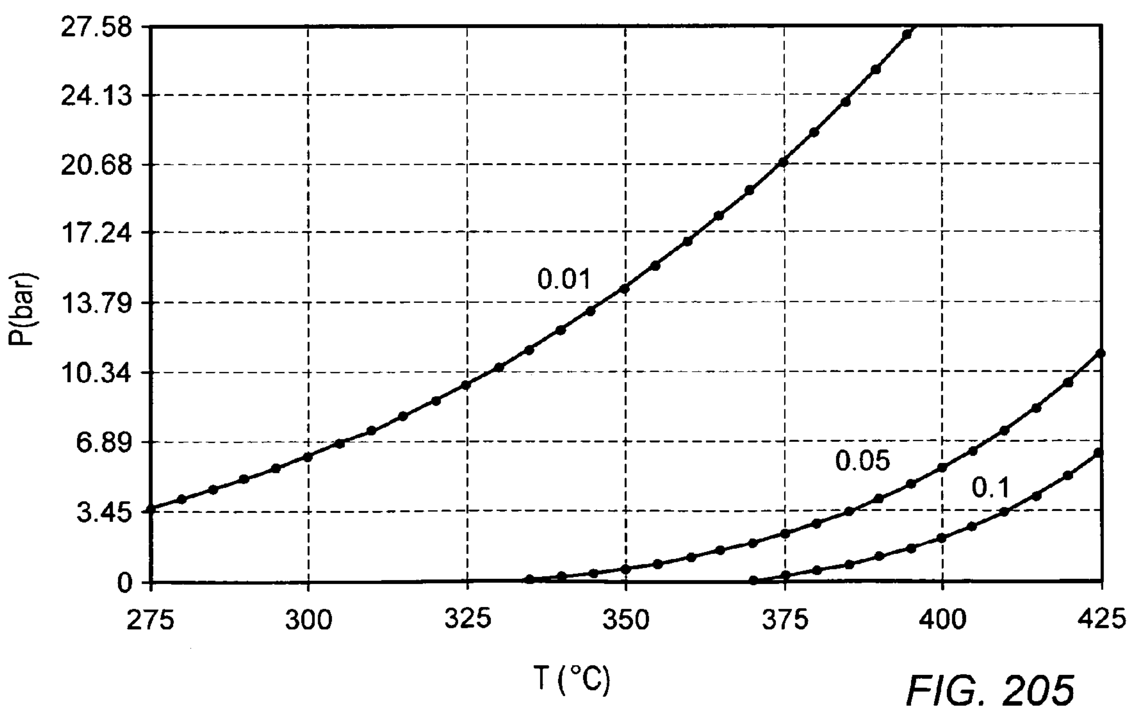

FIG. 205 depicts ethene to ethane ratio produced from an oil shale formation as a function of temperature and pressure.

Figure 206:
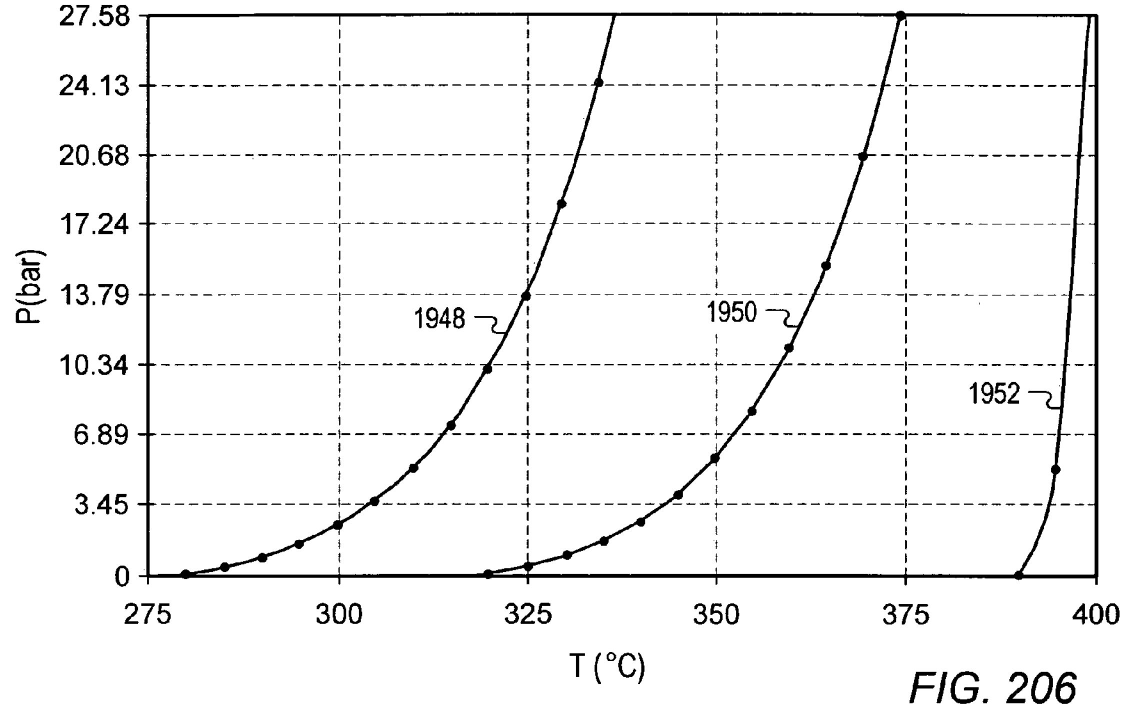

FIG. 206 depicts yield of fluids produced from an oil shale formation as a function of temperature and pressure.

Figure 207:
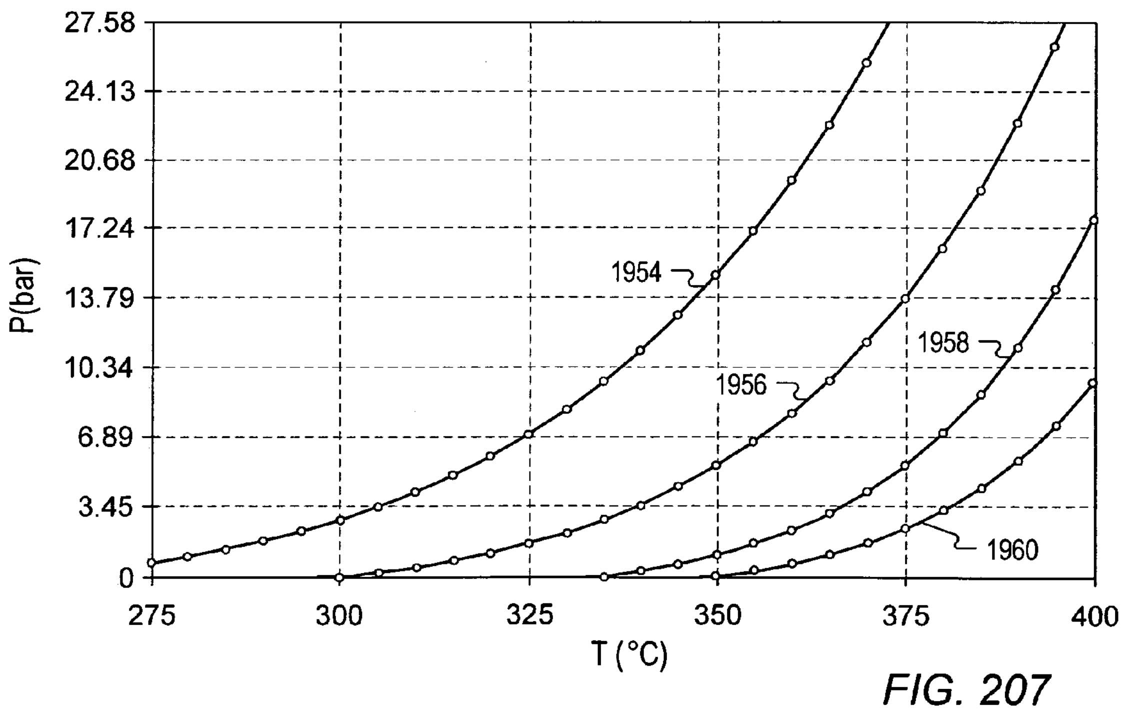

FIG. 207 depicts a plot of oil yield produced from treating an oil shale formation.

Figure 208:
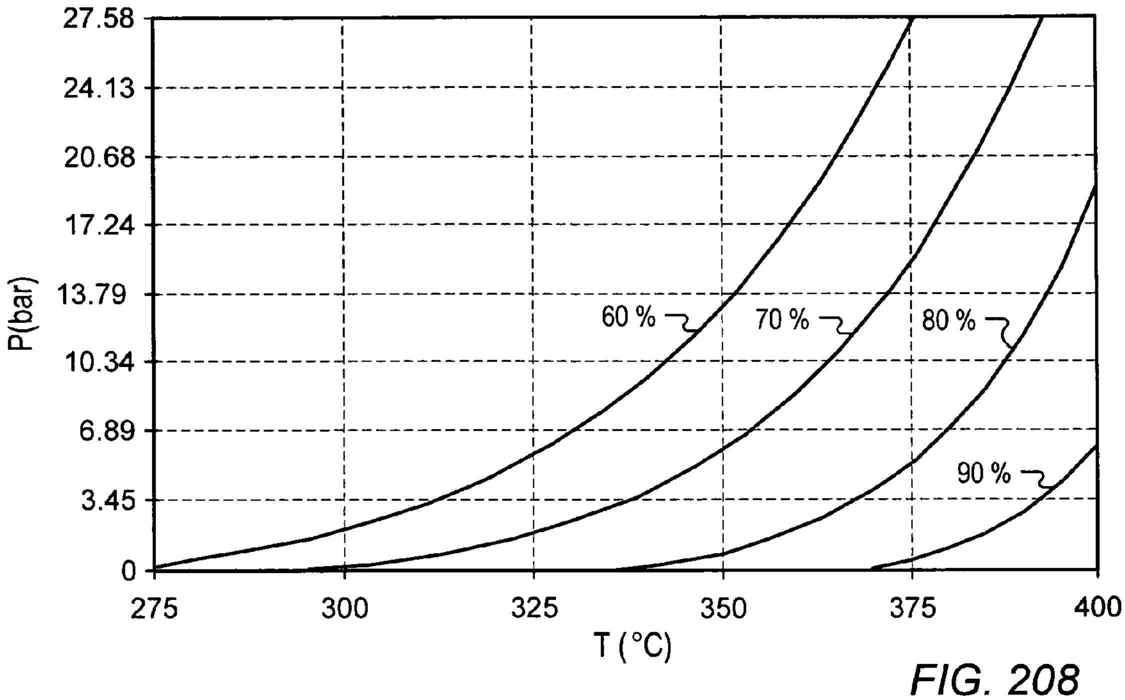

FIG. 208 depicts yield of oil produced from treating an oil shale formation.

Figure 209:
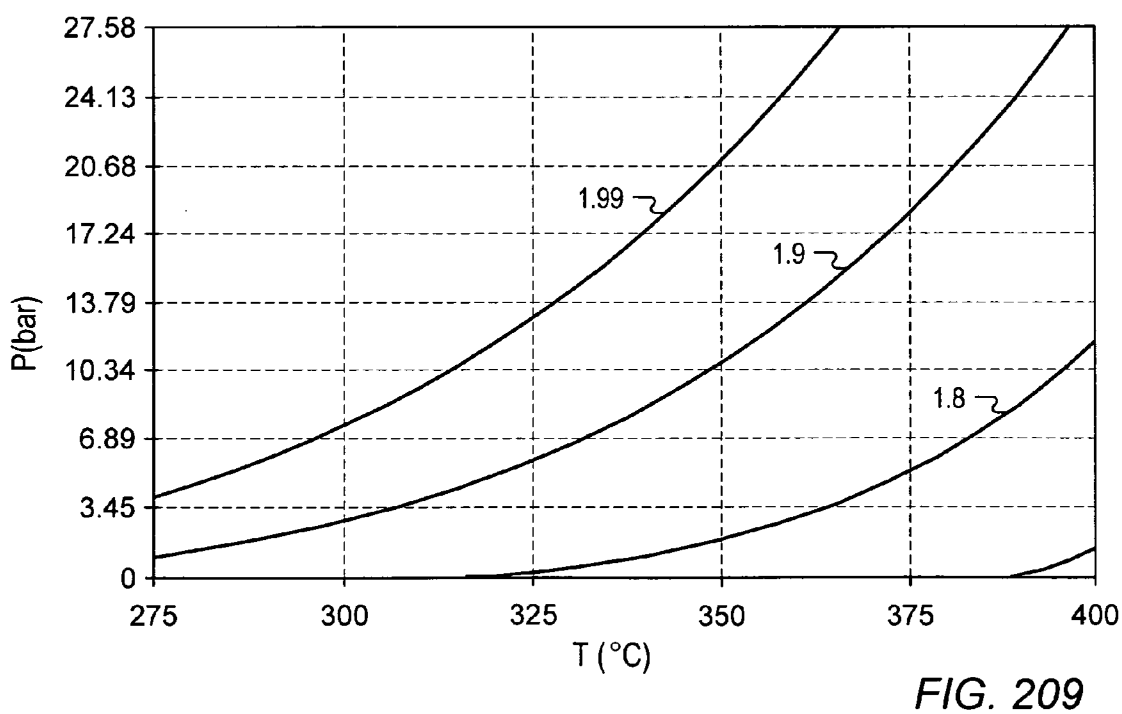

FIG. 209 depicts hydrogen to carbon ratio of hydrocarbon condensate produced from an oil shale formation as a function of temperature and pressure.

Figure 210:
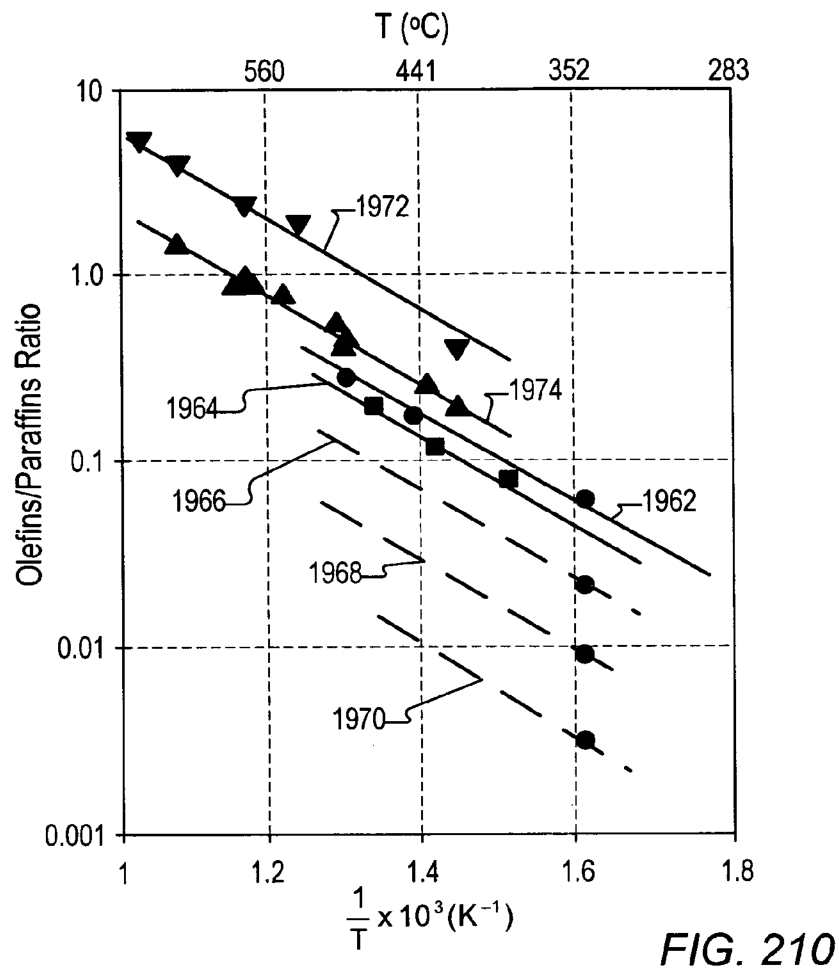

FIG. 210 depicts olefin to paraffin ratio of hydrocarbon condensate produced from an oil shale formation as a function of pressure and temperature.

Figure 211:
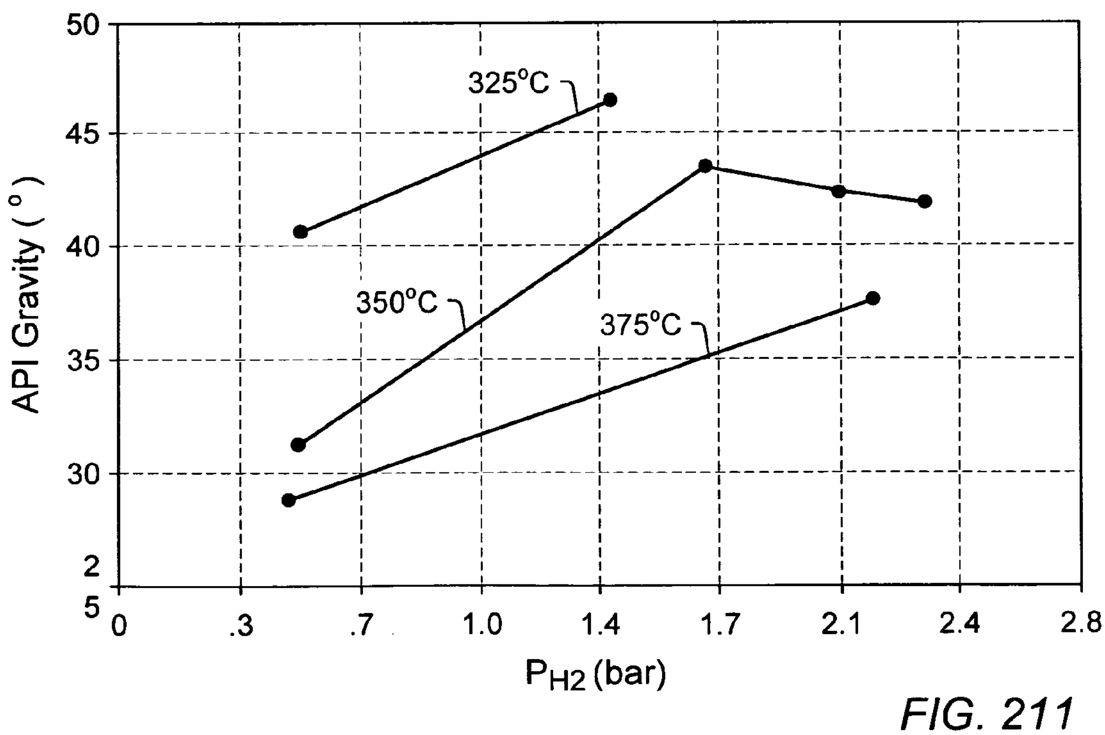

FIG. 211 depicts relationships between properties of a hydrocarbon fluid produced from an oil shale formation as a function of hydrogen partial pressure.

Figure 212:
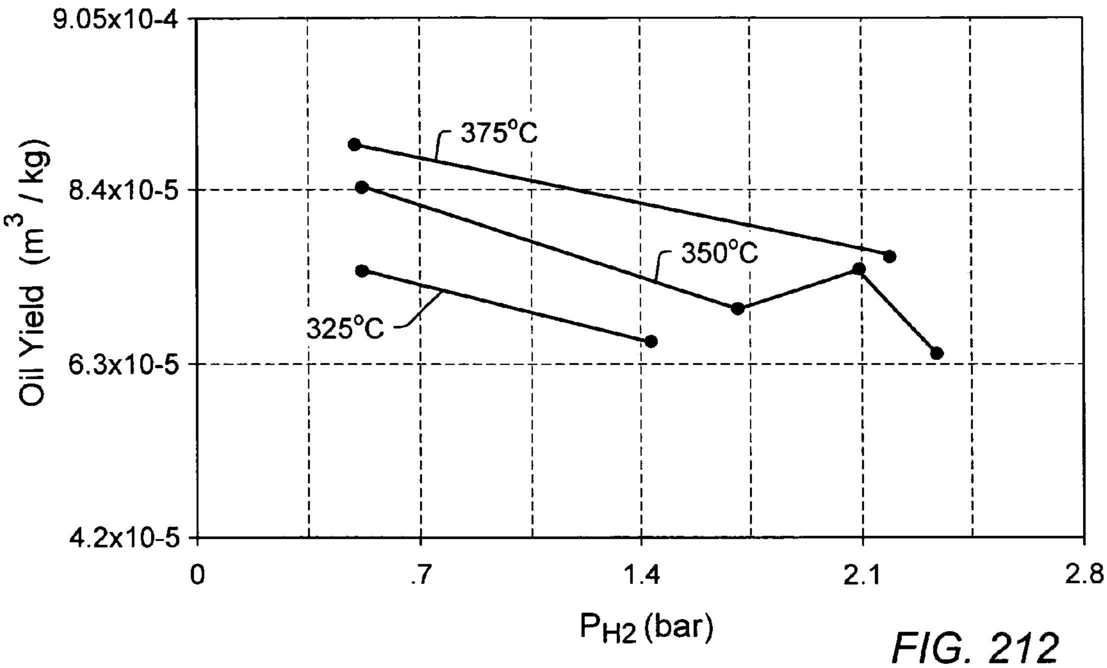

FIG. 212 depicts quantity of oil produced from an oil shale formation as a function of partial pressure of $H_2$.

Figure 213:
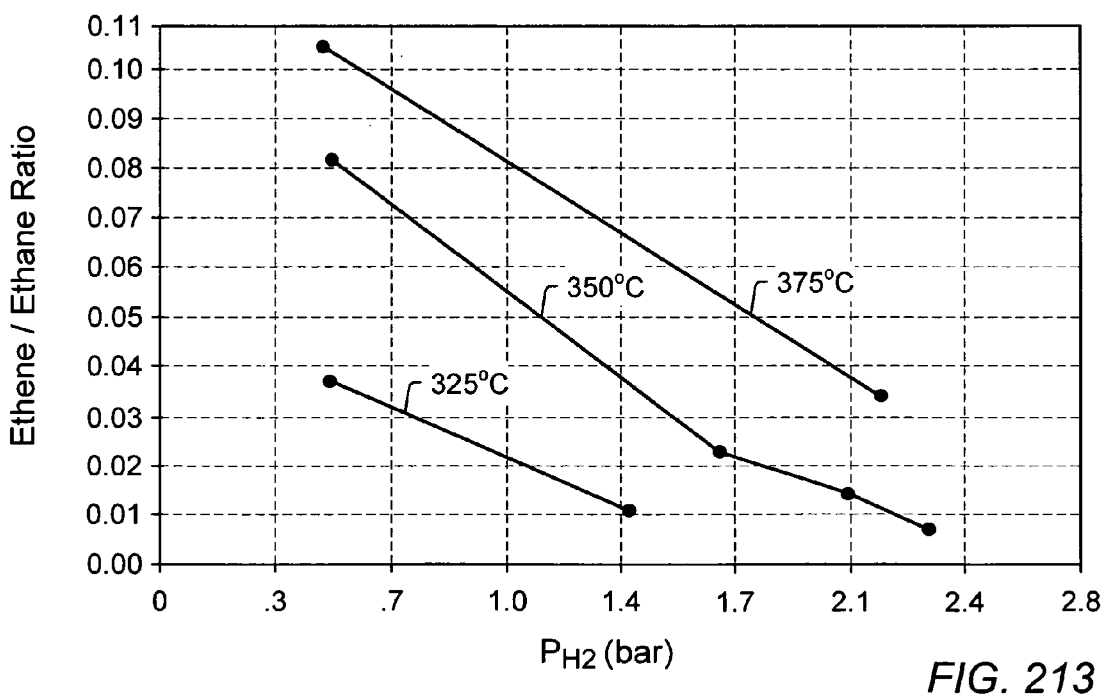

FIG. 213 depicts ethene to ethane ratios of fluid produced from an oil shale formation as a function of temperature and pressure.

Figure 214:
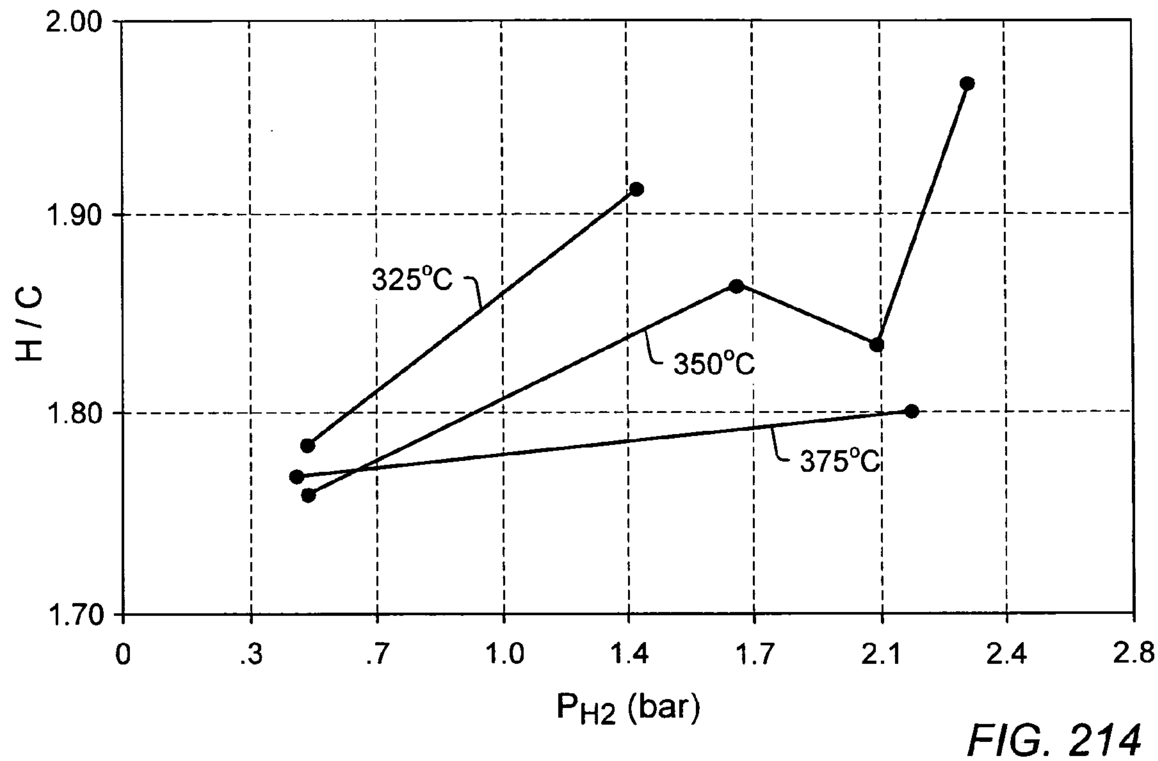

FIG. 214 depicts hydrogen to carbon atomic ratios of fluid produced from an oil shale formation as a function of temperature and pressure.

Figure 215:
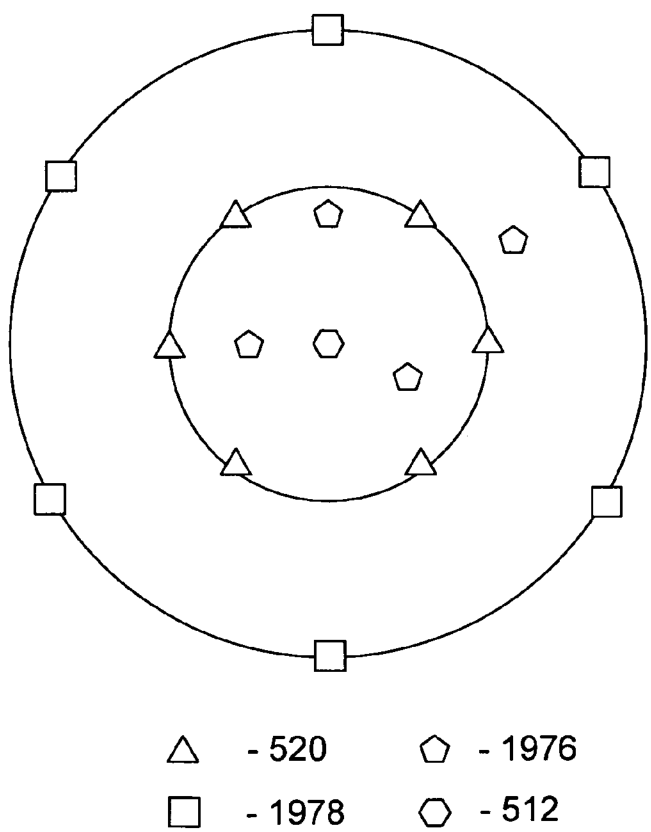

FIG. 215 depicts a heat source and production well pattern for a field experiment in an oil shale formation.

Figure 216:
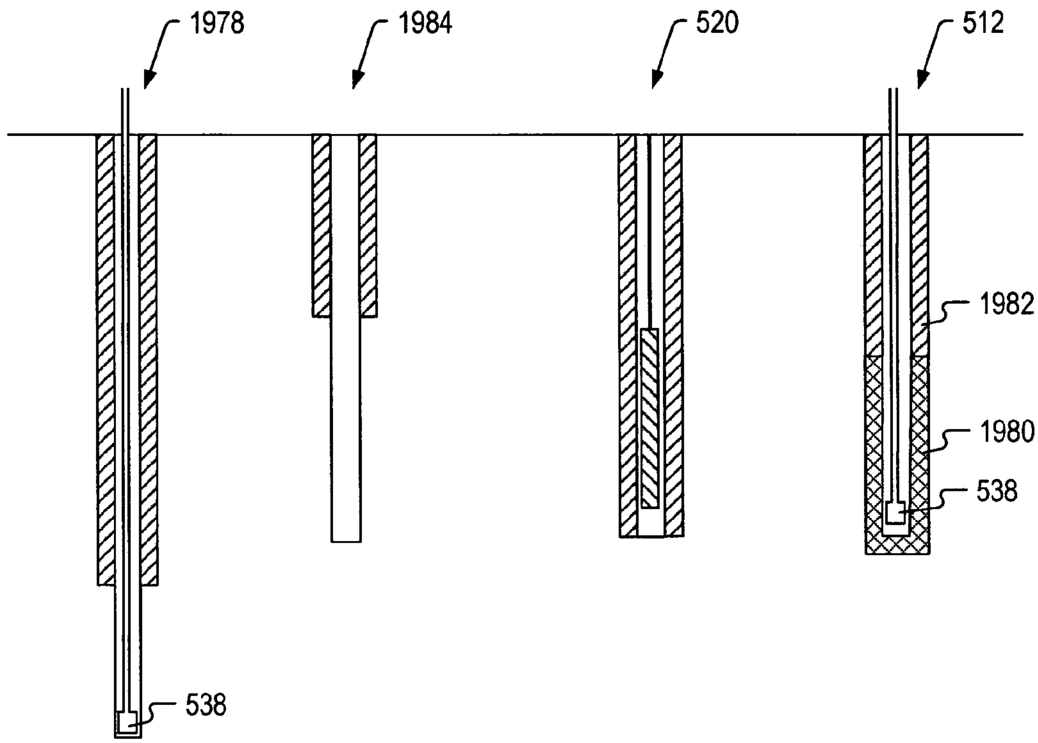

FIG. 216 depicts a cross-sectional representation of the field experiment.

Figure 217:
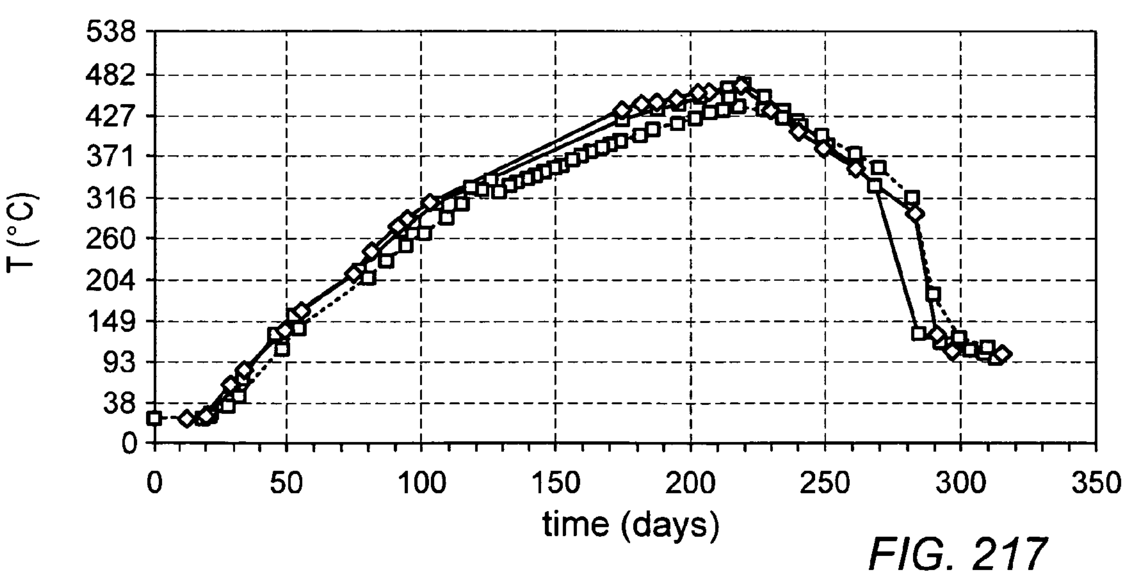

FIG. 217 depicts a plot of temperature within the oil shale formation during the field experiment.

Figure 218:
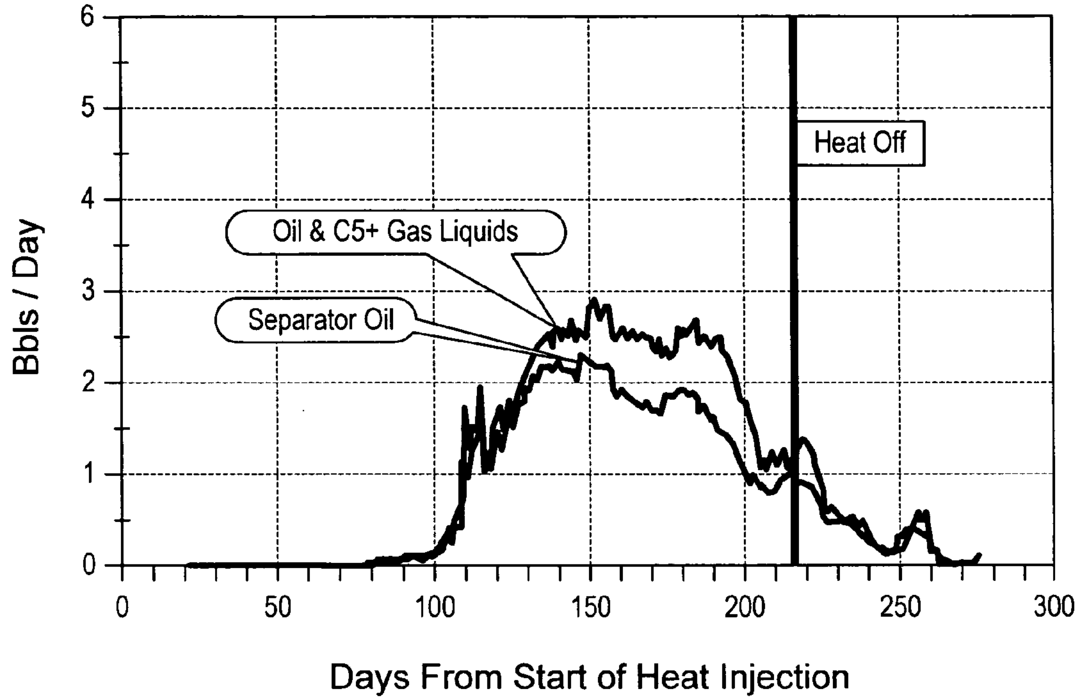

FIG. 218 depicts a plot of hydrocarbon liquids production over time for the in situ field experiment.

Figure 219:
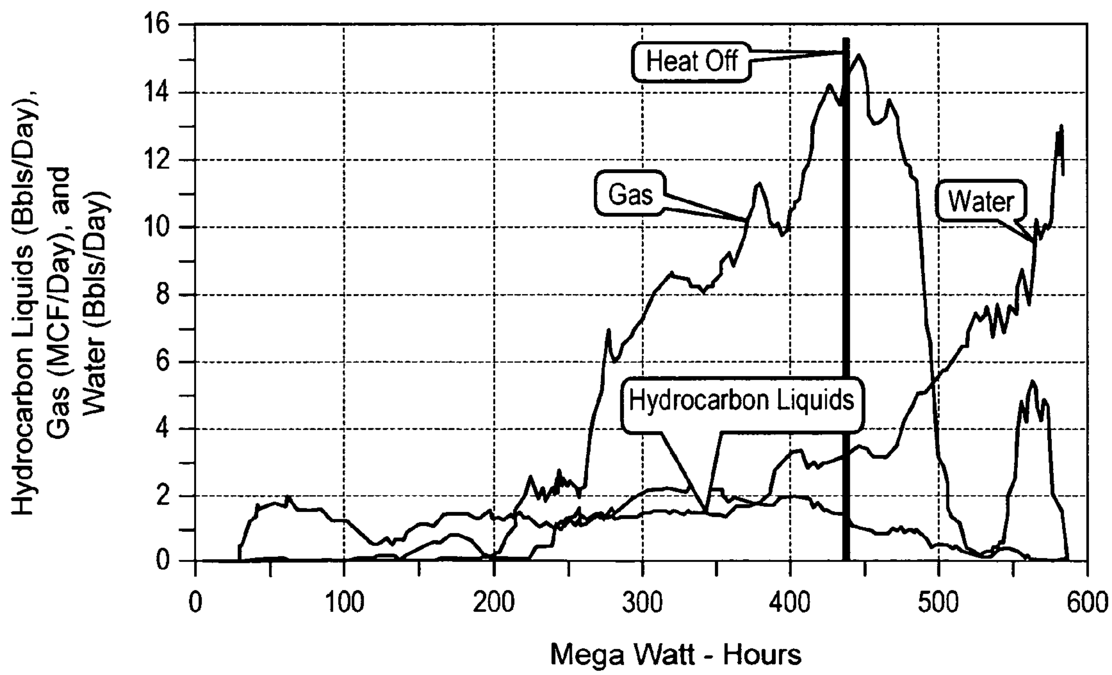

FIG. 219 depicts a plot of production of hydrocarbon liquids, gas, and water for the in situ field experiment.

Figure 220:
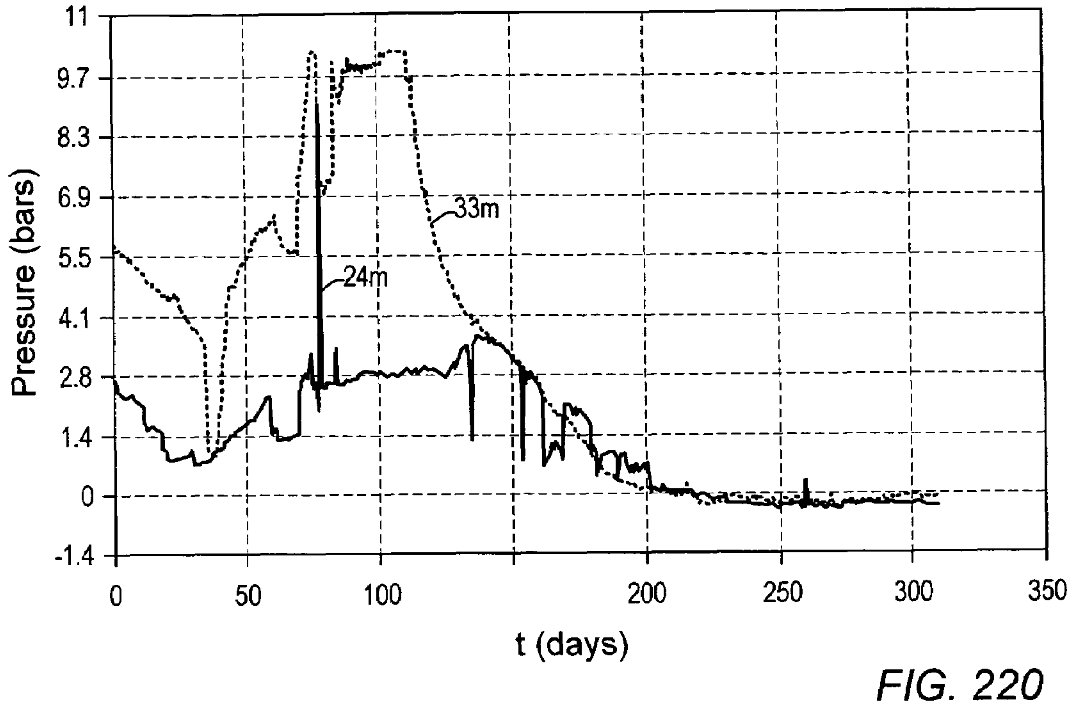

FIG. 220 depicts pressure within the oil shale formation during the field experiment.

Figure 221:
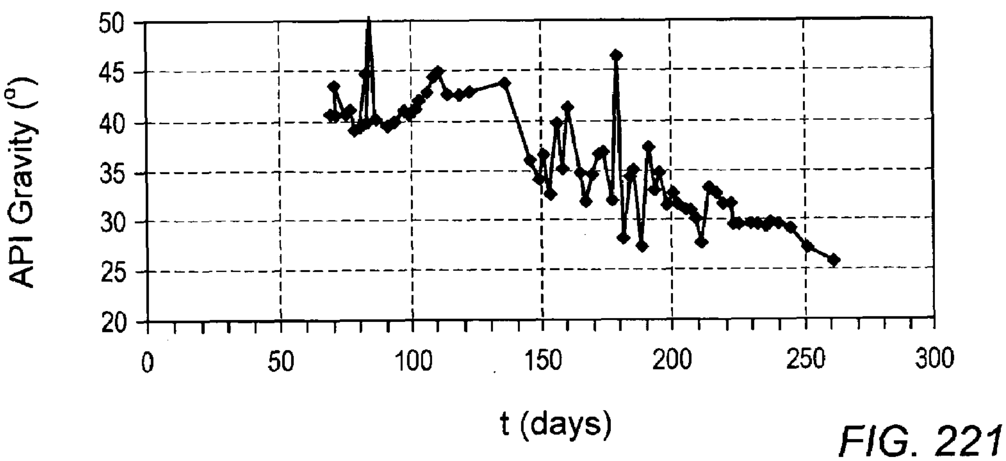

FIG. 221 depicts a plot of API gravity of a fluid produced from the oil shale formation during the field experiment versus time.

Figure 222:
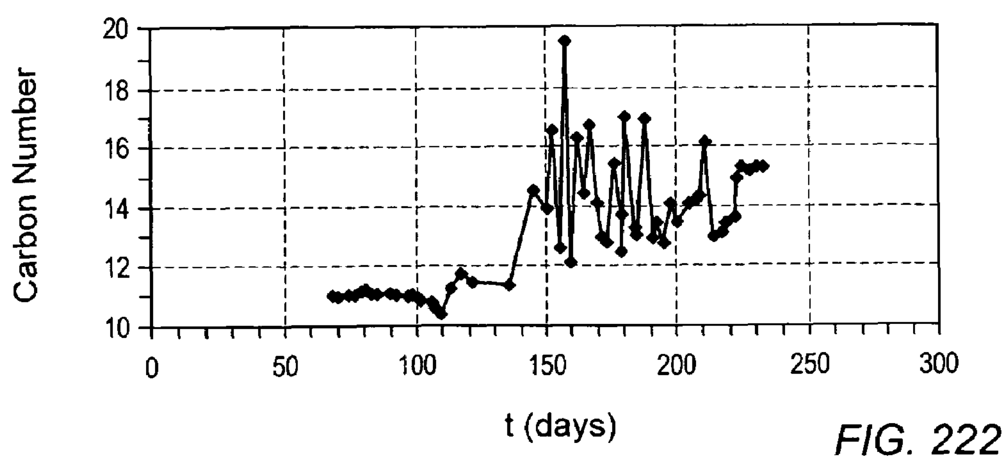

FIG. 222 depicts average carbon numbers of fluid produced from the oil shale formation during the field experiment versus time.

Figure 223:
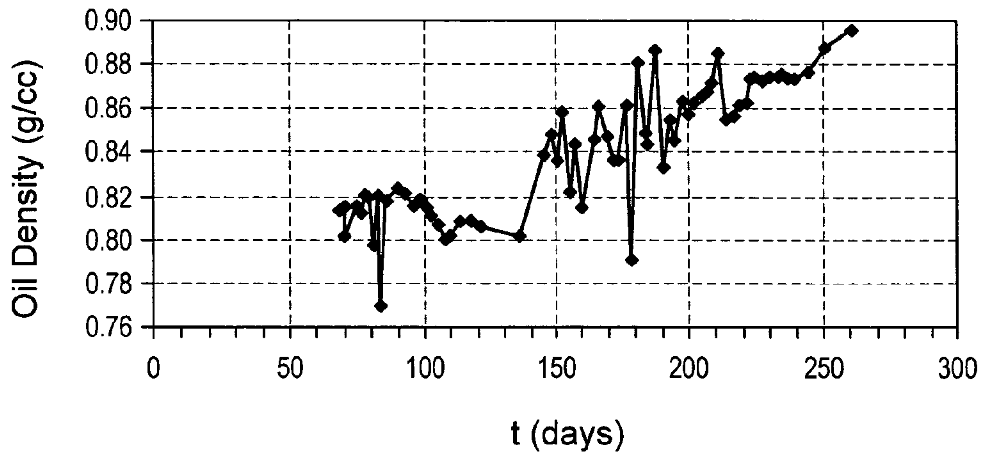

FIG. 223 depicts density of fluid produced from the oil shale formation during the field experiment versus time.

Figure 224:
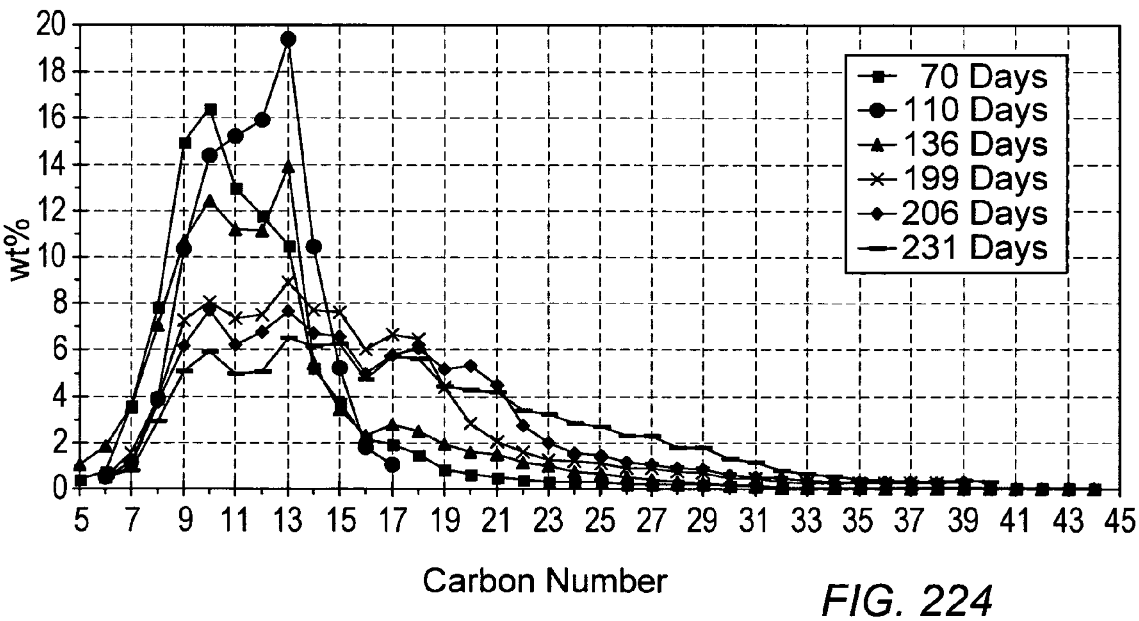

FIG. 224 depicts a plot of weight percent of hydrocarbons within fluid produced from the oil shale formation during the field experiment.

Figure 225:
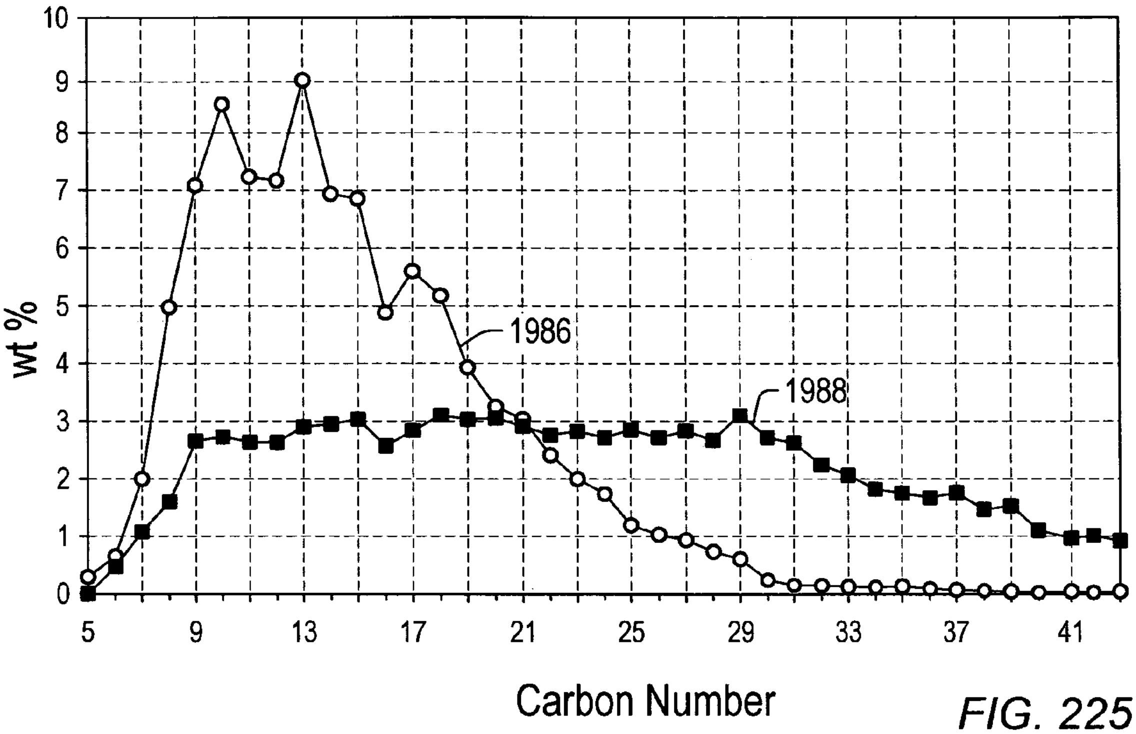

FIG. 225 depicts a plot of weight percent versus carbon number of produced oil from the oil shale formation during the field experiment.

Figure 226:
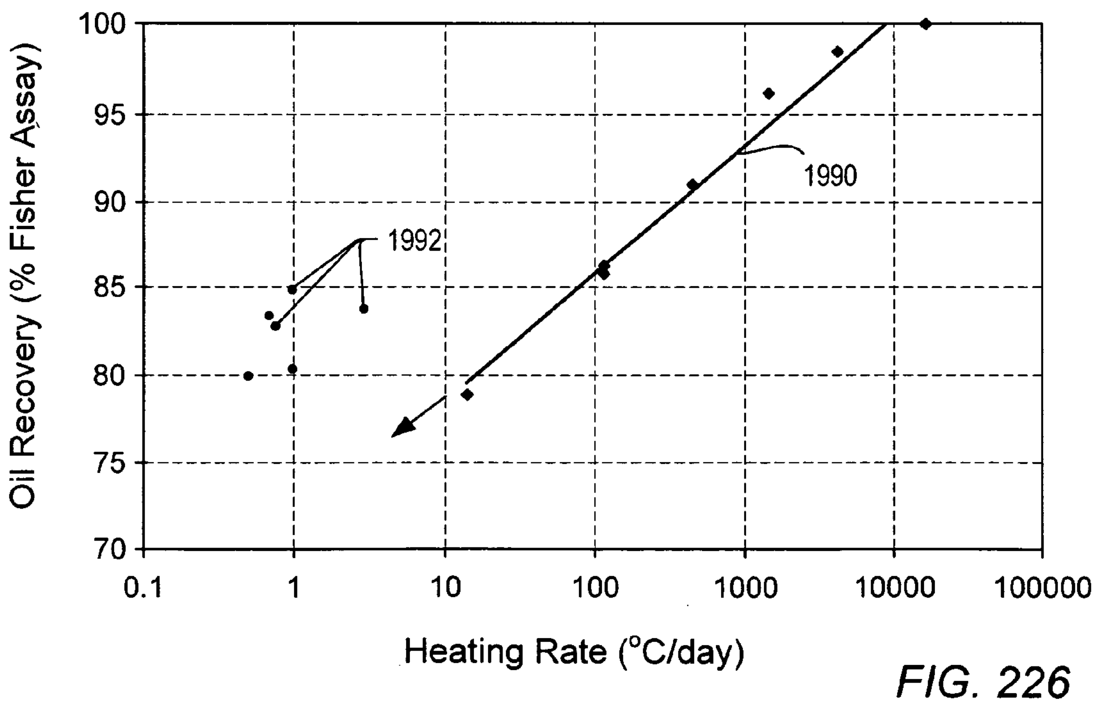

FIG. 226 depicts oil recovery versus heating rate for experimental and laboratory oil shale data.

Figure 227:
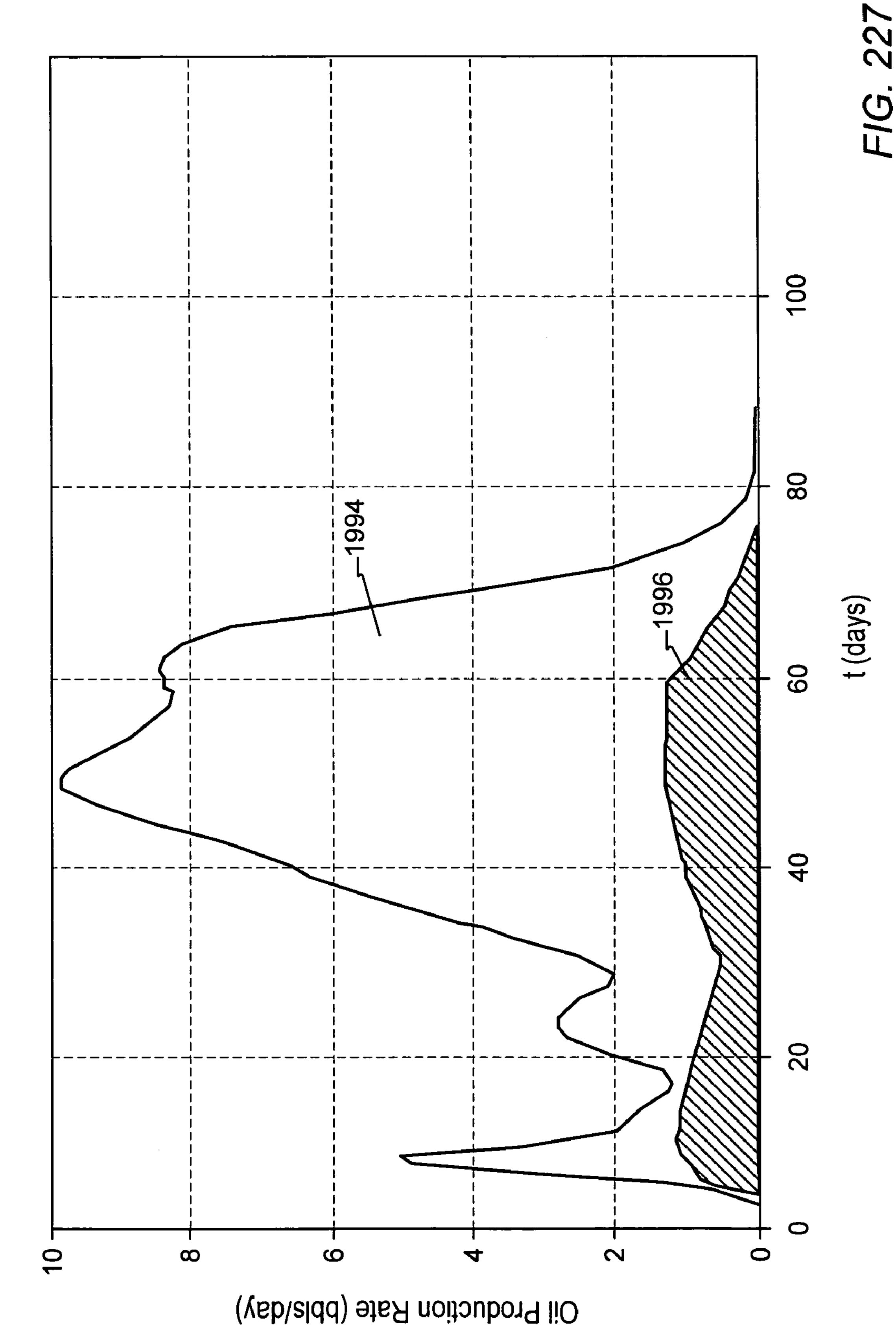

FIG. 227 depicts total hydrocarbon production and liquid phase fraction versus time of a fluid produced from an oil shale formation.

Figure 228:
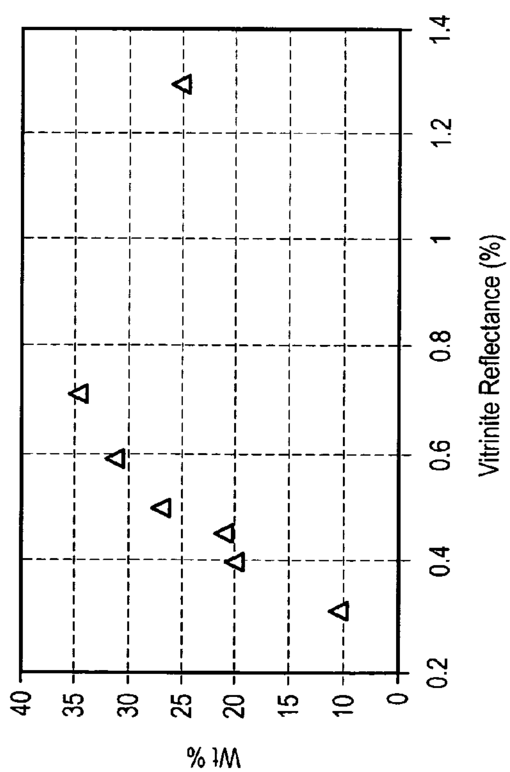

FIG. 228 depicts weight percent of paraffins versus vitrinite reflectance.

Figure 229:
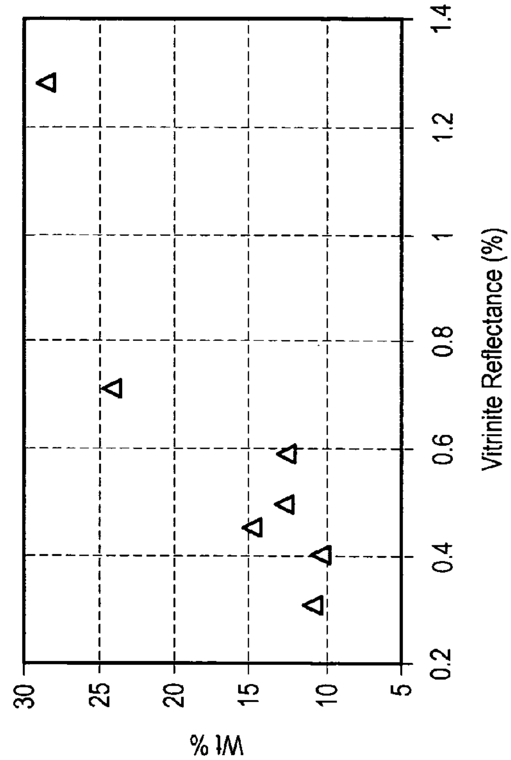

FIG. 229 depicts weight percent of cycloalkanes in produced oil versus vitrinite reflectance.

Figure 230:
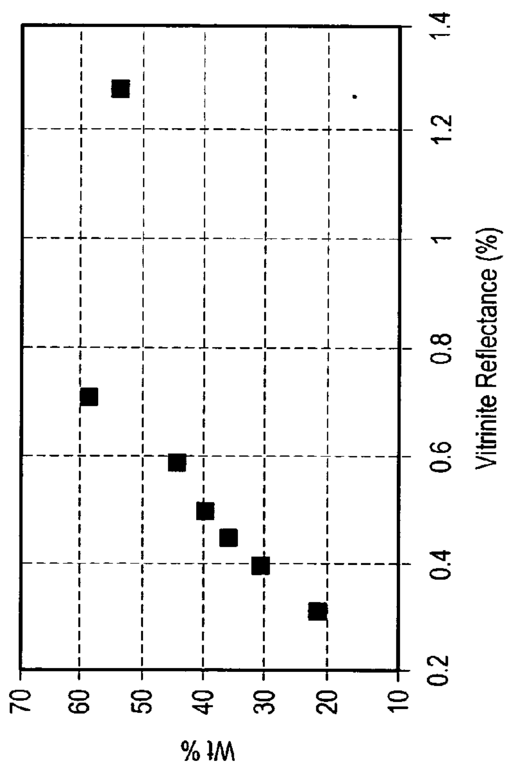

FIG. 230 depicts weight percentages of paraffins and cycloalkanes in produced oil versus vitrinite reflectance.

Figure 231:
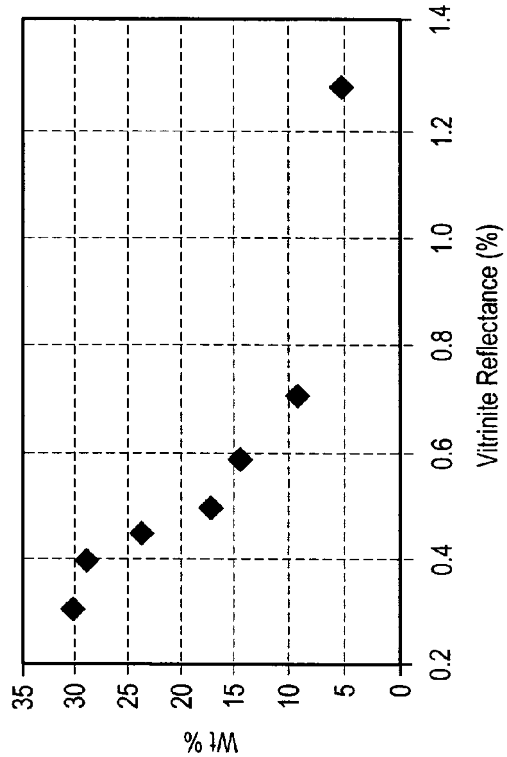

FIG. 231 depicts phenol weight percent in produced oil versus vitrinite reflectance.

Figure 232:
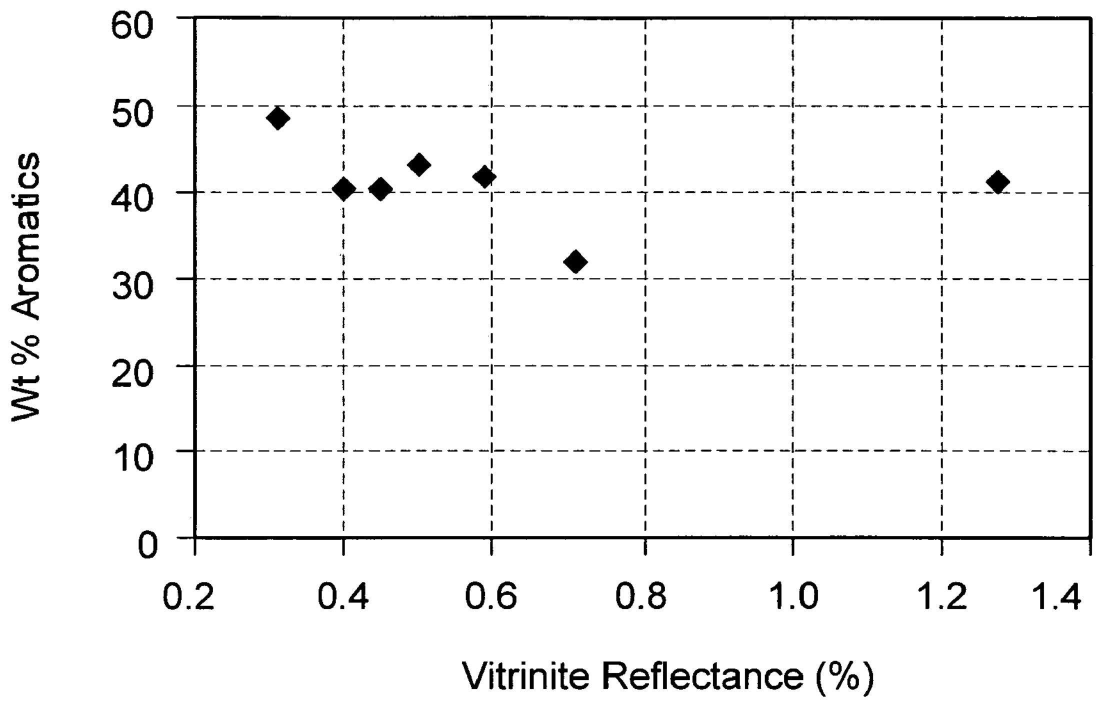

FIG. 232 depicts aromatic weight percent in produced oil versus vitrinite reflectance.

Figure 233:
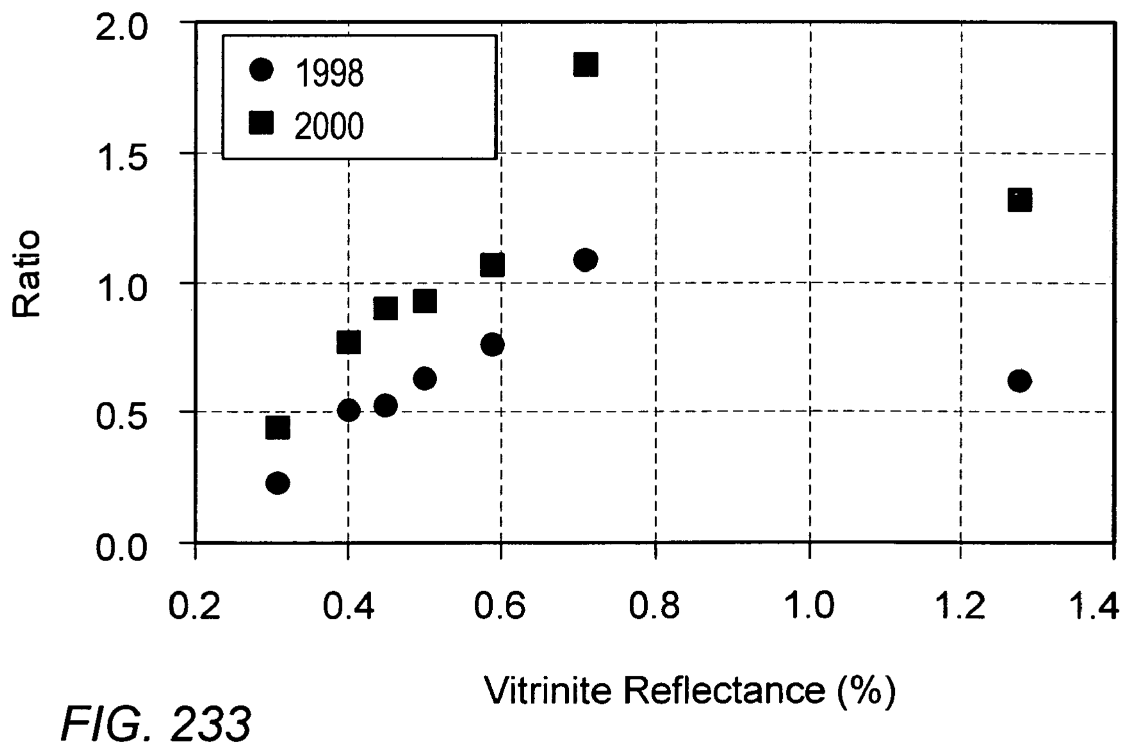

FIG. 233 depicts ratios of paraffins to aromatics and aliphatics to aromatics versus vitrinite reflectance.

Figure 234:
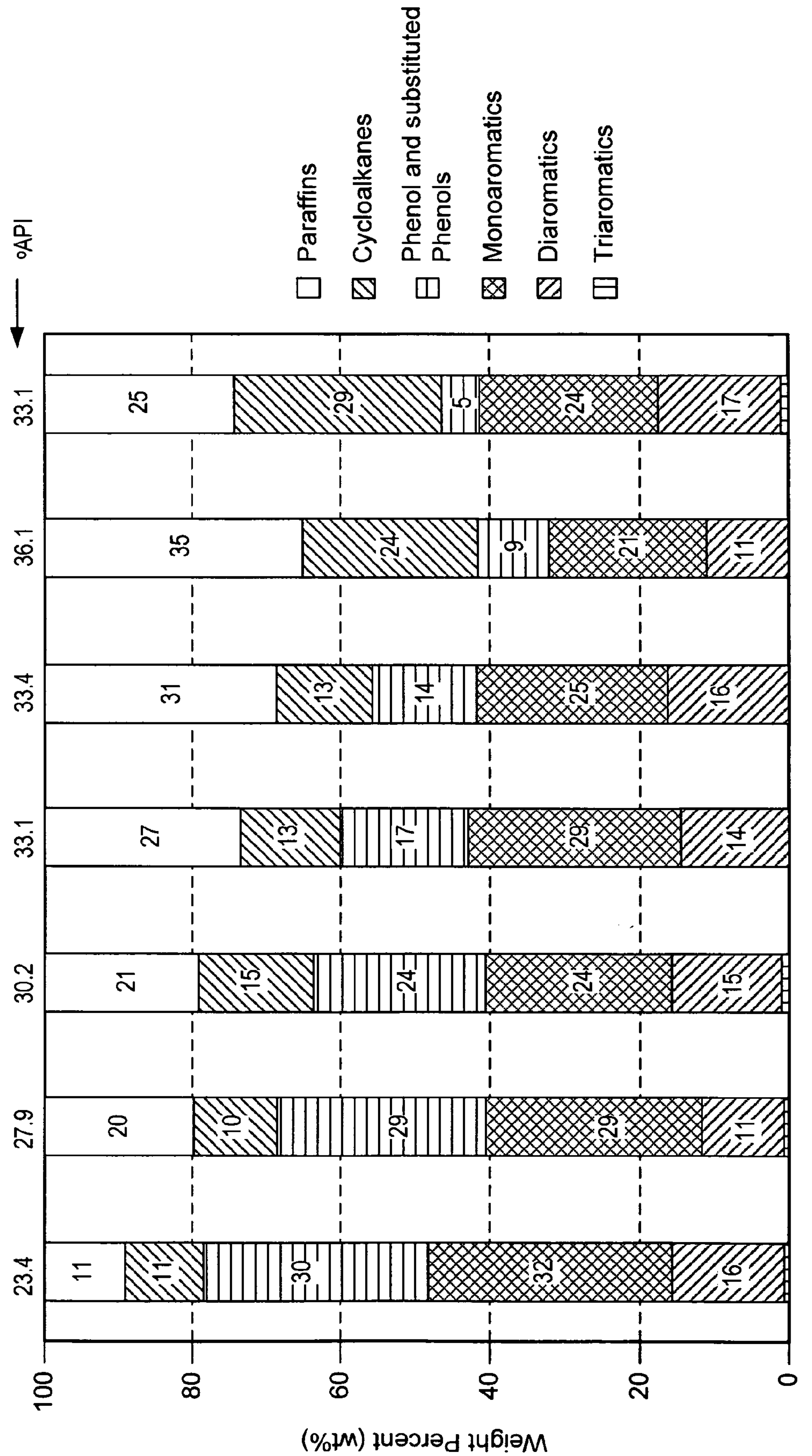

FIG. 234 depicts the compositions of condensable hydrocarbons produced when various ranks of coal were treated.

Figure 235:
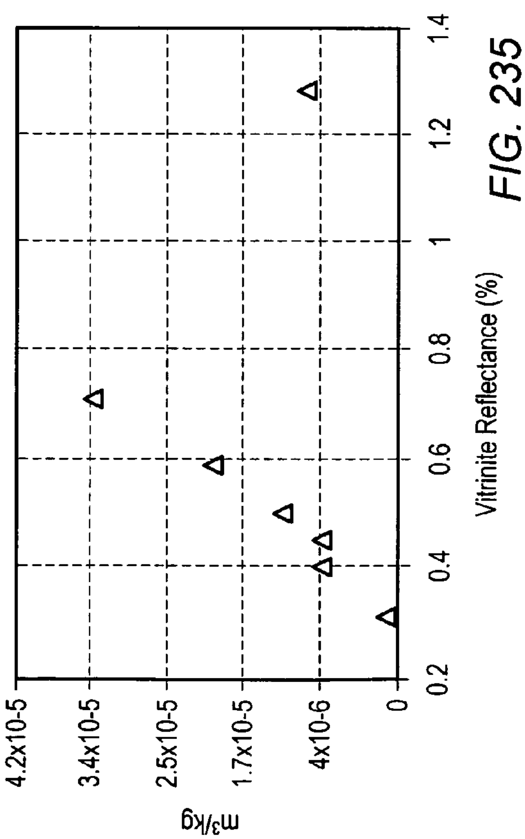

FIG. 235 depicts yields of paraffins versus vitrinite reflectance.

Figure 236:
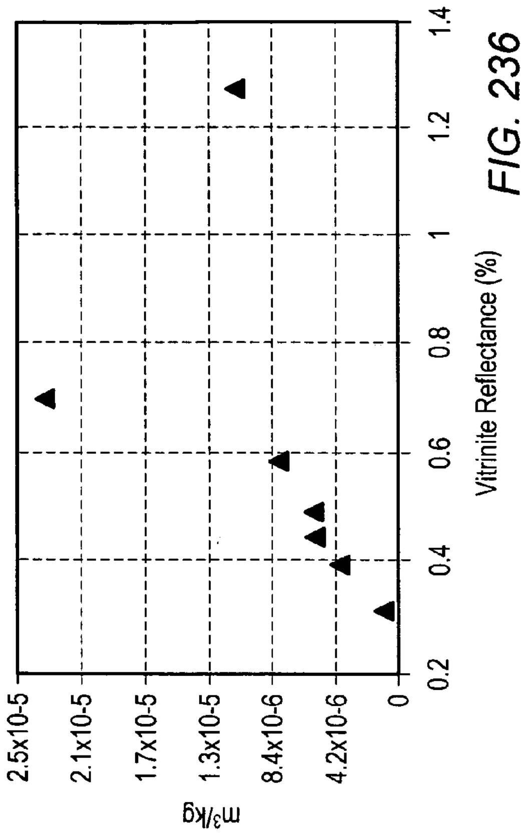

FIG. 236 depicts yields of cycloalkanes versus vitrinite reflectance.

Figure 237:
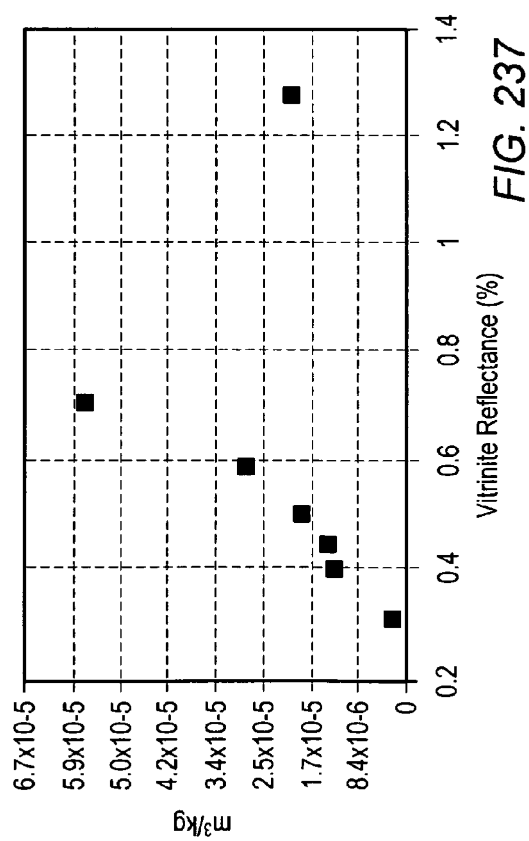

FIG. 237 depicts yields of cycloalkanes and paraffins versus vitrinite reflectance.

Figure 238:
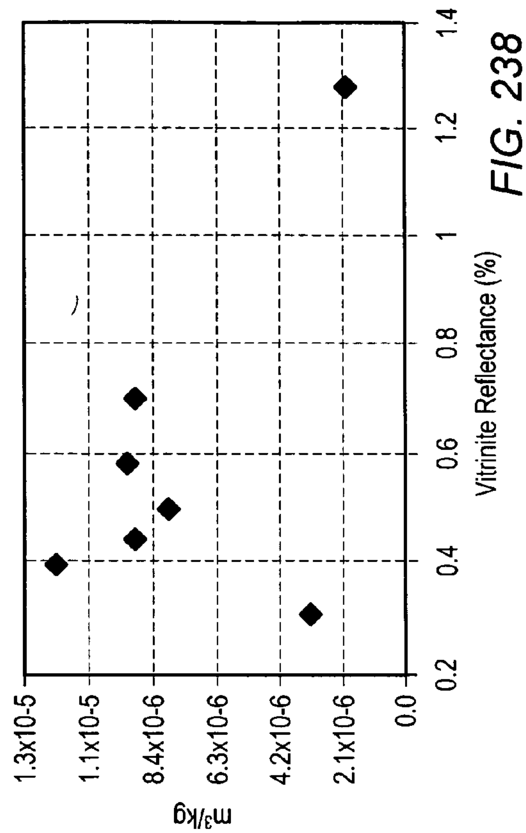

FIG. 238 depicts yields of phenols versus vitrinite reflectance.

Figure 239:
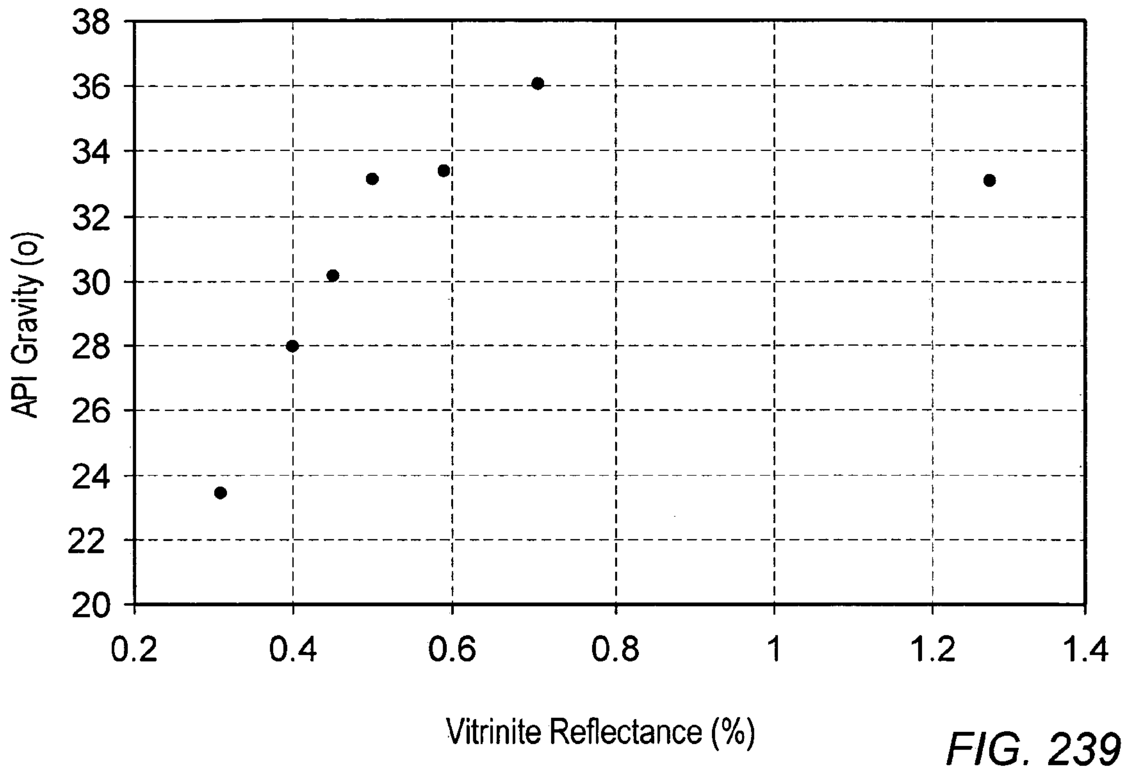

FIG. 239 depicts API gravity as a function of vitrinite reflectance.

Figure 240:
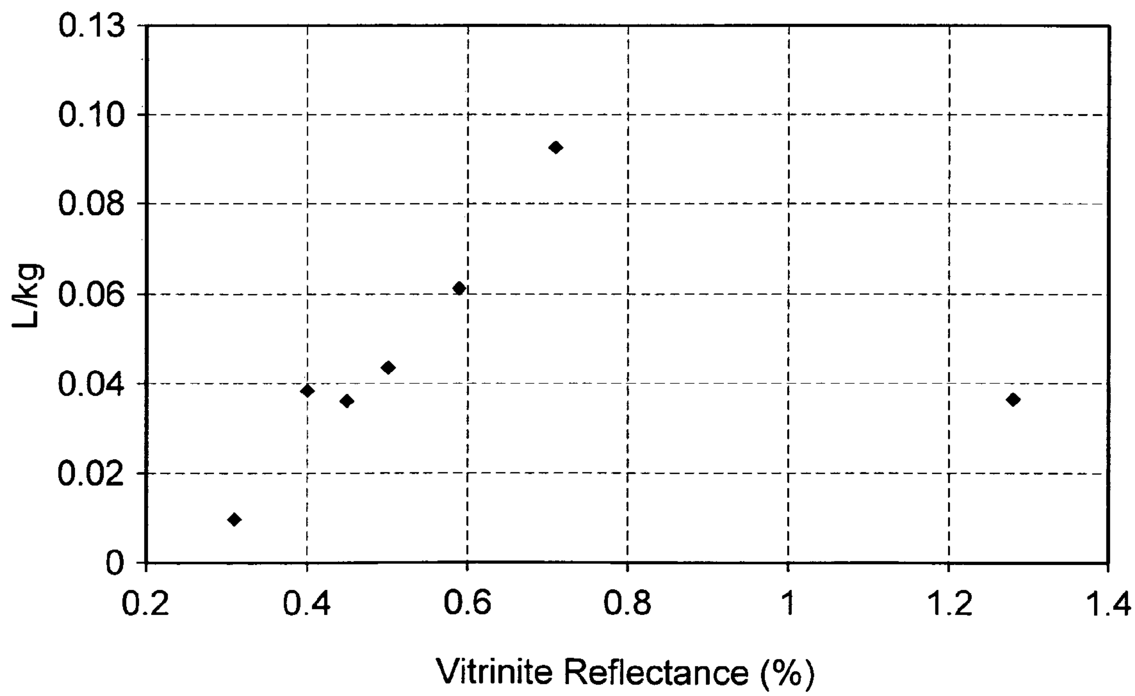

FIG. 240 depicts yield of oil from a coal formation as a function of vitrinite reflectance.

Figure 241:
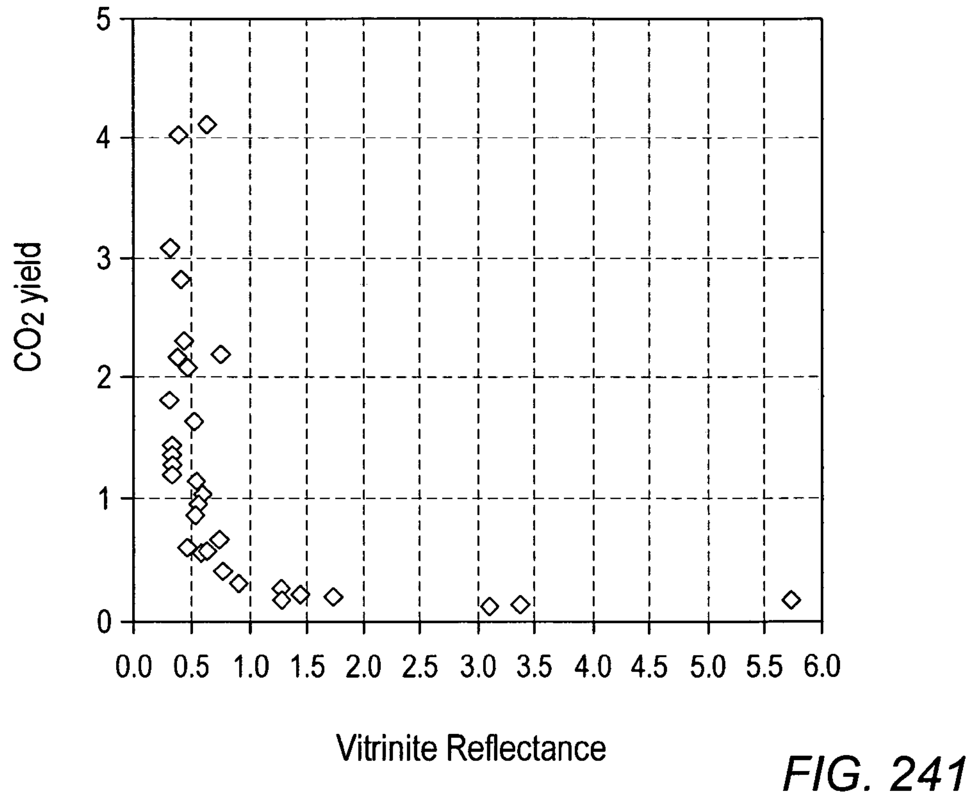

FIG. 241 depicts $CO_2$ yield from coal having various vitrinite reflectances.

Figure 242:
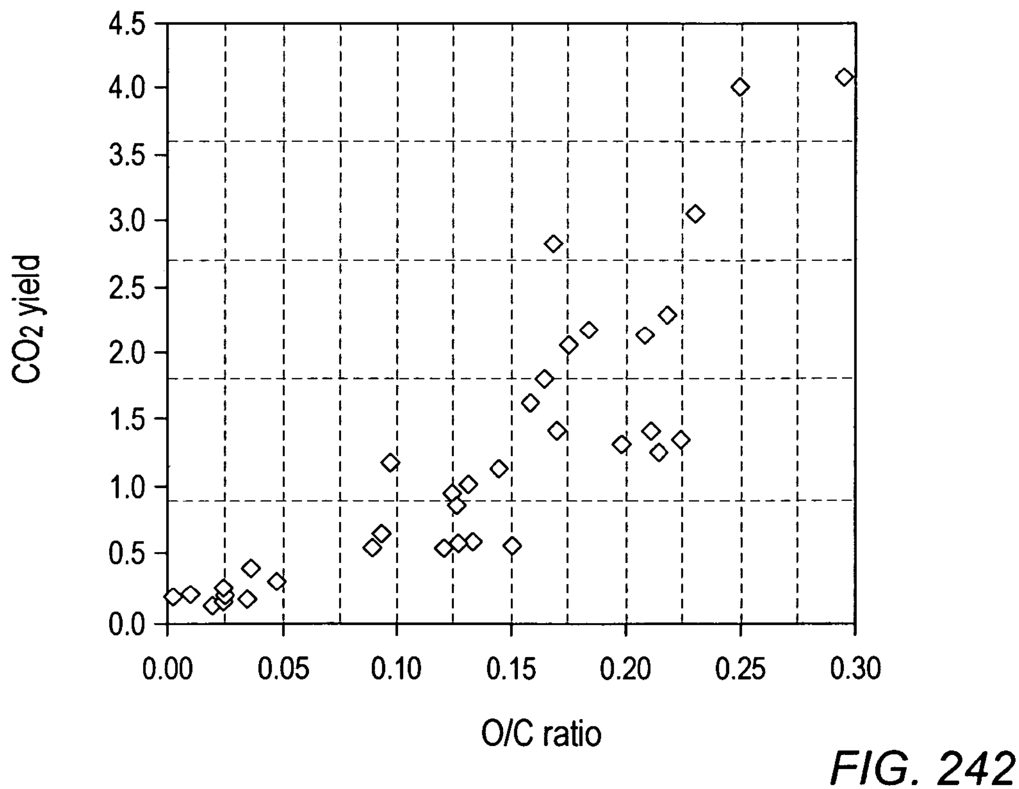

FIG. 242 depicts $CO_2$ yield versus atomic O/C ratio for a coal formation.

Figure 243:
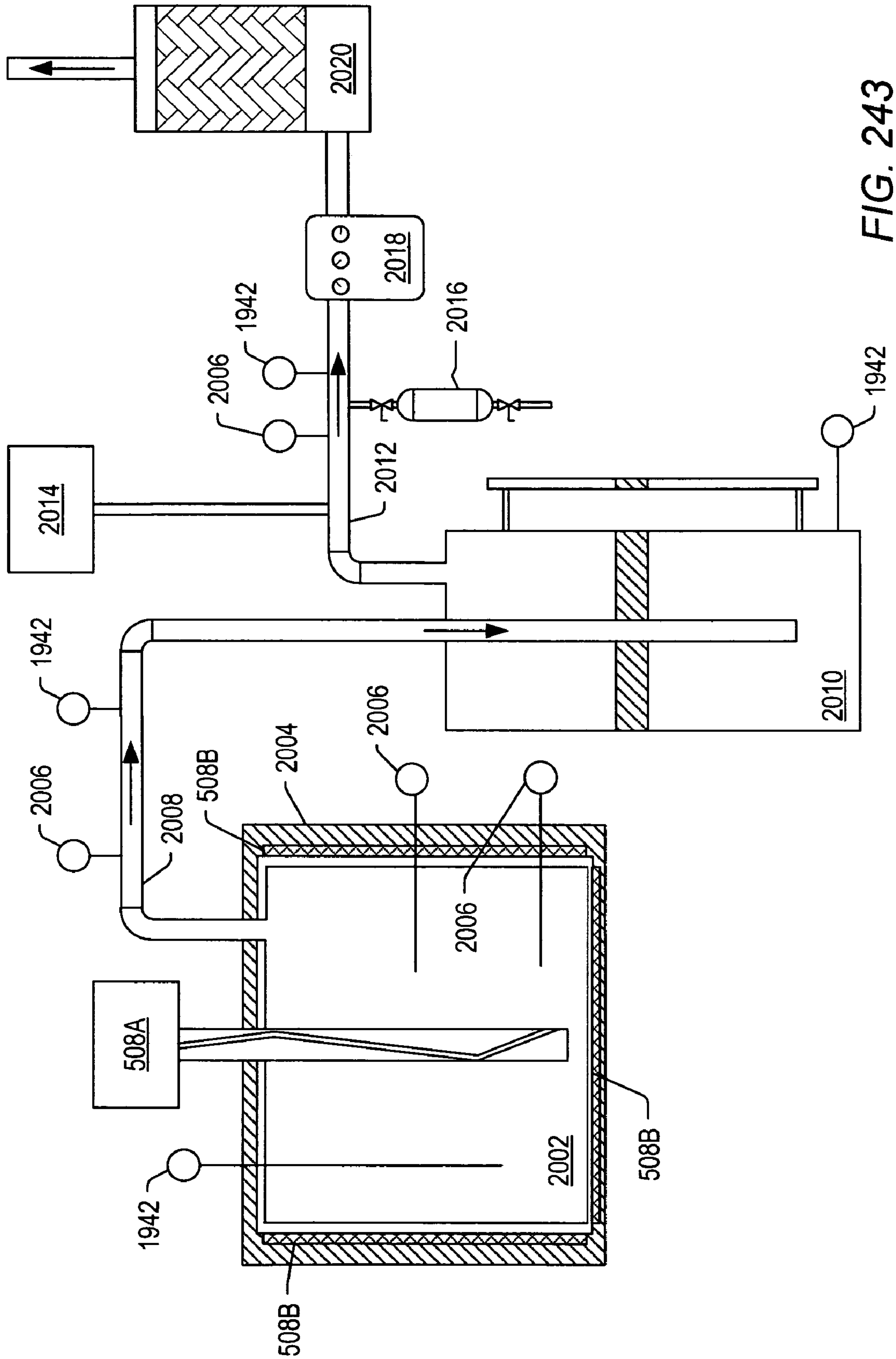

FIG. 243 depicts a schematic of a coal cube experiment.

Figure 244:
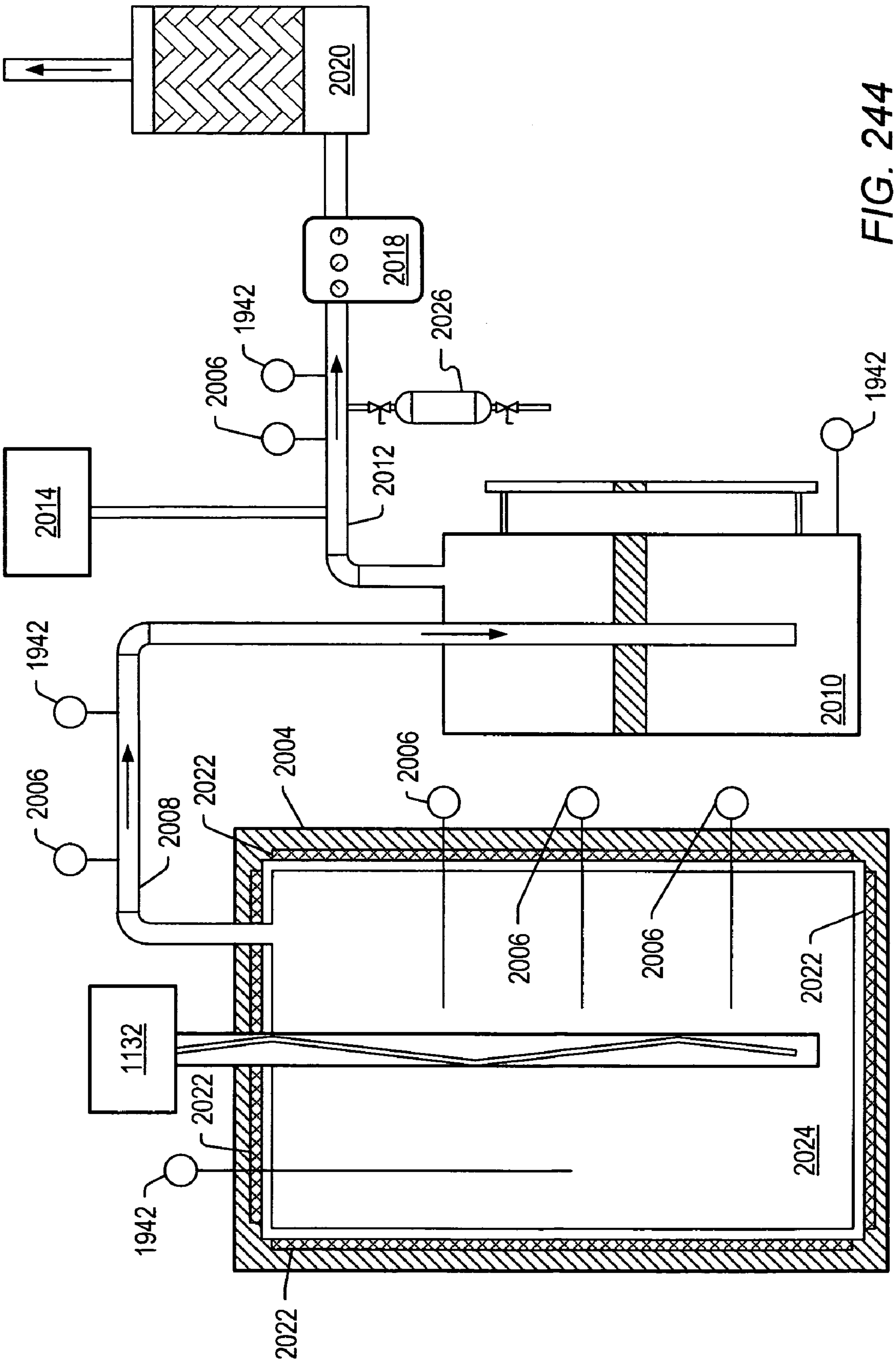

FIG. 244 depicts an embodiment of an apparatus for a drum experiment.

Figure 245:
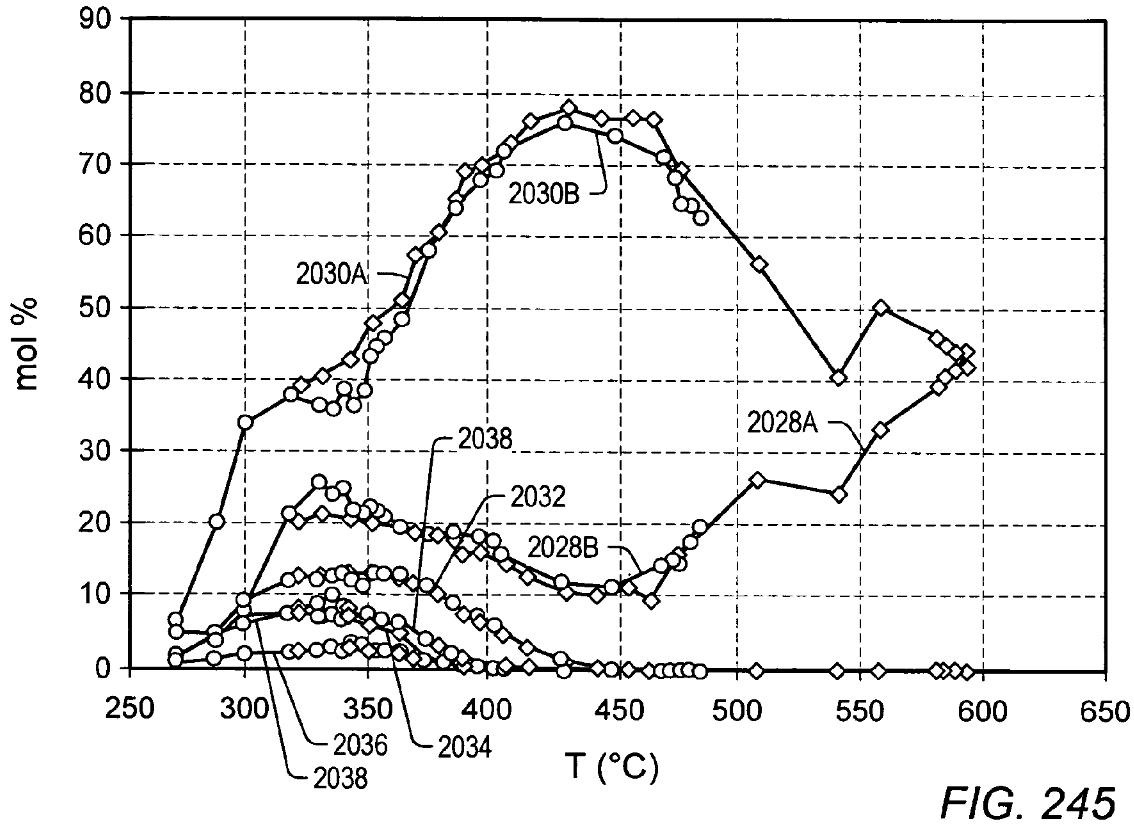

FIG. 245 depicts equilibrium gas phase compositions produced from experiments on a coal cube and a coal drum.

Figure 246:
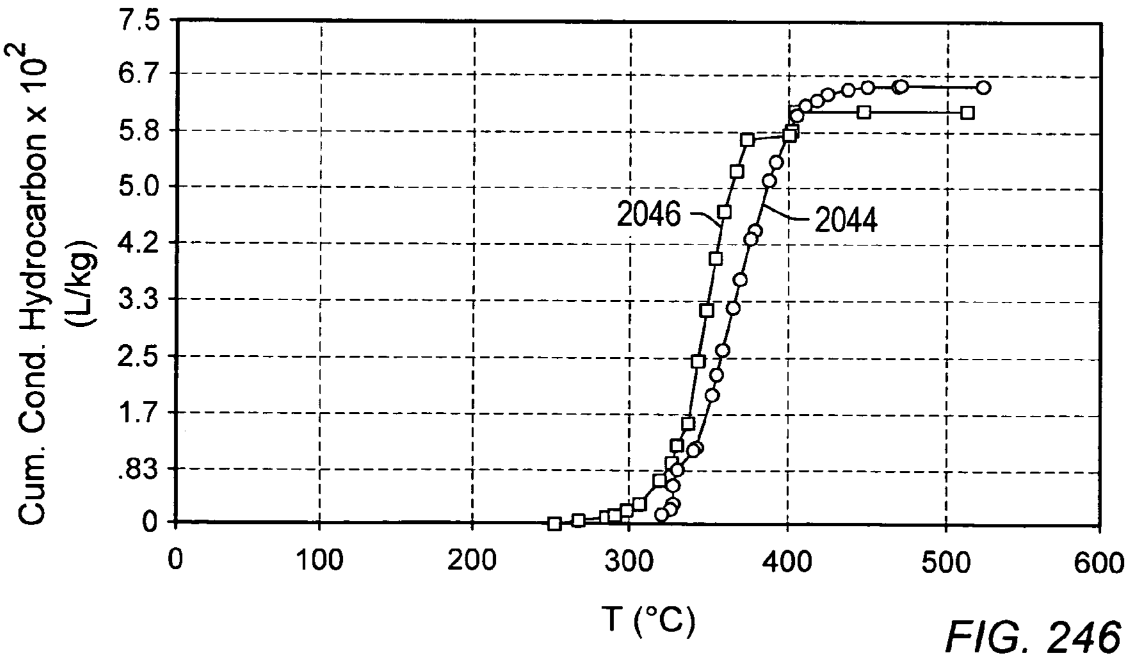

FIG. 246 depicts cumulative condensable hydrocarbons as a function of temperature produced by heating a coal in a cube and coal in a drum.

Figure 247:
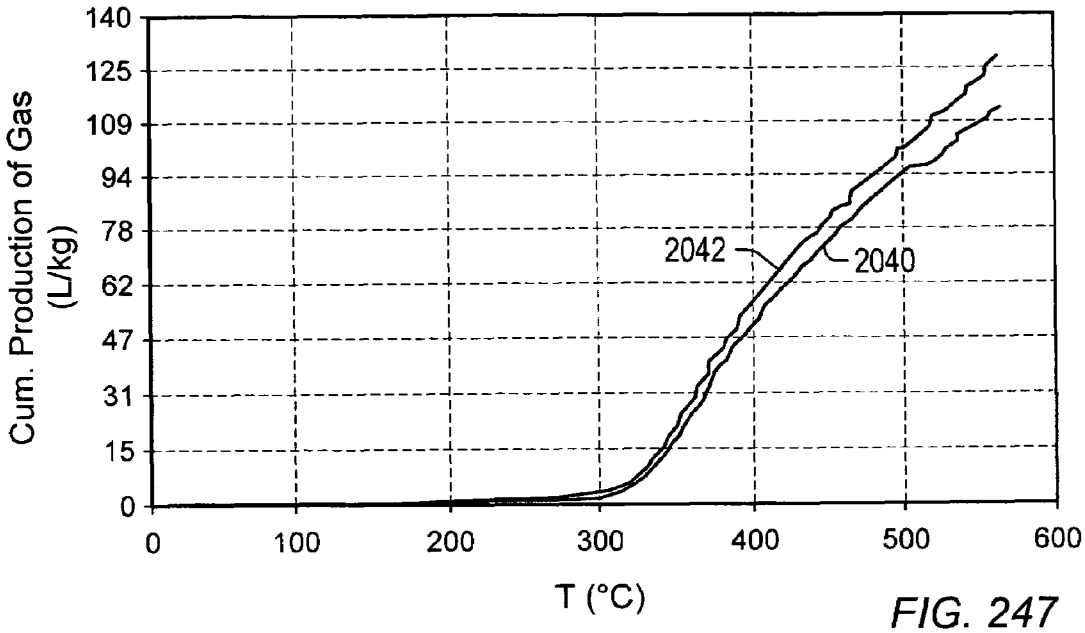

FIG. 247 depicts cumulative production of gas as a function of temperature produced by heating a coal in a cube and coal in a drum.

Figure 248:
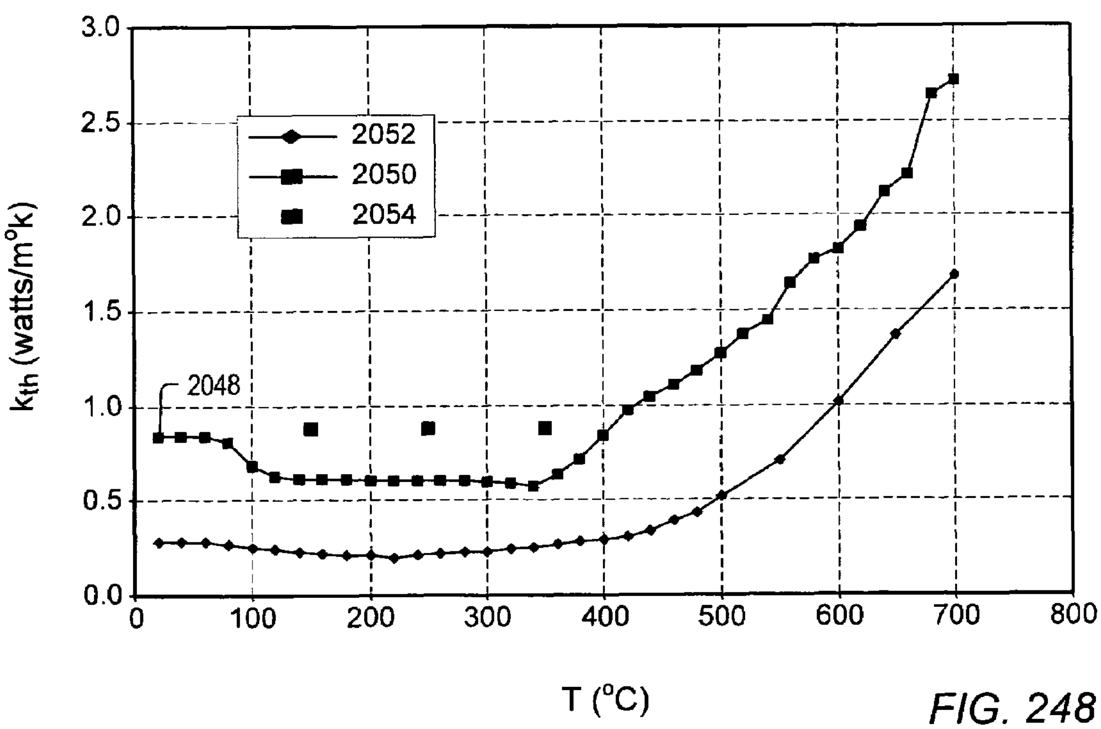

FIG. 248 depicts thermal conductivity of coal versus temperature.

Figure 249:
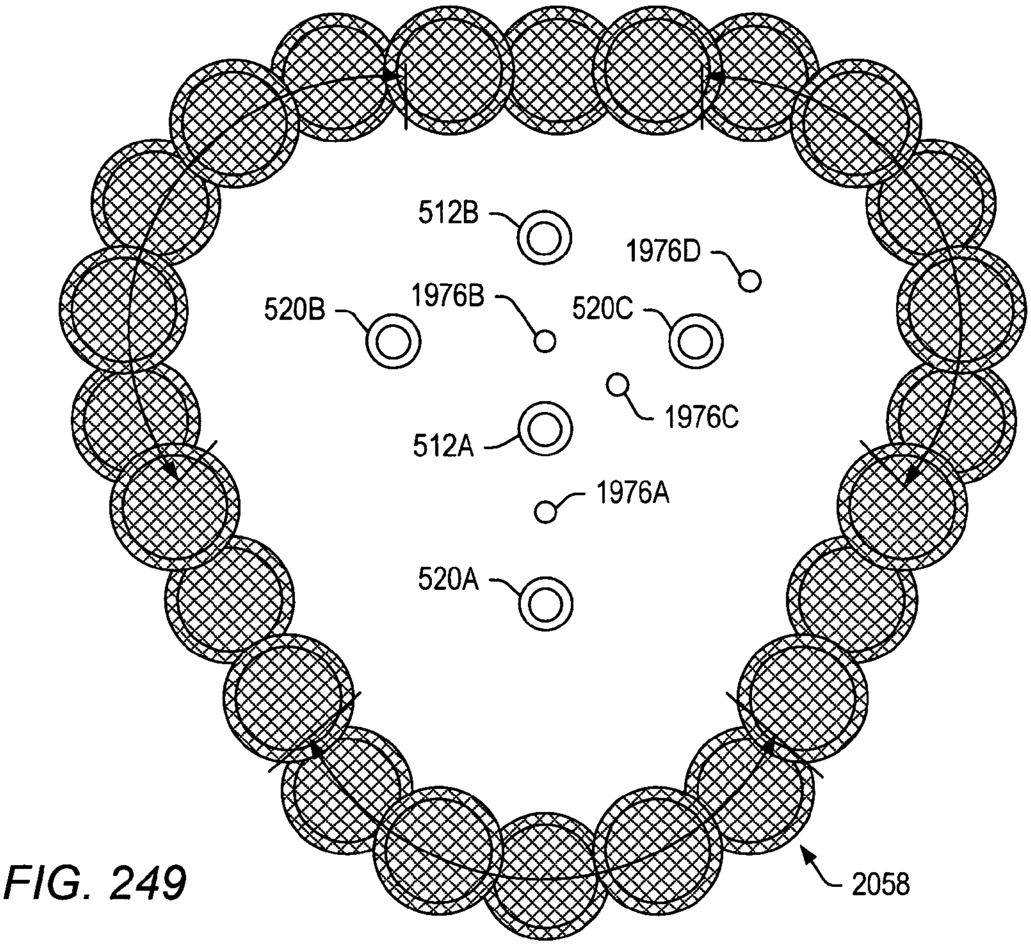

FIG. 249 depicts locations of heat sources and wells in an experimental field test.

Figure 250:
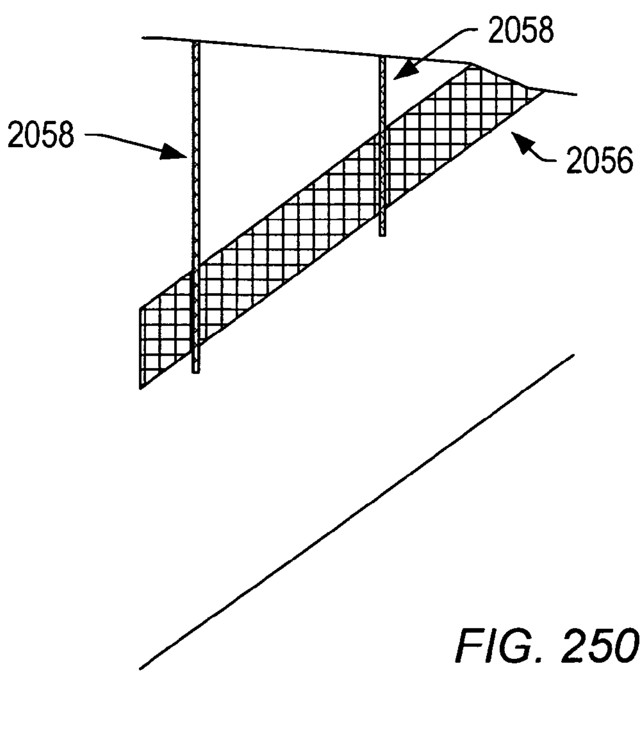

FIG. 250 depicts a cross-sectional representation of the in situ experimental field test.

Figure 251:
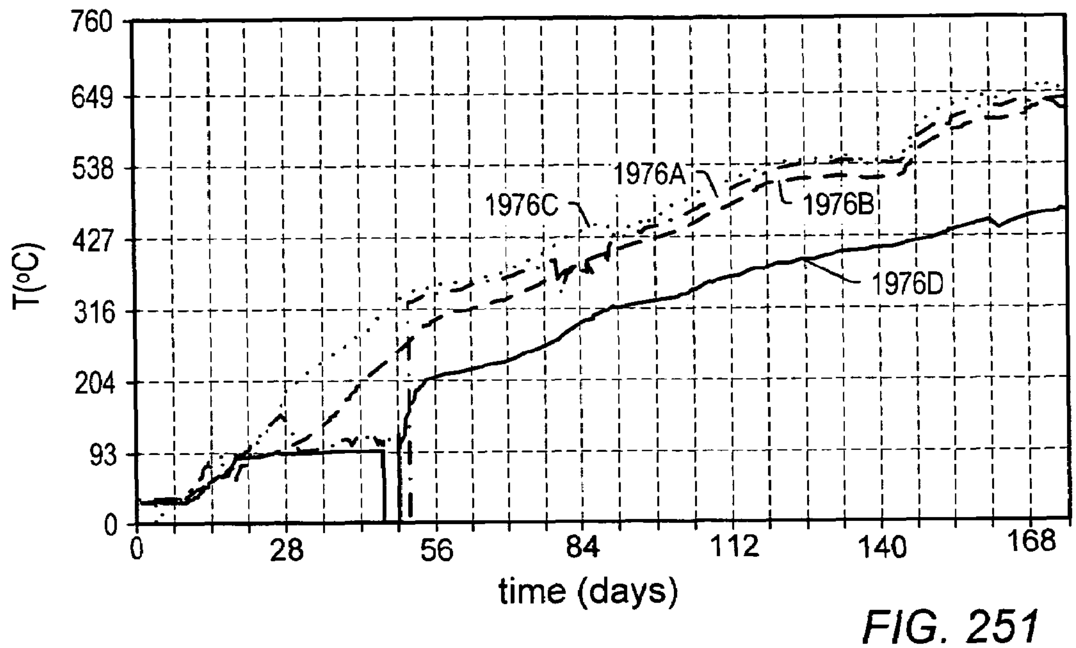

FIG. 251 depicts temperature versus time in the experimental field test.

Figure 252:
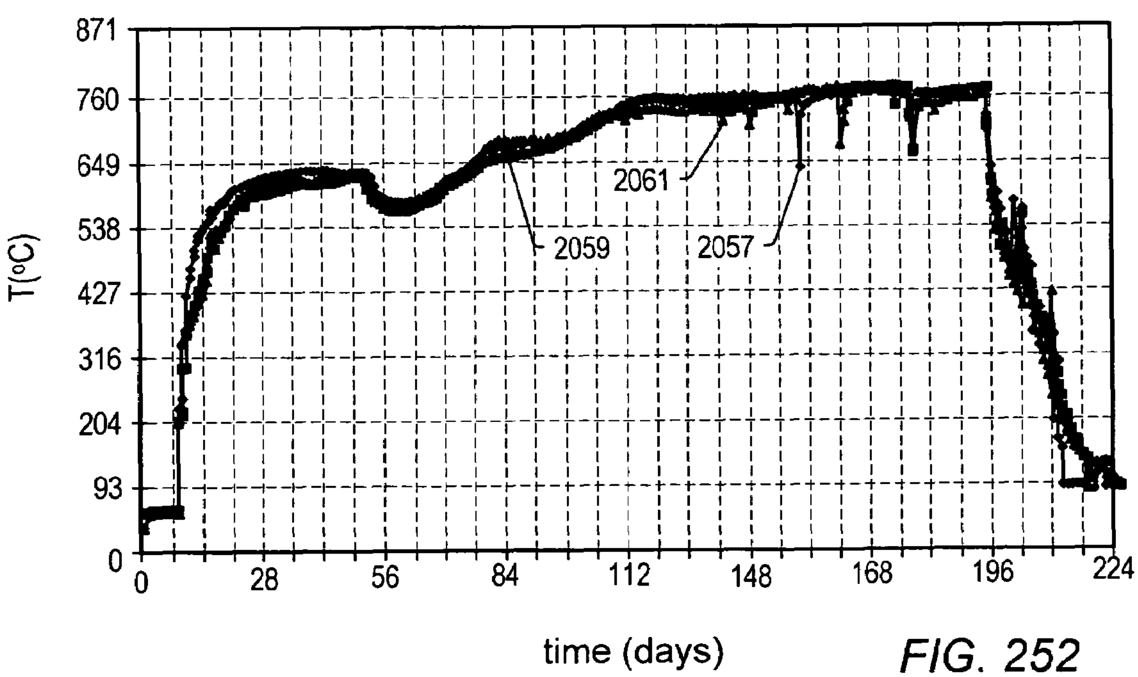

FIG. 252 depicts temperature versus time in the experimental field test.

Figure 253:
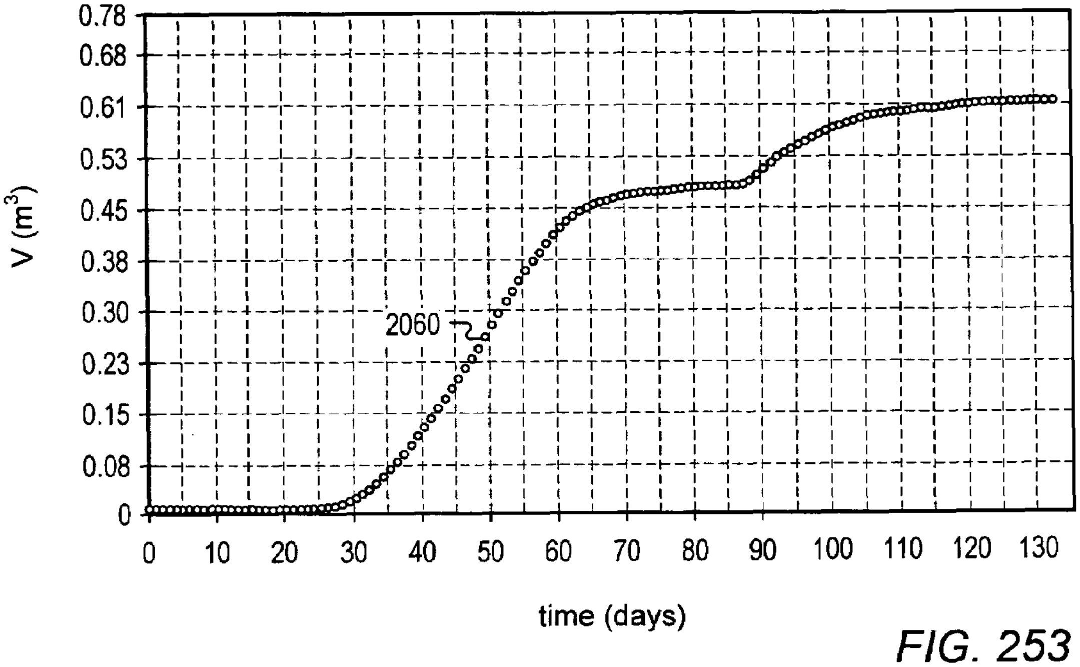

FIG. 253 depicts volume of oil produced from the experimental field test as a function of time.

Figure 254:
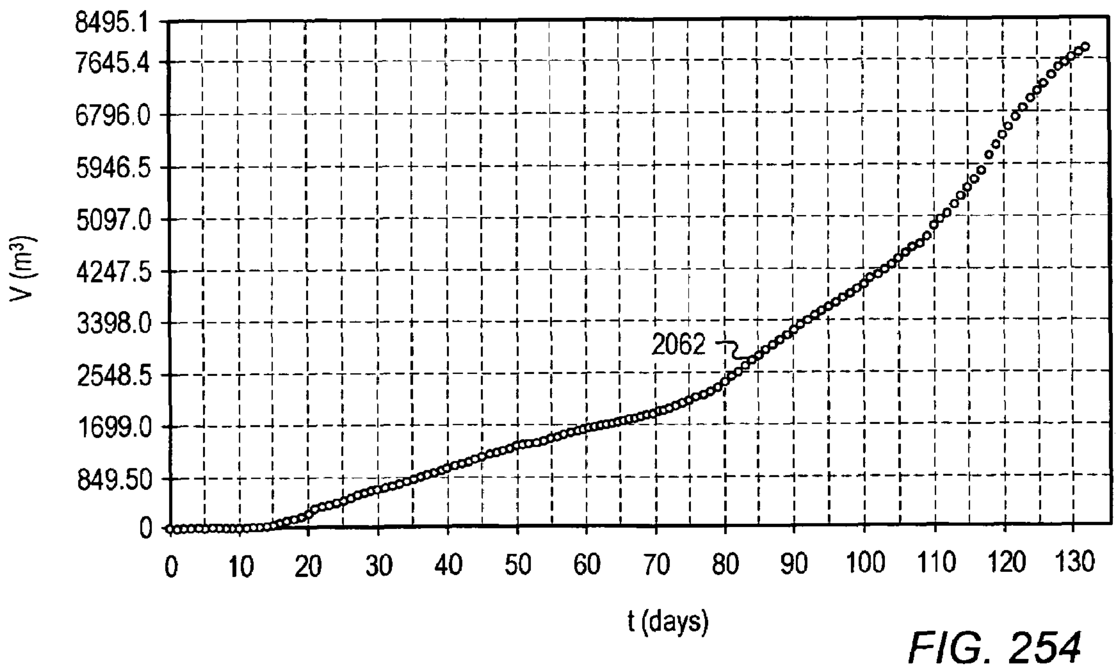

FIG. 254 depicts volume of gas produced from a coal formation in the experimental field test as a function of time.

Figure 255:
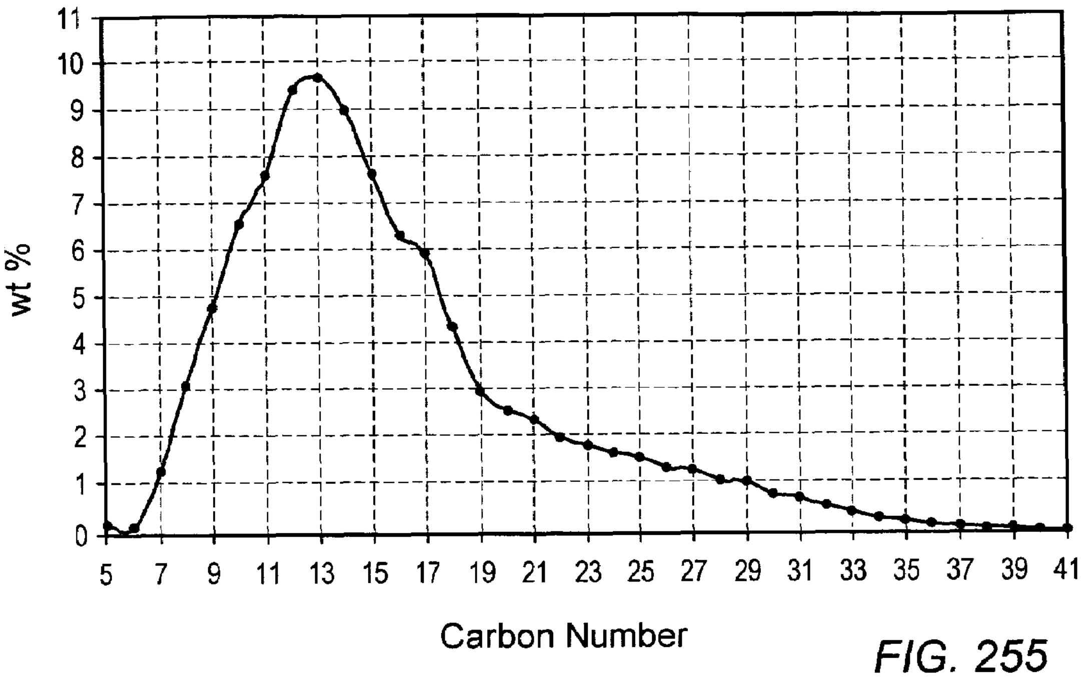

FIG. 255 depicts carbon number distribution of fluids produced from the experimental field test.

Figure 256:
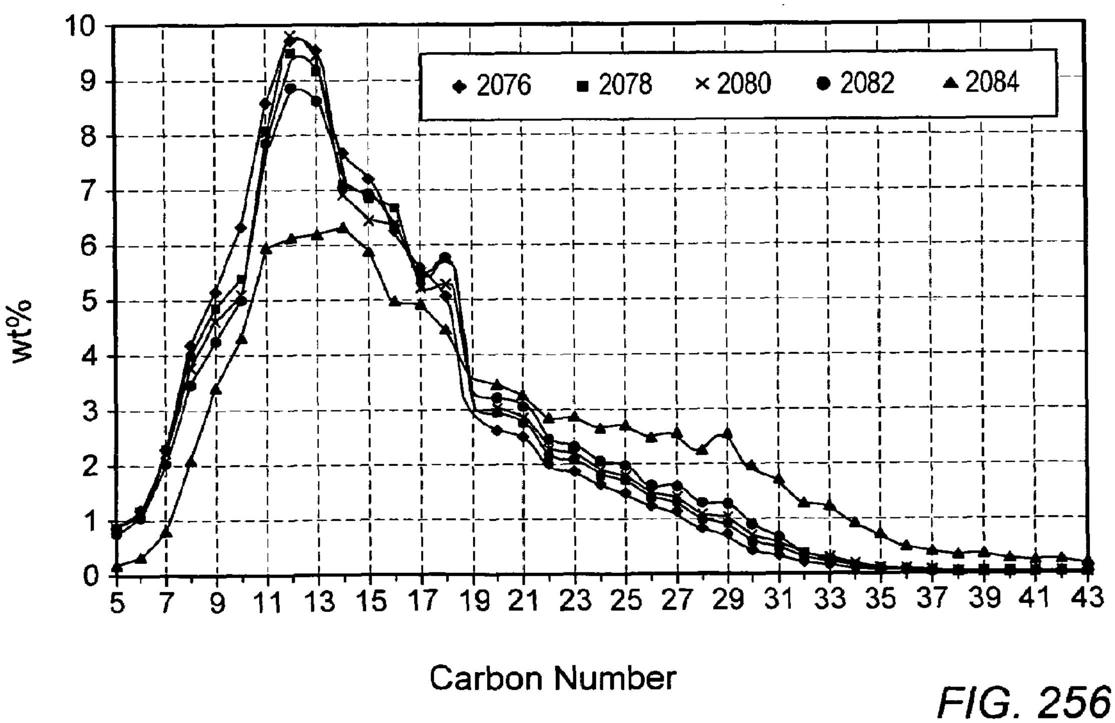

FIG. 256 depicts weight percentages of various fluids produced from a coal formation for various heating rates in laboratory experiments.

Figure 257:
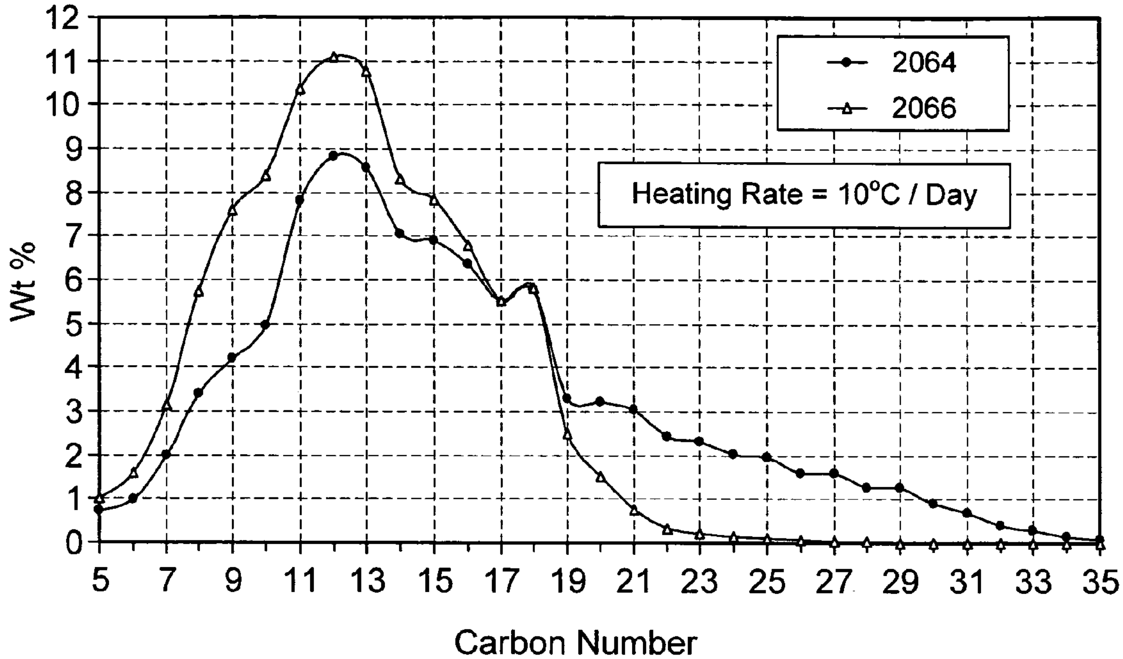

FIG. 257 depicts weight percent of a hydrocarbon produced from two laboratory experiments on coal from the field test site versus carbon number distribution.

Figure 258:
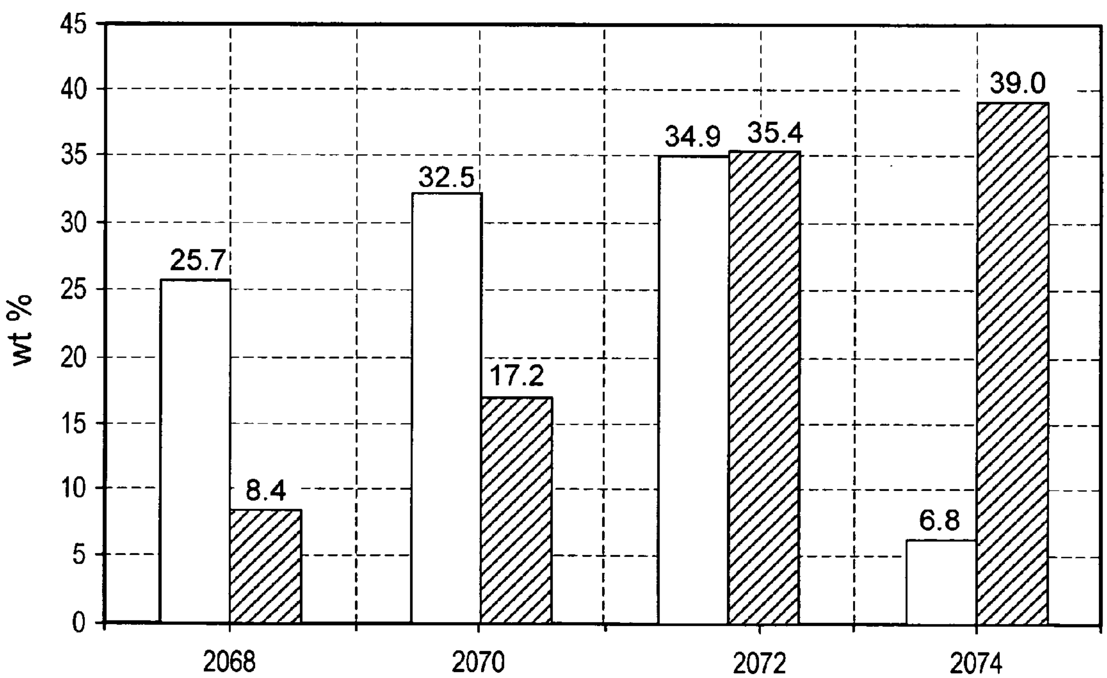

FIG. 258 depicts fractions from separation of coal oils treated by Fischer Assay and treated by slow heating in a coal cube experiment.

Figure 259:
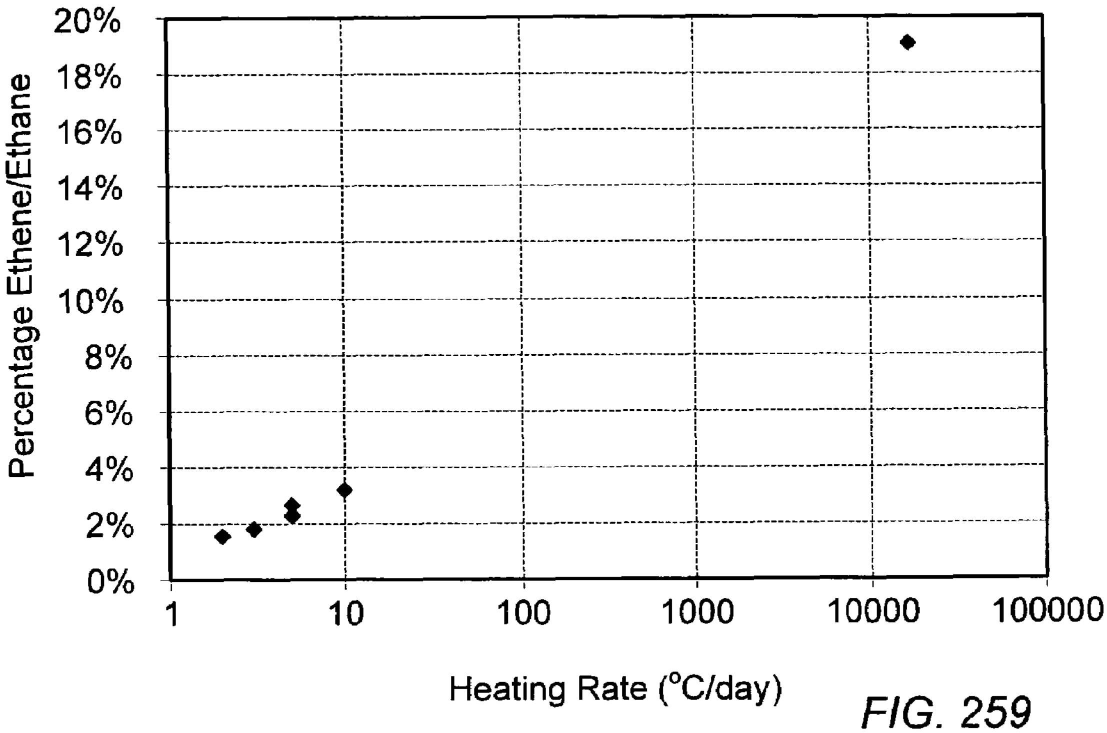

FIG. 259 depicts percentage ethene to ethane produced from a coal formation as a function of heating rate in laboratory experiments.

Figure 260:
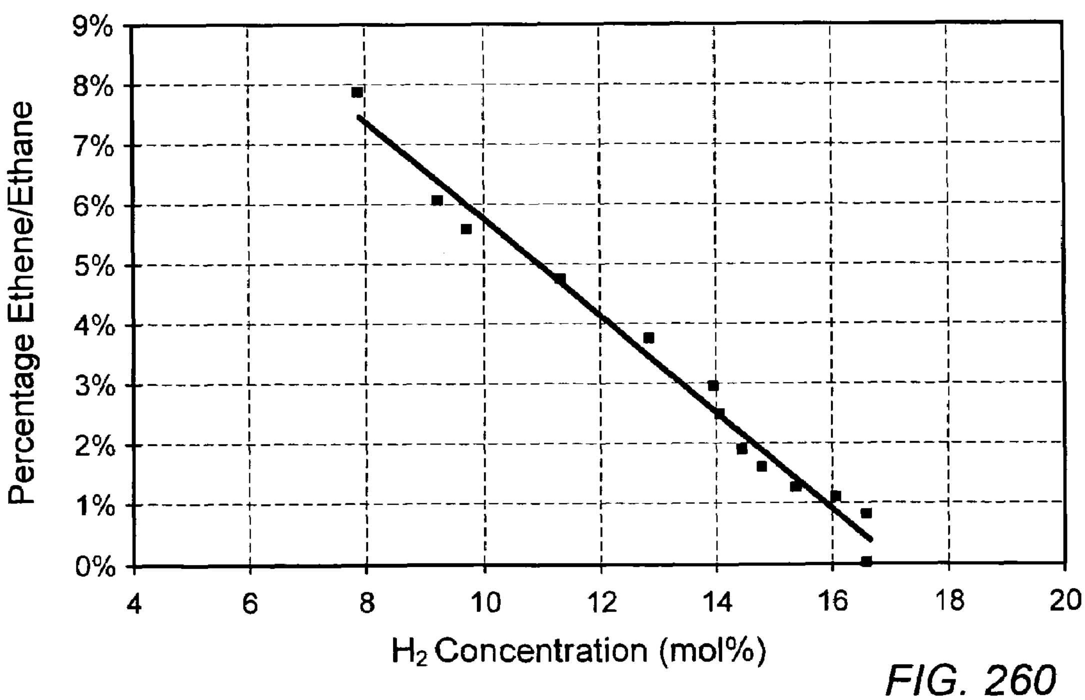

FIG. 260 depicts a plot of ethene to ethane ratio versus hydrogen concentration.

Figure 261:
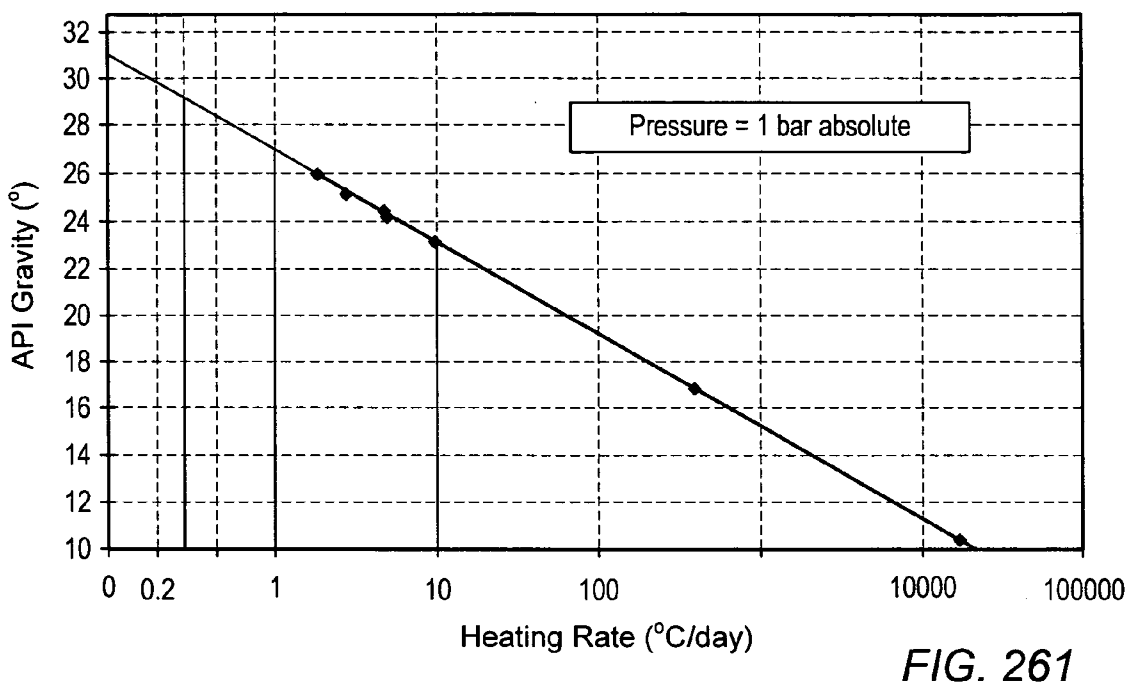

FIG. 261 depicts product quality of fluids produced from a coal formation as a function of heating rate in laboratory experiments.

Figure 262:
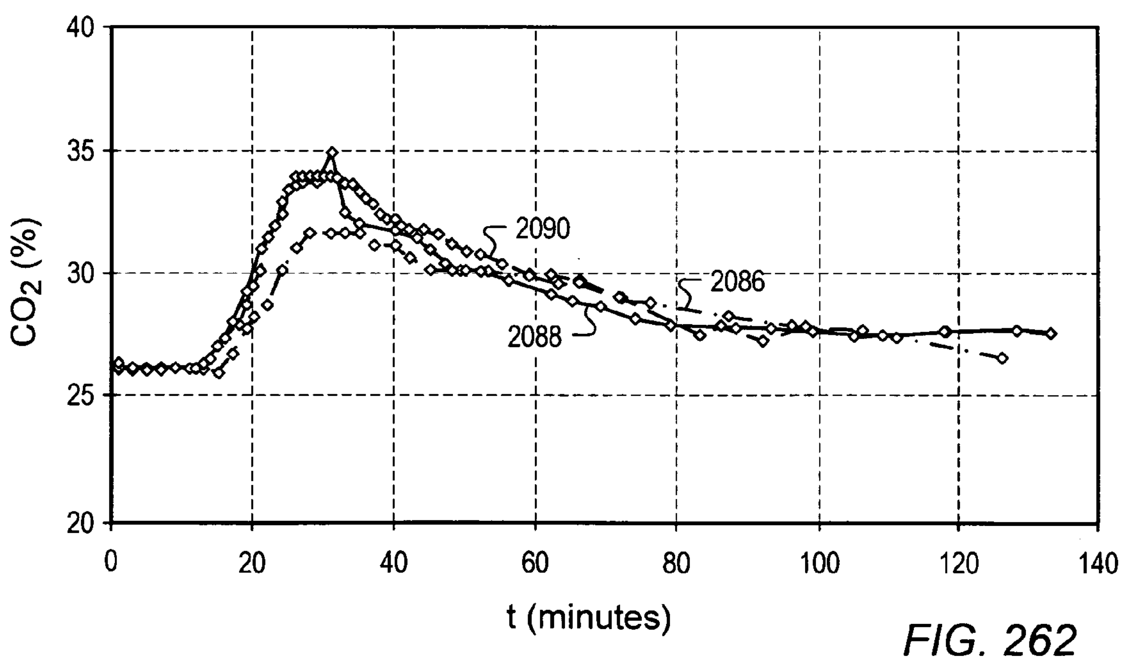

FIG. 262 depicts $CO_2$ produced at three different locations versus time in the experimental field test.

Figure 263:
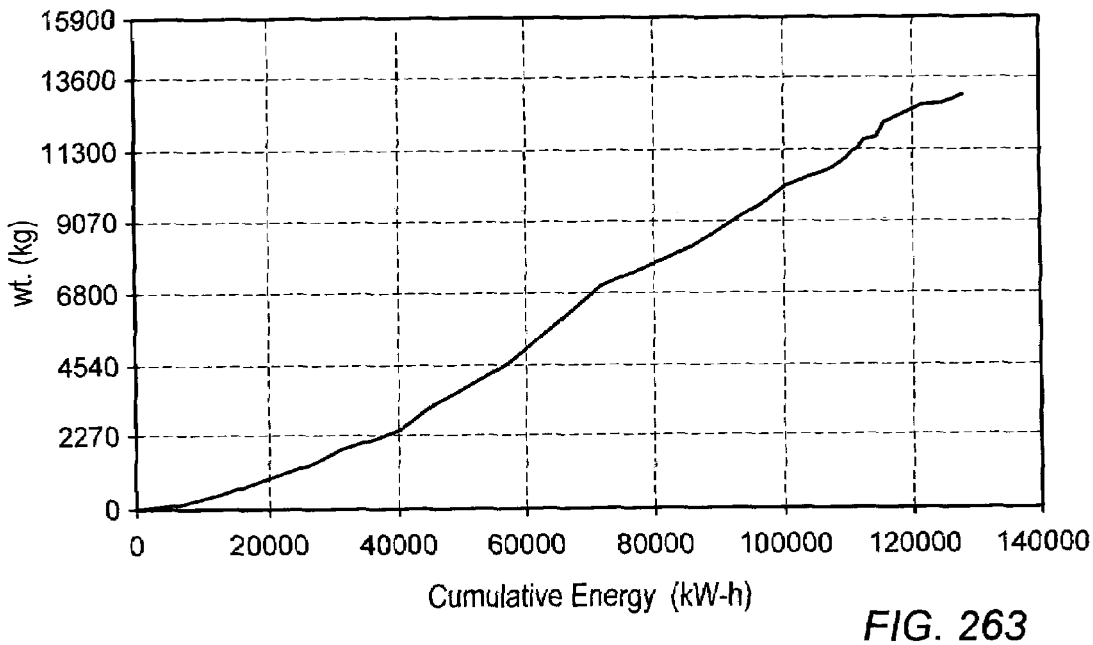

FIG. 263 depicts volatiles produced from a coal formation in the experimental field test versus cumulative energy content.

Figure 264:
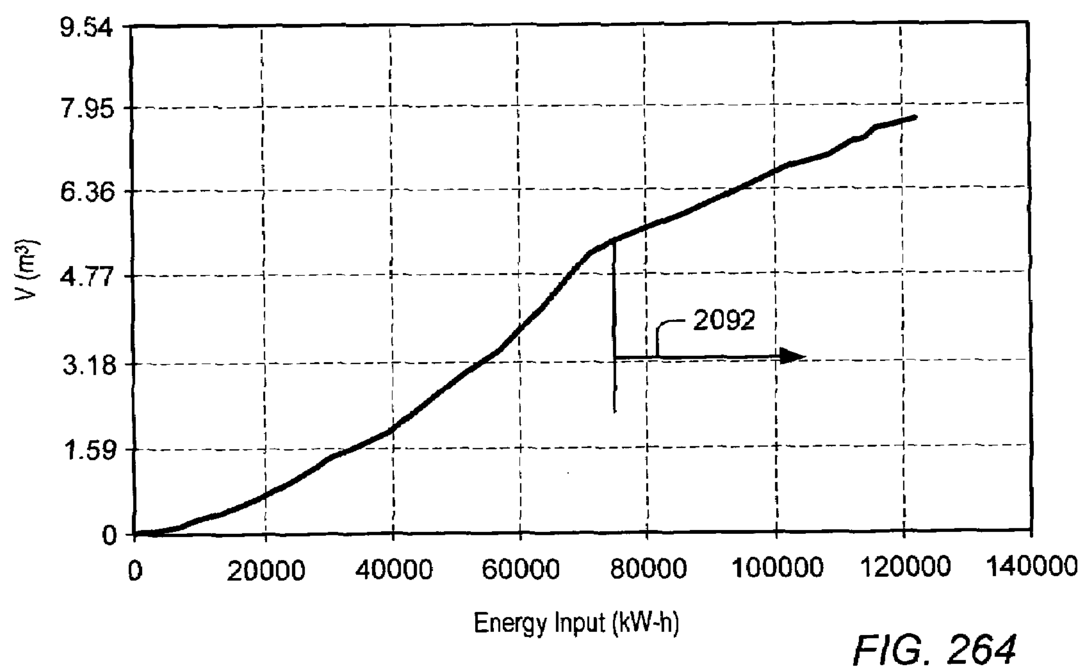

FIG. 264 depicts volume of oil produced from a coal formation in the experimental field test as a function of energy input.

Figure 265:
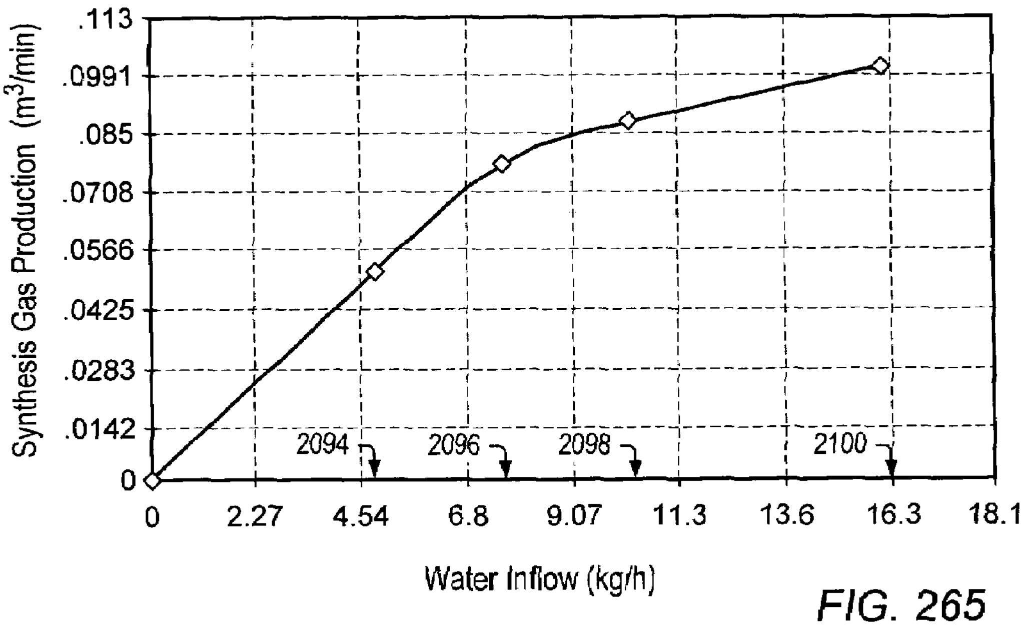

FIG. 265 depicts synthesis gas production from the coal formation in the experimental field test versus the total water inflow.

Figure 266:
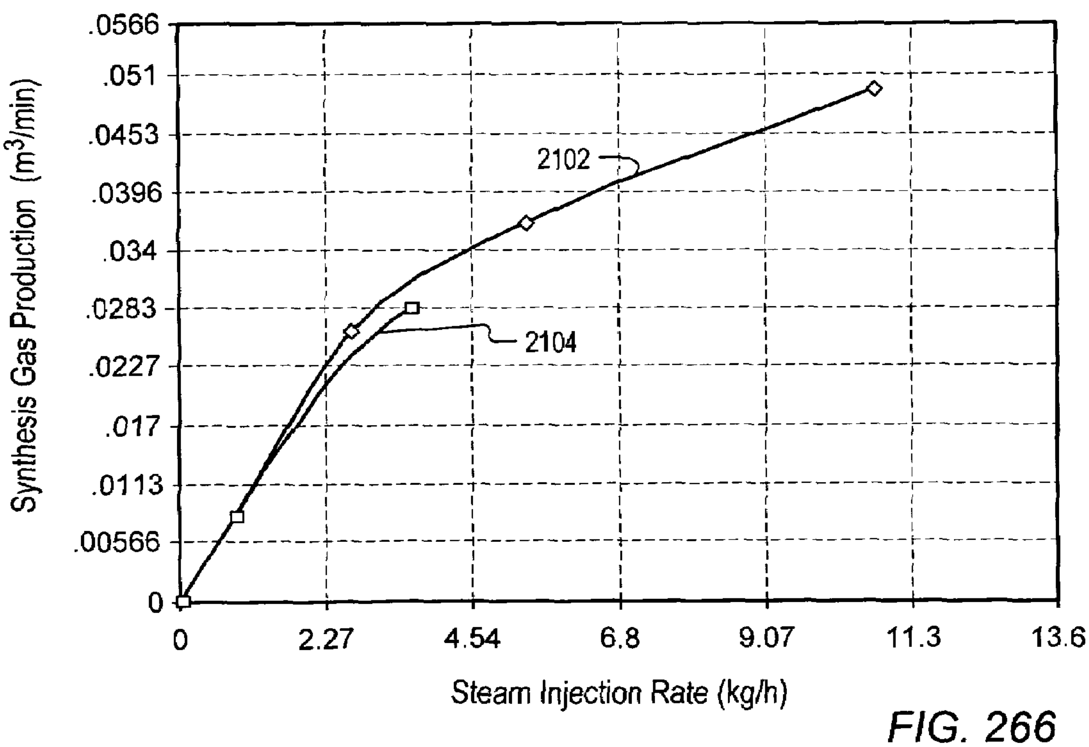

FIG. 266 depicts additional synthesis gas production from the coal formation in the experimental field test due to injected steam.

Figure 267:
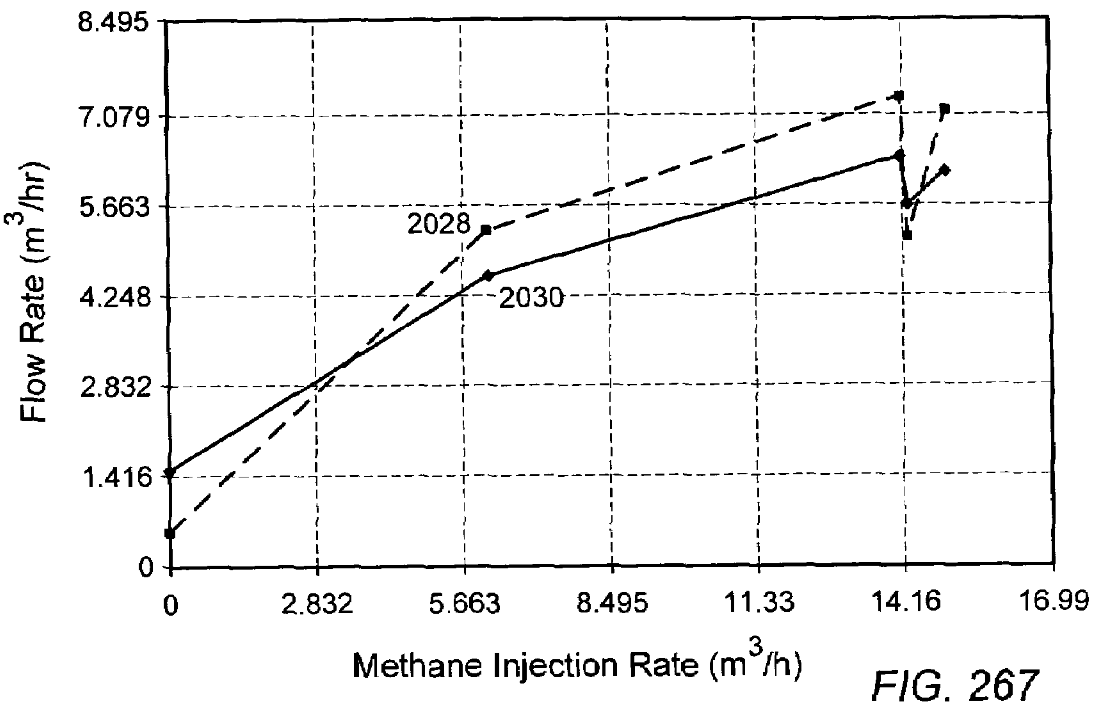

FIG. 267 depicts the effect of methane injection into a heated formation.

Figure 268:
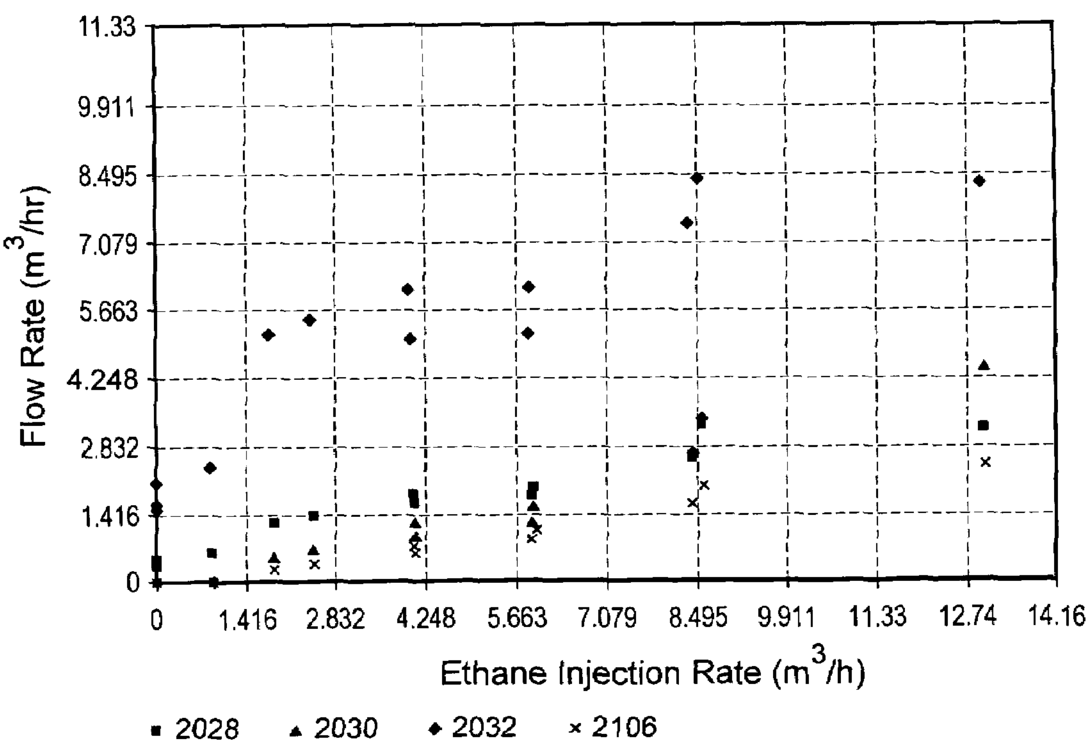

FIG. 268 depicts the effect of ethane injection into a heated formation.

Figure 269:
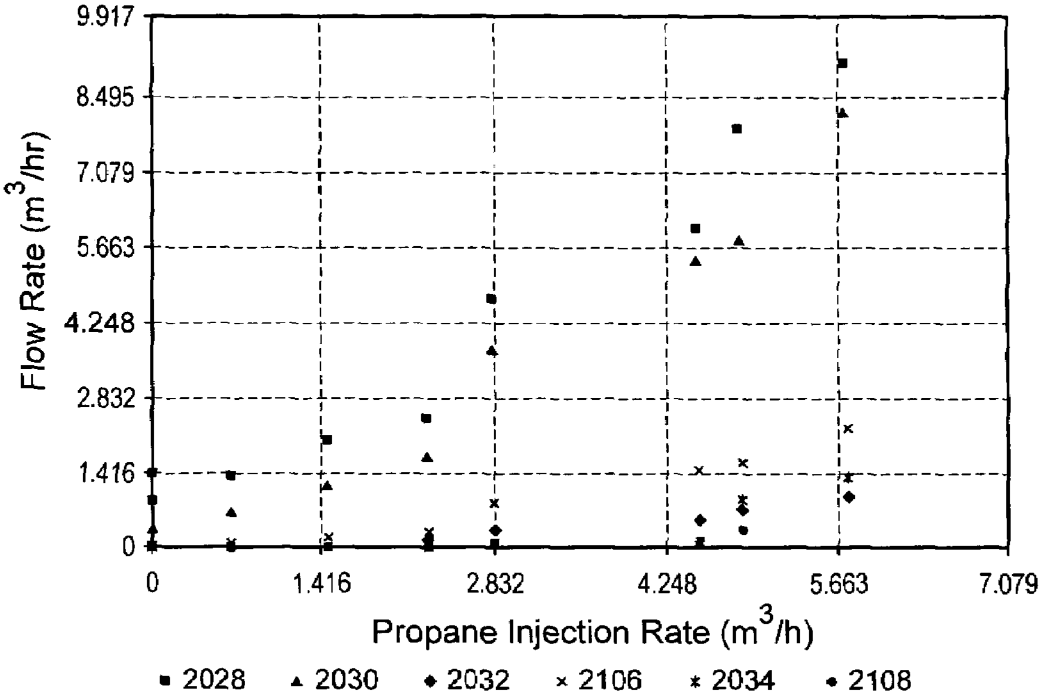

FIG. 269 depicts the effect of propane injection into a heated formation.

Figure 270:
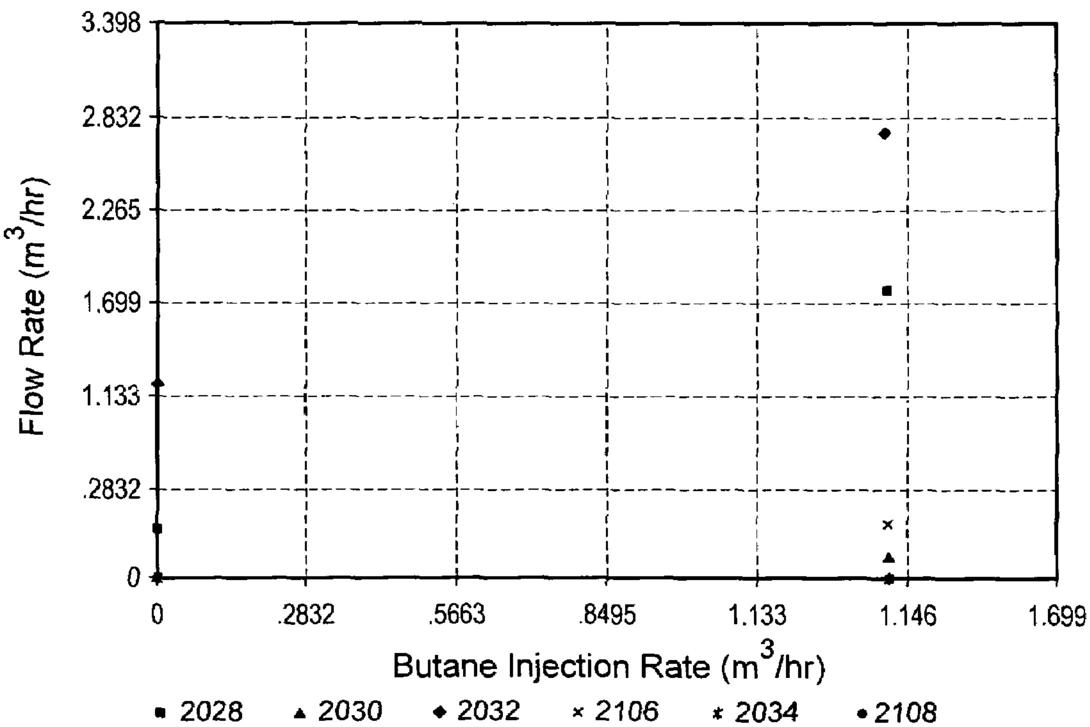

FIG. 270 depicts the effect of butane injection into a heated formation.

Figure 271:
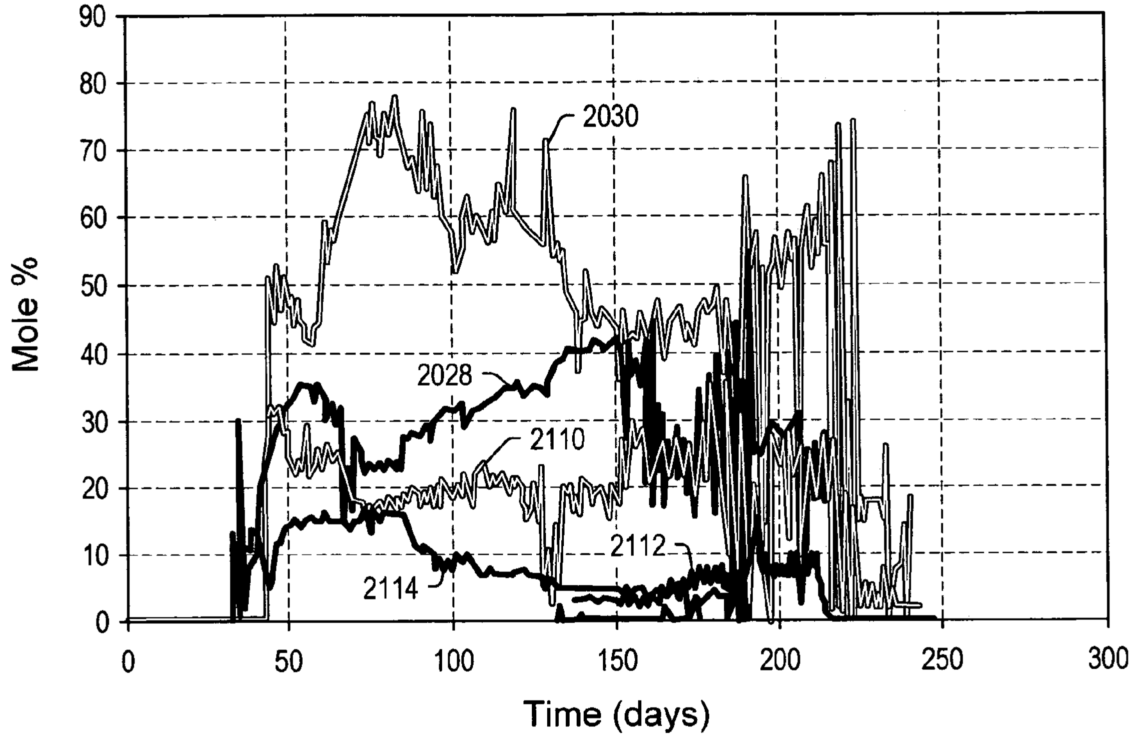

FIG. 271 depicts composition of gas produced from a formation versus time.

Figure 272:
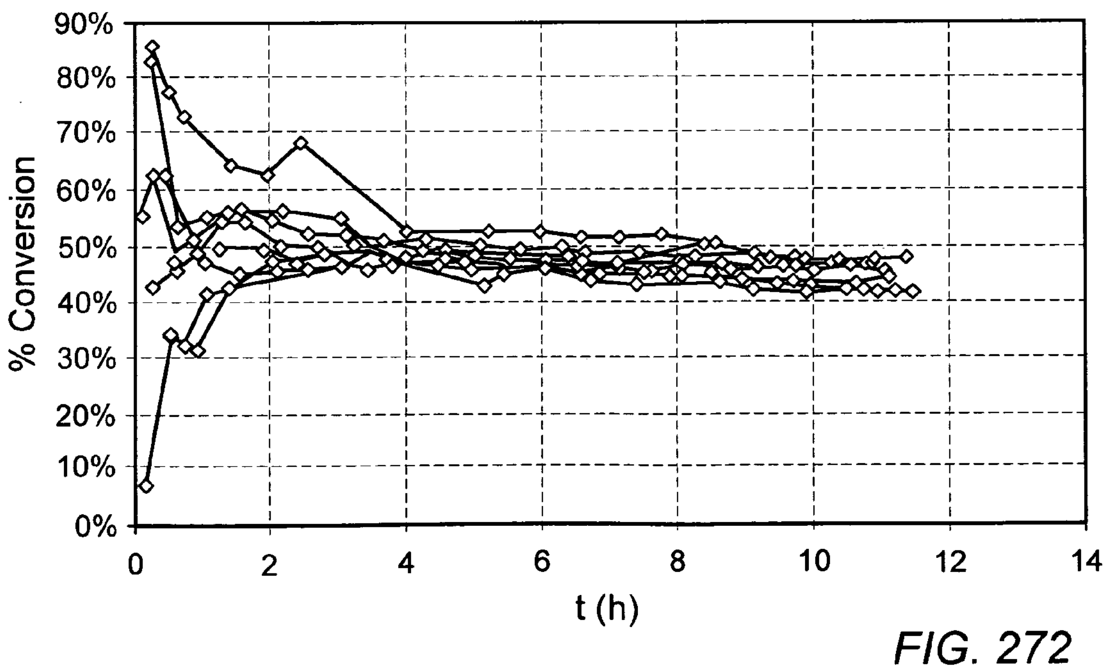

FIG. 272 depicts synthesis gas conversion versus time.

Figure 273:
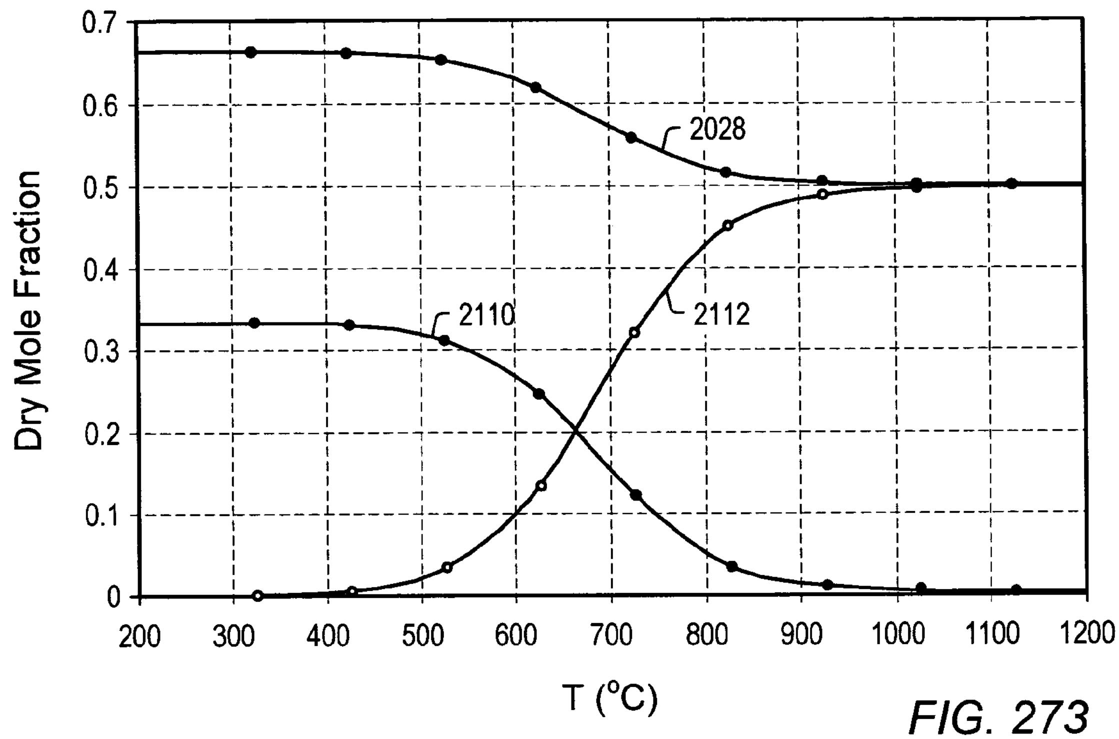

FIG. 273 depicts calculated equilibrium gas dry mole fractions for a reaction of coal with water.

Figure 274:
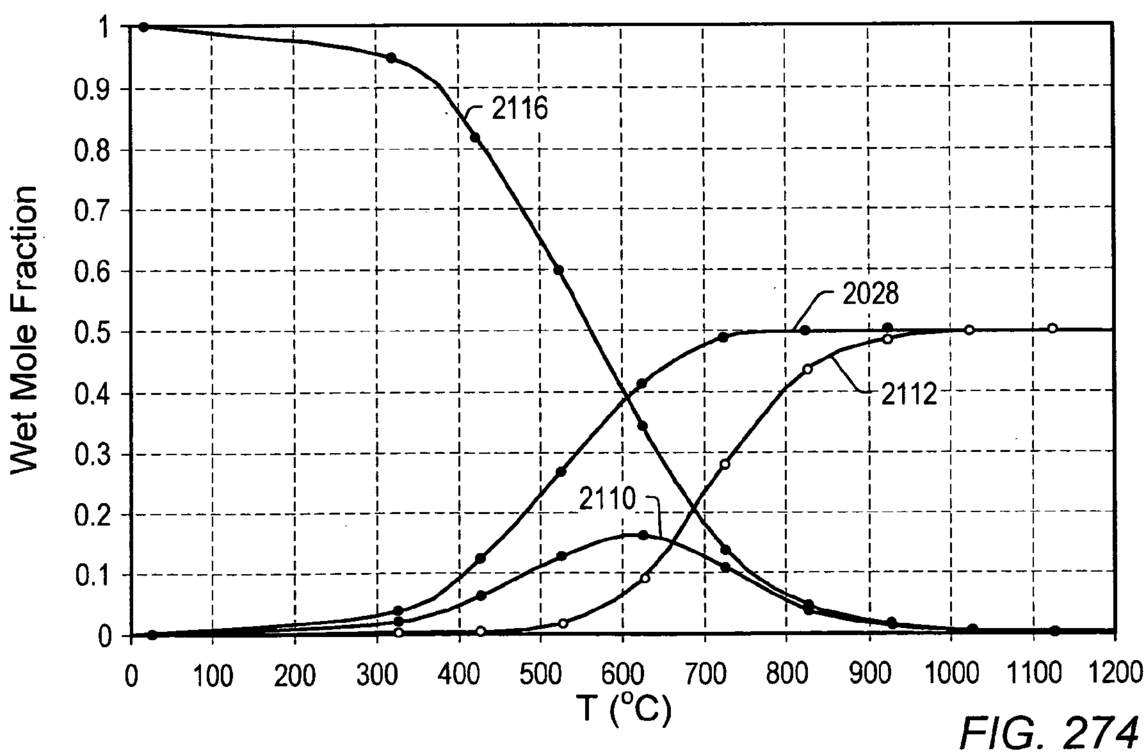

FIG. 274 depicts calculated equilibrium gas wet mole fractions for a reaction of coal with water.

Figure 275:
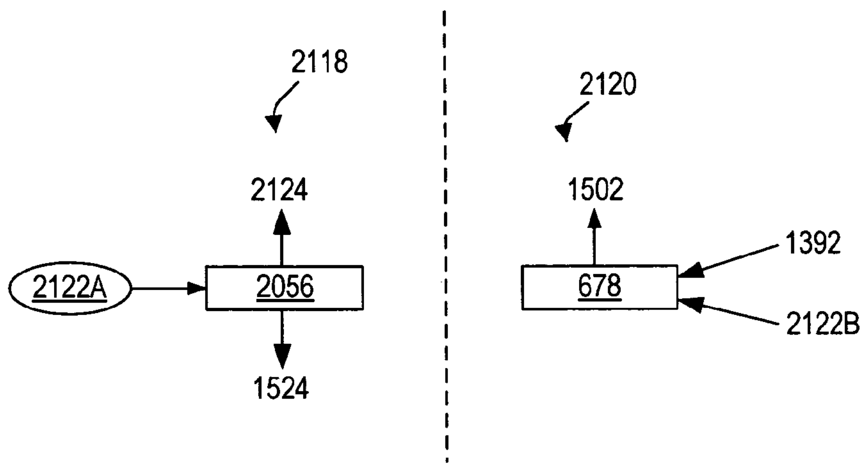

FIG. 275 depicts an embodiment of pyrolysis and synthesis gas production stages in a coal formation.

Figure 276:
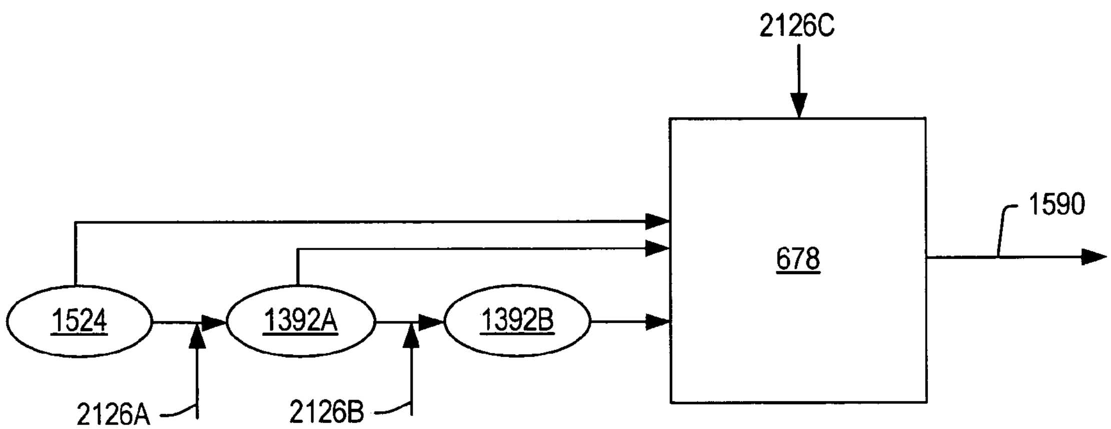

FIG. 276 depicts an embodiment of low temperature in situ synthesis gas production.

Figure 277:
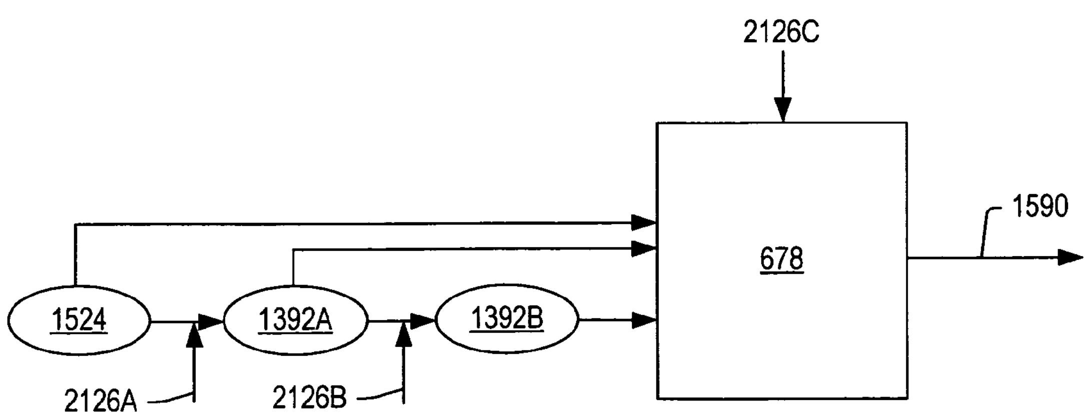

FIG. 277 depicts an embodiment of high temperature in situ synthesis gas production.

Figure 278:
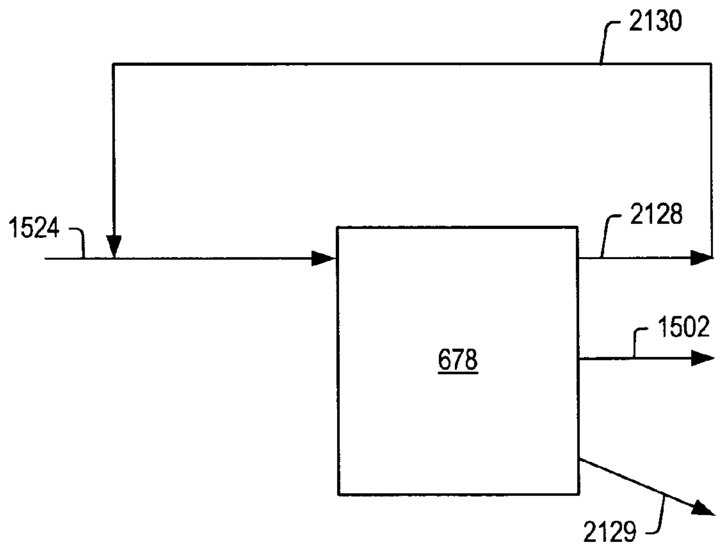

FIG. 278 depicts an embodiment of in situ synthesis gas production in a hydrocarbon containing formation.

Figure 279:
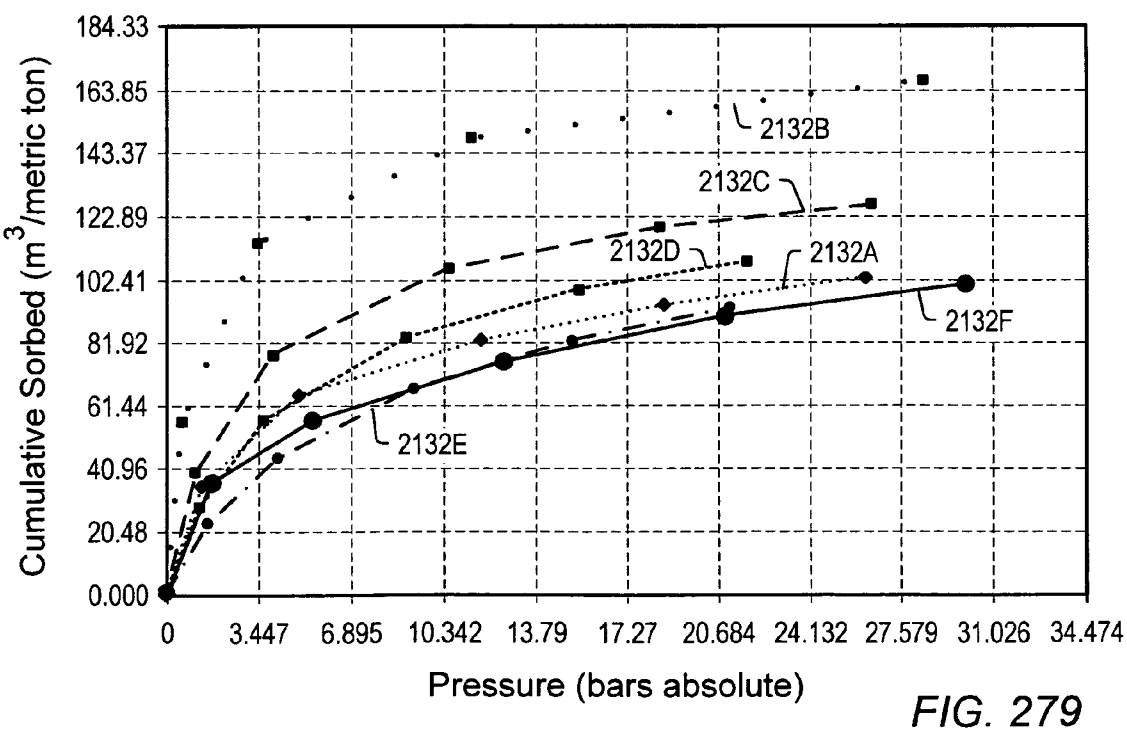

FIG. 279 depicts a plot of cumulative sorbed methane and carbon dioxide versus pressure in a coal formation.

Figure 280:
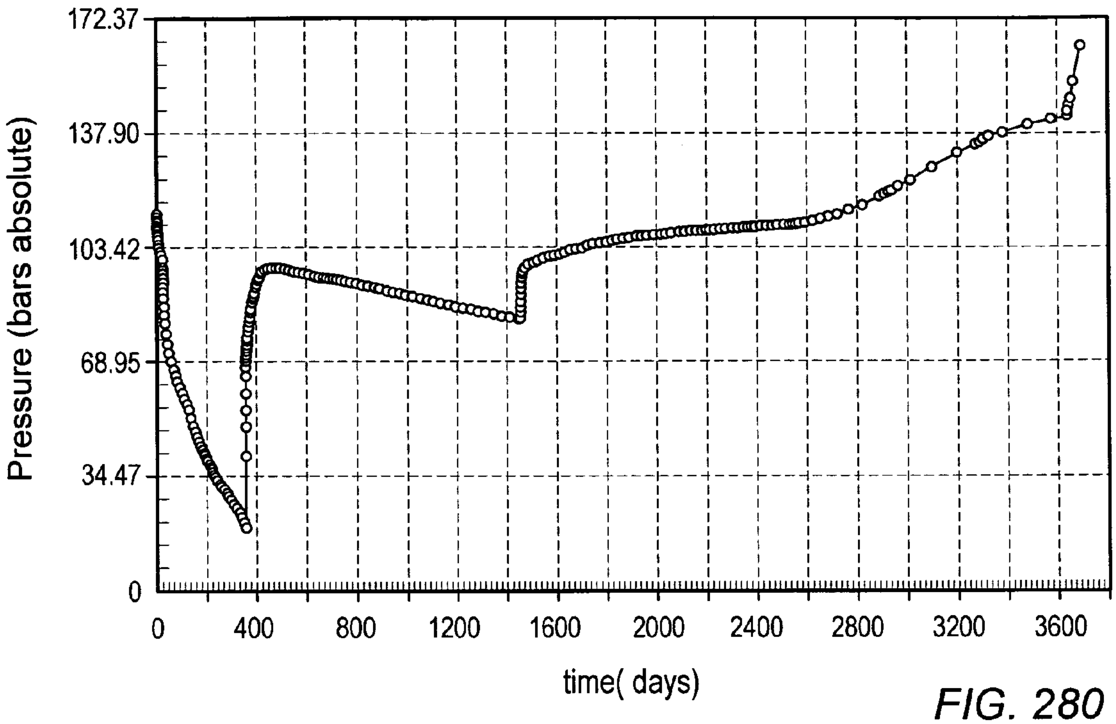

FIG. 280 depicts pressure at a wellhead as a function of time from a numerical simulation.

Figure 281:
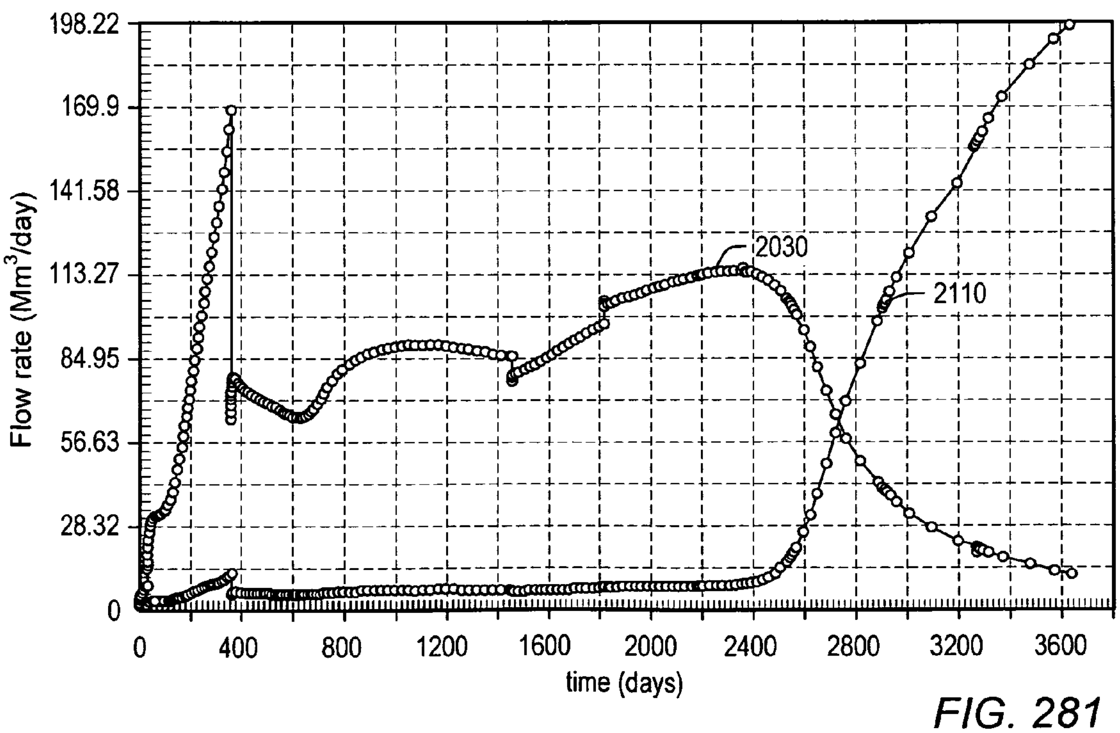

FIG. 281 depicts production rate of carbon dioxide and methane as a function of time from a numerical simulation.

Figure 282:
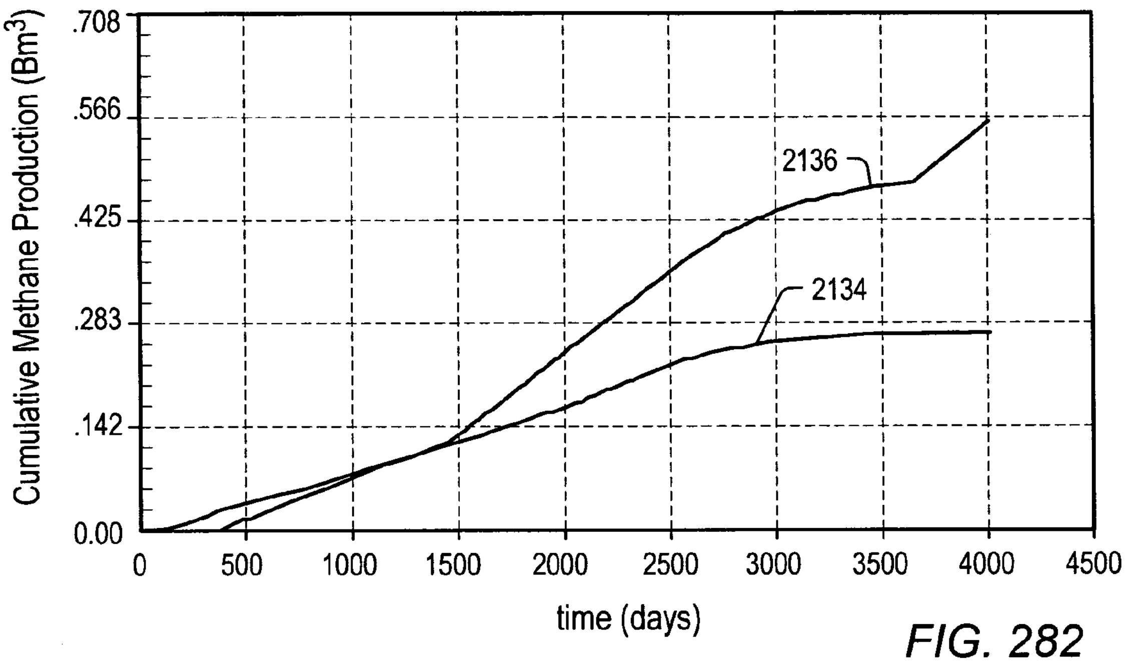

FIG. 282 depicts cumulative methane produced and net carbon dioxide injected as a function of time from a numerical simulation.

Figure 283:
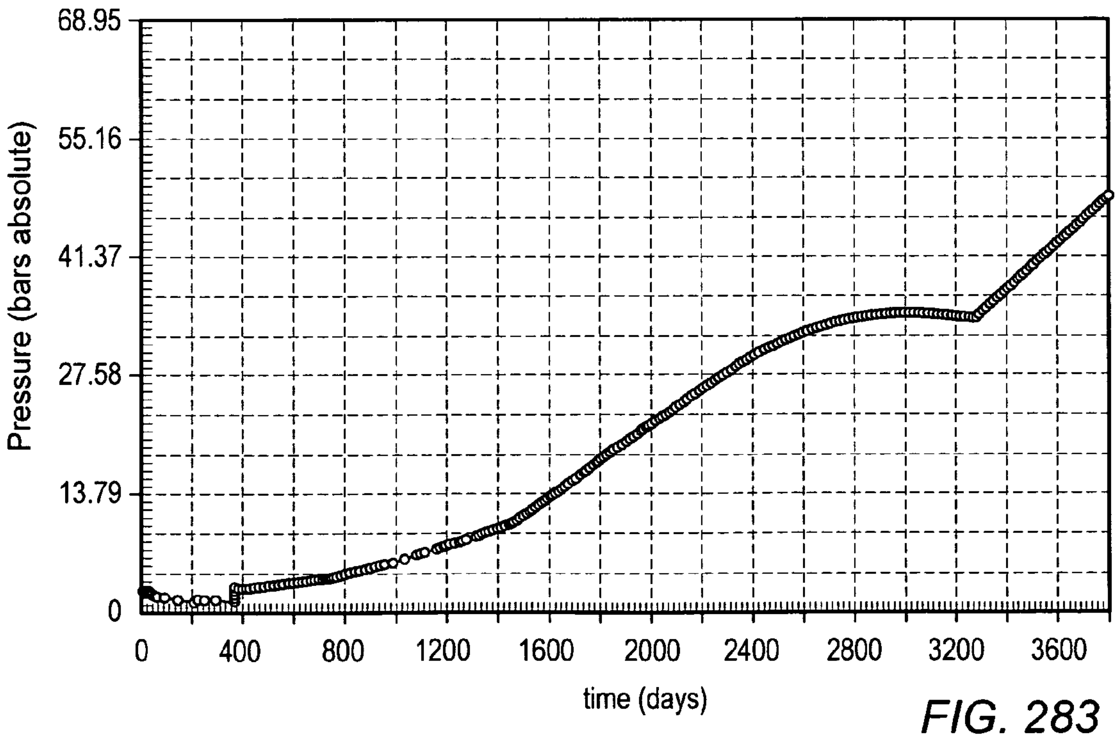

FIG. 283 depicts pressure at wellheads as a function of time from a numerical simulation.

Figure 284:
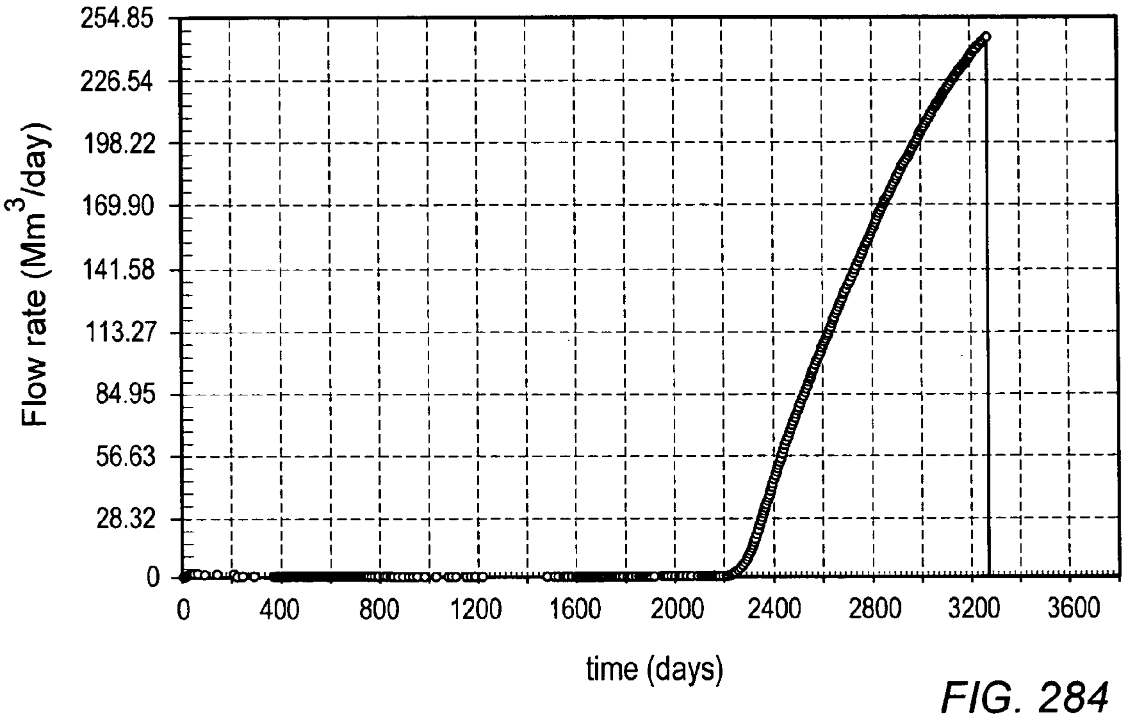

FIG. 284 depicts production rate of carbon dioxide as a function of time from a numerical simulation.

Figure 285:
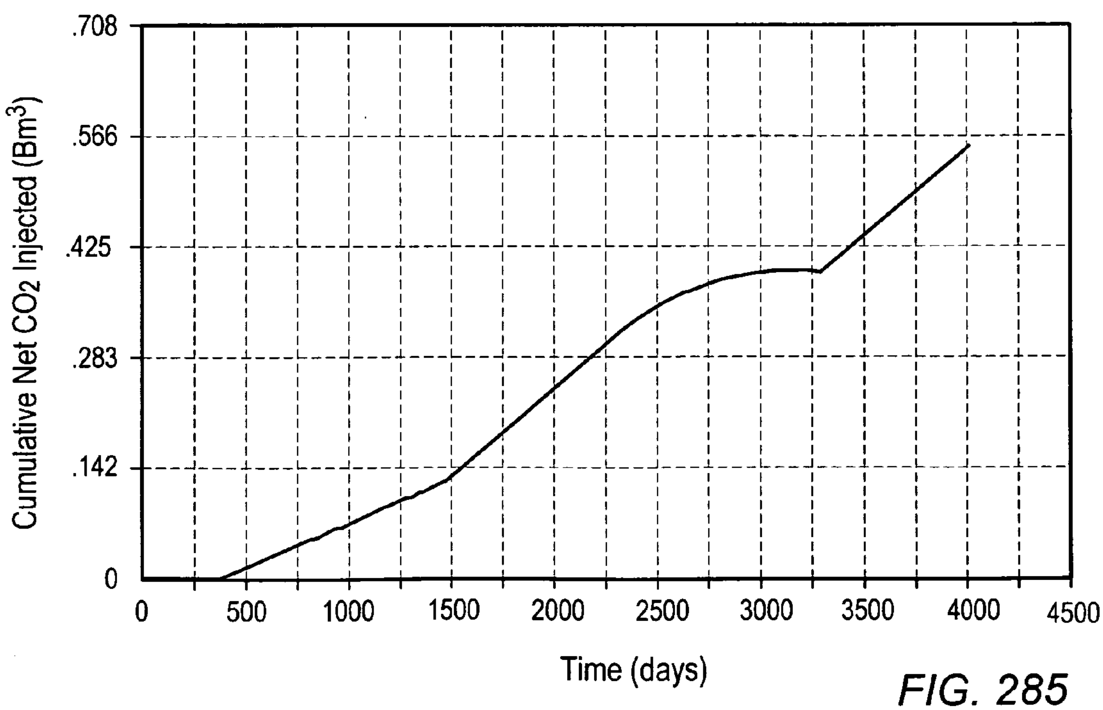

FIG. 285 depicts cumulative net carbon dioxide injected as a function of time from a numerical simulation.

Figure 286:
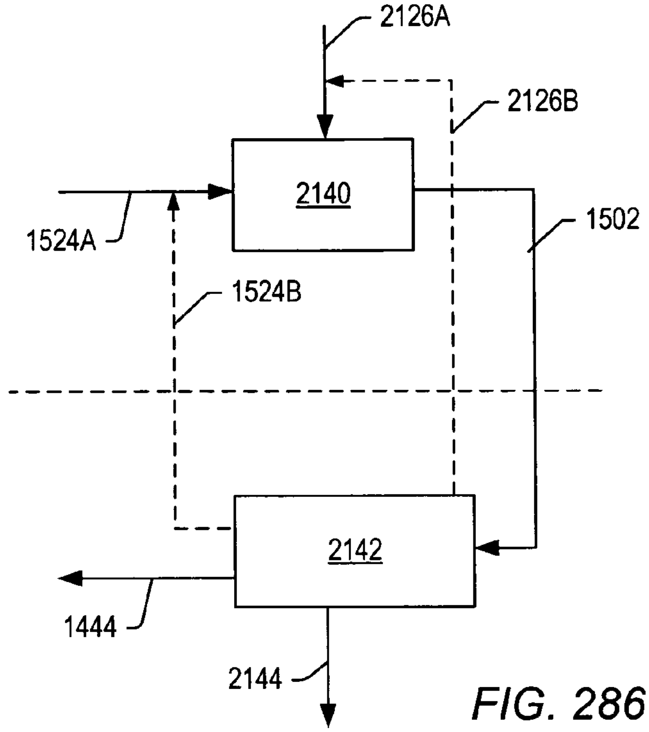

FIG. 286 depicts an embodiment of in situ synthesis gas production integrated with a Fischer-Tropsch process.

Figure 287:
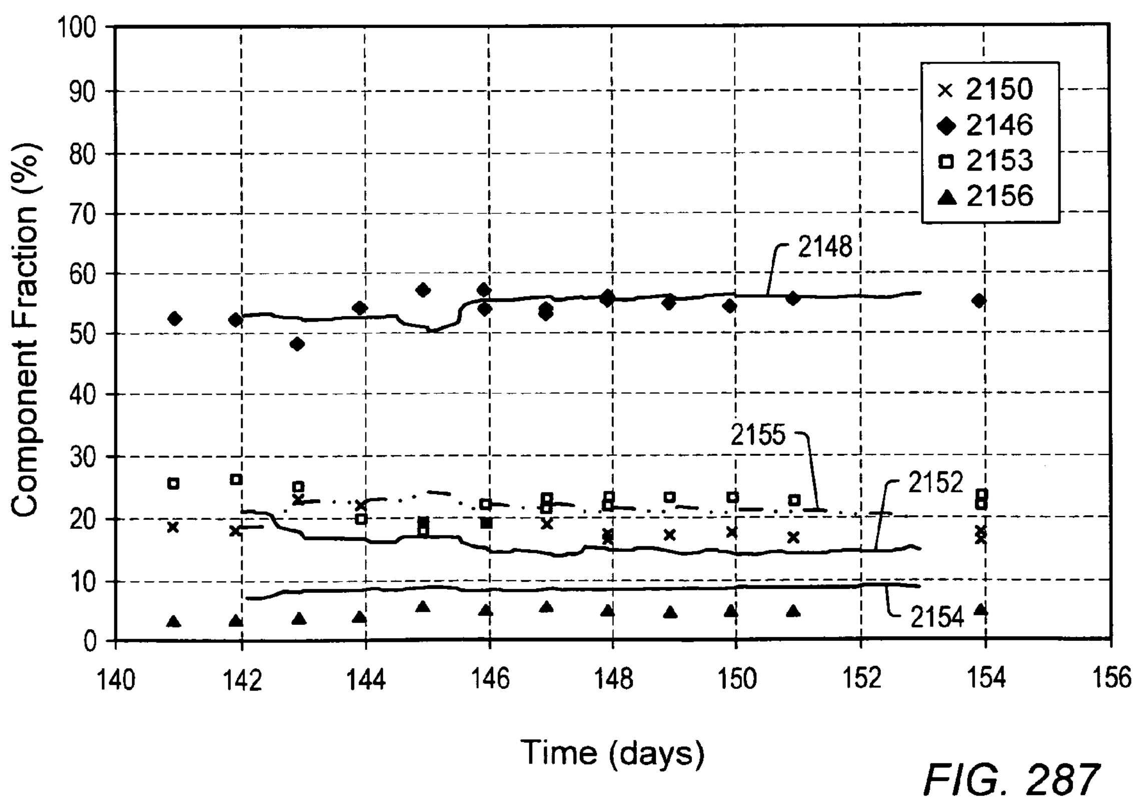

FIG. 287 depicts a comparison between numerical simulation data and experimental field test data of synthesis gas composition produced as a function of time.

Figure 288:
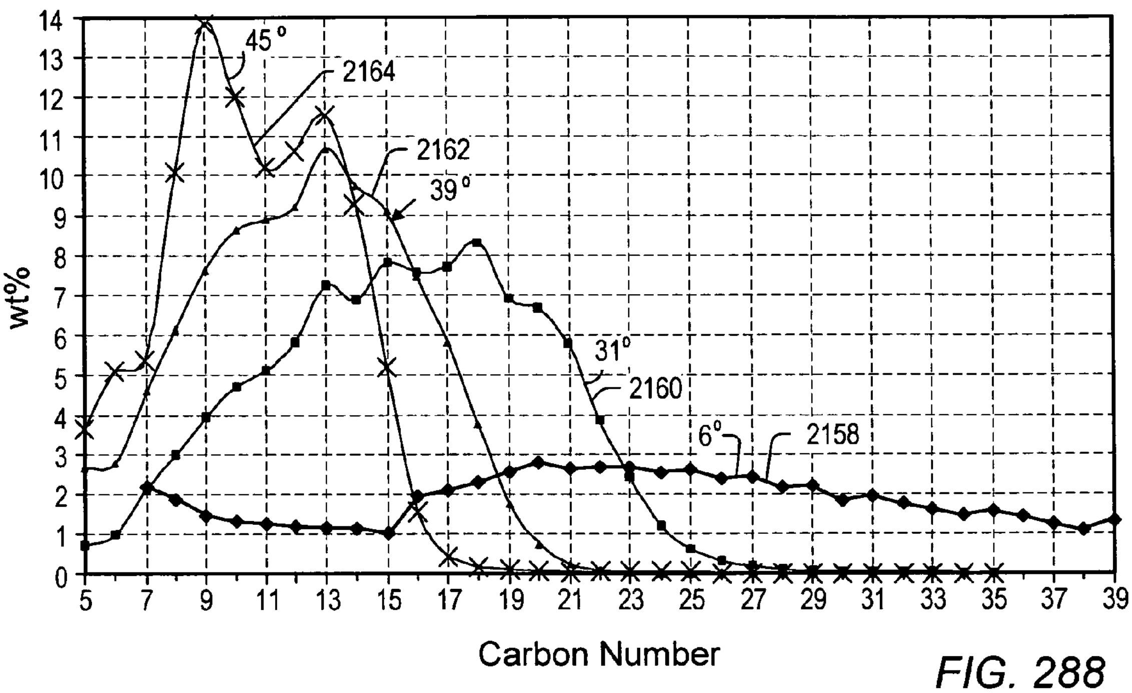

FIG. 288 depicts weight percentages of carbon compounds versus carbon number produced from a heavy hydrocarbon containing formation.

Figure 289:
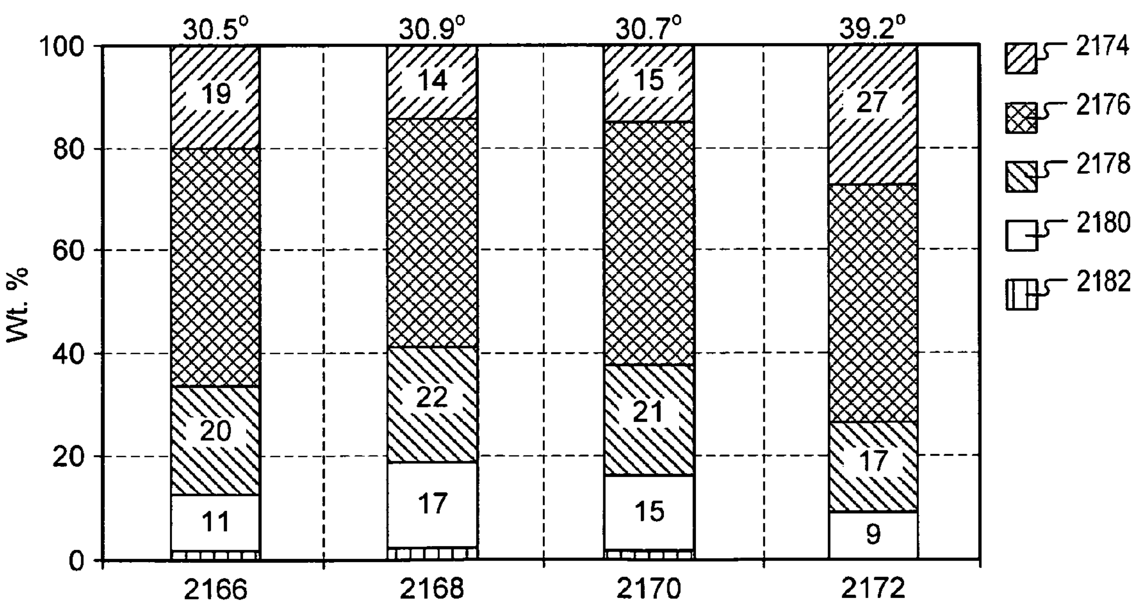

FIG. 289 depicts weight percentages of carbon compounds produced from a heavy hydrocarbon containing formation for various pyrolysis heating rates and pressures.

Figure 290:
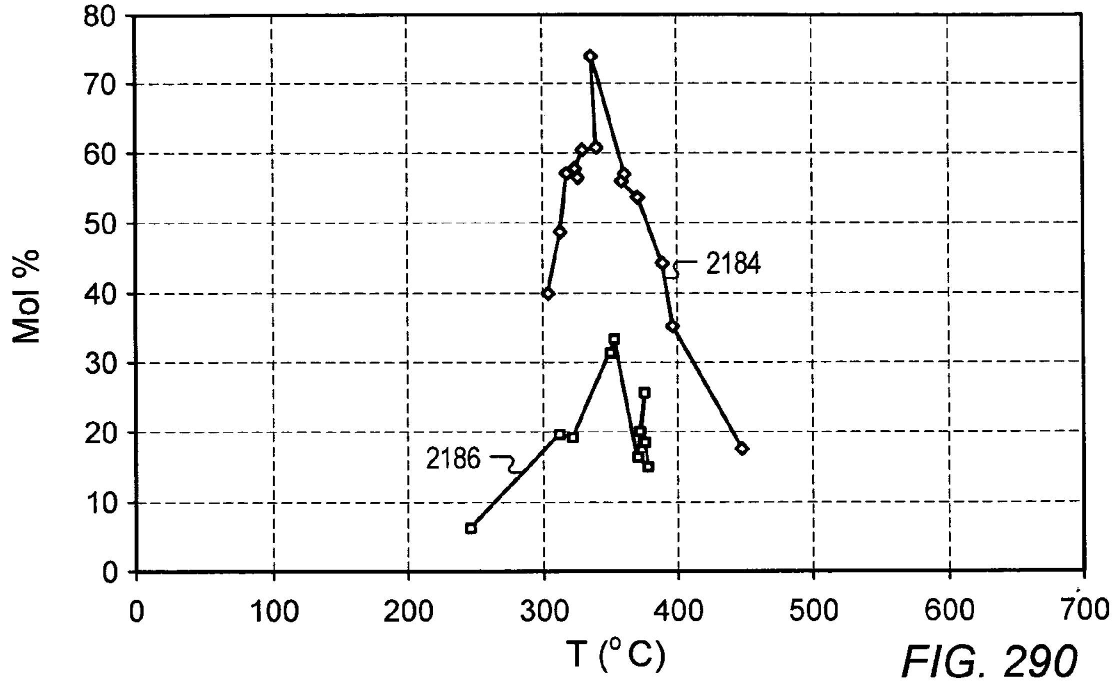

FIG. 290 depicts $H_2$ mole percent in gases produced from heavy hydrocarbon drum experiments.

Figure 291:
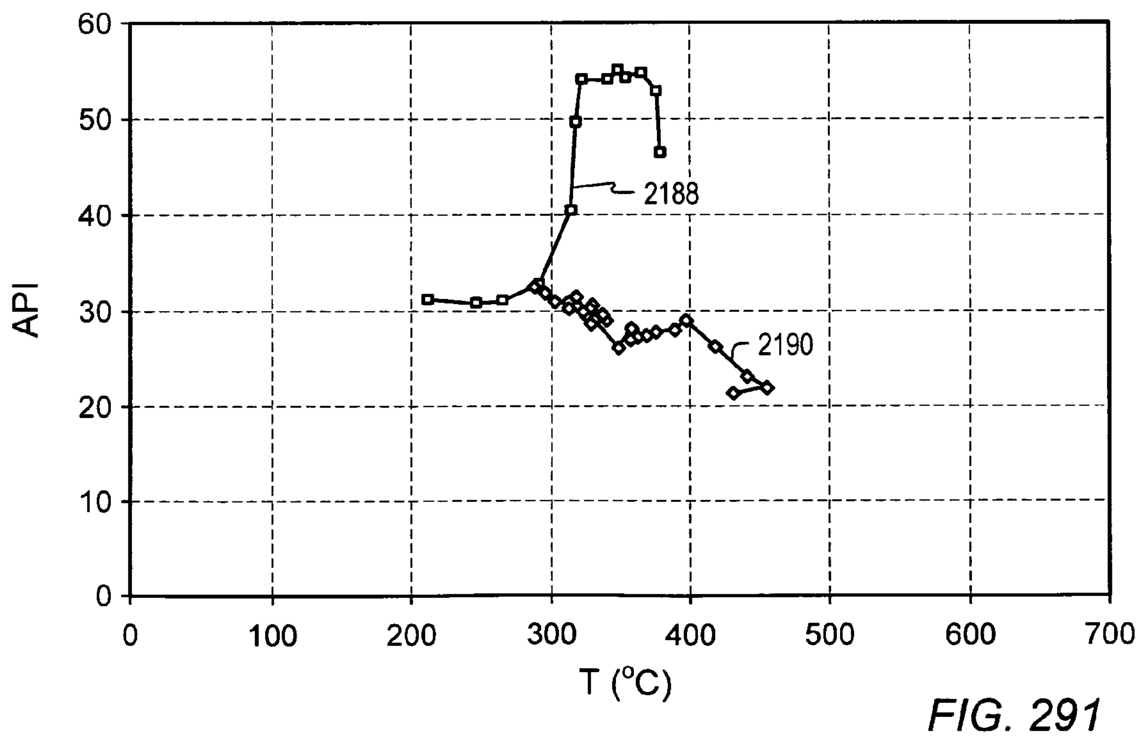

FIG. 291 depicts API gravity of liquids produced from heavy hydrocarbon drum experiments.

Figure 292:
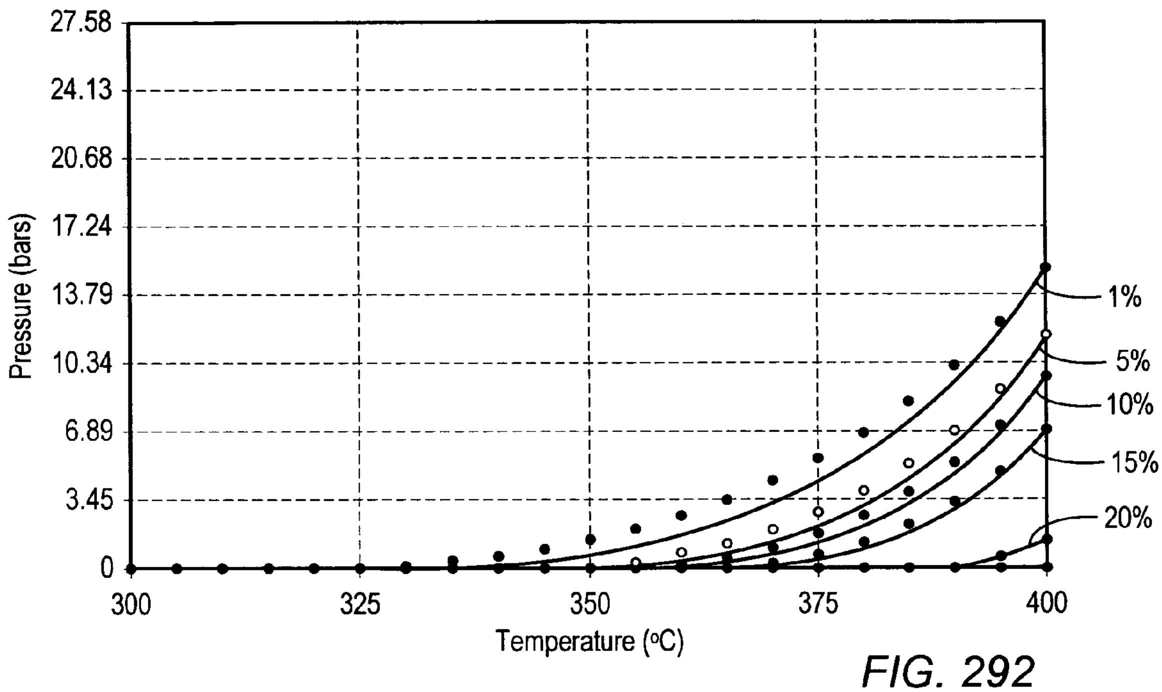

FIG. 292 depicts percentage of hydrocarbon fluid having carbon numbers greater than 25 as a function of pressure and temperature for oil produced from a retort experiment.

Figure 293:
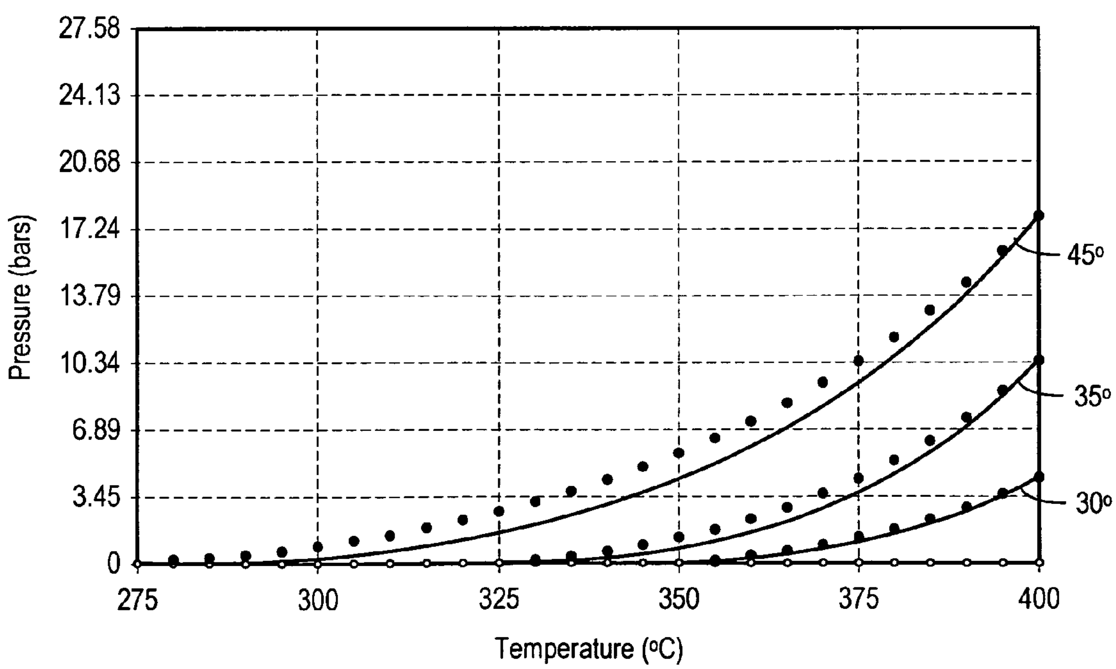

FIG. 293 illustrates oil quality produced from a tar sands formation as a function of pressure and temperature in a retort experiment.

Figure 294:
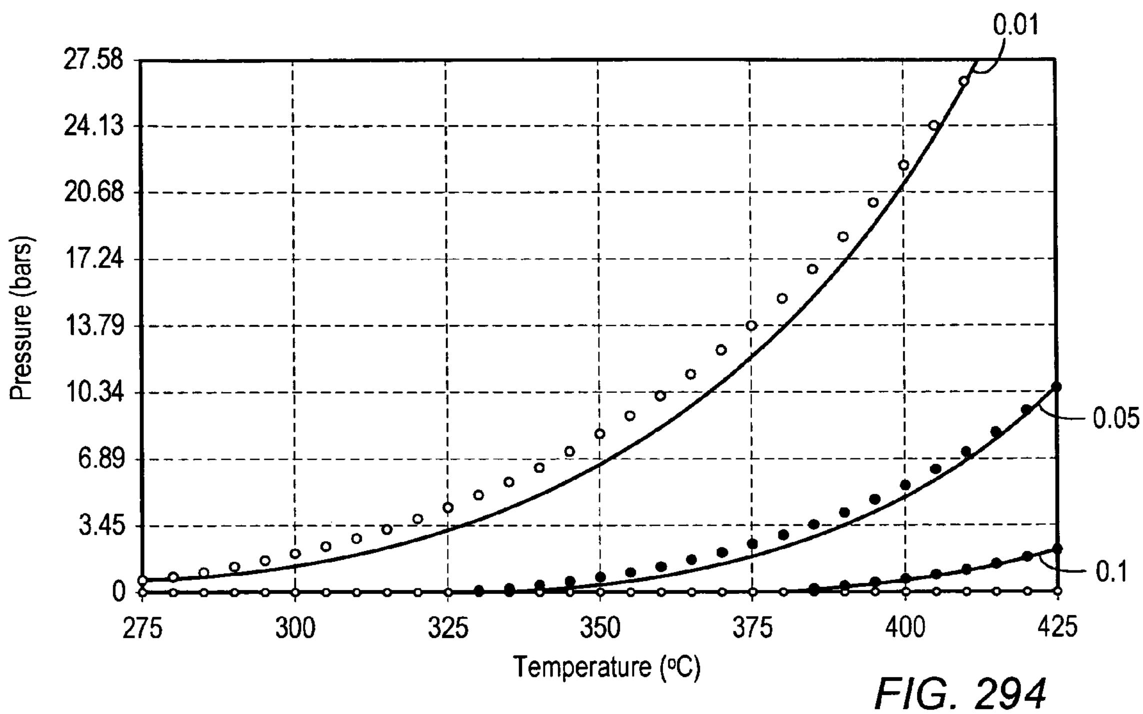

FIG. 294 illustrates an ethene to ethane ratio produced from a tar sands formation as a function of pressure and temperature in a retort experiment.

Figure 295:
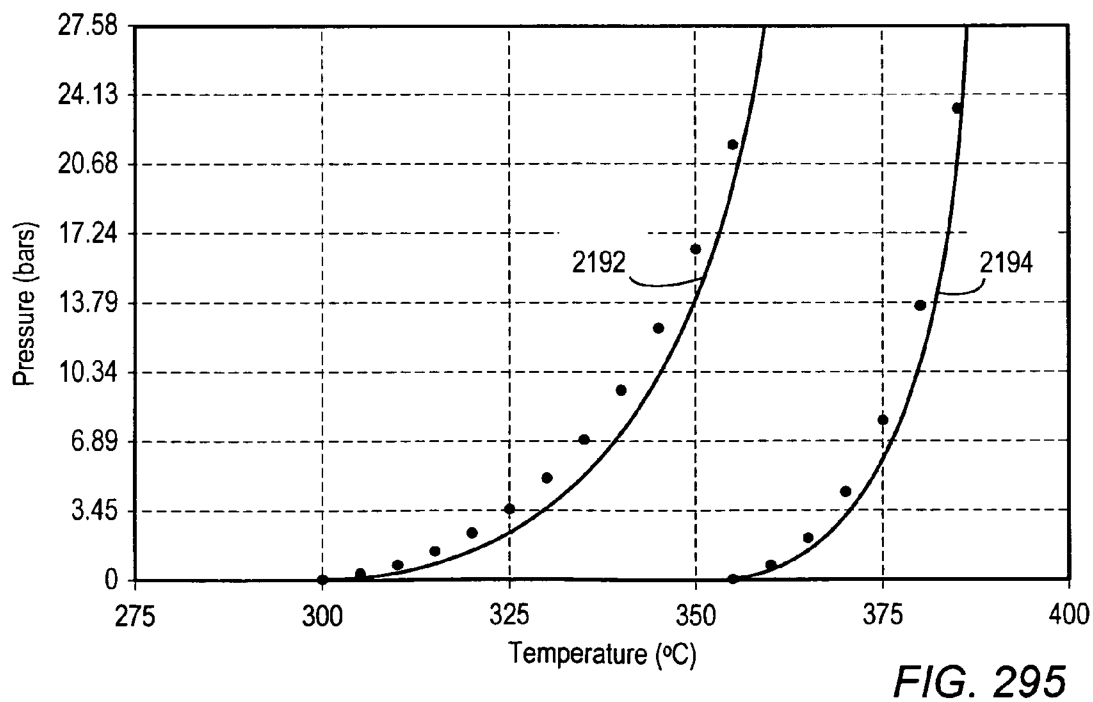

FIG. 295 depicts the dependence of yield of equivalent liquids produced from a tar sands formation as a function of temperature and pressure in a retort experiment.

Figure 296:
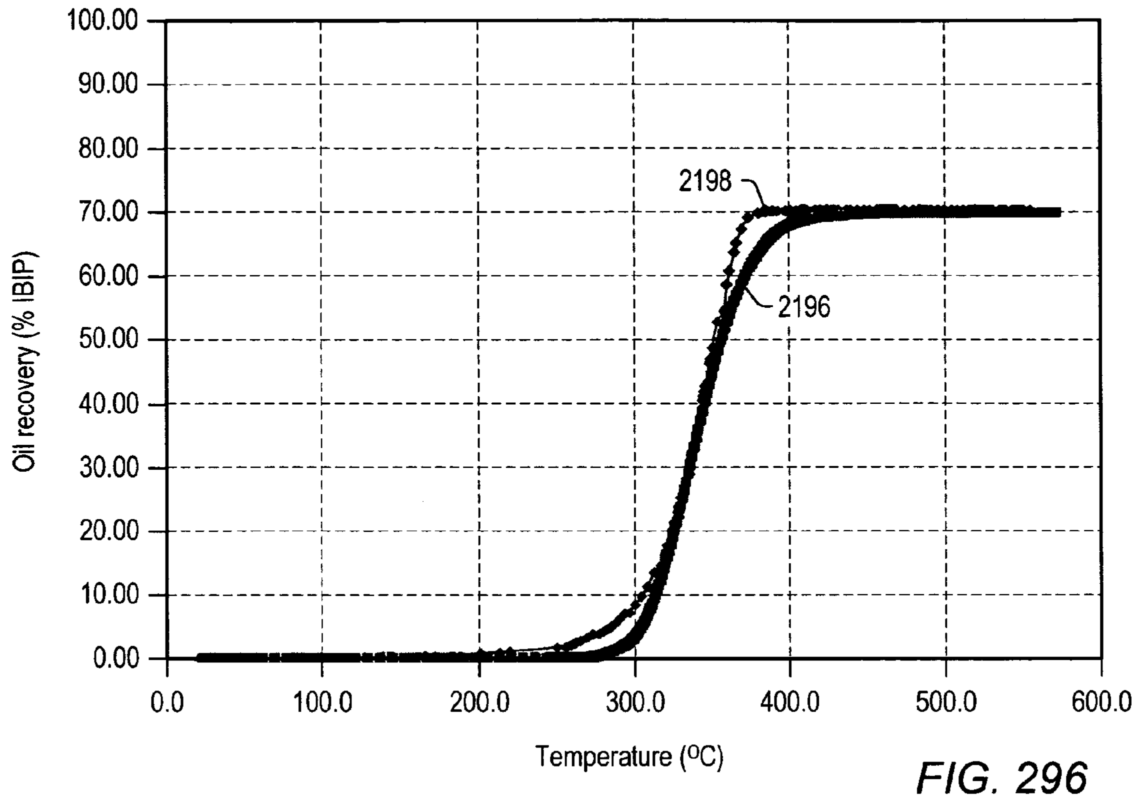

FIG. 296 illustrates a plot of percentage oil recovery versus temperature for a laboratory experiment and a simulation.

Figure 297:
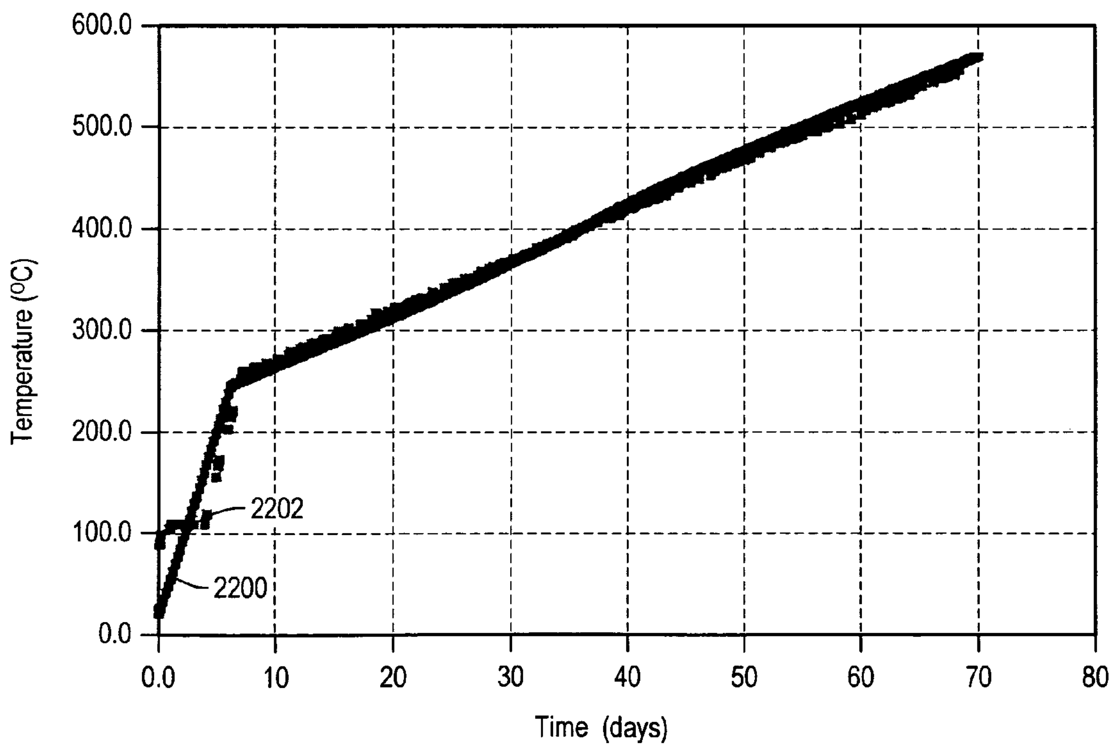

FIG. 297 depicts temperature versus time for a laboratory experiment and a simulation.

Figure 298:
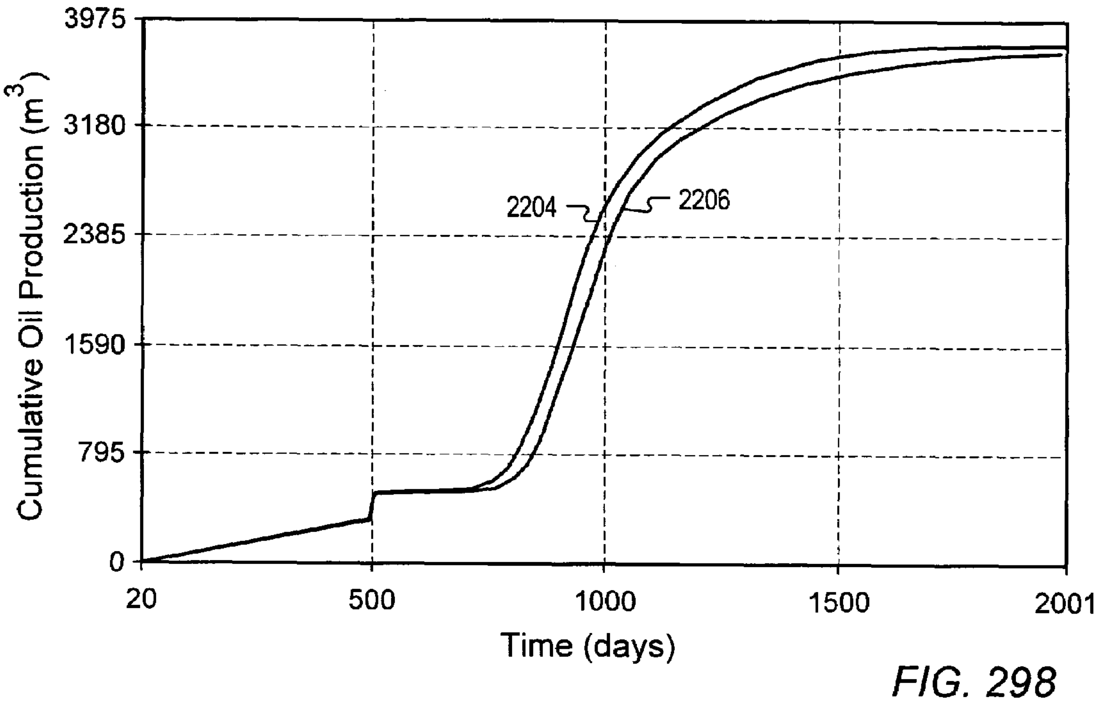

FIG. 298 depicts a plot of cumulative oil production versus time in a heavy hydrocarbon containing formation.

Figure 299:
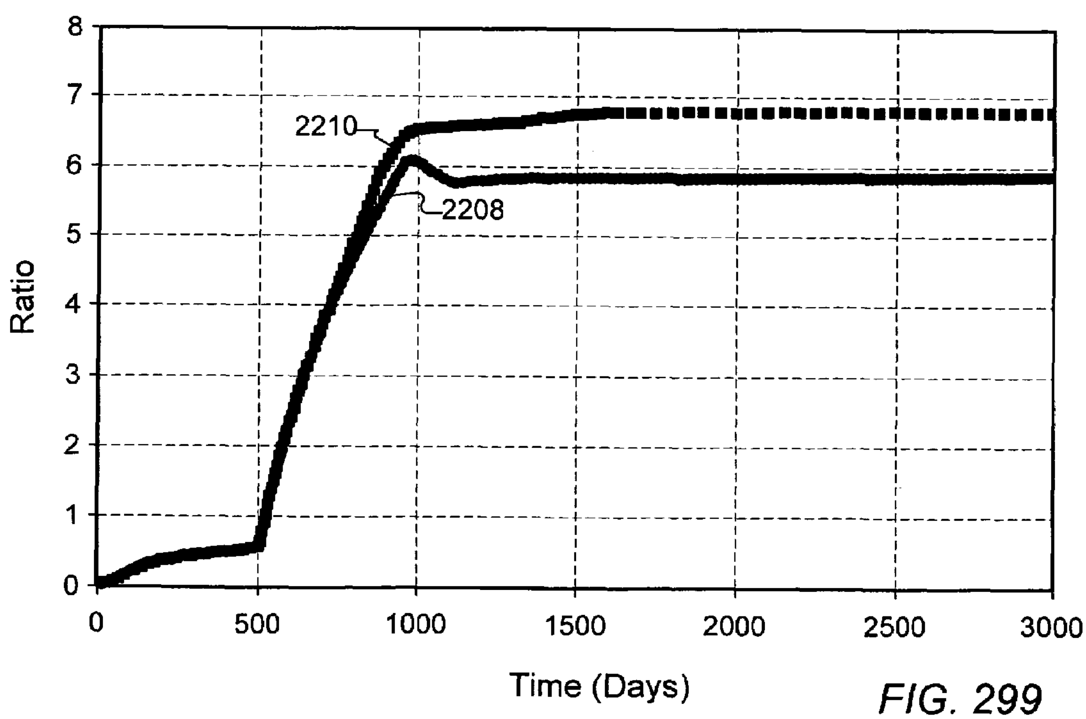

FIG. 299 depicts ratio of heat content of fluids produced from a heavy hydrocarbon containing formation to heat input versus time.

Figure 300:
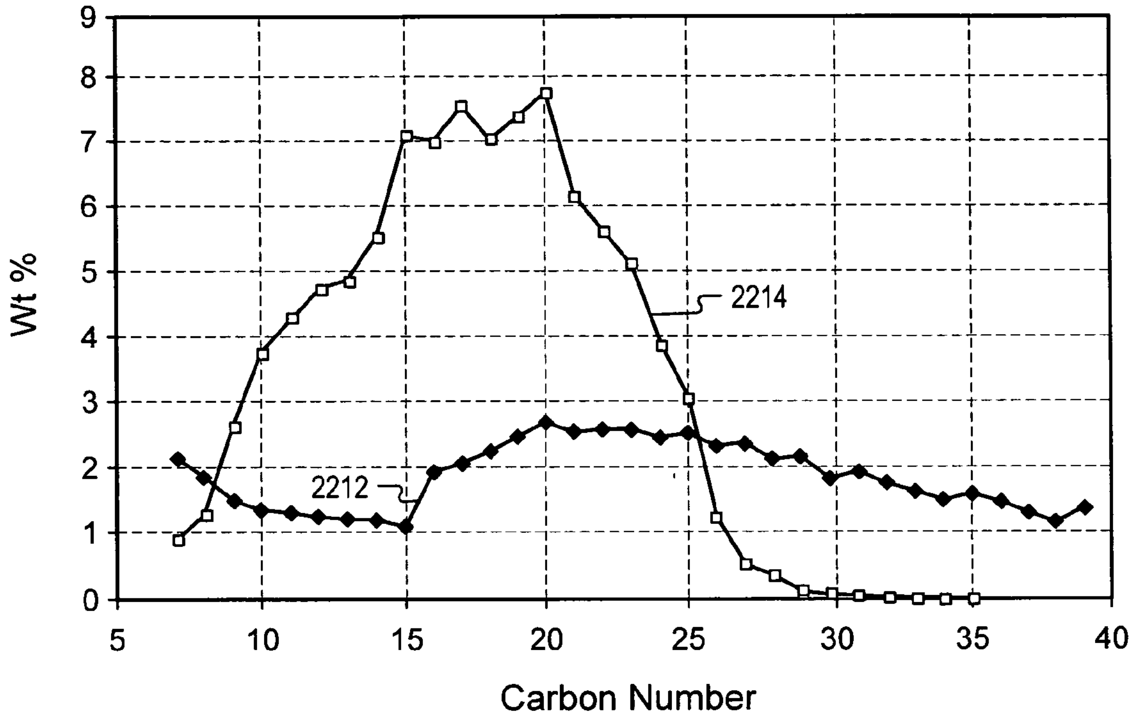

FIG. 300 depicts numerical simulation data of weight percentage versus carbon number for a heavy hydrocarbon containing formation.

Figure 301:
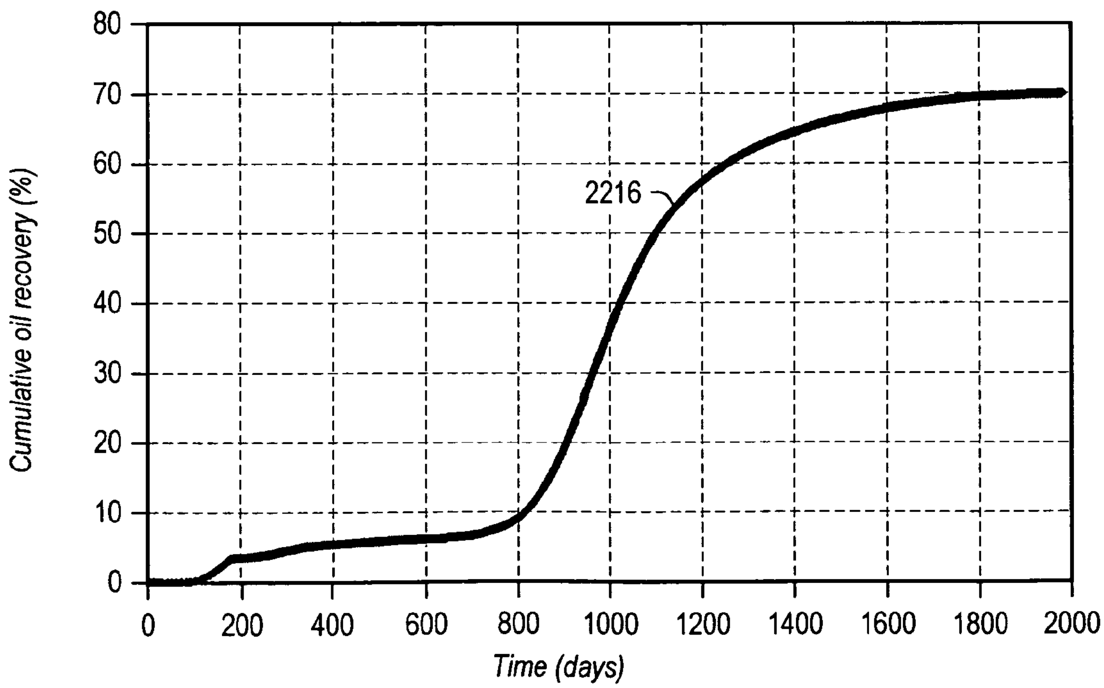

FIG. 301 illustrates percentage cumulative oil recovery versus time for a simulation using horizontal heaters.

Figure 302:
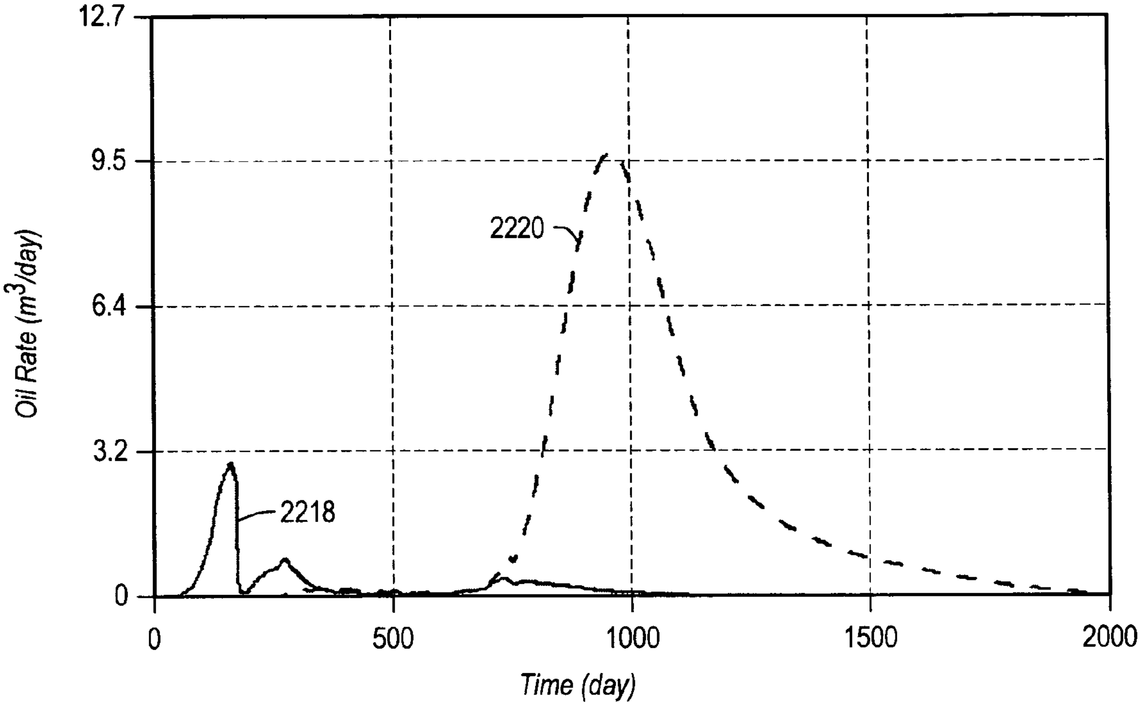

FIG. 302 illustrates oil production rate versus time for heavy hydrocarbons and light hydrocarbons in a simulation.

Figure 303:
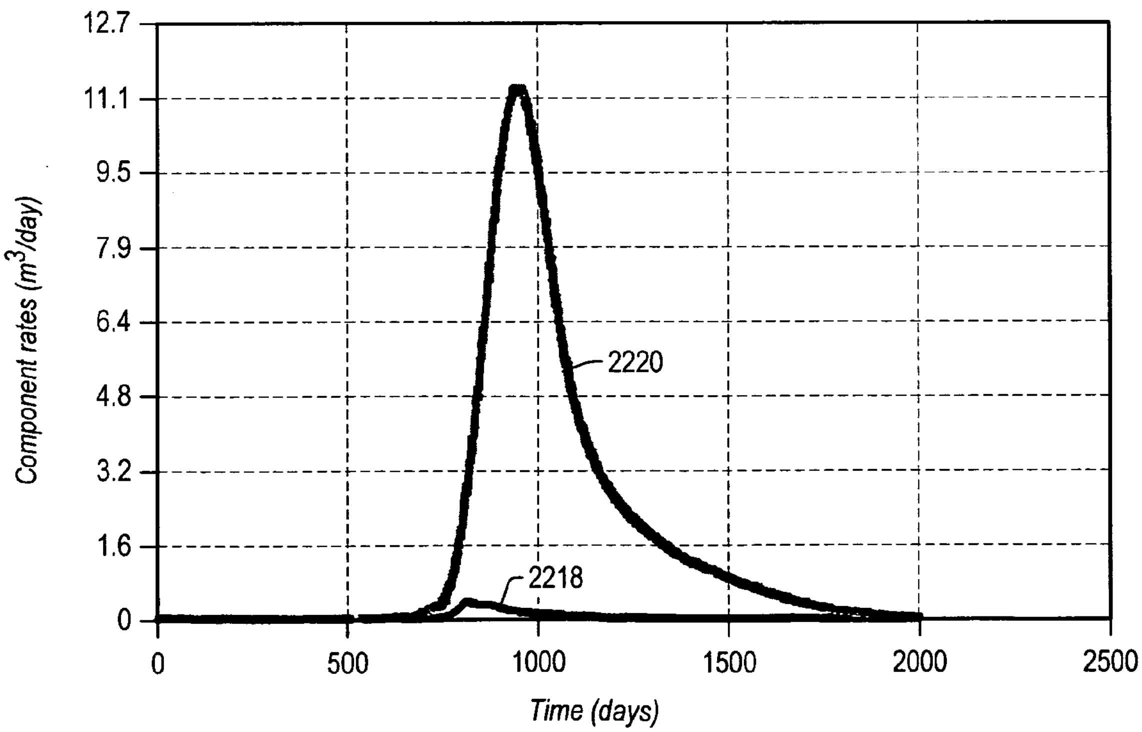

FIG. 303 illustrates oil production rate versus time for heavy hydrocarbons and light hydrocarbons with production inhibited for the first 500 days of heating in a simulation.

Figure 304:
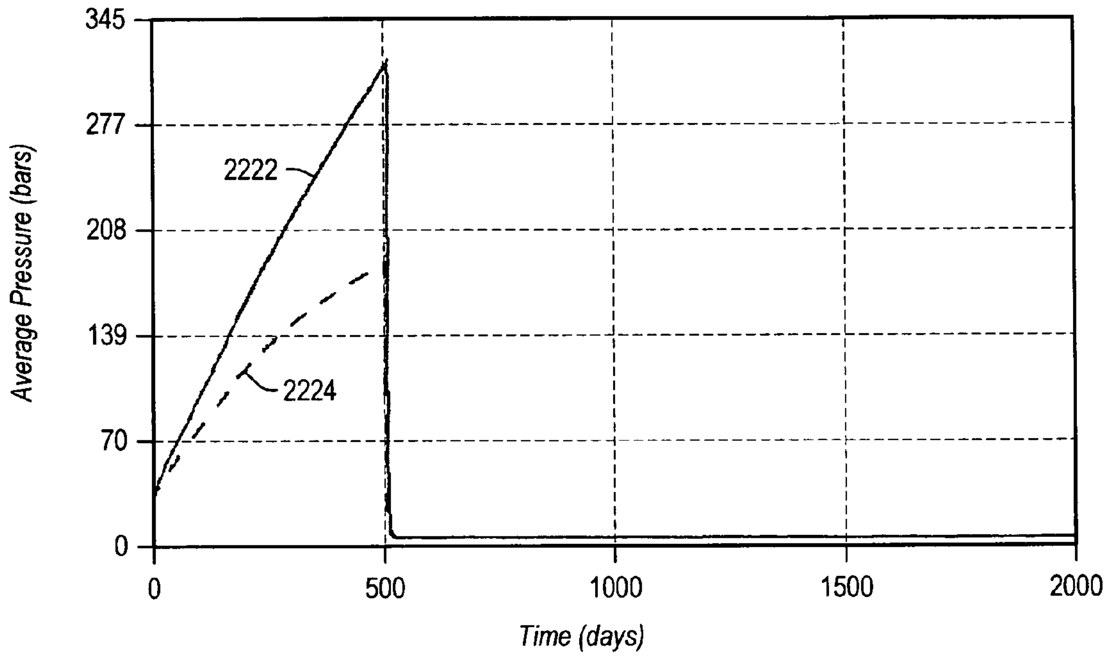

FIG. 304 depicts average pressure in a formation versus time in a simulation.

Figure 305:
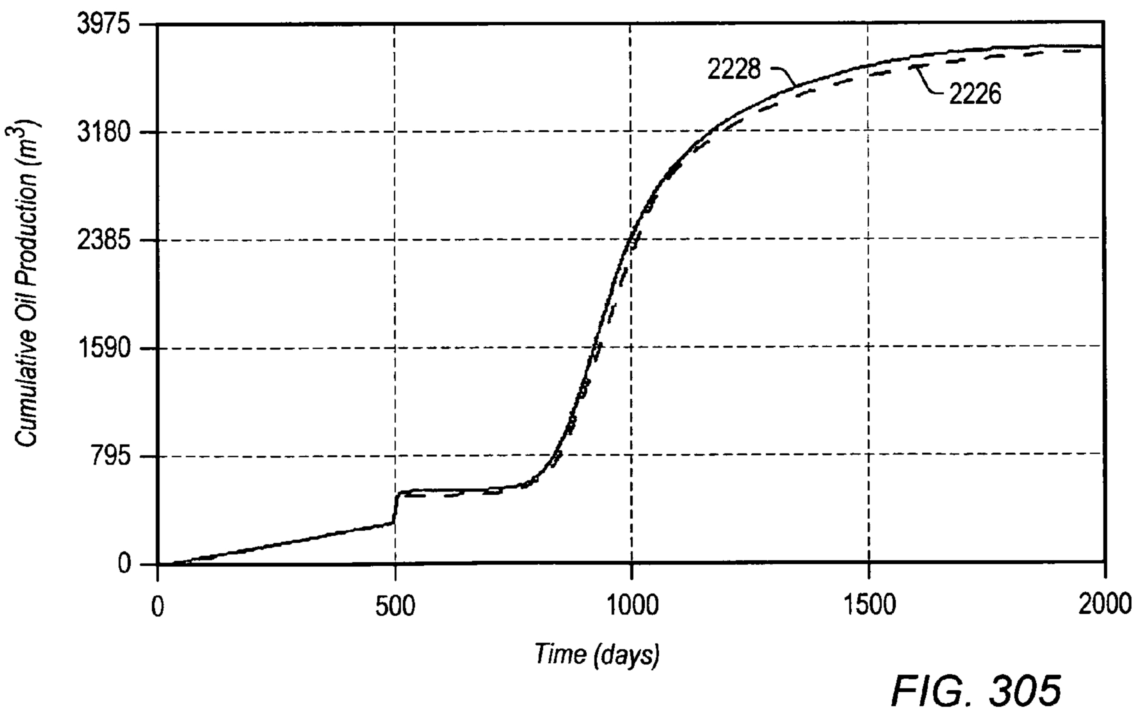

FIG. 305 illustrates cumulative oil production versus time for a vertical producer and a horizontal producer in a simulation.

Figure 306:
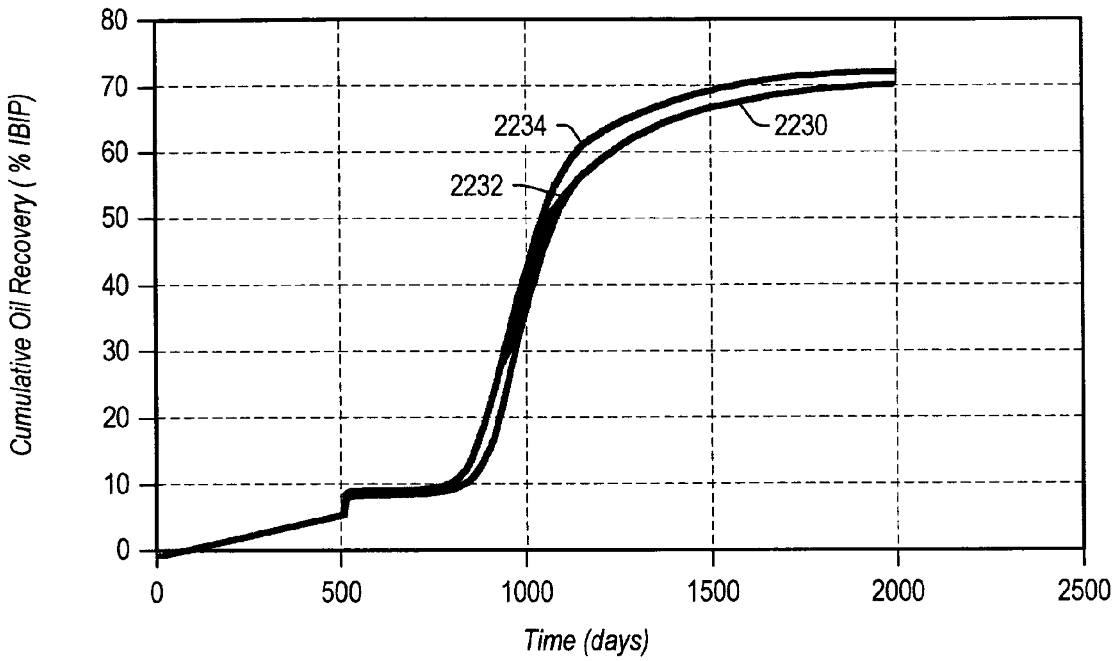

FIG. 306 illustrates percentage cumulative oil recovery versus time for three different horizontal producer well locations in a simulation.

Figure 307:
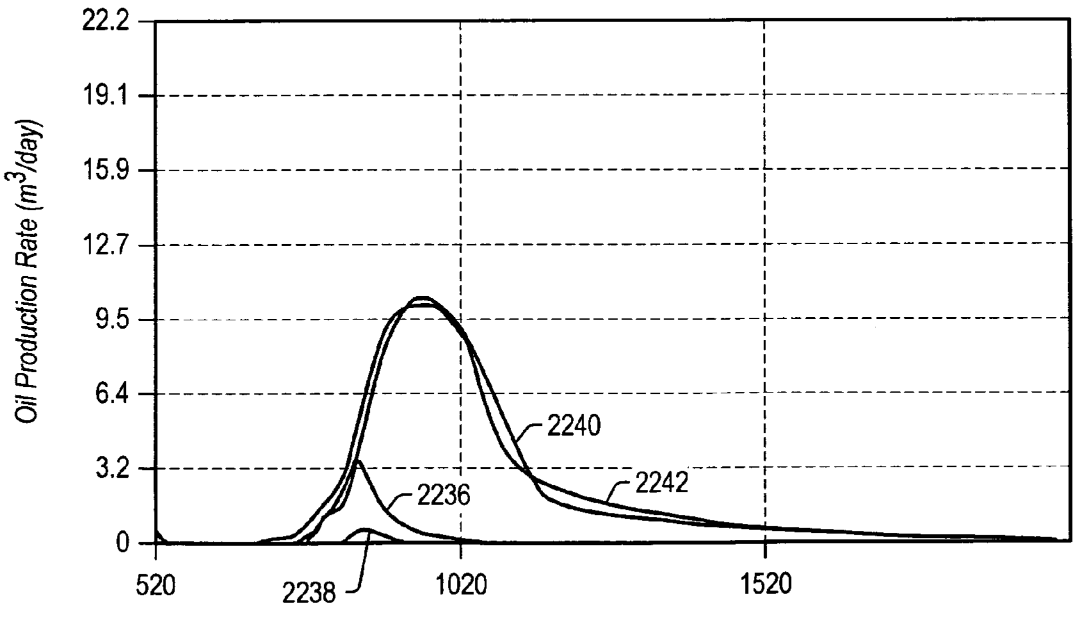

FIG. 307 illustrates production rate versus time for heavy hydrocarbons and light hydrocarbons for middle and bottom producer locations in a simulation.

Figure 308:
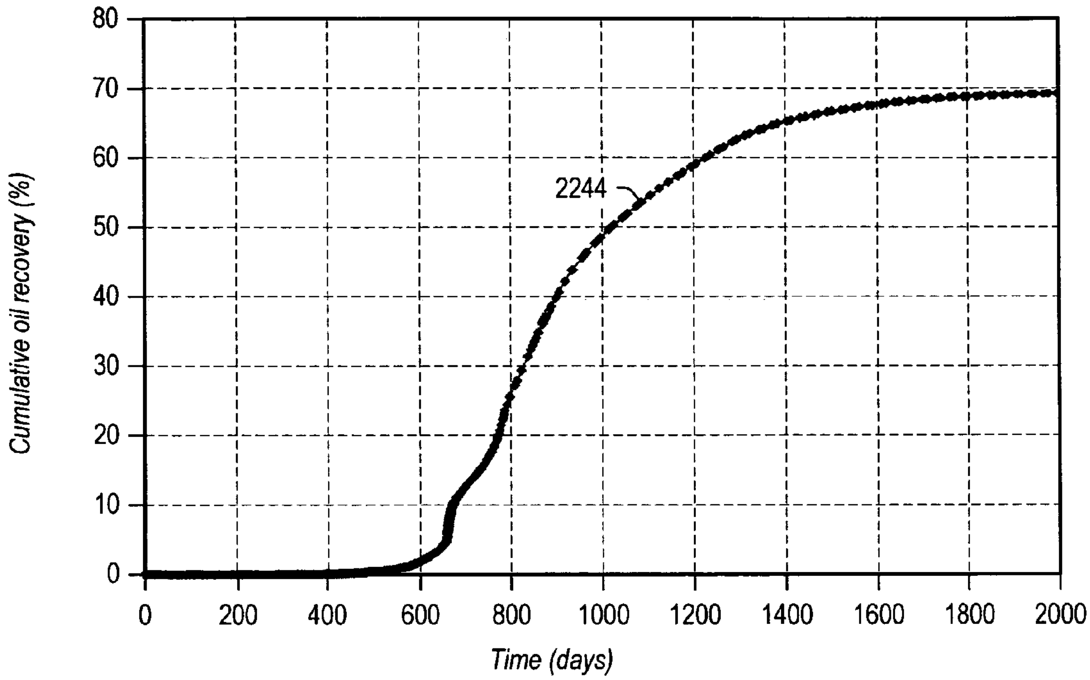

FIG. 308 illustrates percentage cumulative oil recovery versus time in a simulation.

Figure 309:
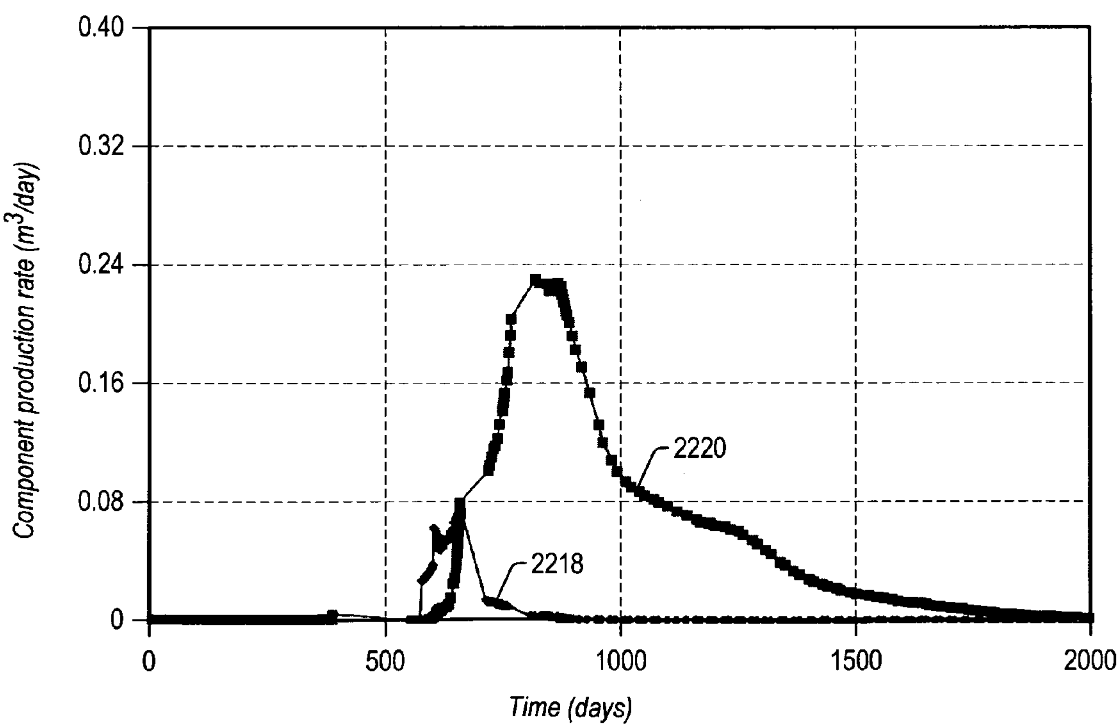

FIG. 309 illustrates oil production rate versus time for heavy hydrocarbons and light hydrocarbons in a simulation.

Figure 310:
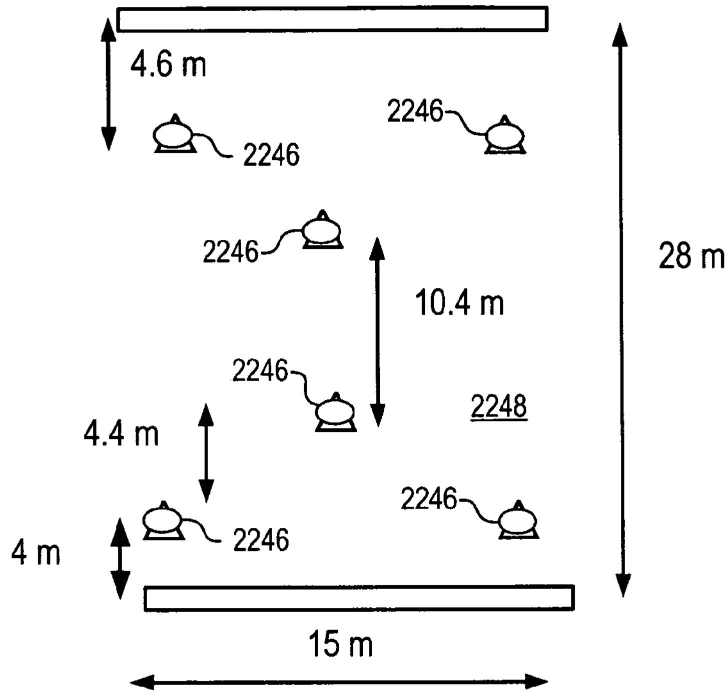

FIG. 310 illustrates a pattern of heater/producer wells used to heat a relatively permeable formation in a simulation.

Figure 311:
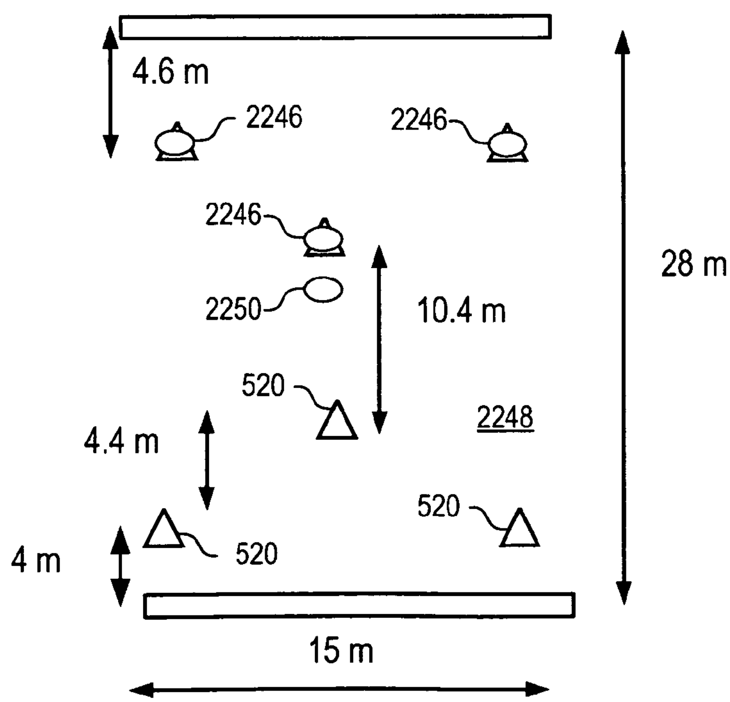

FIG. 311 illustrates a pattern of heater/producer wells used in the simulation with three heater/producer wells, a cold producer well, and three heater wells used to heat a relatively permeable formation in a simulation.

Figure 312:
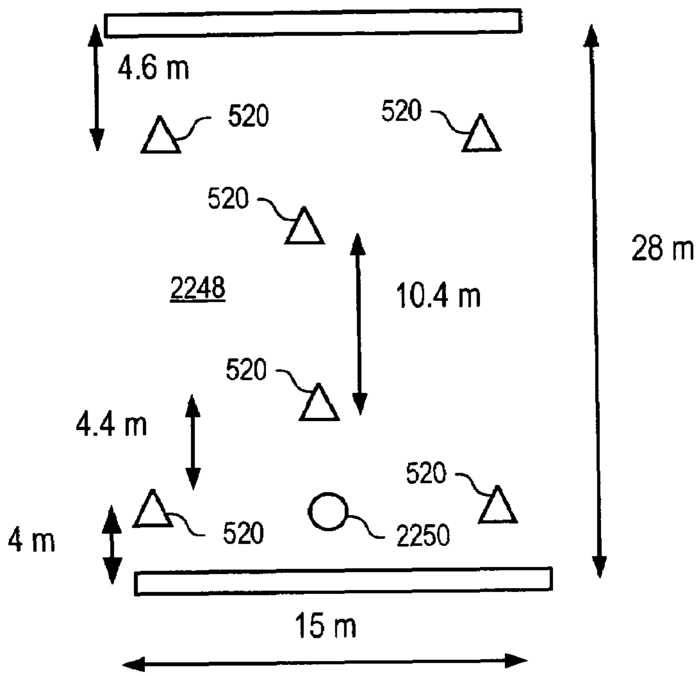

FIG. 312 illustrates a pattern of six heater wells and a cold producer well used in a simulation.

Figure 313:
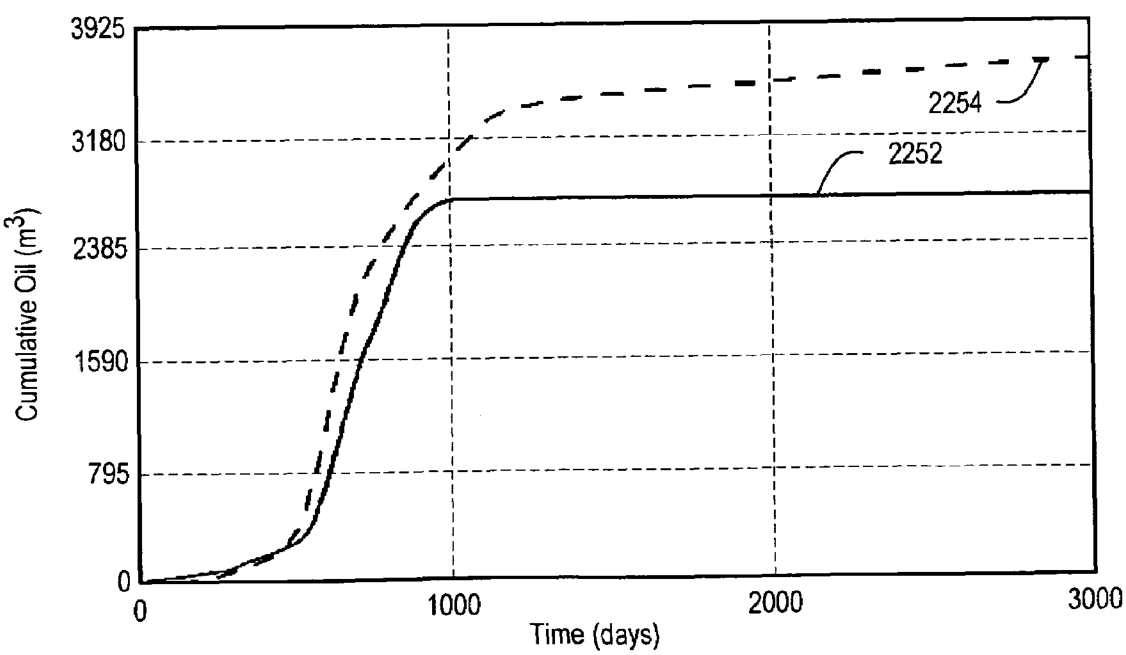

FIG. 313 illustrates a plot of oil production versus time for the simulation with the well pattern depicted in FIG. 310.

Figure 314:
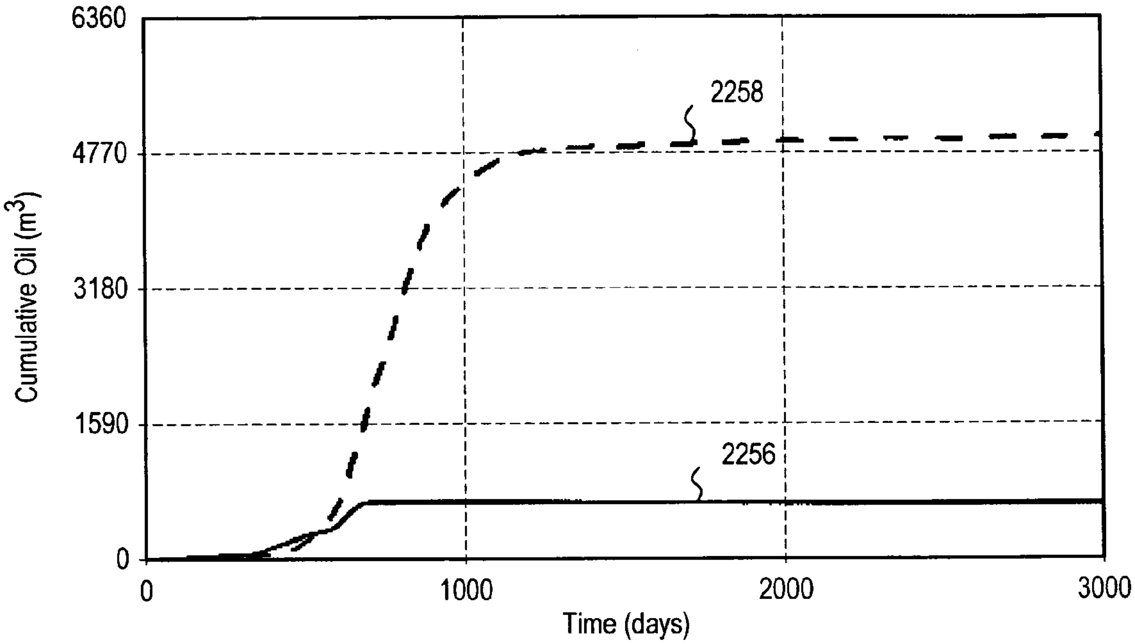

FIG. 314 illustrates a plot of oil production versus time for the simulation with the well pattern depicted in FIG. 311.

Figure 315:
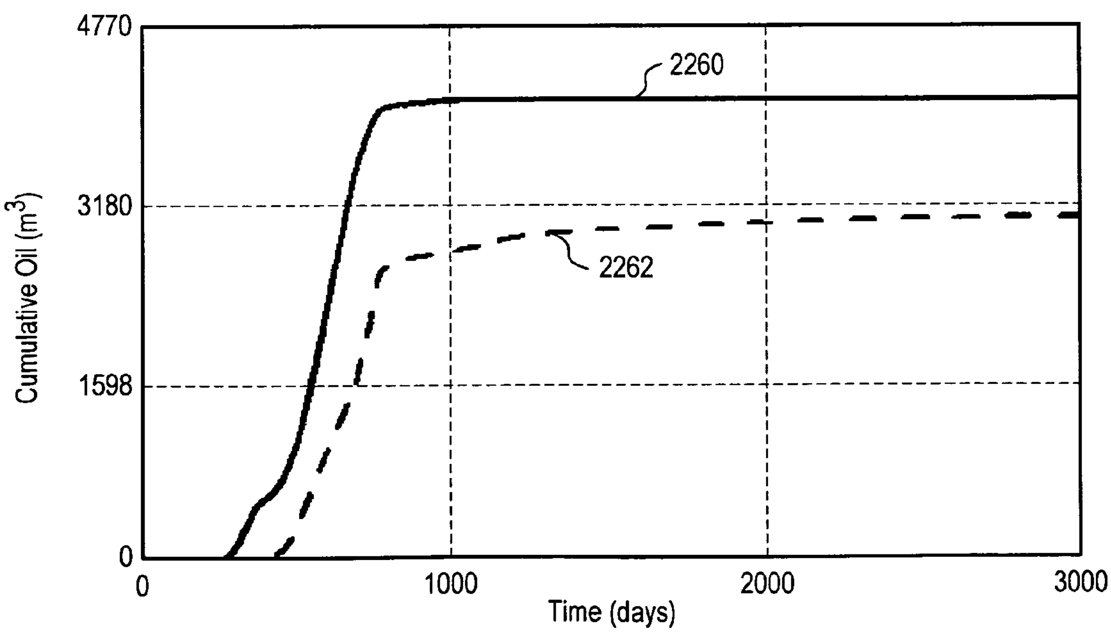

FIG. 315 illustrates a plot of oil production versus time for the simulation with the well pattern depicted in FIG. 312.

Figure 316:
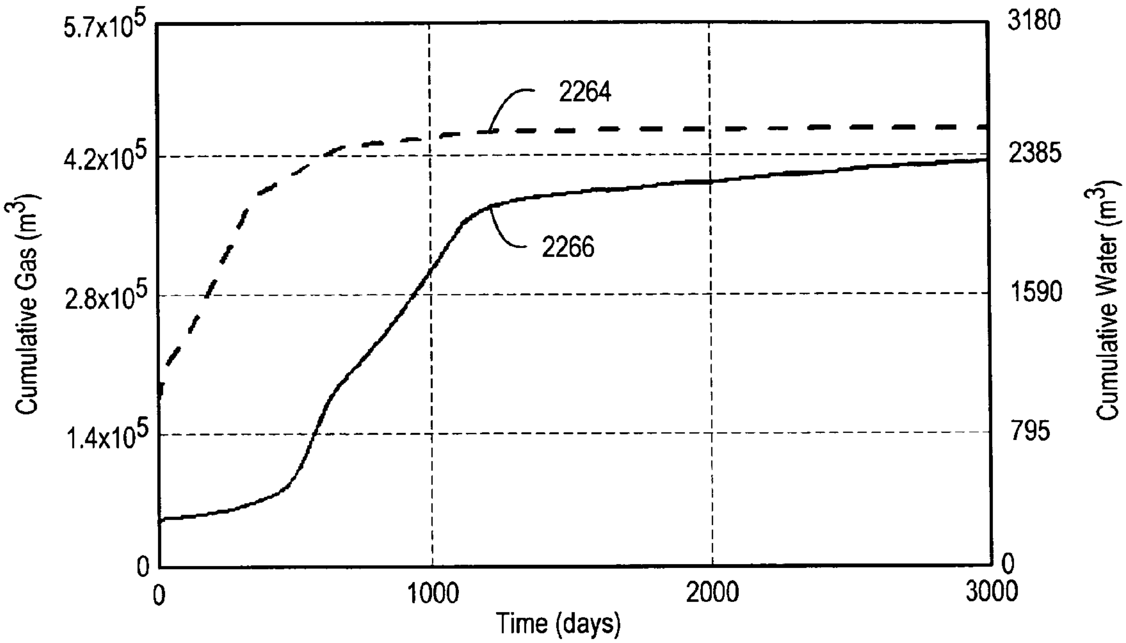

FIG. 316 illustrates gas production and water production versus time for the simulation with the well pattern depicted in FIG. 310.

Figure 317:
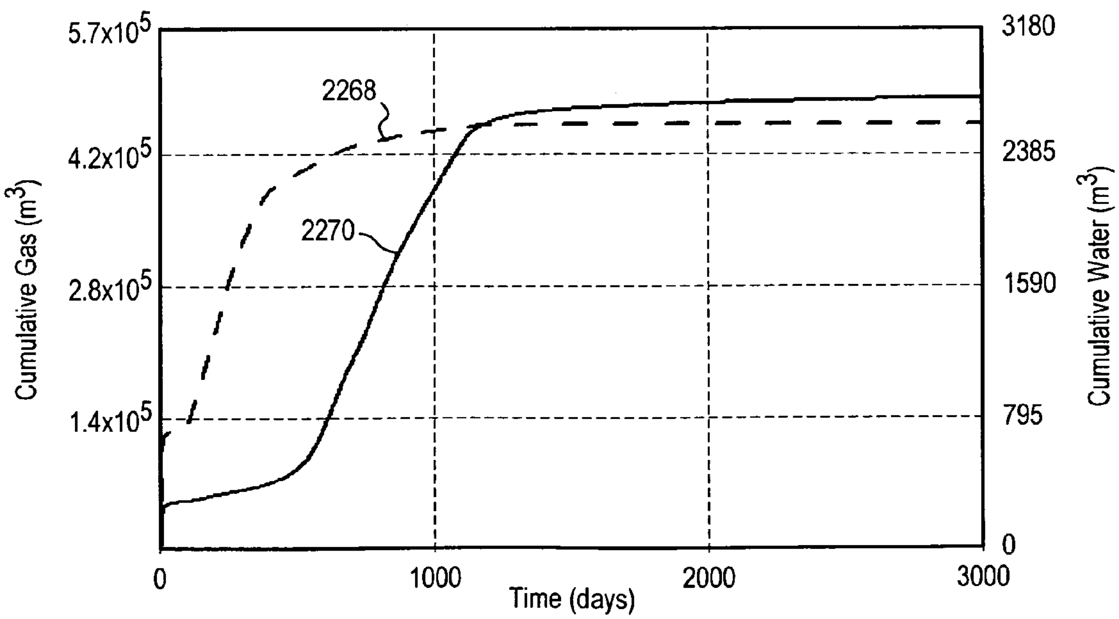

FIG. 317 illustrates gas production and water production versus time for the simulation with the well pattern depicted in FIG. 311.

Figure 318:
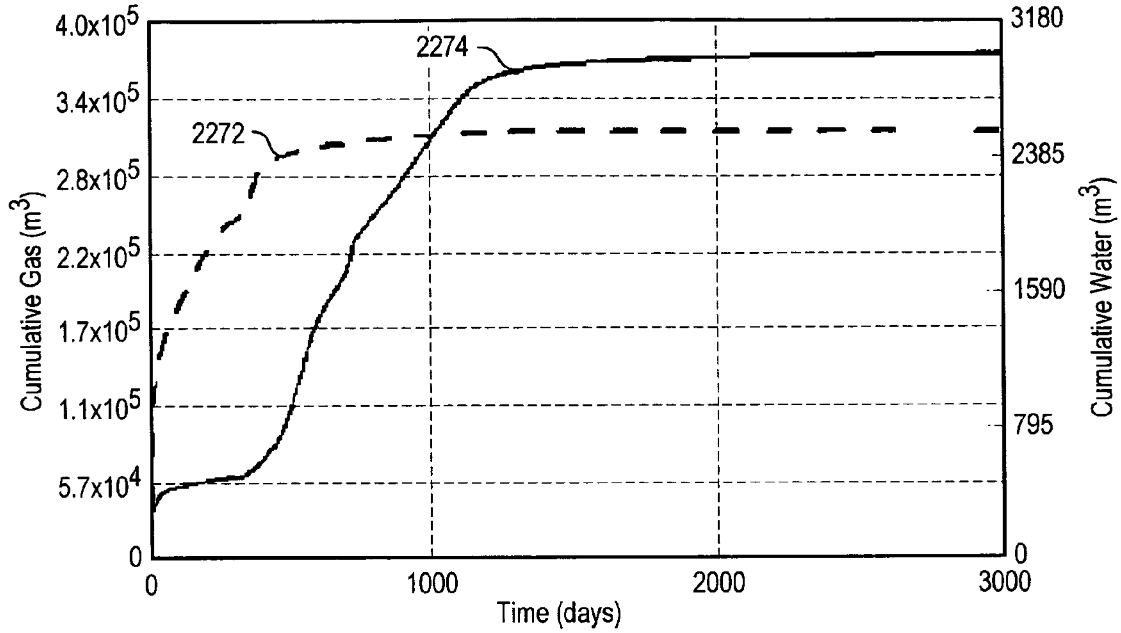

FIG. 318 illustrates gas production and water production versus time for the simulation with the well pattern depicted in FIG. 312.

Figure 319:
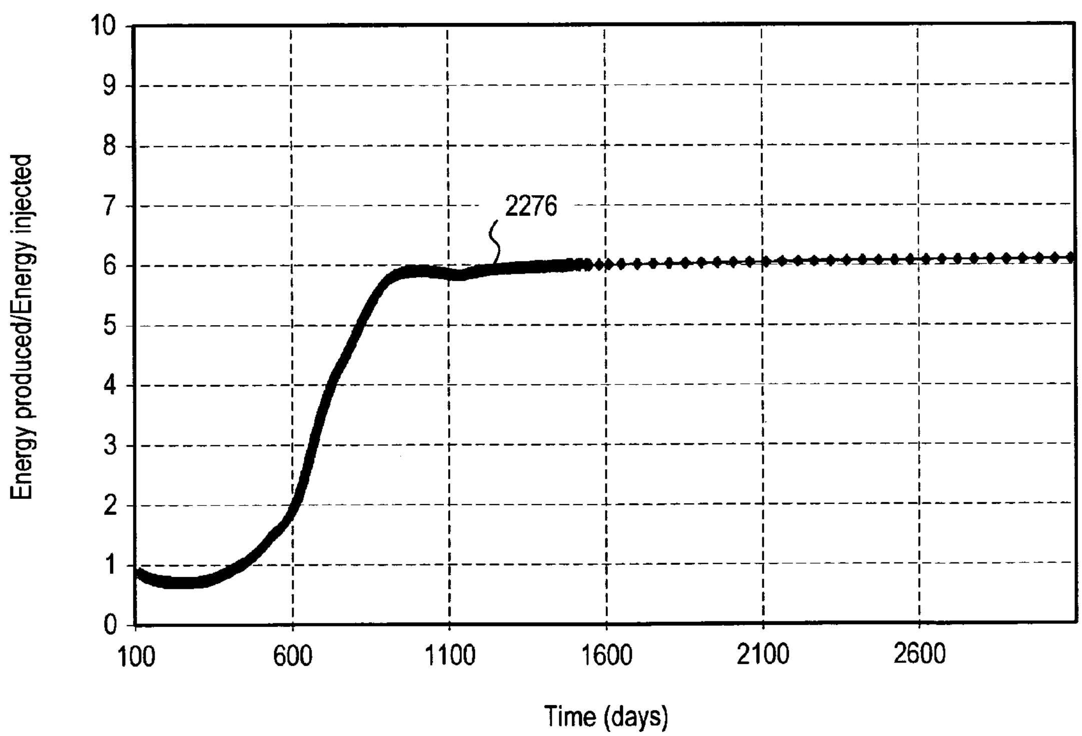

FIG. 319 illustrates an energy ratio versus time for the simulation with the well pattern depicted in FIG. 310.

Figure 320:
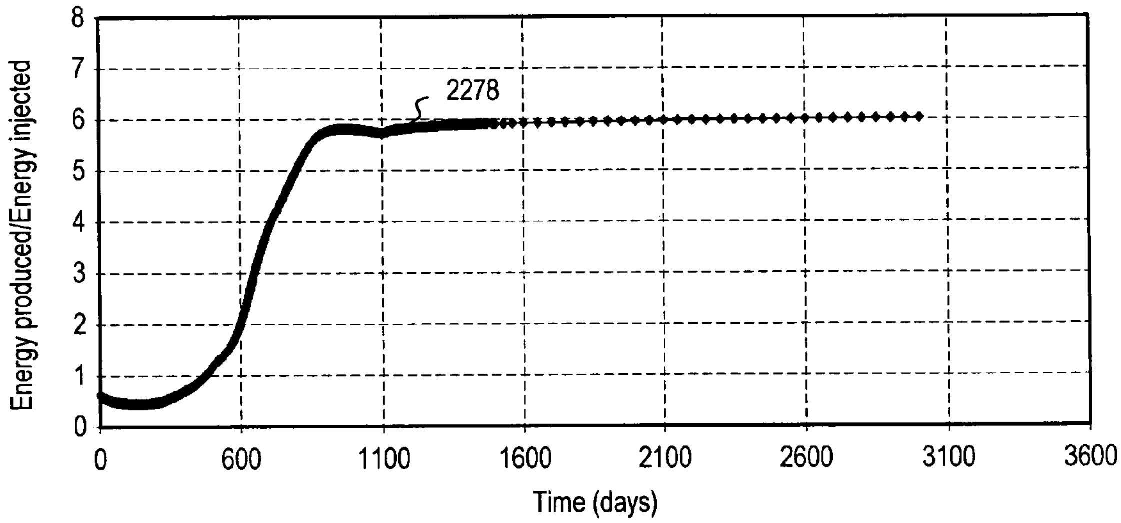

FIG. 320 illustrates an energy ratio versus time for the simulation with the well pattern depicted in FIG. 311.

Figure 321:
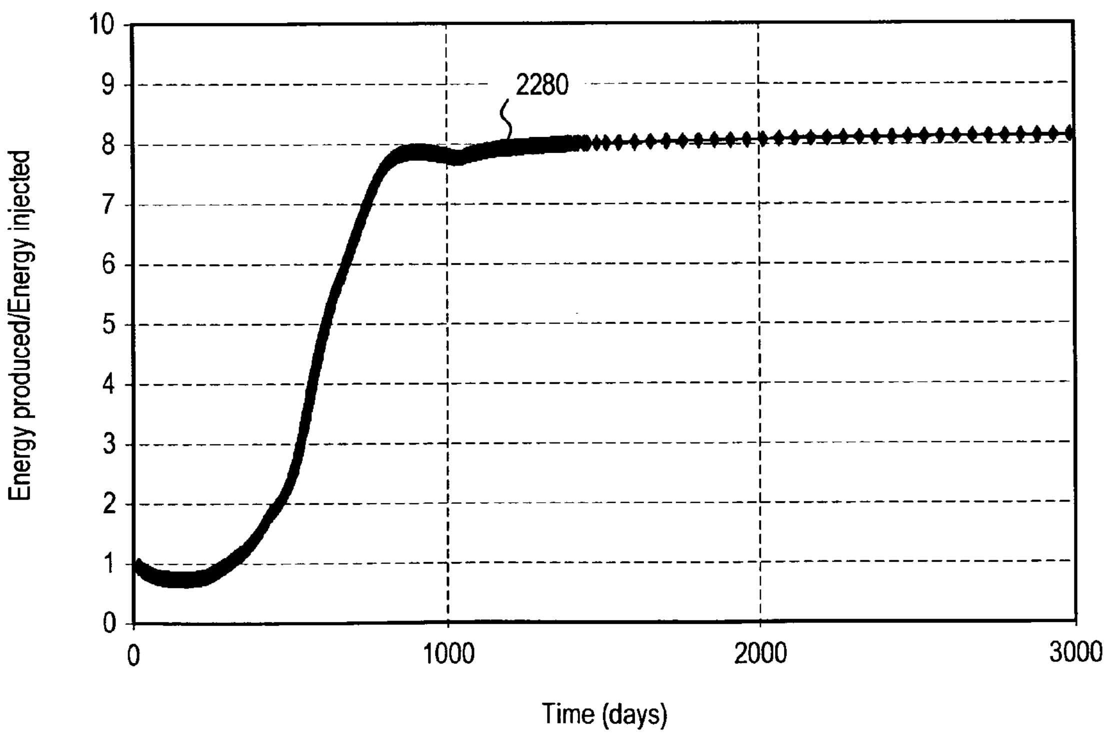

FIG. 321 illustrates an energy ratio versus time for the simulation with the well pattern depicted in FIG. 312.

Figure 322:
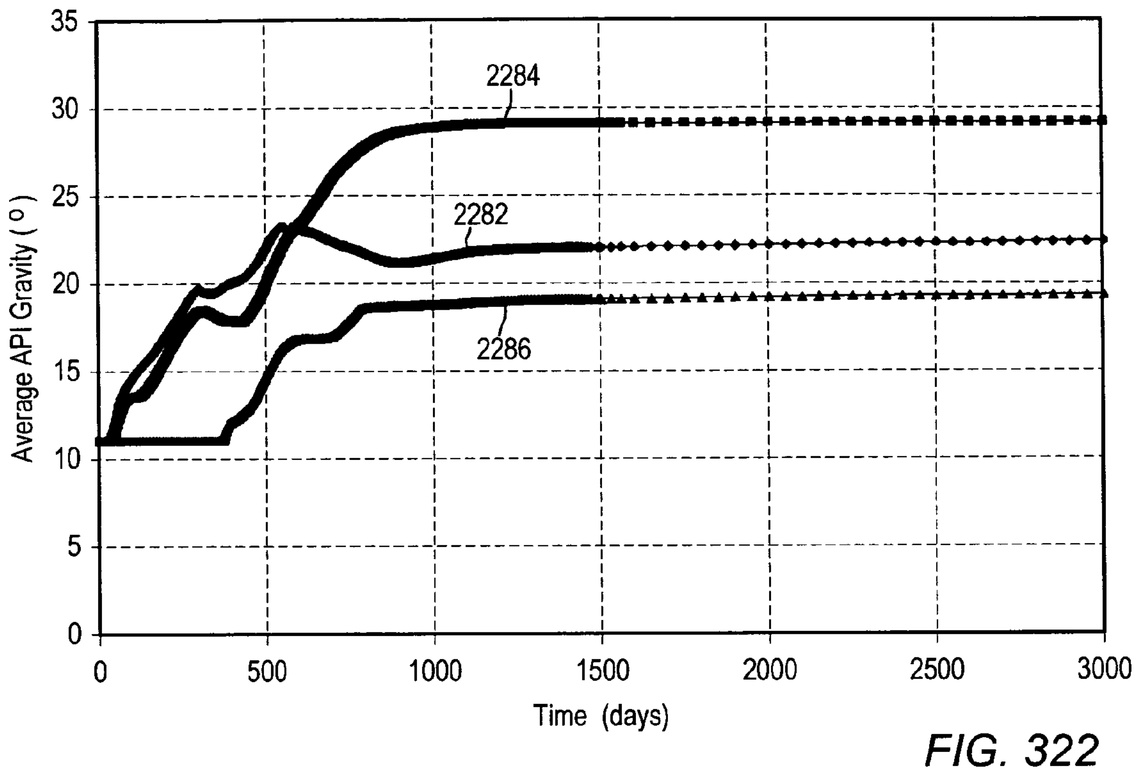

FIG. 322 illustrates an average API gravity of produced fluid versus time for the simulations with the well patterns depicted in FIGS. 310-312.

Figure 323:
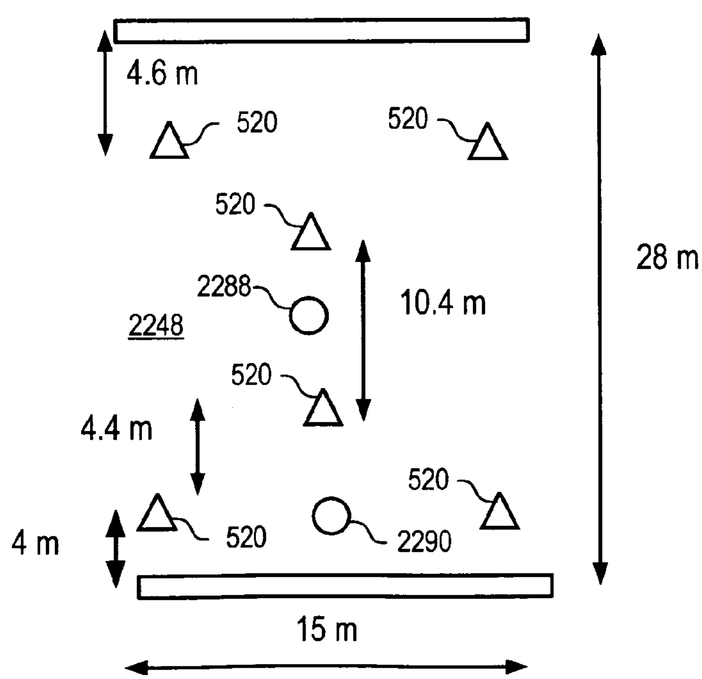

FIG. 323 depicts a heater well pattern used in a 3-D STARS simulation.

Figure 324:
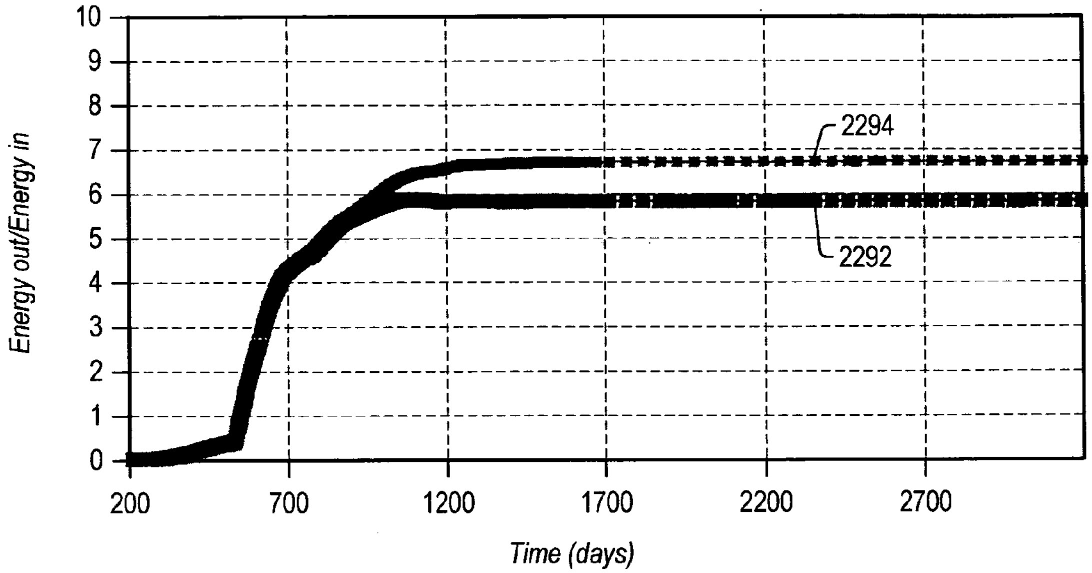

FIG. 324 illustrates an energy out/energy in ratio versus time for production through a middle producer location in a simulation.

Figure 325:
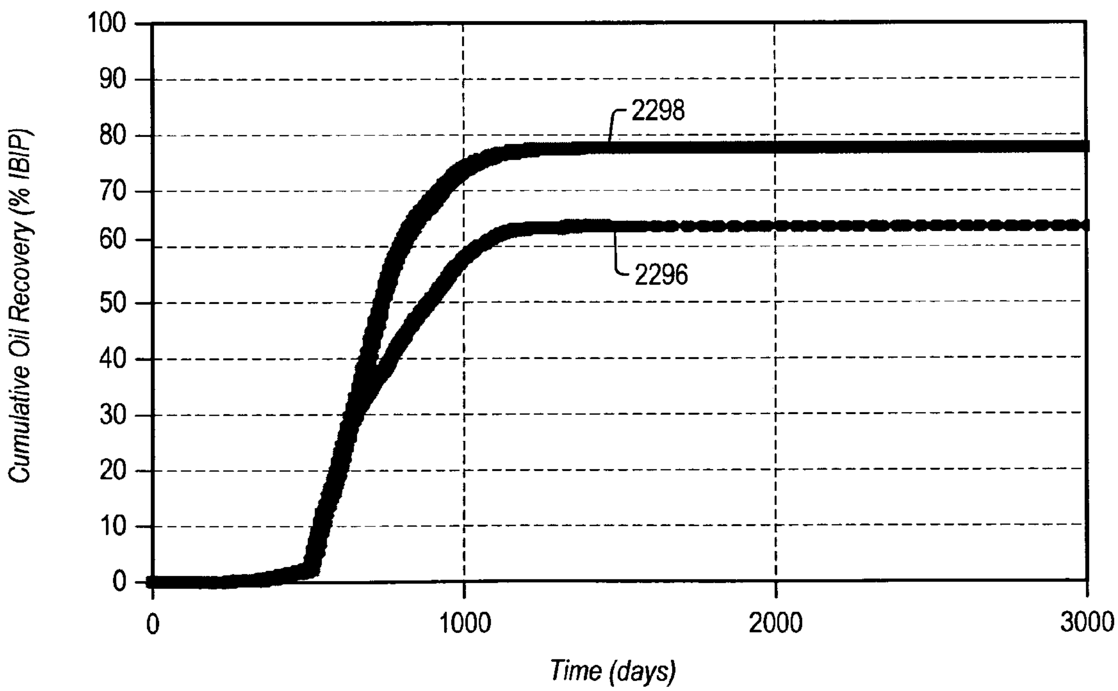

FIG. 325 illustrates percentage cumulative oil recovery versus time for production using a middle producer location and a bottom producer location in a simulation.

Figure 326:
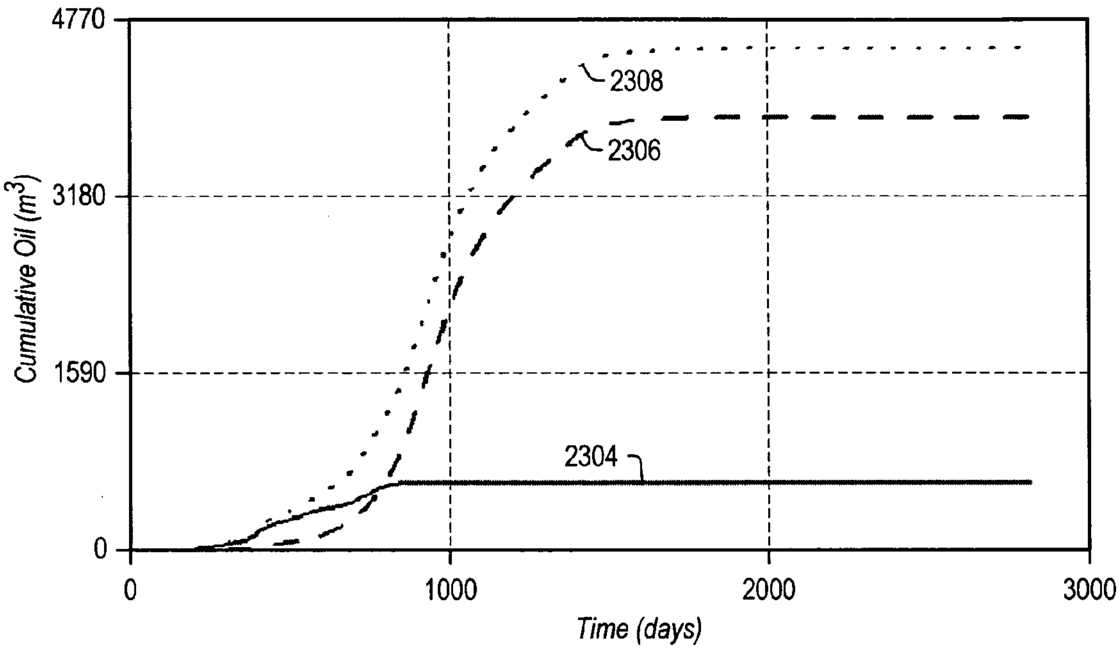

FIG. 326 illustrates cumulative oil production versus time using a middle producer location in a simulation.

Figure 327:
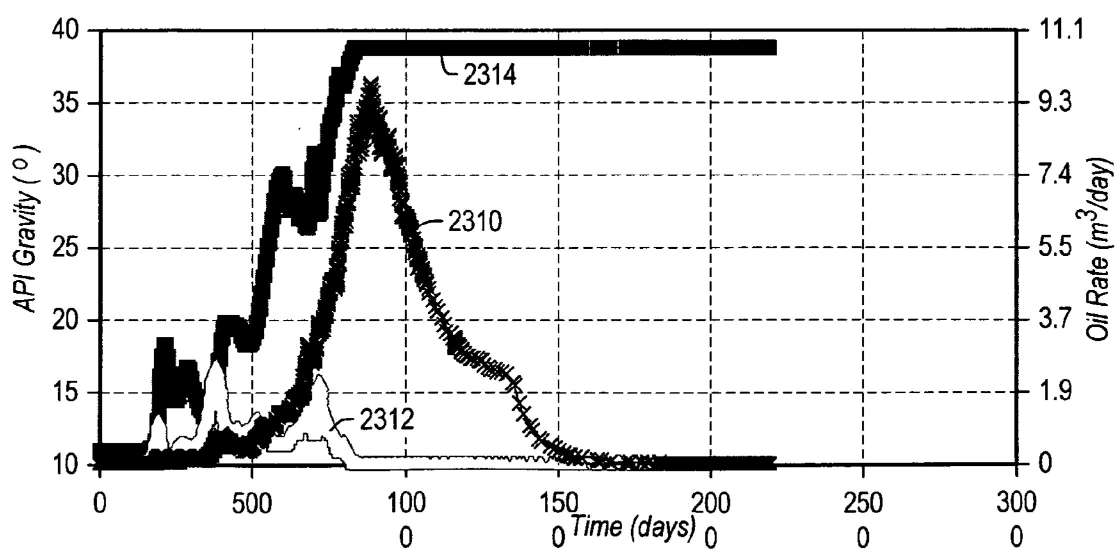

FIG. 327 illustrates API gravity of oil produced and oil production rate for heavy hydrocarbons and light hydrocarbons for a middle producer location in a simulation.

Figure 328:
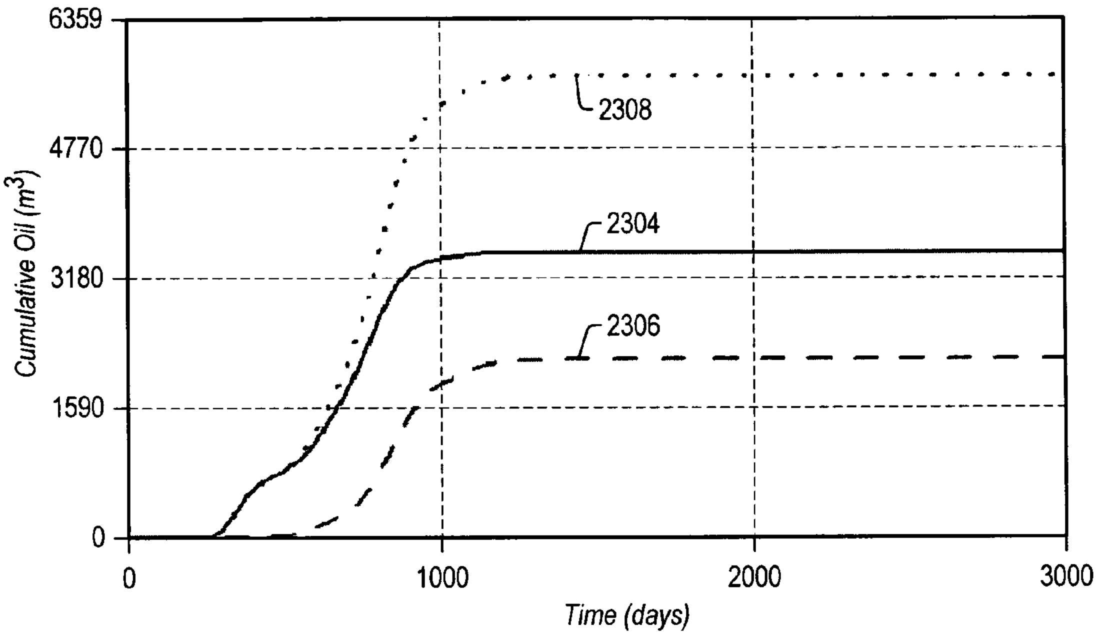

FIG. 328 illustrates cumulative oil production versus time for a bottom producer location in a simulation.

Figure 329:
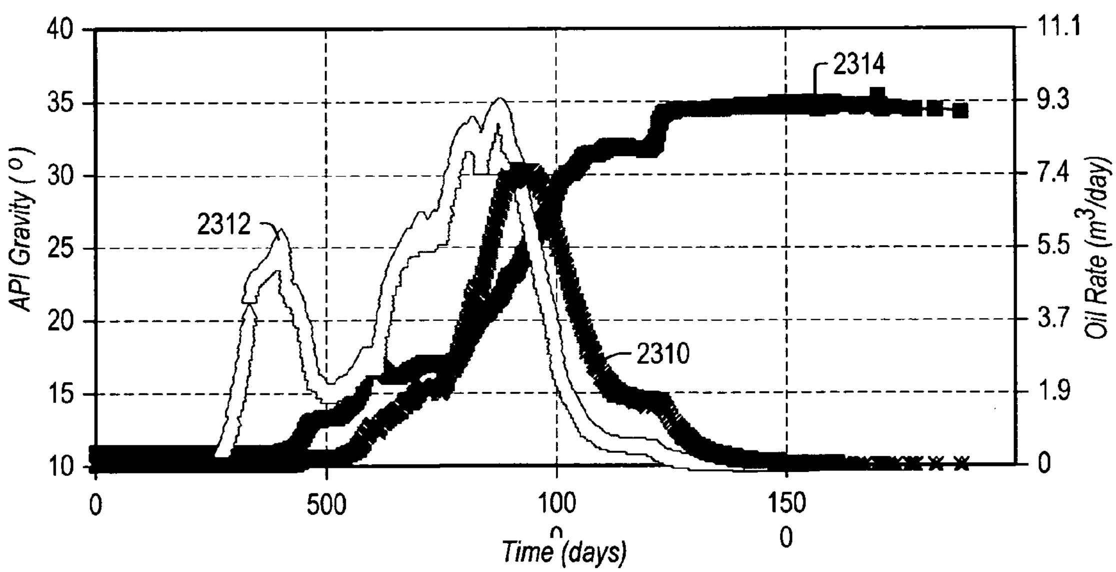

FIG. 329 illustrates API gravity of oil produced and oil production rate for heavy hydrocarbons and light hydrocarbons for a bottom producer location in a simulation.

Figure 330:
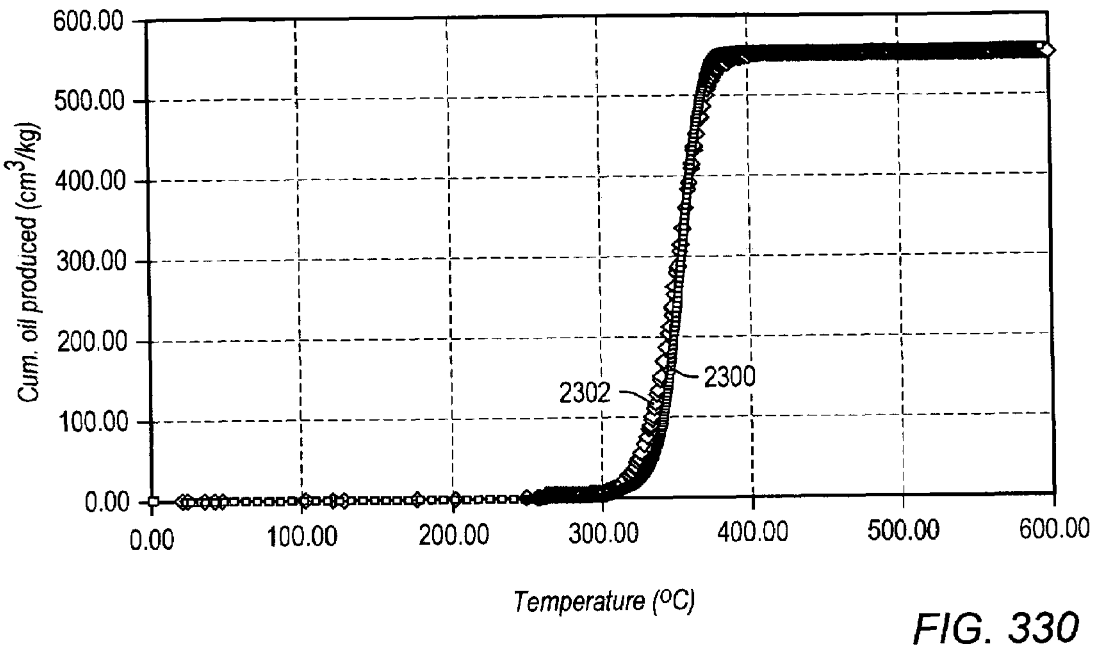

FIG. 330 illustrates cumulative oil produced versus temperature for lab pyrolysis experiments and for a simulation.

Figure 331:
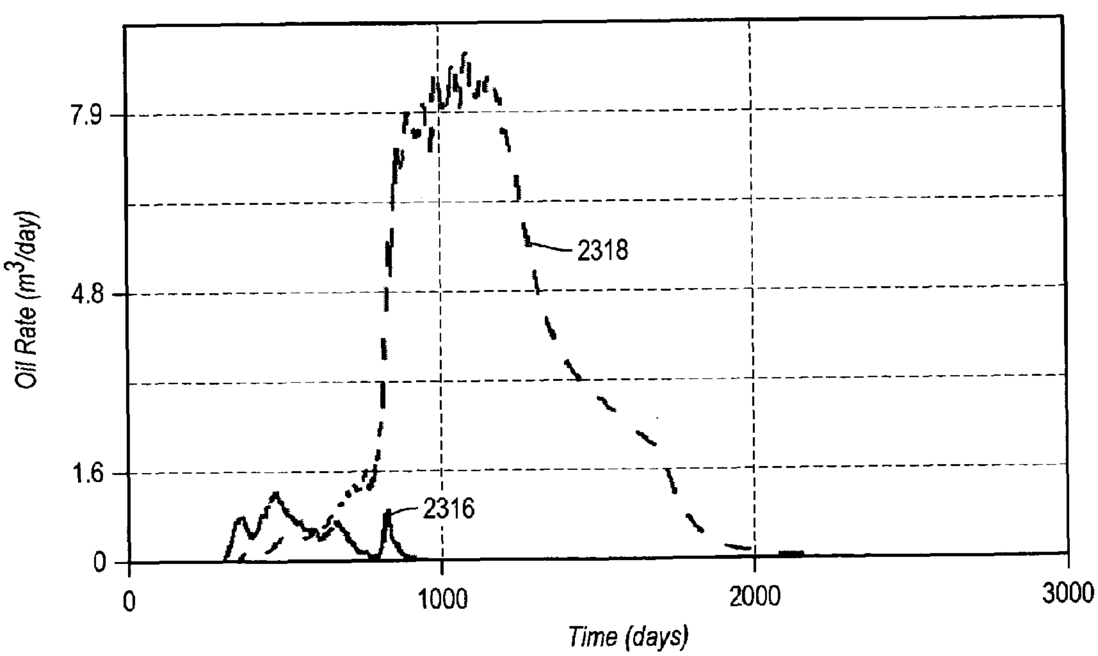

FIG. 331 illustrates oil production rate versus time for heavy hydrocarbons and light hydrocarbons produced through a middle producer location in a simulation.

Figure 332:
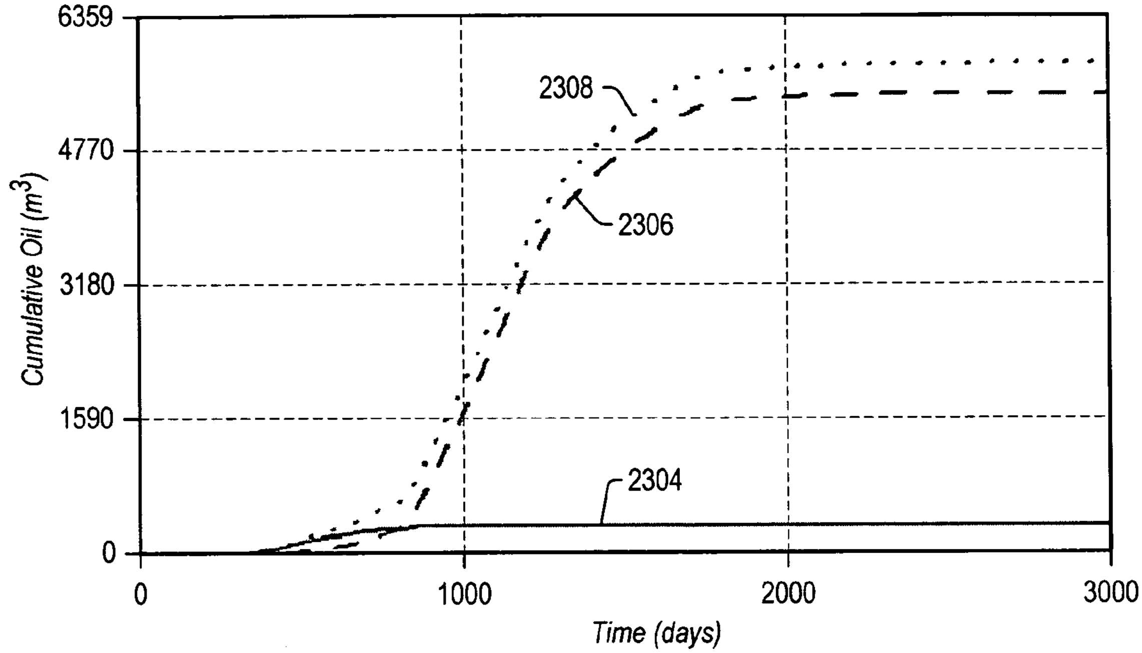

FIG. 332 illustrates cumulative oil production versus time for a wider horizontal heater spacing with production through a middle producer location in a simulation.

Figure 333:
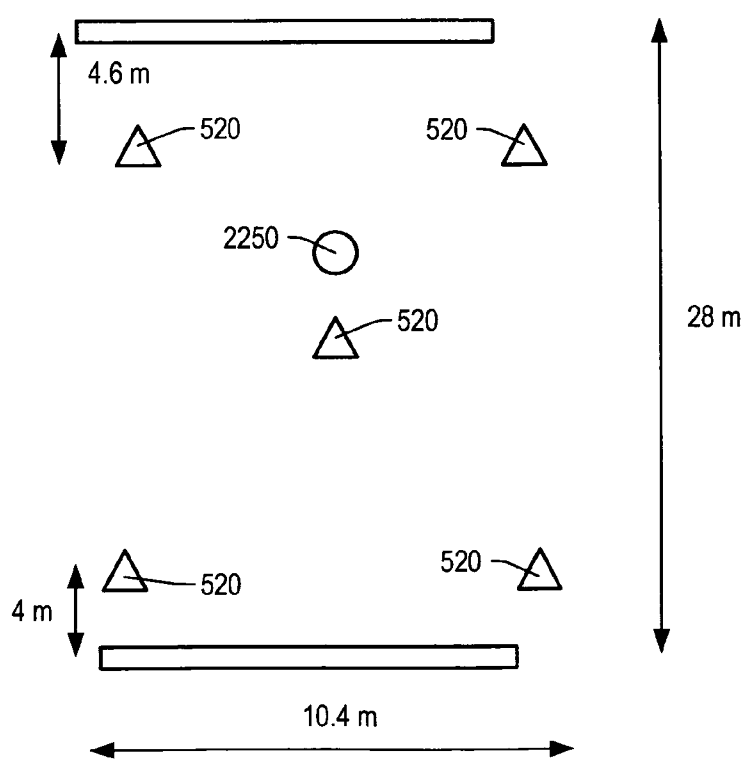

FIG. 333 depicts a heater well pattern used in a 3-D STARS simulation.

Figure 334:
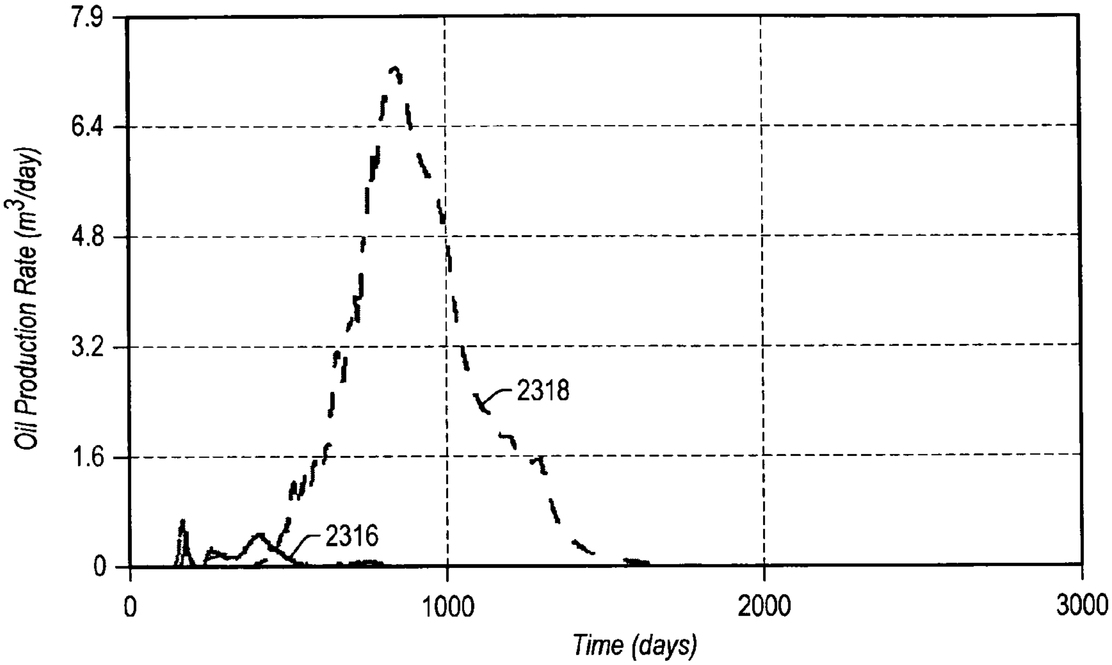

FIG. 334 illustrates oil production rate versus time for heavy hydrocarbons and light hydrocarbons produced through a production well located in the middle of the formation in a simulation.

Figure 335:
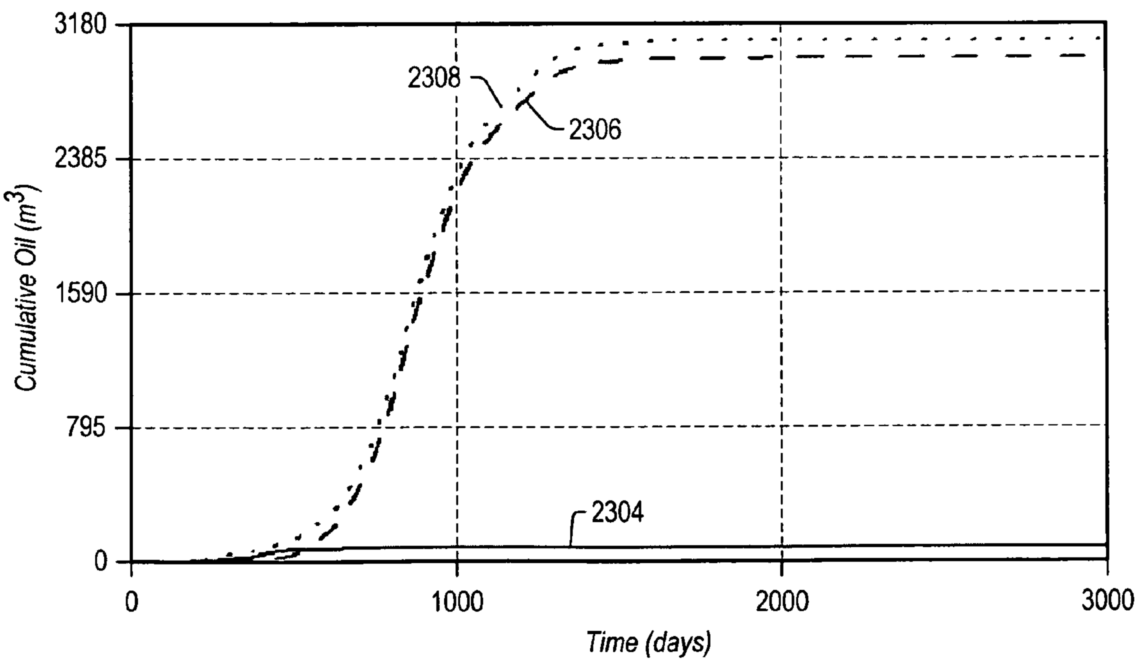

FIG. 335 illustrates cumulative oil production versus time for a triangular heater pattern used in a simulation.

Figure 336:
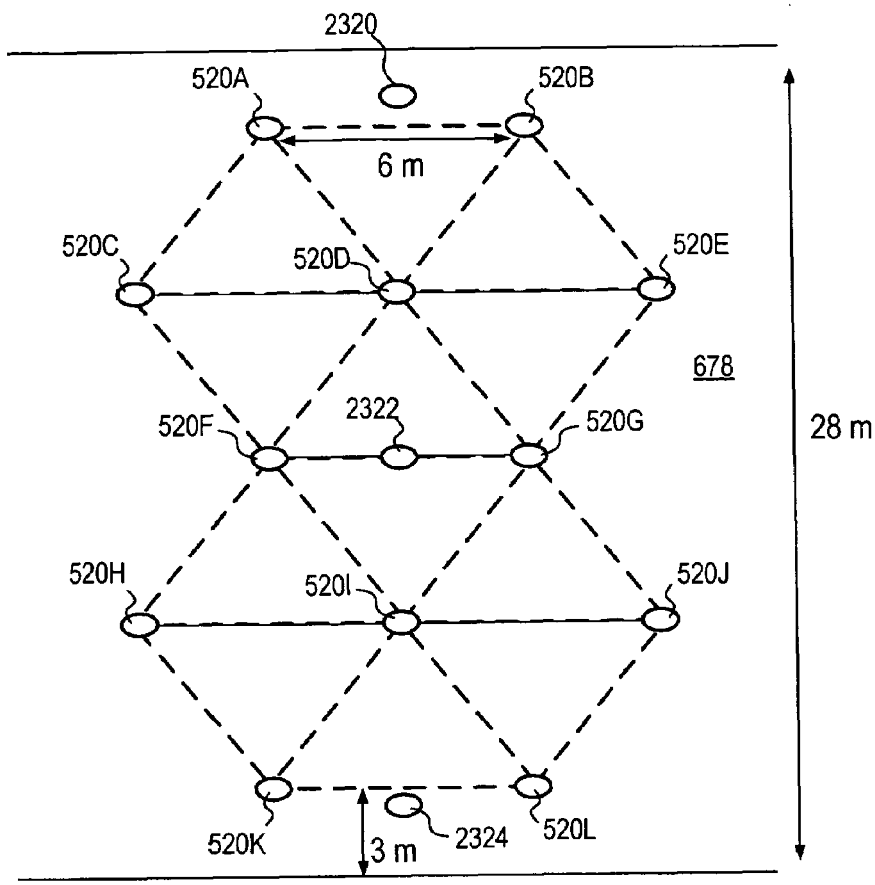

FIG. 336 illustrates a pattern of wells used for a simulation.

Figure 337:
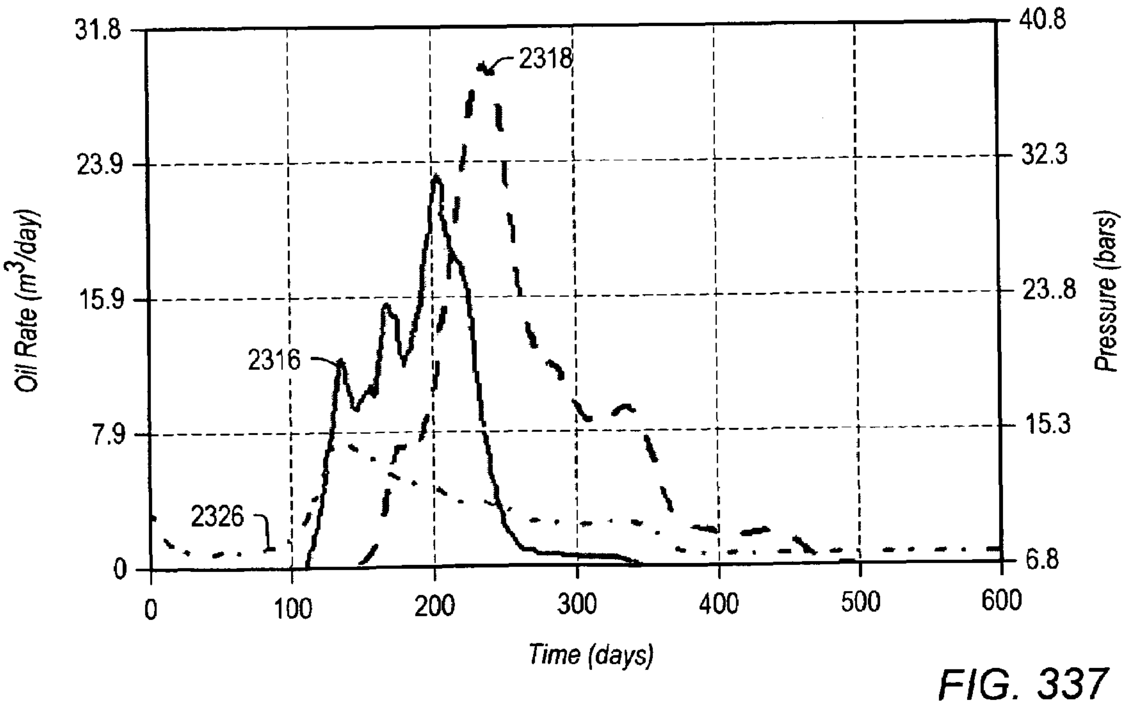

FIG. 337 illustrates oil production rate versus time for heavy hydrocarbons and light hydrocarbons for production using a bottom production well in a simulation.

Figure 338:
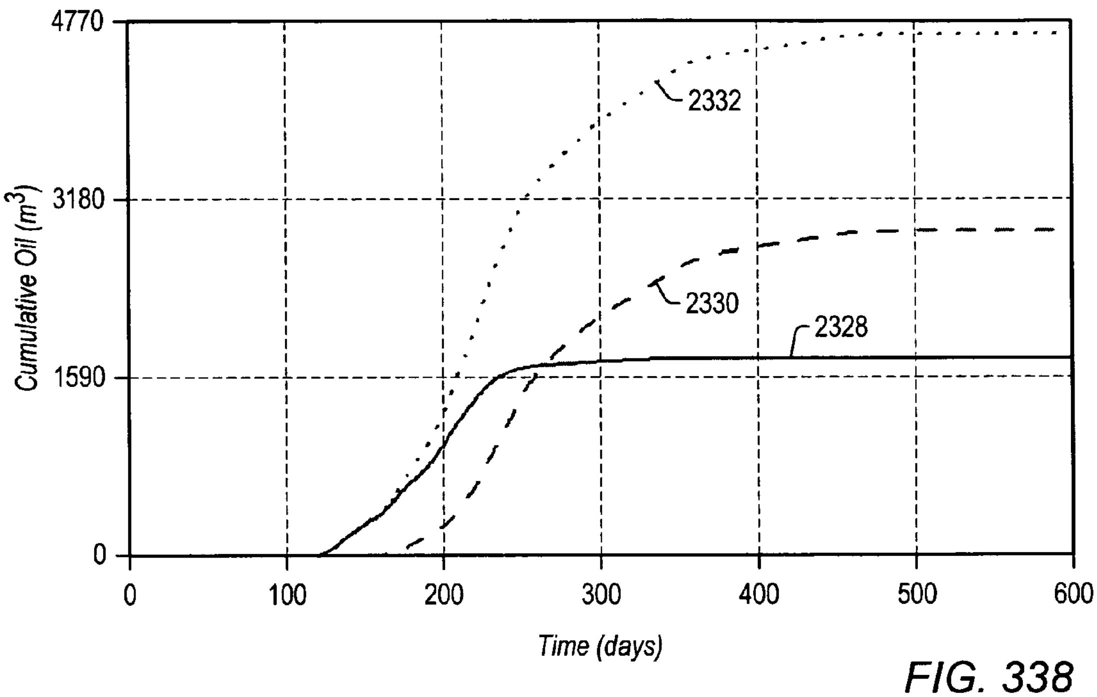

FIG. 338 illustrates cumulative oil production versus time for production through a bottom production well in a simulation.

Figure 339:
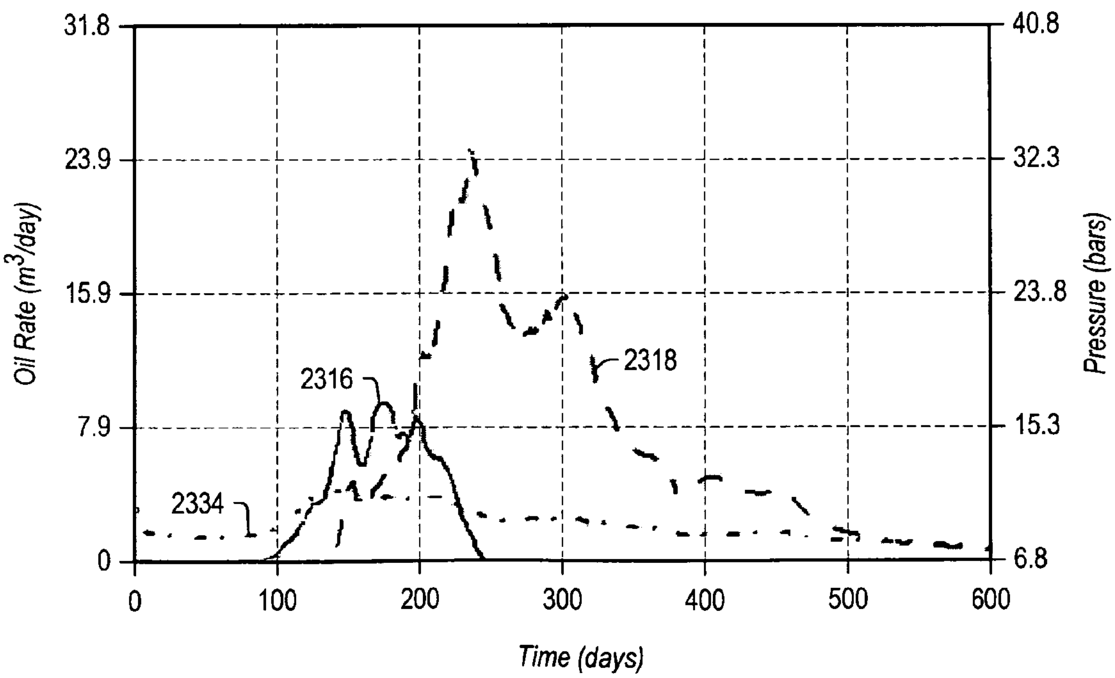

FIG. 339 illustrates oil production rate versus time for heavy hydrocarbons and light hydrocarbons for production using a middle production well in a simulation.

Figure 340:
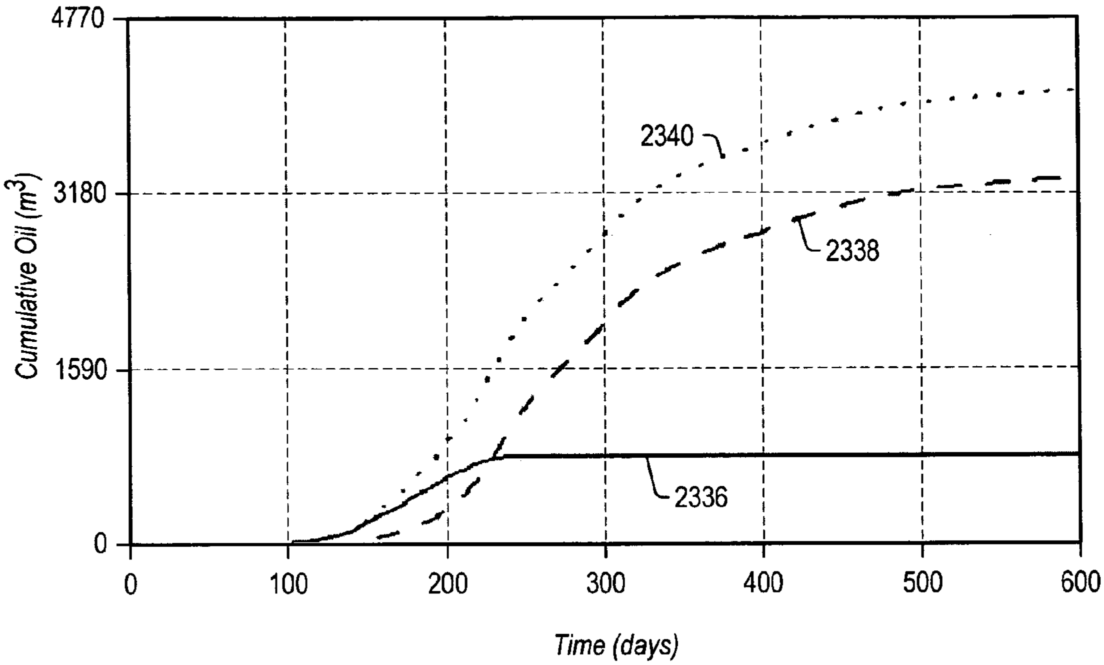

FIG. 340 illustrates cumulative oil production versus time for production through a middle production well in a simulation.

Figure 341:
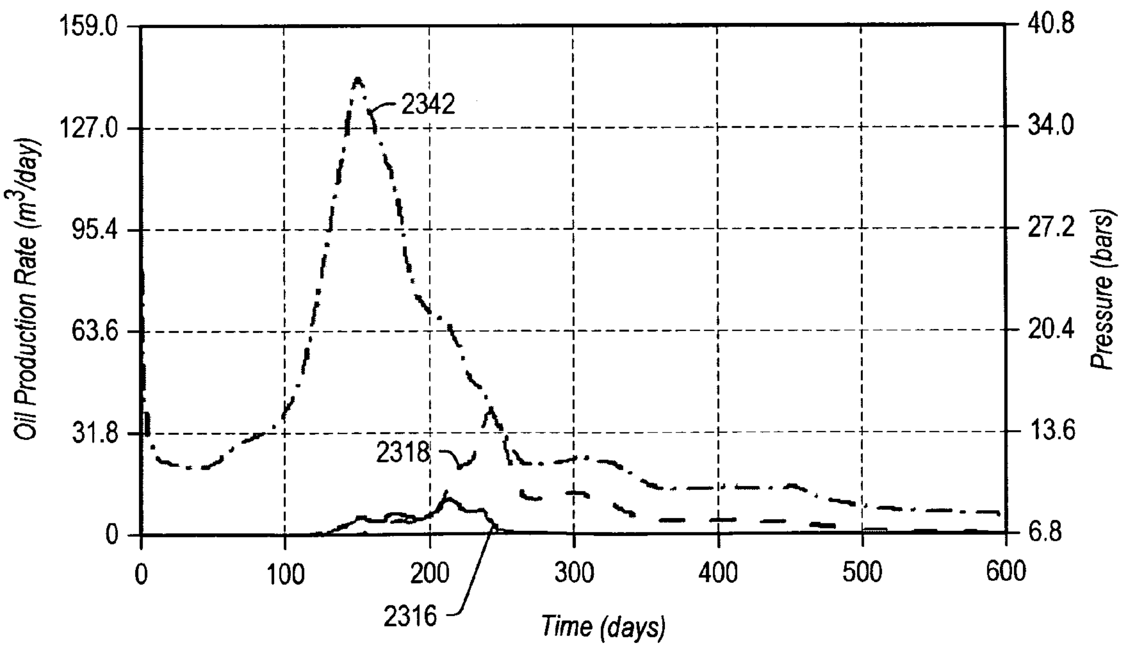

FIG. 341 illustrates oil production rate versus time for heavy hydrocarbon production and light hydrocarbon production for production using a top production well in a simulation.

Figure 342:
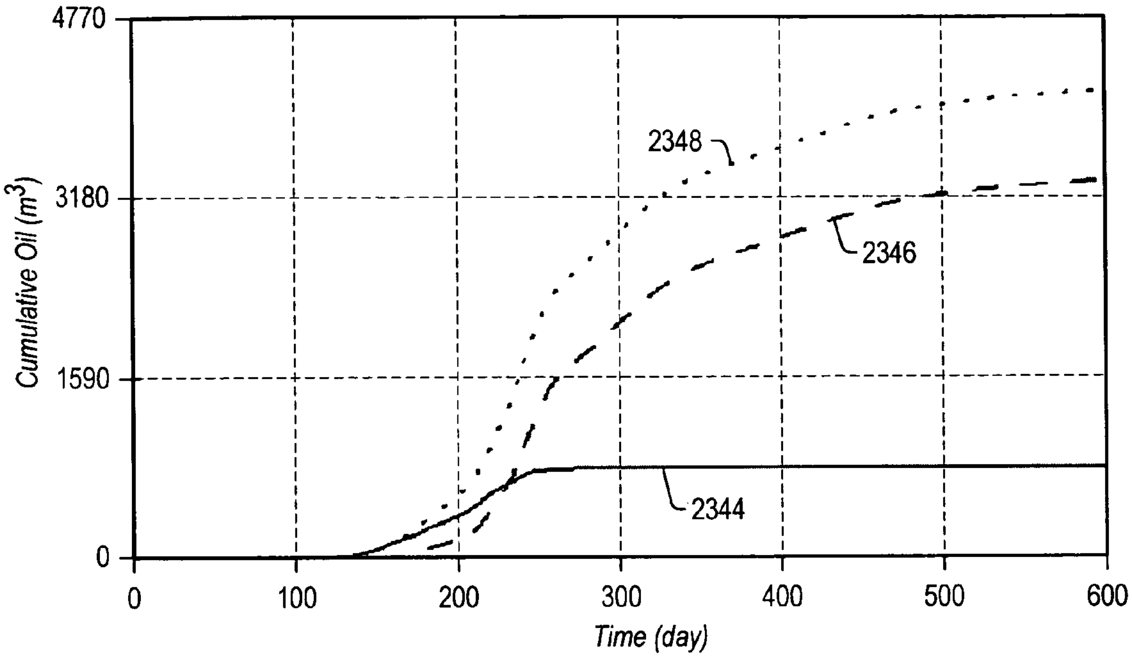

FIG. 342 illustrates cumulative oil production versus time for production through a top production well in a simulation.

Figure 343:
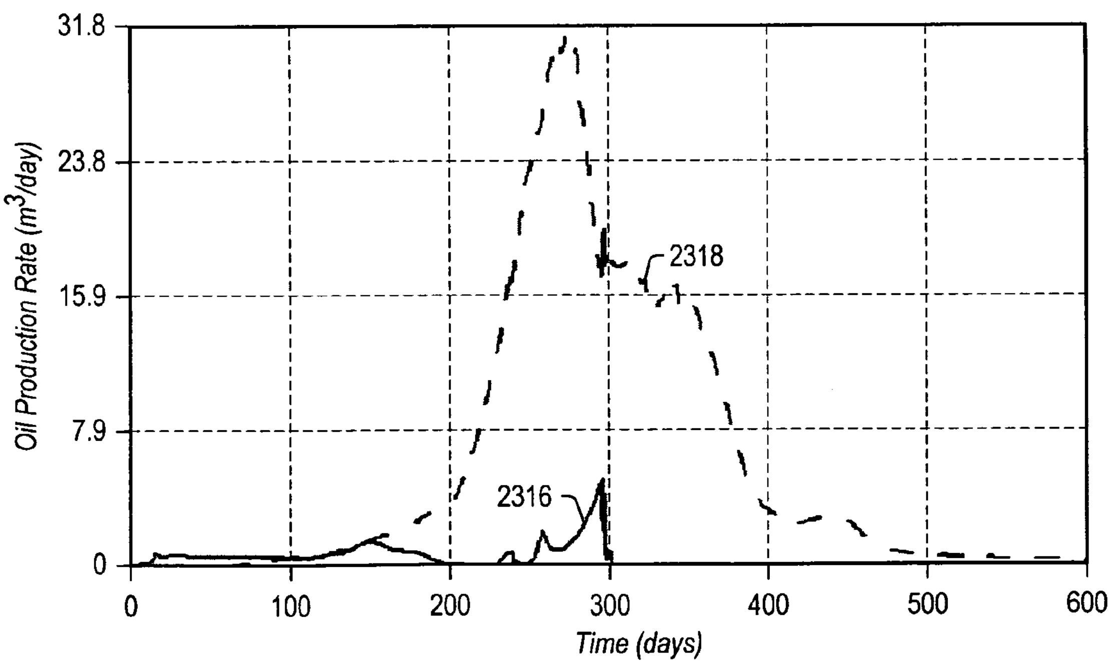

FIG. 343 illustrates oil production rate versus time for heavy hydrocarbons and light hydrocarbons produced in a simulation.

Figure 344:
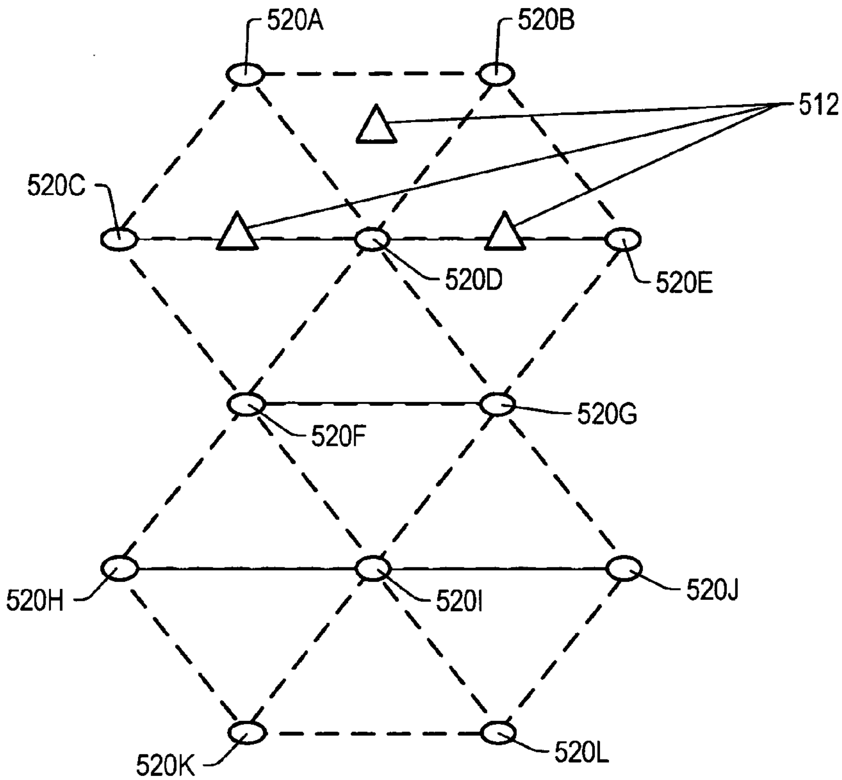

FIG. 344 depicts an embodiment of a well pattern used in a simulation.

Figure 345:
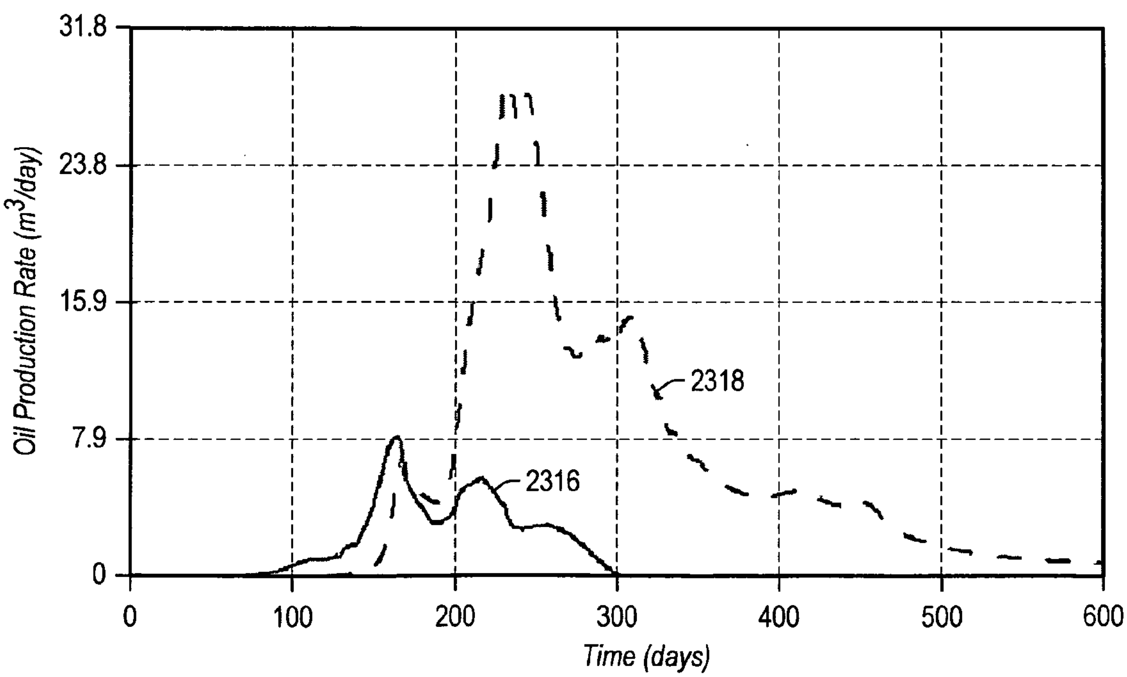

FIG. 345 illustrates oil production rate versus time for heavy hydrocarbons and light hydrocarbons for three production wells in a simulation.

Figure 346:
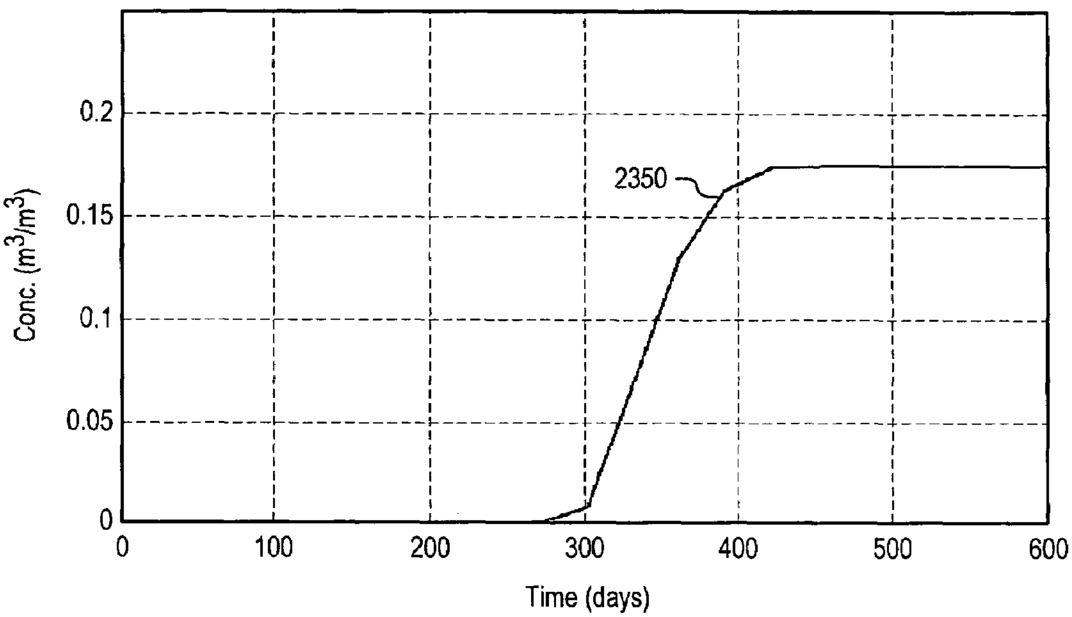
Figure 347:
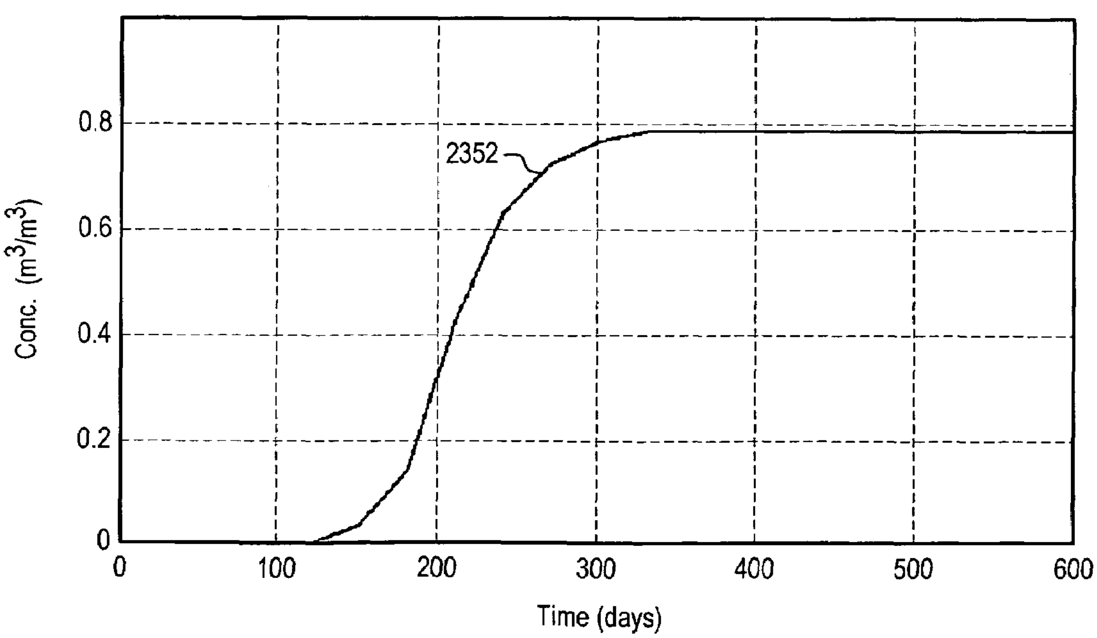

FIG. 346 and FIG. 347 illustrate coke deposition near heater wells.

Figure 348:
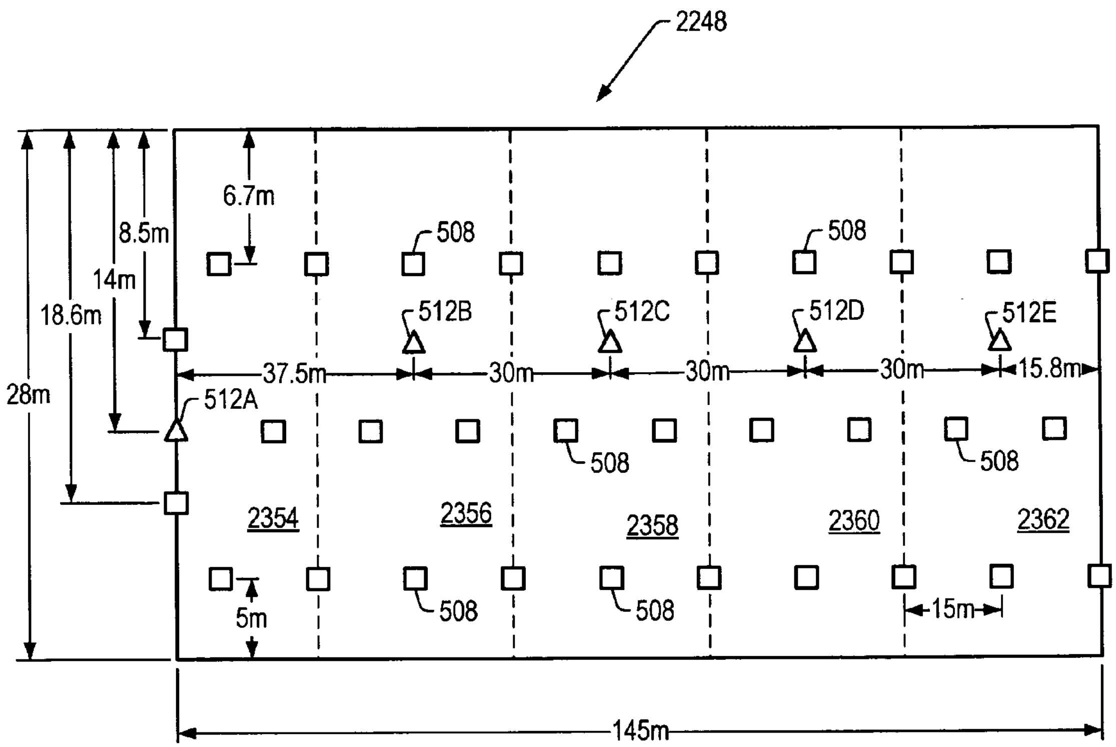

FIG. 348 depicts a large pattern of heater and producer wells used in a 3-D STARS simulation of an in situ process for a tar sands formation.

Figure 349:
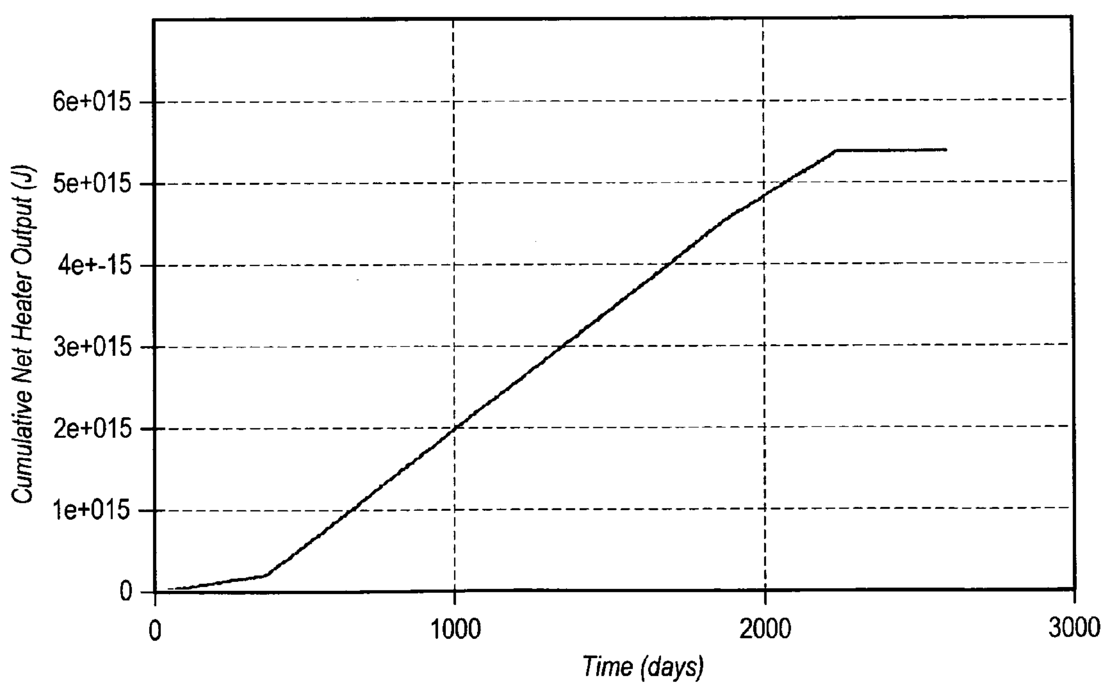

FIG. 349 depicts net heater output versus time for the simulation with the well pattern depicted in FIG. 348.

Figure 350:
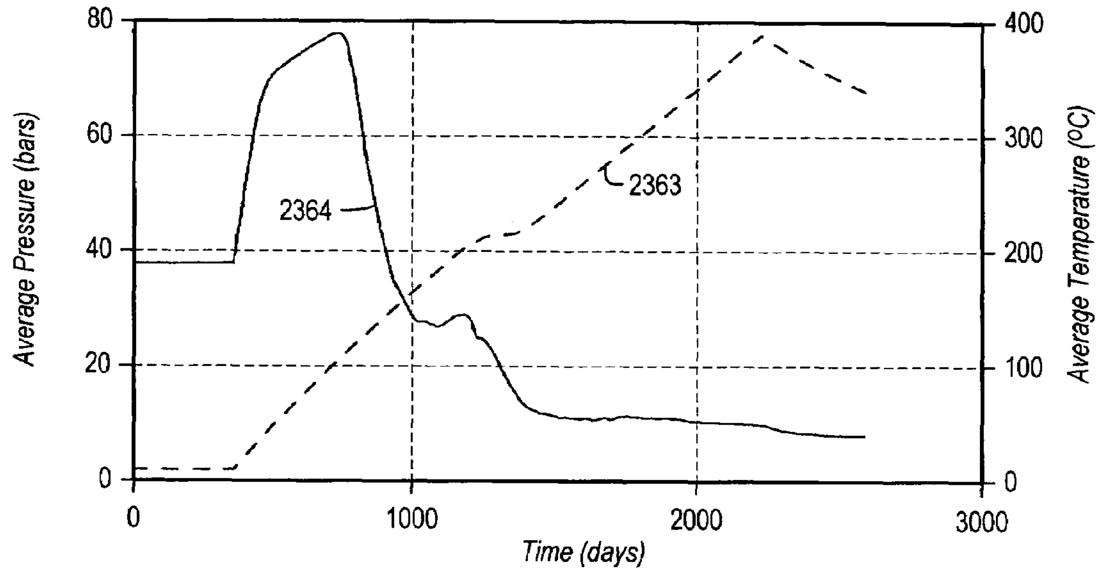

FIG. 350 depicts average pressure and average temperature versus time in a section of the formation for the simulation with the well pattern depicted in FIG. 348.

Figure 351:
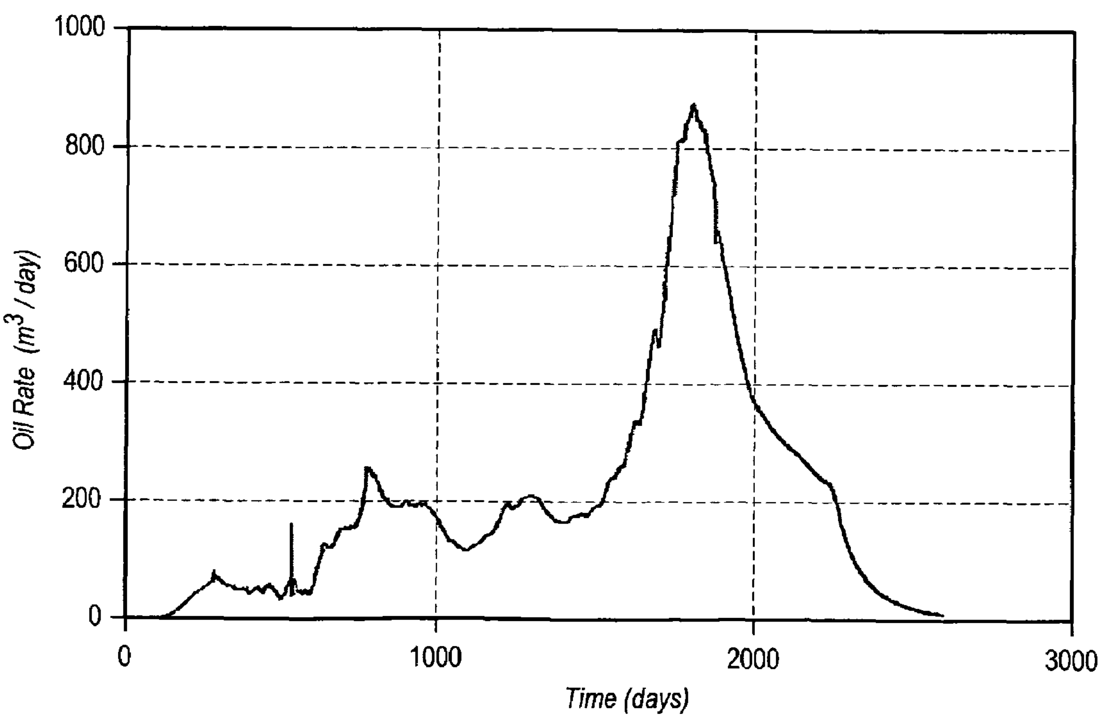

FIG. 351 depicts oil production rate versus time as calculated in the simulation with the well pattern depicted in FIG. 348.

Figure 352:
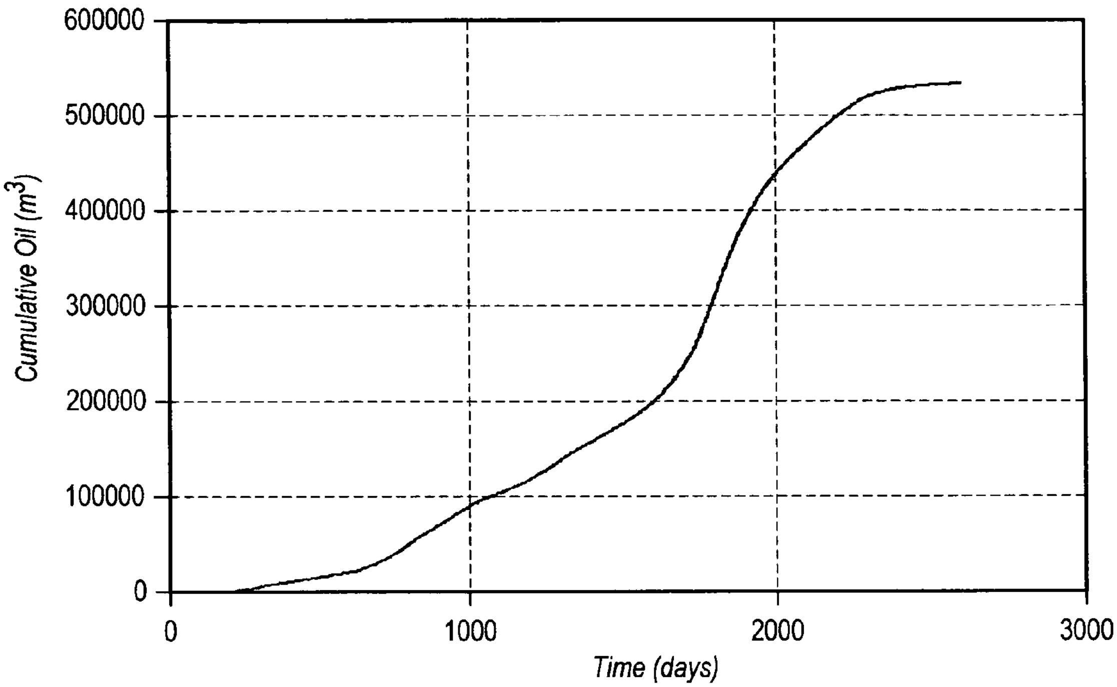

FIG. 352 depicts cumulative oil production versus time as calculated in the simulation with the well pattern depicted in FIG. 348.

Figure 353:
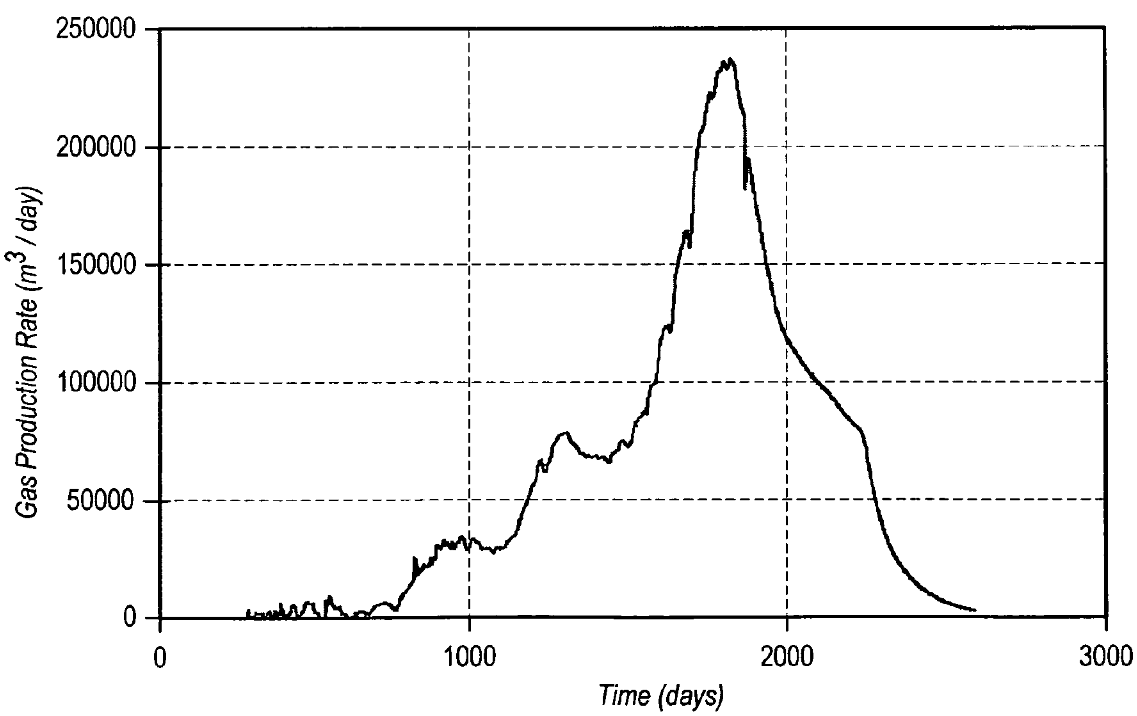

FIG. 353 depicts gas production rate versus time as calculated in the simulation with the well pattern depicted in FIG. 348.

Figure 354:
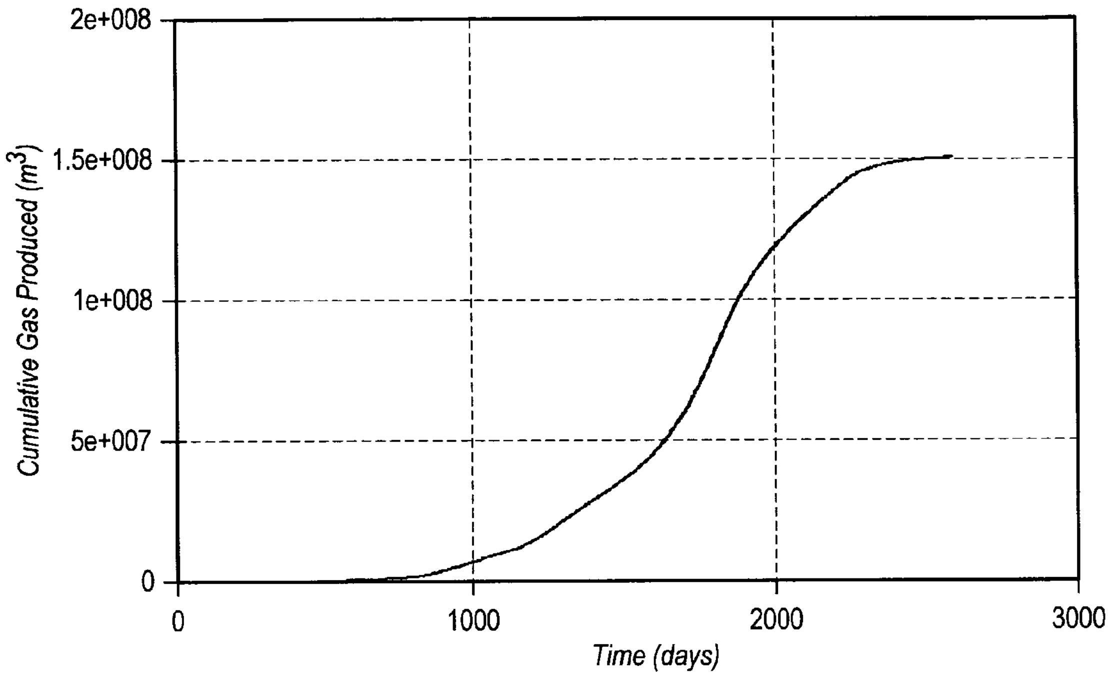

FIG. 354 depicts cumulative gas production versus time as calculated in the simulation with the well pattern depicted in FIG. 348.

Figure 355:
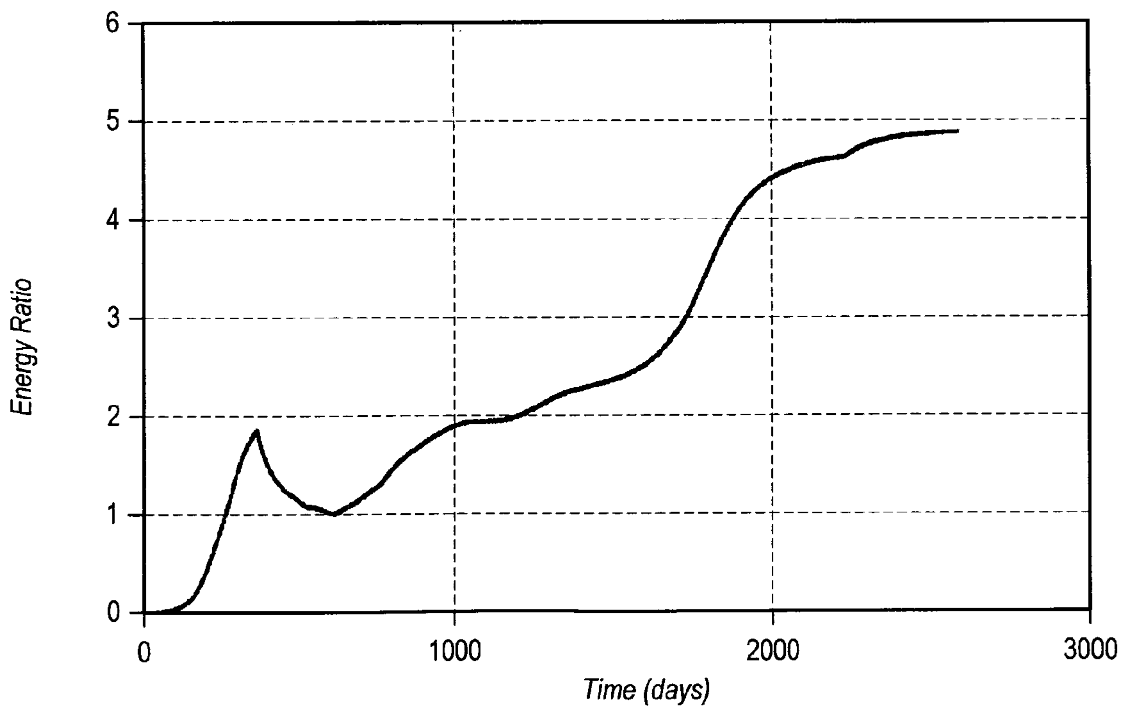

FIG. 355 depicts energy ratio versus time as calculated in the simulation with the well pattern depicted in FIG. 348.

Figure 356:
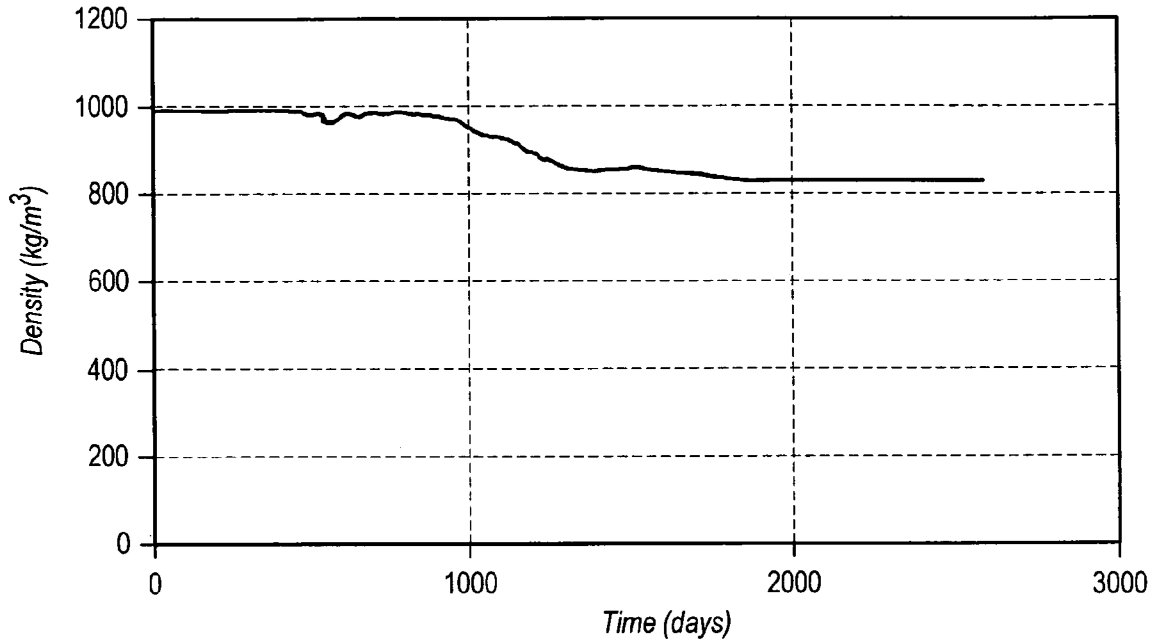

FIG. 356 depicts average oil density versus time for the simulation with the well pattern depicted in FIG. 348.

Figure 357:
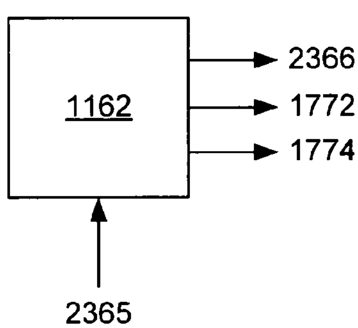

FIG. 357 depicts a schematic of a surface treatment configuration that separates formation fluid as it is being produced from a formation.

Figure 358:
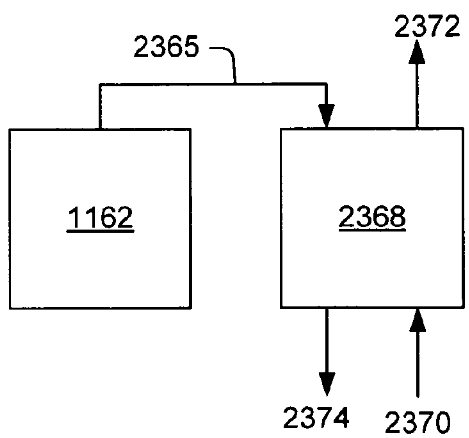

FIG. 358 depicts a schematic of a treatment facility configuration that heats a fluid for use in an in situ treatment process and/or a treatment facility configuration.

Figure 359:
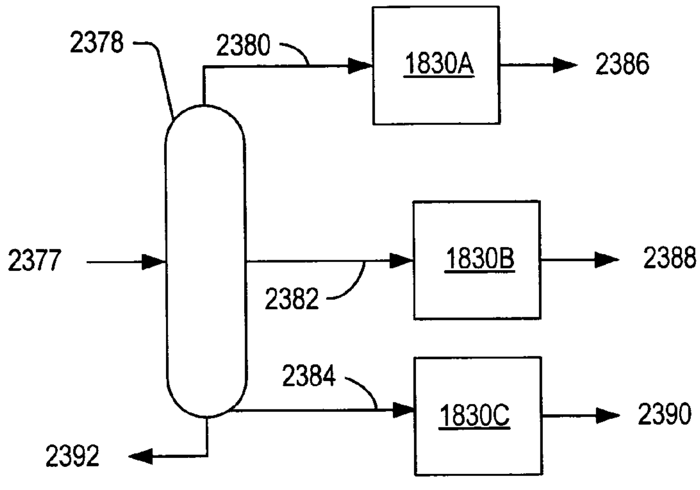

FIG. 359 depicts a schematic of an embodiment of a fractionator that separates component streams from a synthetic condensate.

Figure 360:
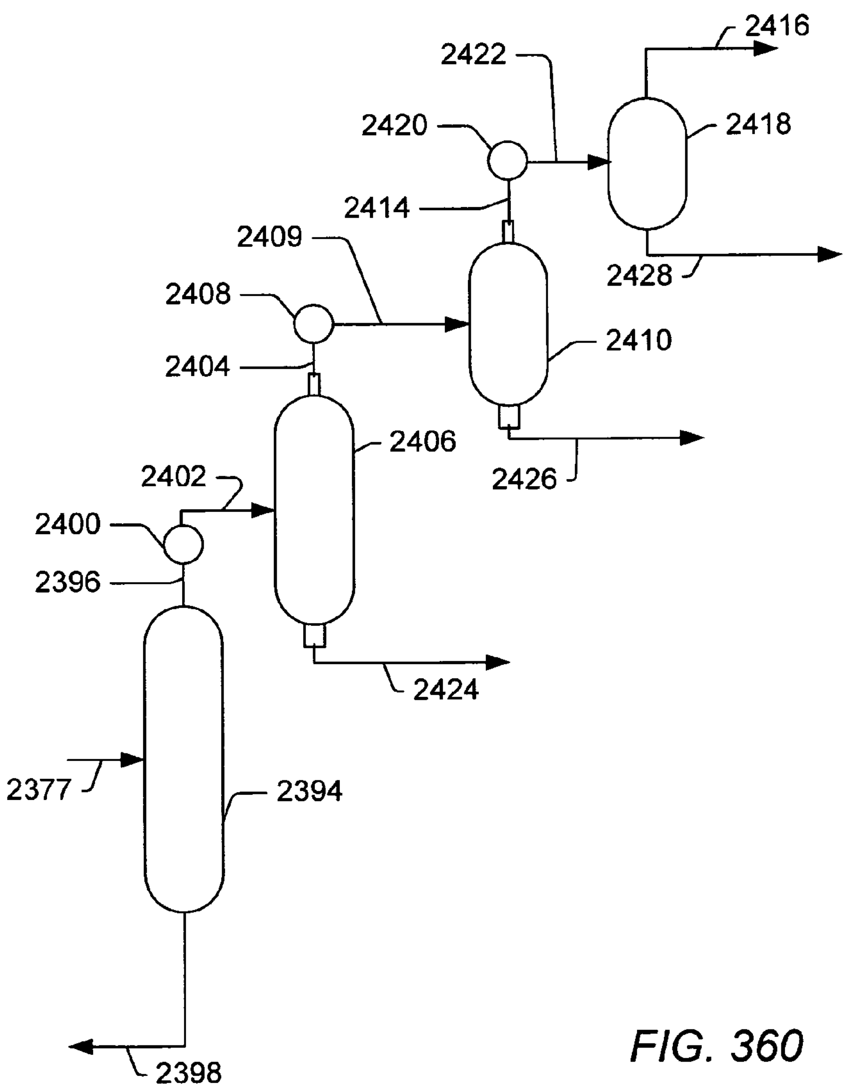

FIG. 360 depicts a schematic of an embodiment of a series of separation units used to separate component streams from synthetic condensate.

Figure 361:
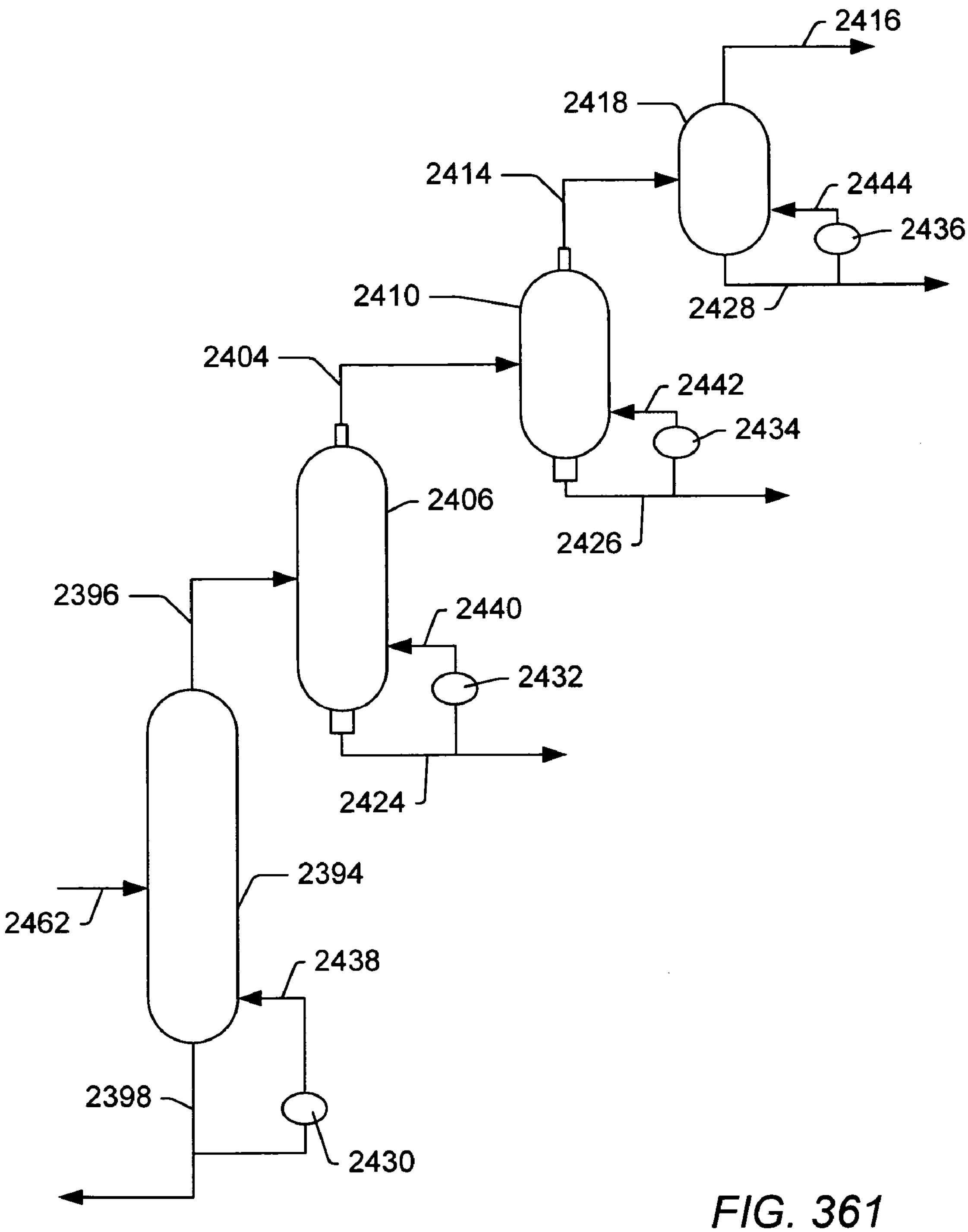

FIG. 361 depicts a schematic an embodiment of a series of separation units used to separate bottoms into fractions.

Figure 362:
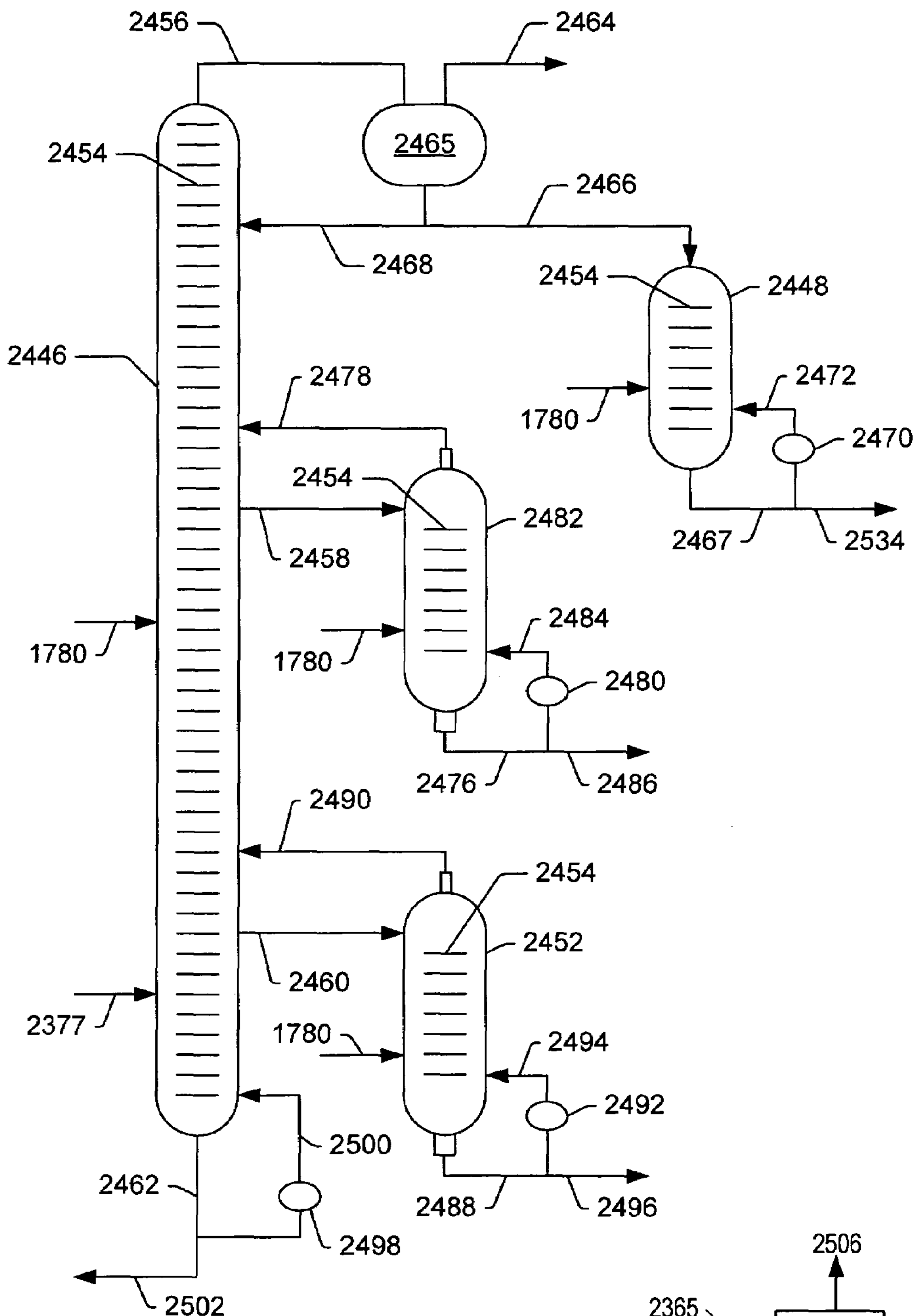

FIG. 362 depicts a schematic of an embodiment of a surface treatment configuration used to reactively distill a synthetic condensate.

Figure 363:
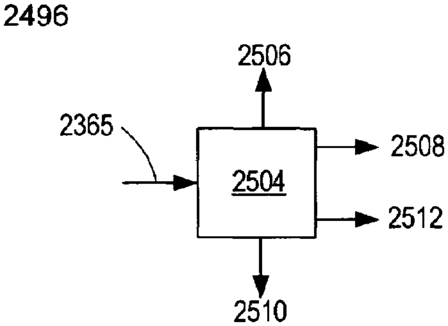

FIG. 363 depicts a schematic of an embodiment of a surface treatment configuration that separates formation fluid through condensation.

Figure 364:
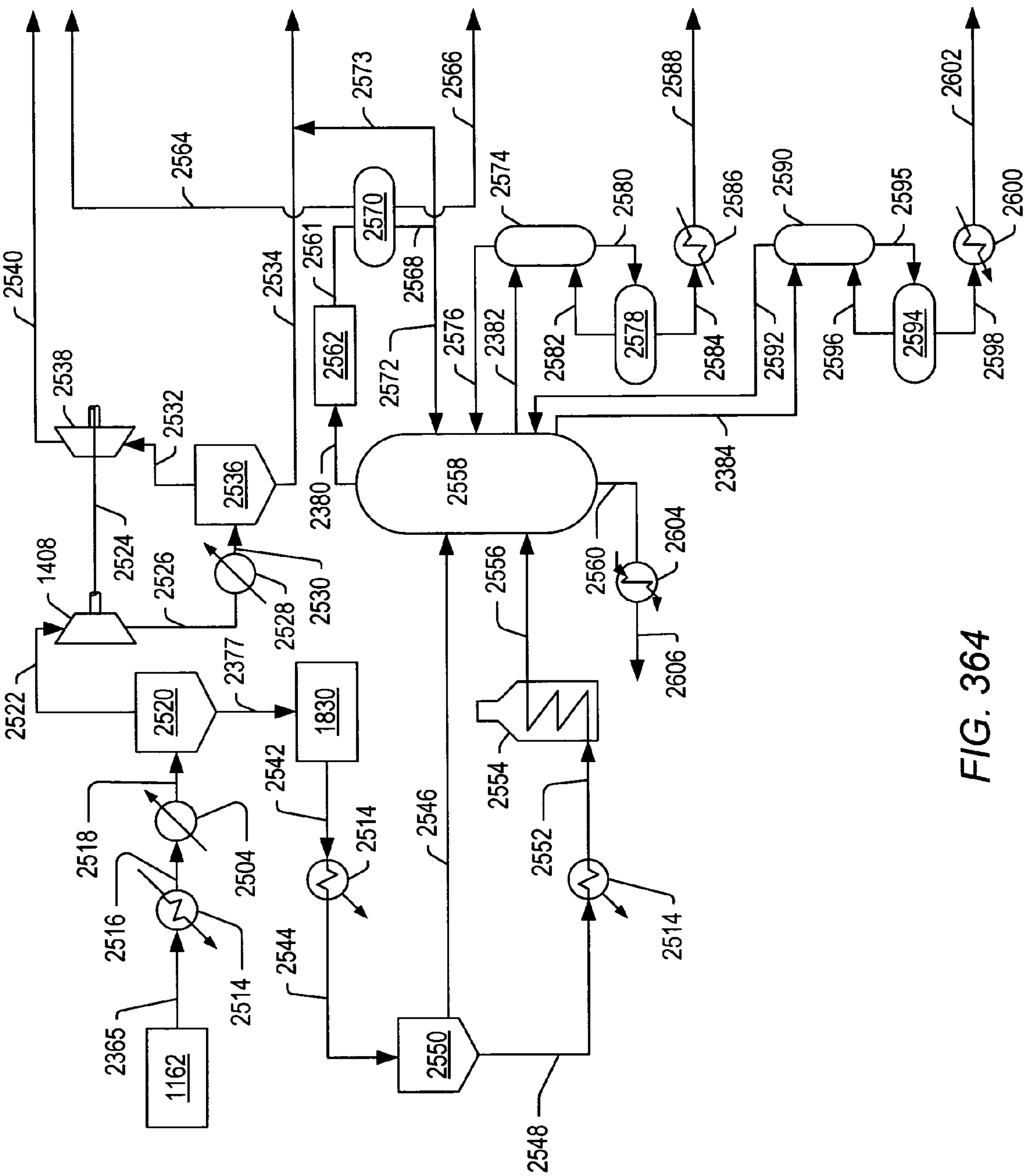

FIG. 364 depicts a schematic of an embodiment of a surface treatment configuration that hydrotreats untreated formation fluid.

Figure 365:
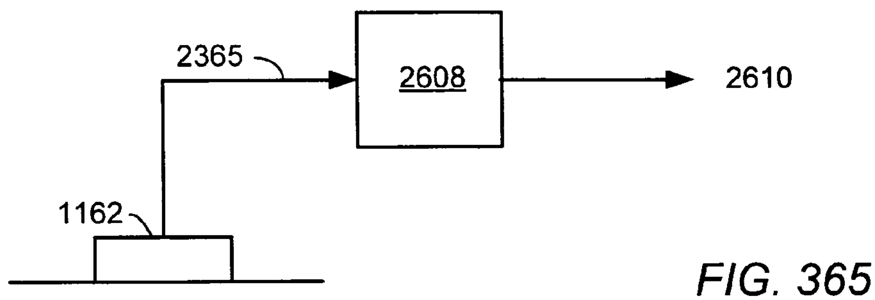

FIG. 365 depicts a schematic of an embodiment of a surface treatment configuration that converts formation fluid into olefins.

Figure 366:
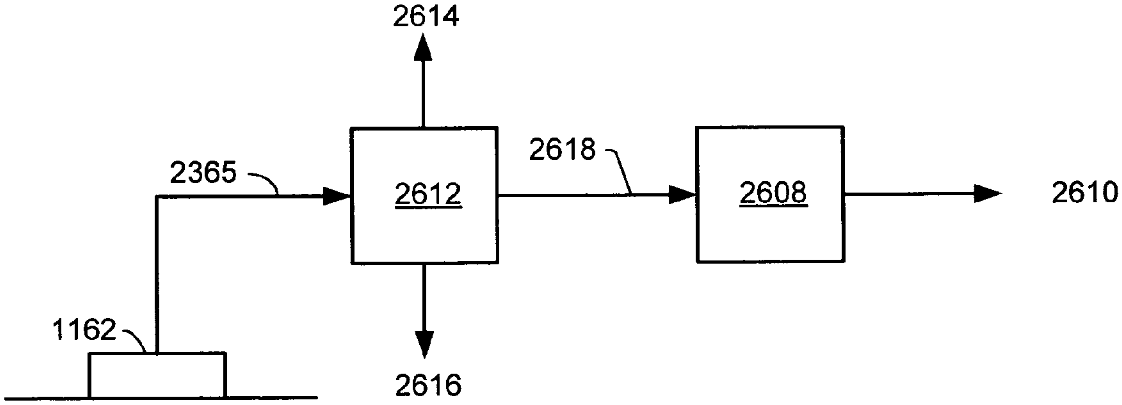

FIG. 366 depicts a schematic of an embodiment of a surface treatment configuration that removes a component and converts formation fluid into olefins.

Figure 367:
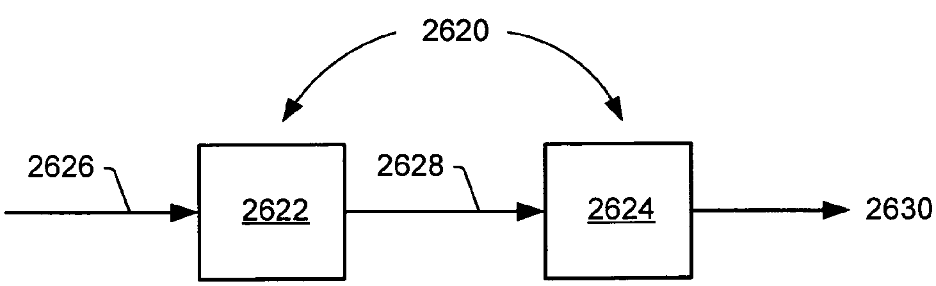

FIG. 367 depicts a schematic of an embodiment of a surface treatment configuration that converts formation fluid into olefins using a heating unit and a quenching unit.

Figure 368:
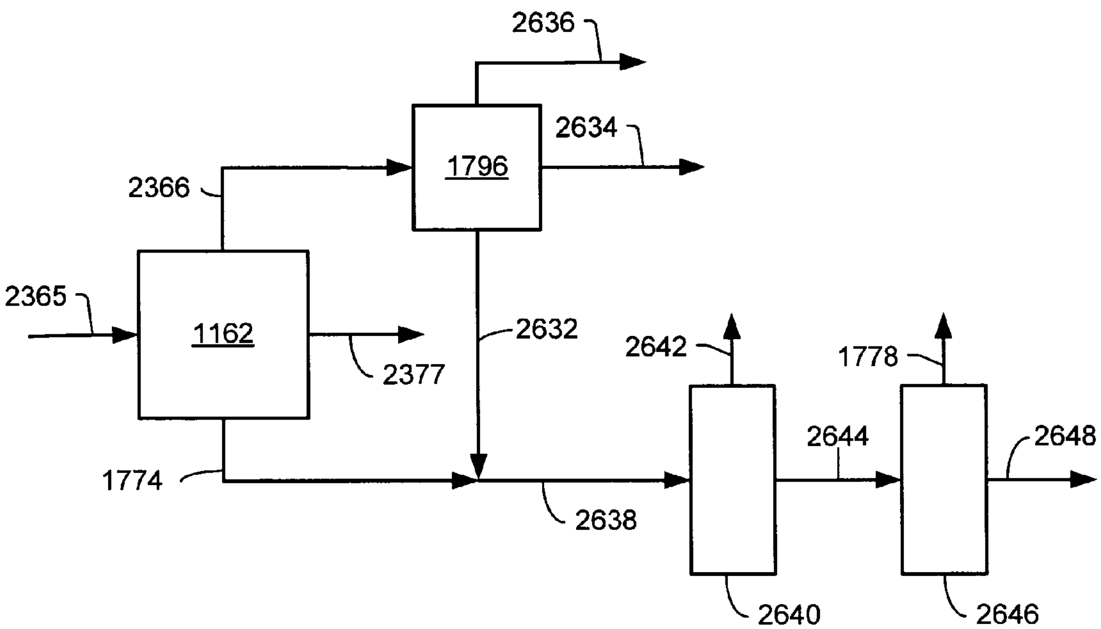

FIG. 368 depicts a schematic of an embodiment of a surface treatment configuration that separates ammonia and hydrogen sulfide from water produced in the formation.

Figure 369:
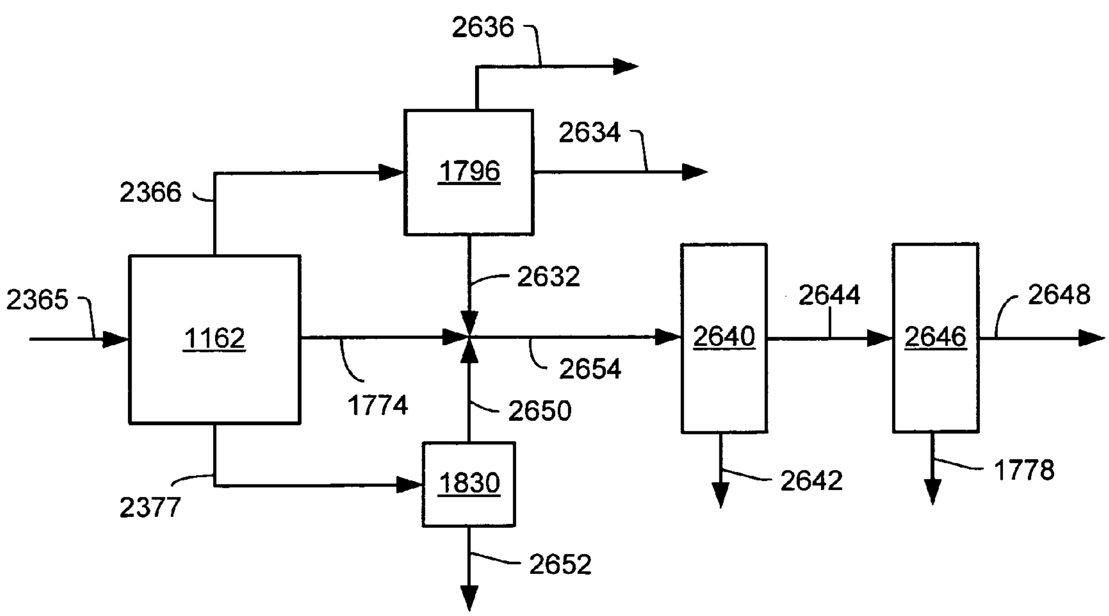

FIG. 369 depicts a schematic of an embodiment of a surface treatment configuration used to produce and separate ammonia.

Figure 370:
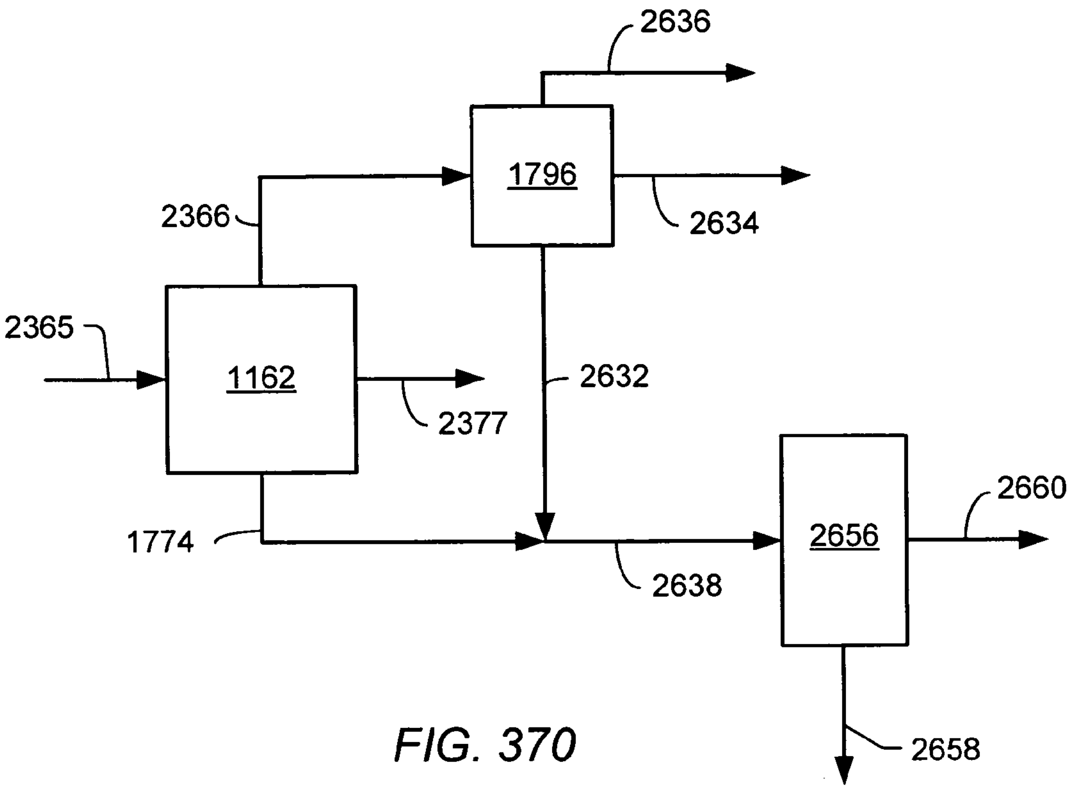

FIG. 370 depicts a schematic of an embodiment of a surface treatment configuration that separates ammonia and hydrogen sulfide from water produced in the formation.

Figure 371:
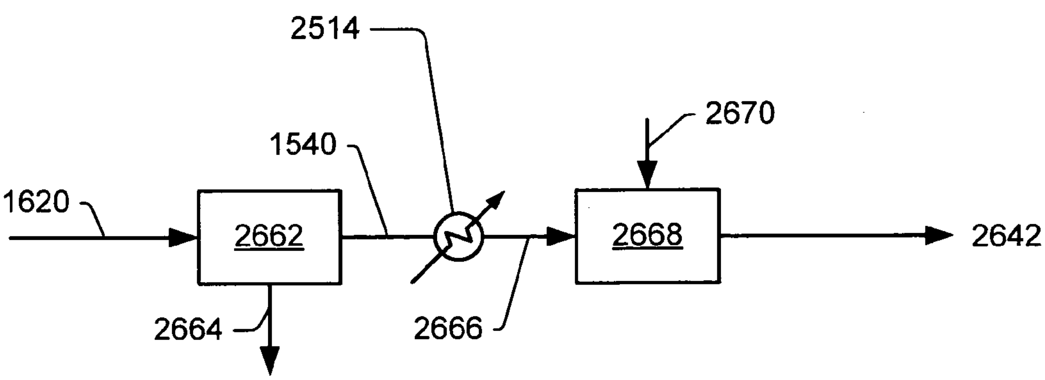

FIG. 371 depicts a schematic of an embodiment of a surface treatment configuration that produces ammonia on site.

Figure 372:
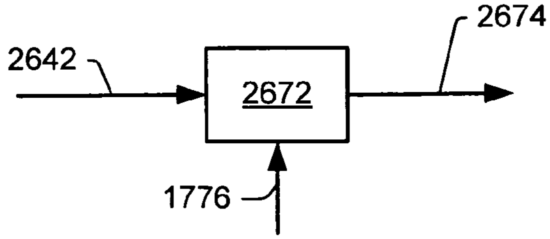

FIG. 372 depicts a schematic of an embodiment of a surface treatment configuration used for the synthesis of urea.

Figure 373:
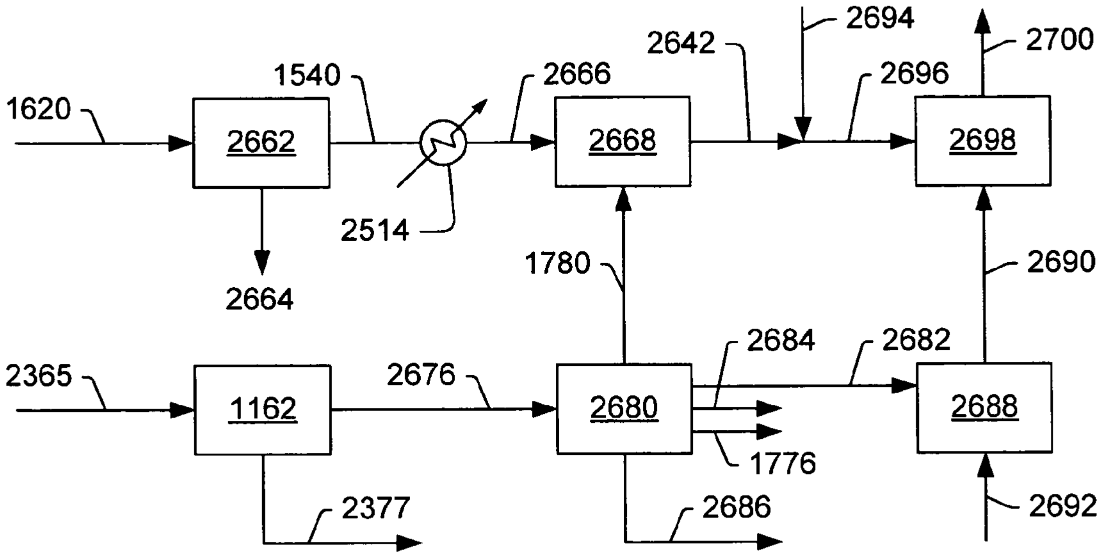

FIG. 373 depicts a schematic of an embodiment of a surface treatment configuration that synthesizes ammonium sulfate.

Figure 374:
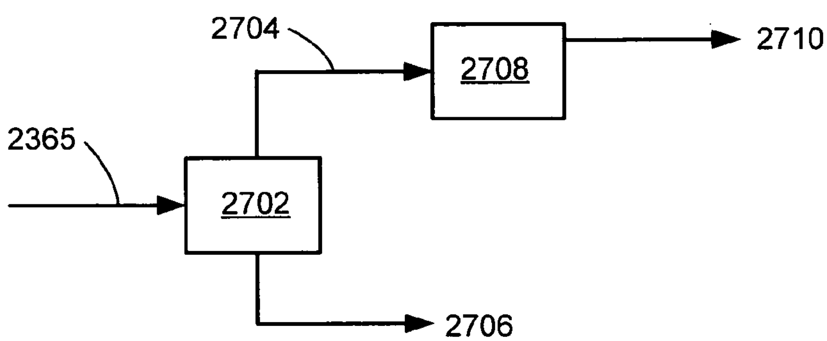

FIG. 374 depicts an embodiment of surface treatment units used to separate phenols from formation fluid.

Figure 375:
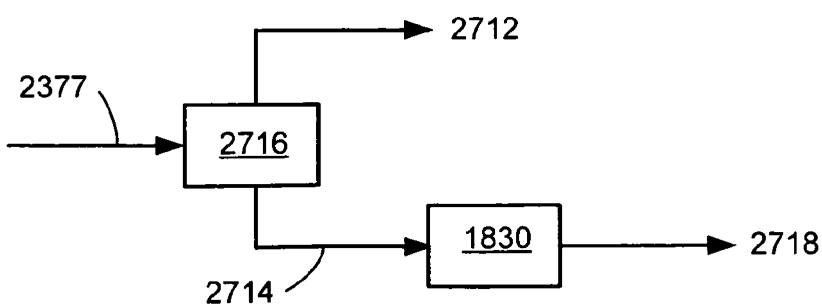

FIG. 375 depicts a schematic of an embodiment of a surface treatment configuration used to separate BTEX compounds from formation fluid.

Figure 376:
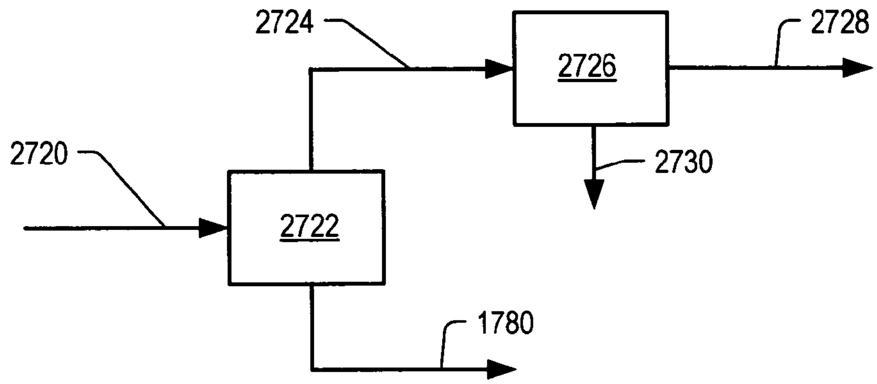

FIG. 376 depicts a schematic of an embodiment of a surface treatment configuration used to recover BTEX compounds from a naphtha fraction.

Figure 377:
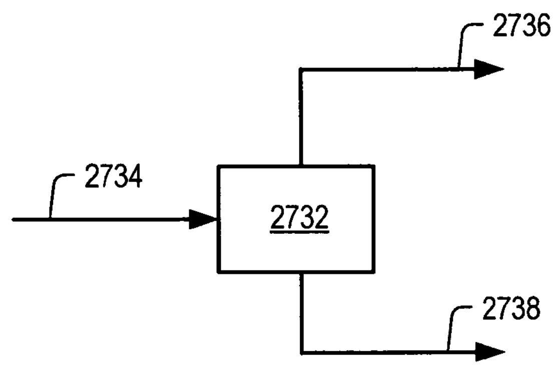

FIG. 377 depicts a schematic of an embodiment of a surface treatment configuration that separates a component from a heart cut.

Figure 378:
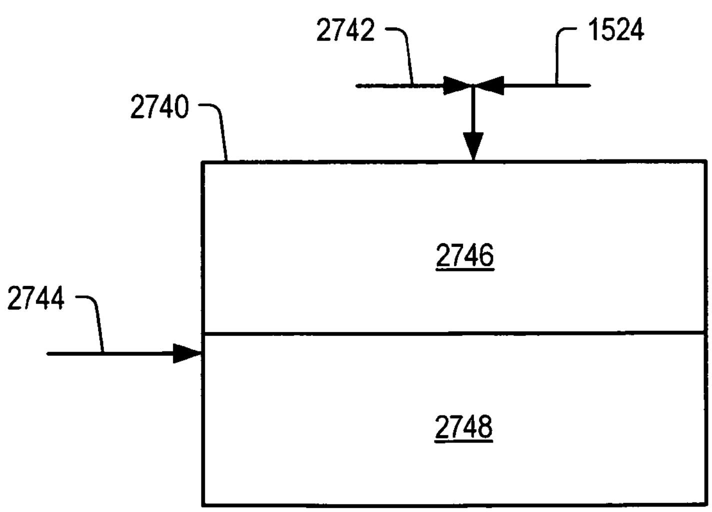

FIG. 378 illustrates experiments performed in a batch mode.

Figure 379:
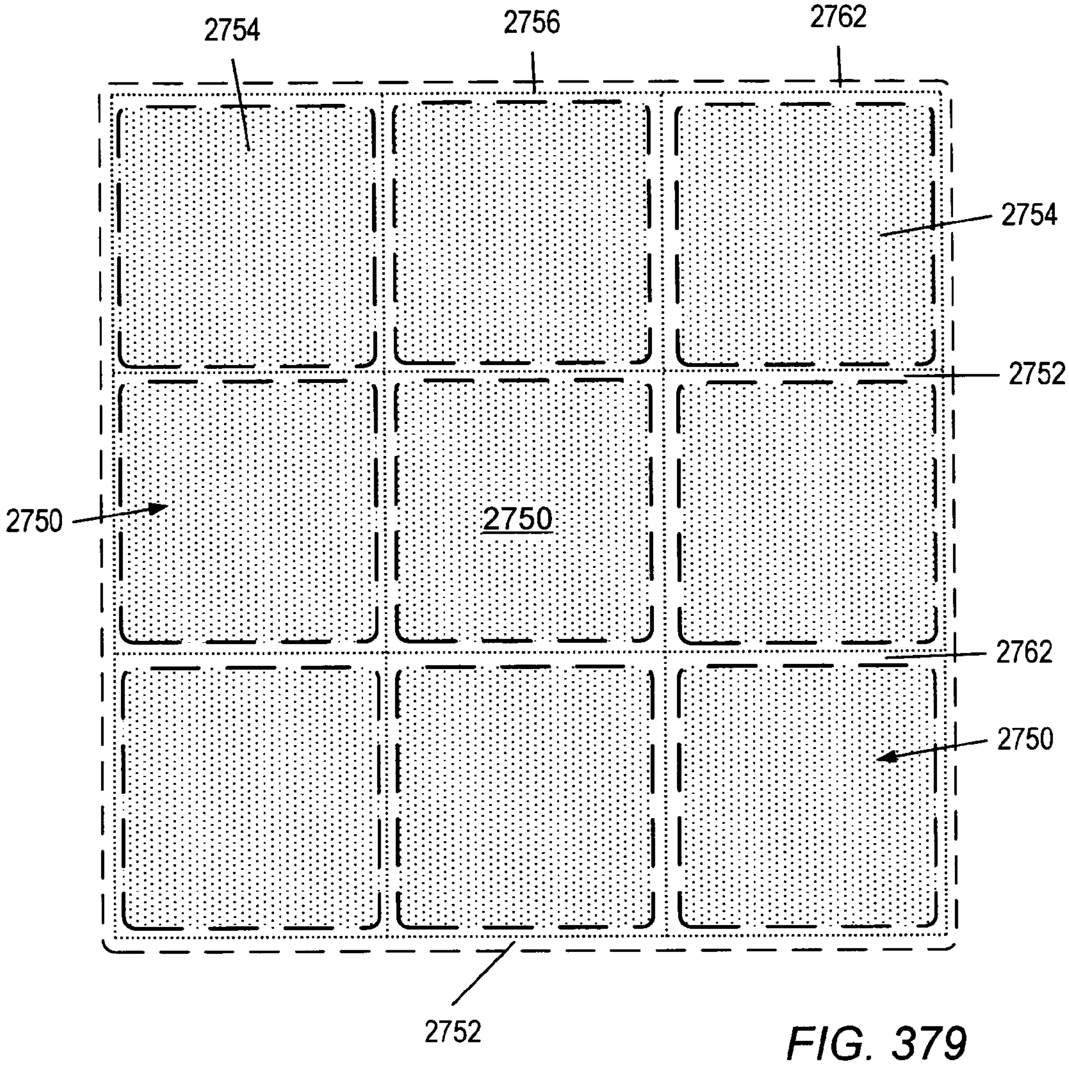

FIG. 379 depicts a plan view representation of an embodiment of treatment areas formed by perimeter barriers.

Figure 380:
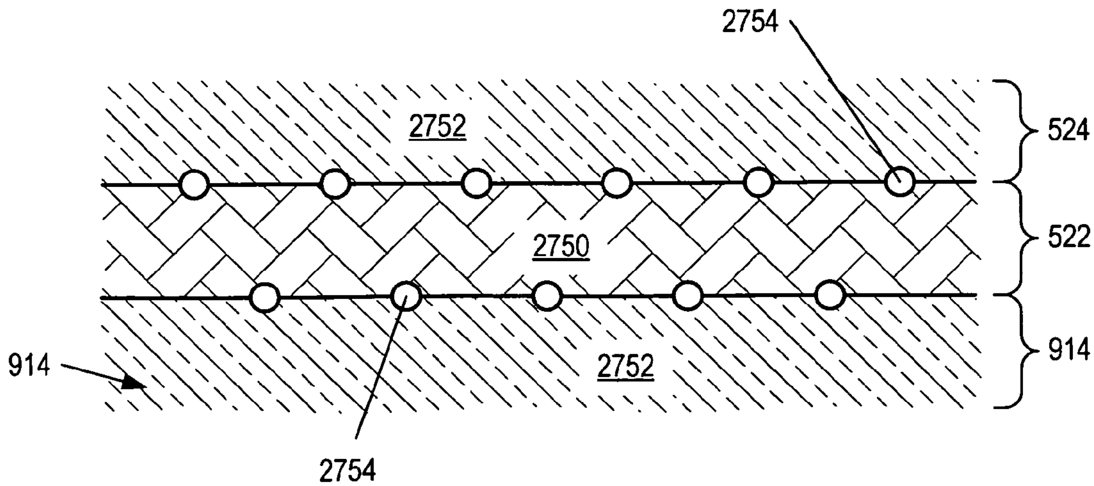

FIG. 380 depicts a side representation of an embodiment of an in situ conversion process system used to treat a thin rich formation.

Figure 381:
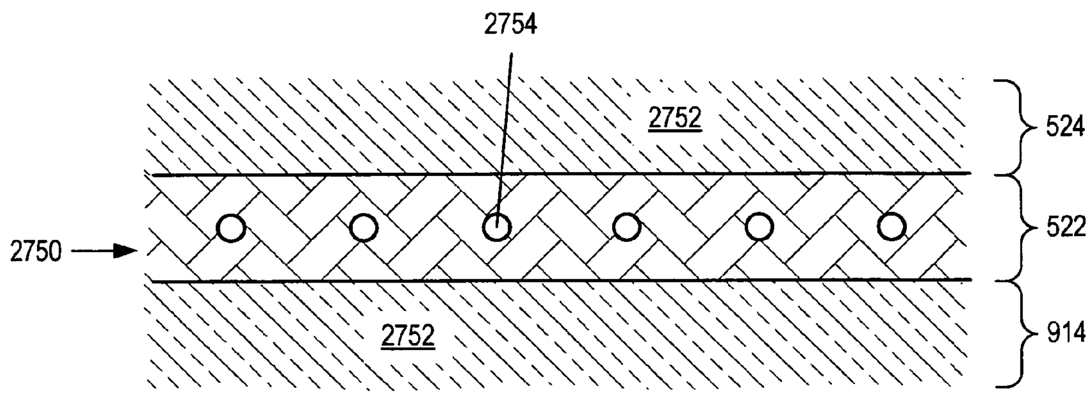

FIG. 381 depicts a side representation of an embodiment of an in situ conversion process system used to treat a thin rich formation.

Figure 382:
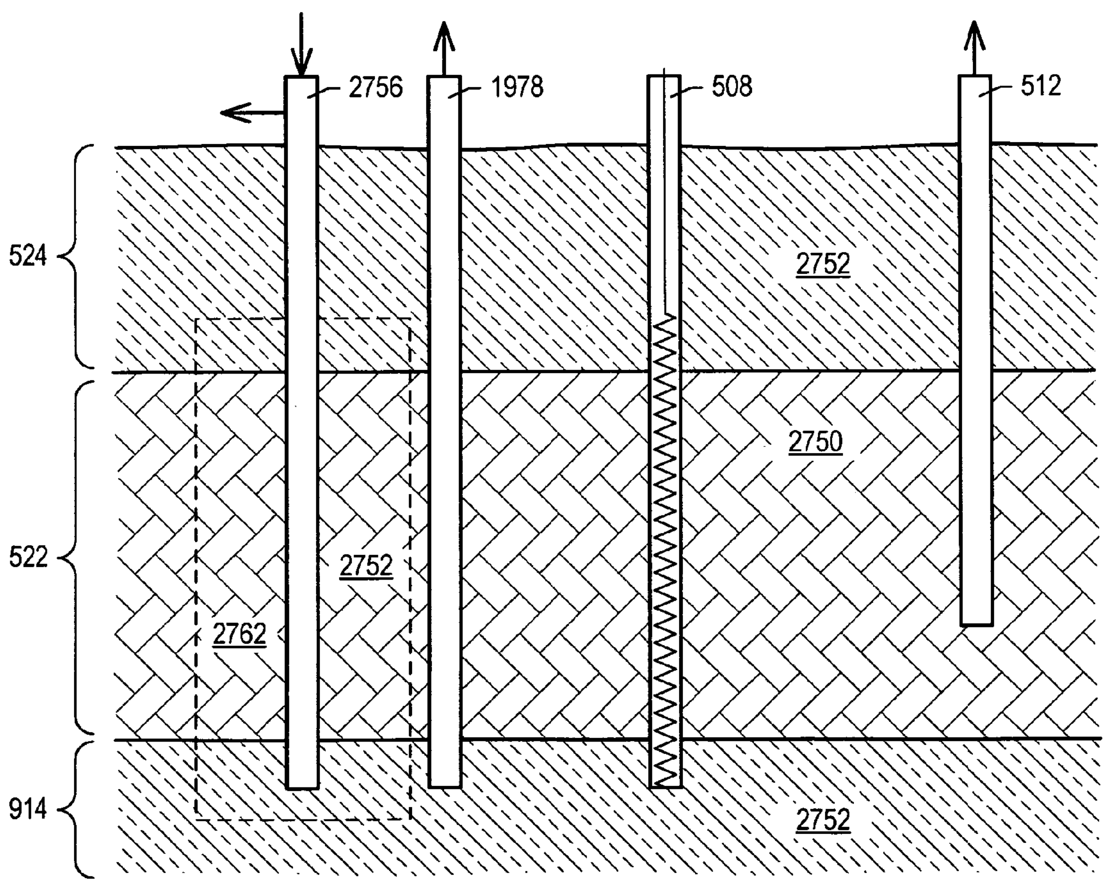

FIG. 382 depicts a side representation of an embodiment of an in situ conversion process system.

Figure 383:
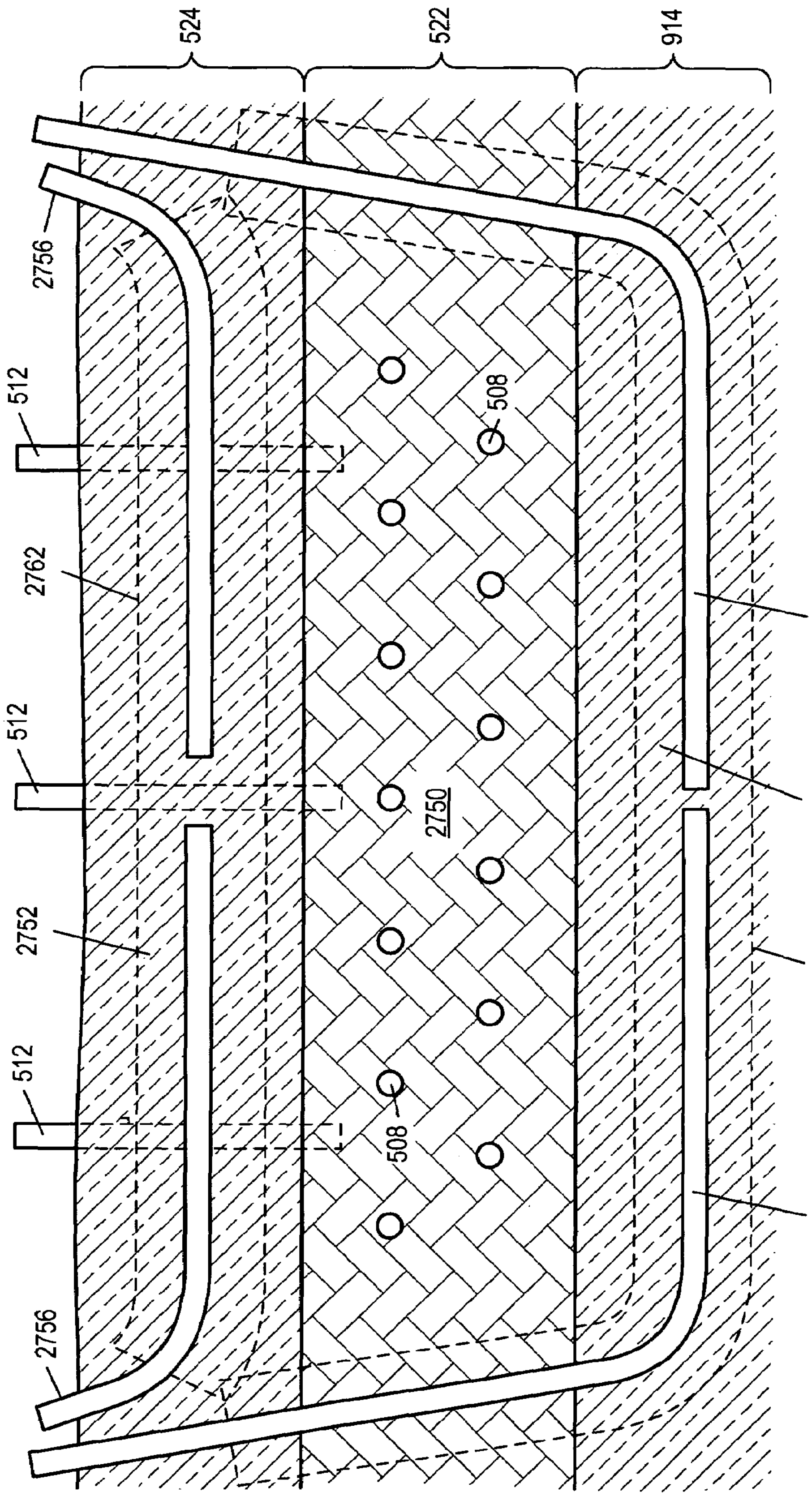

FIG. 383 depicts a side representation of an embodiment of an in situ conversion process system with an installed upper perimeter barrier and an installed lower perimeter barrier.

Figure 384:
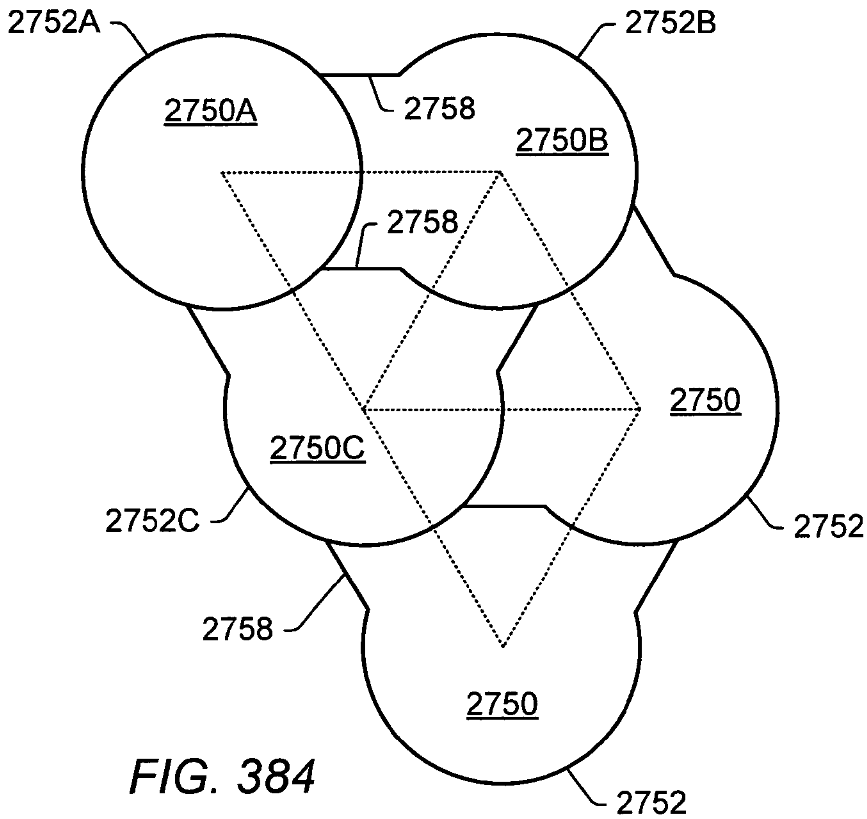

FIG. 384 depicts a plan view representation of an embodiment of treatment areas formed by perimeter barriers having arced portions, wherein the centers of the arced portions are in an equilateral triangle pattern.

Figure 385:
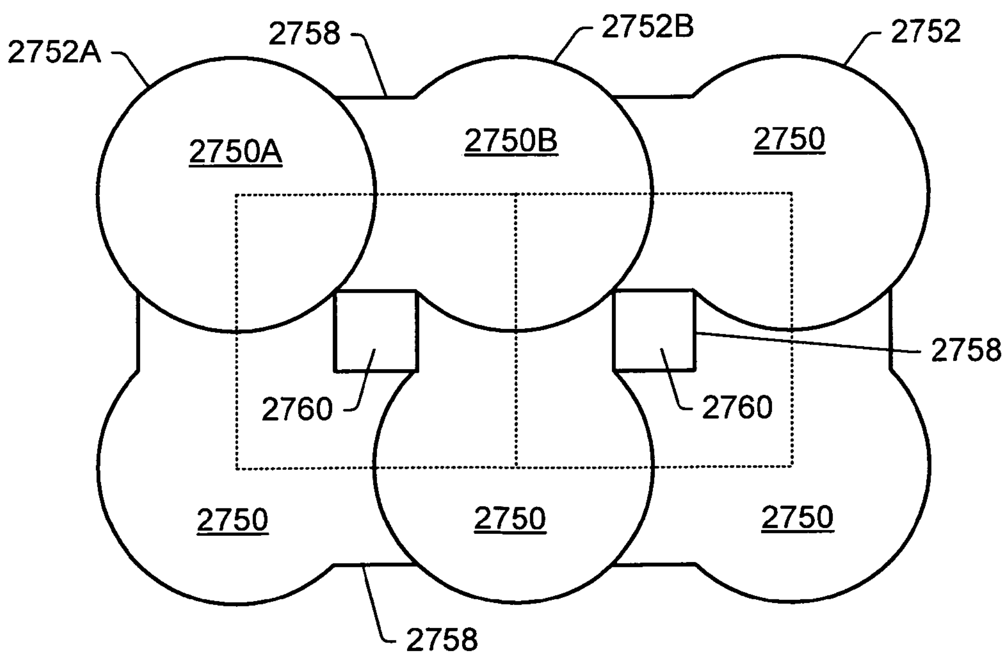

FIG. 385 depicts a plan view representation of an embodiment of treatment areas formed by perimeter barriers having arced portions, wherein the centers of the arced portions are in a square pattern.

Figure 386:
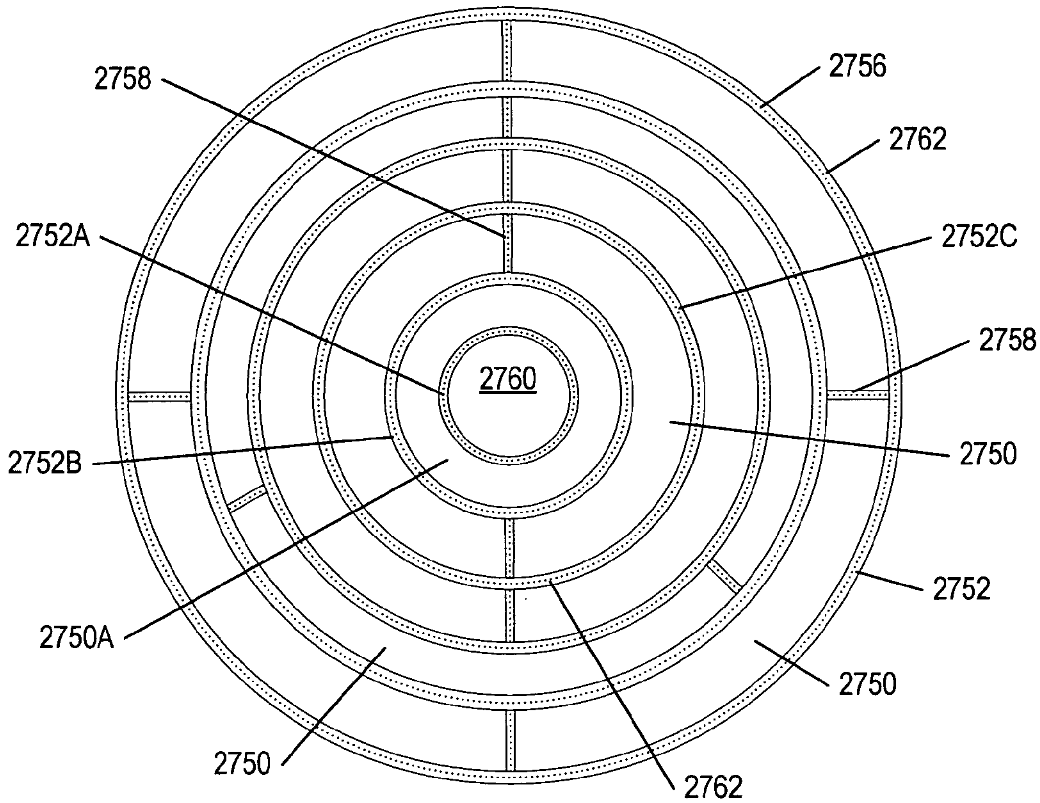

FIG. 386 depicts a plan view representation of an embodiment of treatment areas formed by perimeter barriers radially positioned around a central point.

Figure 387:
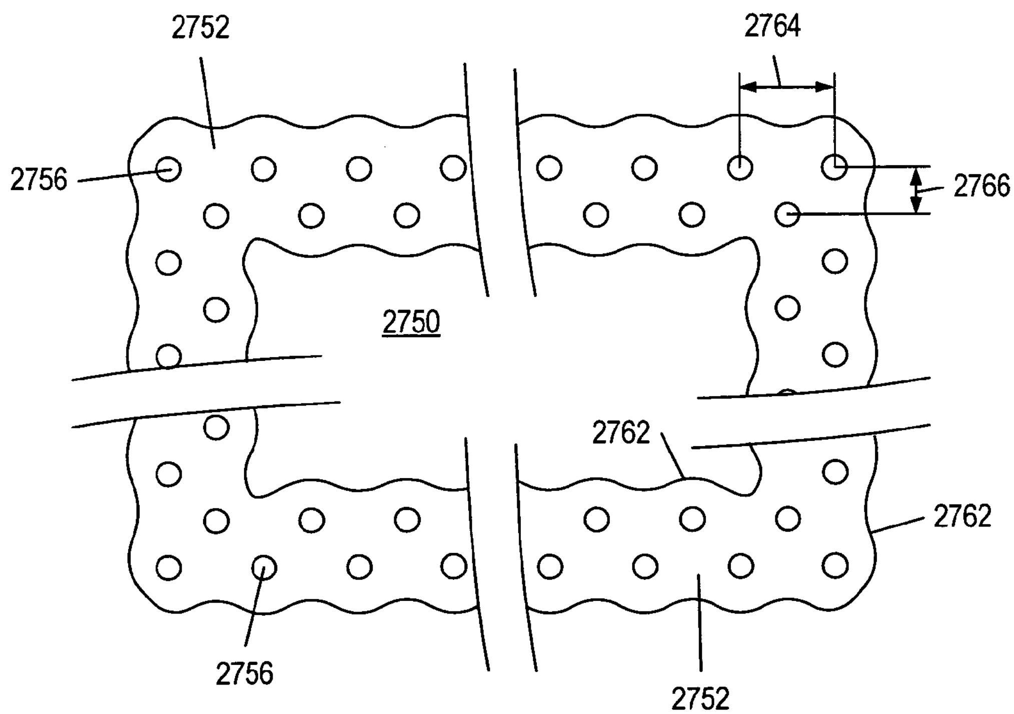

FIG. 387 depicts a plan view representation of a portion of a treatment area defined by a double ring of freeze wells.

Figure 388:
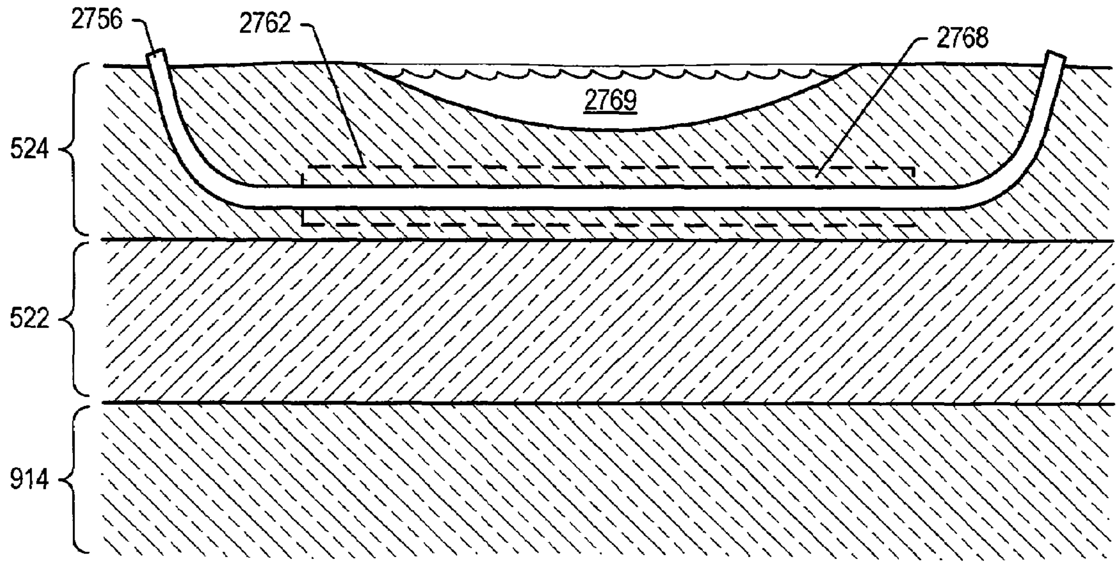

FIG. 388 depicts a side representation of a freeze well that is directionally drilled in a formation so that the freeze well enters the formation in a first location and exits the formation in a second location.

Figure 389:
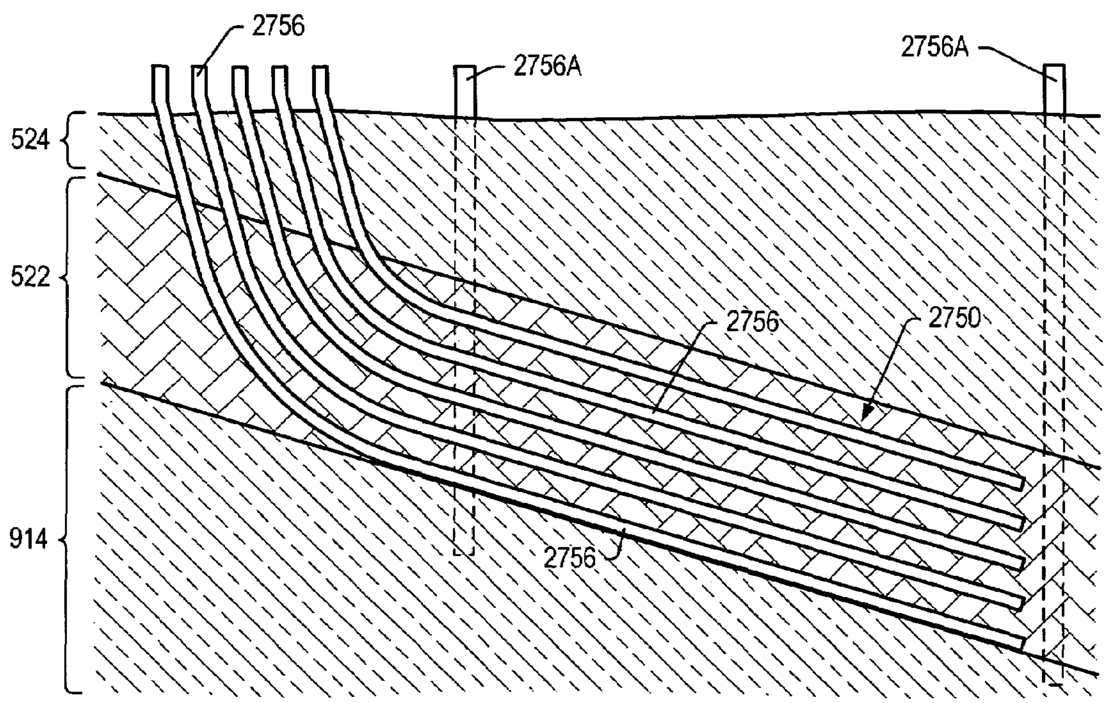

FIG. 389 depicts a side representation of freeze wells that form a barrier along sides and ends of a dipping hydrocarbon containing layer in a formation.

Figure 390:
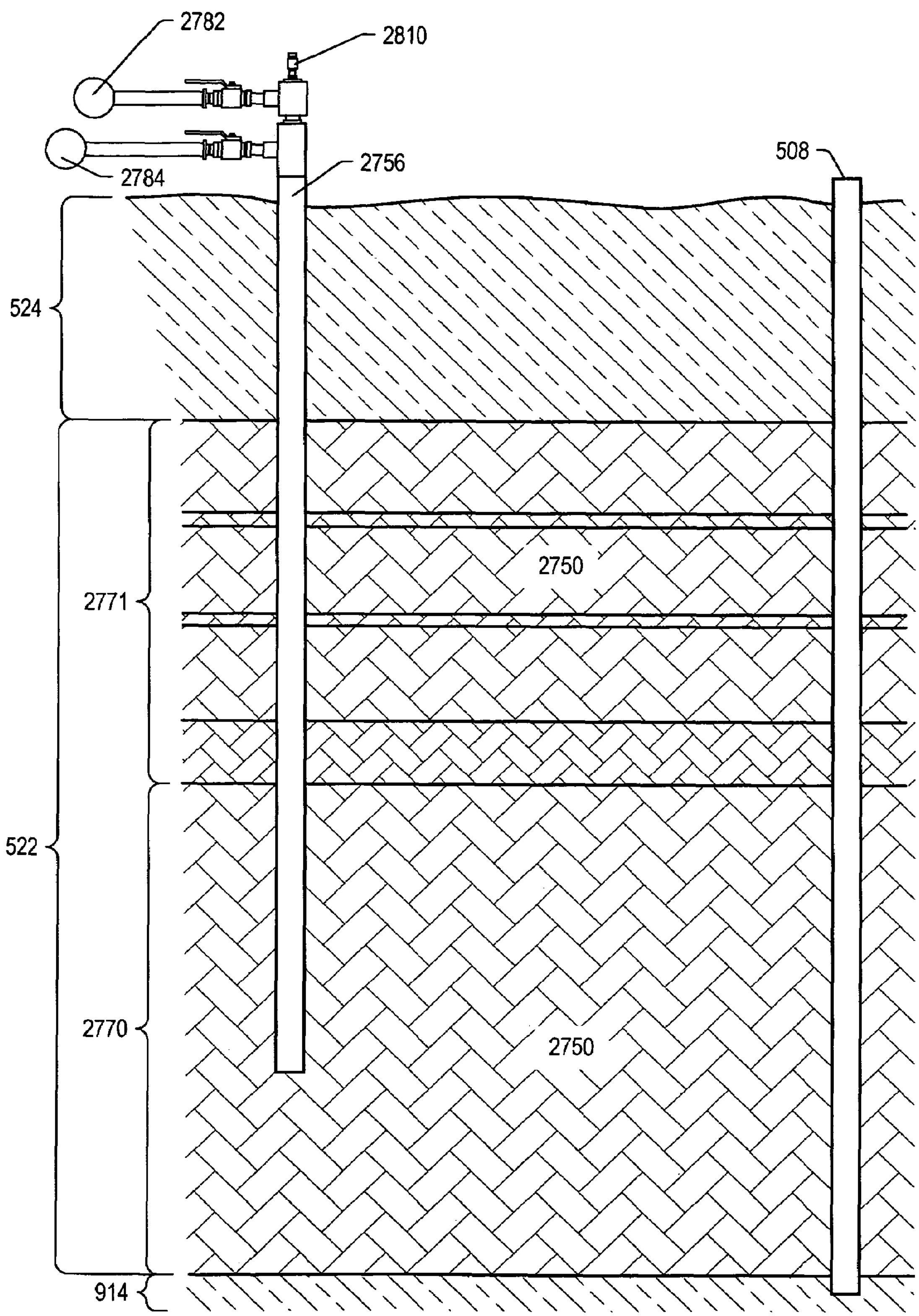

FIG. 390 depicts a representation of an embodiment of a freeze well and an embodiment of a heat source that may be used during an in situ conversion process.

Figure 391:
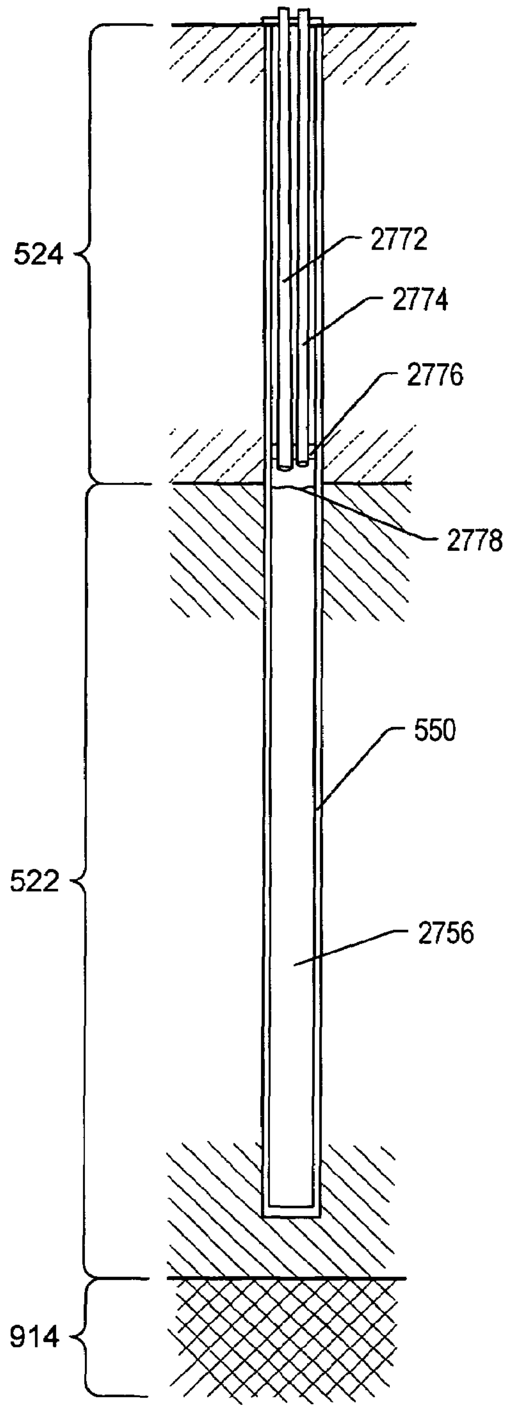

FIG. 391 depicts an embodiment of a batch operated freeze well.

Figure 392:
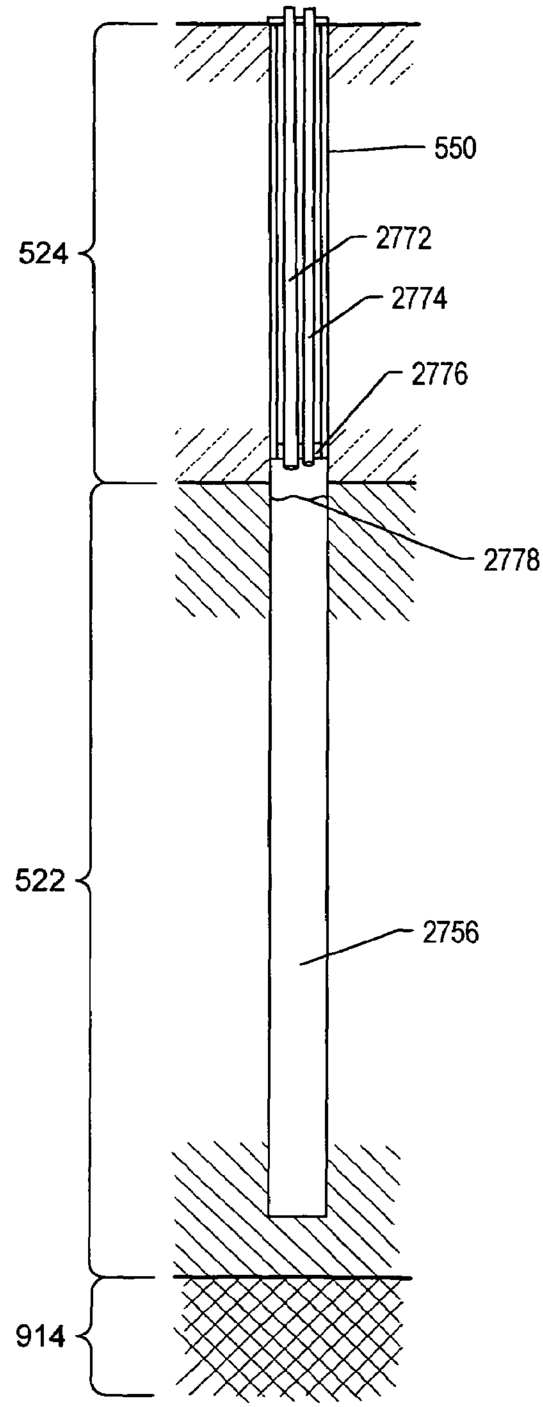

FIG. 392 depicts an embodiment of a batch operated freeze well having an open wellbore portion.

Figure 393:
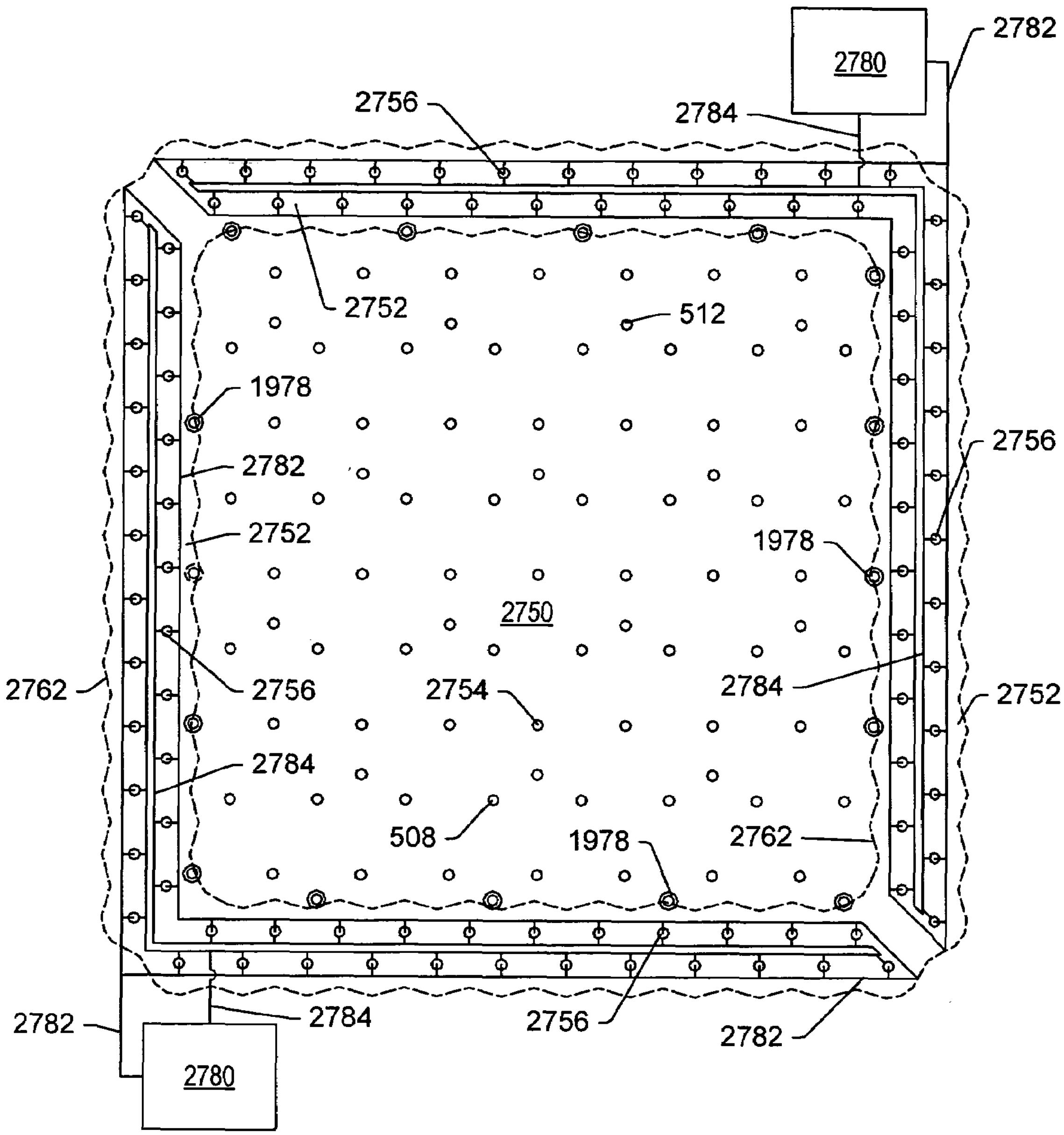

FIG. 393 depicts a plan view representation of a circulated fluid refrigeration system.

Figure 394:
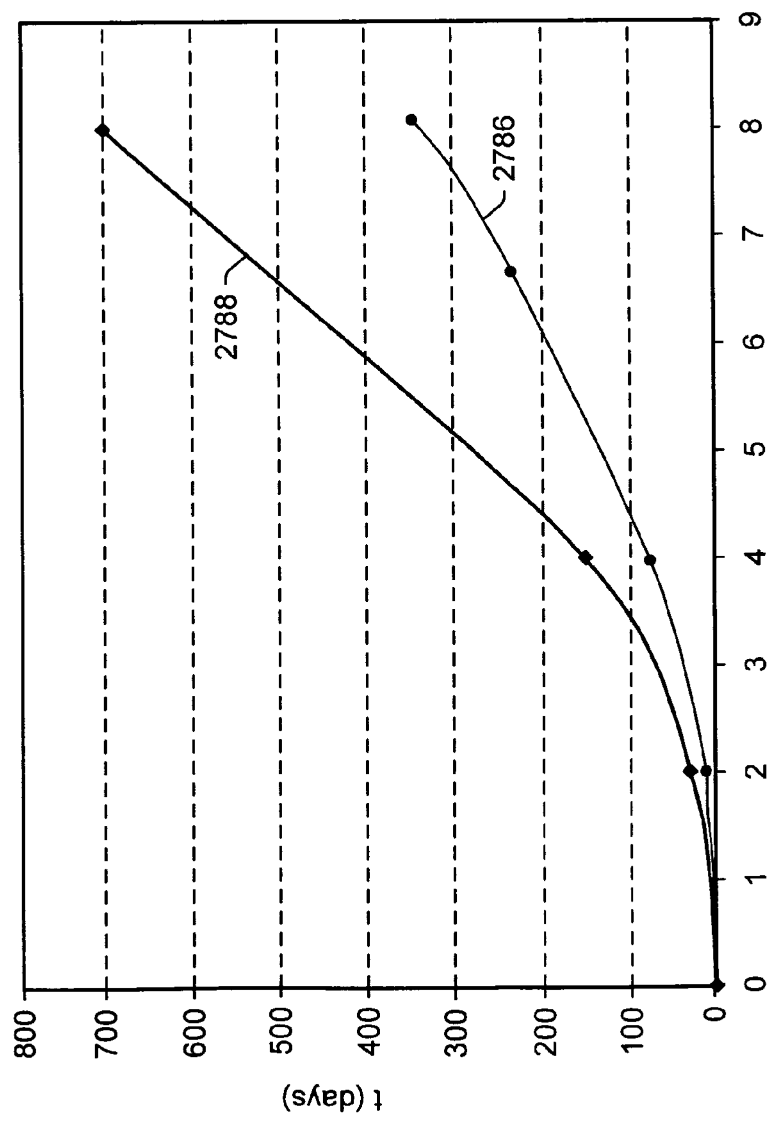

FIG. 394 shows simulation results as a plot of time to reduce a temperature midway between two freeze wells versus well spacing.

Figure 395:
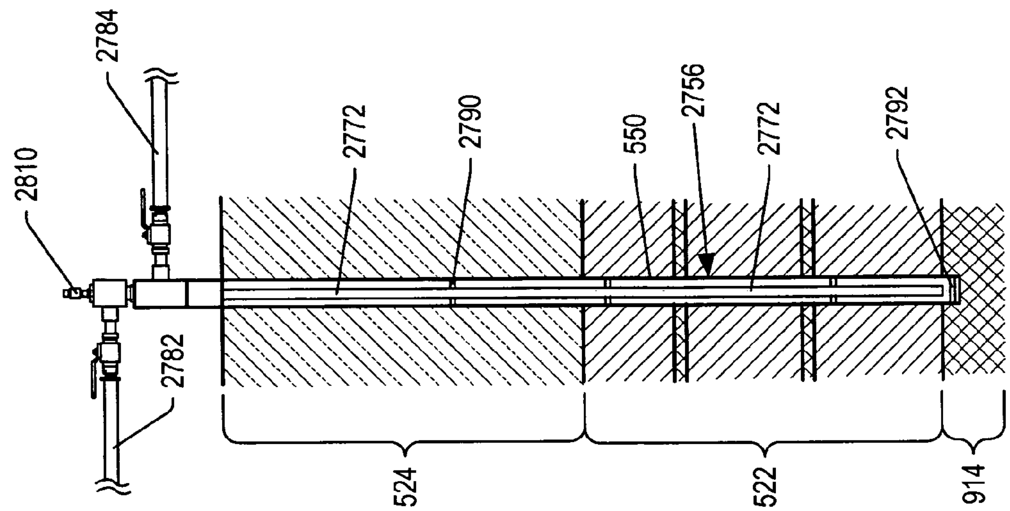

FIG. 395 depicts an embodiment of a freeze well for a circulated liquid refrigeration system, wherein a cutaway view of the freeze well is represented below ground surface.

Figure 396:
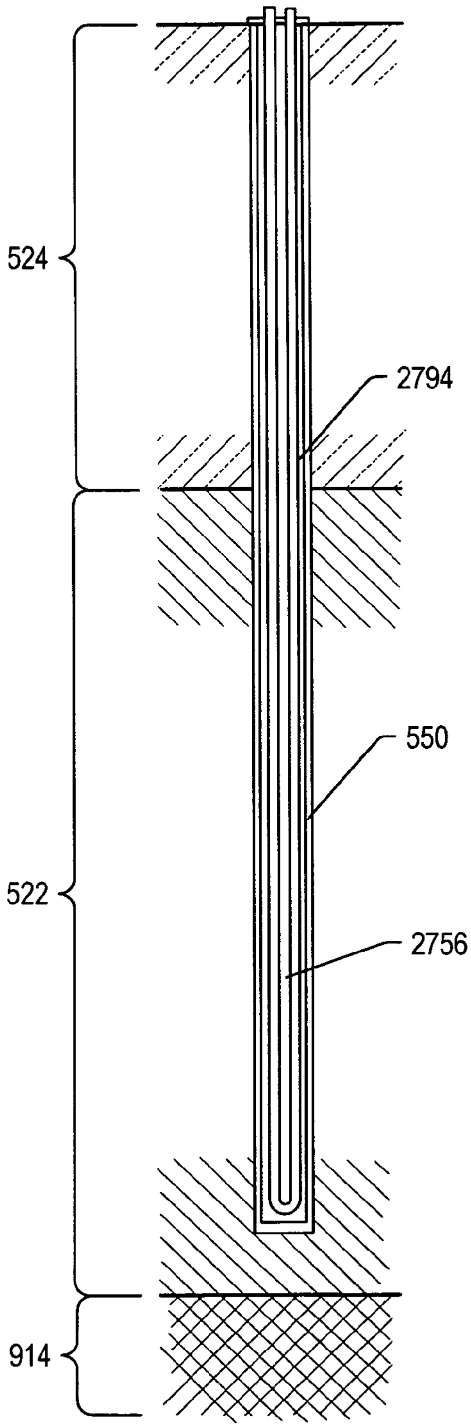

FIG. 396 depicts an embodiment of a freeze well for a circulated liquid refrigeration system.

Figure 397:
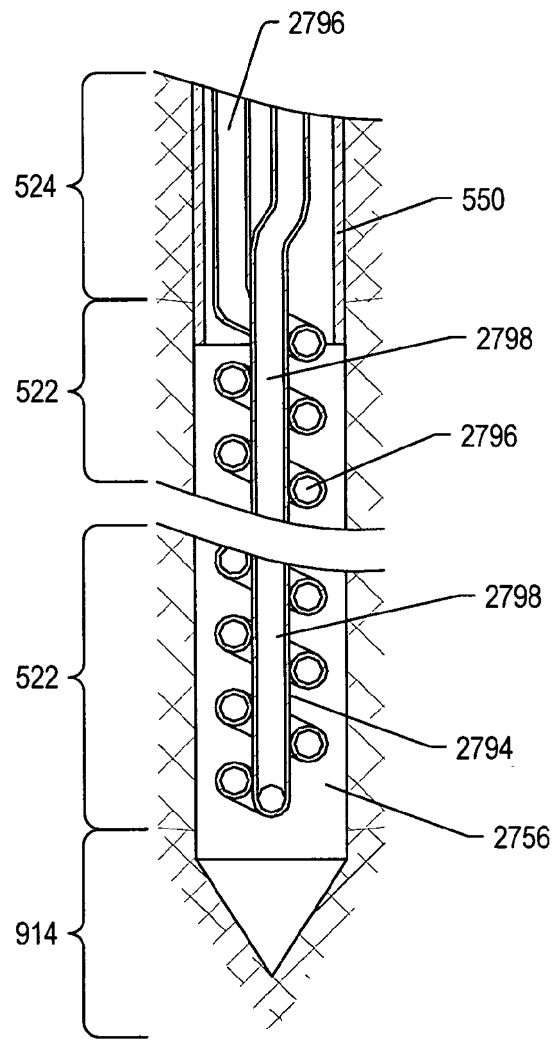

FIG. 397 depicts an embodiment of a freeze well for a circulated liquid refrigeration system.

Figure 398:
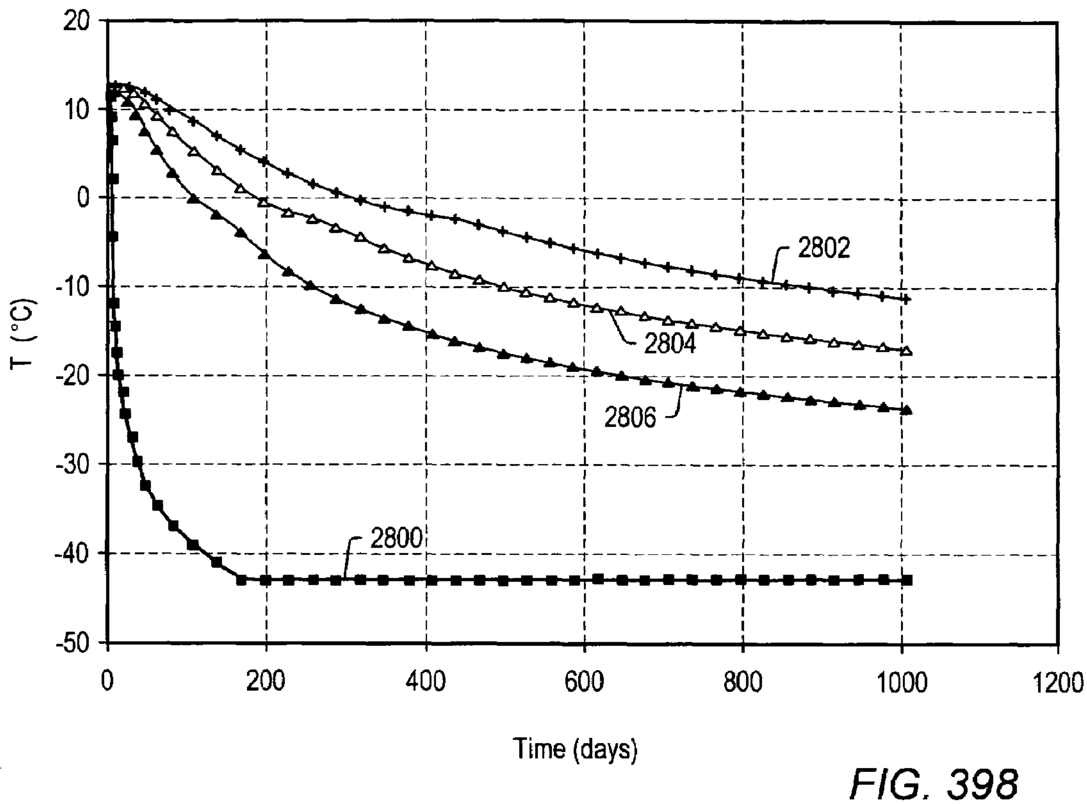

FIG. 398 depicts results of a simulation for Green River oil shale presented as temperature versus time for a formation cooled with a refrigerant.

Figure 399:
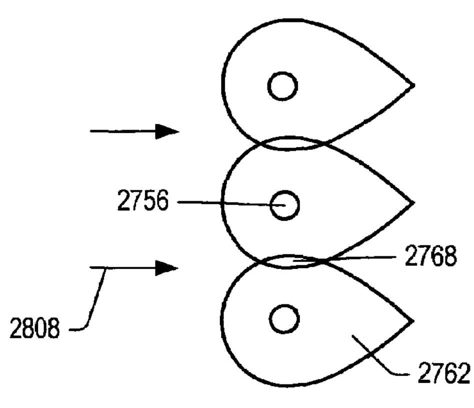

FIG. 399 depicts a plan view representation of low temperature zones formed by freeze wells placed in a formation through which fluid flows slowly enough to allow for formation of an interconnected low temperature zone.

Figure 400:
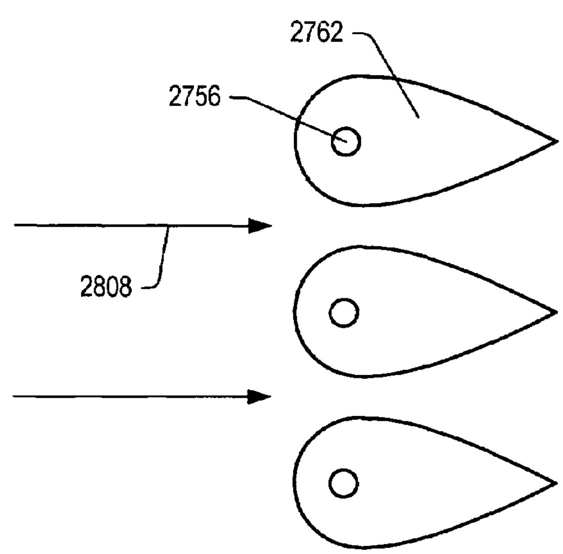

FIG. 400 depicts a plan view representation of low temperature zones formed by freeze wells placed in a formation through which fluid flows at too high a flow rate to allow for formation of an interconnected low temperature zone.

Figure 401:
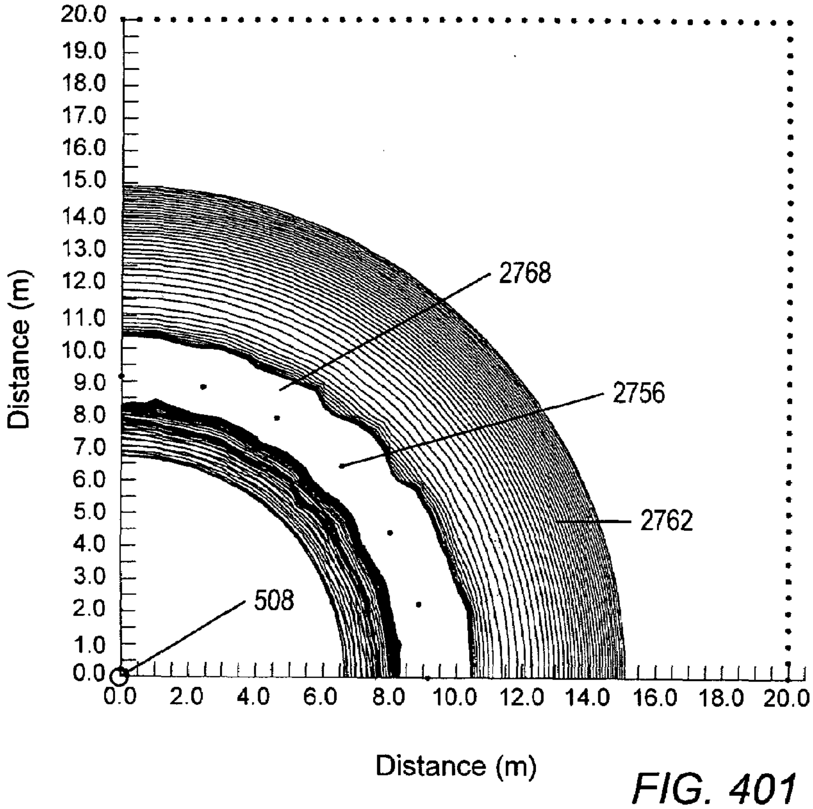

FIG. 401 depicts thermal simulation results of a heat source surrounded by a ring of freeze wells.

Figure 402:
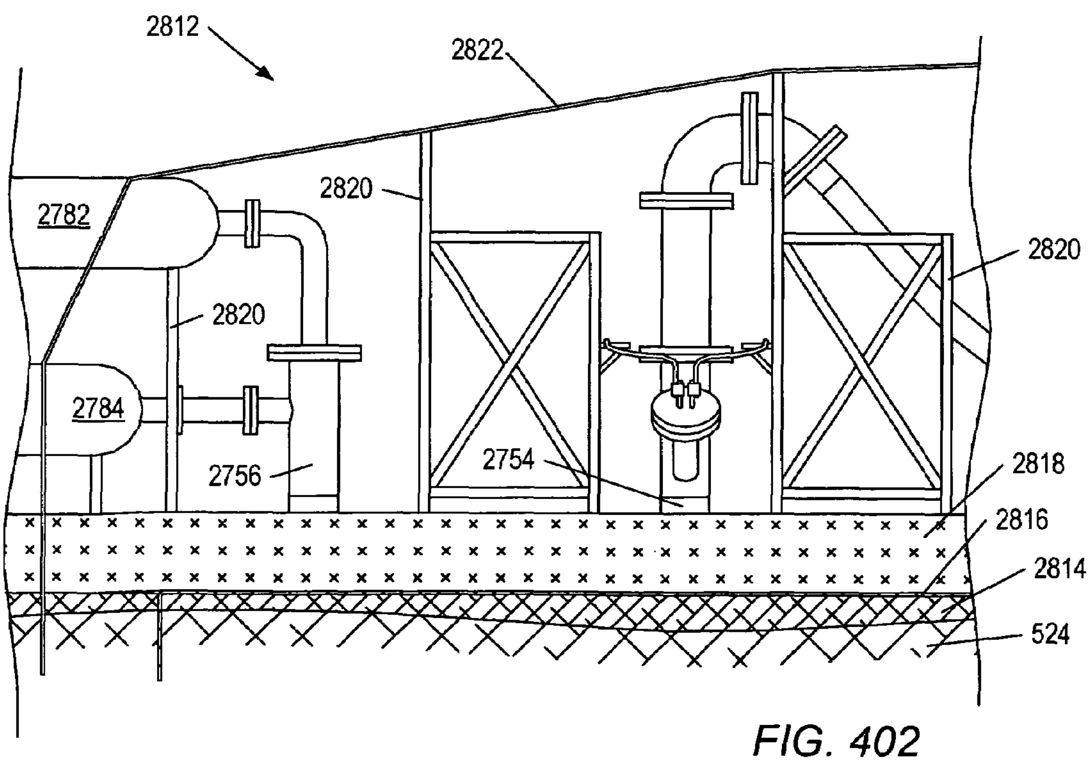

FIG. 402 depicts a representation of an embodiment of a ground cover.

Figure 403:
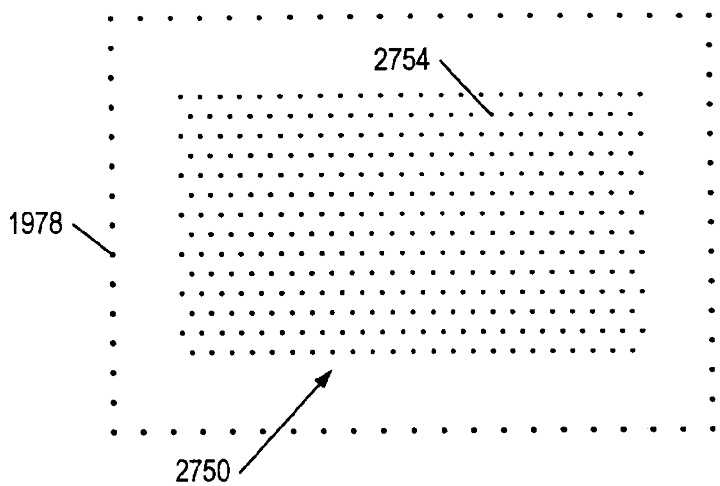

FIG. 403 depicts an embodiment of a treatment area surrounded by a ring of dewatering wells.

Figure 404A:
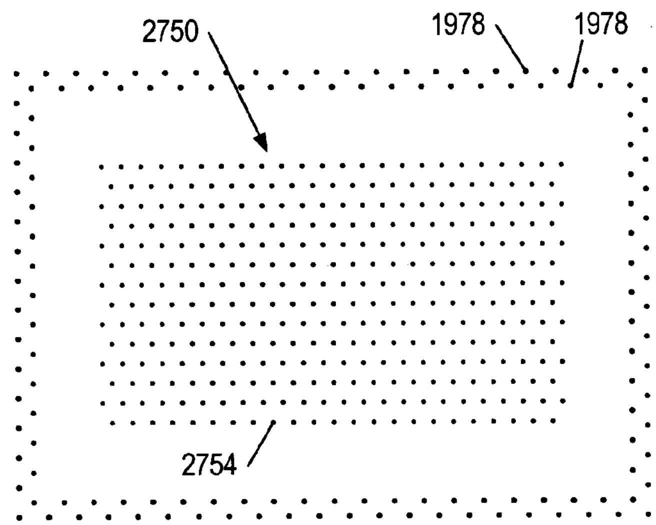

FIG. 404A depicts an embodiment of a treatment area surrounded by two rings of dewatering wells.

Figure 404B:
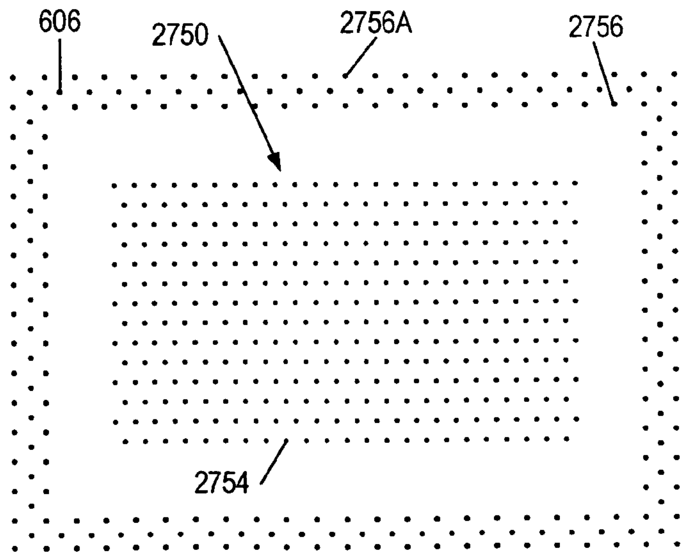

FIG. 404B depicts an embodiment of a treatment area surrounded by two rings of freeze wells.

Figure 405:
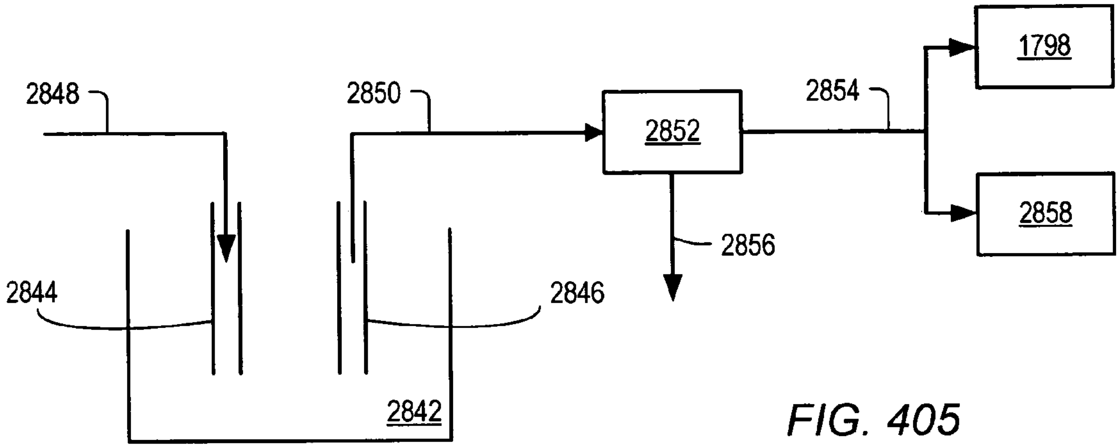

FIG. 405 illustrates a schematic of an embodiment of an injection wellbore and a production wellbore.

Figure 406:
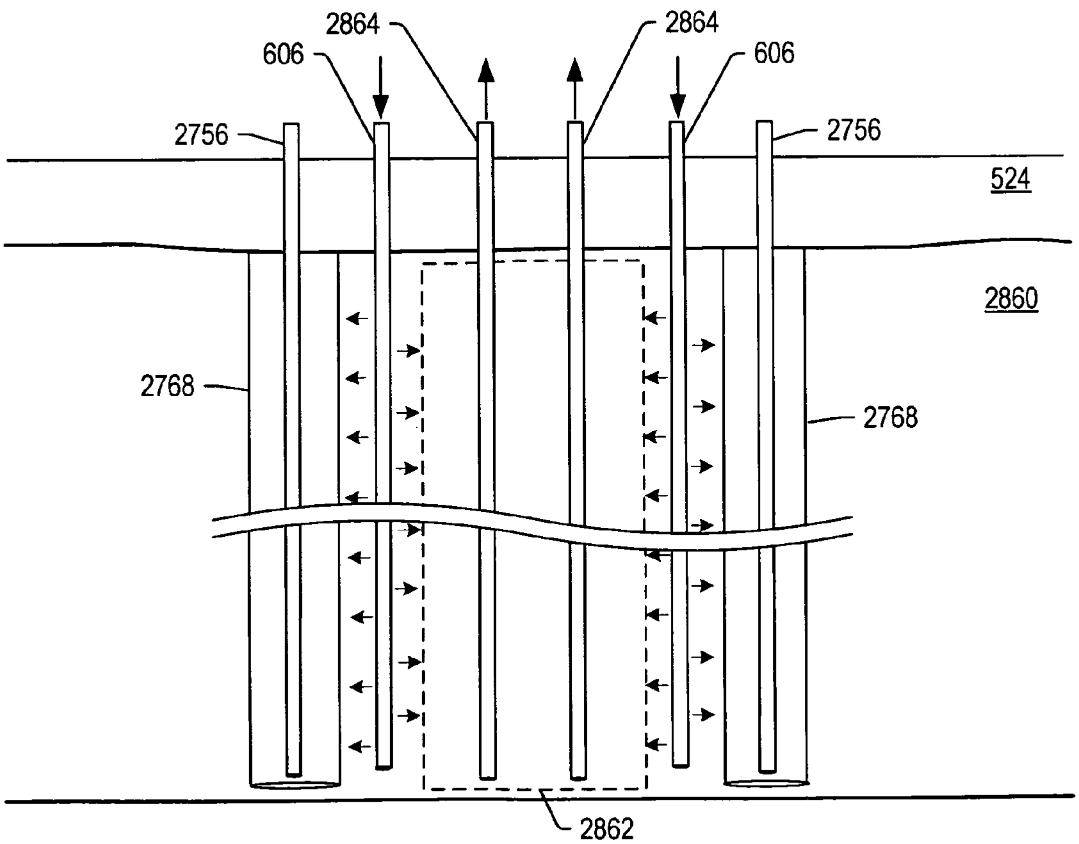

FIG. 406 depicts an embodiment of a remediation process used to treat a treatment area.

Figure 407:
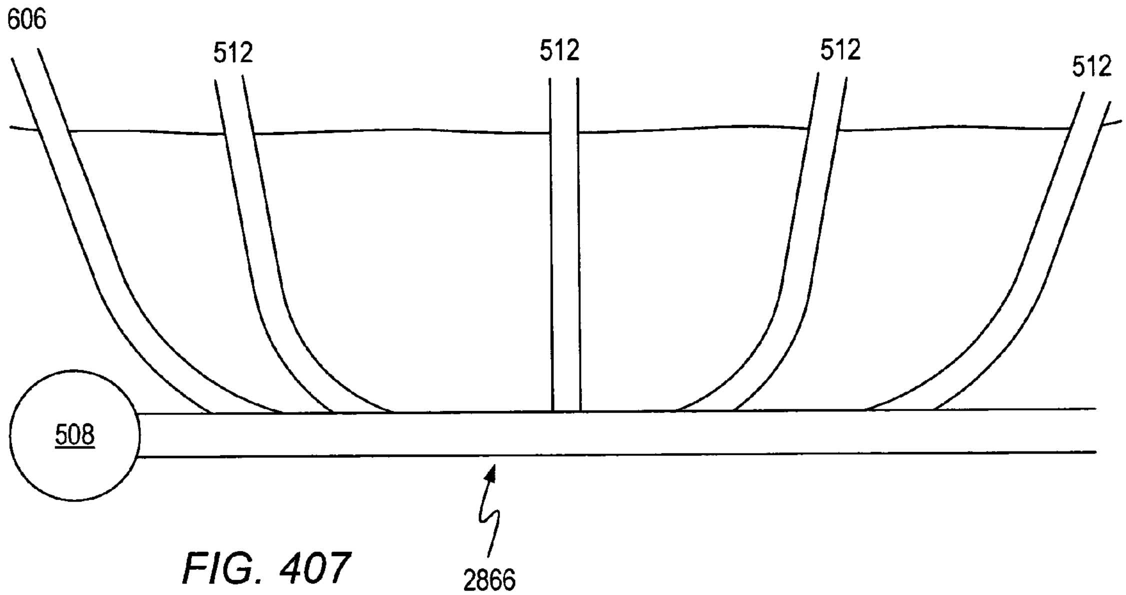

FIG. 407 illustrates an embodiment of a temperature gradient formed in a section of heated formation.

Figure 408:
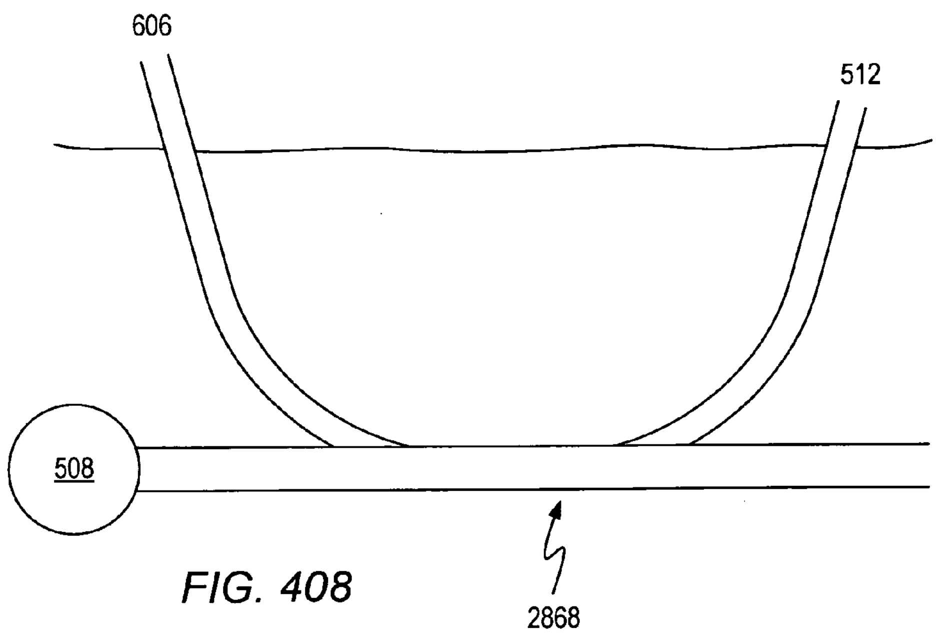

FIG. 408 depicts an embodiment of a heated formation used for separation of hydrocarbons and contaminants.

Figure 409:
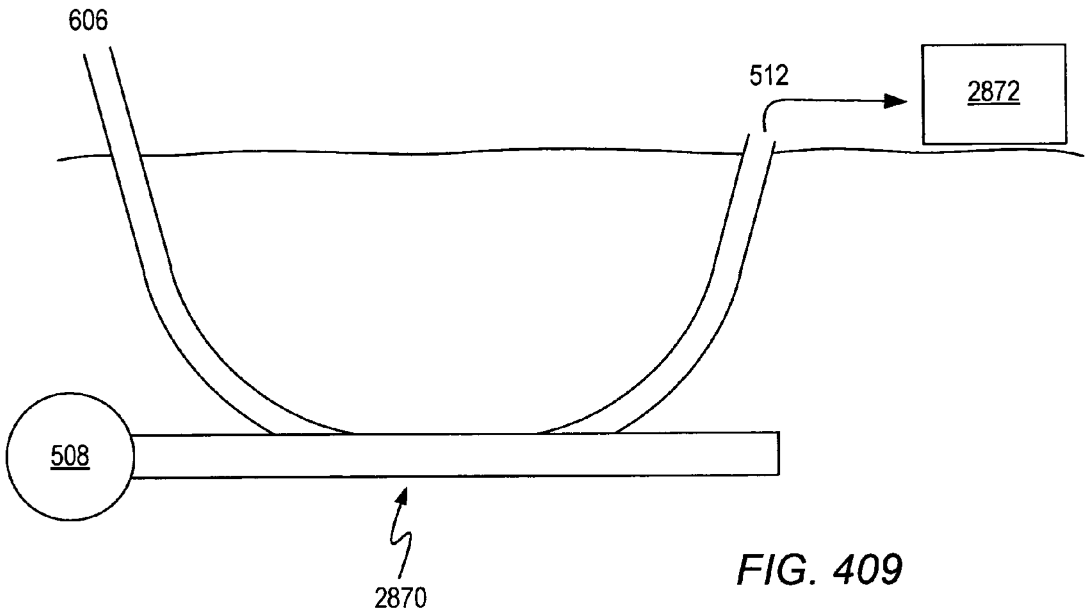

FIG. 409 depicts an embodiment for recovering heat from a heated formation and transferring the heat to an above-ground processing unit.

Figure 410:
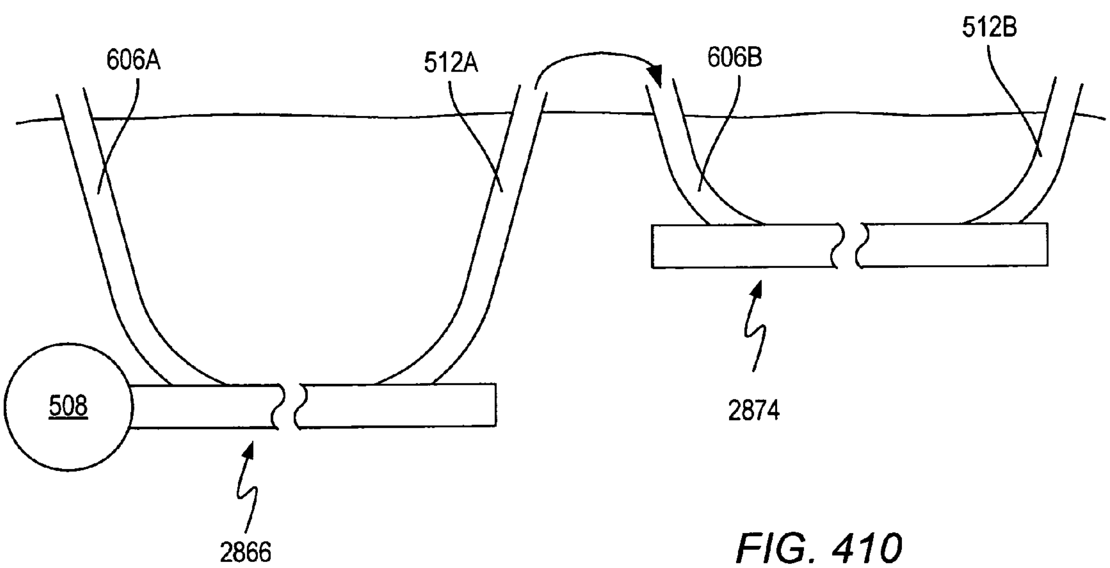

FIG. 410 depicts an embodiment for recovering heat from one formation and providing heat to another formation with an intermediate production step.

Figure 411:
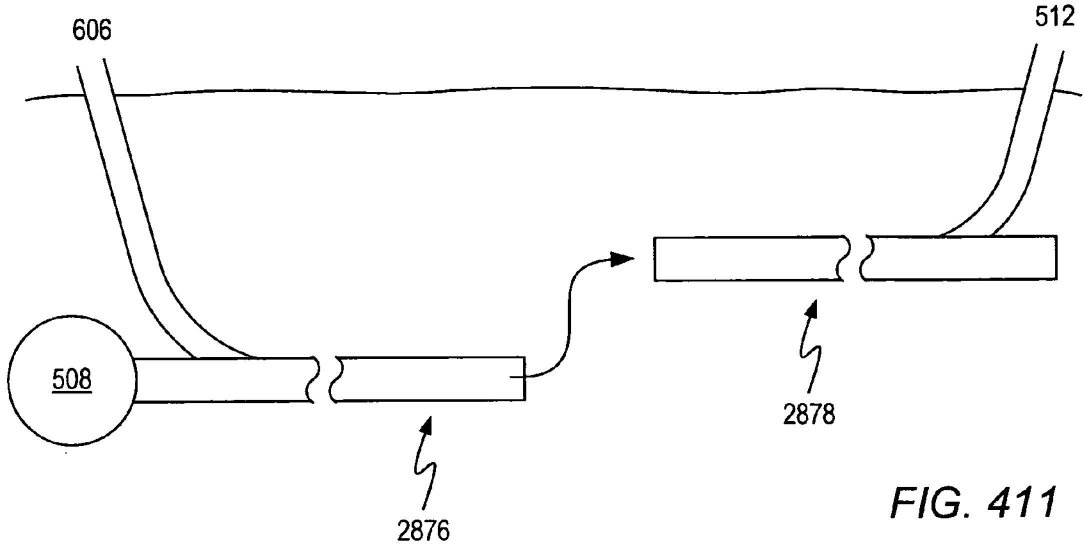

FIG. 411 depicts an embodiment for recovering heat from one formation and providing heat to another formation in situ.

Figure 412:
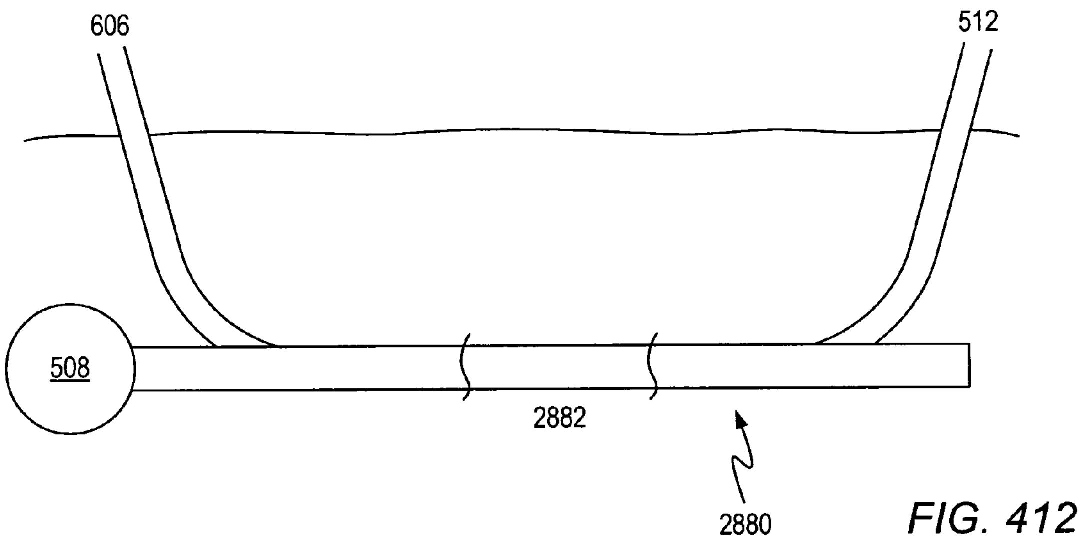

FIG. 412 depicts an embodiment of a region of reaction within a heated formation.

Figure 413:
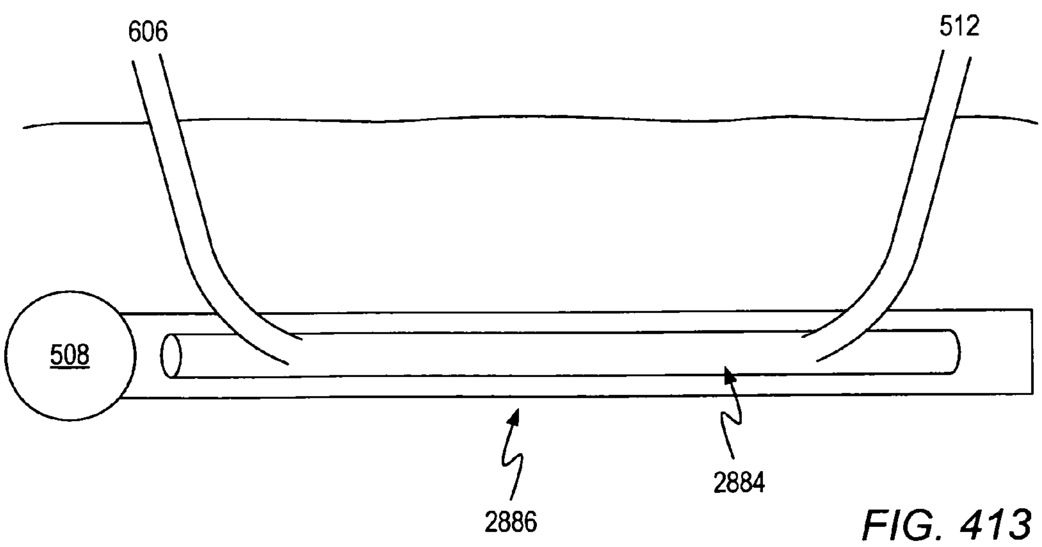

FIG. 413 depicts an embodiment of a conduit placed within a heated formation.

Figure 414:
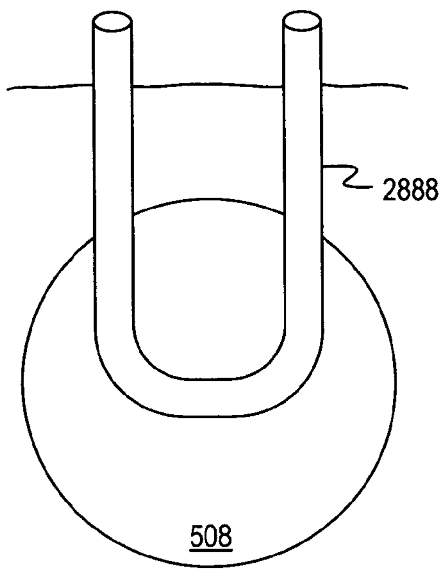

FIG. 414 depicts an embodiment of a U-shaped conduit placed within a heated formation.

Figure 415:
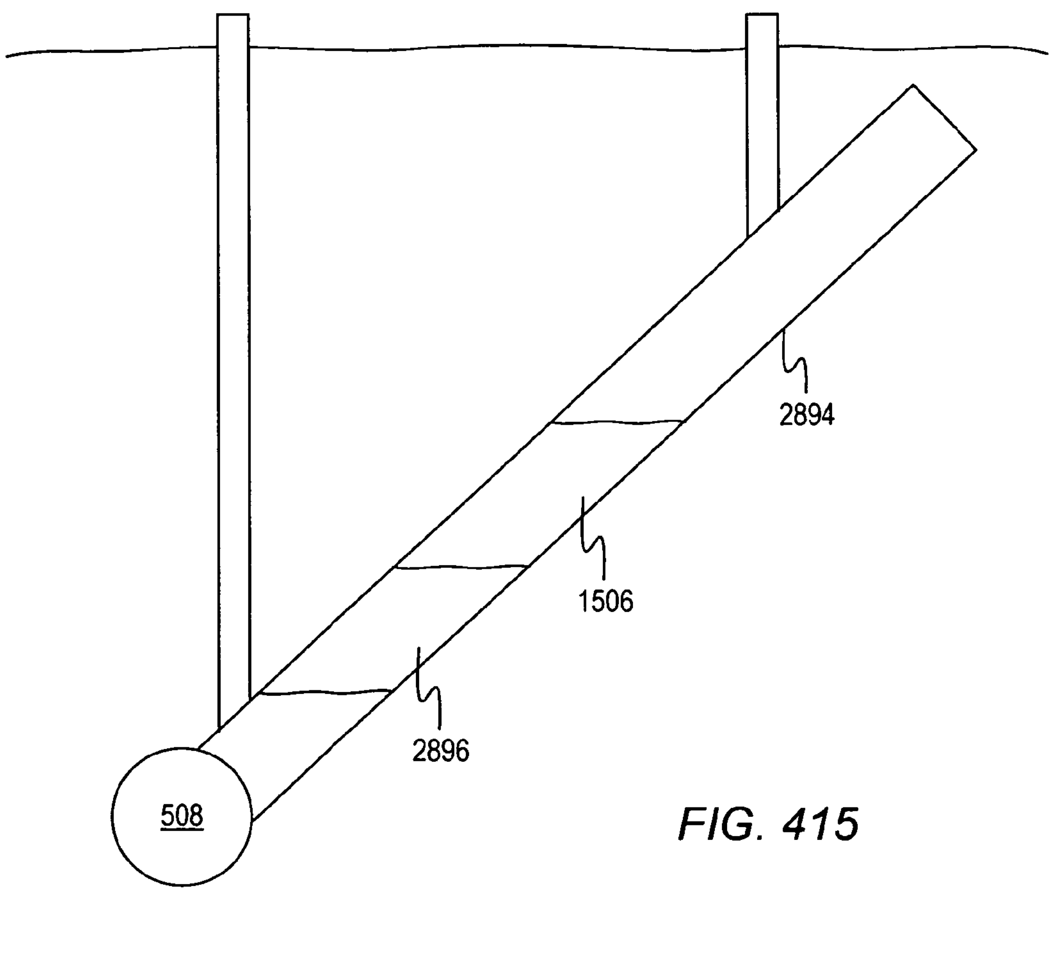

FIG. 415 depicts an embodiment for sequestration of carbon dioxide in a heated formation.

Figure 416:
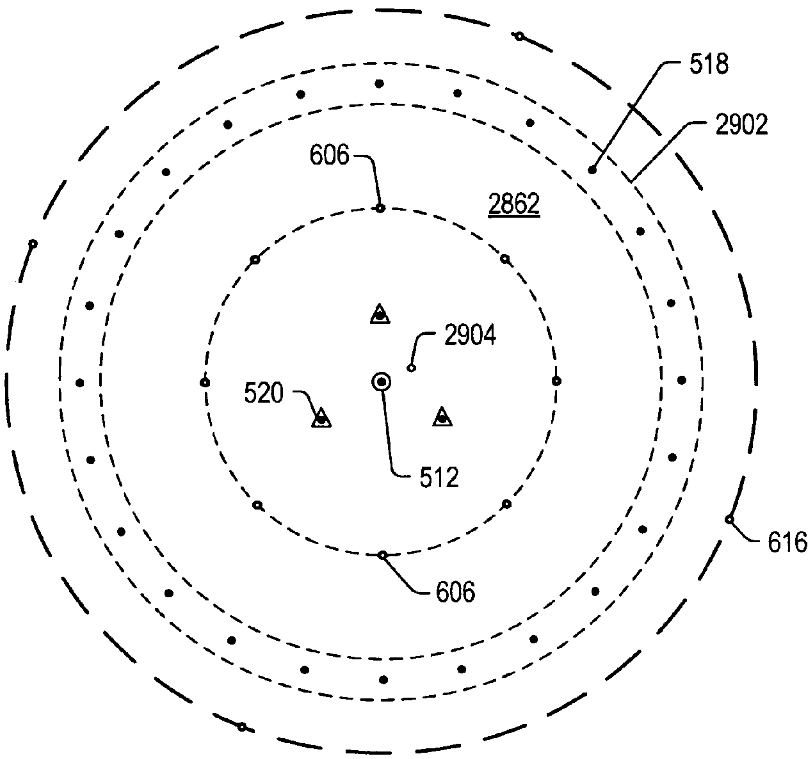

FIG. 416 depicts an embodiment for solution mining a formation.

Figure 417:
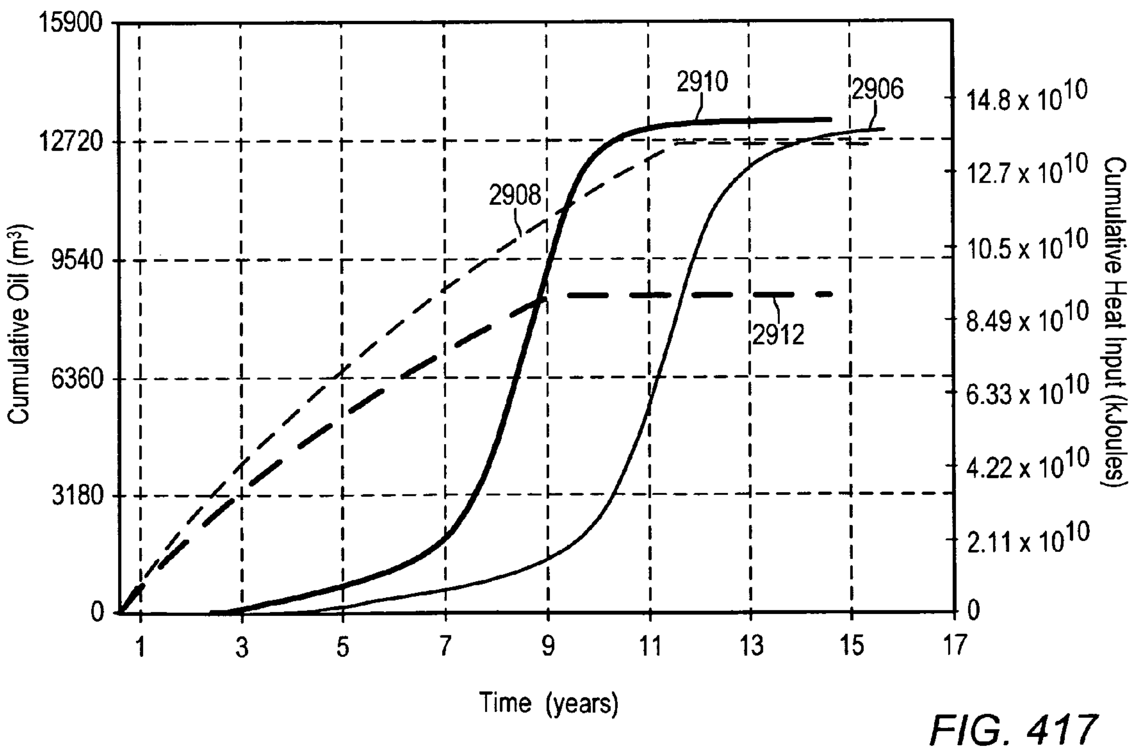

FIG. 417 illustrates cumulative oil production and cumulative heat input versus time using an in situ conversion process for solution mined oil shale and for non-solution mined oil shale.

Figure 418:
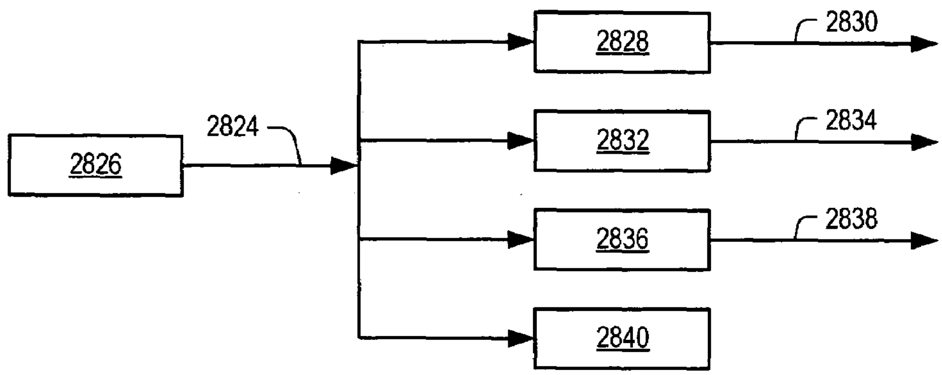

FIG. 418 is a flow chart illustrating options for produced fluids from a shut-in formation.

Figure 419:
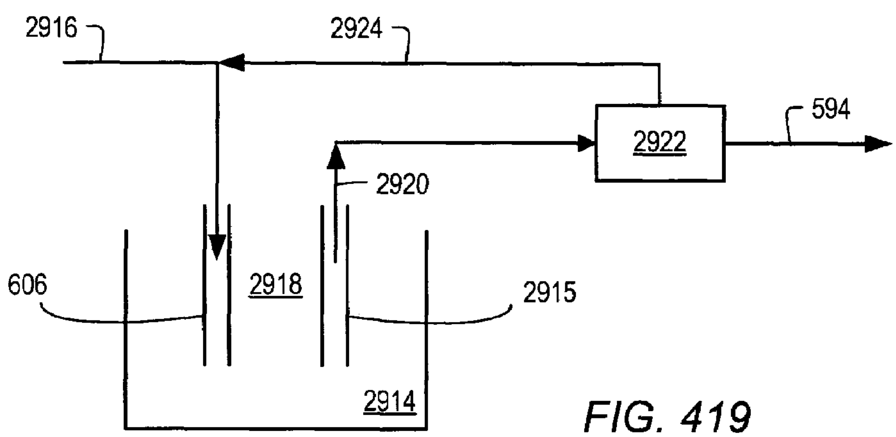

FIG. 419 illustrates a schematic of an embodiment of an injection wellbore and a production wellbore.

Figure 420:
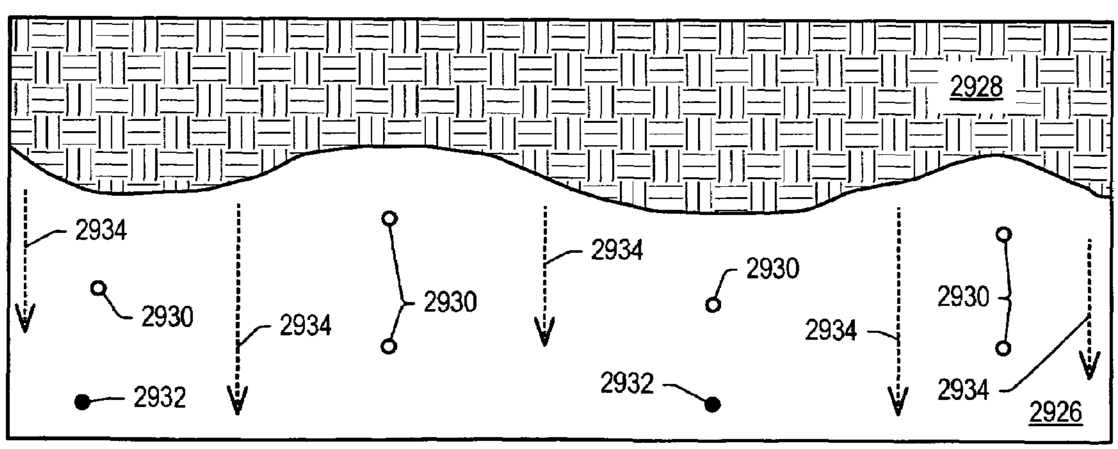

FIG. 420 illustrates a cross-sectional representation of in situ treatment of a formation with steam injection according to one embodiment.

Figure 421:
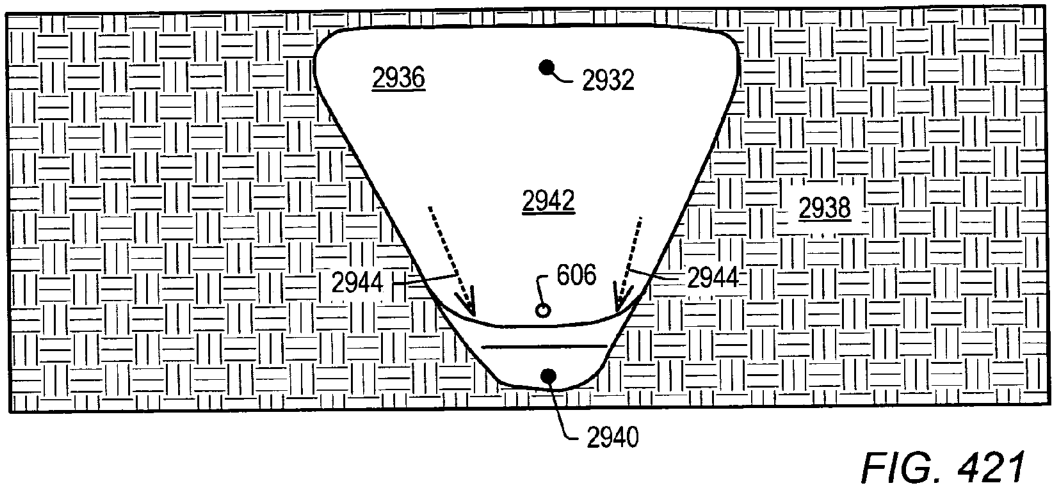

FIG. 421 illustrates a cross-sectional representation of in situ treatment of a formation with steam injection according to one embodiment.

Figure 422:
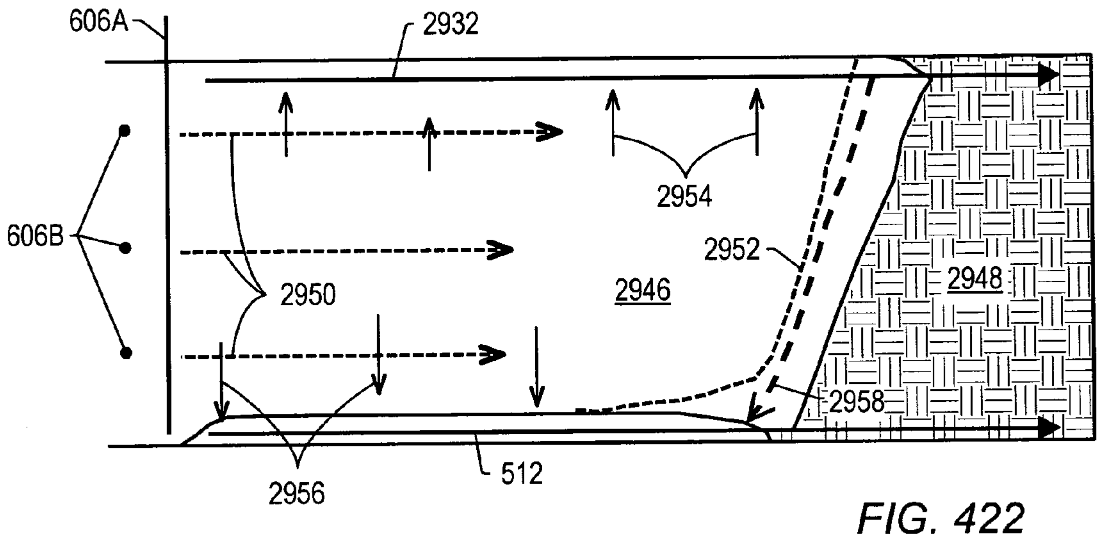

FIG. 422 illustrates a cross-sectional representation of in situ treatment of a formation with steam injection according to one embodiment.

Figure 423:
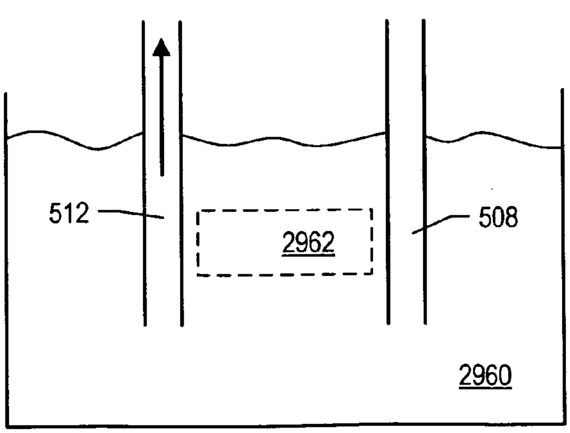

FIG. 423 illustrates a schematic of a portion of a kerogen and liquid hydrocarbon containing formation.

Figure 424:
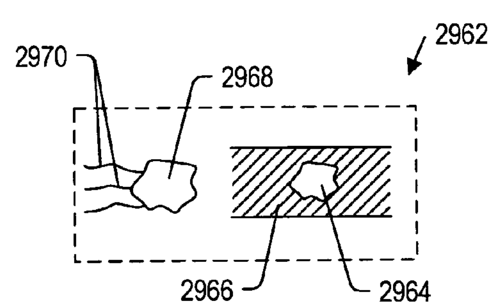

FIG. 424 illustrates an expanded view of a selected section.

Figure 425:
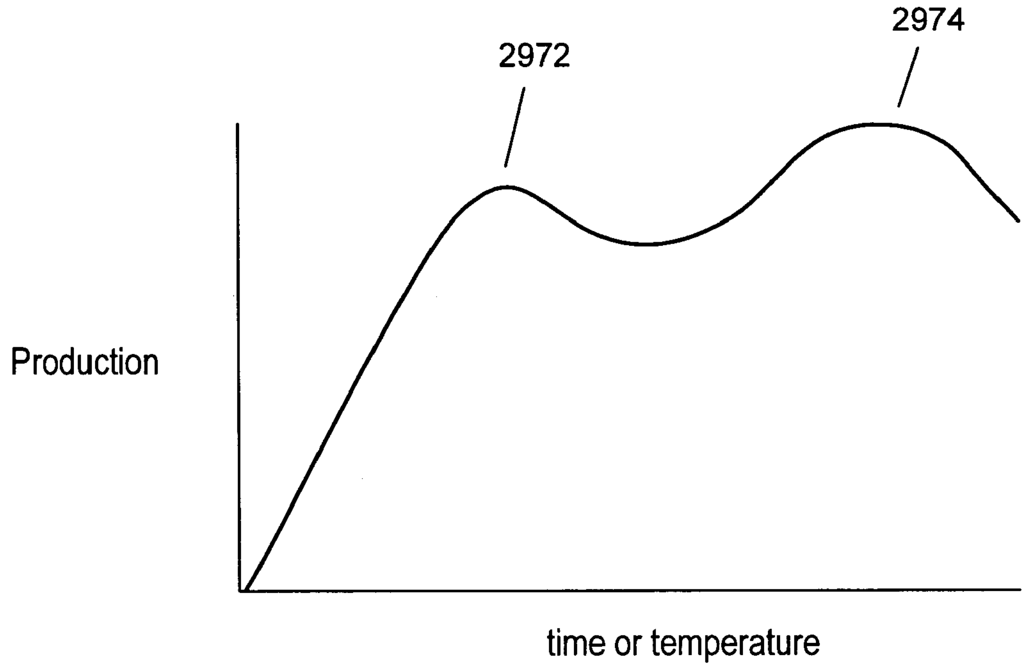

FIG. 425 depicts a schematic illustration of one embodiment of production versus time or temperature from a production well as shown in FIG. 423.

Figure 426:
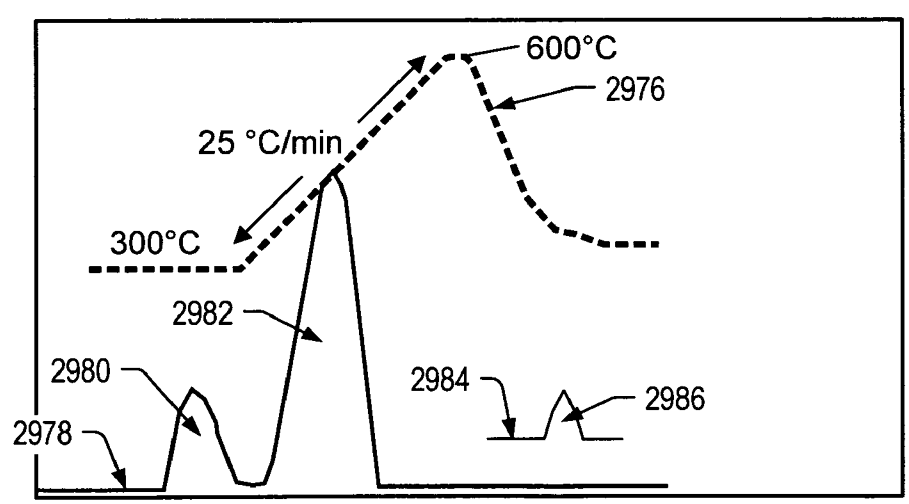

FIG. 426 illustrates a schematic of a temperature profile of the Rock-Eval pyrolysis process.

Figure 427:
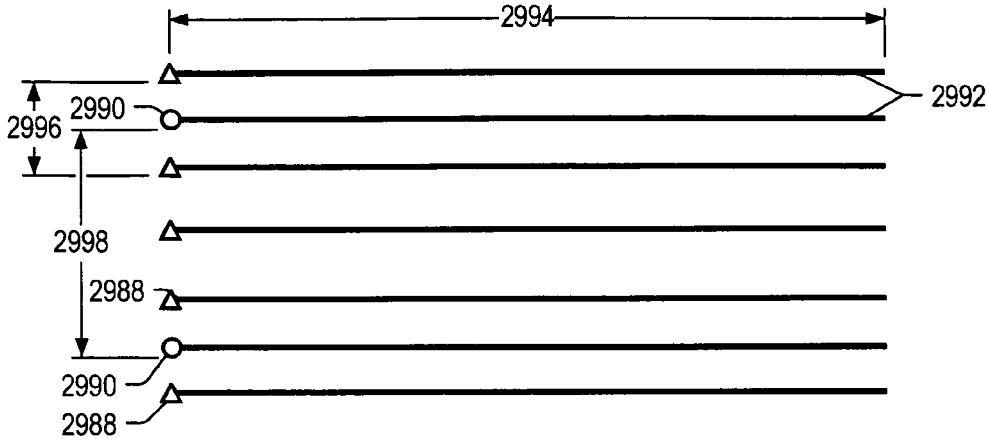

FIG. 427 illustrates a plan view of horizontal heater wells and horizontal production wells.

Figure 428:
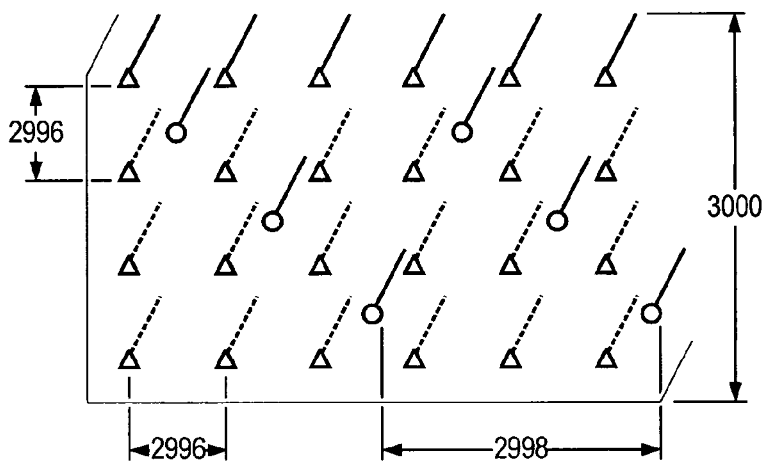

FIG. 428 illustrates an end view schematic of the horizontal heater wells and horizontal production wells depicted in FIG. 427.

Figure 429:
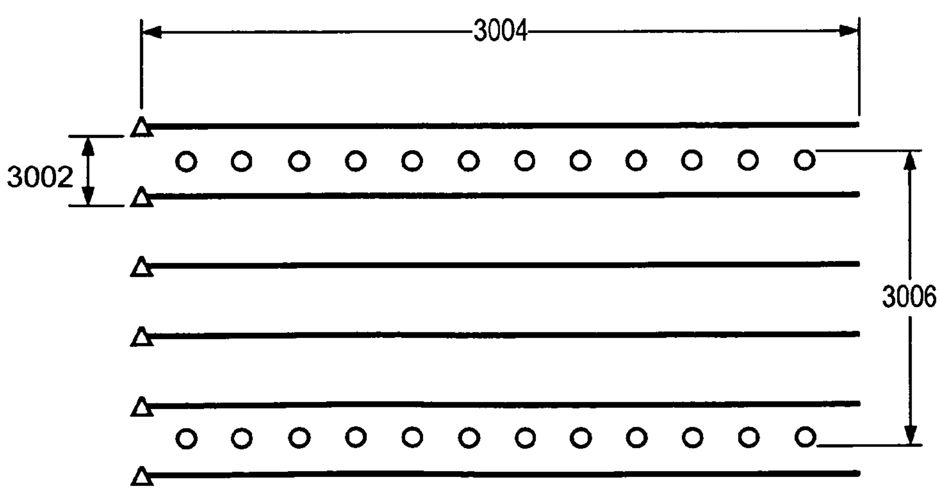

FIG. 429 illustrates a plan view of horizontal heater wells and vertical production wells.

Figure 430:
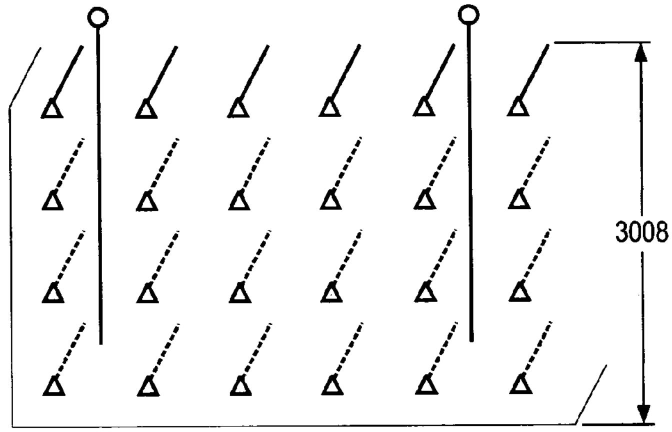

FIG. 430 illustrates an end view schematic of the horizontal heater wells and vertical production wells depicted in FIG. 429.

Figure 431:
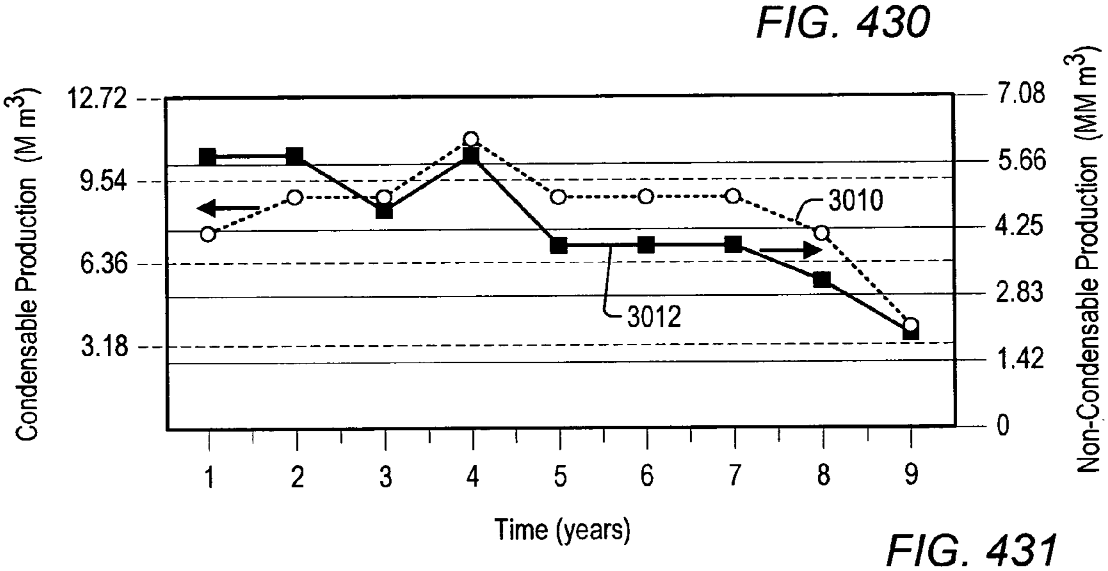

FIG. 431 illustrates the production of condensables and non-condensables per pattern as a function of time from an in situ conversion process as calculated by a simulator.

Figure 432:
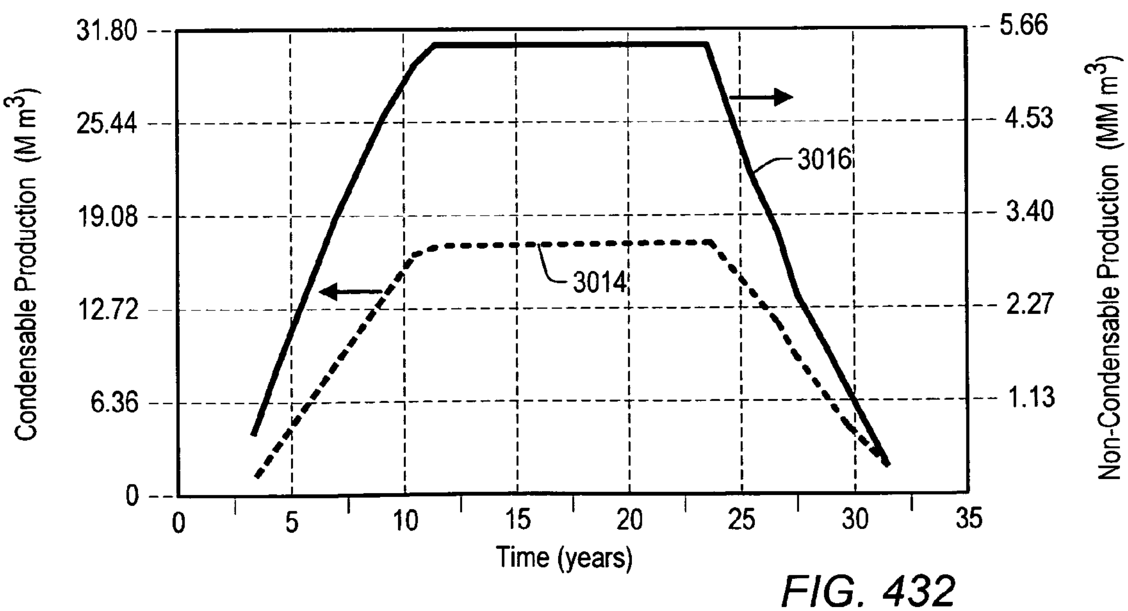

FIG. 432 illustrates the total production of condensables and non-condensables as a function of time from an in situ conversion process as calculated by a simulator.

Figure 433:
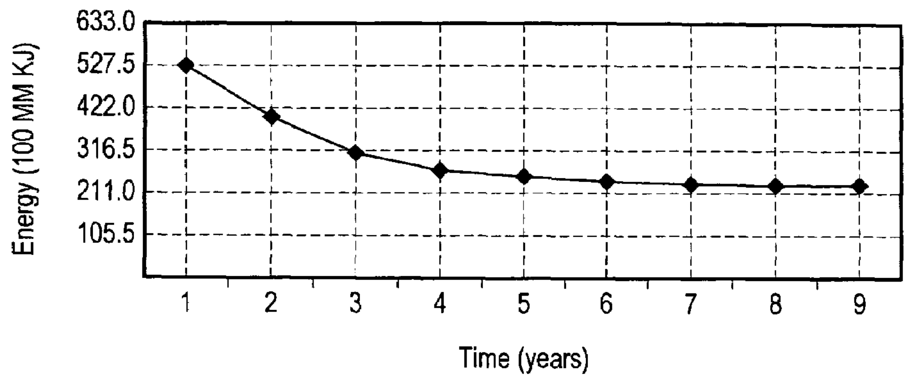

FIG. 433 shows the annual heat injection rate per pattern versus time calculated by the simulator.

Figure 434:
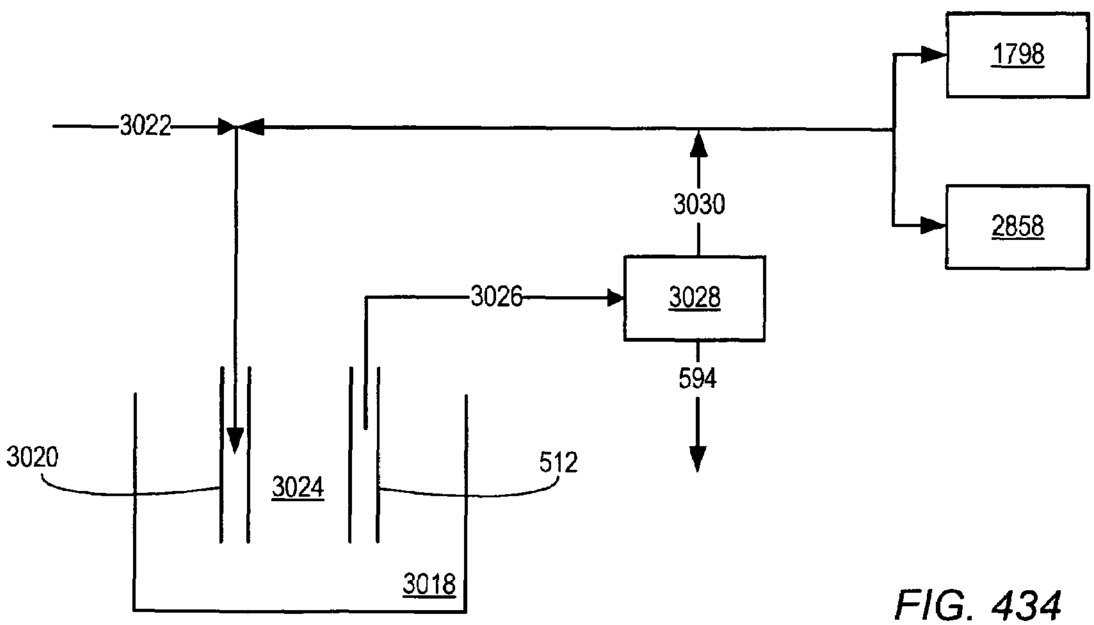

FIG. 434 illustrates a schematic of an embodiment of in situ treatment of an oil containing formation.

Figure 435:
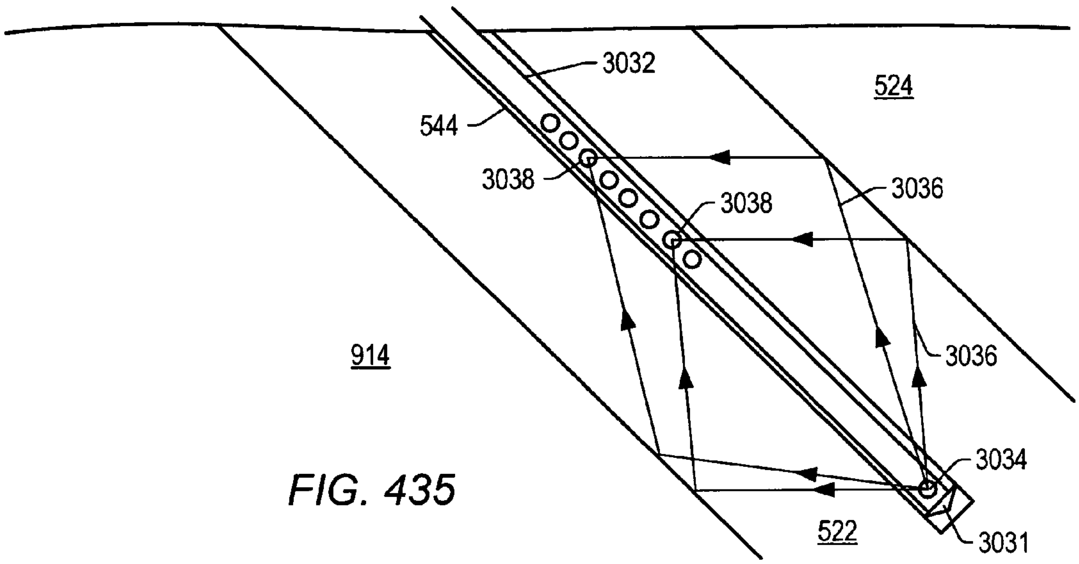

FIG. 435 depicts an embodiment for using acoustic reflections to determine a location of a wellbore in a formation.

Figure 436:
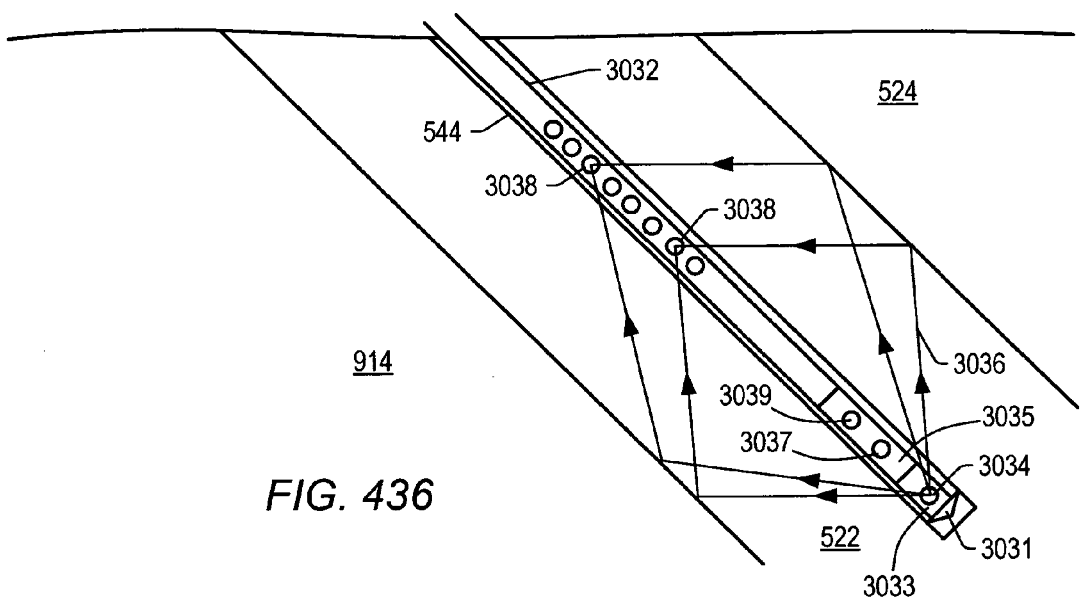

FIG. 436 depicts an embodiment for using acoustic reflections and magnetic tracking to determine a location of a wellbore in a formation.

Figure 437:
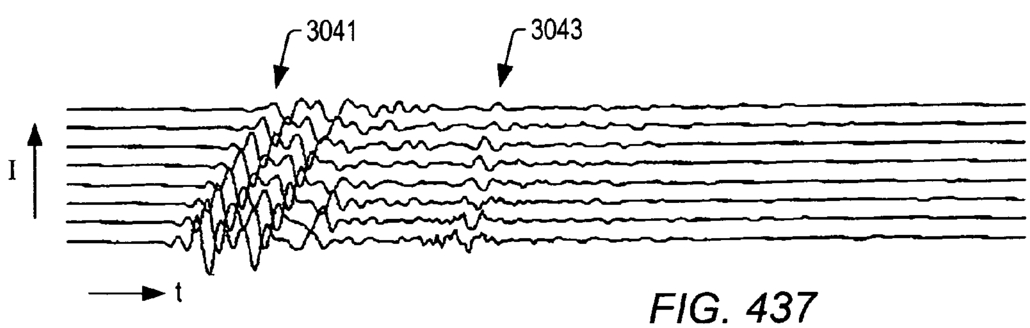

FIG. 437 depicts raw data obtained from an acoustic sensor in a formation.

Figure 438:
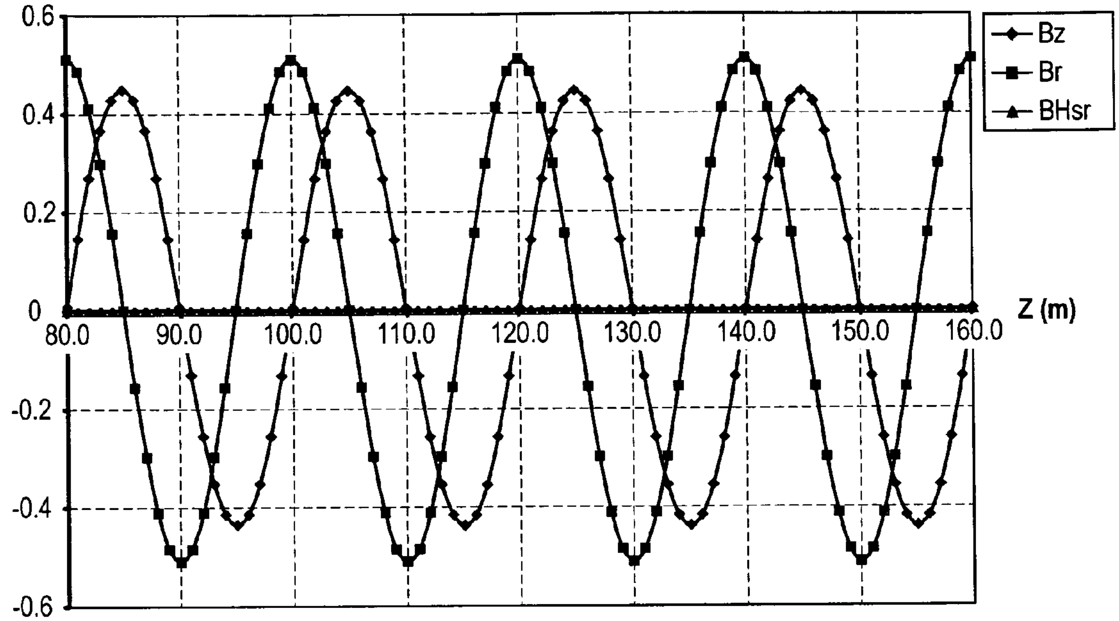
Figure 439:
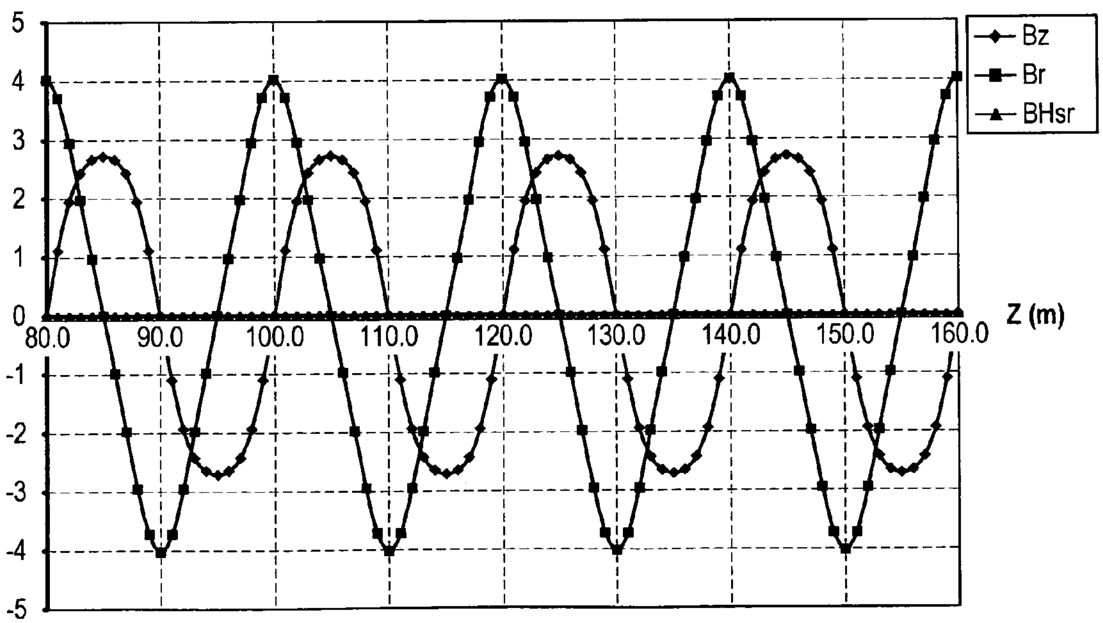
Figure 440:
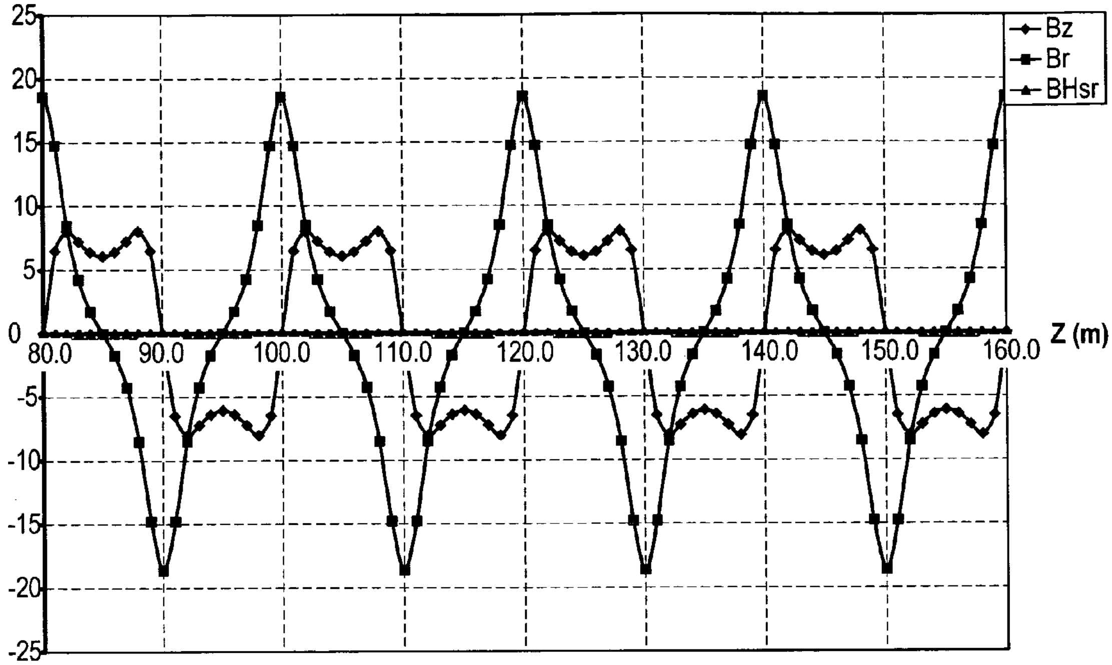

FIGS. 438, 439, and 440 show magnetic field components as a function of hole depth in neighboring observation wells.

Figure 441:
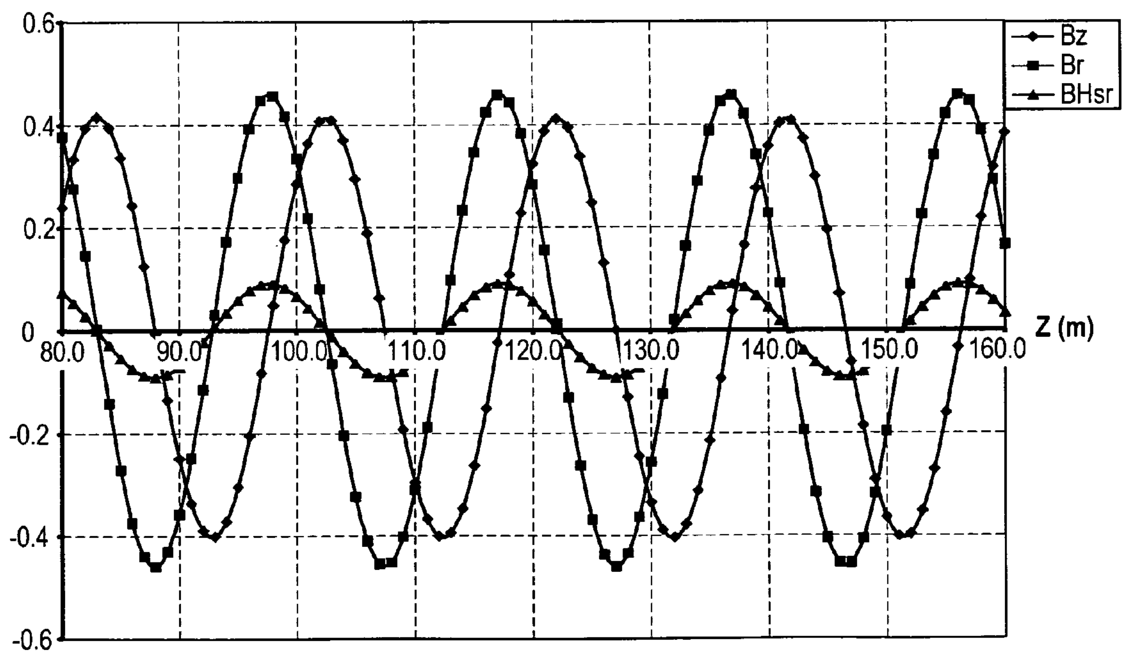

FIG. 441 shows magnetic field components for a build-up section of a wellbore.

Figure 442:
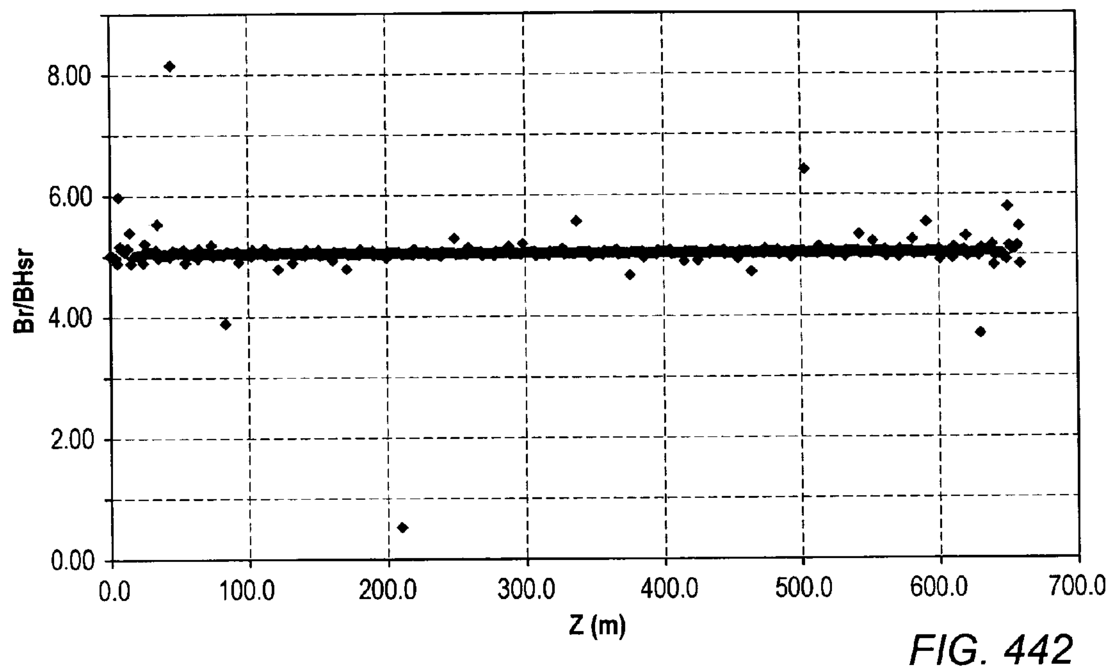

FIG. 442 depicts a ratio of magnetic field components for a build-up section of a wellbore.

Figure 443:
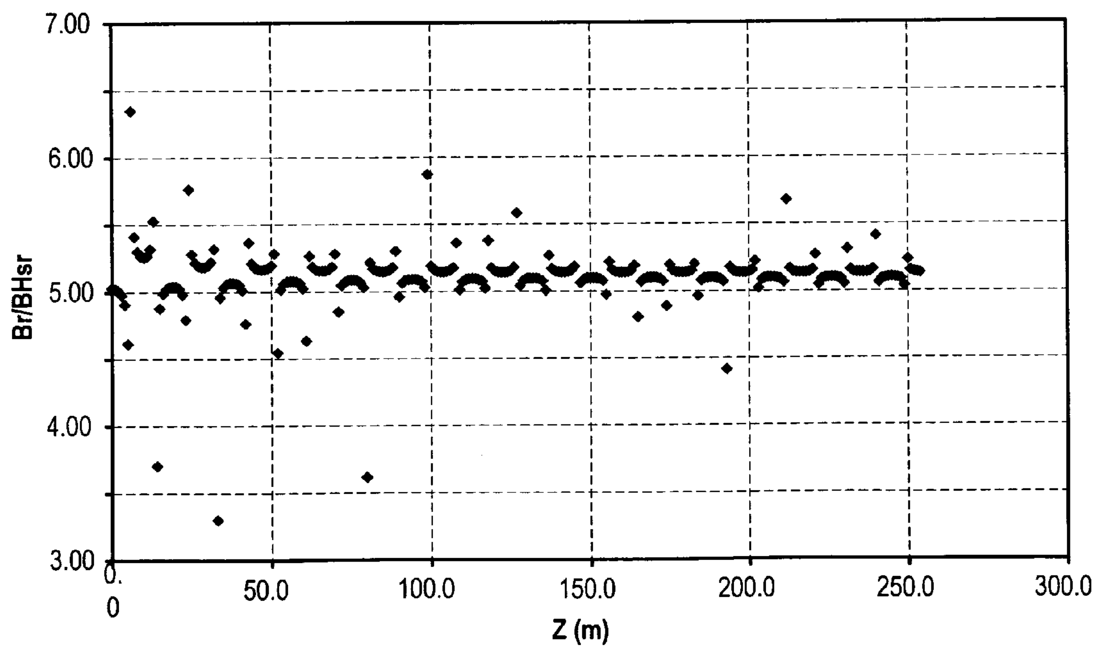

FIG. 443 depicts a ratio of magnetic field components for a build-up section of a wellbore.

Figure 444:
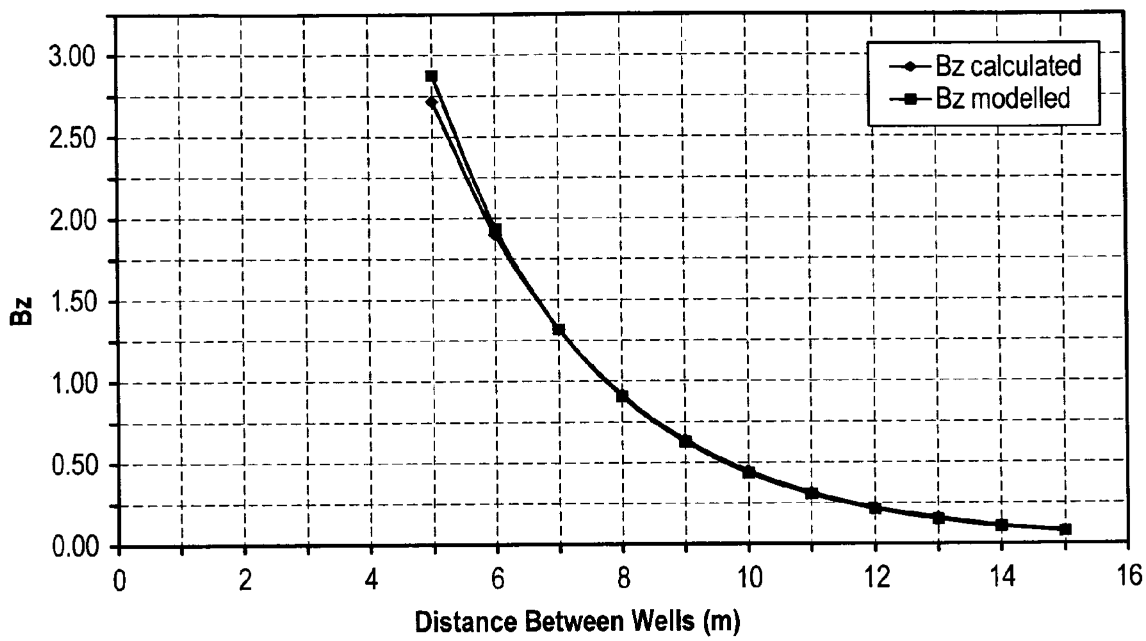

FIG. 444 depicts comparisons of magnetic field components determined from experimental data and magnetic field components modeled using analytical equations versus distance between wellbores.

Figure 445:
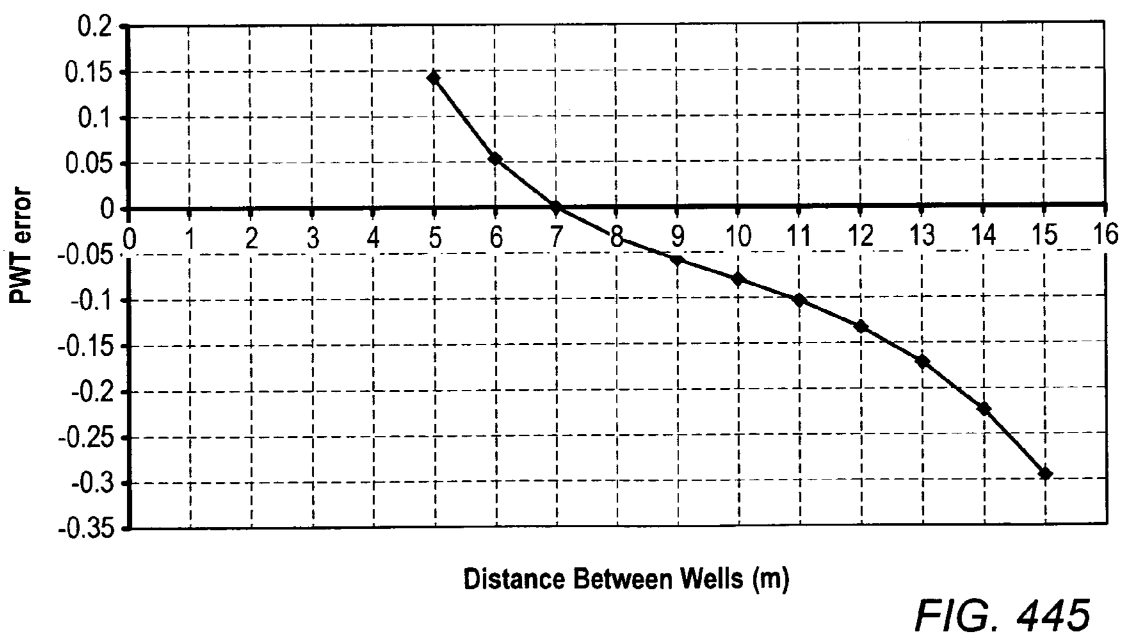

FIG. 445 depicts the difference between the two curves in FIG. 444.

Figure 446:
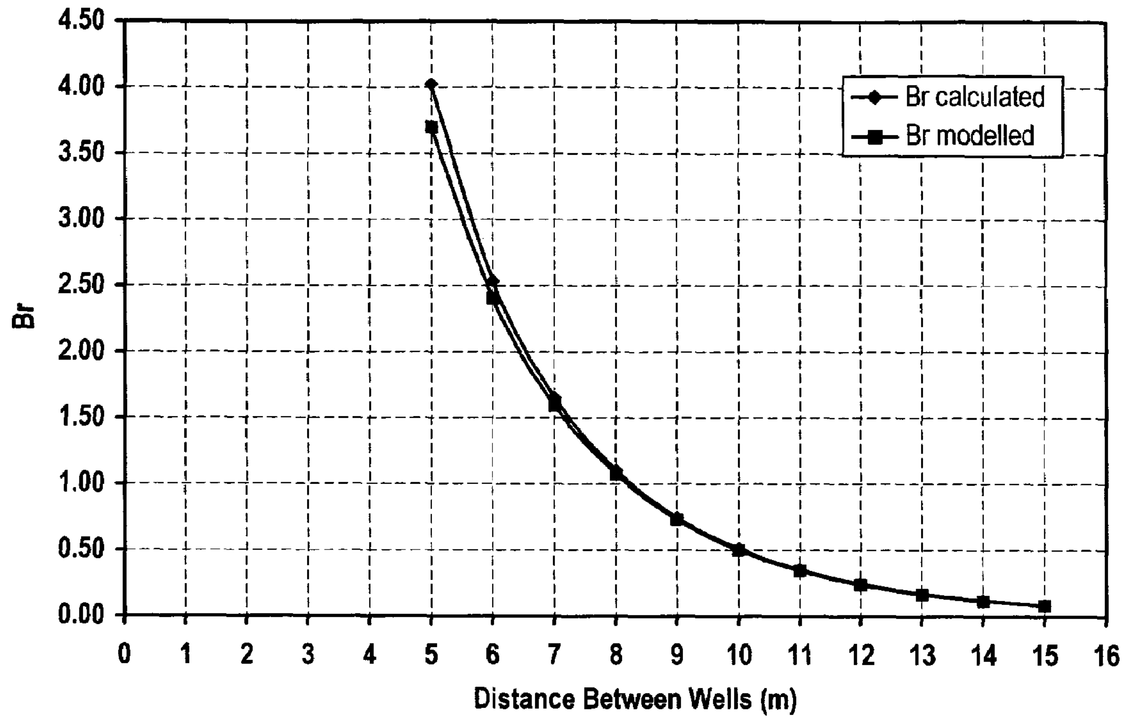

FIG. 446 depicts comparisons of magnetic field components determined from experimental data and magnetic field components modeled using analytical equations versus distance between wellbores.

Figure 447:
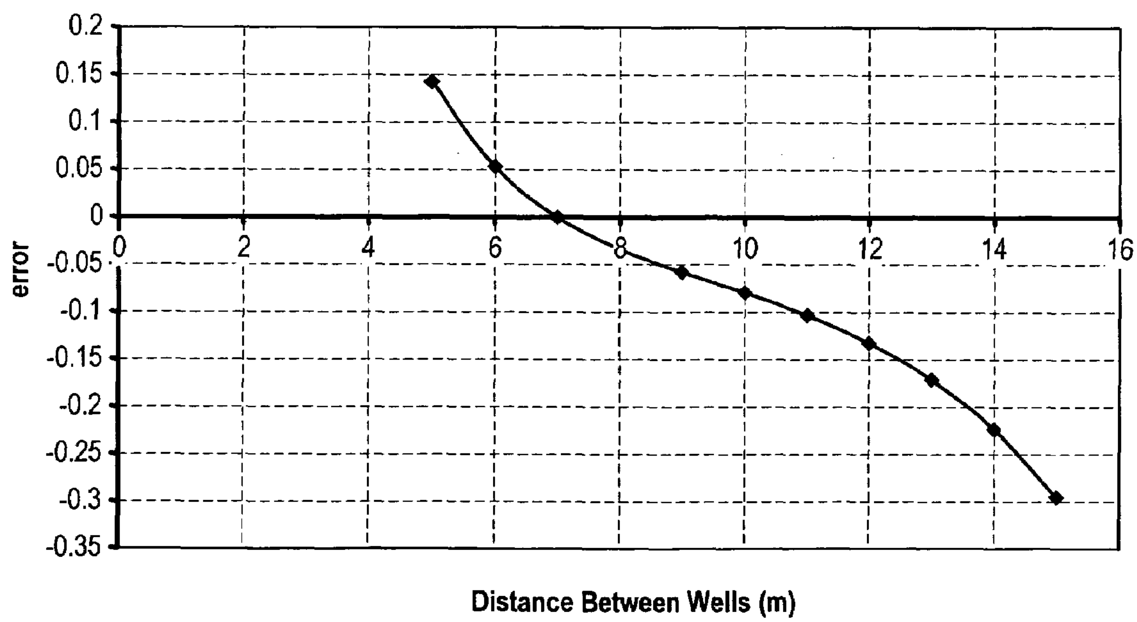

FIG. 447 depicts the difference between the two curves in FIG. 446.

Figure 448:
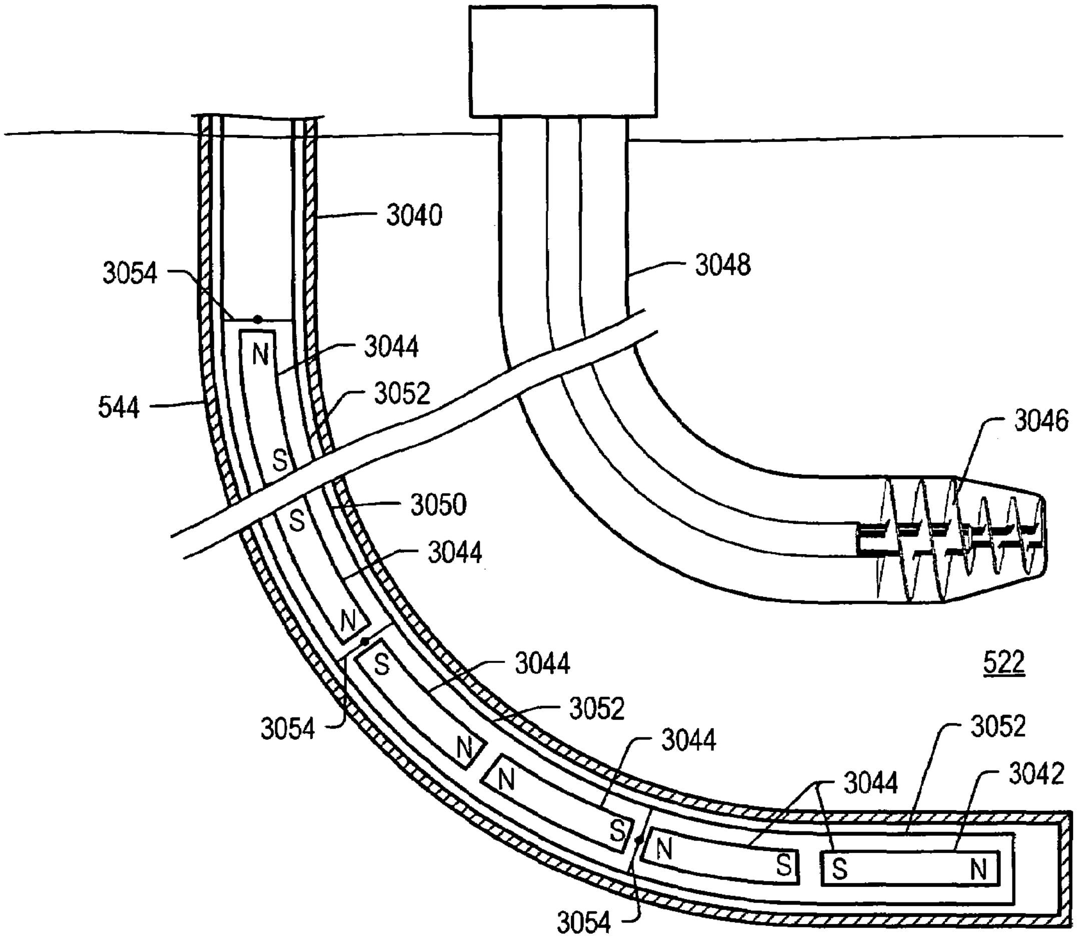

FIG. 448 depicts a schematic representation of an embodiment of a magnetostatic drilling operation.

Figure 449:
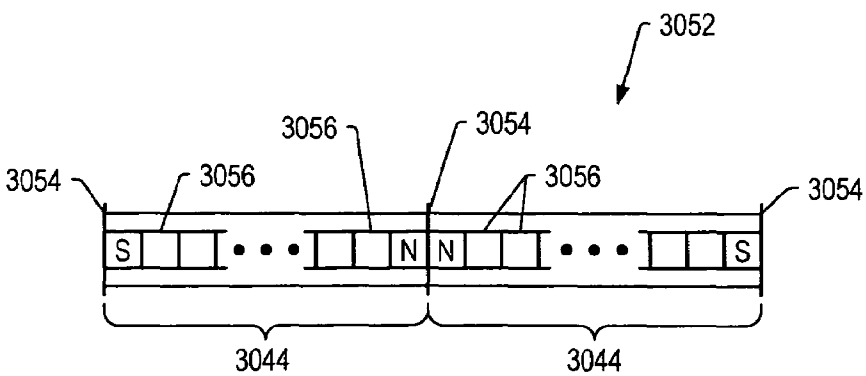

FIG. 449 depicts an embodiment of a section of a conduit with two magnetic segments.

Figure 450:
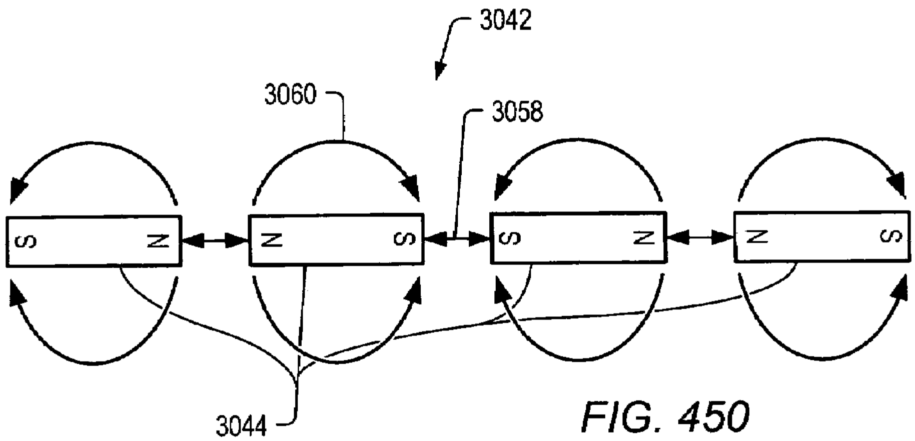

FIG. 450 depicts a schematic of a portion of a magnetic string.

Figure 451:
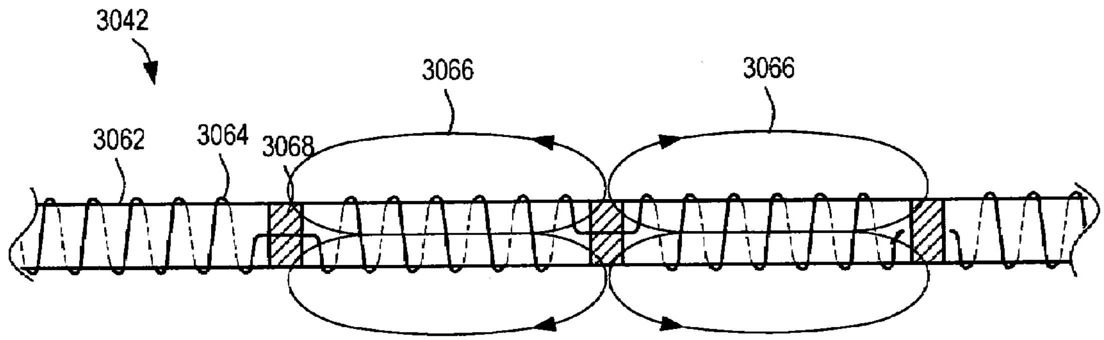

FIG. 451 depicts an embodiment of a magnetic string.

Figure 452:
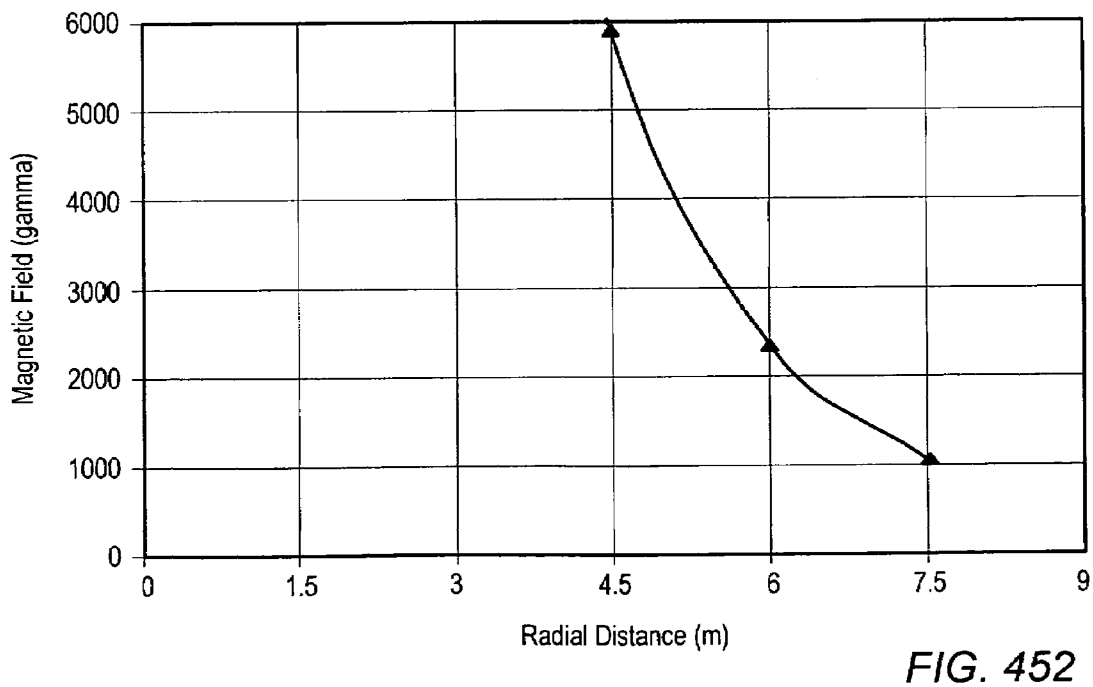

FIG. 452 depicts magnetic field strength versus radial distance using analytical calculations.

Figure 453:
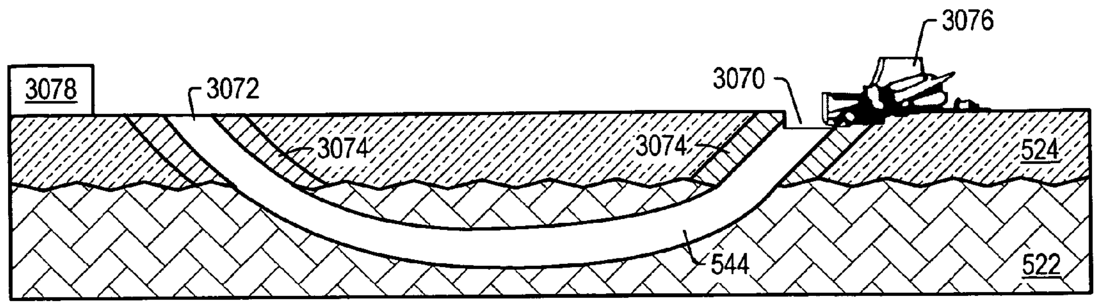

FIG. 453 depicts an embodiment an opening in a hydrocarbon containing formation that has been formed with a river crossing rig.

Figure 454:
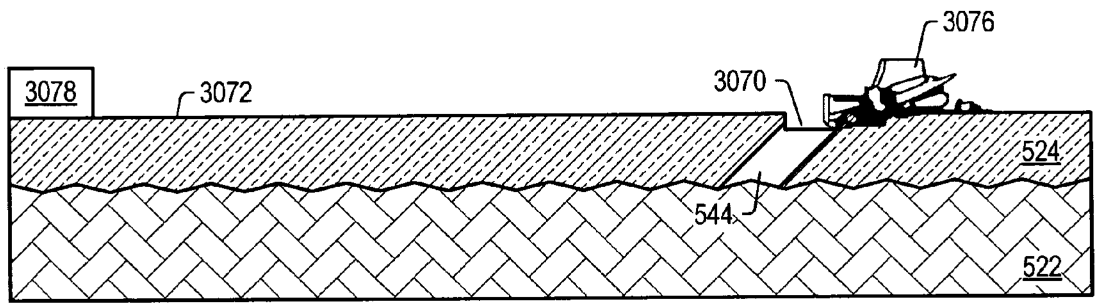

FIG. 454 depicts an embodiment for forming a portion of an opening in an overburden at a first end of the opening.

Figure 455:
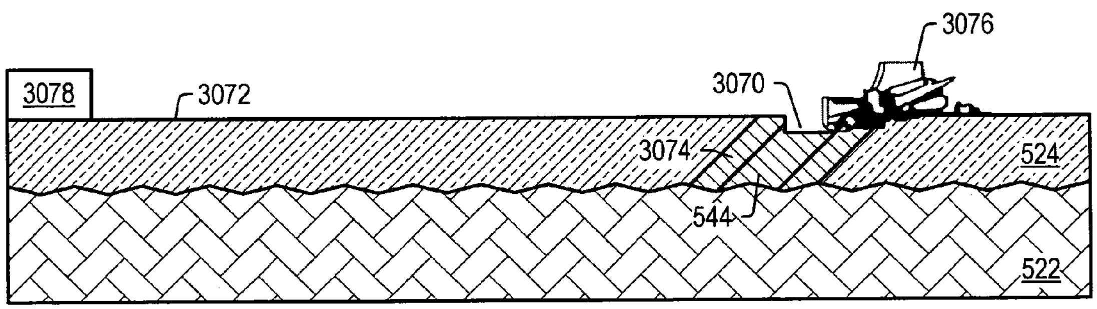

FIG. 455 depicts an embodiment of reinforcing material placed in a portion of an opening in an overburden at a first end of the opening.

Figure 456:
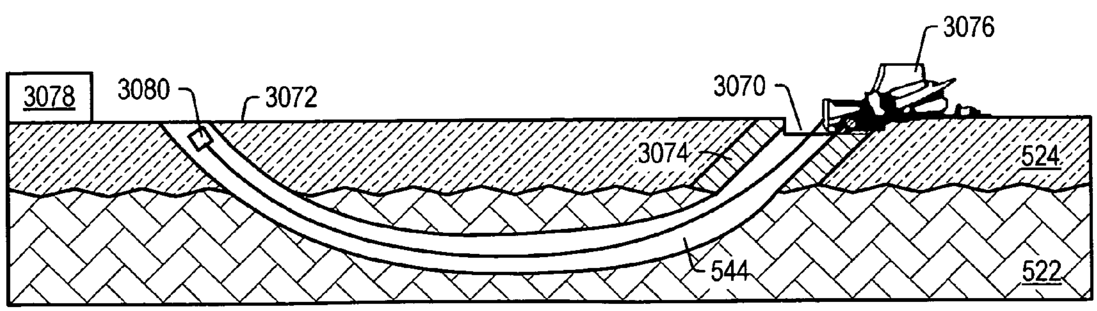

FIG. 456 depicts an embodiment for forming an opening in a hydrocarbon layer and an overburden.

Figure 457:
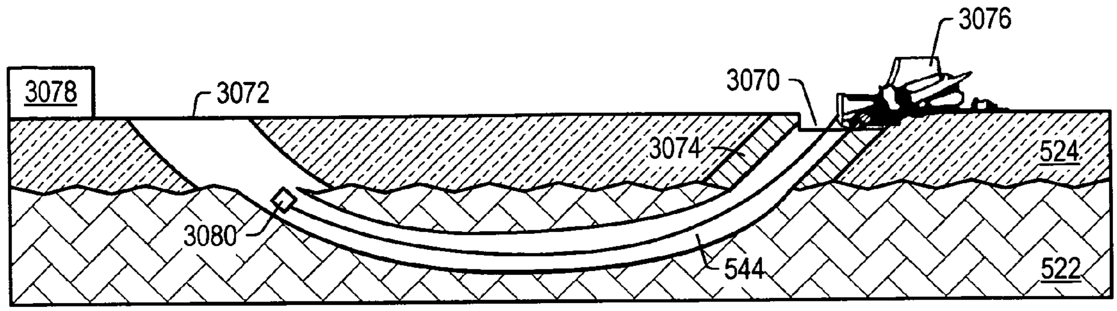

FIG. 457 depicts an embodiment of a reamed out portion of an opening in an overburden at a second end of the opening.

Figure 458:
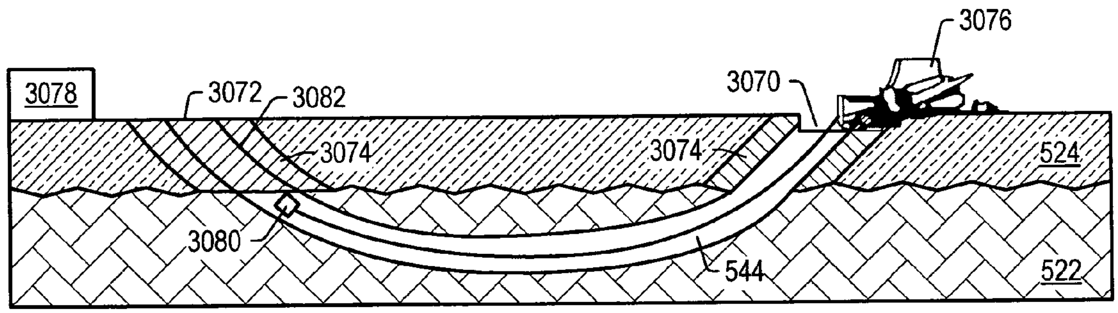

FIG. 458 depicts an embodiment of reinforcing material placed in the reamed out portion of an opening.

Figure 459:
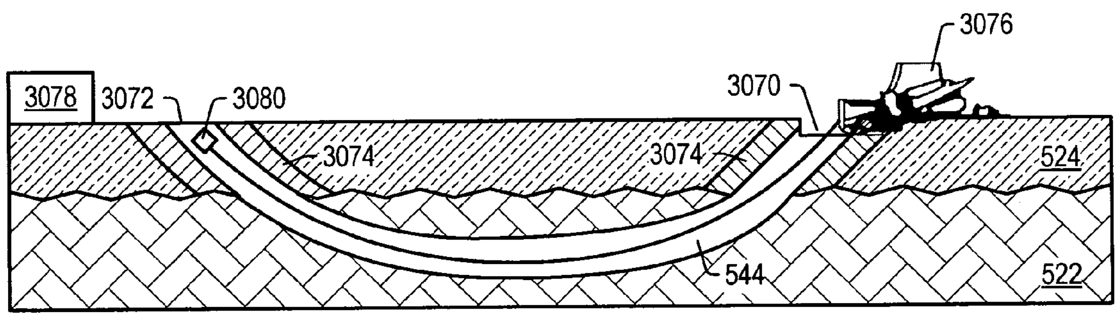

FIG. 459 depicts an embodiment of reforming an opening through a reinforcing material in a portion of an opening.

Figure 460:
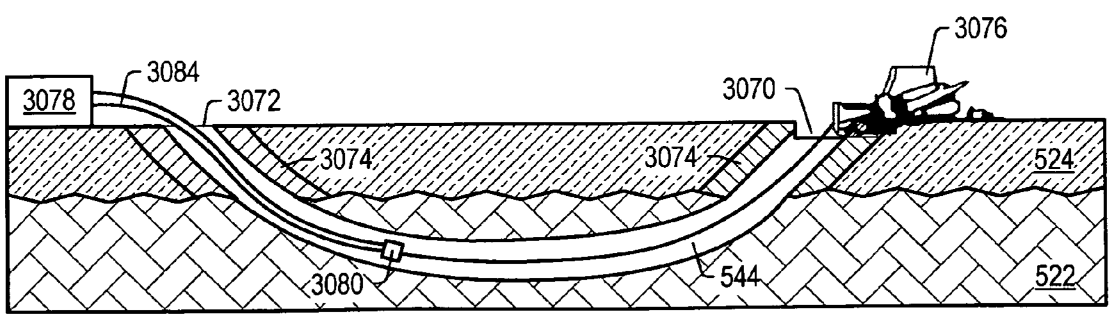

FIG. 460 depicts an embodiment for installing equipment into an opening.

Figure 461:
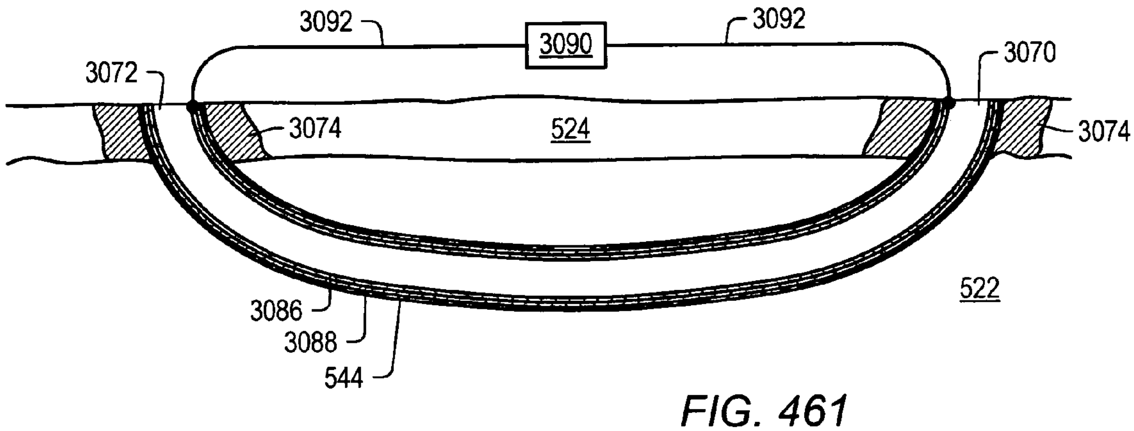

FIG. 461 depicts an embodiment of a wellbore with a casing that may be energized to produce a magnetic field.

Figure 462:
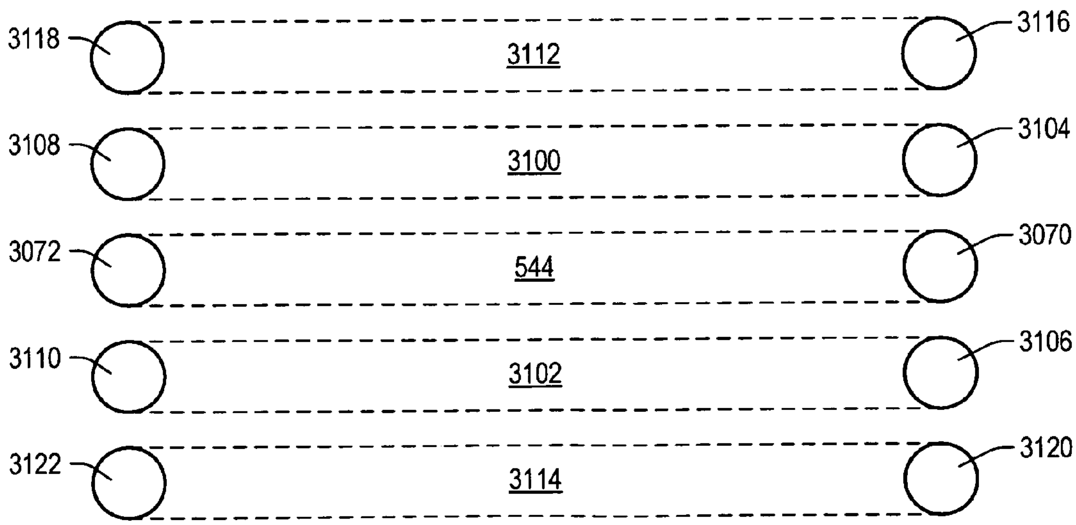

FIG. 462 depicts a plan view for an embodiment of forming one or more wellbores using magnetic tracking of a previously formed wellbore.

Figure 463:
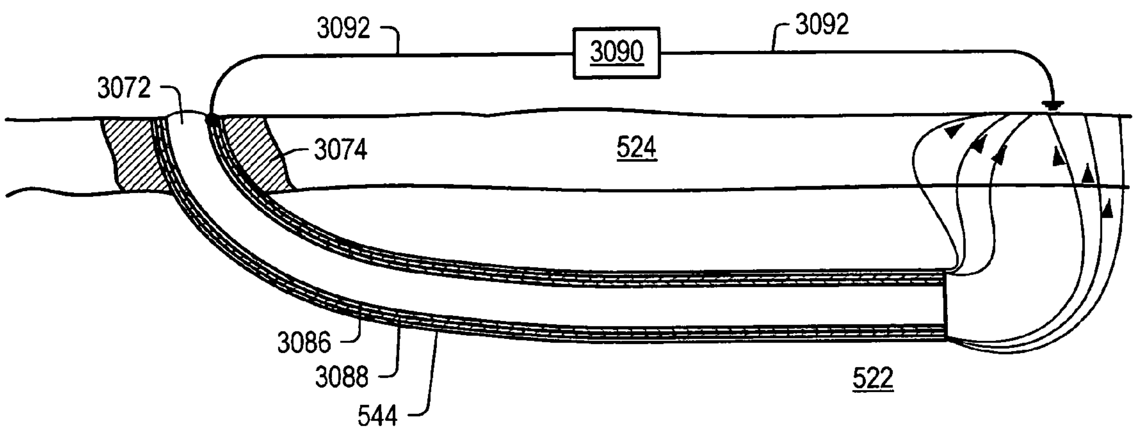

FIG. 463 depicts another embodiment of a wellbore with a casing that may be energized to produce a magnetic field.

Figure 464:
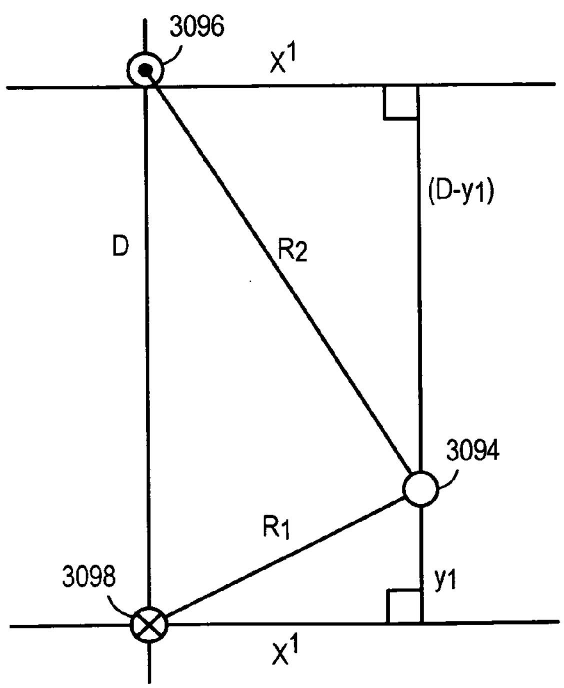

FIG. 464 shows distances between wellbores and the surface used for a analytical equations.

Figure 465:
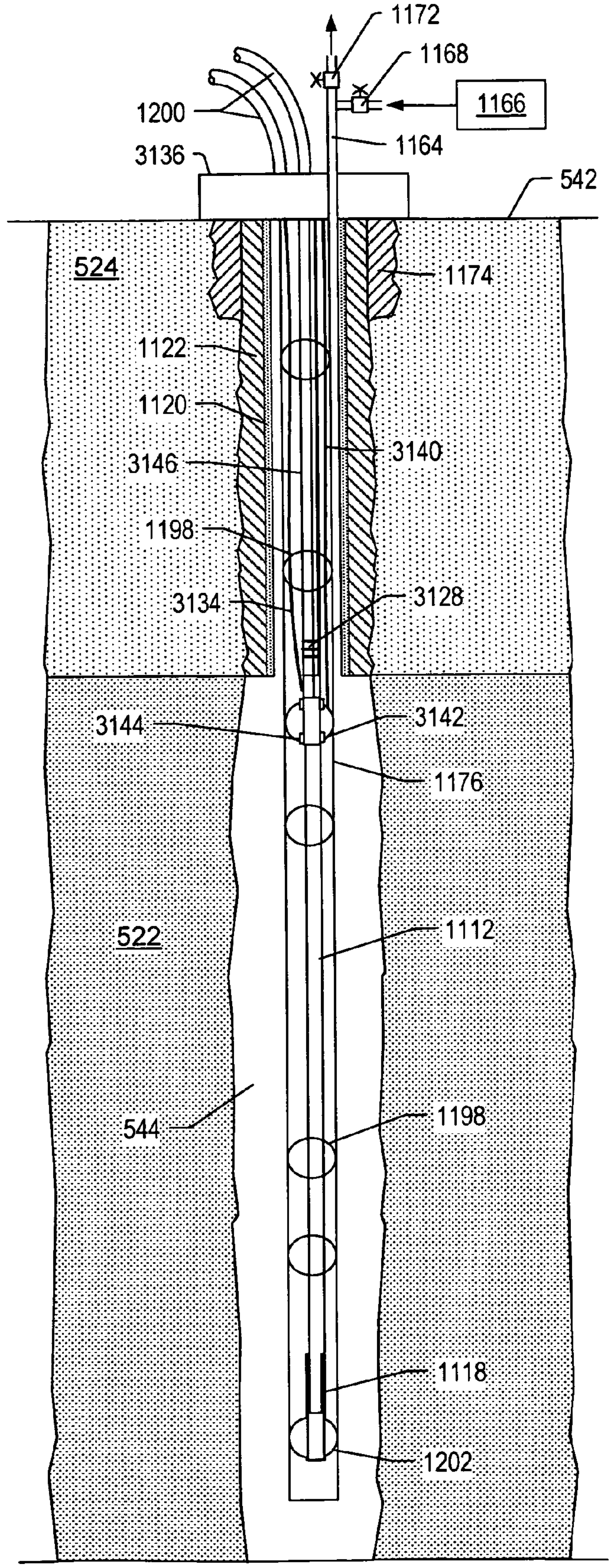

FIG. 465 depicts an embodiment of a conductor-in-conduit heat source with a lead-out conductor coupled to a sliding connector.

Figure 466:
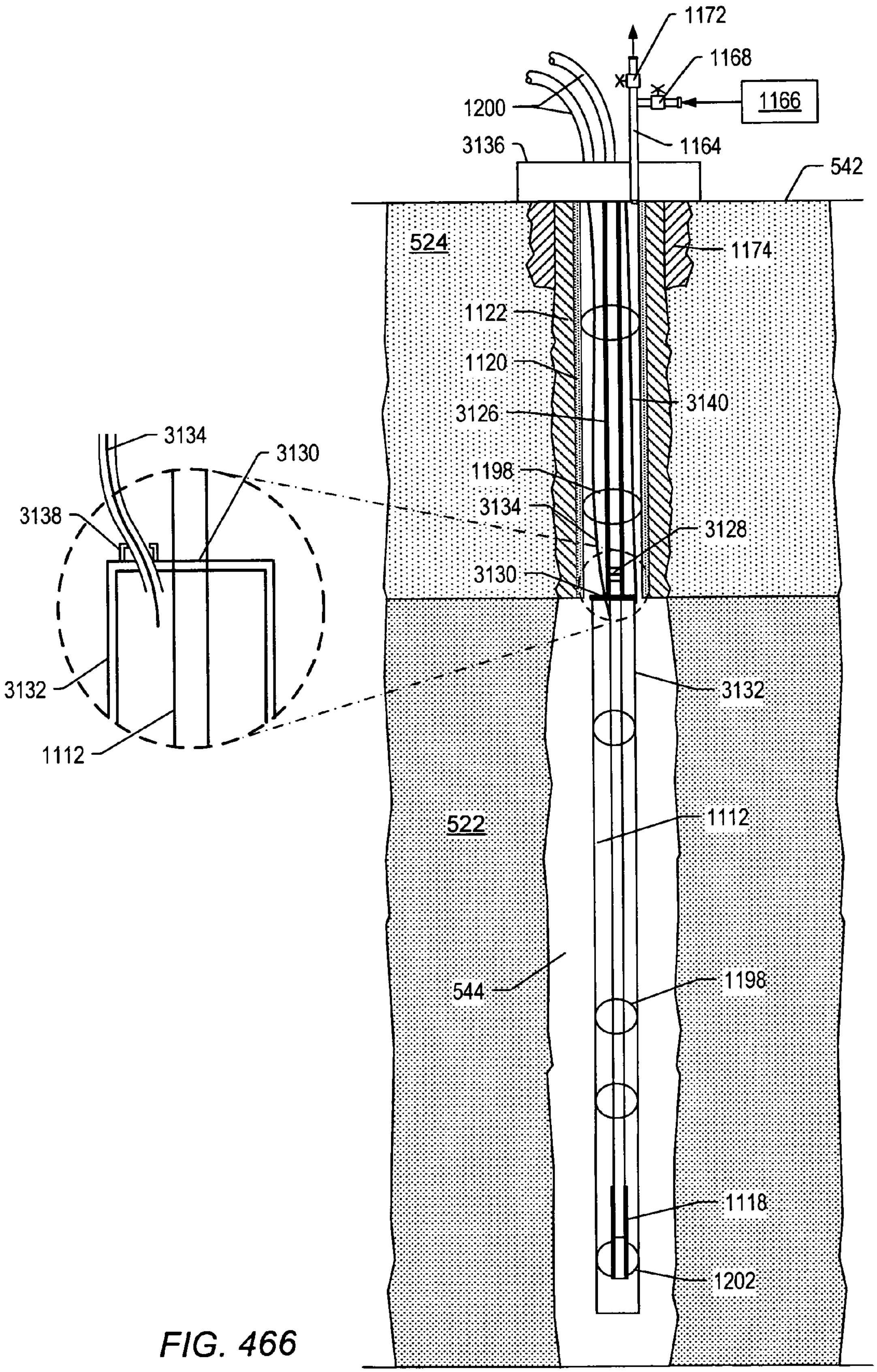

FIG. 466 depicts an embodiment of a conductor-in-conduit heat source with lead-in and lead-out conductors in the overburden.

Figure 467:
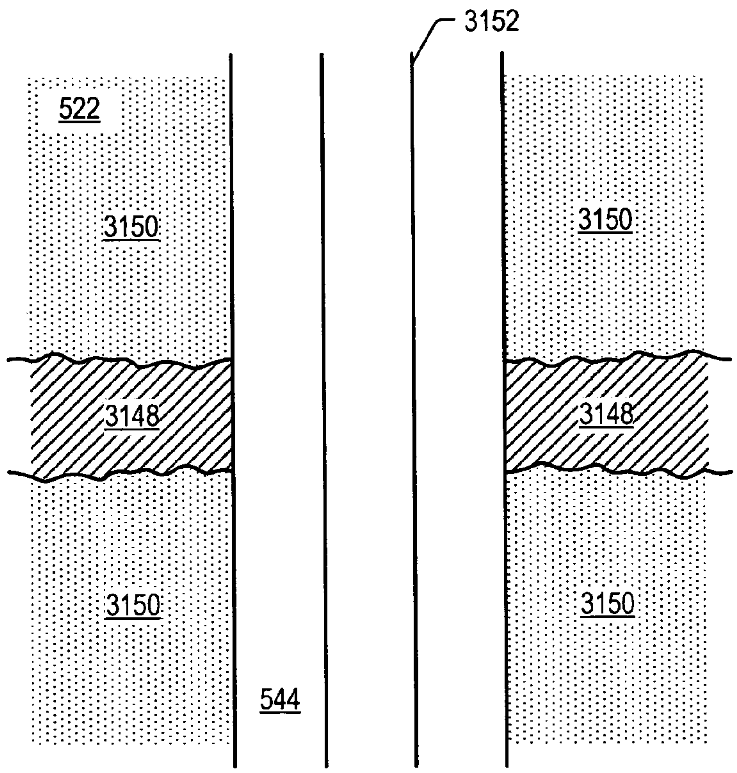

FIG. 467 depicts an embodiment of a heater in an open wellbore of a hydrocarbon containing formation with a rich layer.

Figure 468:
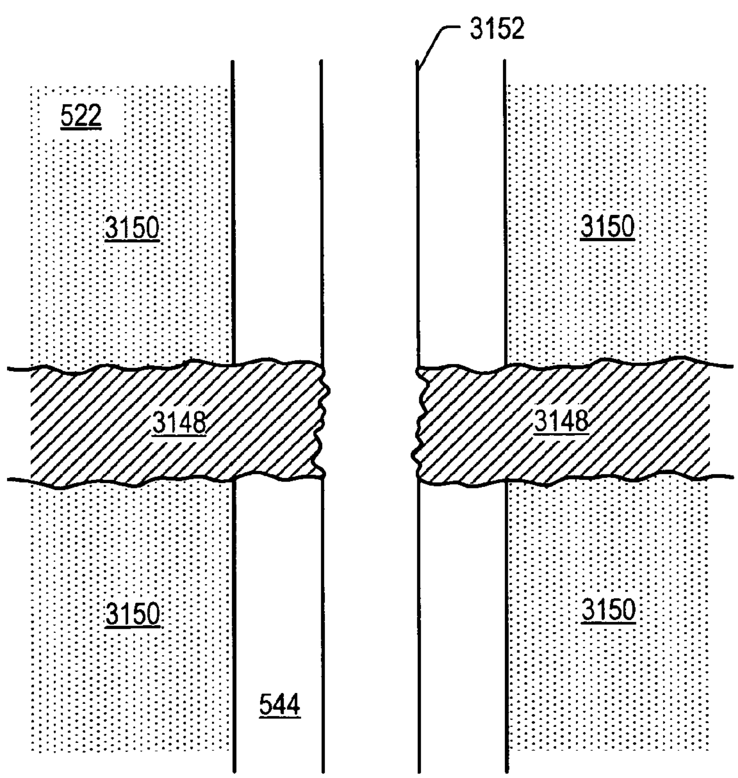

FIG. 468 depicts an embodiment of a heater in an open wellbore of a hydrocarbon containing formation with an expanded rich layer.

Figure 469:
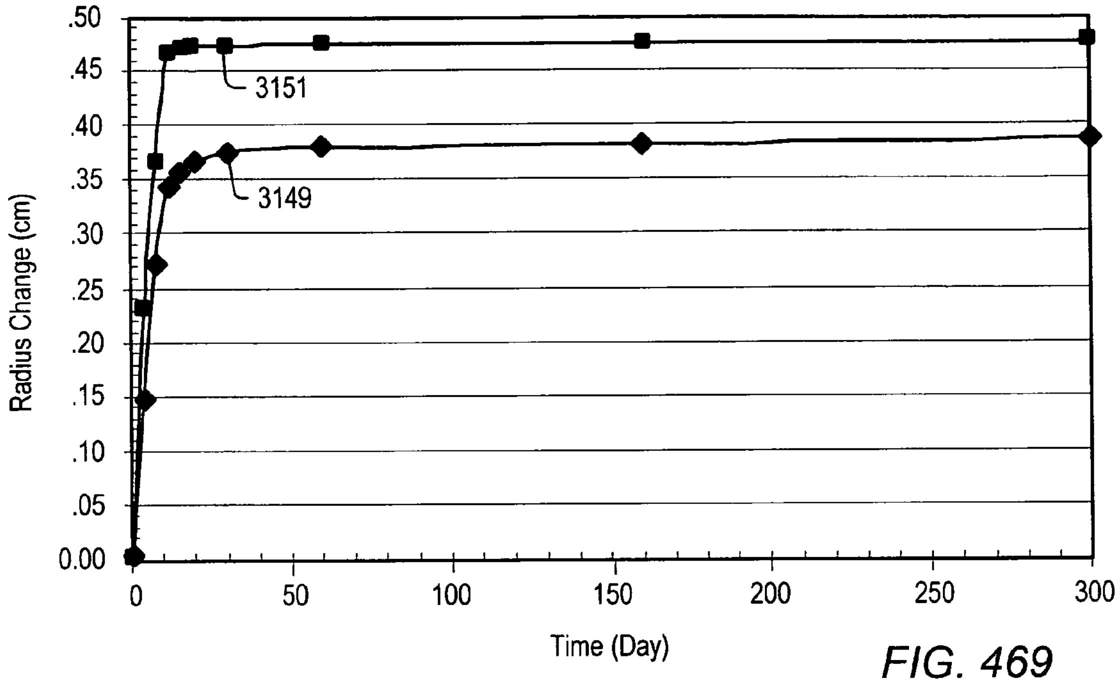

FIG. 469 depicts calculations of wellbore radius change versus time for heating in an open wellbore.

Figure 470:
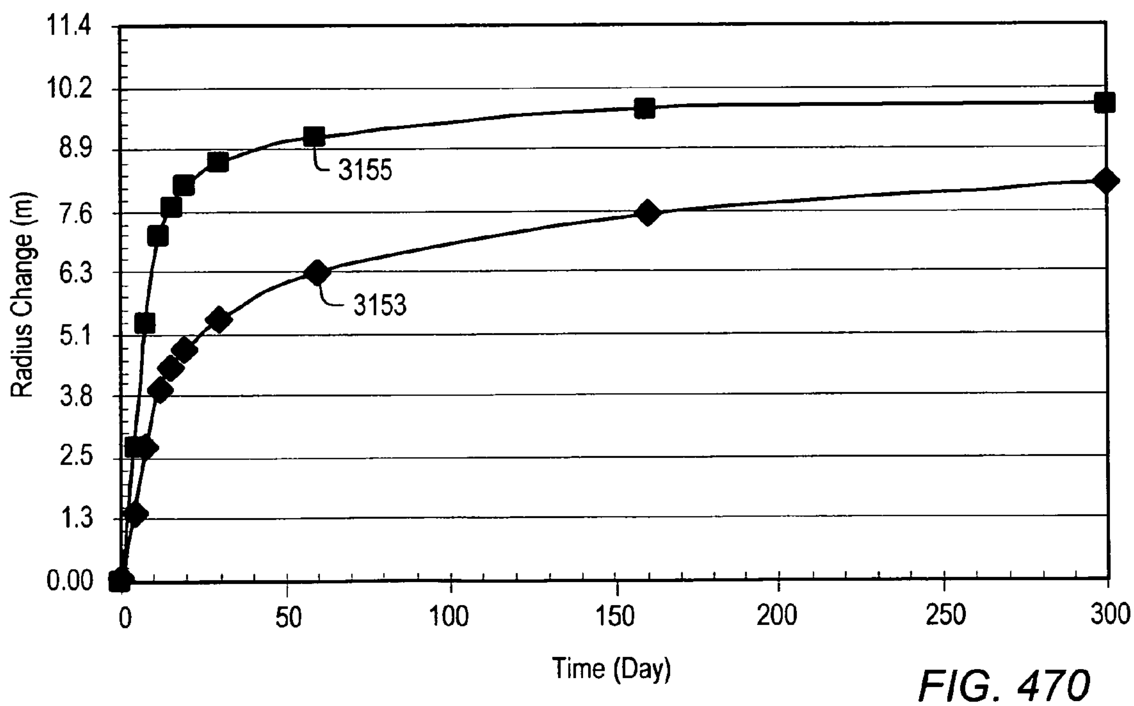

FIG. 470 depicts calculations of wellbore radius change versus time for heating in an open wellbore.

Figure 471:
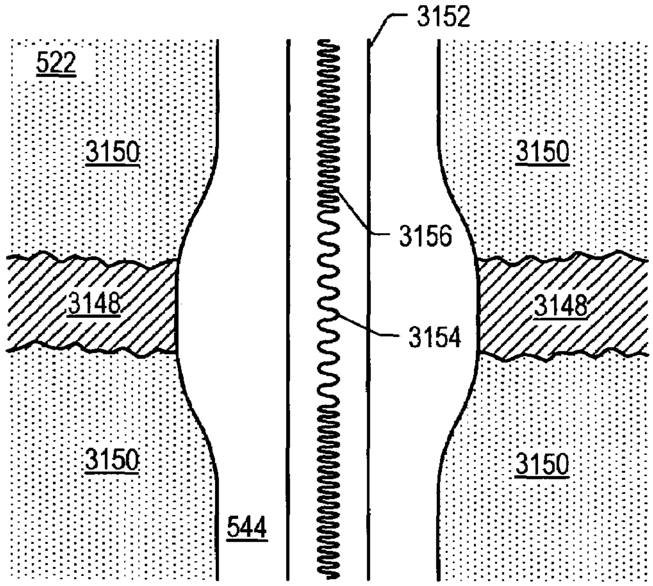

FIG. 471 depicts an embodiment of a heater in an open wellbore of a hydrocarbon containing formation with an expanded wellbore proximate a rich layer.

Figure 472:
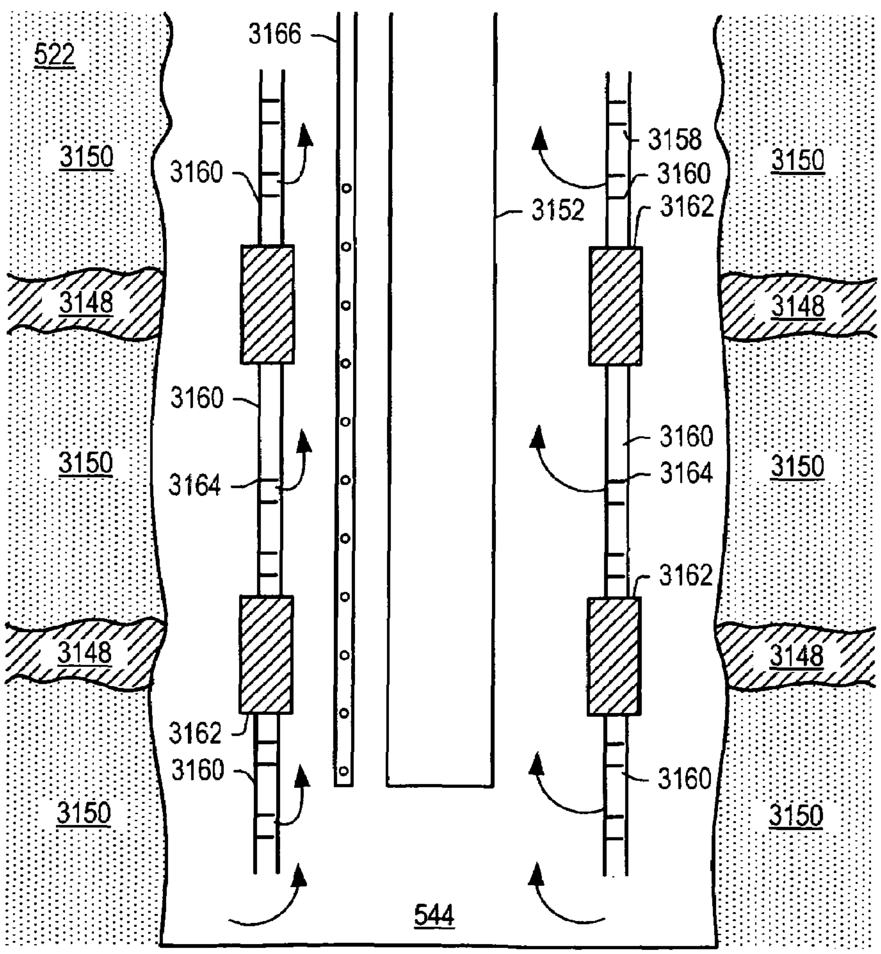

FIG. 472 depicts an embodiment of a heater in an open wellbore with a liner placed in the opening.

Figure 473:
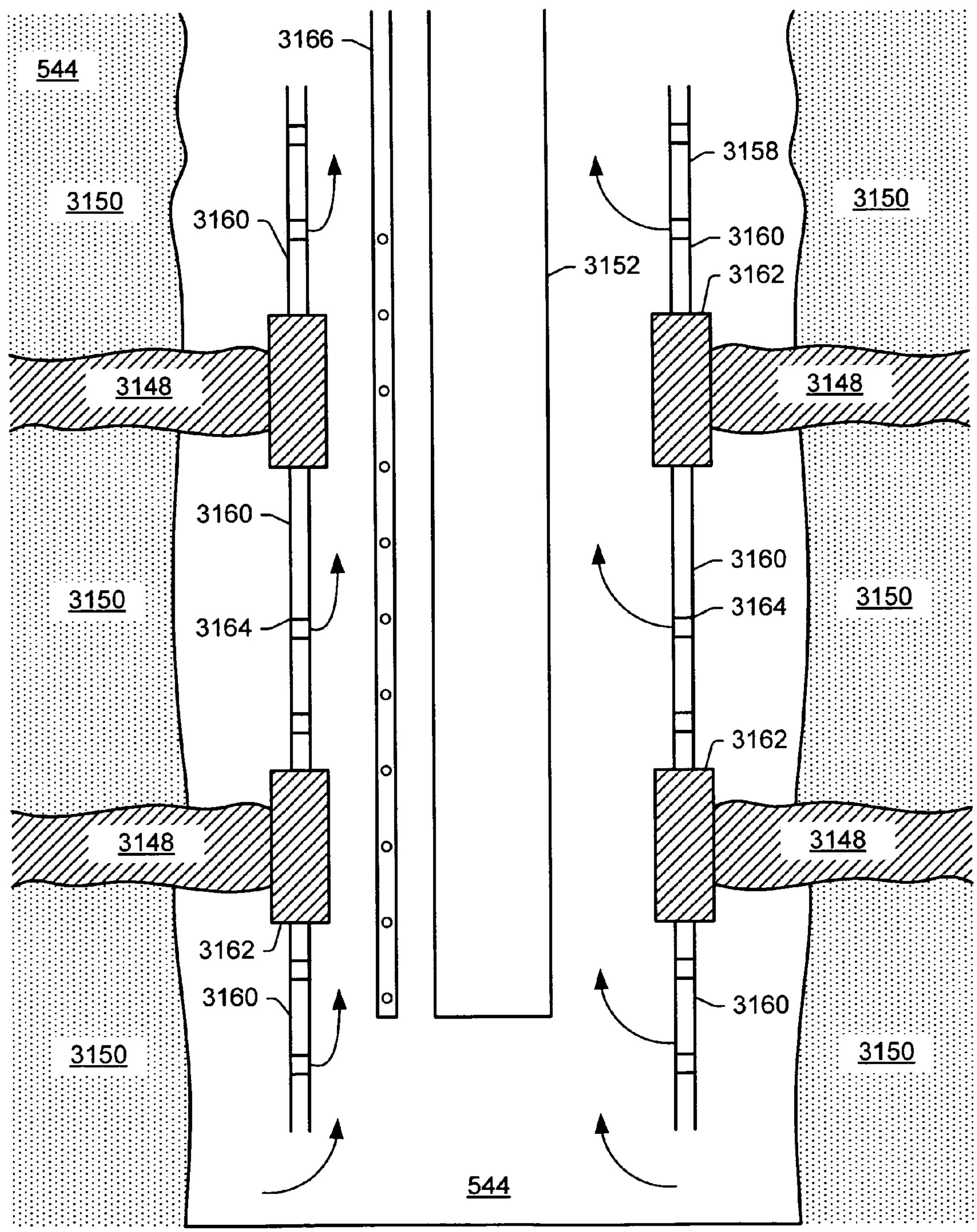

FIG. 473 depicts an embodiment of a heater in an open wellbore with a liner placed in the opening and the formation expanded against the liner.

Figure 474:
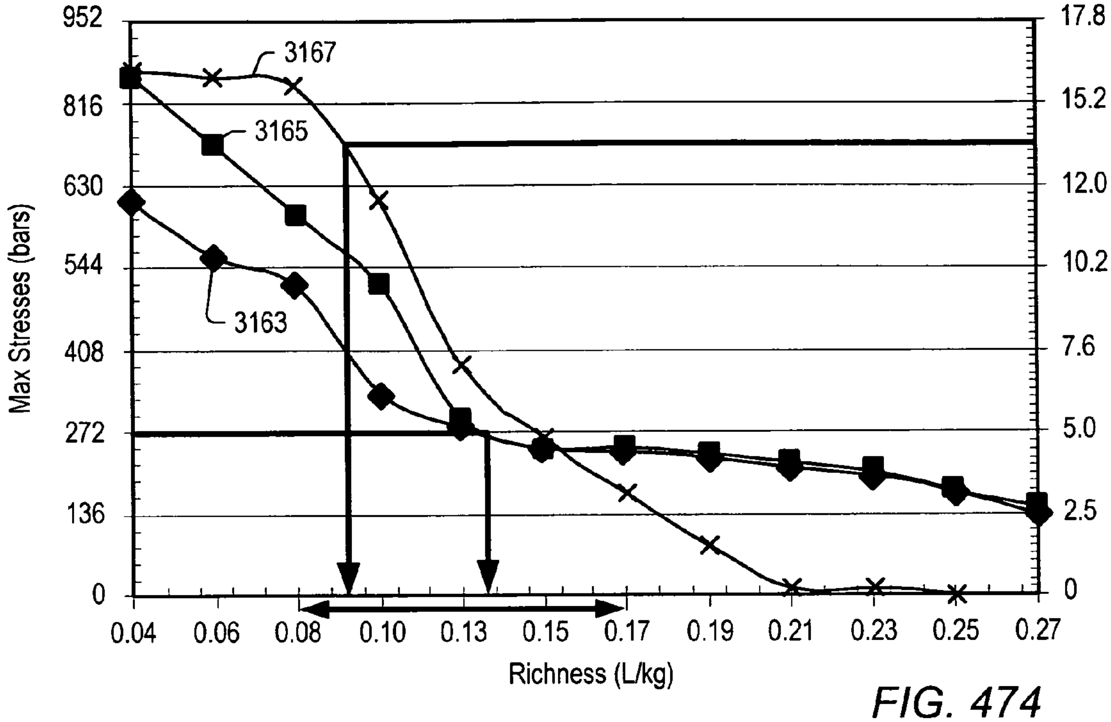

FIG. 474 depicts maximum stress and hole size versus richness for calculations of heating in an open wellbore.

Figure 475:
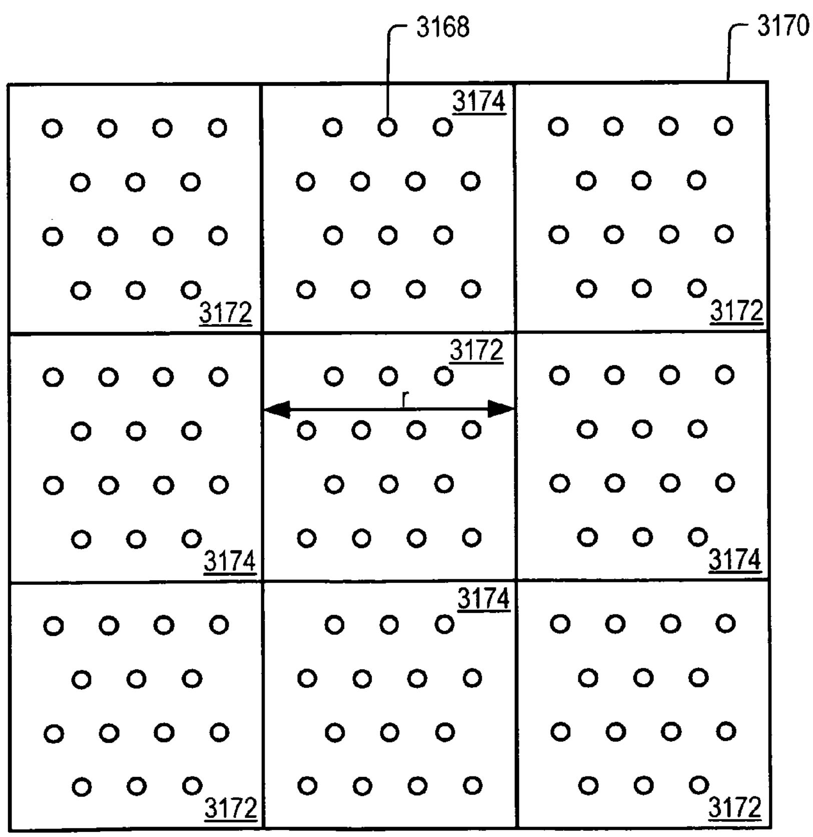

FIG. 475 depicts an embodiment of a plan view of a pattern of heaters for heating a hydrocarbon containing formation.

Figure 476:
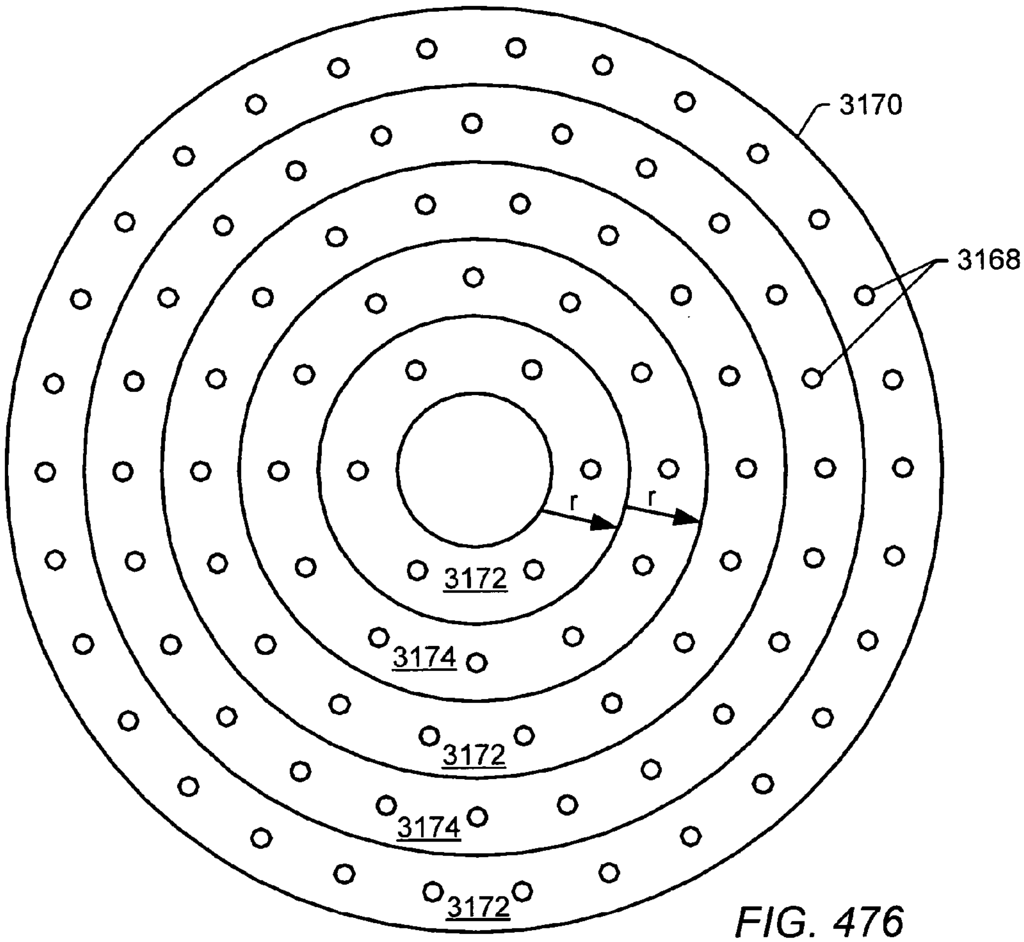

FIG. 476 depicts an embodiment of a plan view of a pattern of heaters for heating a hydrocarbon containing formation.

Figure 477:
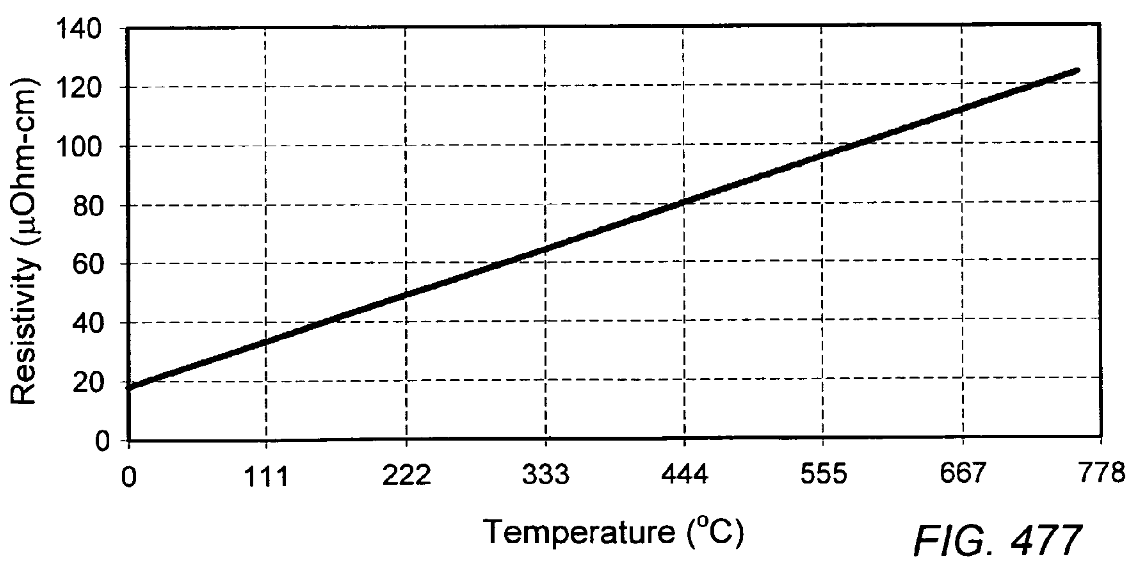

FIG. 477 shows DC resistivity versus temperature for a 1% carbon steel temperature limited heater.

Figure 478:
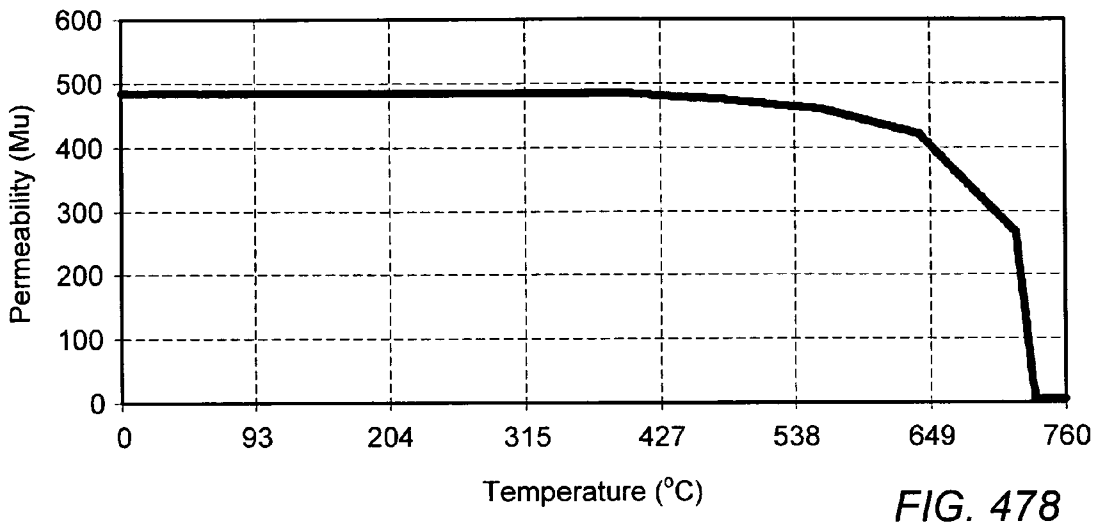

FIG. 478 shows relative permeability versus temperature for a 1% carbon steel temperature limited heater.

Figure 479:
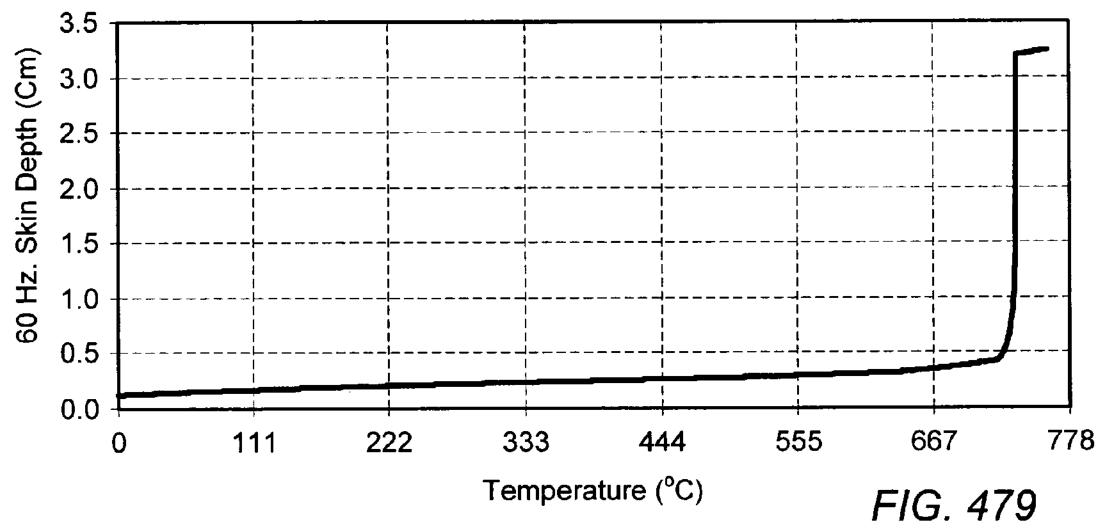

FIG. 479 shows skin depth versus temperature for a 1% carbon steel temperature limited heater at 60 Hz.

Figure 480:
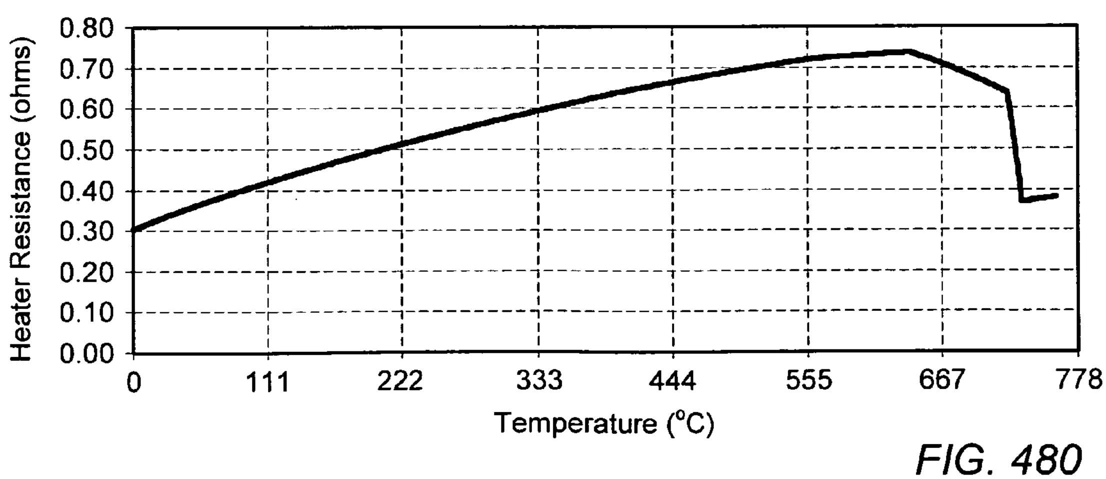

FIG. 480 shows AC resistance versus temperature for a 1% carbon steel temperature limited heater at 60 Hz.

Figure 481:
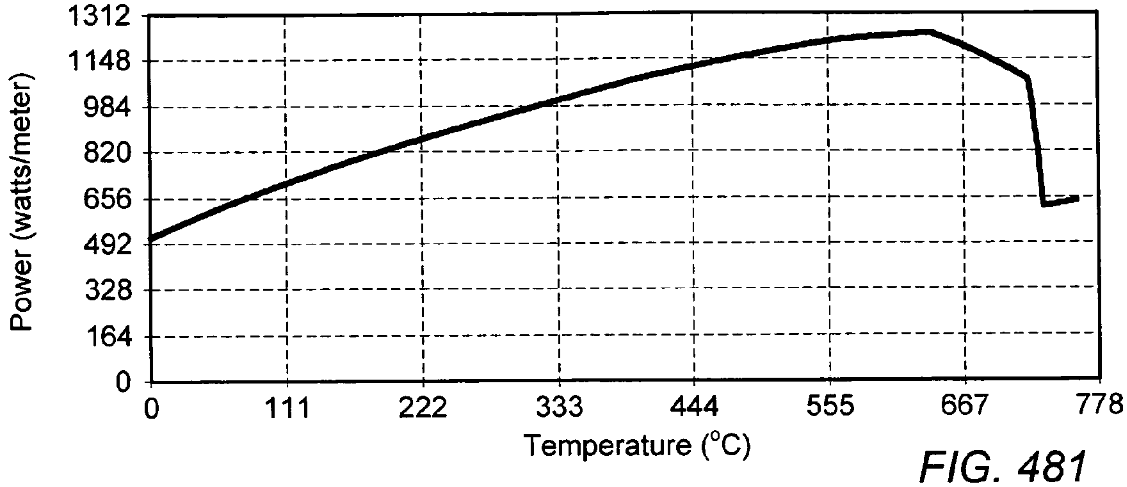

FIG. 481 shows heater power per meter versus temperature for a 1% carbon steel rod at 350 A at 60 Hz.

Figure 482:
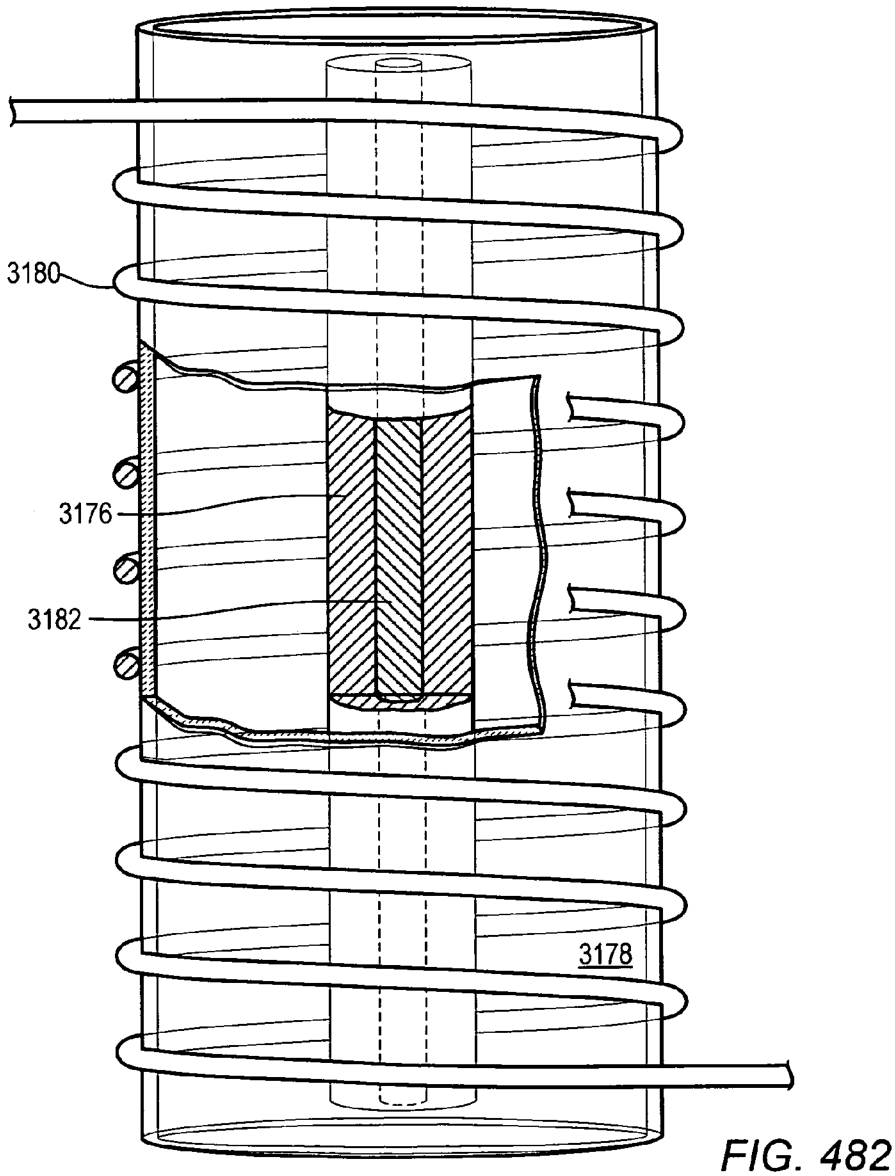

FIG. 482 depicts an embodiment for forming a composite conductor.

Figure 483:
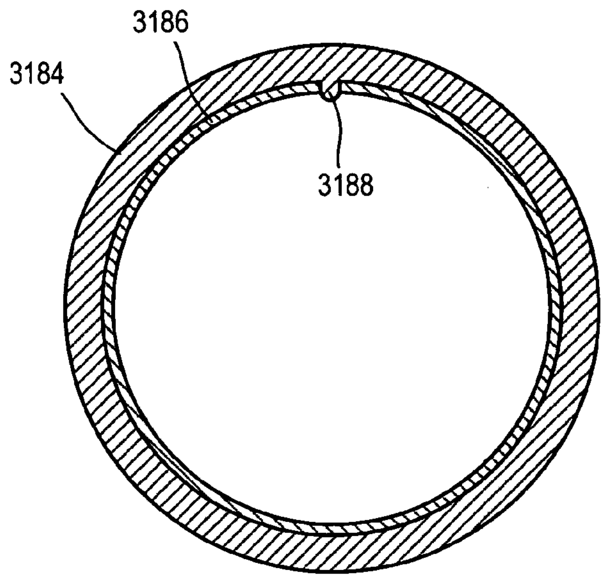

FIG. 483 depicts an embodiment of an inner conductor and an outer conductor formed by a tube-in-tube milling process.

Figure 484:
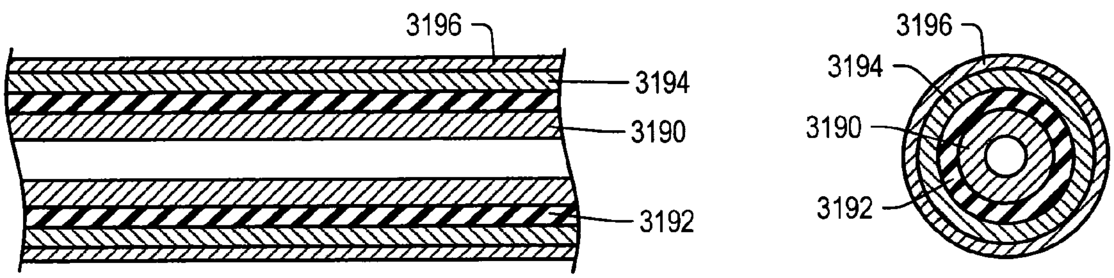

FIG. 484 depicts an embodiment of a temperature limited heater.

Figure 485:
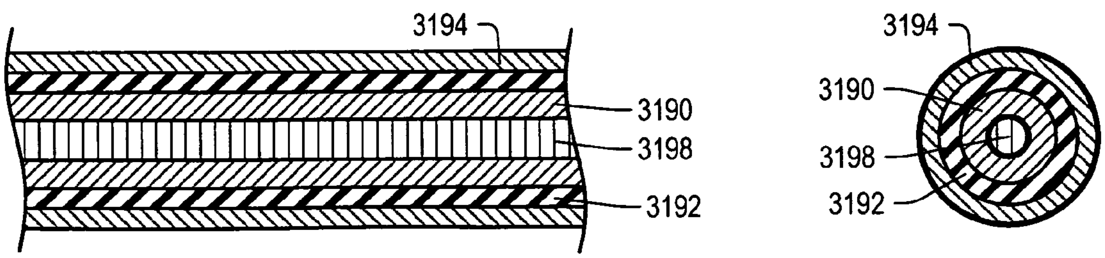

FIG. 485 depicts an embodiment of a temperature limited heater.

Figure 486:
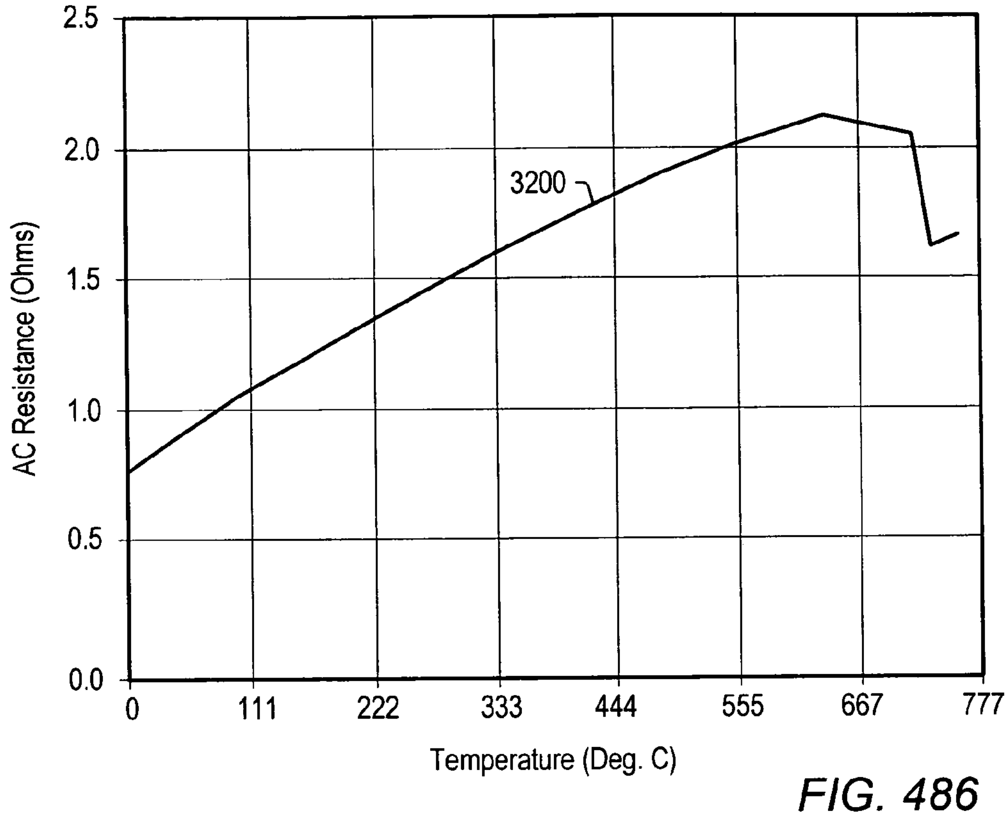

FIG. 486 depicts AC resistance versus temperature for a 1.5 cm diameter iron conductor.

Figure 487:
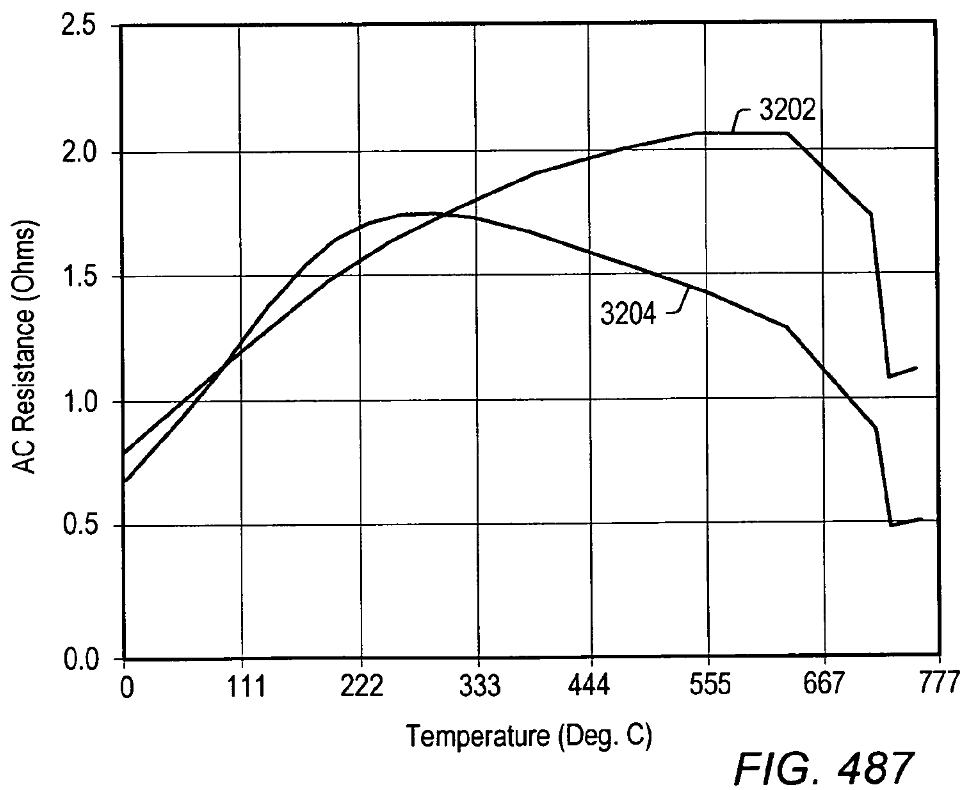

FIG. 487 depicts AC resistance versus temperature for a 1.5 cm diameter composite conductor of iron and copper.

Figure 488:
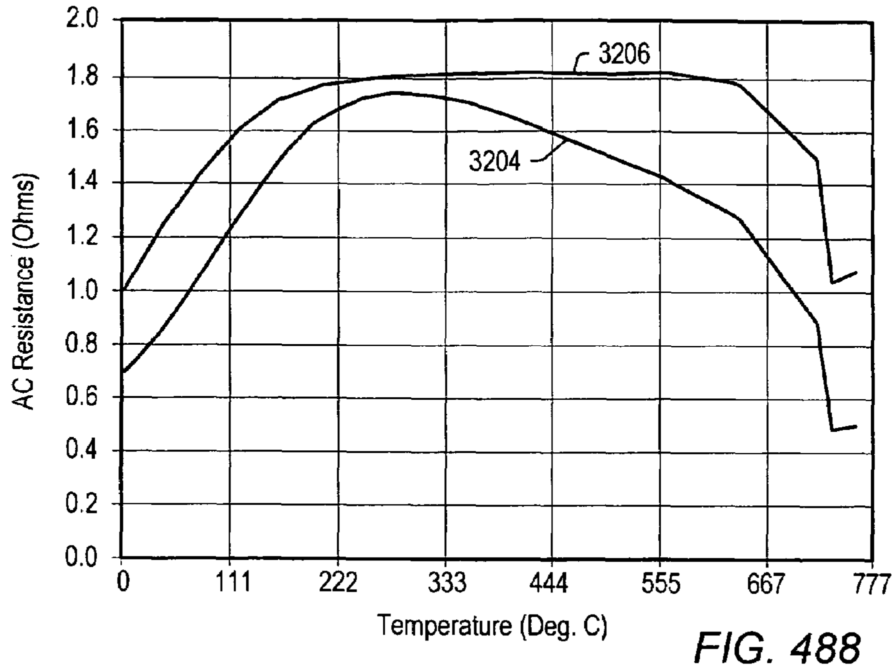

FIG. 488 depicts AC resistance versus temperature for a 1.3 cm diameter composite conductor of iron and copper and a 1.5 cm diameter composite conductor of iron and copper.

Figure 489:
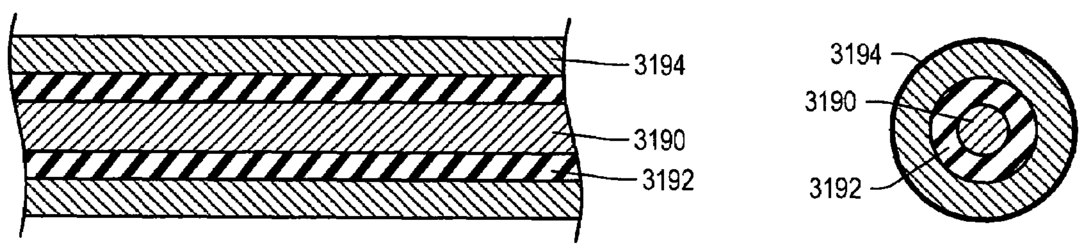

FIG. 489 depicts an embodiment of a temperature limited heater.

Figure 490:
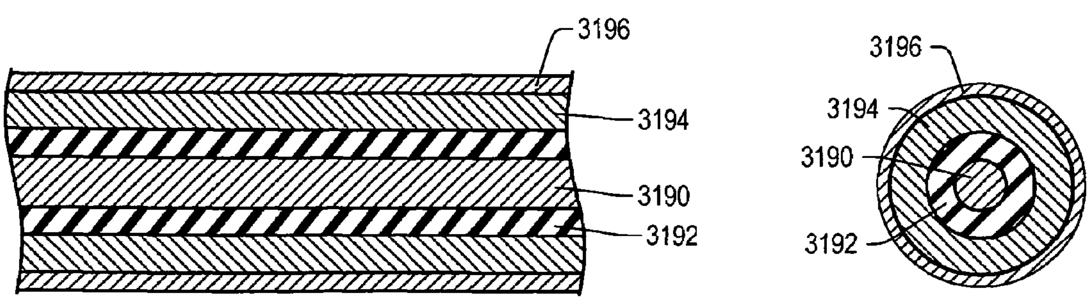

FIG. 490 depicts an embodiment of a temperature limited heater.

Figure 491:
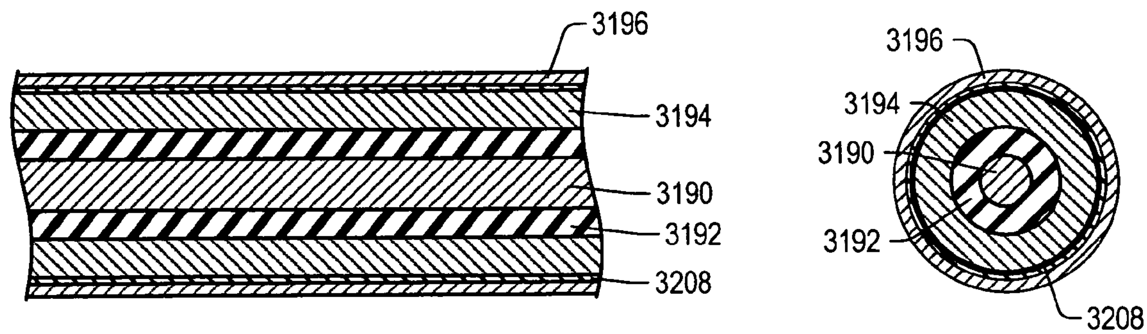

FIG. 491 depicts an embodiment of a temperature limited heater.

Figure 492:
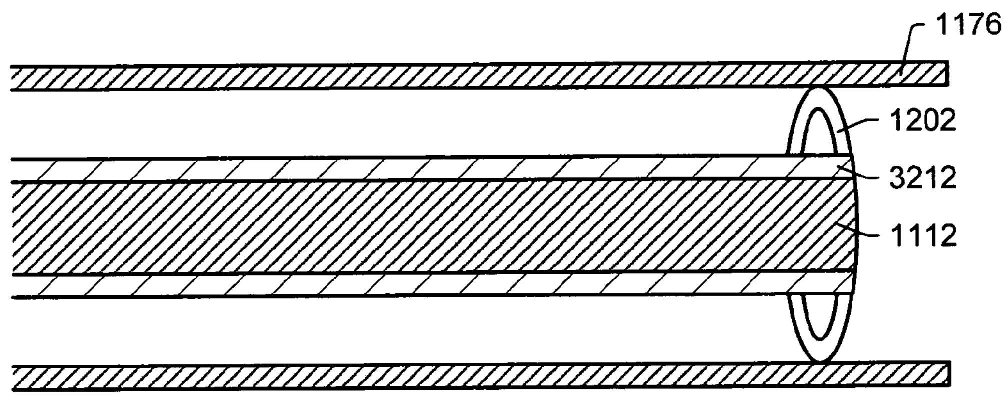

FIG. 492 depicts an embodiment of a conductor-in-conduit temperature limited heater.

Figure 493:
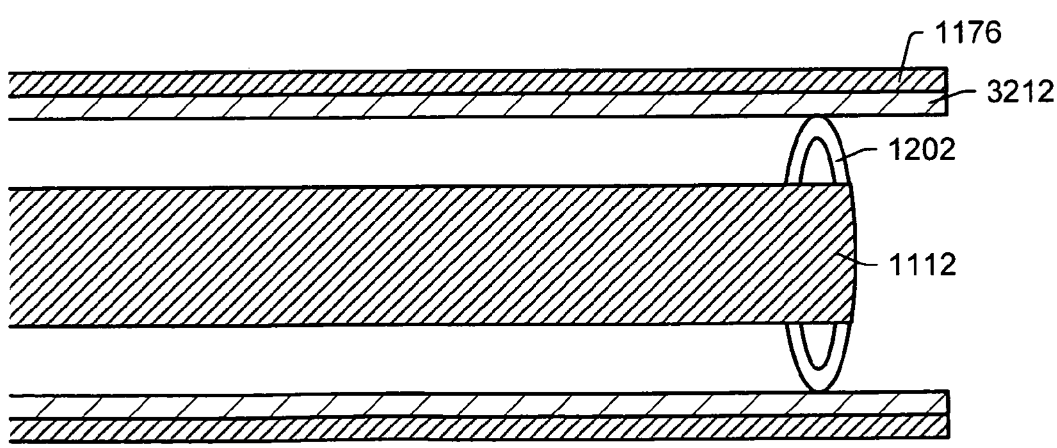

FIG. 493 depicts an embodiment of a conductor-in-conduit temperature limited heater.

Figure 494:
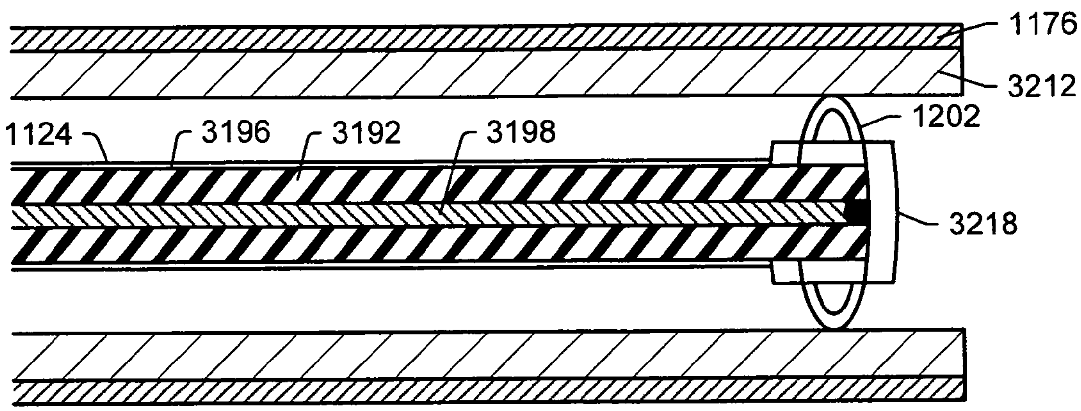

FIG. 494 depicts an embodiment of a conductor-in-conduit temperature limited heater with an insulated conductor as the conductor.

Figure 495:
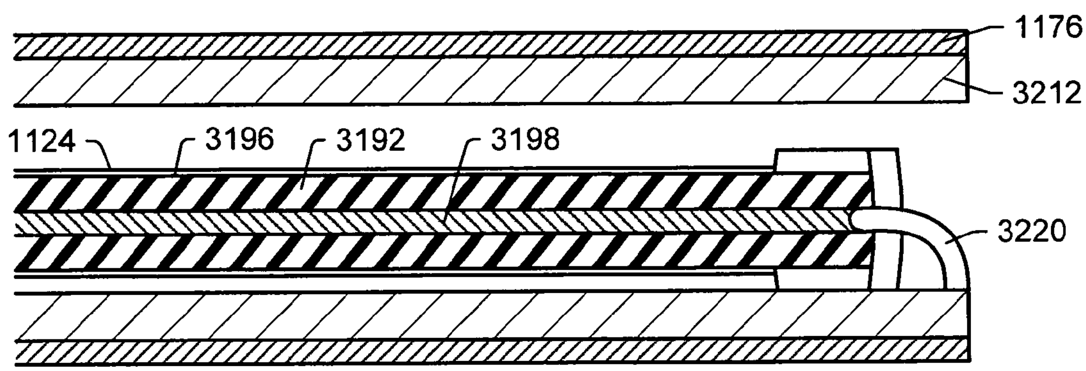

FIG. 495 depicts an embodiment of an insulated conductor-in-conduit temperature limited heater.

Figure 496:
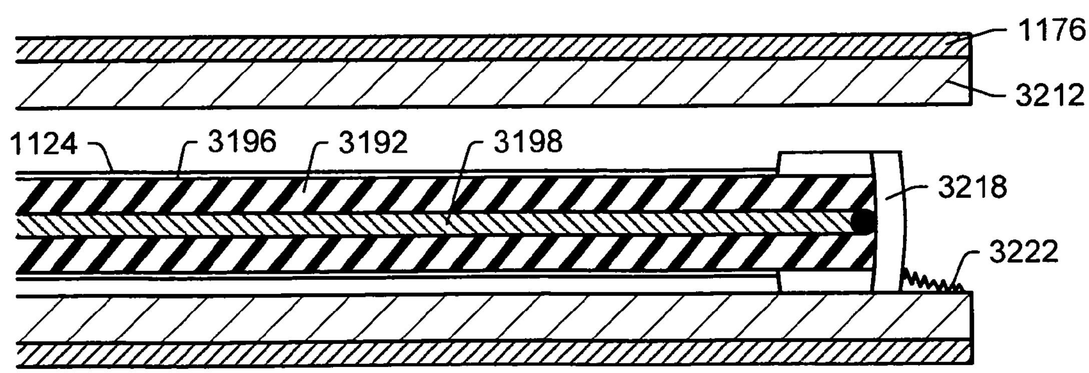

FIG. 496 depicts an embodiment of an insulated conductor-in-conduit temperature limited heater.

Figure 497:
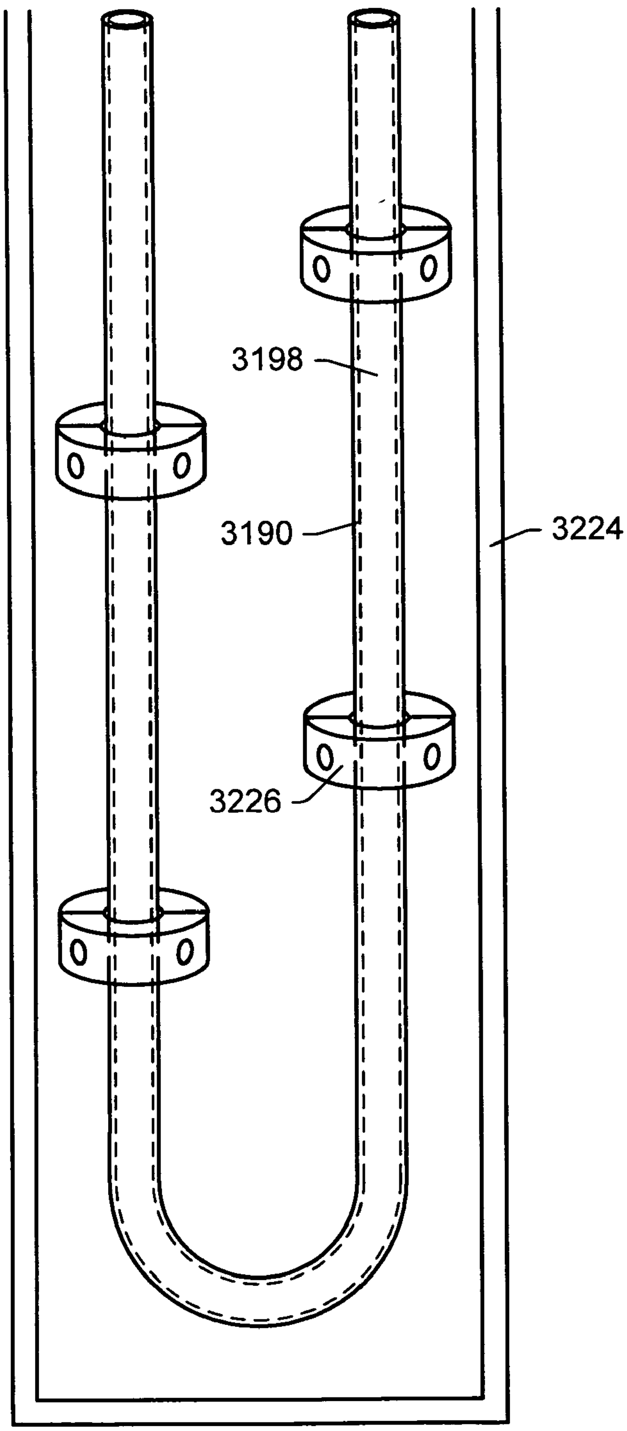

FIG. 497 depicts an embodiment of a temperature limited heater.

Figure 498:
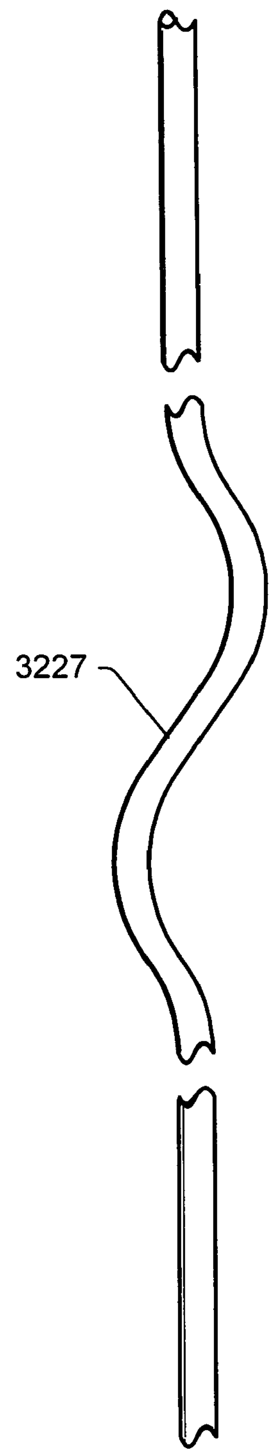

FIG. 498 depicts an embodiment of an "S" bend for a heater.

Figure 499:
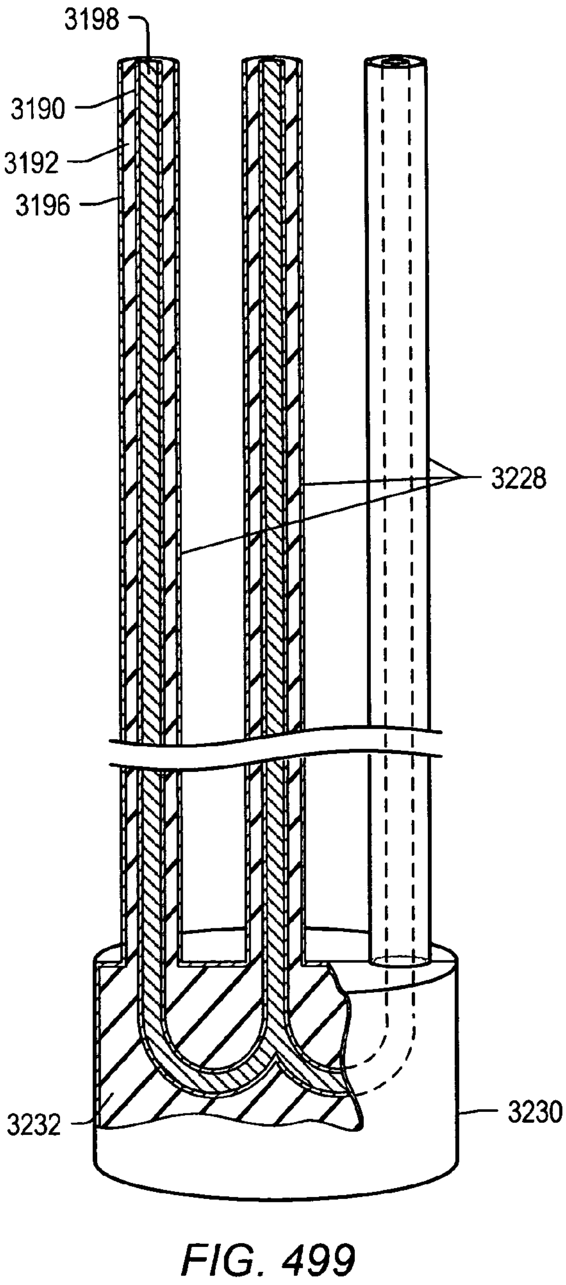

FIG. 499 depicts an embodiment of a three-phase temperature limited heater.

Figure 500:
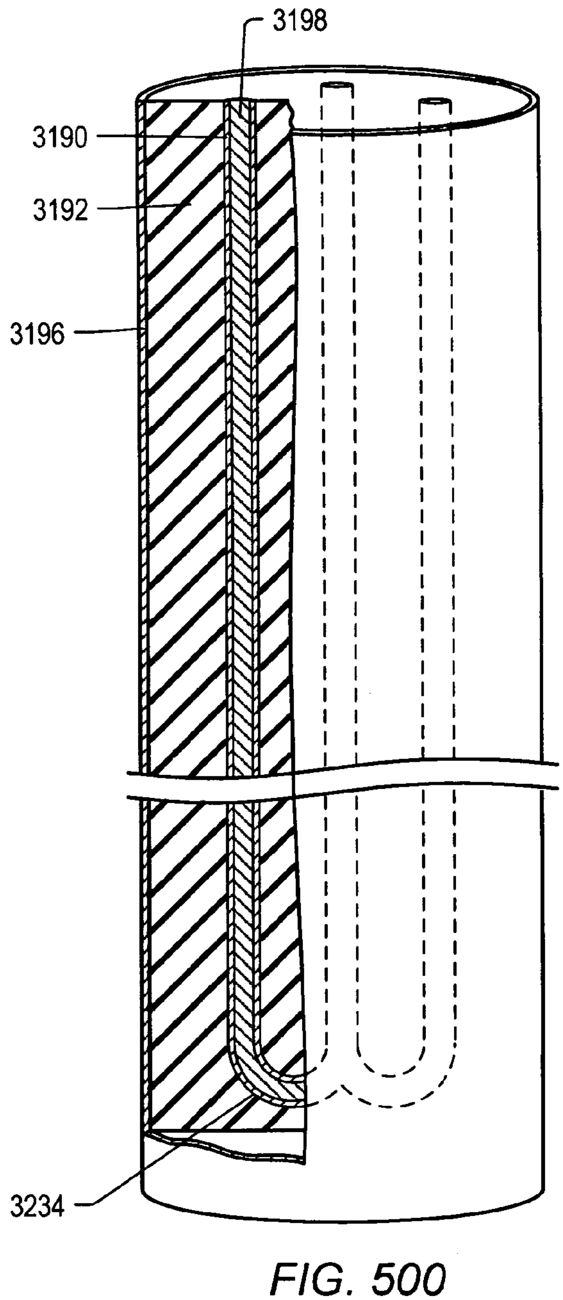

FIG. 500 depicts an embodiment of a three-phase temperature limited heater.

Figure 501:
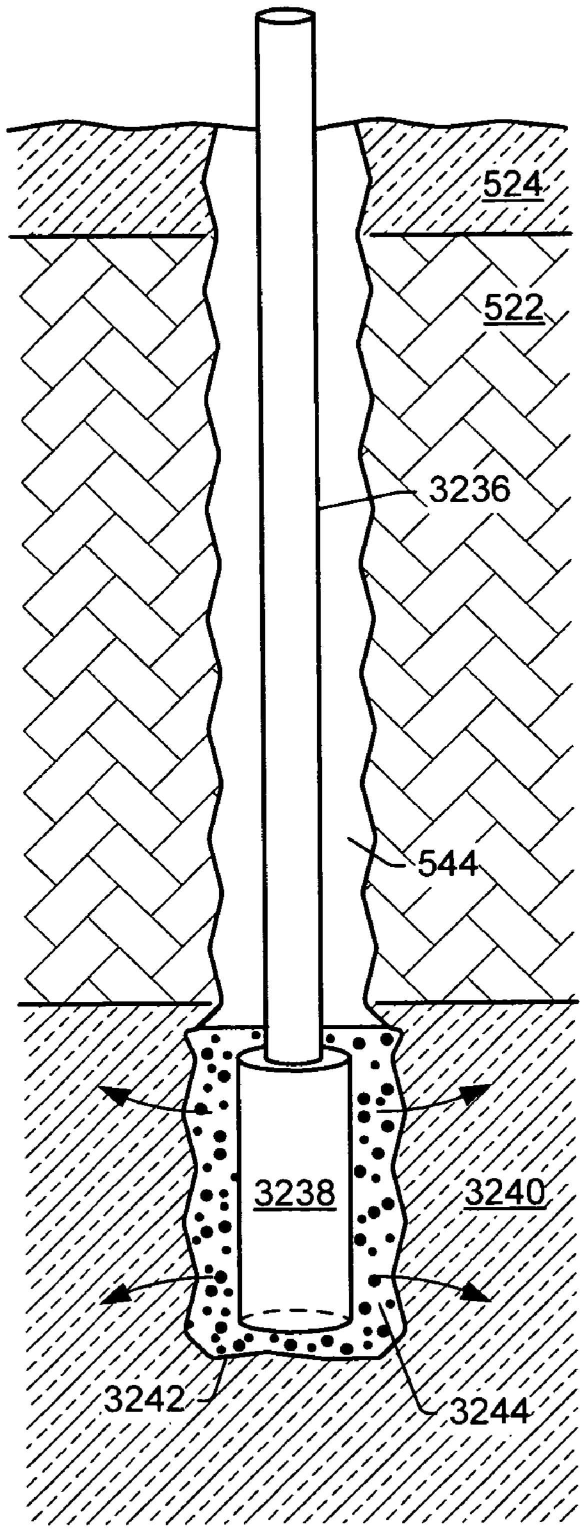

FIG. 501 depicts an embodiment of a temperature limited heater with current return through the earth formation.

Figure 502:
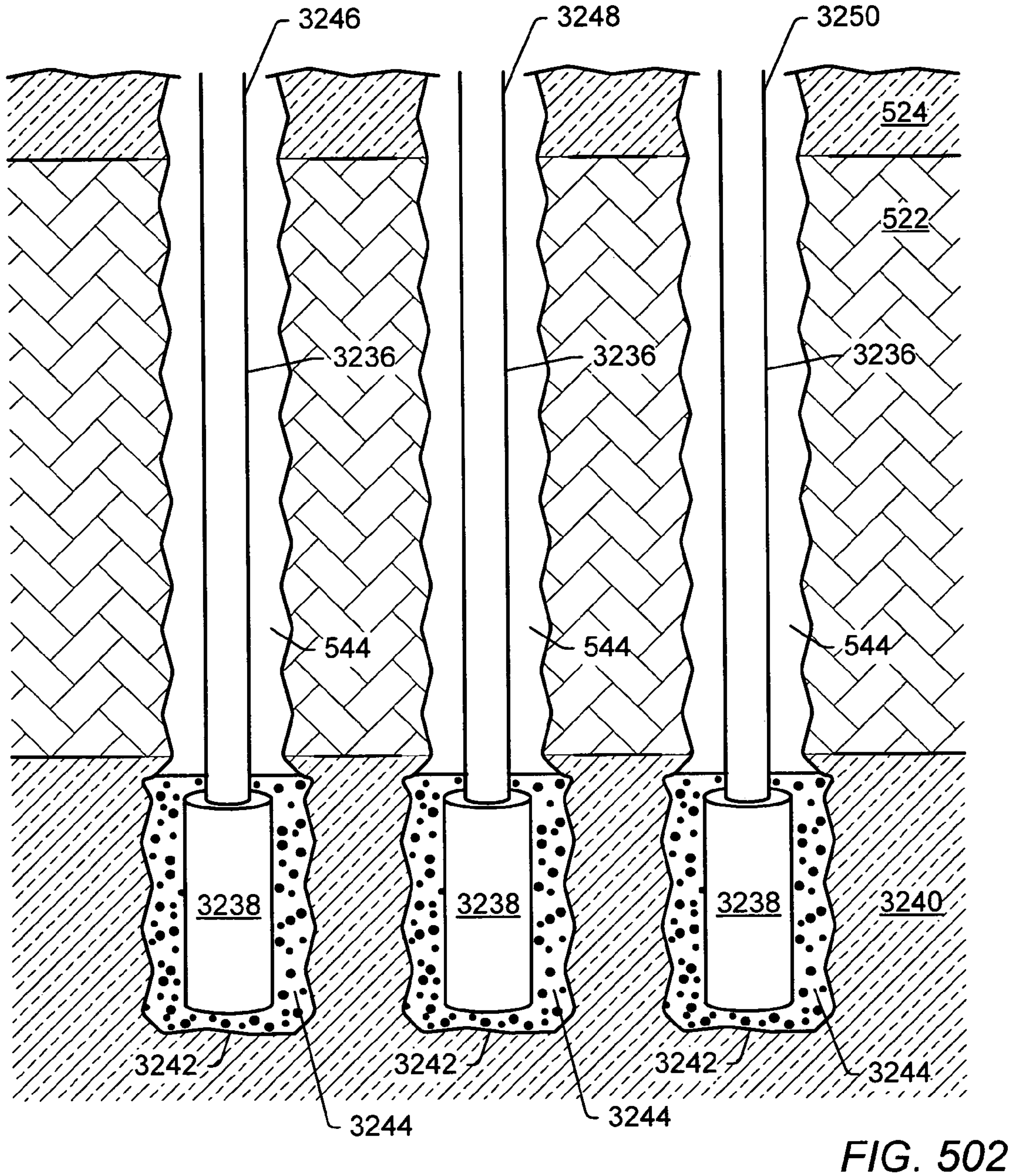

FIG. 502 depicts an embodiment of a three-phase temperature limited heater with current connection through the earth formation.

Figure 503:
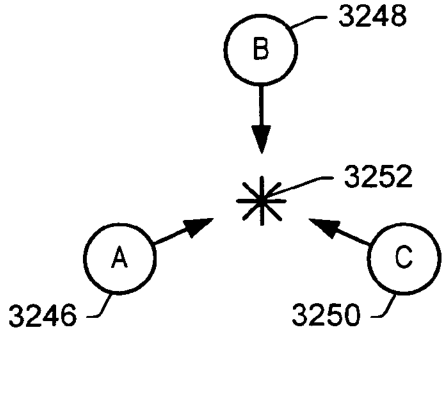

FIG. 503 depicts a plan view of the embodiment of FIG. 502.

Figure 504:
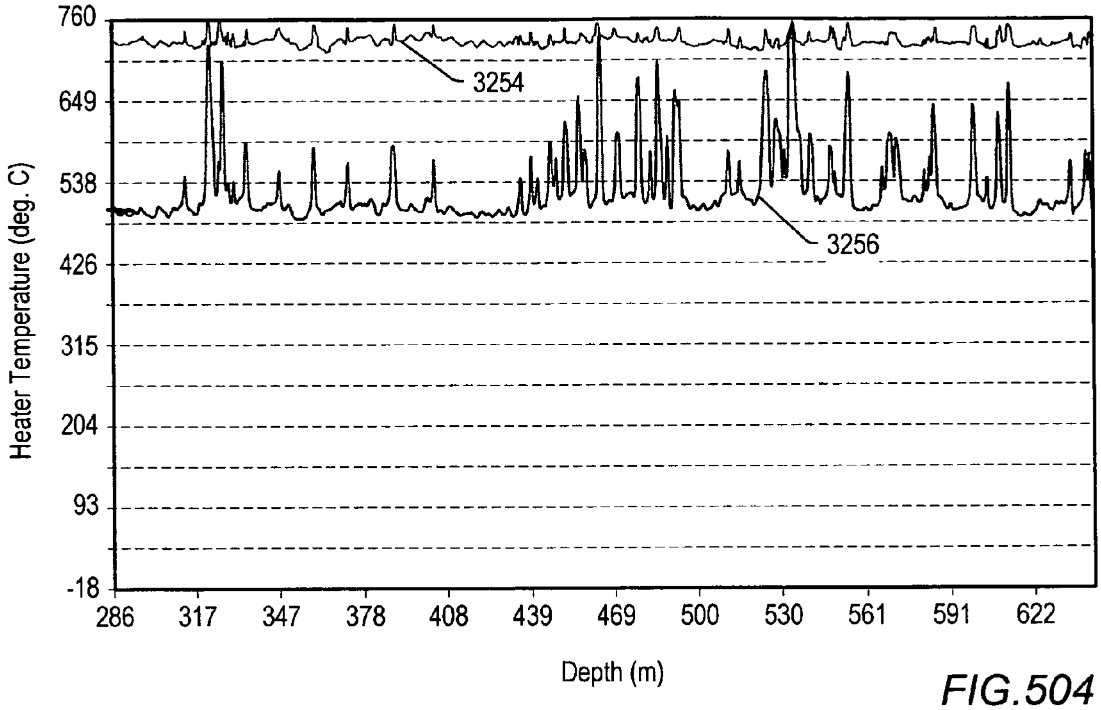

FIG. 504 depicts heater temperature versus depth for heaters used in a simulation for heating oil shale.

Figure 505:
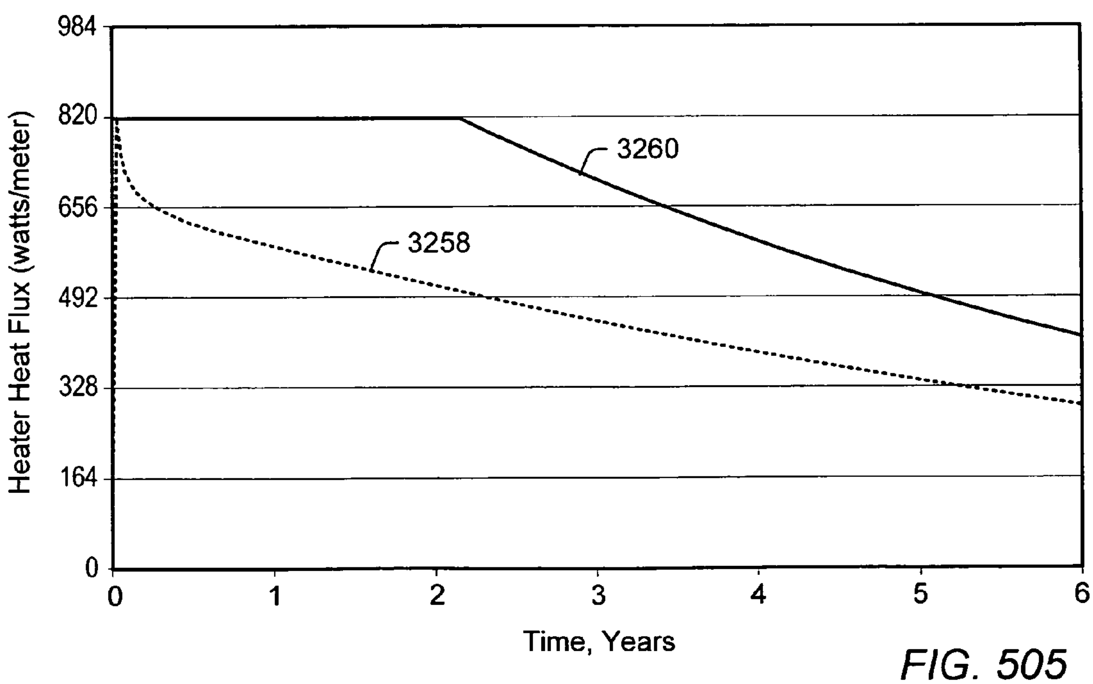

FIG. 505 depicts heat flux versus time for heaters used in a simulation for heating oil shale.

Figure 506:
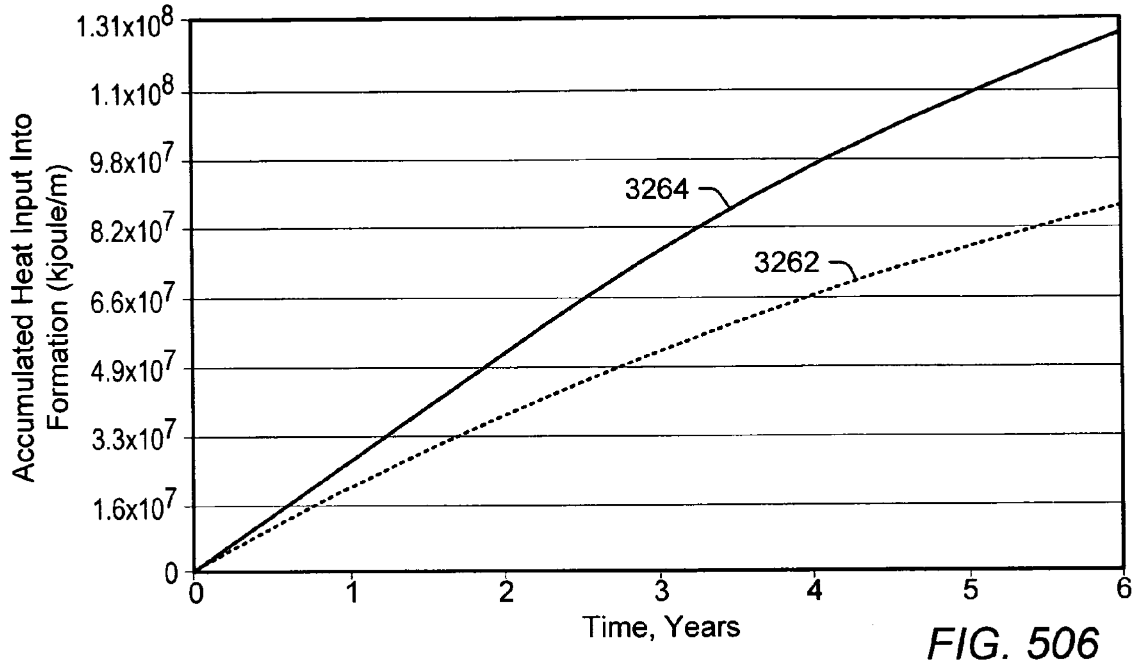

FIG. 506 depicts accumulated heat input versus time in a simulation for heating oil shale.

Figure 507:
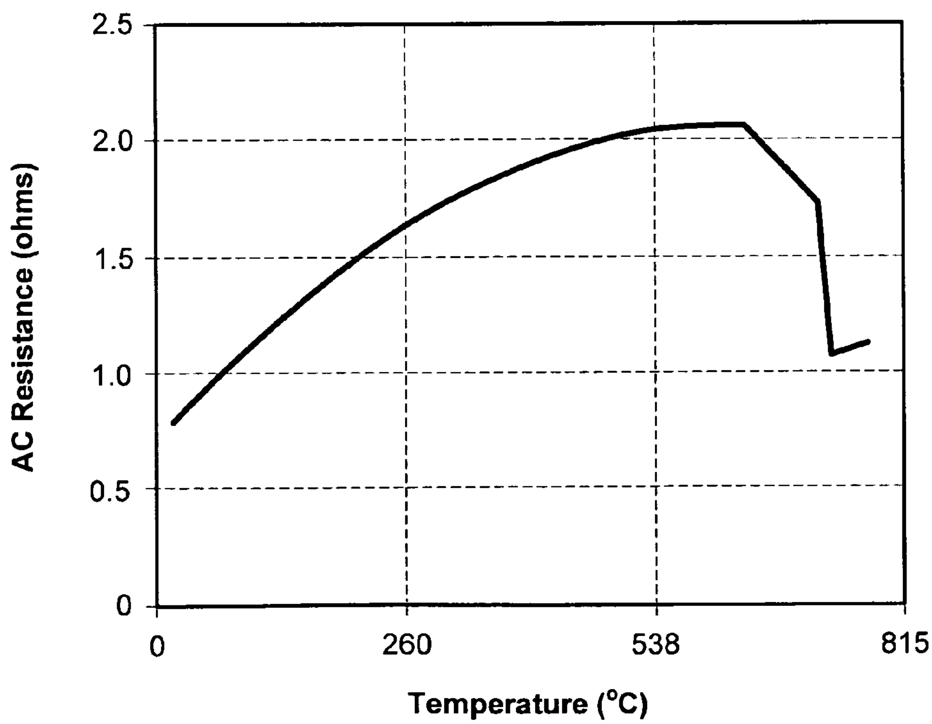

FIG. 507 depicts AC resistance versus temperature using an analytical solution.

Figure 508:
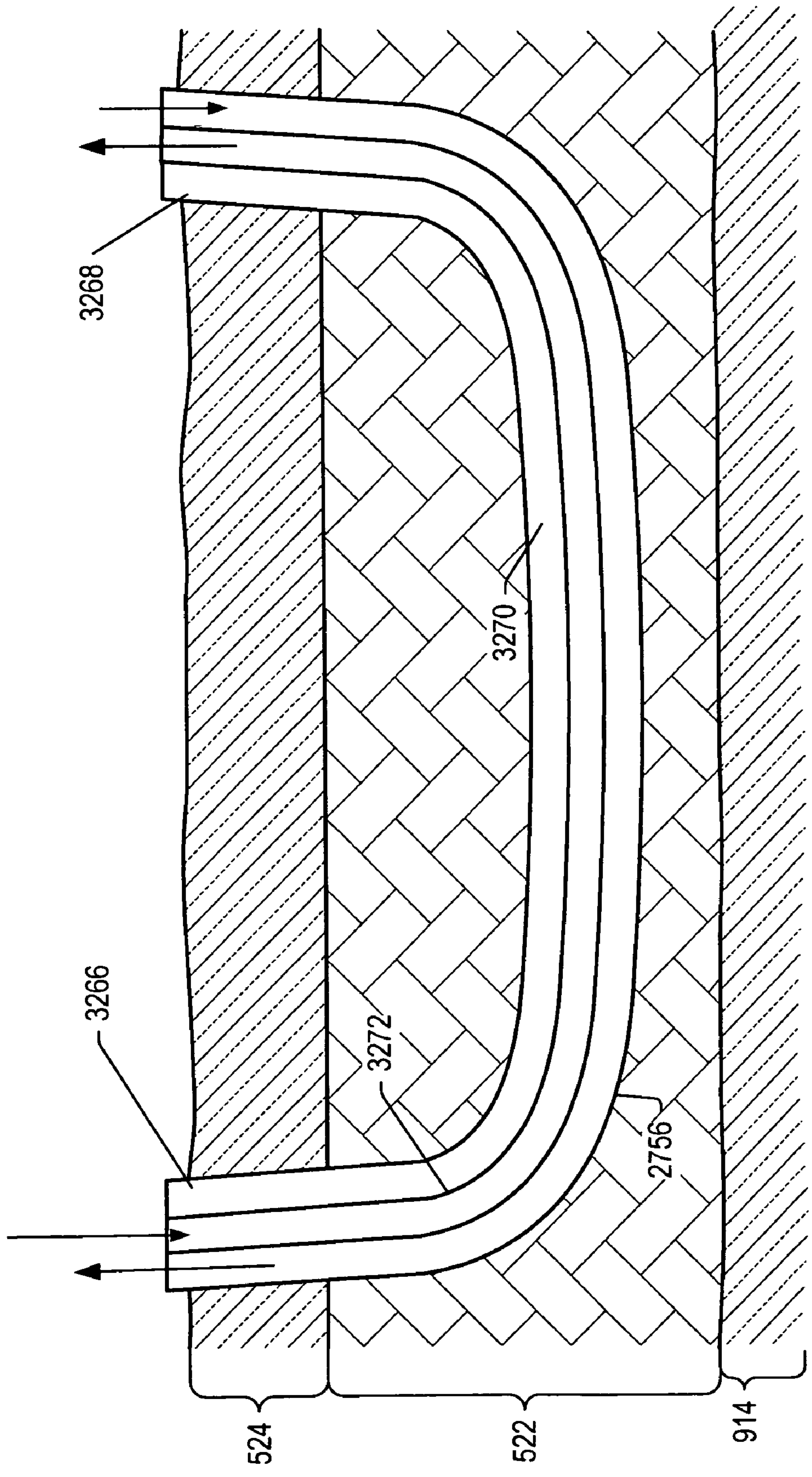

FIG. 508 depicts an embodiment of a freeze well for a hydrocarbon containing formation.

Figure 509:
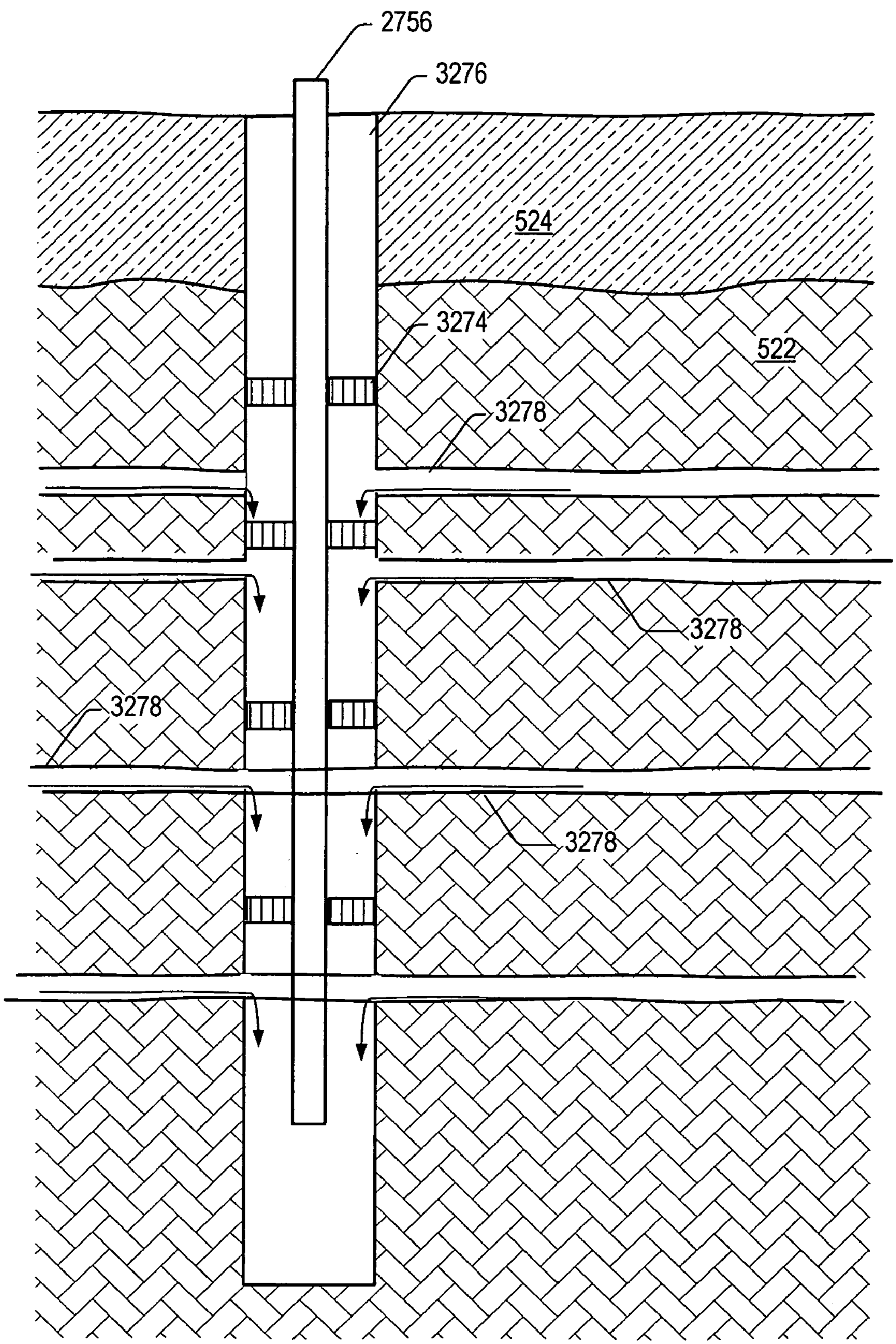

FIG. 509 depicts an embodiment of a freeze well for inhibiting water flow.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

The following description generally relates to systems and methods for treating a hydrocarbon containing formation (e.g., a formation containing coal (including lignite, sapropelic coal, etc.), oil shale, carbonaceous shale, shungites, kerogen, bitumen, oil, kerogen and oil in a low permeability matrix, heavy hydrocarbons, asphaltites, natural mineral waxes, formations wherein kerogen is blocking production of other hydrocarbons, etc.). Such formations may be treated to yield relatively high quality hydrocarbon products, hydrogen, and other products.

"Hydrocarbons" are generally defined as molecules formed primarily by carbon and hydrogen atoms. Hydrocarbons may also include other elements, such as, but not limited to, halogens, metallic elements, nitrogen, oxygen, and/or sulfur. Hydrocarbons may be, but are not limited to, kerogen, bitumen, pyrobitumen, oils, natural mineral waxes, and asphaltites. Hydrocarbons may be located within or adjacent to mineral matrices within the earth. Matrices may include, but are not limited to, sedimentary rock, sands, silicilytes, carbonates, diatomites, and other porous media. "Hydrocarbon fluids" are fluids that include hydrocarbons. Hydrocarbon fluids may include, entrain, or be entrained in non-hydrocarbon fluids (e.g., hydrogen ("$H_2$"), nitrogen ("$N_2$"), carbon monoxide, carbon dioxide, hydrogen sulfide, water, and ammonia).

A "formation" includes one or more hydrocarbon containing layers, one or more non-hydrocarbon layers, an overburden, and/or an underburden. An "overburden" and/or an "underburden" includes one or more different types of impermeable materials. For example, overburden and/or underburden may include rock, shale, mudstone, or wet/tight carbonate (i.e., an impermeable carbonate without hydrocarbons). In some embodiments of in situ conversion processes, an overburden and/or an underburden may include a hydrocarbon containing layer or hydrocarbon containing layers that are relatively impermeable and are not subjected to temperatures during in situ conversion processing that results in significant characteristic changes of the hydrocarbon containing layers of the overburden and/or underburden. For example, an underburden may contain shale or mudstone. In some cases, the overburden and/or underburden may be somewhat permeable.

"Kerogen" is a solid, insoluble hydrocarbon that has been converted by natural degradation (e.g., by diagenesis) and that principally contains carbon, hydrogen, nitrogen, oxygen, and sulfur. Coal and oil shale are typical examples of materials that contain kerogens. "Bitumen" is a non-crystalline solid or viscous hydrocarbon material that is substantially soluble in carbon disulfide. "Oil" is a fluid containing a mixture of condensable hydrocarbons.

The terms "formation fluids" and "produced fluids" refer to fluids removed from a hydrocarbon containing formation and may include pyrolyzation fluid, synthesis gas, mobilized hydrocarbon, and water (steam). The term "mobilized fluid" refers to fluids within the formation that are able to flow because of thermal treatment of the formation. Formation fluids may include hydrocarbon fluids as well as non-hydrocarbon fluids.

"Carbon number" refers to a number of carbon atoms within a molecule. A hydrocarbon fluid may include various hydrocarbons having varying numbers of carbon atoms. The hydrocarbon fluid may be described by a carbon number distribution. Carbon numbers and/or carbon number distributions may be determined by true boiling point distribution and/or gas-liquid chromatography.

A "heat source" is any system for providing heat to at least a portion of a formation substantially by conductive and/or radiative heat transfer. For example, a heat source may include electric heaters such as an insulated conductor, an elongated member, and/or a conductor disposed within a conduit, as described in embodiments herein. A heat source may also include heat sources that generate heat by burning a fuel external to or within a formation, such as surface burners, downhole gas burners, flameless distributed combustors, and natural distributed combustors, as described in embodiments herein. In some embodiments, heat provided to or generated in one or more heat sources may be supplied by other sources of energy. The other sources of energy may directly heat a formation, or the energy may be applied to a transfer media that directly or indirectly heats the formation. It is to be understood that one or more heat sources that are applying heat to a formation may use different sources of energy. Thus, for example, for a given formation some heat sources may supply heat from electric resistance heaters, some heat sources may provide heat from combustion, and some heat sources may provide heat from one or more other energy sources (e.g., chemical reactions, solar energy, wind energy, biomass, or other sources of renewable energy). A chemical reaction may include an exothermic reaction (e.g., an oxidation reaction). A heat source may also include a heater that may provide heat to a zone proximate and/or surrounding a heating location such as a heater well.

A "heater" is any system for generating heat in a well or a near wellbore region. Heaters may be, but are not limited to, electric heaters, burners, combustors (e.g., natural distributed combustors) that react with material in or produced from a formation, and/or combinations thereof. A "unit of heat sources" refers to a number of heat sources that form a template that is repeated to create a pattern of heat sources within a formation.

The term "wellbore" refers to a hole in a formation made by drilling or insertion of a conduit into the formation. A wellbore may have a substantially circular cross section, or other cross-sectional shapes (e.g., circles, ovals, squares, rectangles, triangles, slits, or other regular or irregular shapes). As used herein, the terms "well" and "opening," when referring to an opening in the formation may be used interchangeably with the term "wellbore."

"Natural distributed combustor" refers to a heater that uses an oxidant to oxidize at least a portion of the carbon in the formation to generate heat, and wherein the oxidation takes place in a vicinity proximate a wellbore. Most of the combustion products produced in the natural distributed combustor are removed through the wellbore.

"Orifices" refer to openings (e.g., openings in conduits) having a wide variety of sizes and cross-sectional shapes including, but not limited to, circles, ovals, squares, rectangles, triangles, slits, or other regular or irregular shapes.

"Reaction zone" refers to a volume of a hydrocarbon containing formation that is subjected to a chemical reaction such as an oxidation reaction.

"Insulated conductor" refers to any elongated material that is able to conduct electricity and that is covered, in whole or in part, by an electrically insulating material. The term "self-controls" refers to controlling an output of a heater without external control of any type.

"Pyrolysis" is the breaking of chemical bonds due to the application of heat. For example, pyrolysis may include transforming a compound into one or more other substances by heat alone. Heat may be transferred to a section of the formation to cause pyrolysis.

"Pyrolyzation fluids" or "pyrolysis products" refers to fluid produced substantially during pyrolysis of hydrocarbons. Fluid produced by pyrolysis reactions may mix with other fluids in a formation. The mixture would be considered pyrolyzation fluid or pyrolyzation product. As used herein, "pyrolysis zone" refers to a volume of a formation (e.g., a relatively permeable formation such as a tar sands formation) that is reacted or reacting to form a pyrolyzation fluid.

"Cracking" refers to a process involving decomposition and molecular recombination of organic compounds to produce a greater number of molecules than were initially present. In cracking, a series of reactions take place accompanied by a transfer of hydrogen atoms between molecules. For example, naphtha may undergo a thermal cracking reaction to form ethene and $H_2$.

"Superposition of heat" refers to providing heat from two or more heat sources to a selected section of a formation such that the temperature of the formation at least at one location between the heat sources is influenced by the heat sources.

"Fingering" refers to injected fluids bypassing portions of a formation because of variations in transport characteristics of the formation (e.g., permeability or porosity).

"Thermal conductivity" is a property of a material that describes the rate at which heat flows, in steady state, between two surfaces of the material for a given temperature difference between the two surfaces.

"Fluid pressure" is a pressure generated by a fluid within a formation. "Lithostatic pressure" (sometimes referred to as "lithostatic stress") is a pressure within a formation equal to a weight per unit area of an overlying rock mass. "Hydrostatic pressure" is a pressure within a formation exerted by a column of water.

"Condensable hydrocarbons" are hydrocarbons that condense at 25° C. at one atmosphere absolute pressure. Condensable hydrocarbons may include a mixture of hydrocarbons having carbon numbers greater than 4. "Non-condensable hydrocarbons" are hydrocarbons that do not condense at 25° C. and one atmosphere absolute pressure. Non-condensable hydrocarbons may include hydrocarbons having carbon numbers less than 5.

"Olefins" are molecules that include unsaturated hydrocarbons having one or more non-aromatic carbon-to-carbon double bonds.

"Urea" describes a compound represented by the molecular formula of $NH_2$—CO—$NH_2$. Urea may be used as a fertilizer.

"Synthesis gas" is a mixture including hydrogen and carbon monoxide used for synthesizing a wide range of compounds. Additional components of synthesis gas may include water, carbon dioxide, nitrogen, methane, and other gases. Synthesis gas may be generated by a variety of processes and feedstocks.

"Reforming" is a reaction of hydrocarbons (such as methane or naphtha) with steam to produce CO and $H_2$ as major products. Generally, it is conducted in the presence of a catalyst, although it can be performed thermally without the presence of a catalyst.

"Sequestration" refers to storing a gas that is a by-product of a process rather than venting the gas to the atmosphere.

"Dipping" refers to a formation that slopes downward or inclines from a plane parallel to the Earth's surface, assuming the plane is flat (i.e., a "horizontal" plane). A "dip" is an angle that a stratum or similar feature makes with a horizontal plane. A "steeply dipping" hydrocarbon containing formation refers to a hydrocarbon containing formation lying at an angle of at least 20° from a horizontal plane. "Down dip" refers to downward along a direction parallel to a dip in a formation.

"Up dip" refers to upward along a direction parallel to a dip of a formation. "Strike" refers to the course or bearing of hydrocarbon material that is normal to the direction of dip.

"Subsidence" is a downward movement of a portion of a formation relative to an initial elevation of the surface.

"Thickness" of a layer refers to the thickness of a cross section of a layer, wherein the cross section is normal to a face of the layer.

"Coring" is a process that generally includes drilling a hole into a formation and removing a substantially solid mass of the formation from the hole.

A "surface unit" is an ex situ treatment unit.

"Middle distillates" refers to hydrocarbon mixtures with a boiling point range that corresponds substantially with that of kerosene and gas oil fractions obtained in a conventional atmospheric distillation of crude oil material. The middle distillate boiling point range may include temperatures between about 150° C. and about 360° C., with a fraction boiling point between about 200° C. and about 360° C. Middle distillates may be referred to as gas oil.

A "boiling point cut" is a hydrocarbon liquid fraction that may be separated from hydrocarbon liquids when the hydrocarbon liquids are heated to a boiling point range of the fraction.

"Selected mobilized section" refers to a section of a formation that is at an average temperature within a mobilization temperature range. "Selected pyrolyzation section" refers to a section of a formation (e.g., a relatively permeable formation such as a tar sands formation) that is at an average temperature within a pyrolyzation temperature range.

"Enriched air" refers to air having a larger mole fraction of oxygen than air in the atmosphere. Enrichment of air is typically done to increase its combustion-supporting ability.

"Heavy hydrocarbons" are viscous hydrocarbon fluids. Heavy hydrocarbons may include highly viscous hydrocarbon fluids such as heavy oil, tar, and/or asphalt. Heavy hydrocarbons may include carbon and hydrogen, as well as smaller concentrations of sulfur, oxygen, and nitrogen. Additional elements may also be present in heavy hydrocarbons in trace amounts. Heavy hydrocarbons may be classified by API gravity. Heavy hydrocarbons generally have an API gravity below about 20°. Heavy oil, for example, generally has an API gravity of about 10-20°, whereas tar generally has an API gravity below about 100. The viscosity of heavy hydrocarbons is generally greater than about 100 centipoise at 15° C. Heavy hydrocarbons may also include aromatics or other complex ring hydrocarbons.

Heavy hydrocarbons may be found in a relatively permeable formation. The relatively permeable formation may include heavy hydrocarbons entrained in, for example, sand or carbonate. "Relatively permeable" is defined, with respect to formations or portions thereof, as an average permeability of 10 millidarcy or more (e.g., 10 or 100 millidarcy). "Relatively low permeability" is defined, with respect to formations or portions thereof, as an average permeability of less than about 10 millidarcy. One darcy is equal to about 0.99 square micrometers. An impermeable layer generally has a permeability of less than about 0.1 millidarcy.

"Tar" is a viscous hydrocarbon that generally has a viscosity greater than about 10,000 centipoise at 15° C. The specific gravity of tar generally is greater than 1.000. Tar may have an API gravity less than 10°.

A "tar sands formation" is a formation in which hydrocarbons are predominantly present in the form of heavy hydrocarbons and/or tar entrained in a mineral grain framework or other host lithology (e.g., sand or carbonate).

In some cases, a portion or all of a hydrocarbon portion of a relatively permeable formation may be predominantly heavy hydrocarbons and/or tar with no supporting mineral grain framework and only floating (or no) mineral matter (e.g., asphalt lakes).

Certain types of formations that include heavy hydrocarbons may also be, but are not limited to, natural mineral waxes (e.g., ozocerite), or natural asphaltites (e.g., gilsonite, albertite, impsonite, wurtzilite, grahamite, and glance pitch). "Natural mineral waxes" typically occur in substantially tubular veins that may be several meters wide, several kilometers long, and hundreds of meters deep. "Natural asphaltites" include solid hydrocarbons of an aromatic composition and typically occur in large veins. In situ recovery of hydrocarbons from formations such as natural mineral waxes and natural asphaltites may include melting to form liquid hydrocarbons and/or solution mining of hydrocarbons from the formations.

"Upgrade" refers to increasing the quality of hydrocarbons. For example, upgrading heavy hydrocarbons may result in an increase in the API gravity of the heavy hydrocarbons.

"Off peak" times refers to times of operation when utility energy is less commonly used and, therefore, less expensive.

"Low viscosity zone" refers to a section of a formation where at least a portion of the fluids are mobilized.

"Thermal fracture" refers to fractures created in a formation caused by expansion or contraction of a formation and/or fluids within the formation, which is in turn caused by increasing/decreasing the temperature of the formation and/or fluids within the formation, and/or by increasing/decreasing a pressure of fluids within the formation due to heating.

"Vertical hydraulic fracture" refers to a fracture at least partially propagated along a vertical plane in a formation, wherein the fracture is created through injection of fluids into a formation.

Figure 1:
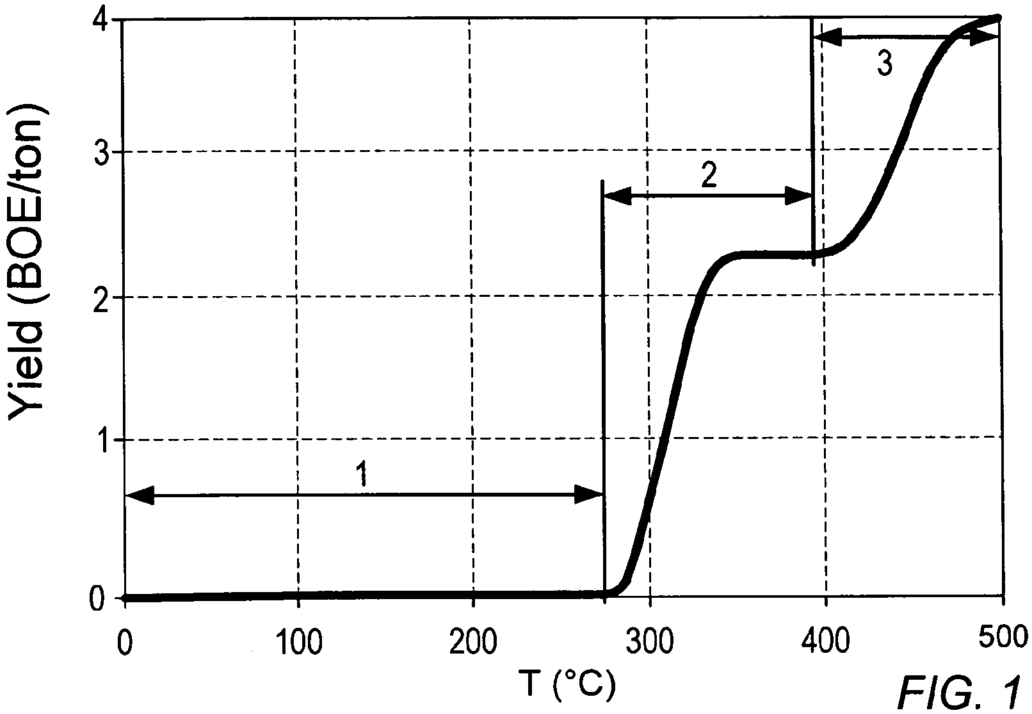
FIG. 1 depicts an illustration of stages of heating a hydrocarbon containing formation.

Hydrocarbons in formations may be treated in various ways to produce many different products. In certain embodiments, such formations may be treated in stages. FIG. 1 illustrates several stages of heating a hydrocarbon containing formation. FIG. 1 also depicts an example of yield (barrels of oil equivalent per ton) (y axis) of formation fluids from a hydrocarbon containing formation versus temperature (° C.) (x axis) of the formation.

Desorption of methane and vaporization of water occurs during stage 1 heating. Heating of the formation through stage 1 may be performed as quickly as possible. For example, when a hydrocarbon containing formation is initially heated, hydrocarbons in the formation may desorb adsorbed methane. The desorbed methane may be produced from the formation. If the hydrocarbon containing formation is heated further, water within the hydrocarbon containing formation may be vaporized. Water may occupy, in some hydrocarbon containing formations, between about 10% to about 50% of the pore volume in the formation. In other formations, water may occupy larger or smaller portions of the pore volume. Water typically is vaporized in a formation between about 160° C. and about 285° C. for pressures of about 6 bars absolute to 70 bars absolute. In some embodiments, the vaporized water may produce wettability changes in the formation and/or increase formation pressure. The wettability changes and/or increased pressure may affect pyrolysis reactions or other reactions in the formation. In certain embodiments, the vaporized water may be produced from the formation. In other embodiments, the vaporized water may be used for steam extraction and/or distillation in the formation or outside the formation. Removing the water from and increasing the pore volume in the formation may increase the storage space for hydrocarbons within the pore volume.

After stage 1 heating, the formation may be heated further, such that a temperature within the formation reaches (at least) an initial pyrolyzation temperature (e.g., a temperature at the lower end of the temperature range shown as stage 2). Hydrocarbons within the formation may be pyrolyzed throughout stage 2. A pyrolysis temperature range may vary depending on types of hydrocarbons within the formation. A pyrolysis temperature range may include temperatures between about 250° C. and about 900° C. A pyrolysis temperature range for producing desired products may extend through only a portion of the total pyrolysis temperature range. In some embodiments, a pyrolysis temperature range for producing desired products may include temperatures between about 250° C. to about 400° C. If a temperature of hydrocarbons in a formation is slowly raised through a temperature range from about 250° C. to about 400° C., production of pyrolysis products may be substantially complete when the temperature approaches 400° C. Heating the hydrocarbon containing formation with a plurality of heat sources may establish thermal gradients around the heat sources that slowly raise the temperature of hydrocarbons in the formation through a pyrolysis temperature range.

In some in situ conversion embodiments, a temperature of the hydrocarbons to be subjected to pyrolysis may not be slowly increased throughout a temperature range from about 250° C. to about 400° C. The hydrocarbons in the formation may be heated to a desired temperature (e.g., about 325° C.). Other temperatures may be selected as the desired temperature. Superposition of heat from heat sources may allow the desired temperature to be relatively quickly and efficiently established in the formation. Energy input into the formation from the heat sources may be adjusted to maintain the temperature in the formation substantially at the desired temperature. The hydrocarbons may be maintained substantially at the desired temperature until pyrolysis declines such that production of desired formation fluids from the formation becomes uneconomical. Parts of a formation that are subjected to pyrolysis may include regions brought into a pyrolysis temperature range by heat transfer from only one heat source.

Formation fluids including pyrolyzation fluids may be produced from the formation. The pyrolyzation fluids may include, but are not limited to, hydrocarbons, hydrogen, carbon dioxide, carbon monoxide, hydrogen sulfide, ammonia, nitrogen, water, and mixtures thereof. As the temperature of the formation increases, the amount of condensable hydrocarbons in the produced formation fluid tends to decrease. At high temperatures, the formation may produce mostly methane and/or hydrogen. If a hydrocarbon containing formation is heated throughout an entire pyrolysis range, the formation may produce only small amounts of hydrogen towards an upper limit of the pyrolysis range. After all of the available hydrogen is depleted, a minimal amount of fluid production from the formation will typically occur.

After pyrolysis of hydrocarbons, a large amount of carbon and some hydrogen may still be present in the formation. A significant portion of remaining carbon in the formation can be produced from the formation in the form of synthesis gas. Synthesis gas generation may take place during stage 3 heating depicted in FIG. 1. Stage 3 may include heating a hydrocarbon containing formation to a temperature sufficient to allow synthesis gas generation. For example, synthesis gas may be produced within a temperature range from about 400° C. to about 1200° C. The temperature of the formation when the synthesis gas generating fluid is introduced to the formation may determine the composition of synthesis gas produced within the formation. If a synthesis gas generating fluid is introduced into a formation at a temperature sufficient to allow synthesis gas generation, synthesis gas may be generated within the formation. The generated synthesis gas may be removed from the formation through a production well or production wells. A large volume of synthesis gas may be produced during generation of synthesis gas.

Total energy content of fluids produced from a hydrocarbon containing formation may stay relatively constant throughout pyrolysis and synthesis gas generation. During pyrolysis at relatively low formation temperatures, a significant portion of the produced fluid may be condensable hydrocarbons that have a high energy content. At higher pyrolysis temperatures, however, less of the formation fluid may include condensable hydrocarbons. More non-condensable formation fluids may be produced from the formation. Energy content per unit volume of the produced fluid may decline slightly during generation of predominantly non-condensable formation fluids. During synthesis gas generation, energy content per unit volume of produced synthesis gas declines significantly compared to energy content of pyrolyzation fluid. The volume of the produced synthesis gas, however, will in many instances increase substantially, thereby compensating for the decreased energy content.

Figure 2:
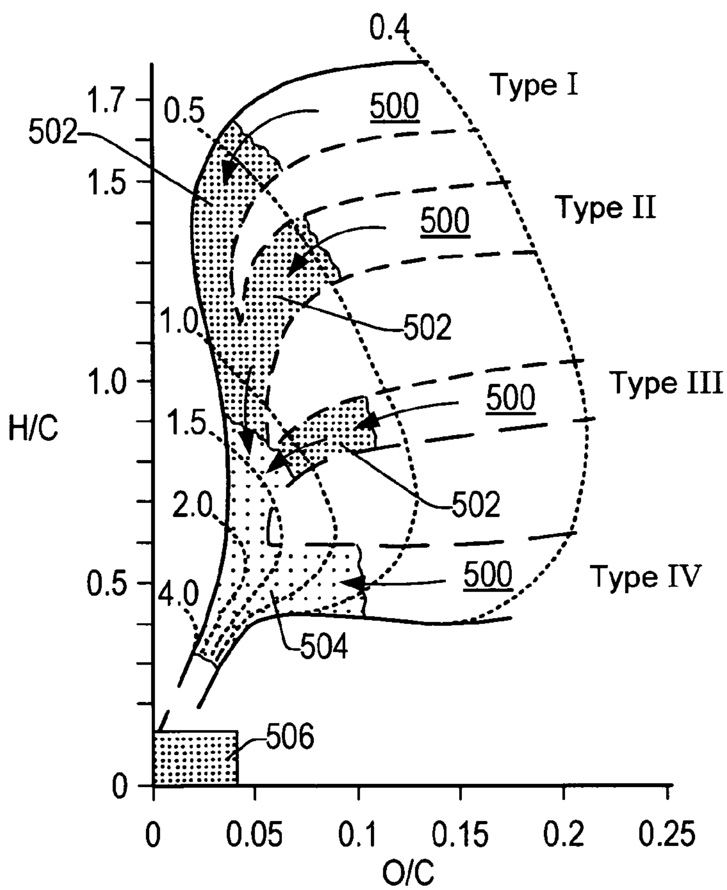
FIG. 2 depicts a diagram that presents several properties of kerogen resources.

FIG. 2 depicts a van Krevelen diagram. The van Krevelen diagram is a plot of atomic hydrogen to carbon ratio (y axis) versus atomic oxygen to carbon ratio (x axis) for various types of kerogen. The van Krevelen diagram shows the maturation sequence for various types of kerogen that typically occurs over geologic time due to temperature, pressure, and biochemical degradation. The maturation sequence may be accelerated by heating in situ at a controlled rate and/or a controlled pressure.

A van Krevelen diagram may be useful for selecting a resource for practicing various embodiments. Treating a formation containing kerogen in region 500 may produce carbon dioxide, non-condensable hydrocarbons, hydrogen, and water, along with a relatively small amount of condensable hydrocarbons. Treating a formation containing kerogen in region 502 may produce condensable and non-condensable hydrocarbons, carbon dioxide, hydrogen, and water. Treating a formation containing kerogen in region 504 will in many instances produce methane and hydrogen. A formation containing kerogen in region 502 may be selected for treatment because treating region 502 kerogen may produce large quantities of valuable hydrocarbons, and low quantities of undesirable products such as carbon dioxide and water. A region 502 kerogen may produce large quantities of valuable hydrocarbons and low quantities of undesirable products because the region 502 kerogen has already undergone dehydration and/or decarboxylation over geological time. In addition, region 502 kerogen can be further treated to make other useful products (e.g., methane, hydrogen, and/or synthesis gas) as the kerogen transforms to region 504 kerogen.

If a formation containing kerogen in region 500 or region 502 is selected for in situ conversion, in situ thermal treatment may accelerate maturation of the kerogen along paths represented by arrows in FIG. 2. For example, region 500 kerogen may transform to region 502 kerogen and possibly then to region 504 kerogen. Region 502 kerogen may transform to region 504 kerogen. In situ conversion may expedite maturation of kerogen and allow production of valuable products from the kerogen.

If region 500 kerogen is treated, a substantial amount of carbon dioxide may be produced due to decarboxylation of hydrocarbons in the formation. In addition to carbon dioxide, region 500 kerogen may produce some hydrocarbons (e.g., methane). Treating region 500 kerogen may produce substantial amounts of water due to dehydration of kerogen in the formation. Production of water from kerogen may leave hydrocarbons remaining in the formation enriched in carbon. Oxygen content of the hydrocarbons may decrease faster than hydrogen content of the hydrocarbons during production of such water and carbon dioxide from the formation. Therefore, production of such water and carbon dioxide from region 500 kerogen may result in a larger decrease in the atomic oxygen to carbon ratio than a decrease in the atomic hydrogen to carbon ratio (see region 500 arrows in FIG. 2 which depict more horizontal than vertical movement).

If region 502 kerogen is treated, some of the hydrocarbons in the formation may be pyrolyzed to produce condensable and non-condensable hydrocarbons. For example, treating region 502 kerogen may result in production of oil from hydrocarbons, as well as some carbon dioxide and water. In situ conversion of region 502 kerogen may produce significantly less carbon dioxide and water than is produced during in situ conversion of region 500 kerogen. Therefore, the atomic hydrogen to carbon ratio of the kerogen may decrease rapidly as the kerogen in region 502 is treated. The atomic oxygen to carbon ratio of region 502 kerogen may decrease much slower than the atomic hydrogen to carbon ratio of region 502 kerogen.

Kerogen in region 504 may be treated to generate methane and hydrogen. For example, if such kerogen was previously treated (e.g., it was previously region 502 kerogen), then after pyrolysis longer hydrocarbon chains of the hydrocarbons may have cracked and been produced from the formation. Carbon and hydrogen, however, may still be present in the formation.

If kerogen in region 504 were heated to a synthesis gas generating temperature and a synthesis gas generating fluid (e.g., steam) were added to the region 504 kerogen, then at least a portion of remaining hydrocarbons in the formation may be produced from the formation in the form of synthesis gas. For region 504 kerogen, the atomic hydrogen to carbon ratio and the atomic oxygen to carbon ratio in the hydrocarbons may significantly decrease as the temperature rises. Hydrocarbons in the formation may be transformed into relatively pure carbon in region 504. Heating region 504 kerogen to still higher temperatures will tend to transform such kerogen into graphite 506.

A hydrocarbon containing formation may have a number of properties that depend on a composition of the hydrocarbons within the formation. Such properties may affect the composition and amount of products that are produced from a hydrocarbon containing formation during in situ conversion. Properties of a hydrocarbon containing formation may be used to determine if and/or how a hydrocarbon containing formation is to be subjected to in situ conversion.

Kerogen is composed of organic matter that has been transformed due to a maturation process. Hydrocarbon containing formations that include kerogen may include, but are not limited to, coal formations and oil shale formations. Examples of hydrocarbon containing formations that may not include significant amounts of kerogen are formations containing oil or heavy hydrocarbons (e.g., tar sands). The maturation process for kerogen may include two stages: a biochemical stage and a geochemical stage. The biochemical stage typically involves degradation of organic material by aerobic and/or anaerobic organisms. The geochemical stage typically involves conversion of organic matter due to temperature changes and significant pressures. During maturation, oil and gas may be produced as the organic matter of the kerogen is transformed.

The van Krevelen diagram shown in FIG. 2 classifies various natural deposits of kerogen. For example, kerogen may be classified into four distinct groups: type I, type II, type III, and type IV, which are illustrated by the four branches of the van Krevelen diagram. The van Krevelen diagram shows the maturation sequence for kerogen that typically occurs over geological time due to temperature and pressure. Classification of kerogen type may depend upon precursor materials of the kerogen. The precursor materials transform over time into macerals. Macerals are microscopic structures that have different structures and properties depending on the precursor materials from which they are derived. Oil shale may be described as a kerogen type I or type II, and may primarily contain macerals from the liptinite group. Liptinites are derived from plants, specifically the lipid rich and resinous parts. The concentration of hydrogen within liptinite may be as high as 9 weight %. In addition, liptinite has a relatively high hydrogen to carbon ratio and a relatively low atomic oxygen to carbon ratio.

A type I kerogen may be classified as an alginite, since type I kerogen developed primarily from algal bodies. Type I kerogen may result from deposits made in lacustrine environments. Type II kerogen may develop from organic matter that was deposited in marine environments.

Type III kerogen may generally include vitrinite macerals. Vitrinite is derived from cell walls and/or woody tissues (e.g., stems, branches, leaves, and roots of plants). Type III kerogen may be present in most humic coals. Type III kerogen may develop from organic matter that was deposited in swamps. Type IV kerogen includes the inertinite maceral group. The inertinite maceral group is composed of plant material such as leaves, bark, and stems that have undergone oxidation during the early peat stages of burial diagenesis. Inertinite maceral is chemically similar to vitrinite, but has a high carbon and low hydrogen content.

The dashed lines in FIG. 2 correspond to vitrinite reflectance. Vitrinite reflectance is a measure of maturation. As kerogen undergoes maturation, the composition of the kerogen usually changes due to expulsion of volatile matter (e.g., carbon dioxide, methane, and oil) from the kerogen. Rank classifications of kerogen indicate the level to which kerogen has matured. For example, as kerogen undergoes maturation, the rank of kerogen increases. As rank increases, the volatile matter within, and producible from, the kerogen tends to decrease. In addition, the moisture content of kerogen generally decreases as the rank increases. At higher ranks, the moisture content may reach a relatively constant value. Higher rank kerogens that have undergone significant maturation, such as semi-anthracite or anthracite coal, tend to have a higher carbon content and a lower volatile matter content than lower rank kerogens such as lignite.

Rank stages of coal formations include the following classifications, which are listed in order of increasing rank and maturity for type III kerogen: wood, peat, lignite, sub-bituminous coal, high volatile bituminous coal, medium volatile bituminous coal, low volatile bituminous coal, semi-anthracite, and anthracite. As rank increases, kerogen tends to exhibit an increase in aromatic nature.

Hydrocarbon containing formations may be selected for in situ conversion based on properties of at least a portion of the formation. For example, a formation may be selected based on richness, thickness, and/or depth (i.e., thickness of overburden) of the formation. In addition, the types of fluids producible from the formation may be a factor in the selection of a formation for in situ conversion. In certain embodiments, the quality of the fluids to be produced may be assessed in advance of treatment. Assessment of the products that may be produced from a formation may generate significant cost savings since only formations that will produce desired products need to be subjected to in situ conversion. Properties that may be used to assess hydrocarbons in a formation include, but are not limited to, an amount of hydrocarbon liquids that may be produced from the hydrocarbons, a likely API gravity of the produced hydrocarbon liquids, an amount of hydrocarbon gas producible from the formation, and/or an amount of carbon dioxide and water that in situ conversion will generate.

Another property that may be used to assess the quality of fluids produced from certain kerogen containing formations is vitrinite reflectance. Such formations include, but are not limited to, coal formations and oil shale formations. Hydrocarbon containing formations that include kerogen may be assessed/selected for treatment based on a vitrinite reflectance of the kerogen. Vitrinite reflectance is often related to a hydrogen to carbon atomic ratio of a kerogen and an oxygen to carbon atomic ratio of the kerogen, as shown by the dashed lines in FIG. 2. A van Krevelen diagram may be useful in selecting a resource for an in situ conversion process.

Vitrinite reflectance of a kerogen in a hydrocarbon containing formation may indicate which fluids are producible from a formation upon heating. For example, a vitrinite reflectance of approximately 0.5% to approximately 1.5% may indicate that the kerogen will produce a large quantity of condensable fluids. In addition, a vitrinite reflectance of approximately 1.5% to 3.0% may indicate a kerogen in region 504 as described above. If a hydrocarbon containing formation having such kerogen is heated, a significant amount (e.g., a majority) of the fluid produced by such heating may include methane and hydrogen. The formation may be used to generate synthesis gas if the temperature is raised sufficiently high and a synthesis gas generating fluid is introduced into the formation.

A kerogen containing formation to be subjected to in situ conversion may be chosen based on a vitrinite reflectance. The vitrinite reflectance of the kerogen may indicate that the formation will produce high quality fluids when subjected to in situ conversion. In some in situ conversion embodiments, a portion of the kerogen containing formation to be subjected to in situ conversion may have a vitrinite reflectance in a range between about 0.2% and about 3.0%. In some in situ conversion embodiments, a portion of the kerogen containing formation may have a vitrinite reflectance from about 0.5% to about 2.0%. In some in situ conversion embodiments, a portion of the kerogen containing formation may have a vitrinite reflectance from about 0.5% to about 1.0%.

In some in situ conversion embodiments, a hydrocarbon containing formation may be selected for treatment based on a hydrogen content within the hydrocarbons in the formation. For example, a method of treating a hydrocarbon containing formation may include selecting a portion of the hydrocarbon containing formation for treatment having hydrocarbons with a hydrogen content greater than about 3 weight %, 3.5 weight %, or 4 weight % when measured on a dry, ash-free basis. In addition, a selected section of a hydrocarbon containing formation may include hydrocarbons with an atomic hydrogen to carbon ratio that falls within a range from about 0.5 to about 2, and in many instances from about 0.70 to about 1.65.

Hydrogen content of a hydrocarbon containing formation may significantly influence a composition of hydrocarbon fluids producible from the formation. Pyrolysis of hydrocarbons within heated portions of the formation may generate hydrocarbon fluids that include a double bond or a radical. Hydrogen within the formation may reduce the double bond to a single bond. Reaction of generated hydrocarbon fluids with each other and/or with additional components in the formation may be inhibited. For example, reduction of a double bond of the generated hydrocarbon fluids to a single bond may reduce polymerization of the generated hydrocarbons. Such polymerization may reduce the amount of fluids produced and may reduce the quality of fluid produced from the formation.

Hydrogen within the formation may neutralize radicals in the generated hydrocarbon fluids. Hydrogen present in the formation may inhibit reaction of hydrocarbon fragments by transforming the hydrocarbon fragments into relatively short chain hydrocarbon fluids. The hydrocarbon fluids may enter a vapor phase. Vapor phase hydrocarbons may move relatively easily through the formation to production wells. Increase in the hydrocarbon fluids in the vapor phase may significantly reduce a potential for producing less desirable products within the selected section of the formation.

A lack of bound and free hydrogen in the formation may negatively affect the amount and quality of fluids that can be produced from the formation. If too little hydrogen is naturally present, then hydrogen or other reducing fluids may be added to the formation.

When heating a portion of a hydrocarbon containing formation, oxygen within the portion may form carbon dioxide. A formation may be chosen and/or conditions in a formation may be adjusted to inhibit production of carbon dioxide and other oxides. In an embodiment, production of carbon dioxide may be reduced by selecting and treating a portion of a hydrocarbon containing formation having a vitrinite reflectance of greater than about 0.5%.

An amount of carbon dioxide that can be produced from a kerogen containing formation may be dependent on an oxygen content initially present in the formation and/or an atomic oxygen to carbon ratio of the kerogen. In some in situ conversion embodiments, formations to be subjected to in situ conversion may include kerogen with an atomic oxygen weight percentage of less than about 20 weight %, 15 weight %, and/or 10 weight %. In some in situ conversion embodiments, formations to be subjected to in situ conversion may include kerogen with an atomic oxygen to carbon ratio of less than about 0.15. In some in situ conversion embodiments, a formation selected for treatment may have an atomic oxygen to carbon ratio of about 0.03 to about 0.12.

Heating a hydrocarbon containing formation may include providing a large amount of energy to heat sources located within the formation. Hydrocarbon containing formations may also contain some water. A significant portion of energy initially provided to a formation may be used to heat water within the formation. An initial rate of temperature increase may be reduced by the presence of water in the formation. Excessive amounts of heat and/or time may be required to heat a formation having a high moisture content to a temperature sufficient to pyrolyze hydrocarbons in the formation. In certain embodiments, water may be inhibited from flowing into a formation subjected to in situ conversion. A formation to be subjected to in situ conversion may have a low initial moisture content. The formation may have an initial moisture content that is less than about 15 weight %. Some formations that are to be subjected to in situ conversion may have an initial moisture content of less than about 10 weight %. Other formations that are to be processed using an in situ conversion process may have initial moisture contents that are greater than about 15 weight %. Formations with initial moisture contents above about 15 weight % may incur significant energy costs to remove the water that is initially present in the formation during heating to pyrolysis temperatures.

A hydrocarbon containing formation may be selected for treatment based on additional factors such as, but not limited to, thickness of hydrocarbon containing layers within the formation, assessed liquid production content, location of the formation, and depth of hydrocarbon containing layers. A hydrocarbon containing formation may include multiple layers. Such layers may include hydrocarbon containing layers, as well as layers that are hydrocarbon free or have relatively low amounts of hydrocarbons. Conditions during formation may determine the thickness of hydrocarbon and non-hydrocarbon layers in a hydrocarbon containing formation. A hydrocarbon containing formation to be subjected to in situ conversion will typically include at least one hydrocarbon containing layer having a thickness sufficient for economical production of formation fluids. Richness of a hydrocarbon containing layer may be a factor used to determine if a formation will be treated by in situ conversion. A thin and rich hydrocarbon layer may be able to produce significantly more valuable hydrocarbons than a much thicker, less rich hydrocarbon layer. Producing hydrocarbons from a formation that is both thick and rich is desirable.

Each hydrocarbon containing layer of a formation may have a potential formation fluid yield or richness. The richness of a hydrocarbon layer may vary in a hydrocarbon layer and between different hydrocarbon layers in a formation. Richness may depend on many factors including the conditions under which the hydrocarbon containing layer was formed, an amount of hydrocarbons in the layer, and/or a composition of hydrocarbons in the layer. Richness of a hydrocarbon layer may be estimated in various ways. For example, richness may be measured by a Fischer Assay. The Fischer Assay is a standard method which involves heating a sample of a hydrocarbon containing layer to approximately 500° C. in one hour, collecting products produced from the heated sample, and quantifying the amount of products produced. A sample of a hydrocarbon containing layer may be obtained from a hydrocarbon containing formation by a method such as coring or any other sample retrieval method.

An in situ conversion process may be used to treat formations with hydrocarbon layers that have thicknesses greater than about 10 m. Thick formations may allow for placement of heat sources so that superposition of heat from the heat sources efficiently heats the formation to a desired temperature. Formations having hydrocarbon layers that are less than 10 m thick may also be treated using an in situ conversion process. In some in situ conversion embodiments of thin hydrocarbon layer formations, heat sources may be inserted in or adjacent to the hydrocarbon layer along a length of the hydrocarbon layer (e.g., with horizontal or directional drilling). Heat losses to layers above and below the thin hydrocarbon layer or thin hydrocarbon layers may be offset by an amount and/or quality of fluid produced from the formation.

Figure 3:
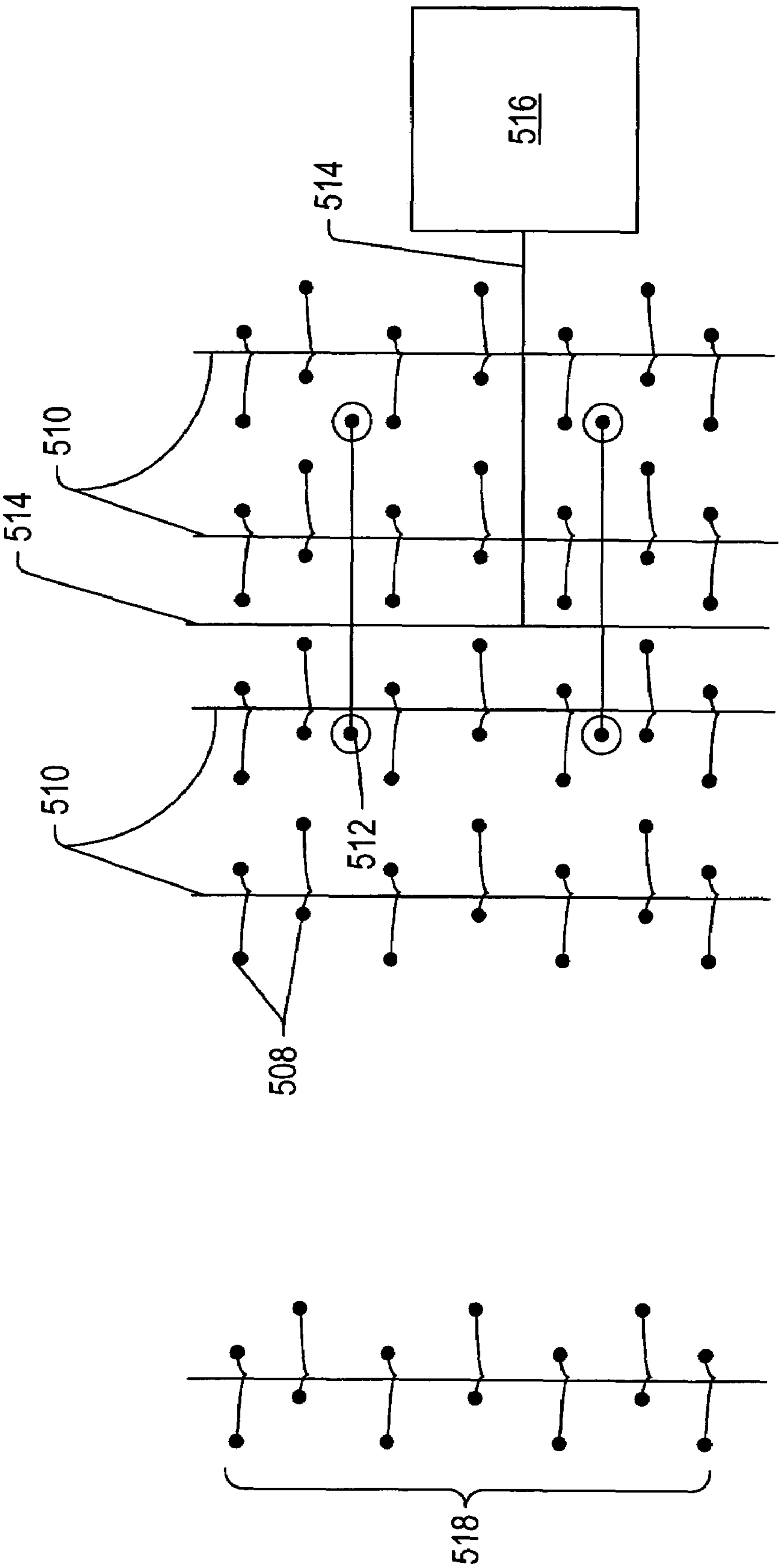
FIG. 3 shows a schematic view of an embodiment of a portion of an in situ conversion system for treating a hydrocarbon containing formation.

FIG. 3 shows a schematic view of an embodiment of a portion of an in situ conversion system for treating a hydrocarbon containing formation. Heat sources 508 may be placed within at least a portion of the hydrocarbon containing formation. Heat sources 508 may include, for example, electric heaters such as insulated conductors, conductor-in-conduit heaters, surface burners, flameless distributed combustors, and/or natural distributed combustors. Heat sources 508 may also include other types of heaters. Heat sources 508 may provide heat to at least a portion of a hydrocarbon containing formation. Energy may be supplied to the heat sources 508 through supply lines 510. Supply lines 510 may be structurally different depending on the type of heat source or heat sources being used to heat the formation. Supply lines 510 for heat sources may transmit electricity for electric heaters, may transport fuel for combustors, or may transport heat exchange fluid that is circulated within the formation.

Production wells 512 may be used to remove formation fluid from the formation. Formation fluid produced from production wells 512 may be transported through collection piping 514 to treatment facilities 516. Formation fluids may also be produced from heat sources 508. For example, fluid may be produced from heat sources 508 to control pressure within the formation adjacent to the heat sources. Fluid produced from heat sources 508 may be transported through tubing or piping to collection piping 514 or the produced fluid may be transported through tubing or piping directly to treatment facilities 516. Treatment facilities 516 may include separation units, reaction units, upgrading units, fuel cells, turbines, storage vessels, and other systems and units for processing produced formation fluids.

An in situ conversion system for treating hydrocarbons may include barrier wells 518. Barrier wells may be used to form a barrier around a treatment area. The barrier may inhibit fluid flow into and/or out of the treatment area. Barrier wells may be, but are not limited to, dewatering wells (vacuum wells), capture wells, injection wells, grout wells, or freeze wells. In some embodiments, barrier wells 518 may be dewatering wells. Dewatering wells may remove liquid water and/or inhibit liquid water from entering a portion of a hydrocarbon containing formation to be heated, or to a formation being heated. A plurality of water wells may surround all or a portion of a formation to be heated. In the embodiment depicted in FIG. 3, the dewatering wells are shown extending only along one side of heat sources 508, but dewatering wells typically encircle all heat sources 508 used, or to be used, to heat the formation.

Dewatering wells may be placed in one or more rings surrounding selected portions of the formation. New dewatering wells may need to be installed as an area being treated by the in situ conversion process expands. An outermost row of dewatering wells may inhibit a significant amount of water from flowing into the portion of formation that is heated or to be heated. Water produced from the outermost row of dewatering wells should be substantially clean, and may require little or no treatment before being released. An innermost row of dewatering wells may inhibit water that bypasses the outermost row from flowing into the portion of formation that is heated or to be heated. The innermost row of dewatering wells may also inhibit outward migration of vapor from a heated portion of the formation into surrounding portions of the formation. Water produced by the innermost row of dewatering wells may include some hydrocarbons. The water may need to be treated before being released. Alternately, water with hydrocarbons may be stored and used to produce synthesis gas from a portion of the formation during a synthesis gas phase of the in situ conversion process. The dewatering wells may reduce heat loss to surrounding portions of the formation, may increase production of vapors from the heated portion, and/or may inhibit contamination of a water table proximate the heated portion of the formation.

In some embodiments, pressure differences between successive rows of dewatering wells may be minimized (e.g., maintained relatively low or near zero) to create a “no or low flow” boundary between rows.

In some in situ conversion process embodiments, a fluid may be injected in the innermost row of wells. The injected fluid may maintain a sufficient pressure around a pyrolysis zone to inhibit migration of fluid from the pyrolysis zone through the formation. The fluid may act as an isolation barrier between the outermost wells and the pyrolysis fluids. The fluid may improve the efficiency of the dewatering wells.

In certain embodiments, wells initially used for one purpose may be later used for one or more other purposes, thereby lowering project costs and/or decreasing the time required to perform certain tasks. For instance, production wells (and in some circumstances heater wells) may initially be used as dewatering wells (e.g., before heating is begun and/or when heating is initially started). In addition, in some circumstances dewatering wells can later be used as production wells (and in some circumstances heater wells). As such, the dewatering wells may be placed and/or designed so that such wells can be later used as production wells and/or heater wells. The heater wells may be placed and/or designed so that such wells can be later used as production wells and/or dewatering wells. The production wells may be placed and/or designed so that such wells can be later used as dewatering wells and/or heater wells. Similarly, injection wells may be wells that initially were used for other purposes (e.g., heating, production, dewatering, monitoring, etc.), and injection wells may later be used for other purposes. Similarly, monitoring wells may be wells that initially were used for other purposes (e.g., heating, production, dewatering, injection, etc.), and monitoring wells may later be used for other purposes.

Hydrocarbons to be subjected to in situ conversion may be located under a large area. The in situ conversion system may be used to treat small portions of the formation, and other sections of the formation may be treated as time progresses. In an embodiment of a system for treating a formation (e.g., an oil shale formation), a field layout for 24 years of development may be divided into 24 individual plots that represent individual drilling years. Each plot may include 120 "tiles" (repeating matrix patterns) wherein each plot is made of 6 rows by 20 columns of tiles. Each tile may include 1 production well and 12 or 18 heater wells. The heater wells may be placed in an equilateral triangle pattern with a well spacing of about 12 m. Production wells may be located in centers of equilateral triangles of heater wells, or the production wells may be located approximately at a midpoint between two adjacent heater wells.

Figure 4:
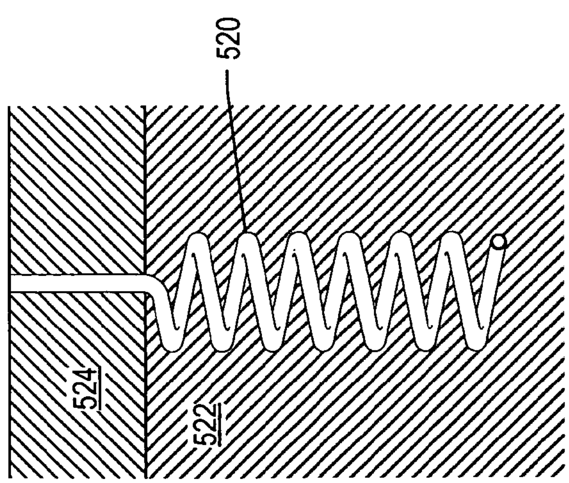
FIG. 4 depicts an embodiment of a heater well.

In certain embodiments, heat sources will be placed within a heater well formed within a hydrocarbon containing formation. The heater well may include an opening through an overburden of the formation. The heater may extend into or through at least one hydrocarbon containing section (or hydrocarbon containing layer) of the formation. As shown in FIG. 4, an embodiment of heater well 520 may include an opening in hydrocarbon layer 522 that has a helical or spiral shape. A spiral heater well may increase contact with the formation as opposed to a vertically positioned heater. A spiral heater well may provide expansion room that inhibits buckling or other modes of failure when the heater well is heated or cooled. In some embodiments, heater wells may include substantially straight sections through overburden 524. Use of a straight section of heater well through the overburden may decrease heat loss to the overburden and reduce the cost of the heater well.

Figure 5:
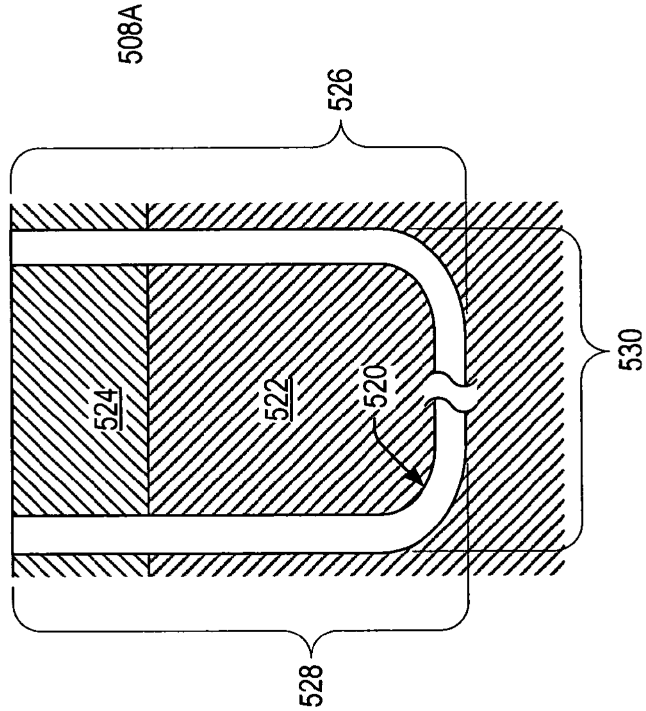
FIG. 5 depicts an embodiment of a heater well.

As shown in FIG. 5, a heat source embodiment may be placed into heater well 520. Heater well 520 may be substantially "U" shaped. The legs of the "U" may be wider or more narrow depending on the particular heater well and formation characteristics. First portion 526 and third portion 528 of heater well 520 may be arranged substantially perpendicular to an upper surface of hydrocarbon layer 522 in some embodiments. In addition, the first and the third portion of the heater well may extend substantially vertically through overburden 524. Second portion 530 of heater well 520 may be substantially parallel to the upper surface of the hydrocarbon layer.

Figure 6:
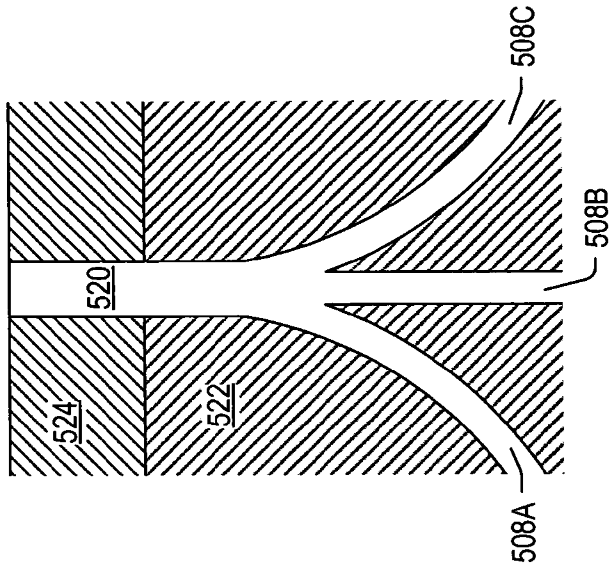
FIG. 6 depicts an embodiment of a heater well.

Multiple heat sources (e.g., 2, 3, 4, 5, 10 heat sources or more) may extend from a heater well in some situations. As shown in FIG. 6, heat sources 508A, 508B, and 508C extend through overburden 524 into hydrocarbon layer 522 from heater well 520. Multiple wells extending from a single wellbore may be used when surface considerations (e.g., aesthetics, surface land use concerns, and/or unfavorable soil conditions near the surface) make it desirable to concentrate well platforms in a small area. For example, in areas where the soil is frozen and/or marshy, it may be more cost-effective to have a minimal number of well platforms located at selected sites.

In certain embodiments, a first portion of a heater well may extend from the ground surface, through an overburden, and into a hydrocarbon containing formation. A second portion of the heater well may include one or more heater wells in the hydrocarbon containing formation. The one or more heater wells may be disposed within the hydrocarbon containing formation at various angles. In some embodiments, at least one of the heater wells may be disposed substantially parallel to a boundary of the hydrocarbon containing formation. In some embodiments, at least one of the heater wells may be substantially perpendicular to the hydrocarbon containing formation. In addition, one of the one or more heater wells may be positioned at an angle between perpendicular and parallel to a layer in the formation.

Figure 7:
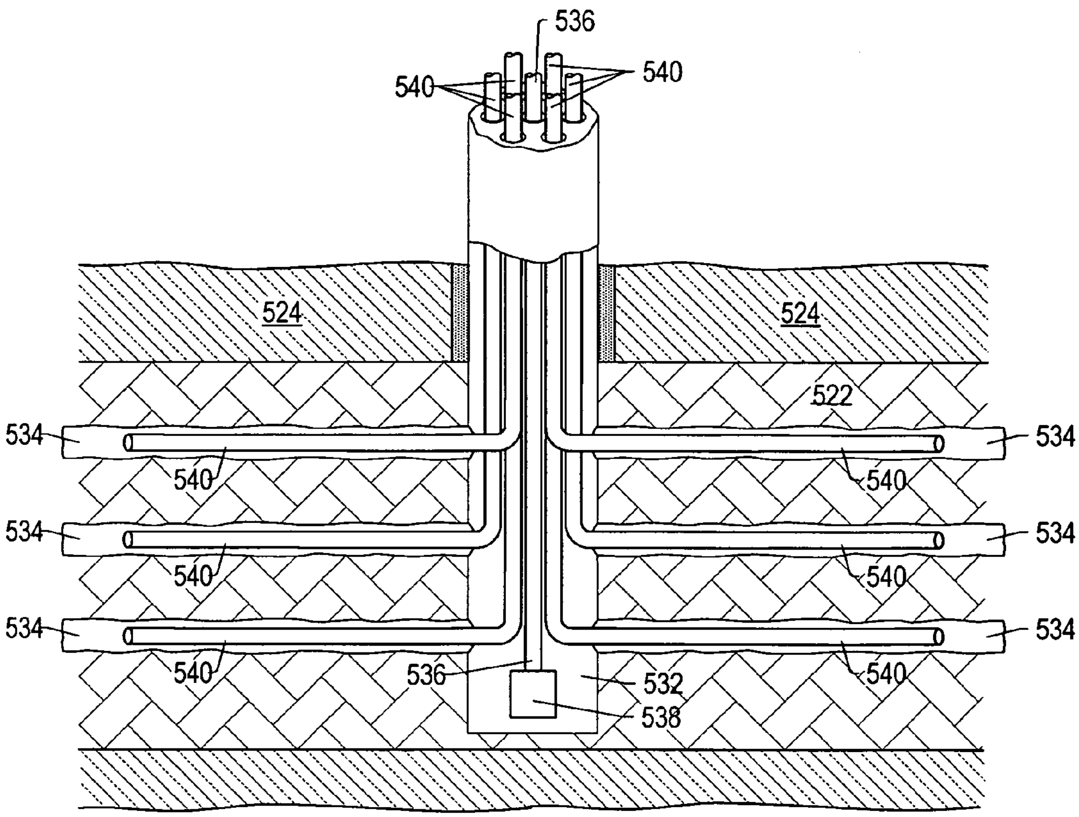
FIG. 7 illustrates a schematic view of multiple heaters branched from a single well in a hydrocarbon containing formation.

FIG. 7 illustrates a schematic of view of multilateral or side tracked lateral heaters branched from a single well in a hydrocarbon containing formation. In relatively thin and deep layers found in a hydrocarbon containing formation (e.g., in a coal, oil shale, or tar sands formation), it may be advantageous to place more than one heater substantially horizontally within the relatively thin layer of hydrocarbons. For example, an oil shale layer may have a richness greater than about 0.06 L/kg and a relatively low initial thermal conductivity. Heat provided to a thin layer with a low thermal conductivity from a horizontal wellbore may be more effectively trapped within the thin layer and reduce heat losses from the layer. Substantially vertical opening 532 may be placed in hydrocarbon layer 522. Substantially vertical opening 532 may be an elongated portion of an opening formed in hydrocarbon layer 522. Hydrocarbon layer 522 may be below overburden 524.

One or more substantially horizontal openings 534 may also be placed in hydrocarbon layer 522. Horizontal openings 534 may, in some embodiments, contain perforated liners. The horizontal openings 534 may be coupled to vertical opening 532. Horizontal openings 534 may be elongated portions that diverge from the elongated portion of vertical opening 532. Horizontal openings 534 may be formed in hydrocarbon layer 522 after vertical opening 532 has been formed. In certain embodiments, openings 534 may be angled upwards to facilitate flow of formation fluids towards the production conduit.

Each horizontal opening 534 may lie above or below an adjacent horizontal opening. In an embodiment, six horizontal openings 534 may be formed in hydrocarbon layer 522. Three horizontal openings 534 may face 180°, or in a substantially opposite direction, from three additional horizontal openings 534. Two horizontal openings facing substantially opposite directions may lie in a substantially identical vertical plane within the formation. Any number of horizontal openings 534 may be coupled to a single vertical opening 532, depending on, but not limited to, a thickness of hydrocarbon layer 522, a type of formation, a desired heating rate in the formation, and a desired production rate.

Production conduit 536 may be placed substantially vertically within vertical opening 532. Production conduit 536 may be substantially centered within vertical opening 532. Pump 538 may be coupled to production conduit 536. Such a pump may be used, in some embodiments, to pump formation fluids from the bottom of the well. Pump 538 may be a rod pump, progressing cavity pump (PCP), centrifugal pump, jet pump, gas lift pump, submersible pump, rotary pump, etc.

One or more heaters 540 may be placed within each horizontal opening 534. Heaters 540 may be placed in hydrocarbon layer 522 through vertical opening 532 and into horizontal opening 534.

In some embodiments, heater 540 may be used to generate heat along a length of the heater within vertical opening 532 and horizontal opening 534. In other embodiments, heater 540 may be used to generate heat only within horizontal opening 534. In certain embodiments, heat generated by heater 540 may be varied along its length and/or varied between vertical opening 532 and horizontal opening 534. For example, less heat may be generated by heater 540 in vertical opening 532 and more heat may be generated by the heater in horizontal opening 534. It may be advantageous to have at least some heating within vertical opening 532. This may maintain fluids produced from the formation in a vapor phase in production conduit 536 and/or may upgrade the produced fluids within the production well. Having production conduit 536 and heaters 540 installed into a formation through a single opening in the formation may reduce costs associated with forming openings in the formation and installing production equipment and heaters within the formation.

Figure 8:
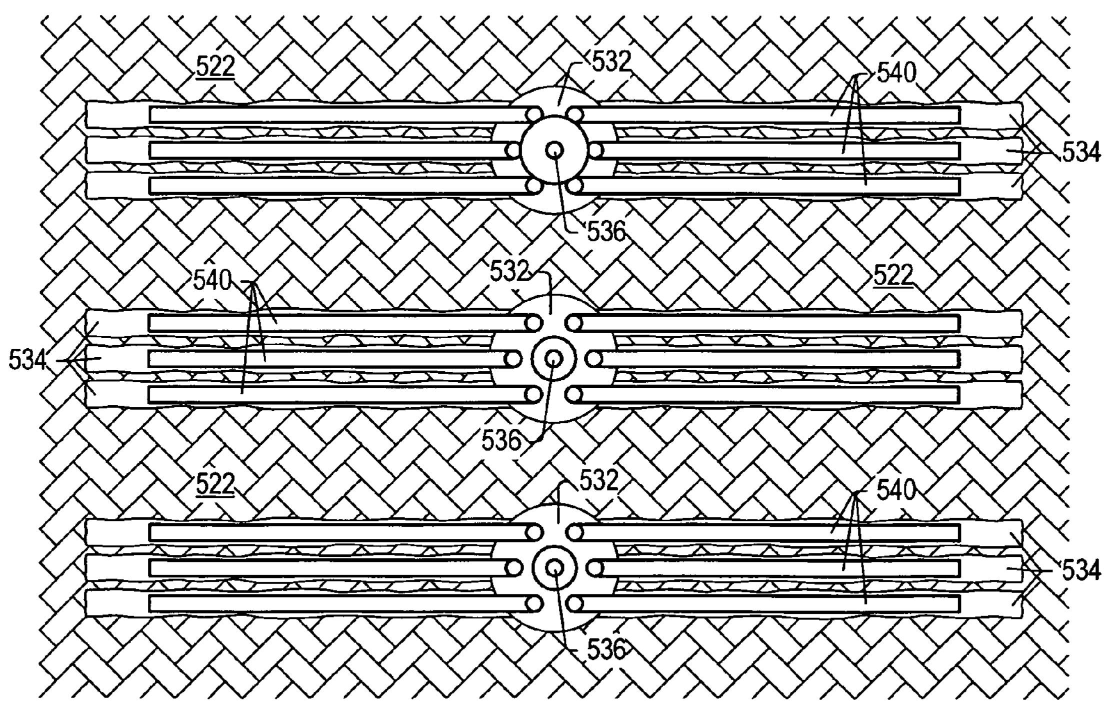
FIG. 8 illustrates a schematic of an elevated view of multiple heaters branched from a single well in a hydrocarbon containing formation.

FIG. 8 depicts a schematic view from an elevated position of the embodiment of FIG. 7. One or more vertical openings 532 may be formed in hydrocarbon layer 522. Each of vertical openings 532 may lie along a single plane in hydrocarbon layer 522. Horizontal openings 534 may extend in a plane substantially perpendicular to the plane of vertical openings 532. Additional horizontal openings 534 may lie in a plane below the horizontal openings as shown in the schematic depiction of FIG. 7. A number of vertical openings 532 and/or a spacing between vertical openings 532 may be determined by, for example, a desired heating rate or a desired production rate. In some embodiments, spacing between vertical openings may be about 4 m to about 30 m. Longer or shorter spacings may be used to meet specific formation needs. A length of a horizontal opening 534 may be up to about 1600 m. However, a length of horizontal openings 534 may vary depending on, for example, a maximum installation cost, an area of hydrocarbon layer 522, or a maximum producible heater length.

In an in situ conversion process embodiment, a formation having one or more thin hydrocarbon layers may be treated. The hydrocarbon layer may be, but is not limited to, a rich, thin coal seam; a rich, thin oil shale; or a relatively thin hydrocarbon layer in a tar sands formation. In some in situ conversion process embodiments, such formations may be treated with heat sources that are positioned substantially horizontal within and/or adjacent to the thin hydrocarbon layer or thin hydrocarbon layers. A relatively thin hydrocarbon layer may be at a substantial depth below a ground surface. For example, a formation may have an overburden of up to about 650 m in depth. The cost of drilling a large number of substantially vertical wells within a formation to a significant depth may be expensive. It may be advantageous to place heaters horizontally within these formations to heat large portions of the formation for lengths up to about 1600 m. Using horizontal heaters may reduce the number of vertical wells that are needed to place a sufficient number of heaters within the formation.

Figure 9:
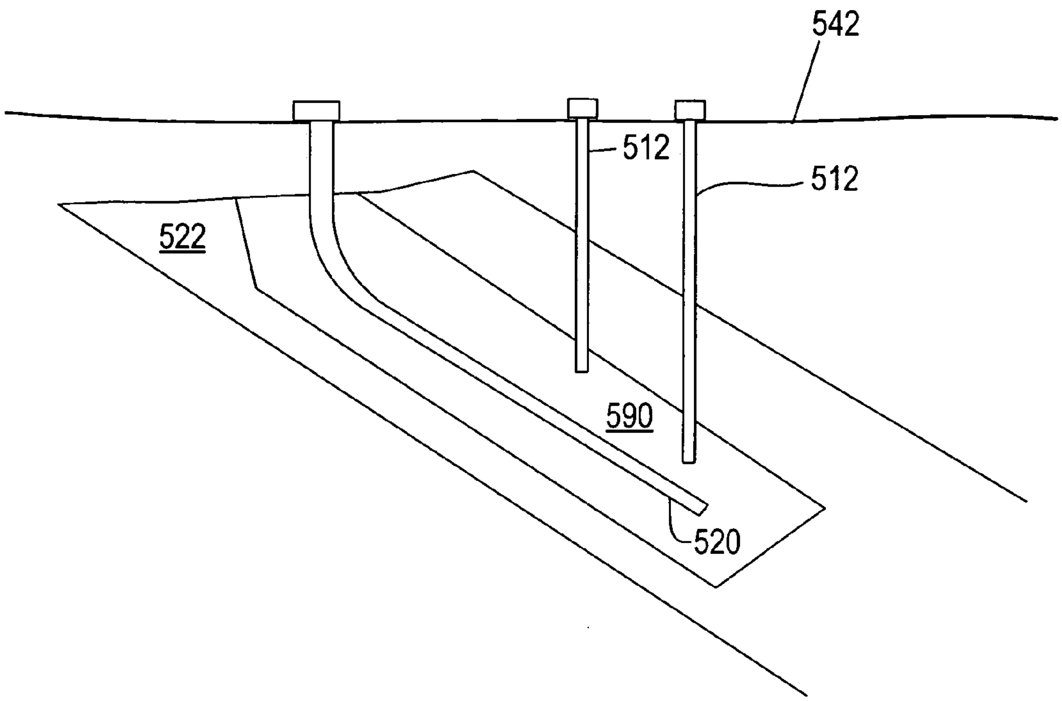
FIG. 9 depicts an embodiment of heater wells located in a hydrocarbon containing formation.

FIG. 9 illustrates an embodiment of hydrocarbon containing layer 522 that may be at a near-horizontal angle with respect to surface 542 of the ground. An angle of hydrocarbon containing layer 522, however, may vary. For example, hydrocarbon containing layer 522 may dip or be steeply dipping. Economically viable production of a steeply dipping hydrocarbon containing layer may not be possible using presently available mining methods.

A dipping or relatively steeply dipping hydrocarbon containing layer may be subjected to an in situ conversion process. For example, a set of production wells may be disposed near a highest portion of a dipping hydrocarbon layer of a hydrocarbon containing formation. Hydrocarbon portions adjacent to and below the production wells may be heated to pyrolysis temperatures. Pyrolysis fluid may be produced from the production wells. As production from the top portion declines, deeper portions of the formation may be heated to pyrolysis temperatures. Vapors may be produced from the hydrocarbon containing layer by transporting vapor through the previously pyrolyzed hydrocarbons. High permeability resulting from pyrolysis and production of fluid from the upper portion of the formation may allow for vapor phase transport with minimal pressure loss. Vapor phase transport of fluids produced in the formation may eliminate a need to have deep production wells in addition to the set of production wells. A number of production wells required to process the formation may be reduced. Reducing the number of production wells required for production may increase economic viability of an in situ conversion process.

In steeply dipping formations, directional drilling may be used to form an opening in the formation for a heater well or production well. Directional drilling may include drilling an opening in which the route/course of the opening may be planned before drilling. Such an opening may usually be drilled with rotary equipment. In directional drilling, a route/course of an opening may be controlled by deflection wedges, etc.

A wellbore may be formed using a drill equipped with a steerable motor and an accelerometer. The steerable motor and accelerometer may allow the wellbore to follow a layer in the hydrocarbon containing formation. A steerable motor may maintain a substantially constant distance between heater well 520 and a boundary of hydrocarbon containing layer 522 throughout drilling of the opening.

In some in situ conversion embodiments, geosteered drilling may be used to drill a wellbore in a hydrocarbon containing formation. Geosteered drilling may include determining or estimating a distance from an edge of hydrocarbon containing layer 522 to the wellbore with a sensor. The sensor may monitor variations in characteristics or signals in the formation. The characteristic or signal variance may allow for determination of a desired drill path. The sensor may monitor resistance, acoustic signals, magnetic signals, gamma rays, and/or other signals within the formation. A drilling apparatus for geosteered drilling may include a steerable motor. The steerable motor may be controlled to maintain a predetermined distance from an edge of a hydrocarbon containing layer based on data collected by the sensor.

In some in situ conversion embodiments, wellbores may be formed in a formation using other techniques. Wellbores may be formed by impaction techniques and/or by sonic drilling techniques. The method used to form wellbores may be determined based on a number of factors. The factors may include, but are not limited to, accessibility of the site, depth of the wellbore, properties of the overburden, and properties of the hydrocarbon containing layer or layers.

Figure 10:
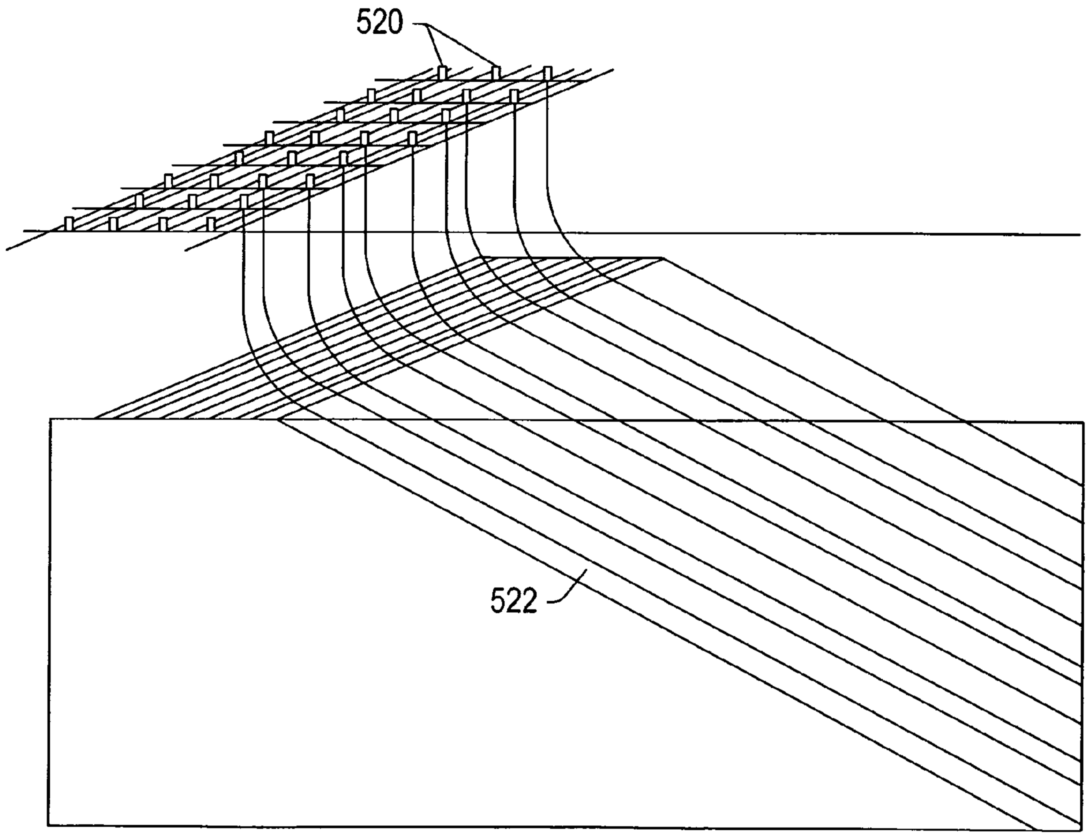
FIG. 10 depicts an embodiment of a pattern of heater wells in a hydrocarbon containing formation.

FIG. 10 illustrates an embodiment of a plurality of heater wells 520 formed in hydrocarbon containing layer 522. Hydrocarbon containing layer 522 may be a steeply dipping layer. Heater wells 520 may be formed in the formation such that two or more of the heater wells are substantially parallel to each other, and/or such that at least one heater well is substantially parallel to a boundary of hydrocarbon containing layer 522. For example, one or more of heater wells 520 may be formed in hydrocarbon containing layer 522 by a magnetic steering method.

Magnetic steering may include drilling heater well 520 parallel to an adjacent heater well. The adjacent well may have been previously drilled. Magnetic steering may include directing the drilling by sensing and/or determining a magnetic field produced in an adjacent heater well. For example, the magnetic field may be produced in the adjacent heater well by permanent magnets positioned in the adjacent heater well, by flowing a current through the casing of the adjacent heater well, and/or by flowing a current through an insulated current-carrying wireline disposed in the adjacent heater well.

Figure 11:
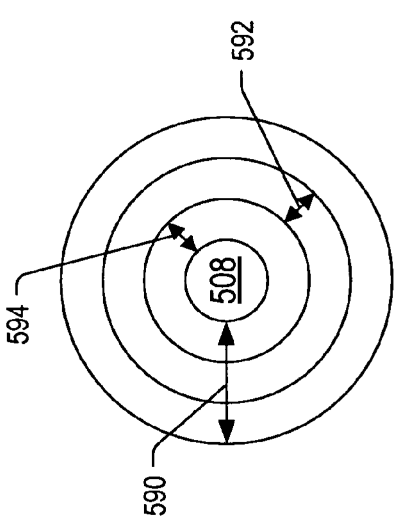
FIG. 11 depicts an embodiment of a heated portion of a hydrocarbon containing formation.

In some embodiments, heated portion 590 may extend radially from heat source 508, as shown in FIG. 11. For example, a width of heated portion 590, in a direction extending radially from heat source 508, may be about 0 m to about 10 m. A width of heated portion 590 may vary, however, depending upon, for example, heat provided by heat source 508 and the characteristics of the formation. Heat provided by heat source 508 will typically transfer through the heated portion to create a temperature gradient within the heated portion. For example, a temperature proximate the heater well will generally be higher than a temperature proximate an outer lateral boundary of the heated portion. A temperature gradient within the heated portion may vary within the heated portion depending on various factors (e.g., thermal conductivity of the formation, density, and porosity).

As heat transfers through heated portion 590 of the hydrocarbon containing formation, a temperature within at least a section of the heated portion may be within a pyrolysis temperature range. As the heat transfers away from the heat source, a front at which pyrolysis occurs will in many instances travel outward from the heat source. For example, heat from the heat source may be allowed to transfer into a selected section of the heated portion such that heat from the heat source pyrolyzes at least some of the hydrocarbons within the selected section. Pyrolysis may occur within selected section 592 of the heated portion, and pyrolyzation fluids will be generated in the selected section.

Selected section 592 may have a width radially extending from the inner lateral boundary of the selected section. For a single heat source as depicted in FIG. 11, width of the selected section may be dependent on a number of factors. The factors may include, but are not limited to, time that heat source 508 is supplying energy to the formation, thermal conductivity properties of the formation, extent of pyrolyzation of hydrocarbons in the formation. A width of selected section 592 may expand for a significant time after initialization of heat source 508. A width of selected section 592 may initially be zero and may expand to 10 m or more after initialization of heat source 508.

An inner boundary of selected section 592 may be radially spaced from the heat source. The inner boundary may define a volume of spent hydrocarbons 594. Spent hydrocarbons 594 may include a volume of hydrocarbon material that is transformed to coke due to the proximity and heat of heat source 508. Coking may occur by pyrolysis reactions that occur due to a rapid increase in temperature in a short time period. Applying heat to a formation at a controlled rate may allow for avoidance of significant coking, however, some coking may occur in the vicinity of heat sources. Spent hydrocarbons 594 may also include a volume of material that has been subjected to pyrolysis and the removal of pyrolysis fluids. The volume of material that has been subjected to pyrolysis and the removal of pyrolysis fluids may produce insignificant amounts or no additional pyrolysis fluids with increases in temperature. The inner lateral boundary may advance radially outwards as time progresses during operation of an in situ conversion process.

Figure 12:
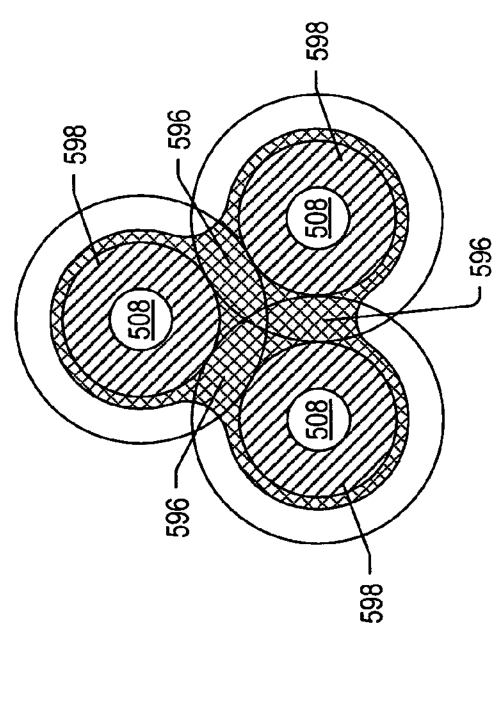
FIG. 12 depicts an embodiment of superposition of heat in a hydrocarbon containing formation.

In some embodiments, a plurality of heated portions may exist within a unit of heat sources. A unit of heat sources refers to a minimal number of heat sources that form a template that is repeated to create a pattern of heat sources within the formation. The heat sources may be located within the formation such that superposition (overlapping) of heat produced from the heat sources occurs. For example, as illustrated in FIG. 12, transfer of heat from two or more heat sources 508 results in superposition of heat to region 596 between the heat sources 508. Superposition of heat may occur between two, three, four, five, six, or more heat sources. Region 596 is an area in which temperature is influenced by various heat sources. Superposition of heat may provide the ability to efficiently raise the temperature of large volumes of a formation to pyrolysis temperatures. The size of region 596 may be significantly affected by the spacing between heat sources.

Superposition of heat may increase a temperature in at least a portion of the formation to a temperature sufficient for pyrolysis of hydrocarbons within the portion. Superposition of heat to region 596 may increase the quantity of hydrocarbons in a formation that are subjected to pyrolysis. Selected sections of a formation that are subjected to pyrolysis may include regions 598 brought into a pyrolysis temperature range by heat transfer from substantially only one heat source. Selected sections of a formation that are subjected to pyrolysis may also include regions 596 brought into a pyrolysis temperature range by superposition of heat from multiple heat sources.

A pattern of heat sources will often include many units of heat sources. There will typically be many heated portions, as well as many selected sections within the pattern of heat sources. Superposition of heat within a pattern of heat sources may decrease the time necessary to reach pyrolysis temperatures within the multitude of heated portions. Superposition of heat may allow for a relatively large spacing between adjacent heat sources. In some embodiments, a large spacing may provide for a relatively slow heating rate of hydrocarbon material. The slow heating rate may allow for pyrolysis of hydrocarbon material with minimal coking or no coking within the formation away from areas in the vicinity of the heat sources. Heating from heat sources allows the selected section to reach pyrolysis temperatures so that all hydrocarbons within the selected section may be subject to pyrolysis reactions. In some in situ conversion embodiments, a majority of pyrolysis fluids are produced when the selected section is within a range from about 0 m to about 25 m from a heat source.

In an in situ conversion process embodiment, a heating rate may be controlled to minimize costs associated with heating a selected section. The costs may include, for example, input energy costs and equipment costs. In certain embodiments, a cost associated with heating a selected section may be minimized by reducing a heating rate when the cost associated with heating is relatively high and increasing the heating rate when the cost associated with heating is relatively low. For example, a heating rate of about 330 watts/m may be used when the associated cost is relatively high, and a heating rate of about 1640 watts/m may be used when the associated cost is relatively low. In certain embodiments, heating rates may be varied between about 300 watts/m and about 800 watts/m when the associated cost is relatively high and between about 1000 watts/m and 1800 watts/m when the associated cost is relatively low. The cost associated with heating may be relatively high at peak times of energy use, such as during the daytime. For example, energy use may be high in warm climates during the daytime in the summer due to energy use for air conditioning. Low times of energy use may be, for example, at night or during weekends, when energy demand tends to be lower. In an embodiment, the heating rate may be varied from a higher heating rate during low energy usage times, such as during the night, to a lower heating rate during high energy usage times, such as during the day.

As shown in FIG. 3, in addition to heat sources 508, one or more production wells 512 will typically be placed within the portion of the hydrocarbon containing formation. Formation fluids may be produced through production well 512. In some embodiments, production well 512 may include a heat source. The heat source may heat the portions of the formation at or near the production well and allow for vapor phase removal of formation fluids. The need for high temperature pumping of liquids from the production well may be reduced or eliminated. Avoiding or limiting high temperature pumping of liquids may significantly decrease production costs. Providing heating at or through the production well may: (1) inhibit condensation and/or refluxing of production fluid when such production fluid is moving in the production well proximate the overburden, (2) increase heat input into the formation, and/or (3) increase formation permeability at or proximate the production well. In some in situ conversion process embodiments, an amount of heat supplied to production wells is significantly less than an amount of heat applied to heat sources that heat the formation.

Because permeability and/or porosity increases in the heated formation, produced vapors may flow considerable distances through the formation with relatively little pressure differential. Increases in permeability may result from a reduction of mass of the heated portion due to vaporization of water, removal of hydrocarbons, and/or creation of fractures. Fluids may flow more easily through the heated portion. In some embodiments, production wells may be provided in upper portions of hydrocarbon layers. As shown in FIG. 9, production wells 512 may extend into a hydrocarbon containing formation near the top of heated portion 590. Extending production wells significantly into the depth of the heated hydrocarbon layer may be unnecessary.

Fluid generated within a hydrocarbon containing formation may move a considerable distance through the hydrocarbon containing formation as a vapor. The considerable distance may be over 1000 m depending on various factors (e.g., permeability of the formation, properties of the fluid, temperature of the formation, and pressure gradient allowing movement of the fluid). Due to increased permeability in formations subjected to in situ conversion and formation fluid removal, production wells may only need to be provided in every other unit of heat sources or every third, fourth, fifth, or sixth units of heat sources.

Embodiments of a production well may include valves that alter, maintain, and/or control a pressure of at least a portion of the formation. Production wells may be cased wells. Production wells may have production screens or perforated casings adjacent to production zones. In addition, the production wells may be surrounded by sand, gravel or other packing materials adjacent to production zones. Production wells 512 may be coupled to treatment facilities 516, as shown in FIG. 3.

During an in situ process, production wells may be operated such that the production wells are at a lower pressure than other portions of the formation. In some embodiments, a vacuum may be drawn at the production wells. Maintaining the production wells at lower pressures may inhibit fluids in the formation from migrating outside of the in situ treatment area.

Figure 13:
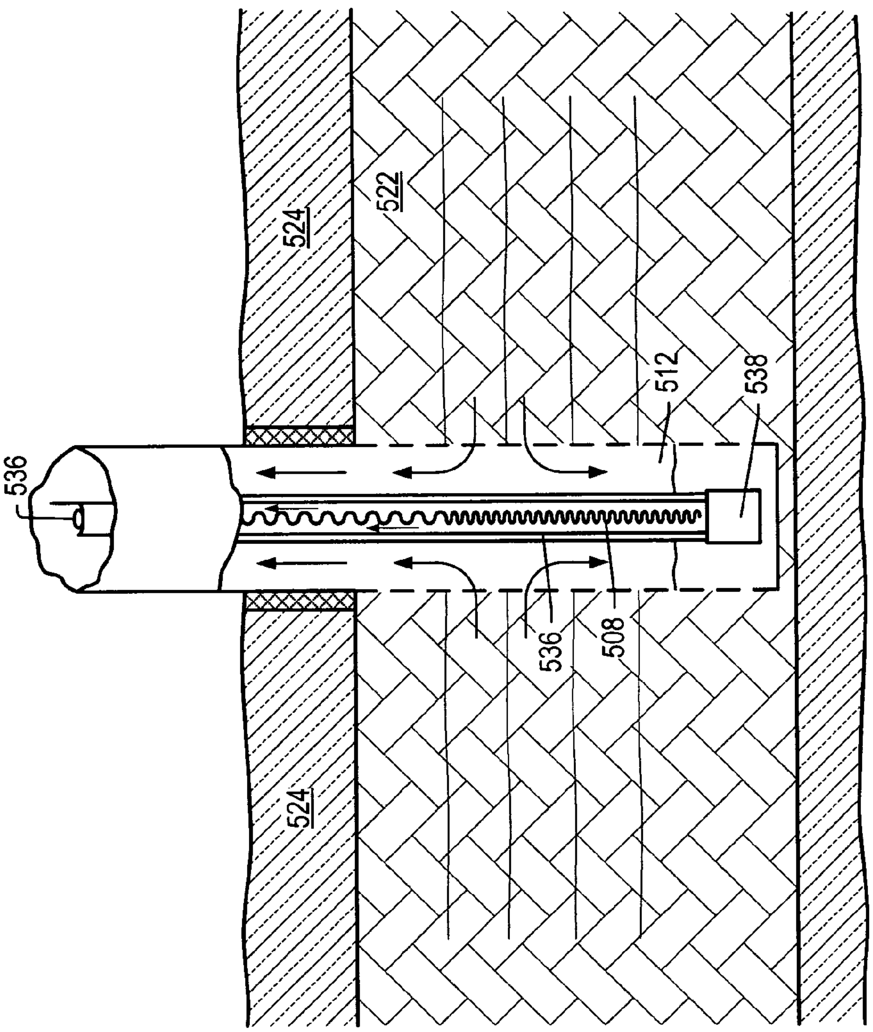
FIG. 13 illustrates an embodiment of a production well placed in a formation.

FIG. 13 illustrates an embodiment of production well 512 placed in hydrocarbon layer 522. Production well 512 may be used to produce formation fluids from hydrocarbon layer 522. Hydrocarbon layer 522 may be treated using an in situ conversion process. Production conduit 536 may be placed within production well 512. In an embodiment, production conduit 536 is a hollow sucker rod placed in production well 512. Production well 512 may have a casing, or lining, placed along the length of the production well. The casing may have openings, or perforations, to allow formation fluids to enter production well 512. Formation fluids may include vapors and/or liquids. Production conduit 536 and production well 512 may include non-corrosive materials such as steel.

In certain embodiments, production conduit 536 may include heat source 508. Heat source 508 may be a heater placed inside or outside production conduit 536 or formed as part of the production conduit. Heat source 508 may be a heater such as an insulated conductor heater, a conductor-in-conduit heater, or a skin-effect heater. A skin-effect heater is an electric heater that uses eddy current heating to induce resistive losses in production conduit 536 to heat the production conduit. An example of a skin-effect heater is obtainable from Dagang Oil Products (China).

Heating of production conduit 536 may inhibit condensation and/or refluxing in the production conduit or within production well 512. In certain embodiments, heating of production conduit 536 may inhibit plugging of pump 538 by liquids (e.g., heavy hydrocarbons). For example, heat source 508 may heat production conduit 536 to about 35° C. to maintain the mobility of liquids in the production conduit to inhibit plugging of pump 538 or the production conduit. In certain embodiments (e.g., for formations greater than about 100 m in depth), heat source 508 may heat production conduit 536 and/or production well 512 to temperatures of about 200° C. to about 250° C. to maintain produced fluids substantially in a vapor phase by inhibiting condensation and/or reflux of fluids in the production well.

Pump 538 may be coupled to production conduit 536. Pump 538 may be used to pump formation fluids from hydrocarbon layer 522 into production conduit 536. Pump 538 may be any pump used to pump fluids, such as a rod pump, PCP, jet pump, gas lift pump, centrifugal pump, rotary pump, or submersible pump. Pump 538 may be used to pump fluids through production conduit 536 to a surface of the formation above overburden 524.

In certain embodiments, pump 538 can be used to pump formation fluids that may be liquids. Liquids may be produced from hydrocarbon layer 522 prior to production well 512 being heated to a temperature sufficient to vaporize liquids within the production well. In some embodiments, liquids produced from the formation tend to include water. Removing liquids from the formation before heating the formation, or during early times of heating before pyrolysis occurs, tends to reduce the amount of heat input that is needed to produce hydrocarbons from the formation.

In an embodiment, formation fluids that are liquids may be produced through production conduit 536 using pump 538. Formation fluids that are vapors may be simultaneously produced through an annulus of production well 512 outside of production conduit 536.

Insulation may be placed on a wall of production well 512 in a section of the production well within overburden 524. The insulation may be cement or any other suitable low heat transfer material. Insulating the overburden section of production well 512 may inhibit transfer of heat from fluids being produced from the formation into the overburden.

In an in situ conversion process embodiment, a mixture may be produced from a hydrocarbon containing formation. The mixture may be produced through a heater well disposed in the formation. Producing the mixture through the heater well may increase a production rate of the mixture as compared to a production rate of a mixture produced through a non-heater well. A non-heater well may include a production well. In some embodiments, a production well may be heated to increase a production rate.

A heated production well may inhibit condensation of higher carbon numbers ($C_5$ or above) in the production well. A heated production well may inhibit problems associated with producing a hot, multi-phase fluid from a formation.

A heated production well may have an improved production rate as compared to a non-heated production well. Heat applied to the formation adjacent to the production well from the production well may increase formation permeability adjacent to the production well by vaporizing and removing liquid phase fluid adjacent to the production well and/or by increasing the permeability of the formation adjacent to the production well by formation of macro and/or micro fractures. A heater in a lower portion of a production well may be turned off when superposition of heat from heat sources heats the formation sufficiently to counteract benefits provided by heating from within the production well. In some embodiments, a heater in an upper portion of a production well may remain on after a heater in a lower portion of the well is deactivated. The heater in the upper portion of the well may inhibit condensation and reflux of formation fluid.

In some embodiments, heated production wells may improve product quality by causing production through a hot zone in the formation adjacent to the heated production well. A final phase of thermal cracking may exist in the hot zone adjacent to the production well. Producing through a hot zone adjacent to a heated production well may allow for an increased olefin content in non-condensable hydrocarbons and/or condensable hydrocarbons in the formation fluids. The hot zone may produce formation fluids with a greater percentage of non-condensable hydrocarbons due to thermal cracking in the hot zone. The extent of thermal cracking may depend on a temperature of the hot zone and/or on a residence time in the hot zone. A heater can be deliberately run hotter to promote the further in situ upgrading of hydrocarbons. This may be an advantage in the case of heavy hydrocarbons (e.g., bitumen or tar) in relatively permeable formations, in which some heavy hydrocarbons tend to flow into the production well before sufficient upgrading has occurred.

In an embodiment, heating in or proximate a production well may be controlled such that a desired mixture is produced through the production well. The desired mixture may have a selected yield of non-condensable hydrocarbons. For example, the selected yield of non-condensable hydrocarbons may be about 75 weight % non-condensable hydrocarbons or, in some embodiments, about 50 weight % to about 100 weight %. In other embodiments, the desired mixture may have a selected yield of condensable hydrocarbons. The selected yield of condensable hydrocarbons may be about 75 weight % condensable hydrocarbons or, in some embodiments, about 50 weight % to about 95 weight %.

A temperature and a pressure may be controlled within the formation to inhibit the production of carbon dioxide and increase production of carbon monoxide and molecular hydrogen during synthesis gas production. In an embodiment, the mixture is produced through a production well (or heater well), which may be heated to inhibit the production of carbon dioxide. In some embodiments, a mixture produced from a first portion of the formation may be recycled into a second portion of the formation to inhibit the production of carbon dioxide. The mixture produced from the first portion may be at a lower temperature than the mixture produced from the second portion of the formation.

A desired volume ratio of molecular hydrogen to carbon monoxide in synthesis gas may be produced from the formation. The desired volume ratio may be about 2.0:1. In an embodiment, the volume ratio may be maintained between about 1.8:1 and 2.2:1 for synthesis gas.

Figure 14:
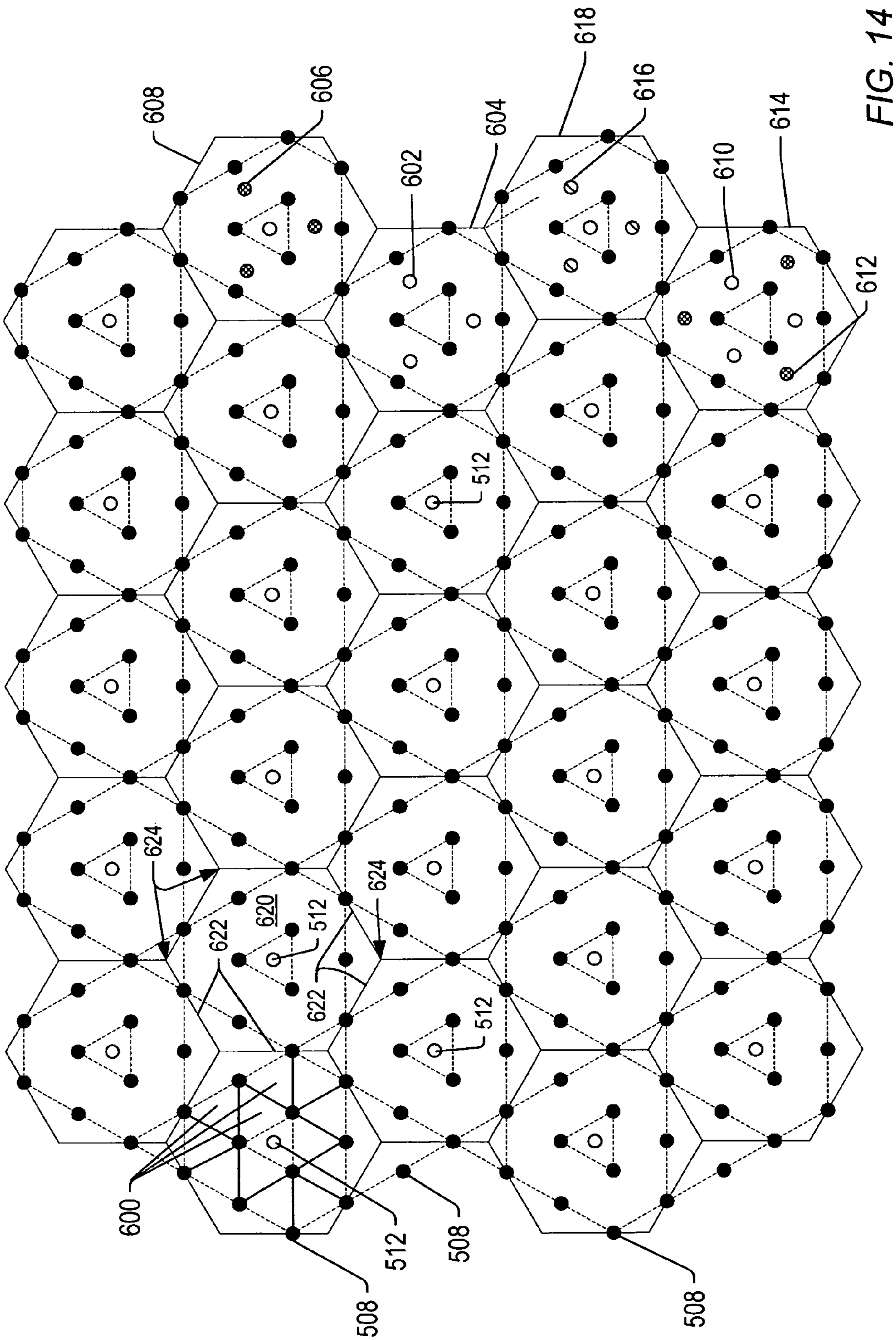
FIG. 14 depicts an embodiment of a pattern of heat sources and production wells in a hydrocarbon containing formation.

FIG. 14 illustrates a pattern of heat sources 508 and production wells 512 that may be used to treat a hydrocarbon containing formation. Heat sources 508 may be arranged in a unit of heat sources such as triangular pattern 600. Heat sources 508, however, may be arranged in a variety of patterns including, but not limited to, squares, hexagons, and other polygons. The pattern may include a regular polygon to promote uniform heating of the formation in which the heat sources are placed. The pattern may also be a line drive pattern. A line drive pattern generally includes a first linear array of heater wells, a second linear array of heater wells, and a production well or a linear array of production wells between the first and second linear array of heater wells.

A distance from a node of a polygon to a centroid of the polygon is smallest for a 3-sided polygon and increases with increasing number of sides of the polygon. The distance from a node to the centroid for an equilateral triangle is (length/2)/(square root(3)/2) or 0.5774 times the length. For a square, the distance from a node to the centroid is (length/2)/(square root(2)/2) or 0.7071 times the length. For a hexagon, the distance from a node to the centroid is (length/2)/(½) or the length. The difference in distance between a heat source and a midpoint to a second heat source (length/2) and the distance from a heat source to the centroid for an equilateral pattern (0.5774 times the length) is significantly less for the equilateral triangle pattern than for any higher order polygon pattern. The small difference means that superposition of heat may develop more rapidly and that the formation may rise to a more uniform temperature between heat sources using an equilateral triangle pattern rather than a higher order polygon pattern.

Triangular patterns tend to provide more uniform heating to a portion of the formation in comparison to other patterns such as squares and/or hexagons. Triangular patterns tend to provide faster heating to a predetermined temperature in comparison to other patterns such as squares or hexagons. The use of triangular patterns may result in smaller volumes of a formation being overheated. A plurality of units of heat sources such as triangular pattern 600 may be arranged substantially adjacent to each other to form a repetitive pattern of units over an area of the formation. For example, triangular patterns 600 may be arranged substantially adjacent to each other in a repetitive pattern of units by inverting an orientation of adjacent triangles 600. Other patterns of heat sources 508 may also be arranged such that smaller patterns may be disposed adjacent to each other to form larger patterns.

Production wells may be disposed in the formation in a repetitive pattern of units. In certain embodiments, production well 512 may be disposed proximate a center of every third triangle 600 arranged in the pattern. Production well 512, however, may be disposed in every triangle 600 or within just a few triangles. In some embodiments, a production well may be placed within every 13, 20, or 30 heater well triangles. For example, a ratio of heat sources in the repetitive pattern of units to production wells in the repetitive pattern of units may be more than approximately 5 (e.g., more than 6, 7, 8, or 9). In some well pattern embodiments, three or more production wells may be located within an area defined by a repetitive pattern of units. For example, production wells 602 may be located within an area defined by repetitive pattern of units 604. Production wells 602 may be located in the formation in a unit of production wells. The location of production wells 512, 602 within a pattern of heat sources 508 may be determined by, for example, a desired heating rate of the hydrocarbon containing formation, a heating rate of the heat sources, the type of heat sources used, the type of hydrocarbon containing formation (and its thickness), the composition of the hydrocarbon containing formation, permeability of the formation, the desired composition to be produced from the formation, and/or a desired production rate.

One or more injection wells may be disposed within a repetitive pattern of units. For example, injection wells 606 may be located within an area defined by repetitive pattern of units 608. Injection wells 606 may also be located in the formation in a unit of injection wells. For example, the unit of injection wells may be a triangular pattern. Injection wells 606, however, may be disposed in any other pattern. In certain embodiments, one or more production wells and one or more injection wells may be disposed in a repetitive pattern of units. For example, production wells 610 and injection wells 612 may be located within an area defined by repetitive pattern of units 614. Production wells 610 may be located in the formation in a unit of production wells, which may be arranged in a first triangular pattern. In addition, injection wells 612 may be located within the formation in a unit of production wells, which are arranged in a second triangular pattern. The first triangular pattern may be different than the second triangular pattern. For example, areas defined by the first and second triangular patterns may be different.

One or more monitoring wells may be disposed within a repetitive pattern of units. Monitoring wells may include one or more devices that measure temperature, pressure, and/or fluid properties. In some embodiments, logging tools may be placed in monitoring well wellbores to measure properties within a formation. The logging tools may be moved to other monitoring well wellbores as needed. The monitoring well wellbores may be cased or uncased wellbores. Monitoring wells 616 may be located within an area defined by repetitive pattern of units 618. Monitoring wells 616 may be located in the formation in a unit of monitoring wells, which may be arranged in a triangular pattern. Monitoring wells 616, however, may be disposed in any of the other patterns within repetitive pattern of units 618.

It is to be understood that a geometrical pattern of heat sources 508 and production wells 512 is described herein by example. A pattern of heat sources and production wells will in many instances vary depending on, for example, the type of hydrocarbon containing formation to be treated. For example, for relatively thin layers, heater wells may be aligned along one or more layers along strike or along dip. For relatively thick layers, heat sources may be at an angle to one or more layers (e.g., orthogonally or diagonally).

A triangular pattern of heat sources may treat a hydrocarbon layer having a thickness of about 10 m or more. For a thin hydrocarbon layer (e.g., about 10 m thick or less) a line and/or staggered line pattern of heat sources may treat the hydrocarbon layer.

For certain thin layers, heating wells may be placed close to an edge of the layer (e.g., in a staggered line instead of a line placed in the center of the layer) to increase the amount of hydrocarbons produced per unit of energy input. A portion of input heating energy may heat non-hydrocarbon portions of the formation, but the staggered pattern may allow superposition of heat to heat a majority of the hydrocarbon layers to pyrolysis temperatures. If the thin formation is heated by placing one or more heater wells in the layer along a center of the thickness, a significant portion of the hydrocarbon layers may not be heated to pyrolysis temperatures. In some embodiments, placing heater wells closer to an edge of the layer may increase the volume of layer undergoing pyrolysis per unit of energy input.

Exact placement of heater wells, production wells, etc. will depend on variables specific to the formation (e.g., thickness of the layer or composition of the layer), project economics, etc. In certain embodiments, heater wells may be substantially horizontal while production wells may be vertical, or vice versa. In some embodiments, wells may be aligned along dip or strike or oriented at an angle between dip and strike.

The spacing between heat sources may vary depending on a number of factors. The factors may include, but are not limited to, the type of a hydrocarbon containing formation, the selected heating rate, and/or the selected average temperature to be obtained within the heated portion. In some well pattern embodiments, the spacing between heat sources may be within a range of about 5 m to about 25 m. In some well pattern embodiments, spacing between heat sources may be within a range of about 8 m to about 15 m.

The spacing between heat sources may influence the composition of fluids produced from a hydrocarbon containing formation. In an embodiment, a computer-implemented simulation may be used to determine optimum heat source spacings within a hydrocarbon containing formation. At least one property of a portion of hydrocarbon containing formation can usually be measured. The measured property may include, but is not limited to, vitrinite reflectance, hydrogen content, atomic hydrogen to carbon ratio, oxygen content, atomic oxygen to carbon ratio, water content, thickness of the hydrocarbon containing formation, and/or the amount of stratification of the hydrocarbon containing formation into separate layers of rock and hydrocarbons.

In certain embodiments, a computer-implemented simulation may include providing at least one measured property to a computer system. One or more sets of heat source spacings in the formation may also be provided to the computer system. For example, a spacing between heat sources may be less than about 30 m. Alternatively, a spacing between heat sources may be less than about 15 m. The simulation may include determining properties of fluids produced from the portion as a function of time for each set of heat source spacings. The produced fluids may include formation fluids such as pyrolyzation fluids or synthesis gas. The determined properties may include, but are not limited to, API gravity, carbon number distribution, olefin content, hydrogen content, carbon monoxide content, and/or carbon dioxide content. The determined set of properties of the produced fluid may be compared to a set of selected properties of a produced fluid. Sets of properties that match the set of selected properties may be determined. Furthermore, heat source spacings may be matched to heat source spacings associated with desired properties.

As shown in FIG. 14, unit cell 620 will often include a number of heat sources 508 disposed within a formation around each production well 512. An area of unit cell 620 may be determined by midlines 622 that may be equidistant and perpendicular to a line connecting two production wells 512. Vertices 624 of the unit cell may be at the intersection of two midlines 622 between production wells 512. Heat sources 508 may be disposed in any arrangement within the area of unit cell 620. For example, heat sources 508 may be located within the formation such that a distance between each heat source varies by less than approximately 10%, 20%, or 30%. In addition, heat sources 508 may be disposed such that an approximately equal space exists between each of the heat sources. Other arrangements of heat sources 508 within unit cell 620 may be used. A ratio of heat sources 508 to production wells 512 may be determined by counting the number of heat sources 508 and production wells 512 within unit cell 620 or over the total field.

Figure 15:
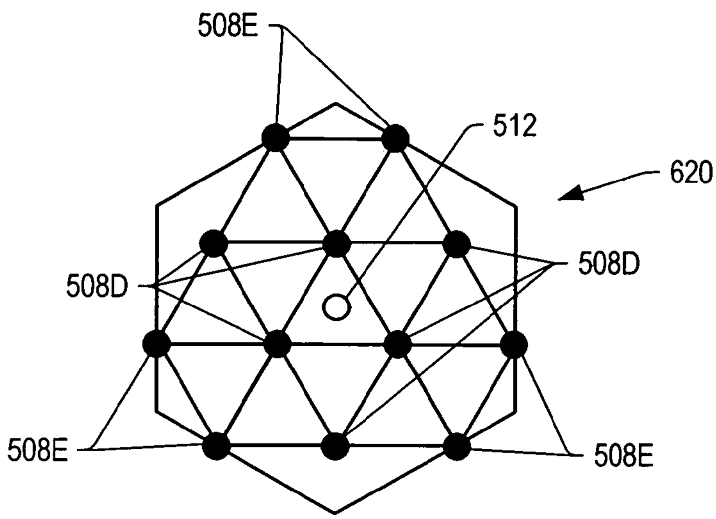
FIG. 15 depicts an embodiment of a pattern of heat sources and a production well in a hydrocarbon containing formation.

FIG. 15 illustrates an embodiment of unit cell 620. Unit cell 620 includes heat sources 508D, 508E and production well 512. Unit cell 620 may have six full heat sources 508D and six partial heat sources 508E. Full heat sources 508D may be closer to production well 512 than partial heat sources 508E. In addition, an entirety of each of full heat sources 508D may be located within unit cell 620. Partial heat sources 508E may be partially disposed within unit cell 620. Only a portion of heat source 508E disposed within unit cell 620 may provide heat to a portion of a hydrocarbon containing formation disposed within unit cell 620. A remaining portion of heat source 508E disposed outside of unit cell 620 may provide heat to a remaining portion of the hydrocarbon containing formation outside of unit cell 620. To determine a number of heat sources within unit cell 620, partial heat source 508E may be counted as one-half of full heat source 508D. In other unit cell embodiments, fractions other than ½ (e.g., ⅓) may more accurately describe the amount of heat applied to a portion from a partial heat source based on geometrical considerations.

The total number of heat sources in unit cell 620 may include six full heat sources 508D that are each counted as one heat source, and six partial heat sources 508E that are each counted as one-half of a heat source. Therefore, a ratio of heat sources 508D, 508E to production wells 512 in unit cell 620 may be determined as 9:1. A ratio of heat sources to production wells may be varied, however, depending on, for example, the desired heating rate of the hydrocarbon containing formation, the heating rate of the heat sources, the type of heat source, the type of hydrocarbon containing formation, the composition of hydrocarbon containing formation, the desired composition of the produced fluid, and/or the desired production rate. Providing more heat source wells per unit area will allow faster heating of the selected portion and thus hasten the onset of production. However, adding more heat sources will generally cost more money in installation and equipment. An appropriate ratio of heat sources to production wells may include ratios greater than about 5:1. In some embodiments, an appropriate ratio of heat sources to production wells may be about 10:1, 20:1, 50:1, or greater. If larger ratios are used, then project costs tend to decrease since less production wells and accompanying equipment are needed.

In some embodiments, a selected section is the volume of formation that is within a perimeter defined by the location of the outermost heat sources (assuming that the formation is viewed from above). For example, if four heat sources were located in a single square pattern with an area of about 100 $m^2$ (with each source located at a corner of the square), and if the formation had an average thickness of approximately 5 m across this area, then the selected section would be a volume of about 500 $m^3$ (i.e., the area multiplied by the average formation thickness across the area). In many commercial applications, many heat sources (e.g., hundreds or thousands) may be adjacent to each other to heat a selected section, and therefore only the outermost heat sources (i.e., edge heat sources) would define the perimeter of the selected section.

Figure 16:
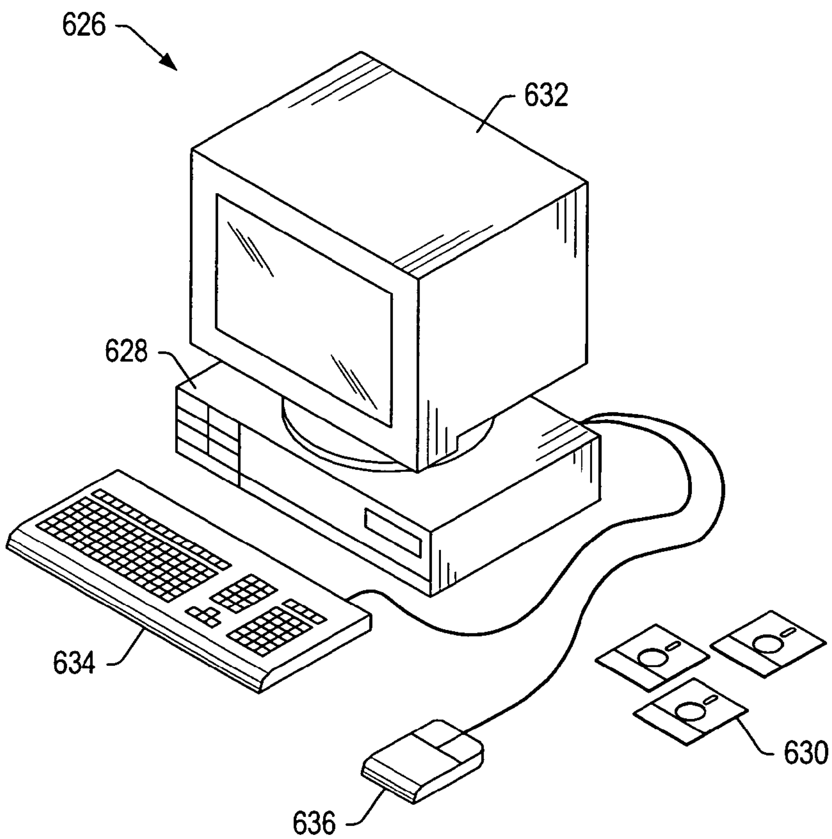
FIG. 16 illustrates a computational system.

FIG. 16 illustrates computational system 626 suitable for implementing various embodiments of a system and method for in situ processing of a formation. Computational system 626 typically includes components such as one or more central processing units (CPU) 628 with associated memory mediums, represented by floppy disks 630 or compact discs (CDs). The memory mediums may store program instructions for computer programs, wherein the program instructions are executable by CPU 628. Computational system 626 may further include one or more display devices such as monitor 632, one or more alphanumeric input devices such as keyboard 634, and/or one or more directional input devices such as mouse 636. Computational system 626 is operable to execute the computer programs to implement (e.g., control, design, simulate, and/or operate) in situ processing of formation systems and methods.

Computational system 626 preferably includes one or more memory mediums on which computer programs according to various embodiments may be stored. The term "memory medium" may include an installation medium, e.g., CD-ROM or floppy disks 630, a computational system memory such as DRAM, SRAM, EDO DRAM, SDRAM, DDR SDRAM, Rambus RAM, etc., or a non-volatile memory such as a magnetic media (e.g., a hard drive) or optical storage. The memory medium may include other types of memory as well, or combinations thereof. In addition, the memory medium may be located in a first computer that is used to execute the programs. Alternatively, the memory medium may be located in a second computer, or other computers, connected to the first computer (e.g., over a network). In the latter case, the second computer provides the program instructions to the first computer for execution. Also, computational system 626 may take various forms, including a personal computer, mainframe computational system, workstation, network appliance, Internet appliance, personal digital assistant (PDA), television system, or other device. In general, the term "computational system" can be broadly defined to encompass any device, or system of devices, having a processor that executes instructions from a memory medium.

The memory medium preferably stores a software program or programs for event-triggered transaction processing. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A CPU, such as host CPU 628, executing code and data from the memory medium, includes a system/process for creating and executing the software program or programs according to the methods and/or block diagrams described below.

In one embodiment, the computer programs executable by computational system 626 may be implemented in an object-oriented programming language. In an object-oriented programming language, data and related methods can be grouped together or encapsulated to form an entity known as an object.

All objects in an object-oriented programming system belong to a class, which can be thought of as a category of like objects that describes the characteristics of those objects. Each object is created as an instance of the class by a program. The objects may therefore be said to have been instantiated from the class. The class sets out variables and methods for objects that belong to that class. The definition of the class does not itself create any objects. The class may define initial values for its variables, and it normally defines the methods associated with the class (e.g., includes the program code which is executed when a method is invoked). The class may thereby provide all of the program code that will be used by objects in the class, hence maximizing re-use of code that is shared by objects in the class.

Figure 17:
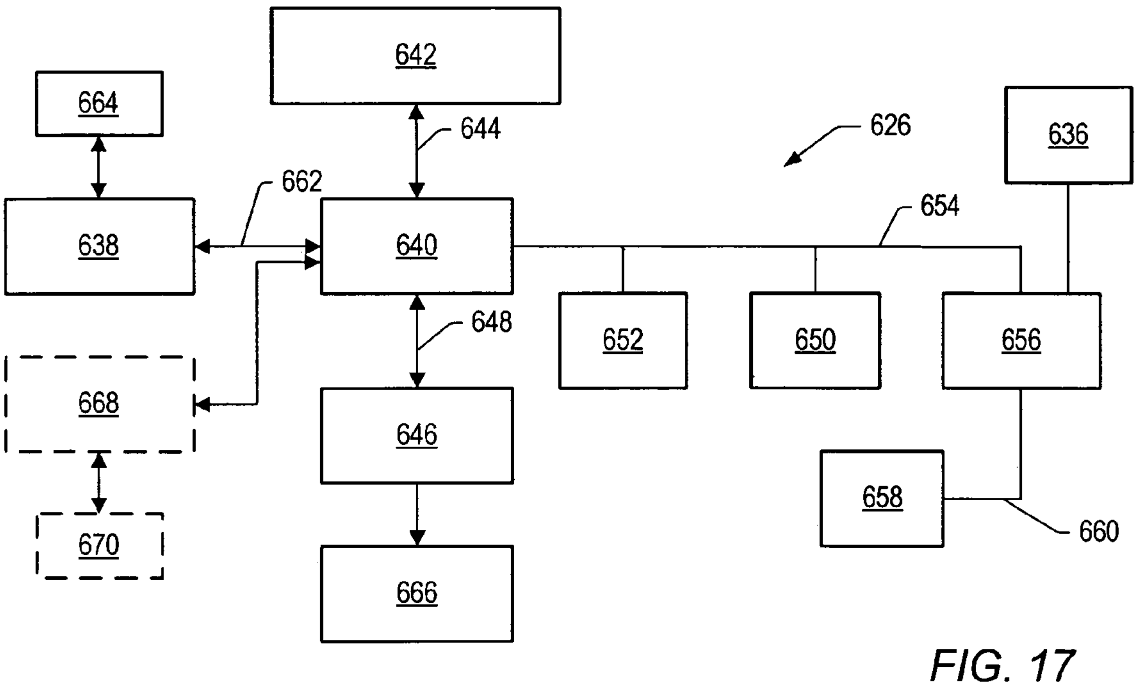
FIG. 17 depicts a block diagram of a computational system.

FIG. 17 depicts a block diagram of one embodiment of computational system 626 including processor 638 coupled to a variety of system components through bus bridge 640 is shown. Other embodiments are possible and contemplated. In the depicted system, main memory 642 is coupled to bus bridge 640 through memory bus 644, and graphics controller 646 is coupled to bus bridge 640 through AGP bus 648. A plurality of PCI devices 650 and 652 are coupled to bus bridge 640 through PCI bus 654. Secondary bus bridge 656 may be provided to accommodate an electrical interface to one or more EISA or ISA devices 658 through EISA/ISA bus 660. Processor 638 is coupled to bus bridge 640 through CPU bus 662 and to optional L2 cache 664.

Bus bridge 640 provides an interface between processor 638, main memory 642, graphics controller 646, and devices attached to PCI bus 654. When an operation is received from one of the devices connected to bus bridge 640, bus bridge 640 identifies the target of the operation (e.g., a particular device or, in the case of PCI bus 654, that the target is on PCI bus 654). Bus bridge 640 routes the operation to the targeted device. Bus bridge 640 generally translates an operation from the protocol used by the source device or bus to the protocol used by the target device or bus.

In addition to providing an interface to an ISA/EISA bus for PCI bus 654, secondary bus bridge 656 may further incorporate additional functionality, as desired. An input/output controller (not shown), either external from or integrated with secondary bus bridge 656, may also be included within computational system 626 to provide operational support for keyboard and mouse 636 and for various serial and parallel ports, as desired. An external cache unit (not shown) may further be coupled to CPU bus 662 between processor 638 and bus bridge 640 in other embodiments. Alternatively, the external cache may be coupled to bus bridge 640 and cache control logic for the external cache may be integrated into bus bridge 640. L2 cache 664 is further shown in a backside configuration to processor 638. It is noted that L2 cache 664 may be separate from processor 638, integrated into a cartridge (e.g., slot 1 or slot A) with processor 638, or even integrated onto a semiconductor substrate with processor 638.

Main memory 642 is a memory in which application programs are stored and from which processor 638 primarily executes. A suitable main memory 642 comprises DRAM (Dynamic Random Access Memory). For example, a plurality of banks of SDRAM (Synchronous DRAM), DDR (Double Data Rate) SDRAM, or Rambus DRAM (RDRAM) may be suitable.

PCI devices 650 and 652 are illustrative of a variety of peripheral devices such as, for example, network interface cards, video accelerators, audio cards, hard or floppy disk drives or drive controllers, SCSI (Small Computer Systems Interface) adapters, and telephony cards. Similarly, ISA device 658 is illustrative of various types of peripheral devices, such as a modem, a sound card, and a variety of data acquisition cards such as GPIB or field bus interface cards.

Graphics controller 646 is provided to control the rendering of text and images on display 666. Graphics controller 646 may embody a typical graphics accelerator generally known in the art to render three-dimensional data structures that can be effectively shifted into and from main memory 642. Graphics controller 646 may therefore be a master of AGP bus 648 in that it can request and receive access to a target interface within bus bridge 640 to thereby obtain access to main memory 642. A dedicated graphics bus accommodates rapid retrieval of data from main memory 642. For certain operations, graphics controller 646 may generate PCI protocol transactions on AGP bus 648. The AGP interface of bus bridge 640 may thus include functionality to support both AGP protocol transactions as well as PCI protocol target and initiator transactions. Display 666 is any electronic display upon which an image or text can be presented. A suitable display 666 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computational system 626 may be a multiprocessing computational system including additional processors (e.g., processor 668 shown as an optional component of computational system 626). Processor 668 may be similar to processor 638. More particularly, processor 668 may be an identical copy of processor 638. Processor 668 may be connected to bus bridge 640 via an independent bus (as shown in FIG. 17) or may share CPU bus 662 with processor 638. Furthermore, processor 668 may be coupled to optional L2 cache 670 similar to L2 cache 664.

Figure 18:
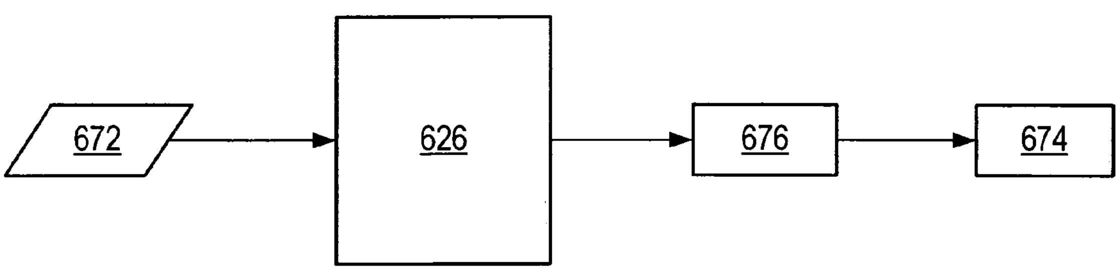
FIG. 18 illustrates a flow chart of an embodiment of a computer-implemented method for treating a formation based on a characteristic of the formation.

FIG. 18 illustrates a flowchart of a computer-implemented method for treating a hydrocarbon containing formation based on a characteristic of the formation. At least one characteristic 672 may be input into computational system 626. Computational system 626 may process at least one characteristic 672 using a software executable to determine a set of operating conditions 676 for treating the formation with in situ process 674. The software executable may process equations relating to formation characteristics and/or the relationships between formation characteristics. At least one characteristic 672 may include, but is not limited to, an overburden thickness, depth of the formation, coal rank, vitrinite reflectance, type of formation, permeability, density, porosity, moisture content, and other organic maturity indicators, oil saturation, water saturation, volatile matter content, kerogen composition, oil chemistry, ash content, net-to-gross ratio, carbon content, hydrogen content, oxygen content, sulfur content, nitrogen content, mineralogy, soluble compound content, elemental composition, hydrogeology, water zones, gas zones, barren zones, mechanical properties, or top seal character. Computational system 626 may be used to control in situ process 674 using determined set of operating conditions 676.

Figure 19:
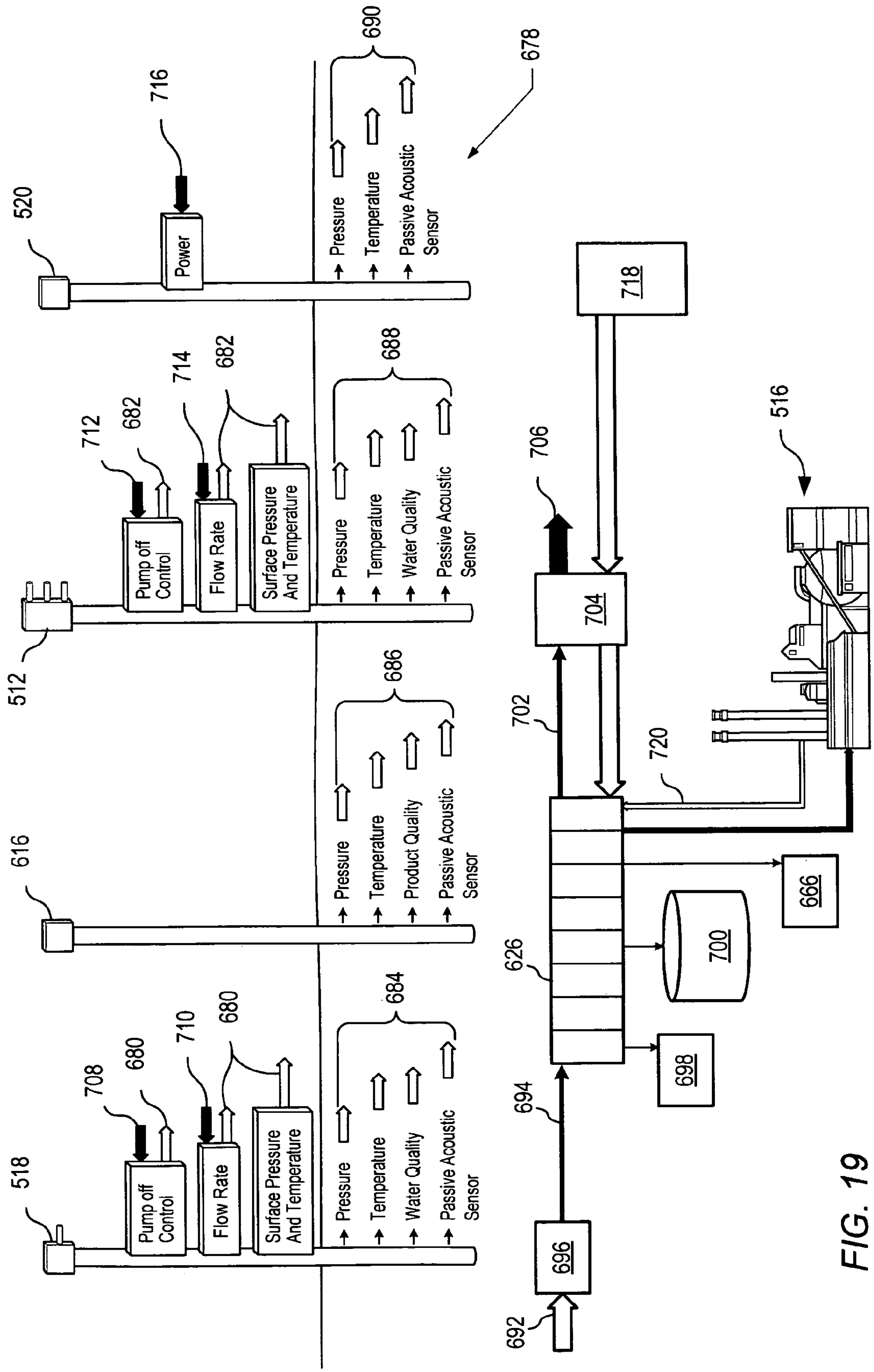
FIG. 19 illustrates a schematic of an embodiment used to control an in situ conversion process in a formation.

FIG. 19 illustrates a schematic of an embodiment used to control an in situ conversion process (ICP) in formation 678. Barrier well 518, monitor well 616, production well 512, and heater well 520 may be placed in formation 678. Barrier well 518 may be used to control water conditions within formation 678. Monitoring well 616 may be used to monitor subsurface conditions in the formation, such as, but not limited to, pressure, temperature, product quality, or fracture progression. Production well 512 may be used to produce formation fluids (e.g., oil, gas, and water) from the formation. Heater well 520 may be used to provide heat to the formation. Formation conditions such as, but not limited to, pressure, temperature, fracture progression (monitored, for instance, by acoustical sensor data), and fluid quality (e.g., product quality or water quality) may be monitored through one or more of wells 512, 518, 520, and 616.

Surface data such as, but not limited to, pump status (e.g., pump on or off), fluid flow rate, surface pressure/temperature, and/or heater power may be monitored by instruments placed at each well or certain wells. Similarly, subsurface data such as, but not limited to, pressure, temperature, fluid quality, and acoustical sensor data may be monitored by instruments placed at each well or certain wells. Surface data 680 from barrier well 518 may include pump status, flow rate, and surface pressure/temperature. Surface data 682 from production well 512 may include pump status, flow rate, and surface pressure/temperature. Subsurface data 684 from barrier well 518 may include pressure, temperature, water quality, and acoustical sensor data. Subsurface data 686 from monitoring well 616 may include pressure, temperature, product quality, and acoustical sensor data. Subsurface data 688 from production well 512 may include pressure, temperature, product quality, and acoustical sensor data. Subsurface data 690 from heater well 520 may include pressure, temperature, and acoustical sensor data.

Surface data 680 and 682 and subsurface data 684, 686, 688, and 690 may be monitored as analog data 692 from one or more measuring instruments. Analog data 692 may be converted to digital data 694 in analog-to-digital converter 696. Digital data 694 may be provided to computational system 626. Alternatively, one or more measuring instruments may provide digital data to computational system 626. Computational system 626 may include a distributed central processing unit (CPU). Computational system 626 may process digital data 694 to interpret analog data 692. Output from computational system 626 may be provided to remote display 698, data storage 700, display 666, or to treatment facility 516. Treatment facility 516 may include, for example, a hydrotreating plant, a liquid processing plant, or a gas processing plant. Computational system 626 may provide digital output 702 to digital-to-analog converter 704. Digital-to-analog converter 704 may convert digital output 702 to analog output 706.

Analog output 706 may include instructions to control one or more conditions of formation 678. Analog output 706 may include instructions to control the ICP within formation 678. Analog output 706 may include instructions to adjust one or more parameters of the ICP. The one or more parameters may include, but are not limited to, pressure, temperature, product composition, and product quality. Analog output 706 may include instructions for control of pump status 708 or flow rate 710 at barrier well 518. Analog output 706 may include instructions for control of pump status 712 or flow rate 714 at production well 512. Analog output 706 may also include instructions for control of heater power 716 at heater well 520. Analog output 706 may include instructions to vary one or more conditions such as pump status, flow rate, or heater power. Analog output 706 may also include instructions to turn on and/or off pumps, heaters, or monitoring instruments located at each well.

Remote input data 718 may also be provided to computational system 626 to control conditions within formation 678. Remote input data 718 may include data used to adjust conditions of formation 678. Remote input data 718 may include data such as, but not limited to, electricity cost, gas or oil prices, pipeline tariffs, data from simulations, plant emissions, or refinery availability. Remote input data 718 may be used by computational system 626 to adjust digital output 702 to a desired value. In some embodiments, treatment facility data 720 may be provided to computational system 626.

An in situ conversion process (ICP) may be monitored using a feedback control process, feedforward control process, or other type of control process. Conditions within a formation may be monitored and used within the feedback control process. A formation being treated using an in situ conversion process may undergo changes in mechanical properties due to the conversion of solids and viscous liquids to vapors, fracture propagation (e.g., to overburden, underburden, water tables, etc.), increases in permeability or porosity and decreases in density, moisture evaporation, and/or thermal instability of matrix minerals (leading to dehydration and decarbonation reactions and shifts in stable mineral assemblages).

Remote monitoring techniques that will sense these changes in reservoir properties may include, but are not limited to, 4D (4 dimension) time lapse seismic monitoring, 3D/3C (3 dimension/3 component) seismic passive acoustic monitoring of fracturing, time lapse 3D seismic passive acoustic monitoring of fracturing, electrical resistivity, thermal mapping, surface or downhole tilt meters, surveying permanent surface monuments, chemical sniffing or laser sensors for surface gas abundance, and gravimetrics. More direct subsurface-based monitoring techniques may include high temperature downhole instrumentation (such as thermocouples and other temperature sensing mechanisms, pressure sensors such as hydrophones, stress sensors, or instrumentation in the producer well to detect gas flows on a finely incremental basis). In certain embodiments, a "base" seismic monitoring may be conducted, and then subsequent seismic results can be compared to determine changes.

U.S. Pat. Nos. 6,456,566 issued to Aronstam; 5,418,335 issued to Winbow; and 4,879,696 issued to Kostelnicek et al. and U.S. Statutory Invention Registration H1561 to Thompson describe seismic sources for use in active acoustic monitoring of subsurface geophysical phenomena. A time-lapse profile may be generated to monitor temporal and areal changes in a hydrocarbon containing formation. In some embodiments, active acoustic monitoring may be used to obtain baseline geological information before treatment of a formation. During treatment of a formation, active and/or passive acoustic monitoring may be used to monitor changes within the formation.

Simulation methods on a computer system may be used to model an in situ process for treating a formation. Simulations may determine and/or predict operating conditions (e.g., pressure, temperature, etc.), products that may be produced from the formation at given operating conditions, and/or product characteristics (e.g., API gravity, aromatic to paraffin ratio, etc.) for the process. In certain embodiments, a computer simulation may be used to model fluid mechanics (including mass transfer and heat transfer) and kinetics within the formation to determine characteristics of products produced during heating of the formation. A formation may be modeled using commercially available simulation programs such as STARS, THERM, FLUENT, or CFX. In addition, combinations of simulation programs may be used to more accurately determine or predict characteristics of the in situ process. Results of the simulations may be used to determine operating conditions within the formation prior to actual treatment of the formation. Results of the simulations may also be used to adjust operating conditions during treatment of the formation based on a change in a property of the formation and/or a change in a desired property of a product produced from the formation.

Figure 20:
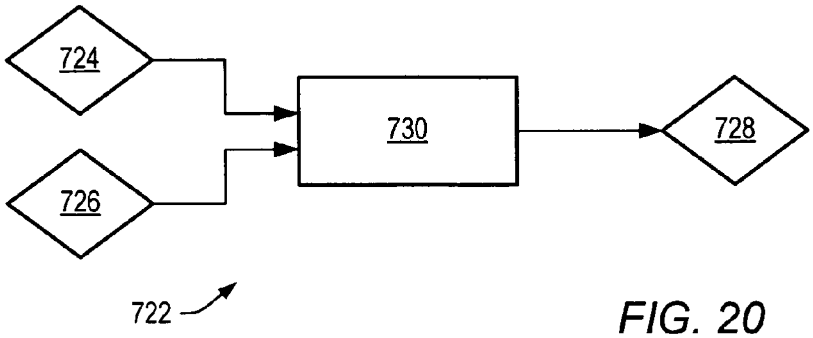
FIG. 20 illustrates a flow chart of an embodiment of a method for modeling an in situ process for treating a hydrocarbon containing formation using a computer system.

FIG. 20 illustrates a flowchart of an embodiment of method 722 for modeling an in situ process for treating a hydrocarbon containing formation using a computer system. Method 722 may include providing at least one property 724 of the formation to the computer system. Properties of the formation may include, but are not limited to, porosity, permeability, saturation, thermal conductivity, volumetric heat capacity, compressibility, composition, and number and types of phases in the formation. Properties may also include chemical components, chemical reactions, and kinetic parameters. At least one operating condition 726 of the process may also be provided to the computer system. For instance, operating conditions may include, but are not limited to, pressure, temperature, heating rate, heat input rate, process time, weight percentage of gases, production characteristics (e.g., flow rates, locations, compositions), and peripheral water recovery or injection. In addition, operating conditions may include characteristics of the well pattern such as producer well location, producer well orientation, ratio of producer wells to heater wells, heater well spacing, type of heater well pattern, heater well orientation, and distance between an overburden and horizontal heater wells.

Method 722 may include assessing at least one process characteristic 728 of the in situ process using simulation method 730 on the computer system. At least one process characteristic may be assessed as a function of time from at least one property of the formation and at least one operating condition. Process characteristics may include, but are not limited to, properties of a produced fluid such as API gravity, olefin content, carbon number distribution, ethene to ethane ratio, atomic carbon to hydrogen ratio, and ratio of non-condensable hydrocarbons to condensable hydrocarbons (gas/oil ratio). Process characteristics may include, but are not limited to, a pressure and temperature in the formation, total mass recovery from the formation, and/or production rate of fluid produced from the formation.

In some embodiments, simulation method 730 may include a numerical simulation method used/performed on the computer system. The numerical simulation method may employ finite difference methods to solve fluid mechanics, heat transfer, and chemical reaction equations as a function of time. A finite difference method may use a body-fitted grid system with unstructured grids to model a formation. An unstructured grid employs a wide variety of shapes to model a formation geometry, in contrast to a structured grid. A body-fitted finite difference simulation method may calculate fluid flow and heat transfer in a formation. Heat transfer mechanisms may include conduction, convection, and radiation. The body-fitted finite difference simulation method may also be used to treat chemical reactions in the formation. Simulations with a finite difference simulation method may employ closed value thermal conduction equations to calculate heat transfer and temperature distributions in the formation. A finite difference simulation method may determine values for heat injection rate data.

In an embodiment, a body-fitted finite difference simulation method may be well suited for simulating systems that include sharp interfaces in physical properties or conditions. A body-fitted finite difference simulation method may be more accurate, in certain circumstances, than space-fitted methods due to the use of finer, unstructured grids in body-fitted methods. For instance, it may be advantageous to use a body-fitted finite difference simulation method to calculate heat transfer in a heater well and in the region near or close to a heater well. The temperature profile in and near a heater well may be relatively sharp. A region near a heater well may be referred to as a "near wellbore region." The size or radius of a near wellbore region may depend on the type of formation. A general criteria for determining or estimating the radius of a "near wellbore region" may be a distance at which heat transfer by the mechanism of convection contributes significantly to overall heat transfer. Heat transfer in the near wellbore region is typically limited to contributions from conductive and/or radiative heat transfer. Convective heat transfer tends to contribute significantly to overall heat transfer at locations where fluids flow within the formation (i.e., convective heat transfer is significant where the flow of mass contributes to heat transfer).

In general, the radius of a near wellbore region in a formation decreases with both increasing convection and increasing variation of thermal properties with temperature in the formation. For example, a heavy hydrocarbon containing formation may have a relatively small near wellbore region due to the contribution of convection for heat transfer and a large variation of thermal properties with temperature. In one embodiment, the near wellbore region in a heavy hydrocarbon containing formation may have a radius of about 1 m to about 2 m. In other embodiments, the radius may be between about 2 m and about 4 m.

A coal formation may also have a relatively small near wellbore region due to a large variation of thermal properties with temperature. Alternatively, an oil shale formation may have a relatively large near wellbore region due to the relatively small contribution of convection for heat transfer and a small variation in thermal properties with temperature. For example, an oil shale formation may have a near wellbore region with a radius between about 5 m and about 7 m. In other embodiments, the radius may be between about 7 m and about 10 m.

In a simulation of a heater well and near wellbore region, a body-fitted finite difference simulation method may calculate the heat input rate that corresponds to a given temperature in a heater well. The method may also calculate the temperature distributions both inside the wellbore and at the near wellbore region.

CFX supplied by AEA Technologies in the United Kingdom is an example of a commercially available body-fitted finite difference simulation method. FLUENT is another commercially available body-fitted finite difference simulation method from FLUENT, Inc. located in Lebanon, N.H. FLUENT may simulate models of a formation that include porous media and heater wells. The porous media models may include one or more materials and/or phases with variable fractions. The materials may have user-specified temperature dependent thermal properties and densities. The user may also specify the initial spatial distribution of the materials in a model. In one modeling scheme of a porous media, a combustion reaction may only involve a reaction between carbon and oxygen. In a model of hydrocarbon combustion, the volume fraction and porosity of the formation tend to decrease. In addition, a gas phase may be modeled by one or more species in FLUENT, for example, nitrogen, oxygen, and carbon dioxide.

In an embodiment, the simulation method may include a numerical simulation method on a computer system that uses a space-fitted finite difference method with structured grids. The space-fitted finite difference simulation method may be a reservoir simulation method. A reservoir simulation method may calculate, but is not limited to calculating, fluid mechanics, mass balances, heat transfer, and/or kinetics in the formation. A reservoir simulation method may be particularly useful for modeling multiphase porous media in which convection (e.g., the flow of hot fluids) is a relatively important mechanism of heat transfer.

STARS is an example of a reservoir simulation method provided by Computer Modeling Group, Ltd. of Alberta, Canada. STARS is designed for simulating steam flood, steam cycling, steam-with-additives, dry and wet combustion, along with many types of chemical additive processes, using a wide range of grid and porosity models in both field and laboratory scales. STARS includes options such as thermal applications, steam injection, fireflood, horizontal wells, dual porosity/permeability, directional permeability, and flexible grids. STARS allows for complex temperature dependent models of thermal and physical properties. STARS may also simulate pressure dependent chemical reactions. STARS may simulate a formation using a combination of structured space-fitted grids and unstructured body-fitted grids. Additionally, THERM is an example of a reservoir simulation method provided by Scientific Software Intercomp.

In certain embodiments, a simulation method may use properties of a formation. In general, the properties of a formation for a model of an in situ process depend on the type of formation. In a model of an oil shale formation, for example, a porosity value may be used to model an amount of kerogen and hydrated mineral matter in the formation. The kerogen and hydrated mineral matter used in a model may be determined or approximated by the amount of kerogen and hydrated mineral matter necessary to generate the oil, gas and water produced in laboratory experiments. The remainder of the volume of the oil shale may be modeled as inert mineral matter, which may be assumed to remain intact at all simulated temperatures. During a simulation, hydrated mineral matter decomposes to produce water and minerals. In addition, kerogen pyrolyzes during the simulation to produce hydrocarbons and other compounds resulting in a rise in fluid porosity. In some embodiments, the change in porosity during a simulation may be determined by monitoring the amount of solids that are treated/transformed, and fluids that are generated.

In an embodiment of a coal formation model, the amount of coal in the formation for the model may be determined by laboratory pyrolysis experiments. Laboratory pyrolysis experiments may determine the amount of coal in an actual formation. The remainder of the volume may be modeled as inert mineral matter or ash. In some embodiments, the porosity of the ash may be between approximately 5% and approximately 10%. Absorbed and/or adsorbed fluid components, such as initial moisture, may be modeled as part of a solid phase. As moisture desorbs, the fluid porosity tends to increase. The value of the fluid porosity affects the results of the simulation since it may be used to model the change in permeability.

An embodiment of a model of a tar sands formation may include an inert mineral matter phase and a fluid phase that includes heavy hydrocarbons. In an embodiment, the porosity of a tar sands formation may be modeled as a function of the pressure of the formation and its mechanical properties. For example, the porosity, $\phi$, at a pressure, P, in a tar sands formation may be given by EQN. 2:

$$\phi=\phi_{ref}\,exp[c(P-P_{ref})] \quad (2)$$

where $P_{ref}$ is a reference pressure, $\phi_{ref}$ is the porosity at the reference pressure, and c is the formation compressibility.

Some embodiments of a simulation method may require an initial permeability of a formation and a relationship for the dependence of permeability on conditions of the formation. An initial permeability of a formation may be determined from experimental measurements of a sample (e.g., a core sample) of a formation. In some types of formations (e.g., a coal formation), a ratio of vertical permeability to horizontal permeability may be adjusted to take into consideration cleating in the formation.

Figure 21:
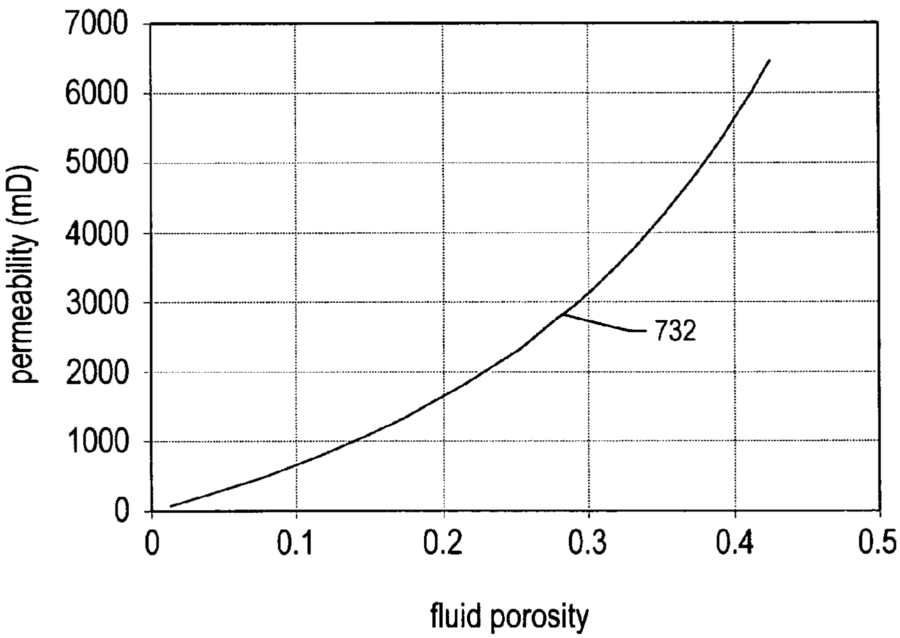
FIG. 21 illustrates a plot of a porosity-permeability relationship.

In some embodiments, the porosity of a formation may be used to model the change in permeability of the formation during a simulation. For example, the permeability of oil shale often increases with temperature due to the loss of solid matter from the decomposition of mineral matter and the pyrolysis of kerogen. Similarly, the permeability of a coal formation often increases with temperature due to the loss of solid matter from pyrolysis. In one embodiment, the dependence of porosity on permeability may be described by an analytical relationship. For example, the effect of pyrolysis on permeability, K, may be governed by a Carman-Kozeny type formula shown in EQN. 3:

$$K(\phi_f)=K_0(\phi_f/\phi_{f,0})^{CKpower}[(1-\phi_{f,0})/(1-\phi_f)]^2 \quad (3)$$

where $\phi_f$ is the current fluid porosity, $\phi_{f,0}$ is the initial fluid porosity, $K_0$ is the permeability at initial fluid porosity, and CKpower is a user-defined exponent. The value of CKpower may be fitted by matching or approximating the pressure gradient in an experiment in a formation. The porosity-permeability relationship 732 is plotted in FIG. 21 for a value of the initial porosity of 0.935 millidarcy and CKpower=0.95.

Alternatively, in some formations, such as a tar sands formation, the permeability dependence may be expressed as shown in EQN. 4:

$$K(\phi_f)=K_0\times\exp[k_{mul}\times(\phi_f-\phi_{f,0})/(1-\phi_{f,0})] \quad (4)$$

where $K_0$ and $q_{f,0}$ are the initial permeability and porosity, and $k_{mul}$ is a user-defined grid dependent permeability multiplier. In other embodiments, a tabular relationship rather than an analytical expression may be used to model the dependence of permeability on porosity. In addition, the ratio of vertical to horizontal permeability for tar sands formations may be determined from experimental data.

In certain embodiments, the thermal conductivity of a model of a formation may be expressed in terms of the thermal conductivities of constituent materials. For example, the thermal conductivity may be expressed in terms of solid phase components and fluid phase components. The solid phase in oil shale formations and coal formations may be composed of inert mineral matter and organic solid matter. One or more fluid phases in the formations may include, for example, a water phase, an oil phase, and a gas phase. In some embodiments, the dependence of the thermal conductivity on constituent materials in an oil shale formation may be modeled according to EQN. 5:

$$k_{th}=\phi_f\times(k_{th,w}\times S_w+k_{th,o}\times S_o+k_{th,g}\times S_g)+(1-\phi)\times k_{th,r}+(\phi-\phi_f)\times k_{th,s} \quad (5)$$

where $\phi$ is the porosity of the formation, $\phi_f$ is the instantaneous fluid porosity, $k_{th,i}$ is the thermal conductivity of phase i=(w ,o, g)=(water, oil, gas), $S_i$ is the saturation of phase i=(w, o, g)=(water, oil, gas), $k_{th,r}$ is the thermal conductivity of rock (inert mineral matter), and k,,, is the thermal conductivity of solid-phase components. The thermal conductivity, from EQN. 5, may be a function of temperature due to the temperature dependence of the solid phase components. The thermal conductivity also changes with temperature due to the change in composition of the fluid phase and porosity.

In some embodiments, a model may take into account the effect of different geological strata on properties of the formation. A property of a formation may be calculated for a given mineralogical composition. For example, the thermal conductivity of a model of a tar sands formation may be calculated from EQN. 6:

$$k_{th} = k_f^{\phi} \prod_{i=1}^{n} k_i^{c_i(1-\phi)} \quad (6)$$

where $k^{\Phi}_f$ is the thermal conductivity of the fluid phase at porosity $\phi$, $k_i$ is the thermal conductivity of geological layer i, and $c_i$ is the compressibility of geological layer i.

In an embodiment, the volumetric heat capacity, $\rho_b C_p$, may also be modeled as a direct function of temperature. However, the volumetric heat capacity also depends on the composition of the formation material through the density, which is affected by temperature.

In one embodiment, properties of the formation may include one or more phases with one or more chemical components. For example, fluid phases may include water, oil, and gas. Solid phases may include mineral matter and organic matter. Each of the fluid phases in an in situ process may include a variety of chemical components such as hydrocarbons, $H_2$, $CO_2$, etc. The chemical components may be products of one or more chemical reactions, such as pyrolysis reactions, that occur in the formation. Some embodiments of a model of an in situ process may include modeling individual chemical components known to be present in a formation. However, inclusion of chemical components in a model of an in situ process may be limited by available experimental composition and kinetic data for the components. In addition, a simulation method may also place numerical and solution time limitations on the number of components that may be modeled.

In some embodiments, one or more chemical components may be modeled as a single component called a pseudo-component. In certain embodiments, the oil phase may be modeled by two volatile pseudo-components, a light oil and a heavy oil. The oil and at least some of the gas phase components are generated by pyrolysis of organic matter in the formation. The light oil and the heavy oil may be modeled as having an API gravity that is consistent with laboratory or experimental field data. For example, the light oil may have an API gravity of between about 20° and about 70°. The heavy oil may have an API gravity less than about 20°.

In some embodiments, hydrocarbon gases in a formation of one or more carbon numbers may be modeled as a single pseudo-component. In other embodiments, non-hydrocarbon gases and hydrocarbon gases may be modeled as a single component. For example, hydrocarbon gases between a carbon number of one to a carbon number of five and nitrogen and hydrogen sulfide may be modeled as a single component. In some embodiments, the multiple components modeled as a single component have relatively similar molecular weights. A molecular weight of the hydrocarbon gas pseudo-component may be set such that the pseudo-component is similar to a hydrocarbon gas generated in a laboratory pyrolysis experiment at a specified pressure.

In some embodiments of an in situ process, the composition of the generated hydrocarbon gas may vary with pressure. As pressure increases, the ratio of a higher molecular weight component to a lower molecular component tends to increase. For example, as pressure increases, the ratio of hydrocarbon gases with carbon numbers between about three and about five to hydrocarbon gases with one and two carbon numbers tends to increase. Consequently, the molecular weight of the pseudo-component that models a mixture of component gases may vary with pressure.

TABLE 1 lists components in a model of in situ process in a coal formation according to one embodiment. Similarly, TABLE 2 lists components in a model of an in situ process in an oil shale formation according to an embodiment.

TABLE 1

CHEMICAL COMPONENTS IN A MODEL OF A COAL FORMATION.

| Component | Phase | MW |
|---|---|---|
| $H_20$ | Aqueous | 18.016 |
| heavy oil | Oil | 291.37 |
| light oil | Oil | 155.21 |
| HCgas | Gas | 19.512 |
| $H_2$ | Gas | 2.016 |
| $CO_2$ | Gas | 44.01 |
| CO | Gas | 28.01 |
| $N_2$ | Gas | 28.02 |
| $O_2$ | Gas | 32.0 |
| Coal | Solid | 15.153 |
| Coalbtm | Solid | 14.786 |
| Prechar | Solid | 14.065 |
| Char | Solid | 12.72 |

TABLE 2

CHEMICAL COMPONENTS IN A MODEL OF AN OIL SHALE FORMATION.

| Component | Phase | MW |
|---|---|---|
| $H_20$ | Aqueous | 18.016 |
| heavy oil | Oil | 317.96 |
| light oil | Oil | 154.11 |
| HCgas | Gas | 26.895 |
| $H_2$ | Gas | 2.016 |
| $CO_2$ | Gas | 44.01 |
| CO | Gas | 28.01 |
| Hydramin | Solid | 15.153 |
| Kerogen | Solid | 15.153 |
| Prechar | Solid | 12.72 |

As shown in TABLE 1, the hydrocarbon gases produced by the pyrolysis of coal may be grouped into a pseudo-component, HCgas. The HCgas component may have critical properties intermediate between methane and ethane. Similarly, the pseudo-component, HCgas, generated from pyrolysis in an oil shale formation, as shown in TABLE 2, may have critical properties very close to those of ethane. For both coal and oil shale, the HCgas pseudo-components may model hydrocarbons between a carbon number of about one and a carbon number of about five. The molecular weight of the pseudo-component in TABLE 2 generally reflects the composition of the hydrocarbon gas that was generated in a laboratory experiment at a pressure of about 6.9 bars absolute.

In some embodiments, the solid phase in a formation may be modeled with one or more components. For example, in a coal formation the components may include coal and char, as shown in TABLE 1. The components in a kerogen formation may include kerogen and a hydrated mineral phase (hydramin), as shown in TABLE 2. The hydrated mineral component may be included to model water and carbon dioxide generated in an oil shale formation at temperatures below a pyrolysis temperature of kerogen. The hydrated minerals, for example, may include illite and nahcolite.

Kerogen may be the source of most or all of the hydrocarbon fluids generated by the pyrolysis. Kerogen may also be the source of some of the water and carbon dioxide that is generated at temperatures below a pyrolysis temperature.

In an embodiment, the solid phase model may also include one or more intermediate components that are artifacts of the reactions that model the pyrolysis. For example, a coal formation may include two intermediate components, coalbtm and prechar, as shown in TABLE 1. An oil shale formation may include at least one intermediate component, prechar, as shown in TABLE 2. The prechar solid-phase components may model carbon residue in a formation that may contain $H_2$ and low molecular weight hydrocarbons. Coalbtm accounts for intermediate unpyrolyzed compounds that tend to appear and disappear during the course of pyrolysis. In one embodiment, the number of intermediate components may be increased to improve the match or agreement between simulation results and experimental results.

In one embodiment, a model of an in situ process may include one or more chemical reactions. A number of chemical reactions are known to occur in an in situ process for a hydrocarbon containing formation. The chemical reactions may belong to one of several categories of reactions. The categories may include, but not be limited to, generation of pre-pyrolysis water and carbon dioxide, generation of hydrocarbons, coking and cracking of hydrocarbons, formation of synthesis gas, and combustion and oxidation of coke.

In one embodiment, the rate of change of the concentration of species X due to a chemical reaction, for example:

$$X \rightarrow \text{products} \tag{7}$$

may be expressed in terms of a rate law:

$$d[X]/dt=-k[X]^n \tag{8}$$

Species X in the chemical reaction undergoes chemical transformation to the products. [X] is the concentration of species X, t is the time, k is the reaction rate constant, and n is the order of the reaction. The reaction rate constant, k, may be defined by the Arrhenius equation:

$$k=A\exp[-E_a/RT] \tag{9}$$

where A is the frequency factor, $E_a$ is the activation energy, R is the universal gas constant, and T is the temperature. Kinetic parameters, such as k, A, $E_a$, and n, may be determined from experimental measurements. A simulation method may include one or more rate laws for assessing the change in concentration of species in an in situ process as a function of time. Experimentally determined kinetic parameters for one or more chemical reactions may be used as input to the simulation method.

In some embodiments, the number and categories of reactions in a model of an in situ process may depend on the availability of experimental kinetic data and/or numerical limitations of a simulation method. Generally, chemical reactions and kinetic parameters for a model may be chosen such that simulation results match or approximate quantitative and qualitative experimental trends.

In some embodiments, reactions that model the generation of pre-pyrolysis water and carbon dioxide account for the bound water, carbon dioxide, and carbon monoxide generated in a temperature range below a pyrolysis temperature. For example, pre-pyrolysis water may be generated from hydrated mineral matter. In one embodiment, the temperature range may be between about 100° C. and about 270° C. In other embodiments, the temperature range may be between about 80° C. and about 300° C. Reactions in the temperature range below a pyrolysis temperature may account for between about 45% and about 60% of the total water generated and up to about 30% of the total carbon dioxide observed in laboratory experiments of pyrolysis.

In an embodiment, the pressure dependence of the chemical reactions may be modeled. To account for the pressure dependence, a single reaction with variable stoichiometric coefficients may be used to model the generation of pre-pyrolysis fluids. Alternatively, the pressure dependence may be modeled with two or more reactions with pressure dependent kinetic parameters such as frequency factors.

For example, experimental results indicate that the reaction that generates pre-pyrolysis fluids from oil shale is a function of pressure. The amount of water generated generally decreases with pressure while the amount of carbon dioxide generated generally increases with pressure. In an embodiment, the generation of pre-pyrolysis fluids may be modeled with two reactions to account for the pressure dependence. One reaction may be dominant at high pressures while the other may be prevalent at lower pressures. For example, a molar stoichiometry of two reactions according to one embodiment may be written as follows:

$$1\text{ mol hydramine} \rightarrow 0.5884\text{ mol } H_2O + 0.0962\text{ mol } CO_2 + 0.0114\text{ mol CO} \tag{10}$$

$$1\text{ mol hydramin} \rightarrow 0.8234\text{ mol } H_2O + 0.0\text{ mol } CO_2 + 0.0114\text{ mol CO} \tag{11}$$

Experimentally determined kinetic parameters for Reactions (10) and (11) are shown in TABLE 3. TABLE 3 shows that pressure dependence of Reactions (10) and (11) is taken into account by the frequency factor. The frequency factor increases with increasing pressure for Reaction (10), which results in an increase in the rate of product formation with pressure. The rate of product formation increases due to the increase in the rate constant. In addition, the frequency factor decreases with increasing pressure for Reaction (11), which results in a decrease in the rate of product formation with increasing pressure. Therefore, the values of the frequency factor in TABLE 3 indicate that Reaction (10) dominates at high pressures while Reaction (11) dominates at low pressures. In addition, the molar balances for Reactions (10) and (11) indicate that Reaction (10) generates less water and more carbon dioxide than Reaction (11).

In one embodiment, a reaction enthalpy may be used by a simulation method such as STARS to assess the thermodynamic properties of a formation. In TABLES 3-8, the reaction enthalpy is a negative number if a chemical reaction is endothermic and positive if a chemical reaction is exothermic.

TABLE 3

KINETIC PARAMETERS OF PRE-PYROLYSIS FLUID GENERATION REACTIONS IN AN OIL SHALE FORMATION.

| Reaction | Pressure (bars absolute) | Frequency Factor [(day)$^{-1}$] | Activation Energy (kJ/kgmole) | Order | Reaction Enthalpy (kJ/kgmole) |
|---|---|---|---|---|---|
| 10 | 1.0342 | $1.197 \times 10^9$ | 125,600 | 1 | 0 |
| | 4.482 | $7.938 \times 10^{10}$ | | | |
| | 7.929 | $2.170 \times 10^{11}$ | | | |
| | 11.376 | $4.353 \times 10^{11}$ | | | |
| | 14.824 | $7.545 \times 10^{11}$ | | | |
| | 18.271 | $1.197 \times 10^{12}$ | | | |
| 11 | 1.0342 | $1.197 \times 10^{12}$ | 125,600 | 1 | 0 |
| | 4.482 | $5.176 \times 10^{11}$ | | | |
| | 7.929 | $2.037 \times 10^{11}$ | | | |
| | 11.376 | $6.941 \times 10^{10}$ | | | |
| | 14.824 | $1.810 \times 10^{10}$ | | | |
| | 18.271 | $1.197 \times 10^9$ | | | |

In other embodiments, the generation of hydrocarbons in a pyrolysis temperature range in a formation may be modeled with one or more reactions. One or more reactions may model the amount of hydrocarbon fluids and carbon residue that are generated in a pyrolysis temperature range. Hydrocarbons generated may include light oil, heavy oil, and non-condensable gases. Pyrolysis reactions may also generate water, $H_2$, and $CO_2$.

Experimental results indicate that the composition of products generated in a pyrolysis temperature range may depend on operating conditions such as pressure. For example, the production rate of hydrocarbons generally decreases with pressure. In addition, the amount of produced hydrogen gas generally decreases substantially with pressure, the amount of carbon residue generally increases with pressure, and the amount of condensable hydrocarbons generally decreases with pressure. Furthermore, the amount of non-condensable hydrocarbons generally increases with pressure such that the sum of condensable hydrocarbons and non-condensable hydrocarbons generally remains approximately constant with a change in pressure. In addition, the API gravity of the generated hydrocarbons increases with pressure.

In an embodiment, the generation of hydrocarbons in a pyrolysis temperature range in an oil shale formation may be modeled with two reactions. One of the reactions may be dominant at high pressures, the other prevailing at low pressures. For example, the molar stoichiometry of the two reactions according to one embodiment may be as follows:

1 mol kerogen→0.02691 mol $H_2O$+0.009588 mol heavy oil+0.01780 mol light oil+0.04475 mol HCgas+0.01049 mol $H_2$+0.00541 mol $CO_2$+0.5827 mol prechar (12)

1 mol kerogen→0.02691 mol $H_2O$+0.009588 mol heavy oil+0.01780 mol light oil +0.04475 mol HCgas+0.07930 mol $H_2$+0.00541 mol $CO_2$+0.5718 mol prechar (13)

Experimentally determined kinetic parameters are shown in TABLE 4. Reactions (12) and (13) model the pressure dependence of hydrogen and carbon residue on pressure. However, the reactions do not take into account the pressure dependence of hydrocarbon production. In one embodiment, the pressure dependence of the production of hydrocarbons may be taken into account by a set of cracking/coking reactions. Alternatively, pressure dependence of hydrocarbon production may be modeled by hydrocarbon generation reactions without cracking/coking reactions.

TABLE 4

KINETIC PARAMETERS OF PRE-PYROLYSIS GENERATION REACTIONS IN AN OIL SHALE FORMATION.

| Reaction | Pressure (bars absolute) | Frequency Factor [(day)$^{-1}$] | Activation Energy (kJ/kgmole) | Order | Reaction Enthalpy (kJ/kgmole) |
|---|---|---|---|---|---|
| 12 | 1.0342 | $1.000 \times 10^9$ | 161600 | 1 | 0 |
| | 4.482 | $2.620 \times 10^{12}$ | | | |
| | 7.929 | $2.610 \times 10^{12}$ | | | |
| | 11.376 | $1.975 \times 10^{12}$ | | | |
| | 14.824 | $1.620 \times 10^{12}$ | | | |
| | 18.271 | $1.317 \times 10^{12}$ | | | |
| 13 | 1.0342 | $4.935 \times 10^{12}$ | 161600 | 1 | 0 |
| | 4.482 | $1.195 \times 10^{12}$ | | | |
| | 7.929 | $2.940 \times 10^{11}$ | | | |
| | 11.376 | $7.250 \times 10^{10}$ | | | |
| | 14.824 | $1.840 \times 10^{10}$ | | | |
| | 18.271 | $1.100 \times 10^{10}$ | | | |

In one embodiment, one or more reactions may model the cracking and coking in a formation. Cracking reactions involve the reaction of condensable hydrocarbons (e.g., light oil and heavy oil) to form lighter compounds (e.g., light oil and non-condensable gases) and carbon residue. The coking reactions model the polymerization and condensation of hydrocarbon molecules. Coking reactions lead to formation of char, lower molecular weight hydrocarbons, and hydrogen. Gaseous hydrocarbons may undergo coking reactions to form carbon residue and $H_2$.

Coking and cracking may account for the deposition of coke in the vicinity of heater wells where the temperature may be substantially greater than a pyrolysis temperature. For example, the molar stoichiometry of the cracking and coking reactions in an oil shale formation according to one embodiment may be as follows:

1 mol heavy oil (gas phase)→1.8530 mol light oil+0.045 mol HCgas+2.4515 mol prechar (14)

1 mol light oil (gas phase)→5.730 mol HCgas (15)

1 mol heavy oil (liquid phase)→0.2063 mol light oil+2.365 mol HCgas +17.497 mol prechar (16)

1 mol light oil (liquid phase)→0.5730 mol HCgas+10.904 mol prechar (17)

1 mol HCgas→2.8 mol $H_2$+1.6706 mol char (18)

Kinetic parameters for Reactions 14 to 18 are listed in TABLE 5. The kinetic parameters of the cracking reactions were chosen to match or approximate the oil and gas production observed in laboratory experiments. The kinetics parameter of the coking reaction was derived from experimental data on pyrolysis reactions in a coal experiment.

TABLE 5

KINETIC PARAMETERS OF CRACKING AND COKING REACTIONS IN AN OIL SHALE FORMATION.

| Reaction | Pressure (bars absolute) | Frequency Factor [(day)$^{-1}$] | Activation Energy (kJ/kgmole) | Order | Reaction Enthalpy (kJ/kgmole) |
|---|---|---|---|---|---|
| 14 | 1.0342 | $6.250 \times 10^{16}$ | 206034 | 1 | 0 |
| | 4.482 | | | | |
| | 7.929 | | | | |
| | 11.376 | | | | |
| | 14.824 | | | | |
| | 18.271 | $7.950 \times 10^{16}$ | | | |
| 15 | 1.0342 | $9.850 \times 10^{16}$ | 219328 | 1 | 0 |
| | 4.482 | | | | |
| | 7.929 | | | | |
| | 11.376 | | | | |
| | 14.824 | | | | |
| | 18.271 | $5.850 \times 10^{16}$ | | | |
| 16 | — | $2.647 \times 10^{20}$ | 206034 | 1 | 0 |
| 17 | — | $3.820 \times 10^{20}$ | 219328 | 1 | 0 |
| 18 | — | $7.660 \times 10^{20}$ | 311432 | 1 | 0 |

In addition, reactions may model the generation of water at a temperature below or within a pyrolysis temperature range and the generation of hydrocarbons at a temperature in a pyrolysis temperature range in a coal formation. For example, according to one embodiment, the reactions may include:

1 mol coal→0.01894 mol $H_2O$+0.0004.91 mol HCgas+0.000047 mol $H_2$+0.0006.8 mol $CO_2$+0.99883 mol coalbtm (19)

1 mol coalbtm→0.02553 mol $H_2O$+0.00136 mol heavy oil+0.003174 mol light oil+0.01618 mol HCgas+0.0032 mol $H_2$+0.005599 mol $CO_2$+0.0008.26 mol CO+0.91306 mol prechar (20)

$$1 \text{ mol prechar} \rightarrow 0.02764 \text{ mol } H_2O + 0.05764 \text{ mol HCgas} + 0.02823 \text{ mol } H_2 + 0.0154 \text{ mol } CO_2 + 0.006.465 \text{ mol CO} + 0.90598 \text{ mol char} \quad (21)$$

The kinetic parameters of the three reactions are tabulated in TABLE 6. Reaction (19) models the generation of water in a temperature range below a pyrolysis temperature. Reaction (20) models the generation of hydrocarbons, such as oil and gas, generated in a pyrolysis temperature range. Reaction (21) models gas generated at temperatures between about 370° C. and about 600° C.

TABLE 6

KINETIC PARAMETERS OF REACTIONS IN A COAL FORMATION.

| Reaction | Frequency Factor $[(\text{day})^{-1} \times (\text{mole/m}^3)^{\text{order}-1}]$ | Activation Energy (kJ/kgmole) | Order | Reaction Enthalpy (kJ/kgmole) |
|---|---|---|---|---|
| 19 | $2.069 \times 10^{12}$ | 146535 | 5 | 0 |
| 20 | $1.895 \times 10^{15}$ | 201549 | 1.808 | −1282 |
| 21 | $1.64 \times 10^{2}$ | 230270 | 9 | 0 |

Coking and cracking in a coal formation may be modeled by one or more reactions in both the liquid phase and the gas phase. For example, the molar stoichiometry of two cracking reactions in the liquid and gas phase may be according to one embodiment:

$$1 \text{ mol heavy oil} \rightarrow 0.1879 \text{ mol light oil} + 2.983 \text{ mol HCgas} + 16.038 \text{ mol char} \quad (22)$$

$$1 \text{ mol light oil} \rightarrow 0.7985 \text{ mol HCgas} + 10.977 \text{ mol char} \quad (23)$$

In addition coking in a coal formation may be modeled as $$1 \text{ mol HCgas} \rightarrow 2.2 \text{ mol } H_2 + 1.1853 \text{ mol char} \quad (24)$$

Reaction (24) may model the coking of methane and ethane observed in field experiments when low carbon number hydrocarbon gases are injected into a hot coal formation.

The kinetic parameters of reactions 22-24 are tabulated in TABLE 7. The kinetic parameters for cracking were derived from literature data. The kinetic parameters for the coking reaction were derived from laboratory data on cracking.

TABLE 7

KINETIC PARAMETERS OF CRACKING AND COKING REACTIONS IN A COAL FORMATION.

| Reaction | Frequency Factor $(\text{day})^{-1}$ | Activation Energy (kJ/kgmole) | Order | Reaction Enthalpy (kJ/kgmole) |
|---|---|---|---|---|
| 22 | $2.647 \times 10^{20}$ | 206034 | 1 | 0 |
| 23 | $3.82 \times 10^{20}$ | 219328 | 1 | 0 |
| 24 | $7.66 \times 10^{20}$ | 311432 | 1 | 0 |

In certain embodiments, the generation of synthesis gas in a formation may be modeled by one or more reactions. For example, the molar stoichiometry of four synthesis gas reactions may be according to one embodiment:

$$1 \text{ mol } 0.9442 \text{ char} + 1.0 \text{ mol } CO_2 \rightarrow 2.0 \text{ mol CO} \quad (25)$$

$$1.0 \text{ mol CO} \rightarrow 0.5 \text{ mol } CO_2 + 0.4721 \text{ mol char} \quad (26)$$

$$0.94426 \text{ mol char} + 1.0 \text{ mol } H_2O \rightarrow 1.0 \text{ mol } H_2 + 1.0 \text{ mol CO} \quad (27)$$

$$1.0 \text{ mol } H_2 + 1.0 \text{ mol CO} \rightarrow 0.94426 \text{ mol char} + 1.0 \text{ mol } H_2O \quad (28)$$

The kinetic parameters of the four reactions are tabulated in TABLE 8. Kinetic parameters for Reactions 25-28 were based on literature data that were adjusted to fit the results of a coal cube laboratory experiment. Pressure dependence of reactions in the coal formation is not taken into account in TABLES 6, 7, and 8. In one embodiment, pressure dependence of the reactions in the coal formation may be modeled, for example, with pressure dependent frequency factors.

TABLE 8

KINETIC PARAMETERS FOR SYNTHESIS GAS REACTIONS IN A COAL FORMATION.

| Reaction | Frequency Factor $(\text{day} \times \text{bar})^{-1}$ | Activation Energy (kJ/kgmole) | Order | Reaction Enthalpy (kJ/kgmole) |
|---|---|---|---|---|
| 25 | $2.47 \times 10^{11}$ | 169970 | 1 | −173033 |
| 26 | 201.6 | 148.6 | 1 | 86516 |
| 27 | $6.44 \times 10^{14}$ | 237015 | 1 | −135138 |
| 28 | $2.73 \times 10^{7}$ | 103191 | 1 | 135138 |

In one embodiment, a combustion and oxidation reaction of coke to carbon dioxide may be modeled in a formation. For example, the molar stoichiometry of a reaction according to one embodiment may be:

$$0.9442 \text{ mol char} + 1.0 \text{ mol } O_2 \rightarrow 1.0 \text{ mol } CO_2 \quad (29)$$

Experimentally derived kinetic parameters include a frequency factor of $1.0 \times 10^4$ $(\text{day})^{-1}$, an activation energy of 58,614 kJ/kgmole, an order of 1, and a reaction enthalpy of 427,977 kJ/kgmole.

In some embodiments, a model of a tar sands formation may be modeled with the following components: bitumen (heavy oil), light oil, HCgas1, HCgas2, water, char, and prechar. According to one embodiment, an in situ process in a tar sands formation may be modeled by at least two reactions:

$$\text{Bitumen} \rightarrow \text{light oil} + \text{HCgas1} + H_2O + \text{prechar} \quad (30)$$

$$\text{Prechar} \rightarrow \text{HCgas2} + H_2O + \text{char} \quad (31)$$

Reaction 30 models the pyrolysis of bitumen to oil and gas components. In one embodiment, Reaction (30) may be modeled as a $2^{nd}$ order reaction and Reaction (31) may be modeled as a $7^{th}$ order reaction. In one embodiment, the reaction enthalpy of Reactions (30) and (31) may be zero.

Figure 22:
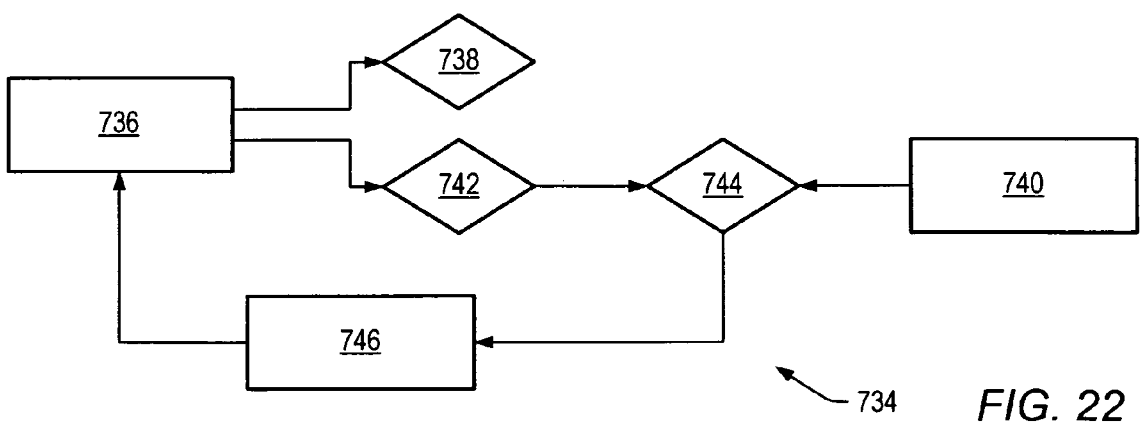
FIG. 22 illustrates a method for simulating heat transfer in a formation.

In an embodiment, a method of modeling an in situ process of treating a hydrocarbon containing formation using a computer system may include simulating a heat input rate to the formation from two or more heat sources. FIG. 22 illustrates method 734 for simulating heat transfer in a formation. Simulation method 736 may simulate heat input rate 738 from two or more heat sources in the formation. For example, the simulation method may be a body-fitted finite difference simulation method. The heat may be allowed to transfer from the heat sources to a selected section of the formation. In an embodiment, the superposition of heat from the two or more heat sources may pyrolyze at least some hydrocarbons within the selected section of the formation. In one embodiment, two or more heat sources may be simulated with a model of heat sources with symmetry boundary conditions.

In some embodiments, method 734 may include providing at least one desired parameter 740 of the in situ process to the computer system. In some embodiments, desired parameter 740 may be a desired temperature in the formation. In particular, the desired parameter may be a maximum temperature at specific locations in the formation. In some embodiments, the desired parameter may be a desired heating rate or a desired product composition. Desired parameters 740 may include other parameters such as, but not limited to, a desired pressure, process time, production rate, time to obtain a given production rate, and/or product composition. Process characteristics 742 determined by simulation method 736 may be compared 744 to at least one desired parameter 740. The method may further include controlling 746 the heat input rate from the heat sources (or some other process parameter) to achieve at least one desired parameter. Consequently, the heat input rate from the two or more heat sources during a simulation may be time dependent.

In an embodiment, heat injection into a formation may be initiated by imposing a constant flux per unit area at the interface between a heater and the formation. When a point in the formation, such as the interface, reaches a specified maximum temperature, the heat flux may be varied to maintain the maximum temperature. The specified maximum temperature may correspond to the maximum temperature allowed for a heater well casing (e.g., a maximum operating temperature for the metallurgy in the heater well). In one embodiment, the maximum temperature may be between about 600° C. and about 700° C. In other embodiments, the maximum temperature may be between about 700° C. and about 800° C. In some embodiments, the maximum temperature may be greater than about 800° C.

Figure 23:
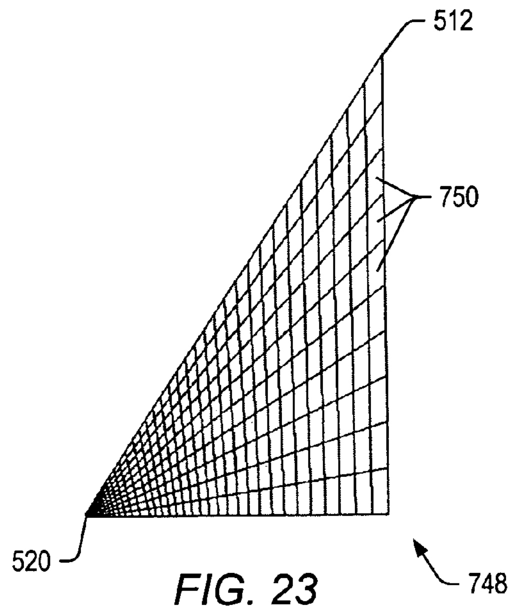
FIG. 23 illustrates a model for simulating a heat transfer rate in a formation.

FIG. 23 illustrates a model for simulating heat transfer rate in a formation. Model 748 represents an aerial view of $1/12^{th}$ of a seven spot heater pattern in a formation. The pattern is composed of body-fitted grid elements 750. The model includes heater well 520 and production well 512. A pattern of heaters in a formation is modeled by imposing symmetry boundary conditions. The elements near the heaters and in the region near the heaters are substantially smaller than other portions of the formation to more effectively model a steep temperature profile.

Figure 24:
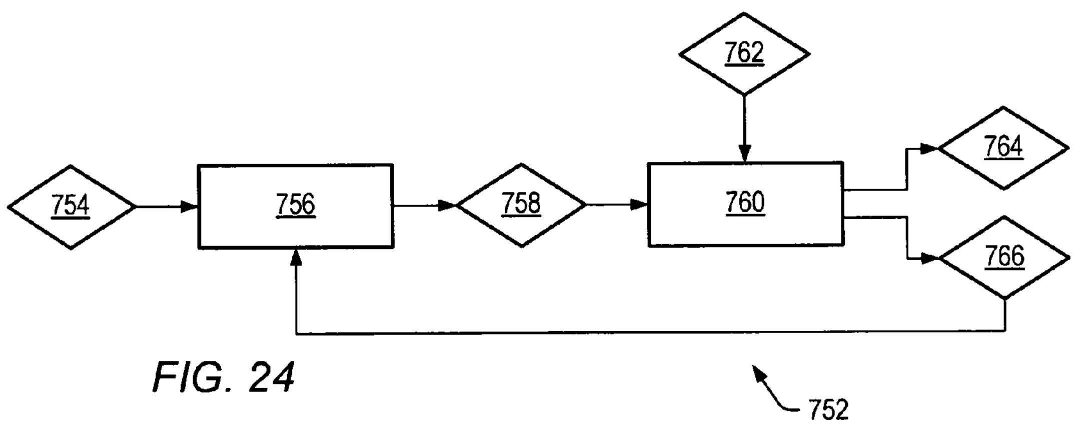
FIG. 24 illustrates a flow chart of an embodiment of a method for using a computer system to model an in situ conversion process.

In some embodiments, in situ process are modeled with more than one simulation method. FIG. 24 illustrates a flowchart of an embodiment of method 752 for modeling an in situ process for treating a hydrocarbon containing formation using a computer system. At least one heat input property 754 may be provided to the computer system. The computer system may include first simulation method 756. At least one heat input property 754 may include a heat transfer property of the formation. For example, the heat transfer property of the formation may include heat capacities or thermal conductivities of one or more components in the formation. In certain embodiments, at least one heat input property 754 includes an initial heat input property of the formation. Initial heat input properties may also include, but are not limited to, volumetric heat capacity, thermal conductivity, porosity, permeability, saturation, compressibility, composition, and the number and types of phases. Properties may also include chemical components, chemical reactions, and kinetic parameters.

In certain embodiments, first simulation method 756 may simulate heating of the formation. For example, the first simulation method may simulate heating the wellbore and the near wellbore region. Simulation of heating of the formation may assess (i.e., estimate, calculate, or determine) heat injection rate data 758 for the formation. In one embodiment, heat injection rate data may be assessed to achieve at least one desired parameter of the formation, such as a desired temperature or composition of fluids produced from the formation. First simulation method 756 may use at least one heat input property 754 to assess heat injection rate data 758 for the formation. First simulation method 756 may be a numerical simulation method. The numerical simulation may be a body-fitted finite difference simulation method. In certain embodiments, first simulation method 756 may use at least one heat input property 754, which is an initial heat input property. First simulation method 756 may use the initial heat input property to assess heat input properties at later times during treatment (e.g., heating) of the formation.

Heat injection rate data 758 may be used as input into second simulation method 760. In some embodiments, heat injection rate data 758 may be modified or altered for input into second simulation method 760. For example, heat injection rate data 758 may be modified as a boundary condition for second simulation method 760. At least one property 762 of the formation may also be input for use by second simulation method 760. Heat injection rate data 758 may include a temperature profile in the formation at any time during heating of the formation. Heat injection rate data 758 may also include heat flux data for the formation. Heat injection rate data 758 may also include properties of the formation.

Second simulation method 760 may be a numerical simulation and/or a reservoir simulation method. In certain embodiments, second simulation method 760 may be a space-fitted finite difference simulation (e.g., STARS). Second simulation method 760 may include simulations of fluid mechanics, mass balances, and/or kinetics within the formation. The method may further include providing at least one property 762 of the formation to the computer system. At least one property 762 may include chemical components, reactions, and kinetic parameters for the reactions that occur within the formation. At least one property 762 may also include other properties of the formation such as, but not limited to, permeability, porosities, and/or a location and orientation of heat sources, injection wells, or production wells.

Second simulation method 760 may assess at least one process characteristic 764 as a function of time based on heat injection rate data 758 and at least one property 762. In some embodiments, second simulation method 760 may assess an approximate solution for at least one process characteristic 764. The approximate solution may be a calculated estimation of at least one process characteristic 764 based on the heat injection rate data and at least one property. The approximate solution may be assessed using a numerical method in second simulation method 760. At least one process characteristic 764 may include one or more parameters produced by treating a hydrocarbon containing formation in situ. For example, at least one process characteristic 764 may include, but is not limited to, a production rate of one or more produced fluids, an API gravity of a produced fluid, a weight percentage of a produced component, a total mass recovery from the formation, and operating conditions in the formation such as pressure or temperature.

In some embodiments, first simulation method 756 and second simulation method 760 may be used to predict process characteristics using parameters based on laboratory data. For example, experimentally based parameters may include chemical components, chemical reactions, kinetic parameters, and one or more formation properties. The simulations may further be used to assess operating conditions that can be used to produce desired properties in fluids produced from the formation. In additional embodiments, the simulations may be used to predict changes in process characteristics based on changes in operating conditions and/or formation properties.

In certain embodiments, one or more of the heat input properties may be initial values of the heat input properties. Similarly, one or more of the properties of the formation may be initial values of the properties. The heat input properties and the reservoir properties may change during a simulation of the formation using the first and second simulation methods. For example, the chemical composition, porosity, permeability, volumetric heat capacity, thermal conductivity, and/or saturation may change with time. Consequently, the heat input rate assessed by the first simulation method may not be adequate input for the second simulation method to achieve a desired parameter of the process. In some embodiments, the method may further include assessing modified heat injection rate data at a specified time of the second simulation. At least one heat input property 766 of the formation assessed at the specified time of the second simulation method may be used as input by first simulation method 756 to calculate the modified heat input data. Alternatively, the heat input rate may be controlled to achieve a desired parameter during a simulation of the formation using the second simulation method.

Figure 25:
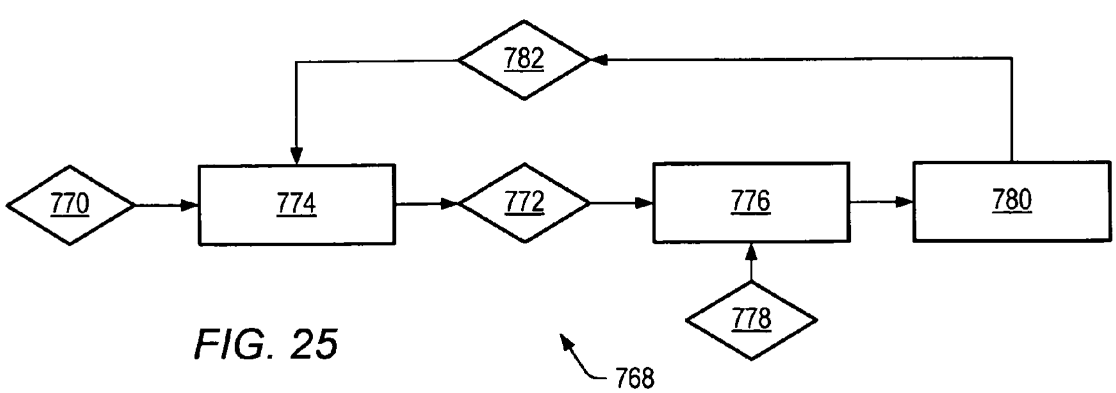
FIG. 25 illustrates a flow chart of an embodiment of a method for calibrating model parameters to match laboratory or field data for an in situ process.

In some embodiments, one or more model parameters for input into a simulation method may be based on laboratory or field test data of an in situ process for treating a hydrocarbon containing formation. FIG. 25 illustrates a flowchart of an embodiment of method 768 for calibrating model parameters to match or approximate laboratory or field data for an in situ process. Method 768 may include providing one or more model parameters 770 for the in situ process. Model parameters 770 may include properties of the formation. Model parameters 770 may include relationships for the dependence of properties on the changes in conditions, such as temperature and pressure, in the formation. For example, model parameters 770 may include a relationship for the dependence of porosity on pressure in the formation. Model parameters 770 may also include an expression for the dependence of permeability on porosity. Model parameters 770 may include an expression for the dependence of thermal conductivity on composition of the formation. Model parameters 770 may include chemical components, the number and types of reactions in the formation, and kinetic parameters. Kinetic parameters may include the order of a reaction, activation energy, reaction enthalpy, and frequency factor.

In some embodiments, method 768 may include assessing one or more simulated process characteristics 772 based on the one or more model parameters. Simulated process characteristics 772 may be assessed using simulation method 774. Simulation method 774 may be a body-fitted finite difference simulation method. In some embodiments, simulation method 774 may be a reservoir simulation method.

In an embodiment, simulated process characteristics 772 may be compared 776 to real process characteristics 778. Real process characteristics 778 may be process characteristics obtained from laboratory or field tests of an in situ process. Comparing process characteristics may include comparing simulated process characteristics 772 with real process characteristics 778 as a function of time. Differences between simulated process characteristic 772 and real process characteristic 778 may be associated with one or more model parameters. For example, a higher ratio of gas to oil of produced fluids from a real in situ process may be due to a lack of pressure dependence of kinetic parameters. Method 768 may further include modifying 780 the one or more model parameters such that at least one simulated process characteristic 772 matches or approximates at least one real process characteristic 778. One or more model parameters may be modified to account for a difference between a simulated process characteristic and a real process characteristic. For example, an additional chemical reaction may be added to account for pressure dependence or a discrepancy of an amount of a particular component in produced fluids.

Some embodiments may include assessing one or more modified simulated process characteristics from simulation method 774 based on modified model parameters 782. Modified model parameters may include one or both of model parameters 770 that have been modified and that have not been modified. In an embodiment, the simulation method may use modified model parameters 782 to assess at least one operating condition of the in situ process to achieve at least one desired parameter.

Method 768 may be used to calibrate model parameters for generation reactions of pre-pyrolysis fluids and generation of hydrocarbons from pyrolysis. For example, field test results may show a larger amount of $H_2$ produced from the formation than the simulation results. The discrepancy may be due to the generation of synthesis gas in the formation in the field test. Synthesis gas may be generated from water in the formation, particularly near heater wells. The temperatures near heater wells may approach a synthesis gas generating temperature range even when the majority of the formation is below synthesis gas generating temperatures. Therefore, the model parameters for the simulation method may be modified to include some synthesis gas reactions.

In addition, model parameters may be calibrated to account for the pressure dependence of the production of low molecular weight hydrocarbons in a formation. The pressure dependence may arise in both laboratory and field scale experiments. As pressure increases, fluids tend to remain in a laboratory vessel or a formation for longer periods of time. The fluids tend to undergo increased cracking and/or coking with increased residence time in the laboratory vessel or the formation. As a result, larger amounts of lower molecular weight hydrocarbons may be generated. Increased cracking of fluids may be more pronounced in a field scale experiment (as compared to a laboratory experiment, or as compared to calculated cracking) due to longer residence times since fluids may be required to pass through significant distances (e.g., tens of meters) of formation before being produced from a formation.

Simulations may be used to calibrate kinetic parameters that account for the pressure dependence. For example, pressure dependence may be accounted for by introducing cracking and coking reactions into a simulation. The reactions may include pressure dependent kinetic parameters to account for the pressure dependence. Kinetic parameters may be chosen to match or approximate hydrocarbon production reaction parameters from experiments.

Figure 26:
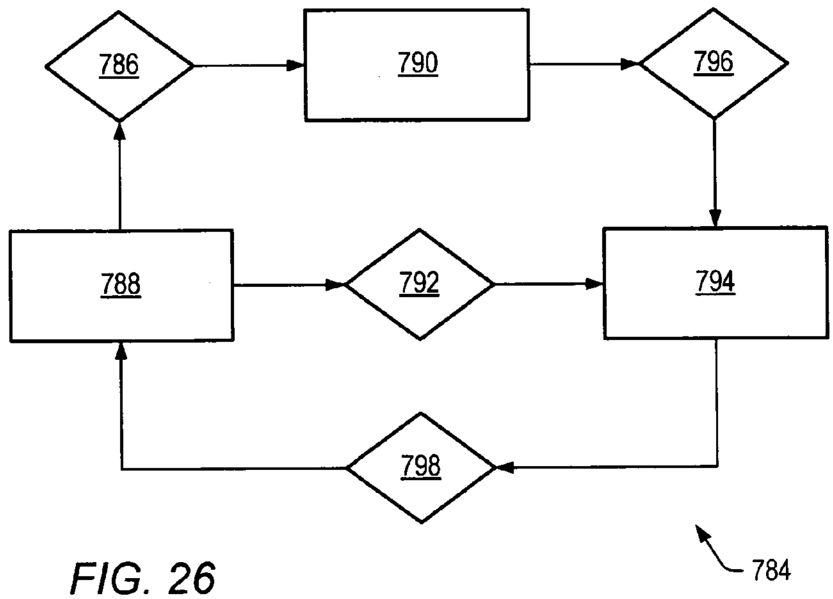
FIG. 26 illustrates a flow chart of an embodiment of a method for calibrating model parameters.

In certain embodiments, a simulation method based on a set of model parameters may be used to design an in situ process. A field test of an in situ process based on the design may be used to calibrate the model parameters. FIG. 26 illustrates a flowchart of an embodiment of method 784 for calibrating model parameters. Method 784 may include assessing at least one operating condition 786 of the in situ process using simulation method 788 based on one or more model parameters. Operating conditions may include pressure, temperature, heating rate, heat input rate, process time, weight percentage of gases, peripheral water recovery or injection. Operating conditions may also include characteristics of the well pattern such as producer well location, producer well orientation, ratio of producer wells to heater wells, heater well spacing, type of heater well pattern, heater well orientation, and distance between an overburden and horizontal heater wells. In one embodiment, at least one operating condition may be assessed such that the in situ process achieves at least one desired parameter.

In some embodiments, at least one operating condition 786 may be used in real in situ process 790. In an embodiment, the real in situ process may be a field test, or a field operation, operating with at least one operating condition. The real in situ process may have one or more real process characteristics 796. Simulation method 788 may assess one or more simulated process characteristics 792. In an embodiment, simulated process characteristics 792 may be compared 794 to real process characteristics 796. The one or more model parameters may be modified such that at least one simulated process characteristic 792 from a simulation of the in situ process matches or approximates at least one real process characteristic 796 from the in situ process. The in situ process may then be based on at least one operating condition. The method may further include assessing one or more modified simulated process characteristics based on the modified model parameters 798. In some embodiments, simulation method 788 may be used to control the in situ process such that the in situ process has at least one desired parameter.

In some situations, a first simulation method may be more effective than a second simulation method in assessing process characteristics under a first set of conditions. In other situations, the second simulation method may be more effective in assessing process characteristics under a second set of conditions. A first simulation method may include a body-fitted finite difference simulation method. A first set of conditions may include, for example, a relatively sharp interface in an in situ process. In an embodiment, a first simulation method may use a finer grid than a second simulation method. Thus, the first simulation method may be more effective in modeling a sharp interface. A sharp interface refers to a relatively large change in one or more process characteristics in a relatively small region in the formation. A sharp interface may include a relatively steep temperature gradient that may exist in a near wellbore region of a heater well. A relatively steep gradient in pressure and composition, due to pyrolysis, may also exist in the near wellbore region. A sharp interface may also be present at a combustion or reaction front as it propagates through a formation. A steep gradient in temperature, pressure, and composition may be present at a reaction front.

In certain embodiments, a second simulation method may include a space-fitted finite difference simulation method such as a reservoir simulation method. A second set of conditions may include conditions in which heat transfer by convection is significant. In addition, a second set of conditions may also include condensation of fluids in a formation.

Figure 27:
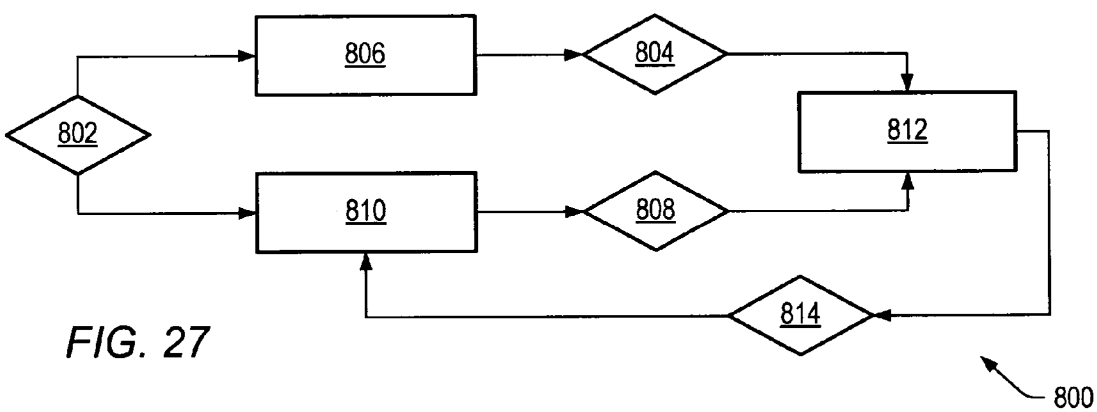
FIG. 27 illustrates a flow chart of an embodiment of a method for calibrating model parameters for a second simulation method using a simulation method.

In some embodiments, model parameters for the second simulation method may be calibrated such that the second simulation method effectively assesses process characteristics under both the first set and the second set of conditions. FIG. 27 illustrates a flowchart of an embodiment of method 800 for calibrating model parameters for a second simulation method using a first simulation method. Method 800 may include providing one or more model parameters 802 to a computer system. One or more first process characteristics 804 based on one or more model parameters 802 may be assessed using first simulation method 806 in memory on the computer system. First simulation method 806 may be a body-fitted finite difference simulation method. The model parameters may include relationships for the dependence of properties such as porosity, permeability, thermal conductivity, and heat capacity on the changes in conditions (e.g., temperature and pressure) in the formation. In addition, model parameters may include chemical components, the number and types of reactions in the formation, and kinetic parameters. Kinetic parameters may include the order of a reaction, activation energy, reaction enthalpy, and frequency factor. Process characteristics may include, but are not limited to, a temperature profile, pressure, composition of produced fluids, and a velocity of a reaction or combustion front.

In certain embodiments, one or more second process characteristics 808 based on one or more model parameters 802 may be assessed using second simulation method 810. Second simulation method 810 may be a space-fitted finite difference simulation method, such as a reservoir simulation method. One or more first process characteristics 804 may be compared 812 to one or more second process characteristics 808. The method may further include modifying one or more model parameters 802 such that at least one first process characteristic 804 matches or approximates at least one second process characteristic 808. For example, the order or the activation energy of the one or more chemical reactions may be modified to account for differences between the first and second process characteristics. In addition, a single reaction may be expressed as two or more reactions. In some embodiments, one or more third process characteristics based on the one or more modified model parameters 814 may be assessed using the second simulation method.

Figure 28:
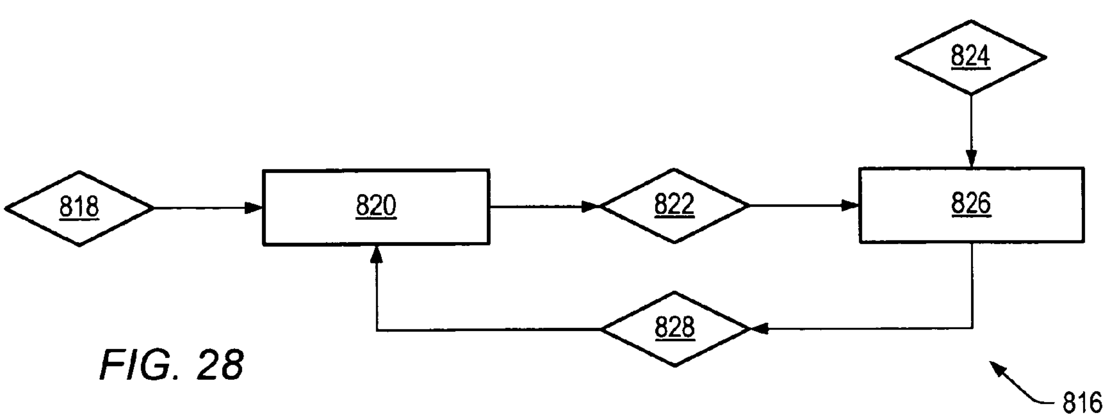
FIG. 28 illustrates a flow chart of an embodiment of a method for design and/or control of an in situ process.

In one embodiment, simulations of an in situ process for treating a hydrocarbon containing formation may be used to design and/or control a real in situ process. Design and/or control of an in situ process may include assessing at least one operating condition that achieves a desired parameter of the in situ process. FIG. 28 illustrates a flowchart of an embodiment of method 816 for the design and/or control of an in situ process. The method may include providing to the computer system one or more values of at least one operating condition 818 of the in situ process for use as input to simulation method 820. The simulation method may be a space-fitted finite difference simulation method such as a reservoir simulation method or it may be a body-fitted simulation method such as FLUENT. At least one operating condition may include, but is not limited to, pressure, temperature, heating rate, heat input rate, process time, weight percentage of gases, peripheral water recovery or injection, production rate, and time to reach a given production rate. In addition, operating conditions may include characteristics of the well pattern such as producer well location, producer well orientation, ratio of producer wells to heater wells, heater well spacing, type of heater well pattern, heater well orientation, and distance between an overburden and horizontal heater wells.

In one embodiment, the method may include assessing one or more values of at least one process characteristic 822 corresponding to one or more values of at least one operating condition 818 from one or more simulations using simulation method 820. In certain embodiments, a value of at least one process characteristic may include the process characteristic as a function of time. A desired value of at least one process characteristic 824 for the in situ process may also be provided to the computer system. An embodiment of the method may further include assessing 826 desired value of at least one operating condition 828 to achieve the desired value of at least one process characteristic 824. The desired value of at least one operating condition 828 may be assessed from the values of at least one process characteristic 822 and values of at least one operating condition 818. For example, desired value 828 may be obtained by interpolation of values 822 and values 818. In some embodiments, a value of at least one process characteristic may be assessed from the desired value of at least one operating condition 828 using simulation method 820. In some embodiments, an operating condition to achieve a desired parameter may be assessed by comparing a process characteristic as a function of time for different operating conditions. In an embodiment, the method may include operating the in situ system using the desired value of at least one additional operating condition.

In some embodiments, a desired value of at least one operating condition to achieve a desired value of at least one process characteristic may be assessed by using a relationship between at least one process characteristic and at least one operating condition of the in situ process. The relationship may be assessed from a simulation method. The relationship may be stored on a database accessible by the computer system. The relationship may include one or more values of at least one process characteristic and corresponding values of at least one operating condition. Alternatively, the relationship may be an analytical function.

In an embodiment, a desired process characteristic may be a selected composition of fluids produced from a formation. A selected composition may correspond to a ratio of non-condensable hydrocarbons to condensable hydrocarbons. In certain embodiments, increasing the pressure in the formation may increase the ratio of non-condensable hydrocarbons to condensable hydrocarbons of produced fluids. The pressure in the formation may be controlled by increasing the pressure at a production well in an in situ process. In some embodiments, other operating condition may be controlled simultaneously (e.g., the heat input rate).

In an embodiment, the pressure corresponding to the selected composition may be assessed from two or more simulations at two or more pressures. In one embodiment, at least one of the pressures of the simulations may be estimated from EQN. 32:

$$p = \exp^{\left[\frac{A}{T}+B\right]} \tag{32}$$

where p is measured in psia (pounds per square inch absolute), T is measured in Kelvin, and A and B are parameters dependent on the value of the desired process characteristic for a given type of formation. Values of A and B may be assessed from experimental data for a process characteristic in a given formation and may be used as input to EQN. 32. The pressure corresponding to the desired value of the process characteristic may then be estimated for use as input into a simulation.

The two or more simulations may provide a relationship between pressure and the composition of produced fluids. The pressure corresponding to the desired composition may be interpolated from the relationship. A simulation at the interpolated pressure may be performed to assess a composition and one or more additional process characteristics. The accuracy of the interpolated pressure may be assessed by comparing the selected composition with the composition from the simulation. The pressure at the production well may be set to the interpolated pressure to obtain produced fluids with the selected composition.

In certain embodiments, the pressure of a formation may be readily controlled at certain stages of an in situ process. At some stages of the in situ process, however, pressure control may be relatively difficult. For example, during a relatively short period of time after heating has begun, the permeability of the formation may be relatively low. At such early stages, the heat transfer front at which pyrolysis occurs may be at a relatively large distance from a producer well (i.e., the point at which pressure may be controlled). Therefore, there may be a significant pressure drop between the producer well and the heat transfer front. Consequently, adjusting the pressure at a producer well may have a relatively small influence on the pressure at which pyrolysis occurs at early stages of the in situ process. At later stages of the in situ process when permeability has developed relatively uniformly throughout the formation, the pressure of the producer well corresponds to the pressure in the formation. Therefore, the pressure at the producer well may be used to control the pressure at which pyrolysis occurs.

In some embodiments, a similar procedure may be followed to assess heater well pattern and producer well pattern characteristics that correspond to a desired process characteristic. For example, a relationship between the spacing of the heater wells and composition of produced fluids may be obtained from two or more simulations with different heater well spacings.

FIGS. 296-307 depict results of simulations of in situ treatment of tar sands formations. The simulations used EQN. 4 for modeling the permeability of the tar sand formation. EQNS. 5 or 6 were used for modeling the thermal conductivity. Chemical reactions in the formation were modeled with EQNS. 30 and 31. The heat injection rate was calculated using CFX. A constant heat input rate of about 1640 Watts/m was imposed at the casing interface. When the interface temperature reached about 760° C., the heat input rate was controlled to maintain the temperature of the interface at about 760° C. The approximate heat input rate to maintain the interface temperature at about 760° C. was used as input into STARS. STARS was then used to calculate the results in FIGS. 296-307.

The data from these simulations may be used to predict or assess operating conditions and/or process characteristics for in situ treatment of tar sands formations. Similar simulations may be used to predict or assess operating conditions and/or process characteristics for treatment of other hydrocarbon containing formations (e.g., coal or oil shale formations).

In one embodiment, a simulation method on a computer system may be used in a method for modeling one or more stages of a process for treating a hydrocarbon containing formation in situ. The simulation method may be, for example, a reservoir simulation method. The simulation method may simulate heating of the formation, fluid flow, mass transfer, heat transfer, and chemical reactions in one or more of the stages of the process. In some embodiments, the simulation method may also simulate removal of contaminants from the formation, recovery of heat from the formation, and injection of fluids into the formation.

Figure 29:
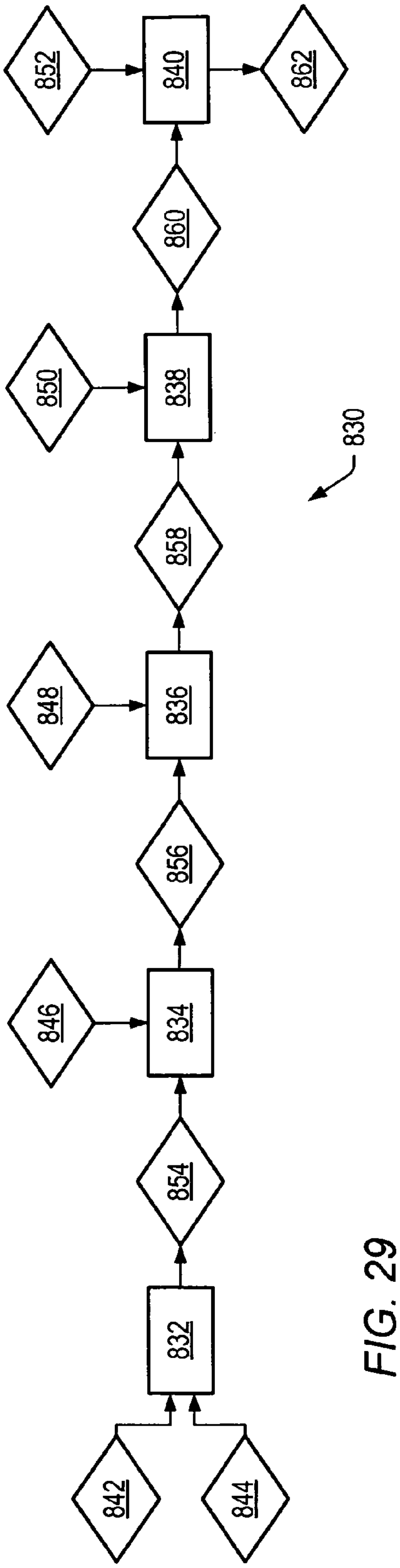
FIG. 29 depicts a method of modeling one or more stages of a treatment process.

Method 830 of modeling the one or more stages of a treatment process is depicted in a flowchart in FIG. 29. The one or more stages may include heating stage 832, pyrolyzation stage 834, synthesis gas generation stage 836, remediation stage 838, and/or shut-in stage 840. Method 830 may include providing at least one property 842 of the formation to the computer system. In addition, operating conditions 844, 846, 848, 850, and/or 852 for one or more of the stages of the in situ process may be provided to the computer system. Operating conditions may include, but not be limited to, pressure, temperature, heating rates, etc. In addition, operating conditions of a remediation stage may include a flow rate of ground water and injected water into the formation, size of treatment area, and type of drive fluid.

In certain embodiments, method 830 may include assessing process characteristics 854, 856, 858, 860, and/or 862 of the one or more stages using the simulation method. Process characteristics may include properties of a produced fluid such as API gravity and gas/oil ratio. Process characteristics may also include a pressure and temperature in the formation, total mass recovery from the formation, and production rate of fluid produced from the formation. In addition, a process characteristic of the remediation stage may include the type and concentration of contaminants remaining in the formation.

Figure 30:
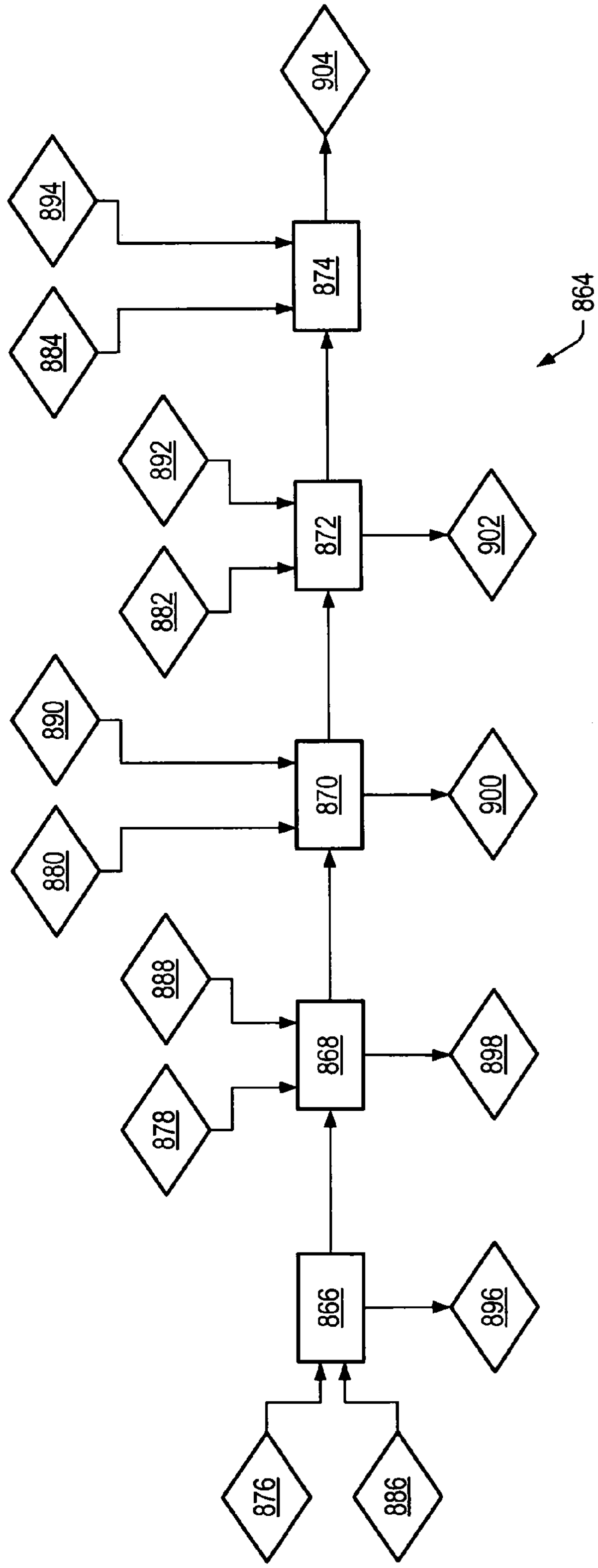
FIG. 30 illustrates a flow chart of an embodiment of a method for designing and controlling an in situ process with a simulation method on a computer system.

In one embodiment, a simulation method may be used to assess operating conditions of at least one of the stages of an in situ process that results in desired process characteristics. FIG. 30 illustrates a flowchart of an embodiment of method 864 for designing and controlling heating stage 866, pyrolyzation stage 868, synthesis gas generating stage 870, remediation stage 872, and/or shut-in stage 874 of an in situ process with a simulation method on a computer system. The method may include providing sets of operating conditions 876, 878, 880, 882, and/or 884 for at least one of the stages of the in situ process. In addition, desired process characteristics 886, 888, 890, 892, and/or 894 for at least one of the stages of the in situ process may also be provided. Method 864 may include assessing at least one additional operating condition 896, 898, 900, 902, and/or 904 for at least one of the stages that achieves the desired process characteristics of one or more stages.

In an embodiment, in situ treatment of a hydrocarbon containing formation may substantially change physical and mechanical properties of the formation. The physical and mechanical properties may be affected by chemical properties of a formation, operating conditions, and process characteristics.

Changes in physical and mechanical properties due to treatment of a formation may result in deformation of the formation. Deformation characteristics may include, but are not limited to, subsidence, compaction, heave, and shear deformation. Subsidence is a vertical decrease in the surface of a formation over a treated portion of a formation. Heave is a vertical increase at the surface above a treated portion of a formation. Surface displacement may result from several concurrent subsurface effects, such as the thermal expansion of layers of the formation, the compaction of the richest and weakest layers, and the constraining force exerted by cooler rock that surrounds the treated portion of the formation. In general, in the initial stages of heating a formation, the surface above the treated portion may show a heave due to thermal expansion of incompletely pyrolyzed formation material in the treated portion of the formation. As a significant portion of formation becomes pyrolyzed, the formation is weakened and pore pressure in the treated portion declines. The pore pressure is the pressure of the liquid and gas that exists in the pores of a formation. The pore pressure may be influenced by the thermal expansion of the organic matter in the formation and the withdrawal of fluids from the formation. The decrease in the pore pressure tends to increase the effective stress in the treated portion. Since the pore pressure affects the effective stress on the treated portion of a formation, pore pressure influences the extent of subsurface compaction in the formation. Compaction, another deformation characteristic, is a vertical decrease of a subsurface portion above or in the treated portion of the formation. In addition, shear deformation of layers both above and in the treated portion of the formation may also occur. In some embodiments, deformation may adversely affect the in situ treatment process. For example, deformation may seriously damage treatment facilities and wellbores.

In certain embodiments, an in situ treatment process may be designed and controlled such that the adverse influence of deformation is minimized or substantially eliminated. Computer simulation methods may be useful for design and control of an in situ process since simulation methods may predict deformation characteristics. For example, simulation methods may predict subsidence, compaction, heave, and shear deformation in a formation from a model of an in situ process. The models may include physical, mechanical, and chemical properties of a formation. Simulation methods may be used to study the influence of properties of a formation, operating conditions, and process characteristics on deformation characteristics of the formation.

Figure 31:
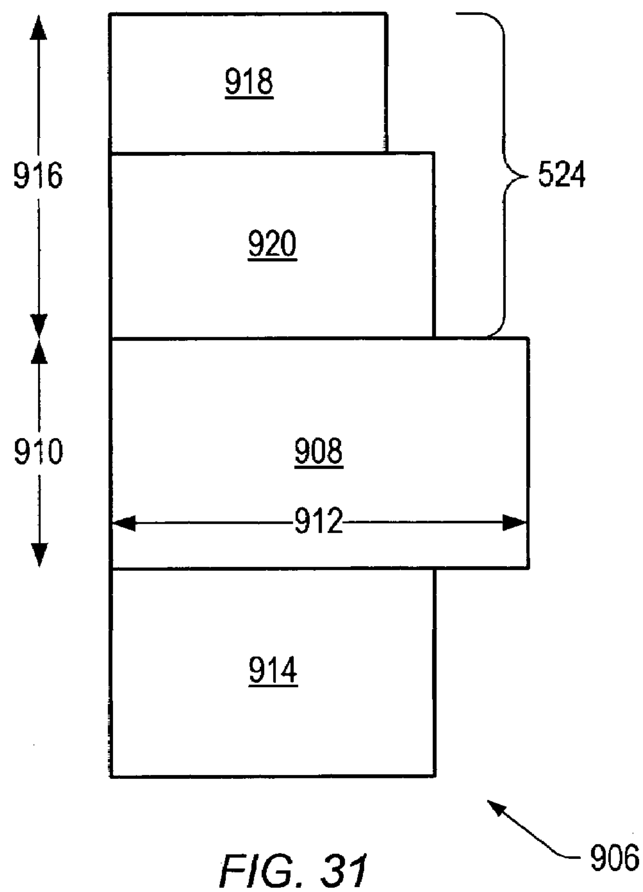
FIG. 31 illustrates a model of a formation that may be used in simulations of deformation characteristics according to one embodiment.

FIG. 31 illustrates model 906 of a formation that may be used in simulations of deformation characteristics according to one embodiment. The formation model is a vertical cross section that may include treated portions 908 with thickness 910 and width or radius 912. Treated portion 908 may include several layers or regions that vary in mineral composition and richness of organic matter. For example, in a model of an oil shale formation, treated portion 908 may include layers of lean kerogenous chalk, rich kerogenous chalk, and silicified kerogenous chalk. In one embodiment, treated portion 908 may be a dipping coal seam that is at an angle to the surface of the formation. Model 906 may include untreated portions such as overburden 524 and underburden 914. Overburden 524 may have thickness 916. Overburden 524 may also include one or more portions, for example, portion 918 and portion 920 that differ in composition. For example, portion 920 may have a composition similar to treated portion 908 prior to treatment. Portion 918 may be composed of organic material, soil, rock, etc. Underburden 914 may include barren rock. In some embodiments, underburden 914 may include some organic material.

Figure 32:
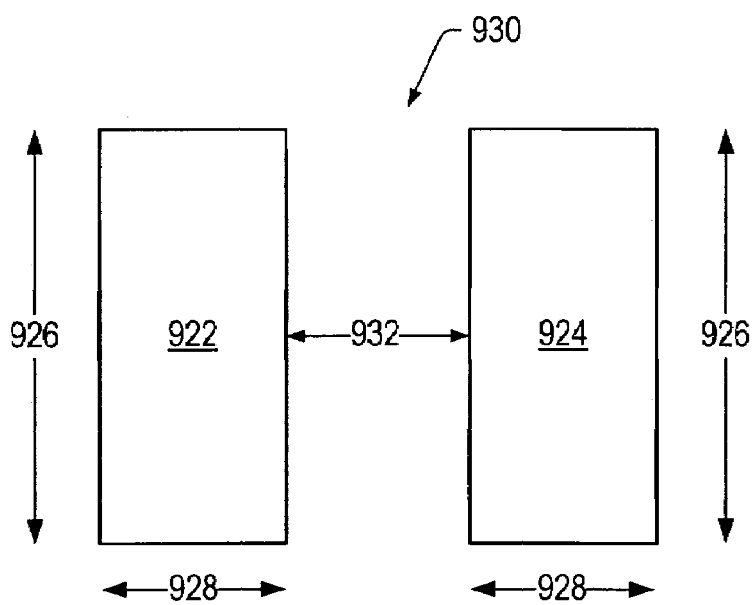
FIG. 32 illustrates a schematic of a strip development according to one embodiment.

In some embodiments, an in situ process may be designed such that it includes an untreated portion or strip between treated portions of the formation. FIG. 32 illustrates a schematic of a strip development according to one embodiment. The formation includes treated portion 922 and treated portion 924 with thicknesses 926 and widths 928 (thicknesses 926 and widths 928 may vary between portion 922 and portion 924). Untreated portion 930 with width 932 separates treated portion 922 from treated portion 924. In some embodiments, width 932 is substantially less than widths 928 since only smaller sections need to remain untreated to provide structural support. In some embodiments, the use of an untreated portion may decrease the amount of subsidence, heave, compaction, or shear deformation at and above the treated portions of the formation.

Figure 33:
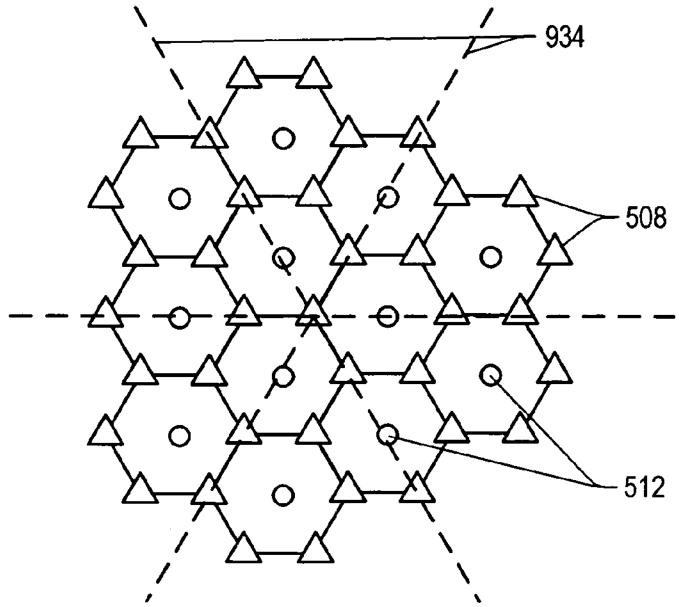
FIG. 33 depicts a schematic illustration of a treated portion that may be modeled with a simulation.

In an embodiment, an in situ treatment process may be represented by a three-dimensional model. FIG. 33 depicts a schematic illustration of a treated portion that may be modeled with a simulation. The treated portion includes a well pattern with heat sources 508 and production wells 512. Dashed lines 934 correspond to three planes of symmetry that may divide the pattern into six equivalent sections. Solid lines between heat sources 508 merely depict the pattern of heat sources (i.e., the solid lines do not represent actual equipment between the heat sources). In some embodiments, a geomechanical model of the pattern may include one of the six symmetry segments.

Figure 34:
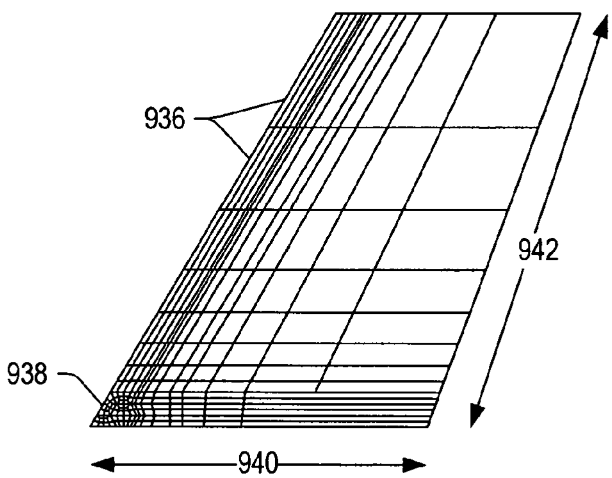
FIG. 34 depicts a horizontal cross section of a model of a formation for use by a simulation method according to one embodiment.

FIG. 34 depicts a cross section of a model of a formation for use by a simulation method according to one embodiment. The model includes grid elements 936. Treated portion 938 is located in the lower left corner of the model. Grid elements in the treated portion may be sufficiently small to take into account the large variations in conditions in the treated portion. In addition, distance 940 and distance 942 may be sufficiently large such that the deformation furthest from the treated portion is substantially negligible. Alternatively, a model may be approximated by a shape, such as a cylinder. The diameter and height of the cylinder may correspond to the size and height of the treated portion.

In certain embodiments, heat sources may be modeled by line sources that inject heat at a fixed rate. The heat sources may generate a reasonably accurate temperature distribution in the vicinity of the heat sources. Alternatively, a time-dependent temperature distribution may be imposed as an average boundary condition.

Figure 35:
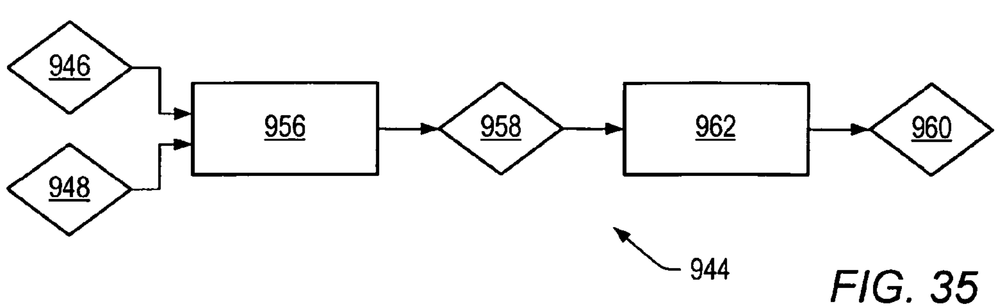
FIG. 35 illustrates a flow chart of an embodiment of a method for modeling deformation due to in situ treatment of a hydrocarbon containing formation.

FIG. 35 illustrates a flowchart of an embodiment of method 944 for modeling deformation due to in situ treatment of a hydrocarbon containing formation. The method may include providing at least one property 946 of the formation to a computer system. The formation may include a treated portion and an untreated portion. Properties may include, but are not limited to, mechanical, chemical, thermal, and physical properties of the portions of the formation. For example, the mechanical properties may include compressive strength, confining pressure, creep parameters, elastic modulus, Poisson's ratio, cohesion stress, friction angle, and cap eccentricity. Thermal and physical properties may include a coefficient of thermal expansion, volumetric heat capacity, and thermal conductivity. Properties may also include the porosity, permeability, saturation, compressibility, and density of the formation. Chemical properties may include, for example, the richness and/or organic content of the portions of the formation.

In addition, at least one operating condition 948 may be provided to the computer system. For instance, operating conditions may include, but are not limited to, pressure, temperature, process time, rate of pressure increase, heating rate, and characteristics of the well pattern. In addition, an operating condition may include the overburden thickness and thickness and width or radius of the treated portion of the formation. An operating condition may also include untreated portions between treated portions of the formation, along with the horizontal distance between treated portions of a formation.

In certain embodiments, the properties may include initial properties of the formation. Furthermore, the model may include relationships for the dependence of the mechanical, thermal, and physical properties on conditions such as temperature, pressure, and richness in the treated portions of the formation. For example, the compressive strength in the treated portion of the formation may be a function of richness, temperature, and pressure. The volumetric heat capacity may depend on the richness and the coefficient of thermal expansion may be a function of the temperature and richness. Additionally, the permeability, porosity, and density may be dependent upon the richness of the formation.

Figure 36:
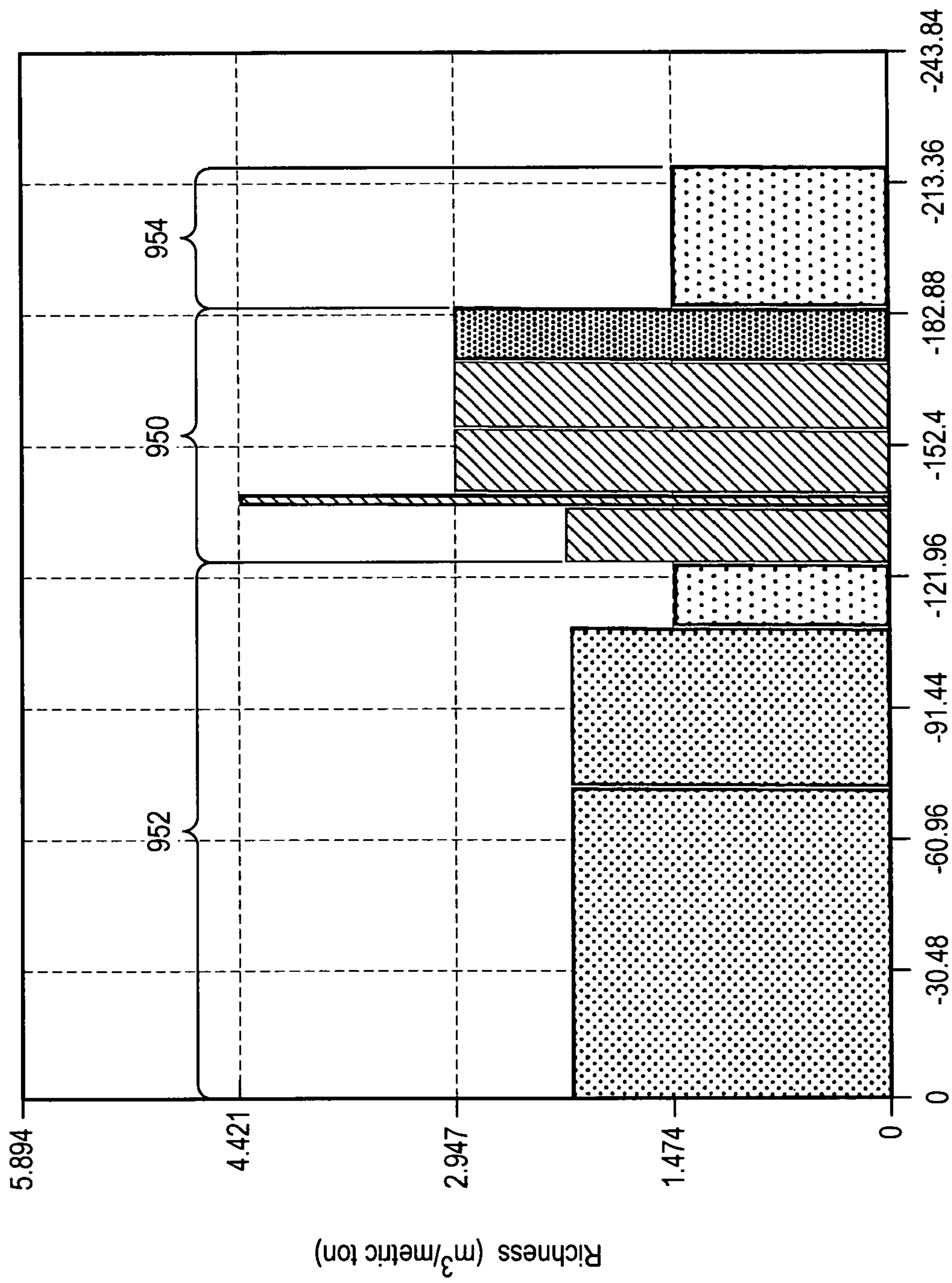
FIG. 36 depicts a profile of richness versus depth in a model of an oil shale formation.

In some embodiments, physical and mechanical properties for a model of a formation may be assessed from samples extracted from a geological formation targeted for treatment. Properties of the samples may be measured at various temperatures and pressures. For example, mechanical properties may be measured using uniaxial, triaxial, and creep experiments. In addition, chemical properties (e.g., richness) of the samples may also be measured. Richness of the samples may be measured by the Fischer Assay method. The dependence of properties on temperature, pressure, and richness may then be assessed from the measurements. In certain embodiments, the properties may be mapped on to a model using known sample locations. For instance, FIG. 36 depicts a profile of richness versus depth in a model of an oil shale formation. The treated portion is represented by region 950. The overburden 524 and underburden 914 (as shown in FIG. 31) of the formation are represented by region 952 and region 954, respectively. Richness is measured in $m^3$ of kerogen per metric ton of oil shale.

In certain embodiments, assessing deformation using a simulation method may require a material or constitutive model. A constitutive model relates the stress in the formation to the strain or displacement. Mechanical properties may be entered into a suitable constitutive model to calculate the deformation of the formation. In some embodiments, the Drucker-Prager-with-cap material model may be used to model the time-independent deformation of the formation.

In an embodiment, the time-dependent creep or secondary creep strain of the formation may also be modeled. For example, the time-dependent creep in a formation may be modeled with a power law in EQN. 33:

$$\in = C \times (\sigma_1 - \sigma_3)^D \times t \qquad (33)$$

where $\in$ is the secondary creep strain, C is a creep multiplier, $\sigma_1$ is the axial stress, $\sigma_3$ is the confining pressure, D is a stress exponent, and t is the time. The values of C and D may be obtained from fitting experimental data. In one embodiment, the creep rate may be expressed by EQN. 34:

$$d\in/dt = A \times (\sigma_1/\sigma_u)^D \qquad (34)$$

where A is a multiplier obtained from fitting experimental data and $\sigma_u$ is the ultimate strength in uniaxial compression.

Method 944 shown in FIG. 35 may include assessing 956 at least one process characteristic 958 of the treated portion of the formation. At least one process characteristic 958 may be, but is not limited to, a pore pressure distribution, a heat input rate, or a time dependent temperature distribution in the treated portion of the formation.

At least one process characteristic may be assessed by a simulation method. For example, a heat input rate may be estimated using a body-fitted finite difference simulation package such as FLUENT. Similarly, the pore pressure distribution may be assessed from a space-fitted or body-fitted simulation method such as STARS. In other embodiments, the pore pressure may be assessed by a finite element simulation method such as ABAQUS. The finite element simulation method may employ line sinks of fluid to simulate the performance of production wells.

Alternatively, process characteristics such as temperature distribution and pore pressure distribution may be approximated by other means. For example, the temperature distribution may be imposed as an average boundary condition in the calculation of deformation characteristics. The temperature distribution may be estimated from results of detailed calculations of a heating rate of a formation. For example, a treated portion may be heated to a pyrolyzation temperature for a specified period of time by heat sources and the temperature distribution assessed during heating of the treated portion. In an embodiment, the heat sources may be uniformly distributed and inject a constant amount of heat. The temperature distribution inside most of the treated portion may be substantially uniform during the specified period of time. Some heat may be allowed to diffuse from the treated portion into the overburden, base rock, and lateral rock. The treated portion may be maintained at a selected temperature for a selected period of time after the specified period of time by injecting heat from the heat sources as needed.

Similarly, the pore pressure distribution may also be imposed as an average boundary condition. The initial pore pressure distribution may be assumed to be lithostatic. The pore pressure distribution may then be gradually reduced to a selected pressure during the remainder of the simulation of the deformation characteristics.

In some embodiments, method 944 may include assessing at least one deformation characteristic 960 of the formation using simulation method 962 on the computer system as a function of time. In some embodiments, at least one deformation characteristic may be assessed from at least one property 946, at least one process characteristic 958, and at least one operating condition 948. In some embodiments, process characteristic 958 may be assessed by a simulation or process characteristic 958 may be measured. Deformation characteristics may include, but are not limited to, subsidence, compaction, heave, and shear deformation in the formation.

Simulation method 962 may be a finite element simulation method for calculating elastic, plastic, and time dependent behavior of materials. For example, ABAQUS is a commercially available finite element simulation method from Hibbitt, Karlsson & Sorensen, Inc. located in Pawtucket, R.I. ABAQUS is capable of describing the elastic, plastic, and time dependent (creep) behavior of a broad class of materials such as mineral matter, soils, and metals. In general, ABAQUS may treat materials whose properties may be specified by user-defined constitutive laws. ABAQUS may also calculate heat transfer and treat the effect of pore pressure variations on rock deformation.

Figure 37:
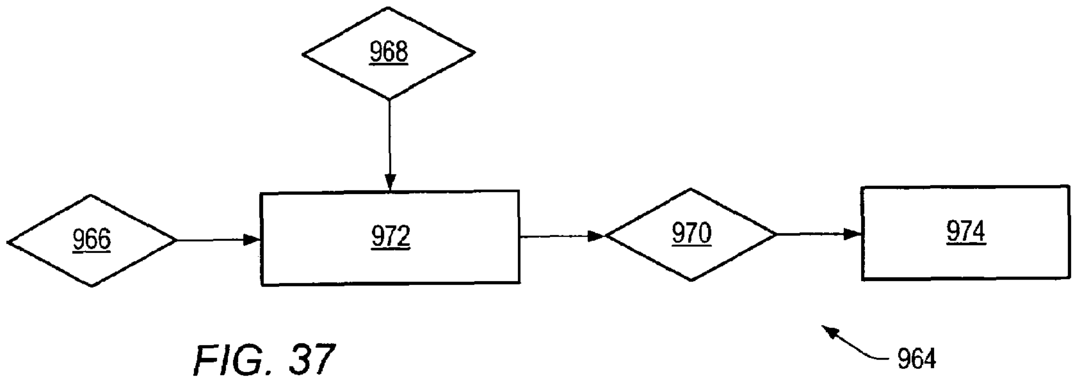
FIG. 37 illustrates a flow chart of an embodiment of a method for using a computer system to design and control an in situ conversion process.

Computer simulations may be used to assess operating conditions of an in situ process in a formation that may result in desired deformation characteristics. FIG. 37 illustrates a flowchart of an embodiment of method 964 for designing and controlling an in situ process using a computer system. The method may include providing to the computer system at least one set of operating conditions 966 for the in situ process. For instance, operating conditions may include pressure, temperature, process time, rate of pressure increase, heating rate, characteristics of the well pattern, the overburden thickness, thickness and width of the treated portion of the formation and/or untreated portions between treated portions of the formation, and the horizontal distance between treated portions of a formation.

In addition, at least one desired deformation characteristic 968 for the in situ process may be provided to the computer system. The desired deformation characteristic may be a selected subsidence, selected heave, selected compaction, or selected shear deformation. In some embodiments, at least one additional operating condition 970 may be assessed using simulation method 972 that achieves at least one desired deformation characteristic 968. A desired deformation characteristic may be a value that does not adversely affect the operation of an in situ process. For example, a minimum overburden necessary to achieve a desired maximum value of subsidence may be assessed. In an embodiment, at least one additional operating condition 970 may be used to operate in situ process 974.

Figure 38:
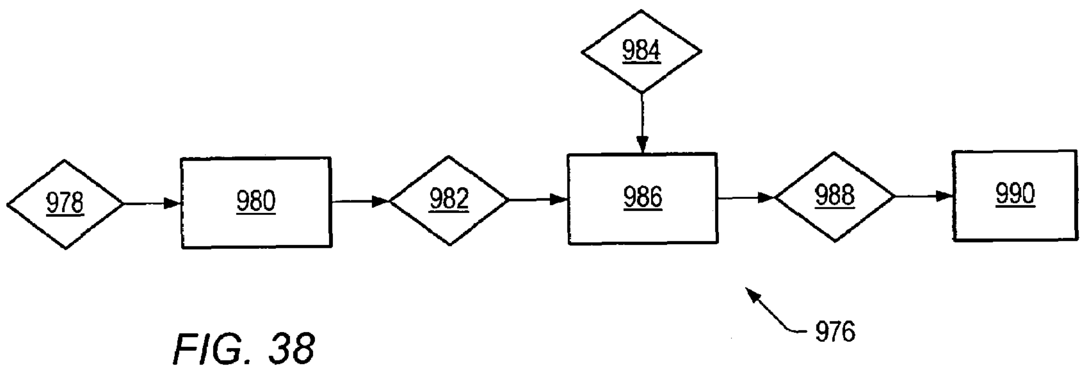
FIG. 38 illustrates a flow chart of an embodiment of a method for determining operating conditions to obtain desired deformation characteristics.

In an embodiment, operating conditions to obtain desired deformation characteristics may be assessed from simulations of an in situ process based on multiple operating conditions. FIG. 38 illustrates a flowchart of an embodiment of method 976 for assessing operating conditions to obtain desired deformation characteristics. The method may include providing one or more values of at least one operating condition 978 to a computer system for use as input to simulation method 980. The simulation method may be a finite element simulation method for calculating elastic, plastic, and creep behavior.

In some embodiments, method 976 may include assessing one or more values of deformation characteristics 982 using simulation method 980 based on the one or more values of at least one operating condition 978. In one embodiment, a value of at least one deformation characteristic may include the deformation characteristic as a function of time. A desired value of at least one deformation characteristic 984 for the in situ process may also be provided to the computer system. An embodiment of the method may include assessing 986 desired value of at least one operating condition 988 to achieve desired value of at least one deformation characteristic 984.

Desired value of at least one operating condition 988 may be assessed from the values of at least one deformation characteristic 982 and the values of at least one operating condition 978. For example, desired value 988 may be obtained by interpolation of values 982 and values 978. In some embodiments, a value of at least one deformation characteristic may be assessed 990 from the desired value of at least one operating condition 988 using simulation method 980. In some embodiments, an operating condition to achieve a desired deformation characteristic may be assessed by comparing a deformation characteristic as a function of time for different operating conditions.

In some embodiments, a desired value of at least one operating condition to achieve the desired value of at least one deformation characteristic may be assessed using a relationship between at least one deformation characteristic and at least one operating condition of the in situ process. The relationship may be assessed using a simulation method. Such relationship may be stored on a database accessible by the computer system. The relationship may include one or more values of at least one deformation characteristic and corresponding values of at least one operating condition. Alternatively, the relationship may be an analytical function.

Figure 39:
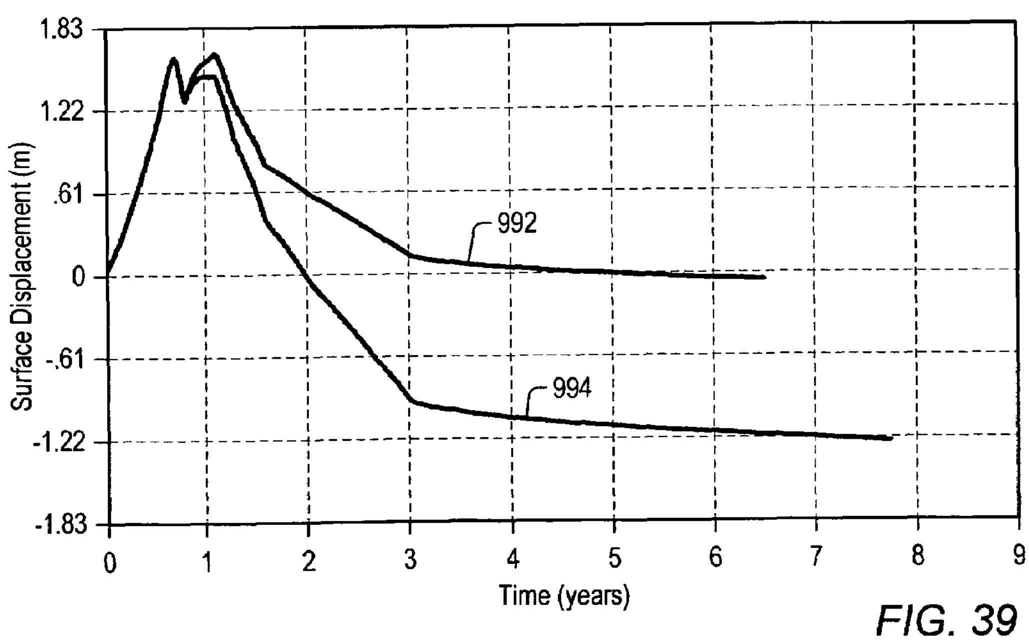
FIG. 39 illustrates the influence of operating pressure on subsidence in a cylindrical model of a formation from a finite element simulation.

Simulations have been used to investigate the effect of various operating conditions on the deformation characteristics of an oil shale formation. In one set of simulations, the formation was modeled as either a cylinder or a rectangular slab. In the case of a cylinder, the model of the formation is described by a thickness of the treated portion, a radius, and a thickness of the overburden. The rectangular slab is described by a width rather than a radius and by a thickness of the treated section and overburden. FIG. 39 illustrates the influence of operating pressure on subsidence in a cylindrical model of a formation from a finite element simulation. The thickness of the treated portion is 189 m, the radius of the treated portion is 305 m, and the overburden thickness is 201 m. FIG. 39 shows the vertical surface displacement in meters over a period of years. Curve 992 corresponds to an operating pressure of 27.6 bars absolute and curve 994 to an operating pressure of 6.9 bars absolute. It is to be understood that the surface displacements set forth in FIG. 39 are only illustrative (actual surface displacements will generally differ from those shown in FIG. 39). FIG. 39 demonstrates, however, that increasing the operating pressure may substantially reduce subsidence.

Figure 40:
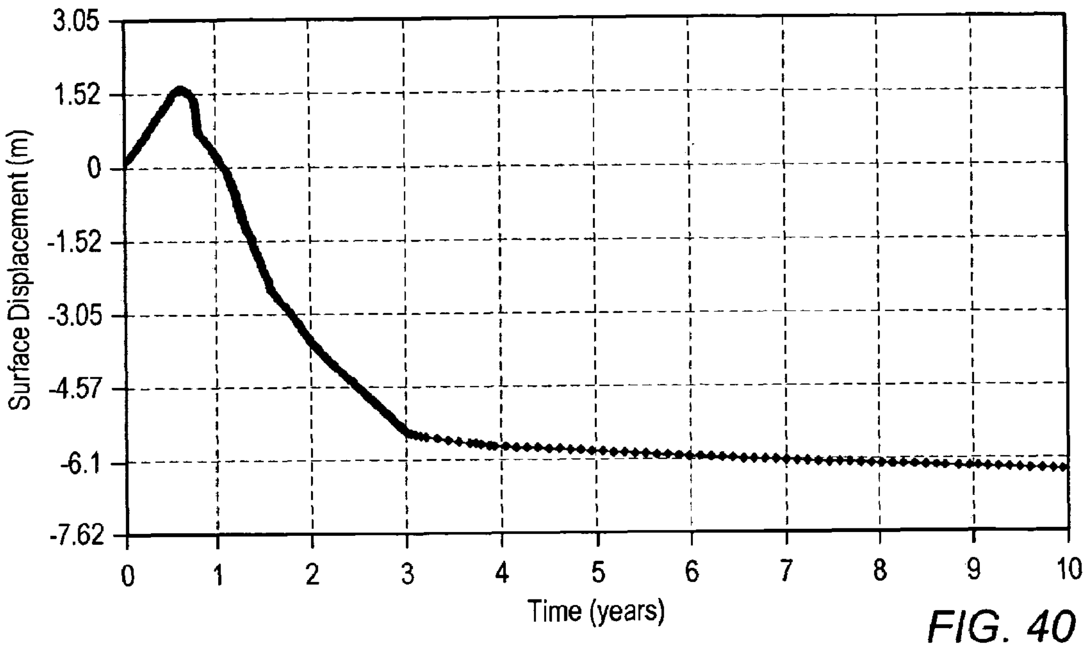
FIG. 40 illustrates the influence of an untreated portion between two treated portions.
Figure 41:
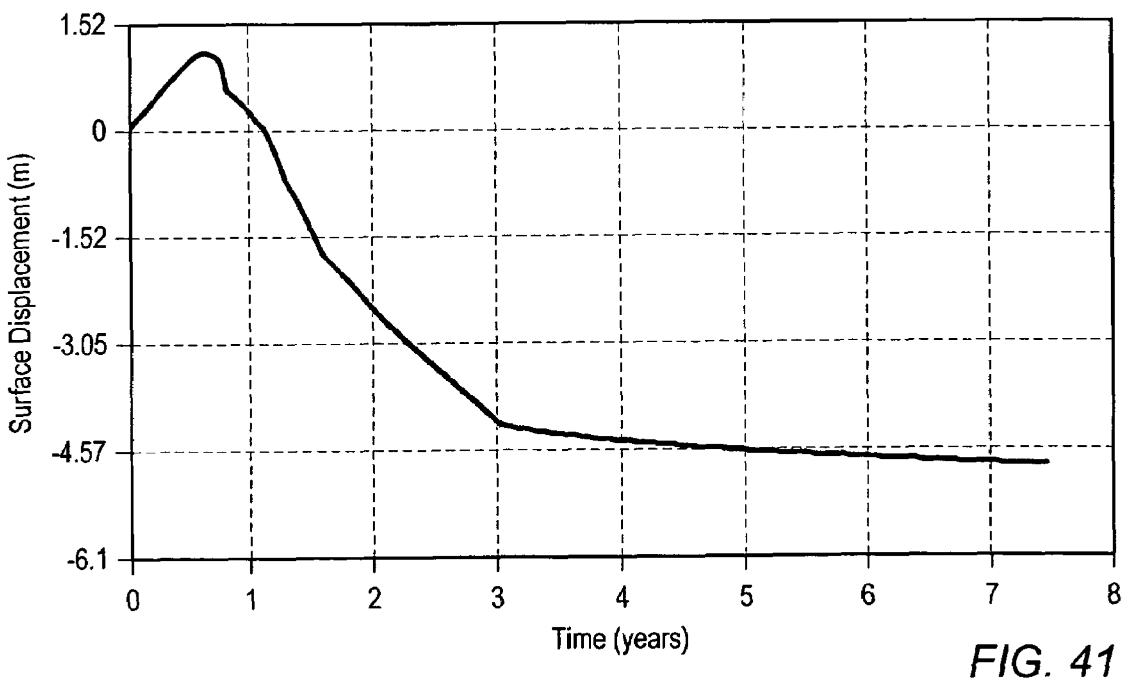
FIG. 41 illustrates the influence of an untreated portion between two treated portions.

FIGS. 40 and 41 illustrate the influence of the use of an untreated portion between two treated portions. FIG. 40 is the subsidence in a rectangular slab model with a treated portion thickness of 189 m, treated portion width of 649 m, and overburden thickness of 201 m. FIG. 41 represents the subsidence in a rectangular slab model with two treated portions separated by an untreated portion, as pictured in FIG. 32. The thickness of the treated portion and the overburden are the same as the model corresponding to FIG. 40. The width of each treated portion is one half of the width of the treated portion of the model in FIG. 40. Therefore, the total width of the treated portions is the same for each model. The operating pressure in each case is 6.9 bars absolute. As with FIG. 39, the surface displacements in FIGS. 40 and 41 are only illustrative. A comparison of FIGS. 40 and 41, however, shows that the use of an untreated portion reduces the subsidence by about 25%. In addition, the initial heave is also reduced.

Figure 42:
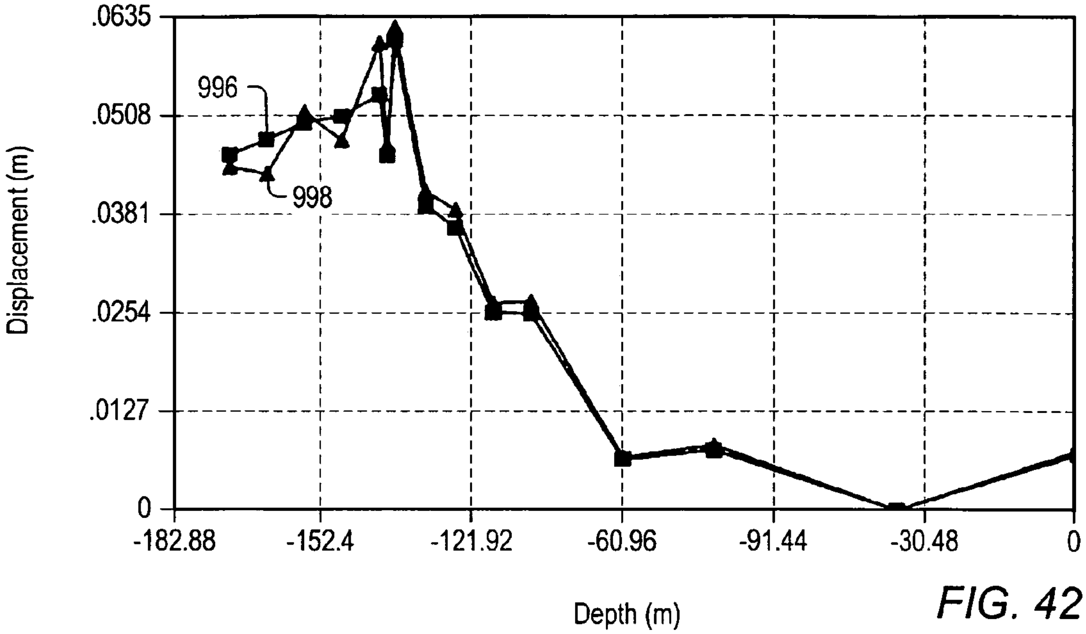
FIG. 42 represents shear deformation of a formation at the location of selected heat sources as a function of depth.

In another set of simulations, the calculation of the shear deformation in a treated oil shale formation was demonstrated. The model included a symmetry element of a pattern of heat sources and producer wells. Boundary conditions imposed in the model were such that the vertical planes bounding the formation were symmetry planes. FIG. 42 represents the shear deformation of the formation at the location of selected heat sources as a function of depth. Curve 996 and curve 998 represent the shear deformation as a function of depth at 10 months and 12 months, respectively. The curves, which correspond to the predicted shape of the heater wells, show that shear deformation increases with depth in the formation.

Figure 43:
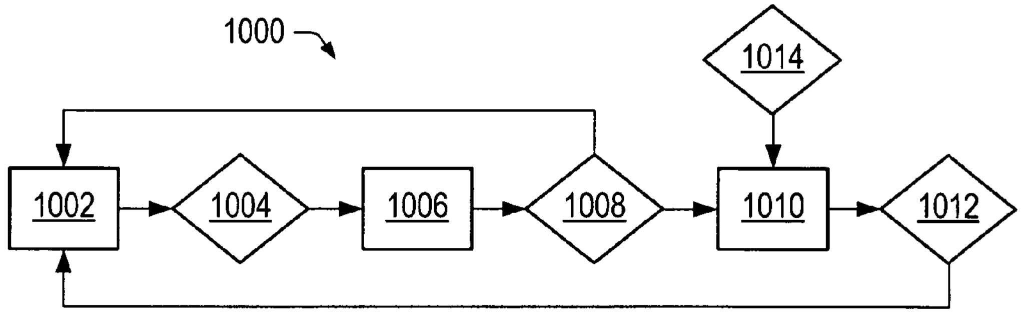
FIG. 43 illustrates a method for controlling an in situ process using a computer system.

In certain embodiments, a computer system may be used to operate an in situ process for treating a hydrocarbon containing formation. The in situ process may include providing heat from one or more heat sources to at least one portion of the formation. The heat may transfer from the one or more heat sources to a selected section of the formation. FIG. 43 illustrates method 1000 for operating an in situ process using a computer system. Method 1000 may include operating in situ process 1002 using one or more operating parameters. Operating parameters may include, but are not limited to, properties of the formation, such as heat capacity, density, permeability, thermal conductivity, porosity, and/or chemical reaction data. In addition, operating parameters may include operating conditions. Operating conditions may include, but are not limited to, thickness and area of heated portion of the formation, pressure, temperature, heating rate, heat input rate, process time, production rate, time to obtain a given production rate, weight percentage of gases, and/or peripheral water recovery or injection. Operating conditions may also include characteristics of the well pattern such as producer well location, producer well orientation, ratio of producer wells to heater wells, heater well spacing, type of heater well pattern, heater well orientation, and/or distance between an overburden and horizontal heater wells. Operating parameters may also include mechanical properties of the formation. Operating parameters may include deformation characteristics, such as fracture, strain, subsidence, heave, compaction, and/or shear deformation.

In certain embodiments, at least one operating parameter 1004 of in situ process 1002 may be provided to computer system 1006. Computer system 1006 may be at or near in situ process 1002. Alternatively, computer system 1006 may be at a location remote from in situ process 1002. The computer system may include a first simulation method for simulating a model of in situ process 1002. In one embodiment, the first simulation method may include method 722 illustrated in FIG. 20, method 734 illustrated in FIG. 22, method 752 illustrated in FIG. 24, method 768 illustrated in FIG. 25, method 784 illustrated in FIG. 26, method 800 illustrated in FIG. 27, and/or method 816 illustrated in FIG. 28. The first simulation method may include a body-fitted finite difference simulation method such as FLUENT or space-fitted finite difference simulation method such as STARS. The first simulation method may perform a reservoir simulation. A reservoir simulation method may be used to determine operating parameters including, but not limited to, pressure, temperature, heating rate, heat input rate, process time, production rate, time to obtain a given production rate, weight percentage of gases, and peripheral water recovery or injection.

In an embodiment, the first simulation method may also calculate deformation in a formation. A simulation method for calculating deformation characteristics may include a finite element simulation method such as ABAQUS. The first simulation method may calculate fracture progression, strain, subsidence, heave, compaction, and shear deformation. A simulation method used for calculating deformation characteristics may include method 944 illustrated in FIG. 35 and/or method 976 illustrated in FIG. 38.

Method 1000 may include using at least one parameter 1004 with a first simulation method and the computer system to provide assessed information 1008 about in situ process 1002. Operating parameters from the simulation may be compared to operating parameters of in situ process 1002. Assessed information from a simulation may include a simulated relationship between one or more operating parameters with at least one parameter 1004. For example, the assessed information may include a relationship between operating parameters such as pressure, temperature, heating input rate, or heating rate and operating parameters relating to product quality.

In some embodiments, assessed information may include inconsistencies between operating parameters from simulation and operating parameters from in situ process 1002. For example, the temperature, pressure, product quality, or production rate from the first simulation method may differ from in situ process 1002. The source of the inconsistencies may be assessed from the operating parameters provided by simulation. The source of the inconsistencies may include differences between certain properties used in a simulated model of in situ process 1002 and in situ process 1002. Certain properties may include, but are not limited to, thermal conductivity, heat capacity, density, permeability, or chemical reaction data. Certain properties may also include mechanical properties such as compressive strength, confining pressure, creep parameters, elastic modulus, Poisson's ratio, cohesion stress, friction angle, and cap eccentricity.

In one embodiment, assessed information may include adjustments in one or more operating parameters of in situ process 1002. The adjustments may compensate for inconsistencies between simulated operating parameters and operating parameters from in situ process 1002. Adjustments may be assessed from a simulated relationship between at least one parameter 1004 and one or more operating parameters.

For example, an in situ process may have a particular hydrocarbon fluid production rate, e.g., I $m^3$/day, after a particular period of time (e.g., 90 days). A theoretical temperature at an observation well (e.g., 100° C.) may be calculated using given properties of the formation. However, a measured temperature at an observation well (e.g., 80° C.) may be lower than the theoretical temperature. A simulation on a computer system may be performed using the measured temperature. The simulation may provide operating parameters of the in situ process that correspond to the measured temperature. The operating parameters from simulation may be used to assess a relationship between, for example, temperature or heat input rate and the production rate of the in situ process. The relationship may indicate that the heat capacity or thermal conductivity of the formation used in the simulation is inconsistent with the formation.

In some embodiments, method 1000 may further include using assessed information 1008 to operate in situ process 1002. As used herein, "operate" refers to controlling or changing operating conditions of an in situ process. For example, the assessed information may indicate that the thermal conductivity of the formation in the above example is lower than the thermal conductivity used in the simulation. Therefore, the heat input rate to in situ process 1002 may be increased to operate at the theoretical temperature.

In some embodiments, method 1000 may include obtaining 1010 information 1012 from a second simulation method and the computer system using assessed information 1008 and desired parameter 1014. In one embodiment, the first simulation method may be the same as the second simulation method. In another embodiment, the first and second simulation methods may be different. Simulations may provide a relationship between at least one operating parameter and at least one other parameter. Additionally, obtained information 1012 may be used to operate in situ process 1002.

Obtained information 1012 may include at least one operating parameter for use in the in situ process that achieves the desired parameter. In one embodiment, simulation method 816 illustrated in FIG. 28 may be used to obtain at least one operating parameter that achieves the desired parameter. For example, a desired hydrocarbon fluid production rate for an in situ process may be 6 $m^3$/day. One or more simulations may be used to determine the operating parameters necessary to achieve a hydrocarbon fluid production rate of 6 $m^3$/day. In some embodiments, model parameters used by simulation method 816 may be calibrated to account for differences observed between simulations and in situ process 1002. In one embodiment, simulation method 768 illustrated in FIG. 25 may be used to calibrate model parameters. In another embodiment, simulation method 976 illustrated in FIG. 38 may be used to obtain at least one operating parameter that achieves a desired deformation characteristic.

Figure 44:
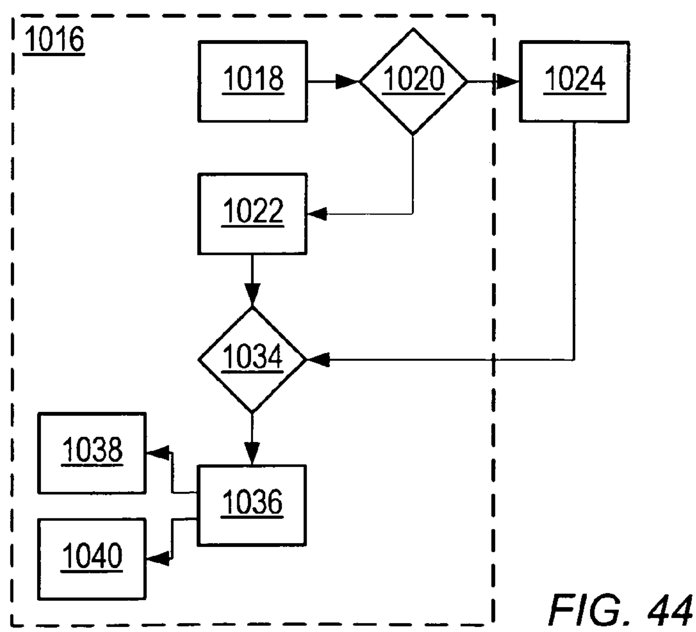
FIG. 44 illustrates a schematic of an embodiment for controlling an in situ process in a formation using a computer simulation method.

FIG. 44 illustrates a schematic of an embodiment for controlling in situ process 1016 in a formation using a computer simulation method. In situ process 1016 may include sensor 1018 for monitoring operating parameters. Sensor 1018 may be located in a barrier well, a monitoring well, a production well, or a heater well. Sensor 1018 may monitor operating parameters such as subsurface and surface conditions in the formation. Subsurface conditions may include pressure, temperature, product quality, and deformation characteristics, such as fracture progression. Sensor 1018 may also monitor surface data such as pump status (i.e., on or off), fluid flow rate, surface pressure/temperature, and heater power. The surface data may be monitored with instruments placed at a well.

Figure 45:
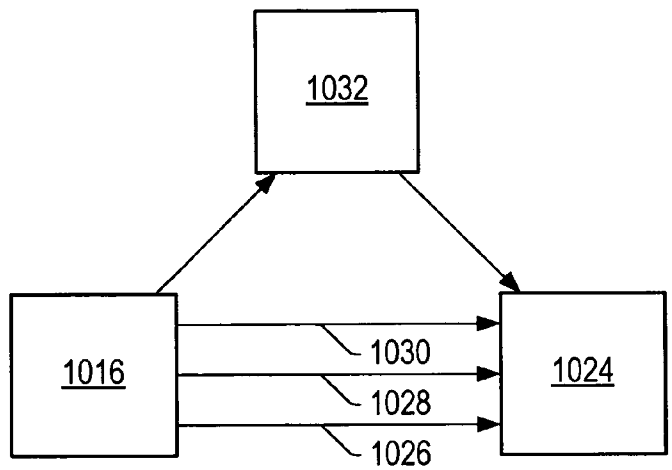
FIG. 45 illustrates several ways that information may be transmitted from an in situ process to a remote computer system.

At least one operating parameter 1020 measured by sensor 1018 may be provided to local computer system 1022. In some embodiments, operating parameter 1020 may be provided to remote computer system 1024. Computer system 1024 may be, for example, a personal desktop computer system, a laptop, or personal digital assistant such as a palm pilot. FIG. 45 illustrates several ways that information may be transmitted from in situ process 1016 to remote computer system 1024. Information may be transmitted by means of internet 1026 or local area network, hardwire telephone lines 1028, and/or wireless communications 1030. Wireless communications 1030 may include transmission via satellite 1032. Information may be received at an in situ process site by internet or local area network, hardwire telephone lines, wireless communications, and/or satellite communication systems.

As shown in FIG. 44, operating parameter 1020 may be provided to computer system 1022 or 1024 automatically during the treatment of a formation. Computer systems 1024, 1022 may include a simulation method for simulating a model of the in situ treatment process 1016. The simulation method may be used to obtain information 1034 about the in situ process.

In an embodiment, a simulation of in situ process 1016 may be performed manually at a desired time. Alternatively, a simulation may be performed automatically when a desired condition is met. For instance, a simulation may be performed when one or more operating parameters reach, or fail to reach, a particular value at a particular time. For example, a simulation may be performed when the production rate fails to reach a particular value at a particular time.

In some embodiments, information 1034 relating to in situ process 1016 may be provided automatically by computer system 1024 or 1022 for use in controlling in situ process 1016. Information 1034 may include instructions relating to control of in situ process 1016. Information 1034 may be transmitted from computer system 1024 via internet, hardwire, wireless, or satellite transmission. Information 1034 may be provided to computer system 1036. Computer system 1036 may also be at a location remote from the in situ process. Computer system 1036 may process information 1034 for use in controlling in situ process 1016. For example, computer system 1036 may use information 1034 to determine adjustments in one or more operating parameters. Computer system 1036 may then automatically adjust 1038 one or more operating parameters of in situ process 1016. Alternatively, one or more operating parameters of in situ process 1016 may be displayed and/or manually adjusted 1040.

Figure 46:
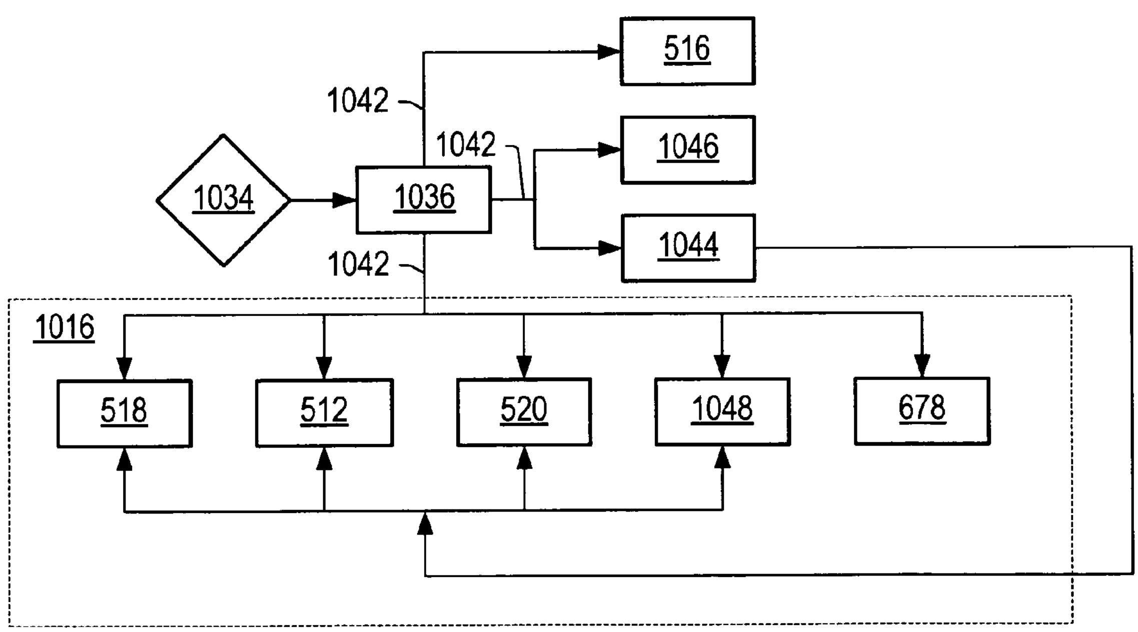
FIG. 46 illustrates a schematic of an embodiment for controlling an in situ process in a formation using information.

FIG. 46 illustrates a schematic of an embodiment for controlling in situ process 1016 in a formation using information 1034. Information 1034 may be obtained using a simulation method and a computer system. Information 1034 may be provided to computer system 1036. Information 1034 may include information that relates to adjusting one or more operating parameters. Output 1042 from computer system 1036 may be provided to display 1044, data storage 1046, or treatment facility 516. Output 1042 may also be used to automatically control conditions in the formation by adjusting one or more operating parameters. Output 1042 may include instructions to adjust pump status and/or flow rate at a barrier well 518, instructions to control flow rate at a production well 512, and/or adjust the heater power at a heater well 520. Output 1042 may also include instructions to heating pattern 1048 of in situ process 1016. For example, an instruction may be to add one or more heater wells at particular locations. In addition, output 1042 may include instructions to shut-in formation 678.

In some embodiments, output 1042 may be viewed by operators of the in situ process on display 1044. The operators may then use output 1042 to manually adjust one or more operating parameters.

Figure 47:
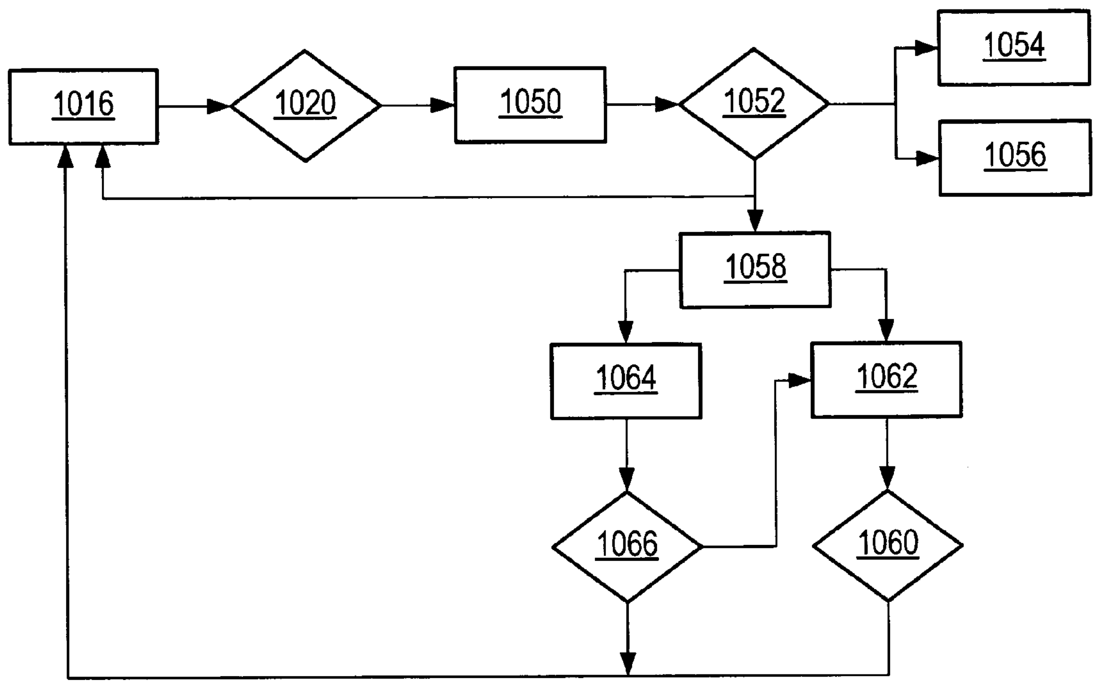
FIG. 47 illustrates a schematic of an embodiment for controlling an in situ process in a formation using a simulation method and a computer system.

FIG. 47 illustrates a schematic of an embodiment for controlling in situ process 1016 in a formation using a simulation method and a computer system. At least one operating parameter 1020 from in situ process 1016 may be provided to computer system 1050. Computer system 1050 may include a simulation method for simulating a model of in situ process 1016. Computer system 1050 may use the simulation method to obtain information 1052 about in situ process 1016. Information 1052 may be provided to data storage 1054, display 1056, and/or analyzer 1058. In an embodiment, information 1052 may be automatically provided to in situ process 1016. Information 1052 may then be used to operate in situ process 1016.

Analyzer 1058 may include review and organize information 1052 and/or use of the information to operate in situ process 1016. Analyzer 1058 may obtain additional information 1060 from one or more simulations 1062 of in situ process 1016. One or more simulations may be used to obtain additional or modified model parameters of in situ process 1016. The additional or modified model parameters may be used to further assess in situ process 1016. Simulation method 768 illustrated in FIG. 25 may be used to determine additional or modified model parameters. Method 768 may use at least one operating parameter 1020 and information 1052 to calibrate model parameters. For example, at least one operating parameter 1020 may be compared to at least one simulated operating parameter. Model parameters may be modified such that at least one simulated operating parameter matches or approximates at least one operating parameter 1020.

In an embodiment, analyzer 1058 may obtain 1064 additional information 1066 about properties of in situ process 1016. Properties may include, for example, thermal conductivity, heat capacity, porosity, or permeability of one or more portions of the formation. Properties may also include chemical reaction data such as chemical reactions, chemical components, and chemical reaction parameters. Properties may be obtained from the literature, or from field or laboratory experiments. For example, properties of core samples of the treated formation may be measured in a laboratory. Additional information 1066 may be used to operate in situ process 1016. Alternatively, additional information 1066 may be used in one or more simulations 1062 to obtain additional information 1060. For example, additional information 1060 may include one or more operating parameters that may be used to operate in situ process 1016. In one embodiment, method 816 illustrated in FIG. 28 may be used to determine operating parameters to achieve a desired parameter. The operating parameters may then be used to operate in situ process 1016.

An in situ process for treating a formation may include treating a selected section of the formation with a minimum average overburden thickness. The minimum average overburden thickness may depend on a type of hydrocarbon resource and geological formation surrounding the hydrocarbon resource. An overburden may, in some embodiments, be substantially impermeable so that fluids produced in the selected section are inhibited from passing to the ground surface through the overburden. A minimum overburden thickness may be determined as the minimum overburden needed to inhibit the escape of fluids produced in the formation and to inhibit breakthrough to the surface due to increased pressure within the formation during in the situ conversion process. Determining this minimum overburden thickness may be dependent on, for example, composition of the overburden, maximum pressure to be reached in the formation during the in situ conversion process, permeability of the overburden, composition of fluids produced in the formation, and/or temperatures in the formation or overburden. A ratio of overburden thickness to hydrocarbon resource thickness may be used during selection of resources to produce using an in situ thermal conversion process.

Selected factors may be used to determine a minimum overburden thickness. These selected factors may include overall thickness of the overburden, lithology and/or rock properties of the overburden, earth stresses, expected extent of subsidence and/or reservoir compaction, a pressure of a process to be used in the formation, and extent and connectivity of natural fracture systems surrounding the formation.

For coal, a minimum overburden thickness may be about 50 m or between about 25 m and 100 m. In some embodiments, a selected section may have a minimum overburden pressure. A minimum overburden to resource thickness may be between about 0.25:1 and 100:1.

For oil shale, a minimum overburden thickness may be about 100 m or between about 25 m and 300 m. A minimum overburden to resource thickness may be between about 0.25:1 and 100:1.

Figure 48:
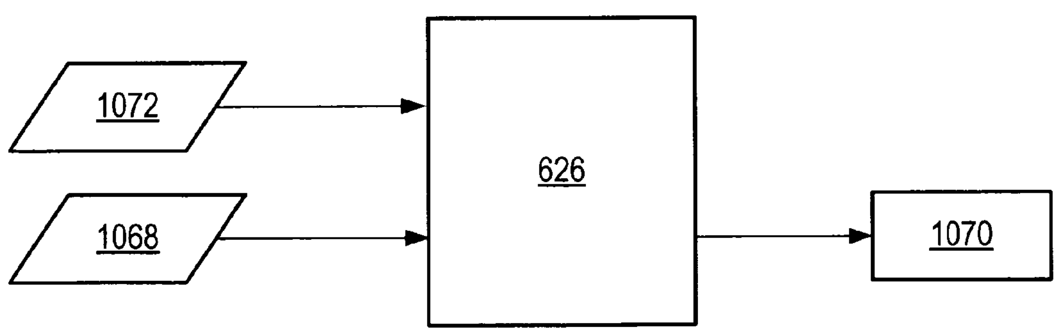
FIG. 48 illustrates a flow chart of an embodiment of a computer-implemented method for determining a selected overburden thickness.

FIG. 48 illustrates a flow chart of a computer-implemented method for determining a selected overburden thickness. Selected section properties 1068 may be input into computational system 626. Properties of the selected section may include type of formation, density, permeability, porosity, earth stresses, etc. Selected section properties 1068 may be used by a software executable to determine minimum overburden thickness 1070 for the selected section. The software executable may be, for example, ABAQUS. The software executable may incorporate selected factors. Computational system 626 may also run a simulation to determine minimum overburden thickness 1070. The minimum overburden thickness may be determined so that fractures that allow formation fluid to pass to the ground surface will not form within the overburden during an in situ process. A formation may be selected for treatment by computational system 626 based on properties of the formation and/or properties of the overburden as determined herein. Overburden properties 1072 may also be input into computational system 626. Properties of the overburden may include a type of material in the overburden, density of the overburden, permeability of the overburden, earth stresses, etc. Computational system 626 may also be used to determine operating conditions and/or control operating conditions for an in situ process of treating a formation.

Heating of the formation may be monitored during an in situ conversion process. Monitoring heating of a selected section may include continuously monitoring acoustical data associated with the selected section. Acoustical data may include seismic data or any acoustical data that may be measured, for example, using geophones, hydrophones, or other acoustical sensors. In an embodiment, a continuous acoustical monitoring system can be used to monitor (e.g., intermittently or constantly) the formation. The formation can be monitored (e.g., using geophones at 2 kilohertz, recording measurements every ⅛ of a millisecond) for undesirable formation conditions. In an embodiment, a continuous acoustical monitoring system may be obtained from Oyo Instruments (Houston, Tex.).

Acoustical data may be acquired by recording information using underground acoustical sensors located within and/or proximate a treated formation area. Acoustical data may be used to determine a type and/or location of fractures developing within the selected section. Acoustical data may be input into a computational system to determine the type and/or location of fractures. Also, heating profiles of the formation or selected section may be determined by the computational system using the acoustical data. The computational system may run a software executable to process the acoustical data. The computational system may be used to determine a set of operating conditions for treating the formation in situ. The computational system may also be used to control the set of operating conditions for treating the formation in situ based on the acoustical data. Other properties, such as a temperature of the formation, may also be input into the computational system.

An in situ conversion process may be controlled by using some of the production wells as injection wells for injection of steam and/or other process modifying fluids (e.g., hydrogen, which may affect a product composition through in situ hydrogenation).

In certain embodiments, it may be possible to use well technologies that may operate at high temperatures. These technologies may include both sensors and control mechanisms. The heat injection profiles and hydrocarbon vapor production may be adjusted on a more discrete basis. It may be possible to adjust heat profiles and production on a bed-by-bed basis or in meter-by-meter increments. This may allow the ICP to compensate, for example, for different thermal properties and/or organic contents in an interbedded lithology. Thus, cold and hot spots may be inhibited from forming, the formation may not be overpressurized, and/or the integrity of the formation may not be highly stressed, which could cause deformations and/or damage to wellbore integrity.

Figure 49:
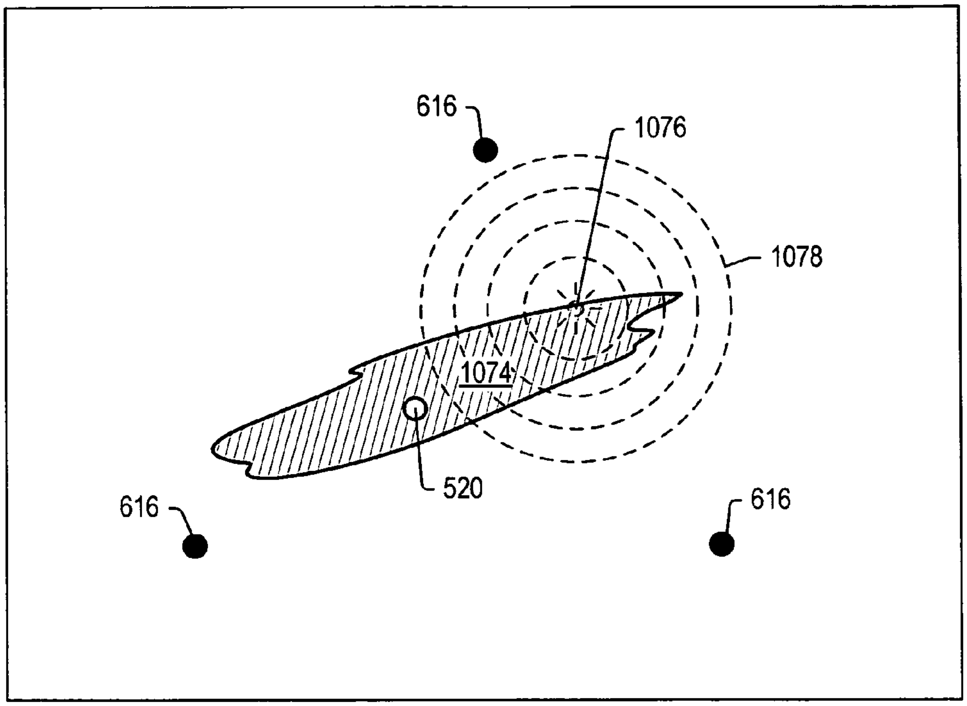
FIG. 49 illustrates a schematic diagram of a plan view of a zone being treated using an in situ conversion process.
Figure 50:
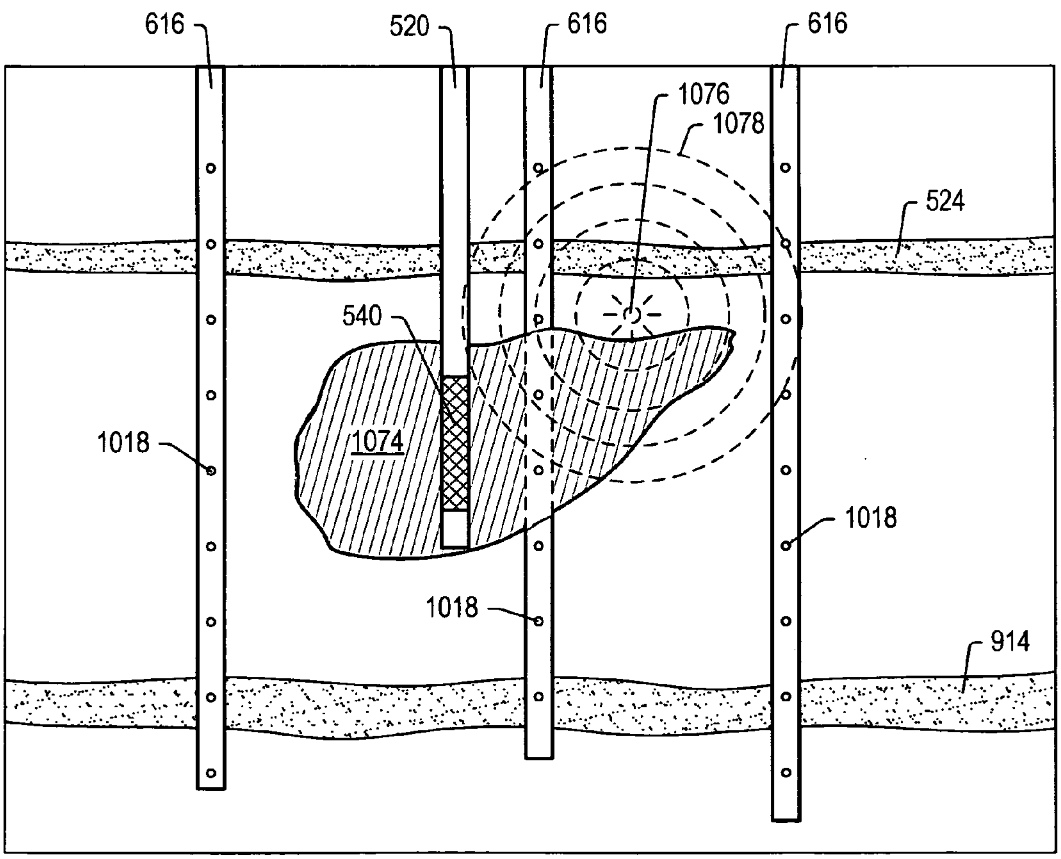
FIG. 50 illustrates a schematic diagram of a cross-sectional representation of a zone being treated using an in situ conversion process.

FIGS. 49 and 50 illustrate schematic diagrams of a plan view and a cross-sectional representation, respectively, of a zone being treated using an in situ conversion process (ICP). The ICP may cause microseismic failures, or fractures, within the treatment zone from which a seismic wave may be emitted. Treatment zone 1074 may be heated using heat provided from heater 540 placed in heater well 520. Pressure in treatment zone 1074 may be controlled by producing some formation fluid through heater wells 520 and/or production wells. Heat from heater 540 may cause failure 1076 in a portion of the formation proximate treatment zone 1074. Failure 1076 may be a localized rock failure within a rock volume of the formation. Failure 1076 may be an instantaneous failure. Failure 1076 tends to produce seismic disturbance 1078. Seismic disturbance 1078 may be an elastic or microseismic disturbance that propagates as a body wave in the formation surrounding the failure. Magnitude and direction of seismic disturbance as measured by sensors may indicate a type of macro-scale failure that occurs within the formation and/or treatment zone 1074. For example, seismic disturbance 1078 may be evaluated to indicate a location, orientation, and/or extent of one or more macro-scale failures that occurred in the formation due to heat treatment of the treatment zone 1074.

Seismic disturbance 1078 from one or more failures 1076 may be detected with one or more sensors 1018. Sensor 1018 may be a geophone, hydrophone, accelerometer, and/or other seismic sensing device. Sensors 1018 may be placed in monitoring well 616 or monitoring wells. Monitoring wells 616 may be placed in the formation proximate heater well 520 and treatment zone 1074. In certain embodiments, three monitoring wells 616 are placed in the formation such that a location of failure 1076 may be triangulated using sensors 1018 in each monitoring well.

In an in situ conversion process embodiment, sensors 1018 may measure a signal of seismic disturbance 1078. The signal may include a wave or set of waves emitted from failure 1076. The signals may be used to determine an approximate location of failure 1076. An approximate time at which failure 1076 occurred, causing seismic disturbance 1078, may also be determined from the signal. This approximate location and approximate time of failure 1076 may be used to determine if the failure can propagate into an undesired zone of the formation. The undesired zone may include a water aquifer, a zone of the formation undesired for treatment, overburden 524 of the formation, and/or underburden 914 of the formation. An aquifer may also lie above overburden 524 or below underburden 914. Overburden 524 and/or underburden 914 may include one or more rock layers that can be fractured and allow formation fluid to undesirably escape from the in situ conversion process. Sensors 1018 may be used to monitor a progression of failure 1076 (i.e., an increase in extent of the failure) over a period of time.

In certain embodiments, a location of failure 1076 may be more precisely determined using a vertical distribution of sensors 1018 along each monitoring well 616. The vertical distribution of sensors 1018 may also include at least one sensor above overburden 524 and/or below underburden 914. The sensors above overburden 524 and/or below underburden 914 may be used to monitor penetration (or an absence of penetration) of a failure through the overburden or underburden.

If failure 1076 propagates into an undesired zone of the formation, a parameter for treatment of treatment zone 1074 controlled through heater well 520 may be altered to inhibit propagation of the failure. The parameter of treatment may include a pressure in treatment zone 1074, a volume (or flow rate) of fluids injected into the treatment zone or removed from the treatment zone, or a heat input rate from heater 540 into the treatment zone.

Figure 51:
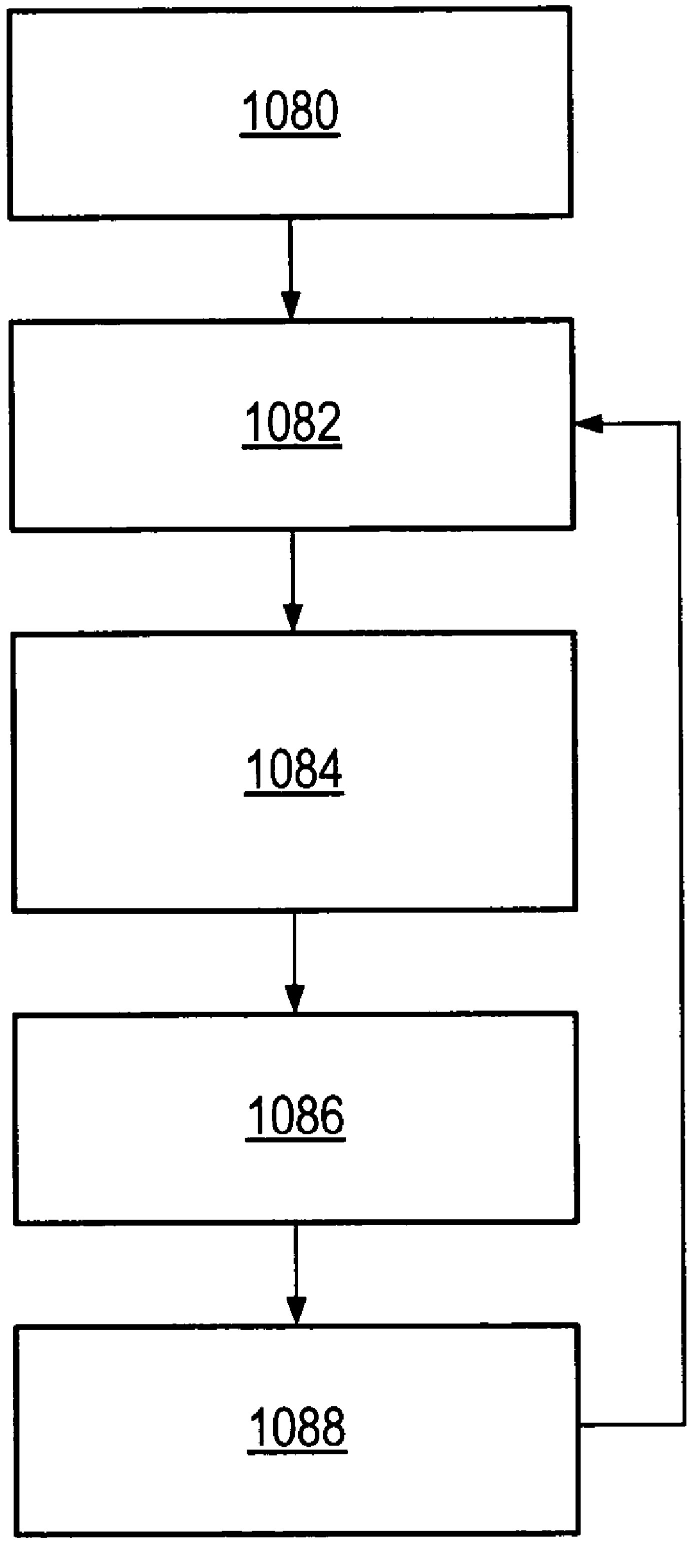
FIG. 51 illustrates a flow chart of an embodiment of a method used to monitor treatment of a formation.

FIG. 51 illustrates a flow chart of an embodiment of a method used to monitor treatment of a formation. Treatment plan 1080 may be provided for a treatment zone (e.g., treatment zone 1074 in FIGS. 49 and 50). Parameters 1082 for treatment plan 1080 may include, but are not limited to, pressure in the treatment zone, heating rate of the treatment zone, and average temperature in the treatment zone. Treatment parameters 1082 may be controlled to treat through heat sources, production wells, and/or injection wells. A failure or -failures may occur during treatment of the treatment zone for a given set of parameters. Seismic disturbances that indicate a failure may be detected by sensors placed in one or more monitoring wells in monitoring step 1084. The seismic disturbances may be used to determine a location, a time, and/or extent of the one or more failures in determination step 1086. Determination step 1086 may include imaging the seismic disturbances to determine a spatial location of a failure or failures and/or a time at which the failure or failures occurred. The location, time, and/or extent of the failure or failures may be processed to determine if treatment parameters 1082 can be altered to inhibit the propagation of a failure or failures into an undesired zone of the formation in interpretation step 1088.

In an in situ conversion process embodiment, a recording system may be used to continuously monitor signals from sensors placed in a formation. The recording system may continuously record the signals from sensors. The recording system may save the signals as data. The data may be permanently saved by the recording system. The recording system may simultaneously monitor signals from sensors. The signals may be monitored at a selected sampling rate (e.g., about once every 0.25 milliseconds). In some embodiments, two recording systems may be used to continuously monitor signals from sensors. A recording system may be used to record each signal from the sensors at the selected sampling rate for a desired time period. A controller may be used when the recording system is used to monitor a signal. The controller may be a computational system or computer. In an embodiment using two or more recording systems, the controller may direct which recording system is used for a selected time period. The controller may include a global positioning satellite (GPS) clock. The GPS clock may be used to provide a specific time for a recording system to begin monitoring signals (e.g., a trigger time) and a time period for the monitoring of signals. The controller may provide the specific time for the recording system to begin monitoring signals to a trigger box. The trigger box may be used to supply a trigger pulse to a recording system to begin monitoring signals.

A storage device may be used to record signals monitored by a recording system. The storage device may include a tape drive (e.g., a high-speed, high-capacity tape drive) or any device capable of recording relatively large amounts of data at very short time intervals. In an embodiment using two recording systems, the storage device may receive data from the first recording system while the second recording system is monitoring signals from one or more sensors, or vice versa. This enables continuous data coverage so that all or substantially all microseismic events that occur will be detected. In some embodiments, heat progress through the formation may be monitored by measuring microseismic events caused by heating of various portions of the formation.

In some embodiments, monitoring heating of a selected section of the formation may include electromagnetic monitoring of the selected section. Electromagnetic monitoring may include measuring a resistivity between at least two electrodes within the selected section. Data from electromagnetic monitoring may be input into a computational system and processed as described above.

A relationship between a change in characteristics of formation fluids with temperature in an in situ conversion process may be developed. The relationship may relate the change in characteristics with temperature to a heating rate and temperature for the formation. The relationship may be used to select a temperature which can be used in an isothermal experiment to determine a quantity and quality of a product produced by ICP in a formation without having to use one or more slow heating rate experiments. The isothermal experiment may be conducted in a laboratory or similar test facility. The isothermal experiment may be conducted much more quickly than experiments that slowly increase temperatures. An appropriate selection of a temperature for an isothermal experiment may be significant for prediction of characteristics of formation fluids. The experiment may include conducting an experiment on a sample of a formation (e.g., a coal sample obtained from a coal formation). The experiment may include producing hydrocarbons from the sample.

For example, first order kinetics may be generally assumed for a reaction producing a product. Assuming first order kinetics and a linear heating rate, the change in concentration (a characteristic of a formation fluid being the concentration of a component) with temperature may be defined by the equation:

$$dC/dT = -(k_0/m) \times e^{(-E/RT)}C; \tag{35}$$

in which C is the concentration of a component, T is temperature in Kelvin, $k_0$ is the frequency factor of the reaction, m is the heating rate, E is the activation energy, and R is the gas constant.

EQN. 35 may be solved for a concentration at a selected temperature based on an initial concentration at a first temperature. The result is the equation:

$$C = C_0 \times e^{\frac{k_0 R T^2 e^{-E/RT}}{mE}}; \tag{36}$$

in which C is the concentration of a component at temperature T and $C_0$ is an initial concentration of the component.

Substituting EQN. 36 into EQN. 35 yields the expression:

$$\frac{dC}{dT} = -\frac{k_0 C_0}{m} \times e^{\left(-\frac{E}{RT} - \frac{k_0 R T^2}{mE} \times e^{-\frac{E}{RT}}\right)}; \tag{37}$$

which relates the change in concentration C with temperature T for first-order kinetics and a linear heating rate.

Typically, in application of an ICP to a hydrocarbon containing formation, the heating rate may not be linear due to temperature limitations in heat sources and/or in heater wells. For example, heating may be reduced at higher temperatures so that a temperature in a heater well is maintained below a desired temperature (e.g., about 650° C.). This may provide a non-linear heating rate that is relatively slower than a linear heating rate. The non-linear heating rate may be expressed as:

$$T = m \times t^n; \tag{38}$$

in which t is time and n is an exponential decay term for the heating rate, and in which n is typically less than 1 (e.g., about 0.75).

Using EQN. 38 in a first-order kinetics equation gives the expression:

$$C = C_0 \times e^{\left(-\frac{k_0 R T^{\frac{n+1}{n}}}{m^{1/n} n} \times e^{\frac{-E}{RT}}\right)}; \tag{39}$$

which is a generalization of EQN. 36 for a non-linear heating rate.

An isothermal experiment may be conducted at a selected temperature to determine a quality and a quantity of a product produced using an ICP in a formation. The selected temperature may be a temperature at which half the initial concentration, $C_0$, has been converted into product (i.e., $C/C_0 = ½$). EQN. 39 may be solved for this value, giving the expression:

$$\ln\left(\frac{k_0 R}{m^{1/n} n}\right) - \ln(\ln 2) = \frac{E}{R T_{1/2}} - \frac{n+1}{n} \times \ln T_{1/2}; \tag{40}$$

in which $T_{1/2}$ is the selected temperature which corresponds to converting half of the initial concentration into product. Alternatively, an equation such as EQN. 37 may be used with a heating rate that approximates a heating rate expected in a temperature range where in situ conversion of hydrocarbons is expected. EQN. 40 may be used to determine a selected temperature based on a heating rate that may be expected for ICP in at least a portion of a formation. The heating rate may be selected based on parameters such as, but not limited to, heater well spacing, heater well installation economics (e.g., drilling costs, heater costs, etc.), and maximum heater output. At least one property of the formation may also be used to determine the heating rate. At least one property may include, but is not limited to, a type of formation, formation heat capacity, formation depth, permeability, thermal conductivity, and total organic content. The selected temperature may be used in an isothermal experiment to determine product quality and/or quantity. The product quality and/or quantity may also be determined at a selected pressure in the isothermal experiment. The selected pressure may be a pressure used for an ICP. The selected pressure may be adjusted to produce a desired product quality and/or quantity in the isothermal experiment. The adjusted selected pressure may be used in an ICP to produce the desired product quality and/or quantity from the formation.

In some embodiments, EQN. 40 may be used to determine a heating rate (m or $m^n$) used in an ICP based on results from an isothermal experiment at a selected temperature ($T_{1/2}$). For example, isothermal experiments may be performed at a variety of temperatures. The selected temperature may be chosen as a temperature at which a product of desired quality and/or quantity is produced. The selected temperature may be used in EQN. 40 to determine the desired heating rate during ICP to produce a product of the desired quality and/or quantity.

Alternatively, if a heating rate is estimated, at least in a first instance, by optimizing costs and incomes such as heater well costs and the time required to produce hydrocarbons, then constants for an equation such as EQN. 40 may be determined by data from an experiment when the temperature is raised at a constant rate. With the constants of EQN. 40 estimated and heating rates estimated, a temperature for isothermal experiments may be calculated. Isothermal experiments may be performed much more quickly than experiments at anticipated heating rates (i.e., relatively slow heating rates). Thus, the effect of variables (such as pressure) and the effect of applying additional gases (such as, for example, steam and hydrogen) may be determined by relatively fast experiments.

In an embodiment, a hydrocarbon containing formation may be heated with a natural distributed combustor system located in the formation. The generated heat may be allowed to transfer to a selected section of the formation. A natural distributed combustor may oxidize hydrocarbons in a formation in the vicinity of a wellbore to provide heat to a selected section of the formation.

A temperature sufficient to support oxidation may be at least about 200° C. or 250° C. The temperature sufficient to support oxidation will tend to vary depending on many factors (e.g., a composition of the hydrocarbons in the hydrocarbon containing formation, water content of the formation, and/or type and amount of oxidant). Some water may be removed from the formation prior to heating. For example, the water may be pumped from the formation by dewatering wells. The heated portion of the formation may be near or substantially adjacent to an opening in the hydrocarbon containing formation. The opening in the formation may be a heater well formed in the formation. The heated portion of the hydrocarbon containing formation may extend radially from the opening to a width of about 0.3 m to about 1.2 m. The width, however, may also be less than about 0.9 m. A width of the heated portion may vary with time. In certain embodiments, the variance depends on factors including a width of formation necessary to generate sufficient heat during oxidation of carbon to maintain the oxidation reaction without providing heat from an additional heat source.

After the portion of the formation reaches a temperature sufficient to support oxidation, an oxidizing fluid may be provided into the opening to oxidize at least a portion of the hydrocarbons at a reaction zone or a heat source zone within the formation. Oxidation of the hydrocarbons will generate heat at the reaction zone. The generated heat will in most embodiments transfer from the reaction zone to a pyrolysis zone in the formation. In certain embodiments, the generated heat transfers at a rate between about 650 watts per meter and 1650 watts per meter as measured along a depth of the reaction zone. Upon oxidation of at least some of the hydrocarbons in the formation, energy supplied to the heater for initially heating the formation to the temperature sufficient to support oxidation may be reduced or turned off. Energy input costs may be significantly reduced using natural distributed combustors, thereby providing a significantly more efficient system for heating the formation.

In an embodiment, a conduit may be disposed in the opening to provide oxidizing fluid into the opening. The conduit may have flow orifices or other flow control mechanisms (i.e., slits, venturi meters, valves, etc.) to allow the oxidizing fluid to enter the opening. The term "orifices" includes openings having a wide variety of cross-sectional shapes including, but not limited to, circles, ovals, squares, rectangles, triangles, slits, or other regular or irregular shapes. The flow orifices may be critical flow orifices in some embodiments. The flow orifices may provide a substantially constant flow of oxidizing fluid into the opening, regardless of the pressure in the opening.

In some embodiments, the number of flow orifices may be limited by the diameter of the orifices and a desired spacing between orifices for a length of the conduit. For example, as the diameter of the orifices decreases, the number of flow orifices may increase, and vice versa. In addition, as the desired spacing increases, the number of flow orifices may decrease, and vice versa. The diameter of the orifices may be determined by a pressure in the conduit and/or a desired flow rate through the orifices. For example, for a flow rate of about 1.7 standard cubic meters per minute and a pressure of about 7 bars absolute, an orifice diameter may be about 1.3 mm with a spacing between orifices of about 2 m. Smaller diameter orifices may plug more readily than larger diameter orifices. Orifices may plug for a variety of reasons. The reasons may include, but are not limited to, contaminants in the fluid flowing in the conduit and/or solid deposition within or proximate the orifices.

In some embodiments, the number and diameter of the orifices are chosen such that a more even or nearly uniform heating profile will be obtained along a depth of the opening in the formation. A depth of a heated formation that is intended to have an approximately uniform heating profile may be greater than about 300 m, or even greater than about 600 m. Such a depth may vary, however, depending on, for example, a type of formation to be heated and/or a desired production rate.

In some embodiments, flow orifices may be disposed in a helical pattern around the conduit within the opening. The flow orifices may be spaced by about 0.3 m to about 3 m between orifices in the helical pattern. In some embodiments, the spacing may be about 1 m to about 2 m or, for example, about 1.5 m.

The flow of oxidizing fluid into the opening may be controlled such that a rate of oxidation at the reaction zone is controlled. Transfer of heat between incoming oxidant and outgoing oxidation products may heat the oxidizing fluid. The transfer of heat may also maintain the conduit below a maximum operating temperature of the conduit.

Figure 52:
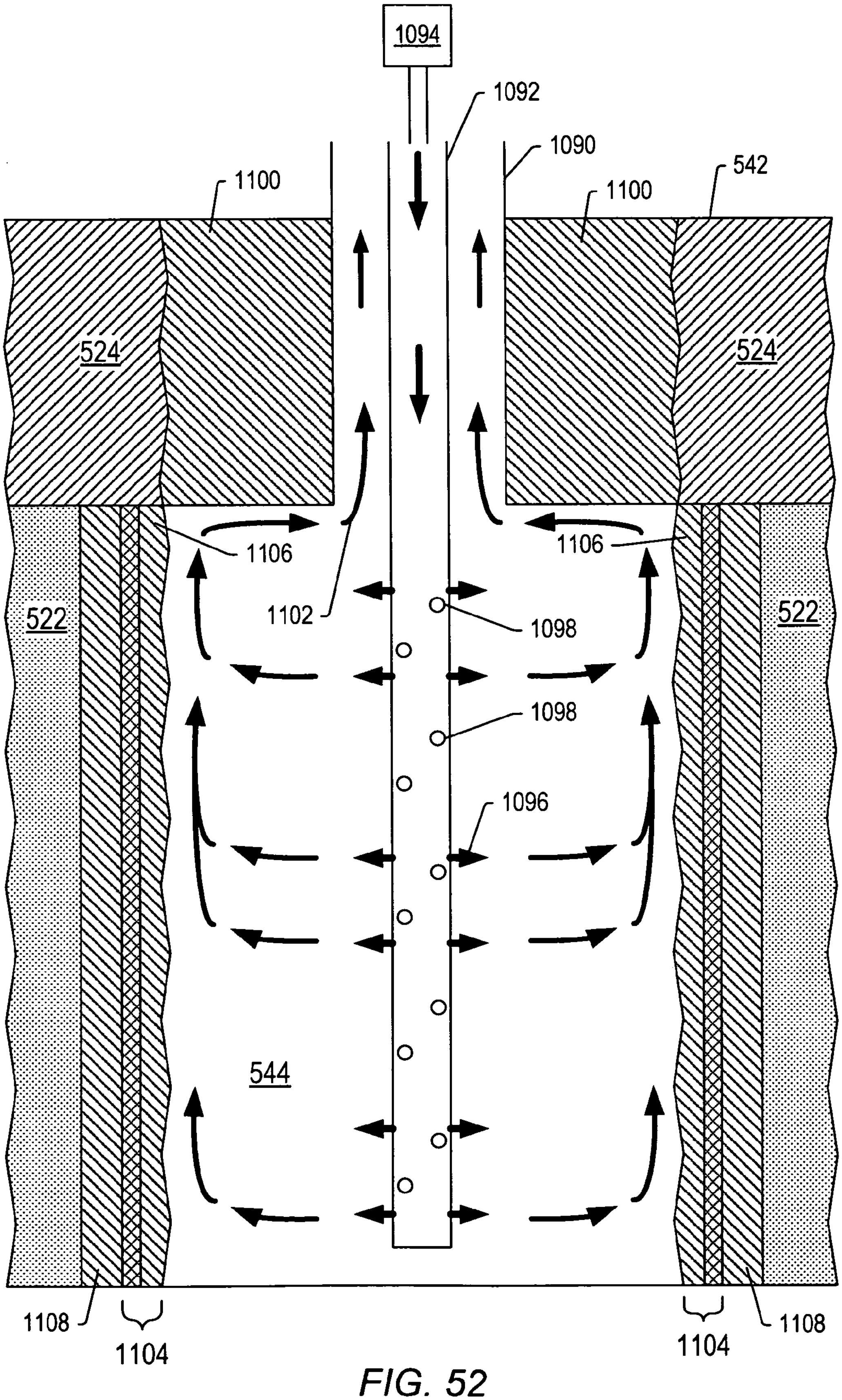
FIG. 52 depicts an embodiment of a natural distributed combustor heat source.

FIG. 52 illustrates an embodiment of a natural distributed combustor that may heat a hydrocarbon containing formation. Conduit 1090 may be placed into opening 544 in hydrocarbon layer 522. Conduit 1090 may have inner conduit 1092. Oxidizing fluid source 1094 may provide oxidizing fluid 1096 into inner conduit 1092. Inner conduit 1092 may have orifices 1098 along its length. In some embodiments, orifices 1098 may be critical flow orifices disposed in a helical pattern (or any other pattern) along a length of inner conduit 1092 in opening 544. For example, orifices 1098 may be arranged in a helical pattern with a distance of about 1 m to about 2.5 m between adjacent orifices. Inner conduit 1092 may be sealed at the bottom. Oxidizing fluid 1096 may be provided into opening 544 through orifices 1098 of inner conduit 1092.

Orifices 1098, (e.g., critical flow orifices) may be designed such that substantially the same flow rate of oxidizing fluid 1096 may be provided through each orifice. Orifices 1098 may also provide substantially uniform flow of oxidizing fluid 1096 along a length of inner conduit 1092. Such flow may provide substantially uniform heating of hydrocarbon layer 522 along the length of inner conduit 1092.

Packing material 1100 may enclose conduit 1090 in overburden 524 of the formation. Packing material 1100 may inhibit flow of fluids from opening 544 to surface 542. Packing material 1100 may include any material that inhibits flow of fluids to surface 542 such as cement or consolidated sand or gravel. A conduit or opening through the packing may provide a path for oxidation products to reach the surface.

Oxidation product 1102 typically enter conduit 1090 from opening 544. Oxidation product 1102 may include carbon dioxide, oxides of nitrogen, oxides of sulfur, carbon monoxide, and/or other products resulting from a reaction of oxygen with hydrocarbons and/or carbon. Oxidation product 1102 may be removed through conduit 1090 to surface 542. Oxidation product 1102 may flow along a face of reaction zone 1104 in opening 544 until proximate an upper end of opening 544 where oxidation product 1102 may flow into conduit 1090. Oxidation product 1102 may also be removed through one or more conduits disposed in opening 544 and/or in hydrocarbon layer 522. For example, oxidation product 1102 may be removed through a second conduit disposed in opening 544. Removing oxidation product 1102 through a conduit may inhibit oxidation product 1102 from flowing to a production well disposed in the formation. Orifices 1098 may inhibit oxidation product 1102 from entering inner conduit 1092.

Figure 53:
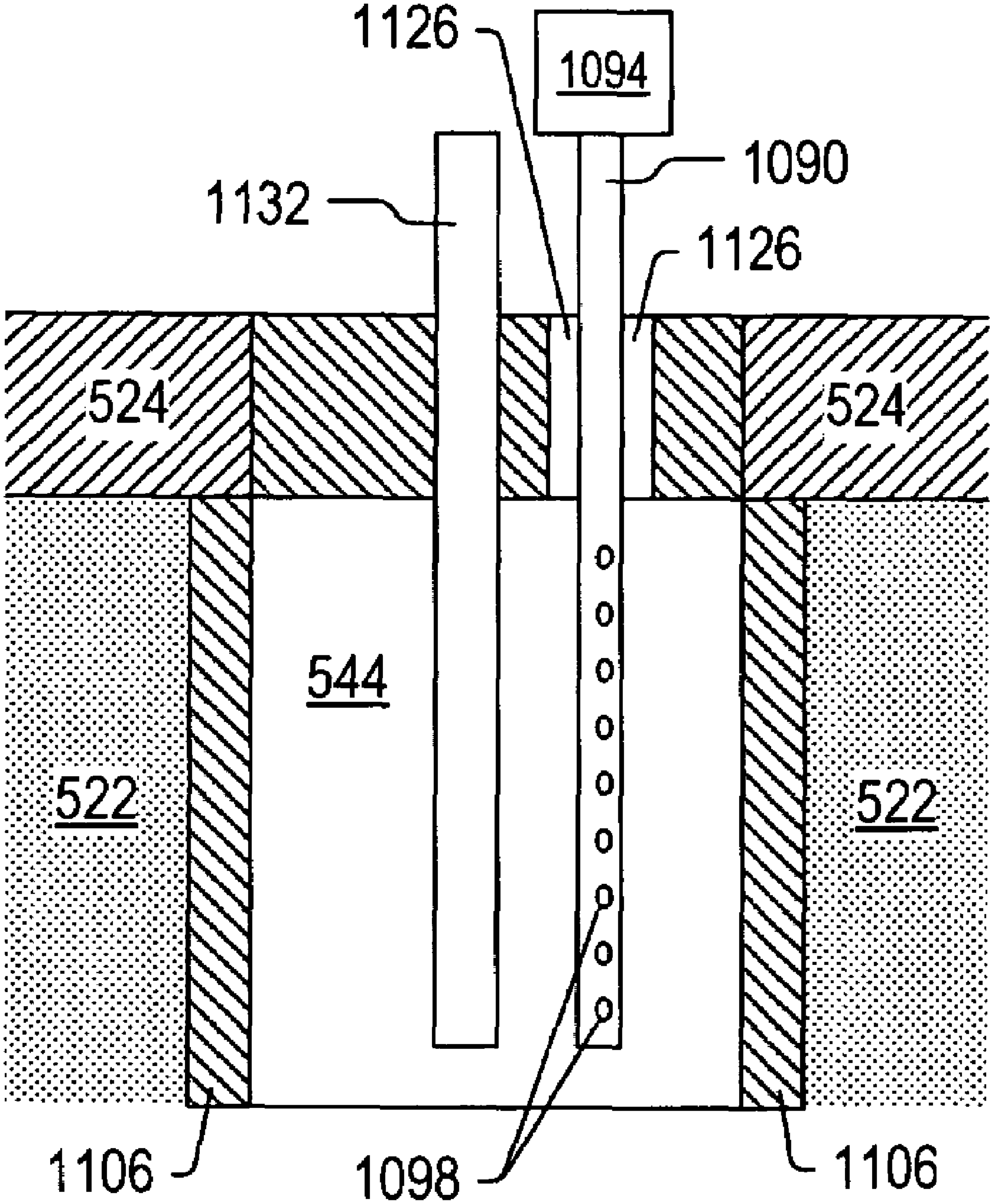
FIG. 53 depicts an embodiment of a natural distributed combustor system for heating a formation.

A flow rate of oxidation product 1102 may be balanced with a flow rate of oxidizing fluid 1096 such that a substantially constant pressure is maintained within opening 544. For a 100 m length of heated section, a flow rate of oxidizing fluid may be between about 0.5 standard cubic meters per minute to about 5 standard cubic meters per minute, or about 1.0 standard cubic meter per minute to about 4.0 standard cubic meters per minute, or, for example, about 1.7 standard cubic meters per minute. A flow rate of oxidizing fluid into the formation may be incrementally increased during use to accommodate expansion of the reaction zone. A pressure in the opening may be, for example, about 8 bars absolute. Oxidizing fluid 1096 may oxidize at least a portion of the hydrocarbons in heated portion 1106 of hydrocarbon layer 522 at reaction zone 1104. Heated portion 1106 may have been initially heated to a temperature sufficient to support oxidation by an electric heater (as shown in FIG. 53). In some embodiments, an electric heater may be placed inside or strapped to the outside of inner conduit 1092.

In certain embodiments, controlling the pressure within opening 544 may inhibit oxidation products and/or oxidation fluids from flowing into the pyrolysis zone of the formation. In some instances, pressure within opening 544 may be controlled to be slightly greater than a pressure in the formation to allow fluid within the opening to pass into the formation but to inhibit formation of a pressure gradient that allows the transport of the fluid a significant distance into the formation.

Although the heat from the oxidation is transferred to the formation, oxidation product 1102 (and excess oxidation fluid such as air) may be inhibited from flowing through the formation and/or to a production well within the formation. Instead, oxidation product 1102 and/or excess oxidation fluid may be removed from the formation. In some embodiments, the oxidation products and/or excess oxidation fluid are removed through conduit 1090. Removing oxidation products and/or excess oxidation fluid may allow heat from oxidation reactions to transfer to the pyrolysis zone without significant amounts of oxidation products and/or excess oxidation fluid entering the pyrolysis zone.

In certain embodiments, some pyrolysis product near reaction zone 1104 may be oxidized in reaction zone 1104 in addition to the carbon. Oxidation of the pyrolysis product in reaction zone 1104 may provide additional heating of hydrocarbon layer 522. When oxidation of pyrolysis product occurs, oxidation products from the oxidation of pyrolysis product may be removed near the reaction zone (e.g., through a conduit such as conduit 1090). Removing the oxidation products of a pyrolysis product may inhibit contamination of other pyrolysis products in the formation with oxidation product.

Conduit 1090 may, in some embodiments, remove oxidation product 1102 from opening 544 in hydrocarbon layer 522. Oxidizing fluid 1096 in inner conduit 1092 may be heated by heat exchange with conduit 1090. A portion of heat transfer between conduit 1090 and inner conduit 1092 may occur in overburden section 524. Oxidation product 1102 may be cooled by transferring heat to oxidizing fluid 1096. Heating the incoming oxidizing fluid 1096 tends to improve the efficiency of heating the formation.

Oxidizing fluid 1096 may transport through reaction zone 1104, or heat source zone, by gas phase diffusion and/or convection. Diffusion of oxidizing fluid 1096 through reaction zone 1104 may be more efficient at the relatively high temperatures of oxidation. Diffusion of oxidizing fluid 1096 may inhibit development of localized overheating and fingering in the formation. Diffusion of oxidizing fluid 1096 through hydrocarbon layer 522 is generally a mass transfer process. In the absence of an external force, a rate of diffusion for oxidizing fluid 1096 may depend upon concentration, pressure, and/or temperature of oxidizing fluid 1096 within hydrocarbon layer 522. The rate of diffusion may also depend upon the diffusion coefficient of oxidizing fluid 1096 through hydrocarbon layer 522. The diffusion coefficient may be determined by measurement or calculation based on the kinetic theory of gases. In general, random motion of oxidizing fluid 1096 may transfer the oxidizing fluid through hydrocarbon layer 522 from a region of high concentration to a region of low concentration.

With time, reaction zone 1104 may slowly extend radially to greater diameters from opening 544 as hydrocarbons are oxidized. Reaction zone 1104 may, in many embodiments, maintain a relatively constant width. For example, reaction zone 1104 may extend radially at a rate of less than about 0.91 m per year for a hydrocarbon containing formation. For example, for a coal formation, reaction zone 1104 may extend radially at a rate between about 0.5 m per year to about 1 m per year. For an oil shale formation, reaction zone 1104 may extend radially about 2 m in the first year and at a lower rate in subsequent years due to an increase in volume of reaction zone 1104 as the reaction zone extends radially. Such a lower rate may be about 1 m per year to about 1.5 m per year. Reaction zone 1104 may extend at slower rates for hydrocarbon rich formations (e.g., coal) and at faster rates for formations with more inorganic material (e.g., oil shale) since more hydrocarbons per volume are available for combustion in the hydrocarbon rich formations.

A flow rate of oxidizing fluid 1096 into opening 544 may be increased as a diameter of reaction zone 1104 increases to maintain the rate of oxidation per unit volume at a substantially steady state. Thus, a temperature within reaction zone 1104 may be maintained substantially constant in some embodiments. The temperature within reaction zone 1104 may be between about 650° C. to about 900° C. or, for example, about 760° C. The temperature may be maintained below a temperature that results in production of oxides of nitrogen ($NO_x$). Oxides of nitrogen are often produced at temperatures above about 1200° C.

The temperature within reaction zone 1104 may be varied to achieve a desired heating rate of selected section 1108. The temperature within reaction zone 1104 may be increased or decreased by increasing or decreasing a flow rate of oxidizing fluid 1096 into opening 544. A temperature of conduit 1090, inner conduit 1092, and/or any metallurgical materials within opening 544 may be controlled to not exceed a maximum operating temperature of the material. Maintaining the temperature below the maximum operating temperature of a material may inhibit excessive deformation and/or corrosion of the material.

An increase in the diameter of reaction zone 1104 may allow for relatively rapid heating of hydrocarbon layer 522. As the diameter of reaction zone 1104 increases, an amount of heat generated per time in reaction zone 1104 may also increase. Increasing an amount of heat generated per time in the reaction zone will in many instances increase a heating rate of hydrocarbon layer 522 over a period of time, even without increasing the temperature in the reaction zone or the temperature at inner conduit 1092. Thus, increased heating may be achieved over time without installing additional heat sources and without increasing temperatures adjacent to wellbores. In some embodiments, the heating rates may be increased while allowing the temperatures to decrease (allowing temperatures to decrease may often lengthen the life of the equipment used).

By utilizing the carbon in the formation as a fuel, the natural distributed combustor may save significantly on energy costs. Thus, an economical process may be provided for heating formations that would otherwise be economically unsuitable for heating by other types of heat sources. Using natural distributed combustors may allow fewer heaters to be inserted into a formation for heating a desired volume of the formation as compared to heating the formation using other types of heat sources. Heating a formation using natural distributed combustors may allow for reduced equipment costs as compared to heating the formation using other types of heat sources.

Heat generated at reaction zone 1104 may transfer by thermal conduction to selected section 1108 of hydrocarbon layer 522. In addition, generated heat may transfer from a reaction zone to the selected section to a lesser extent by convective heat transfer. Selected section 1108, sometimes referred as the "pyrolysis zone," may be substantially adjacent to reaction zone 1104. Removing oxidation products (and excess oxidation fluid such as air) may allow the pyrolysis zone to receive heat from the reaction zone without being exposed to oxidation product, or oxidants, that are in the reaction zone. Oxidation products and/or oxidation fluids may cause the formation of undesirable products if they are present in the pyrolysis zone. Removing oxidation products and/or oxidation fluids may allow a reducing environment to be maintained in the pyrolysis zone.

In an in situ conversion process embodiment, natural distributed combustors may be used to heat a formation. FIG. 52 depicts an embodiment of a natural distributed combustor. A flow of oxidizing fluid 1096 may be controlled along a length of opening 544 or reaction zone 1104. Opening 544 may be referred to as an "elongated opening," such that reaction zone 1104 and opening 544 may have a common boundary along a determined length of the opening. The flow of oxidizing fluid may be controlled using one or more orifices 1098 (the orifices may be critical flow orifices). The flow of oxidizing fluid may be controlled by a diameter of orifices 1098, a number of orifices 1098, and/or by a pressure within inner conduit 1092 (a pressure behind orifices 1098). Controlling the flow of oxidizing fluid may control a temperature at a face of reaction zone 1104 in opening 544. For example, an increased flow of oxidizing fluid 1096 will tend to increase a temperature at the face of reaction zone 1104. Increasing the flow of oxidizing fluid into the opening tends to increase a rate of oxidation of hydrocarbons in the reaction zone. Since the oxidation of hydrocarbons is an exothermic reaction, increasing the rate of oxidation tends to increase the temperature in the reaction zone.

In certain natural distributed combustor embodiments, the flow of oxidizing fluid 1096 may be varied along the length of inner conduit 1092 (e.g., using critical flow orifices 1098) such that the temperature at the face of reaction zone 1104 is variable. The temperature at the face of reaction zone 1104, or within opening 544, may be varied to control a rate of heat transfer within reaction zone 1104 and/or a heating rate within selected section 1108. Increasing the temperature at the face of reaction zone 1104 may increase the heating rate within selected section 1108. A property of oxidation product 1102 may be monitored (e.g., oxygen content, nitrogen content, temperature, etc.). The property of oxidation product 1102 may be monitored and used to control input properties (e.g., oxidizing fluid input) into the natural distributed combustor.

A rate of diffusion of oxidizing fluid 1096 through reaction zone 1104 may vary with a temperature of and adjacent to the reaction zone. In general, the higher the temperature, the faster a gas will diffuse because of the increased energy in the gas. A temperature within the opening may be assessed (e.g., measured by a thermocouple) and related to a temperature of the reaction zone. The temperature within the opening may be controlled by controlling the flow of oxidizing fluid into the opening from inner conduit 1092. For example, increasing a flow of oxidizing fluid into the opening may increase the temperature within the opening. Decreasing the flow of oxidizing fluid into the opening may decrease the temperature within the opening. In an embodiment, a flow of oxidizing fluid may be increased until a selected temperature below the metallurgical temperature limits of the equipment being used is reached. For example, the flow of oxidizing fluid can be increased until a working temperature limit of a metal used in a conduit placed in the opening is reached. The temperature of the metal may be directly measured using a thermocouple or other temperature measurement device.

In a natural distributed combustor embodiment, production of carbon dioxide within reaction zone 1104 may be inhibited. An increase in a concentration of hydrogen in the reaction zone may inhibit production of carbon dioxide within the reaction zone. The concentration of hydrogen may be increased by transferring hydrogen into the reaction zone. In an embodiment, hydrogen may be transferred into the reaction zone from selected section 1108. Hydrogen may be produced during the pyrolysis of hydrocarbons in the selected section. Hydrogen may transfer by diffusion and/or convection into the reaction zone from the selected section. In addition, additional hydrogen may be provided into opening 544 or another opening in the formation through a conduit placed in the opening. The additional hydrogen may transfer into the reaction zone from opening 544.

In some natural distributed combustor embodiments, heat may be supplied to the formation from a second heat source in the wellbore of the natural distributed combustor. For example, an electric heater (e.g., an insulated conductor heater or a conductor-in-conduit heater) used to preheat a portion of the formation may also be used to provide heat to the formation along with heat from the natural distributed combustor. In addition, an additional electric heater may be placed in an opening in the formation to provide additional heat to the formation. The electric heater may be used to provide heat to the formation so that heat provided from the combination of the electric heater and the natural distributed combustor is maintained at a constant heat input rate. Heat input into the formation from the electric heater may be varied as heat input from the natural distributed combustor varies, or vice versa. Providing heat from more than one type of heat source may allow for substantially uniform heating of the formation.

In certain in situ conversion process embodiments, up to 10%, 25%, or 50% of the total heat input into the formation may be provided from electric heaters. A percentage of heat input into the formation from electric heaters may be varied depending on, for example, electricity cost, natural distributed combustor heat input, etc. Heat from electric heaters can be used to compensate for low heat output from natural distributed combustors to maintain a substantially constant heating rate in the formation. If electrical costs rise, more heat may be generated from natural distributed combustors to reduce the amount of heat supplied by electric heaters. In some embodiments, heat from electric heaters may vary due to the source of electricity (e.g., solar or wind power). In such embodiments, more or less heat may be provided by natural distributed combustors to compensate for changes in electrical heat input.

In a heat source embodiment, an electric heater may be used to inhibit a natural distributed combustor from "burning out." A natural distributed combustor may "burn out" if a portion of the formation cools below a temperature sufficient to support combustion. Additional heat from the electric heater may be needed to provide heat to the portion and/or another portion of the formation to heat a portion to a temperature sufficient to support oxidation of hydrocarbons and maintain the natural distributed combustor heating process.

In some natural distributed combustor embodiments, electric heaters may be used to provide more heat to a formation proximate an upper portion and/or a lower portion of the formation. Using the additional heat from the electric heaters may compensate for heat losses in the upper and/or lower portions of the formation. Providing additional heat with the electric heaters proximate the upper and/or lower portions may produce more uniform heating of the formation. In some embodiments, electric heaters may be used for similar purposes (e.g., provide heat at upper and/or lower portions, provide supplemental heat, provide heat to maintain a minimum combustion temperature, etc.) in combination with other types of fueled heaters, such as flameless distributed combustors or downhole combustors.

In some in situ conversion process embodiments, exhaust fluids from a fueled heater (e.g., a natural distributed combustor or downhole combustor) may be used in an air compressor located at a surface of the formation proximate an opening used for the fueled heater. The exhaust fluids may be used to drive the air compressor and reduce a cost associated with compressing air for use in the fueled heater. Electricity may also be generated using the exhaust fluids in a turbine or similar device. In some embodiments, fluids (e.g., oxidizing fluid and/or fuel) used for one or more fueled heaters may be provided using a compressor or a series of compressors. A compressor may provide oxidizing fluid and/or fuel for one heater or more than one heater. In addition, oxidizing fluid and/or fuel may be provided from a centralized facility for use in a single heater or more than one heater.

Pyrolysis of hydrocarbons, or other heat-controlled processes, may take place in heated selected section 1108. Selected section 1108 may be at a temperature between about 270° C. and about 400° C. for pyrolysis. The temperature of selected section 1108 may be increased by heat transfer from reaction zone 1104.

A temperature within opening 544 may be monitored with a thermocouple disposed in opening 544. Alternatively, a thermocouple may be coupled to conduit 1090 and/or disposed on a face of reaction zone 1104. Power input or oxidant introduced into the formation may be controlled based upon the monitored temperature to maintain the temperature in a selected range. The selected range may vary or be varied depending on location of the thermocouple, a desired heating rate of hydrocarbon layer 522, and other factors. If a temperature within opening 544 falls below a minimum temperature of the selected temperature range, the flow rate of oxidizing fluid 1096 may be increased to increase combustion and thereby increase the temperature within opening 544.

In certain embodiments, one or more natural distributed combustors may be placed along strike of a hydrocarbon layer and/or horizontally. Placing natural distributed combustors along strike or horizontally may reduce pressure differentials along the heated length of the heat source. Reduced pressure differentials may make the temperature generated along a length of the heater more uniform and easier to control.

In some embodiments, presence of air or oxygen ($O_2$) in oxidation product 1102 may be monitored. Alternatively, an amount of nitrogen, carbon monoxide, carbon dioxide, oxides of nitrogen, oxides of sulfur, etc. may be monitored in oxidation product 1102. Monitoring the composition and/or quantity of exhaust products (e.g., oxidation product 1102) may be useful for heat balances, for process diagnostics, process control, etc.

Figure 54:
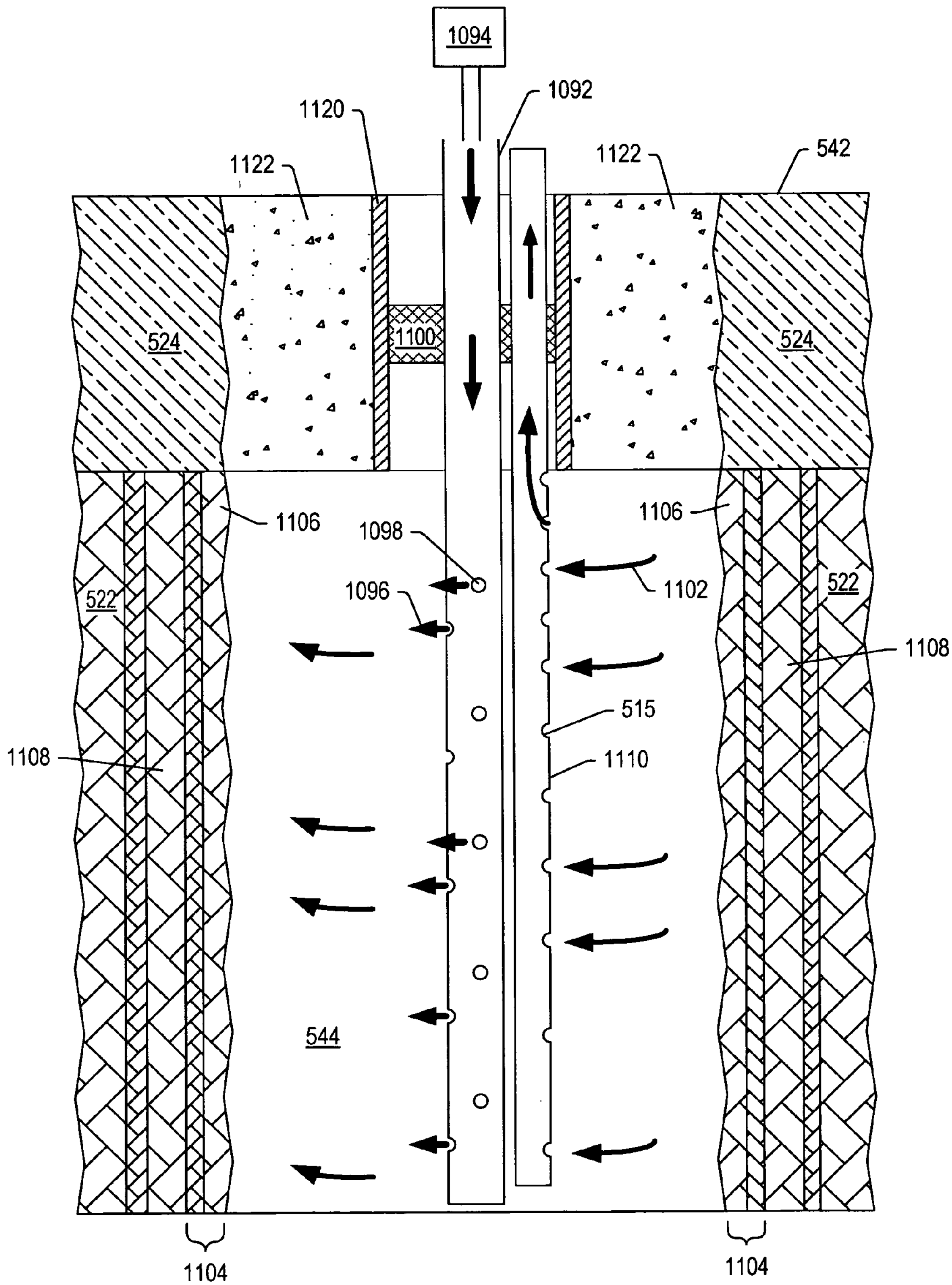
FIG. 54 illustrates a cross-sectional representation of an embodiment of a natural distributed combustor having a second conduit.

FIG. 54 illustrates a cross-sectional representation of an embodiment of a natural distributed combustor having a second conduit 1110 disposed in opening 544. Second conduit 1110 may be used to remove oxidation products from opening 544. Second conduit 1110 may have orifices 1098 disposed along its length. In certain embodiments, oxidation products are removed from an upper region of opening 544 through orifices 1098 disposed on second conduit 1110. Orifices 1098 may be disposed along the length of conduit 1110 such that more oxidation products are removed from the upper region of opening 544.

In certain natural distributed combustor embodiments, orifices 1098 on second conduit 1110 may face away from orifices 1098 on inner conduit 1092. The orientation may inhibit oxidizing fluid provided through inner conduit 1092 from passing directly into second conduit 1110.

In some embodiments, second conduit 1110 may have a higher density of orifices 1098 (and/or relatively larger diameter orifices 1098) towards the upper region of opening 544. The preferential removal of oxidation products from the upper region of opening 544 may produce a substantially uniform concentration of oxidizing fluid along the length of opening 544. Oxidation products produced from reaction zone 1104 tend to be more concentrated proximate the upper region of opening 544. The large concentration of oxidation product 1102 in the upper region of opening 544 tends to dilute a concentration of oxidizing fluid 1096 in the upper region. Removing a significant portion of the more concentrated oxidation products from the upper region of opening 544 may produce a more uniform concentration of oxidizing fluid 1096 throughout opening 544. Having a more uniform concentration of oxidizing fluid throughout the opening may produce a more uniform driving force for oxidizing fluid to flow into reaction zone 1104. The more uniform driving force may produce a more uniform oxidation rate within reaction zone 1104, and thus produce a more uniform heating rate in selected section 1108 and/or a more uniform temperature within opening 544.

In a natural distributed combustor embodiment, the concentration of air and/or oxygen in the reaction zone may be controlled. A more even distribution of oxygen (or oxygen concentration) in the reaction zone may be desirable. The rate of reaction may be controlled as a function of the rate in which oxygen diffuses in the reaction zone. The rate of oxygen diffusion correlates to the oxygen concentration. Thus, controlling the oxygen concentration in the reaction zone (e.g., by controlling oxidizing fluid flow rates, the removal of oxidation products along some or all of the length of the reaction zone, and/or the distribution of the oxidizing fluid along some or all of the length of the reaction zone) may control oxygen diffusion in the reaction zone and thereby control the reaction rates in the reaction zone.

Figure 55:
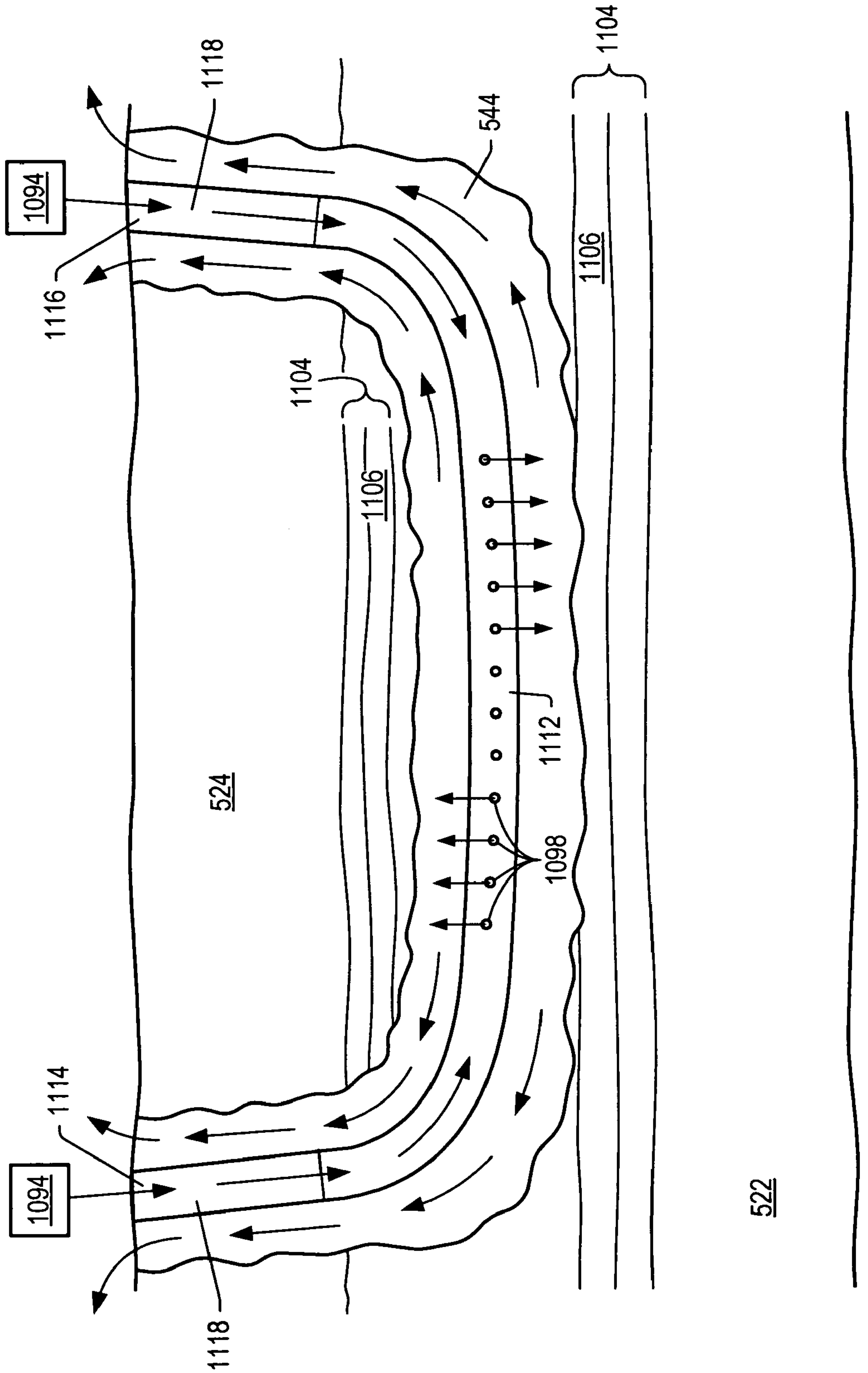
FIG. 55 depicts a schematic representation of an embodiment of a heater well positioned within a hydrocarbon containing formation.

In the embodiment shown in FIG. 55, conductor 1112 is placed in opening 544. Conductor 1112 may extend from first end 1114 of opening 544 to second end 1116 of opening 544. In certain embodiments, conductor 1112 may be placed in opening 544 within hydrocarbon layer 522. One or more low resistance sections 1118 may be coupled to conductor 1112 and used in overburden 524. In some embodiments, conductor 1112 and/or low resistance sections 1118 may extend above the surface of the formation.

In some heat source embodiments, an electric current may be applied to conductor 1112 to increase a temperature of the conductor. Heat may transfer from conductor 1112 to heated portion 1106 of hydrocarbon layer 522. Heat may transfer from conductor 1112 to heated portion 1106 substantially by radiation. Some heat may also transfer by convection or conduction. Current may be provided to the conductor until a temperature within heated portion 1106 is sufficient to support the oxidation of hydrocarbons within the heated portion. As shown in FIG. 55, oxidizing fluid may be provided into conductor 1112 from oxidizing fluid source 1094 at one or both ends 1114, 1116 of opening 544. A flow of the oxidizing fluid from conductor 1112 into opening 544 may be controlled by orifices 1098. The orifices may be critical flow orifices. The flow of oxidizing fluid from orifices 1098 may be controlled by a diameter of the orifices, a number of orifices, and/or by a pressure within conductor 1112 (i.e., a pressure behind the orifices).

Reaction of oxidizing fluids with hydrocarbons in reaction zone 1104 may generate heat. The rate of heat generated in reaction zone 1104 may be controlled by a flow rate of the oxidizing fluid into the formation, the rate of diffusion of oxidizing fluid through the reaction zone, and/or a removal rate of oxidation products from the formation. In an embodiment, oxidation products from the reaction of oxidizing fluid with hydrocarbons in the formation are removed through one or both ends of opening 544. In some embodiments, a conduit may be placed in opening 544 to remove oxidation product. All or portions of the oxidation products may be recycled and/or reused in other oxidation type heaters (e.g., natural distributed combustors, surface burners, downhole combustors, etc.). Heat generated in reaction zone 1104 may transfer to a surrounding portion (e.g., selected section) of the formation. The transfer of heat between reaction zone 1104 and a selected section may be substantially by conduction. In certain embodiments, the transferred heat may increase a temperature of the selected section above a minimum mobilization temperature of the hydrocarbons and/or a minimum pyrolysis temperature of the hydrocarbons.

In some heat source embodiments, a conduit may be placed in the opening. The opening may extend through the formation contacting a surface of the earth at a first location and a second location. Oxidizing fluid may be provided to the conduit from the oxidizing fluid source at the first location and/or the second location after a portion of the formation that has been heated to a temperature sufficient to support oxidation of hydrocarbons by the oxidizing fluid.

Figure 56:
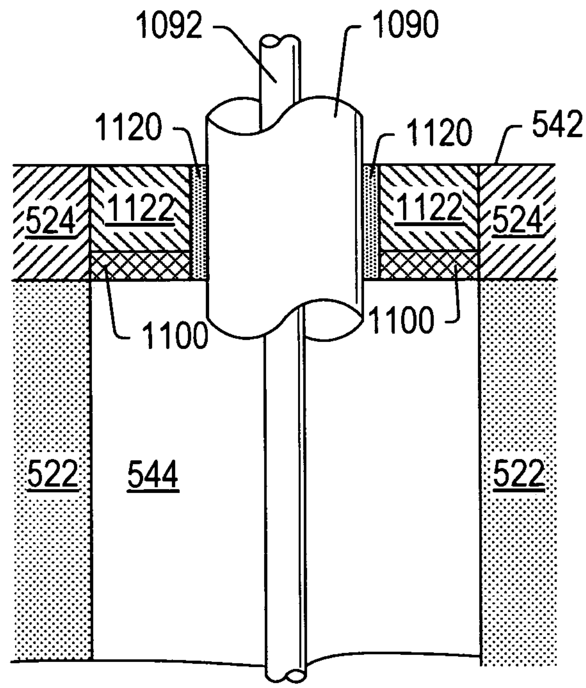
FIG. 56 depicts a portion of an overburden of a formation with a natural distributed combustor heat source.

FIG. 56 illustrates an embodiment of a section of overburden 524 with a natural distributed combustor as described in FIG. 52. Overburden casing 1120 may be disposed in overburden 524. Overburden casing 1120 may be surrounded by materials (e.g., an insulating material such as cement) that inhibit heating of overburden 524. Overburden casing 1120 may be made of a metal material such as, but not limited to, carbon steel or 304 stainless steel.

Overburden casing 1120 may be placed in reinforcing material 1122 in overburden 524. Reinforcing material 1122 may be, but is not limited to, cement, gravel, sand, and/or concrete. Packing material 1100 may be disposed between overburden casing 1120 and opening 544 in the formation. Packing material 1100 may be any substantially non-porous material (e.g., cement, concrete, grout, etc.). Packing material 1100 may inhibit flow of fluid outside of conduit 1090 and between opening 544 and surface 542. Inner conduit 1092 may introduce fluid into opening 544 in hydrocarbon layer 522. Conduit 1090 may remove combustion product (or excess oxidation fluid) from opening 544 in hydrocarbon layer 522. Diameter of conduit 1090 may be determined by an amount of the combustion product produced by oxidation in the natural distributed combustor. For example, a larger diameter may be required for a greater amount of exhaust product produced by the natural distributed combustor heater.

In some heat source embodiments, a portion of the formation adjacent to a wellbore may be heated to a temperature and at a heating rate that converts hydrocarbons to coke or char adjacent to the wellbore by a first heat source. Coke and/or char may be formed at temperatures above about 400° C. In the presence of an oxidizing fluid, the coke or char will oxidize. The wellbore may be used as a natural distributed combustor subsequent to the formation of coke and/or char. Heat may be generated from the oxidation of coke or char.

Figure 57:
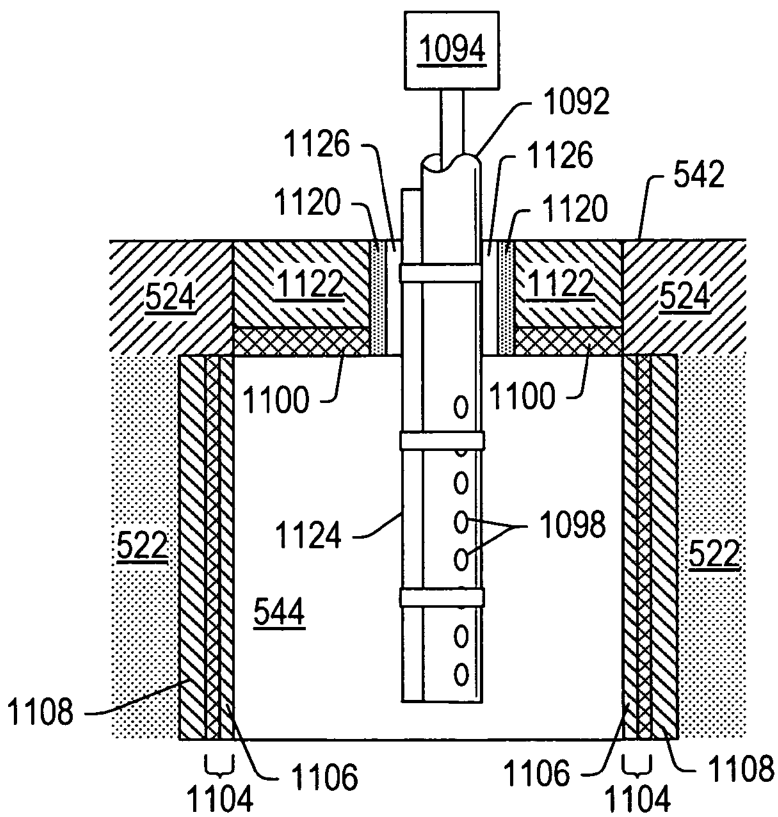
FIG. 57 depicts an embodiment of a natural distributed combustor heat source.

FIG. 57 illustrates an embodiment of a natural distributed combustor heater. Insulated conductor 1124 may be coupled to conduit 1092 and placed in opening 544 in hydrocarbon layer 522. Insulated conductor 1124 may be disposed internal to conduit 1092 (thereby allowing retrieval of insulated conductor 1124), or, alternately, coupled to an external surface of conduit 1092. Insulating material for the conductor may include, but is not limited to, mineral coating and/or ceramic coating. Conduit 1092 may have critical flow orifices 1098 disposed along its length within opening 544. Electrical current may be applied to insulated conductor 1124 to generate radiant heat in opening 544. Conduit 1092 may serve as a return for current. Insulated conductor 1124 may heat portion 1106 of hydrocarbon layer 522 to a temperature sufficient to support oxidation of hydrocarbons.

Oxidizing fluid source 1094 may provide oxidizing fluid into conduit 1092. Oxidizing fluid may be provided into opening 544 through critical flow orifices 1098 in conduit 1092. Oxidizing fluid may oxidize at least a portion of the hydrocarbon layer in reaction zone 1104. A portion of heat generated at reaction zone 1104 may transfer to selected section 1108 by convection, radiation, and/or conduction. Oxidation products may be removed through a separate conduit placed in opening 544 or through opening 1126 in overburden casing 1120.

Figure 58:
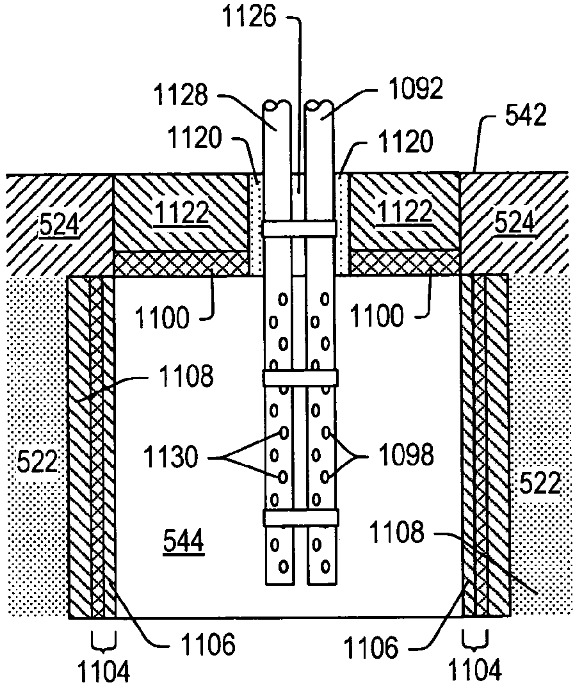
FIG. 58 depicts an embodiment of a natural distributed combustor heat source.

FIG. 58 illustrates an embodiment of a natural distributed combustor heater with an added fuel conduit. Fuel conduit 1128 may be placed in opening 544. Fuel conduit 1128 may be placed adjacent to conduit 1092 in certain embodiments. Fuel conduit 1128 may have orifices 1130 along a portion of the length within opening 544. Conduit 1092 may have orifices 1098 along a portion of the length within opening 544. Fuel conduit may have orifices 1130. In some embodiments, orifices 1130 are critical flow orifices. Orifices 1130, 1098 may be positioned so that a fuel fluid provided through fuel conduit 1128 and an oxidizing fluid provided through conduit 1092 do not react to heat the fuel conduit and the conduit. Heat from reaction of the fuel fluid with oxidizing fluid may heat fuel conduit 1128 and/or conduit 1092 to a temperature sufficient to begin melting metallurgical materials in fuel conduit 1128 and/or conduit 1092 if the reaction takes place proximate fuel conduit 1128 and/or conduit 1092. Orifices 1130 on fuel conduit 1128 and orifices 1098 on conduit 1092 may be positioned so that the fuel fluid and the oxidizing fluid do not react proximate the conduits. For example, conduits 1128 and 1092 may be positioned such that orifices that spiral around the conduits are oriented in opposite directions.

Reaction of the fuel fluid and the oxidizing fluid may produce heat. In some embodiments, the fuel fluid may be methane, ethane, hydrogen, or synthesis gas that is generated by in situ conversion in another part of the formation. The produced heat may heat portion 1106 to a temperature sufficient to support oxidation of hydrocarbons. Upon heating of portion 1106 to a temperature sufficient to support oxidation, a flow of fuel fluid into opening 544 may be turned down or may be turned off. In some embodiments, the supply of fuel may be continued throughout the heating of the formation.

The oxidizing fluid may oxidize at least a portion of the hydrocarbons at reaction zone 1104. Generated heat may transfer to selected section 1108 by radiation, convection, and/or conduction. An oxidation product may be removed through a separate conduit placed in opening 544 or through opening 1126 in overburden casing 1120.

FIG. 53 illustrates an embodiment of a system that may heat a hydrocarbon containing formation. Electric heater 1132 may be disposed within opening 544 in hydrocarbon layer 522. Opening 544 may be formed through overburden 524 into hydrocarbon layer 522. Opening 544 may be at least about 5 cm in diameter. Opening 544 may, as an example, have a diameter of about 13 cm. Electric heater 1132 may heat at least portion 1106 of hydrocarbon layer 522 to a temperature sufficient to support oxidation (e.g., about 260° C.). Portion 1106 may have a width of about 1 m. An oxidizing fluid may be provided into the opening through conduit 1090 or any other appropriate fluid transfer mechanism. Conduit 1090 may have critical flow orifices 1098 disposed along a length of the conduit.

Conduit 1090 may be a pipe or tube that provides the oxidizing fluid into opening 544 from oxidizing fluid source 1094. In an embodiment, a portion of conduit 1090 that may be exposed to high temperatures is a stainless steel tube and a portion of the conduit that will not be exposed to high temperatures (i.e., a portion of the tube that extends through the overburden) is carbon steel. The oxidizing fluid may include air or any other oxygen containing fluid (e.g., hydrogen peroxide, oxides of nitrogen, ozone). Mixtures of oxidizing fluids may be used. An oxidizing fluid mixture may be a fluid including fifty percent oxygen and fifty percent nitrogen. In some embodiments, the oxidizing fluid may include compounds that release oxygen when heated, such as hydrogen peroxide. The oxidizing fluid may oxidize at least a portion of the hydrocarbons in the formation.

Figure 59:
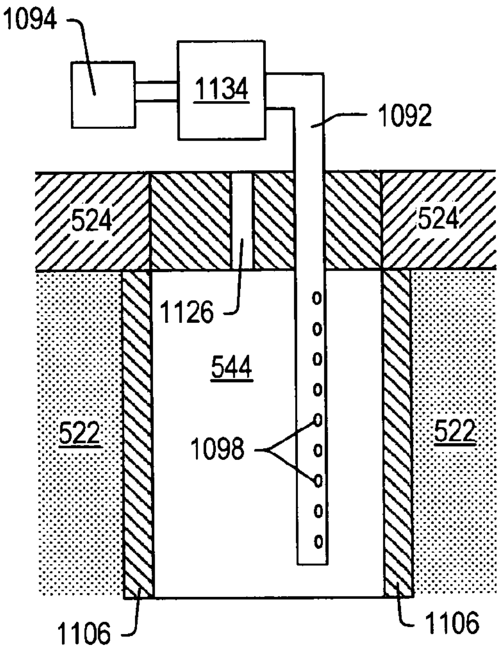
FIG. 59 depicts an embodiment of a natural distributed combustor system for heating a formation.

FIG. 59 illustrates an embodiment of a system that heats a hydrocarbon containing formation. Heat exchange unit 1134 may be disposed external to opening 544 in hydrocarbon layer 522. Opening 544 may be formed through overburden 524 into hydrocarbon layer 522. Heat exchange unit 1134 may provide heat from another surface process, or it may include a heater (e.g., an electric or combustion heater). Oxidizing fluid source 1094 may provide an oxidizing fluid to heat exchange unit 1134. Heat exchange unit 1134 may heat an oxidizing fluid (e.g., above 200° C. or to a temperature sufficient to support oxidation of hydrocarbons). The heated oxidizing fluid may be provided into opening 544 through conduit 1092. Conduit 1092 may have orifices 1098 disposed along a length of the conduit. In some embodiments, orifices 1098 may be critical flow orifices. The heated oxidizing fluid may heat, or at least contribute to the heating of, at least portion 1106 of the formation to a temperature sufficient to support oxidation of hydrocarbons. The oxidizing fluid may oxidize at least a portion of the hydrocarbons in the formation. Opening 1126 may be present to allow for release of oxidation products from the formation. The oxidation products may be sent through a piping system to a treatment facility. After temperature in the formation is sufficient to support oxidation, use of heat exchange unit 1134 may be reduced or phased out.

An embodiment of a natural distributed combustor may include a surface combustor (e.g., a flame-ignited heater). A fuel fluid may be oxidized in the combustor. The oxidized fuel fluid may be provided into an opening in the formation from the heater through a conduit. Oxidation products and unreacted fuel may return to the surface through another conduit. In some embodiments, one of the conduits may be placed within the other conduit. The oxidized fuel fluid may heat, or contribute to the heating of, a portion of the formation to a temperature sufficient to support oxidation of hydrocarbons. Upon reaching the temperature sufficient to support oxidation, the oxidized fuel fluid may be replaced with an oxidizing fluid. The oxidizing fluid may oxidize at least a portion of the hydrocarbons at a reaction zone within the formation.

An electric heater may heat a portion of the hydrocarbon containing formation to a temperature sufficient to support oxidation of hydrocarbons. The portion may be proximate or substantially adjacent to the opening in the formation. The portion may radially extend a width of less than approximately 1 m from the opening. An oxidizing fluid may be provided to the opening for oxidation of hydrocarbons. Oxidation of the hydrocarbons may heat the hydrocarbon containing formation in a process of natural distributed combustion. Electrical current applied to the electric heater may subsequently be reduced or may be turned off. Natural distributed combustion may be used in conjunction with an electric heater to provide a reduced input energy cost method to heat the hydrocarbon containing formation compared to using only an electric heater.

An insulated conductor heater may be a heater element of a heat source. In an embodiment of an insulated conductor heater, the insulated conductor heater is a mineral insulated cable or rod. An insulated conductor heater may be placed in an opening in a hydrocarbon containing formation. The insulated conductor heater may be placed in an uncased opening in the hydrocarbon containing formation. Placing the heater in an uncased opening in the hydrocarbon containing formation may allow heat transfer from the heater to the formation by radiation as well as conduction. Using an uncased opening may facilitate retrieval of the heater from the well, if necessary. Using an uncased opening may significantly reduce heat source capital cost by eliminating a need for a portion of casing able to withstand high temperature conditions. In some heat source embodiments, an insulated conductor heater may be placed within a casing in the formation; may be cemented within the formation; or may be packed in an opening with sand, gravel, or other fill material. The insulated conductor heater may be supported on a support member positioned within the opening. The support member may be a cable, rod, or a conduit (e.g., a pipe). The support member may be made of a metal, ceramic, inorganic material, or combinations thereof. Portions of a support member may be exposed to formation fluids and heat during use, so the support member may be chemically resistant and thermally resistant.

Ties, spot welds, and/or other types of connectors may be used to couple the insulated conductor heater to the support member at various locations along a length of the insulated conductor heater. The support member may be attached to a wellhead at an upper surface of the formation. In an embodiment of an insulated conductor heater, the insulated conductor heater is designed to have sufficient structural strength so that a support member is not needed. The insulated conductor heater will in many instances have some flexibility to inhibit thermal expansion damage when heated or cooled.

In certain embodiments, insulated conductor heaters may be placed in wellbores without support members and/or centralizers. An insulated conductor heater without support members and/or centralizers may have a suitable combination of temperature and corrosion resistance, creep strength, length, thickness (diameter), and metallurgy that will inhibit failure of the insulated conductor during use. For example, an insulated conductor without support members that has a working temperature limit of about 700° C. may be less than about 150 m in length and may be made of 310 stainless steel.

Figure 60:
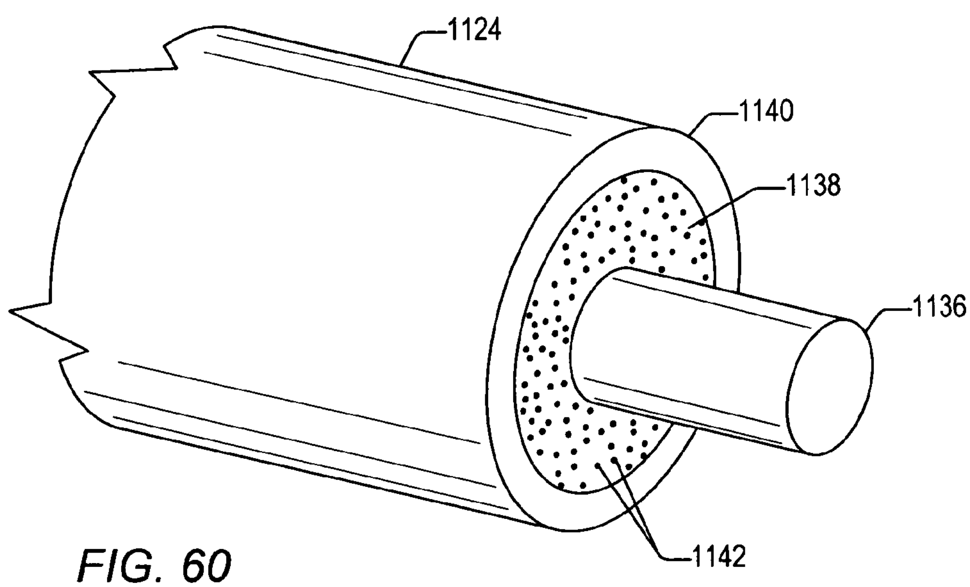
FIG. 60 depicts an embodiment of an insulated conductor heat source.

FIG. 60 depicts a perspective view of an end portion of an embodiment of insulated conductor 1124. An insulated conductor heater may have any desired cross-sectional shape, such as, but not limited to round (as shown in FIG. 60), triangular, ellipsoidal, rectangular, hexagonal, or irregular shape. An insulated conductor heater may include conductor 1136, electrical insulation 1138, and sheath 1140. Conductor 1136 may resistively heat when an electrical current passes through the conductor. An alternating or direct current may be used to heat conductor 1136. In an embodiment, a 60-cycle AC current is used.

In some embodiments, electrical insulation 1138 may inhibit current leakage and arcing to sheath 1140. Electrical insulation 1138 may also thermally conduct heat generated in conductor 1136 to sheath 1140. Sheath 1140 may radiate or conduct heat to the formation. Insulated conductor 1124 may be 1000 m or more in length. In an embodiment of an insulated conductor heater, insulated conductor 1124 may have a length from about 15 m to about 950 m. Longer or shorter insulated conductors may also be used to meet specific application needs. In embodiments of insulated conductor heaters, purchased insulated conductor heaters have lengths of about 100 m to 500 m (e.g., 230 m). In certain embodiments, dimensions of sheaths and/or conductors of an insulated conductor may be selected so that the insulated conductor has enough strength to be self supporting even at upper working temperature limits. Such insulated cables may be suspended from wellheads or supports positioned near an interface between an overburden and a hydrocarbon containing formation without the need for support members extending into the hydrocarbon containing formation along with the insulated conductors.

In an embodiment, a higher frequency current may be used to take advantage of the skin effect in certain metals. In some embodiments, a 60 cycle AC current may be used in combination with conductors made of metals that exhibit pronounced skin effects. For example, ferromagnetic metals like iron alloys and nickel may exhibit a skin effect. The skin effect confines the current to a region close to the outer surface of the conductor, thereby effectively increasing the resistance of the conductor. A high resistance may be desired to decrease the operating current, minimize ohmic losses in surface cables, and minimize the cost of treatment facilities.

Insulated conductor 1124 may be designed to operate at power levels of up to about 1650 watts/meter. Insulated conductor 1124 may typically operate at a power level between about 500 watts/meter and about 1150 watts/meter when heating a formation. Insulated conductor 1124 may be designed so that a maximum voltage level at a typical operating temperature does not cause substantial thermal and/or electrical breakdown of electrical insulation 1138. Insulated conductor 1124 may be designed so that sheath 1140 does not exceed a temperature that will result in a significant reduction in corrosion resistance properties of the sheath material.

In an embodiment of insulated conductor 1124, conductor 1136 may be designed to reach temperatures within a range between about 650° C. and about 870° C. The sheath 1140 may be designed to reach temperatures within a range between about 535° C. and about 760° C. Insulated conductors having other operating ranges may be formed to meet specific operational requirements. In an embodiment of insulated conductor 1124, conductor 1136 is designed to operate at about 760° C., sheath 1140 is designed to operate at about 650° C., and the insulated conductor heater is designed to dissipate about 820 watts/meter.

Insulated conductor 1124 may have one or more conductors 1136. For example, a single insulated conductor heater may have three conductors within electrical insulation that are surrounded by a sheath. FIG. 60 depicts insulated conductor 1124 having a single conductor 1136. The conductor may be made of metal. The material used to form a conductor may be, but is not limited to, nichrome, nickel, and a number of alloys made from copper and nickel in increasing nickel concentrations from pure copper to Alloy 30, Alloy 60, Alloy 180, and Monel. Alloys of copper and nickel may advantageously have better electrical resistance properties than substantially pure nickel or copper.

In an embodiment, the conductor may be chosen to have a diameter and a resistivity at operating temperatures such that its resistance, as derived from Ohm's law, makes it electrically and structurally stable for the chosen power dissipation per meter, the length of the heater, and/or the maximum voltage allowed to pass through the conductor. In some embodiments, the conductor may be designed using Maxwell's equations to make use of skin effect.

The conductor may be made of different materials along a length of the insulated conductor heater. For example, a first section of the conductor may be made of a material that has a significantly lower resistance than a second section of the conductor. The first section may be placed adjacent to a formation layer that does not need to be heated to as high a temperature as a second formation layer that is adjacent to the second section. The resistivity of various sections of conductor may be adjusted by having a variable diameter and/or by having conductor sections made of different materials.

A diameter of conductor 1136 may typically be between about 1.3 mm to about 10.2 mm. Smaller or larger diameters may also be used to have conductors with desired resistivity characteristics. In an embodiment of an insulated conductor heater, the conductor is made of Alloy 60 that has a diameter of about 5.8 mm.

Electrical insulator 1138 of insulated conductor 1124 may be made of a variety of materials. Pressure may be used to place electrical insulator powder between conductor 1136 and sheath 1140. Low flow characteristics and other properties of the powder and/or the sheaths and conductors may inhibit the powder from flowing out of the sheaths. Commonly used powders may include, but are not limited to, MgO, $Al_2O_3$, Zirconia, BeO, different chemical variations of Spinels, and combinations thereof. MgO may provide good thermal conductivity and electrical insulation properties. The desired electrical insulation properties include low leakage current and high dielectric strength. A low leakage current decreases the possibility of thermal breakdown and the high dielectric strength decreases the possibility of arcing across the insulator. Thermal breakdown can occur if the leakage current causes a progressive rise in the temperature of the insulator leading also to arcing across the insulator. An amount of impurities 1142 in the electrical insulator powder may be tailored to provide required dielectric strength and a low level of leakage current. Impurities 1142 added may be, but are not limited to, CaO, $Fe_2O_3$, $Al_2O_3$, and other metal oxides. Low porosity of the electrical insulation tends to reduce leakage current and increase dielectric strength. Low porosity may be achieved by increased packing of the MgO powder during fabrication or by filling of the pore space in the MgO powder with other granular materials, for example, $Al_2O_3$.

Impurities 1142 added to the electrical insulator powder may have particle sizes that are smaller than the particle sizes of the powdered electrical insulator. The small particles may occupy pore space between the larger particles of the electrical insulator so that the porosity of the electrical insulator is reduced. Examples of powdered electrical insulators that may be used to form electrical insulation 1138 are "H" mix manufactured by Idaho Laboratories Corporation (Idaho Falls, Id.) or Standard MgO used by Pyrotenax Cable Company (Trenton, Ontario) for high temperature applications. In addition, other powdered electrical insulators may be used.

Sheath 1140 of insulated conductor 1124 may be an outer metallic layer. Sheath 1140 may be in contact with hot formation fluids. Sheath 1140 may need to be made of a material having a high resistance to corrosion at elevated temperatures. Alloys that may be used in a desired operating temperature range of the sheath include, but are not limited to, 304 stainless steel, 310 stainless steel, Incoloy 800, and Inconel 600. The thickness of the sheath has to be sufficient to last for three to ten years in a hot and corrosive environment. A thickness of the sheath may generally vary between about 1 mm and about 2.5 mm. For example, a 1.3 mm thick, 310 stainless steel outer layer may be used as sheath 1140 to provide good chemical resistance to sulfidation corrosion in a heated zone of a formation for a period of over 3 years. Larger or smaller sheath thicknesses may be used to meet specific application requirements.

An insulated conductor heater may be tested after fabrication. The insulated conductor heater may be required to withstand 2-3 times an operating voltage at a selected operating temperature. Also, selected samples of produced insulated conductor heaters may be required to withstand 1000 VAC at 760° C. for one month.

Figure 62:
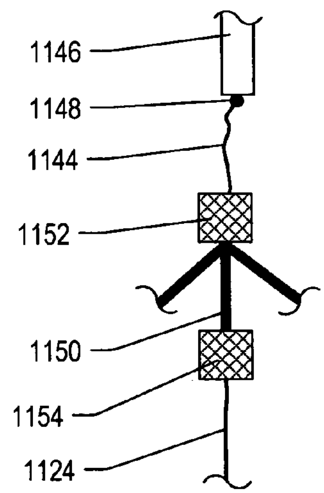
FIG. 62 depicts an embodiment of a transition section of an insulated conductor assembly.

As illustrated in FIG. 62, short flexible transition conductor 1144 may be connected to lead-in conductor 1146 using connection 1148 made during heater installation in the field. Transition conductor 1144 may be a flexible, low resistivity, stranded copper cable that is surrounded by rubber or polymer insulation. Transition conductor 1144 may typically be between about 1.5 m and about 3 m, although longer or shorter transition conductors may be used to accommodate particular needs. Temperature resistant cable may be used as transition conductor 1144. Transition conductor 1144 may also be connected to a short length of an insulated conductor heater that is less resistive than a primary heating section of the insulated conductor heater. The less resistive portion of the insulated conductor heater may be referred to as "cold pin" 1150.

Cold pin 1150 may be designed to dissipate about one-tenth to about one-fifth of the power per unit length as is dissipated in a unit length of the primary heating section. Cold pins may typically be between about 1.5 m and about 15 m, although shorter or longer lengths may be used to accommodate specific application needs. In an embodiment, the conductor of a cold pin section is copper with a diameter of about 6.9 mm and a length of 9.1 m. The electrical insulation is the same type of insulation used in the primary heating section. A sheath of the cold pin may be made of Inconel 600. Chloride corrosion cracking in the cold pin region may occur, so a chloride corrosion resistant metal such as Inconel 600 may be used as the sheath.

Small, epoxy filled canister 1152 may be used to create a connection between transition conductor 1144 and cold pin 1150. Cold pins 1150 may be connected to the primary heating sections of insulated conductor 1124 by "splices" 1154. The length of cold pin 1150 may be sufficient to significantly reduce a temperature of insulated conductor 1124. The heater section of the insulated conductor 1124 may operate from about 530° C. to about 760° C., splice 1154 may be at a temperature from about 260° C. to about 370° C., and the temperature at the lead-in cable connection to the cold pin may be from about 40° C. to about 90° C. In addition to a cold pin at a top end of the insulated conductor heater, a cold pin may also be placed at a bottom end of the insulated conductor heater. The cold pin at the bottom end may in many instances make a bottom termination easier to manufacture.

Splice material may have to withstand a temperature equal to half of a target zone operating temperature. Density of electrical insulation in the splice should in many instances be high enough to withstand the required temperature and the operating voltage.

Splice 1154 may be required to withstand 1000 VAC at 480° C. Splice material may be high temperature splices made by Idaho Laboratories Corporation or by Pyrotenax Cable Company. A splice may be an internal type of splice or an external splice. An internal splice is typically made without welds on the sheath of the insulated conductor heater. The lack of weld on the sheath may avoid potential weak spots (mechanical and/or electrical) on the insulated cable heater. An external splice is a weld made to couple sheaths of two insulated conductor heaters together. An external splice may need to be leak tested prior to insertion of the insulated cable heater into a formation. Laser welds or orbital TIG (tungsten inert gas) welds may be used to form external splices. An additional strain relief assembly may be placed around an external splice to improve the splice's resistance to bending and to protect the external splice against partial or total parting.

Figure 61:
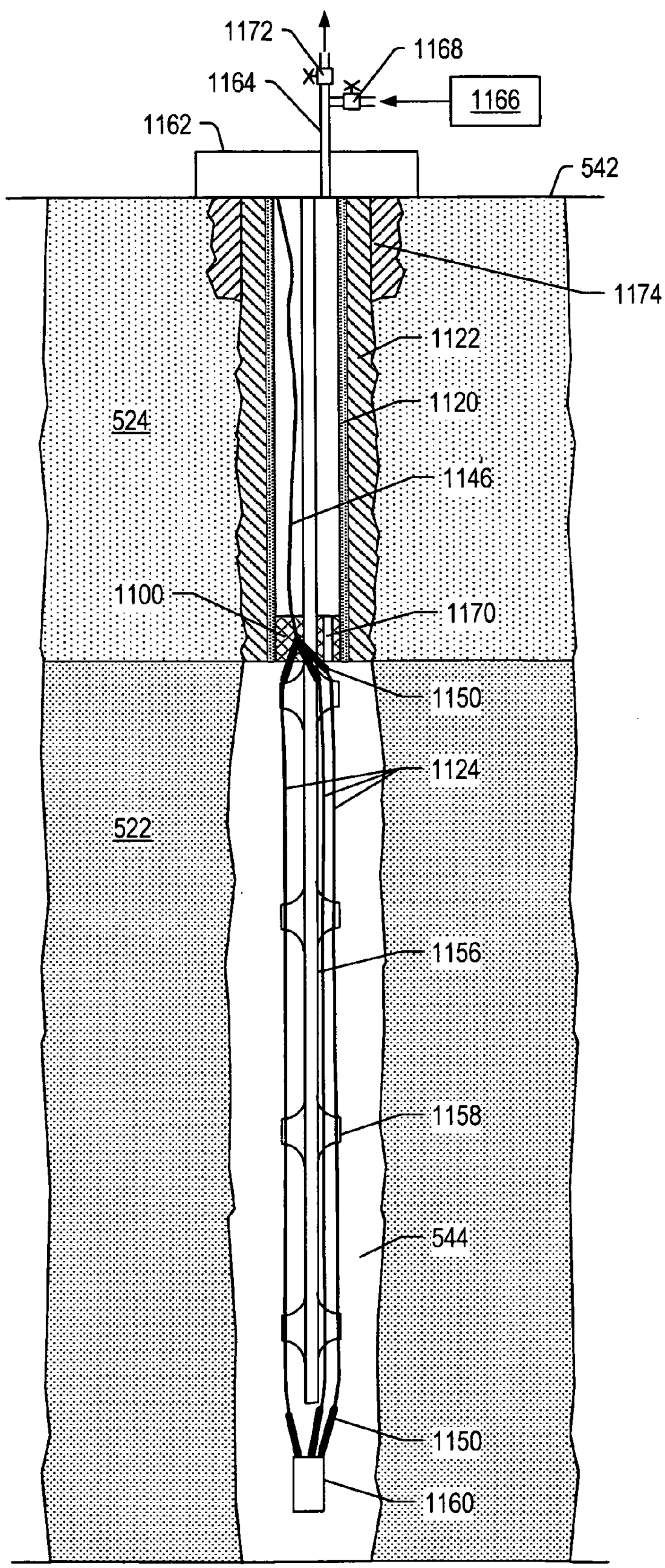
FIG. 61 depicts an embodiment of an insulated conductor heat source.

In certain embodiments, an insulated conductor assembly, such as the assembly depicted in FIG. 61 and FIG. 62, may have to withstand a higher operating voltage than normally would be used. For example, for heaters greater than about 700 m in length, voltages greater than about 2000 V may be needed for generating heat with the insulated conductor, as compared to voltages of about 480 V that may be used with heaters having lengths of less than about 225 m. In such cases, it may be advantageous to form insulated conductor 1124, cold pin 1150, transition conductor 1144, and lead-in conductor 1146 into a single insulated conductor assembly. In some embodiments, cold pin 1150 and canister 1152 may not be required as shown in FIG. 62. In such an embodiment, splice 1154 can be used to directly couple insulated conductor 1124 to transition conductor 1144.

In a heat source embodiment, insulated conductor 1124, transition conductor 1144, and lead-in conductor 1146 each include insulated conductors of varying resistance. Resistance of the conductors may be varied, for example, by altering a type of conductor, a diameter of a conductor, and/or a length of a conductor. In an embodiment, diameters of insulated conductor 1124, transition conductor 1144, and lead-in conductor 1146 are different. Insulated conductor 1124 may have a diameter of 6 mm, transition conductor 1144 may have a diameter of 7 mm, and lead-in conductor 1146 may have a diameter of 8 mm. Smaller or larger diameters may be used to accommodate site conditions (e.g., heating requirements or voltage requirements). Insulated conductor 1124 may have a higher resistance than either transition conductor 1144 or lead-in conductor 1146, such that more heat is generated in the insulated conductor. Also, transition conductor 1144 may have a resistance between a resistance of insulated conductor 1124 and lead-in conductor 1146. Insulated conductor 1124, transition conductor 1144, and lead-in conductor 1146 may be coupled using splice 1154 and/or connection 1148. Splice 1154 and/or connection 1148 may be required to withstand relatively large operating voltages depending on a length of insulated conductor 1124 and/or lead-in conductor 1146. Splice 1154 and/or connection 1148 may inhibit arcing and/or voltage breakdowns within the insulated conductor assembly. Using insulated conductors for each cable within an insulated conductor assembly may allow for higher operating voltages within the assembly.

An insulated conductor assembly may include heating sections, cold pins, splices, termination canisters and flexible transition conductors. The insulated conductor assembly may need to be examined and electrically tested before installation of the assembly into an opening in a formation. The assembly may need to be examined for competent welds and to make sure that there are no holes in the sheath anywhere along the whole heater (including the heated section, the cold pins, the splices, and the termination cans). Periodic X-ray spot checking of the commercial product may need to be made. The whole cable may be immersed in water prior to electrical testing. Electrical testing of the assembly may need to show more than 2000 megaohms at 500 VAC at room temperature after water immersion. In addition, the assembly may need to be connected to 1000 VAC and show less than about 10 microamps per meter of resistive leakage current at room temperature. In addition, a check on leakage current at about 760° C. may need to show less than about 0.4 milliamps per meter.

A number of companies manufacture insulated conductor heaters. Such manufacturers include, but are not limited to, MI Cable Technologies (Calgary, Alberta), Pyrotenax Cable Company (Trenton, Ontario), Idaho Laboratories Corporation (Idaho Falls, Id.), and Watlow (St. Louis, Mo.). As an example, an insulated conductor heater may be ordered from Idaho Laboratories as cable model 355-A90-310-"H" 30'/750'/30' with Inconel 600 sheath for the cold pins, three-phase Y configuration, and bottom jointed conductors. The specification for the heater may also include 1000 VAC, 1400° F. quality cable. The designator 355 specifies the cable OD (0.355"); A90 specifies the conductor material; 310 specifies the heated zone sheath alloy (SS 310); "H" specifies the MgO mix; and 30'/750'/30' specifies about a 230 m heated zone with cold pins top and bottom having about 9 m lengths. A similar part number with the same specification using high temperature Standard purity MgO cable may be ordered from Pyrotenax Cable Company.

One or more insulated conductor heaters may be placed within an opening in a formation to form a heat source or heat sources. Electrical current may be passed through each insulated conductor heater in the opening to heat the formation. Alternately, electrical current may be passed through selected insulated conductor heaters in an opening. The unused conductors may be backup heaters. Insulated conductor heaters may be electrically coupled to a power source in any convenient manner. Each end of an insulated conductor heater may be coupled to lead-in cables that pass through a wellhead. Such a configuration typically has a 180° bend (a "hairpin" bend) or turn located near a bottom of the heat source. An insulated conductor heater that includes a 180° bend or turn may not require a bottom termination, but the 180° bend or turn may be an electrical and/or structural weakness in the heater. Insulated conductor heaters may be electrically coupled together in series, in parallel, or in series and parallel combinations. In some embodiments of heat sources, electrical current may pass into the conductor of an insulated conductor heater and may be returned through the sheath of the insulated conductor heater by connecting conductor 1136 to sheath 1140 (shown in FIG. 60) at the bottom of the heat source.

In the embodiment of a heat source depicted in FIG. 61, three insulated conductors 1124 are electrically coupled in a 3-phase Y configuration to a power supply. The power supply may provide 60 cycle AC current to the electrical conductors. No bottom connection may be required for the insulated conductor heaters. Alternately, all three conductors of the three-phase circuit may be connected together near the bottom of a heat source opening. The connection may be made directly at ends of heating sections of the insulated conductor heaters or at ends of cold pins coupled to the heating sections at the bottom of the insulated conductor heaters. The bottom connections may be made with insulator filled and sealed canisters or with epoxy filled canisters. The insulator may be the same composition as the insulator used as the electrical insulation.

The three insulated conductor heaters depicted in FIG. 61 may be coupled to support member 1156 using centralizers 1158. Alternatively, the three insulated conductor heaters may be strapped directly to the support tube using metal straps. Centralizers 1158 may maintain a location and/or inhibit movement of insulated conductors 1124 on support member 1156. Centralizers 1158 may be made of metal, ceramic, or combinations thereof. The metal may be stainless steel or any other type of metal able to withstand a corrosive and hot environment. In some embodiments, centralizers 1158 may be bowed metal strips welded to the support member at distances less than about 6 m. A ceramic used in centralizer 1158 may be, but is not limited to, $Al_2O_3$, MgO, or other insulator. Centralizers 1158 may maintain a location of insulated conductors 1124 on support member 1156 such that movement of insulated conductor heaters is inhibited at operating temperatures of the insulated conductor heaters. Insulated conductors 1124 may also be somewhat flexible to withstand expansion of support member 1156 during heating.

Support member 1156, insulated conductor 1124, and centralizers 1158 may be placed in opening 544 in hydrocarbon layer 522. Insulated conductors 1124 may be coupled to bottom conductor junction 1160 using cold pin 1150. Bottom conductor junction 1160 may electrically couple each insulated conductor 562 to each other. Bottom conductor junction 1160 may include materials that are electrically conducting and do not melt at temperatures found in opening 544. Cold pin transition conductor 1150 may be an insulated conductor heater having lower electrical resistance than insulated conductor 1124. As illustrated in FIG. 62, cold pin 1150 may be coupled to transition conductor 1144 and insulated conductor 1124. Cold pin transition conductor 1150 may provide a temperature transition between transition conductor 1144 and insulated conductor 1124.

Lead-in conductor 1146 may be coupled to wellhead 1162 to provide electrical power to insulated conductor 1124. Lead-in conductor 1146 may be made of a relatively low electrical resistance conductor such that relatively little heat is generated from electrical current passing through lead-in conductor 1146. In some embodiments, the lead-in conductor is a rubber or polymer insulated stranded copper wire. In some embodiments, the lead-in conductor is a mineral-insulated conductor with a copper core. Lead-in conductor 1146 may couple to wellhead 1162 at surface 542 through a sealing flange located between overburden 524 and surface 542. The sealing flange may inhibit fluid from escaping from opening 544 to surface 542.

Packing material 1100 may be placed between overburden casing 1120 and opening 544. In some embodiments, reinforcing material 1122 may secure overburden casing 1120 to overburden 524. In an embodiment of a heat source, overburden casing is a 7.6 cm (3 inch) diameter carbon steel, schedule 40 pipe. Packing material 1100 may inhibit fluid from flowing from opening 544 to surface 542. Reinforcing material 1122 may include, for example, Class G or Class H Portland cement mixed with silica flour for improved high temperature performance, slag or silica flour, and/or a mixture thereof (e.g., about 1.58 grams per cubic centimeter slag/silica flour). In some heat source embodiments, reinforcing material 1122 extends radially a width of from about 5 cm to about 25 cm. In some embodiments, reinforcing material 1122 may extend radially a width of about 10 cm to about 15 cm.

In certain embodiments, one or more conduits may be provided to supply additional components (e.g., nitrogen, carbon dioxide, reducing agents such as gas containing hydrogen, etc.) to formation openings, to bleed off fluids, and/or to control pressure. Formation pressures tend to be highest near heating sources. Providing pressure control equipment in heat sources may be beneficial. In some embodiments, adding a reducing agent proximate the heating source assists in providing a more favorable pyrolysis environment (e.g., a higher hydrogen partial pressure). Since permeability and porosity tend to increase more quickly proximate the heating source, it is often optimal to add a reducing agent proximate the heating source so that the reducing agent can more easily move into the formation.

Conduit 1164, depicted in FIG. 61, may be provided to add gas from gas source 1166, through valve 1168, and into opening 544. Opening 1170 is provided in packing material 1100 to allow gas to pass into opening 544. Conduit 1164 and valve 1172 may be used at different times to bleed off pressure and/or control pressure proximate opening 544. Conduit 1164, depicted in FIG. 65, may be provided to add gas from gas source 1166, through valve 1168, and into opening 544. An opening is provided in reinforcing material 1122 to allow gas to pass into opening 544. Conduit 1164 and valve 1172 may be used at different times to bleed off pressure and/or control pressure proximate opening 544. It is to be understood that any of the heating sources described herein may also be equipped with conduits to supply additional components, bleed off fluids, and/or to control pressure.

As shown in FIG. 61, support member 1156 and lead-in conductor 1146 may be coupled to wellhead 1162 at surface 542 of the formation. Surface conductor 1174 may enclose reinforcing material 1122 and couple to wellhead 1162. Embodiments of surface conductor 1174 may have an outer diameter of about 10.16 cm to about 30.48 cm or, for example, an outer diameter of about 22 cm. Embodiments of surface conductors may extend to depths of approximately 3m to approximately 515 m into an opening in the formation. Alternatively, the surface conductor may extend to a depth of approximately 9 m into the opening. Electrical current may be supplied from a power source to insulated conductor 1124 to generate heat due to the electrical resistance of conductor 1136 as illustrated in FIG. 60. As an example, a voltage of about 330 volts and a current of about 266 amps are supplied to insulated conductor 1124 to generate a heat of about 1150 watts/meter in insulated conductor 1124. Heat generated from the three insulated conductors 1124 may transfer (e.g., by radiation) within opening 544 to heat at least a portion of the hydrocarbon layer 522.

Figure 63:
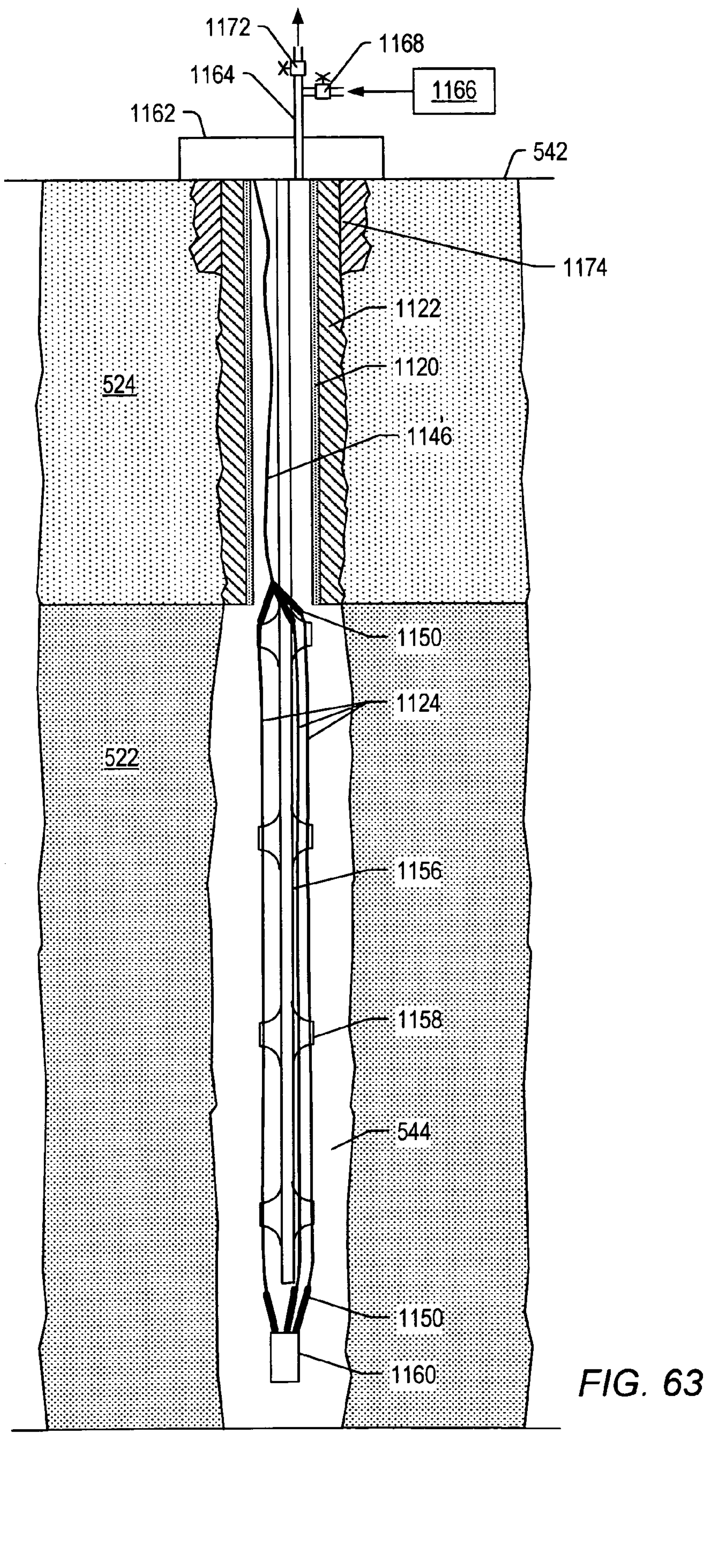
FIG. 63 depicts an embodiment of an insulated conductor heat source.

FIG. 63 depicts an embodiment of an insulated conductor heat source. Insulated conductor 1124 is removable from opening 544 in the formation.

An appropriate configuration of an insulated conductor heater may be determined by optimizing a material cost of the heater based on a length of heater, a power required per meter of conductor, and a desired operating voltage. In addition, an operating current and voltage may be chosen to optimize the cost of input electrical energy in conjunction with a material cost of the insulated conductor heaters. For example, as input electrical energy increases, the cost of materials needed to withstand the higher voltage may also increase. The insulated conductor heaters may generate radiant heat of approximately 650 watts/meter of conductor to approximately 1650 watts/meter of conductor. The insulated conductor heater may operate at a temperature between approximately 530° C. and approximately 760° C. within a formation.

Heat generated by an insulated conductor heater may heat at least a portion of a hydrocarbon containing formation. In some embodiments, heat may be transferred to the formation substantially by radiation of the generated heat to the formation. Some heat may be transferred by conduction or convection of heat due to gases present in the opening. The opening may be an uncased opening. An uncased opening eliminates cost associated with thermally cementing the heater to the formation, costs associated with a casing, and/or costs of packing a heater within an opening. In addition, heat transfer by radiation is typically more efficient than by conduction, so the heaters may be operated at lower temperatures in an open wellbore. Conductive heat transfer during initial operation of a heat source may be enhanced by the addition of a gas in the opening. The gas may be maintained at a pressure up to about 27 bars absolute. The gas may include, but is not limited to, carbon dioxide and/or helium. An insulated conductor heater in an open wellbore may advantageously be free to expand or contract to accommodate thermal expansion and contraction. An insulated conductor heater may advantageously be removable or redeployable from an open wellbore.

In an embodiment, an insulated conductor heater may be installed or removed using a spooling assembly. More than one spooling assembly may be used to install both the insulated conductor and a support member simultaneously. U.S. Pat. No. 4,572,299 issued to Van Egmond et al., which is incorporated by reference as if fully set forth herein, describes spooling an electric heater into a well. Alternatively, the support member may be installed using a coiled tubing unit. Coiled tubing techniques are described in PCT Patent Nos. WO/0043630 and WO/0043631. The heaters may be unspooled and connected to the support as the support is inserted into the well. The electric heater and the support member may be un-spooled from the spooling assemblies. Spacers may be coupled to the support member and the heater along a length of the support member. Additional spooling assemblies may be used for additional electric heater elements.

Figure 66:
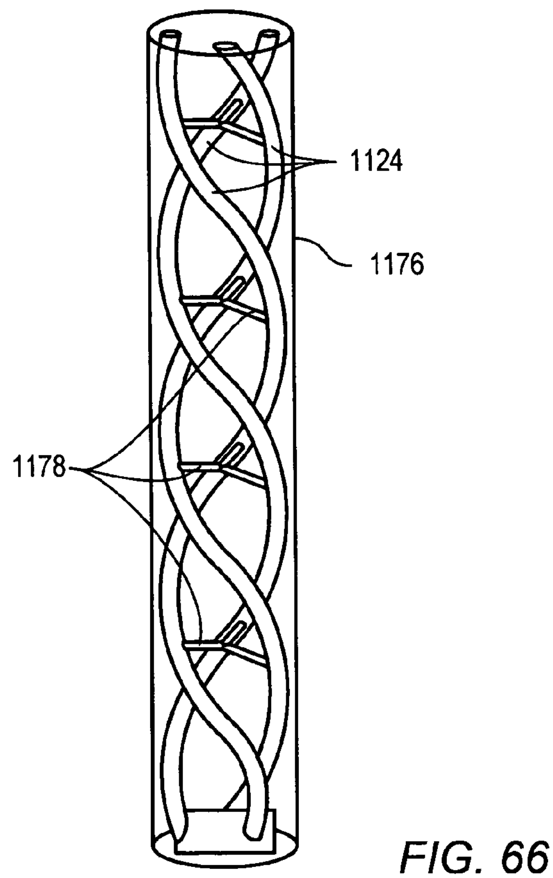
FIG. 66 depicts an embodiment of three insulated conductor heaters placed within a conduit.

In an in situ conversion process embodiment, a heater may be installed in a substantially horizontal wellbore. Installing a heater in a wellbore (whether vertical or horizontal) may include placing one or more heaters (e.g., three mineral insulated conductor heaters) within a conduit. FIG. 66 depicts an embodiment of a portion of three insulated conductor heaters 1124 placed within conduit 1176. Insulated conductor heaters 1124 may be spaced within conduit 1176 using spacers 1178 to locate the insulated conductor heater within the conduit.

The conduit may be reeled onto a spool. The spool may be placed on a transporting platform such as a truck bed or other platform that can be transported to a site of a wellbore. The conduit may be unreeled from the spool at the wellbore and inserted into the wellbore to install the heater within the wellbore. A welded cap may be placed at an end of the coiled conduit. The welded cap may be placed at an end of the conduit that enters the wellbore first. The conduit may allow easy installation of the heater into the wellbore. The conduit may also provide support for the heater.

In some heat source embodiments, coiled tubing installation may be used to install one or more wellbore elements placed in openings in a formation for an in situ conversion process. For example, a coiled conduit may be used to install other types of wells in a formation. The other types of wells may be, but are not limited to, monitor wells, freeze wells or portions of freeze wells, dewatering wells or portions of dewatering wells, outer casings, injection wells or portions of injection wells, production wells or portions of production wells, and heat sources or portions of heat sources. Installing one or more wellbore elements using a coiled conduit installation process may be less expensive and faster than using other installation processes.

Coiled tubing installation may reduce a number of welded and/or threaded connections in a length of casing. Welds and/or threaded connections in coiled tubing may be pretested for integrity (e.g., by hydraulic pressure testing). Coiled tubing is available from Quality Tubing, Inc. (Houston, Tex.), Precision Tubing (Houston, Tex.), and other manufacturers. Coiled tubing may be available in many sizes and different materials. Sizes of coiled tubing may range from about 2.5 cm (1 inch) to about 15 cm (6 inches). Coiled tubing may be available in a variety of different metals, including carbon steel. Coiled tubing may be spooled on a large diameter reel. The reel may be carried on a coiled tubing unit. Suitable coiled tubing units are available from Halliburton (Duncan, Okla.), Fleet Cementers, Inc. (Cisco, Tex.), and Coiled Tubing Solutions, Inc. (Eastland, Tex.). Coiled tubing may be unwound from the reel, passed through a straightener, and inserted into a wellbore. A wellcap may be attached (e.g., welded) to an end of the coiled tubing before inserting the coiled tubing into a well. After insertion, the coiled tubing may be cut from the coiled tubing on the reel.

In some embodiments, coiled tubing may be inserted into a previously cased opening, e.g., if a well is to be used later as a heater well, production well, or monitoring well. Alternately, coiled tubing installed within a wellbore can later be perforated (e.g., with a perforation gun) and used as a production conduit.

Embodiments of heat sources, production wells, and/or freeze wells may be installed in a formation using coiled tubing installation. Some embodiments of heat sources, production wells, and freeze wells include an element placed within an outer casing. For example, a conductor-in-conduit heater may include an outer conduit with an inner conduit placed in the outer conduit. A production well may include a heater element or heater elements placed within a casing to inhibit condensation and refluxing of vapor phase production fluids. A freeze well may include a refrigerant input line placed within a casing, or a refrigeration inlet and outlet line. Spacers may be spaced along a length of an element, or elements, positioned within a casing to inhibit the element, or elements, from contacting walls of the casing.

In some embodiments of heat sources, production wells, and freeze wells, casings may be installed using coiled tube installation. Elements may be placed within the casing after the casing is placed in the formation for heat sources or wells that include elements within the casings. In some embodiments, sections of casings may be threaded and/or welded and inserted into a wellbore using a drilling rig or workover rig. In some embodiments of heat sources, production wells, and freeze wells, elements may be placed within the casing before the casing is wound onto a reel.

Some wells may have sealed casings that inhibit fluid flow from the formation into the casing. Sealed casings also inhibit fluid flow from the casing into the formation. Some casings may be perforated, screened, or have other types of openings that allow fluid to pass into the casing from the formation, or fluid from the casing to pass into the formation. In some embodiments, portions of wells are open wellbores that do not include casings.

In an embodiment, the support member may be installed using standard oil field operations and welding different sections of support. Welding may be done by using orbital welding. For example, a first section of the support member may be disposed into the well. A second section (e.g., of substantially similar length) may be coupled to the first section in the well. The second section may be coupled by welding the second section to the first section. An orbital welder disposed at the wellhead may weld the second section to the first section. This process may be repeated with subsequent sections coupled to previous sections until a support of desired length is within the well.

Figure 64:
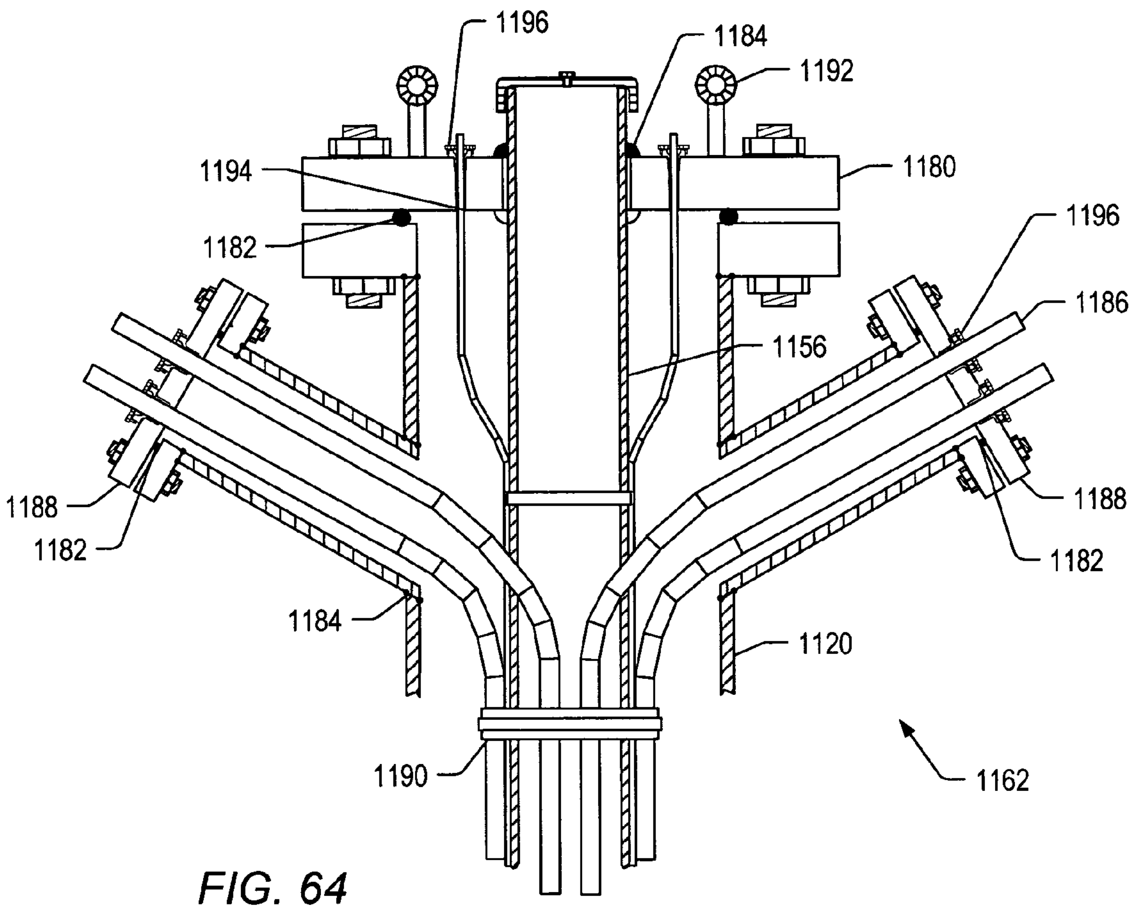
FIG. 64 depicts an embodiment of a wellhead of an insulated conductor heat source.

FIG. 64 illustrates a cross-sectional view of one embodiment of a wellhead coupled to overburden casing 1120. Flange 1180 may be coupled to, or may be a part of, wellhead 1162. Flange 1180 may be formed of carbon steel, stainless steel, or any other material. Flange 1180 may be sealed with seal 1182. Seal may be an O-ring, gasket, compression seal, or other type of seal. Support member 1156 may be coupled to flange 1180. Support member 1156 may support one or more insulated conductor heaters. In an embodiment, support member 1156 is sealed in flange 1180 by welds 1184.

Power conductor 1186 may be coupled to a lead-in cable and/or an insulated conductor heater. Power conductor 1186 may provide electrical energy to the insulated conductor heater. Power conductor 1186 may be positioned through flange 1188. Sealing flange 1188 may be sealed with seal 1182. Power conductor 1186 may be coupled to support member 1156 with band 1190. Band 1190 may include a rigid and corrosion resistant material such as stainless steel. Wellhead 1162 may be sealed with weld 1184 such that fluids are inhibited from escaping the formation through wellhead 1162. Lift bolt 1192 may lift wellhead 1162 and support member 1156.

Thermocouple 1194 may be provided through flange 1180. Thermocouple 1194 may measure a temperature on or proximate support member 1156 within the heated portion of the well. Compression fittings 1196 may serve to seal power cable 1186. Compression fittings 1196 may also be used to seal thermocouple 1194. The compression fittings may inhibit fluids from escaping the formation. Wellhead 1162 may also include a pressure control valve. The pressure control valve may control pressure within an opening in which support member 1156 is disposed.

In a heat source embodiment, a control system may control electrical power supplied to an insulated conductor heater. Power supplied to the insulated conductor heater may be controlled with any appropriate type of controller. For alternating current, the controller may be, but is not limited to, a tapped transformer or a zero crossover electric heater firing SCR (silicon controlled rectifier) controller. Zero crossover electric heater firing control may be achieved by allowing full supply voltage to the insulated conductor heater to pass through the insulated conductor heater for a specific number of cycles, starting at the "crossover," where an instantaneous voltage may be zero, continuing for a specific number of complete cycles, and discontinuing when the instantaneous voltage again crosses zero. A specific number of cycles may be blocked, allowing control of the heat output by the insulated conductor heater. For example, the control system may be arranged to block fifteen and/or twenty cycles out of each sixty cycles that are supplied by a standard 60 Hz alternating current power supply. Zero crossover firing control may be advantageously used with materials having low temperature coefficient materials. Zero crossover firing control may inhibit current spikes from occurring in an insulated conductor heater.

Figure 65:
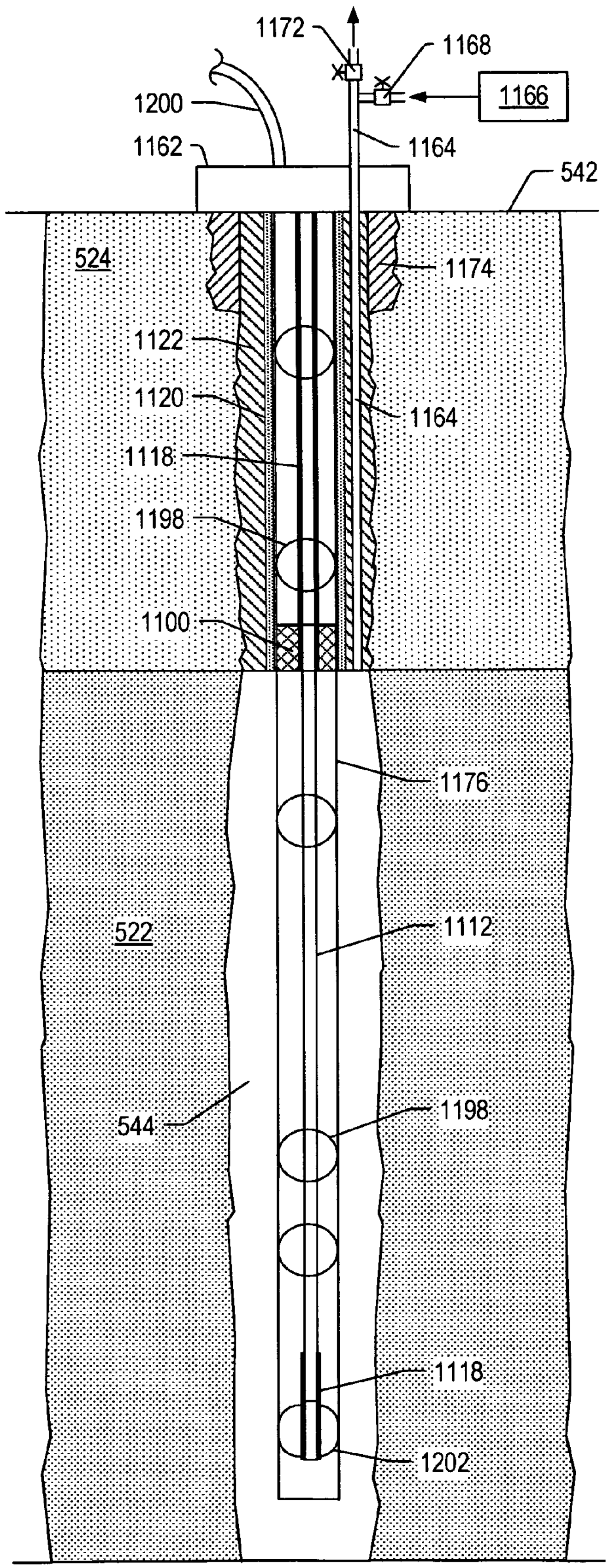
FIG. 65 depicts an embodiment of a conductor-in-conduit heat source in a formation.

FIG. 65 illustrates an embodiment of a conductor-in-conduit heater that may heat a hydrocarbon containing formation. Conductor 1112 may be disposed in conduit 1176. Conductor 1112 may be a rod or conduit of electrically conductive material. Low resistance sections 1118 may be present at both ends of conductor 1112 to generate less heating in these sections. Low resistance section 1118 may be formed by having a greater cross-sectional area of conductor 1112 in that section, or the sections may be made of material having less resistance. In certain embodiments, low resistance section 1118 includes a low resistance conductor coupled to conductor 1112. In some heat source embodiments, conductors 1112 may be 316, 304, or 310 stainless steel rods with diameters of approximately 2.8 cm. In some heat source embodiments, conductors are 316, 304, or 310 stainless steel pipes with diameters of approximately 2.5 cm. Larger or smaller diameters of rods or pipes may be used to achieve desired heating of a formation. The diameter and/or wall thickness of conductor 1112 may be varied along a length of the conductor to establish different heating rates at various portions of the conductor.

Conduit 1176 may be made of an electrically conductive material. For example, conduit 1176 may be a 7.6 cm, schedule 40 pipe made of 316, 304, or 310 stainless steel. Conduit 1176 may be disposed in opening 544 in hydrocarbon layer 522. Opening 544 has a diameter able to accommodate conduit 1176. A diameter of the opening may be from about 10 cm to about 13 cm. Larger or smaller diameter openings may be used to accommodate particular conduits or designs.

Figure 67:
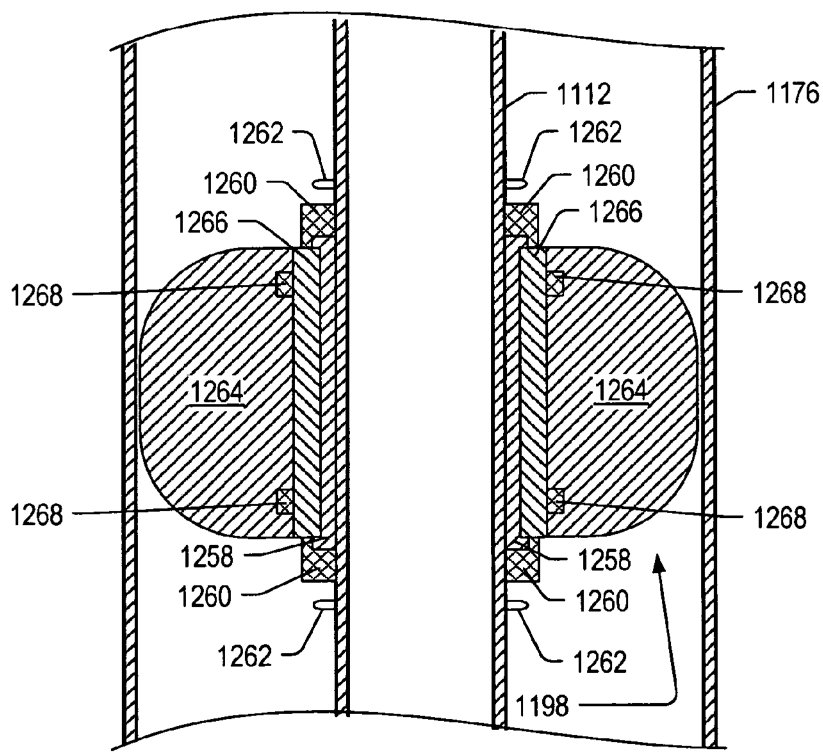
FIG. 67 depicts an embodiment of a centralizer.
Figure 68:
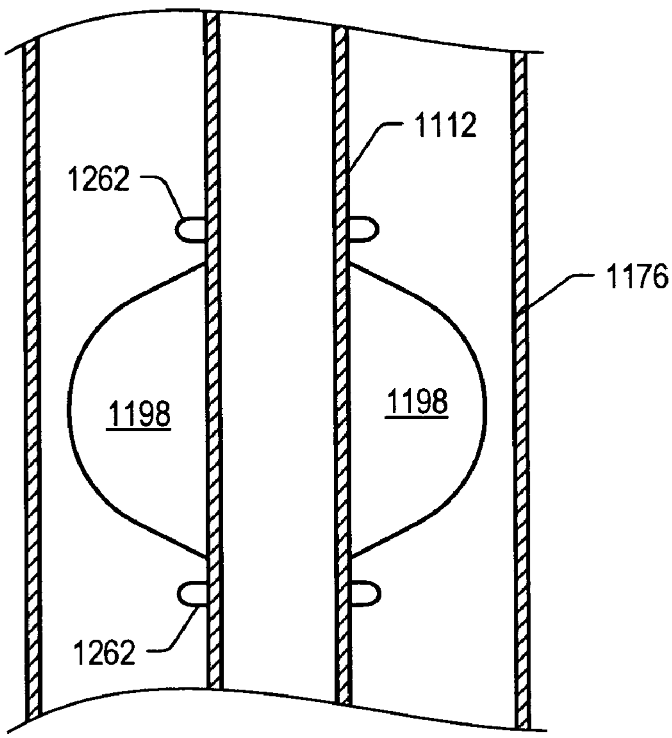
FIG. 68 depicts an embodiment of a centralizer.
Figure 69:
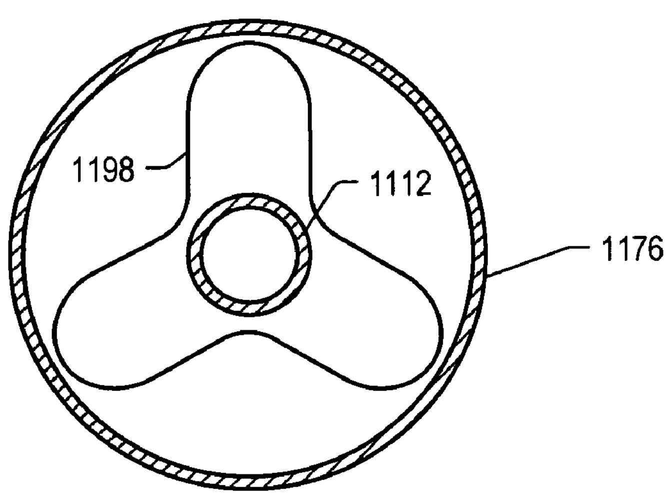
FIG. 69 depicts an embodiment of a centralizer.

Conductor 1112 may be centered in conduit 1176 by centralizer 1198. Centralizer 1198 may electrically isolate conductor 1112 from conduit 1176. Centralizer 1198 may inhibit movement and properly locate conductor 1112 within conduit 1176. Centralizer 1198 may be made of a ceramic material or a combination of ceramic and metallic materials. Centralizers 1198 may inhibit deformation of conductor 1112 in conduit 1176. Centralizer 1198 may be spaced at intervals between approximately 0.5 m and approximately 3 m along conductor 1112. FIGS. 67, 68, and 69 depict embodiments of centralizers 1198.

A second low resistance section 1118 of conductor 1112 may couple conductor 1112 to wellhead 1162, as depicted in FIG. 65. Electrical current may be applied to conductor 1112 from power cable 1200 through low resistance section 1118 of conductor 1112. Electrical current may pass from conductor 1112 through sliding connector 1202 to conduit 1176. Conduit 1176 may be electrically insulated from overburden casing 1120 and from wellhead 1162 to return electrical current to power cable 1200. Heat may be generated in conductor 1112 and conduit 1176. The generated heat may radiate within conduit 1176 and opening 544 to heat at least a portion of hydrocarbon layer 522. As an example, a voltage of about 330 volts and a current of about 795 amps may be supplied to conductor 1112 and conduit 1176 in a 229 m (750 ft) heated section to generate about 1150 watts/meter of conductor 1112 and conduit 1176.

Overburden casing 1120 may be disposed in overburden 524. Overburden casing 1120 may, in some embodiments, be surrounded by materials that inhibit heating of overburden 524. Low resistance section 1118 of conductor 1112 may be placed in overburden casing 1120. Low resistance section 1118 of conductor 1112 may be made of, for example, carbon steel. Low resistance section 1118 may have a diameter between about 2 cm to about 5 cm or, for example, a diameter of about 4 cm. Low resistance section 1118 of conductor 1112 may be centralized within overburden casing 1120 using centralizers 1198. Centralizers 1198 may be spaced at intervals of approximately 6 m to approximately 12 m or, for example, approximately 9 m along low resistance section 1118 of conductor 1112. In a heat source embodiment, low resistance section 1118 of conductor 1112 is coupled to conductor 1112 by a weld or welds. In other heat source embodiments, low resistance sections may be threaded, threaded and welded, or otherwise coupled to the conductor. Low resistance section 1118 may generate little and/or no heat in overburden casing 1120. Packing material 1100 may be placed between overburden casing 1120 and opening 544. Packing material 1100 may inhibit fluid from flowing from opening 544 to surface 542.

In a heat source embodiment, overburden conduit is a 7.6 cm schedule 40 carbon steel pipe. In some embodiments, the overburden conduit may be cemented in the overburden. Reinforcing material 1122 may be slag or silica flour or a mixture thereof (e.g., about 1.58 grams per cubic centimeter slag/silica flour). Reinforcing material 1122 may extend radially a width of about 5 cm to about 25 cm. Reinforcing material 1122 may also be made of material designed to inhibit flow of heat into overburden 524. In other heat source embodiments, overburden may not be cemented into the formation. Having an uncemented overburden casing may facilitate removal of conduit 1176 if the need for removal should arise.

Surface conductor 1174 may couple to wellhead 1162. Surface conductor 1174 may have a diameter of about 10 cm to about 30 cm or, in certain embodiments, a diameter of about 22 cm. Electrically insulating sealing flanges may mechanically couple low resistance section 1118 of conductor 1112 to wellhead 1162 and to electrically couple low resistance section 1118 to power cable 1200. The electrically insulating sealing flanges may couple power cable 1200 to wellhead 1162. For example, power cable 1200 may be a copper cable, wire, or other elongated member. Power cable 1200 may include any material having a substantially low resistance. The power cable may be clamped to the bottom of the low resistance conductor to make electrical contact.

In an embodiment, heat may be generated in or by conduit 1176. About 10% to about 30%, or, for example, about 20%, of the total heat generated by the heater may be generated in or by conduit 1176. Both conductor 1112 and conduit 1176 may be made of stainless steel. Dimensions of conductor 1112 and conduit 1176 may be chosen such that the conductor will dissipate heat in a range from approximately 650 watts per meter to 1650 watts per meter. A temperature in conduit 1176 may be approximately 480° C. to approximately 815° C., and a temperature in conductor 1112 may be approximately 500° C. to 840° C. Substantially uniform heating of a hydrocarbon containing formation may be provided along a length of conduit 1176 greater than about 300 m or even greater than about 600 m.

Figure 70:
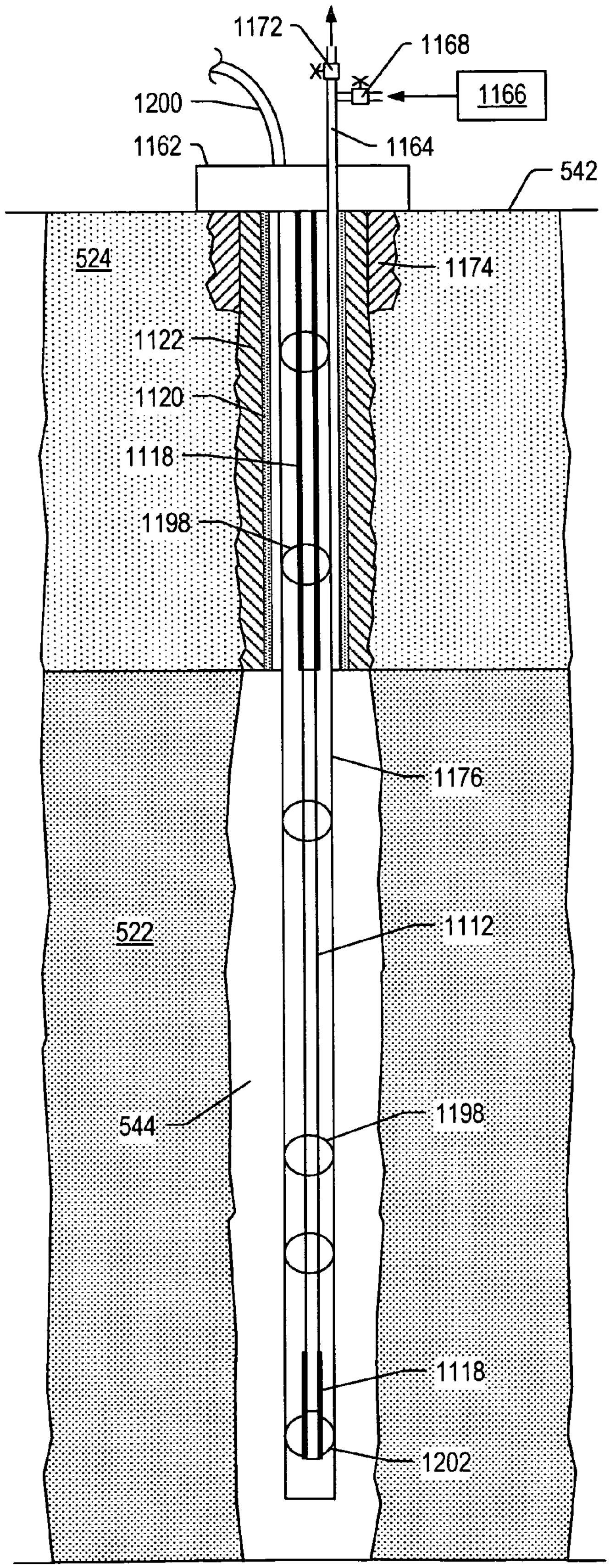
FIG. 70 depicts a cross-sectional representation of an embodiment of a removable conductor-in-conduit heat source.

FIG. 70 depicts a cross-sectional representation of an embodiment of a removable conductor-in-conduit heat source. Conduit 1176 may be placed in opening 544 through overburden 524 such that a gap remains between the conduit and overburden casing 1120. Fluids may be removed from opening 544 through the gap between conduit 1176 and overburden casing 1120. Fluids may be removed from the gap through conduit 1164. Conduit 1176 and components of the heat source included within the conduit that are coupled to wellhead 1162 may be removed from opening 544 as a single unit. The heat source may be removed as a single unit to be repaired, replaced, and/or used in another portion of the formation.

In certain embodiments, portions of a conductor-in-conduit heat source may be moved or removed to adjust a portion of the formation that is heated by the heat source. For example, in a horizontal well the conductor-in-conduit heat source may be initially almost as long as the opening in the formation. As products are produced from the formation, the conductor-in-conduit heat source may be moved so that it is placed at location further from the end of the opening in the formation. Heat may be applied to a different portion of the formation by adjusting the location of the heat source. In certain embodiments, an end of the heater may be coupled to a sealing mechanism (e.g., a packing mechanism, or a plugging mechanism) to seal off perforations in a liner or casing. The sealing mechanism may inhibit undesired fluid production from portions of the heat source wellbore from which the conductor-in-conduit heat source has been removed.

Figure 71:
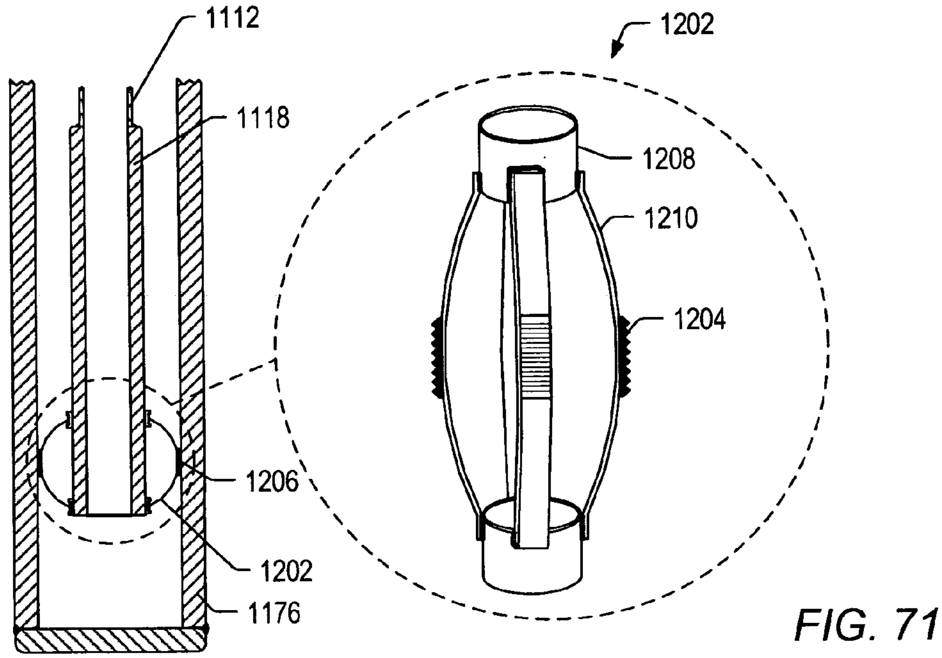
FIG. 71 depicts an embodiment of a sliding connector.

As depicted in FIG. 71, sliding connector 1202 may be coupled near an end of conductor 1112. Sliding connector 1202 may be positioned near a bottom end of conduit 1176. Sliding connector 1202 may electrically couple conductor 1112 to conduit 1176. Sliding connector 1202 may move during use to accommodate thermal expansion and/or contraction of conductor 1112 and conduit 1176 relative to each other. In some embodiments, sliding connector 1202 may be attached to low resistance section 1118 of conductor 1112. The lower resistance of low resistance section 1118 may allow the sliding connector to be at a temperature that does not exceed about 90° C. Maintaining sliding connector 1202 at a relatively low temperature may inhibit corrosion of the sliding connector and promote good contact between the sliding connector and conduit 1176.

Sliding connector 1202 may include scraper 1204. Scraper 1204 may abut an inner surface of conduit 1176 at point 1206. Scraper 1204 may include any metal or electrically conducting material (e.g., steel or stainless steel). Centralizer 1208 may couple to conductor 1112. In some embodiments, sliding connector 1202 may be positioned on low resistance section 1118 of conductor 1112. Centralizer 1208 may include any electrically conducting material (e.g., a metal or metal alloy). Spring bow 1210 may couple scraper 1204 to centralizer 1208. Spring bow 1210 may include any metal or electrically conducting material (e.g., copper-beryllium alloy). In some embodiments, centralizer 1208, spring bow 1210, and/or scraper 1204 are welded together.

More than one sliding connector 1202 may be used for redundancy and to reduce the current through each scraper 1204. In addition, a thickness of conduit 1176 may be increased for a length adjacent to sliding connector 1202 to reduce heat generated in that portion of conduit. The length of conduit 1176 with increased thickness may be, for example, approximately 6 m.

Figure 72:
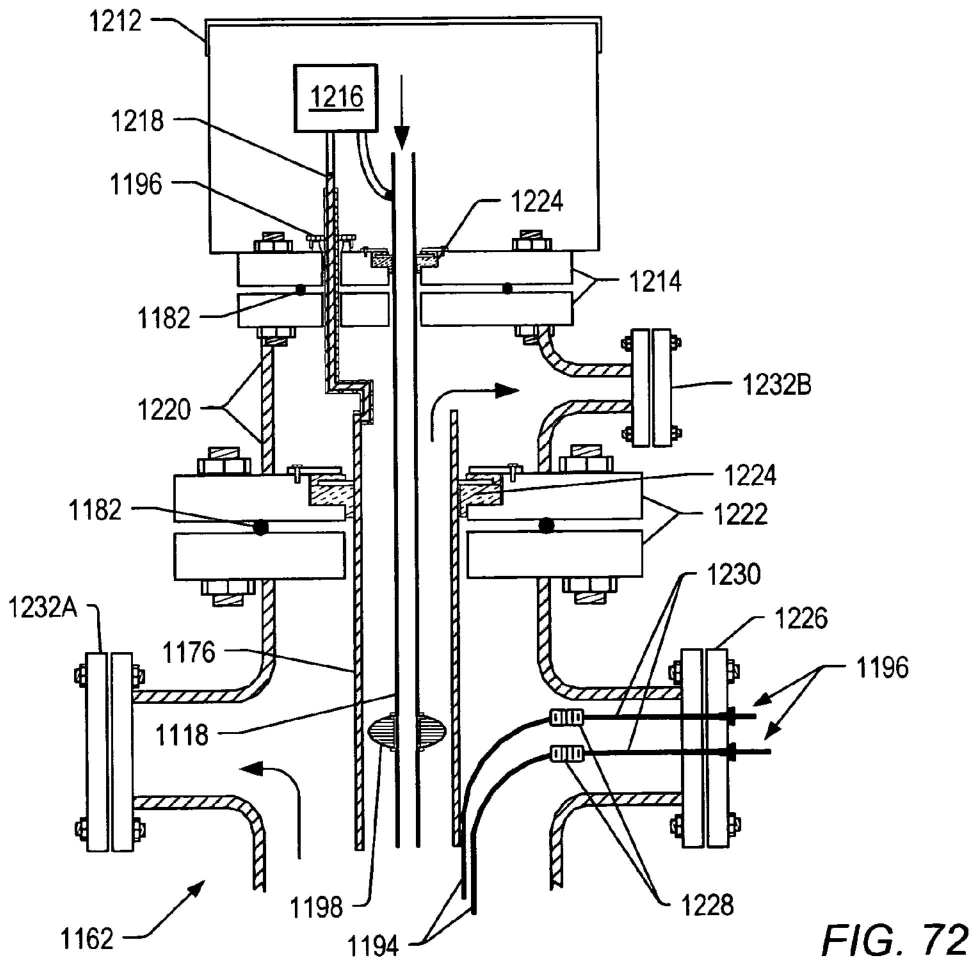
FIG. 72 depicts an embodiment of a wellhead with a conductor-in-conduit heat source.

FIG. 72 illustrates an embodiment of wellhead 1162. Wellhead 1162 may be coupled to electrical junction box 1212 by flange 1214 or any other suitable mechanical device. Electrical junction box 1212 may control power (current and voltage) supplied to an electric heater. Power source 1216 may be included in electrical junction box 1212. In a heat source embodiment, the electric heater is a conductor-in-conduit heater. Flange 1214 may include stainless steel or any other suitable sealing material. Conductor 1218 may electrically couple conduit 1176 to power source 1216. In some embodiments, power source 1216 may be located outside wellhead 1162 and the power source is coupled to the wellhead with power cable 1200, as shown in FIG. 65. Low resistance section 1118 may be coupled to power source 1216. Compression fitting 1196 may seal conductor 1218 at an inner surface of electrical junction box 1212.

Flange 1214 may be sealed with seal 1182. In some embodiments, seal 1182 may be a metal o-ring. Conduit 1220 may couple flange 1214 to flange 1222. Flange 1222 may couple to an overburden casing. Flange 1222 may be sealed with seal 1182 (e.g., metal o-ring or steel o-ring). Low resistance section 1118 of the conductor may couple to electrical junction box 1212. Low resistance section 1118 may be passed through flange 1214. Low resistance section 1118 may be sealed in flange 1214 with seal assembly 1224. Assemblies 1224 are designed to insulate low resistance section 1118 from flange 1214 and flange 1222. Seals 1182 may be designed to electrically insulate conductor 1218 from flange 1214 and junction box 1212. Centralizer 1198 may couple to low resistance section 1118. Thermocouples 1194 may be coupled to thermocouple flange 1226 with connectors 1228 and wire 1230. Thermocouples 1194 may be enclosed in an electrically insulated sheath (e.g., a metal sheath). Thermocouples 1194 may be sealed in thermocouple flange 1226 with compression fittings 1196. Thermocouples 1194 may be used to monitor temperatures in the heated portion downhole. In some embodiments, fluids (e.g., vapors) may be removed through wellhead 1162. For example, fluids from outside conduit 1176 may be removed through flange 1232A or fluids within the conduit may be removed through flange 1232B.

Figure 73:
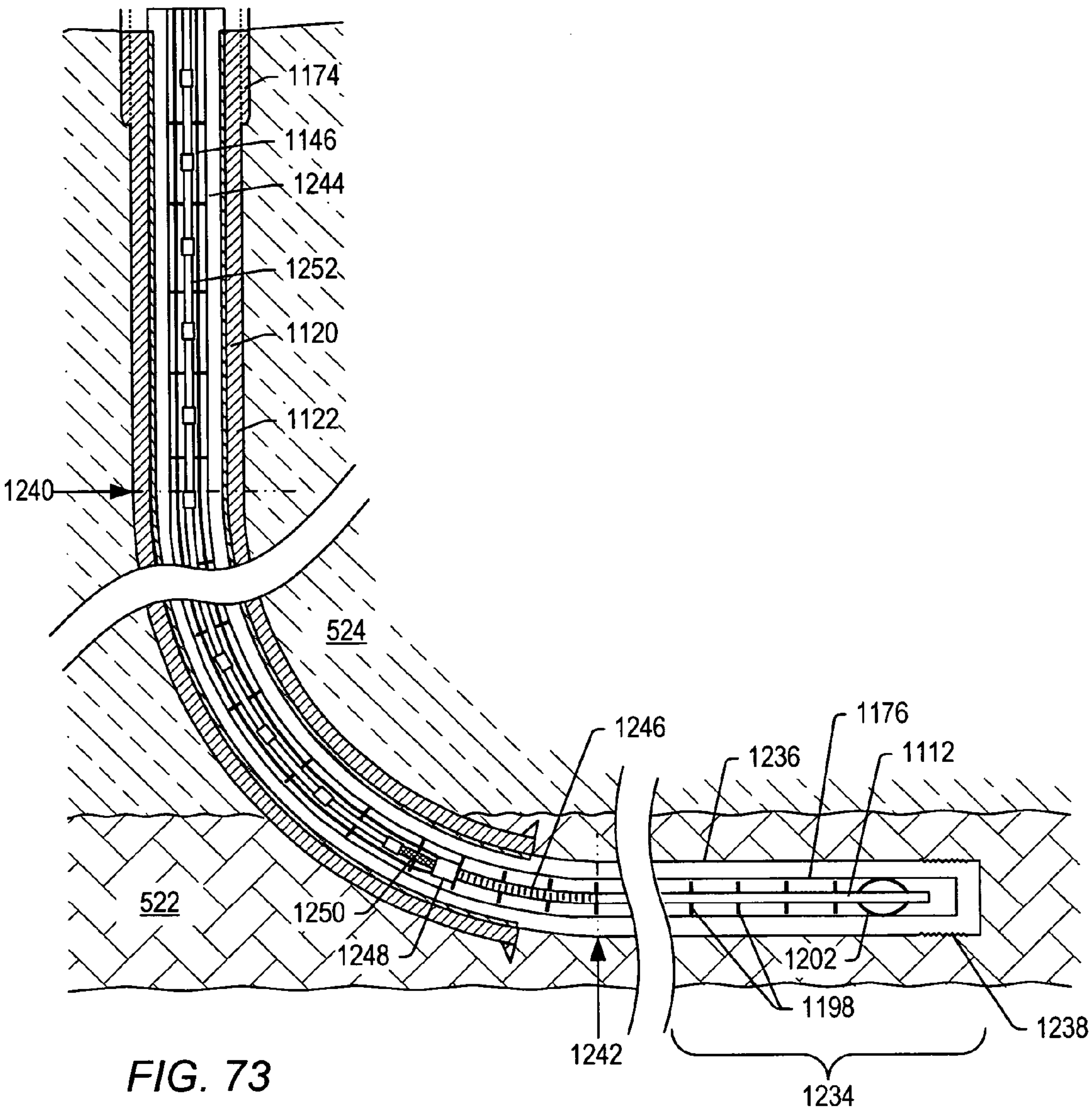
FIG. 73 illustrates a schematic of an embodiment of a conductor-in-conduit heater, where a portion of the heater is placed substantially horizontally within a formation.

FIG. 73 illustrates an embodiment of a conductor-in-conduit heater placed substantially horizontally within hydrocarbon layer 522. Heated section 1234 may be placed substantially horizontally within hydrocarbon layer 522. Heater casing 1236 may be placed within hydrocarbon layer 522. Heater casing 1236 may be formed of a corrosion resistant, relatively rigid material (e.g., 304 stainless steel). Heater casing 1236 may be coupled to overburden casing 1120. Overburden casing 1120 may include materials such as carbon steel. In an embodiment, overburden casing 1120 and heater casing 1236 have a diameter of about 15 cm. Expansion mechanism 1238 may be placed at an end of heater casing 1236 to accommodate thermal expansion of the conduit during heating and/or cooling.

To install heater casing 1236 substantially horizontally within hydrocarbon layer 522, overburden casing 1120 may bend from a vertical direction in overburden 524 into a horizontal direction within hydrocarbon layer 522. A curved wellbore may be formed during drilling of the wellbore in the formation. Heater casing 1236 and overburden casing 1120 may be installed in the curved wellbore. A radius of curvature of the curved wellbore may be determined by properties of drilling in the overburden and the formation. For example, the radius of curvature may be about 200 m from point 1240 to point 1242.

Conduit 1176 may be placed within heater casing 1236. In some embodiments, conduit 1176 may be made of a corrosion resistant metal (e.g., 304 stainless steel). Conduit 1176 may be heated to a high temperature. Conduit 1176 may also be exposed to hot formation fluids. Conduit 1176 may be treated to have a high emissivity. Conduit 1176 may have upper section 1244. In some embodiments, upper section 1244 may be made of a less corrosion resistant metal than other portions of conduit 1176 (e.g., carbon steel). A large portion of upper section 1244 may be positioned in overburden 524 of the formation. Upper section 1244 may not be exposed to temperatures as high as the temperatures of conduit 1176. In an embodiment, conduit 1176 and upper section 1244 have a diameter of about 7.6 cm.

Conductor 1112 may be placed in conduit 1176. A portion of the conduit placed adjacent to conductor 1112 may be made of a metal that has desired electrical properties, emissivity, creep resistance, and corrosion resistance at high temperatures. Conductor 1112 may include, but is not limited to, 310 stainless steel, 304 stainless steel, 316 stainless steel, 347 stainless steel, and/or other steel or non-steel alloys. Conductor 1112 may have a diameter of about 3 cm, however, a diameter of conductor 1112 may vary depending on, but not limited to, heating requirements and power requirements. Conductor 1112 may be located in conduit 1176 using one or more centralizers 1198. Centralizers 1198 may be ceramic or a combination of metal and ceramic. Centralizers 1198 may inhibit conductor 1112 from contacting conduit 1176. In some embodiments, centralizers 1198 may be coupled to conductor 1112. In other embodiments, centralizers 1198 may be coupled to conduit 1176. Conductor 1112 may be electrically coupled to conduit 1176 using sliding connector 1202.

Figure 74:
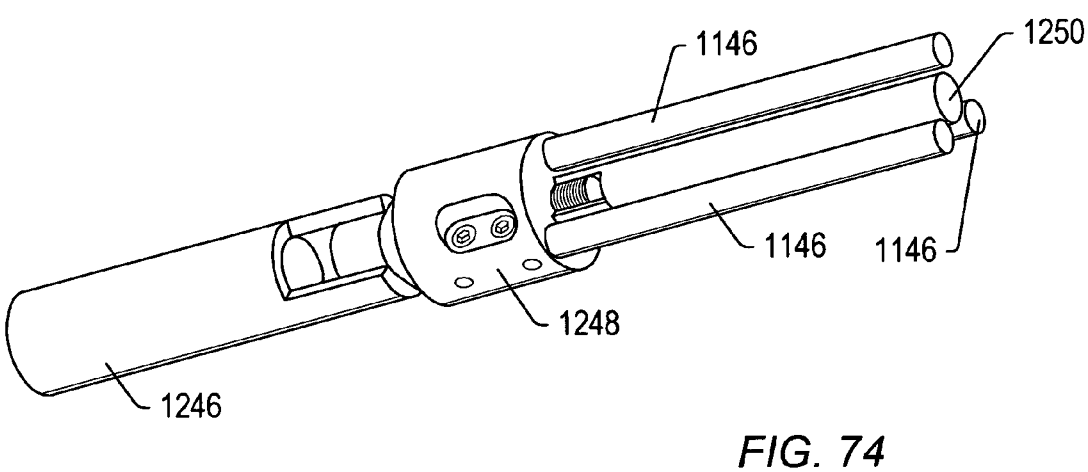
FIG. 74 illustrates an enlarged view of an embodiment of a junction of a conductor-in-conduit heater.

Conductor 1112 may be coupled to transition conductor 1246. Transition conductor 1246 may be used as an electrical transition between lead-in conductor 1146 and conductor 1112. In an embodiment, transition conductor 1246 may be carbon steel. Transition conductor 1246 may be coupled to lead-in conductor 1146 with electrical connector 1248. FIG. 74 illustrates an enlarged view of an embodiment of a junction of transition conductor 1246, electrical connector 1248, insulator 1250, and lead-in conductor 1146. Lead-in conductor 1146 may include one or more conductors (e.g., three conductors). In certain embodiments, the one or more conductors may be insulated copper conductors (e.g., rubber-insulated copper cable). In some embodiments, the one or more conductors may be insulated or un-insulated stranded copper cable. Insulator 1250 may be placed inside lead-in conductor 1146. Insulator 1250 may include electrically insulating materials such as fiberglass.

As depicted in FIG. 73, insulator 1250 may couple electrical connector 1248 to heater support 1252. In an embodiment, electrical current may flow from a power supply through lead-in conductor 1146, through transition conductor 1246, into conductor 1112, and return through conduit 1176 and upper section 1244.

Heater support 1252 may include a support that is used to install heated section 1234 in hydrocarbon layer 522. For example, heater support 1252 may be a sucker rod that is inserted through overburden 524 from a ground surface. The sucker rod may include one or more portions that can be coupled to each other at the surface as the rod is inserted into the formation. In some embodiments, heater support 1252 is a single piece assembled in an assembly facility. Inserting heater support 1252 into the formation may push heated section 1234 into the formation.

Overburden casing 1120 may be supported within overburden 524 using reinforcing material 1122. Reinforcing material may include cement (e.g., Portland cement). Surface conductor 1174 may enclose reinforcing material 1122 and overburden casing 1120 in a portion of overburden 524 proximate the ground surface. Surface conductor 1174 may include a surface casing.

Figure 75:
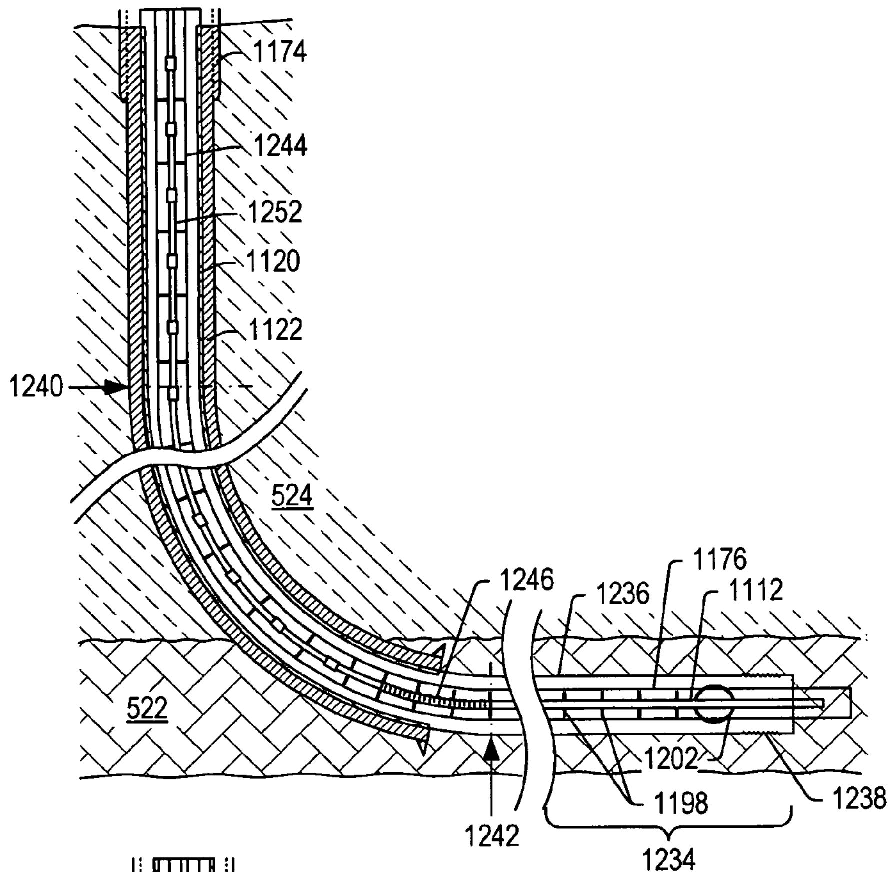
FIG. 75 illustrates a schematic of an embodiment of a conductor-in-conduit heater, wherein a portion of the heater is placed substantially horizontally within a formation.

FIG. 75 illustrates a schematic of an embodiment of a conductor-in-conduit heater placed substantially horizontally within a formation. In an embodiment, heater support 1252 may be a low resistance conductor (e.g., low resistance section 1118 as shown in FIG. 65). Heater support 1252 may include carbon steel or other electrically-conducting materials. Heater support 1252 may be electrically coupled to transition conductor 1246 and conductor 1112.

Figure 76:
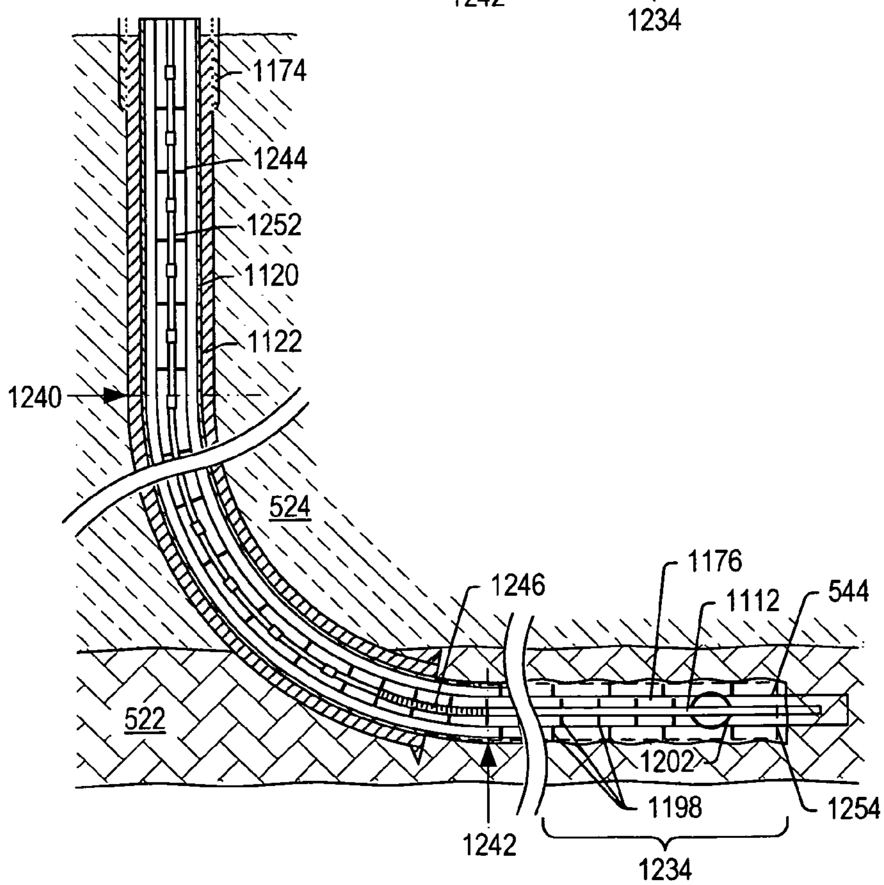
FIG. 76 illustrates a schematic of an embodiment of a conductor-in-conduit heater, wherein a portion of the heater is placed substantially horizontally within a formation.
Figure 77:
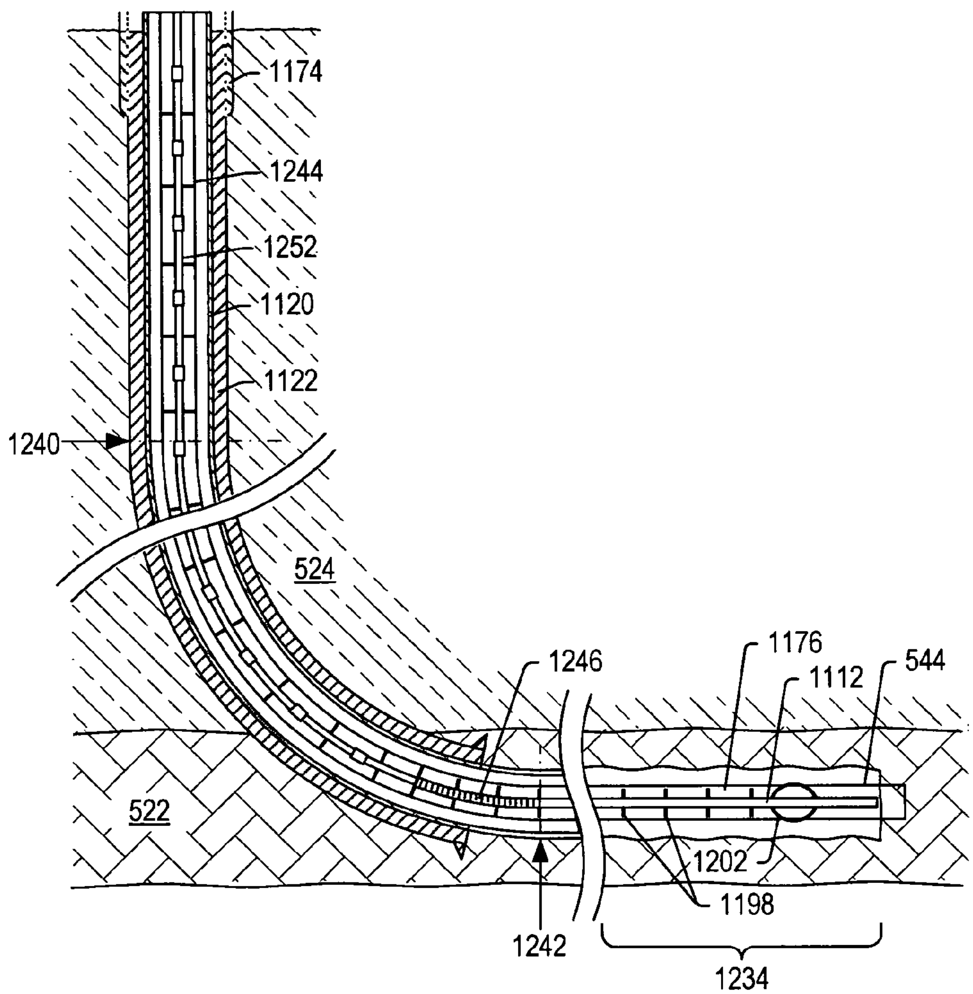
FIG. 77 illustrates a schematic of an embodiment of a conductor-in-conduit heater, wherein a portion of the heater is placed substantially horizontally within a formation.

In some embodiments, a heat source may be placed within an uncased wellbore in a hydrocarbon containing formation. FIG. 77 illustrates a schematic of an embodiment of a conductor-in-conduit heater placed substantially horizontally within an uncased wellbore in a formation. Heated section 1234 may be placed within opening 544 in hydrocarbon layer 522. In certain embodiments, heater support 1252 may be a low resistance conductor (e.g., low resistance section 1118 as shown in FIG. 65). Heater support 1252 may be electrically coupled to transition conductor 1246 and conductor 1112. FIG. 76 depicts an embodiment of the conductor-in-conduit heater shown in FIG. 77. In certain embodiments, perforated casing 1254 may be placed in opening 544 as shown in FIG. 76. In some embodiments, centralizers 1198 may be used to support perforated casing 1254 within opening 544.

Figure 78:
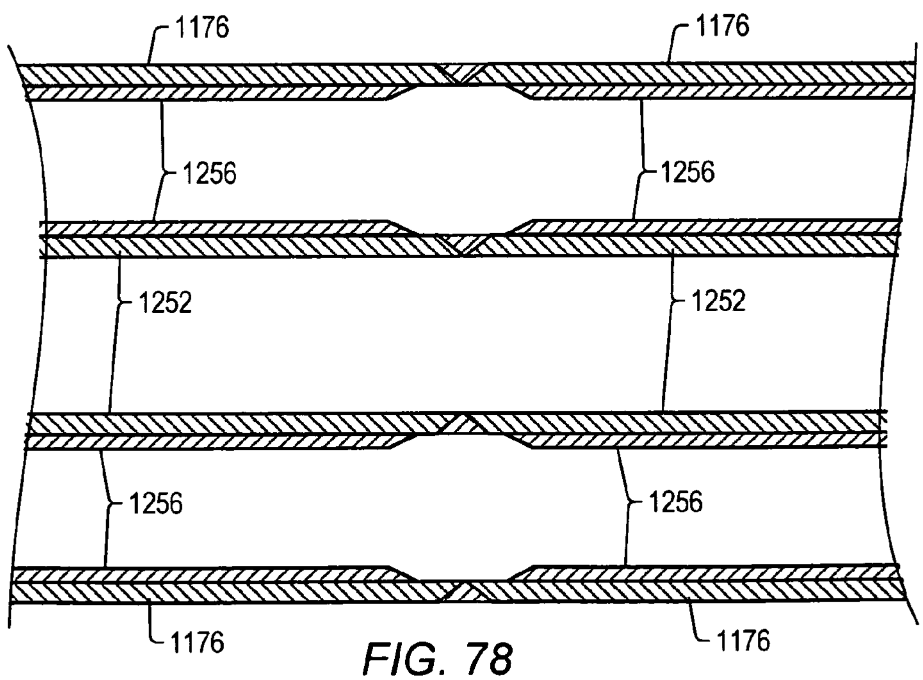
FIG. 78 depicts a cross-sectional view of a portion of an embodiment of a cladding section coupled to a heater support and a conduit.

In certain heat source embodiments, a cladding section may be coupled to heater support 1252 and/or upper section 1244. FIG. 78 depicts an embodiment of cladding section 1256 coupled to heater support 1252. Cladding may also be coupled to an upper section of conduit 1176. Cladding section 1256 may reduce the electrical resistance of heater support 1252 and/or the upper section of conduit 1176. In an embodiment, cladding section 1256 is copper tubing coupled to the heater support and the conduit.

In other heat source embodiments, heated section 1234, as shown in FIGS. 73, 75, and 77, may be placed in a wellbore with an orientation other than substantially horizontally in hydrocarbon layer 522. For example, heated section 1234 may be placed in hydrocarbon layer 522 at an angle of about 45° or substantially vertically in the formation. In addition, elements of the heat source placed in overburden 524 (e.g., heater support 1252, overburden casing 1120, upper section 1244, etc.) may have an orientation other than substantially vertical within the overburden.

In certain heat source embodiments, the heat source may be removably installed in a formation. Heater support 1252 may be used to install and/or remove the heat source, including heated section 1234, from the formation. The heat source may be removed to repair, replace, and/or use the heat source in a different wellbore. The heat source may be reused in the same formation or in a different formation. In some embodiments, a heat source or a portion of a heat source may be spooled on a coiled tubing rig and moved to another well location.

In some embodiments for heating a hydrocarbon containing formation, more than one heater may be installed in a wellbore or heater well. Having more than one heater in a wellbore or heat source may provide the ability to heat a selected portion or portions of a formation at a different rate than other portions of the formation. Having more than one heater in a wellbore or heat source may provide a backup heat source in the wellbore or heat source should one or more of the heaters fail. Having more than one heater may allow a uniform temperature profile to be established along a desired portion of the wellbore. Having more than one heater may allow for rapid heating of a hydrocarbon layer or layers to a pyrolysis temperature from ambient temperature. The more than one heater may include similar types of heaters or may include different types of heaters. For example, the more than one heater may be a natural distributed combustor heater, an insulated conductor heater, a conductor-in-conduit heater, an elongated member heater, a downhole combustor (e.g., a downhole flameless combustor or a downhole combustor), etc.

In an in situ conversion process embodiment, a first heater in a wellbore may be used to selectively heat a first portion of a formation and a second heater may be used to selectively heat a second portion of the formation. The first heater and the second heater may be independently controlled. For example, heat provided by a first heater can be controlled separately from heat provided by a second heater. As another example, electrical power supplied to a first electric heater may be controlled independently of electrical power supplied to a second electric heater. The first portion and the second portion may be located at different heights or levels within a wellbore, either vertically or along a face of the wellbore. The first portion and the second portion may be separated by a third, or separate, portion of a formation. The third portion may contain hydrocarbons or may be a non-hydrocarbon containing portion of the formation. For example, the third portion may include rock or similar non-hydrocarbon containing materials. The third portion may be heated or unheated. In some embodiments, heat used to heat the first and second portions may be used to heat the third portion. Heat provided to the first and second portions may substantially uniformly heat the first, second, and third portions.

FIG. 67 illustrates a perspective view of an embodiment of centralizer 1198 in conduit 1176. Electrical insulator 1258 may be disposed on conductor 1112. Insulator 1258 may be made of aluminum oxide or other electrically insulating material that has a high working temperature limit. Neck portion 1260 may be a bushing which has an inside diameter that allows conductor 1112 to pass through the bushing. Neck portion 1260 may include electrically insulative materials such as metal oxides and ceramics (e.g., aluminum oxide). Insulator 1258 and neck portion 1260 may be obtainable from manufacturers such as CoorsTek (Golden, Colo.) or Norton Ceramics (United Kingdom). In an embodiment, insulator 1258 and/or neck portion 1260 are made from 99% or greater purity machinable aluminum oxide. In certain embodiments, ceramic portions of a heat source may be surface glazed. Surface glazing ceramic may seal the ceramic from contamination from dirt and/or moisture. High temperature surface glazing of ceramics may be done by companies such as NGK-Locke Inc. (Baltimore, Md.) or Johannes Gebhart (Germany).

A location of insulator 1258 on conductor 1112 may be maintained by disc 1262. Disc 1262 may be welded to conductor 1112. Spring bow 1264 maybe coupled to insulator 1258 by disc 1266. Spring bow 1264 and disc 1266 may be made of metals such as 310 stainless steel and/or any other thermally conducting material that may be used at relatively high temperatures. Spring bow 1264 may reduce the stress on ceramic portions of the centralizer during installation or removal of the heater, and/or during use of the heater. Reducing the stress on ceramic portions of the centralizer during installation or removal may increase an operational lifetime of the heater. In some heat source embodiments, centralizer 1198 may have an opening that fits over an end of conductor 1112. In other embodiments, centralizer 1198 may be assembled from two or more pieces around a portion of conductor 1112. The pieces may be coupled to conductor 1112 by fastening device 1268. Fastening device 1268 may be made of any material that can be used at relatively high temperatures (e.g., steel).

FIG. 68 depicts a representation of an embodiment of centralizer 1198 disposed on conductor 1112. Discs 1262 may maintain positions of centralizer 1198 relative to conductor 1112. Discs 1262 may be metal discs welded to conductor 1112. Discs 1262 may be tack-welded to conductor 1112. FIG. 69 depicts a top view representation of a centralizer embodiment. Centralizer 1198 may be made of any suitable electrically insulating material able to withstand high voltage at high temperatures. Examples of such materials include, but are not limited to, aluminum oxide and/or Macor. Centralizer 1198 may electrically insulate conductor 1112 from conduit 1176, as shown in FIGS. 68 and 69.

Figure 79:
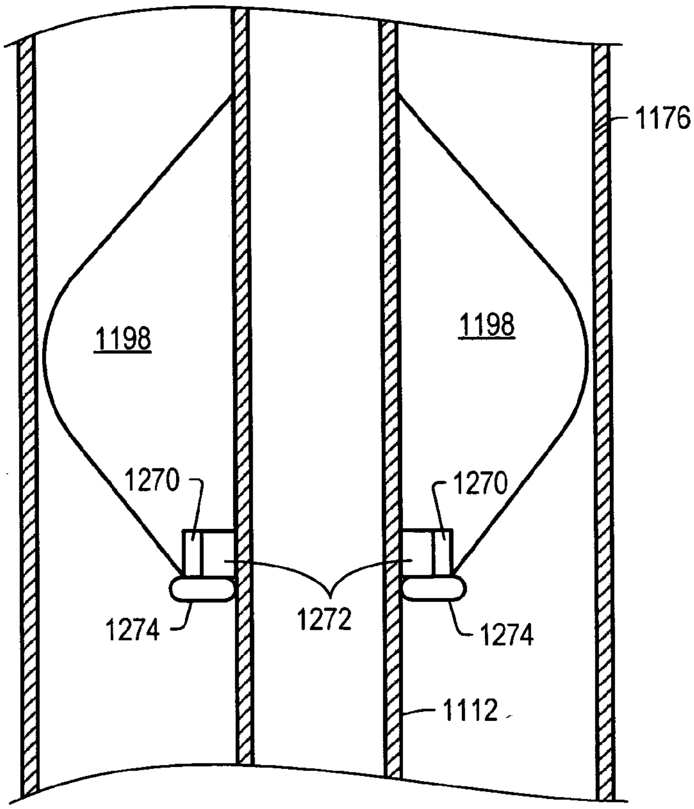
FIG. 79 illustrates a cross-sectional representation of an embodiment of a centralizer placed on a conductor.
Figure 80:
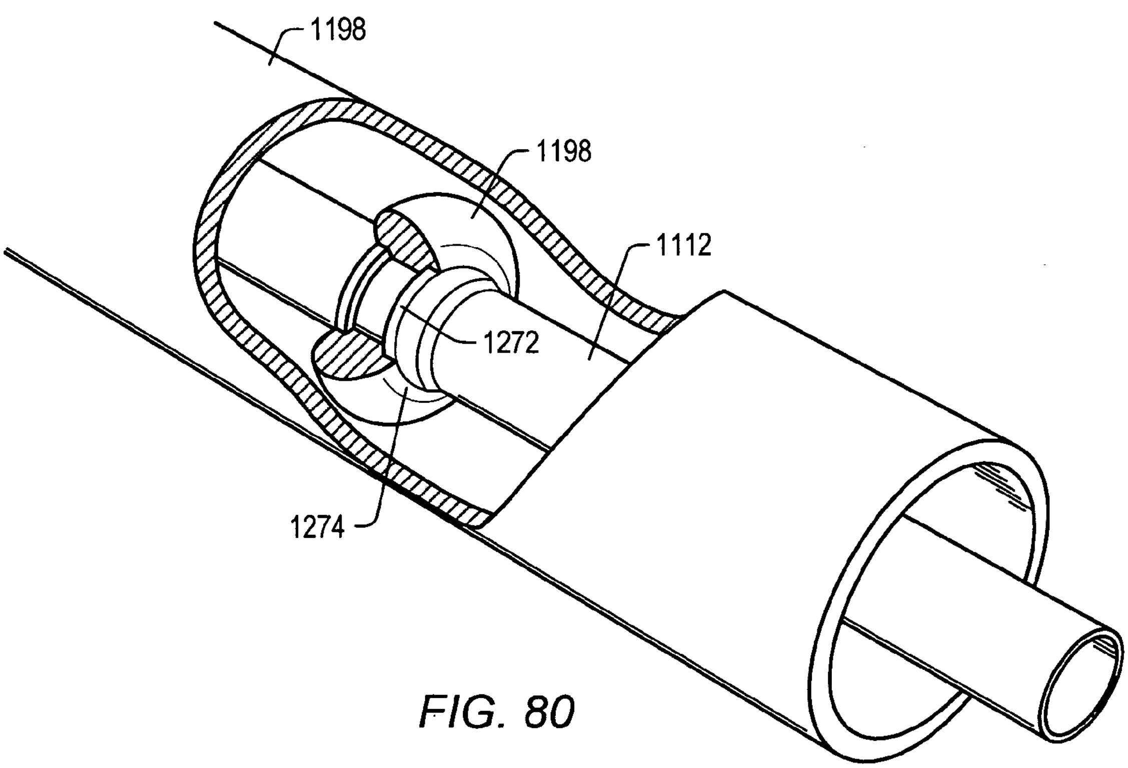
FIG. 80 depicts a portion of an embodiment of a conductor-in-conduit heat source with a cutout view showing a centralizer on the conductor.

FIG. 79 illustrates a cross-sectional representation of an embodiment of a centralizer placed on a conductor. FIG. 80 depicts a portion of an embodiment of a conductor-in-conduit heat source with a cutout view showing a centralizer on the conductor. Centralizer 1198 may be used in a conductor-in-conduit heat source. Centralizer 1198 may be used to maintain a location of conductor 1112 within conduit 1176. Centralizer 1198 may include electrically insulating materials such as ceramics (e.g., alumina and zirconia). As shown in FIG. 79, centralizer 1198 may have at least one recess 1270. Recess 1270 may be, for example, an indentation or notch in centralizer 1198 or a recess left by a portion removed from the centralizer. A cross-sectional shape of recess 1270 may be a rectangular shape or any other geometrical shape. In certain embodiments, recess 1270 has a shape that allows protrusion 1272 to reside within the recess. Recess 1270 may be formed such that the recess will be placed at a junction of centralizer 1198 and conductor 1112. In one embodiment, recess 1270 is formed at a bottom of centralizer 1198.

At least one protrusion 1272 may be formed on conductor 1112. Protrusion 1272 may be welded to conductor 1112. In some embodiments, protrusion 1272 is a weld bead formed on conductor 1112. Protrusion 1272 may include electrically-conductive materials such as steel (e.g., stainless steel). In certain embodiments, protrusion 1272 may include one or more protrusions formed around the circumference of conductor 1112. Protrusion 1272 may be used to maintain a location of centralizer 1198 on conductor 1112. For example, protrusion 1272 may inhibit downward movement of centralizer 1198 along conductor 1112. In some embodiments, at least one additional recess 1270 and at least one additional protrusion 1272 may be placed at a top of centralizer 1198 to inhibit upward movement of the centralizer along conductor 1112.

In an embodiment, electrically insulating material 1274 is placed over protrusion 1272 and recess 1270. Electrically insulating material 1274 may cover recess 1270 such that protrusion 1272 is enclosed within the recess and the electrically insulating material. In some embodiments, electrically insulating material 1274 may partially cover recess 1270. Protrusion 1272 may be enclosed so that carbon deposition (i.e., coking) on protrusion 1272 during use is inhibited. Carbon may form electrically-conducting paths during use of conductor 1112 and conduit 1176 to heat a formation. Electrically insulating material 1274 may include materials such as, but not limited to, metal oxides and/or ceramics (e.g., alumina or zirconia). In some embodiments, electrically insulating material 1274 is a thermally conducting material. A thermal plasma spray process may be used to place electrically insulating material 1274 over protrusion 1272 and recess 1270. The thermal plasma process may spray coat electrically insulating material 1274 on protrusion 1272 and/or centralizer 1198.

In an embodiment, centralizer 1198 with recess 1270, protrusion 1272, and electrically insulating material 1274 are placed on conductor 1112 within conduit 1176 during installation of the conductor-in-conduit heat source in an opening in a formation. In another embodiment, centralizer 1198 with recess 1270, protrusion 1272, and electrically insulating material 1274 are placed on conductor 1112 within conduit 1176 during assembling of the conductor-in-conduit heat source. For example, an assembling process may include forming protrusion 1272 on conductor 1112, placing centralizer 1198 with recess 1270 on conductor 1112, covering the protrusion and the recess with electrically insulating material 1274, and placing the conductor within conduit 1176.

Figure 81:
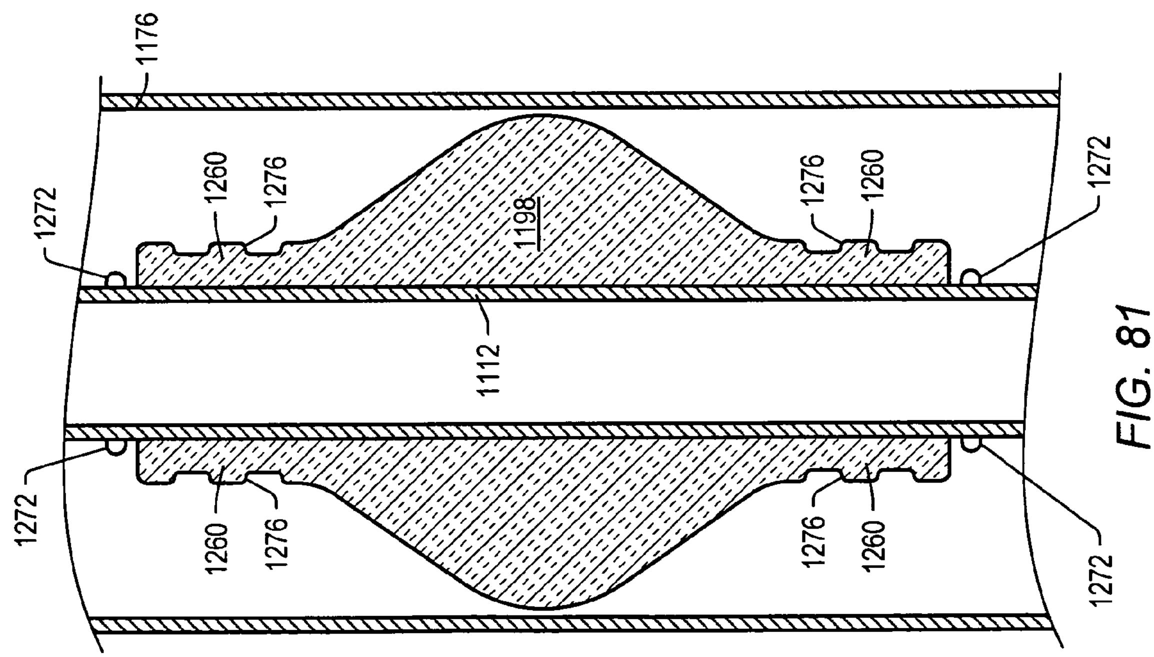
FIG. 81 depicts a cross-sectional representation of an embodiment of a centralizer.

FIG. 81 depicts an embodiment of centralizer 1198. Neck portion 1260 may be coupled to centralizer 1198. In certain embodiments, neck portion 1260 is an extended portion of centralizer 1198. Protrusion 1272 may be placed on conductor 1112 to maintain a location of centralizer 1198 and neck portion 1260 on the conductor. Neck portion 1260 may be a bushing which has an inside diameter that allows conductor 1112 to pass through the bushing. Neck portion 1260 may include electrically insulative materials such as metal oxides and ceramics (e.g., aluminum oxide). For example, neck portion 1260 may be a commercially available bushing from manufacturers such as Borges Technical Ceramics (Pennsburg, Pa.). In one embodiment, as shown in FIG. 81, a first neck portion 1260 is coupled to an upper portion of centralizer 1198 and a second neck portion 1260 is coupled to a lower portion of centralizer 1198.

Neck portion 1260 may extend between about 1 cm and about 5 cm from centralizer 1198. In an embodiment, neck portion 1260 extends about 2-3 cm from centralizer 1198. Neck portion 1260 may extend a selected distance from centralizer 1198 such that arcing (e.g., surface arcing) is inhibited. Neck portion 1260 may increase a path length for arcing between conductor 1112 and conduit 1176. A path for arcing between conductor 1112 and conduit 1176 may be formed by carbon deposition on centralizer 1198 and/or neck portion 1260. Increasing the path length for arcing between conductor 1112 and conduit 1176 may reduce the likelihood of arcing between the conductor and the conduit. Another advantage of increasing the path length for arcing between conductor 1112 and conduit 1176 may be an increase in a maximum operating voltage of the conductor.

In an embodiment, neck portion 1260 also includes one or more grooves 1276. One or more grooves 1276 may further increase the path length for arcing between conductor 1112 and conduit 1176. In certain embodiments, conductor 1112 and conduit 1176 may be oriented substantially vertically within a formation. In such an embodiment, one or more grooves 1276 may also inhibit deposition of conducting particles (e.g., carbon particles or corrosion scale) along the length of neck portion 1260. Conducting particles may fall by gravity along a length of conductor 1112. One or more grooves 1276 may be oriented such that falling particles do not deposit into the one or more grooves. Inhibiting the deposition of conducting particles on neck portion 1260 may inhibit formation of an arcing path between conductor 1112 and conduit 1176. In some embodiments, diameters of each of one or more grooves 1276 may be varied. Varying the diameters of the grooves may further inhibit the likelihood of arcing between conductor 1112 and conduit 1176.

Figure 82:
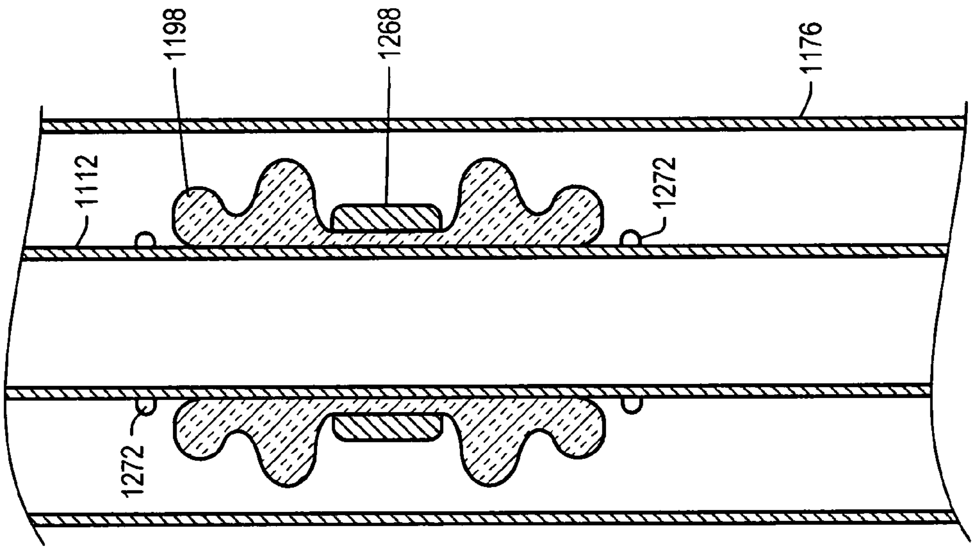
FIG. 82 depicts a cross-sectional representation of an embodiment of a centralizer.
Figure 83:
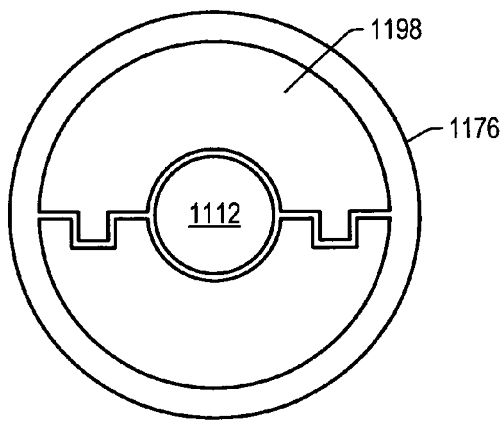
FIG. 83 depicts a top view of an embodiment of a centralizer.
Figure 84:
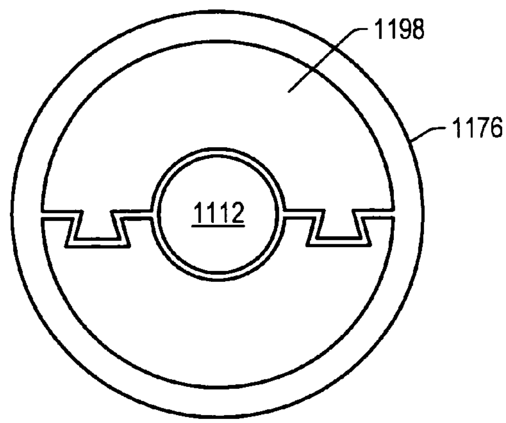
FIG. 84 depicts a top view of an embodiment of a centralizer.

FIG. 82 depicts an embodiment of centralizer 1198. Centralizer 1198 may include two or more portions held together by fastening device 1268. Fastening device 1268 may be a clamp, bolt, snap-lock, or screw. FIGS. 83 and 84 depict top views of embodiments of centralizer 1198 placed on conductor 1112. Centralizer 1198 may include two portions. The two portions may be coupled together to form a centralizer in a "clam shell" configuration. The two portions may have notches and recesses that are shaped to fit together as shown in either of FIGS. 83 and 84. In some embodiments, the two portions may have notches and recesses that are tapered so that the two portions tightly couple together. The two portions may be slid together lengthwise along the notches and recesses.

In a heat source embodiment, an insulation layer may be placed between a conductor and a conduit. The insulation layer may be used to electrically insulate the conductor from the conduit. The insulation layer may also maintain a location of the conductor within the conduit. In some embodiments, the insulation layer may include a layer that remains placed on and/or in the heat source after installation. In certain embodiments, the insulation layer may be removed by heating the heat source to a selected temperature. The insulation layer may include electrically insulating materials such as, but not limited to, metal oxides and/or ceramics. For example, the insulation layer may be Nextel™ insulation obtainable from 3M Company (St. Paul, Minn.). An insulation layer may also be used for installation of any other heat source (e.g., insulated conductor heat source, natural distributed combustor, etc.). In an embodiment, the insulation layer is fastened to the conductor. The insulation layer may be fastened to the conductor with a high temperature adhesive (e.g., a ceramic adhesive such as Cotronics 920 alumina-based adhesive available from Cotronics Corporation (Brooklyn, N.Y.)).

Figure 85:
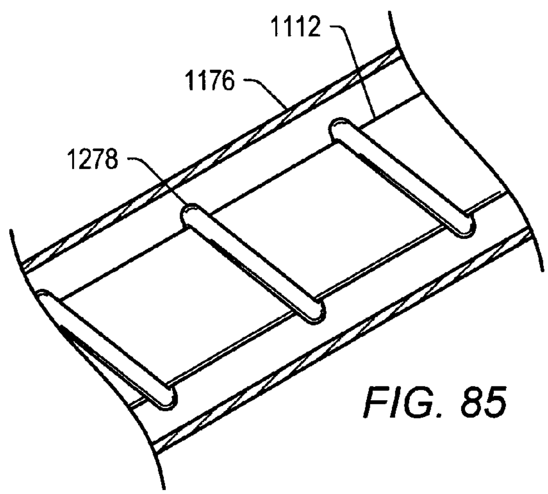
FIG. 85 depicts a cross-sectional representation of a portion of an embodiment of a section of a conduit of a conductor-in-conduit heat source with an insulation layer wrapped around the conductor.

FIG. 85 depicts a cross-sectional representation of an embodiment of a section of a conductor-in-conduit heat source with insulation layer 1278. Insulation layer 1278 may be placed on conductor 1112. Insulation layer 1278 may be spiraled around conductor 1112 as shown in FIG. 85. In one embodiment, insulation layer 1278 is a single insulation layer wound around the length of conductor 1112. In some embodiments, insulation layer 1278 may include one or more individual sections of insulation layers wrapped around conductor 1112. Conductor 1112 may be placed in conduit 1176 after insulation layer 1278 has been placed on the conductor. Insulation layer 1278 may electrically insulate conductor 1112 from conduit 1176.

In an embodiment of a conductor-in-conduit heat source, a conduit may be pressurized with a fluid to inhibit a large pressure difference between pressure in the conduit and pressure in the formation. Balanced pressure or a small pressure difference may inhibit deformation of the conduit during use. The fluid may increase conductive heat transfer from the conductor to the conduit. The fluid may include, but is not limited to, a gas such as helium, nitrogen, air, or mixtures thereof. The fluid may inhibit arcing between the conductor and the conduit. If air and/or air mixtures are used to pressurize the conduit, the air and/or air mixtures may react with materials of the conductor and the conduit to form an oxide layer on a surface of the conductor and/or an oxide layer on an inner surface of the conduit. The oxide layer may inhibit arcing. The oxide layer may make the conductor and/or the conduit more resistant to corrosion.

Reducing the amount of heat losses to an overburden of a formation may increase an efficiency of a heat source. The efficiency of the heat source may be determined by the energy transferred into the formation through the heat source as a fraction of the energy input into the heat source. In other words, the efficiency of the heat source may be a function of energy that actually heats a desired portion of the formation divided by the electrical power (or other input power) provided to the heat source. To increase the amount of energy actually transferred to the formation, heating losses to the overburden may be reduced. Heating losses in the overburden may be reduced for electrical heat sources by the use of relatively low resistance conductors in the overburden that couple a power supply to the heat source. Alternating electrical current flowing through certain conductors (e.g., carbon steel conductors) tends to flow along the skin of the conductors. This skin depth effect may increase the resistance heating at the outer surface of the conductor (i.e., the current flows through only a small portion of the available metal) and thus increase heating of the overburden. Electrically conductive casings, coatings, wiring, and/or claddings may be used to reduce the electrical resistance of a conductor used in the overburden. Reducing the electrical resistance of the conductor in the overburden may reduce electricity losses to heating the conduit in the overburden portion and thereby increase the available electricity for resistive heating in portions of the conductor below the overburden.

As shown in FIG. 65, low resistance section 1118 may be coupled to conductor 1112. Low resistance section 1118 may be placed in overburden 524. Low resistance section 1118 may be, for example, a carbon steel conductor. Carbon steel may be used to provide mechanical strength for the heat source in overburden 524. In an embodiment, an electrically conductive coating may be coated on low resistance section 1118 to further reduce an electrical resistance of the low resistance conductor. In some embodiments, the electrically conductive coating may be coated on low resistance section 1118 during assembly of the heat source. In other embodiments, the electrically conductive coating may be coated on low resistance section 1118 after installation of the heat source in opening 544.

In some embodiments, the electrically conductive coating may be sprayed on low resistance section 1118. For example, the electrically conductive coating may be a sprayed on thermal plasma coating. The electrically conductive coating may include conductive materials such as, but not limited to, aluminum or copper. The electrically conductive coating may include other conductive materials that can be thermal plasma sprayed. In certain embodiments, the electrically conductive coating may be coated on low resistance section 1118 such that the resistance of the low resistance conductor is reduced by a factor of greater than about 2. In some embodiments, the resistance is lowered by a factor of greater than about 4 or about 5. The electrically conductive coating may have a thickness of between 0.1 mm and 0.8 mm. In an embodiment, the electrically conductive coating may have a thickness of about 0.25 mm. The electrically conductive coating may be coated on low resistance conductors used with other types of heat sources such as, for example, insulated conductor heat sources, elongated member heat sources, etc.

Figure 86:
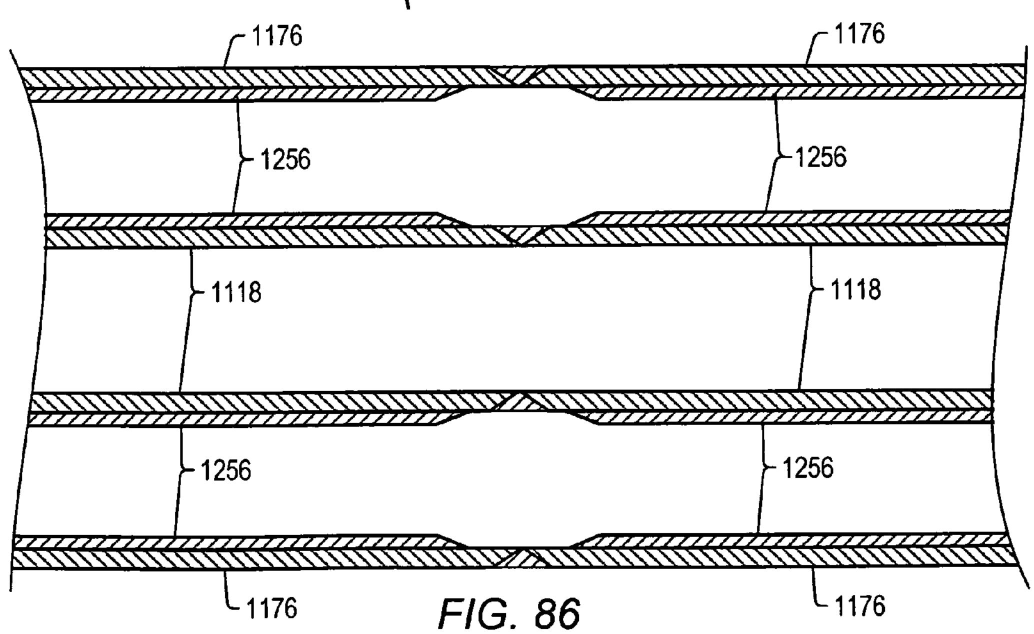
FIG. 86 depicts a cross-sectional representation of an embodiment of a cladding section coupled to a low resistance conductor.

In another embodiment, a cladding may be coupled to low resistance section 1118 to reduce the electrical resistance in overburden 524. FIG. 86 depicts a cross-sectional view of a portion of cladding section 1256 of conductor-in-conduit heater. Cladding section 1256 may be coupled to the outer surface of low resistance section 1118. Cladding sections 1256 may also be coupled to an inner surface of conduit 1176. In certain embodiments, cladding sections may be coupled to inner surface of low resistance section 1118 and/or outer surface of conduit 1176. In some embodiments, low resistance section 1118 may include one or more sections of individual low resistance sections 1118 coupled together. Conduit 1176 may include one or more sections of individual conduits 1176 coupled together.

Individual cladding sections 1256 may be coupled to each individual low resistance section 1118 and/or conduit 1176, as shown in FIG. 86. A gap may remain between each cladding section 1256. The gap may be at a location of a coupling between low resistance sections 1118 and/or conduits 1176. For example, the gap may be at a thread or weld junction between low resistance sections 1118 and/or conduits 1176. The gap may be less than about 4 cm in length. In certain embodiments, the gap may be less than about 5 cm in length or less than 6 cm in length. In some embodiments, there may be substantially no gap between cladding sections 1256.

Cladding section 1256 may be a conduit (or tubing) of relatively electrically conductive material. Cladding section 1256 may be a conduit that tightly fits against a surface of low resistance section 1118 and/or conduit 1176. Cladding section 1256 may include non-ferromagnetic metals that have a relatively high electrical conductivity. For example, cladding section 1256 may include copper, aluminum, brass, bronze, or combinations thereof. Cladding section 1256 may have a thickness between about 0.2 cm and about 1 cm. In some embodiments, low resistance section 1118 has an outside diameter of about 2.5 cm and conduit 1176 has an inside diameter of about 7.3 cm. In an embodiment, cladding section 1256 coupled to low resistance section 1118 is copper tubing with a thickness of about 0.32 cm (about ⅛ inch) and an inside diameter of about 2.5 cm. In an embodiment, cladding section 1256 coupled to conduit 1176 is copper tubing with a thickness of about 0.32 cm (about ⅛ inch) and an outside diameter of about 7.3 cm. In certain embodiments, cladding section 1256 has a thickness between about 0.20 cm and about 1.2 cm.

In certain embodiments, cladding section 1256 is brazed to low resistance section 1118 and/or conduit 1176. In other embodiments, cladding section 1256 may be welded to low resistance section 1118 and/or conduit 1176. In one embodiment, cladding section 1256 is Everdur® (silicon bronze) welded to low resistance section 1118 and/or conduit 1176. Cladding section 1256 may be brazed or welded to low resistance section 1118 and/or conduit 1176 depending on the types of materials used in the cladding section, the low resistance conductor, and the conduit. For example, cladding section 1256 may include copper that is Everdur® welded to low resistance section 1118, which includes carbon steel. In some embodiments, cladding section 1256 may be pre-oxidized to inhibit corrosion of the cladding section during use.

Using cladding section 1256 coupled to low resistance section 1118 and/or conduit 1176 may inhibit a significant temperature rise in the overburden of a formation during use of the heat source (i.e., reduce heat losses to the overburden). For example, using a copper cladding section of about 0.3 cm thickness may decrease the electrical resistance of a carbon steel low resistance conductor by a factor of about 20. The lowered resistance in the overburden section of the heat source may provide a relatively small temperature increase adjacent to the wellbore in the overburden of the formation. For example, supplying a current of about 500 A into an approximately 1.9 cm diameter low resistance conductor (schedule 40 carbon steel pipe) with a copper cladding of about 0.3 cm thickness produces a maximum temperature of about 93° C. at the low resistance conductor. This relatively low temperature in the low resistance conductor may transfer relatively little heat to the formation. For a fixed voltage at the power source, lowering the resistance of the low resistance conductor may increase the transfer of power into the heated section of the heat source (e.g., conductor 1112). For example, a 600 volt power supply may be used to supply power to a heat source through about a 300 m overburden and into about a 260 m heated section. This configuration may supply about 980 watts per meter to the heated section. Using a copper cladding section of about 0.3 cm thickness with a carbon steel low resistance conductor may increase the transfer of power into the heated section by up to about 15% compared to using the carbon steel low resistance conductor only.

In some embodiments, cladding section 1256 may be coupled to conductor 1112 and/or conduit 1176 by a "tight fit tubing" (TFT) method. TFT is commercially available from vendors such as Kuroki (Japan) or Karasaki Steel (Japan). The TFT method includes cryogenically cooling an inner pipe or conduit, which is a tight fit to an outer pipe. The cooled inner pipe is inserted into the heated outer pipe or conduit. The assembly is then allowed to return to an ambient temperature. In some cases, the inner pipe can be hydraulically expanded to bond tightly with the outer pipe.

Another method for coupling a cladding section to a conductor or a conduit may include an explosive cladding method. In explosive cladding, an inner pipe is slid into an outer pipe. Primer cord or other type of explosive charge may be set off inside the inner pipe. The explosive blast may bond the inner pipe to the outer pipe.

Electromagnetically formed cladding may also be used for cladding section 1256. An inner pipe and an outer pipe may be placed in a water bath. Electrodes attached to the inner pipe and the outer pipe may be used to create a high potential between the inner pipe and the outer pipe. The potential may cause sudden formation of bubbles in the bath that bond the inner pipe to the outer pipe.

In another embodiment, cladding section 1256 may be arc welded to a conductor or conduit. For example, copper may be arc deposited and/or welded to a stainless steel pipe or tube.

In some embodiments, cladding section 1256 may be formed with plasma powder welding (PPW). PPW formed material may be obtained from Daido Steel Co. (Japan). In PPW, copper powder is heated to form a plasma. The hot plasma may be moved along the length of a tube (e.g., a stainless steel tube) to deposit the copper and form the copper cladding.

Cladding section 1256 may also be formed by billet co-extrusion. A large piece of cladding material may be extruded along a pipe to form a desired length of cladding along the pipe.

In certain embodiments, forge welding (e.g., shielded active gas welding) may be used to form cladding section 1256 on a low resistance section and/or conduit. Forge welding may be used to form a uniform weld through the cladding section and the low resistance section or conduit. In some embodiments, forge welding may be used to couple portions of low resistance sections and/or conduits with cladding sections 1256. FIG. 86 depicts an embodiment of portions of low resistance sections 1118, conduits 1176, and cladding sections 1256 aligned for a forge welding process. Portions of low resistance sections 1118 and/or conduits 1176 with cladding sections 1256 to be coupled may be held at a certain spacing before welding, as shown in FIG. 86. Spacers and/or robotic control may be used to maintain the certain spacing between the portions of low resistance sections and/or conduits. The portions of low resistance sections 1118 and/or conduits 1176 along with cladding sections 1256 may be forge welded. Portions of cladding sections 1256 may extend beyond the edges of portions of low resistance sections 1118 or conduits 1176 such that cladding sections 1256 are joined together (or touch) before low resistance sections 148 or conduits 1176 are joined. Touching the cladding sections first may ensure an electrical connection between each of the joined cladding sections. If the cladding sections are not joined first, the cladding sections may be disconnected by outward bulging of the low resistance sections or conduits as they are joined. The portions of low resistance sections 1118, conduits 1176, and/or cladding sections 1256 to be joined may also have tapered profiles on each end of the portions. The tapered profiles may produce a more cylindrical profile at the weld joint after welding by allowing for thermal expansion of the ends of the welded portions during the welding process.

Another method is to start with strips of copper and carbon steel that are bonded together by tack welding or another suitable method. The composite strip is drawn through a shaping unit to form a cylindrically shaped tube. The cylindrically shaped tube is seam welded longitudinally. The resulting tube may be coiled onto a spool.

Another possible embodiment for reducing the electrical resistance of the conductor in the overburden is to form low resistance section 1118 from low resistance metals (e.g., metals that are used in cladding section 1256). A polymer coating may be placed on some of these metals to inhibit corrosion of the metals (e.g., to inhibit corrosion of copper or aluminum by hydrogen sulfide).

In some embodiments, a cladding section may be coupled to a conductor or a conduit within a heated section of a heat source (e.g., conductor 1112 or conduit 1176 in heated section 1234 as shown in FIG. 75). The cladding section may be coupled to a conductor or a conduit in a heated section to reduce the cost of materials within the heated section. For example, the conductor and/or the conduit may be made of carbon steel while the cladding section is made of stainless steel. Since alternating electrical current flowing through certain conductors (e.g., steel conductors) tends to flow along the skin of the conductors, a majority of the electricity may propagate through the stainless steel cladding section. Heat may be generated by the electrical current flowing through the stainless steel cladding section, which has a higher electrical resistance. Carbon steel (which is typically cheaper than stainless steel) may be used to provide mechanical support for the stainless steel cladding sections.

Increasing the emissivity of a conductive heat source may increase the efficiency with which heat is transferred to a formation. An emissivity of a surface affects the amount of radiative heat emitted from the surface and the amount of radiative heat absorbed by the surface. In general, the higher the emissivity a surface has, the greater the radiation from the surface or the absorption of heat by the surface. Thus, increasing the emissivity of a surface increases the efficiency of heat transfer because of the increased radiation of energy from the surface into the surroundings. For example, increasing the emissivity of a conductor in a conductor-in-conduit heat source may increase the efficiency with which heat is transferred to the conduit, as shown by the following equation:

$$\dot{Q} = \frac{2\pi r_1 \sigma (T_1^4 - T_2^4)}{\frac{1}{\varepsilon_1} + \left(\frac{r_1}{r_2}\right)\left(\frac{1}{\varepsilon_2} - 1\right)}; \tag{41}$$

where Q is the rate of heat transfer between a cylindrical conductor and a conduit, $r_1$ is the radius of the conductor, $r_2$ is the radius of the conduit, $T_1$ is the temperature at the conductor, $T_2$ is the temperature at the conduit, σ is the Stefan-Boltzmann constant ($5.670\times10^{-8}$ J·K$^{-4}$·m$^{-2}$·s$^{-1}$), $\epsilon_1$ is the emissivity of the conductor, and $\epsilon_2$ is the emissivity of the conduit. According to EQN. 41, increasing the emissivity of the conductor increases the heat transfer between the conductor and the conduit. Accordingly, for a constant heat transfer rate, increasing the emissivity of the conductor decreases the temperature difference between the conductor and the conduit (i.e., increases the temperature of the conduit for a given conductor temperature). Increasing the temperature of the conduit increases the amount of heat transfer to the formation.

In an embodiment, a conductor and/or conduit may be treated to increase the emissivity of the conductor and/or conduit materials. Treating the conductor and/or conduit may include roughening a surface of the conductor or conduit and/or oxidizing the conductor or conduit. In some embodiments, a conductor and/or conduit may be roughened and/or oxidized prior to assembly of a heat source. In some embodiments, a conductor and/or conduit may be roughened and/or oxidized after assembly and/or installation into a formation (e.g., an oxidizing fluid may be introduced into an annular space between the conductor and the conduit when heating a portion of the formation to pyrolysis temperatures so that the heat generated in the conductor oxidizes the conductor and the conduit). The treatment method may be used to treat inner surfaces and/or outer surfaces, or portions thereof, of conductors or conduits. In certain embodiments, the outer surface of a conductor and the inner surface of a conduit are treated to increase the emissivities of the conductor and the conduit.

In an embodiment, surfaces of a conductor, or a portion of the surface, may be roughened. The roughened surface of the conductor may be the outer surface of the conductor. The surface of the conductor may be roughened by, but is not limited to being roughened by, sandblasting or beadblasting the surface, peening the surface, emery grinding the surface, or using an electrostatic discharge method on the surface. For example, the surface of the conductor may be sand blasted with fine particles to roughen the surface. The conductor may also be treated by pre-oxidizing the surface of the conductor (i.e., heating the conductor to an oxidation temperature before use of the conductor). Pre-oxidizing the surface of the conductor may include heating the conductor to a temperature between about 850° C. and about 950° C. The conductor may be heated in an oven or furnace. The conductor may be heated in an oxidizing atmosphere (e.g., an oven with a charge of an oxidizing fluid such as air). In an embodiment, a 304H stainless steel conductor is heated in a furnace at a temperature of about 870° C. for about 2 hours. If the surface of the 304H stainless steel conductor is roughened prior to heating the conductor in the furnace, the emissivity of the 304H stainless steel conductor may be increased from about 0.5 to about 0.85. Increasing the emissivity of the conductor may reduce an operating temperature of the conductor. Operating the conductor at lower temperatures may increase an operational lifetime of the conductor. For example, operating the conductor at lower temperatures may reduce creep and/or corrosion.

In some embodiments, applying a coating to a conductor or conduit may increase the emissivity of a conductor or a conduit and increase the efficiency of heat transfer to the formation. An electrically insulating and thermally conductive coating may be placed on a conductor and/or conduit. The electrically insulating coating may inhibit arcing between the conductor and the conduit. Arcing between the conductor and the conduit may cause shorting between the conductor and the conduit. Arcing may also produce hot spots and/or cold spots on either the conductor or the conduit. In some embodiments, a coating or coatings on portions of a conduit and/or a conductor may increase emissivity, electrically insulate, and promote thermal conduction.

As shown in FIG. 65, conductor 1112 and conduit 1176 may be placed in opening 544 in hydrocarbon layer 522. In an embodiment, an electrically insulative, thermally conductive coating is placed on conductor 1112 and conduit 1176 (e.g., on an outside surface of the conductor and an inside surface of the conduit). In some embodiments, the electrically insulative, thermally conductive coating is placed on conductor 1112. In other embodiments, the electrically insulative, thermally conductive coating is placed on conduit 1176. The electrically insulative, thermally conductive coating may electrically insulate conductor 1112 from conduit 1176. The electrically insulative, thermally conductive coating may inhibit arcing between conductor 1112 and conduit 1176. In certain embodiments, the electrically insulative, thermally conductive coating maintains an emissivity of conductor 1112 or conduit 1176 (i.e., inhibits the emissivity of the conductor or conduit from decreasing). In other embodiments, the electrically insulative, thermally conductive coating increases an emissivity of conductor 1112 and/or conduit 1176. The electrically insulative, thermally conductive coating may include, but is not limited to, oxides of silicon, aluminum, and zirconium, or combinations thereof. For example, silicon oxide may be used to increase an emissivity of a conductor or conduit while aluminum oxide may be used to provide better electrical insulation and thermal conductivity. Thus, a combination of silicon oxide and aluminum oxide may be used to increase emissivity while providing improved electrical insulation and thermal conductivity. In an embodiment, aluminum oxide is coated on conductor 1112 to electrically insulate the conductor followed by a coating of silicon oxide to increase the emissivity of the conductor.

In an embodiment, the electrically insulative, thermally conductive coating is sprayed on conductor 1112 or conduit 1176. The coating may be sprayed on during assembly of the conductor-in-conduit heat source. In some embodiments, the coating is sprayed on before assembling the conductor-in-conduit heat source. For example, the coating may be sprayed on conductor 1112 or conduit 1176 by a manufacturer of the conductor or conduit. In certain embodiments, the coating is sprayed on conductor 1112 or conduit 1176 before the conductor or conduit is coiled onto a spool for installation. In other embodiments, the coating is sprayed on after installation of the conductor-in-conduit heat source.

In a heat source embodiment, a perforated conduit may be placed in the opening formed in the hydrocarbon containing formation proximate and external to the conduit of a conductor-in-conduit heater. The perforated conduit may remove fluids formed in an opening in the formation to reduce pressure adjacent to the heat source. A pressure may be maintained in the opening such that deformation of the first conduit is inhibited. In some embodiments, the perforated conduit may be used to introduce a fluid into the formation adjacent to the heat source. For example, in some embodiments, hydrogen gas may be injected into the formation adjacent to selected heat sources to increase a partial pressure of hydrogen during in situ conversion.

Figure 87:
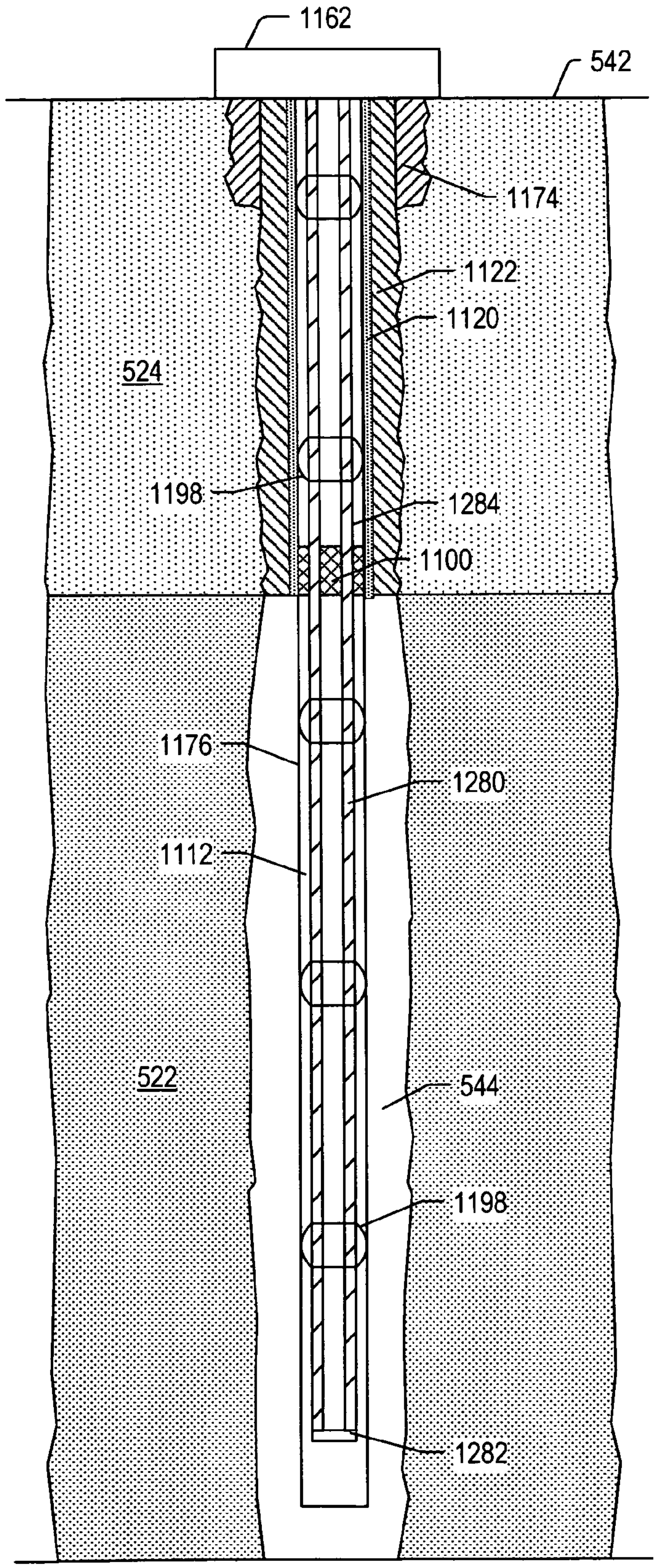
FIG. 87 depicts an embodiment of a conductor-in-conduit heat source in a formation.

FIG. 87 illustrates an embodiment of a conductor-in-conduit heater that may heat a hydrocarbon containing formation. Second conductor 1280 may be disposed in conduit 1176 in addition to conductor 1112. Second conductor 1280 may be coupled to conductor 1112 using connector 1282 located near a lowermost surface of conduit 1176. Second conductor 1280 may be a return path for the electrical current supplied to conductor 1112. For example, second conductor 1280 may return electrical current to wellhead 1162 through low resistance second conductor 1284 in overburden casing 1120. Second conductor 1280 and conductor 1112 may be formed of elongated conductive material. Second conductor 1280 and conductor 1112 may be a stainless steel rod having a diameter of approximately 2.4 cm. Connector 1282 may be flexible. Conduit 1176 may be electrically isolated from conductor 1112 and second conductor 1280 using centralizers 1198. The use of a second conductor may eliminate the need for a sliding connector. The absence of a sliding connector may extend the life of the heater. The absence of a sliding connector may allow for isolation of applied power from hydrocarbon layer 522.

In a heat source embodiment that utilizes second conductor 1280, conductor 1112 and the second conductor may be coupled by a flexible connecting cable. The bottom of the first and second conductor may have increased thicknesses to create low resistance sections. The flexible connector may be made of stranded copper covered with rubber insulation.

In a heat source embodiment, a first conductor and a second conductor may be coupled to a sliding connector within a conduit. The sliding connector may include insulating material that inhibits electrical coupling between the conductors and the conduit. The sliding connector may accommodate thermal expansion and contraction of the conductors and conduit relative to each other. The sliding connector may be coupled to low resistance sections of the conductors and/or to a low temperature portion of the conduit.

In a heat source embodiment, the conductor may be formed of sections of various metals that are welded or otherwise joined together. The cross-sectional area of the various metals may be selected to allow the resulting conductor to be long, to be creep resistant at high operating temperatures, and/or to dissipate desired amounts of heat per unit length along the entire length of the conductor. For example, a first section may be made of a creep resistant metal (such as, but not limited to, Inconel 617 or HR120), and a second section of the conductor may be made of 304 stainless steel. The creep resistant first section may help to support the second section. The cross-sectional area of the first section may be larger than the cross-sectional area of the second section. The larger cross-sectional area of the first section may allow for greater strength of the first section. Higher resistivity properties of the first section may allow the first section to dissipate the same amount of heat per unit length as the smaller cross-sectional area second section.

In some embodiments, the cross-sectional area and/or the metal used for a particular conduit section may be chosen so that a particular section provides greater (or lesser) heat dissipation per unit length than an adjacent section. More heat may be provided near an interface between a hydrocarbon layer and a non-hydrocarbon layer (e.g., the overburden and the hydrocarbon layer and/or an underburden and the hydrocarbon layer) to counteract end effects and allow for more uniform heat dissipation into the hydrocarbon containing formation.

In a heat source embodiment, a conduit may have a variable wall thickness. Wall thickness may be thickest adjacent to portions of the formation that do not need to be fully heated. Portions of formation that do not need to be fully heated may include layers of formation that have low grade, little, or no hydrocarbon material.

In an embodiment of heat sources placed in a formation, a first conductor, a second conductor, and a third conductor may be electrically coupled in a 3-phase Y electrical configuration. Each of the conductors may be a part of a conductor-in-conduit heater. The conductor-in-conduit heaters may be located in separate wellbores within the formation. The outer conduits may be electrically coupled together or conduits may be connected to ground. The 3-phase Y electrical configuration may provide a safer and more efficient method to heat a hydrocarbon containing formation than using a single conductor. The first, second, and third conduits may be electrically isolated from the first, second, and third conductors. Each conductor-in-conduit heater in a 3-phase Y electrical configuration may be dimensioned to generate approximately 650 watts per meter of conductor to approximately 1650 watts per meter of conductor.

Heat may be generated by the conductor-in-conduit heater within an open wellbore. Generated heat may radiatively heat a portion of a hydrocarbon containing formation adjacent to the conductor-in-conduit heater. To a lesser extent, gas conduction adjacent to the conductor-in-conduit heater heats the portion of the formation. Using an open wellbore completion may reduce casing and packing costs associated with filling the opening with a material to provide conductive heat transfer between the insulated conductor and the formation. In addition, heat transfer by radiation may be more efficient than heat transfer by conduction in a formation, so the heaters may be operated at lower temperatures using radiative heat transfer. Operating at a lower temperature may extend the life of the heat source and/or reduce the cost of material needed to form the heat source.

The conductor-in-conduit heater may be installed in opening 544. In an embodiment, the conductor-in-conduit heater may be installed into a well by sections. For example, a first section of the conductor-in-conduit heater may be suspended in a wellbore by a rig. The section may be about 12 m in length. A second section (e.g., of substantially similar length) may be coupled to the first section in the well. The second section may be coupled by welding the second section to the first section and/or with threads disposed on the first and second section. An orbital welder disposed at the wellhead may weld the second section to the first section. The first section may be lowered into the wellbore by the rig. This process may be repeated with subsequent sections coupled to previous sections until a heater of desired length is placed in the wellbore. In some embodiments, three sections may be welded together prior to being placed in the wellbore. The welds may be formed and tested before the rig is used to attach the three sections to a string already placed in the ground. The three sections may be lifted by a crane to the rig. Having three sections already welded together may reduce installation time of the heat source.

Assembling a heat source at a location proximate a formation (e.g., at the site of a formation) may be more economical than shipping a pre-formed heat source and/or conduits to the hydrocarbon containing formation. For example, assembling the heat source at the site of the formation may reduce costs for transporting assembled heat sources over long distances. In addition, heat sources may be more easily assembled in varying lengths and/or of varying materials to meet specific formation requirements at the formation site. For example, a portion of a heat source that is to be heated may be made of a material (e.g., 304 stainless steel or other high temperature alloy) while a portion of the heat source in the overburden may be made of carbon steel. Forming the heat source at the site may allow the heat source to be specifically made for an opening in the formation so that the portion of the heat source in the overburden is carbon steel and not a more expensive, heat resistant alloy. Heat source lengths may vary due to varying formation layer depths and formation properties. For example, a formation may have a varying thickness and/or may be located underneath rolling terrain, uneven surfaces, and/or an overburden with a varying thickness. Heat sources of varying length and of varying materials may be assembled on site in lengths determined by the depth of each opening in the formation.

Figure 88:
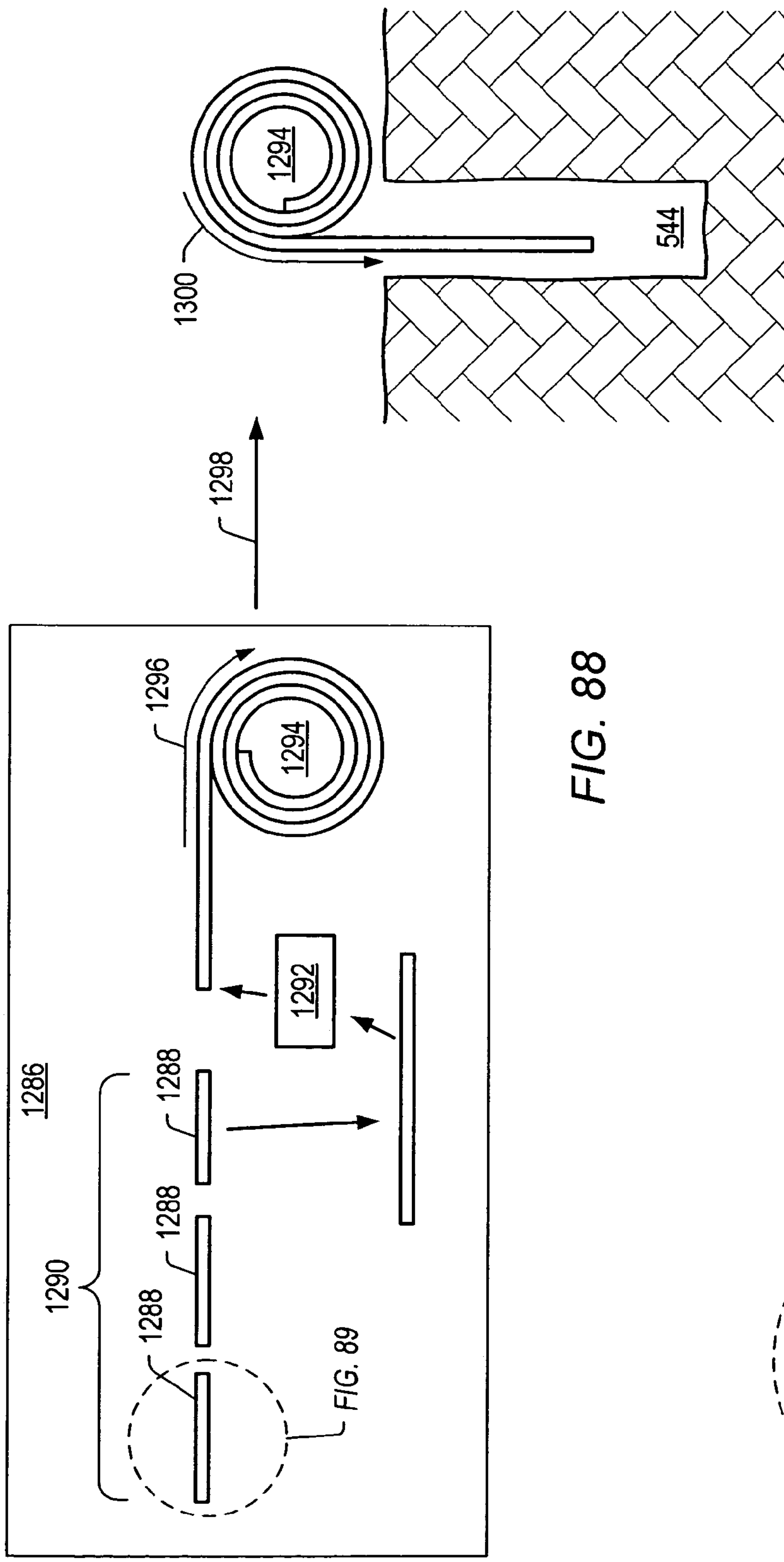
FIG. 88 depicts an embodiment for assembling a conductor-in-conduit heat source and installing the heat source in a formation.

FIG. 88 depicts an embodiment for assembling a conductor-in-conduit heat source and installing the heat source in a formation. The conductor-in-conduit heat source may be assembled in assembly facility 1286. In some embodiments, the heat source is assembled from conduits shipped to the formation site. In other embodiments, heat sources may be made from plate stock that is formed into conduits at the assembly facility. An advantage of forming a conduit at the assembly facility may be that a surface of plate stock may be treated with a desired coating (e.g., a coating that allows the emissivity to approach one) or cladding (e.g., copper cladding) before forming the conduit so that the treated surface is an inside surface of the conduit. In some embodiments, portions of heat sources may be formed from plate stock at the assembly facility, while other portions of the heat source may be formed from conduits shipped to the formation site.

Figure 89:
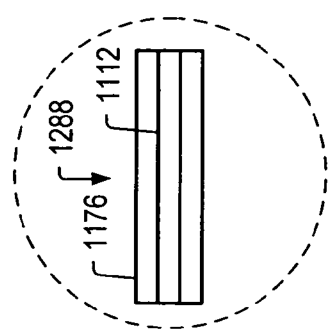
FIG. 89 depicts an embodiment of a conductor-in-conduit heat source to be installed in a formation.

Individual conductor-in-conduit heat source 1288 may include conductor 1112 and conduit 1176 as shown in FIG. 89. In an embodiment, conductor 1112 and conduit 1176 heat sources may be made of a number of joined together sections. In an embodiment, each section is a standard 40 ft (12.2 m) section of pipe. Other section lengths may also be formed and/or utilized. In addition, sections of conductor 1112 and/or conduit 1176 may be treated in assembly facility 1286 before, during, or after assembly. The sections may be treated, for example, to increase an emissivity of the sections by roughening and/or oxidation of the sections.

Each conductor-in-conduit heat source 1288 may be assembled in an assembly facility. Components of conductor-in-conduit heat source 1288 may be placed on or within individual conductor-in-conduit heat source 1288 in the assembly facility. Components may include, but are not limited to, one or more centralizers, low resistance sections, sliding connectors, insulation layers, and coatings, claddings, or coupling materials.

As shown in FIG. 88, each individual conductor-in-conduit heat source 1288 may be coupled to at least one individual conductor-in-conduit heat source 1288 at coupling station 1290 to form conductor-in-conduit heat source of a desired length. The desired length may be, for example, a length of a conductor-in-conduit heat source specified for a selected opening in a formation. In certain embodiments, coupling individual conductor-in-conduit heat source 1288 to at least one additional individual conductor-in-conduit heat source 1288 includes welding the individual conductor-in-conduit heat source to at least one additional individual conductor-in-conduit heat source. In one embodiment, welding each individual conductor-in-conduit heat source 1288 to an additional individual conductor-in-conduit heat source is accomplished by forge welding two adjacent sections together.

In some embodiments, sections of welded together conductor-in-conduit heat source of a desired length are placed on a bench, holding tray or in an opening in the ground until the entire length of the heat source is completed. Weld integrity may be tested as each weld is formed. Weld integrity may be tested by a non-destructive testing method such as x-ray testing, acoustic testing, and/or electromagnetic testing. Weld integrity may be tested at a testing station 1292. After an entire length of conductor-in-conduit heat source of the desired length is completed, the conductor-in-conduit heat source of the desired length may be coiled onto spool 1294 in a direction of arrow 1296. Coiling conductor-in-conduit heat source 1288 of the desired length may make the heat source easier to transport to an opening in a formation. For example, conductor-in-conduit heat source 1288 of the desired length may be more easily transported by truck or train to an opening in the formation.

In some embodiments, a set length of welded together conductor-in-conduit may be coiled onto spool 1294 while other sections are being formed at coupling station 1290. In some embodiments, the assembly facility may be a mobile facility (e.g., placed on one or more train cars or semi-trailers) that can be moved to an opening in a formation. After forming a welded together length of conductor-in-conduit with components (e.g., centralizers, coatings, claddings, sliding connectors), the conductor-in-conduit length may be lowered into the opening in the formation.

In certain embodiments, conductor-in-conduit heat source 1288 of a desired length may be tested at testing station 1292 before coiling the heat source. Testing station 1292 may be used to test a completed conductor-in-conduit heat source or sections of the conductor-in-conduit heat source. Testing station 1292 may be used to test selected properties of conductor-in-conduit heat source. For example, testing station 1292 may be used to test properties such as, but not limited to, electrical conductivity, weld integrity, thermal conductivity, emissivity, and mechanical strength. In one embodiment, testing station 1292 is used to test weld integrity with an Electro-Magnetic Acoustic Transmission (EMAT) weld inspection technique.

Conductor-in-conduit heat source 1288 may be coiled onto spool 1294 for transporting from assembly facility 1286 to an opening in a formation and installation into the opening. In an embodiment, assembly facility 1286 is located at a site of the formation. For example, assembly facility 1286 may be part of a treatment facility used to treat fluids from the formation or located proximate to the formation (e.g., less than about 10 km from the formation or, in some embodiments, less than about 20 km or less than about 30 km). Other types of heat sources (e.g., insulated conductor heat sources, natural distributed combustor heat sources, etc.) may also be assembled in assembly facility 1286. These other heat sources may also be spooled onto spool 1294, transported to an opening in a formation, and installed into the opening. In some embodiments, spool 1294 may be included as a portion of a coiled tubing rig (e.g., for an insulated conductor heat source or a conductor-in-conduit heat source).

Transportation of conductor-in-conduit heat source 1288 to an opening in a formation is represented by arrow 1298 in FIG. 88. Transporting conductor-in-conduit heat source 1288 may include transporting the heat source on a bed, trailer, a cart of a truck or train, or a coiled tubing unit. In some embodiments, more than one heat source may be placed on the bed. Each heat source may be installed in a separate opening in the formation. In one embodiment, a train system (e.g., rail system) may be set up to transport heat sources from assembly facility 1286 to each of the openings in the formation. In some instances, a lift and move track system may be used in which train tracks are lifted and moved to another location after use in one location.

After spool 1294 with conductor-in-conduit heat source 1288 has been transported to opening 544, the heat source may be uncoiled and installed into the opening in a direction of arrow 1300. Conductor-in-conduit heat source 1288 may be uncoiled from spool 1294 while the spool remains on the bed of a truck or train. In some embodiments, more than one conductor-in-conduit heat source 1288 may be installed at one time. In one embodiment, more than one heat source may be installed into one opening 544. Spool 1294 may be re-used for additional heat sources after installation of conductor-in-conduit heat source 1288. In some embodiments, spool 1294 may be used to remove conductor-in-conduit heat source 1288 from the opening. Conductor-in-conduit heat source 1288 of desired length may be re-coiled onto spool 1294 as the heat source is removed from opening 544. Subsequently, conductor-in-conduit heat source 1288 may be re-installed from spool 1294 into opening 544 or transported to an alternate opening in the formation and installed in the alternate opening.

In certain embodiments, conductor-in-conduit heat source 1288, or any heat source (e.g., an insulated conductor heat source or natural distributed combustor), may be installed such that the heat source is removable from opening 544. The heat source may be removable so that the heat source can be repaired or replaced if the heat source fails or breaks. In other instances, the heat source may be removed from the opening and transported and redeployed in another opening in the formation (or in a different formation) at a later time. In other instances, the heat source may be removed and replaced with a lower cost heater at later times of heating a formation. Being able to remove, replace, and/or redeploy a heat source may be economically favorable for reducing equipment and/or operating costs. In addition, being able to remove and replace an ineffective heater may eliminate the need to form wellbores in close proximity to existing wellbores that have failed heaters in a heated or heating formation.

In some embodiments, a conduit of a desired length may be placed into opening 544 before a conductor of the desired length. The conductor and the conduit of the desired length may be assembled in assembly facility 1286. The conduit of the desired length may be installed into opening 544. After installation of the conduit of the desired length, the conductor of the desired length may be installed into opening 544. In an embodiment, the conduit and the conductor of the desired length are coiled onto a spool in assembly facility 1286 and uncoiled from the spool for installation into opening 544. Components (e.g., centralizers 1198, sliding connectors 1202, etc.) may be placed on the conductor or conduit as the conductor is installed into the conduit and opening 544.

In certain embodiments, centralizer 1198 may include at least two portions coupled together to form the centralizer (e.g., "clam shell" centralizers). In one embodiment, the portions are placed on a conductor and coupled together as the conductor is installed into a conduit or opening. The portions may be coupled with fastening devices such as, but not limited to, clamps, bolts, screws, snap-locks, and/or adhesive. The portions may be shaped such that a first portion fits into a second portion. For example, an end of the first portion may have a slightly smaller width than an end of the second portion so that the ends overlap when the two portions are coupled.

In some embodiments, low resistance section 1118 is coupled to conductor-in-conduit heat source 1288 in assembly facility 1286. In other embodiments, low resistance section 1118 is coupled to conductor-in-conduit heat source 1288 after the heat source is installed into opening 544. Low resistance section 1118 of a desired length may be assembled in assembly facility 1286. An assembled low resistance conductor may be coiled onto a spool. The assembled low resistance conductor may be uncoiled from the spool and coupled to conductor-in-conduit heat source 1288 after the heat source is installed in opening 544. In another embodiment, low resistance section 1118 is assembled as the low resistance conductor is coupled to conductor-in-conduit heat source 1288 and installed into opening 544. Conductor-in-conduit heat source 1288 may be coupled to a support after installation so that low resistance section 1118 is coupled to the installed heat source.

Assembling a desired length of a low resistance conductor may include coupling individual low resistance conductors together. The individual low resistance conductors may be plate stock conductors obtained from a manufacturer. The individual low resistance conductors may be coupled to an electrically conductive material to lower the electrical resistance of the low resistance conductor. The electrically conductive material may be coupled to the individual low resistance conductor before assembly of the desired length of low resistance conductor. In one embodiment, the individual low resistance conductors may have threaded ends that are coupled together. In another embodiment, the individual low resistance conductors may have ends that are welded together. Ends of the individual low resistance conductors may be shaped such that an end of a first individual low resistance conductor fits into an end of a second individual low resistance conductor. For example, an end of a first individual low resistance conductor may be a female-shaped end while an end of a second individual low resistance conductor is a male-shaped end.

In another embodiment, a conductor-in-conduit heat source of a desired length may be assembled at a wellbore (or opening) in a formation and installed into the wellbore as the conductor-in-conduit heat source is assembled. Individual conductors may be coupled to form a first section of a conductor of desired length. Similarly, conduits may be coupled to form a first section of a conduit of desired length. The first formed sections of the conductor and the conduit may be installed into the wellbore. The first formed sections of the conductor and the conduit may be electrically coupled at a first end that is installed into the wellbore. The first sections of the conductor and conduit may, in some embodiments, be coupled substantially simultaneously. Additional sections of the conductor and/or conduit may be formed during or after installation of the first formed sections. The additional sections of the conductor and/or conduit may be coupled to the first formed sections of the conductor and/or conduit and installed into the wellbore. Centralizers and/or other components may be coupled to sections of the conductor and/or conduit and installed with the conductor and the conduit into the wellbore.

A method for coupling conductors or conduits may include a forge welding method (e.g., shielded active gas (SAG) welding). In an embodiment, forge welding includes arranging ends of the conductors and/or conduits that are to be interconnected at a selected distance. Seals may be formed against walls of the conduit and/or conductor to define a chamber. A flushing, reducing fluid may be introduced into the chamber. Each end within the chamber may be heated and moved towards another end until the heated ends contact each other. Contacting the heated ends may form a forge weld between the heated ends. The flushing, reducing fluid mixture may include less than 25% by volume of a reducing agent and more than 75% by volume of a substantially inert gas. The flushing, reducing fluid may inhibit oxidation reactions that can adversely affect weld integrity.

A flushing fluid mixture with less than 25% by volume of a reducing fluid (e.g., hydrogen and/or carbon monoxide) and more than 75% by volume of a substantially inert gas (e.g., nitrogen, argon, and/or carbon dioxide) may be non-explosive when the flushing fluid mixture comes into contact with air at elevated temperatures needed to form the forge weld. In some embodiments, the reducing agent may be or include borax powder and/or beryllium or alkaline hydrites. The flushing fluid mixture may contain a sufficient amount of a reducing gas to flush off oxidized skin from the hot ends that are to be interconnected. In some embodiments, the non-explosive flushing fluid mixture includes between 2% by volume and 10% by volume of the reducing fluid and between 90% by volume and 98% by volume of the substantially inert gas. In certain embodiments, the mixture includes about 5% by volume of the reducing fluid and about 95% by volume of the substantially inert gas. In one embodiment, a non-explosive flushing fluid mixture includes about 95% by volume of nitrogen and about 5% by volume of hydrogen. The non-explosive flushing fluid mixture may also include less than 100 ppm $H_2O$ and/or $O_2$ or, in some cases, less than 15 ppm $H_2O$ and/or $O_2$.

A substantially inert gas used during a forge welding procedure is a gas that does not significantly react with the metals to be forge welded at the pressures and temperatures used during forge welding. Substantially inert gas may be, but is not limited to, noble gases (e.g., helium and argon), nitrogen, or combinations thereof.

A non-explosive flushing fluid mixture may be formed in-situ within the chamber. A coating on the conduits and/or conductors may be present and/or a solid may be placed in the chamber. When the conduits and/or conductors are heated, the coating and/or solid may react or physically transform to the flushing fluid mixture.

In an embodiment, ends of conductors or conduits are heated by means of high frequency electrical heating. The ends may be maintained at a predetermined spacing of between 1 mm and 4 mm from each other by a gripping assembly while being heated. Electrical contacts may be pressed at circumferentially spaced intervals against the wall of each conduit and/or conductor adjacent to the end such that the electrical contacts transmit a high frequency electrical current in a substantially circumferential direction in the segment between the electrical contacts.

To equalize the level of heating in a circumferential direction, each end may be heated by at least two pairs of electrodes. The electrodes of each pair may be pressed at substantially diametrically opposite positions against walls of the conduits and/or conductors. The different pairs of electrodes at each end may be activated in an alternating manner.

In one embodiment, two pairs of diametrically opposite electrodes are pressed at angular intervals of substantially 90° against walls of the conductors and conduits. In another embodiment, three pairs of diametrically opposite electrodes are pressed at angular intervals of substantially 60° against the walls of the conductors and conduits. In other embodiments, four, five, six or more pairs of diametrically opposite electrodes may be used and activated in an alternating manner to equalize the level of heating of the ends in the circumferential direction.

The use of two or more pairs of electrodes may reduce unequal heating of the pipe ends because of over heating of the walls in the direct vicinity of the electrode. In addition, using two or more pairs of electrodes may reduce heating of the pipe wall halfway between the electrodes.

In another embodiment, the ends may be heated by a direct resistance heating method. The direct resistance heating method may include transmitting a large current in an axial direction across the conduits and/or conductors while the conduits and/or conductors are pressed together. In another embodiment, the ends may be heated by induction heating. Induction heating may include using external and/or internal heating coils to create an electromagnetic field that induces electrical currents in the conduits and/or conductors. The electrical currents may resistively heat the conduits.

The heating assembly may be used to give the forge welded ends a post weld heat treatment. The post weld heat treatment may include providing at least some heating to the ends such that the ends are cooled down at a predetermined temperature decrease rate (i.e., cool down rate). In some embodiments, the assembly may be equipped with water and/or forced air injectors to increase and/or control the cool down rate of the forge welded ends.

In certain embodiments, the quality of the forge weld formed between the interconnected conduits and/or conductors is inspected by means of an Electro-Magnetic Acoustic Transmission weld inspection technique (EMAT). EMAT may include placing at least one electromagnetic coil adjacent to both sides of the forge welded joint. The coil may be held at a predetermined distance from the conduits and/or conductors during the inspection process. The absence of physical contact between the wall of the hot conduits and/or conductors and the coils of the EMAT inspection tool may enable weld inspection immediately after the forge weld joint has been made.

Figure 90:
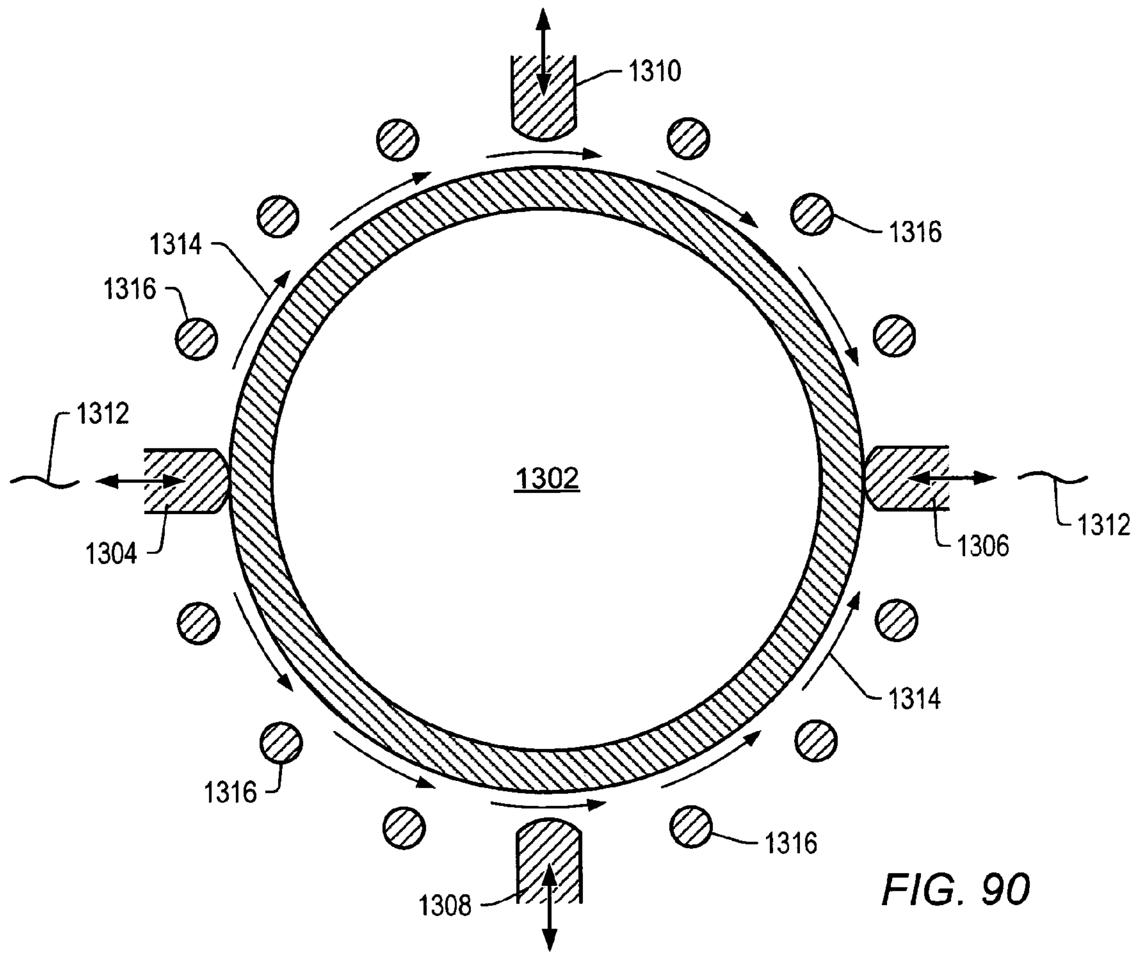
FIG. 90 shows a cross-sectional representation of an end of a tubular around which two pairs of diametrically opposite electrodes are arranged.

FIG. 90 shows an end of tubular 1302 around which two pairs of diametrically opposite electrodes 1304, 1306 and 1308, 1310 are arranged. Tubular 1302 may be a conduit or conductor. Tubular 1302 may be made of electrically conductive material (e.g., stainless steel). The first pair of electrodes 1304, 1306 may be pressed against the outer surface of tubular 1302 and transmit high frequency current 1312 through the wall of the tubular as illustrated by arrows 1314. An assembly of ferrite bars 1316 may serve to enhance the current density in the immediate vicinity of the ends of the tubular 1302 and of the adjacent tubular to which tubular 1302 is to be welded.

Figure 91:
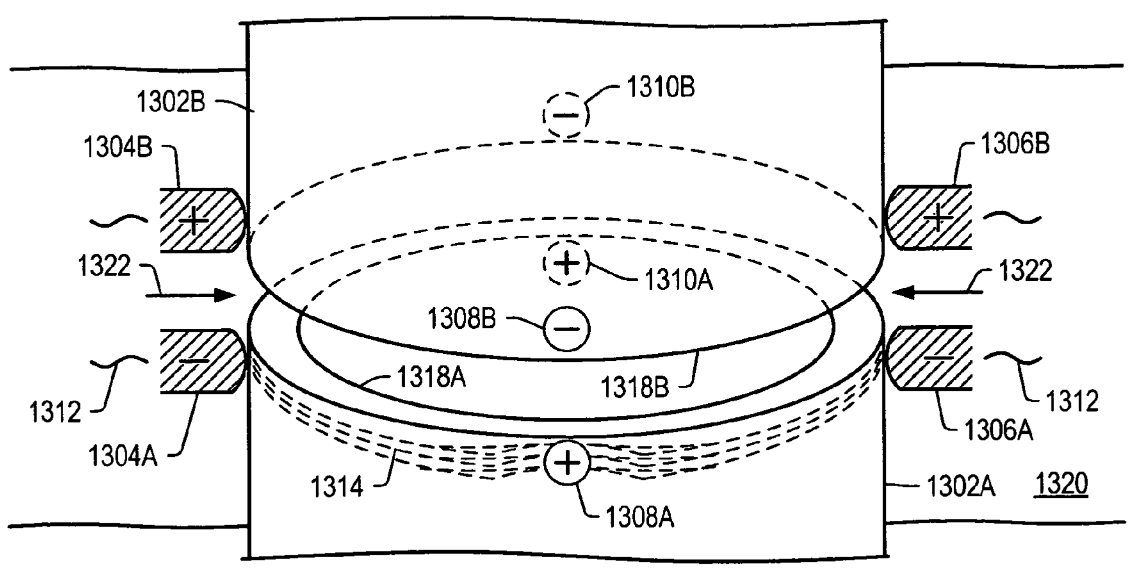
FIG. 91 depicts an embodiment of ends of two adjacent tubulars before forge welding.

FIG. 91 depicts an embodiment with ends 1318A, 1318B of two adjacent tubulars 1302A and 1302B. Tubulars 1302A, 1302B may be heated by two sets of diametrically opposite electrodes 1304A, 1306A, 1308A, 1310A and 1304B, 1306B, 1308B and 1310B, respectively. Tubular ends 1318A, 1318B may be located at a few millimeters distant from each other during a heating phase. The larger spacing of current density shown by dotted lines 1314 midway between electrodes 1304A, 1306A illustrates that the current density midway between these electrodes may be lower than the current density adjacent to each of the electrodes. The lower current density midway between the electrodes may create a variation in the heating rate of the tubular ends 1318A, 1318B. To reduce a possible irregular heating rate, electrodes 1304A, 1306A and 1304B, 1306B may be regularly lifted from the outer surface of tubulars 1302A, 1302B while the other electrodes 1308A, 1308B and 1310A, 1310B are pressed against the outer surface of tubulars 1302A, 1302B and activated to transmit a high frequency current through the ends of the tubulars. By sequentially activating the two sets of diametrically opposite electrodes at each tubular end, irregular heating of the tubular ends may be inhibited (i.e., heating of the tubular ends may be more uniform).

All electrodes 1304A-1310A and 1304B-1310B shown in FIG. 91 may be pressed simultaneously against tubular ends 1318A, 1318B if alternating current supplied to the electrodes is controlled such that during a first part of a current cycle the diametrically opposite electrode pairs 1304B, 1306B and 1308A, 1310A transmit a positive electrical current as indicated by the "+" sign in FIG. 91, whereas electrodes 1304A, 1306A, and 1308B, 1310B transmit a negative electrical current as indicated by the "–" sign. During a second part of the alternating current cycle, electrodes 1304B, 1306B, and 1308A, 1310A transmit a negative electrical current, whereas electrodes 1304A, 1306A, and 1308B, 1310B transmit a positive current into tubulars 1302A, 1302B. Controlling the alternating current in this manner may heat tubular ends 1318A, 1318B in a substantially uniform manner.

The temperature of heated tubular ends 1318A, 1318B may be monitored by an infrared temperature sensor. When the monitored temperature has reached a temperature sufficient to make a forge weld, tubular ends 1318A, 1318B may be pressed onto each other such that a forge weld is made. Tubular ends 1318A, 1318B may be profiled and have a smaller wall thickness than other parts of tubulars 1302A,

1302B to compensate for the deformation of the tubular ends when the ends are abutted. Profiling the tubular ends may allow tubulars 1302A, 1302B to have a substantially uniform wall thickness at forge welded ends.

During the heating phase and while the ends of tubulars 1302A, 1302B are moved towards each other, the tubular ends may be encased, both internally and externally, in a chamber 1320. Chamber 1320 may be filled with a non-explosive flushing fluid mixture. The non-explosive flushing fluid mixture may include more than 75% by volume of nitrogen and less than 25% by volume of hydrogen. In one embodiment, the non-explosive flushing fluid mixture for interconnecting steel tubulars 1302A, 1302B includes about 5% by volume of hydrogen and about 95% by volume of nitrogen. The flushing fluid pressure in a part of chamber 1320 outside the tubulars 1302A, 1302B may be higher than the flushing fluid pressure in a part of the chamber 1320 within the interior of the tubulars such that throughout the heating process the flushing fluid flows along the ends of the tubulars as illustrated by arrows 1322 until the ends of the tubulars are forged together. In some embodiments, flushing fluid may flow through the chamber.

Hydrogen in the flushing fluid may react with oxidized metal on the ends 1318A, 1318B of the tubulars 1302A, 1302B so that formation of an oxidized skin is inhibited. Inhibition of an oxidized skin may allow formation of a forge weld with minimal amounts of corroded metal inclusions.

Laboratory experiments revealed that a good metallurgical bond between stainless steel tubulars may be obtained by forge welding with a flushing fluid containing about 5% by volume of hydrogen and about 95% by volume of nitrogen. Experiments also show that such a flushing fluid mixture may be non-explosive during and after forge welding. Two forge welded stainless steel tubulars failed at a location away from the forge weld when the tubulars were subjected to testing.

In an embodiment, the tubular ends are clamped throughout the forge welding process to a gripping assembly. Clamping the tubular ends may maintain the tubular ends at a predetermined spacing of between 1 mm and 4 mm from each other during the heating phase. The gripping assembly may include a mechanical stop that interrupts axial movement of the heated tubular ends during the forge welding process after the heated tubular ends have moved a predetermined distance towards each other. The heated tubular ends may be pressed into each other such that a high quality forge weld is created without significant deformation of the heated ends.

In certain embodiments, electrodes 1304A-1310A and 1304B -1310B may also be activated to give the forged tubular ends a post weld heat treatment. High frequency current 1312 supplied to the electrodes during the post weld heat treatment may be lower than during the heat up phase before the forge welding operation. High frequency current 1312 supplied during the post weld heat treatment may be controlled in conjunction with temperature measured by an infrared temperature sensor(s) such that the temperature of the forge welded tubular ends is decreased in accordance with a predetermined temperature decrease or cooling cycle.

The quality of the forge weld may be inspected by a hybrid electromagnetic acoustic transmission technique which is known as EMAT. EMAT is described in U.S. Pat. Nos. 5,652,389 to Schaps et al., 5,760,307 to Latimer et al., 5,777,229 to Geier et al., and 6,155,117 to Stevens et al., each of which is incorporated by reference as if fully set forth herein. The EMAT technique makes use of an induction coil placed at one side of the welded joint. The induction coil may induce magnetic fields that generate electromagnetic forces in the surface of the welded joint. These forces may produce a mechanical disturbance by coupling to the atomic lattice through a scattering process. In electromagnetic acoustic generation, the conversion may take place within a skin depth of material (i.e., the metal surface acts as a transducer). The reception may take place in a reciprocal way in a receiving coil. When the elastic wave strikes the surface of the conductor in the presence of a magnetic field, induced currents may be generated in the receiving coil, similar to the operation of an electric generator. An advantage of the EMAT weld inspection technology is that the inductive transmission and receiving coils do not have to contact the welded tubular. Thus, the inspection may be done soon after the forge weld is made (e.g., when the forge welded tubulars are still too hot to allow physical contact with an inspection probe).

Using the SAG method to weld tubular ends of heat sources may inhibit changes in the metallurgy of the tubular materials. For example, the elemental composition of the weld joint may be substantially similar to the elemental composition of the tubulars. Inhibiting changes in metallurgy may reduce the need for heat-treatment of the tubulars before use of the tubulars. The SAG method also appears not to change the grain structure of the near-weld section of the tubulars. Maintaining the grain structure of the tubulars may inhibit corrosion and/or creep in the tubulars during use.

Figure 92:
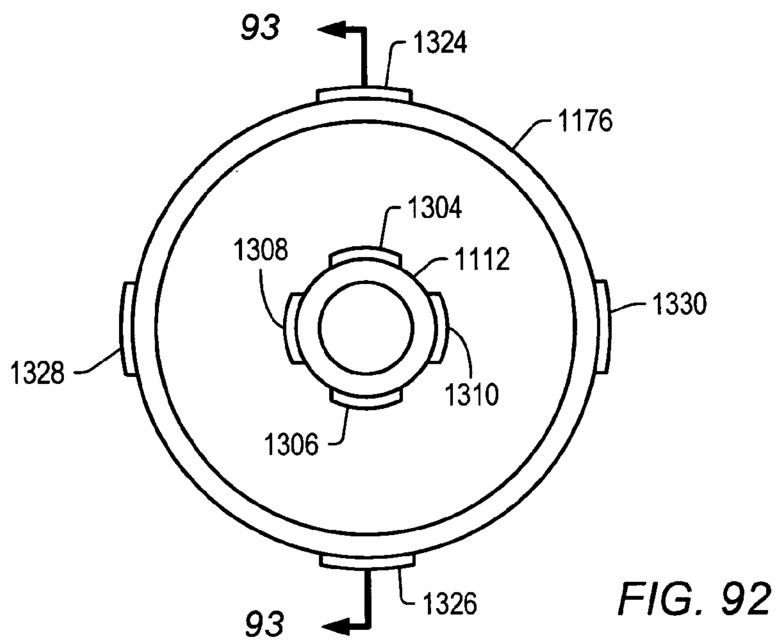
FIG. 92 illustrates an end view of an embodiment of a conductor-in-conduit heat source heated by diametrically opposite electrodes.

FIG. 92 illustrates an end view of an embodiment of a conductor-in-conduit heat source heated by diametrically opposite electrodes. Conductor 1112 may be placed within conduit 1176. Conductor 1112 may be heated by two sets of diametrically opposite electrodes 1304, 1306, 1308, 1310. Conduit 1176 may be heated by two sets of diametrically opposite electrodes 1324, 1326, 1328, 1330. Conductor 1112 and conduits 1176 may be heated and forge welded together as described in the embodiments of FIGS. 90-91. In some embodiments, two ends of conductors 1112 are forged welded together and then two ends of conduits 1176 are forged together in a second procedure.

Figure 93:
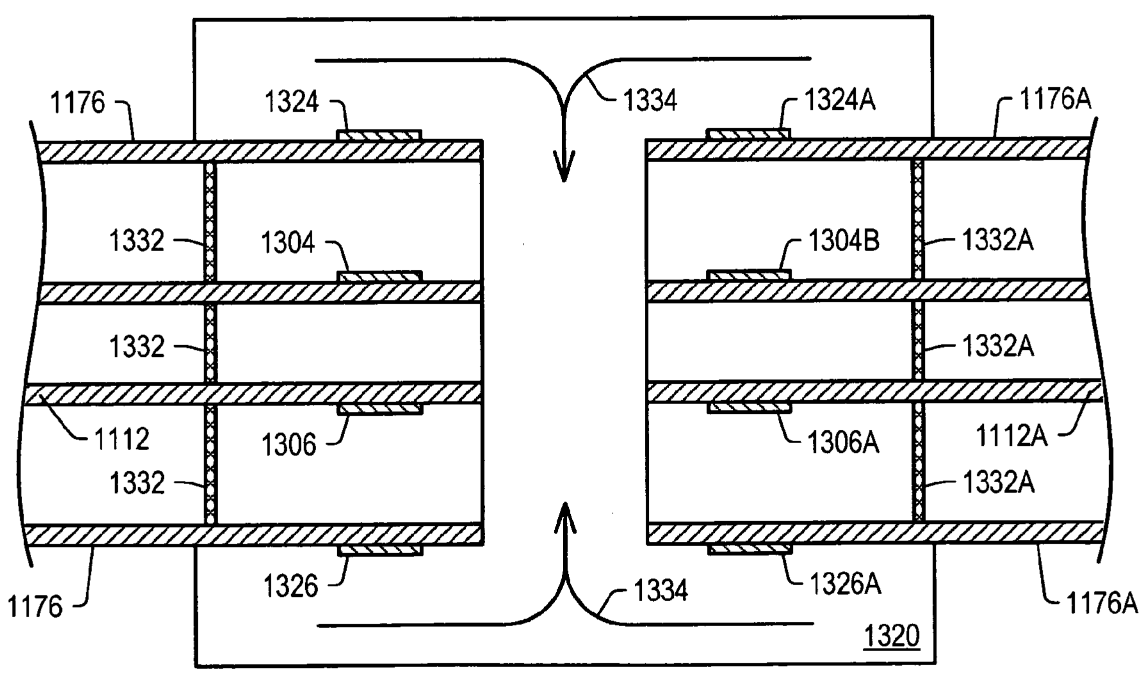
FIG. 93 illustrates a cross-sectional representation of an embodiment of two conductor-in-conduit heat source sections before forge welding.

FIG. 93 illustrates a cross-sectional representation of an embodiment of two sections of a conductor-in-conduit heat source before being forge welded. During heating of conductors 1112, 1112A and conduits 1176, 1176A and while the ends of the conductors and the conduits are moved towards each other, ends of the conductors and conduits may be encased in a chamber 1320. Chamber 1320 may be filled with the non-explosive flushing fluid mixture. Plugs 1332, 1332A may be placed in the annular space between conductors 1112, 1112A and conduits 1176, 1176A. In an embodiment, the plugs may be inflated to seal the annular space. Plugs 1332, 1332A may inhibit the flow of the flushing fluid mixture through the annular space between conductors 1112, 1112A and conduits 1176, 1176A. The flushing fluid pressure in a part of chamber 1320 outside the conduits 1176, 1176A may be higher than the flushing fluid pressure inside the conduits and outside conductors 1112, 1112A. Similarly, the flushing fluid pressure outside conductors 1112, 1112A may be higher than the flushing fluid pressure inside the conductors. Due to the pressure differentials throughout the heating process, the flushing fluid tends to flow along the ends of the tubulars as illustrated by arrows 1334 until the ends of the conductors and conduits are forged together.

Figure 94:
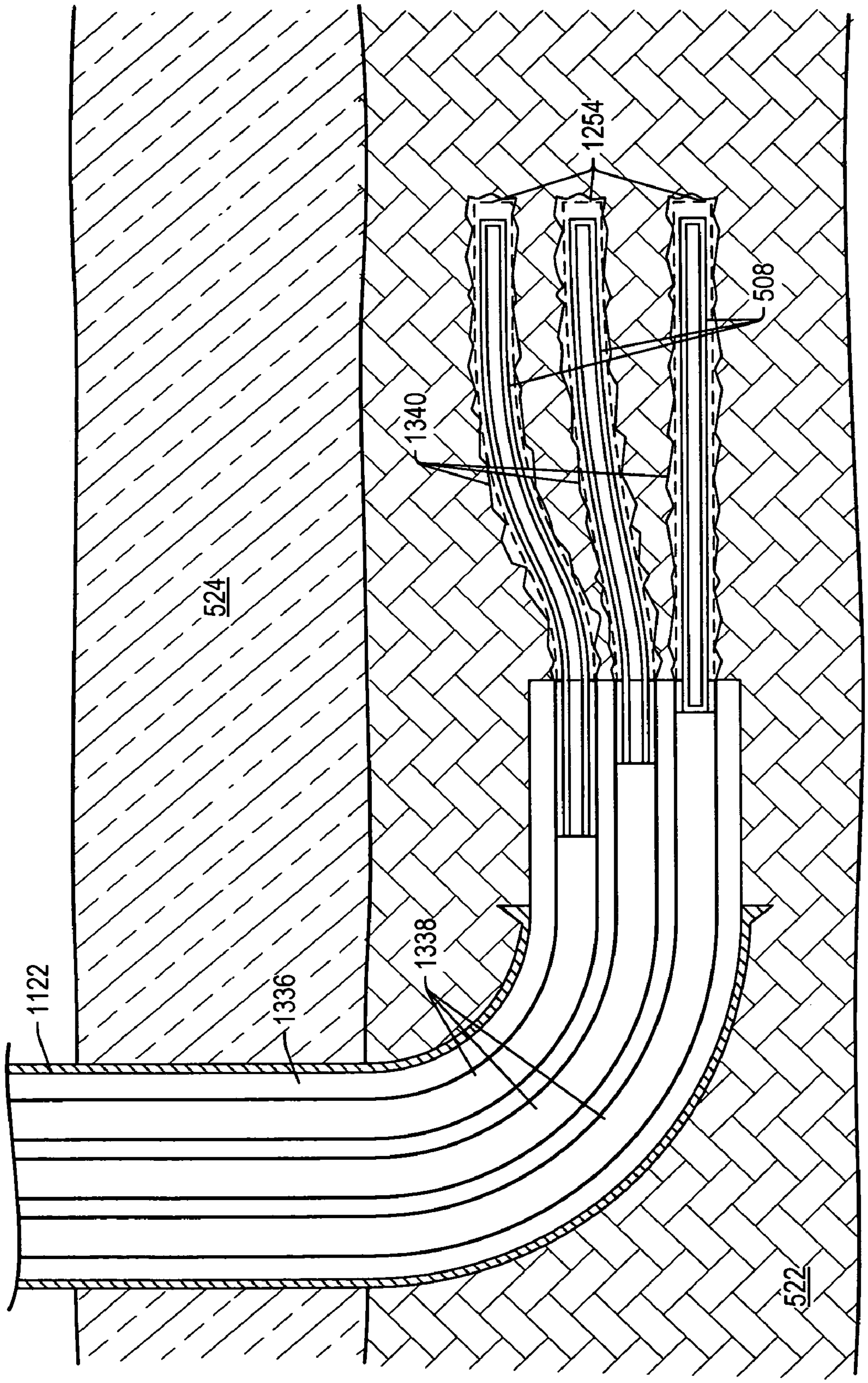
FIG. 94 depicts an embodiment of heat sources installed in a formation.

FIG. 94 depicts an embodiment of three horizontal heat sources placed in a formation. Wellbore 1336 may be formed through overburden 524 and into hydrocarbon layer 522. Wellbore 1336 may be formed by any standard drilling method. In certain embodiments, wellbore 1336 is formed substantially horizontally in hydrocarbon layer 522. In some embodiments, wellbore 1336 may be formed at other angles within hydrocarbon layer 522.

One or more conduits 1338 may be placed within wellbore 1336. A portion of wellbore 1336 and/or second wellbores may include casings. Conduit 1338 may have a smaller diameter than wellbore 1336. In an embodiment, wellbore 1336 has a diameter of about 30.5 cm and conduit 1338 has a diameter of about 14 cm. In an embodiment, an inside diameter of a casing in conduit 1338 may be about 12 cm. Conduits 1338 may have extended sections 1340 that extend beyond the end of wellbore 1336 in hydrocarbon layer 522. Extended sections 1340 may be formed in hydrocarbon layer 522 by drilling or other wellbore forming methods. In an embodiment, extended sections 1340 extend substantially horizontally into hydrocarbon layer 522. In certain embodiments, extended sections 1340 may somewhat diverge as represented in FIG. 94.

Perforated casings 1254 may be placed in extended sections 1340 of conduits 1338. Perforated casings 1254 may provide support for the extended sections so that collapse of wellbores is inhibited during heating of the formation. Perforated casings 1254 may be steel (e.g., carbon steel or stainless steel). Perforated casings 1254 may be perforated liners that expand within the wellbores (expandable tubulars). Expandable tubulars are described in U.S. Pat. Nos. 5,366,012 to Lohbeck, and 6,354,373 to Vercaemer et al., each of which is incorporated by reference as if fully set forth herein. In an embodiment, perforated casings 1254 are formed by inserting a perforated casing into each of extended sections 1340 and expanding the perforated casing within each extended section. The perforated casing may be expanded by pulling an expander tool shaped to push the perforated casing towards the wall of the wellbore (e.g., a pig) along the length of each extended section 1340. The expander tool may push each perforated casing beyond the yield point of the perforated casing.

After installation of perforated casings 1254, heat sources 508 may be installed into extended sections 1340. Heat sources 508 may be used to provide heat to hydrocarbon layer 522 along the length of extended sections 1340. Heat sources 508 may include heat sources such as conductor-in-conduit heaters, insulated conductor heaters, etc. In some embodiments, heat sources 508 have a diameter of about 7.3 cm. Perforated casings 1254 may allow for production of formation fluid from the heat source wellbores. Installation of heat sources 508 in perforated casings 1254 may also allow the heat sources to be removed at a later time. Heat sources 508 may, for example, be removed for repair, replacement, and/or used in another portion of a formation.

In an embodiment, an elongated member may be disposed within an opening (e.g., an open wellbore) in a hydrocarbon containing formation. The opening may be an uncased opening in the hydrocarbon containing formation. The elongated member may be a length (e.g., a strip) of metal or any other elongated piece of metal (e.g., a rod). The elongated member may include stainless steel. The elongated member may be made of a material able to withstand corrosion at high temperatures within the opening.

An elongated member may be a bare metal heater. "Bare metal" refers to a metal that does not include a layer of electrical insulation, such as mineral insulation, that is designed to provide electrical insulation for the metal throughout an operating temperature range of the elongated member. Bare metal may encompass a metal that includes a corrosion inhibiter such as a naturally occurring oxidation layer, an applied oxidation layer, and/or a film. Bare metal includes metal with polymeric or other types of electrical insulation that cannot retain electrical insulating properties at typical operating temperature of the elongated member. Such material may be placed on the metal and may be thermally degraded during use of the heater.

An elongated member may have a length of about 650 m. Longer lengths may be achieved using sections of high strength alloys, but such elongated members may be expensive. In some embodiments, an elongated member may be supported by a plate in a wellhead. The elongated member may include sections of different conductive materials that are welded together end-to-end. A large amount of electrically conductive weld material may be used to couple the separate sections together to increase strength of the resulting member and to provide a path for electricity to flow that will not result in arcing and/or corrosion at the welded connections. In some embodiments, different sections may be forge welded together. The different conductive materials may include alloys with a high creep resistance. The sections of different conductive materials may have varying diameters to ensure uniform heating along the elongated member. A first metal that has a higher creep resistance than a second metal typically has a higher resistivity than the second metal. The difference in resistivities may allow a section of larger cross-sectional area, more creep resistant first metal to dissipate the same amount of heat as a section of smaller cross-sectional area second metal. The cross-sectional areas of the two different metals may be tailored to result in substantially the same amount of heat dissipation in two welded together sections of the metals. The conductive materials may include, but are not limited to, 617 Inconel, HR-120, 316 stainless steel, and 304 stainless steel. For example, an elongated member may have a 60 meter section of 617 Inconel, 60 meter section of HR-120, and 150 meter section of 304 stainless steel. In addition, the elongated member may have a low resistance section that may run from the wellhead through the overburden. This low resistance section may decrease the heating within the formation from the wellhead through the overburden. The low resistance section may be the result of, for example, choosing a electrically conductive material and/or increasing the cross-sectional area available for electrical conduction.

In a heat source embodiment, a support member may extend through the overburden, and the bare metal elongated member or members may be coupled to the support member. A plate, a centralizer, or other type of support member may be located near an interface between the overburden and the hydrocarbon layer. A low resistivity cable, such as a stranded copper cable, may extend along the support member and may be coupled to the elongated member or members. The low resistivity cable may be coupled to a power source that supplies electricity to the elongated member or members.

Figure 95:
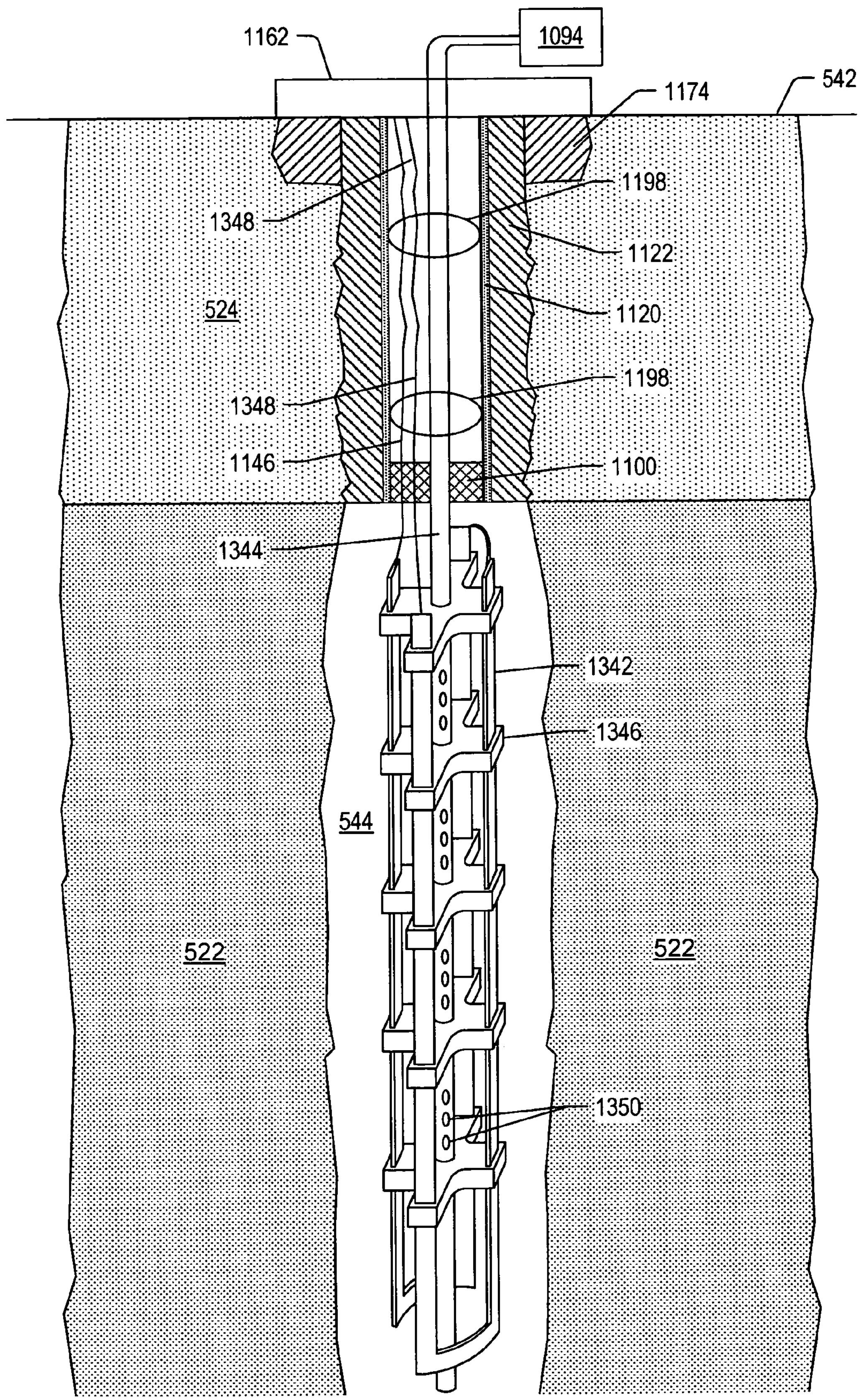
FIG. 95 depicts an embodiment of a heat source in a formation.

FIG. 95 illustrates an embodiment of a plurality of elongated members that may heat a hydrocarbon containing formation. Two or more (e.g., four) elongated members 1342 may be supported by support member 1344. Elongated members 1342 may be coupled to support member 1344 using insulated centralizers 1346. Support member 1344 may be a tube or conduit. Support member 1344 may also be a perforated tube. Support member 1344 may provide a flow of an oxidizing fluid into opening 544. Support member 1344 may have a diameter between about 1.2 cm and about 4 cm and, in some embodiments, about 2.5 cm. Support member 1344, elongated members 1342, and insulated centralizers 1346 may be disposed in opening 544 in hydrocarbon layer 522. Insulated centralizers 1346 may maintain a location of elongated members 1342 on support member 1344 such that lateral movement of elongated members 1342 is inhibited at temperatures high enough to deform support member 1344 or elongated members 1342. Elongated members 1342, in some embodiments, may be metal strips of about 2.5 cm wide and about 0.3 cm thick stainless steel. Elongated members 1342, however, may also include a pipe or a rod formed of a conductive material. Electrical current may be applied to elongated members 1342 such that elongated members 1342 may generate heat due to electrical resistance.

Elongated members 1342 may generate heat of approximately 650 watts per meter of elongated members 1342 to approximately 1650 watts per meter of elongated members 1342. Elongated members 1342 may be at temperatures of approximately 480° C. to approximately 815° C. Substantially uniform heating of a hydrocarbon containing formation may be provided along a length of elongated members 1342 or greater than about 305 m or, maybe even greater than about 610 m.

Elongated members 1342 may be electrically coupled in series. Electrical current may be supplied to elongated members 1342 using lead-in conductor 1146. Lead-in conductor 1146 may be coupled to wellhead 1162. Electrical current may be returned to wellhead 1162 using lead-out conductor 1348 coupled to elongated members 1342. Lead-in conductor 1146 and lead-out conductor 1348 may be coupled to wellhead 1162 at surface 542 through a sealing flange located between wellhead 1162 and overburden 524. The sealing flange may inhibit fluid from escaping from opening 544 to surface 542 and/or atmosphere. Lead-in conductor 1146 and lead-out conductor 1348 may be coupled to elongated members using a cold pin transition conductor. The cold pin transition conductor may include an insulated conductor of low resistance. Little or no heat may be generated in the cold pin transition conductor. The cold pin transition conductor may be coupled to lead-in conductor 1146, lead-out conductor 1348, and/or elongated members 1342 by splices, mechanical connections and/or welds. The cold pin transition conductor may provide a temperature transition between lead-in conductor 1146, lead-out conductor 1348, and/or elongated members 1342. Lead-in conductor 1146 and lead-out conductor 1348 may be made of low resistance conductors so that substantially no heat is generated from electrical current passing through lead-in conductor 1146 and lead-out conductor 1348.

Weld beads may be placed beneath centralizers 1346 on support member 1344 to fix the position of the centralizers. Weld beads may be placed on elongated members 1342 above the uppermost centralizer to fix the position of the elongated members relative to the support member (other types of connecting mechanisms may also be used). When heated, the elongated member may thermally expand downwards. The elongated member may be formed of different metals at different locations along a length of the elongated member to allow relatively long lengths to be formed. For example, a "U" shaped elongated member may include a first length formed of 310 stainless steel, a second length formed of 304 stainless steel welded to the first length, and a third length formed of 310 stainless steel welded to the second length. 310 stainless steel is more resistive than 304 stainless steel and may dissipate approximately 25% more energy per unit length than 304 stainless steel of the same dimensions. 310 stainless steel may be more creep resistant than 304 stainless steel. The first length and the third length may be formed with cross-sectional areas that allow the first length and third lengths to dissipate as much heat as a smaller cross-sectional area of 304 stainless steel. The first and third lengths may be positioned close to wellhead 1162. The use of different types of metal may allow the formation of long elongated members. The different metals may be, but are not limited to, 617 Inconel, HR120, 316 stainless steel, 310 stainless steel, and 304 stainless steel.

Packing material 1100 may be placed between overburden casing 1120 and opening 544. Packing material 1100 may inhibit fluid flowing from opening 544 to surface 542 and to inhibit corresponding heat losses towards the surface. In some embodiments, overburden casing 1120 may be placed in reinforcing material 1122 in overburden 524. In other embodiments, overburden casing may not be cemented to the formation. Surface conductor 1174 may be disposed in reinforcing material 1122. Support member 1344 may be coupled to wellhead 1162 at surface 542. Centralizer 1198 may maintain a location of support member 1344 within overburden casing 1120. Electrical current may be supplied to elongated members 1342 to generate heat. Heat generated from elongated members 1342 may radiate within opening 544 to heat at least a portion of hydrocarbon layer 522.

The oxidizing fluid may be provided along a length of the elongated members 1342 from oxidizing fluid source 1094. The oxidizing fluid may inhibit carbon deposition on or proximate the elongated members. For example, the oxidizing fluid may react with hydrocarbons to form carbon dioxide. The carbon dioxide may be removed from the opening. Openings 1350 in support member 1344 may provide a flow of the oxidizing fluid along the length of elongated members 1342. Openings 1350 may be critical flow orifices. In some embodiments, a conduit may be disposed proximate elongated members 1342 to control the pressure in the formation and/or to introduce an oxidizing fluid into opening 544. Without a flow of oxidizing fluid, carbon deposition may occur on or proximate elongated members 1342 or on insulated centralizers 1346. Carbon deposition may cause shorting between elongated members 1342 and insulated centralizers 1346 or hot spots along elongated members 1342. The oxidizing fluid may be used to react with the carbon in the formation. The heat generated by reaction with the carbon may complement or supplement electrically generated heat.

Figure 96:
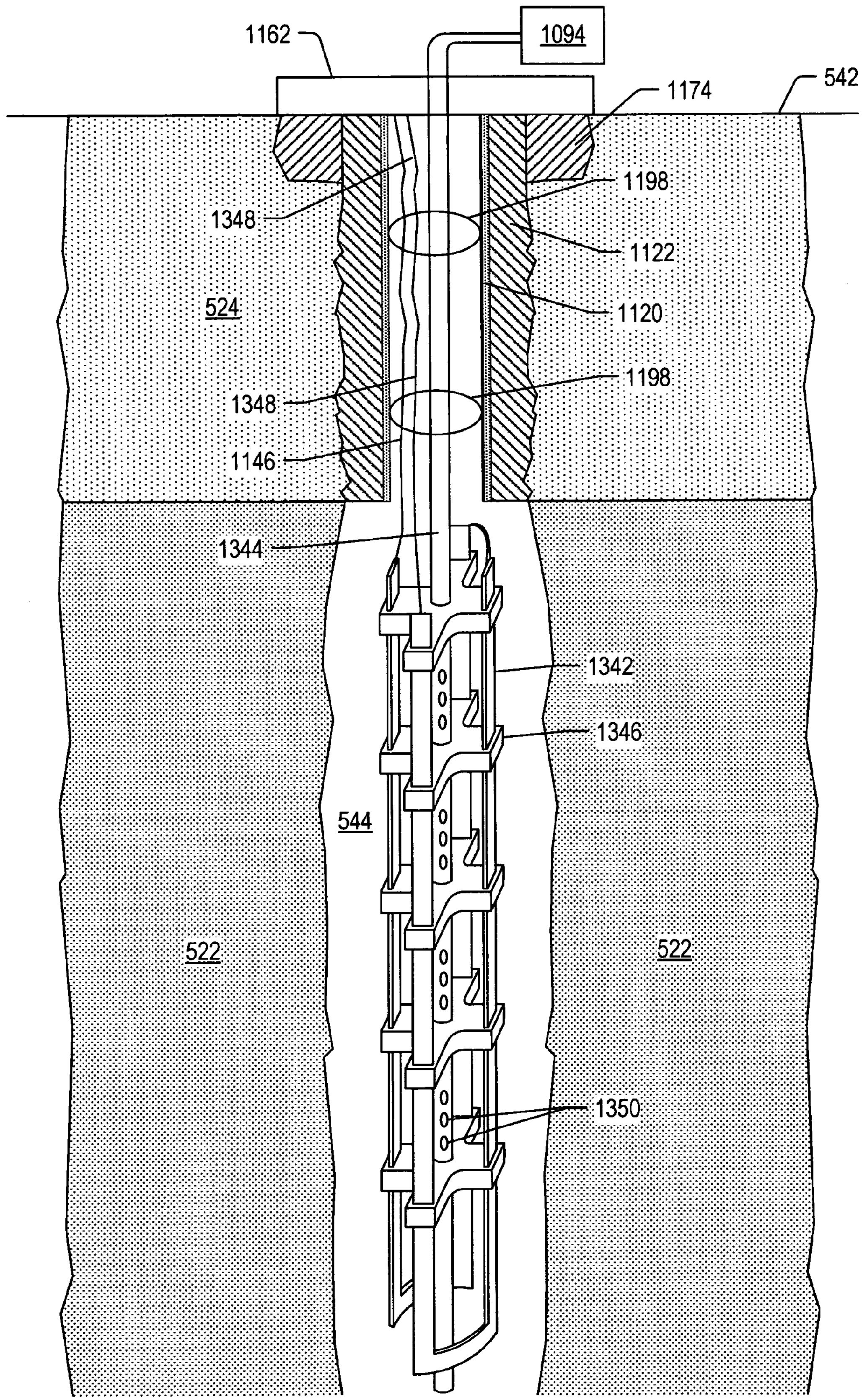
FIG. 96 depicts an embodiment of a heat source in a formation.

FIG. 96 depicts an embodiment of a elongated member heat source. Elongated members 1342 are removable from opening 544 in the formation.

In a heat source embodiment, a bare metal elongated member may be formed in a "U" shape (or hairpin) and the member may be suspended from a wellhead or from a positioner placed at or near an interface between the overburden and the formation to be heated. In certain embodiments, the bare metal heaters are formed of rod stock. Cylindrical, high alumina ceramic electrical insulators may be placed over legs of the elongated members. Tack welds along lengths of the legs may fix the position of the insulators. The insulators may inhibit the elongated member from contacting the formation or a well casing (if the elongated member is placed within a well casing). The insulators may also inhibit legs of the "U" shaped members from contacting each other. High alumina ceramic electrical insulators may be purchased from Cooper Industries (Houston, Tex.). In an embodiment, the "U" shaped member may be formed of different metals having different cross-sectional areas so that the elongated members may be relatively long and may dissipate a desired amount of heat per unit length along the entire length of the elongated member.

Use of welded together sections may result in an elongated member that has large diameter sections near a top of the elongated member and a smaller diameter section or sections lower down a length of the elongated member. For example, an embodiment of an elongated member has two ⅞ inch (2.2 cm) diameter first sections, two ½ inch (1.3 cm) middle sections, and a ⅜ inch (0.95 cm) diameter bottom section that is bent into a "U" shape. The elongated member may be made of materials with other cross-sectional shapes such as ovals, squares, rectangles, triangles, etc. The sections may be formed of alloys that will result in substantially the same heat dissipation per unit length for each section.

In some embodiments, the cross-sectional area and/or the metal used for a particular section may be chosen so that a particular section provides greater (or lesser) heat dissipation per unit length than an adjacent section. More heat dissipation per unit length may be provided near an interface between a hydrocarbon layer and a non-hydrocarbon layer (e.g., the overburden and the hydrocarbon layer) to counteract end effects and allow for more uniform heat dissipation into the hydrocarbon containing formation. A higher heat dissipation per unit length may also occur at a lower end of an elongated member to counteract end effects and allow for more uniform heat dissipation.

In certain embodiments, the wall thickness of portions of a conductor, or any electrically-conducting portion of a heater, may be adjusted to provide more or less heat to certain zones of a formation. In an embodiment, the wall thickness of a portion of the conductor adjacent to a lean zone (i.e., zone containing relatively little or no hydrocarbons) may be thicker than a portion of the conductor adjacent to a rich zone (i.e., hydrocarbon layer in which hydrocarbons are pyrolyzed and/or produced). Adjusting the wall thickness of a conductor to provide less heat to the lean zone and more heat to the rich zone may more efficiently use electricity to heat the formation.

Figure 97:
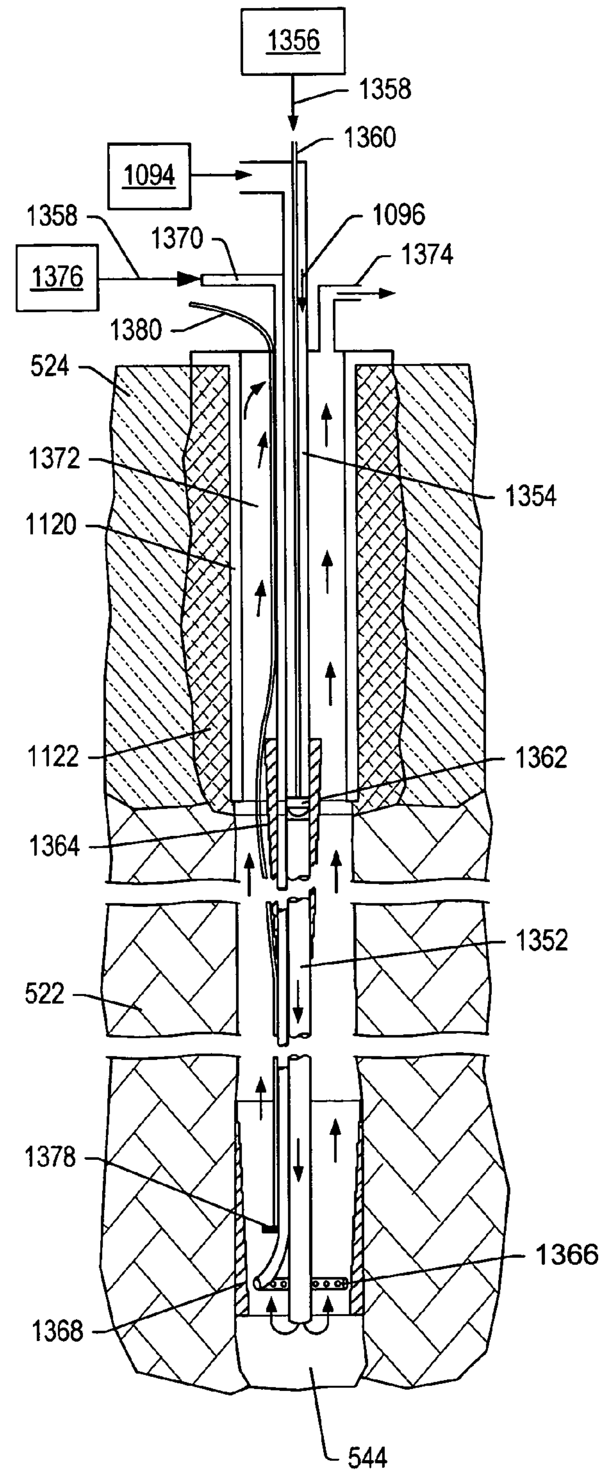
FIG. 97 illustrates a cross-sectional representation of an embodiment of a heater with two oxidizers.

FIG. 97 illustrates a cross-sectional representation of an embodiment of a heater using two oxidizers. One or more oxidizers may be used to heat a hydrocarbon layer or hydrocarbon layers of a formation having a relatively shallow depth (e.g., less than about 250 m). Conduit 1352 may be placed in opening 544 in a formation. Conduit 1352 may have upper portion 1354. Upper portion 1354 of conduit 1352 may be placed primarily in overburden 524 of the formation. A portion of conduit 1352 may include high temperature resistant, non-corrosive materials (e.g., 316 stainless steel and/or 304 stainless steel). Upper portion 1354 of conduit 1352 may include a less temperature resistant material (e.g., carbon steel). A diameter of opening 544 and conduit 1352 may be chosen such that a cross-sectional area of opening 544 outside of conduit 1352 is approximately equal to a cross-sectional area inside conduit 1352. This may equalize pressures outside and inside conduit 1352. In an embodiment, conduit 1352 has a diameter of about 0.11 m and opening 544 has a diameter of about 0.15 m.

Oxidizing fluid source 1094 may provide oxidizing fluid 1096 into conduit 1352. Oxidizing fluid 1096 may include hydrogen peroxide, air, oxygen, or oxygen enriched air. In an embodiment, oxidizing fluid source 1094 may include a membrane system that enriches air by preferentially passing oxygen, instead of nitrogen, through a membrane or membranes. First fuel source 1356 may provide fuel 1358 into first fuel conduit 1360. First fuel conduit 1360 may be placed in upper portion 1354 of conduit 1352. In some embodiments, first fuel conduit 1360 may be placed outside conduit 1352. In other embodiments, conduit 1352 may be placed within first fuel conduit 1360. Fuel 1358 may include combustible material, including but not limited to, hydrogen, methane, ethane, other hydrocarbon fluids, and/or combinations thereof. Fuel 1358 may include steam to inhibit coking within the fuel conduit or proximate an oxidizer. First oxidizer 1362 may be placed in conduit 1352 at a lower end of upper portion 1354. First oxidizer 1362 may oxidize at least a portion of fuel 1358 from first fuel conduit 1360 with at least a portion of oxidizing fluid 1096. First oxidizer may be a burner such as an inline burner. Burners may be obtained from John Zink Company (Tulsa, Okla.) or Callidus Technologies (Tulsa, Okla.). First oxidizer 1362 may include an ignition source such as a flame. First oxidizer 1362 may also include a flameless ignition source such as, for example, an electric igniter.

In some embodiments, fuel 1358 and oxidizing fluid 1096 may be combined at the surface and provided to opening 544 through conduit 1352. Fuel 1358 and oxidizing fluid 1096 may be combined in a mixer, aerator, nozzle, or similar mixing device located at the surface. In such an embodiment, conduit 1352 provides both fuel 1358 and oxidizing fluid 1096 into opening 544. Locating first oxidizer 1362 at or proximate the upper portion of the section of the formation to be heated may tend to inhibit or decrease coking in one or more of the fuel conduits (e.g., in first fuel conduit 1360).

Oxidation of fuel 1358 at first oxidizer 1362 will generate heat. The generated heat may heat fluids in a region proximate first oxidizer 1362. The heated fluids may include fuel, oxidizing fluid, and oxidation product. The heated fluids may be allowed to transfer heat to hydrocarbon layer 522 along a length of conduit 1352. The amount of heat transferred from the heated fluids to the formation may vary depending on, for example, a temperature of the heated fluids. In general, the greater the temperature of the heated fluids, the more heat that will be transferred to the formation. In addition, as heat is transferred from the heated fluids, the temperature of the heated fluids decreases. For example, temperatures of fluids in the oxidizer flame may be about 1300° C. or above, and as the fluids reach a distance of about 150 m from the oxidizer, temperatures of fluids may be, for example, about 750° C. Thus, the temperature of the heated fluids, and hence the heat transferred to the formation, decreases as the heated fluids flow away from the oxidizer.

First insulation 1364 may be placed on lengths of conduit 1352 proximate a region of first oxidizer 1362. First insulation 1364 may have a length of about 10 m to about 200 m (e.g., about 50 m). In alternative embodiments, first insulation 1364 may have a length that is about 1040% of the length of conduit 1352 between any two oxidizers (e.g., between first oxidizer 1362 and second oxidizer 1366 in FIG. 97). A length of first insulation 1364 may vary depending on, for example, desired heat transfer rate to the formation, desired temperature proximate the first oxidizer, and/or desired temperature profile along the length of conduit 1352. First insulation 1364 may have a thickness that varies (either continually or in step fashion) along its length. In certain embodiments, first insulation 1364 may have a greater thickness proximate first oxidizer 1362 and a reduced thickness at a desired distance from the first oxidizer. The greater thickness of first insulation 1364 may preferentially reduce heat transfer proximate first oxidizer 1362 as compared to a reduced thickness portion of the insulation. Variable thickness insulation may allow for uniform or relatively uniform heating of the formation adjacent to a heated portion of the heat source. In an embodiment, first insulation 1364 may have a thickness of about 0.03 m proximate first oxidizer 1362 and a thickness of about 0.015 m at a distance of about 10 m from the first oxidizer. In the embodiment, the heated portion of the conduit is about 300 m in length, with insulation (first insulation 1364) being placed proximate the upper 100 m portion of this length, and insulation (second insulation 1368) being placed proximate the lower 100 m portion of this length.

A thickness of first insulation 1364 may vary depending on, for example, a desired heating rate or a desired temperature within opening 544 of hydrocarbon layer 522. The first insulation may inhibit the transfer of heat from the heated fluids to the formation in a region proximate the insulating conduit. First insulation 1364 may also inhibit charring and/or coking of hydrocarbons proximate first oxidizer 1362. First insulation 1364 may inhibit charring and/or coking by reducing an amount of heat transferred to the formation proximate the first oxidizer. First insulation 1364 may inhibit or decrease coking in fuel conduit 1370 when a carbon containing fuel is in the fuel conduit. First insulation 1364 may be made of a non-corrosive, thermally insulating material such as rock wool, Nextel®, calcium silicate, Fiberfrax®, insulating refractory cements such as those manufactured by Harbizon Walker, A. P. Green, or National Refractories, etc. The relatively high temperatures generated at the flame of first oxidizer 1362, which may be about 1300° C. or greater, may generate sufficient heat to convert hydrocarbons proximate the first oxidizer into coke and/or char if no insulation is provided.

Heated fluids from conduit 1352 may exit a lower end of the conduit into opening 544. A temperature of the heated fluids may be lower proximate the lower end of conduit 1352 than a temperature of the heated fluids proximate first oxidizer 1362. The heated fluids may return to a surface of the formation through the annulus of opening 544 (exhaust annulus 1372) and/or through exhaust conduit 1374. The heated fluids exiting the formation through exhaust conduit 1374 may be referred to as exhaust fluids. The exhaust fluids may be allowed to thermally contact conduit 1352 so as to exchange heat between exhaust fluids and either oxidizing fluid or fuel within conduit 1352. This exchange of heat may preheat fluids within conduit 1352. Thus, the thermal efficiency of the downhole combustor may be enhanced to as much as 90% or more (i.e., 90% or more of the heat from the heat of combustion is being transferred to a selected section of the formation).

In certain embodiments, extra oxidizers may be used in addition to oxidizer 1362 and oxidizer 1366 shown in FIG. 97. For example, in some embodiments, one or more extra oxidizers may be placed between oxidizer 1362 and oxidizer 1366. Such extra oxidizers may be, for example, placed at intervals of about 20-50 m. In certain embodiments, one oxidizer (e.g., oxidizer 1362) may provide at least about 50% of the heat to the selected section of the formation, and the other oxidizers may be used to adjust the heat flux along the length of the oxidizer.

In some embodiments, fins may be placed on an outside surface of conduit 1352 to increase exchange of heat between exhaust fluids and fluids within the conduit. Exhaust conduit 1374 may extend into opening 544. A position of lower end of exhaust conduit 1374 may vary depending on, for example, a desired removal rate of exhaust fluids from the opening. In certain embodiments, it may be advantageous to remove fluids through exhaust conduit 1374 from a lower portion of opening 544 rather than allowing exhaust fluids to return to the surface through the annulus of the opening. All or part of the exhaust fluids may be vented, treated in a treatment facility, and/or recycled. In some circumstances, the exhaust fluids may be recycled as a portion of fuel 1358 or oxidizing fluid 1096 or recycled into an additional heater in another portion of the formation.

Two or more heater wells with oxidizers may be coupled in series with exhaust fluids from a first heater well being used as a portion of fuel for a second heater well. Exhaust fluids from the second heater well may be used as a portion of fuel for a third heater well, and so on as needed. In some embodiments, a separator may separate unused fuel and/or oxidizer from combustion products to increase the energy content of the fuel for the next oxidizer. Using the heated exhaust fluids as a portion of the feed for a heater well may decrease costs associated with pressurizing fluids for use in the heater well. In an embodiment, a portion (e.g., about one-third or about one-half) of the oxygen in the oxidizing fluid stream provided to a first heater well may be utilized in the first heater well. This would leave the remaining oxygen available for use as oxidizing fluid for subsequent heater wells. The heated exhaust fluids tend to have a pressure associated with the previous heater well and may be maintained at that pressure for providing to the next heater well. Thus, connection of two or more heater wells in series can significantly reduce compression costs associated with pressurizing fluids.

Overburden casing 1120 and reinforcing material 1122 may be placed in overburden 524. Overburden 524 may be above hydrocarbon layer 522. In certain embodiments, overburden casing 1120 may extend downward into part or the entire zone being heated. Overburden casing 1120 may include steel (e.g., carbon steel or stainless steel). Reinforcing material 1122 may include, for example, foamed cement or a cement with glass and/or ceramic beads filled with air.

As depicted in the embodiment of FIG. 97, a heater may have second fuel conduit 1370. Second fuel conduit 1370 may be coupled to conduit 1352. Second fuel source 1376 may provide fuel 1358 to second fuel conduit 1370. Second fuel source 1376 may provide fuel that is similar to fuel from first fuel source 1356. In some embodiments, fuel from second fuel source 1376 may be different than fuel from first fuel source 1356. Fuel 1358 may exit second fuel conduit 1370 at a location proximate second oxidizer 1366. Second oxidizer 1366 may be located proximate a bottom of conduit 1352 and/or opening 544. Second oxidizer 1366 may be coupled to a lower end of second fuel conduit 1370. Second oxidizer 1366 may be used to oxidize at least a portion of fuel 1358 (exiting second fuel conduit 1370) with heated fluids exiting conduit 1352. Un-oxidized portions of heated fluids from conduit 1352 may also be oxidized at second oxidizer 1366. Second oxidizer 1366 may be a burner (e.g., a ring burner). Second oxidizer 1366 may be made of stainless steel. Second oxidizer 1366 may include one or more orifices that allow a flow of fuel 1358 into opening 544. The one or more orifices may be critical flow orifices. Oxidized portions of fuel 1358, along with un-oxidized portions of fuel, may combine with heated fluids from conduit 1352 and exit the formation with the heated fluids. Heat generated by oxidation of fuel 1358 from second fuel conduit 1370 proximate a lower end of opening 544, in combination with heat generated from heated fluids in conduit 1352, may provide more uniform heating of hydrocarbon layer 522 than using a single oxidizer. In an embodiment, second oxidizer 1366 may be located about 200 m from first oxidizer 1362. However, in some embodiments, second oxidizer 1366 may be located up to about 250 m from first oxidizer 1362.

Heat generated by oxidation of fuel at the first and second oxidizers may be allowed to transfer to the formation. The generated heat may transfer to a pyrolysis zone in the formation. Heat transferred to the pyrolysis zone may pyrolyze at least some hydrocarbons within the pyrolysis zone.

In some embodiments, ignition source 1378 may be disposed proximate a lower end of second fuel conduit 1370 and/or second oxidizer 1366. Ignition source 1378 may be an electrically controlled ignition source. Ignition source 1378 may be coupled to ignition source lead-in wire 1380. Ignition source lead-in wire 1380 may be further coupled to a power source for ignition source 1378. Ignition source 1378 may be used to initiate oxidation of fuel 1358 exiting second fuel conduit 1370. After oxidation of fuel 1358 from second fuel conduit 1370 has begun, ignition source 1378 may be turned down and/or off. In other embodiments, an ignition source may also be disposed proximate first oxidizer 1362.

In some embodiments, ignition source 1378 may not be used if, for example, the conditions in the wellbore are sufficient to auto-ignite fuel 1358 being used. For example, if hydrogen is used as the fuel, the hydrogen will auto-ignite in the wellbore if the temperature and pressure in the wellbore are sufficient for autoignition of the fuel.

As shown in FIG. 97, second insulation 1368 may be disposed in a region proximate second oxidizer 1366. Second insulation 1368 may be disposed on a face of hydrocarbon layer 522 along an inner surface of opening 544. Second insulation 1368 may have a length of about 10 m to about 200 m (e.g., about 50 m). A length of second insulation 1368 may vary, however, depending on, for example, a desired heat transfer rate to the formation, a desired temperature proximate the lower oxidizer, or a desired temperature profile along a length of conduit 1352 and/or hydrocarbon layer 522. In an embodiment, the length of second insulation 1368 is about 10-40% of the length of conduit 1352 between any two oxidizers. Second insulation 1368 may have a thickness that varies (either continually or in step fashion) along its length. In certain embodiments, second insulation 1368 may have a larger thickness proximate second oxidizer 1366 and a reduced thickness at a desired distance from the second oxidizer. The larger thickness of second insulation 1368 may preferentially reduce heat transfer proximate second oxidizer 1366 as compared to the reduced thickness portion of the insulation. For example, second insulation 1368 may have a thickness of about 0.03 m proximate second oxidizer 1366 and a thickness of about 0.015 m at a distance of about 10 m from the second oxidizer.

A thickness of second insulation 1368 may vary depending on, for example, a desired heating rate or a desired temperature at a surface of hydrocarbon layer 522. The second insulation may inhibit the transfer of heat from the heated fluids to the formation in a region proximate the insulation. Second insulation 1368 may also inhibit charring and/or coking of hydrocarbons proximate second oxidizer 1366. Second insulation 1368 may inhibit charring and/or coking by reducing an amount of heat transferred to the formation proximate the second oxidizer. Second insulation 1368 may be made of a non-corrosive, thermally insulating material such as rock wool, Nextel™, calcium silicate, Fiberfrax®, or thermally insulating concretes such as those manufactured by Harbizon Walker, A. P. Green, or National Refractories. Hydrogen and/or steam may also be added to fuel used in the second oxidizer to further inhibit coking and/or charring of the formation proximate the second oxidizer and/or fuel within the fuel conduit.

In other embodiments, one or more additional oxidizers may be placed in opening 544. The one or more additional oxidizers may be used to increase a heat output and/or provide more uniform heating of the formation. Additional fuel conduits and/or additional insulating conduits may be used with the one or more additional oxidizers as needed.

In an example using two downhole combustors to heat a portion of a formation, the formation has a depth for treatment of about 228 m, with an overburden having a depth of about 91.5 m. Two oxidizers are used, as shown in the embodiment of FIG. 97, to provide heat to the formation in an opening with a diameter of about 0.15 m. To equalize the pressure inside the conduit and outside the conduit, a cross-sectional area inside the conduit should approximately equal a cross-sectional area outside the conduit. Thus, the conduit has a diameter of about 0.11 m.

To heat the formation at a heat input of about 655 watts/meter (W/m), a total heat input of about 150,000 W is needed. About 16,000 W of heat is generated for every 28 standard liters per minute (slm) of methane ($CH_4$) provided to the burners. Thus, a flow rate of about 270 slm is needed to generate the 150,000 W of heat. A temperature midway between the two oxidizers is about 555° C. less than the temperature at a flame of either oxidizer (about 1315° C.). The temperature midway between the two oxidizers on the wall of the formation (where there is no insulation) is about 690° C. About 3,800 W can be carried by 2,830 slm of air for every 55° C. of temperature change in the conduit. Thus, for the air to carry half the heat required (about 75,000 W) from the first oxidizer to the halfway point, 5,660 slm of air is needed. The other half of the heat required may be supplied by air passing the second oxidizer and carrying heat from the second oxidizer.

Using air (21% oxygen) as the oxidizing fluid, a flow rate of about 5,660 slm of air can be used to provide excess oxygen to each oxidizer. About half of the oxygen, or about 11% of the air, is used in the two oxidizers in a first heater well. Thus, the exhaust fluid is essentially air with an oxygen content of about 10%. This exhaust fluid can be used in a second heater well. Pressure of the incoming air of the first heater well is about 6.2 bars absolute. Pressure of the outgoing air of the first heater well is about 4.4 bars absolute. This pressure is also the incoming air pressure of a second heater well. The outlet pressure of the second heater well is about 1.7 bars absolute. Thus, the air does not need to be recompressed between the first heater well and the second heater well.

Figure 98:
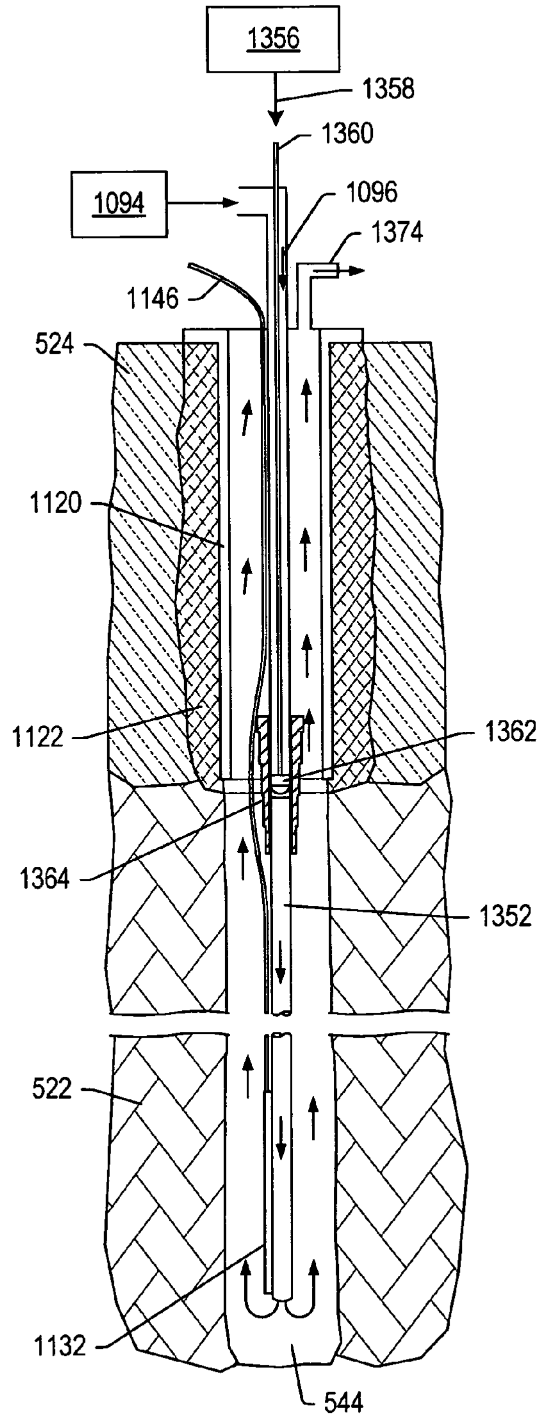
FIG. 98 illustrates a cross-sectional representation of an embodiment of a heater with an oxidizer and an electric heater.

FIG. 98 illustrates a cross-sectional representation of an embodiment of a downhole combustor heater for heating a formation. As depicted in FIG. 98, electric heater 1132 may be used instead of second oxidizer 1366 (as shown in FIG. 97) to provide additional heat to a portion of hydrocarbon layer 522.

In a heat source embodiment, electric heater 1132 may be an insulated conductor heater. In some embodiments, electric heater 1132 may be a conductor-in-conduit heater or an elongated member heater. In general, electric heaters tend to provide a more controllable and/or predictable heating profile than combustion heaters. The heat profile of electric heater 1132 may be selected to achieve a selected heating profile of the formation (e.g., uniform). For example, the heating profile of electric heater 1132 may be selected to "mirror" the heating profile of oxidizer 1362 such that, when the heat from electric heater 1132 and oxidizer 1362 are superpositioned, substantially uniform heating is applied along the length of the conduit.

Figure 99:
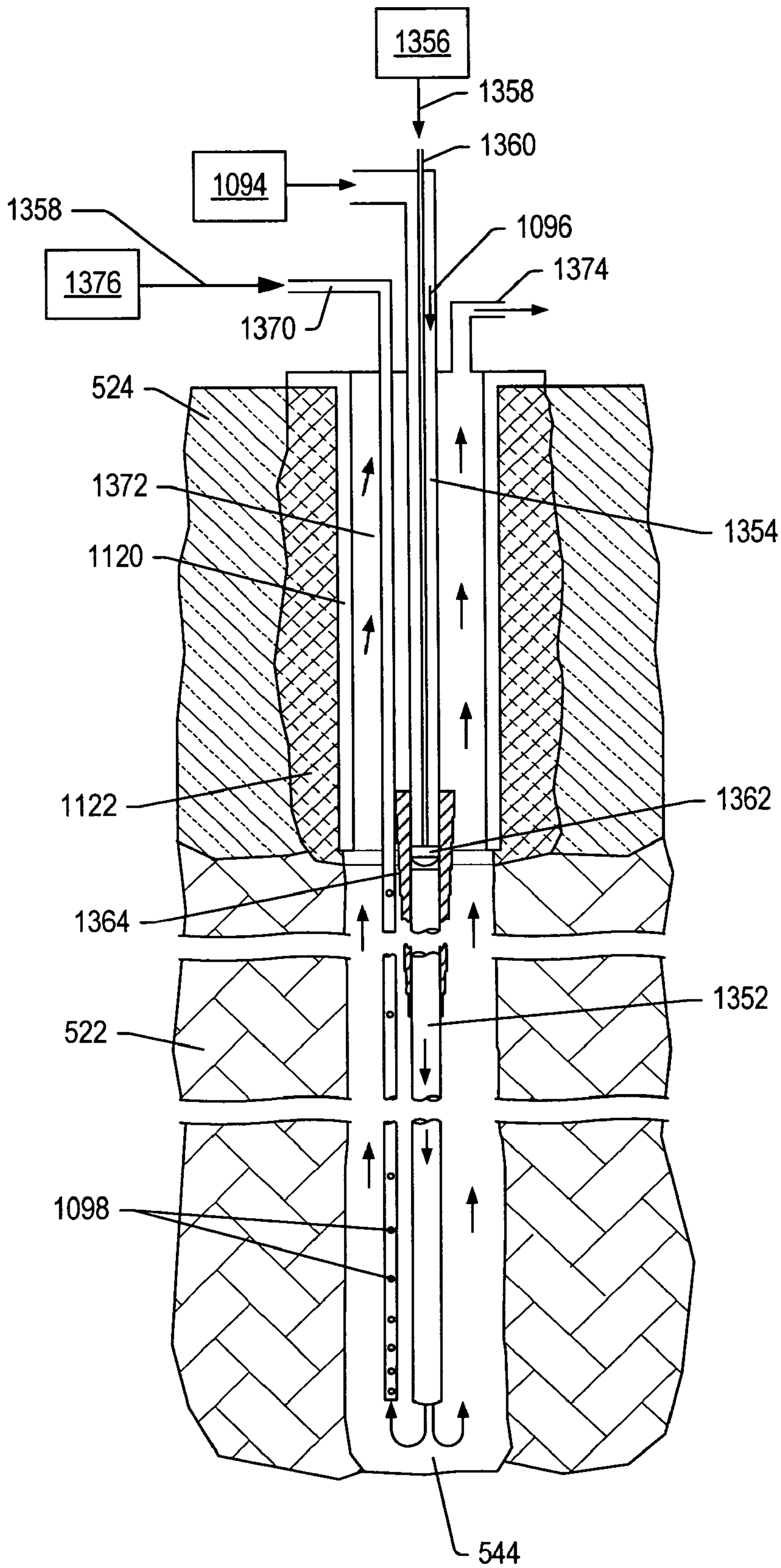
FIG. 99 depicts a cross-sectional representation of an embodiment of a heater with an oxidizer and a flameless distributed combustor heater.

In other heat source embodiments, any other type of heater, such as a natural distributed combustor or flameless distributed combustor, may be used instead of electric heater 1132. In certain embodiments, electric heater 1132 may be used instead of first oxidizer 1362 to heat a portion of hydrocarbon layer 522. FIG. 99 depicts an embodiment using a downhole combustor with a flameless distributed combustor. Second fuel conduit 1370 may have orifices 1098 (e.g., critical flow orifices) distributed along the length of the conduit. Orifices 1098 may be distributed such that a heating profile along the length of hydrocarbon layer 522 is substantially uniform. For example, more orifices 1098 may be placed on second fuel conduit 1370 in a lower portion of the conduit than in an upper portion of the conduit. This will provide more heating to a portion of hydrocarbon layer 522 that is farther from first oxidizer 1362.

As depicted in FIG. 98, electric heater 1132 may be placed in opening 544 proximate conduit 1352. Electric heater 1132 may be used to provide heat to hydrocarbon layer 522 in a portion of opening 544 proximate a lower end of conduit 1352. Electric heater 1132 may be coupled to lead-in conductor 1146. Using electric heater 1132 as well as heated fluids from conduit 1352 to heat hydrocarbon layer 522 may provide substantially uniform heating of hydrocarbon layer 522.

Figure 100:
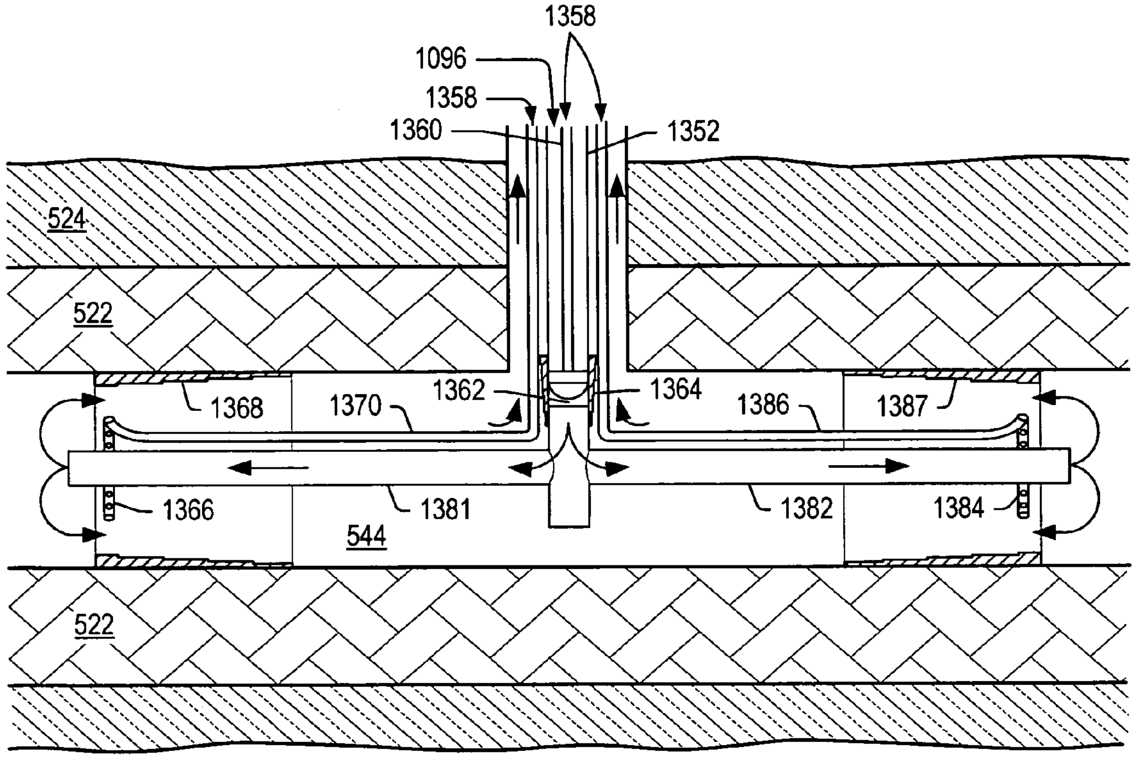
FIG. 100 illustrates a cross-sectional representation of an embodiment of a multilateral downhole combustor heater.

FIG. 100 illustrates a cross-sectional representation of an embodiment of a multilateral downhole combustor heater. Hydrocarbon layer 522 may be a relatively thin layer (e.g., with a thickness of less than about 10 m, about 30 m, or about 60 m) selected for treatment. Such layers may exist in, but are not limited to, tar sands, oil shale, or coal formations. Opening 544 may extend below overburden 524 and then diverge in more than one direction within hydrocarbon layer 522. Opening 544 may have walls that are substantially parallel to upper and lower surfaces of hydrocarbon layer 522.

Conduit 1352 may extend substantially vertically into opening 544 as depicted in FIG. 100. First oxidizer 1362 may be placed in or proximate conduit 1352. Oxidizing fluid 1096 may be provided to first oxidizer 1362 through conduit 1352. First fuel conduit 1360 may be used to provide fuel 1358 to first oxidizer 1362. Second conduit 1381 may be coupled to conduit 1352. Second conduit 1381 may be oriented substantially perpendicular to conduit 1352. Third conduit 1382 may also be coupled to conduit 1352. Third conduit 1382 may be oriented substantially perpendicular to conduit 1352. Second oxidizer 1366 may be placed at an end of second conduit 1381. Second oxidizer 1366 may be a ring burner. Third oxidizer 1384 may be placed at an end of third conduit 1382. In an embodiment, third oxidizer 1384 is a ring burner. Second oxidizer 1366 and third oxidizer 1384 may be placed at or near opposite ends of opening 544.

Second fuel conduit 1370 may be used to provide fuel to second oxidizer 1366. Third fuel conduit 1386 may be used to provide fuel to third oxidizer 1384. Oxidizing fluid 1096 may be provided to second oxidizer 1366 through conduit 1352 and second conduit 1381. Oxidizing fluid 1096 may be provided to third oxidizer 1384 through conduit 1352 and third conduit 1382. First insulation 1364 may be placed proximate first oxidizer 1362. Second insulation 1368 and third insulation 1387 may be placed proximate second oxidizer 1366 and third oxidizer 1384, respectively. Second oxidizer 1366 and third oxidizer 1384 may be located up to about 175 m from first conduit 1352. In some embodiments, a distance between second oxidizer 1366 or third oxidizer 1384 and first conduit 1352 may be less, depending on heating requirements of hydrocarbon layer 522. Heat provided by oxidation of fuel at first oxidizer 1362, second oxidizer 1366, and third oxidizer 1384 may allow for substantially uniform heating of hydrocarbon layer 522.

Exhaust fluids may be removed through opening 544. The exhaust fluids may exchange heat with fluids entering opening 544 through conduit 1352. Exhaust fluids may also be used in additional heater wells and/or treated in treatment facilities.

In a heat source embodiment, one or more electric heaters may be used instead of, or in combination with, first oxidizer 1362, second oxidizer 1366, and/or third oxidizer 1384 to provide heat to hydrocarbon layer 522. Using electric heaters in combination with oxidizers may provide for substantially uniform heating of hydrocarbon layer 522.

Figure 101:
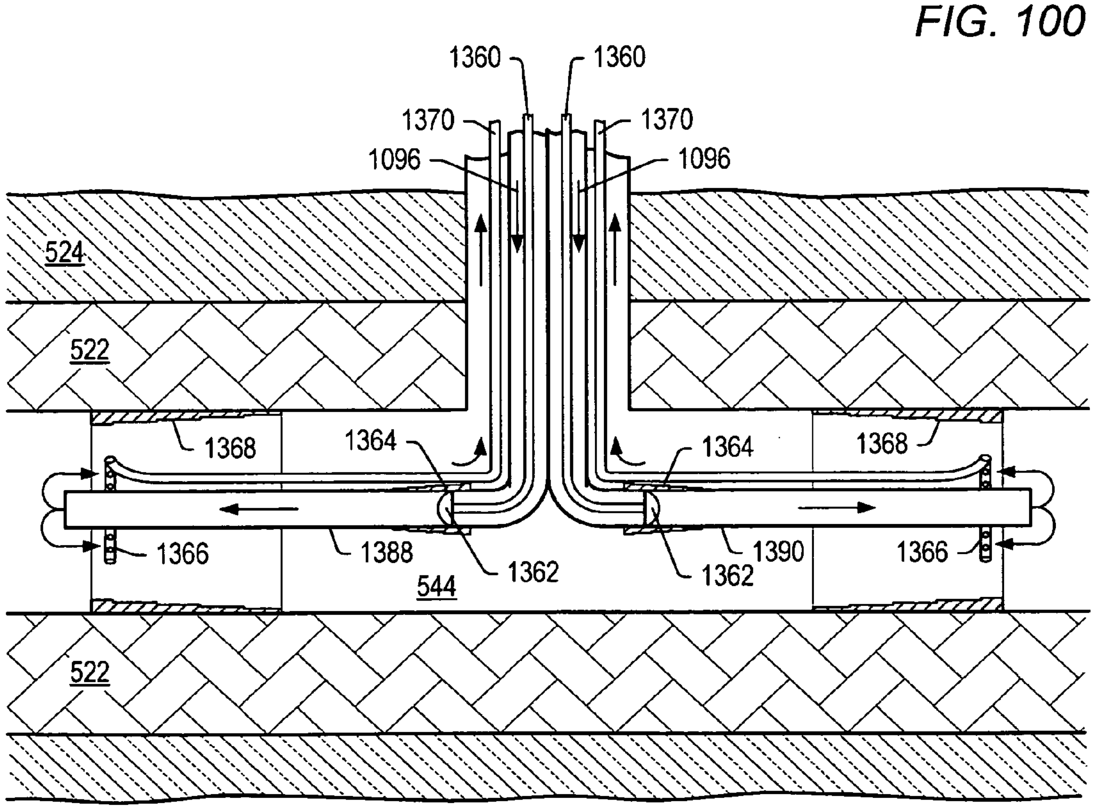
FIG. 101 illustrates a cross-sectional representation of an embodiment of a downhole combustor heater with two conduits.

FIG. 101 depicts a heat source embodiment in which one or more oxidizers are placed in first conduit 1388 and second conduit 1390 to provide heat to hydrocarbon layer 522. The embodiment may be used to heat a relatively thin formation. First oxidizer 1362 may be placed in first conduit 1388. A second oxidizer 1366 may be placed proximate an end of first conduit 1388. First fuel conduit 1360 may provide fuel to first oxidizer 1362. Second fuel conduit 1370 may provide fuel to second oxidizer 1366. First insulation 1364 may be placed proximate first oxidizer 1362. Oxidizing fluid 1096 may be provided into first conduit 1388. A portion of oxidizing fluid 1096 may be used to oxidize fuel at first oxidizer 1362. Second insulation 1368 may be placed proximate second oxidizer 1366.

Second conduit 1390 may diverge in an opposite direction from first conduit 1388 in opening 544 and substantially mirror first conduit 1388. Second conduit 1390 may include elements similar to the elements of first conduit 1388, such as first oxidizer 1362, first fuel conduit 1360, first insulation 1364, second oxidizer 1366, second fuel conduit 1370, and/or second insulation 1368. These elements may be used to substantially uniformly heat hydrocarbon layer 522 below overburden 524 along lengths of conduits 1388 and 1390.

Figure 102:
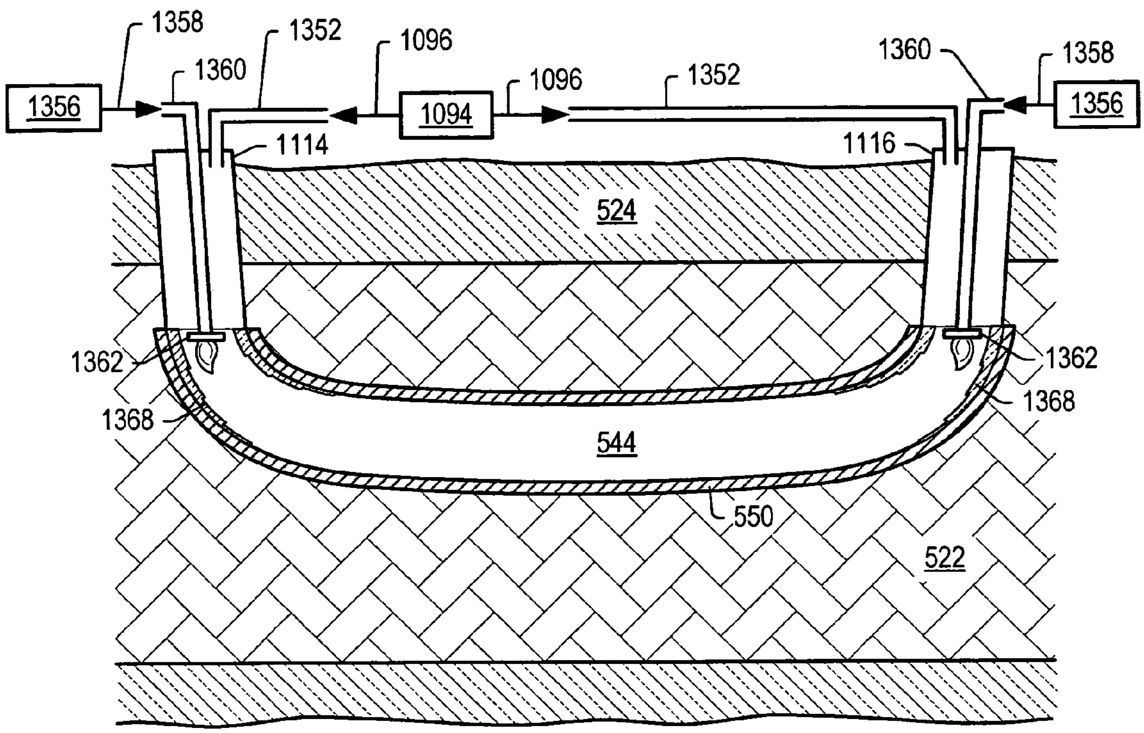
FIG. 102 illustrates a cross-sectional representation of an embodiment of a downhole combustor.

FIG. 102 illustrates a cross-sectional representation of an embodiment of a downhole combustor for heating a formation. Opening 544 is a single opening within hydrocarbon layer 522 that may have first end 1114 and second end 1116. Oxidizers 1362 may be placed in opening 544 proximate a junction of overburden 524 and hydrocarbon layer 522 at first end 1114 and second end 1116. Insulation 1368 may be placed proximate each oxidizer 1362. Fuel conduit 1360 may be used to provide fuel 1358 from fuel source 1356 to oxidizer 1362. Oxidizing fluid 1096 may be provided into opening 544 from oxidizing fluid source 1094 through conduit 1352. Casing 550 may be placed in opening 544. Casing 550 may be made of carbon steel. Portions of casing 550 that may be subjected to much higher temperatures (e.g., proximate oxidizers 1362) may include stainless steel or other high temperature, corrosion resistant metal. In some embodiments, casing 550 may extend into portions of opening 544 within overburden 524.

In a heat source embodiment, oxidizing fluid 1096 and fuel 1358 are provided to oxidizer 1362 in first end 1114. Heated fluids from oxidizer 1362 in first end 1114 tend to flow through opening 544 towards second end 1116. Heat may transfer from the heated fluids to hydrocarbon layer 522 along a length of opening 544. The heated fluids may be removed from the formation through second end 1116. During this time, oxidizer 1362 at second end 1116 may be turned off. The removed fluids may be provided to a second opening in the formation and used as oxidizing fluid and/or fuel in the second opening. After a selected time (e.g., about a week), oxidizer 1362 at first end 1114 may be turned off. At this time, oxidizing fluid 1096 and fuel 1358 may be provided to oxidizer 1362 at second end 1116 and the oxidizer turned on. Heated fluids may be removed during this time through first end 1114. Oxidizers 1362 at first end 1114 and at second end 1116 may be used alternately for selected times (e.g., about a week) to heat hydrocarbon layer 522. This may provide a more substantially uniform heating profile of hydrocarbon layer 522. Removing the heated fluids from the opening through an end distant from an oxidizer may reduce a possibility of coking within opening 544 as heated fluids are removed from the opening separately from incoming fluids. The use of the heat content of an oxidizing fluid may also be more efficient as the heated fluids can be used in a second opening or second downhole combustor.

Figure 102A:
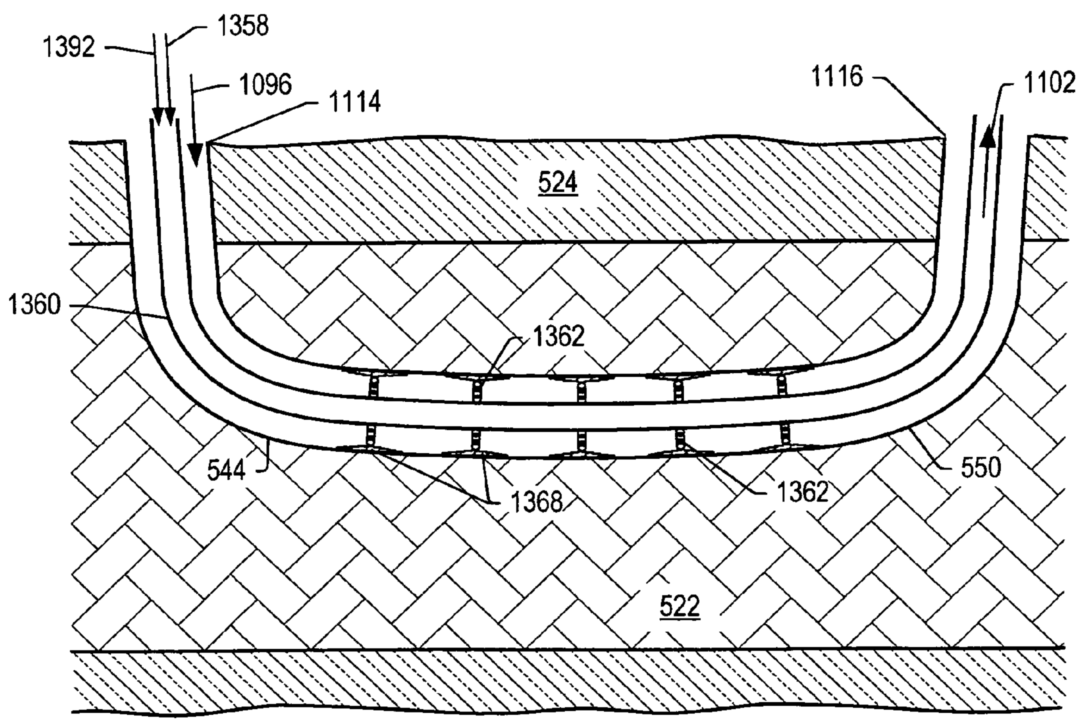
FIG. 102A depicts an embodiment of a heat source for a hydrocarbon containing formation.

FIG. 102A depicts an embodiment of a heat source for a hydrocarbon containing formation. Fuel conduit 1360 may be placed within opening 544. In some embodiments, opening 544 may include casing 550. Opening 544 is a single opening within the formation that may have first end 1114 at a first location on the surface of the earth and second end 1116 at a second location on the surface of the earth. Oxidizers 1362 may be positioned proximate the fuel conduit in hydrocarbon layer 522. Oxidizers 1362 may be separated by a distance ranging from about 3 m to about 50 m (e.g., about 30 m). Fuel 1358 may be provided to fuel conduit 1360. In addition, steam 1392 may be provided to fuel conduit 1360 to reduce coking proximate oxidizers 1362 and/or in fuel conduit 1360. Oxidizing fluid 1096 (e.g., air and/or oxygen) may be provided to oxidizers 1362 through opening 544. Oxidation of fuel 1358 may generate heat. The heat may transfer to a portion of the formation. Oxidation product 1102 may exit opening 544 proximate second end 1116.

Figure 103:
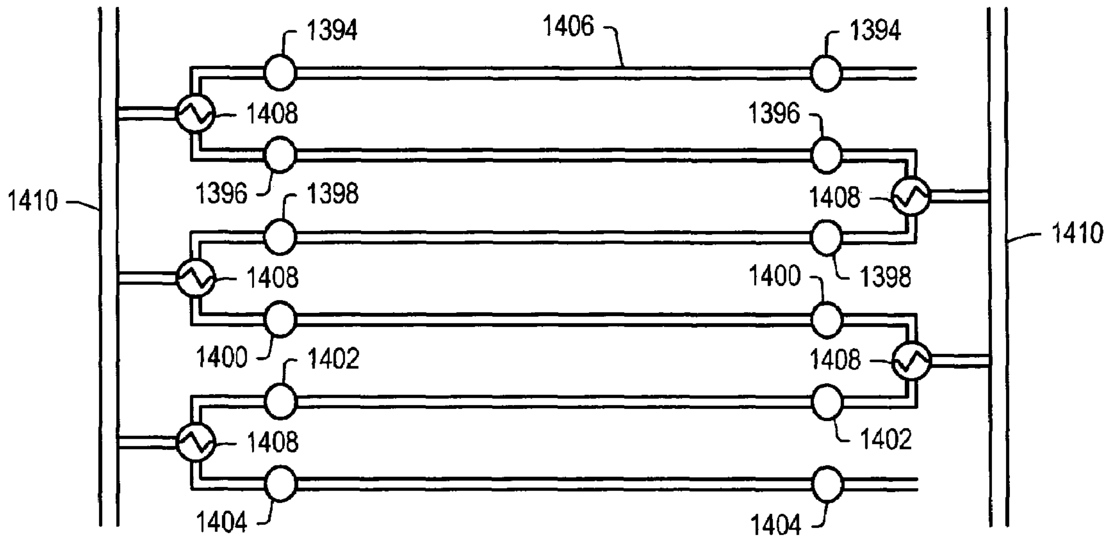
FIG. 103 depicts a representation of a portion of a piping layout for heating a formation using downhole combustors.

FIG. 103 depicts a schematic, from an elevated view, of an embodiment for using downhole combustors depicted in the embodiment of FIG. 102. In some embodiments, the schematic depicted in FIG. 103, and variations of the schematic, may be used for other types of heaters (e.g., surface burners, flameless distributed combustors, etc.) that may utilize fuel fluid and/or oxidizing fluid in one or more openings in a hydrocarbon containing formation. Openings 1394, 1396, 1398, 1400, 1402, and 1404 may have downhole combustors (as shown in the embodiment of FIG. 102) placed in each opening. More or fewer openings (i.e., openings with a downhole combustor) may be used as needed. A number of openings may depend on, for example, a size of an area for treatment, a desired heating rate, or a selected well spacing. Conduit 1406 may be used to transport fluids from a downhole combustor in opening 1394 to downhole combustors in openings 1396, 1398, 1400, 1402, and 1404. The openings may be coupled in series using conduit 1406. Compressor 1408 may be used between openings, as needed, to increase a pressure of fluid between the openings. Additional oxidizing fluid may be provided to each compressor 1408 from conduit 1410. A selected flow of fuel from a fuel source may be provided into each of the openings.

For a selected time, a flow of fluids may be from first opening 1394 towards opening 1404. Flow of fluid within first opening 1394 may be substantially opposite flow within second opening 1396. Subsequently, flow within second opening 1396 may be substantially opposite flow within third opening 1398, etc. This may provide substantially more uniform heating of the formation using the downhole combustors within each opening. After the selected time, the flow of fluids may be reversed to flow from opening 1404 towards first opening 1394. This process may be repeated as needed during a time needed for treatment of the formation. Alternating the flow of fluids may enhance the uniformity of a heating profile of the formation.

Figure 104:
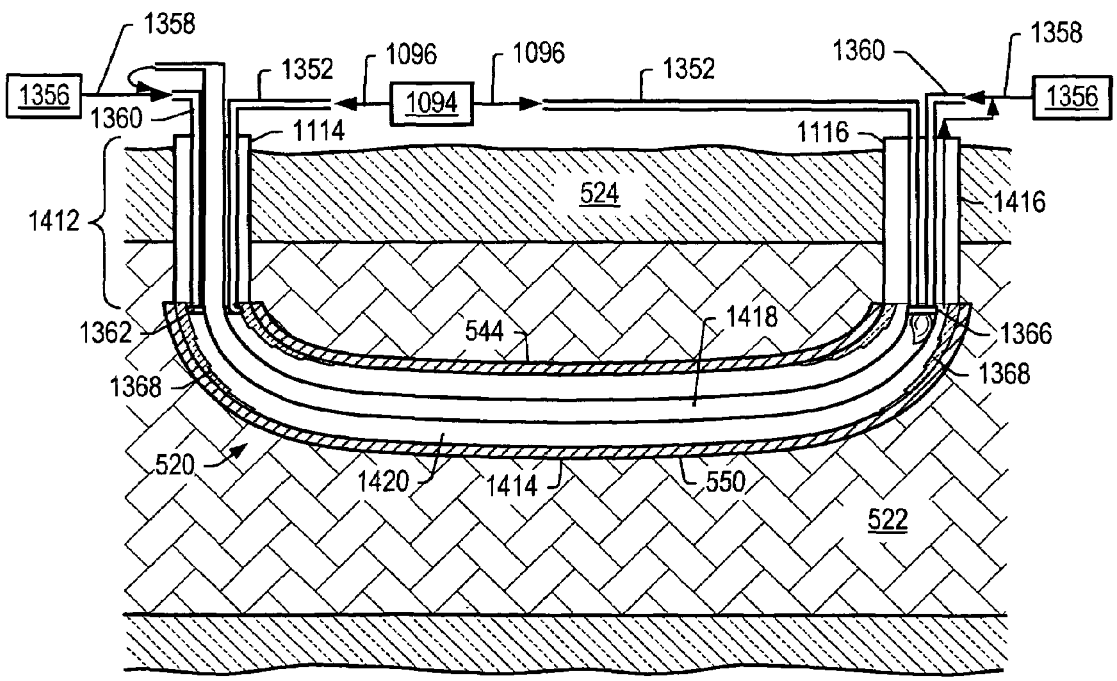
FIG. 104 depicts a schematic representation of an embodiment of a heater well positioned within a hydrocarbon containing formation.

FIG. 104 depicts a schematic representation of an embodiment of a heater well positioned within a hydrocarbon containing formation. Heater well 520 may be placed within opening 544. In certain embodiments, opening 544 is a single opening within the formation that may have first end 1114 and second end 1116 contacting the surface of the earth. Opening 544 may include elongated portions 1412, 1414, 1416. Elongated portions 1412, 1416 may be placed substantially in a non-hydrocarbon containing layer (e.g., overburden). Elongated portion 1414 may be placed substantially within hydrocarbon layer 522 and/or a treatment zone.

In some heat source embodiments, casing 550 may be placed in opening 544. In some embodiments, casing 550 may be made of carbon steel. Portions of casing 550 that may be subjected to high temperatures may be made of more temperature resistant material (e.g., stainless steel). In some embodiments, casing 550 may extend into elongated portions 1412, 1416 within overburden 524. Oxidizers 1362, 1366 may be placed proximate a junction of overburden 524 and hydrocarbon layer 522 at first end 1114 and second end 1116 of opening 544. Oxidizers 1362, 1366 may include burners (e.g., inline burners and/or ring burners). Insulation 1368 may be placed proximate each oxidizer 1362, 1366.

Conduit 1418 may be placed within opening 544 forming annulus 1420 between an outer surface of conduit 1418 and an inner surface of the casing 550. Annulus 1420 may have a regular and/or irregular shape within the opening. In some embodiments, oxidizers may be positioned within the annulus and/or the conduit to provide heat to a portion of the formation. Oxidizer 1362 is positioned within annulus 1420 and may include a ring burner. Heated fluids from oxidizer 1362 may flow within annulus 1420 to end 1116. Heated fluids from oxidizer 1366 may be directed by conduit 1418 through opening 544. Heated fluids may include, but are not limited to oxidation product, oxidizing fluid, and/or fuel. Flow of the heated fluids through annulus 1420 may be in the opposite direction of the flow of heated fluids in conduit 1418. In some embodiments, oxidizers 1362, 1366 may be positioned proximate the same end of opening 544 to allow the heated fluids to flow through opening 544 in the same direction.

Fuel conduits 1360 may be used to provide fuel 1358 from fuel source 1356 to oxidizers 1362, 1366. Oxidizing fluid 1096 may be provided to oxidizers 1362, 1366 from oxidizing fluid source 1094 through conduits 1352. Flow of fuel 1358 and oxidizing fluid 1096 may generate oxidation products at oxidizers 1362, 1366. In some embodiments, a flow of oxidizing fluid 1096 may be controlled to control oxidation at oxidizers 1362, 1366. Alternatively, a flow of fuel may be controlled to control oxidation at oxidizers 1362, 1366.

In a heat source embodiment, oxidizing fluid 1096 and fuel 1358 are provided to oxidizer 1362. Heated fluids from oxidizer 1362 in first end 1114 tend to flow through opening 544 towards second end 1116. Heat may transfer from the heated fluids to hydrocarbon layer 522 along a segment of opening 544. The heated fluids may be removed from the formation through second end 1116. In some embodiments, a portion of the heated fluids removed from the formation may be provided to fuel conduit 1360 at end 1116 to be utilized as fuel in oxidizer 1366. Fluids heated by oxidizer 1366 may be directed through the opening in conduit 1418 to first end 1114. In some embodiments, a portion of the heated fluids is provided to fuel conduit 1360 at first end 1114. Alternatively, heated fluids produced from either end of the opening may be directed to a second opening in the formation for use as either oxidizing fluid and/or fuel. In some embodiments, heated fluids may be directed toward one end of the opening for use in a single oxidizer.

Oxidizers 1362, 1366 may be utilized concurrently. In some embodiments, use of the oxidizers may alternate. Oxidizer 1362 may be turned off after a selected time period (e.g., about a week). At this time, oxidizing fluid 1096 and fuel 1358 may be provided to oxidizer 1366. Heated fluids may be removed during this time through first end 1114. Use of oxidizer 1362 and oxidizer 1366 may be alternated for selected times to heat hydrocarbon layer 522. Flowing oxidizing fluids in opposite directions may produce a more uniform heating profile in hydrocarbon layer 522. Removing the heated fluids from the opening through an end distant from the oxidizer at which the heated fluids were produced may reduce the possibility for coking within the opening. Heated fluids may be removed from the formation in exhaust conduits in some embodiments. In addition, the potential for coking may be further reduced by removing heated fluids from the opening separately from incoming fluids (e.g., fuel and/or oxidizing fluid). In certain instances, some heat within the heated fluids may transfer to the incoming fluids to increase the efficiency of the oxidizers.

Figure 105:
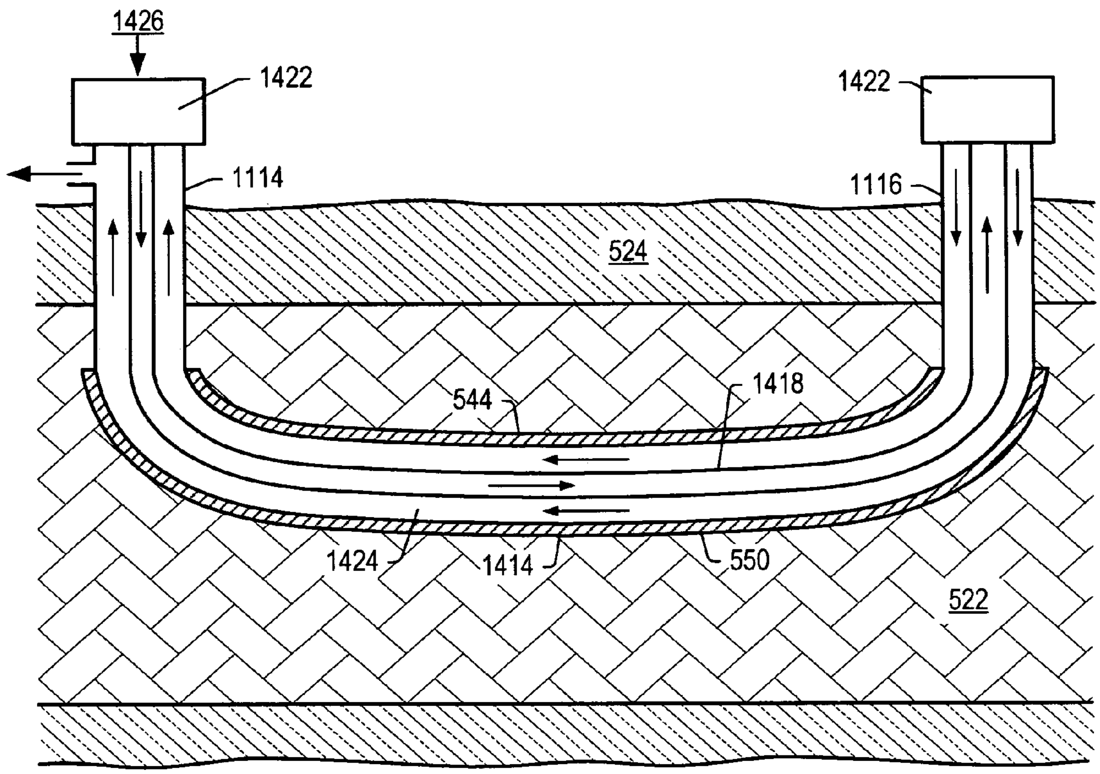
FIG. 105 depicts an embodiment of a heat source positioned in a hydrocarbon containing formation.

FIG. 105 depicts an embodiment of a heat source positioned within a hydrocarbon containing formation. Surface units 1422 (e.g., burners and/or furnaces) provide heat to an opening in the formation. Surface unit 1422 may provide heat to conduit 1418 positioned in conduit 1424. Surface unit 1422 positioned proximate first end 1114 of opening 544 may heat fluids 1426 (e.g., air, oxygen, steam, fuel, and/or flue gas) provided to surface unit 1422. Conduit 1418 may extend into surface unit 1422 to allow fluids heated in surface unit 1422 proximate first end 1114 to flow into conduit 1418. Conduit 1418 may direct fluid flow to second end 1116. At second end 1116 conduit 1418 may provide fluids to surface unit 1422. Surface unit 1422 may heat the fluids. The heated fluids may flow into conduit 1424. Heated fluids may then flow through conduit 1424 towards end 1114. In some embodiments, conduit 1418 and conduit 1424 may be concentric.

In some embodiments, fluids may be compressed prior to entering the surface unit. Compression of the fluids may maintain a fluid flow through the opening. Flow of fluids through the conduits may affect the transfer of heat from the conduits to the formation.

In some embodiments, a single surface unit may be utilized for heating proximate first end 1114. Conduits may be positioned such that fluid within an inner conduit flows into the annulus between the inner conduit and an outer conduit. Thus the fluid flow in the inner conduit and the annulus may be counter current.

Figure 106:
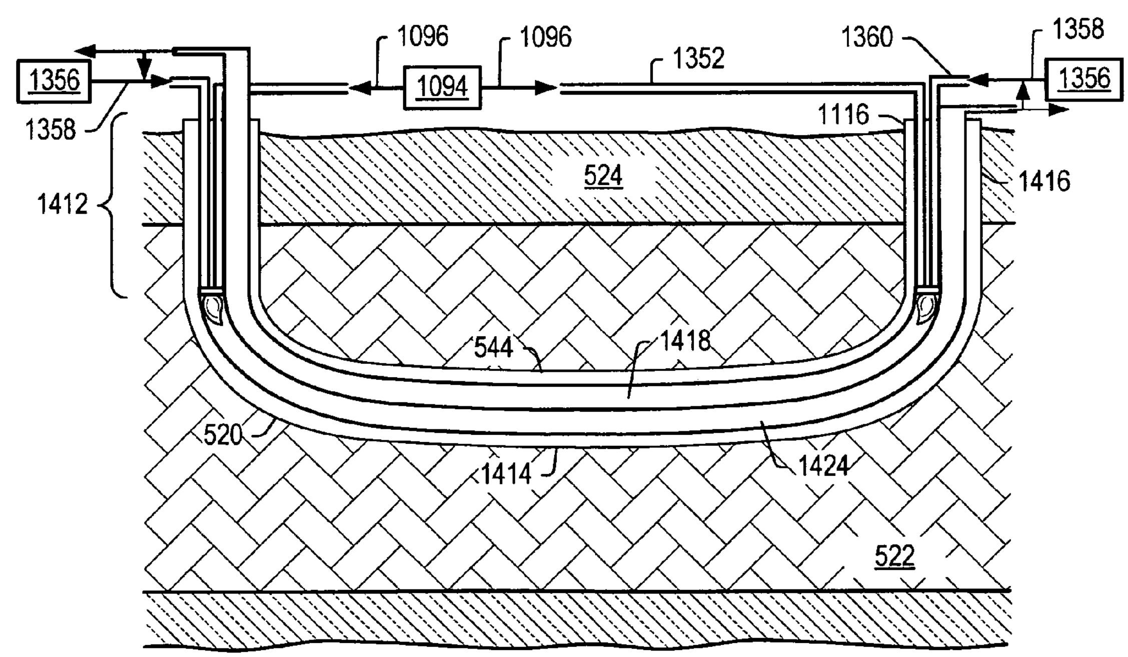
FIG. 106 depicts a schematic representation of an embodiment of a heat source positioned in a hydrocarbon containing formation.

A heat source embodiment is illustrated in FIG. 106. Conduits 1418, 1424 may be placed within opening 544. Opening 544 may be an open wellbore. In some embodiments, a casing may be included in a portion of the opening (e.g., in the portion in the overburden). In addition, some embodiments may include insulation surrounding a portion of conduits 1418, 1424. For example, the portions of the conduits within overburden 524 may be insulated to inhibit heat transfer from the heated fluids to the overburden and/or a portion of the formation proximate the oxidizers.

Figure 107:
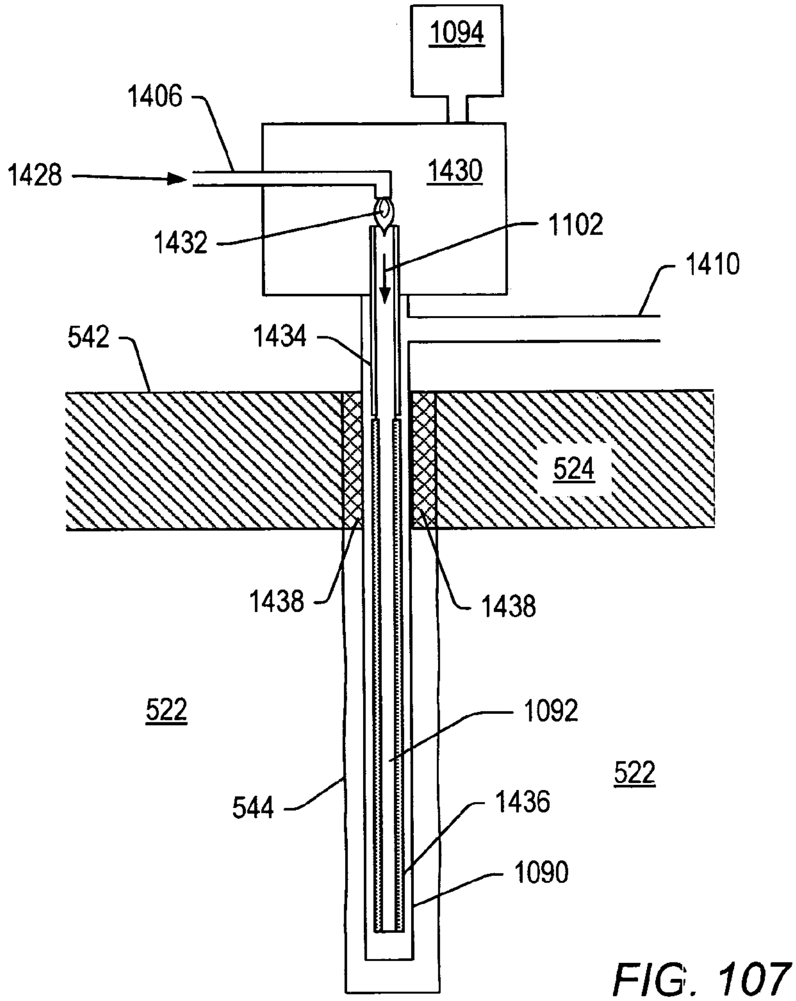
FIG. 107 depicts an embodiment of a surface combustor heat source.

FIG. 107 illustrates an embodiment of a surface combustor that may heat a section of a hydrocarbon containing formation. Fuel fluid 1428 may be provided into burner 1430 through conduit 1406. An oxidizing fluid may be provided into burner 1430 from oxidizing fluid source 1094. Fuel fluid 1428 may be oxidized with the oxidizing fluid in burner 1430 to form oxidation product 1102. Fuel fluid 1428 may include, but is not limited to, hydrogen, methane, ethane, and/or other hydrocarbons. Burner 1430 may be located external to the formation or within opening 544 in hydrocarbon layer 522. Source 1432 may heat fuel fluid 1428 to a temperature sufficient to support oxidation in burner 1430. Source 1432 may heat fuel fluid 1428 to a temperature of about 1425° C. Source 1432 may be coupled to an end of conduit 1406. In a heat source embodiment, source 1432 is a pilot flame. The pilot flame may burn with a small flow of fuel fluid 1428. In other embodiments, source 1432 may be an electrical ignition source.

Oxidation product 1102 may be provided into opening 544 within inner conduit 1092 coupled to burner 1430. Heat may be transferred from oxidation product 1102 through outer conduit 1090 into opening 544 and to hydrocarbon layer 522 along a length of inner conduit 1092. Oxidation product 1102 may cool along the length of inner conduit 1092. For example, oxidation product 1102 may have a temperature of about 870° C. proximate top of inner conduit 1092 and a temperature of about 650° C. proximate bottom of inner conduit 1092. A section of inner conduit 1092 proximate burner 1430 may have ceramic insulator 1434 disposed on an inner surface of inner conduit 1092. Ceramic insulator 1434 may inhibit melting of inner conduit 1092 and/or insulation 1436 proximate burner 1430. Opening 544 may extend into the formation a length up to about 550 m below surface 542.

Figure 108:
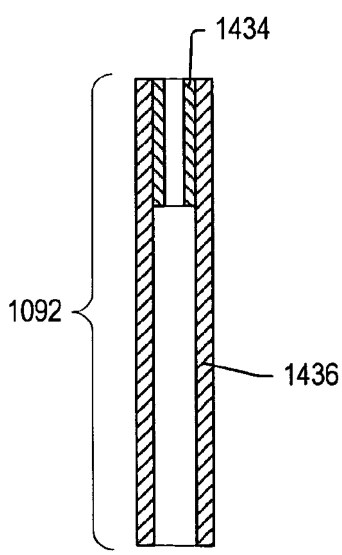
FIG. 108 depicts an embodiment of a conduit for a heat source with a portion of an inner conduit shown cut away to show a center tube.

Inner conduit 1092 may provide oxidation product 1102 into outer conduit 1090 proximate a bottom of opening 544. Inner conduit 1092 may have insulation 1436. FIG. 108 illustrates an embodiment of inner conduit 1092 with insulation 1436 and ceramic insulator 1434 disposed on an inner surface of inner conduit 1092. Insulation 1436 may inhibit heat transfer between fluids in inner conduit 1092 and fluids in outer conduit 1090. A thickness of insulation 1436 may be varied along a length of inner conduit 1092 such that heat transfer to hydrocarbon layer 522 may vary along the length of inner conduit 1092. For example, a thickness of insulation 1436 may be tapered from a larger thickness to a lesser thickness from a top portion to a bottom portion, respectively, of inner conduit 1092 in opening 544. Such a tapered thickness may provide more uniform heating of hydrocarbon layer 522 along the length of inner conduit 1092 in opening 544. Insulation 1436 may include ceramic and metal materials. Oxidation product 1102 may return to surface 542 through outer conduit 1090. Outer conduit 1090 may have insulation 1438, as depicted in FIG. 107. Insulation 1438 may inhibit heat transfer from outer conduit 1090 to overburden 524.

Oxidation product 1102 may be provided to an additional burner through conduit 1410 at surface 542. Oxidation product 1102 may be used as a portion of a fuel fluid in the additional burner. Doing so may increase an efficiency of energy output versus energy input for heating hydrocarbon layer 522. The additional burner may provide heat through an additional opening in hydrocarbon layer 522.

In some embodiments, an electric heater may provide heat in addition to heat provided from a surface combustor. The electric heater may be, for example, an insulated conductor heater or a conductor-in-conduit heater as described in any of the above embodiments. The electric heater may provide the additional heat to a hydrocarbon containing formation so that the hydrocarbon containing formation is heated substantially uniformly along a depth of an opening in the formation.

Flameless combustors such as those described in U.S. Pat. No. 5,404,952 to Vinegar et al., which is incorporated by reference as if fully set forth herein, may heat a hydrocarbon containing formation.

Figure 109:
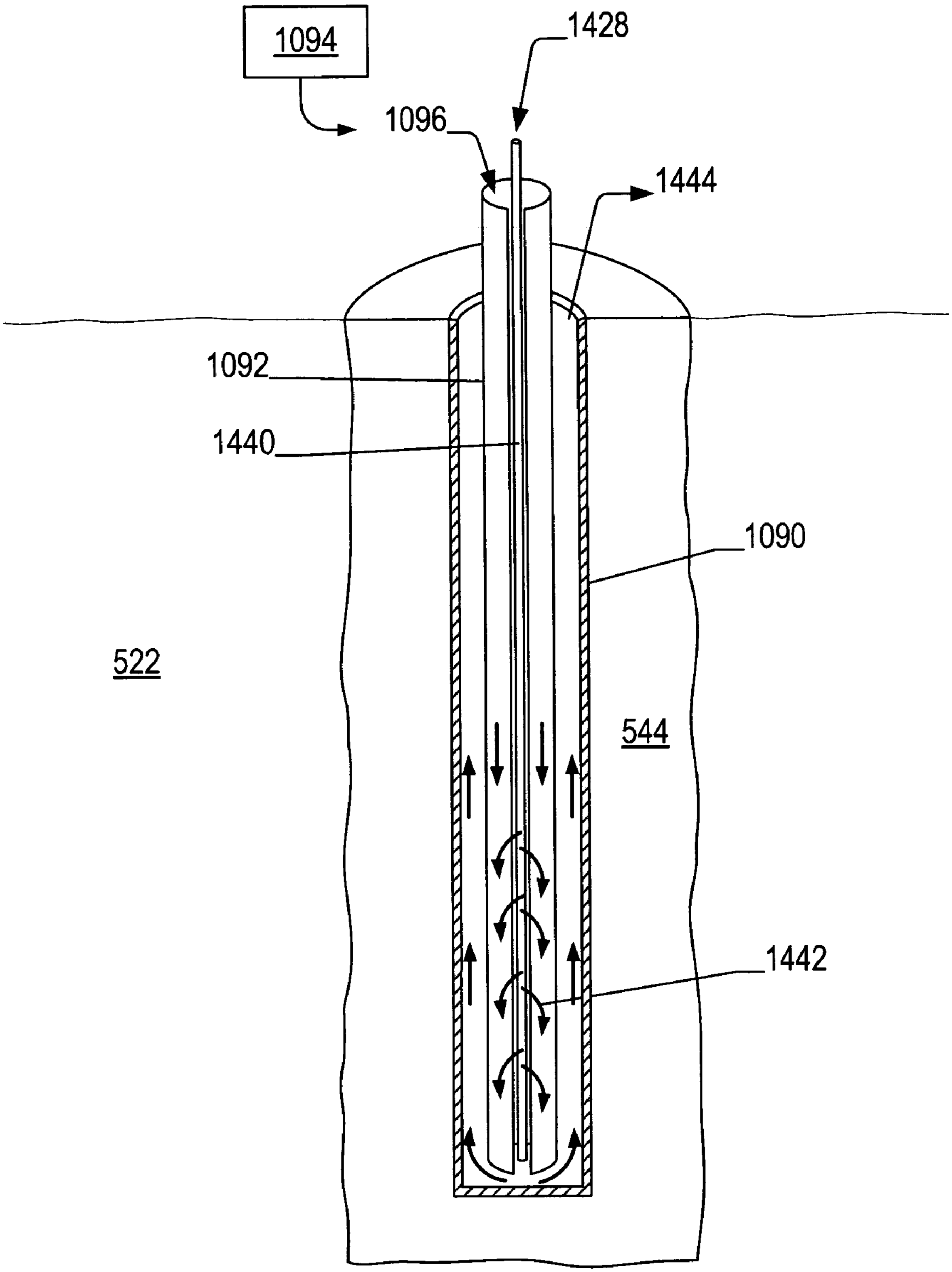
FIG. 109 depicts an embodiment of a flameless combustor heat source.

FIG. 109 illustrates an embodiment of a flameless combustor that may heat a section of the hydrocarbon containing formation. The flameless combustor may include center tube 1440 disposed within inner conduit 1092. Center tube 1440 and inner conduit 1092 may be placed within outer conduit 1090. Outer conduit 1090 may be disposed within opening 544 in hydrocarbon layer 522. Fuel fluid 1428 may be provided into the flameless combustor through center tube 1440. If a hydrocarbon fuel such as methane is utilized, the fuel may be mixed with steam to inhibit coking in center tube 1440. If hydrogen is used as the fuel, no steam may be required.

Center tube 1440 may include flow mechanisms 1442 (e.g., flow orifices) disposed within an oxidation region to allow a flow of fuel fluid 1428 into inner conduit 1092. Flow mechanisms 1442 may control a flow of fuel fluid 1428 into inner conduit 1092 such that the flow of fuel fluid 1428 is not dependent on a pressure in inner conduit 1092. Oxidizing fluid 1096 may be provided into the combustor through inner conduit 1092. Oxidizing fluid 1096 may be provided from oxidizing fluid source 1094. Flow mechanisms 1442 on center tube 1440 may inhibit flow of oxidizing fluid 1096 into center tube 1440.

Oxidizing fluid 1096 may mix with fuel fluid 1428 in the oxidation region of inner conduit 1092. Either oxidizing fluid 1096 or fuel fluid 1428, or a combination of both, may be preheated external to the combustor to a temperature sufficient to support oxidation of fuel fluid 1428. Oxidation of fuel fluid 1428 may provide heat generation within outer conduit 1090. The generated heat may provide heat to a portion of a hydrocarbon containing formation proximate the oxidation region of inner conduit 1092. Products 1444 from oxidation of fuel fluid 1428 may be removed through outer conduit 1090 outside inner conduit 1092. Heat exchange between the downgoing oxidizing fluid and the upgoing combustion products in the overburden results in enhanced thermal efficiency. A flow of removed combustion products 1444 may be balanced with a flow of fuel fluid 1428 and oxidizing fluid 1096 to maintain a temperature above auto-ignition temperature but below a temperature sufficient to produce oxides of nitrogen. In addition, a constant flow of fluids may provide a substantially uniform temperature distribution within the oxidation region of inner conduit 1092. Outer conduit 1090 may be a stainless steel tube. Heating in the portion of the hydrocarbon containing formation may be substantially uniform. Maintaining a temperature below temperatures sufficient to produce oxides of nitrogen may allow for relatively inexpensive metallurgical cost.

Care may be taken during design and installation of a well (e.g., freeze wells, production wells, monitoring wells, and heat sources) into a formation to allow for thermal effects within the formation. Heating and/or cooling of the formation may expand and/or contract elements of a well, such as the well casing. Elements of a well may expand or contract at different rates (e.g., due to different thermal expansion coefficients). Thermal expansion or contraction may cause failures (such as leaks, fractures, short-circuiting, etc.) to occur in a well. An operational lifetime of one or more elements in the wellbore may be shortened by such failures.

In some well embodiments, a portion of the well is an open wellbore completion. Portions of the well may be suspended from a wellbore or a casing that is cemented in the formation (e.g., a portion of a well in the overburden). Expansion of the well due to heat may be accommodated in the open wellbore portion of the well.

In a well embodiment, an expansion mechanism may be coupled to a heat source or other element of a well placed in an opening in a formation. The expansion mechanism may allow for thermal expansion of the heat source or element during use. The expansion mechanism may be used to absorb changes in length of the well as the well expands or contracts with temperature. The expansion mechanism may inhibit the heat source or element from being pushed out of the opening during thermal expansion. Using the expansion mechanism in the opening may increase an operational lifetime of the well.

Figure 110:
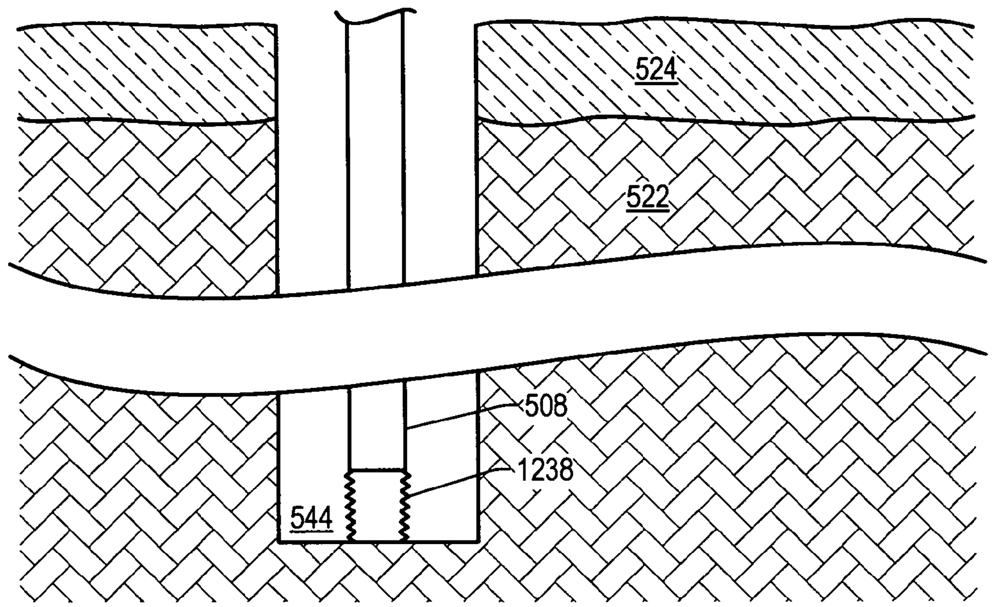
FIG. 110 illustrates a representation of an embodiment of an expansion mechanism coupled to a heat source in an opening in a formation.

FIG. 110 illustrates a representation of an embodiment of expansion mechanism 1238 coupled to heat source 508 in opening 544 in hydrocarbon layer 522. Expansion mechanism 1238 may allow for thermal expansion of heat source 508. Heat source 508 may be any heat source (e.g., conductor-in-conduit heat source, insulated conductor heat source, natural distributed combustor heat source, etc.). In some embodiments, more than one expansion mechanism 1238 may be coupled to individual components of a heat source. For example, if the heat source includes more than one element (e.g., conductors, conduits, supports, cables, elongated members, etc.), an expansion mechanism may be coupled to each element. Expansion mechanism 1238 may include spring loading. In one embodiment, expansion mechanism 1238 is an accordion mechanism. In another embodiment, expansion mechanism 1238 is a bellows or an expansion joint.

Expansion mechanism 1238 may be coupled to heat source 508 at a bottom of the heat source in opening 544. In some embodiments, expansion mechanism 1238 may be coupled to heat source 508 at a top of the heat source. In other embodiments, expansion mechanism 1238 may be placed at any point along the length of heat source 508 (e.g., in a middle of the heat source). Expansion mechanism 1238 may be used to reduce the hanging weight of heat source 508 (i.e., the weight supported by a wellhead coupled to the heat source). Reducing the hanging weight of heat source 508 may reduce creeping of the heat source during heating.

Certain heat source embodiments may include an operating system coupled to a heat source or heat sources by insulated conductors or other types of wiring. The operating system may interface with the heat source. The operating system may receive a signal (e.g., an electromagnetic signal) from a heater that is representative of a temperature distribution of the heat source. Additionally, the operating system may control the heat source, either locally or remotely. For example, the operating system may alter a temperature of the heat source by altering a parameter of equipment coupled to the heat source. The operating system may monitor, alter, and/or control the heating of at least a portion of the formation.

For some heat source embodiments, a heat source or heat sources may operate without a control and/or operating system. A heat source may only require a power supply from a power source such as an electric transformer. A conductor-in-conduit heater and/or an elongated member heater may include a heater element formed of a self-regulating material, such as 304 stainless steel or 316 stainless steel. Power dissipation and amperage through a heater element made of a self-regulating material decrease as temperature increases, and increase as temperature decreases due in part to the resistivity properties of the material and Ohm's Law. For a substantially constant voltage supply to a heater element, if the temperature of the heater element increases, the resistance of the element will increase, the amperage through the heater element will decrease, and the power dissipation will decrease; thus forcing the heater element temperature to decrease. On the other hand, if the temperature of the heater element decreases, the resistance of the element will decrease, the amperage through the heater element will increase, and the power dissipation will increase; thus forcing the heater element temperature to increase. Some metals, such as certain types of nichrome, have resistivity curves that decrease with increasing temperature for certain temperature ranges. Such materials may not be capable of being self-regulating heaters.

In some heat source embodiments, leakage current of electric heaters may be monitored. For insulated heaters, an increase in leakage current may show deterioration in an insulated conductor heater. Voltage breakdown in the insulated conductor heater may cause failure of the heat source. In some heat source embodiments, a current and voltage applied to electric heaters may be monitored. The current and voltage may be monitored to assess/indicate resistance in a heater element of the heat source. The resistance in the heat source may represent a temperature in the heat source since the resistance of the heat source may be known as a function of temperature. In some embodiments, a temperature of a heat source may be monitored with one or more thermocouples placed in or proximate the heat source. In some embodiments, a control system may monitor a parameter of the heat source.

The control system may alter parameters of the heat source to establish a desired output such as heating rate and/or temperature increase.

In some embodiments, a thermowell may be disposed into an opening in a hydrocarbon containing formation that includes a heat source. The thermowell may be disposed in an opening that may or may not have a casing. In the opening without a casing, the thermowell may include appropriate metallurgy and thickness such that corrosion of the thermowell is inhibited. A thermowell and temperature logging process, such as that described in U.S. Pat. No. 4,616,705 issued to Stegemeier et al., which is incorporated by reference as if fully set forth herein, may be used to monitor temperature. Only selected wells may be equipped with thermowells to avoid expenses associated with installing and operating temperature monitors at each heat source. Some thermowells may be placed midway between two heat sources. Some thermowells may be placed at or close to a center of a well pattern. Some thermowells may be placed in or adjacent to production wells.

In an embodiment for treating a hydrocarbon containing formation in situ, an average temperature within a majority of a selected section of the formation may be assessed by measuring temperature within a wellbore or wellbores. The wellbore may be a production well, heater well, or monitoring well. The temperature within a wellbore may be measured to monitor and/or determine operating conditions within the selected section of the formation. The measured temperature may be used as a property for input into a program for controlling production within the formation. In certain embodiments, a measured temperature may be used as input for a software executable on a computational system. In some embodiments, a temperature within a wellbore may be measured using a moveable thermocouple. The moveable thermocouple may be disposed in a conduit of a heater or heater well. An example of a moveable thermocouple and its use is described in U.S. Pat. No. 4,616,705 to Stegemeier et al.

In some embodiments, more than one thermocouple may be placed in a wellbore to measure the temperature within the wellbore. The thermocouples may be part of a multiple thermocouple array. The thermocouples may be located at various depths and/or locations. The multiple thermocouple array may include a magnesium oxide insulated sheath or sheaths placed around portions of the thermocouples. The insulated sheaths may include corrosion resistant materials. A corrosion resistant material may include, but is not limited to, stainless steels 304, 310, 316 or Inconel. Multiple thermocouple arrays may be obtained from Pyrotenax Cables Ltd. (Ontario, Canada) or Idaho Labs (Idaho Falls, Id.). The multiple thermocouple array may be moveable within the wellbore.

Figure 111:
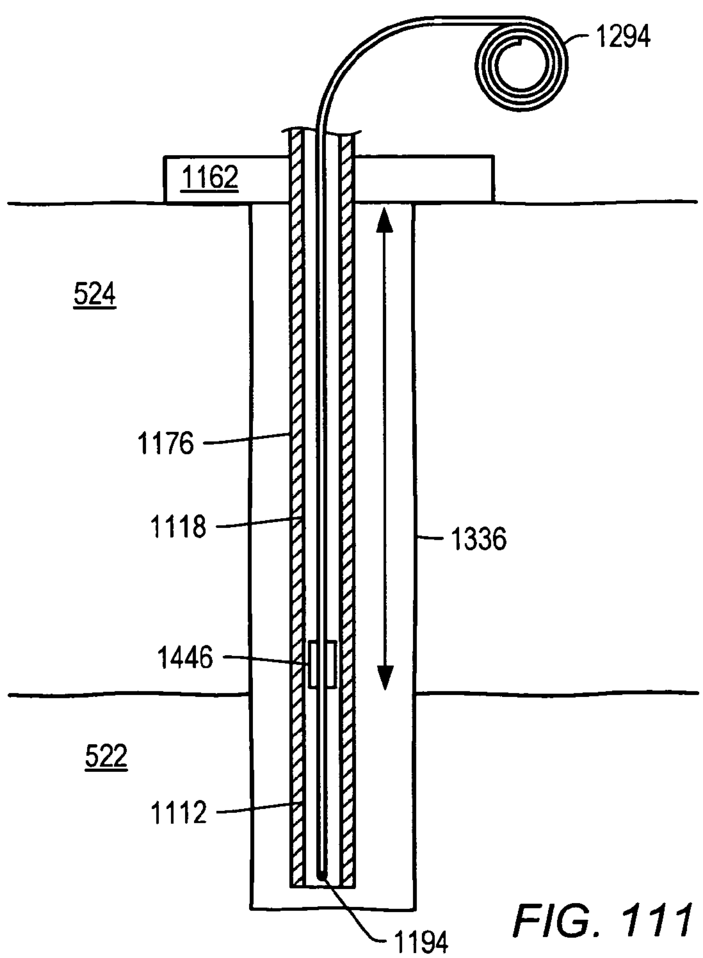
FIG. 111 illustrates a schematic of a thermocouple placed in a wellbore.

In certain thermocouple embodiments, voltage isolation may be used with a moveable thermocouple placed in a wellbore. FIG. 111 illustrates a schematic of thermocouple 1194 placed inside conductor 1112. Conductor 1112 may be placed within conduit 1176 of a conductor-in-conduit heat source. Conductor 1112 may be coupled to low resistance section 1118. Low resistance section 1118 may be placed in overburden 524. Conduit 1176 may be placed in wellbore 1336. Thermocouple 1194 may be used to measure a temperature within conductor 1112 along a length of the conductor in hydrocarbon layer 522. Thermocouple 1194 may include thermocouple wires that are coupled at the surface to spool 1294 so that the thermocouple is moveable along the length of conductor 1112 to obtain a temperature profile in the heated section. Thermocouple isolation 1446 may be coupled to thermocouple 1194. Thermocouple isolation 1446 may be, for example, a transformer coupled thermocouple isolation block available from Watlow Electric Manufacturing Company (St. Louis, Mo.). Alternately, an optically isolated thermocouple isolation block may be used. Thermocouple isolation 1446 may reduce voltages above the thermocouple isolation and at wellhead 1162. High voltages may exist within wellbore 1336 due to use of the electric heat source within the wellbore. The high voltages can be dangerous for operators or personnel working around wellhead 1162. With thermocouple isolation 1446, voltages at wellhead 1162 (e.g., at spool 1294) may be lowered to safer levels (e.g., about zero or ground potential). Thus, using thermocouple isolation 1446 may increase safety at wellhead 1162.

In some embodiments, thermocouple isolation 1446 may be used along the length of low resistance section 1118. Temperatures within low resistance section 1118 may not be above a maximum operating temperature of thermocouple isolation 1446. Thermocouple isolation 1446 may be moved along the length of low resistance section 1118 as thermocouple 1194 is moved along the length of conductor 1112 by spool 1294. In other embodiments, thermocouple isolation 1446 may be placed at wellhead 1162.

In a temperature monitor embodiment, a temperature within a wellbore in a formation is measured using a fiber assembly. The fiber assembly may include optical fibers made from quartz or glass. The fiber assembly may have fibers surrounded by an outer shell. The fibers may include fibers that transmit temperature measurement signals. A fiber that may be used for temperature measurements can be obtained from Sensa Highway (Houston, Tex.). The fiber assembly may be placed within a wellbore in the formation. The wellbore may be a heater well, a monitoring well, or a production well. Use of the fibers may be limited by a maximum temperature resistance of the outer shell, which may be about 800° C. in some embodiments. A signal may be sent down a fiber disposed within a wellbore. The signal may be a signal generated by a laser or other optical device. Thermal noise may be developed in the fiber from conditions within the wellbore. The amount of noise may be related to a temperature within the wellbore. In general, the more noise on the fiber, the higher the temperature within the wellbore. This may be due to changes in the index of refraction of the fiber as the temperature of the fiber changes. The relationship between noise and temperature may be characterized for a certain fiber. This relationship may be used to determine a temperature of the fiber along the length of the fiber. The temperature of the fiber may represent a temperature within the wellbore.

In some in situ conversion process embodiments, a temperature within a wellbore in a formation may be measured using pressure waves. A pressure wave may include a sound wave. Examples of using sound waves to measure temperature are shown in U.S. Pat. Nos. 5,624,188 to West; 5,437,506 to Gray; 5,349,859 to Kleppe; 4,848,924 to Nuspl et al.; 4,762,425 to Shakkottai et al.; and 3,595,082 to Miller, Jr., which are incorporated by reference as if fully set forth herein. Pressure waves may be provided into the wellbore. The wellbore may be a heater well, a production well, a monitoring well, or a test well. A test well may be a well placed in a formation that is used primarily for measurement of properties of the formation. A plurality of discontinuities may be placed within the wellbore. A predetermined spacing may exist between each discontinuity. The plurality of discontinuities may be placed inside a conduit placed within a wellbore. For example, the plurality of discontinuities may be placed within a conduit used as a portion of a conductor-in-conduit heater or a conduit used to provide fluid into a wellbore. The plurality of discontinuities may also be placed on an external surface of a conduit in a wellbore. A discontinuity may include, but may not be limited to, an alumina centralizer, a stub, a node, a notch, a weld, a collar, or any such point that may reflect a pressure wave.

Figure 112:
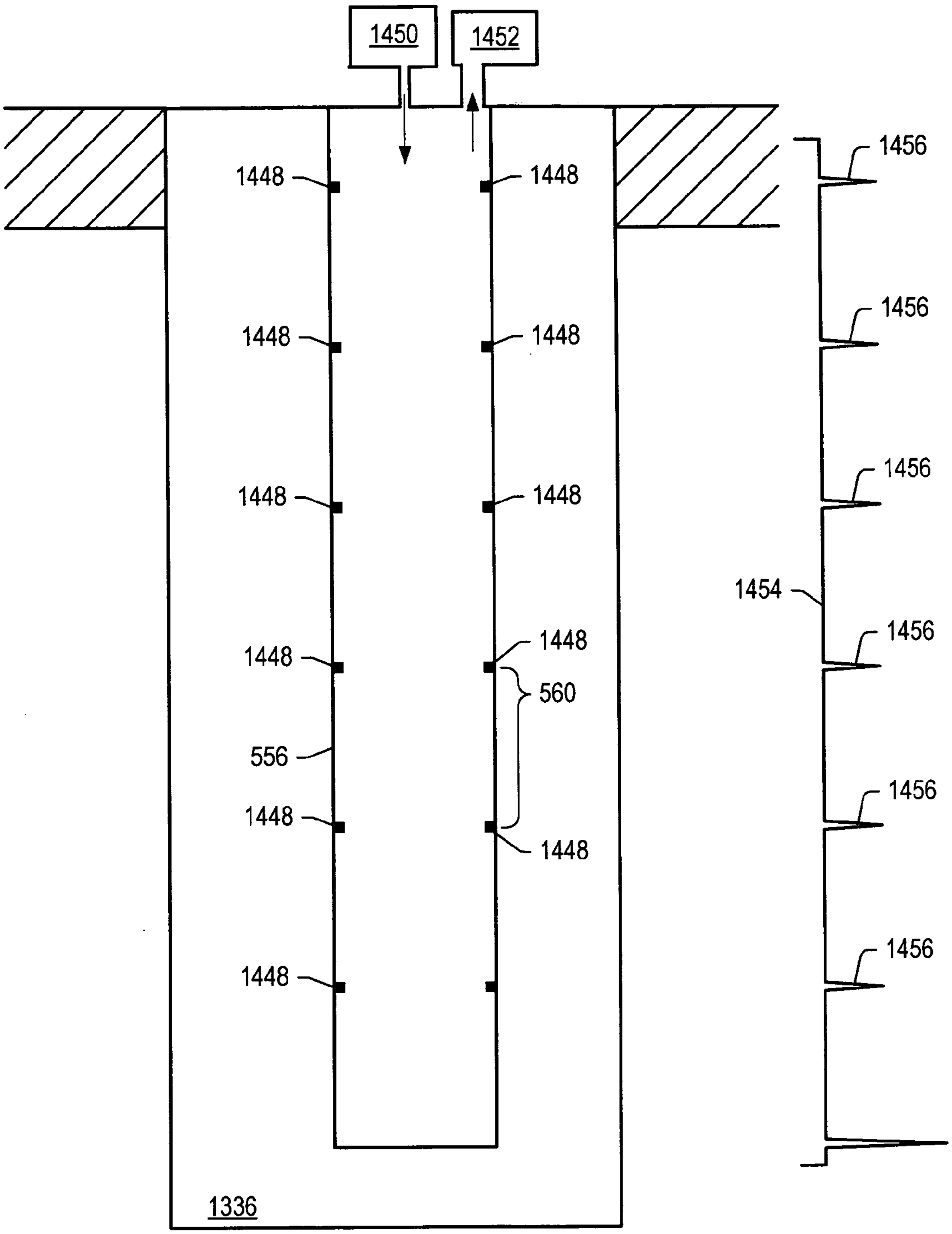
FIG. 112 depicts a schematic of a well embodiment for using pressure waves to measure temperature within a wellbore.

FIG. 112 depicts a schematic view of an embodiment for using pressure waves to measure temperature within a wellbore. Conduit 556 may be placed within wellbore 1336. Plurality of discontinuities 1448 may be placed within conduit 556. The discontinuities may be separated by substantially constant separation distance 560. Distance 560 may be, in some embodiments, about 1 m, about 5 m, or about 15 m. A pressure wave may be provided into conduit 556 from pressure wave source 1450. Pressure wave source 1450 may include, but is not limited to, an air gun, an explosive device (e.g., blank shotgun), a piezoelectric crystal, a magnetostrictive transducer, an electrical sparker, or a compressed air source. A compressed air source may be operated or controlled by a solenoid valve. The pressure wave may propagate through conduit 556. In some embodiments, an acoustic wave may be propagated through the wall of the conduit.

A reflection (or signal) of the pressure wave within conduit 556 may be measured using wave measuring device 1452. Wave measuring device 1452 may be, for example, a piezoelectric crystal, a magnetostrictive transducer, or any device that measures a time-domain pressure of the wave within the conduit. Wave measuring device 1452 may determine time-domain pressure wave 1454 that represents travel of the pressure wave within conduit 556. Each slight increase in pressure, or pressure spike 1456, represents a reflection of the pressure wave at a discontinuity 1448. The pressure wave may be repeatedly provided into the wellbore at a selected frequency. The reflected signal may be continuously measured to increase a signal-to-noise ratio for pressure spike 1456 in the reflected signal. This may include using a repetitive stacking of signals to reduce noise. A repeatable pressure wave source may be used. For example, repeatable signals may be producible from a piezoelectric crystal. A trigger signal may be used to start wave measuring device 1452 and pressure wave source 1450. The time, as measured using pressure wave 1454, may be used with the distance between each discontinuity 1448 to determine an average temperature between the discontinuities for a known gas within conduit 556. Since the velocity of the pressure wave varies with temperature within conduit 556, the time for travel of the pressure wave between discontinuities will vary with an average temperature between the discontinuities. For dry air within a conduit or wellbore, the temperature may be approximated using the equation:

$$c=33{,}145\times(1+T/273.16)^{1/2}; \qquad (42)$$

in which c is the velocity of the wave in cm/sec and T is the temperature in degrees Celsius. If the gas includes other gases or a mixture of gases, EQN. 42 can be modified to incorporate properties of the alternate gas or the gas mixture. EQN. 42 can be derived from the more general equation for the velocity of a wave in a gas:

$$c=[(RT/M)(1+R/C_v)]^{1/2}; \qquad (43)$$

in which R is the ideal gas constant, T is the temperature in Kelvin, and $C_v$ is the heat capacity of the gas.

Alternatively, a reference time-domain pressure wave can be determined at a known ambient temperature. Thus, a time-domain pressure wave determined at an increased temperature within the wellbore may be compared to the reference pressure wave to determine an average temperature within the wellbore after heating the formation. The change in velocity between the reference pressure wave and the increased temperature pressure wave, as measured by the change in distance between pressure spikes 1456, can be used to determine the increased temperature within the conduit. Use of pressure waves to measure an average temperature may require relatively low maintenance. Using the velocity of pressure waves to measure temperature may be less expensive than other temperature measurement methods.

In some embodiments, a heat source may be turned down and/or off after an average temperature in a formation reaches a selected temperature. Turning down and/or off the heat source may reduce input energy costs, inhibit overheating of the formation, and allow heat to transfer into colder regions of the formation.

In some in situ conversion process embodiments, electrical power used in heating a hydrocarbon containing formation may be supplied from alternate energy sources. Alternate energy sources include, but are not limited to, solar power, wind power, hydroelectric power, geothermal power, biomass sources (i.e., agricultural and forestry by-products and energy crops), and tidal power. Electric heaters used to heat a formation may use any available current, voltage (AC or DC), or frequency that will not result in damage to the heater element. Because the heaters can be operated at a wide variety of voltages or frequencies, transformers or other conversion equipment may not be needed to allow for the use of electricity from alternate energy sources to power the electric heaters. This may significantly reduce equipment costs associated with using alternate energy sources, such as wind power in which a significant cost is associated with equipment that establishes a relatively narrow current and/or voltage range.

Power generated from alternate energy sources may be generated at or proximate an area for treating a hydrocarbon containing formation. For example, one or more solar panels and equipment for converting solar energy to electricity may be placed at a location proximate a formation. A wind farm, which includes a plurality of wind turbines, may be placed near a formation that is to be, or is being, subjected to an in situ conversion process. A power station that combusts or otherwise uses local or imported biomass for electrical generation may be placed near a formation that is to be, or is being, subjected to an in situ conversion process. If suitable geothermal or hydroelectric sites are located sufficiently nearby, these resources may be used for power generation. Power for electric heaters may be generated at or proximate the location of a formation, thus reducing costs associated with obtaining and/or transporting electrical power. In certain embodiments, steam and/or other exhaust fluids from treating a formation may be used to power a generator that is also primarily powered by wind turbines.

In an embodiment in which an alternate energy source such as wind or solar power is used to power electric heaters, supplemental power may be needed to complement the alternate energy source when the alternate energy source does not provide sufficient power to supply the heaters. For example, with a wind power source, during times when there is insufficient wind to power a wind turbine to provide power to an electric heater, the additional power required may be obtained from line power sources such as a fossil fuel plant or nuclear power plant. In other embodiments, power from alternate energy sources may be used for supplemental power in addition to power from line power sources to reduce costs associated with heating a formation.

Alternate energy sources such as wind or solar power may be used to supplement or replace electrical grid power during peak energy cost times. If excess electricity that is compatible with the electricity grid is generated using alternate energy sources, the excess electricity may be sold to the grid. If excess electricity is generated, and if the excess energy is not easily compatible with an existing electricity grid, the excess electricity may be used to create stored energy that can be recaptured at a later time. Methods of energy storage may include, but are not limited to, converting water to oxygen and hydrogen, powering a flywheel for later recovery of the mechanical energy, pumping water into a higher reservoir for later use as a hydroelectric power source, and/or compression of air (as in underground caverns or spent areas of the reservoir).

Use of wind, solar, hydroelectric, biomass, or other such energy sources in an in situ conversion process essentially converts the alternate energy into liquid transportation fuels and other energy containing hydrocarbons with a very high efficiency. Alternate energy source usage may allow reduced life cycle greenhouse gas emissions, as in many cases the alternate energy sources (other than biomass) would replace an equivalent amount of power generated by fossil fuel. Even in the case of biomass, the carbon dioxide emitted would not come from fossil fuel, but would instead be recycled from the existing global carbon portfolio through photosynthesis. Unlike with fossil fuel combustion, there would therefore be no net addition of carbon dioxide to the atmosphere. If carbon dioxide from the biomass was captured and sequestered underground or elsewhere, there may be a net removal of carbon from the environment.

Use of alternate energy sources may allow for formation heating in areas where a power grid is lacking or where there otherwise is insufficient coal, oil, or natural gas available for power generation. In embodiments of in situ conversion processes that use combustion (e.g., natural distributed combustors) for heating a portion of a formation, the use of alternate energy sources may allow start up without the need for construction of expensive power plants or grid connections.

The use of alternate energy sources is not limited to supplying electricity for electric heaters. Alternate energy sources may also be used to supply power to treatment facilities for processing fluids produced from a formation. Alternate energy sources may supply fuel for surface burners or other gas combustors. For example, biomass may produce methane and/or other combustible hydrocarbons for reservoir heating.

Figure 113:
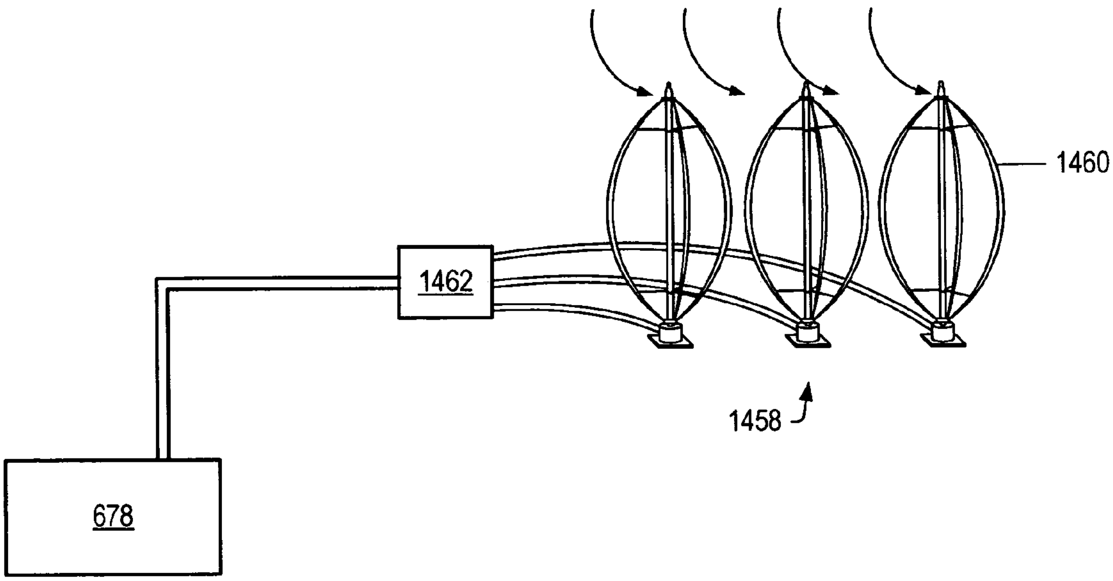
FIG. 113 illustrates a schematic of an embodiment that uses wind to generate electricity to heat a formation.
Figure 114:
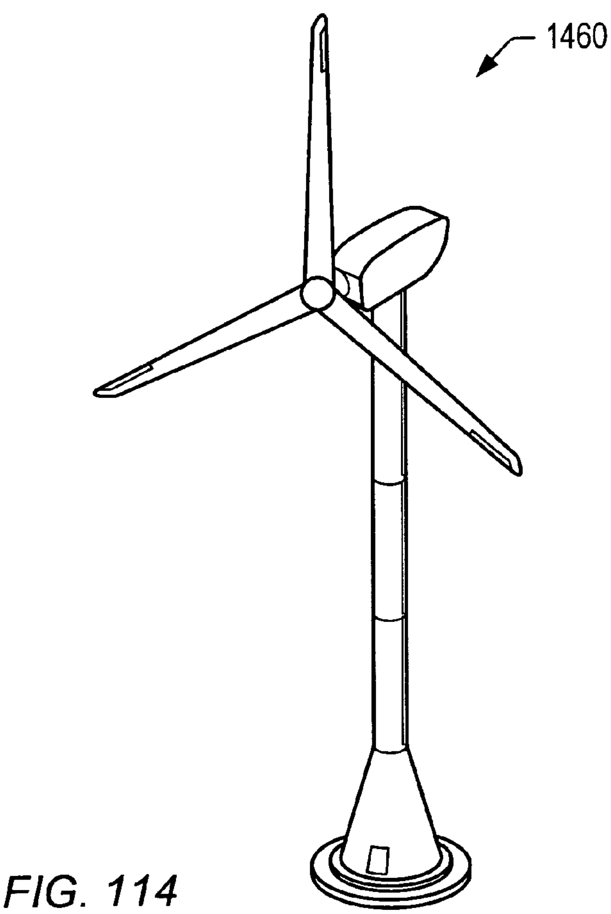
FIG. 114 depicts an embodiment of a windmill for generating electricity.

FIG. 113 illustrates a schematic of an embodiment using wind to generate electricity to heat a formation. Wind farm 1458 may include one or more windmills. The windmills may be of any type of mechanism that converts wind to a usable mechanical form of motion. For example, windmill 1460 can be a design as shown in the embodiment of FIG. 113 or have a design shown as an example in FIG. 114. In some embodiments, the wind farm may include advanced windmills as suggested by the National Renewable Energy Laboratory (Golden, Colo.). Wind farm 1458 may provide power to generator 1462. Generator 1462 may convert power from wind farm 1458 into electrical power. In some embodiments, each windmill may include a generator. Electrical power from generator 1462 may be supplied to formation 678. The electrical power may be used in formation 678 to power heaters, pumps, or any electrical equipment that may be used in treating formation 678.

Figure 115:
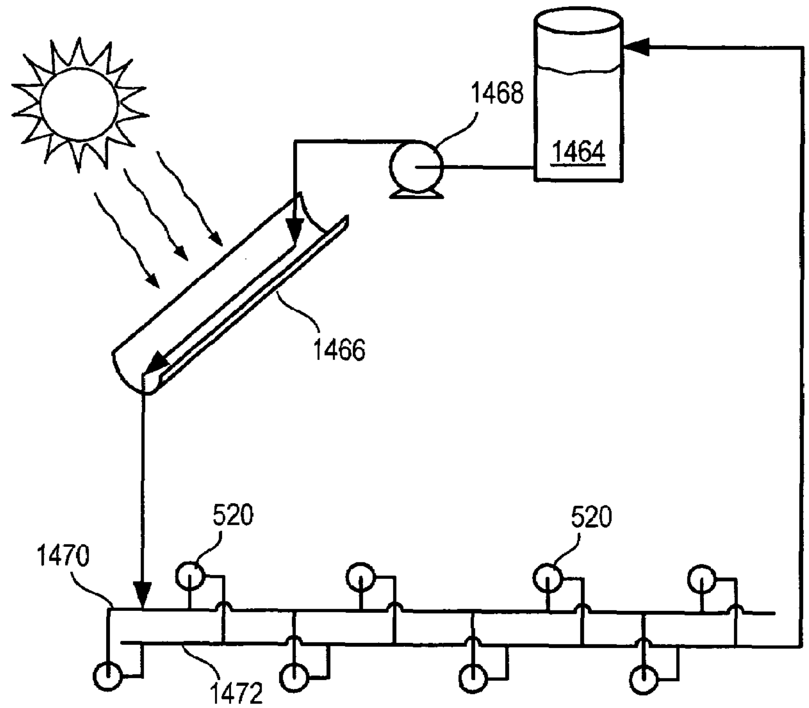
FIG. 115 illustrates a schematic of an embodiment for using solar power to heat a formation.

FIG. 115 illustrates a schematic of an embodiment for using solar power to heat a formation. A heating fluid may be provided from storage tank 1464 to solar array 1466. The heating fluid may include any fluid that has a relatively low viscosity with relatively good heat transfer properties (e.g., water, superheated steam, or molten ionic salts such as molten carbonate). In certain embodiments, a low melting point ionic salt may be used. Pump 1468 may be used to draw heating fluid from storage tank 1464 and provide the heating fluid to solar array 1466. Solar array 1466 may include any array designed to heat the heating fluid to a relatively high temperature (e.g., above about 650° C.) using solar energy. For example, solar array 1466 may include a reflective trough with the heating fluid flowing through tubes within the reflective trough. The heating fluid may be provided to heater wells 520 through hot fluid conduit 1470. Each heater well 520 may be coupled to a branch of hot fluid conduit 1470. A portion of the heating fluid may be provided into each heater well 520.

Each heater well 520 may include two concentric conduits. Heating fluid may be provided into a heater well through an inner conduit. Heating fluid may then be removed from the heater well through an outer conduit. Heat may be transferred from the heating fluid to at least a portion of the formation within each heater well 520 to provide heat to the formation. A portion of each heater well 520 in an overburden of the formation may be insulated such that no heat is transferred from the heating fluid to the overburden. Heating fluid from each heater well 520 may flow into cold fluid conduit 1472, which may return the heating fluid to storage tank 1464. Heating fluid may have cooled within the heater well to a temperature of about 480° C. Heating fluid may be recirculated in a closed loop process as needed. An advantage of using the heating fluid to provide heat to the formation may be that solar power is used directly to heat the formation without converting the solar power to electricity.

Certain in situ conversion embodiments may include providing heat to a first portion of a hydrocarbon containing formation from one or more heat sources. Formation fluids may be produced from the first portion. A second portion of the formation may remain unpyrolyzed by maintaining temperature in the second portion below a pyrolysis temperature of hydrocarbons in the formation. In some embodiments, the second portion or significant sections of the second portion may remain unheated.

A second portion that remains unpyrolyzed may be adjacent to a first portion of the formation that is subjected to pyrolysis. The second portion may provide structural strength to the formation. The second portion may be between the first portion and the third portion. Formation fluids may be produced from the third portion of the formation. A processed formation may have a pattern that resembles a striped or checkerboard pattern with alternating pyrolyzed portions and unpyrolyzed portions. In some in situ conversion embodiments, columns of unpyrolyzed portions of formation may remain in a formation that has undergone in situ conversion.

Unpyrolyzed portions of formation among pyrolyzed portions of formation may provide structural strength to the formation. The structural strength may inhibit subsidence of the formation. Inhibiting subsidence may reduce or eliminate subsidence problems such as changing surface levels and/or decreasing permeability and flow of fluids in the formation due to compaction of the formation.

Temperature (and average temperatures) within a heated hydrocarbon containing formation may vary depending on a number of factors. The factors may include, but are not limited to proximity to a heat source, thermal conductivity and thermal diffusivity of the formation, type of reaction occurring, type of hydrocarbon containing formation, and the presence of water within the hydrocarbon containing formation. A temperature within the hydrocarbon containing formation may be assessed using a numerical simulation model. The numerical simulation model may calculate a subsurface temperature distribution. In addition, the numerical simulation model may assess various properties of a subsurface formation using the calculated temperature distribution.

Assessed properties of the subsurface formation may include, but are not limited to, thermal conductivity of the subsurface portion of the formation and permeability of the subsurface portion of the formation. The numerical simulation model may also assess various properties of fluid formed within a subsurface formation using the calculated temperature distribution. Assessed properties of formed fluid may include, but are not limited to, a cumulative volume of a fluid formed in the formation, fluid viscosity, fluid density, and a composition of the fluid in the formation. The numerical simulation model may be used to assess the performance of commercial-scale operation of a small-scale field experiment. For example, a performance of a commercial-scale development may be assessed based on, but is not limited to, a total volume of product producible from a commercial-scale operation, amount of producible undesired products, and/or a time frame needed before production becomes economical.

In some in situ conversion process embodiments, the in situ conversion process increases a temperature or average temperature within a selected portion of a hydrocarbon containing formation. A temperature or average temperature increase (ΔT) in a specified volume (V) of the hydrocarbon containing formation may be assessed for a given heat input rate (q) over time (t) by EQN. 44:

$$\Delta T = \frac{\sum (q * t)}{C_V * \rho_B * V} \tag{44}$$

In EQN. 44, an average heat capacity of the formation ($C_v$) and an average bulk density of the formation ($\rho_B$) may be estimated or determined using one or more samples taken from the hydrocarbon containing formation.

An in situ conversion process may include heating a specified volume of hydrocarbon containing formation to a pyrolysis temperature or average pyrolysis temperature. Heat input rate (q) during a time (t) required to heat the specified volume (V) to a desired temperature increase (ΔT) may be determined or assessed using EQN. 45:

$$\Sigma q * t = \Delta T * C_v * \rho_B * V \tag{45}$$

In EQN. 45, an average heat capacity of the formation ($C_v$) and an average bulk density of the formation ($\rho_B$) may be estimated or determined using one or more samples taken from the hydrocarbon containing formation.

EQNS. 44 and 45 may be used to assess or estimate temperatures, average temperatures (e.g., over selected sections of the formation), heat input, etc. Such equations do not take into account other factors (such as heat losses), which would also have some effect on heating and temperature assessments. However such factors can ordinarily be addressed with correction factors.

In some in situ conversion process embodiments, a portion of a hydrocarbon containing formation may be heated at a heating rate in a range from about 0.1° C./day to about 50° C./day. Alternatively, a portion of a hydrocarbon containing formation may be heated at a heating rate in a range of about 0.1° C./day to about 10° C./day. For example, a majority of hydrocarbons may be produced from a formation at a heating rate within a range of about 0.1° C./day to about 10° C./day. In addition, a hydrocarbon containing formation may be heated at a rate of less than about 0.7° C./day through a significant portion of a pyrolysis temperature range. The pyrolysis temperature range may include a range of temperatures as described in above embodiments. For example, the heated portion may be heated at such a rate for a time greater than 50% of the time needed to span the temperature range, more than 75% of the time needed to span the temperature range, or more than 90% of the time needed to span the temperature range.

A rate at which a hydrocarbon containing formation is heated may affect the quantity and quality of the formation fluids produced from the hydrocarbon containing formation. For example, heating at high heating rates (e.g., as is done during a Fischer Assay analysis) may allow for production of a large quantity of condensable hydrocarbons from a hydrocarbon containing formation. The products of such a process may be of a significantly lower quality than would be produced using heating rates less than about 10° C./day. Heating at a rate of temperature increase less than approximately 10° C./day may allow pyrolysis to occur within a pyrolysis temperature range in which production of undesirable products and heavy hydrocarbons may be reduced. In addition, a rate of temperature increase of less than about 3° C./day may further increase the quality of the produced condensable hydrocarbons by further reducing the production of undesirable products and further reducing production of heavy hydrocarbons from a hydrocarbon containing formation.

In some in situ conversion process embodiments, controlling temperature within a hydrocarbon containing formation may involve controlling a heating rate within the formation. For example, controlling the heating rate such that the heating rate is less than approximately 3° C./day may provide better control of temperature within the hydrocarbon containing formation.

An in situ process for hydrocarbons may include monitoring a rate of temperature increase at a production well. A temperature within a portion of a hydrocarbon containing formation, however, may be measured at various locations within the portion of the formation. An in situ process may include monitoring a temperature of the portion at a midpoint between two adjacent heat sources. The temperature may be monitored over time to allow for calculation of a rate of temperature increase. A rate of temperature increase may affect a composition of formation fluids produced from the formation. Energy input into a formation may be adjusted to change a heating rate of the formation based on calculated rate of temperature increase in the formation to promote production of desired products.

In some embodiments, a power (Pwr) required to generate a heating rate (h) in a selected volume (V) of a hydrocarbon containing formation may be determined by EQN. 46:

$$Pwr = h * V * C_v * \rho_B \tag{46}$$

In EQN. 46, an average heat capacity of the hydrocarbon containing formation is described as $C_v$. The average heat capacity of the hydrocarbon containing formation may be a relatively constant value. Average heat capacity may be estimated or determined using one or more samples taken from a hydrocarbon containing formation, or the average heat capacity may be measured in situ using a thermal pulse test. Methods of determining average heat capacity based on a thermal pulse test are described by I. Berchenko, E. Detournay, N. Chandler, J. Martino, and E. Kozak, "In-situ measurement of some thermoporoelastic parameters of a granite" in *Poromechanics, A Tribute to Maurice A. Biot*., pages 545-550, Rotterdam, 1998 (Balkema), which is incorporated by reference as if fully set forth herein.

An average bulk density of the hydrocarbon containing formation is described as $\rho_B$. The average bulk density of the hydrocarbon containing formation may be a relatively constant value. Average bulk density may be estimated or determined using one or more samples taken from a hydrocarbon containing formation. In certain embodiments, the product of average heat capacity and average bulk density of the hydrocarbon containing formation may be a relatively constant value (such product can be assessed in situ using a thermal pulse test).

A determined power may be used to determine heat provided from a heat source into the selected volume such that the selected volume may be heated at a heating rate, h. For example, a heating rate may be less than about 3° C./day, and even less than about 2° C./day. A heating rate within a range of heating rates may be maintained within the selected volume. It is to be understood that in this context "power" is used to describe energy input per time. The form of such energy input may vary (e.g., energy may be provided from electrical resistance heaters, combustion heaters, etc.).

The heating rate may be selected based on a number of factors including, but not limited to, the maximum temperature possible at the well, a predetermined quality of formation fluids that may be produced from the formation, and/or spacing between heat sources. A quality of hydrocarbon fluids may be defined by an API gravity of condensable hydrocarbons, by olefin content, by the nitrogen, sulfur and/or oxygen content, etc. In an in situ conversion process embodiment, heat may be provided to at least a portion of a hydrocarbon containing formation to produce formation fluids having an API gravity of greater than about 20°. The API gravity may vary, however, depending on a number of factors including the heating rate and a pressure within the portion of the formation and the time relative to initiation of the heat sources when the formation fluid is produced.

Subsurface pressure in a hydrocarbon containing formation may correspond to the fluid pressure generated within the formation. Heating hydrocarbons within a hydrocarbon containing formation may generate fluids by pyrolysis. The generated fluids may be vaporized within the formation. Vaporization and pyrolysis reactions may increase the pressure within the formation. Fluids that contribute to the increase in pressure may include, but are not limited to, fluids produced during pyrolysis and water vaporized during heating. As temperatures within a selected section of a heated portion of the formation increase, a pressure within the selected section may increase as a result of increased fluid generation and vaporization of water. Controlling a rate of fluid removal from the formation may allow for control of pressure in the formation.

In some embodiments, pressure within a selected section of a heated portion of a hydrocarbon containing formation may vary depending on factors such as depth, distance from a heat source, a richness of the hydrocarbons within the hydrocarbon containing formation, and/or a distance from a producer well. Pressure within a formation may be determined at a number of different locations (e.g., near or at production wells, near or at heat sources, or at monitor wells).

Heating of a hydrocarbon containing formation to a pyrolysis temperature range may occur before substantial permeability has been generated within the hydrocarbon containing formation. An initial lack of permeability may inhibit the transport of generated fluids from a pyrolysis zone within the formation to a production well. As heat is initially transferred from a heat source to a hydrocarbon containing formation, a fluid pressure within the hydrocarbon containing formation may increase proximate a heat source. Such an increase in fluid pressure may be caused by generation of fluids during pyrolysis of at least some hydrocarbons in the formation. The increased fluid pressure may be released, monitored, altered, and/or controlled through the heat source. For example, the heat source may include a valve that allows for removal of some fluid from the formation. In some heat source embodiments, the heat source may include an open wellbore configuration that inhibits pressure damage to the heat source.

In some in situ conversion process embodiments, pressure generated by expansion of pyrolysis fluids or other fluids generated in the formation may be allowed to increase although an open path to the production well or any other pressure sink may not yet exist in the formation. The fluid pressure may be allowed to increase towards a lithostatic pressure. Fractures in the hydrocarbon containing formation may form when the fluid approaches the lithostatic pressure. For example, fractures may form from a heat source to a production well. The generation of fractures within the heated portion may relieve some of the pressure within the portion.

When permeability or flow channels to production wells are established, pressure within the formation may be controlled by controlling production rate from the production wells. In some embodiments, a back pressure may be maintained at production wells or at selected production wells to maintain a selected pressure within the heated portion.

A formation (e.g., an oil shale formation) may include one or more lean zones. Lean zones may include zones with a relatively low kerogen content (e.g., less than about 0.06 L/kg in oil shale). Rich zones may include zones with a relatively high kerogen content (e.g., greater than about 0.06 L/kg in oil shale). Lean zones may exist at an upper or lower boundary of a rich zone and/or may exist as lean zone layers between layers of rich zone layers. Generally, lean zones may be more permeable and include more brittle material than rich zones. In addition, rich zones typically have a lower thermal conductivity than lean zones. For example, lean zones may include zones through which fluids (e.g., water) can flow. In some cases, however, lean zones may have lower permeabilities and/or include somewhat less brittle material. In an in situ process for treating a formation, heat may be applied to rich zones with substantial amounts of hydrocarbons to pyrolyze and produce hydrocarbons from the rich zones. Applying heat to lean zones may be inhibited to avoid creating fractures within the lean zones (e.g., when the lean zone is at an outer boundary of the formation).

In certain embodiments, heat may be applied to a lean zone (e.g., a lean zone between two rich zones) to create and propagate fractures within the lean zone. Applying heat to a lean zone and creating fractures within the lean zone may allow for earlier production of hydrocarbons from a formation. In some embodiments, heating of the lean zone may not be needed as fractures or high permeability is initially present within the lean zone. Formation fluids may flow through a permeable lean zone more rapidly than through other portions of a formation. Formation fluids may be produced through a production well earlier during heating of the formation in the presence of a permeable lean zone. The permeable lean zone may provide a pathway for the flow of fluids between the heat front where fluids are pyrolyzed and the production well. Production of formation fluids through the permeable lean zone may increase the production of fluids as liquids, inhibit pressure buildup in the formation, inhibit failure/collapse of wells due to high pressures, and/or allow for convective heat transfer through the fractures.

Figure 116:
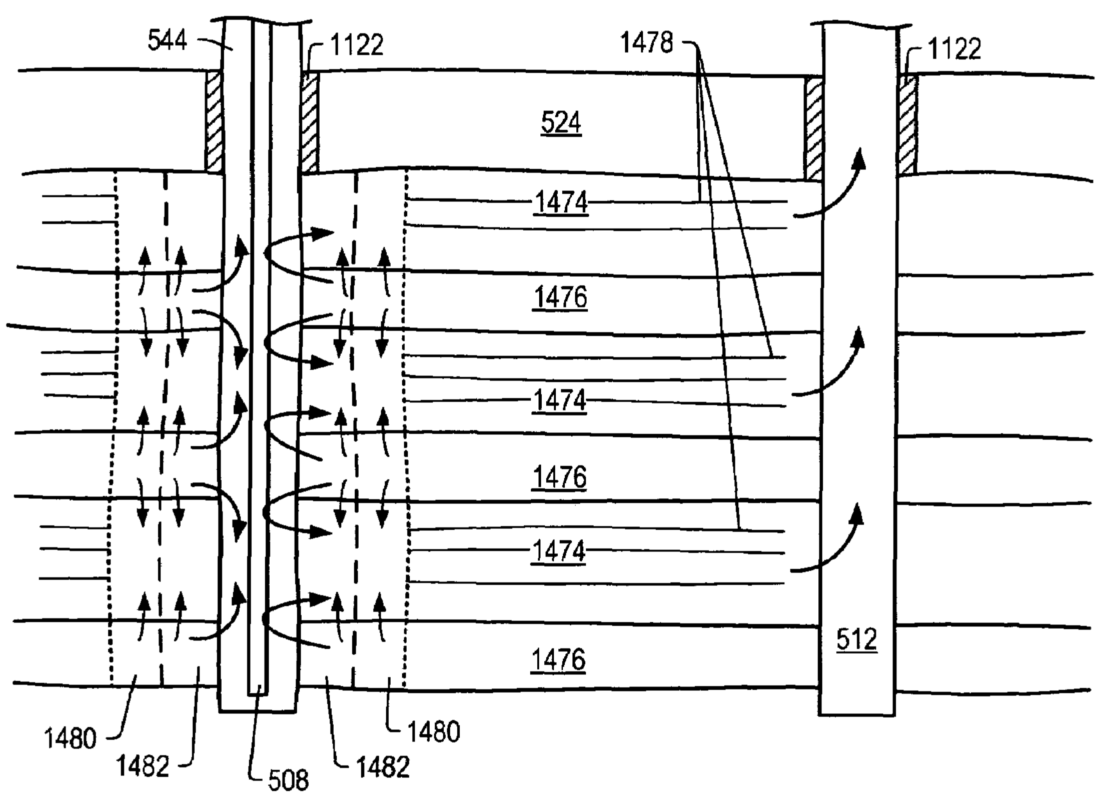
FIG. 116 depicts a cross-sectional representation of an embodiment for treating a lean zone and a rich zone of a formation.

FIG. 116 depicts a cross-sectional representation of an embodiment for treating lean zones 1474 and rich zones 1476 of a formation. Lean zones 1474 and rich zones 1476 are below overburden 524. In some embodiments, lean zones 1474 may be relatively permeable sections of the formation. For example, lean zones 1474 may have an average permeability thickness product of greater than about 100 millidarcy feet. In certain embodiments, lean zones 1474 may have an average permeability thickness product of greater than about 1000 millidarcy feet or greater than about 5000 millidarcy feet. Rich zones 1476 may be sections of the formation that are selected for treatment based on a richness of the section. Rich zones 1476 may have an initial average permeability thickness product of less than about 10 millidarcy feet. Certain rich zones may have an initial average permeability thickness product of less than about 1 millidarcy feet or less than about 0.5 millidarcy feet.

Heat source 508 may be placed through overburden 524 and into opening 544. Reinforcing material 1122 (e.g., cement) may seal a portion of opening 544 to overburden 524. Heat source 508 may apply heat to lean zones 1474 and/or rich zones 1476. In some embodiments, heat source 508 may include a conductor with a thickness that is adjusted to provide more heat to rich zones 1476 than lean zones 1474 (i.e., the thickness of the conductor is larger proximate the lean zones than the thickness of the conductor proximate the rich zones).

In certain embodiments, rich zones 1476 may not fracture. For example, the rich zones may have a ductility that is high enough to inhibit the formation of fractures. A formation (e.g., an oil shale formation) may have one or more lean zones 1474 and one or more rich zones 1476 that are layered throughout the formation as shown in FIG. 116. Formation fluids formed in rich zones 1476 may be produced through pre-existing fractures in lean zone 1474. In some embodiments, lean zone 1474 may have a permeability sufficiently high to allow production of fluids. This high permeability may be initially present in the lean zone because of, for example, water flow through the lean zone that leached out minerals over geological time prior to initiation of the in situ conversion process. In some embodiments, the application of heat to the formation from heat sources may produce, or increase the size of, fractures 1478 and/or increase the permeability in lean zones 1474. Fractures 1478 may increase the permeability of lean zones 1474 by providing a pathway for fluids to propagate through the lean zones.

During early times of heating, permeability may be created near opening 544. Permeability may be created in permeable zone 1480 adjacent opening 544. Permeable zone 1480 will increase in size and move out radially as the heat front produced by heat source 508 moves outward. As the heat front migrates through the formation, hydrocarbons may be pyrolyzed as temperatures within rich zones 1476 reach pyrolysis temperatures. Pyrolyzation of the hydrocarbons, along with heating of the rich zones, may increase the permeability of rich zones 1476. At later times of heating, hydrocarbons in coking portion 1482 of permeable zone 1480 may coke as temperatures within this portion increase to coking temperatures. At some point permeable zone 1480 will move outward to a distance from opening 544 at which no coking of hydrocarbons occurs (i.e., a distance at which temperatures do not approach coking temperatures). Permeable zone 1480 may continue to expand with the migration of the heat front through the formation. If sufficient water is present, coking may be suppressed near opening 544.

In certain embodiments, fluids formed in rich zones 1476 may flow into lean zones 1474 through permeable zone 1480. Coking portion 1482 may inhibit the flow of fluids between rich zones 1476 and lean zones 1474. Fluids may continue to flow into lean zones 1474 through un-coked portions of permeable zone 1480. In some embodiments, fluids may flow to opening 544 (e.g., during early times of heating before permeable zone 1480 has sufficient permeability for fluid flow into the lean zones). Fluids that flow to opening 544 may be produced through the opening or be allowed to flow through lean zones 1474 to production well 512. In addition, during early times of heating, some coke formation may occur near opening 544.

Allowing formation fluids to be produced through lean zones 1474 may allow for earlier production of fluids formed in rich zones 1476. For example, fluids formed in rich zones 1474 may be produced through lean zones 1474 before sufficient permeability has been created in the rich zones for fluids to flow directly within the rich zones to production well 512. Producing at least some fluids through lean zone 1474 or through opening 544 may inhibit a buildup of pressure within the formation during heating of the formation.

In certain embodiments, fractures 1478 may propagate in a horizontal direction. However, fractures 1478 may propagate in other directions depending on, for example, a depth of the fracturing layer and structure of the fracturing layer. As an example, oil shale formations in the Piceance basin in Colorado that are deeper than about 125 m below the surface tend to have fractures that propagate at an angle or vertically. In certain embodiments, the creation of angled or vertical fractures may be inhibited to inhibit fracturing into an aquifer or other environmentally sensitive area.

In some embodiments, applying heat to rich zones 1476 may create fractures within the rich zones. Fractures within rich zone 1476 may be less likely to initially occur due to the more ductile (less brittle) composition of the rich zone as compared to lean zones 1474. In an embodiment, fractures may develop that connect lean zones 1474 and rich zones 1476. These fractures may provide a path for propagation of fluids from one zone to the other zone.

Production well 512 may be placed at an angle, vertically, or horizontally into lean zones 1474 and rich zones 1476. Production well 512 may produce formation fluids from lean zones 1474 and/or rich zones 1476.

In some embodiments, more than one production well may be placed in lean zones 1474 and/or rich zones 1476. A number of production wells may be determined by, for example, a desired product quality of the produced fluids, a desired production rate, a desired weight percentage of a component in the produced fluids, etc.

In other embodiments, formation fluids may be produced through opening 544, which may be uncased or perforated. Producing formation fluids through opening 544 tends to increase cracking of hydrocarbons (from the heat provided by heat source 508) as the fluids propagate along the length of the opening. Fluids produced through opening 544 may have lower carbon numbers than fluids produced through production well 512.

In an in situ conversion process embodiment, pressure may be increased within a selected section of a portion of a hydrocarbon containing formation to a selected pressure during pyrolysis. A selected pressure may be within a range from about 2 bars absolute to about 72 bars absolute or, in some embodiments, 2 bars absolute to 36 bars absolute. Alternatively, a selected pressure may be within a range from about 2 bars absolute to about 18 bars absolute. In some in situ conversion process embodiments, a majority of hydrocarbon fluids may be produced from a formation having a pressure within a range from about 2 bars absolute to about 18 bars absolute. The pressure during pyrolysis may vary or be varied. The pressure may be varied to alter and/or control a composition of a formation fluid produced, to control a percentage of condensable fluid as compared to non-condensable fluid, and/or to control an API gravity of fluid being produced. For example, decreasing pressure may result in production of a larger condensable fluid component. The condensable fluid component may contain a larger percentage of olefins.

In some in situ conversion process embodiments, increased pressure due to fluid generation may be maintained within the heated portion of the formation. Maintaining increased pressure within a formation may inhibit formation subsidence during in situ conversion. Increased formation pressure may promote generation of high quality products during pyrolysis. Increased formation pressure may facilitate vapor phase production of fluids from the formation. Vapor phase production may allow for a reduction in size of collection conduits used to transport fluids produced from the formation. Increased formation pressure may reduce or eliminate the need to compress formation fluids at the surface to transport the fluids in collection conduits to treatment facilities. Maintaining increased pressure within a formation may also facilitate generation of electricity from produced non-condensable fluid. For example, the produced non-condensable fluid may be passed through a turbine to generate electricity.

Increased pressure in the formation may also be maintained to produce more and/or improved formation fluids. In certain in situ conversion process embodiments, significant amounts (e.g., a majority) of the hydrocarbon fluids produced from a formation may be non-condensable hydrocarbons. Pressure may be selectively increased and/or maintained within the formation to promote formation of smaller chain hydrocarbons in the formation. Producing small chain hydrocarbons in the formation may allow more non-condensable hydrocarbons to be produced from the formation. The condensable hydrocarbons produced from the formation at higher pressure may be of a higher quality (e.g., higher API gravity) than condensable hydrocarbons produced from the formation at a lower pressure.

A high pressure may be maintained within a heated portion of a hydrocarbon containing formation to inhibit production of formation fluids having carbon numbers greater than, for example, about 25. Some high carbon number compounds may be entrained in vapor in the formation and may be removed from the formation with the vapor. A high pressure in the formation may inhibit entrainment of high carbon number compounds and/or multi-ring hydrocarbon compounds in the vapor. Increasing pressure within the hydrocarbon containing formation may increase a boiling point of a fluid within the portion. High carbon number compounds and/or multi-ring hydrocarbon compounds may remain in a liquid phase in the formation for significant time periods. The significant time periods may provide sufficient time for the compounds to pyrolyze to form lower carbon number compounds.

Maintaining increased pressure within a heated portion of the formation may surprisingly allow for production of large quantities of hydrocarbons of increased quality. Maintaining increased pressure may promote vapor phase transport of pyrolyzation fluids within the formation. Increasing the pressure often permits production of lower molecular weight hydrocarbons since such lower molecular weight hydrocarbons will more readily transport in the vapor phase in the formation.

Generation of lower molecular weight hydrocarbons (and corresponding increased vapor phase transport) is believed to be due, in part, to autogenous generation and reaction of hydrogen within a portion of the hydrocarbon containing formation. For example, maintaining an increased pressure may force hydrogen generated during pyrolysis into a liquid phase (e.g., by dissolving). Heating the portion to a temperature within a pyrolysis temperature range may pyrolyze hydrocarbons within the formation to generate pyrolyzation fluids in a liquid phase. The generated components may include double bonds and/or radicals. $H_2$in the liquid phase may reduce double bonds of the generated pyrolyzation fluids, thereby reducing a potential for polymerization or formation of long chain compounds from the generated pyrolyzation fluids. In addition, hydrogen may also neutralize radicals in the generated pyrolyzation fluids. Therefore, $H_2$ in the liquid phase may inhibit the generated pyrolyzation fluids from reacting with each other and/or with other compounds in the formation. Shorter chain hydrocarbons may enter the vapor phase and may be produced from the formation.

Increasing the formation pressure may reduce the potential for coking within a selected section of the formation. Coking reactions may occur substantially in a liquid phase at high temperatures. Coking reactions may occur in localized sections of the formation. An in situ conversion process embodiment may slowly raise temperature within a selected section. Pyrolysis reactions that occur in a liquid phase may result in the production of small molecules in the liquid phase. The small molecules may leave the liquid as a vapor due to local temperature and pressure conditions. The small molecules undergoing phase change from a liquid phase to a vapor phase may absorb a significant amount of heat. The absorbed heat may help to inhibit high temperatures that could result in coking reactions. In addition, increased pressure in the formation may result in a significant amount of hydrogen being forced into the liquid phase present in the formation. The hydrogen may inhibit polymerization reactions that result in the generation of large hydrocarbon molecules. Inhibiting the production of large hydrocarbon molecules may result in less coking within the formation.

Operating an in situ conversion process at increased pressure may allow for vapor phase production of formation fluid from the formation. Vapor phase production may permit increased recovery of lighter (and relatively high quality) pyrolyzation fluids. Vapor phase production may result in less formation fluid being left in the formation after the fluid is produced by pyrolysis. Vapor phase production may allow for fewer production wells in the formation than are present using liquid phase or liquid/vapor phase production. Fewer production wells may significantly reduce equipment costs associated with an in situ conversion process.

In an embodiment, a portion of a hydrocarbon containing formation may be heated to increase a partial pressure of $H_2$. In some embodiments, an increased $H_2$ partial pressure may include $H_2$ partial pressures in a range from about 0.5 bars absolute to about 7 bars absolute. Alternatively, an increased $H_2$ partial pressure range may include $H_2$ partial pressures in a range from about 5 bars absolute to about 7 bars absolute. For example, a majority of hydrocarbon fluids may be produced wherein a $H_2$ partial pressure is within a range of about 5 bars absolute to about 7 bars absolute. A range of $H_2$ partial pressures within the pyrolysis $H_2$ partial pressure range may vary depending on, for example, temperature and pressure of the heated portion of the formation.

Maintaining a $H_2$ partial pressure within the formation of greater than atmospheric pressure may increase an API value of produced condensable hydrocarbon fluids. Maintaining an increased $H_2$ partial pressure may increase an API value of produced condensable hydrocarbon fluids to greater than about 25° or, in some instances, greater than about 30°. Maintaining an increased $H_2$ partial pressure within a heated portion of a hydrocarbon containing formation may increase a concentration of $H_2$ within the heated portion. The $H_2$ may be available to react with pyrolyzed components of the hydrocarbons. Reaction of $H_2$ with the pyrolyzed components of hydrocarbons may reduce polymerization of olefins into tars and other cross-linked, difficult to upgrade, products. Therefore, production of hydrocarbon fluids having low API gravity values may be inhibited.

In an embodiment, a method for treating a hydrocarbon containing formation in situ may include adding hydrogen to a selected section of the formation when the selected section is at or undergoing certain conditions. For example, the hydrogen may be added through a heater well or production well located in or proximate the selected section. Since hydrogen is sometimes in relatively short supply (or relatively expensive to make or procure), hydrogen may be added when conditions in the formation optimize the use of the added hydrogen. For example, hydrogen produced in a section of a formation undergoing synthesis gas generation may be added to a section of the formation undergoing pyrolysis. The added hydrogen in the pyrolysis section of the formation may promote formation of aliphatic compounds and inhibit formation of olefinic compounds that reduce the quality of hydrocarbon fluids produced from formation.

In some embodiments, hydrogen may be added to the selected section after an average temperature of the formation is at a pyrolysis temperature (e.g., when the selected section is at least about 270° C.). In some embodiments, hydrogen may be added to the selected section after the average temperature is at least about 290° C., 320° C., 375° C., or 400° C. Hydrogen may be added to the selected section before an average temperature of the formation is about 400° C. In some embodiments, hydrogen may be added to the selected section before the average temperature is about 300° C. or about 325° C.

The average temperature of the formation may be controlled by selectively adding hydrogen to the selected section of the formation. Hydrogen added to the formation may react in exothermic reactions. The exothermic reactions may heat the formation and reduce the amount of energy that needs to be supplied from heat sources to the formation. In some embodiments, an amount of hydrogen may be added to the selected section of the formation such that an average temperature of the formation does not exceed about 400° C.

A valve may maintain, alter, and/or control a pressure within a heated portion of a hydrocarbon containing formation. For example, a heat source disposed within a hydrocarbon containing formation may be coupled to a valve. The valve may release fluid from the formation through the heat source. In addition, a pressure valve may be coupled to a production well within the hydrocarbon containing formation. In some embodiments, fluids released by the valves may be collected and transported to a surface unit for further processing and/or treatment.

An in situ conversion process for hydrocarbons may include providing heat to a portion of a hydrocarbon containing formation and controlling a temperature, rate of temperature increase, and/or pressure within the heated portion. A temperature and/or a rate of temperature increase of the heated portion may be controlled by altering the energy supplied to heat sources in the formation.

Controlling pressure and temperature within a hydrocarbon containing formation may allow properties of the produced formation fluids to be controlled. For example, composition and quality of formation fluids produced from the formation may be altered by altering an average pressure and/or an average temperature in a selected section of a heated portion of the formation. The quality of the produced fluids may be evaluated based on characteristics of the fluid such as, but not limited to, API gravity, percent olefins in the produced formation fluids, ethene to ethane ratio, atomic hydrogen to carbon ratio, percent of hydrocarbons within produced formation fluids having carbon numbers greater than 25, total equivalent production (gas and liquid), total liquids production, and/or liquid yield as a percent of Fischer Assay. Controlling the quality of the produced formation fluids may include controlling average pressure and average temperature in the selected section such that the average assessed pressure in the selected section is greater than the pressure (p) as set forth in the form of EQN. 47 for an assessed average temperature (T) in the selected section:

$$p = \exp\left[\frac{A}{T}+B\right] \qquad (47)$$

where p is measured in psia (pounds per square inch absolute), T is measured in Kelvin, and A and B are parameters dependent on the value of the selected property.

EQN. 47 may be rewritten such that the natural log of pressure is a linear function of the inverse of temperature. This form of EQN. 47 is expressed as: ln(p)=A/T +B. In a plot of the natural log of absolute pressure as a function of the reciprocal of the absolute temperature, A is the slope and B is the intercept. The intercept B is defined to be the natural logarithm of the pressure as the reciprocal of the temperature approaches zero. The slope and intercept values (A and B) of the pressure-temperature relationship may be determined from at least two pressure-temperature data points for a given value of a selected property. The pressure-temperature data points may include an average pressure within a formation and an average temperature within the formation at which the particular value of the property was, or may be, produced from the formation. The pressure-temperature data points may be obtained from an experiment such as a laboratory experiment or a field experiment.

A relationship between the slope parameter, A, and a value of a property of formation fluids may be determined. For example, values of A may be plotted as a function of values of a formation fluid property. A cubic polynomial may be fitted to these data. For example, a cubic polynomial relationship such as EQN. 48:

$$A=a_1*(\text{property})^3+a_2*(\text{property})^2+a_3*(\text{property})+a_4; \qquad (48)$$

may be fitted to the data, where $a_1$, $a_2$, $a_3$, and $a_4$ are empirical constants that describe a relationship between the first parameter, A, and a property of a formation fluid. Alternatively, relationships having other functional forms such as another order polynomial, trigonometric function, or a logarithmic function may be fitted to the data. Values for $a_1$, $a_2$, . . . , may be estimated from the results of the data fitting. Similarly, a relationship between the second parameter, B, and a value of a property of formation fluids may be determined. For example, values of B may be plotted as a function of values of a property of a formation fluid. A cubic polynomial may also be fitted to the data. For example, a cubic polynomial relationship such as EQN. 49:

$$B=b_1*(\text{property})^3+b_2*(\text{property})^2+b_3*(\text{property})+b_4; \qquad (49)$$

may be fitted to the data, where $b_1$, $b_2$, $b_3$, and $b_4$ are empirical constants that may describe a relationship between the parameter B and the value of a property of a formation fluid. As such, $b_1$, $b_2$, $b_3$, and $b_4$ may be estimated from results of fitting the data. TABLES 9 and 10 list estimated empirical constants determined for several properties of a formation fluid produced by an in situ conversion process from Green River oil shale.

TABLE 9

| PROPERTY | $a_1$ | $a_2$ | $a_3$ | $a_4$ |
|---|---|---|---|---|
| API Gravity | −0.738549 | −8.893902 | 4752.182 | −145484.6 |
| Ethene/Ethane Ratio | −15543409 | 3261335 | −303588.8 | −2767.469 |
| Weight Percent of Hydrocarbons Having a Carbon Number Greater Than 25 | 0.1621956 | −8.85952 | 547.9571 | −24684.9 |
| Atomic H/C Ratio | 2950062 | −16982456 | 32584767 | −20846821 |
| Liquid Production (gal/ton) | 119.2978 | −5972.91 | 96989 | −524689 |
| Equivalent Liquid Production (gal/ton) | −6.24976 | 212.9383 | −777.217 | −39353.47 |
| % Fischer Assay | 0.5026013 | −126.592 | 9813.139 | −252736 |

TABLE 10

| PROPERTY | $B_1$ | $b_2$ | $b_3$ | $b_4$ |
|---|---|---|---|---|
| API Gravity | 0.003843 | −0.279424 | 3.391071 | 96.67251 |
| Ethene/Ethane Ratio | −8974.317 | 2593.058 | −40.78874 | 23.31395 |
| Weight Percent of Hydrocarbons Having a Carbon Number Greater Than 25 | −0.0005022 | 0.026258 | −1.12695 | 44.49521 |
| Atomic H/C Ratio | 790.0532 | −4199.454 | 7328.572 | −4156.599 |
| Liquid Production (gal/ton) | −0.17808 | 8.914098 | −144.999 | 793.2477 |
| Equivalent Liquid Production (gal/ton) | −0.03387 | 2.778804 | −72.6457 | 650.7211 |
| % Fischer Assay | −0.0007901 | 0.196296 | −15.1369 | 395.3574 |

To determine an average pressure and an average temperature for producing a formation fluid having a selected property, the value of the selected property and the empirical constants may be used to determine values for the first parameter A and the second parameter B, according to EQNS. 50 and 51:

$$A=a_1*(\text{property})^3+a_2*(\text{property})^2+a_3*(\text{property})+a_4 \quad (50)$$

$$B=b_1*(\text{property})^3+b_2*(\text{property})^2+b_3*(\text{property})+b_4 \quad (51)$$

TABLES 11-17 list estimated values for the parameter A and approximate values for the parameter B, as determined for a selected property of a formation fluid produced by an in situ conversion process from Green River oil shale.

TABLE 11

| API Gravity | A | B |
|---|---|---|
| 20° | −59906.9 | 83.46594 |
| 25° | 43778.5 | 66.85148 |
| 30° | −30864.5 | 50.67593 |
| 35° | −21718.5 | 37.82131 |
| 40° | −16894.7 | 31.16965 |
| 45° | −16946.8 | 33.60297 |

TABLE 12

| Ethene/Ethane Ratio | A | B |
|---|---|---|
| 0.20 | −57379 | 83.145 |
| 0.10 | −16056 | 27.652 |
| 0.05 | −11736 | 21.986 |
| 0.01 | −5492.8 | 14.234 |

TABLE 13

| Weight Percent of Hydrocarbons Having a Carbon Number Greater Than 25 | A | B |
|---|---|---|
| 25% | −14206 | 25.123 |
| 20% | −15972 | 28.442 |
| 15% | −17912 | 31.804 |
| 10% | −19929 | 35.349 |
| 5% | −21956 | 38.849 |
| 1% | −24146 | 43.394 |

TABLE 14

| Atomic H/C Ratio | A | B |
|---|---|---|
| 1.7 | −38360 | 60.531 |
| 1.8 | −12635 | 23.989 |
| 1.9 | −7953.1 | 17.889 |
| 2.0 | −6613.1 | 16.364 |

TABLE 15

| Liquid Production (gal/ton) | A | B |
|---|---|---|
| 14 gal/ton | −10179 | 21.780 |
| 16 gal/ton | −13285 | 25.866 |
| 18 gal/ton | −18364 | 32.882 |
| 20 gal/ton | −19689 | 34.282 |

TABLE 16

| Equivalent Liquid Production (gal/ton) | A | B |
|---|---|---|
| 20 gal/ton | −19721 | 38.338 |
| 25 gal/ton | −23350 | 42.052 |
| 30 gal/ton | −39768.9 | 57.68 |

TABLE 17

| % Fischer Assay | A | B |
|---|---|---|
| 60% | −11118 | 23.156 |
| 70% | −13726 | 26.635 |
| 80% | −20543 | 36.191 |
| 90% | −28554 | 47.084 |

In some in situ conversion process embodiments, the determined values for the parameter A and the parameter B may be used to determine an average pressure in the selected section of the formation using an assessed average temperature, T, in the selected section. For example, an average pressure of the selected section may be determined by EQN. 52:

$$p=\exp[(A/T)+B], \quad (52)$$

in which p is expressed in psia, and T is expressed in Kelvin. Alternatively, an average absolute pressure of the selected section, measured in bars, may be determined using EQN. 53:

$$p_{bars}=\exp[(A/T)+B-2.6744]. \quad (53)$$

An average pressure within the selected section may be controlled such that the average pressure within the selected section is about the value calculated from the equation. Formation fluid produced from the selected section may approximately have the chosen value of the selected property, and therefore, the desired quality.

In some in situ conversion process embodiments, the determined values for the parameter A and the parameter B may be used to determine an average temperature in the selected section of the formation using an assessed average pressure, p, in the selected section. Using the relationships described above, an average temperature within the selected section may be controlled to approximate the calculated average temperature to produce hydrocarbon fluids having a selected property and quality.

Formation fluid properties may vary depending on a location of a production well in the formation. For example, a location of a production well with respect to a location of a heat source in the formation may affect the composition of formation fluid produced from the formation. Distance between a production well and a heat source in the formation may be varied to alter the composition of formation fluid producible from the formation. Having a short distance between a production well and a heat source or heat sources may allow a high temperature to be maintained at and adjacent to the production well. Having a high temperature at and adjacent to the production well may allow a substantial portion of pyrolyzation fluids flowing to and through the production well to crack to non-condensable compounds. In some in situ conversion process embodiments, location of production wells relative to heat sources may be selected to allow for production of formation fluid having a large non-condensable gas fraction. In some in situ conversion process embodiments, location of production wells relative to heat sources may be selected to increase a condensable gas fraction of the produced formation fluids. During operation of in situ conversion process embodiments, energy input into heat sources adjacent to production wells may be controlled to allow for production of a desired ratio of non-condensable to condensable hydrocarbons.

A carbon number distribution of a produced formation fluid may indicate a quality of the produced formation fluid. In general, condensable hydrocarbons with low carbon numbers are considered to be more valuable than condensable hydrocarbons having higher carbon numbers. Low carbon numbers may include, for example, carbon numbers less than about 25. High carbon numbers may include carbon numbers greater than about 25. In an in situ conversion process embodiment, the in situ conversion process may include providing heat to a portion of a formation so that a majority of hydrocarbons produced from the formation have carbon numbers of less than approximately 25.

An in situ conversion process may be operated so that carbon numbers of the largest weight fraction of hydrocarbons produced from the formation are about 12, for a given time period. The time period may be total time of operation, or a selected subset of operation (e.g., a day, week, month, year, etc.). Operating conditions of an in situ conversion process may be adjusted to shift the carbon number of the largest weight fraction of hydrocarbons produced from the formation. For example, increasing pressure in a formation may shift the carbon number of the largest weight fraction of hydrocarbons produced from the formation to a smaller carbon number. Shifting the carbon number of the largest weight fraction of hydrocarbons produced from the formation may also be expressed as shifting the mean carbon number of the carbon number distribution.

In some in situ conversion process embodiments, hydrocarbons produced from the formation may have a mean carbon number less than about 25. In some in situ conversion process embodiments, less than about 15 weight % of the hydrocarbons in the condensable hydrocarbons have carbon numbers greater than approximately 25. In some embodiments, less than about 5 weight % of hydrocarbons in the condensable hydrocarbons have carbon numbers greater than about 25, and/or less than about 2 weight % of hydrocarbons in the condensable hydrocarbons have carbon numbers greater than about 25.

In an in situ conversion process embodiment, the in situ conversion process may include providing heat to at least a portion of a hydrocarbon containing formation at a rate sufficient to alter and/or control production of olefins. The in situ conversion process may include heating the portion at a rate to produce formation fluids having an olefin content of less than about 10 weight % of condensable hydrocarbons of the formation fluids. Reducing olefin production may reduce coating of pipe surfaces by the olefins, thereby reducing difficulty associated with transporting hydrocarbons through the piping. Reducing olefin production may inhibit polymerization of hydrocarbons during pyrolysis, thereby increasing permeability in the formation and/or enhancing the quality of produced fluids (e.g., by lowering the mean carbon number of the carbon number distribution for fluids produced from the formation, increasing API gravity, etc.).

In some in situ conversion process embodiments, however, the portion may be heated at a rate to allow for production of olefins from formation fluid in sufficient quantities to allow for economic recovery of the olefins. Olefins in produced formation fluid may be separated from other hydrocarbons. Operating conditions (i.e., temperature and pressure) within the formation may be selected to control the composition of olefins produced along with other formation fluid. For example, operating conditions of an in situ conversion process may be selected to produce a carbon number distribution with a mean carbon number of about 9. Only a small weight fraction of the olefins produced may have carbon numbers greater than 9. The small weight fraction may not significantly affect the quality (e.g., API gravity) of the produced fluid from the formation. The fluid may remain easy to process even with enough olefins present to make separation of olefins economically viable.

In some in situ conversion process embodiments, a portion of the formation may be heated at a rate to selectively increase the content of phenol and substituted phenols of condensable hydrocarbons in the produced fluids. For example, phenol and/or substituted phenols may be separated from condensable hydrocarbons. The separated compounds may be used to produce additional products. The resource may, in some embodiments, be selected to enhance production of phenol and/or substituted phenols.

Hydrocarbons in produced fluids may include a mixture of a number of different hydrocarbon components. Hydrocarbons in formation fluid produced from a formation may have a hydrogen to carbon atomic ratio that is at least approximately 1.7 or above. For example, the hydrogen to carbon atomic ratio of a produced fluid may be approximately 1.8, approximately 1.9, or greater. The ratio may be below two because of the presence of aromatic compounds and/or olefins. Some of the hydrocarbon components are condensable and some are not. The fraction of non-condensable hydrocarbons within the produced fluid may be altered and/or controlled by altering, controlling, and/or maintaining a high temperature and/or high pressure during pyrolysis within the formation. Treatment facilities may separate hydrocarbon fluids from non-hydrocarbon fluids. Treatment facilities may also separate condensable hydrocarbons from non-condensable hydrocarbons.

In some embodiments, the non-condensable hydrocarbons may include hydrocarbons having carbon numbers less than or equal to 5. Produced formation fluid may also include non-hydrocarbon, non-condensable fluids such as, but not limited to, $H_2$, $CO_2$, ammonia, $H_2S$, $N_2$ and/or CO. In certain embodiments, non-condensable hydrocarbons of a fluid produced from a portion of a hydrocarbon containing formation may have a weight ratio of hydrocarbons having carbon numbers from 2 through 4 ("$C_{2-4}$ hydrocarbons") to methane of greater than about 0.3, greater than about 0.75, or greater than about 1 in some circumstances. Hydrocarbon resource characteristics may influence the ratio of $C_{2-4}$ hydrocarbons to methane. For example, a ratio of $C_{2-4}$ hydrocarbons to methane for an oil shale or heavy hydrocarbon containing formation may be about 1, while a ratio of $C_{2-4}$ hydrocarbons to methane for a coal formation processed at similar temperature and pressure conditions may be greater than about 0.3. Operating conditions (e.g., temperature and pressure) may be adjusted to influence a ratio of $C_{2-4}$ hydrocarbons to methane. For example, producing hydrocarbons from a relatively hot formation at a relatively high pressure may produce significant amount of methane, which may result in a significantly lower value for the ratio of $C_{2-4}$ hydrocarbons to methane as compared to fluid produced from the same formation at milder temperature and pressure conditions.

An in situ conversion process may be able to produce a high weight ratio of $C_{2-4}$ hydrocarbons to methane as compared to ratios producible using other processes such as fire floods or steam floods. High weight ratios of $C_{2-4}$ hydrocarbons to methane may indicate the presence of significant amounts of hydrocarbons with 2, 3, and/or 4 carbons (e.g., ethane, ethene, propane, propene, butane, and butene). $C_{2-4}$ hydrocarbons may have significant value. The value of $C_3$ and $C_4$ hydrocarbons may be many times (e.g., 2, 3, or greater) than the value of methane. Production of hydrocarbon fluids having high $C_{2-4}$ hydrocarbons to methane weight ratios may be due to conditions applied to the formation during pyrolysis (e.g., controlled heating and/or pressure used in reducing environments or non-oxidizing environments). The conditions may allow for long chain hydrocarbons to be reduced to small (and in many cases more saturated) chain hydrocarbons with only a portion of the long chain hydrocarbons being reduced to methane or carbon dioxide.

Methane and at least a portion of ethane may be separated from non-condensable hydrocarbons in produced fluid. The methane and ethane may be utilized as natural gas. A portion of propane and butane may be separated from non-condensable hydrocarbons of the produced fluid. In addition, the separated propane and butane may be utilized as fuels or as feedstocks for producing other hydrocarbons. Ethane, propane and butane produced from the formation may be used to generate olefins. A portion of the produced fluid having carbon numbers less than 4 may be reformed to produce additional $H_2$ and/or methane. In some in situ conversion process embodiments, the reformation may be performed in the formation. In addition, ethane, propane, and butane may be separated from the non-condensable hydrocarbons.

Formation fluid produced from a formation during a pyrolysis stage of an in situ conversion process may have a $H_2$ content of greater than about 5 weight %, greater than about 10 weight %, or even greater than about 15 weight %. The $H_2$ may be used for a variety of purposes. The purposes may include, but are not limited to, as a fuel for a fuel cell, to hydrogenate hydrocarbon fluids in situ, and/or to hydrogenate hydrocarbon fluids ex situ.

Formation fluid produced from a formation may include some hydrogen sulfide. The hydrogen sulfide may be a non-condensable, non-hydrocarbon component of the formation fluid. The hydrogen sulfide may be separated from other compounds. The separated hydrogen sulfide may be used to produce, for example, sulfuric acid, fertilizer, and/or elemental sulfur.

Formation fluid produced from a formation during in situ conversion may include carbon dioxide. Carbon dioxide produced from the formation may be used for a variety of purposes. The purposes may include, but are not limited to, drive fluid for enhanced oil recovery, drive fluid for coal bed methane production, as a feedstock for production of urea, and/or a component of a synthesis gas fluid generating fluid. In some embodiments, a portion of carbon dioxide produced during an in situ conversion process may be sequestered in a spent portion of the formation being processed.

Formation fluid produced from a formation during in situ conversion may include carbon monoxide. Carbon monoxide produced from the formation may be used, for example, as a feedstock for a fuel cell, as a feedstock for a Fischer-Tropsch process, as a feedstock for production of methanol, and/or as a feedstock for production of methane.

Condensable hydrocarbons of formation fluids produced from a formation may be separated from the formation fluids. Formation fluids may be separated into a non-condensable portion (hydrocarbon and non-hydrocarbon) and a condensable portion (hydrocarbon and non-hydrocarbon). The condensable portion may include condensable hydrocarbons and compounds found in an aqueous phase. The aqueous phase may be separated from the condensable component.

An aqueous phase may include ammonia. The ammonia content of the total produced fluids may be greater than about 0.1 weight % of the fluid, greater than about 0.5 weight % of the fluid, and, in some embodiments, up to about 10 weight % of the produced fluids. The ammonia may be used to produce, for example, urea.

In certain embodiments, a fluid produced from a formation (e.g., a coal formation) may include oxygenated hydrocarbons. For example, condensable hydrocarbons of the produced fluid may include an amount of oxygenated hydrocarbons greater than about 5 weight % of the condensable hydrocarbons. Alternatively, the condensable hydrocarbons may include an amount of oxygenated hydrocarbons greater than about 0.1 weight % of the condensable hydrocarbons. Furthermore, the condensable hydrocarbons may include an amount of oxygenated hydrocarbons greater than about 1.0 weight % of the condensable hydrocarbons or greater than about 2.0 weight % of the condensable hydrocarbons. The oxygenated hydrocarbons may include, but are not limited to, phenol and/or substituted phenols. In some embodiments, phenol and substituted phenols may have more economic value than many other products produced from an in situ conversion process. Therefore, an in situ conversion process may be utilized to produce phenol and/or substituted phenols. For example, generation of phenol and/or substituted phenols may increase when a fluid pressure within the formation is maintained at a lower pressure.

In some in situ conversion process embodiments, condensable hydrocarbons of a fluid produced from a hydrocarbon containing formation may include olefins. For example, an olefin content of the condensable hydrocarbons may be in a range from about 0.1 weight % to about 15 weight %. Alternatively, an olefin content of the condensable hydrocarbons may be within a range from about 0.1 weight % to about 5 weight %. An olefin content of the condensable hydrocarbons may also be within a range from about 0.1 weight % to about 2.5 weight %. An olefin content of the condensable hydrocarbons may be altered and/or controlled by controlling a pressure and/or a temperature within the formation. For example, olefin content of the condensable hydrocarbons may be reduced by selectively increasing pressure within the formation, by selectively decreasing temperature within the formation, by selectively reducing heating rates within the formation, and/or by selectively increasing hydrogen partial pressures in the formation. In some in situ conversion process embodiments, a reduced olefin content of the condensable hydrocarbons may be desired. For example, if a portion of the produced fluids is used to produce motor fuels, a reduced olefin content may be desired.

In some in situ conversion process embodiments, a higher olefin content may be desired. For example, if a portion of the condensable hydrocarbons may be sold, a higher olefin content may be selected due to a high economic value of olefin products. In some embodiments, olefins may be separated from the produced fluids and then sold and/or used as a feedstock for the production of other compounds.

Non-condensable hydrocarbons of a produced fluid may include olefins. An ethene/ethane molar ratio may be used as an estimate of olefin content of non-condensable hydrocarbons. In certain in situ conversion process embodiments, the ethene/ethane molar ratio may range from about 0.001 to about 0.15.

Fluid produced from a hydrocarbon containing formation may include aromatic compounds. For example, the condensable hydrocarbons may include an amount of aromatic compounds greater than about 20 weight % or about 25 weight % of the condensable hydrocarbons. Alternatively, the condensable hydrocarbons may include an amount of aromatic compounds greater than about 30 weight % of the condensable hydrocarbons. The condensable hydrocarbons may also include relatively low amounts of compounds with more than two rings in them (e.g., tri-aromatics or above). For example, the condensable hydrocarbons may include less than about 1 weight % or less than about 2 weight % of tri-aromatics or above in the condensable hydrocarbons. Alternatively, the condensable hydrocarbons may include less than about 5 weight % of tri-aromatics or above in the condensable hydrocarbons.

Fluid produced from a hydrocarbon containing formation may include a small amount of asphaltenes (i.e., large multi-ring aromatics that may be substantially soluble in hydrocarbons) as compared to fluid produced from a formation using other techniques such as fire floods and/or steam floods. Temperature and pressure control within a selected portion may inhibit the production of asphaltenes using an in situ conversion process. Some asphaltenes may be entrained in formation fluid produced from the formation. Asphaltenes may make up less than about 0.3 weight % of the condensable hydrocarbons produced using an in situ conversion process. In some in situ conversion process embodiments, asphaltenes may be less than 0.1 weight %, 0.05 weight %, or 0.01 weight %. In some in situ conversion process embodiments, the in situ conversion process may result in no, or substantially no, asphaltene production, especially if initial production from the formation is inhibited or if initial production is ignored until the formation produces hydrocarbons of a minimum quality.

Condensable hydrocarbons of a produced fluid may include relatively large amounts of cycloalkanes. Linear chain molecules may form ring compounds (e.g., hexane may form cyclohexane) in the formation. In addition, some aromatic compounds may be hydrogenated in the formation to produce cycloalkanes (e.g., benzene may be hydrogenated to form cyclohexane). The condensable hydrocarbons may include a cycloalkane component of from about 0 weight % to about 30 weight %. In some in situ conversion process embodiments, the condensable hydrocarbons may include a cycloalkane component from about 1% to about 20%, or from about 5% to about 20%.

In certain in situ conversion process embodiments, the condensable hydrocarbons of a fluid produced from a formation may include compounds containing nitrogen. For example, less than about 1 weight % (when calculated on an elemental basis) of the condensable hydrocarbons may be nitrogen (e.g., typically the nitrogen may be in nitrogen containing compounds such as pyridines, amines, amides, carbazoles, etc.). The amount of nitrogen containing compounds may depend on the amount of nitrogen in the initial hydrocarbon material present in the formation.

Some of the nitrogen in the initial hydrocarbon material present may be produced as ammonia. Produced ammonia may be separated from hydrocarbons. The ammonia may be separated, along with water, from formation fluid produced from the formation. Formation fluid produced from the formation may include about 0.05 weight % or more of ammonia. Certain formations (e.g., coal and/or oil shale) may produce larger amounts of ammonia (e.g., up to about 10 weight % of the total fluid produced may be ammonia).

In certain in situ conversion process embodiments, the condensable hydrocarbons of a fluid produced from a formation may include compounds containing oxygen. For example, in certain embodiments (e.g., for oil shale and heavy hydrocarbons), less than about 1 weight % (when calculated on an elemental basis) of the condensable hydrocarbons may be oxygen containing compounds (e.g., typically the oxygen may be in oxygen containing compounds such as phenol, substituted phenols, ketones, etc.). In some in situ conversion process embodiments (e.g., for coal formations), between about 1 weight % and about 30 weight % of the condensable hydrocarbons may typically include oxygen containing compounds such as phenols, substituted phenols, ketones, etc. In some instances, certain compounds containing oxygen (e.g., phenols) may be valuable and, as such, may be economically separated from the produced fluid. Other types of formations (e.g., tar sands formations or other mature hydrocarbon containing formations) may contain insignificant or no oxygen containing compounds in the initial hydrocarbon material. Such formations may not produce any or only insignificant amounts of oxygenated compounds. Some of the oxygen in the initial hydrocarbon material may be produced as carbon dioxide.

In some in situ conversion process embodiments, condensable hydrocarbons of the fluid-produced from a formation may include compounds containing sulfur. For example, less than about 1 weight % (when calculated on an elemental basis) of the condensable hydrocarbons may be sulfur containing compounds. Typical sulfur containing compounds may include compounds such as thiophenes, mercaptans, etc. The amount of sulfur containing compounds may depend on the amount of sulfur in the initial hydrocarbon material present in the formation. Some of the sulfur in the initial hydrocarbon material present may be produced as hydrogen sulfide.

In some in situ conversion process embodiments, formation fluid produced from the formation may include molecular hydrogen ($H_2$). Hydrogen may be from about 0.1 volume % to about 80 volume % of a non-condensable component of formation fluid produced from the formation. In some in situ conversion process embodiments, $H_2$ may be about 5 volume % to about 70 volume % of the non-condensable component of formation fluid produced from the formation. The amount of hydrogen in the formation fluid may be strongly dependent on the temperature of the formation. A high formation temperature may result in the production of significant amounts of hydrogen. A high temperature may also result in the formation of a significant amount of coke within the formation.

In some in situ conversion process embodiments, a large portion of the total organic carbon content of a formation may be converted into hydrocarbon fluids. In some embodiments, up to about 20 weight % of the total organic carbon content of hydrocarbons in the portion may be transformed into hydrocarbon fluids. In some in situ conversion process embodiments, the weight percentage of total organic carbon content of hydrocarbons in the portion removed during the in situ process may be significantly increased if synthesis gas is generated within the portion.

A total potential amount of products that may be produced from hydrocarbons may be determined by a Fischer Assay. A Fischer Assay is a standard method that involves heating a sample of hydrocarbons to approximately 500° C. in one hour, collecting products produced from the heated sample, and quantifying the products. In an embodiment, a method for treating a hydrocarbon containing formation in situ may include heating a section of the formation to yield greater than about 60 weight % of the potential amount of products from the hydrocarbons as measured by the Fischer Assay.

In certain embodiments, heating of the selected section of the formation may be controlled to pyrolyze at least about 20 weight % (or in some embodiments about 25 weight %) of the hydrocarbons within the selected section of the formation. Conversion of selected portions of hydrocarbon layers within a formation may be avoided to inhibit subsidence of the formation.

Heating at least a portion of a formation may cause some of the hydrocarbons within the portion to pyrolyze. Pyrolyzation may generate hydrocarbon fragments. The hydrocarbon fragments may be reactive and may react with other compounds in the formation and/or with other hydrocarbon fragments produced by pyrolysis. Reaction of the hydrocarbon fragments with other compounds and/or with each other, however, may reduce production of a selected product. A reducing agent in, or provided to, the portion of the formation during heating may increase production of the selected product. The reducing agent may be, but is not limited to, $H_2$, methane, and/or other non-condensable hydrocarbon fluids.

In an in situ conversion process embodiment, molecular hydrogen may be provided to the formation to create a reducing environment. Hydrogenation reactions between the molecular hydrogen and some of the hydrocarbons within a portion of the formation may generate heat. The heat may heat the portion of the formation. Molecular hydrogen may also be generated within the portion of the formation. The generated $H_2$ may hydrogenate hydrocarbon fluids within a portion of a formation. The hydrogenation may generate heat that transfers to the formation to maintain a desired temperature within the formation.

$H_2$ may be produced from a first portion of a hydrocarbon containing formation. The $H_2$ may be separated from formation fluid produced from the first portion. The $H_2$ from the first portion, along with other reducing or substantially inert fluid (e.g., methane, ethane, and/or nitrogen), may be provided to a second portion of the formation to create a reducing environment within the second portion. The second portion of the formation may be heated by heat sources. Power input into the heat sources may be reduced after introduction of $H_2$ due to heating of the formation by hydrogenation reactions within the formation. $H_2$ may be introduced into the formation continuously or batchwise.

Hydrogen introduced into the second portion of the formation may reduce (e.g., at least partially saturate) some pyrolyzation fluid being produced or present in the second section. Reducing the pyrolyzation fluid may decrease a concentration of olefins in the pyrolyzation fluids. Reducing the pyrolysis products may improve the product quality of the hydrocarbon fluids.

An in situ conversion process may generate significant amounts of $H_2$ and hydrocarbon fluids within the formation. Generation of hydrogen within the formation, and pressure within the formation sufficient to force hydrogen into a liquid phase within the formation, may produce a reducing environment within the formation without the need to introduce a reducing fluid (e.g., $H_2$ and/or non-condensable saturated hydrocarbons) into the formation. A hydrogen component of formation fluid produced from the formation may be separated and used for desired purposes. The desired purposes may include, but are not limited to, fuel for fuel cells, fuel for combustors, and/or a feed stream for surface hydrogenation units.

In an in situ conversion process embodiment, heating the formation may result in an increase in the thermal conductivity of a selected section of the heated portion. For example, porosity and permeability within a selected section of the portion may increase substantially during heating such that heat may be transferred through the formation not only by conduction, but also by convection and/or by radiation from a heat source. Such radiant and convective transfer of heat may increase an apparent thermal conductivity of the selected section and, consequently, the thermal diffusivity. The large apparent thermal diffusivity may make heating at least a portion of a hydrocarbon containing formation from heat sources feasible. For example, a combination of conductive, radiant, and/or convective heating may accelerate heating. Such accelerated heating may significantly decrease a time required for producing hydrocarbons and may significantly increase the economic feasibility of commercialization of the in situ conversion process.

In some in situ conversion process embodiments for treating coal formations, the in situ conversion process may increase the rank level of coal within a heated portion of the coal. The increase in rank level of the coal, as assessed by the vitrinite reflectance, may coincide with a substantial change of the structure (e.g., molecular changes in the carbon structure) of the coal. The changed structure of the coal may have a higher thermal conductivity.

Thermal conductivity and thermal diffusivity within a hydrocarbon containing formation may vary depending on, for example, a density of the hydrocarbon containing formation, a heat capacity of the formation, and a thermal conductivity of the formation. As pyrolysis occurs within a selected section, a portion of hydrocarbon containing mass may be removed from the selected section. The removal of mass may include, but is not limited to, removal of water and a transformation of hydrocarbons to formation fluids. A lower thermal conductivity may be expected as water is removed from a hydrocarbon containing formation. Reduction of thermal conductivity may be a function of depth of hydrocarbons in the formation. Lithostatic pressure may increase with depth. Deep in a formation, lithostatic pressure may close certain types of openings (e.g., cleats and/or fractures) in the formation. The closure of the formation openings may result in a decreased or minimal effect of mass removal from the formation on thermal conductivity and thermal diffusivity.

In some in situ conversion process embodiments, the in situ conversion process may generate molecular hydrogen during the pyrolysis process. In addition, pyrolysis tends to increase the porosity/void spaces in the formation. Void spaces in the formation may contain hydrogen gas generated by the pyrolysis process. Hydrogen gas may have about six times the thermal conductivity of nitrogen or air. The presence of hydrogen in void spaces may raise the thermal conductivity of the formation and decrease the effect of mass removal from the formation on thermal conductivity.

Some in situ conversion process embodiments may be able to economically treat formations that were previously believed to be uneconomical to produce. Recovery of hydrocarbons from previously uneconomically producible formations may be possible because of the surprising increases in thermal conductivity and thermal diffusivity that can be achieved during thermal conversion of hydrocarbons within the formation by conductively and/or radiatively heating a portion of the formation. Surprising results are illustrated by the fact that prior literature indicated that certain hydrocarbon containing formations, such as coal, exhibited relatively low values for thermal conductivity and thermal diffusivity when heated. For example, in government report No. 8364 by J. M. Singer and R. P. Tye entitled "Thermal, Mechanical, and Physical Properties of Selected Bituminous Coals and Cokes," U.S. Department of the Interior, Bureau of Mines (1979), the authors report the thermal conductivity and thermal diffusivity for four bituminous coals. This government report includes graphs of thermal conductivity and diffusivity that show relatively low values up to about 400° C. (e.g., thermal conductivity is about 0.2 W/(m ° C.) or below, and thermal diffusivity is below about $1.7\times10^{-3}$ $cm^2/s$). This government report states: "coals and cokes are excellent thermal insulators."

In certain in situ conversion process embodiments, hydrocarbon containing resources (e.g., coal) may be treated such that the thermal conductivity and thermal diffusivity are significantly higher (e.g., thermal conductivity at or above about 0.5 W/(m ° C.) and thermal diffusivity at or above $4.1\times10^{-3}$ $cm^2/s$) than would be expected based on previous literature, such as government report No. 8364. If a coal formation is subjected to an in situ conversion process, the coal does not act as "an excellent thermal insulator." Instead, heat can and does transfer and/or diffuse into the formation at significantly higher (and better) rates than would be expected according to the literature, thereby significantly enhancing economic viability of treating the formation.

In an in situ conversion process embodiment, heating a portion of a hydrocarbon containing formation in situ to a temperature less than an upper pyrolysis temperature may increase permeability of the heated portion. Permeability may increase due to formation of thermal fractures within the heated portion. Thermal fractures may be generated by thermal expansion of the formation and/or by localized increases in pressure due to vaporization of liquids (e.g., water and/or hydrocarbons) in the formation. As a temperature of the heated portion increases, water in the formation may be vaporized. The vaporized water may escape and/or be removed from the formation. Removal of water may also increase the permeability of the heated portion. In addition, permeability of the heated portion may also increase as a result of mass loss from the formation due to generation of pyrolysis fluids in the formation. Pyrolysis fluid may be removed from the formation through production wells.

Heating the formation from heat sources placed in the formation may allow a permeability of the heated portion of a hydrocarbon containing formation to be substantially uniform. A substantially uniform permeability may inhibit channeling of formation fluids in the formation and allow production from substantially all portions of the heated formation. An assessed (e.g., calculated or estimated) permeability of any selected portion in the formation having a substantially uniform permeability may not vary by more than a factor of 10 from an assessed average permeability of the selected portion.

Permeability of a selected section within the heated portion of the hydrocarbon containing formation may rapidly increase when the selected section is heated by conduction. A permeability of an impermeable hydrocarbon containing formation may be less than about 0.1 millidarcy ($9.9\times10^{-17}$ $m^2$) before treatment. In some embodiments, pyrolyzing at least a portion of a hydrocarbon containing formation may increase a permeability within a selected section of the portion to greater than about 10 millidarcy, 100 millidarcy, 1 darcy, 10 darcy, 20 darcy, or 50 darcy. A permeability of a selected section of the portion may increase by a factor of more than about 100, 1,000, 10,000, 100,000 or more.

In some in situ conversion process embodiments, superposition (e.g., overlapping influence) of heat from one or more heat sources may result in substantially uniform heating of a portion of a hydrocarbon containing formation. Since formations during heating will typically have a temperature gradient that is highest near heat sources and reduces with increasing distance from the heat sources, "substantially uniform" heating means heating such that temperature in a majority of the section does not vary by more than 100° C. from an assessed average temperature in the majority of the selected section (volume) being treated.

Removal of hydrocarbons from the formation during an in situ conversion process may occur on a microscopic scale, as well as a macroscopic scale (e.g., through production wells). Hydrocarbons may be removed from micropores within a portion of the formation due to heating. Micropores may be generally defined as pores having a cross-sectional dimension of less than about 1000 Å. Removal of solid hydrocarbons may result in a substantially uniform increase in porosity within at least a selected section of the heated portion. Heating the portion of a hydrocarbon containing formation may substantially uniformly increase a porosity of a selected section within the heated portion. "Substantially uniform porosity" means that the assessed (e.g., calculated or estimated)

porosity of any selected portion in the formation does not vary by more than about 25% from the assessed average porosity of such selected portion.

Physical characteristics of a portion of a hydrocarbon containing formation after pyrolysis may be similar to those of a porous bed. The physical characteristics of a formation subjected to an in situ conversion process may significantly differ from physical characteristics of a hydrocarbon containing formation subjected to injection of gases that burn hydrocarbons to heat the hydrocarbons and or to formations subjected to steam flood production. Gases injected into virgin or fractured formations may channel through the formation. The gases may not be uniformly distributed throughout the formation. In contrast, a gas injected into a portion of a hydrocarbon containing formation subjected to an in situ conversion process may readily and substantially uniformly contact the carbon and/or hydrocarbons remaining in the formation. Gases produced by heating the hydrocarbons may be transferred a significant distance within the heated portion of the formation with minimal pressure loss.

Transfer of gases in a formation over significant distances may be particularly advantageous to reduce the number of production wells needed to produce formation fluid from the formation. A first portion of a hydrocarbon containing formation may be subjected to an in situ conversion process. The volume of the formation subjected to in situ conversion may be expanded by heating abutting portions of the hydrocarbon containing formation. Formation fluid produced in the abutting portions of the formation may be produced from production wells in the first portion. If needed, a few additional production wells may be installed in the abutting portions of formation, but such production wells may have large separation distances. The ability to transfer fluid in a formation over long distances may be advantageous for treating a steeply dipping hydrocarbon containing formation. Production wells may be placed in an upper portion of the dipping hydrocarbon production. Heat sources may be inserted into the steeply dipping formation. The heat sources may follow the dip of the formation. The upper portion may be subjected to thermal treatment by activating portions of the heat sources in the upper portion. Abutting portions of the steeply dipping formation may be subjected to thermal treatment after treatment in the upper portion increases the permeability of the formation so that fluids in lower portions may be produced from the upper portions.

Synthesis gas may be produced from a portion of a hydrocarbon containing formation. Synthesis gas may be produced from coal, oil shale, other kerogen containing formations, heavy hydrocarbons (tar sands, etc.), and other bitumen containing formations. The hydrocarbon containing formation may be heated prior to synthesis gas generation to produce a substantially uniform, relatively high permeability formation. In an in situ conversion process embodiment, synthesis gas production may be commenced after production of pyrolysis fluids has been exhausted or becomes uneconomical. Alternately, synthesis gas generation may be commenced before substantial exhaustion or uneconomical pyrolysis fluid production has been achieved if production of synthesis gas will be more economically favorable. Formation temperatures will usually be higher than pyrolysis temperatures during synthesis gas generation. Raising the formation temperature from pyrolysis temperatures to synthesis gas generation temperatures allows further utilization of heat applied to the formation to pyrolyze the formation. While raising a temperature of a formation from pyrolysis temperatures to synthesis gas temperatures, methane and/or $H_2$ may be produced from the formation.

Producing synthesis gas from a formation from which pyrolyzation fluids have been previously removed allows a synthesis gas to be produced that includes mostly $H_2$, CO, water, and/or $CO_2$. Produced synthesis gas, in certain embodiments, may have substantially no hydrocarbon component unless a separate source hydrocarbon stream is introduced into the formation with or in addition to the synthesis gas producing fluid. Producing synthesis gas from a substantially uniform, relatively high permeability formation that was formed by slowly heating a formation through pyrolysis temperatures may allow for easy introduction of a synthesis gas generating fluid into the formation, and may allow the synthesis gas generating fluid to contact a relatively large portion of the formation. The synthesis gas generating fluid can do so because the permeability of the formation has been increased during pyrolysis and/or because the surface area per volume in the formation has increased during pyrolysis. The relatively large surface area (e.g., "contact area") in the post-pyrolysis formation tends to allow synthesis gas generating reactions to be substantially at equilibrium conditions for C, $H_2$, CO, water, and $CO_2$. Reactions in which methane is formed may, however, not be at equilibrium because they are kinetically limited. The relatively high, substantially uniform formation permeability may allow production wells to be spaced farther apart than production wells used during pyrolysis of the formation.

A temperature of at least a portion of a formation that is used to generate synthesis gas may be raised to a synthesis gas generating temperature (e.g., between about 400° C. and about 1200° C.). In some embodiments, composition of produced synthesis gas may be affected by formation temperature, by the temperature of the formation adjacent to synthesis gas production wells, and/or by residence time of the synthesis gas components. A relatively low synthesis gas generation temperature may produce a synthesis gas having a high $H_2$ to CO ratio, but the produced synthesis gas may also include a large portion of other gases such as water, $CO_2$, and methane. A relatively high formation temperature may produce a synthesis gas having a $H_2$ to CO ratio that approaches 1, and the stream may include mostly and, in some cases, only $H_2$ and CO. If the synthesis gas generating fluid is substantially pure steam, then the $H_2$ to CO ratio may approach 1 at relatively high temperatures. At a formation temperature of about 700° C., the formation may produce a synthesis gas with a $H_2$ to CO ratio of about 2 at a certain pressure. The composition of the synthesis gas tends to depend on the nature of the synthesis gas generating fluid.

Synthesis gas generation is generally an endothermic process. Heat may be added to a portion of a formation during synthesis gas production to keep formation temperature at a desired synthesis gas generating temperature or above a minimum synthesis gas generating temperature. Heat may be added to the formation from heat sources, from oxidation reactions within the portion, and/or from introducing synthesis gas generating fluid into the formation at a higher temperature than the temperature of the formation.

An oxidant may be introduced into a portion of the formation with synthesis gas generating fluid. The oxidant may exothermically react with carbon within the portion of the formation to heat the formation. Oxidation of carbon within a formation may allow a portion of a formation to be economically heated to relatively high synthesis gas generating temperatures. The oxidant may be introduced into the formation without synthesis gas generating fluid to heat the portion. Using an oxidant, or an oxidant and heat sources, to heat the portion of the formation may be significantly more favorable than heating the portion of the formation with only the heat sources. The oxidant may be, but is not limited to, air, oxygen, or oxygen enriched air. The oxidant may react with carbon in the formation to produce $CO_2$ and/or CO. The use of air, or oxygen enriched air (i.e., air with an oxygen content greater than 21 volume %), to generate heat within the formation may cause a significant portion of $N_2$ to be present in produced synthesis gas. Temperatures in the formation may be maintained below temperatures needed to generate oxides of nitrogen ($NO_x$), so that little or no $NO_x$ compounds may be present in produced synthesis gas.

A mixture of steam and oxygen, steam and enriched air, or steam and air, may be continuously injected into a formation. If injection of steam and oxygen or steam and enriched air is used for synthesis gas production, the oxygen may be produced on site (or near to the site) by electrolysis of water utilizing direct current output of a fuel cell. $H_2$ produced by the electrolysis of water may be used as a fuel stream for the fuel cell. $O_2$ produced by the electrolysis of water may also be injected into the hot formation to raise a temperature of the formation.

Heat sources and/or production wells within a formation for pyrolyzing and producing pyrolysis fluids from the formation may be utilized for different purposes during synthesis gas production. A well that was used as a heat source or a production well during pyrolysis may be used as an injection well to introduce synthesis gas producing fluid into the formation. A well that was used as a heat source or a production well during pyrolysis may be used as a production well during synthesis gas generation. A well that was used as a heat source or a production well during pyrolysis may be used as a heat source to heat the formation during synthesis gas generation. Some production wells used during a pyrolysis phase may be shut in. Synthesis gas production wells may be spaced further apart than pyrolysis production wells because of the relatively high, substantially uniform permeability of the formation. Some production wells used during a pyrolysis phase may be shut in or converted to other uses. Synthesis gas production wells may be heated to relatively high temperatures so that a portion of the formation adjacent to the production well is at a temperature that will produce a desired synthesis gas composition. Comparatively, pyrolysis fluid production wells may not be heated at all, or may only be heated to a temperature that will inhibit condensation of pyrolysis fluid within the production well.

Synthesis gas may be produced from a dipping formation from wells used during pyrolysis of the formation. As shown in FIG. 9, production wells 512 used for synthesis gas production may be located above and down dip from heater well 520. In some embodiments, heater well 520 may be used as an injection well. Hot synthesis gas producing fluid may be introduced into heater well 520. Hot synthesis gas fluid that moves down dip may generate synthesis gas that is produced through production wells 512. Synthesis gas generating fluid that moves up dip may generate synthesis gas in a portion of the formation that is at synthesis gas generating temperatures. A portion of the synthesis gas generating fluid and generated synthesis gas that moves up dip above the portion of the formation at synthesis gas generating temperatures may heat adjacent portions of the formation. The synthesis gas generating fluid that moves up dip may condense, heat adjacent portions of formation, and flow downwards towards or into a portion of the formation at synthesis gas generating temperature. The synthesis gas generating fluid may then generate additional synthesis gas.

Synthesis gas generating fluid may be any fluid capable of generating $H_2$ and CO within a heated portion of a formation. Synthesis gas generating fluid may include water, $O_2$, air, $CO_2$, hydrocarbon fluids, or combinations thereof. Water may be introduced into a formation as a liquid or as steam. Water may react with carbon in a formation to produce $H_2$, CO, and $CO_2$. $CO_2$ may react with hot carbon to form CO. Air and $O_2$ may be oxidants that react with carbon in a formation to generate heat and form $CO_2$, CO, and other compounds. Hydrocarbon fluids may react within a formation to form $H_2$, CO, $CO_2$, $H_2O$, coke, methane, and/or other light hydrocarbons. Introducing low carbon number hydrocarbons (i.e., compounds with carbon numbers less than 5) may produce additional $H_2$ within the formation. Adding higher carbon number hydrocarbons to the formation may increase an energy content of generated synthesis gas by having a significant methane and other low carbon number compounds fraction within the synthesis gas.

Water provided as a synthesis gas generating fluid may be derived from numerous different sources. Water may be produced during a pyrolysis stage of treating a formation. The water may include some entrained hydrocarbon fluids. Such fluid may be used as synthesis gas generating fluid. Water that includes hydrocarbons may advantageously generate additional $H_2$ when used as a synthesis gas generating fluid. Water produced from water pumps that inhibit water flow into a portion of formation being subjected to an in situ conversion process may provide water for synthesis gas generation. A low rank kerogen resource or hydrocarbons having a relatively high water content (i.e., greater than about 20 weight % $H_2O$) may generate a large amount of water and/or $CO_2$ if subjected to an in situ conversion process. The water and $CO_2$ produced by subjecting a low rank kerogen resource to an in situ conversion process may be used as a synthesis gas generating fluid.

Reactions involved in the formation of synthesis gas may include, but are not limited to:

$$C+H_2O \Leftrightarrow H_2+CO \quad (54)$$

$$C+2H_2O \Leftrightarrow 2H_2+CO_2 \quad (55)$$

$$C+CO_2 \Leftrightarrow 2CO \quad (56)$$

Thermodynamics also allows the following reactions to proceed:

$$2C+2H_2O \Leftrightarrow CH_4+CO_2 \quad (57)$$

$$C+2H_2 \Leftrightarrow CH_4 \quad (58)$$

However, kinetics of the reactions are slow in certain embodiments, so that relatively low amounts of methane are formed at formation conditions from Reactions 57 and 58.

In the presence of oxygen, the following reaction may take place to generate carbon dioxide and heat:

$$C+O_2 \rightarrow CO_2 \quad (59)$$

Equilibrium gas phase compositions of coal in contact with steam may provide an indication of the compositions of components produced in a formation during synthesis gas generation. Equilibrium composition data for $H_2$, carbon monoxide, and carbon dioxide may be used to determine appropriate operating conditions (e.g., temperature) that may be used to produce a synthesis gas having a selected composition. Equilibrium conditions may be approached within a formation due to a high, substantially uniform permeability of the formation. Composition data obtained from synthesis gas production may in many in situ conversion process embodiments, deviate by less than 10% from equilibrium values.

In one synthesis gas production embodiment, a composition of the produced synthesis gas can be changed by injecting additional components into the formation along with steam. Carbon dioxide may be provided in the synthesis gas generating fluid to inhibit production of carbon dioxide from the formation during synthesis gas generation. The carbon dioxide may shift the equilibrium of Reaction 55 to the left, thus reducing the amount of carbon dioxide generated from formation carbon. The carbon dioxide may also shift the equilibrium of Reaction 56 to the right to generate carbon monoxide. Carbon dioxide may be separated from the synthesis gas and may be re-injected into the formation with the synthesis gas generating fluid. Addition of carbon dioxide in the synthesis gas generating fluid may, however, reduce the production of hydrogen.

Figure 117:
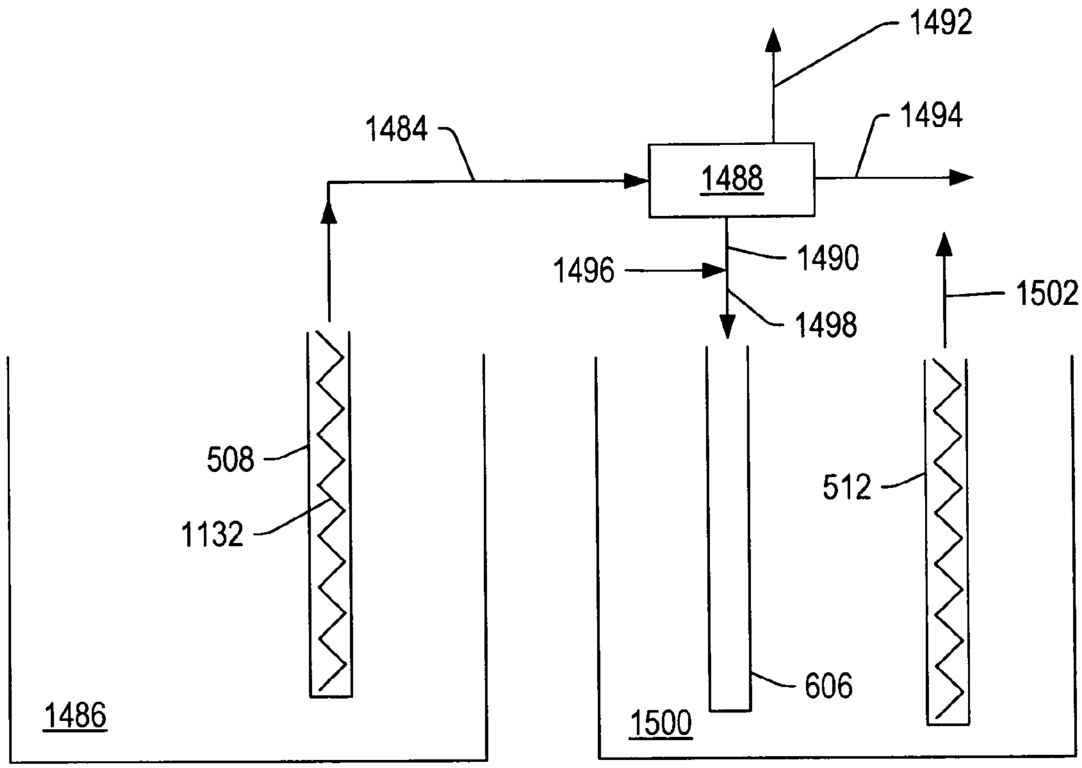
FIG. 117 depicts an embodiment of using pyrolysis water to generate synthesis gas in a formation.

FIG. 117 depicts a schematic diagram of use of water recovered from pyrolysis fluid production to generate synthesis gas. Heat source 508 with electric heater 1132 produces pyrolysis fluid 1484 from first section 1486 of the formation. Produced pyrolysis fluid 1484 may be sent to separator 1488. Separator 1488 may include a number of individual separation units and processing units that produce aqueous stream 1490, vapor stream 1492, and hydrocarbon condensate stream 1494. Aqueous stream 1490 from separator 1488 may be combined with synthesis gas generating fluid 1496 to form synthesis gas generating fluid 1498. Synthesis gas generating fluid 1498 may be provided to injection well 606 and introduced to second portion 1500 of the formation. Synthesis gas 1502 may be produced from production well 512.

Figure 118:
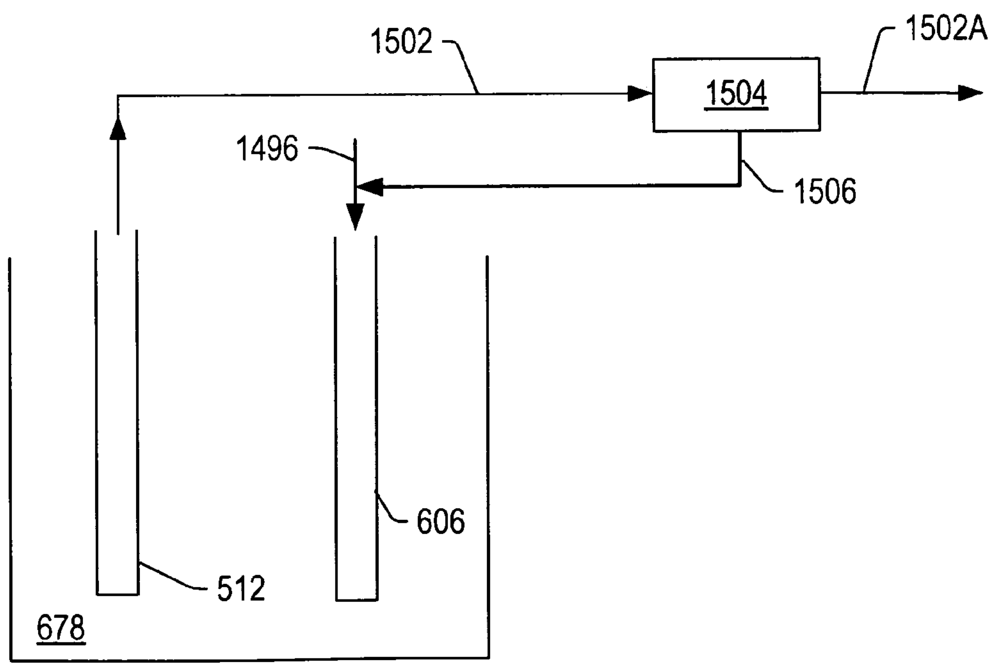

FIG. 118 depicts a schematic diagram of an embodiment of a system for synthesis gas production. Synthesis gas 1502 may be produced from formation 678 through production well 512. Gas separation unit 1504 may separate a portion of carbon dioxide from synthesis gas 1502 to produce $CO_2$ stream 1506 and remaining synthesis gas stream 1502A. $CO_2$ stream 1506 may be mixed with synthesis gas generating fluid 1496 that is introduced into formation 678 through injection well 606. In some synthesis gas process embodiments, $CO_2$ may be introduced into the formation separate from synthesis gas producing fluid. Introducing $CO_2$ may inhibit conversion of carbon within the formation to $CO_2$ and/or may increase an amount of CO generated within the formation.

Synthesis gas generating fluid may be introduced into a formation in a variety of different ways. Steam may be injected into a heated hydrocarbon containing formation at a lowermost portion of the heated formation. Alternatively, in a steeply dipping formation, steam may be injected up dip with synthesis gas production down dip. The injected steam may pass through the remaining hydrocarbon containing formation to a production well. In addition, endothermic heat of reaction may be provided to the formation with heat sources disposed along a path of the injected steam. In some embodiments, steam may be injected at a plurality of locations along the hydrocarbon containing formation to increase penetration of the steam throughout the formation. A line drive pattern of locations may also be utilized. The line drive pattern may include alternating rows of steam injection wells and synthesis gas production wells.

Synthesis gas reactions may be slow at relatively low pressures and at temperatures below about 400° C. At relatively low pressures, and temperatures between about 400° C. and about 700° C., Reaction 55 may predominate so that synthesis gas composition is primarily hydrogen and carbon dioxide. At relatively low pressures and temperatures greater than about 700° C., Reaction 54 may predominate so that synthesis gas composition is primarily hydrogen and carbon monoxide.

Advantages of a lower temperature synthesis gas reaction may include lower heat requirements, cheaper metallurgy, and less endothermic reactions (especially when methane formation takes place). An advantage of a higher temperature synthesis gas reaction is that hydrogen and carbon monoxide may be used as feedstock for other processes (e.g., Fischer-Tropsch processes).

A pressure of the hydrocarbon containing formation may be maintained at relatively high pressures during synthesis gas production. The pressure may range from atmospheric pressure to a pressure that approaches a lithostatic pressure of the formation. Higher formation pressures may allow generation of electricity by passing produced synthesis gas through a turbine. Higher formation pressures may allow for smaller collection conduits to transport produced synthesis gas and reduced downstream compression requirements on the surface.

In some synthesis gas process embodiments, synthesis gas may be produced from a portion of a formation in a substantially continuous manner. The portion may be heated to a desired synthesis gas generating temperature. A synthesis gas generating fluid may be introduced into the portion. Heat may be added to, or generated within, the portion of the formation during introduction of the synthesis gas generating fluid to the portion. The added heat may compensate for the loss of heat due to the endothermic synthesis gas reactions as well as heat losses to a top layer (overburden), bottom layer (underburden), and unreactive material in the portion.

Figure 119:
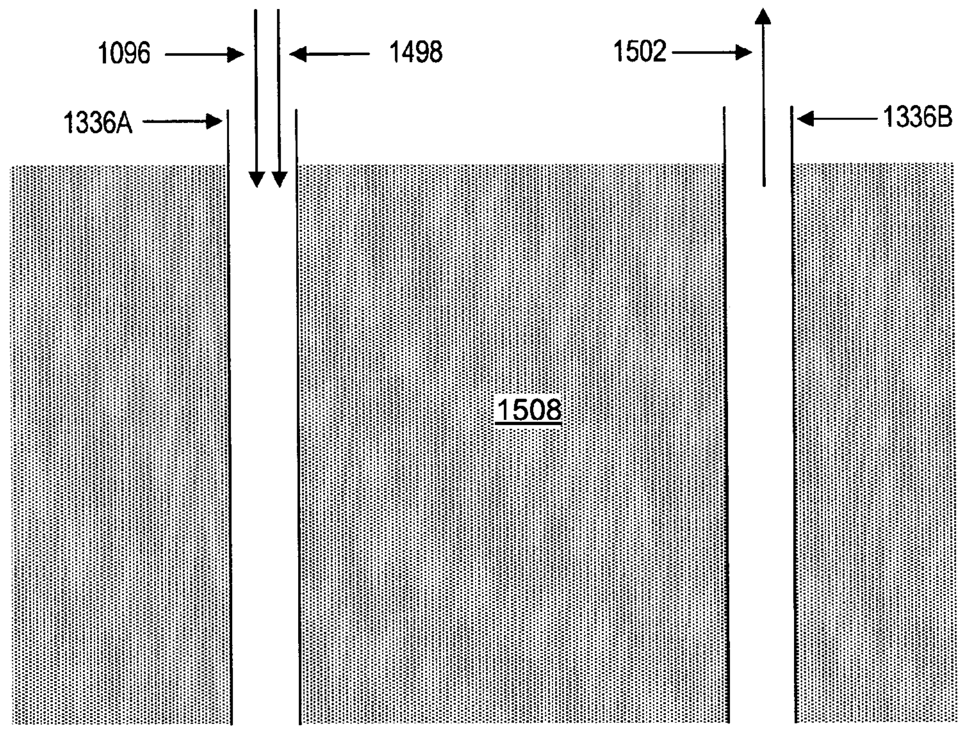

FIG. 119 illustrates a schematic representation of an embodiment of a continuous synthesis gas production system. FIG. 119 includes a formation with heat injection wellbore 1336A and heat injection wellbore 1336B. The wellbores may be members of a larger pattern of wellbores placed throughout a portion of the formation. The portion of the formation may be heated to synthesis gas generating temperatures by heating the formation with heat sources, by injecting an oxidizing fluid, or by a combination thereof. Oxidizing fluid 1096 (e.g., air, enriched air, or oxygen) and synthesis gas generating fluid 1498 (e.g., water, or steam) may be injected into wellbore 1336A. In a synthesis gas process embodiment that uses oxygen and steam, the ratio of oxygen to steam may range from approximately 1:2 to approximately 1:10, or approximately 1:3 to approximately 1:7 (e.g., about 1:4).

In situ combustion of hydrocarbons may heat region 1508 of the formation between wellbores 1336A and 1336B. Injection of the oxidizing fluid may heat region 1508 to a particular temperature range, for example, between about 600° C. and about 700° C. The temperature may vary, however, depending on a desired composition of the synthesis gas. An advantage of the continuous production method may be that a temperature gradient established across region 1508 may be substantially uniform and substantially constant with time once the formation approaches thermal equilibrium. Continuous production may also eliminate a need for use of valves to reverse injection directions on a frequent basis. Further, continuous production may reduce temperatures near the injection wells due to endothermic cooling from the synthesis gas reaction that occur in the same region as oxidative heating. The substantially constant temperature gradient may allow for control of synthesis gas composition. Produced synthesis gas 1502 may exit continuously from wellbore 1336B.

In a synthesis gas process embodiment, oxygen may be used instead of air as oxidizing fluid 1096 in continuous production. If air is used, nitrogen may need to be separated from the produced synthesis gas. The use of oxygen as oxidizing fluid 1096 may increase a cost of production due to the cost of obtaining substantially pure oxygen. The cryogenic nitrogen by-product obtained from an air separation plant used to produce the required oxygen may, however, be used in a heat exchange unit to condense hydrocarbons from a hot vapor stream produced during pyrolysis of hydrocarbons. The pure nitrogen may also be used for ammonia production.

In some synthesis gas process embodiments, synthesis gas may be produced in a batch manner from a portion of the formation. The portion of the formation may be heated, or heat may be generated within the portion, to raise a temperature of the portion to a high synthesis gas generating temperature. Synthesis gas generating fluid may then be added to the portion until generation of synthesis gas reduces the temperature of the formation below a temperature that produces a desired synthesis gas composition. Introduction of the synthesis gas generating fluid may then be stopped. The cycle may be repeated by reheating the portion of the formation to the high synthesis gas generating temperature and adding synthesis gas generating fluid after obtaining the high synthesis gas generating temperature. Composition of generated synthesis gas may be monitored to determine when addition of synthesis gas generating fluid to the formation should be stopped.

Figure 120:
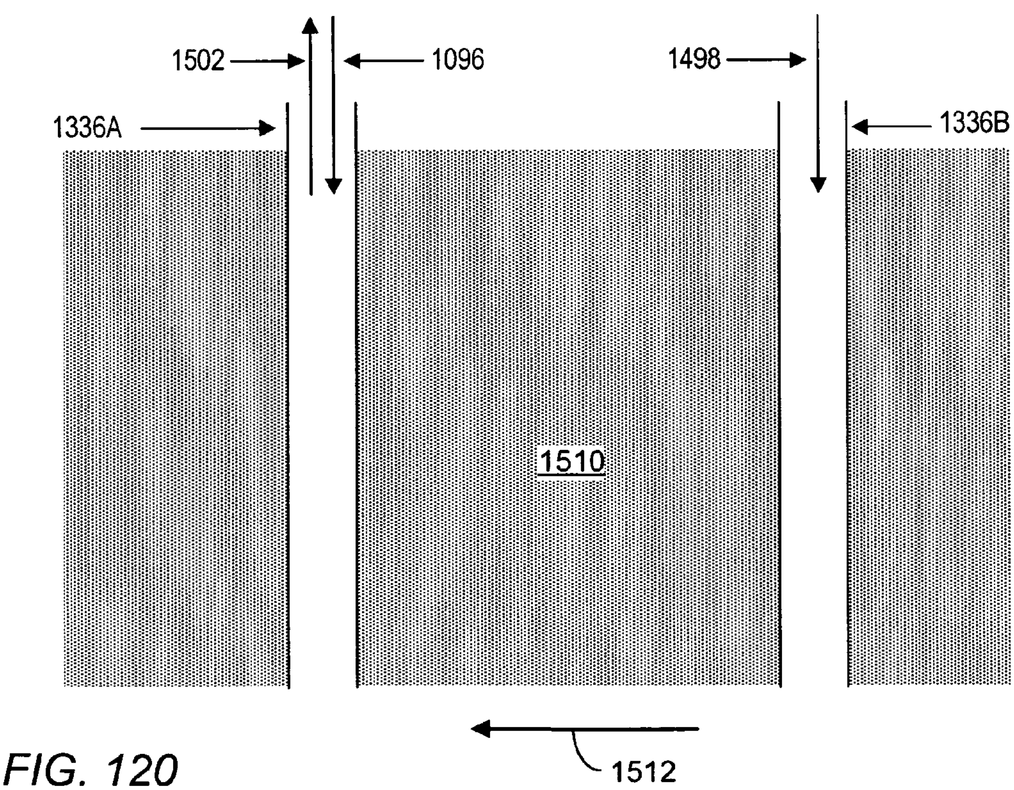

FIG. 120 illustrates a schematic representation of an embodiment of a batch production of synthesis gas in a hydrocarbon containing formation. Wellbore 1336A and wellbore 1336B may be located within a portion of the formation. The wellbores may be members of a larger pattern of wellbores throughout the portion of the formation. Oxidizing fluid 1096, such as air or oxygen, may be injected into wellbore 1336A. Oxidation of hydrocarbons may heat region 1510 of a formation between wellbores 1336A and 1336B. Injection of air or oxygen may continue until an average temperature of region 1510 is at a desired temperature (e.g., between about 900° C. and about 1000° C.). Higher or lower temperatures may also be developed. A temperature gradient may be formed in region 1510 between wellbore 1336A and wellbore 1336B. The highest temperature of the gradient may be located proximate injection wellbore 1336A.

When a desired temperature has been reached, or when oxidizing fluid has been injected for a desired period of time, oxidizing fluid injection may be lessened and/or ceased. Synthesis gas generating fluid 1498, such as steam or water, may be injected into injection wellbore 1336B to produce synthesis gas. A back pressure of the injected steam or water in the injection wellbore may force the synthesis gas produced and un-reacted steam across region 1510. A decrease in average temperature of region 1510 caused by the endothermic synthesis gas reaction may be partially offset by the temperature gradient in region 1510 in a direction indicated by arrow 1512. Synthesis gas 1502 may be produced through heat source wellbore 1336A. If the composition of the product deviates from a desired composition, then steam injection may cease, and air or oxygen injection may be reinitiated.

Synthesis gas of a selected composition may be produced by blending synthesis gas produced from different portions of the formation. A first portion of a formation may be heated by one or more heat sources to a first temperature sufficient to allow generation of synthesis gas having a $H_2$ to carbon monoxide ratio of less than the selected $H_2$ to carbon monoxide ratio (e.g., about 1:1 or 2:1). A first synthesis gas generating fluid may be provided to the first portion to generate a first synthesis gas. The first synthesis gas may be produced from the formation. A second portion of the formation may be heated by one or more heat sources to a second temperature sufficient to allow generation of synthesis gas having a $H_2$ to carbon monoxide ratio of greater than the selected $H_2$ to carbon monoxide ratio (e.g., a ratio of 3:1 or more). A second synthesis gas generating fluid may be provided to the second portion to generate a second synthesis gas. The second synthesis gas may be produced from the formation. The first synthesis gas may be blended with the second synthesis gas to produce a blend synthesis gas having a desired $H_2$ to carbon monoxide ratio.

The first temperature may be different than the second temperature. Alternatively, the first and second temperatures may be approximately the same temperature. For example, a temperature sufficient to allow generation of synthesis gas having different compositions may vary depending on compositions of the first and second portions and/or prior pyrolysis of hydrocarbons within the first and second portions. The first synthesis gas generating fluid may have substantially the same composition as the second synthesis gas generating fluid. Alternatively, the first synthesis gas generating fluid may have a different composition than the second synthesis gas generating fluid. Appropriate first and second synthesis gas generating fluids may vary depending upon, for example, temperatures of the first and second portions, compositions of the first and second portions, and prior pyrolysis of hydrocarbons within the first and second portions.

In addition, synthesis gas having a selected ratio of $H_2$ to carbon monoxide may be obtained by controlling the temperature of the formation. In one embodiment, the temperature of an entire portion or section of the formation may be controlled to yield synthesis gas with a selected ratio. Alternatively, the temperature in or proximate a synthesis gas production well may be controlled to yield synthesis gas with the selected ratio. Controlling temperature near a production well may be sufficient because synthesis gas reactions may be fast enough to allow reactants and products to approach equilibrium concentrations.

In a synthesis gas process, synthesis gas having a selected ratio of $H_2$ to carbon monoxide may be obtained by treating produced synthesis gas at the surface. First, the temperature of the formation may be controlled to yield synthesis gas with a ratio different than a selected ratio. For example, the formation may be maintained at a relatively high temperature to generate a synthesis gas with a relatively low $H_2$ to carbon monoxide ratio (e.g., the ratio may approach 1 under certain conditions). Some or all of the produced synthesis gas may then be provided to a shift reactor (shift process) at the surface. Carbon monoxide reacts with water in the shift process to produce $H_2$ and carbon dioxide. Therefore, the shift process increases the $H_2$ to carbon monoxide ratio. The carbon dioxide may then be separated to obtain a synthesis gas having a selected $H_2$ to carbon monoxide ratio.

Figure 121:
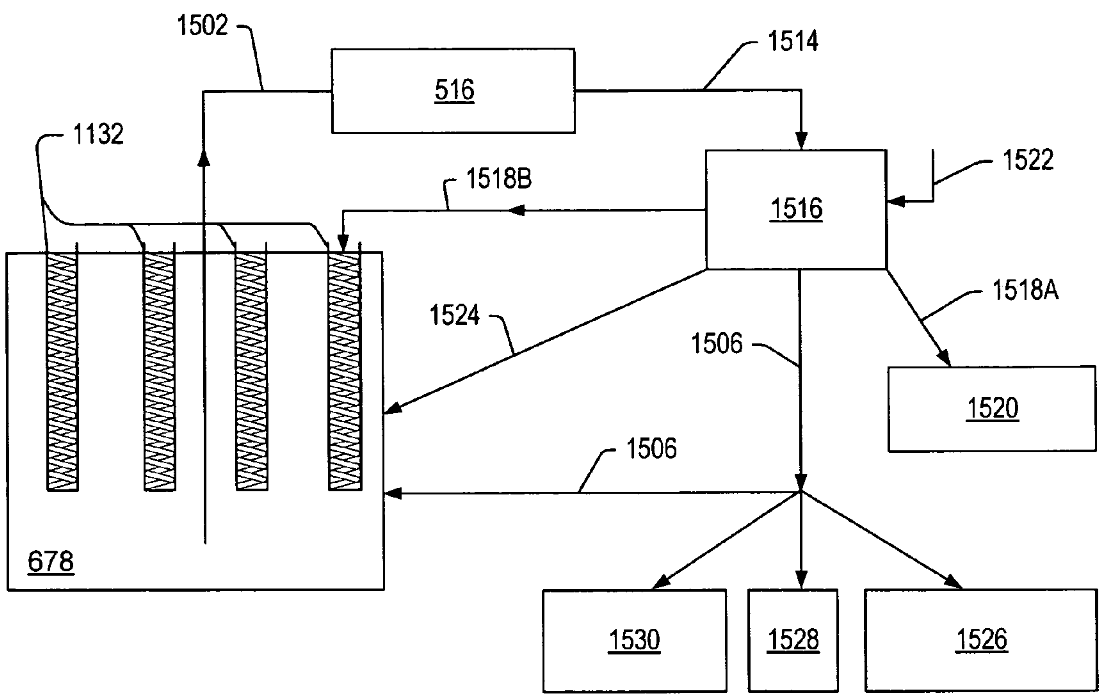

Produced synthesis gas 1502 may be used for production of energy. In FIG. 121, treated gases 1514 may be routed from treatment facility 516 to energy generation unit 1516 for extraction of useful energy. In some embodiments, energy may be extracted from the combustible gases in the synthesis gas by oxidizing the gases to produce heat and converting a portion of the heat into mechanical and/or electrical energy. Alternatively, energy generation unit 1516 may include a fuel cell that produces electrical energy. In addition, energy generation unit 1516 may include, for example, a molten carbonate fuel cell or another type of fuel cell, a turbine, a boiler firebox, or a downhole gas heater. Produced electrical energy 1518A may be supplied to power grid 1520. A portion of produced electricity 1518B may be used to supply energy to electric heaters 1132 that heat formation 678.

In one embodiment, energy generation unit 1516 may be a boiler firebox. A firebox may include a small refractory-lined chamber, built wholly or partly in the wall of a kiln, for combustion of fuel. Air or oxygen 1522 may be supplied to energy generation unit 1516 to oxidize the produced synthesis gas. Water 1524 produced by oxidation of the synthesis gas may be recycled to the formation to produce additional synthesis gas.

A portion of synthesis gas produced from a formation may, in some embodiments, be used for fuel in downhole gas heaters. Downhole gas heaters (e.g., flameless combustors, downhole combustors, etc.) may be used to provide heat to a hydrocarbon containing formation. In some embodiments, downhole gas heaters may heat portions of a formation substantially by conduction of heat through the formation. Providing heat from gas heaters may be primarily self-reliant and may reduce or eliminate a need for electric heaters. Because downhole gas heaters may have thermal efficiencies approaching 90%, the amount of carbon dioxide released to the environment by downhole gas heaters may be less than the amount of carbon dioxide released to the environment from a process using fossil-fuel generated electricity to heat the hydrocarbon containing formation.

Carbon dioxide may be produced during pyrolysis and/or during synthesis gas generation. Carbon dioxide may also be produced by energy generation processes and/or combustion processes. Net release of carbon dioxide to the atmosphere from an in situ conversion process for hydrocarbons may be reduced by utilizing the produced carbon dioxide and/or by storing carbon dioxide within the formation or within another formation. For example, a portion of carbon dioxide produced from the formation may be utilized as a flooding agent or as a feedstock for producing chemicals.

In an in situ conversion process embodiment, an energy generation process may produce a reduced amount of emissions by sequestering carbon dioxide produced during extraction of useful energy. For example, emissions from an energy generation process may be reduced by storing carbon dioxide within a hydrocarbon containing formation. In an in situ conversion process embodiment, the amount of stored carbon dioxide may be approximately equivalent to that in an exit stream from the formation.

FIG. 121 illustrates a reduced emission energy process. Carbon dioxide stream 1506 produced by energy generation unit 1516 may be separated from fluids exiting the energy generation unit. Carbon dioxide may be separated from $H_2$ at high temperatures by using a hot palladium film supported on porous stainless steel or a ceramic substrate, or by using high temperature and pressure swing adsorption. A portion or all of carbon dioxide stream 1506 may be sequestered in spent hydrocarbon containing formation 1526, injected into oil producing fields 1528 for enhanced oil recovery by improving mobility and production of oil in such fields, sequestered into a deep hydrocarbon containing formation 1530 containing methane by adsorption and subsequent desorption of methane, or re-injected into a section of the formation through a synthesis gas production well to enhance production of carbon monoxide. Carbon dioxide leaving the energy generation unit may be sequestered in a dewatered coal bed methane reservoir. The water for synthesis gas generation may come from dewatering a coal bed methane reservoir. Additional methane may be produced by alternating carbon dioxide and nitrogen. An example of a method for sequestering carbon dioxide is illustrated in U.S. Pat. No. 5,566,756 to Chaback et al., which is incorporated by reference as if fully set forth herein. Additional energy may be utilized by removing heat from the carbon dioxide stream leaving the energy generation unit.

In an in situ conversion process embodiment, a hot spent formation may be cooled before being used to sequester carbon dioxide. A larger quantity of carbon dioxide may be adsorbed in a coal formation if the coal formation is at ambient or near ambient temperature. In addition, cooling a formation may strengthen the formation. The spent formation may be cooled by introducing water into the formation. The steam produced may be removed from the formation through production wells. The generated steam may be used for any desired process. For example, the steam may be provided to an adjacent portion of a formation to heat the adjacent portion or to generate synthesis gas.

In an in situ conversion process embodiment, a spent hydrocarbon containing formation may be mined. In some embodiments, a coal formation may be mined after region 2 heating (depicted in FIG. 1) without undergoing a synthesis gas generation phase. In some embodiments, a coal formation may be mined after undergoing synthesis gas generation during region 3 heating. The mined material may be used for metallurgical purposes such as a fuel for generating high temperatures during production of steel. Pyrolysis of a coal formation may increase a rank of the coal. After pyrolysis, the coal may be transformed to a coal having characteristics of anthracite. A spent hydrocarbon containing formation may have a thickness of 30 m or more. In comparison, anthracite coal seams that are typically mined for metallurgical uses are typically about one meter or less in thickness.

Figure 122:
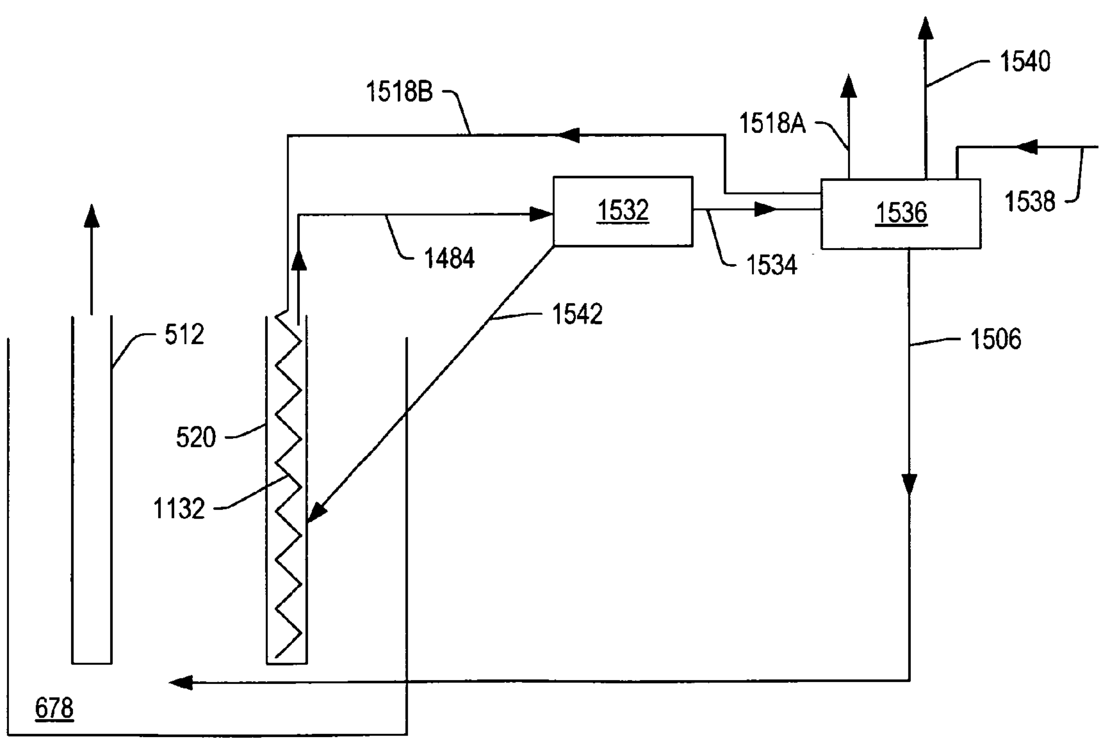

FIG. 122 illustrates an in situ conversion process embodiment in which fluid produced from pyrolysis may be separated into a fuel cell feed stream and fed into a fuel cell to produce electricity. The embodiment may include hydrocarbon containing formation 678 with production well 512 that produces pyrolysis fluid. Heater well 520 with electric heater 1132 may be a heat source that heats, or contributes to heating, the formation. Heater well 520 may also be a production well used to produce pyrolysis fluid 1484. Pyrolysis fluid from heater well 520 may include $H_2$ and hydrocarbons with carbon numbers less than 5. Larger chain hydrocarbons may be reduced to hydrocarbons with carbon numbers less than 5 due to the heat adjacent to heater well 520. Pyrolysis fluid 1484 produced from heater well 520 may be fed to gas membrane separation system 1532 to separate $H_2$ and hydrocarbons with carbon numbers less than 5. Fuel cell feed stream 1534, which may be substantially composed of $H_2$, may be fed into fuel cell 1536. Air feed stream 1538 may be fed into fuel cell 1536. Nitrogen stream 1540 may be vented from fuel cell 1536. Electricity 1518A produced from the fuel cell may be routed to a power grid. Electricity 1518B may be used to power electric heaters 1132 in heater wells 520. Carbon dioxide stream 1506 produced in fuel cell 1536 may be injected into formation 678.

Hydrocarbons having carbon numbers of 4, 3, and 1 typically have fairly high market values. Separation and selling of these hydrocarbons may be desirable. Ethane (carbon number 2) may not be sufficiently valuable to separate and sell in some markets. Ethane may be sent as part of a fuel stream to a fuel cell or ethane may be used as a hydrocarbon fluid component of a synthesis gas generating fluid. Ethane may also be used as a feedstock to produce ethene. In some markets, there may be no market for any hydrocarbons having carbon numbers less than 5. In such a situation, all of the hydrocarbon gases produced during pyrolysis may be sent to fuel cells, used as fuels, and/or be used as hydrocarbon fluid components of a synthesis gas generating fluid.

Stream 1542, which may be substantially composed of hydrocarbons with carbon numbers less than 5, may be injected into formation 678 that is hot. When the hydrocarbons contact the formation, hydrocarbons may crack within the formation to produce methane, $H_2$, coke, and olefins such as ethene and propylene. In one embodiment, the production of olefins may be increased by heating the temperature of the formation to the upper end of the pyrolysis temperature range and by injecting hydrocarbon fluid at a relatively high rate. Residence time of the hydrocarbons in the formation may be reduced and dehydrogenated hydrocarbons may form olefins rather than cracking to form $H_2$ and coke. Olefin production may also be increased by reducing formation pressure.

In some in situ conversion process embodiments, a hot formation that was subjected to pyrolysis and/or synthesis gas generation may be used to produce olefins. A hot formation may be significantly less efficient at producing olefins than a reactor designed to produce olefins. However, a hot formation may have a several orders of magnitude more surface area and volume than a reactor designed to produce olefins. The reduction in efficiency of a hot formation may be more than offset by the increased size of the hot formation. A feed stream for olefin production in a hot formation may be produced adjacent to the hot formation from a portion of a formation undergoing pyrolysis. The availability of a feed stream may also offset efficiency of a hot formation for producing olefins as compared to generating olefins in a reactor designed to produce olefins.

In some in situ conversion process embodiments, $H_2$ and/or non-condensable hydrocarbons may be used as a fuel, or as a fuel component, for surface burners or combustors. The combustors may be heat sources used to heat a hydrocarbon containing formation. In some heat source embodiments, the combustors may be flameless distributed combustors. In some heat source embodiments, the combustors may be natural distributed combustors and the fuel may be provided to the natural distributed combustor to supplement the fuel available from hydrocarbon material in the formation.

Heater well 520 may heat a portion of a formation to a synthesis gas generating temperature range. Pyrolysis fluid 1542, or a portion of the pyrolysis fluid, may be injected into formation 678. In some process embodiments, pyrolysis fluid 1542 introduced into formation 678 may include no, or substantially no, hydrocarbons having carbon numbers greater than about 4. In other process embodiments, pyrolysis fluid 1542 introduced into formation 678 may include a significant portion of hydrocarbons having carbon numbers greater than 4. In some process embodiments, pyrolysis fluid 1542 introduced into formation 678 may include no, or substantially no, hydrocarbons having carbon numbers less than 5. When hydrocarbons in pyrolysis fluid 1542 are introduced into formation 678, the hydrocarbons may crack within the formation to produce methane, $H_2$, and coke.

Figure 123:
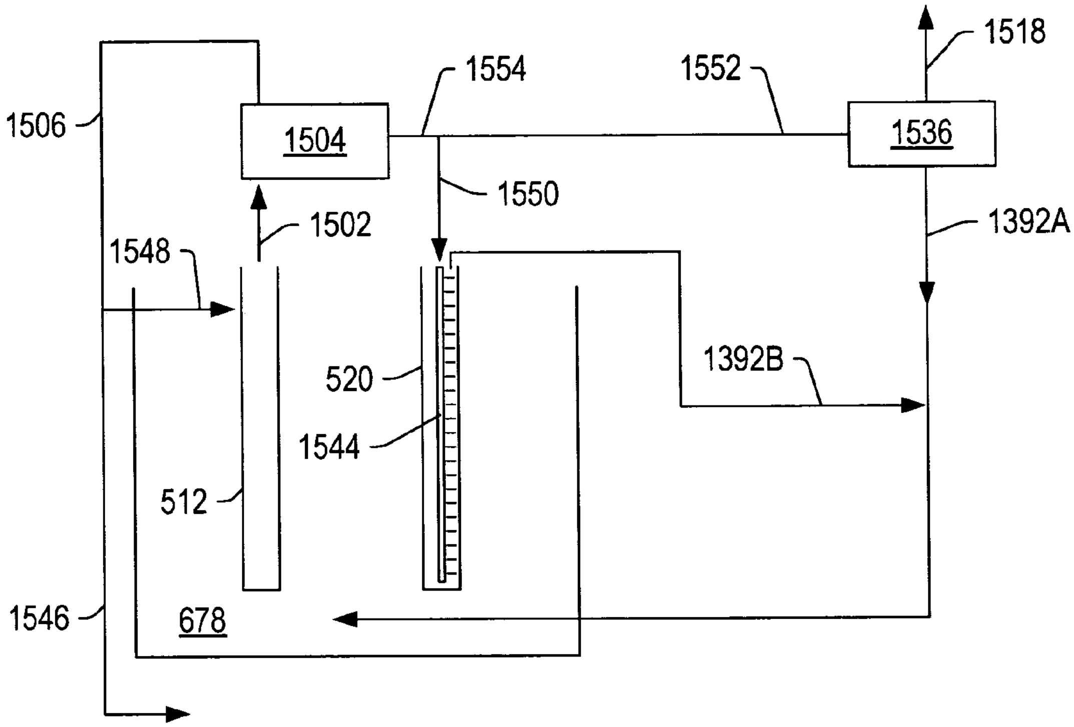

FIG. 123 depicts an embodiment of a synthesis gas generating process from hydrocarbon containing formation 678 with flameless distributed combustor 1544. Synthesis gas 1502 produced from production well 512 may be fed into gas separation unit 1504. Gas separation unit 1504 may generate carbon dioxide stream 1506 from other components of synthesis gas 1502. First portion 1546 of carbon dioxide may be routed to a formation for sequestration. Second portion 1548 of carbon dioxide may be injected into the formation with synthesis gas generating fluid. Portion 1550 of stream 1554 from gas separation unit 1504 may be introduced into heater well 520 as a portion of fuel for combustion in flameless distributed combustor 1544. Flameless distributed combustor 1544 may provide heat to the formation. Portion 1552 of stream 1554 may be fed to fuel cell 1536 for the production of electricity. Electricity 1518 may be routed to a power grid. Steam 1392A produced in the fuel cell and steam 1392B produced from combustion in the distributed burner may be introduced into the formation as a portion of a synthesis gas generation fluid.

Figure 124:
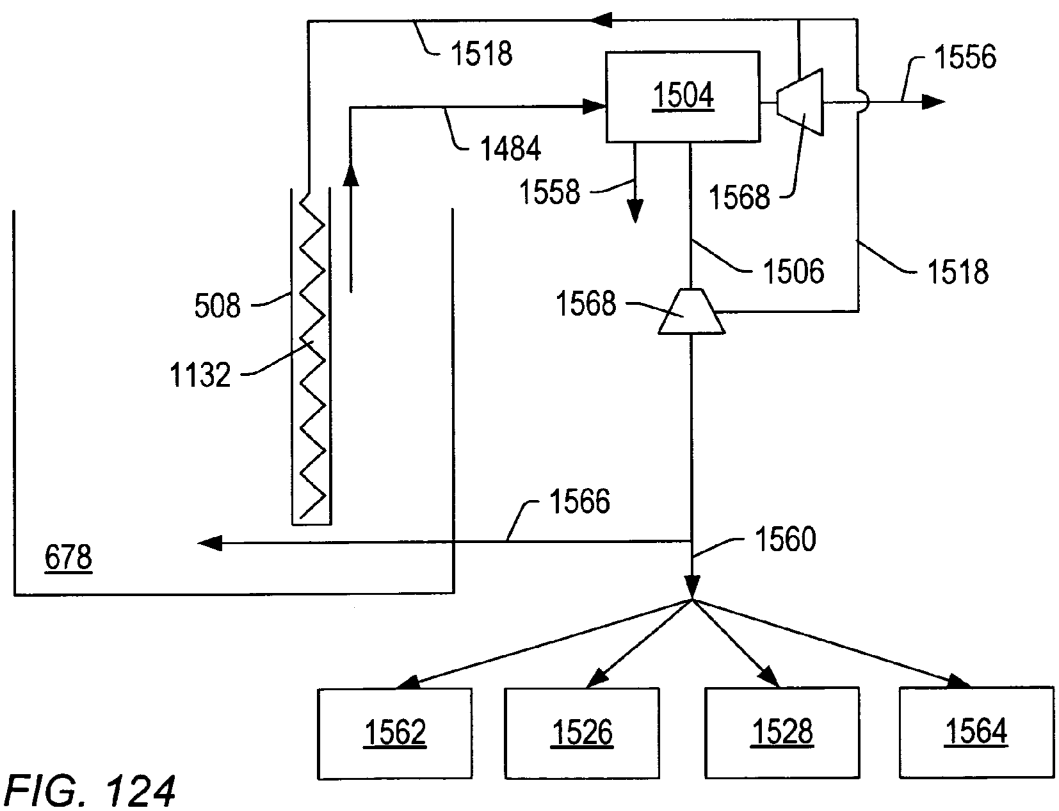

In an in situ conversion process embodiment, carbon dioxide generated with pyrolysis fluids may be sequestered in a hydrocarbon containing formation. FIG. 124 illustrates in situ pyrolysis in hydrocarbon containing formation 678. Heat source 508 with electric heater 1132 may be placed in formation 678. Pyrolysis fluids 1484 may be produced from formation 678 and fed into gas separation unit 1504. Gas separation unit 1504 may separate pyrolysis fluid 1484 into carbon dioxide stream 1506, vapor component 1556, and liquid component 1558. Portion 1560 of carbon dioxide stream 1506 may be stored in formation 1562. Formation 1562 may be a coal bed with entrained methane. The carbon dioxide may displace some of the methane and allow for production of methane. The carbon dioxide may be sequestered in spent hydrocarbon containing formation 1526, injected into oil producing fields 1528 for enhanced oil recovery, or sequestered into coal bed 1564. In some embodiments, portion 1566 of carbon dioxide stream 1506 may be re-injected into a section of formation 678 through a synthesis gas production well to promote production of carbon monoxide.

Vapor component 1556 and/or carbon dioxide stream 1506 may pass through turbine 1568 or turbines to generate electricity. A portion of electricity 1518 generated by the vapor component and/or carbon dioxide may be used to power electric heaters 1132 placed within formation 678. Initial power and/or make-up power may be provided to electric heaters from a power grid.

Figure 125:
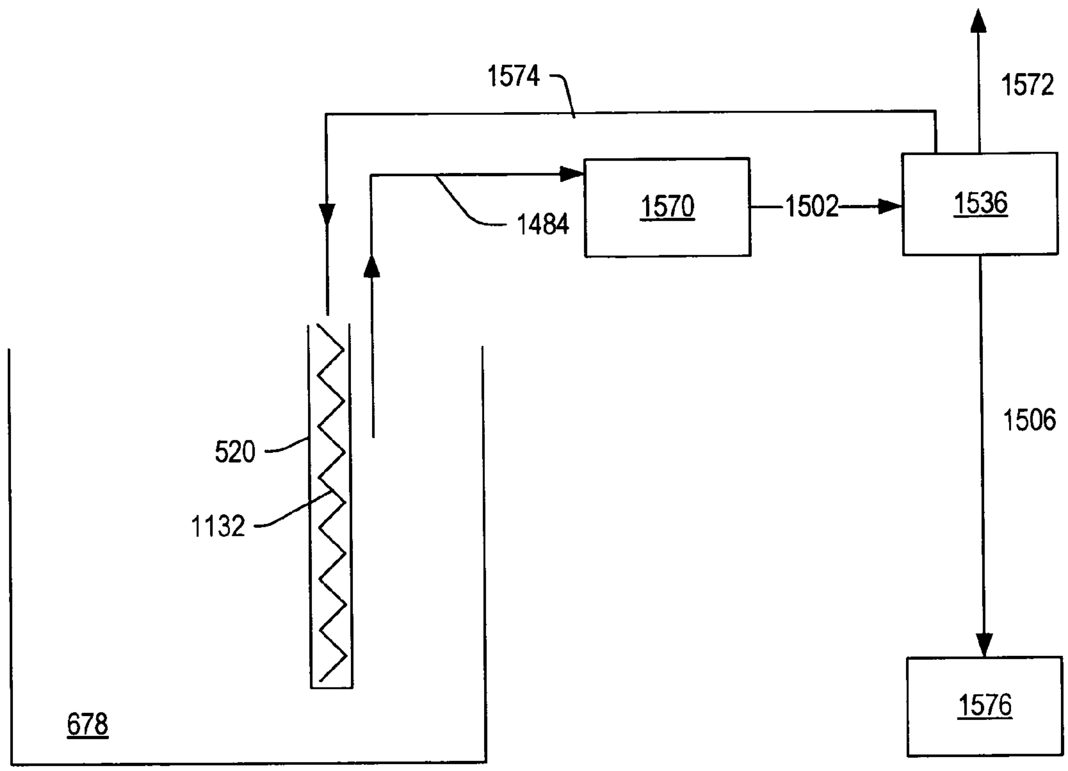

As depicted in FIG. 125, heater well 520 may be located within hydrocarbon containing formation 678. Additional heater wells may also be located within formation 678. Heater well 520 may include electric heater 1132 or another type of heat source. Pyrolysis fluid 1484 produced from the formation may be fed to reformer 1570 to produce synthesis gas 1502. In some process embodiments, reformer 1570 is a steam reformer. Synthesis gas 1502 may be sent to fuel cell 1536. A portion of pyrolysis fluid 1484 and/or produced synthesis gas 1502 may be used as fuel to heat reformer 1570. Reformer 1570 may include a catalyst material that promotes the reforming reaction and a burner to supply heat for the endothermic reforming reaction. A steam source may be connected to reformer 1570 to provide steam for the reforming reaction. The burner may operate at temperatures well above that required by the reforming reaction and well above the operating temperatures of fuel cells. As such, it may be desirable to operate the burner as a separate unit independent of fuel cell 1536.

In some process embodiments, reformer 1570 may be a tube reformer. Reformer 1570 may include multiple tubes made of refractory metal alloys. Each tube may include a packed granular or pelletized material having a reforming catalyst as a surface coating. A diameter of the tubes may vary from between about 9 cm and about 16 cm. A heated length of each tube may normally be between about 6 m and about 12 m. A combustion zone may be provided external to the tubes, and may be formed in the burner. A surface temperature of the tubes may be maintained by the burner at a temperature of about 900° C. to ensure that the hydrocarbon fluid flowing inside the tube is properly catalyzed with steam at a temperature between about 500° C. and about 700° C. A traditional tube reformer may rely upon conduction and convection heat transfer within the tube to distribute heat for reforming.

Pyrolysis fluids 1484 from formation 678 may be pre-processed prior to being fed to reformer 1570. Reformer 1570 may transform pyrolysis fluids 1484 into simpler reactants prior to introduction to a fuel cell. For example, pyrolysis fluids 1484 may be pre-processed in a desulfurization unit. Subsequent to pre-processing, pyrolysis fluids 1484 may be provided to a reformer and a shift reactor to produce a suitable fuel stock for a $H_2$ fueled fuel cell.

Synthesis gas 1502 produced by reformer 1570 may include a number of components including carbon dioxide, carbon monoxide, methane, and/or hydrogen. Produced synthesis gas 1502 may be fed to fuel cell 1536. Portion 1572 of electricity produced by fuel cell 1536 may be sent to a power grid. In addition, portion 1574 of electricity may be used to power electric heater 1132. Carbon dioxide stream 1506 exiting the fuel cell may be routed to sequestration area 1576. The sequestration area may be a spent portion of formation 678.

In a process embodiment, pyrolysis fluid produced from a formation may be fed to the reformer. The reformer may produce a carbon dioxide stream and a $H_2$ stream. For example, the reformer may include a flameless distributed combustor for a core, and a membrane. The membrane may allow only $H_2$ to pass through the membrane resulting in separation of the $H_2$ and carbon dioxide. The carbon dioxide may be routed to a sequestration area.

Synthesis gas produced from a formation may be converted to heavier condensable hydrocarbons. For example, a Fischer-Tropsch hydrocarbon synthesis process may be used for conversion of synthesis gas. A Fischer-Tropsch process may include converting synthesis gas to hydrocarbons. The process may use elevated temperatures, normal or elevated pressures, and a catalyst, such as magnetic iron oxide or a cobalt catalyst. Products produced from a Fischer-Tropsch process may include hydrocarbons having a broad molecular weight distribution and may include branched and/or unbranched paraffins. Products from a Fischer-Tropsch process may also include considerable quantities of olefins and oxygen containing organic compounds. An example of a Fischer-Tropsch reaction may be illustrated by Reaction 60:

$$(n+2)CO+(2n+5)H_2 \leftrightarrow CH_3(—CH_2—)_nCH_3+(n+2)H_2O \quad (60)$$

A hydrogen to carbon monoxide ratio for synthesis gas used as a feed gas for a Fischer-Tropsch reaction may be about 2:1. In certain embodiments, the ratio may range from approximately 1.8:1 to 2.2:1. Higher or lower ratios may be accommodated by certain Fischer-Tropsch systems.

Figure 126:
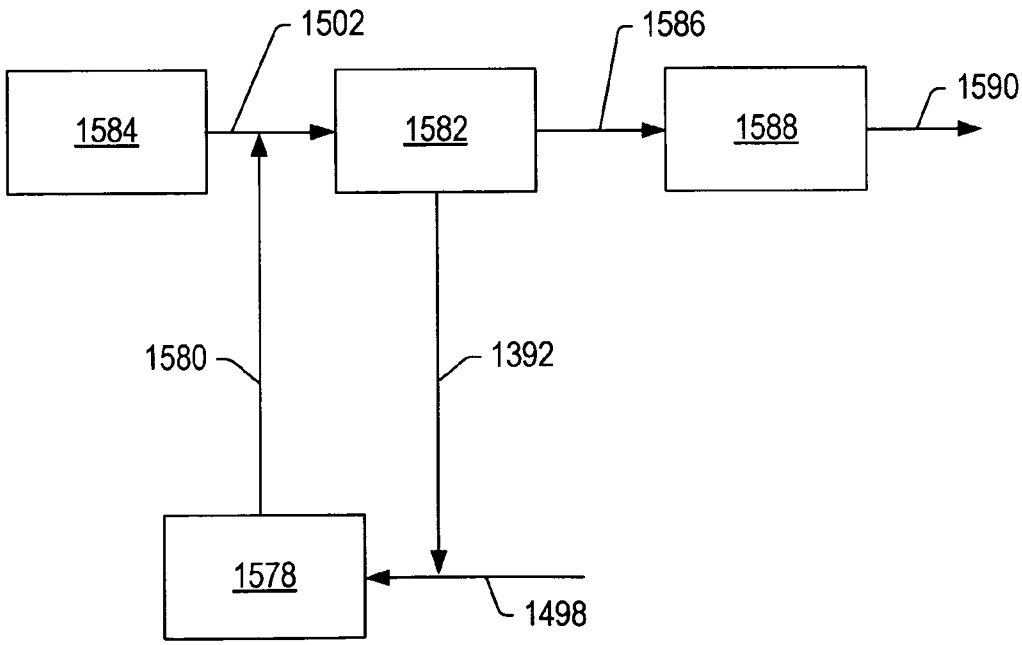

FIG. 126 illustrates a flowchart of a Fischer-Tropsch process that uses synthesis gas produced from a hydrocarbon containing formation as a feed stream. Hot formation 1578 may be used to produce synthesis gas having a $H_2$ to CO ratio of approximately 2:1. The proper ratio may be produced by operating synthesis production wells at approximately 700° C., or by blending synthesis gas produced from different sections of formation to obtain a synthesis gas having approximately a 2:1 $H_2$ to CO ratio. Synthesis gas generating fluid 1498 may be fed into hot formation 1578 to generate synthesis gas. $H_2$ and CO may be separated from the synthesis gas produced from the hot formation 1578 to form feed stream 1580. Feed stream 1580 may be sent to Fischer-Tropsch plant 1582. Feed stream 1580 may supplement or replace synthesis gas 1502 produced from catalytic methane reformer 1584.

Fischer-Tropsch plant 1582 may produce wax feed stream 1586. The Fischer-Tropsch synthesis process that produces wax feed stream 1586 is an exothermic process. Steam 1392 may be generated during the Fischer-Tropsch process. Steam 1392 may be used as a portion of synthesis gas generating fluid 1498.

Wax feed stream 1586 produced from Fischer-Tropsch plant 1582 may be sent to hydrocracker 1588. Hydrocracker 1588 may produce product stream 1590. The product stream may include diesel, jet fuel, and/or naphtha products. Examples of methods for conversion of synthesis gas to hydrocarbons in a Fischer-Tropsch process are illustrated in U.S. Pat. Nos. 4,096,163 to Chang et al., 6,085,512 to Agee et al., and 6,172,124 to Wolflick et al., which are incorporated by reference as if fully set forth herein.

Figure 127:
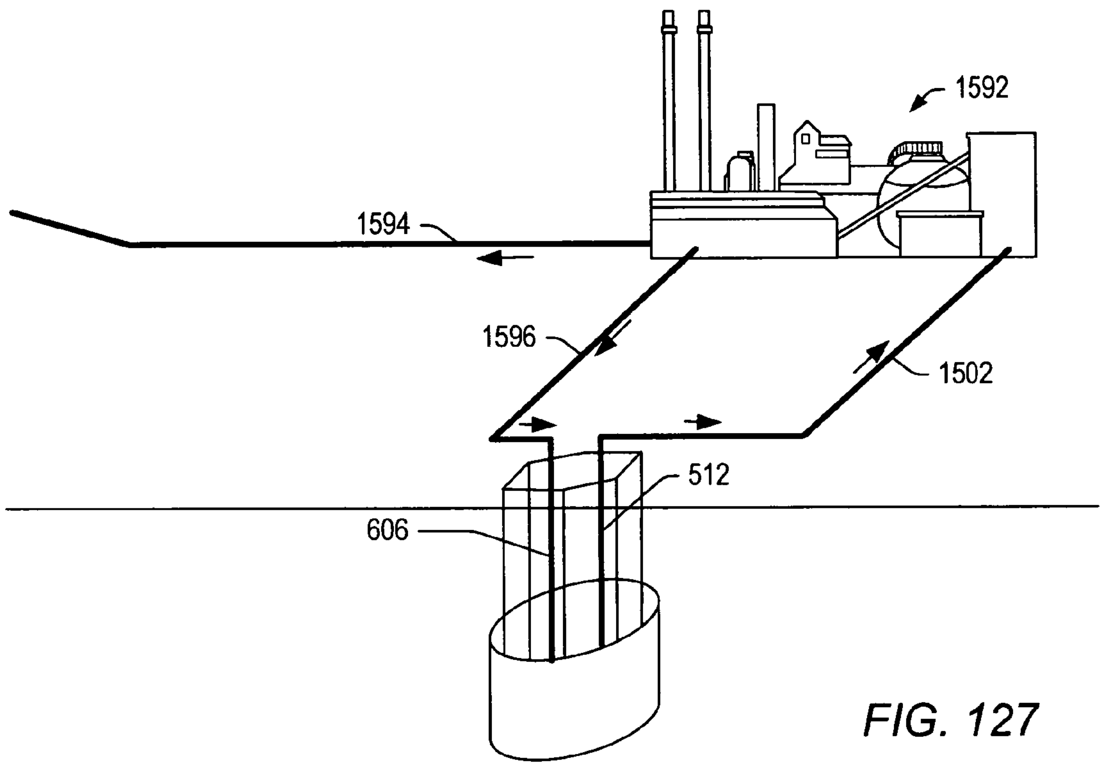

FIG. 127 depicts an embodiment of in situ synthesis gas production integrated with a Shell Middle Distillates Synthesis (SMDS) Fischer-Tropsch and wax cracking process. An example of a SMDS process is illustrated in U.S. Pat. No. 4,594,468 to Minderhoud, and is incorporated by reference as if fully set forth herein. A middle distillates hydrocarbon mixture may be produced from produced synthesis gas using the SMDS process as illustrated in FIG. 127. Synthesis gas 1502, having a $H_2$ to carbon monoxide ratio of about 2:1, may exit production well 512. The synthesis gas may be fed into SMDS plant 1592. In certain embodiments, the ratio may range from approximately 1.8:1 to 2.2:1. Products of the SMDS plant include organic liquid product 1594 and steam 1596. Steam 1596 may be supplied to injection wells 606. Steam 1596 may be used as a feed for synthesis gas production. Hydrocarbon vapors may in some circumstances be added to the steam.

Figure 128:
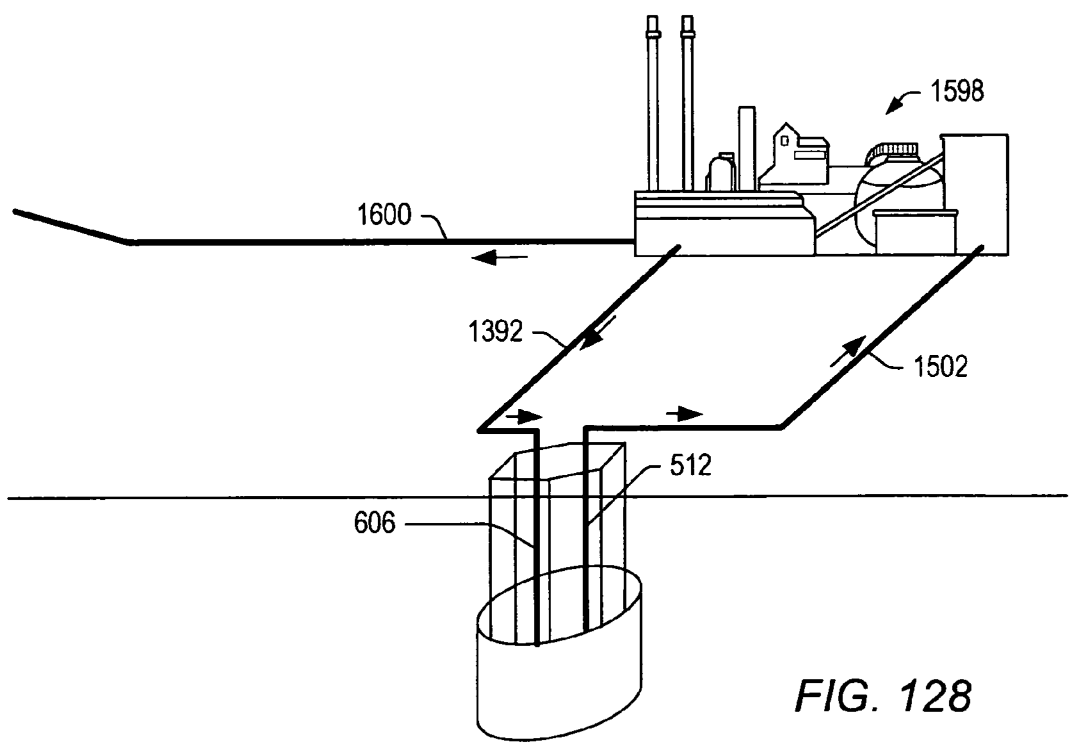

FIG. 128 depicts an embodiment of in situ synthesis gas production integrated with a catalytic methanation process. Synthesis gas 1502 exiting production well 512 may be supplied to catalytic methanation plant 1598. Synthesis gas supplied to catalytic methanation plant 1598 may have a $H_2$ to carbon monoxide ratio of about 3:1. Methane 1600 may be produced by catalytic methanation plant 1598. Steam 1392 produced by plant 1598 may be supplied to injection well 606 for production of synthesis gas. Examples of a catalytic methanation process are illustrated in U.S. Pat. Nos. 3,922,148 to Child; 4,130,575 to Jorn et al.; and 4,133,825 to Stroud et al., which are incorporated by reference as if fully set forth herein.

Synthesis gas produced from a formation may be used as a feed for a process for producing methanol. Examples of processes for production of methanol are described in U.S. Pat. Nos. 4,407,973 to van Dijk et al., 4,927,857 to McShea, III et al., and 4,994,093 to Wetzel et al., each of which is incorporated by reference as if fully set forth herein. The produced synthesis gas may also be used as a feed gas for a process that converts synthesis gas to engine fuel (e.g., gasoline or diesel). Examples of processes for producing engine fuels are described in U.S. Pat. Nos. 4,076,761 to Chang et al., 4,138,442 to Chang et al., and 4,605,680 to Beuther et al., each of which is incorporated by reference as if fully set forth herein.

Figure 129:
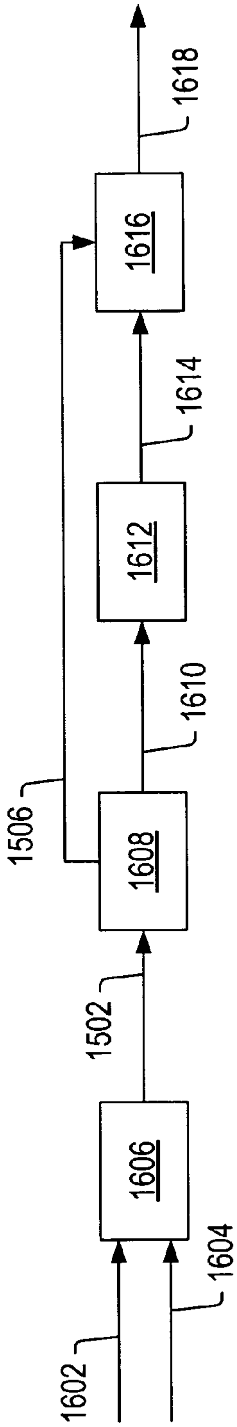

In a process embodiment, produced synthesis gas may be used as a feed gas for production of ammonia and urea. FIGS. 129 and 130 depict embodiments of making ammonia and urea from synthesis gas. Ammonia may be synthesized by the Haber-Bosch process, which involves synthesis directly from $N_2$ and $H_2$ according to Reaction 61:

$$N_2+3H_2 \leftrightarrow 2NH_3. \quad (61)$$

The $N_2$ and $H_2$ may be combined, compressed to high pressure (e.g., from about 80 bars to about 220 bars), and then heated to a relatively high temperature. The reaction mixture may be passed over a catalyst composed substantially of iron to produce ammonia. During ammonia synthesis, the reactants (i.e., $N_2$ and $H_2$) and the product (i.e., ammonia) may be in equilibrium. The total amount of ammonia produced may be increased by shifting the equilibrium towards product formation. Equilibrium may be shifted to product formation by removing ammonia from the reaction mixture as ammonia is produced.

Removal of the ammonia may be accomplished by cooling the gas mixture to a temperature between about −5° C. to about 25° C. In this temperature range, a two-phase mixture may be formed with ammonia in the liquid phase and $N_2$ and $H_2$ in the gas phase. The ammonia may be separated from other components of the mixture. The nitrogen and hydrogen may be subsequently reheated to the operating temperature for ammonia conversion and passed through the reactor again.

Urea may be prepared by introducing ammonia and carbon dioxide into a reactor at a suitable pressure, (e.g., from about 125 bars absolute to about 350 bars absolute), and at a suitable temperature, (e.g., from about 160° C. to about 250° C.). Ammonium carbamate may be formed according to Reaction 62:

$$2NH_3+CO_2 \rightarrow NH_2(CO_2)NH_4. \quad (62)$$

Urea may be subsequently formed by dehydrating the ammonium carbamate according to equilibrium Reaction 63:

$$NH_2(CO_2)NH_4 \leftrightarrow NH_2(CO)NH_2+H_2O. \quad (63)$$

The degree to which the ammonia conversion takes place may depend on the temperature and the amount of excess ammonia. The solution obtained as the reaction product may include urea, water, ammonium carbamate, and unbound ammonia. The ammonium carbamate and the ammonia may need to be removed from the solution and returned to the reactor. The reactor may include separate zones for the formation of ammonium carbamate and urea. However, these zones may also be combined into one piece of equipment.

In a process embodiment, a high pressure urea plant may operate such that the decomposition of ammonium carbamate that has not been converted into urea and the expulsion of the excess ammonia are conducted at a pressure between 15 bars absolute and 100 bars absolute. This pressure may be considerably lower than the pressure in the urea synthesis reactor. The synthesis reactor may be operated at a temperature of about 180° C. to about 210° C. and at a pressure of about 180 bars absolute to about 300 bars absolute. Ammonia and carbon dioxide may be directly fed to the urea reactor. The $NH_3/CO_2$ molar ratio (N/C molar ratio) in the urea synthesis may generally be between about 3 and about 5. The unconverted reactants may be recycled to the urea synthesis reactor following expansion, dissociation, and/or condensation.

In a process embodiment, an ammonia feed stream having a selected ratio of $H_2$ to $N_2$ may be generated from a formation using enriched air. A synthesis gas generating fluid and an enriched air stream may be provided to the formation. The composition of the enriched air may be selected to generate synthesis gas having the selected ratio of $H_2$ to $N_2$. In one embodiment, the temperature of the formation may be controlled to generate synthesis gas having the selected ratio.

In a process embodiment, the $H_2$ to $N_2$ ratio of the feed stream provided to the ammonia synthesis process may be approximately 3:1. In other embodiments, the ratio may range from approximately 2.8:1 to 3.2:1. An ammonia synthesis feed stream having a selected $H_2$ to $N_2$ ratio may be obtained by blending feed streams produced from different portions of the formation.

In a process embodiment, ammonia from the ammonia synthesis process may be provided to a urea synthesis process to generate urea. Ammonia produced during pyrolysis may be added to the ammonia generated from the ammonia synthesis process. In another process embodiment, ammonia produced during hydrotreating may be added to the ammonia generated from the ammonia synthesis process. Some of the carbon monoxide in the synthesis gas may be converted to carbon dioxide in a shift process. The carbon dioxide from the shift process may be fed to the urea synthesis process. Carbon dioxide generated from treatment of the formation may also be fed, in some embodiments, to the urea synthesis process.

FIG. 129 illustrates an embodiment of a method for production of ammonia and urea from synthesis gas using membrane-enriched air. Enriched air 1602 and steam or water 1604 may be fed into hot carbon containing formation 1606 to produce synthesis gas 1502 in a wet oxidation mode.

In some synthesis gas production embodiments, enriched air 1602 is blended from air and oxygen streams such that the nitrogen to hydrogen ratio in the produced synthesis gas is about 1:3. The synthesis gas may be at a correct ratio of nitrogen and hydrogen to form ammonia. For example, it has been calculated that for a formation temperature of 700° C., a pressure of 3 bars absolute, and with 13,231 tons/day of char that will be converted into synthesis gas, one could inject 14.7 kilotons/day of air, 6.2 kilotons/day of oxygen, and 21.2 kilotons/day of steam. This would result in production of 2 billion cubic feet/day of synthesis gas including 5689 tons/day of steam, 16,778 tons/day of carbon monoxide, 1406 tons/day of hydrogen, 18,689 tons/day of carbon dioxide, 1258 tons/day of methane, and 11,398 tons/day of nitrogen. After a shift reaction (to shift the carbon monoxide to carbon dioxide and to produce additional hydrogen), the carbon dioxide may be removed, the product stream may be methanated (to remove residual carbon monoxide), and then one can theoretically produce 13,840 tons/day of ammonia and 1258 tons/day of methane. This calculation includes the products produced from Reactions (57) and (58) above.

Enriched air may be produced from a membrane separation unit. Membrane separation of air may be primarily a physical process. Based upon specific characteristics of each molecule, such as size and permeation rate, the molecules in air may be separated to form substantially pure forms of nitrogen, oxygen, or combinations thereof.

In a membrane system embodiment, the membrane system may include a hollow tube filled with a plurality of very thin membrane fibers. Each membrane fiber may be another hollow tube in which air flows. The walls of the membrane fiber may be porous such that oxygen permeates through the wall at a faster rate than nitrogen. A nitrogen rich stream may be allowed to flow out the other end of the fiber. Air outside the fiber and in the hollow tube may be oxygen enriched. Such air may be separated for subsequent uses, such as production of synthesis gas from a formation.

In some membrane system embodiments, the purity of nitrogen generated may be controlled by variation of the flow rate and/or pressure of air through the membrane. Increasing air pressure may increase permeation of oxygen molecules through a fiber wall. Decreasing flow rate may increase the residence time of oxygen in the membrane and, thus, may increase permeation through the fiber wall. Air pressure and flow rate may be adjusted to allow a system operator to vary the amount and purity of the nitrogen generated in a relatively short amount of time.

The amount of $N_2$ in the enriched air may be adjusted to provide a N:H ratio of about 3:1 for ammonia production. Synthesis gas may be generated at a temperature that favors the production of carbon dioxide over carbon monoxide. The temperature during synthesis gas generation may be maintained between about 400° C. and about 550° C., or between about 400° C. and about 450° C. Synthesis gas produced at such low temperatures may include $N_2$, $H_2$, and carbon dioxide with little carbon monoxide.

As illustrated in FIG. 129, a feed stream for ammonia production may be prepared by first feeding synthesis gas stream 1502 into ammonia feed stream gas processing unit 1608. In ammonia feed stream gas processing unit 1608, the feed stream may undergo a shift reaction (to shift the carbon monoxide to carbon dioxide and to produce additional hydrogen). Carbon dioxide may be removed from the feed stream, and the feed stream can be methanated (to remove residual carbon monoxide). In certain embodiments, carbon dioxide may be separated from the feed stream (or any gas stream) by absorption in an amine unit. Membranes or other carbon dioxide separation techniques/equipment may also be used to separate carbon dioxide from a feed stream.

Ammonia feed stream 1610 may be fed to ammonia production facility 1612 to produce ammonia 1614. Carbon dioxide stream 1506 exiting stream gas processing unit 1608 (and/or carbon dioxide from other sources) may be fed, with ammonia 1614, into urea production facility 1616 to produce urea 1618.

Ammonia and urea may be produced using a carbon containing formation and using an $O_2$ rich stream and a $N_2$ rich stream. The $O_2$ rich stream and synthesis gas generating fluid may be provided to a formation. The formation may be heated, or partially heated, by oxidation of carbon in the formation with the $O_2$ rich stream. $H_2$ in the synthesis gas and $N_2$ from the $N_2$ rich stream may be provided to an ammonia synthesis process to generate ammonia.

FIG. 130 illustrates a flowchart of an embodiment for production of ammonia and urea from synthesis gas using cryogenically separated air. Air 1620 may be fed into cryogenic air separation unit 1622. Cryogenic separation involves a distillation process that may occur at temperatures between about −168° C. and −172° C. In other embodiments, the distillation process may occur at temperatures between about −165° C. and −175° C. Air may liquefy in these temperature ranges. The distillation process may be operated at a pressure between about 8 bars absolute and about 10 bars absolute. High pressures may be achieved by compressing air and exchanging heat with cold air exiting the column. Nitrogen is more volatile than oxygen and may come off as a distillate product.

$N_2$ 1624 exiting separator 1622 may be utilized in heat exchange unit 1626 to condense higher molecular weight hydrocarbons from pyrolysis stream 1628 and to remove lower molecular weight hydrocarbons from the gas phase into a liquid oil phase. Upgraded gas stream 1630 containing a higher composition of lower molecular weight hydrocarbons than stream 1628 and liquid stream 1632, which includes condensed hydrocarbons, may exit heat exchange unit 1626. $N_2$ 1624 may also exit heat exchange unit 1626.

Oxygen 1634 from cryogenic separation unit 1622 and steam 1392, or water, may be fed into hot carbon containing formation 1606 to produce synthesis gas 1502 in a continuous process. Synthesis gas may be generated at a temperature that favors the formation of carbon dioxide over carbon monoxide. Synthesis gas 1502 may include $H_2$ and carbon dioxide. Carbon dioxide may be removed from synthesis gas 1502 to prepare a feed stream for ammonia production using amine gas separation unit 1636. $H_2$ stream 1638 from gas separation unit 1636 and $N_2$ stream 1624 from the heat exchange unit may be fed into ammonia production facility 1612 to produce ammonia 1614. Carbon dioxide stream 1506 exiting gas separation unit 1636 and ammonia 1614 may be fed into urea production facility 1616 to produce urea 1618.

FIG. 131 illustrates an embodiment of a method for preparing a nitrogen stream for an ammonia and urea process. Air 1620 may be injected into hot carbon containing formation 1606 to produce carbon dioxide by oxidation of carbon in the formation. In an embodiment, a heater may heat at least a portion of the carbon containing formation to a temperature sufficient to support oxidation of the carbon. The temperature sufficient to support oxidation may be, for example, about 260° C. for coal. Stream 1640 exiting the hot formation may include carbon dioxide and nitrogen. In some embodiments, a flue gas stream may be added to stream 1640, or stream 1640 may be a flue gas stream instead of a stream from a portion of a formation.

Nitrogen may be separated from carbon dioxide in stream 1640 by passing the stream through cold spent carbon containing formation 1642. Carbon dioxide may preferentially adsorb versus nitrogen in cold spent formation 1642. For example, at 50° C. and 0.35 bars, the adsorption of carbon dioxide on a spent portion of coal may be about 72 $m^3$/metric ton compared to about 15.4 $m^3$/metric ton for nitrogen. Nitrogen 1624 exiting cold spent portion 1642 may be supplied to ammonia production facility 1612 with $H_2$ stream 1638 to produce ammonia 1614. In some process embodiments, $H_2$ stream 1638 may be obtained from a product stream produced during synthesis gas generation of a portion of the formation.

FIG. 132 depicts an embodiment for treating a relatively permeable formation using horizontal heat sources. Heat source 508 may be disposed within hydrocarbon layer 522. Hydrocarbon layer 522 may be below overburden 524. Overburden 524 may include, but is not limited to, shale, carbonate, and/or other types of sedimentary rock. Overburden 524 may have a thickness of about 10 m or more. A thickness of overburden 524, however, may vary depending on, for example, a type of formation. Heat source 508 may be disposed substantially horizontally or, in some embodiments, at an angle between horizontal and vertical within hydrocarbon layer 522. Heat source 508 may provide heat to a portion of hydrocarbon layer 522.

Heat source 508 may include a low temperature heat source and/or a high temperature heat source. Provided heat may mobilize a portion of heavy hydrocarbons within hydrocarbon layer 522. Provided heat may also pyrolyze a portion of heavy hydrocarbons within hydrocarbon layer 522. A length of horizontal heat source 508 disposed within hydrocarbon layer 522 may be between about 50 m to about 1500 m. The length of heat source 508 within hydrocarbon layer 522 may vary, however, depending on, for example, a width of hydrocarbon layer 522, a desired production rate, an energy output of heat source 508, and/or a maximum possible length of a wellbore and/or heat sources.

FIG. 133 depicts an embodiment for treating a relatively permeable formation using substantially horizontal heat sources. Heat sources 508 may be disposed horizontally within hydrocarbon layer 522. Hydrocarbon layer 522 may be below overburden 524. Production well 512 may be disposed vertically, horizontally, or at an angle to hydrocarbon layer 522. The location of production well 512 within hydrocarbon layer 522 may vary depending on a variety of factors (e.g., a desired product and/or a desired production rate). In certain embodiments, production well 512 may be disposed proximate a bottom of hydrocarbon layer 522. Producing proximate the bottom of the relatively permeable formation may allow for production of a relatively low API gravity fluid. In other embodiments, production well 512 may be disposed proximate a top of hydrocarbon layer 522. Producing proximate the top of the relatively permeable formation may allow for production of a relatively high API gravity fluid.

Heat sources 508 may provide heat to mobilize a portion of the heavy hydrocarbons within hydrocarbon layer 522. The mobilized fluids may flow towards a bottom of hydrocarbon layer 522 substantially by gravity. The mobilized fluids may be removed through production well 512. Each of heat sources 508 disposed at or near the bottom of hydrocarbon layer 522 may heat some or all of a section proximate the bottom of hydrocarbon layer 522 to a temperature sufficient. to pyrolyze heavy hydrocarbons within the section. Such a section may be referred to as a selected pyrolyzation section. A temperature within the selected pyrolyzation section may be between about 225° C. and about 400° C. Pyrolysis of the heavy hydrocarbons within the selected pyrolyzation section may convert a portion of the heavy hydrocarbons into pyrolyzation fluids. The pyrolyzation fluids may be removed through production well 512. Production well 512 may be disposed within the selected pyrolyzation section. In some embodiments, one or more of heat sources 508 may be turned down and/or off after substantially mobilizing a majority of the heavy hydrocarbons within hydrocarbon layer 522. Doing so may more efficiently heat the formation and/or may save input energy costs associated with the in situ process. In addition, the formation may be heated during off peak times when electricity is cheaper, if the heaters are electric heaters.

In certain embodiments, heat may be provided within production well 512 to vaporize formation fluids. Heat may also be provided within production well 512 to pyrolyze and/or upgrade formation fluids.

In some embodiments, a pressurizing fluid may be provided into hydrocarbon layer 522 through heat sources 508. The pressurizing fluid may increase the flow of the mobilized fluids towards production well 512. Increasing the pressure of the pressurizing fluid proximate heat sources 508 will tend to increase the flow of the mobilized fluids towards production well 512. The pressurizing fluid may include, but is not limited to, steam, $N_2$, $CO_2$, $CH_4$, $H_2$, combustion products, a non-condensable or condensable component of fluid produced from the formation, by-products of surface processes such as refining or power/heat generation, and/or mixtures thereof. Alternatively, the pressurizing fluid may be provided through an injection well disposed in the formation.

Pressure in the formation may be controlled to control a production rate of formation fluids from the formation. The pressure in the formation may be controlled by adjusting control valves coupled to production wells 512, heat sources 508, and/or pressure control wells disposed in the formation.

In an embodiment, an in situ process for treating a relatively permeable formation may include providing heat to a portion of a formation from a plurality of heat sources. A plurality of heat sources may be arranged within a relatively permeable formation in a pattern. FIG. 134 illustrates an embodiment of pattern 1644 of heat sources 508 and production well 512 that may treat a relatively permeable formation. Heat sources 508 may be arranged in a "5 spot" pattern with production well 512. In the "5 spot" pattern, four heat sources 508 are arranged substantially around production well 512, as depicted in FIG. 134. Although heat sources 508 are depicted as being equidistant from each other in FIG. 134, the heat sources may be placed around production well 512 and not be equidistant from the production well and/or each other. Depending on the heat generated by each heat source 508, a spacing between heat sources 508 and production well 512 may be determined by a desired product or a desired production rate. A spacing between heat sources 508 and production well 512 may be, for example, about 15 m. Heat source 508 may be converted into production well 512. Production well 512 may be converted into heat source 508.

FIG. 135 illustrates an embodiment of pattern 1646 of heat sources 508 arranged in a "7 spot" pattern with production well 512. In the "7 spot" pattern, six heat sources 508 are arranged substantially around production well 512, as depicted in FIG. 135. Although heat sources 508 are depicted as being equidistant from each other in FIG. 135, the heat sources may be placed around production well 512 and not be equidistant from the production well and/or each other. Heat sources 508 may also be used to produce fluids from the formation. In addition, production well 512 may be heated.

In certain embodiments, a pattern of heat sources 508 and production wells 512 may vary depending on, for example, the type of relatively permeable formation to be treated. A location of production well 512 within a pattern of heat sources 508 may be determined by, for example, a desired heating rate of the relatively permeable formation, a heating rate of the heat sources, a type of heat source, a type of relatively permeable formation, a composition of the relatively permeable formation, a viscosity of fluid in the relatively permeable formation, and/or a desired production rate.

FIG. 136 illustrates a plan view of an embodiment for treating a relatively permeable formation. Hydrocarbon layer 522 may include heavy hydrocarbons. Production wells 512 may be disposed in hydrocarbon layer 522. Hydrocarbon layer 522 may be enclosed between impermeable layers. Underburden 914 may be referred to as base rock. In some embodiments, the overburden and/or the underburden may be somewhat permeable.

In an embodiment, low temperature heat sources 1648 and high temperature heat sources 1650 are disposed in production well 512. Low temperature heat source 1648 may be a heat source, or heater, that provides heat to a selected mobilization section of hydrocarbon layer 522, which is substantially adjacent to low temperature heat source 1648. The provided heat may heat some or all of the selected mobilization section to an average temperature within a mobilization temperature range of the heavy hydrocarbons contained within hydrocarbon layer 522. The mobilization temperature range may be between about 50° C. and about 225° C. A selected mobilization temperature may be about 100° C. The mobilization temperature may vary, however, depending on a viscosity of the heavy hydrocarbons contained within hydrocarbon layer 522. For example, a higher mobilization temperature may be required to mobilize a higher viscosity fluid within hydrocarbon layer 522.

High temperature heat source 1650 may be a heat source, or heater, that provides heat to selected pyrolyzation section 1652 of hydrocarbon layer 522, which may be substantially adjacent to the high temperature heat source. The provided heat may heat some or all of selected pyrolyzation section 1652 to an average temperature within a pyrolyzation temperature range of the heavy hydrocarbons contained within hydrocarbon layer 522. The pyrolyzation temperature range may be between about 225° C. and about 400° C. A selected pyrolyzation temperature may be about 300° C. The pyrolyzation temperature may vary, however, depending on formation characteristics, composition, pressure, and/or a desired quality of a product produced from the formation. A quality of the product may be determined based upon properties of the product (e.g., the API gravity of the product). Pyrolyzation may include cracking of the heavy hydrocarbons into hydrocarbon fragments and/or lighter hydrocarbons. Pyrolyzation of the heavy hydrocarbons tends to upgrade the quality of the heavy hydrocarbons.

As shown in FIG. 136, mobilized fluids in hydrocarbon layer 522 may flow into selected pyrolyzation section 1652 substantially by gravity. The mobilized fluids may be upgraded by pyrolysis in selected pyrolyzation section 1652. Flow of the mobilized fluids may optionally be increased by providing pressurizing fluid 1654 (e.g., through conduit 1656 or any injection well placed in the formation) into the formation. Pressurizing fluid 1654 may be a fluid that increases a pressure in the formation proximate conduit 1656. The increased pressure proximate conduit 1656 may increase flow of the mobilized fluids in hydrocarbon layer 522 into selected pyrolyzation section 1652. A pressure of pressurizing fluid 1654 provided by conduit 1656 may be between, in one embodiment, about 7 bars absolute to about 70 bars absolute. The pressure of pressurizing fluid 1654 may vary, depending on, for example, a viscosity of fluid within hydrocarbon layer 522, the depth of overburden 524, and/or a desired flow rate of fluid into selected pyrolyzation section 1652. Pressurizing fluid 1654 may, in certain embodiments, be any gas that does not result in significant oxidation of the heavy hydrocarbons. For example, pressurizing fluid 1654 may include steam, $N_2$, $CO_2$, $CH_4$, hydrogen, etc.

Production wells 512 may remove pyrolyzation fluids and/or mobilized fluids from selected pyrolyzation section 1652. In some embodiments, formation fluids may be removed as vapor. The formation fluids may be upgraded by reactions induced by high temperature heat source 1650 and/or low temperature heat source 1648 in production well 512. Production well 512 may control pressure in selected pyrolyzation section 1652 to provide a pressure gradient so that mobilized fluids flow into selected pyrolyzation section 1652 from the selected mobilization section. In some embodiments, pressure in selected pyrolyzation section 1652 may be controlled to control the flow of the mobilized fluids into selected pyrolyzation section 1652. By not heating the entire formation to pyrolyzation temperatures, the drainage process may produce a higher ratio of energy produced versus energy input for the in situ conversion process (as compared to heating the entire formation to pyrolysis temperatures).

In addition, pressure in the formation may be controlled to produce a desired quality of formation fluids. For example, the pressure in the formation may be increased to produce formation fluids with an increased API gravity as compared to formation fluids produced at a lower pressure. Increasing the pressure in the formation may increase a hydrogen partial pressure in mobilized and/or pyrolyzation fluids. The increased hydrogen partial pressure in mobilized and/or pyrolyzation fluids may reduce the heavy hydrocarbons in mobilized and/or pyrolyzation fluids. Reducing the heavy hydrocarbons may produce lighter, more valuable hydrocarbons. An API gravity of the hydrogenated heavy hydrocarbons may be higher than an API gravity of the un-hydrogenated heavy hydrocarbons.

In an embodiment, pressurizing fluid 1654 may be provided to the formation through a conduit disposed in/or proximate production well 512. The conduit may provide pressurizing fluid 1654 into hydrocarbon layer 522 proximate overburden 524. In some embodiments, the conduit is an injection well.

In another embodiment, low temperature heat source 1648 may be turned down and/or off in production wells 512. The heavy hydrocarbons in hydrocarbon layer 522 may be mobilized by transfer of heat from selected pyrolyzation section 1652 into an adjacent portion of hydrocarbon layer 522. Heat transfer from selected pyrolyzation section 1652 may be substantially by conduction.

FIG. 137 illustrates an embodiment for treating a relatively permeable formation without substantially pyrolyzing mobilized fluids. Low temperature heat source 1648 may be placed in production well 512. Low temperature heat source 1648 may provide heat to hydrocarbon layer 522 to heat some or all of hydrocarbon layer 522 to an average temperature within the mobilization temperature range. Mobilized fluids within hydrocarbon layer 522 may flow towards a bottom of hydrocarbon layer 522 substantially by gravity. Pressurizing fluid 1654 may be provided into the formation through conduit 1656 and may increase a flow of the mobilized fluids towards the bottom of hydrocarbon layer 522. Pressurizing fluid 1654 may also be provided into the formation through another conduit, such as a conduit disposed in/or proximate production well 512. Formation fluids may be removed through production well 512 at and/or near the bottom of hydrocarbon layer 522. Low temperature heat source 1648 may provide heat to the formation fluids removed through production well 512. The provided heat may vaporize the removed formation fluids within production well 512 such that the formation fluids may be removed as a vapor. The provided heat may also increase an API gravity of the removed formation fluids within production well 512.

FIG. 138 illustrates an embodiment for treating a relatively permeable formation with layers 1658 of heavy hydrocarbons separated by layers 1660. Such layers 1660 may, for example, be impermeable layers or less permeable layers of the formation. Heater well 520 and production well 512 may be disposed in the relatively permeable formation. Layers 1660 may separate layers 1658. Heavy hydrocarbons may be disposed in layers 1658. Low temperature heat source 1648 may be disposed in injection well 520. Heavy hydrocarbons may be mobilized by heat provided from low temperature heat source 1648 such that a viscosity of the heavy hydrocarbons is substantially reduced. Pressurizing fluid 1654 may be provided through openings in injection well 520 into layers 1658. The pressure of pressurizing fluid 1654 may cause the mobilized fluids to flow towards production well 512. The pressure of pressurizing fluid 1654 at or near injection well 520 may be, for example, about 7 bars absolute to about 70 bars absolute. The pressure of pressurizing fluid 1654 is, however, generally controlled to remain below a pressure that can lift the overburden.

High temperature heat source 1650 may, in some embodiments, be disposed in production well 512. Heat provided by high temperature heat source 1650 may pyrolyze a portion of the mobilized fluids within a selected pyrolyzation section proximate production well 512. The pyrolyzation and/or mobilized fluids may be removed from layers 1658 by production well 512. High temperature heat source 1650 may cause reactions that further upgrade the removed formation fluids within production well 512. In some embodiments, the removed formation fluids may be removed as vapor through production well 512. A pressure at or near production well 512 may be less than about 70 bars absolute. Not heating the entire formation to pyrolyzation temperatures may produce a higher ratio of energy produced versus energy input for the in situ conversion process as compared to heating the entire formation to pyrolysis temperatures. Upgrading of the formation fluids at or near production well 512 may produce a higher value product.

In another embodiment, high temperature heat source 1650 may be supplemented or replaced with low temperature heat source 1648 within production well 512. Low temperature heat source 1648 may produce less pyrolyzation of the heavy hydrocarbons within layers 1658 than high temperature heat source 1650. Therefore, the formation fluids removed through production well 512 produced with low temperature heat source 1648 may not be as upgraded as formation fluids removed through production well 512 produced with high temperature heat source 1650.

In another embodiment, pyrolyzation of the heavy hydrocarbons may be increased by replacing low temperature heat source 1648 with high temperature heat source 1650 within injection well 520. High temperature heat source 1650 may allow for more pyrolyzation of the heavy hydrocarbons within layers 1658 than low temperature heat source 1648. The formation fluids removed through production well 512 may be higher in value as compared to the formation fluids removed in a process using low temperature heat source 1648 within injection well 520 as described in the embodiment shown in FIG. 138.

In some embodiments, a relatively permeable formation may be below a thick impermeable layer (overburden). The overburden may have a thickness ranging from about 10 m to about 300 m or more. The overburden may inhibit vapor release to the atmosphere.

In some embodiments, portions of heat sources may be placed horizontally or non-vertically in a relatively permeable formation. Using horizontal or directionally drilled heat sources may be more economical than using vertical or substantially vertical heat sources. Portions of production wells may also be disposed horizontally or non-vertically within the relatively permeable formation.

In an embodiment, production of hydrocarbons from a formation is inhibited until at least some hydrocarbons within the formation have been pyrolyzed. A mixture may be produced from the formation at a time when the mixture includes a selected quality in the mixture (e.g., API gravity, hydrogen concentration, aromatic content, etc.). In some embodiments, the selected quality includes an API gravity of at least about 20°, 30°, or 40°. Inhibiting production until at least some hydrocarbons are pyrolyzed may increase conversion of heavy hydrocarbons to light hydrocarbons. Inhibiting initial production may minimize the production of heavy hydrocarbons from the formation. Production of substantial amounts of heavy hydrocarbons may require expensive equipment and/or reduce the life of production equipment.

In one embodiment, the time for beginning production may be determined by sampling a test stream produced from the formation. The test stream may be an amount of fluid produced through a production well or a test well. The test stream may be a portion of fluid removed from the formation to control pressure within the formation. The test stream may be tested to determine if the test stream has a selected quality. For example, the selected quality may be a selected minimum API gravity or a selected maximum weight percentage of heavy hydrocarbons. When the test stream has the selected quality, production of the mixture may be started through production wells and/or heat sources in the formation.

In an embodiment, the time for beginning production is determined from laboratory experimental treatment of samples obtained from the formation. For example, a laboratory treatment may include a pyrolysis experiment used to determine a process time that produces a selected minimum API gravity from the sample.

In one embodiment, measuring a pressure (e.g., a downhole pressure in a production well) is used to determine the time for beginning production from a formation. For example, production may be started when a minimum selected downhole pressure is reached in a production well in a selected section of the formation.

In an embodiment, the time for beginning production is determined from a simulation for treating the formation. The simulation may be a computer simulation that simulates formation conditions (e.g., pressure, temperature, production rates, etc.) to determine qualities of fluids produced from the formation.

When production of hydrocarbons from the formation is inhibited, the pressure in the formation tends to increase with temperature in the formation because of thermal expansion and/or phase change of heavy hydrocarbons and other fluids (e.g., water) in the formation. Pressure within the formation may have to be maintained below a selected pressure to inhibit unwanted production, fracturing of the overburden or underburden, and/or coking of hydrocarbons in the formation. The selected pressure may be a lithostatic or hydrostatic pressure of the formation. For example, the selected pressure may be about 150 bars absolute or, in some embodiments, the selected pressure may be about 35 bars absolute. The pressure in the formation may be controlled by controlling production rate from production wells in the formation. In other embodiments, the pressure in the formation is controlled by releasing pressure through one or more pressure relief wells in the formation. Pressure relief wells may be heat sources or separate wells inserted into the formation. Formation fluid removed from the formation through the relief wells may be sent to a treatment facility. Producing at least some hydrocarbons from the formation may inhibit the pressure in the formation from rising above the selected pressure.

In certain embodiments, some formation fluids may be back produced through a heat source wellbore. For example, some formation fluids may be back produced through a heat source wellbore during early times of heating of a hydrocarbon containing formation. In an embodiment, some formation fluids may be produced through a portion of a heat source wellbore. Injection of heat may be adjusted along the length of the wellbore so that fluids produced through the wellbore are not overheated. Fluids may be produced through portions of the heat source wellbore that are at lower temperatures than other portions of the wellbore.

Producing at least some formation fluids through a heat source wellbore may reduce or eliminate the need for additional production wells in a formation. In addition, pressures within the formation may be reduced by producing fluids through a heat source wellbore (especially within the region surrounding the heat source wellbore). Reducing pressures in the formation may alter the ratio of produced liquids to produced vapors. In certain embodiments, producing fluids through the heat source wellbore may lead to earlier production of fluids from the formation. Portions of the formation closest to the heat source wellbore will increase to mobilization and/or pyrolysis temperatures earlier than portions of the formation near production wells. Thus, fluids may be produced at earlier times from portions near the heat source wellbore.

FIG. 139 depicts an embodiment of a heater well for selectively heating a formation. Heat source 508 may be placed in opening 544 in hydrocarbon layer 522. In certain embodiments, opening 544 may be a substantially horizontal opening within hydrocarbon layer 522. Perforated casing 1254 may be placed in opening 544. Perforated casing 1254 may provide support from hydrocarbon and/or other material in hydrocarbon layer 522 collapsing opening 544. Perforations in perforated casing 1254 may allow for fluid flow from hydrocarbon layer 522 into opening 544. Heat source 508 may include hot portion 1662. Hot portion 1662 may be a portion of heat source 508 that operates at higher heat outputs of a heat source. For example, hot portion 1662 may output between about 650 watts per meter and about 1650 watts per meter. Hot portion 1662 may extend from a "heel" of the heat source to the end of the heat source (i.e., the "toe" of the heat source). The heel of a heat source is the portion of the heat source closest to the point at which the heat source enters a hydrocarbon layer. The toe of a heat source is the end of the heat source furthest from the entry of the heat source into a hydrocarbon layer.

In an embodiment, heat source 508 may include warm portion 1664. Warm portion 1664 may be a portion of heat source 508 that operates at lower heat outputs than hot portion 1662. For example, warm portion 1664 may output between about 150 watts per meter and about 650 watts per meter. Warm portion 1664 may be located closer to the heel of heat source 508. In certain embodiments, warm portion 1664 may be a transition portion (i.e., a transition conductor) between hot portion 1662 and overburden portion 1666. Overburden portion 1666 may be located within overburden 524. Overburden portion 1666 may provide a lower heat output than warm portion 1664. For example, overburden portion may output between about 30 watts per meter and about 90 watts per meter. In some embodiments, overburden portion 1666 may provide as close to no heat (0 watts per meter) as possible to overburden 524. Some heat, however, may be used to maintain fluids produced through opening 544 in a vapor phase within overburden 524.

In certain embodiments, hot portion 1662 of heat source 508 may heat hydrocarbons to high enough temperatures to result in coke 1668 forming in hydrocarbon layer 522. Coke 1668 may occur in an area surrounding opening 544. Warm portion 1664 may be operated at lower heat outputs such that coke does not form at or near the warm portion of heat source 508. Coke 1668 may extend radially from opening 544 as heat from heat source 508 transfers outward from the opening. At a certain distance, however, coke 1668 no longer forms because temperatures in hydrocarbon layer 522 at the certain distance will not reach coking temperatures. The distance at which no coke forms may be a function of heat output (watts per meter from heat source 508), type of formation, hydrocarbon content in the formation, and/or other conditions within the formation.

The formation of coke 1668 may inhibit fluid flow into opening 544 through the coking. Fluids in the formation may, however, be produced through opening 544 at the heel of heat source 508 (i.e., at warm portion 1664 of the heat source) where there is no coke formation. The lower temperatures at the heel of heat source 508 may reduce the possibility of increased cracking of formation fluids produced through the heel. Fluids may flow in a horizontal direction through the formation more easily than in a vertical direction. Typically, horizontal permeability in a relatively permeable formation (e.g., a tar sands formation) is about 5 to 10 times greater than vertical permeability. Thus, fluids may flow along the length of heat source 508 in a substantially horizontal direction. Producing formation fluids through opening 544 may be possible at earlier times than producing fluids through production wells in hydrocarbon layer 522. The earlier production times through opening 544 may be possible because temperatures near the opening increase faster than temperatures further away due to conduction of heat from heat source 508 through hydrocarbon layer 522. Early production of formation fluids may be used to maintain lower pressures in hydrocarbon layer 522 during start-up heating of the formation (i.e., before production begins at production wells in the formation). Lower pressures in the formation may increase liquid production from the formation. In addition, producing formation fluids through opening 544 may reduce the number of production wells needed in the formation.

Alternately, in certain embodiments portions of a heater may be moved or removed, thereby shortening the heated section. For example, in a horizontal well the heater may initially extend to the "toe." As products are produced from the formation, the heater may be moved so that it is placed at location further from the "toe." Heat may be applied to a different portion of the formation.

In an embodiment for treating a relatively permeable formation, mobilized fluids may be produced from the formation with limited or no pyrolyzing and/or upgrading of the mobilized fluids. The produced fluids may be further treated in a treatment facility located near the formation or at a remotely located treatment facility. The produced fluids may be treated such that the fluids can be transported (e.g., by pipeline, ship, etc.). Heat sources in such an embodiment may have a larger spacing than may be needed for producing pyrolyzed formation fluids. For example, a spacing between heat sources may be about 15 m, about 30 m, or even about 40 m for producing substantially un-pyrolyzed fluids from a relatively permeable formation. An average temperature of the formation may be between about 50° C. and about 225° C., or, in some embodiments, between about 150° C. and about 200° C. or between about 100° C. and about 150° C. For example, a well spacing of about 30 m may produce an average temperature in the formation of about 150° C. in about ten years, assuming a constant heat output from the heat sources. Smaller heat source spacings may be used to increase a temperature rise within the formation. For example, a well spacing of about 15 m will tend to produce an average temperature in the formation of about 150° C. in less than about a year. Larger well spacings may decrease costs associated with, but not limited to, forming wellbores, purchasing and installing heating equipment, and providing energy to heat the formation.

In certain embodiments, the average temperature of a relatively permeable formation is kept below the boiling point of water at formation conditions (e.g., formation pressure) in order to limit the enthalpy of vaporization loss to boiling the water. Production wells may also be operated to minimize the production of steam from the formation.

In some embodiments, the ratio of energy output of the formation to energy input into the formation may be increased by producing a larger percentage of heavy hydrocarbons versus light hydrocarbons from the formation. The energy content of heavy hydrocarbons tends to be higher than the energy content of light hydrocarbons. Producing more heavy hydrocarbons may increase the ratio of energy output to energy input. In addition, production costs (such as heat input) for heavy hydrocarbons from a relatively permeable formation may be less than production costs for light hydrocarbons. In certain embodiments, the energy output to energy input ratio is at least about 5. In other embodiments, the energy output to energy input ratio is at least about 6 or at least about 7. In general, energy output to energy input ratios for in situ production from a relatively permeable formation may be improved versus typical production techniques. For example, steam production of heavy hydrocarbons typically have energy ratios between about 2.7 and about 3.3. Steam production may also produce about 28% to about 40% of the initial hydrocarbons in place from the formation. In situ production from a relatively permeable formation may produce, in certain embodiments, greater than about 50% of the initial hydrocarbons in place.

"Hot zones" (or "hot sections") may be created in a formation to allow for production of hydrocarbons from the formation. Hydrocarbon fluids that are originally in the hot zones may be produced at a temperature that mobilizes the fluids within the hot zones. Removing fluids from the hot zone may create a pressure or flow gradient that allows mobilized fluids from other zones (or sections) of the formation to flow into the hot zones when the other zones are heated to mobilization temperatures. The one or more hot zones may be heated to a temperature for pyrolyzation of hydrocarbons that flow into the hot zones. Temperatures in other zones of the formation may only be high enough such that fluids within the other zones are mobilized and flow into the hot zones. Maintaining lower temperatures within these other zones may reduce energy costs associated with heating a relatively permeable formation compared to heating the entire formation (including hot zones and other zones) to pyrolyzation temperatures. In addition, producing fluids from the one or more hot zones rather than throughout the formation reduces costs associated with installation and operation of production wells.

FIG. 140 depicts a cross-sectional representation of an embodiment for treating a formation containing heavy hydrocarbons with multiple heating sections. Heat sources 508 may be placed within first section 1670. Heat sources 508 may be placed in a desired pattern, (e.g., hexagonal, triangular, square, etc.). In an embodiment, heat sources 508 are placed in triangular patterns. A spacing between heat sources 508 may be less than about 25 m within first section 1670 or, in some embodiments, less about 20 m or less than about 15 m. A volume of first section 1670 (as well as second sections 1672 and third sections 1674) may be determined by a pattern and spacing of heat sources 508 within the section and/or a heat output of the heat sources. Production wells 512 may be placed within first section 1670. A number, orientation, and/or location of production wells 512 may be determined by considerations including, but not limited to, a desired production rate, a selected product quality, and/or a ratio of heavy hydrocarbons to light hydrocarbons. For example, one production well 512 may be placed in an upper portion of first section 1670. In some embodiments, an injection well 606 is placed in first section 1670. Injection well 606 (and/or a heat source or production well) may be used to provide a pressurizing fluid into first section 1670. The pressurizing fluid may include, but is not limited to, steam, carbon dioxide, $N_2$, $CH_4$, combustion products, non-condensable and condensable fluid produced from the formation, or combinations thereof. In certain embodiments, a location of injection well 606 is chosen such that the recovery of fluids from first section 1670 is increased with the provided pressurizing fluid.

In an embodiment, heat sources 508 are used to provide heat to first section 1670. First section 1670 may be heated such that at least some heavy hydrocarbons within the first section are mobilized. A temperature at which at least some hydrocarbons are mobilized (i.e., a mobilization temperature) may be between about 50° C. and about 210° C. In other embodiments, a mobilization temperature is between about 50° C. and about 150° C. or between about 50° C. and about 100° C.

In an embodiment, a first mixture is produced from first section 1670. The first mixture may be produced through production well 512 or production wells and/or heat sources 508. The first mixture may include mobilized fluids from the first section. The mobilized fluids may include at least some hydrocarbons from first section 1670. In certain embodiments, the mobilized fluids produced include heavy hydrocarbons. An API gravity of the first mixture may be less than about 20°, less than about 15°, or less than about 10°. In some embodiments, the first mixture includes at least some pyrolyzed hydrocarbons. Some hydrocarbons may be pyrolyzed in portions of first section 1670 that are at higher temperatures than a remainder of the first section. For example, portions adjacent heat sources 508 may be at somewhat higher temperatures (e.g., approximately 50° C. to approximately 100° C. higher) than the remainder of first section 1670.

Second sections 1672 may be adjacent to first section 1670. Second sections 1672 may include heat sources 508. Heat sources 508 in second section 1672 may be arranged in a pattern similar to a pattern of heat sources 508 in first section 1670. In some embodiments, heat sources 508 in second section 1672 are arranged in a different pattern than heat sources 508 in first section 1670 to provide desired heating of the second section. In certain embodiments, a spacing between heat sources 508 in second section 1672 is greater than a spacing between heat sources 508 in first section 1670. Heat sources 508 may provide heat to second section 1672 to mobilize at least some hydrocarbons within the second section.

In an embodiment, temperature within first section 1670 may be increased to a pyrolyzation temperature after production of the first mixture. A pyrolyzation temperature in the first section may be between about 225° C. and about 375° C. In some instances, a pyrolyzation temperature in the first section may be at least about 250° C., or at least about 275° C. Mobilized fluids (e.g., mobilized heavy hydrocarbons) from second section 1672 may be allowed to flow into first section 1670. Some of the mobilized fluids from second section 1672 that flow into first section 1670 may be pyrolyzed within the first section. Pyrolyzing the mobilized fluids in first section 1670 may upgrade a quality of fluids (e.g., increase an API gravity of the fluid).

In certain embodiments, a second mixture is produced from first section 1670. The second mixture may be produced through production well 512 or production wells and/or heat sources 508. The second mixture may include at least some hydrocarbons pyrolyzed within first section 1670. Mobilized fluids from second section 1672 and/or hydrocarbons originally within first section 1670 may be pyrolyzed within the first section. Conversion of heavy hydrocarbons to light hydrocarbons by pyrolysis may be controlled by controlling heat provided to first section 1670 and second section 1672. In some embodiments, the heat provided to first section 1670 and second section 1672 is controlled by adjusting the heat output of a heat source or heat sources 508 within the first section. In other embodiments, the heat provided to first section 1670 and second section 1672 is controlled by adjusting the heat output of a heat source or heat sources 508 within the second section. The heat output of heat sources 508 within first section 1670 and second section 1672 may be adjusted to control the heat distribution within hydrocarbon layer 522 to account for the flow of fluids along a vertical and/or horizontal plane within the formation. For example, the heat output may be adjusted to balance heat and mass fluxes within the formation so that mass within the formation (e.g., fluids within the formation) is substantially uniformly heated.

Producing fluid from production wells in the first section may lower the average pressure in the formation by forming an expansion volume for fluids heated in adjacent sections of the formation. Thus, producing fluid from production wells in the first section may establish a pressure gradient in the formation that draws mobilized fluid from adjacent sections into the first section. In some embodiments, a pressurizing fluid is provided in second section 1672 (e.g., through injection well 606) to increase mobilization of hydrocarbons within the second section. The pressurizing fluid may enhance the pressure gradient in the formation to flow mobilized hydrocarbons into first section 1670. In certain embodiments, the production of fluids from first section 1670 allows the pressure in second section 1672 to remain below a selected pressure (e.g., a pressure below which fracturing of the overburden may occur).

In some embodiments, a pressurizing fluid is provided into second section 1672 (e.g., through injection well 606) to increase mobilization of hydrocarbons within the second section. The pressurizing fluid may also be used to increase a flow of mobilized hydrocarbons into first section 1670. For example, a pressure gradient may be produced between second section 1672 and first section 1670 such that the flow of fluids from the second section to the first section is increased.

Third sections 1674 may be adjacent to second sections 1672. Heat may be provided to third section 1674 from heat sources 508. Heat sources 508 in third section 1674 may be arranged in a pattern similar to a pattern of heat sources 508 in first section 1670 and/or heat sources in the second section 1672. In some embodiments, heat sources 508 in third section 1674 are arranged in a different pattern than heat sources 508 in first section 1670 and/or heat sources in the second section 1672. In certain embodiments, a spacing between heat sources 508 in third section 1674 is greater than a spacing between heat sources 508 in first section 1670. Heat sources 508 may provide heat to third section 1674 to mobilize at least some hydrocarbons within the third section.

In an embodiment, a temperature within second section 1672 may be increased to a pyrolyzation temperature after production of the first mixture. Mobilized fluids from third section 1674 may be allowed to flow into second section 1672. Some of the mobilized fluids from third section 1674 that flow into second section 1672 may be pyrolyzed within the second section. A mixture may be produced from second section 1672. The mixture produced from second section 1672 may include at least some pyrolyzed hydrocarbons. An API gravity of the mixture produced from second section 1672 may be at least about 20°, 30°, or 40°. The mixture may be produced through production wells 512 and/or heat sources 508 placed in second section 1672. Heat provided to third section 1674 and second section 1672 may be controlled to control conversion of heavy hydrocarbons to light hydrocarbons and/or a desired characteristic of the mixture produced in the second section.

In another embodiment, mobilized fluids from third section 1674 are allowed to flow through second section 1672 and into first section 1670. At least some of the mobilized fluids from third section 1674 may be pyrolyzed in first section 1670. In addition, some of the mobilized fluids from third section 1674 may be produced as a portion of the second mixture in first section 1670. The heavy hydrocarbon fraction in produced fluids may decrease as successive sections of the formation are produced through first section 1670.

In some embodiments, a pressurizing fluid is provided in third section 1674 (e.g., through injection well 606) to increase mobilization of hydrocarbons within the third section. The pressurizing fluid may also be used to increase a flow of mobilized hydrocarbons into second section 1672 and/or first section 1670. For example, a pressure gradient may be produced between third section 1674 and first section 1670 such that the flow of fluids from the third section towards the first section is increased.

In an embodiment, heat provided to second section 1672, third section 1674, and any subsequent sections may be turned on simultaneously after first section 1670 has been substantially depleted of hydrocarbons and other fluids (e.g., brine). The delay between providing heat to first section 1670 and subsequent sections (e.g., second section 1672, third section 1674, etc.) may be, for example, about 1 year, about 1.5 years, or about 2 years.

Hydrocarbons may be produced from first section 1670 and/or second section 1672 such that at least about 50% by weight of the initial mass of hydrocarbons in the formation are produced. In other embodiments, at least about 60% by weight or at least about 70% by weight of the initial mass of hydrocarbons in the formation are produced.

In certain embodiments, hydrocarbons may be produced from the formation such that at least about 60% by volume of the initial volume in place of hydrocarbons is produced from the formation. In some embodiments, at least about 70% by volume of the initial volume in place of hydrocarbons or at least about 80% by volume of the initial volume in place of hydrocarbons may be produced from the formation.

FIG. 141 depicts a schematic of an embodiment for treating a relatively permeable formation using a combination of production and heater wells in the formation. Heat sources 508A and 508B may be placed substantially horizontally within hydrocarbon layer 522. Heat sources 508A may be placed in upper portion 1676 of hydrocarbon layer 522. Heat sources 508B may be placed in lower portion 1678 of hydrocarbon layer 522. In some embodiments, heat sources 508A, 508B or selected heat sources may be used as fluid injection wells. Heat sources 508A and/or heat sources 508B may be placed in a triangular pattern within hydrocarbon layer 522. A pattern of heat sources within hydrocarbon layer 522 may be repeated as needed depending on various factors (e.g., a width of the formation, a desired heating rate, and/or a desired production rate).

Other patterns of heat sources, such as squares, rectangles, hexagons, octagons, etc., may be used within the formation. In some embodiments, heat sources 508B may be placed proximate a bottom of hydrocarbon layer 522. Heat sources 508B may be placed from about 1 m to about 6 m from the bottom of the formation, from about 1 m to about 4 m from the bottom of the formation, or possibly from about 1 m to about 2 m from the bottom of the formation. In certain embodiments, heat input varies between heat sources 508A and heat sources 508B. The difference in heat input may reduce costs and/or allow for production of a desired product. For example, heat sources 508A in an upper portion of the formation may be turned down and/or off after some fluids within hydrocarbon layer 522 have been mobilized. Turning off or reducing heat output of a heater may inhibit excessive cracking of hydrocarbon vapors before the vapors are produced from the formation. Turning off or reducing heat output of a heater or heaters may reduce energy costs for heating the formation.

FIG. 142 depicts a schematic of the embodiment of FIG. 141. Heat sources 508A and 508B may be placed substantially horizontally within hydrocarbon layer 522. Heat sources 508A and 508B may enter hydrocarbon layer 522 through one or more vertical or slanted wellbores formed through an overburden of the formation. In some embodiments, each heat source may have its own wellbore. In other embodiments, one or more heat sources may branch from a common wellbore. In another embodiment, one or more heat sources are placed in the formation as shown in FIGS. 7 and 8.

Formation fluids may be produced through production wells 512, as shown in FIGS. 141 and 142. In certain embodiments, production wells 512 are placed in upper portion 1676 of hydrocarbon layer 522. Production well 512 may be placed proximate overburden 524. For example, production well 512 may be placed about 1 m to about 20 m from overburden 524, about 1 m to about 4 m from the overburden, or possibly about 1 m to about 3 m from the overburden. In some embodiments, at least some formation fluids are produced through heat sources 508A, 508B or selected heat sources.

In some embodiments, a pressurizing fluid (e.g., a gas) is provided to a relatively permeable formation to increase mobility of hydrocarbons within the formation. Providing a pressurizing fluid may increase a shear rate applied to hydrocarbon fluids in the formation and decrease the viscosity of hydrocarbon fluids within the formation. In some embodiments, pressurizing fluid is provided to the selected section before significant heating of the formation. Pressurizing fluid injection may increase a portion of the formation available for production. Pressurizing fluid injection may increase a ratio of energy output of the formation (i.e., energy content of products produced from the formation) to energy input into the formation (i.e., energy costs for treating the formation).

As shown in FIG. 141, injection well 606 may be placed in the formation to introduce the pressurizing fluid into the formation. Injection well 606 may, in certain embodiments, be placed between two heat sources 508A, 508B. However, a location of an injection well may be varied. In certain embodiments, a pressurizing fluid is injected through a heat source or production well placed in a relatively permeable formation. In some embodiments, more than one injection well 606 is placed in the formation. The pressurizing fluid may include gases such as carbon dioxide, $N_2$, steam, $CH_4$, and/or mixtures thereof. In some embodiments, fluids produced from the formation (e.g., combustion gases, heater exhaust gases, or produced formation fluids) may be used as pressurizing fluid. Providing the pressurizing fluid may increase a pressure in a selected section of the formation. The pressure in the selected section may be maintained below a selected pressure. For example, the pressure may be maintained below about 150 bars absolute, about 100 bars absolute, or about 50 bars absolute. In some embodiments, the pressure may be maintained below about 35 bars absolute. Pressure may be varied depending on a number of factors (e.g., desired production rate or an initial viscosity of tar in the formation). Injection of a gas into the formation may result in a viscosity reduction of some of the tar in the formation.

In some embodiments, pressure is maintained by controlling flow (e.g., injection rate) of the pressurizing fluid into the selected section. In other embodiments, the pressure is controlled by varying a location for injecting the pressurizing fluid. In other embodiments, pressure is maintained by controlling a pressure and/or production rate at production wells 512.

In certain embodiments, heat sources may be used to generate a path for a flow of fluids between an injection well and a production well. The viscosity of heavy hydrocarbons at or near a heat source is reduced by the heat provided from the heat source. The reduced viscosity hydrocarbons may be immobile until a path is created for flow of the hydrocarbons. The path for flow of the hydrocarbons may be created by placing an injection well and a production well at different positions along the length of the heat source and proximate the heat source. A pressurizing fluid provided through the injection well may produce a flow of the reduced viscosity hydrocarbons towards the production well.

FIG. 143 depicts a schematic of an embodiment for injecting a pressurizing fluid in a formation. Heat source 508 may be placed substantially horizontally within opening 544 in hydrocarbon layer 522. The substantially horizontal portion of opening 544 may be placed in a lower portion of hydrocarbon layer 522 and/or proximate the bottom of the hydrocarbon layer. Perforations 1680 may be located in the heel of heat source 508. Injection wells 606 may be placed substantially vertically in hydrocarbon layer 522. At least one injection well 606 may be placed near the toe of heat source 508. Another injection well 606 may be placed proximate the midline of the horizontal section of heat source 508. More or less injection wells 606 may be used depending on, for example, the size of hydrocarbon layer 522, a desired production rate, etc.

Heat source 508 may provide heat to hydrocarbon layer 522 to reduce the viscosity of hydrocarbons in the formation. The viscosity of hydrocarbons at or near heat source 508 decreases earlier than hydrocarbons further away from the heat sources because of the radial propagation of heat fronts away from the heat sources. A pressurizing fluid (e.g., steam) may be provided into the formation through injection wells 606. The pressurizing fluid may produce a flow of the reduced viscosity hydrocarbons towards perforations 1680. Hydrocarbons and/or other fluids may be produced through perforations 1680 and from the formation along a length of opening 544. The produced fluids may be further heated along the length of opening 544 by heat source 508 to maintain produced fluids in a vapor phase and/or further crack produced fluids along the length of the heat source. The flow of fluids in hydrocarbon layer 522 are represented by the arrows in FIG. 143. The flow may be controlled by an injection rate of the pressurizing fluid and/or a pressure in opening 544.

FIG. 144 depicts a schematic of another embodiment for injecting a pressurizing fluid into hydrocarbon layer 522. As shown in FIG. 144, injection well 606 may be placed substantially horizontally in hydrocarbon layer 522. Injection well 606 may also be placed proximate the top of hydrocarbon layer 522 and/or in an upper portion of the hydrocarbon layer. Heat source 508 may be placed substantially horizontally within opening 544 in hydrocarbon layer 522. The substantially horizontal portion of opening 544 may be placed in a lower portion of hydrocarbon layer 522 and/or proximate the bottom of the hydrocarbon layer. Opening 544 may, in certain embodiments, be a cased opening with perforations 1680 placed proximate the toe of heat source 508. The flow of reduced viscosity hydrocarbons produced by injection of a pressurizing fluid (e.g., steam) may be along the length of heat source 508 between an end of injection well 606 proximate opening 544 and towards perforations 1680 as represented by the arrows in FIG. 144. Mobilized fluids (e.g., hydrocarbons, pressurizing fluid, etc.) may be produced through perforations 1680. The produced fluids may be further heated along the length of opening 544 by heat source 508 to maintain produced fluids in a vapor phase and/or further crack produced fluids along the length of the heat source.

FIG. 145A depicts a schematic of an embodiment for injecting a pressurizing fluid into hydrocarbon layer 522. Injection well 606 may be placed substantially horizontally within hydrocarbon layer 522. Injection well 606 may also be placed proximate the top of hydrocarbon layer 522 and/or in an upper portion of the hydrocarbon layer. Heat sources 508 may be placed within opening 544 in hydrocarbon layer 522. Heat sources 508 may have toe portions that proximately meet, but do not necessarily touch, near a midsection of the substantially horizontal portion of opening 544. The substantially horizontal portion of opening 544 may be placed in a lower portion of hydrocarbon layer 522 and/or proximate the bottom of the hydrocarbon layer. Perforations 1680 may be placed at or near the heel of one heat source 508. The flow of reduced viscosity hydrocarbons produced by injection of a pressurizing fluid (e.g., steam) through injection well 606 may be from proximate a top portion of one heat source 508 and along a length of opening 544 towards perforations 1680 as shown by the arrows in FIG. 145A. Mobilized fluids (e.g., hydrocarbons, pressurizing fluid, etc.) may be produced through perforations 1680. The produced fluids may be further heated along the length of opening 544 by heat source 508 to maintain produced fluids in a vapor phase and/or further crack produced fluids along the length of the heat source.

FIG. 145B depicts a schematic of an embodiment for injecting a pressurizing fluid into hydrocarbon layer 522. As shown by the arrows in FIG. 145B, fluids may be produced from an end of opening 544 opposite of an end in which the fluids are produced in the embodiment of FIG. 145A. Producing the fluids as shown in FIG. 145B may increase the time that produced fluids are exposed to heat from heat sources 508. Increasing the heating of the produced fluids may increase cracking and/or upgrading of the produced fluids.

FIG. 146 depicts a schematic of another embodiment for injecting a pressurizing fluid into hydrocarbon layer 522. Injection well 606 may be placed substantially vertically in hydrocarbon layer 522. Production well 512 may be placed substantially vertically in hydrocarbon layer 522. In some embodiments, production well 512 may be heated to maintain produced fluids in a vapor phase and/or further crack produced fluids along the length of the production well.

As shown in FIG. 146, heat source 508 may be placed substantially horizontally within opening 544 in hydrocarbon layer 522. The substantially horizontal portion of opening 544 may be placed in a lower portion of hydrocarbon layer 522 and/or proximate the bottom of the hydrocarbon layer. Opening 544 may, in certain embodiments, be a cased opening. The flow of reduced viscosity hydrocarbons produced by injection of a pressurizing fluid (e.g., steam) may be along the length of heat source 508 between an end of injection well 606 proximate the heel of the heat source and towards an end of production well 512 proximate the toe of the heat source as represented by the arrows in FIG. 146. Mobilized fluids (e.g., hydrocarbons, pressurizing fluid, etc.) may be produced through perforations 1680 in production well 512.

In an embodiment, after a flow of hydrocarbons has been created in hydrocarbon layer 522, heat sources 508 may be turned down and/or off. Turning down and/or off heat sources 508 may save on energy costs for producing fluids from the formation. Fluids may continue to be produced from hydrocarbon layer 522 using injection of pressurizing fluid to mobilize and sweep fluids towards perforations 1680 and/or production well 512. In certain embodiments, the pressurizing fluid may be heated to elevated temperatures at the surface (e.g., in a heat exchange unit). The heated pressurizing fluid may be used to provide some heat to hydrocarbon layer 522. In an embodiment, heated pressurizing fluid may be used to maintain a temperature in the formation after reducing and/or turning off heat provided by heat sources 508.

Providing the pressurizing fluid in the selected section may increase sweeping of hydrocarbons from the formation (i.e., increase the total amount of hydrocarbons heated and produced in the formation). Increased sweeping of hydrocarbons in the formation may increase total hydrocarbon recovery from the formation. In some embodiments, greater than about 50% by weight of the initial estimated mass of hydrocarbons may be produced from the formation. In other embodiments, greater than about 60% by weight or greater than about 70% by weight of the initial estimated mass of hydrocarbons may be produced from the formation.

In an embodiment, greater than about 60% by volume of the initial volume in place of hydrocarbons in the formation are produced. In other embodiments, greater than about 70% by volume or greater than about 80% by volume of the initial volume in place of hydrocarbons may be produced from a formation.

In an embodiment, a portion of a relatively permeable formation may be heated to increase a partial pressure of $H_2$. The partial pressure of $H_2$ may be measured at a production well, a monitoring well, a heater well and/or an injection well. In some embodiments, an increased $H_2$ partial pressure may include $H_2$ partial pressures in a range from about 0.5 bars absolute to about 7 bars absolute. Alternatively, an increased $H_2$ partial pressure range may include $H_2$ partial pressures in a range from about 5 bars absolute to about 7 bars absolute. For example, a majority of hydrocarbon fluids may be produced wherein a $H_2$ partial pressure is within a range of about 5 bars absolute to about 7 bars absolute. A range of $H_2$ partial pressures within the pyrolysis $H_2$ partial pressure range may vary depending on, for example, temperature and pressure of the heated portion of the formation.

In an embodiment, pressure within a formation may be controlled to enhance production of hydrocarbons of a desired carbon number distribution. Low formation pressure may favor production of hydrocarbons having a high carbon number distribution (e.g., condensable hydrocarbons). Low pressure in the formation may reduce the cracking of hydrocarbons into lighter hydrocarbons. Thus, reducing pressure in the formation may increase the production of condensable hydrocarbons and lower the production of non-condensable hydrocarbons. Operating at lower pressure in the formation may inhibit the production of carbon dioxide in the formation and/or increase the recovery of hydrocarbons from the formation.

Pressure within a relatively permeable formation may be controlled and/or reduced by creating a pressure sink within the formation. In an embodiment, a first section of the formation may be heated prior to other sections (i.e., adjacent sections) of the formation. At least some hydrocarbons within the first section may be pyrolyzed during heating of the first section. Pyrolyzed hydrocarbons (e.g., light hydrocarbons) from the first section may be produced before or during start-up of heating in other sections (i.e., during early times of heating before temperatures within the other sections reach pyrolysis temperatures). In some embodiments, some un-pyrolyzed hydrocarbons (e.g., heavy hydrocarbons) may be produced from the first section. The un-pyrolyzed hydrocarbons may be produced during early times of heating when temperatures within the first section are below pyrolysis temperatures. Producing fluid from the first section may establish a pressure gradient in the formation with the lowest pressure located at the production wells.

When a section of formation adjacent to the first section is heated, heat applied to the formation may mobilize the hydrocarbons. Mobilized liquid hydrocarbons may move downwards by gravity drainage. Mobilized vapor hydrocarbons may move towards the first section due to a pressure gradient caused by production of fluids from the first section. Movement of mobilized vapor hydrocarbons towards the first section may inhibit excess pressure buildup in the sections being heated and/or pyrolyzed. Temperature of the first section may be maintained above a condensation temperature of desired hydrocarbon fluids that are to be produced from the production wells in the first section.

Producing fluids from other sections through production wells in the first section may reduce the number of production wells needed to produce fluids from a formation. Pressure in the other sections (e.g., pressures at and adjacent to heat sources in the other sections) of the formation may remain low. Low formation pressure may be maintained even in relatively deep relatively permeable formations. For example, a formation pressure may be maintained below about 15 bars absolute in a formation that is about 220 m below the surface.

Controlling the pressure in the sections being heated may inhibit casing collapse in the heat sources. Controlling the pressure in the sections being heated may inhibit excessive coke formation on and adjacent to the heat sources. Pressure in the sections being heated may be controlled by controlling production rate of fluid from production wells in adjacent sections and/or by releasing pressure at or adjacent to heat sources in the section being heated.

FIG. 147 depicts a cross-sectional representation of an embodiment for treating a relatively permeable formation.

Heat sources 508 may be used to provide heat to sections 1682, 1684, 1686 of hydrocarbon layer 522. Heat sources 508 may be placed in a similar pattern as shown in the embodiment of FIG. 140. Production well 512 may be placed a center of first section 1682. Production well 512 may be placed substantially horizontally within first section 1682. Other locations and/or orientations for production well 512 may be used depending on, for example, a desired production rate, a desired product quality or characteristic, etc.

In an embodiment, heat may be provided to first section 1682 from heat sources 508. Heat provided to first section 1682 may mobilize at least some hydrocarbons within the first section. Hydrocarbons within first section 1682 may be mobilized at temperatures above about 50° C. or, in some embodiments, above about 75° C. or above about 100° C. In an embodiment, production of mobilized hydrocarbons may be inhibited until pyrolysis temperatures are reached in first section 1682. Inhibiting the production of hydrocarbons while increasing temperature within first section 1682 tends to increase the pressure within the first section. In some embodiments, at least some mobilized hydrocarbons may be produced through production well 512 to inhibit excessive pressure buildup in the formation. The produced mobilized hydrocarbons may include heavy hydrocarbons, liquid-phase light hydrocarbons, and/or un-pyrolyzed hydrocarbons. In certain embodiments, only a portion of the mobilized hydrocarbons is produced, such that the pressure in first section 1682 is maintained below a selected pressure. The selected pressure may be, for example, a lithostatic pressure, a hydrostatic pressure, or a pressure selected to produce a desired product characteristic.

In an embodiment, heat may be provided to first section 1682 from heat sources 508 to increase temperatures within the first section to pyrolysis temperatures. Pyrolysis temperatures may include temperatures above about 250° C. In some embodiments, pyrolysis temperatures may be above about 270° C., 300° C., or 325° C. Pyrolyzed hydrocarbons from first section 1682 may be produced through production well 512 or production wells. During production of hydrocarbons through production well 512 or production wells, heat may be provided to second sections 1684 from heat sources 508 to mobilize hydrocarbons within the second section. Further heating of second sections 1684 may pyrolyze at least some hydrocarbons within the second section. Heat may also be provided to third sections 1686 from heat sources 508 to mobilize and/or pyrolyze hydrocarbons within the third section. In some embodiments, heat sources 508 in third sections 1686 may be turned on after heat sources 508 in second sections 1684. In other embodiments, heat sources 508 in third sections 1686 are turned on simultaneously with heat sources 508 in second sections 1684.

Producing hydrocarbons from first section 1682 at production well 512 or production wells may create a pressure sink at the production well. The pressure sink may be a low pressure zone around production well 512 or production wells as compared to the pressure in the formation. Fluids from second sections 1684 and third sections 1686 may flow towards production well 512 or production wells because of the pressure sink at the production well. The fluids that flow towards production well 512 may include at least some vapor phase light hydrocarbons. In some embodiments, the fluids may include some liquid phase hydrocarbons. The flow of fluids towards production well 512 may maintain lower pressures in second sections 1684 and third sections 1686 than if the fluids remain within these sections and are heated to higher temperatures. In addition, fluids that flow towards production well 512 may have a shorter residence time in the heated sections and undergo less pyrolyzation than fluids that remain within the heated sections. At least a portion of fluids from second sections 1684 and/or third sections 1686 may be produced through production well 512. In certain embodiments, one or more production wells may be placed in second sections 1684 and/or third sections 1686 to produce at least some hydrocarbons from these sections.

After substantial production of the hydrocarbons that are initially present in each of the sections (first section 1682, second sections 1684, and third sections 1686), heat sources 508 in each of the sections may be turned down and/or off to reduce the heat provided to the section. Turning down and/or off heat sources 508 may reduce energy input costs for heating the formation. In addition, turning down and/or off heat sources 508 may inhibit further cracking of hydrocarbons as the hydrocarbons flow towards production well 512 and/or other production wells in the formation. In an embodiment, heat sources 508 in first section 1682 are turned off before heat sources 508 in second sections 1684 or heat sources 508 in third sections 1686. The time and duration each heat source 508 in each section 1682, 1684, 1686 is turned on may be determined based on experimental and/or simulation data.

The flow of fluids towards production well 512 may increase the recovery of hydrocarbons from the formation. Generally, decreasing the pressure in the formation tends to increase the cumulative recovery of hydrocarbons from the formation and decrease the production of non-condensable hydrocarbons from the formation. Decreasing the production of non-condensable hydrocarbons may result in a decrease in the API gravity of a mixture produced from the formation. In some embodiments, a pressure may be selected to balance a desired API gravity in the produced mixture with a recovery of hydrocarbons from the formation. The flow of fluids towards production well 512 may increase a sweep efficiency of hydrocarbons from the formation. Increased sweep efficiency may result in increased recovery of hydrocarbons from the formation.

In certain embodiments, pressure within the formation may be selected to produce a mixture from the formation with a desired quality. Pressure within the formation may be controlled by, for example, controlling heating rates within the formation, controlling the production rate through production well 512 or production wells, controlling the time for turning on heat sources 508, controlling the duration for using heat sources 508, etc. Pressures within the formation along with other operating conditions (e.g., temperature, production rate, etc.) may be selected and controlled to produce a mixture with desired qualities. In certain embodiments, pressure and/or other operating conditions in the formation may be selected based on a price characteristic of the produced mixture.

In some embodiments, one or more injection wells may be placed in the formation. The one or more injection wells may be used to inject a pressurizing fluid into the formation. Injecting a pressurizing fluid into the formation may be used to increase the recovery of hydrocarbons from the formation and/or to increase a pressure in the formation. Controlling the flow rate of pressurizing fluid may control pressure in the formation.

In certain embodiments, a substantial portion of hydrocarbons from a formation may be recovered (i.e., produced) in a single pass in situ recovery process. A single pass in situ recovery process may include staged heating of the formation and/or a single step of injecting fluid into the formation. Typically, multiple pass processes (e.g., secondary or tertiary pass processes) include multiple steps of injecting liquids or gases into a formation to promote recovery from the formation. For example, steam flood recovery from a tar sands formation may include more than one step of injecting steam into the formation and/or recycling of fluids (e.g., steam or product fluids) back into the formation for further recovery. The recovery efficiency for hydrocarbons in a single pass in situ recovery process may be improved compared to the recovery efficiency of multiple fluid injection step processes. In addition, a single pass in situ recovery process may produce a relatively flat production rate through the process. The relatively flat production rate may reduce or minimize treatment facility requirements needed for treatment of product fluids. Typically, large treatment facilities are required in multiple step processes for the large initial production of fluid, while during subsequent production steps the production rate steeply decreases resulting in unused treatment facility capacity.

Producing formation fluids in the upper portion of the formation may allow for production of hydrocarbons substantially in a vapor phase. Lighter hydrocarbons may be produced from production wells placed in the upper portion of the hydrocarbon containing formation. Hydrocarbons produced from an upper portion of the formation may be upgraded as compared to hydrocarbons produced from a lower portion of the formation. Producing through wells in the upper portion may also inhibit coking of produced fluids at the production wellbore. Producing through wells placed in a lower portion of the formation may produce a heavier hydrocarbon fluid than is produced in the upper portion of the formation. The heavier hydrocarbon fluid may contain substantial amounts of cold bitumen or tar. Cold bitumen or tar production tends to be decreased when producing through wells placed in the upper portion of the formation. In some embodiments, the upper portion of the formation may include an upper half of the formation. However, a size of the upper portion may vary depending on several factors (e.g., a thickness of the formation, vertical permeability of the formation, a desired quality of produced fluid, or a desired production rate).

In some embodiments, a quality of a mixture produced from a formation is controlled by varying a location for producing the mixture within the formation. The quality of the mixture produced may be rated on a variety of factors (e.g., API gravity of the mixture, carbon number distribution, a weight ratio of components in the mixture, and/or a partial pressure of hydrogen in the mixture). Other qualities of the mixture may include, but are not limited to, a ratio of heavy hydrocarbons to light hydrocarbons in the mixture and/or a ratio of aromatics to paraffins in the mixture. In one embodiment, the location for producing the mixture is varied by varying a location of a production well within the formation. For example, the quality of the mixture can be varied by varying a distance between a production well and a heat source. Locating the production well closer to the heat source may increase cracking at or near the production well, thus, increasing, for example, an API gravity of the mixture produced. In some embodiments, a number of production wells in a portion of the formation or a production rate from a portion of the formation may be used to control the quality of a mixture produced.

In some embodiments, varying a location for production includes varying a portion of the formation from which the mixture is produced. For example, a mixture may be produced from an upper portion of the formation, a middle portion of the formation, and/or a lower portion of the formation at various times during production from a formation. Varying the portion of the formation from which the mixture is produced may include varying a depth of a production well within the formation and/or varying a depth for producing the mixture within a production well. In certain embodiments, the quality of the produced mixture is increased by producing in an upper portion of the formation rather than a middle or lower portion of the formation. Producing in the upper portion tends to increase the amount of vapor phase and/or light hydrocarbon production from the formation. Producing in lower portions of the formation may decrease a quality of the produced mixture; however, a total mass recovery from the formation and/or a portion of the formation selected for treatment (i.e., a weight percentage of initial mass of hydrocarbons in the formation, or in the selected portion, produced) can be increased by producing in lower portions (e.g., the middle portion or lower portion of the formation). Producing in the lower portion may, in some embodiments, provide the highest total mass recovery, energy recovery, and/or a better energy balance.

In certain embodiments, an upper portion of the formation includes about one-third of the formation closest to an overburden of the formation. The upper portion of the formation, however, may include up to about 35%, 40%, or 45% of the formation closest to the overburden. A lower portion of the formation may include a percentage of the formation closest to an underburden, or base rock, of the formation that is substantially equivalent to the percentage of the formation that is included in the upper portion. A middle portion of the formation may include the remainder of the formation between the upper portion and the lower portion. For example, the upper portion may include about one-third of the formation closest to the overburden while the lower portion includes about one-third of the formation closest to the underburden and the middle portion includes the remaining third of the formation between the upper portion and the lower portion. FIG. 148 (described below) depicts embodiments of upper portion 1688, middle portion 1690, and lower portion 1692 in hydrocarbon layer 522 along with production well 512.

In some embodiments, the lower portion includes a different percentage of the formation than the upper portion. For example, the upper portion may include about 30% of the formation closest to the overburden while the lower portion includes about 40% of the formation closest to the underburden and the middle portion includes the remaining 30% of the formation. Percentages of the formation included in the upper, middle, and lower portions of the formation may vary depending on, for example, placement of heat sources in the formation, spacing of heat sources in the formation, a structure of the formation (e.g., impermeable layers within the formation), etc. In some embodiments, a formation may include only an upper portion and a lower portion. In addition, the percentages of the formation included in the upper, middle, and lower portions of the formation may vary due to variation of permeability within the formation. In some formations, permeability may vary vertically within the formation. For example, the permeability in the formation may be lower in an upper portion of the formation than a lower portion of the formation.

In some cases, the upper, middle, and lower portions of a hydrocarbon containing formation may be determined by characteristics of the portions. For example, a middle portion may include a portion that is high enough within the formation to not allow heavy hydrocarbons to settle in the portion after at least some hydrocarbons have been mobilized. A bottom portion may be a portion where the heavy hydrocarbons are substantially settled after mobilization due to gravity drainage. A top portion may be a portion where production is substantially vapor phase production after mobilization of at least some heavy hydrocarbons.

In an embodiment, selecting the location for producing a mixture from a formation includes selecting the location based on a price characteristic for the produced mixture. The price characteristic may be a price characteristic of hydrocarbons produced from the formation. The price characteristic may be determined by multiplying a production rate of the produced mixture at a selected API gravity by a price obtainable for selling the produced mixture with the selected API gravity. In some embodiments, the price characteristic may be determined as a function of the API gravity of the produced mixture, the total mass recovery from the formation, a price obtainable for selling the produced mixture, and/or other factors affecting production of the mixture from the formation. Other characteristics, however, may also be included in the price characteristic. For example, other characteristics may include, but are not limited to, a selling price of hydrocarbon components in the produced mixture, a selling price of sulfur produced, a selling price of metals produced, a ratio of paraffins to aromatics produced, and/or a weight percentage of heavy hydrocarbons in the mixture.

In some instances, the price characteristic may change during production of the mixture from the formation. The price characteristic may change, for example, based on a change in the selling price of the produced mixture or of a hydrocarbon component in the mixture. In such a case, a parameter for producing the mixture may be adjusted based on the change in the price characteristic. In an embodiment, the parameter for producing the mixture is a location for producing the mixture within the formation.

In some embodiments, the parameter may include operating conditions within the formation that are controlled based on the price characteristic. Operating conditions may include parameters such as, but not limited to, pressure, temperature, heating rate, and heat output from one or more heat sources. Operating conditions within the formation may be adjusted based on a change in the price characteristic during production of the mixture from the formation.

In certain embodiments, the price characteristic may be based on a relationship between cumulative oil (hydrocarbon) recovery and API gravity. Generally, increasing the API gravity produced from a formation by an in situ conversion process tends to decrease the cumulative hydrocarbon recovery from the formation (i.e., total mass recovery). In an embodiment, the relationship between API gravity of the produced hydrocarbons and total mass recovery is a linear relationship. The linear relationship may be based on, for example, experimental data (e.g., pyrolysis data) and/or simulation data (e.g., STARS simulation data).

FIG. 149 depicts linear relationships between total mass recovery (recovery (vol %)) versus API gravity (°) of the produced hydrocarbons for three different tar sands formations. Athabasca (Canada) tar sands 1694 shows the highest recovery for a value of API gravity. Athabasca shows the highest recovery because Athabasca tar sands have the highest initial API gravity. Cerro Negro (Venezuela) tar sands 1696 shows a slightly lower recovery for a value of API gravity. Santa Cruz (United States) tar sands 1698 shows the lowest recovery for a value of API gravity. Santa Cruz shows the lowest recovery because Santa Cruz tar sands have the lowest initial API gravity. Other hydrocarbon containing formations may be tested similarly to produce similar plots. These relationships may be used to determine a desired operating range for treating a hydrocarbon containing formation. For example, the linear relationship between recovery and API gravity may be used to determine a best operating range (e.g., a desired API gravity produces a specific recovery value) based on market conditions such as the price of oil.

In an embodiment, a location from which the mixture is produced is varied by varying a production depth within a production well. The mixture may be produced from different portions of, or locations in, the formation to control the quality of the produced mixture. A production depth within a production well may be adjusted to vary a portion of the formation from which the mixture is produced. In some embodiments, the production depth is determined before producing the mixture from the formation. In other embodiments, the production depth may be adjusted during production of the mixture to control the quality of the produced mixture. In certain embodiments, production depth within a production well includes varying a production location along a length of the production wellbore. For example, the production location may be at any depth along the length of a substantially vertical production wellbore located within the formation or at any position along the length of a substantially horizontal production wellbore. Changing the depth of the production location within the formation may change a quality of the mixture produced from the formation.

In some embodiments, varying the production location within a production well includes varying a packing height within the production well. For example, the packing height may be changed within the production well to change the portion of the production well that produces fluids from the formation. Packing within the production well tends to inhibit production of fluids at locations where the packing is located. In other embodiments, varying the production location within a production well includes varying a location of perforations on the production wellbore used to produce the mixture. Perforations on the production wellbore may be used to allow fluids to enter into the production well. Varying the location of these perforations may change a location or locations at which fluids can enter the production well.

FIG. 148 depicts a cross-sectional representation of an embodiment of production well 512 placed in hydrocarbon layer 522. Hydrocarbon layer 522 may include upper portion 1688, middle portion 1690, and lower portion 1692. Production well 512 may be placed within all three portions 1688, 1690, 1692 within hydrocarbon layer 522 or within only one or more portions of the formation. As shown in FIG. 148, production well 512 may be placed substantially vertically within hydrocarbon layer 522. Production well 512, however, may be placed at other angles (e.g., horizontal or at other angles between horizontal and vertical) within hydrocarbon layer 522 depending on, for example, a desired product mixture, a depth of overburden 524, a desired production rate, etc.

Packing material 1100 may be placed within production well 512. Packing material 1100 tends to inhibit production of fluids at locations of the packing within the wellbore (i.e., fluids are inhibited from flowing into production well 512 at the packing material). A height of packing material 1100 within production well 512 may be adjusted to vary the depth in the production well from which fluids are produced. For example, increasing the packing height decreases the maximum depth in the formation at which fluids may be produced through production well 512. Decreasing the packing height will increase the depth for production. In some embodiments, layers of packing material 1100 may be placed at different heights within the wellbore to inhibit production of fluids at the different heights. Conduit 1700 may be placed through packing material 1100 to produce fluids entering production well 512 beneath the packing layers.

One or more perforations 1680 may be placed along a length of production well 512. Perforations 1680 may be used to allow fluids to enter into production well 512. In certain embodiments, perforations 1680 are placed along an entire length of production well 512 to allow fluids to enter into the production well at any location along the length of the production well. In other embodiments, locations of perforations 1680 may be varied to adjust sections along the length of production well 512 that are used for producing fluids from the formation. In some embodiments, one or more perforations 1680 may be closed (shut-in) to inhibit production of fluids through the one or more perforations. For example, a sliding member may be placed over perforations 1680 that are to be closed to inhibit production. Certain perforations 1680 along production well 512 may be closed or opened at selected times to allow production of fluids at different locations along the production well at the selected times.

In one embodiment, a first mixture is produced from upper portion 1688. A second mixture may be produced from middle portion 1690. A third mixture may be produced from lower portion 1692. The first, second, and third mixtures may be produced at different times during treatment of the formation. For example, the first mixture may be produced before the second mixture or the third mixture and the second mixture may be produced before the third mixture. In certain embodiments, the first mixture is produced such that the first mixture has an API gravity greater than about 20°. The second mixture or the third mixture may also be produced such that each mixture has an API gravity greater than about 20°. A time at which each mixture is produced with an API gravity greater than about 20° may be different for each of the mixtures. For example, the first mixture may be produced at an earlier time than either the second or the third mixture. The first mixture may be produced earlier because the first mixture is produced from upper portion 1688. Fluids in upper portion 1688 tend to have a higher API gravity at earlier times than fluids in middle portion 1690 or lower portion 1692 due to gravity drainage of heavier fluids (e.g., heavy hydrocarbons) in the formation and/or higher vapor phase production in higher portions of the formation.

In an embodiment, a fluid produced from a portion of a relatively permeable formation by an in situ process may include nitrogen containing compounds. For example, less than about 0.5 weight % of the condensable fluid may include nitrogen containing compounds or, for example, less than about 0.1 weight % of the condensable fluid may include nitrogen containing compounds. In addition, a fluid produced by an in situ process may include oxygen containing compounds (e.g., phenolics). For example, less than about 1 weight % of the condensable fluid may include oxygen containing compounds or, for example, less than about 0.5 weight % of the condensable fluid may include oxygen containing compounds. A fluid produced from a relatively permeable formation may also include sulfur containing compounds. For example, less than about 5 weight % of the condensable fluid may include sulfur containing compounds or, for example, less than about 3 weight % of the condensable fluid may include sulfur containing compounds. In some embodiments, a weight percent of nitrogen containing compounds, oxygen containing compounds, and/or sulfur containing compounds in a condensable fluid may be decreased by increasing a fluid pressure in a relatively permeable formation during an in situ process.

In an embodiment, condensable hydrocarbons of a fluid produced from a relatively permeable formation may include aromatic compounds. For example, greater than about 20 weight % of the condensable hydrocarbons may include aromatic compounds. In another embodiment, an aromatic compound weight percent may include greater than about 30 weight % of the condensable hydrocarbons. The condensable hydrocarbons may also include di-aromatic compounds. For example, less than about 20 weight % of the condensable hydrocarbons may include di-aromatic compounds. In another embodiment, di-aromatic compounds may include less than about 15 weight % of the condensable hydrocarbons. The condensable hydrocarbons may also include tri-aromatic compounds. For example, less than about 4 weight % of the condensable hydrocarbons may include tri-aromatic compounds. In another embodiment, less than about 1 weight % of the condensable hydrocarbons may include tri-aromatic compounds.

In certain embodiments, some precipitation and/or non-dissolution of asphaltenes may occur in heavy hydrocarbons and/or heavy hydrocarbons mixed with light hydrocarbons within a relatively permeable formation during a recovery process. Precipitation and/or non-dissolution of the asphaltenes may increase the quality of hydrocarbons produced from the formation. In some cases, the precipitated and/or non-dissolved asphaltenes may be produced through further heating of the formation and/or injection of recovery fluid into the formation (e.g., injection of a light hydrocarbon mixture or blending agent to form a producible mixture including the asphaltenes).

In some embodiments, hydrocarbon fluids produced from a hydrocarbon containing formation may have a relatively low acid number. "Acid number" is defined as the number of milligrams of KOH (potassium hydroxide) required to neutralize one gram of oil (i.e., bring the oil to a pH of 7). Higher acid hydrocarbon fluids (e.g., greater than about 1 mg/gram KOH) are typically more expensive to refine and generally considered to have a less desirable quality. Generally, fluids with acid numbers less than about 1 are desired. Heavy hydrocarbon fluids produced from hydrocarbon containing formations using standard production techniques such as cold production or steam flooding may have a high acid number due to the presence of naphthenic, humic, or other acids in the produced hydrocarbons. Hydrocarbon fluids produced from a formation using an in situ recovery process (e.g., pyrolyzed fluids) may have a lower acid number due to acid-reducing reactions during heating of the formation. For example, decarboxylation may reduce the amount of carboxylic acids in the formation during heating/pyrolyzation. In an embodiment, hydrocarbon fluids produced from a relatively permeable formation have an acid number near zero. In certain embodiments, hydrocarbon fluids produced from a formation have acid numbers less than about 1 mg/gram KOH, less than about 0.8 mg/gram KOH, less than about 0.6 mg/gram KOH, less than about 0.5 mg/gram KOH, less than about 0.25 mg/gram KOH, or less than about 0.1 mg/gram KOH.

In certain embodiments, a portion of the formation proximate a production well may be hotter than other portions of the formation (e.g., an average temperature above about 300° C.). The increased temperature of the portion of the formation proximate the production well may be produced by additional heat provided by a heater placed within the production well, an additional heat source proximate the production well, and/or natural heating within the portion. Having an increased temperature in the portion proximate the production well may increase and/or upgrade a quality of hydrocarbons produced through the production well (e.g., by increased cracking or thermal upgrading of the hydrocarbons). In addition, a quality of hydrocarbons produced may be further increased by cracking of hydrocarbons or reaction of hydrocarbons within the production well.

Increasing heating proximate a production well, however, may increase the possibility of coking at the production well.

In some embodiments, operating conditions within the formation may be controlled to inhibit coking of a production well. In one embodiment, heat output from a heat source proximate the production well may be controlled to inhibit coking of the production well. For example, the heat source can be turned down and/or off when conditions (e.g., temperature) at the production well begin to favor coking at the production well. For example, coke may form at temperatures above about 400° C. In certain embodiments, heat provided from the heat source may be turned down and/or off during a time at which a mixture is produced through the production well. The heat provided may be turned on and/or increased when the quality of produced fluid is below a desired quality. In another embodiment, a production well is located at a sufficient distance from each of the heat sources in the formation such that a temperature at the production well inhibits coking at the production well.

In other embodiments, steam may be added to the formation by adding water or steam through a conduit in a production well or other wellbore. In some embodiments, steam may be produced by evaporation of water within the formation. The additional steam may inhibit coke formation proximate the production well. The steam may react with the coke to form carbon dioxide, carbon monoxide, and/or hydrogen. In certain embodiments, air may be periodically injected through a conduit (e.g., a conduit in a production well) to oxidize any coke formed at or near a production well.

In an embodiment of a system using heat sources, a material (e.g., a cement and/or polymer foam) may be injected into the formation to inhibit fingering and/or breakthrough of gases within the formation. The material may inhibit fluid flow through channels adjacent to the heat sources. The use of such a material may provide a more uniform flow of mobilized fluids and increase the recovery of fluids from the formation.

An in situ process may be used to provide heat to mobilize and/or pyrolyze hydrocarbons within a relatively permeable formation to produce hydrocarbons from the formation that are not technically or economically producible using current production techniques such as surface mining, solution extraction, steam injection, etc. Such hydrocarbons may exist in relatively deep, relatively permeable formations. For example, such hydrocarbons may exist in a relatively permeable formation that is greater than about 500 m below a ground surface but less than about 700 m below the surface. Hydrocarbons within these relatively deep, relatively permeable formations may still be at a relatively cool temperature such that the hydrocarbons are substantially immobile. Hydrocarbons found in deeper formations (e.g., a depth greater than about 700 m below the surface) may be somewhat more mobile due to increased natural heating of the formations as formation depth increases below the surface. Typically, the temperature in the formation increases about 2° C. to about 4° C. for every 100 meters in depth below the surface. The temperature at a certain depth may vary, however, depending on, for example, the surface temperature which may be anywhere from about −5° C. to about 30° C. Hydrocarbons may be more readily produced from these deeper formations because of their mobility. However, these hydrocarbons will generally be heavy hydrocarbons with an API gravity below about 20°. In some embodiments, the API gravity may be below about 15° or below about 10°.

Heavy hydrocarbons produced from a relatively permeable formation may be mixed with light hydrocarbons so that the heavy hydrocarbons can be transported to a treatment facility (e.g., pumping the hydrocarbons through a pipeline). In some embodiments, the light hydrocarbons (such as naphtha or gas condensate) are brought in through a second pipeline (or are trucked) from other areas (such as a treatment facility or another production site) to be mixed with the heavy hydrocarbons. The cost of purchasing and/or transporting the light hydrocarbons to a formation site can add significant cost to a process for producing hydrocarbons from a formation. In an embodiment, producing the light hydrocarbons at or near a formation site (e.g., less than about 100 km from the formation site) that produces heavy hydrocarbons instead of using a second pipeline for supply of the light hydrocarbons may allow for use of the second pipeline for other purposes. The second pipeline may be used, in addition to a first pipeline already used for pumping produced fluids, to pump produced fluids from the formation site to a treatment facility. Use of the second pipeline for this purpose may further increase the economic viability of producing light hydrocarbons (i.e., blending agents) at or near the formation site. Another option is to build a treatment facility or refinery at a formation site. However, this can be expensive and, in some cases, not possible.

In an embodiment, light hydrocarbons (e.g., a blending agent) may be produced at or near a formation site that produces heavy hydrocarbons (i.e., near the production site of heavy hydrocarbons). The light hydrocarbons may be mixed with heavy hydrocarbons to produce a transportable mixture. The transportable mixture may be introduced into a first pipeline used to transport fluid to a remote refinery or transportation facility, which may be located more than about 100 km from the production site. The transportable mixture may also be introduced into a second pipeline that was previously used to transport a blending agent (e.g., naphtha, condensate, etc.) to or near the production site. Producing the blending agent at or near the production site may allow the ability to significantly increase throughput to the remote refinery or transportation facility without installation of additional pipelines. Additionally, the blending agent used may be recovered and sold from the refinery instead of being transported back to the heavy hydrocarbon production site. The transportable mixture may also be used as a raw material feed for a production process at the remote refinery.

Throughput of heavy hydrocarbons to an existing remote treatment facility may be a limiting factor in embodiments that use a two pipeline system with one of the pipelines dedicated to transporting a blending agent to the heavy hydrocarbon production site. Using a blending agent produced at or near the heavy hydrocarbon production site may allow for a significant increase in the throughput of heavy hydrocarbons to the remote treatment facility. For example, a pair of pipelines with a blending agent to heavy hydrocarbon ratio of 1:2 may transport twice as much oil if recycling of the blending agent is not necessary. In some embodiments, the blending agent may be used to clean tanks, pipes, wellbores, etc. The blending agent may be used for such purposes without precipitating out components (e.g., asphaltenes or waxes) cleaned from the tanks, pipes, or wellbores.

In an embodiment, heavy hydrocarbons are produced as a first mixture from a first section of a relatively permeable formation. Heavy hydrocarbons may include hydrocarbons with an API gravity below about 20°, 15°, or 10°. Heat provided to the first section may mobilize at least some hydrocarbons within the first section. The first mixture may include at least some mobilized hydrocarbons from the first section. Heavy hydrocarbons in the first mixture may include a relatively high asphaltene content compared to saturated hydrocarbon content. For example, heavy hydrocarbons in the first mixture may include an asphaltene content to saturated hydrocarbon content ratio greater than about 1, greater than about 1.5, or greater than about 2.

Heat provided to a second section of the formation may pyrolyze at least some hydrocarbons within the second section. A second mixture may be produced from the second section. The second mixture may include at least some pyrolyzed hydrocarbons from the second section. Pyrolyzed hydrocarbons from the second section may include light hydrocarbons produced in the second section. The second mixture may include relatively higher amounts (as compared to heavy hydrocarbons or hydrocarbons found in the formation) of hydrocarbons such as naphtha, methane, ethane, or propane (i.e., saturated hydrocarbons) and/or aromatic hydrocarbons. In some embodiments, light hydrocarbons may include an asphaltene content to saturated hydrocarbon content ratio less than about 0.5, less than about 0.05, or less than about 0.005.

A condensable fraction of the light hydrocarbons of the second mixture may be used as a blending agent. The presence of compounds in the blending agent in addition to naphtha may allow the blending agent to dissolve a large amount of asphaltenes and/or solid hydrocarbons. The blending agent may be used to clean tanks, pipelines or other vessels that have solid (or semi-solid) hydrocarbon deposits.

The light hydrocarbons of the second mixture may include less nitrogen, oxygen, sulfur, and/or metals (e.g., vanadium or nickel) than heavy hydrocarbons. For example, light hydrocarbons may have a nitrogen, oxygen, and sulfur combined weight percentage of less than about 5%, less than about 2%, or less than about 1%. Heavy hydrocarbons may have a nitrogen, oxygen, and sulfur combined weight percentage greater than about 10%, greater than about 15%, or greater than about 18%. Light hydrocarbons may have an API gravity greater than about 20°, greater than about 30°, or greater than about 40°.

The first mixture and the second mixture may be blended to produce a third mixture. The third mixture may be formed in a treatment facility located at or near production facilities for the heavy hydrocarbons. The third mixture may have a selected API gravity. The selected API gravity may be at least about 100 or, in some embodiments, at least about 20° or 30°. The API gravity may be selected to allow the third mixture to be efficiently transported (e.g., through a pipeline).

A ratio of the first mixture to the second mixture in the third mixture may be determined by the API gravities of the first mixture and the second mixture. For example, the lower the API gravity of the first mixture, the more of the second mixture that may be needed to produce a selected API gravity in the third mixture. Likewise, if the API gravity of the second mixture is increased, the ratio of the first mixture to the second mixture may be increased. In some embodiments, a ratio of the first mixture to the second mixture in the third mixture is at least about 3:1. Other ratios may be used to produce a third mixture with a desired API gravity. In certain embodiments, a ratio of the first mixture to the second mixture is chosen such that a total mass recovery from the formation will be as high as possible. In one embodiment, the ratio of the first mixture to the second mixture may be chosen such that at least about 50% by weight of the initial mass of hydrocarbons in the formation is produced. In other embodiments, at least about 60% by weight or at least about 70% by weight of the initial mass of hydrocarbons may be produced. In some embodiments, the first mixture and the second mixture are blended in a specific ratio that may increase the total mass recovery from the formation compared to production of only the second mixture from the formation (i.e., in situ processing of the formation to produce light hydrocarbons).

The ratio of the first mixture to the second mixture in the third mixture may be selected based on a desired viscosity, desired boiling point, desired composition, desired ratio of components (e.g., a desired asphaltene to saturated hydrocarbon ratio or a desired aromatic hydrocarbon to saturated hydrocarbon ratio), and/or desired density of the third mixture. The viscosity and/or density may be selected such that the third mixture is transportable through a pipeline or usable in a treatment facility. In some embodiments, the viscosity (at about 4° C.) may be selected to be less than about 7500 centistokes (cs) less than about 2000 cs, less than about 100 cs, or less than about 10 cs. Centistokes is a unit of kinematic viscosity. Kinematic viscosity multiplied by the density yields absolute viscosity. The density (at about 4° C.) may be selected to be less than about 1.0 g/cm$^3$, less than about 0.95 g/cm$^3$, or less than about 0.9 g/cm$^3$. The asphaltene to saturated hydrocarbon ratio may be selected to be less than about 1, less than about 0.9, or less than about 0.7. The aromatic hydrocarbon to saturated hydrocarbon ratio may be selected to be less than about 4, less than about 3.5, or less than about 2.5.

The viscosity of a third mixture may have improved viscosity compared to conventionally produced crude oils. For example, in "The Viscosity of Air, Natural Gas, Crude Oil and Its Associated Gases at Oil Field Temperatures and Pressures" by Carlton Beal, AIME Transactions, vol. 165, p. 94, 1946, which is incorporated by reference as if fully set forth herein. Beal found a correlation for 655 samples of crude oil that indicates an average viscosity of about 50 centipoise (cp) at 38° C. for crude oil with an API gravity of 24°. The lowest average viscosity was found to be about 20 cp at 38° C. for 200 California crude oil samples with an API gravity of 24°. A third mixture produced by mixing of a first mixture and a second mixture may have a viscosity of about 11 cp at 38° C. and 24° API. Thus, a mixture produced by mixing heavy hydrocarbons with light hydrocarbons produced by an in situ conversion process may have improved viscosity compared to typical produced crude oils.

In an embodiment, the ratio of the first mixture to the second mixture in the third mixture is selected based on the relative stability of the third mixture. A component or components of the third mixture may precipitate out of the third mixture. For example, asphaltene precipitation may be a problem for some mixtures of heavy hydrocarbons and light hydrocarbons. Asphaltenes may precipitate when fluid is depressurized (e.g., removed from a pressurized formation or vessel) and/or there is a change in mixture composition. For the third mixture to be transportable through a pipeline or usable in a treatment facility, the third mixture may need a minimum relative stability. The minimum relative stability may include a ratio of the first mixture to the second mixture such that asphaltenes do not precipitate out of the third mixture at ambient and/or elevated temperatures. Tests may be used to determine desired ratios of the first mixture to the second mixture that will produce a relatively stable third mixture. For example, induced precipitation, chromatography, titration, and/or laser techniques may be used to determine the stability of asphaltenes in the third mixture. In some embodiments, asphaltenes precipitate out of a mixture but are held suspended in the mixture and, hence, the mixture may be transportable. A blending agent produced by an in situ process may have excellent blending characteristics with heavy hydrocarbons (i.e., low probability for precipitation of heavy hydrocarbons from a mixture with the blending agent).

In certain embodiments, resin content in the second mixture (i.e., light hydrocarbon mixture) may determine the stability of the third mixture. For example, resins such as maltenes or resins containing heteroatoms such as N, S, or O may be present in the second mixture. These resins may enhance the stability of a third mixture produced by mixing a first mixture with the second mixture. In some cases, the resins may suspend asphaltenes in the mixture and inhibit asphaltene precipitation.

In certain embodiments, market conditions may determine characteristics of a third mixture. Examples of market conditions may include, but are not limited to, demand for a selected octane of gasoline, demand for heating oil in cold weather, demand for a selected cetane rating in a diesel oil, demand for a selected smoke point for jet fuel, demand for a mixture of gaseous products for chemical synthesis, demand for transportation fuels with a certain sulfur or oxygenate content, or demand for material in a selected chemical process.

In an embodiment, a blending agent may be produced from a section of a relatively permeable formation (e.g., a tar sands formation). "Blending agent" is a material that is mixed with another material to produce a mixture having a desired property (e.g., viscosity, density, API gravity, etc.). The blending agent may include at least some pyrolyzed hydrocarbons. The blending agent may include properties of the second mixture of light hydrocarbons described above. For example, the blending agent may have an API gravity greater than about 20°, greater than about 30°, or greater than about 40°. The blending agent may be blended with heavy hydrocarbons to produce a mixture with a selected API gravity. For example, the blending agent may be blended with heavy hydrocarbons with an API gravity below about 15° to produce a mixture with an API gravity of at least about 20°. In certain embodiments, the blending agent may be blended with heavy hydrocarbons to produce a transportable mixture (e.g., movable through a pipeline). In some embodiments, the heavy hydrocarbons are produced from another section of the relatively permeable formation. In other embodiments, the heavy hydrocarbons may be produced from another relatively permeable formation or any other formation containing heavy hydrocarbons, at the same site or another site.

In some embodiments, the first section and the second section of the formation may be at different depths within the same formation. For example, the heavy hydrocarbons may be produced from a section having a depth between about 500 m and about 1500 m, a section having a depth between about 500 m and about 1200 m, or a section having a depth between about 500 m and about 800 m. At these depths, the heavy hydrocarbons may be somewhat mobile (and producible) due to a relatively higher natural temperature in the reservoir. The light hydrocarbons may be produced from a section having a depth between about 10 m and about 500 m, a section having a depth between about 10 m and about 400 m, or a section having a depth between about 10 m and about 250 m. At these shallower depths, heavy hydrocarbons may not be readily producible because of the lower natural temperatures at the shallower depths. In addition, the API gravity of heavy hydrocarbons may be lower at shallower depths due to increased water washing, loss of lighter hydrocarbons due to leaks in the seal of the formation, and/or bacterial degradation. In other embodiments, heavy hydrocarbons and light hydrocarbons are produced from first and second sections that are at a similar depth below the surface. In another embodiment, the light hydrocarbons and the heavy hydrocarbons are produced from different formations. The different formations, however, may be located near each other.

In an embodiment, heavy hydrocarbons are cold produced from a formation (e.g., a tar sands formation in the Faja (Venezuela)) at depths between about 760 m and about 823 m. The produced hydrocarbons may have an API gravity of less than about 9°. Cold production of heavy hydrocarbons is generally defined as the production of heavy hydrocarbons without providing heat (or providing relatively little heat) to the formation or the production well. In other embodiments, the heavy hydrocarbons may be produced by steam injection or a mixture of steam injection and cold production. The heavy hydrocarbons may be mixed with a blending agent to transport the produced heavy hydrocarbons through a pipeline. In one embodiment, the blending agent is naphtha. Naphtha may be produced in treatment facilities that are located remotely from the formation.

In other embodiments, the heavy hydrocarbons may be mixed with a blending agent produced from a shallower section of the formation using an in situ conversion process. The shallower section may be at a depth less than about 400 m (e.g., less than about 150 m). The shallower section of the formation may contain heavy hydrocarbons with an API gravity of less than about 7°. The blending agent may include light hydrocarbons produced by pyrolyzing at least some of the heavy hydrocarbons from the shallower section of the formation. The blending agent may have an API gravity above about 35° (e.g., above about 40°).

In certain embodiments, a blending agent may be produced in a first portion of a relatively permeable formation and injected (e.g., into a production well) into a second portion of the relatively permeable formation (or, in some embodiments, a second portion in another relatively permeable formation). Heavy hydrocarbons may be produced from the second portion (e.g., by cold production). Mixing between the blending agent may occur within the production well and/or within the second portion of the formation. The blending agent may be produced through a production well in the first portion and pumped to a production well in the second portion. In some embodiments, non-hydrocarbon fluids (e.g., water or carbon dioxide), vapor-phase hydrocarbons, and/or other undesired fluids may be separated from the blending agent prior to mixing with heavy hydrocarbons.

Injecting the blending agent into a portion of a relatively permeable formation may provide mixing of the blending agent and heavy hydrocarbons in the portion. The blending agent may be used to assist in the production of heavy hydrocarbons from the formation. The blending agent may reduce a viscosity of heavy hydrocarbons in the formation. Reducing the viscosity of heavy hydrocarbons in the formation may reduce the possibility of clogging or other problems associated with cold producing heavy hydrocarbons. In some embodiments, the blending agent may be at an elevated temperature and be used to provide at least some heat to the formation to increase the mobilization (i.e., reduce the viscosity) of heavy hydrocarbons within the formation. The elevated temperature of the blending agent may be a temperature proximate the temperature at which the blending agent is produced minus some heat losses during production and transport of the blending agent. In certain embodiments, the blending agent may be pumped through an insulated pipeline to reduce heat losses during transport.

The blending agent may be mixed with the cold produced heavy hydrocarbons in a selected ratio to produce a third mixture with a selected API gravity. For example, the blending agent may be mixed with cold produced heavy hydrocarbons in a 1 to 2 ratio or a 1 to 4 ratio to produce a third mixture with an API gravity greater than about 20°. In some embodiments, other ratios of blending agent to heavy hydrocarbons may be selected as desired to produce a third mixture with one or more selected properties. In certain embodiments, the third mixture may have an overall API gravity greater than about 25° or an API gravity sufficiently high such that the third mixture is transportable through a conduit or pipeline. In some embodiments, the third mixture of hydrocarbons may have an API gravity between about 20° and about 45°. In other embodiments, the blending agent may be mixed with cold produced heavy hydrocarbons to produce a third mixture with a selected viscosity, a selected stability, and/or a selected density.

The third mixture may be transported through a conduit, such as a pipeline, between the formation and a treatment facility or refinery. The third mixture may be transported through a pipeline to another location for further transportation (e.g., the mixture can be transported to a facility at a river or a coast through the pipeline where the mixture can be further transported by tanker to a processing plant or refinery). Producing the blending agent at the formation site (i.e., producing the blending agent from the formation) may reduce a total cost for producing hydrocarbons from the formation. In addition, producing the third hydrocarbon mixture at a formation site may eliminate a need for a separate supply of light hydrocarbons and/or construction of a treatment facility at the site.

In an embodiment, a mixture of hydrocarbons may include about 20 weight % light hydrocarbons (or blending agent) or greater (e.g., about 50 weight % or about 80 weight % light hydrocarbons) and about 80 weight % heavy hydrocarbons or less (e.g., about 50 weight % or about 20 weight % heavy hydrocarbons). The weight percentage of light hydrocarbons and heavy hydrocarbons may vary depending on, for example, a weight distribution (or API gravity) of light and heavy hydrocarbons, a relatively stability of the third mixture or a desired API gravity of the mixture. For example, in some embodiments, the weigh percentage of light hydrocarbons in the mixture may be less than 50 weight % or less than 20 weight %. In certain embodiments, the weight percentage of light hydrocarbons may be selected to blend the least amount of light hydrocarbons with heavy hydrocarbons that produces a mixture with a desired density or viscosity. Reducing the viscosity of heavy hydrocarbons with a blending agent may make it easier to separate water from the blended hydrocarbons.

FIG. 150 depicts a plan view of an embodiment of a relatively permeable formation used to produce a first mixture that is blended with a second mixture. Relatively permeable formation 1702 may include first section 1704 and second section 1706. First section 1704 may be at depths greater than, for example, about 800 m below a surface of the formation. Heavy hydrocarbons in first section 1704 may be produced through production well 512 placed in the first section. Heavy hydrocarbons in first section 1704 may be produced without heating because of the depth of the first section. First section 1704 may be below a depth at which natural heating mobilizes heavy hydrocarbons within the first section. In some embodiments, at least some heat may be provided to first section 1704 to mobilize fluids within the first section.

Second section 1706 may be heated using heat sources 508 placed in the second section. Heat sources 508 are depicted as substantially horizontal heat sources in FIG. 150. Heat provided by heat sources 508 may pyrolyze at least some hydrocarbons within second section 1706. Pyrolyzed fluids may be produced from second section 1706 through production well 512. Production well 512 is depicted as a substantially vertical production well in FIG. 150.

In an embodiment, heavy hydrocarbons from first section 1704 are produced in a first mixture through production well 512. Light hydrocarbons (i.e., pyrolyzed hydrocarbons) may be produced in a second mixture through production well 512. The first mixture and the second mixture may be mixed to produce a third mixture in treatment facility 516. The first and the second mixture may be mixed in a selected ratio to produce a desired third mixture. The third mixture may be transported through pipeline 1708 to a production facility or a transportation facility. The production facility or transportation facility may be located remotely from treatment facility 516. In some embodiments, the third mixture may be trucked or shipped to a production facility or transportation facility. In certain embodiments, treatment facility 516 may be a simple mixing station to combine the mixtures produced from production well 512 and production well 512.

In certain embodiments, the blending agent produced from second section 1706 may be injected through production well 512 into first section 1704. A mixture of light hydrocarbons and heavy hydrocarbons may be produced through production well 512 after mixing of the blending agent and heavy hydrocarbons in first section 1704. In some embodiments, the blending agent may be produced by separating non-desirable components (e.g., water) from a mixture produced from second section 1706. The blending agent may be produced in treatment facility 516. The blending agent may be pumped from treatment facility 516 through production well 512 and into first section 1704.

FIGS. 151-157 depict results from an experiment. In the experiment, blending agent 1710 produced by pyrolysis was mixed with Athabasca tar (heavy hydrocarbons 1712) in three blending mixtures of different ratios. First mixture 1714 included 80% blending agent 1710 and 20% heavy hydrocarbons 1712. Second mixture 1716 included 50% blending agent 1710 and 50% heavy hydrocarbons 1712. Third mixture 1718 included 20% blending agent 1710 and 80% heavy hydrocarbons 1712. Composition, physical properties, and asphaltene stability were measured for the blending agent, heavy hydrocarbons, and each of the mixtures.

TABLE 18 presents results of composition measurements of the mixtures. SARA analysis determined composition on a topped oil basis. SARA analysis includes a combination of induced precipitation (for asphaltenes) and column chromatography. Whole oil basis compositions were also determined.

TABLE 18

| | Blend Ratio | Topped oil basis (SARA) | | | | Whole oil basis | |
|---|---|---|---|---|---|---|---|
| Blend | 1712:1710 | Sat | Aro | NSO | Asph | NSO | Asph |
| 1710 | 0:100 | 43.4 | 46.5 | 9.8 | 0.23 | 0.42 | 0.01 |
| 1714 | 20:80 | 20.6 | 49.4 | 20.6 | 9.30 | 4.91 | 2.21 |
| 1716 | 50:50 | 15.3 | 51.5 | 20.1 | 13.0 | 10.7 | 6.91 |
| 1718 | 80:20 | 14.4 | 51.5 | 20.8 | 13.1 | 16.4 | 10.3 |
| 1712 | 100:0 | 12.5 | 52.8 | 20.2 | 14.5 | 18.4 | 13.2 |

Key:
Sat Saturates
Aro Aromatics
NSO Resins (containing heteroatoms such as N, S and O)
Asph Asphaltenes FIG. 151 depicts asphaltene content (on a whole oil basis) in the blend versus percent blending agent in the mixture for each of the three mixtures (1714, 1716, and 1718), blending agent 1710, and heavy hydrocarbons 1712. As shown in FIG. 151, asphaltene content on a whole oil basis varies linearly with the percentage of blending agent 1710 in the mixture.

FIG. 152 depicts SARA results (saturate/aromatic ratio versus asphaltene/resin ratio) for each of the blends (1710, 1714, 1716, 1718, and 1712). The line in FIG. 152 represents the differentiation between stable mixtures and unstable mixtures based on SARA results. The topping procedure used for SARA removed a greater proportion of the contribution of blending agent 1710 (as compared to whole oil analysis) and resulted in the non-linear distribution in FIG. 152. First mixture 1714, second mixture 1716, and third mixture 1718 plotted closer to heavy hydrocarbons 1712 than blending agent 1710. In addition, second mixture 1716 and third mixture 1718 plotted relatively closely. All blends (1710, 1714, 1716, 1718, and 1712) plotted in a region of marginal stability.

Blending agent 1710 included very little asphaltene (0.01% by weight, whole oil basis). Heavy hydrocarbons 1712 included about 13.2% by weight (whole oil basis) with the amount of asphaltenes in the mixtures (1714, 1716, and 1718) varying between 2.2% by weight and 10.3% by weight on a whole oil basis. Other indicators of the gross oil properties is the ratio between saturates and aromatics and the ratio between asphaltenes and resins. The asphaltene/resin ratio was lowest for first mixture 1714, which has the largest percentage of blending agent 1710. Second mixture 1716 and third mixture 1718 had relatively similar asphaltene/resin ratios indicating that the majority of resins in the mixtures are due to contribution from heavy hydrocarbons 1712. The saturate/aromatic ratio was relatively similar for each of the mixtures.

Density and viscosity of the mixtures were measured at three temperatures: 4.4° C. (40° F.), 21° C. (70° F.), and 32° C. (90° F.). The density and API gravity of the mixtures were also determined at 15° C. (60° F.) and used to calculate API gravities at other temperatures. In addition, a Floc Point Analyzer (FPA) value was determined for each of the three blended mixtures (1714, 1716, and 1718). FPA is determined by n-heptane titration. The floc point is detected with a near infrared laser. The light source is blocked by asphaltenes precipitating out of solution. The FPA test was calibrated with a set of known problem and non-problem mixtures. Generally, FPA values less than 2.5 are considered unstable, greater than 3.0 are considered stable, and 2.5-3.0 are considered marginal. TABLE 19 presents values for FPA, density, viscosity, and API gravity for the three blended mixtures at four temperatures.

The peak in the plot for first mixture 1714 illustrates that precipitation of asphaltenes occurs rapidly with the addition of n-heptane.

Second mixture 1716 exhibited different behavior. Second mixture 1716 had a FPA value of 2.2 indicating instability with respect to asphaltene precipitation. FIG. 154 illustrates near infrared transmittance versus volume (ml) of n-heptane added to second mixture 1716. Two distinct peaks are seen in FIG. 154 indicating that asphaltenes were precipitated, re-dissolved, and then re-precipitated with continuous addition of n-heptane.

FIG. 155 illustrates near infrared transmittance versus volume (ml) of n-heptane added to third mixture 1718. Third mixture 1718 showed similar behavior to second mixture 1716 as shown in FIG. 154 and FIG. 155. The first peak in FIG. 155, however, was less pronounced than the first peak in FIG. 154. The FPA value of 2.8 found for third mixture 1718 indicates marginal stability for the third mixture. Slow homogenization, associated with a high viscosity of the sample mixtures, is most likely responsible for the appearance of double peaks in FIGS. 154 and 155.

Each of the mixtures (1714, 1716, and 1718) showed relatively similar changes in density with increasing temperature (as shown in FIG. 156). API values increased correspondingly with decreasing density. Viscosity changes, however, varied between each of the mixtures.

First mixture 1714 was the least affected by temperature with viscosity values at 21° C. and 32° C. determined to be about 70% and about 57% of that at 4.4° C., respectively. Second mixture 1716 had viscosity values that decreased to values (of that at 4.4° C.) of about 48% at 21° C. and about 30% at 32° C. Third mixture 1718 was the most affected by temperature with viscosity values of about 21% and about 9% at 21° C. and 32° C., respectively. Viscosity changes are approximately linear on a logarithmic plot of viscosity versus temperature as shown in FIG. 157.

Typically, a majority of relatively permeable formations are water-wet. A substantial majority of flow within the formation may occur while the formation remains water-wet

TABLE 19

| | | Temperature: 15° C. | | | 4.4° C. | | | 21° C. | | | 32° C. | | |
|---|---|---|---|---|---|---|---|---|---|---|---|---|---|
| Blend | FPA | Spec. Grav. | Density (g/cc) | API | Density (g/cc) | Visc. (cs) | API | Density (g/cc) | Visc. (cs) | API | Density (g/cc) | Visc. (cs) | API |
| 1714 | 1.5 | 0.845 | 0.8443 | 35.9 | 0.8535 | 4.20 | 34.12 | 0.8405 | 2.95 | 36.7 | 0.8324 | 2.39 | 39.3 |
| 1716 | 2.2 | 0.909 | 0.9086 | 24.1 | 0.9177 | 53.9 | 22.54 | 0.9052 | 25.6 | 24.7 | 0.8974 | 16.2 | 26.0 |
| 1718 | 2.8 | 0.976 | 0.9751 | 13.5 | 0.9839 | 5934 | 12.18 | 0.9717 | 1267 | 14.0 | 0.9643 | 531.6 | 15.1 |

Key:

| | |
|---|---|
| FPA | Flocculation Point Analyzer value |
| Spec. Grav. | Specific Gravity relative to water |
| Density (g/cc) | Density in grams per cubic centimeter |
| API | API gravity relative to water |
| Visc. (cs) | Viscosity in centistokes |

FPA tests showed that the mixtures containing lower amounts of heavy hydrocarbons were less stable. The lower stability was likely due to the proportion of aliphatic components already in these mixtures, which reduces asphaltene solubility. First mixture 1714 was the least stable with a FPA value of 1.5, indicating instability with respect to asphaltene precipitation. FIG. 153 illustrates near infrared transmittance versus volume (ml) of n-heptane added to first mixture 1714.

(increased temperatures in the formation has not resulted in the vaporization of water in the formation). The formation being water-wet may help the efficiency of gravity-produced flow in the formation during early stages of production. The formation may become more oil-wet as water evaporates and/or as asphaltene is precipitated (asphaltene precipitation may depend on oil composition, pressure and temperature, and/or $CO_2$ level). Later stages of production may occur when the reservoir is oil-wet. Oil-wet production may increase the efficiency of film drainage during the later stages of production.

In some embodiments, permeability of a relatively permeable formation may be improved upon heating of the relatively permeable formation. Some relatively permeable formations include clays such as kaolinite between the grains. The clays may reduce permeability in the formation. These clays may dissolve at temperatures approaching and above about 250° C. in the presence of steam. The steam may be generated by water evaporation in the formation. Dissolving the clays will increase the permeability of the formation. Permeability may also be increased due to reduction in effective stress of the formation as fluid pressure increases in the formation during heating. The fluid pressure may increase in the pore spaces of the formation during heating. Thermal expansion of the fluids may produce dilatancy effects in the formation. "Dilatancy" is the tendency of rocks to expand along minute fractures immediately prior to failure. Dilatancy may increase permeability in the formation.

In some embodiments, the formation may be treated to provide a pathway for vertical drainage of fluids if no such pathway exists. For example, the formation may be fractured hydraulically or by other techniques.

Toward the end of production, oil quality may also improve as compared to initial oil quality. Carbon dioxide produced in the formation may cause non-cracking related upgrading (e.g., by asphaltene precipitation or viscosity reduction) of fluids within the formation.

In some embodiments, injection of carbon dioxide can be used to sequester carbon dioxide within the formation. As production from the formation is slowed and/or halted, carbon dioxide may be sequestered in the formation at relatively high pressures. This may reduce carbon taxes associated with a production process and/or create environmental emissions credit.

In certain embodiments, evaporation of water within the formation may increase pressure in the formation due to production of steam. The produced steam may increase flow of mobilized fluids within the formation.

In some embodiments, a relatively permeable formation may include tar mats. Tar mats may form by a variety of methods. One possibility for tar mat formation is through deasphalting. Deasphalting may include compositional gravity segregation as well as a destabilization of an oil due to gas addition. Gas addition may be provided by migration from adjacent areas and/or by gas formation within the formation. Another possibility for tar mat formation may be by biodegradation and/or water washing. In addition, there is the possibility of in situ maturation, with lighter oil and pyrobitumen forming from a heavier precursor. Another formation possibility is asphaltenic precipitation due to pressure decline during uplift of a formation. The chemistry of a tar mat may be highly asphaltenic (i.e., complex hydrocarbons with high molecular weights). Reservoirs with basal or lateral tar mats exist worldwide.

In certain embodiments, a tar mat may inhibit oil production by water drive. In such embodiments, heater wells may be used to heat a tar mat zone sufficiently to remove bitumen from the formation or lower the oil viscosity in the tar mat. This process may significantly improve permeability and flow characteristics within the tar mat zone, thus allowing enhanced production due to a natural water drive or some other drive mechanism (e.g., water or steam injection).

An in situ conversion process may be used to produce hydrocarbons from a relatively low permeability formation. Hydrocarbon material in the low permeability formation may be heavy hydrocarbons. Hydrocarbons in a selected section of the formation may be pyrolyzed by heat from heat sources. Heat provided by the heat sources may allow for vapor phase transport to production wells in the formation.

In addition to allowing for vapor phase transport through the selected section of formation, heating the formation may also increase the average permeability of at least a portion of the selected section. The increase in temperature of the formation may create thermal fractures in the formation. The thermal fractures may propagate between heat sources, further increasing the permeability in a portion of a selected section of the formation. During heating of the formation to pyrolysis temperatures, water in the selected section may vaporize. Vaporization may generate localized areas of very high pressure that cause fracturing of the selected formation. In some formations, the formation and/or heavy hydrocarbons in the formation may absorb a portion of the energy caused by thermal expansion and/or by vaporization pressure change to limit increasing permeability.

In an in situ conversion process embodiment, the pressure in at least a portion of the relatively low permeability formation may be controlled to maintain a composition of produced formation fluids within a desired range. The composition of the produced formation fluids may be monitored. The pressure may be controlled by a back pressure valve located proximate where the formation fluids are produced. A desired operating pressure of a production well to produce a desired composition may be determined from experimental data for the relationship between pressure and the composition of pyrolysis products of the heavy hydrocarbons in the formation.

FIG. 158 is a view of an embodiment of a heat source and production well pattern for heating heavy hydrocarbons in a relatively low permeability formation. Heat sources 508A, 508B, and 508C may be arranged in a triangular pattern with the heat sources at the apices of the triangular grid. Production well 512 may be located proximate the center of the triangular grid. In other pattern embodiments, a production well may be placed at any location in the grid pattern. Heat sources may be arranged in patterns other than the triangular pattern shown in FIG. 158. For example, wells may be arranged in square patterns. Heat sources 508A, 508B, and 508C may heat a portion of the formation to a temperature that allows for pyrolysis of heavy hydrocarbons in the formation. Pyrolyzation fluids produced by pyrolysis may flow toward the production well, as indicated by the arrows, and formation fluids may be produced through production well 512.

In some in situ conversion process embodiments for treating low permeability formations, average distances between heat sources effective to pyrolyze heavy hydrocarbons in the formation may be between about 5 m and about 8 m. In some embodiments, a smaller average distance may be needed. In some in situ conversion process embodiments for treating low permeability formations, average distance between heat sources may be between about 2 m and about 5 m.

FIG. 159 is a view of an embodiment of a heat source pattern for heating heavy hydrocarbons in a portion of a hydrocarbon containing formation of relatively low permeability and producing fluids from one or more heater wells. Heat sources 508 may be arranged in a triangular pattern. The heat sources may provide heat to pyrolyze some or all of the fluid in the formation. Fluids may be produced through one or more of the heat sources.

An embodiment for treating hydrocarbons in a relatively low permeability formation may include heating the formation to create at least two zones within the formation such that the zones have different average temperatures. Heat sources may heat a first section of the formation to create a pyrolysis zone. Heat sources may heat a second section to an average temperature that is less than a pyrolysis temperature to create a low viscosity zone.

The decrease in viscosity of the heavy hydrocarbons in the selected second section may be sufficient to produce mobilized fluids within the selected second section. The mobilized fluids may flow into the pyrolysis zone of the first section. For example, increasing the temperature of the heavy hydrocarbons in the formation to between about 200° C. and about 250° C. may decrease the viscosity of the heavy hydrocarbons sufficiently for the heavy hydrocarbons to flow through the formation. In another embodiment, increasing the temperature of the fluid to between about 180° C. and about 200° C. may also be sufficient to mobilize the heavy hydrocarbons. For example, the viscosity of heavy hydrocarbons in a formation at 200° C. may be about 50 centipoise to about 200 centipoise. Production wells in the first section may create a low pressure zone that facilitates fluid flow from the second section into the first section.

Heating may create thermal fractures that propagate between heat sources in both the selected first section and the selected second section. The thermal fractures may substantially increase the permeability of the formation and may facilitate the flow of mobilized fluids from the low viscosity zone to the pyrolysis zone. In one embodiment, a vertical hydraulic fracture may be created in the formation to further increase permeability. The presence of a hydraulic fracture may also be desirable since heavy hydrocarbons that collect in the hydraulic fracture may have an increased residence time in the pyrolysis zone. The increased residence time may result in increased pyrolysis of the heavy hydrocarbons in the pyrolysis zone.

In addition, the pressure in the low viscosity zone may increase due to thermal expansion of the formation and evaporation of entrained water in the formation to form steam. For example, pressures in the low viscosity zone may range from about 10 bars absolute to an overburden pressure. In some process embodiments, the pressure may range from about 15 bars absolute to about 50 bars absolute. The value of the pressure may depend upon factors such as, but not limited to, the degree of thermal fracturing, the amount of water in the formation, and material properties of the formation. The pressure in the pyrolysis zone may be substantially lower than the pressure in the low viscosity zone because of the higher permeability of the pyrolysis zone. The higher temperature in the pyrolysis zone compared to the low viscosity zone may cause a higher degree of thermal fracturing, and thus a greater permeability. For example, pyrolysis zone pressures may range from about 3.5 bars absolute to about 10 bars absolute. In some embodiments, pyrolysis zone pressures may range from about 10 bars absolute to about 15 bars absolute.

The pressure differential between the pyrolysis zone and the low viscosity zone may force some mobilized fluids to flow from the low viscosity zone into the pyrolysis zone. Heavy hydrocarbons in the pyrolysis zone may be upgraded by pyrolysis into pyrolyzation fluids. Pyrolyzation fluids may be produced from the formation through a production well or production wells. A production well or production wells may be designed to remove liquids, vapor or a combination of liquid and vapor from the formation.

In an in situ conversion process embodiment, the concentration (or density) of heat sources in the pyrolysis zone may be greater than the concentration of heat sources in the low viscosity zone. The increased concentration of heat sources in the pyrolysis zone may establish and maintain a uniform pyrolysis temperature in the pyrolysis zone. Using a lower concentration of heat sources in the low viscosity zone may be more efficient and economical due to the lower temperature required in the low viscosity zone. In one process embodiment, an average distance between heat sources for heating the first selected section may be between about 5 m and about 10 m. Alternatively, an average distance may be between about 2 m and about 5 m. In some embodiments, an average distance between heat sources for heating the second selected section may be between about 5 m and about 20 m.

In an in situ conversion process embodiment, the pyrolysis zone and one or more low viscosity zones may be heated sequentially over time. Heat sources may heat the first selected section until an average temperature of the pyrolysis zone reaches a desired pyrolysis temperature. Subsequently, heat sources may heat one or more low viscosity zones of the selected second section that may be nearest the pyrolysis zone until such low viscosity zones reach a desired average temperature. Heating low viscosity zones of the selected second section farther away from the pyrolysis zone may continue in a like manner.

In an in situ conversion process embodiment, heat may be provided to a formation to create a first volume of formation at a pyrolysis temperature (pyrolysis zone) and an adjacent volume of formation below a pyrolysis temperature (low viscosity zone). One or more planar low viscosity zones may be created with symmetry about the pyrolysis zone. In an in situ conversion process embodiment, the pyrolysis zone may be surrounded by an annular low viscosity zone. In some embodiments, portions of the pyrolysis zone that no longer produce formation fluids of a desired quality and/or quantity are allowed to cool while a leading edge or leading edges (or a circumference) of pyrolysis zone is maintained at pyrolysis temperatures. Formation fluids may be produced through a production well or production wells. The production well or production wells may be located in the pyrolysis zone and/or in a produced portion of the formation that is no longer maintained at pyrolysis temperatures.

FIG. 160 is a view of an embodiment of a heat source and production well pattern illustrating a pyrolysis zone and a low viscosity zone. Heat sources 508A along plane 1720A and plane 1720B may heat planar region 1722 to create a pyrolysis zone. Heating may create thermal fractures 1724 in the pyrolysis zone. Heating with heat sources 508B in planes 1720C, 1720D, 1720E, and 1720F may create a low viscosity zone with an increased permeability due to thermal fractures. Pressure differential between the low viscosity zone and the pyrolysis zone may force mobilized fluid from the low viscosity zone into the pyrolysis zone. The permeability created by thermal fractures 1724 may be sufficiently high to create a substantially uniform pyrolysis zone. Pyrolyzation fluids may be produced through production well 512.

In an in situ conversion process embodiment, a pyrolysis zone and/or low viscosity zone may move as time spent processing the formation advances. In an embodiment, the heat sources nearest the pyrolysis zone may be activated first. For example, heat sources 508A between plane 1720A and plane 1720B of FIG. 160 may be activated first. A substantially uniform temperature may be established in the pyrolysis zone after a period of time. Mobilized fluids that flow through the pyrolysis zone may undergo pyrolysis and vaporize. Once the pyrolysis zone is established, heat sources in the low viscosity zone (e.g., heat sources 508B adjacent to plane 1720A and in plane 1720E) nearest the pyrolysis zone may be turned on and/or up to establish a low viscosity zone. A larger low viscosity zone may be developed by repeatedly activating heat sources (e.g., heat sources 508B in plane 1720E and heat sources in plane 1720F) farther away from the pyrolysis zone. Heat sources 508B in plane 1720C and plane 1720D may also be activated at appropriate times.

FIG. 161 depicts an aerial view of a pattern for treating a relatively low permeability formation. Heat sources may create pyrolysis zones 1726. Regions 1728A, 1728B, and 1728C may include heat sources that apply heat to create a low viscosity zone. Production wells 512 may be disposed in regions where pyrolysis occurs. Production wells 512 may remove pyrolyzation fluids from the formation. In one embodiment, a length of pyrolysis zones 1726 may be between about 75 m and about 300 m. In another embodiment, a length of the pyrolysis zones may be between about 100 m and about 125 m. In an embodiment, an average distance between production wells in the same plane may be between about 100 m and about 150 m. Shorter or longer production zones may be established to correspond to formation conditions. In one embodiment, a distance between plane 1730A and plane 1730B may be between about 40 m and about 80 m. In some embodiments, more than one production well may be disposed in a region where pyrolysis occurs. Plane 1730A and plane 1730B may be substantially parallel. The formation may include additional planar vertical pyrolysis zones that may be substantially parallel to each other. Hot fluids may be provided into vertical planar regions such that in situ pyrolysis of heavy hydrocarbons may occur. Pyrolyzation fluids may be removed by production wells disposed in the vertical planar regions.

An embodiment of a planar pyrolysis zone may include a vertical hydraulic fracture created by hydraulically fracturing through a production well in the formation. The formation may include heat sources located substantially parallel to the vertical hydraulic fracture in the formation. Heat sources in a planar region adjacent to the fracture may provide heat sufficient to pyrolyze at least some or all of the heavy hydrocarbons in a pyrolysis zone. Heat sources outside the planar region may heat the formation to a temperature sufficient to decrease the viscosity of the fluids in a low viscosity zone.

FIG. 162 is a view of an embodiment for treating heavy hydrocarbons in at least a portion of a hydrocarbon containing formation of relatively low permeability. Fracture 1732 may be created from wellbore of production well 512. In an embodiment, the width of fracture 1732 generated by hydraulic fracturing may be between about 0.3 cm and about 1 cm. In other embodiments, the width of fracture 1732 may be between about 1 cm and about 3 cm. The pyrolysis zone may be formed in a planar region on either side of the vertical hydraulic fracture by heating the planar region to an average temperature within a pyrolysis temperature range with heat sources 508A in plane 1720A and plane 1720B. Creation of a low viscosity zone on both sides of the pyrolysis zone, above plane 1720A and below plane 1720B, may be accomplished by heat sources outside the pyrolysis zone. For example, heat sources 508B in planes 1720C, 1720D, 1720E, and 1720F may heat the low viscosity zone to a temperature sufficient to lower the viscosity of heavy hydrocarbons in the formation. Mobilized fluids in the low viscosity zone may flow to the pyrolysis zone due to the pressure differential between the low viscosity zone and the pyrolysis zone and the increased permeability from thermal fractures.

FIG. 163 is a view of an embodiment for treating a relatively low permeability formation. FIG. 163 illustrates a formation with two fractures 1732A, 1732B along plane 1720A and two fractures 1732C, 1732D along plane 1720B. Each fracture may be produced from wellbores of production wells 512. Plane 1720A and plane 1720B may be substantially parallel. The length of a fracture created by hydraulic fracturing in relatively low permeability formations may be between about 75 m and about 100 m. In some embodiments, the vertical hydraulic fracture may be between about 100 m and about 125 m. Vertical hydraulic fractures may propagate substantially equal distances along a plane from a production well. The distance between production wells along the same plane may be between about 100 m and about 150 m to inhibit fractures from joining together. As the distance between fractures on different planes increases, for example the distance between plane 1720A and plane 1720B, the flow of mobilized fluids farthest from either fracture may decrease. A distance between fractures on different planes that may be economical and effective for the transport of mobilized fluids to the pyrolysis zone may be about 40 m to about 80 m.

Plane 1720C and plane 1720D may include heat sources that may provide heat sufficient to create a pyrolysis zone between the planes. Plane 1720E and plane 1720F may include heat sources that create a pyrolysis zone between the planes. Heat sources in regions 1728A, 1728B, 1728C, and 1728D may provide heat that may create low viscosity zones. Mobilized fluids in regions 1728A, 1728B, 1728C, and 1728D may flow in a direction toward the closest fracture in the formation. Mobilized fluids entering the pyrolysis zone may be pyrolyzed. Pyrolyzation fluids may be produced from production wells 512.

In one in situ conversion process embodiment, heat may be provided to a relatively low permeability formation to create a pyrolysis zone and a low viscosity zone around a production well. Fluids may be pyrolyzed in the pyrolysis zone. Pyrolyzation fluids may be produced from the production well in the pyrolysis zone. Heat sources may be located around a production well in a pattern. Heat sources closest to a production well may heat portions of the formation adjacent to the production well to a pyrolysis temperature. Additional heaters farther from the production well may heat the formation to create a low viscosity zone. Mobilized fluid in the low viscosity zone may flow to the pyrolysis zone due to the pressure differential between the low viscosity zone and the pyrolysis zone. An increased permeability due to thermal fracturing of the formation may facilitate flow of hydrocarbons to the pyrolysis zone and production well.

Several patterns of heat sources arranged in rings around production wells may be utilized to create a pyrolysis region around a production well and a low viscosity zone in a hydrocarbon containing formation. Various pattern embodiments are shown in FIGS. 164-177. Although the patterns are discussed in the context of heavy hydrocarbons, it is to be understood that any of the patterns shown in FIGS. 164-177 may be used for other hydrocarbon containing formations (e.g., for coal, oil shale, etc.).

FIG. 164 illustrates an embodiment of a pattern of heat sources 508 that may create a pyrolysis zone and low viscosity zone around production well 512. Production well 512 may be surrounded by rings 1734, 1736, and 1738 of heat sources 508. Heat sources 508 in ring 1734 may heat the formation to create pyrolysis zone 1726. Heat sources 508 in rings 1736 and 1738 outside pyrolysis zone 1726 may heat the formation to create a low viscosity zone. The viscosity of a portion of the hydrocarbons in the low viscosity zone may be reduced sufficiently to allow the hydrocarbons to flow inward from the low viscosity zone to pyrolysis zone 1726. Fluids may be produced through production well 512. In some embodiments, an average distance between heat sources may be between about 2 m and about 10 m. In other embodiments, the average distance between heat sources may be between about 10 m and about 20 m.

Pyrolysis zones and low viscosity zones in a formation may be created sequentially. Heat sources 508 nearest production well 512 may be activated first, for example, heat sources 508 in ring 1734. A substantially uniform temperature pyrolysis zone may be established after a period of time. Fluids that flow through the pyrolysis zone may undergo pyrolysis and/or vaporization. Once the pyrolysis zone is established, heat sources 508 in the low viscosity zone near the pyrolysis zone (e.g., heat sources 508 in ring 1736) may be activated to provide heat to a portion of a low viscosity zone. Fluid may flow inward towards production well 512 due to a pressure differential between the low viscosity zone and the pyrolysis zone, as indicated by the arrows. A larger low viscosity zone may be developed by repeatedly activating heat sources farther away from production well 512 (e.g., heat sources 508 in ring 1738).

Production wells 512 and heat sources 508 may be located at the apices of a triangular grid, as depicted in FIG. 165. The triangular grid for heat sources 508 may be an equilateral triangular grid with sides of length s. Production wells 512 may be spaced at a distance of about 1.732(s). Each production well 512 may be disposed at a center of ring 1740 of heat sources 508 in a hexagonal pattern. Each heat source 508 may provide substantially equal amounts of heat to three production wells. Therefore, each ring 1740 of six heat sources 508 may contribute approximately two equivalent heat sources per production well 512.

FIG. 166 illustrates a pattern of production wells 512 with an inner hexagonal ring 1740 and an outer hexagonal ring 1742 of heat sources 508. In this pattern, production wells 512 may be spaced at a distance of about 2(1.732)s, where s is the distance between heat sources 508. Heat sources 508 may be located at all other grid positions. This pattern may result in a ratio of equivalent heat sources to production wells that may approach 11:1 (i.e., 6 equivalent heat sources for ring 1740; (½)(6) or 3 equivalent heat sources for the 6 heat sources of ring 1742 between apices of the hexagonal pattern; and (⅓)(6) or 2 equivalent heat sources for the 6 heat sources of ring 1742 at the apices of the hexagonal pattern).

FIG. 167 illustrates three rings of heat sources 508 surrounding production well 512. Production well 512 may be surrounded by ring 1740 of six heat sources 508. Second hexagonally shaped ring 1742 of twelve heat sources 508 may surround ring 1740. Third ring 1744 of heat sources 508 may include twelve heat sources that may provide substantially equal amounts of heat to two production wells and six heat sources that may provide substantially equal amounts of heat to three production wells. Therefore, a total of eight equivalent heat sources may be disposed on third ring 1744. Production well 512 may be provided heat from an equivalent of about twenty-six heat sources. FIG. 168 illustrates an even larger pattern that may have a greater spacing between production wells 512.

FIGS. 169, 170, 171, and 172 illustrate embodiments in which both production wells and heat sources are located at the apices of a triangular grid. In FIG. 169, a triangular grid with a spacing of s between adjacent heat sources may have production wells 512 spaced at a distance of 2s. A hexagonal pattern may include one ring 1740 of six heat sources 508. Each heat source 508 may provide substantially equal amounts of heat to two production wells 512. Therefore, each ring 1740 of six heat sources 508 contributes approximately three equivalent heat sources per production well 512.

FIG. 170 illustrates a pattern of production wells 512 with inner hexagonal ring 1740A and outer hexagonal ring 1740B. Production wells 512 may be spaced at a distance of 3s. Heat sources 508 may be located at apices of hexagonal ring 1740A and hexagonal ring 1740B. Hexagonal ring 1740A and hexagonal ring 1740B may include six heat sources each. The pattern in FIG. 170 may result in a ratio of heat sources 508 to production well 512 of about eight.

FIG. 171 illustrates a pattern of production wells 512 also with two hexagonal rings of heat sources surrounding each production well. Production well 512 may be surrounded by ring 1740 of six heat sources 508. Production wells 512 may be spaced at a distance of 4s. Second hexagonal ring 1742 may surround ring 1740. Second hexagonal ring 1742 may include twelve heat sources 508. This pattern may result in a ratio of heat sources 508 to production wells 512 that may approach fifteen.

FIG. 172 illustrates a pattern of heat sources 508 with three rings of heat sources 508 surrounding each production well 512. Production wells 512 may be surrounded by ring 1740 of six heat sources 508. Second ring 1742 of twelve heat sources 508 may surround ring 1740. Third ring 1744 of heat sources 508 may surround second ring 1742. Third ring 1744 may include 6 equivalent heat sources. This pattern may result in a ratio of heat sources 508 to production wells 512 that is about 24:1.

FIGS. 173, 174, 175, and 176 illustrate patterns in which the production well may be disposed at a center of a triangular grid such that the production well may be equidistant from the apices of the triangular grid. In FIG. 173, the triangular grid of heater wells with a spacing of s between adjacent heat sources may include production wells 512 spaced at a distance of s. Each production well 512 may be surrounded by ring 1746 of three heat sources 508. Each heat source 508 may provide substantially equal amounts of heat to three production wells 512. Therefore, each ring 1746 of three heat sources 508 may contribute one equivalent heat source per production well 512.

FIG. 174 illustrates a pattern of production wells 512 with inner triangular ring 1746 and outer hexagonal ring 1748. In this pattern, production wells 512 may be spaced at a distance of 2s. Heat sources 508 may be located at apices of inner triangular ring 1746 and outer hexagonal ring 1748. Inner triangular ring 1746 may contribute three equivalent heat sources per production well 512. Outer hexagonal ring 1748 containing three heater wells may contribute one equivalent heat source per production well 512. Thus, a total of four equivalent heat sources may provide heat to production well 512.

FIG. 175 illustrates a pattern of production wells with one inner triangular ring of heat sources surrounding each production well and one irregular hexagonal outer ring. Production wells 512 may be surrounded by ring 1746 of three heat sources 508. Production wells 512 may be spaced at a distance of 3s, where s is the distance between adjacent heat sources. Irregular hexagonal ring 1750 of nine heat sources 508 may surround ring 1746. This pattern may result in a ratio of heat sources 508 to production wells 512 of about 9:1.

FIG. 176 illustrates triangular patterns of heat sources with three rings of heat sources surrounding each production well. Production wells 512 may be surrounded by ring 1746 of three heat sources 508. Irregular hexagon pattern 1750 of nine heat sources 508 may surround ring 1746. Third set 1752 of heat sources 508 may surround irregular hexagonal pattern 1750. Third set 1752 may contribute four equivalent heat sources to production well 512. A ratio of equivalent heat sources to production well 512 may be sixteen.

FIG. 177 depicts an embodiment of a pattern of heat sources 508 arranged in a triangular pattern. Production well 512 may be surrounded by triangles 1746A, 1746B, and 1746C of heat sources 508. Heat sources 508 in triangles 1746A, 1746B, and 1746C may provide heat to the formation. The provided heat may raise an average temperature of the formation to a pyrolysis temperature. Pyrolyzation fluids may flow to production well 512. Formation fluids may be produced in production well 512.

FIG. 178 illustrates an example of a square pattern of heat sources and production wells 512. The heat sources are disposed at vertices of squares 1752. Production well 512 is placed in a center of every third square in both x- and y-directions. Midlines 1754 are formed equidistant to two production wells 512, and perpendicular to a line connecting such production wells. Intersections of midlines 1754 at vertices 1756 form unit cell 1758. Heat sources 508A are completely within unit cell 1758. Heat sources 508B and heat sources 508C are only partially within unit cell 1758. Only the one-half fraction of heat sources 508B and the one-quarter fraction of heat sources 508C within unit cell 1758 provide heat within unit cell 1758. The fraction of heat sources outside of unit cell 1758 may provide heat to other unit cells.

The total number of heat sources attributable to unit cell 1758 may be determined by the following method:

(a) 4 heat sources 508A inside unit cell 1758 are counted as one heat source each;

(b) 8 heat sources 508B on midlines 1754 are counted as one-half heat source each; and (c) 4 heat sources 508C at vertices 1756 are counted as one-quarter heat source each.

The total number of heat sources is determined from adding the heat sources counted by (a) 4, (b) 8/2=4, and (c) 4/4=1, for a total number of 9 heat sources in unit cell 1758. Therefore, a ratio of heat sources to production wells 512 is determined as 9:1 for the pattern illustrated in FIG. 178.

FIG. 179 illustrates an example of another pattern of heat sources 508 and production wells 512. Midlines 1754 are formed equidistant from two production wells 512, and perpendicular to a line connecting such production wells. Unit cell 1758 is determined by intersection of midlines 1754 at vertices 1756. Twelve heat sources are counted in unit cell 1758, of which six are whole sources of heat, and six are one-third sources of heat (with the other two-thirds of heat from such six wells going to other patterns). Thus, a ratio of heat sources to production wells 512 is determined as 8:1 for the pattern illustrated in FIG. 179.

FIG. 180 illustrates an embodiment of triangular pattern 1760 of heat sources 508. FIG. 181 illustrates an embodiment of square pattern 1762 of heat sources 508. FIG. 182 illustrates an embodiment of hexagonal pattern 1764 of heat sources 508. FIG. 183 illustrates an embodiment of 12:1 pattern 1766 of heat sources 508. A temperature distribution for all patterns may be determined by an analytical method. The analytical method may be simplified by analyzing only temperature fields within "confined" patterns (e.g., hexagons), i.e., completely surrounded by others. In addition, the temperature field may be estimated to be a superposition of analytical solutions corresponding to a single heat source.

FIG. 184 illustrates a schematic diagram of an embodiment of treatment facilities 516 that may treat a formation fluid. The formation fluid may be produced though a production well. Treatment facilities 516 may include separator 1768. Separator 1768 may receive formation fluid produced from a hydrocarbon containing formation during an in situ conversion process. Separator 1768 may separate the formation fluid into gas stream 1770, liquid hydrocarbon condensate stream 1772, and water stream 1774.

Water stream 1774 may flow from separator 1768 to a portion of a formation, to a containment system, or to a processing unit. For example, water stream 1774 may flow from separator 1768 to an ammonia production unit. Ammonia produced in the ammonia production unit may flow to an ammonium sulfate unit. The ammonium sulfate unit may combine the ammonia with $H_2SO_4$ or $SO_2/SO_3$ to produce ammonium sulfate. In addition, ammonia produced in the ammonia production unit may flow to a urea production unit. The urea production unit may combine carbon dioxide with the ammonia to produce urea.

Gas stream 1770 may flow through a conduit from separator 1768 to gas treatment unit 1796. The gas treatment unit may separate various components of gas stream 1770. For example, the gas treatment unit may separate gas stream 1770 into carbon dioxide stream 1776, hydrogen sulfide stream 1778, hydrogen stream 1780, and stream 1782 that may include, but is not limited to, methane, ethane, propane, butanes (including n-butane or isobutane), pentane, ethene, propene, butene, pentene, water, or combinations thereof.

The carbon dioxide stream may flow through a conduit to a formation, to a containment system, to a disposal unit, and/or to another processing unit. In addition, the hydrogen sulfide stream may also flow through a conduit to a containment system and/or to another processing unit. For example, the hydrogen sulfide stream may be converted into elemental sulfur in a Claus process unit. The gas treatment unit may separate gas stream 1770 into stream 1784. Stream 1784 may include heavier hydrocarbon components from gas stream 1770. Heavier hydrocarbon components may include, for example, hydrocarbons having a carbon number of greater than about 5. Heavier hydrocarbon components in stream 1784 may be provided to liquid hydrocarbon condensate stream 1772.

Treatment facilities 516 may also include processing unit 1786. Processing unit 1786 may separate stream 1782 into a number of streams. Each of the streams may be rich in a predetermined component or a predetermined number of compounds. For example, processing unit 1786 may separate stream 1782 into first portion 1788 of stream 1782, second portion 1790 of stream 1782, third portion 1792 of stream 1782, and fourth portion 1794 of stream 1782. First portion 1788 of stream 1782 may include lighter hydrocarbon components such as methane and ethane. First portion 1788 of stream 1782 may flow from gas treatment unit 1796 to power generation unit 1798.

Power generation unit 1798 may extract useable energy from the first portion of stream 1782. For example, stream 1782 may be produced under pressure. Power generation unit 1798 may include a turbine that generates electricity from the first portion of stream 1782. The power generation unit may also include, for example, a molten carbonate fuel cell, a solid oxide fuel cell, or other type of fuel cell. The extracted useable energy may be provided to user 1800. User 1800 may include, for example, treatment facilities 516, a heat source disposed within a formation, and/or a consumer of useable energy.

Second portion 1790 of stream 1782 may also include light hydrocarbon components. For example, second portion 1790 of stream 1782 may include, but is not limited to, methane and ethane. Second portion 1790 of stream 1782 may be provided to natural gas pipeline 1801. Alternatively, second portion 1790 of stream 1782 may be provided to a local market. The local market may be a consumer market or a commercial market. Second portion 1790 of stream 1782 may be used as an end product or an intermediate product depending on, for example, a composition of the light hydrocarbon components.

Third portion 1792 of stream 1782 may include liquefied petroleum gas ("LPG"). Major constituents of LPG may include hydrocarbons containing three or four carbon atoms such as propane and butane. Butane may include n-butane or isobutane. LPG may also include relatively small concentrations of other hydrocarbons, such as ethene, propene, butene, and pentene. Some LPG may also include additional components. LPG may be a gas at atmospheric pressure and normal ambient temperatures. LPG may be liquefied, however, when moderate pressure is applied or when the temperature is sufficiently reduced. When such moderate pressure is released, LPG gas may have about 250 times a volume of LPG liquid. Therefore, large amounts of energy may be stored and transported compactly as LPG.

Third portion 1792 of stream 1782 may be provided to local market 1802. The local market may include a consumer market or a commercial market. Third portion 1792 of stream 1782 may be used as an end product or an intermediate product. LPG may be used in applications, such as food processing, aerosol propellants, and automotive fuel. LPG may be provided for standard heating and cooking purposes as commercial propane and/or commercial butane. Propane may be more versatile for general use than butane because propane has a lower boiling point than butane.

Fourth portion 1794 of stream 1782 may flow from the gas treatment unit to hydrogen manufacturing unit 1804. Hydrogen-rich stream 1806 is shown exiting hydrogen manufacturing unit 1804. Examples of hydrogen manufacturing unit 1804 may include a steam reformer and a catalytic flameless distributed combustor with a hydrogen separation membrane.

FIG. 185 illustrates an embodiment of a catalytic flameless distributed combustor that may be hydrogen manufacturing unit 1804. Examples of catalytic flameless distributed combustors with hydrogen separation membranes are illustrated in U.S. Provisional Application 60/273,354 filed on Mar. 5, 2001; U.S. patent application Ser. No. 10/091,108 filed on Mar. 5, 2002; U.S. Provisional Application 60/273,353 filed on Mar. 5, 2001; and U.S. Pat. No. 6,821,501 to Matzakos et al., each of which is incorporated by reference as if fully set forth herein. A catalytic flameless distributed combustor may include fuel line 1808, oxidant line 1810, catalyst 1812, and membrane 1814. Fourth portion 1794 of stream 1782 (shown in FIG. 184) may be provided to hydrogen manufacturing unit 1804 as fuel 1816. Fuel 1816 within fuel line 1808 may mix within reaction volume in annular space 1818 between the fuel line and the oxidant line. Reaction of the fuel with the oxidant in the presence of catalyst 1812 may produce reaction products that include $H_2$. Membrane 1814 may allow a portion of the generated $H_2$ to pass into annular space 1820 between outer wall 1822 of oxidant line 1810 and membrane 1814. Excess fuel passing out of fuel line 1808 may be circulated back to an entrance of hydrogen manufacturing unit 1804. Combustion products leaving oxidant line 1810 may include carbon dioxide and other reactions product as well as some fuel and oxidant. The fuel and oxidant may be separated and recirculated back to hydrogen manufacturing unit 1804. Carbon dioxide may be separated from the exit stream. The carbon dioxide may be sequestered within a portion of a formation or used for an alternate purpose.

Fuel line 1808 may be concentrically positioned within oxidant line 1810. Critical flow orifices 1824 within fuel line 1808 may allow fuel to enter into a reaction volume in annular space 1818 between the fuel line and oxidant line 1810. The fuel line may carry a mixture of water and vaporized hydrocarbons such as, but not limited to, methane, ethane, propane, butane, methanol, ethanol, or combinations thereof. The oxidant line may carry an oxidant such as, but not limited to, air, oxygen enriched air, oxygen, hydrogen peroxide, or combinations thereof.

Catalyst 1812 may be located in the reaction volume to allow reactions that produce $H_2$ to proceed at relatively low temperatures. Without a catalyst and without membrane separation of $H_2$, a steam reformation reaction may need to be conducted in a series of reactors with temperatures for a shift reaction occurring in excess of 980° C. With a catalyst and with separation of $H_2$ from the reaction stream, the reaction may occur at temperatures within a range from about 300° C. to about 600° C., or within a range from about 400° C. to about 500° C. Catalyst 1812 may be any steam reforming catalyst. In selected embodiments, catalyst 1812 is a group VIII transition metal, such as nickel. The catalyst may be supported on porous substrate 1826. The substrate may include group III or group IV elements, such as, but not limited to, aluminum, silicon, titanium, or zirconium. In an embodiment, the substrate is alumina ($Al_2O_3$).

Membrane 1814 may remove $H_2$ from a reaction stream within a reaction volume of a hydrogen manufacturing unit 1804. When $H_2$ is removed from the reaction stream, reactions within the reaction volume may generate additional $H_2$. A vacuum may draw $H_2$ from an annular region between membrane 1814 and outer wall 1822 of oxidant line 1810. Alternately, $H_2$ may be removed from the annular region in a carrier gas. Membrane 1814 may separate $H_2$ from other components within the reaction stream. The other components may include, but are not limited to, reaction products, fuel, water, and hydrogen sulfide. The membrane may be a hydrogen-permeable and hydrogen selective material such as, but not limited to, a ceramic, carbon, metal, or combination thereof. The membrane may include, but is not limited to, metals of group VIII, V, III, or I such as palladium, platinum, nickel, silver, tantalum, vanadium, yttrium, and/or niobium. The membrane may be supported on a porous substrate such as alumina. The support may separate membrane 1814 from catalyst 1812. The separation distance and insulation properties of the support may help to maintain the membrane within a desired temperature range.

Hydrogen manufacturing unit 1804 of the treatment facilities embodiment depicted in FIG. 184 may produce hydrogen-rich stream 1806 from fourth portion 1794. Hydrogen-rich stream 1806 may flow into hydrogen stream 1780 to form stream 1828. Stream 1828 may include a larger volume of hydrogen than either hydrogen-rich stream 1806 or hydrogen stream 1780.

Hydrocarbon condensate stream 1772 may flow through a conduit from separator 1768 to hydrotreating unit 1830. Hydrotreating unit 1830 may hydrogenate hydrocarbon condensate stream 1772 to form hydrogenated hydrocarbon condensate stream 1832. The hydrotreater may upgrade and swell the hydrocarbon condensate. Treatment facilities 516 may provide stream 1828 (which includes a relatively high concentration of hydrogen) to hydrotreating unit 1830. $H_2$ in stream 1828 may hydrogenate a double bond of the hydrocarbon condensate, thereby reducing a potential for polymerization of the hydrocarbon condensate. In addition, hydrogen may also neutralize radicals in the hydrocarbon condensate. The hydrogenated hydrocarbon condensate may include relatively short chain hydrocarbon fluids. Furthermore, hydrotreating unit 1830 may reduce sulfur, nitrogen, and aromatic hydrocarbons in hydrocarbon condensate stream 1772. Hydrotreating unit 1830 may be a deep hydrotreating unit or a mild hydrotreating unit. An appropriate hydrotreating unit may vary depending on, for example, a composition of stream 1828, a composition of the hydrocarbon condensate stream, and/or a selected composition of the hydrogenated hydrocarbon condensate stream.

Hydrogenated hydrocarbon condensate stream 1832 may flow from hydrotreating unit 1830 to transportation unit 1834. Transportation unit 1834 may collect a volume of the hydrogenated hydrocarbon condensate and/or to transport the hydrogenated hydrocarbon condensate to market center 1836. Market center 1836 may include, but is not limited to, a consumer marketplace or a commercial marketplace. A commercial marketplace may include a refinery. The hydrogenated hydrocarbon condensate may be used as an end product or an intermediate product.

Alternatively, hydrogenated hydrocarbon condensate stream 1832 may flow to a splitter or an ethene production unit. The splitter may separate the hydrogenated hydrocarbon condensate stream into a hydrocarbon stream including components having carbon numbers of 5 or 6, a naphtha stream, a kerosene stream, and/or a diesel stream. Selected streams exiting the splitter may be fed to the ethene production unit. In addition, the hydrocarbon condensate stream and the hydrogenated hydrocarbon condensate stream may be fed to the ethene production unit. Ethene produced by the ethene production unit may be fed to a petrochemical complex to produce base and industrial chemicals and polymers. Alternatively, the streams exiting the splitter may be fed to a hydrogen conversion unit. A recycle stream may flow from the hydrogen conversion unit to the splitter. The hydrocarbon stream exiting the splitter and the naphtha stream may be fed to a mogas production unit. The kerosene stream and the diesel stream may be distributed as product.

FIG. 186 illustrates an embodiment of an additional processing unit that may be included in treatment facilities 516, such as the facilities depicted in FIG. 184. Air 1620 may be fed to air separation unit 1838. Air separation unit 1838 may generate nitrogen stream 1840 and oxygen stream 1842. In some embodiments, oxygen stream 1842 and steam 1392 may be injected into formation 678 that has previously undergone a pyrolysis phase of an in situ conversion process to generate synthesis gas 1502. In some embodiments, a portion or all of produced synthesis gas 1502 may be provided to Shell Middle Distillates process unit 1844 that produces middle distillates 1846. In some embodiments, a portion or all of produced synthesis gas 1502 may be provided to catalytic methanation process unit 1848 that produces natural gas 1850. A portion or all of produced synthesis gas 1502 may also be provided to methanol production unit 1852 to produce methanol 1854. A portion or all of produced synthesis gas 1502 may be provided to process unit 1856 for production of ammonia and/or urea 1858. Synthesis gas may be used as a fuel for fuel cell 1536 that produces electricity 1518A. A portion or all of produced synthesis gas 1502 may be routed to power generation unit 1798, such as a turbine or combustor, to produce electricity 1518B.

Comparisons of patterns of heat sources were evaluated for patterns having substantially the same heater well density and the same heating input regime. For example, a number of heat sources per unit area in a triangular pattern is the same as the number of heat sources per unit area in the 10 m hexagonal pattern if the space between heat sources is increased to about 12.2 m in the triangular pattern. The equivalent spacing for a square pattern would be 11.3 m, while the equivalent spacing for a 12:1 pattern would be 15.7 m.

FIG. 187 illustrates temperature profile 1860 after three years of heating for a triangular pattern with a 12.2 m spacing in a typical Green River oil shale. FIG. 180 depicts an embodiment of a triangular pattern. Temperature profile 1860 is a three-dimensional plot of temperature versus a location within a triangular pattern. FIG. 188 illustrates temperature profile 1862 after three years of heating for a square pattern with 11.3 m spacing in a typical Green River oil shale. Temperature profile 1862 is a three-dimensional plot of temperature versus a location within a square pattern. FIG. 181 depicts an embodiment of a square pattern. FIG. 189 illustrates temperature profile 1864 after three years of heating for a hexagonal pattern with 10.0 m spacing in a typical Green River oil shale. Temperature profile 1864 is a three-dimensional plot of temperature versus a location within a hexagonal pattern. FIG. 182 depicts an embodiment of a hexagonal pattern.

As shown in a comparison of FIGS. 187, 188, and 189, a temperature profile of the triangular pattern is more uniform than a temperature profile of the square or hexagonal pattern. For example, a minimum temperature of the square pattern is approximately 280° C., and a minimum temperature of the hexagonal pattern is approximately 250° C. In contrast, a minimum temperature of the triangular pattern is approximately 300° C. Therefore, a temperature variation within the triangular pattern after 3 years of heating is 20° C. less than a temperature variation within the square pattern and 50° C. less than a temperature variation within the hexagonal pattern. For a chemical process, where reaction rate is proportional to an exponent of temperature, a 20° C. difference may have a substantial effect on products being produced in a pyrolysis zone.

FIG. 190 illustrates a comparison plot of simulation results showing the average pattern temperature (in degrees Celsius) and temperatures at the coldest spots for each pattern as a function of time (in years). The coldest spot for each pattern is located at a pattern center (centroid). As shown in FIG. 180, the coldest spot of a triangular pattern is point 1866. Curve 1874 of FIG. 190 depicts temperature as a function of time at point 1866. As shown in FIG. 181, the coldest spot of a square pattern is point 1868. Curve 1876 of FIG. 190 depicts temperature as a function of time at point 1868. As shown in FIG. 182, the coldest spot of a hexagonal pattern is point 1870. Curve 1878 of FIG. 190 depicts temperature as a function of time at point 1870. As shown in FIG. 183, the coldest spot of a 12:1 pattern is point 1872. Curve 1880 of FIG. 190 depicts temperature as a function of time at point 1872. The difference between an average pattern temperature and temperature of the coldest spot represents how uniform the temperature distribution for a given pattern is. The more uniform the heating, the better the product quality that may be made in the formation. The larger the volume fraction of resource that is overheated, the greater the amount of undesirable product tends to be made.

In simulations, heat input into each of the various patterns was a constant. The constant heat input into the formation results in average temperature curve 1882 for each pattern. As shown in FIG. 190, the difference between average temperature curve 1882 and curve 1874 for temperature of the coldest spot is less for triangular pattern than for curve 1876 for square pattern, curve 1878 for hexagonal pattern, or curve 1880 for 12:1 pattern. There appears to be a substantial difference between triangular and hexagonal patterns.

Another way to assess the uniformity of temperature distribution is to compare temperatures of the coldest spot of a pattern with a point located at the center of a side of a pattern midway between heaters. As shown in FIG. 180, point 1884 is located at the center of a side of a triangular pattern midway between heaters. Point 1886 is located at the center of a side of the square pattern midway between heaters, as shown in FIG. 181. As shown in FIG. 182, point 1888 is located at the center of a side of the hexagonal pattern midway between heaters.

FIG. 191 illustrates a comparison plot between average pattern temperature curve 1882 (in degrees Celsius), temperature at coldest spot curve 1890 (corresponding to point 1866 in FIG. 180) for triangular patterns, temperature at coldest spot curve 1892 (corresponding to point 1870 in FIG. 182) for hexagonal patterns, temperature at mid-point curve 1894 (corresponding to point 1884 in FIG. 180), and temperature at mid-point curve 1896 (corresponding to point 1888 in FIG. 182) as a function of time (in years). FIG. 192 illustrates a comparison plot between average pattern temperature 1882 (in degrees Celsius), temperatures at coldest spot curve 1898 (corresponding to point 1868 in FIG. 181) and temperature at a mid-point curve 1900 (corresponding to point 1886 in FIG. 181) as a function of time (in years), for a square pattern.

As shown in a comparison of FIGS. 191 and 192, for each pattern, a temperature at a center of a side midway between heaters is higher than a temperature at a center of the pattern. A difference between a temperature at a center of a side midway between heaters and a center of the hexagonal pattern increases substantially during the first year of heating, and stays relatively constant afterward. A difference between a temperature at an outer lateral boundary and a center of the triangular pattern, however, is negligible. Therefore, a temperature distribution in a triangular pattern is more uniform than a temperature distribution in a hexagonal pattern. A square pattern also provides more uniform temperature distribution than a hexagonal pattern, however, it is still less uniform than a temperature distribution in a triangular pattern.

A triangular pattern of heat sources may have, for example, a shorter total process time than a square, hexagonal, or 12:1 pattern of heat sources for the same heater well density. A total process time may include a time required for an average temperature of a heated portion of a formation to reach a target temperature and a time required for a temperature at a coldest spot within the heated portion to reach the target temperature. For example, heat may be provided to the portion of the formation until an average temperature of the heated portion reaches the target temperature. After the average temperature of the heated portion reaches the target temperature, an energy supply to the heat sources may be reduced such that less or minimal heat may be provided to the heated portion. An example of a target temperature may be approximately 340° C. The target temperature, however, may vary depending on, for example, formation composition and/or formation conditions such as pressure.

FIG. 193 illustrates a comparison plot between the average pattern temperature curve and temperatures at the coldest spots for each pattern, as a function of time when heaters are turned off after the average temperature reaches a target value. As shown in FIG. 193, average temperature curve 1882 of the formation reaches a target temperature (about 340° C.) in approximately 3 years. As shown in FIG. 193, temperature at the coldest point curve 1902 (corresponding to point 1866) reaches the target temperature (about 340° C.) about 0.8 years later. A total process time for such a triangular pattern is about 3.8 years when the heat input is discontinued when the target average temperature is reached. As shown in FIG. 193, a temperature at the coldest point within the triangular pattern reaches the target temperature (about 340° C.) before temperature at coldest point curve 1904 (corresponding to point 1868) or temperature at the coldest point curve 1906 (corresponding to point 1870) reaches the target temperature. A temperature at the coldest point within the hexagonal pattern, however, reaches the target temperature after an additional time of about 2 years when the heaters are turned off upon reaching the target average temperature. Therefore, a total process time for a hexagonal pattern is about 5.0 years. A total process time for heating a portion of a formation with a triangular pattern is 1.2 years less (approximately 25% less) than a total process time for heating a portion of a formation with a hexagonal pattern. In an embodiment, the power to the heaters may be reduced or turned off when the average temperature of the pattern reaches a target level. This prevents overheating the resource, which wastes energy and produces lower product quality. The triangular pattern has the most uniform temperatures and the least overheating. Although a capital cost of such a triangular pattern may be approximately the same as a capital cost of the hexagonal pattern, the triangular pattern may accelerate oil production and require a shorter total process time.

A triangular pattern may be more economical than a hexagonal pattern. A spacing of heat sources in a triangular pattern that will have about the same process time as a hexagonal pattern having about a 10.0 m space between heat sources may be equal to approximately 14.3 m. The triangular pattern may include about 26% less heat sources than the equivalent hexagonal pattern. Using the triangular pattern may allow for lower capital cost (i.e., there are fewer heat sources and production wells) and lower operating costs (i.e., there are fewer heat sources and production wells to power and operate).

FIG. 57 depicts an embodiment of a natural distributed combustor. In one experiment, the embodiment schematically shown in FIG. 57 was used to heat high volatile bituminous C coal in situ. A portion of a formation was heated with electrical resistance heaters and/or a natural distributed combustor. Thermocouples were located every 2 feet along the length of the natural distributed combustor (along conduit 1092 schematically shown in FIG. 57). The coal was first heated with electrical resistance heaters until pyrolysis was complete near the well. FIG. 194 depicts square data points measured during electrical resistance heating at various depths in the coal after the temperature profile had stabilized (the coal seam was about 16 feet thick starting at about 28 feet of depth). At this point heat energy was being supplied at about 300 watts per foot. Air was subsequently injected via conduit 1092 at gradually increasing rates, and electric power supplied to the electrical resistance heaters was decreased. Combustion products were removed from the reaction volume through an annular space between conduit 1092 and a well casing. The power supplied to the electrical resistance heaters was decreased at a rate that would approximately offset heating provided by the combustion of the coal adjacent to conduit 1092. Air input was increased and power input was decreased over a period of about 2 hours until no electric power was being supplied.

Diamond data points of FIG. 194 depict temperature as a function of depth for natural distributed combustion heating (without any electrical resistance heating) in the coal after the temperature profile had substantially stabilized. As can be seen in FIG. 194, the natural distributed combustion heating provided a temperature profile that is comparable to the electrical resistance temperature profile (represented by square data points). This experiment demonstrated that natural distributed combustors may provide formation heating that is comparable to the formation heating provided by electrical resistance heaters. This experiment was repeated at different temperatures and in two other wells, all with similar results.

Numerical calculations have been made for a natural distributed combustor system that heats a hydrocarbon containing formation. A commercially available program called PRO-II (Simulation Sciences Inc., Brea, Calif.) was used to make example calculations based on a conduit of diameter 6.03 cm with a wall thickness of 0.39 cm. The conduit was disposed in an opening in the formation with a diameter of 14.4 cm. The conduit had critical flow orifices of 1.27 mm diameter spaced 183 cm apart. The conduit heated a formation of 91.4 m thickness. A flow rate of air was 1.70 standard cubic meters per minute through the critical flow orifices. Pressure of air at the inlet of the conduit was 7 bars absolute. Exhaust gases had a pressure of 3.3 bars absolute. A heating output of 1066 watts per meter was used. A temperature in the opening was set at 760° C. The calculations determined a minimal pressure drop within the conduit of about 0.023 bars. The pressure drop within the opening was less than 0.0013 bars.

FIG. 195 illustrates extension (in meters) of a reaction zone within a coal formation over time (in years) according to the parameters set in the calculations. The width of the reaction zone increases with time due to oxidation of carbon adjacent to the conduit.

Numerical calculations have been made for heat transfer using a conductor-in-conduit heater. Calculations were made for a conductor having a diameter of about 1 inch (2.54 cm) disposed in a conduit having a diameter of about 3 inches (7.62 cm). The conductor-in-conduit heater was disposed in an opening of a carbon containing formation having a diameter of about 6 inches (15.24 cm). An emissivity of the carbon containing formation was maintained at a value of 0.9, which is expected for geological materials. The conductor and the conduit were given alternate emissivity values of high emissivity (0.86), which is common for oxidized metal surfaces, and low emissivity (0.1), which is for polished and/or unoxidized metal surfaces. The conduit was filled with either air or helium. Helium is known to be a more thermally conductive gas than air. The space between the conduit and the opening was filled with a gas mixture of methane, carbon dioxide, and hydrogen gases. Two different gas mixtures were used. The first gas mixture had mole fractions of 0.5 for methane, 0.3 for carbon dioxide, and 0.2 for hydrogen. The second gas mixture had mole fractions of 0.2 for methane, 0.2 for carbon dioxide, and 0.6 for hydrogen.

FIG. 196 illustrates a calculated ratio of conductive heat transfer to radiative heat transfer versus a temperature of a face of the hydrocarbon containing formation in the opening for an air filled conduit. The temperature of the conduit was increased linearly from 93° C. to 871° C. The ratio of conductive to radiative heat transfer was calculated based on emissivity values, thermal conductivities, dimensions of the conductor, conduit, and opening, and the temperature of the conduit. Line 1908 is calculated for the low emissivity value (0.1). Line 1910 is calculated for the high emissivity value (0.86). A lower emissivity for the conductor and the conduit provides for a higher ratio of conductive to radiative heat transfer to the formation. The decrease in the ratio with an increase in temperature may be due to a reduction of conductive heat transfer with increasing temperature. As the temperature on the face of the formation increases, a temperature difference between the face and the heater is reduced, thus reducing a temperature gradient that drives conductive heat transfer.

FIG. 197 illustrates a calculated ratio of conductive heat transfer to radiative heat transfer versus a temperature at a face of the carbon containing formation in the opening for a helium filled conduit. The temperature of the conduit was increased linearly from 93° C. to 871° C. The ratio of conductive to radiative heat transfer was calculated based on emissivity values; thermal conductivities; dimensions of the conductor, conduit, and opening; and the temperature of the conduit. Line 1912 is calculated for the low emissivity value (0.1). Line 1914 is calculated for the high emissivity value (0.86). A lower emissivity for the conductor and the conduit again provides for a higher ratio of conductive to radiative heat transfer to the formation. The use of helium instead of air in the conduit significantly increases the ratio of conductive heat transfer to radiative heat transfer. This may be due to a thermal conductivity of helium being about 5.2 to about 5.3 times greater than a thermal conductivity of air.

FIG. 198 illustrates temperatures of the conductor, the conduit, and the opening versus a temperature at a face of the carbon containing formation for a helium filled conduit and a high emissivity of 0.86. The opening has a gas mixture equivalent to the second mixture described above having a hydrogen mole fraction of 0.6. Opening temperature 1916 was linearly increased from 93° C. to 871° C. Opening temperature 1916 was assumed to be the same as the temperature at the face of the carbon containing formation. Conductor temperature 1918 and conduit temperature 1920 were calculated from opening temperature 1916 using the dimensions of the conductor, conduit, and opening, values of emissivities for the conductor, conduit, and face, and thermal conductivities for gases (helium, methane, carbon dioxide, and hydrogen). It may be seen from the plots of temperatures of the conductor, conduit, and opening for the conduit filled with helium, that at higher temperatures approaching 871° C., the temperatures of the conductor, conduit, and opening begin to equilibrate.

FIG. 199 illustrates temperatures of the conductor, the conduit, and the opening versus a temperature at a face of the carbon containing formation for an air filled conduit and a high emissivity of 0.86. The opening has a gas mixture equivalent to the second mixture described above having a hydrogen mole fraction of 0.6. Opening temperature 1916 was linearly increased from 93° C. to 871° C. Opening temperature 1916 was assumed to be the same as the temperature at the face of the carbon containing formation. Conductor temperature 1918 and conduit temperature 1920 were calculated from opening temperature 1916 using the dimensions of the conductor, conduit, and opening, values of emissivities for the conductor, conduit, and face, and thermal conductivities for gases (air, methane, carbon dioxide, and hydrogen). It may be seen from the plots of temperatures of the conductor, conduit, and opening for the conduit filled with air, that at higher temperatures approaching 871° C., the temperatures of the conductor, conduit, and opening begin to equilibrate, as seen for the helium filled conduit with high emissivity.

FIG. 200 illustrates temperatures of the conductor, the conduit, and the opening versus a temperature at a face of the carbon containing formation for a helium filled conduit and a low emissivity of 0.1. The opening has a gas mixture equivalent to the second mixture described above having a hydrogen mole fraction of 0.6. Opening temperature 1916 was linearly increased from 93° C. to 871° C. Opening temperature 1916 was assumed to be the same as the temperature at the face of the carbon containing formation. Conductor temperature 1918 and conduit temperature 1920 were calculated from opening temperature 1916 using the dimensions of the conductor, conduit, and opening, values of emissivities for the conductor, conduit, and face, and thermal conductivities for gases (helium, methane, carbon dioxide, and hydrogen). It may be seen from the plots of temperatures of the conductor, conduit, and opening for the conduit filled with helium, that at higher temperatures approaching 871° C., the temperatures of the conductor, conduit, and opening do not begin to equilibrate as seen for the high emissivity example shown in FIG. 198. In addition, higher temperatures in the conductor and the conduit are needed to achieve an opening and face temperature of 871° C. Thus, increasing an emissivity of the conductor and the conduit may be advantageous in reducing operating temperatures needed to produce a desired temperature in a carbon containing formation. Such reduced operating temperatures may allow for the use of less expensive alloys for metallic conduits.

FIG. 201 illustrates temperatures of the conductor, the conduit, and the opening versus a temperature at a face of the carbon containing formation for an air filled conduit and a low emissivity of 0.1. The opening has a gas mixture equivalent to the second mixture described above having a hydrogen mole fraction of 0.6. Opening temperature 1916 was linearly increased from 93° C. to 871° C. Opening temperature 1916 was assumed to be the same as the temperature at the face of the carbon containing formation. Conductor temperature 1918 and conduit temperature 1920 were calculated from opening temperature 1916 using the dimensions of the conductor, conduit, and opening, values of emissivities for the conductor, conduit, and face, and thermal conductivities for gases (air, methane, carbon dioxide, and hydrogen). It may be seen from the plots of temperatures of the conductor, conduit, and opening for the conduit filled with helium, that at higher temperatures approaching 871° C., the temperatures of the conductor, conduit, and opening do not begin to equilibrate as seen for the high emissivity example shown in FIG. 199. In addition, higher temperatures in the conductor and the conduit are needed to achieve an opening and face temperature of 871° C. Thus, increasing an emissivity of the conductor and the conduit may be advantageous in reducing operating temperatures needed to produce a desired temperature in a carbon containing formation. Such reduced operating temperatures may provide for a lesser metallurgical cost associated with materials that require less substantial temperature resistance (e.g., a lower melting point).

Calculations were also made using the first mixture of gas having a hydrogen mole fraction of 0.2. The calculations resulted in substantially similar results to those for a hydrogen mole fraction of 0.6.

FIG. 202 depicts a retort and collection system used to conduct certain experiments. Retort vessel 1922 was a pressure vessel of 316 stainless steel for holding a material to be tested. The vessel and appropriate flow lines were wrapped with a 0.0254 m by 1.83 m electric heating tape. The wrapping provided substantially uniform heating throughout the retort system. The temperature was controlled by measuring a temperature of the retort vessel with a thermocouple and altering the electrical input to the heating tape with a proportional controller to approach a desired set point. Insulation surrounded the heating tape. The vessel sat on a 0.0508 m thick insulating block. The heating tape extended past the bottom of the stainless steel vessel to counteract heat loss from the bottom of the vessel.

A 0.00318 m stainless steel dip tube 1924 was inserted through mesh screen 1926 and into the small dimple on the bottom of vessel 1922. Dip tube 1924 was slotted near an end to inhibit plugging of the dip tube. Mesh screen 1926 was supported along the cylindrical wall of the vessel by a small ring having a thickness of about 0.00159 m. The small ring provides a space between an end of dip tube 1924 and a bottom of retort vessel 1922 to inhibit solids from plugging the dip tube. A thermocouple was attached to the outside of the vessel to measure a temperature of the steel cylinder. The thermocouple was protected from direct heat of the heater by a layer of insulation. Air-operated diaphragm type backpressure valve 1928 was provided for tests at elevated pressures. The products at atmospheric pressure passed into conventional glass laboratory condenser 1930. Coolant disposed in the condenser 1930 was chilled water having a temperature of about 1.7° C. The oil vapor and steam products condensed in the flow lines of the condenser flowed into the graduated glass collection tube. A volume of produced oil and water was measured visually. Non-condensable gas flowed from condenser 1930 through gas bulb 1932. Gas bulb 1932 has a capacity of 500 $cm^3$. In addition, gas bulb 1932 was originally filled with helium. The valves on the bulb were two-way valves 1934 to provide easy purging of bulb 1932 and removal of non-condensable gases for analysis. Considering a sweep efficiency of the bulb, the bulb would be expected to contain a composite sample of the previously produced 1 to 2 liters of gas. Standard gas analysis methods were used to determine the gas composition. The gas exiting the bulb passed into collection vessel 1936 that is in water 1524 in water bath 1938. Water bath 1938 was graduated to provide an estimate of the volume of the produced gas over a time of the procedure (the water level changed, thereby indicating the amount of gas produced). Collection vessel 1936 also included an inlet valve at a bottom of the collection system under water and a septum at a top of the collection system for transfer of gas samples to an analyzer.

At location 1940 one or more gases may be injected into the system shown in FIG. 202 to pressurize, maintain pressure, or sweep fluids in the system. Pressure gauge 1942 may be used to monitor pressure in the system. Heating/insulating material 1944 (e.g., insulation or a temperature control bath) may be used to regulate and/or maintain temperatures. Controller 1946 may be used to control heating of vessel 1922.

A final volume of gas produced is not the volume of gas collected over water because carbon dioxide and hydrogen sulfide are soluble in water. Analysis of the water has shown that the gas collection system over water removes about a half of the carbon dioxide produced in a typical experiment. The concentration of carbon dioxide in water affects a concentration of the non-soluble gases collected over water. In addition, the volume of gas collected over water was found to vary from about one-half to two-thirds of the volume of gas produced.

The system was purged with about 5 to 10 pore volumes of helium to remove all air and pressurized to about 20 bars absolute for 24 hours to check for pressure leaks. Heating was then started slowly, taking about 4 days to reach 260° C. After about 8 to 12 hours at 260° C., the temperature was raised as specified by the schedule desired for the particular test. Readings of temperature on the inside and outside of the vessel were recorded frequently to assure that the controller was working correctly.

In one experiment, oil shale was tested in the system shown in FIG. 202. In this experiment, 270° C. was about the lowest temperature at which oil was generated at any appreciable rate. Water production started at about 100° C. and was monitored at all times during the run. Various amounts of gas were generated during the course of production. Gas production was monitored throughout the run.

Oil and water production were collected in 4 or 5 fractions throughout the run. These fractions were composite samples over a particular time interval involved. The cumulative volume of oil and water in each fraction was measured as it accrued. After each fraction was collected, the oil was analyzed as desired. The density of the oil was measured.

After the test, the retort was cooled, opened, and inspected for evidence of any liquid residue. A representative sample of the crushed shale loaded into the retort was taken and analyzed for oil generating potential by the Fischer Assay method. After the test, three samples of spent shale in the retort were taken: one near the top, one at the middle, and one near the bottom. These samples were tested for remaining organic matter and elemental analysis.

Experimental data from the experiment described above was used to determine a pressure-temperature relationship relating to the quality of the produced fluids. Varying the operating conditions included altering temperatures and pressures. Various samples of oil shale were pyrolyzed at various operating conditions. The quality of the produced fluids was described by a number of desired properties. Desired properties included API gravity, an ethene to ethane ratio, an atomic carbon to atomic hydrogen ratio, equivalent liquids produced (gas and liquid), liquids produced, percent of Fischer Assay, and percent of fluids with carbon numbers greater than about 25. Based on data collected in these equilibrium experiments, families of curves for several values of each of the properties were constructed as shown in FIGS. 203-209. EQNS. 64, 65, and 66 were used to describe the functional relationship of a given value of a property:

$$P=\exp[(A/T)+B], \quad (64)$$

$$A=a_1*(\text{property})^3+a_2*(\text{property})^2+a_3*(\text{property})+a_4 \quad (65)$$

$$B=b_1*(\text{property})^3+b_2*(\text{property})^2+b_3*(\text{property})+b_4. \quad (66)$$

The generated curves may be used to determine a selected temperature and a selected pressure for producing fluids with desired properties.

In FIG. 203, a plot of gauge pressure versus temperature is depicted (in FIGS. 203-209 the pressure is indicated in bars). Lines representing the fraction of products with carbon numbers greater than about 25 were plotted. For example, when operating at a temperature of 375° C. and a pressure of 4.5 bars absolute, 15% of the produced fluid hydrocarbons had a carbon number equal to or greater than 25. At low pyrolysis temperatures and high pressures, the fraction of produced fluids with carbon numbers greater than about 25 decreases. Therefore, operating at a high pressure and a pyrolysis temperature at the lower end of the pyrolysis temperature zone may decrease the fraction of fluids with carbon numbers greater than 25 produced from oil shale.

FIG. 204 illustrates oil quality produced from an oil shale formation as a function of pressure and temperature. Lines indicating different oil qualities, as defined by API gravity, are plotted. For example, the quality of the produced oil was 40° API when pressure was maintained at about 11.1 bars absolute and a temperature was about 375° C. Low pyrolysis temperatures and relatively high pressures may produce a high API gravity oil.

FIG. 205 illustrates an ethene to ethane ratio produced from an oil shale formation as a function of pressure and temperature. For example, at a pressure of 21.7 bars absolute and a temperature of 375° C., the ratio of ethene to ethane is approximately 0.01. The volume ratio of ethene to ethane may predict an olefin to alkane ratio of hydrocarbons produced during pyrolysis. Olefin content may be reduced by operating at temperatures at a lower end of a pyrolysis temperature range and at a high pressure.

FIG. 206 depicts the dependence of yield of equivalent liquids produced from an oil shale formation as a function of temperature and pressure. Line 1948 represents the pressure-temperature combination at which $8.38\times10^{-5}$ m$^3$ of fluid per kilogram of oil shale (20 gallons/ton) was produced. The pressure/temperature plot results in line 1950 for the production of total fluids per ton of oil shale equal to $1.05\times10^{-4}$ m$^3$/kg (25 gallons/ton). Line 1952 illustrates that $1.21\times10^{-4}$ m$^3$ of fluid was produced from 1 kilogram of oil shale (30 gallons/ton). At a temperature of about 325° C. and a pressure of about 14.8 bars absolute, the resulting equivalent liquids produced was $8.38\times10^{-5}$ m$^3$/kg. As temperature of the retort increased and the pressure decreased, the yield of the equivalent liquids produced increased. Equivalent liquids produced is defined as the amount of liquids equivalent to the energy value of the produced gas and liquids.

FIG. 207 illustrates a plot of oil yield produced from treating an oil shale formation, measured as volume of liquids per ton of the formation, as a function of temperature and pressure of the retort. Temperature is illustrated in units of Celsius on the x-axis, and pressure is illustrated in units of bars absolute on the y-axis. As shown in FIG. 207, the yield of liquid/condensable products increases as temperature of the retort increases and pressure of the retort decreases. The lines on FIG. 207 correspond to different liquid production rates measured as the volume of liquids produced per weight of oil shale. The data is tabulated in TABLE 20.

TABLE 20

| LINE | VOLUME PRODUCED/MASS OF OIL SHALE (m$^3$/kg) |
|---|---|
| 1954 | $5.84\times10^{-5}$ |
| 1956 | $6.68\times10^{-5}$ |
| 1958 | $7.51\times10^{-5}$ |
| 1960 | $8.35\times10^{-5}$ |

FIG. 208 illustrates yield of oil produced from treating an oil shale formation expressed as a percent of Fischer Assay as a function of temperature and pressure. Temperature is illustrated in units of degrees Celsius on the x-axis, and gauge pressure is illustrated in units of bars on the y-axis. Fischer Assay was used as a method for assessing a recovery of hydrocarbon condensate from the oil shale. In this case, a maximum recovery would be 100% of the Fischer Assay. As the temperature decreased and the pressure increased, the percent of Fischer Assay yield decreased.

FIG. 209 illustrates hydrogen to carbon ratio of hydrocarbon condensate produced from an oil shale formation as a function of a temperature and pressure. Temperature is illustrated in units of degrees Celsius on the x-axis, and pressure is illustrated in units of bars on the y-axis. As shown in FIG. 209, a hydrogen to carbon ratio of hydrocarbon condensate produced from an oil shale formation decreases as a temperature increases and as a pressure decreases. Treating an oil shale formation at high temperatures may decrease a hydrogen concentration of the produced hydrocarbon condensate.

FIG. 210 illustrates the effect of pressure and temperature within an oil shale formation on a ratio of olefins to paraffins. The relationship of the value of one of the properties (R) with temperature has the same functional form as the pressure-temperature relationships previously discussed. In this case, the property (R) can be explicitly expressed as a function of pressure and temperature, as in EQNS. 67, 68, and 69.

$$R=\exp[F(P)/T)+G(P)] \quad (67)$$

$$F(P)=f_1*(P)^3+f_2*(P)^2+f_3*(P)+f_4 \quad (68)$$

$$G(P)=g_1*(P)^3+g_2*(P)^2+g_3*(P)+g_4 \quad (69)$$

wherein R is a value of the property, T is the absolute temperature (in Kelvin), and F(P) and G(P) are functions of pressure representing the slope and intercept of a plot of R versus 1/T.

Data from experiments were compared to data from other sources. Isobars were plotted on a temperature versus olefin to paraffin ratio graph using data from a variety of sources. Data from the experiments included isobars at 1 bar absolute 1962, 2.5 bars absolute 1964, 4.5 bars absolute 1966, 7.9 bars absolute 1968, and 14.8 bars absolute 1970. Additional data plotted included data from a surface retort, data from Ljungstrom 1972, and data from ex situ oil shale studies conducted by Lawrence Livermore Laboratories 1974. As illustrated in FIG. 210, the olefin to paraffin ratio appears to increase as the pyrolysis temperature increases. However, for a fixed temperature, the ratio decreases rapidly with an increase in pressure. Higher pressures and lower temperatures appear to favor the lowest olefin to paraffin ratios. At a temperature of about 350° C. and a pressure of about 7.9 bars absolute 1968, a ratio of olefins to paraffins was approximately 0.01. Pyrolyzing at reduced temperature and increased pressure may decrease an olefin to paraffin ratio. Pyrolyzing hydrocarbons for a longer period of time, which may be accomplished by increasing pressure within the system, may result in a lower average molecular weight oil. In addition, production of gas may increase when pressure is increased. A non-volatile coke may be formed in the formation.

FIG. 211 illustrates a relationship between an API gravity of a hydrocarbon condensate fluid, the partial pressure of molecular hydrogen within the fluid, and a temperature within an oil shale formation. As illustrated in FIG. 211, as a partial pressure of hydrogen within the fluid increased, the API gravity generally increased. In addition, lower pyrolysis temperatures appear to have increased the API gravity of the produced fluids. Maintaining a partial pressure of molecular hydrogen within a heated portion of a hydrocarbon containing formation may increase the API gravity of the produced fluids.

In FIG. 212, a quantity of oil liquids produced in $m^3$ of liquids per kg of oil shale formation is plotted versus a partial pressure of $H_2$. Also illustrated in FIG. 212 are various curves for pyrolysis occurring at different temperatures. At higher pyrolysis temperatures, production of oil liquids was higher than at the lower pyrolysis temperatures. In addition, high pressures tended to decrease the quantity of oil liquids produced from an oil shale formation. Operating an in situ conversion process at low pressures and high temperatures may produce a higher quantity of oil liquids than operating at low temperatures and high pressures.

As illustrated in FIG. 213, an ethene to ethane ratio in the produced gas increased with increasing temperature. In addition, application of pressure decreased the ethene to ethane ratio significantly. As illustrated in FIG. 213, lower temperatures and higher pressures decreased the ethene to ethane ratio. The ethene to ethane ratio is indicative of the olefin to paraffin ratio in the condensed hydrocarbons.

FIG. 214 illustrates an atomic hydrogen to atomic carbon ratio in the hydrocarbon liquids. In general, lower temperatures and higher pressures increased the atomic hydrogen to atomic carbon ratio of the produced hydrocarbon liquids.

A small-scale field experiment of an in situ conversion process in oil shale was conducted. An objective of this test was to substantiate laboratory experiments that produced high quality crude utilizing the in situ retort process.

As illustrated in FIG. 215, the field experiment consisted of a single unconfined hexagonal seven spot pattern on eight foot spacing. Six heater wells 520, drilled to a depth of 40 m, contained 17 m long heating elements that injected thermal energy into the formation from 21 m to 39 m. Production well 512 in the center of the pattern captured the liquids and vapors from the in situ retort. Three observation wells 1976 inside the pattern and one outside the pattern recorded formation temperatures and pressures. Six dewatering wells 1978 surrounded the pattern on 6 m spacing and were completed in an active aquifer below the heated interval (from 44 m to 61 m).

FIG. 216 depicts a cross-sectional representation of the field experiment. Production well 512 includes pump 538. Lower portion 1980 of production well 512 was packed with gravel. Upper portion 1982 of production well 512 was cemented. Heater wells 520 were located a distance of approximately 2.4 m from production well 512. A heating element was located within the heater well and the heater well was cemented in place. Dewatering wells 1978 were located approximately 4.0 m from heater wells 520. Coring well 1984 was located approximately 0.5 m from heater wells 520.

Produced oil, gas, and water were sampled and analyzed throughout the life of the experiment. Surface and subsurface pressures and temperatures and energy injection data were captured electronically and saved for future evaluation. The composite oil produced from the test had a 36° API gravity with a low olefin content of 1.1 weight % and a paraffin content of 66 weight %. The composite oil also included a sulfur content of 0.4 weight %. This condensate-like crude confirmed the quality predicted from the laboratory experiments. The composition of the gas changed throughout the test. The gas was high in hydrogen (average approximately 25 mol %) and $CO_2$ (average approximately 15 mol %), as expected.

Evaluation of the post heat core indicates that the oil shale zone was thoroughly retorted except for the top and bottom 1 m to 1.2 m. Oil recovery efficiency was shown to be in the 75% to 80% range. Some retorting also occurred at least two feet outside of the pattern. During the in situ conversion process experiment, the formation pressures were monitored with pressure monitoring wells. The pressure increased to a highest pressure at 9.4 bars absolute and then slowly declined. The high oil quality was produced at the highest pressure and temperatures below 350° C. The pressure was allowed to decrease to atmospheric as temperatures increased above 370° C. As predicted, the oil composition under these conditions was shown to be of lower API gravity, higher molecular weight, greater carbon numbers in carbon number distribution, higher olefin content, and higher sulfur and nitrogen contents.

FIG. 217 illustrates a plot of the maximum temperatures within each of three innermost observation wells 1976 (see FIG. 215) versus time. The temperature profiles were very similar for the three observation wells. Heat was provided to the oil shale formation for 216 days. As illustrated in FIG. 217, the temperature at the observer wells increased steadily until the heat was turned off.

FIG. 218 illustrates a plot of hydrocarbon liquids production, in barrels per day, for the same in situ experiment. In this figure, the line marked as "Separator Oil" indicates the hydrocarbon liquids that were produced after the produced fluids were cooled to ambient conditions and separated. In this figure the line marked as "Oil & C5+Gas Liquids" includes the hydrocarbon liquids produced after the produced fluids were cooled to ambient conditions and separated and, in addition, the assessed $C_5$ and heavier compounds that were flared. The total liquid hydrocarbons produced to a stock tank during the experiment was 194 barrels. The total equivalent liquid hydrocarbons produced (including the $C_5$ and heavier compounds) was 250 barrels. As indicated in FIG. 218, the heat was turned off at day 216, however, some hydrocarbons continued to be produced thereafter.

FIG. 219 illustrates a plot of production of hydrocarbon liquids (in barrels per day), gas (in MCF per day), and water (in barrels per day), versus heat energy injected (in megawatt-hours), during the same in situ experiment. As shown in FIG. 219, the heat was turned off after about 440 megawatt-hours of energy had been injected.

As illustrated in FIG. 220, pressure within the oil shale material showed some variations initially at different depths, however, over time these variations equalized. FIG. 220 depicts the gauge fluid pressure in observation well 1976 versus time measured in days at a radial distance of 2.1 m from production well 512, shown in FIG. 215. The fluid pressures were monitored at depths of 24 m and 33 m. These depths corresponded to a richness within the oil shale material of $8.3\times10^{-5}$ $m^3$of oil/kg of oil shale at 24 m and $1.7\times10^{-4}$ $m^3$of oil/kg of oil shale at 33 m. The higher pressures initially observed at 33 m may be the result of a higher generation of fluids due to the richness of the oil shale material at that depth. In addition, at lower depths a lithostatic pressure may be higher, causing the oil shale material at 33 m to fracture at higher pressure than at 24 m. During the course of the experiment, pressures within the oil shale formation equalized. The equalization of the pressure may have resulted from fractures forming within the oil shale formation.

FIG. 221 is a plot of API gravity versus time measured in days. As illustrated in FIG. 221, the API gravity was relatively high (i.e., hovering around 40° until about 140 days). The API gravity, although it still varied, decreased steadily thereafter. Prior to 110 days, the pressure measured at shallower depths was increasing, and after 110 days, it began to decrease significantly. At about 140 days, the pressure at the deeper depths began to decrease. At about 140 days, the temperature as measured at the observation wells increased above about 370° C.

In FIG. 222 average carbon numbers of the produced fluid are plotted versus time measured in days. At approximately 140 days, the average carbon number of the produced fluids increased. This approximately corresponded to the temperature rise and the drop in pressure illustrated in FIG. 217 and FIG. 220, respectively. In addition, as shown in FIG. 223, the density of the produced hydrocarbon liquids, in grams per cc, increased at approximately 140 days. The quality of the produced hydrocarbon liquids, as demonstrated in FIG. 221, FIG. 222, and FIG. 223, decreased as the temperature increased and the pressure decreased.

FIG. 224 depicts a plot of the weight percent of specific carbon numbers of hydrocarbons within the produced hydrocarbon liquids. The various curves represent different times at which the liquids were produced. The carbon number distribution of the produced hydrocarbon liquids for the first 136 days exhibited a relatively narrow carbon number distribution, with a low weight percent of carbon numbers above 16. The carbon number distribution of the produced hydrocarbon liquids becomes progressively broader as time progresses after 136 days (e.g., from 199 days to 206 days to 231 days). As the temperature continued to increase and the pressure had decreased towards one atmosphere absolute, the product quality steadily deteriorated.

FIG. 225 illustrates a plot of the weight percent of specific carbon numbers of hydrocarbons within the produced hydrocarbon liquids. Curve 1986 represents the carbon distribution for the composite mixture of hydrocarbon liquids over the entire in situ conversion process ("ICP") field experiment. For comparison, a plot of the carbon number distribution for hydrocarbon liquids produced from a surface retort of the same Green River oil shale is also depicted as curve 1988. In the surface retort, oil shale was mined, placed in a vessel, and rapidly heated at atmospheric pressure to a high temperature in excess of 500° C. As illustrated in FIG. 225, a carbon number distribution of the majority of the hydrocarbon liquids produced from the ICP field experiment was within a range of 8 to 15. The peak carbon number from production of oil during the ICP field experiment was about 13. In contrast, curve 1988 shows a relatively flat carbon number distribution with a substantial amount of carbon numbers greater than 25. In addition, the acid number of oil produced from the ICP field experiment was 0.14 mg/gram KOH.

During the ICP experiment, the formation pressures were monitored with pressure monitoring wells. The pressure increased to a highest pressure at 9.3 bars absolute and then slowly declined. The high oil quality was produced at the highest pressures and temperatures below 350° C. The pressure was allowed to decrease to atmospheric as temperatures increased above 370° C. As predicted, the oil composition under these conditions was shown to be of lower API gravity, higher molecular weight, greater carbon numbers in the carbon number distribution, higher olefin content, and higher sulfur and nitrogen contents.

Experimental data from studies conducted by Lawrence Livermore National Laboratories (LLNL) was plotted along with laboratory data from the in situ conversion process (ICP) for an oil shale formation at atmospheric pressure in FIG. 226. The oil recovery as a percent of Fischer Assay was plotted against a log of the heating rate. Data from LLNL 1990 included data derived from pyrolyzing powdered oil shale at atmospheric pressure and in a range from about 2 bars absolute to about 2.5 bars absolute. As illustrated in FIG. 226, data from LLNL 1990 has a linear trend. Data from ICP 1992 demonstrates that oil recovery, as measured by Fischer Assay, was much higher for ICP than data from LLNL 1990 would suggest. FIG. 226 shows that oil recovery from oil shale may increase along an S-curve, instead of linearly, as a function of heating rate.

Results from the oil shale field experiment (e.g., measured pressures, temperatures, produced fluid quantities and compositions, etc.) were input into a numerical simulation model to assess formation fluid transport mechanisms. FIG. 227 shows the results from the computer simulation. In FIG. 227, oil production 1994 in stock tank barrels/day was plotted versus time. Area 1996 represents the liquid hydrocarbons in the formation at reservoir conditions that were measured in the field experiment. FIG. 227 indicates that more than 90% of the hydrocarbons in the formation were vapors. Based on these results and the fact that the wells in the field test produced mostly vapors (until such vapors were cooled, at which point hydrocarbon liquids were produced), it is believed that hydrocarbons in the formation move through the formation primarily as vapors when heated.

A series of experiments was conducted to determine the effects of various properties of hydrocarbon containing formations on properties of fluids produced from coal formations. The series of experiments included organic petrography, proximate/ultimate analyses, Rock-Eval pyrolysis, Leco Total Organic Carbon ("TOC"), Fischer Assay, and pyrolysis-gas chromatography. Such a combination of petrographic and chemical techniques may provide a quick and inexpensive method for determining physical and chemical properties of coal and for providing a comprehensive understanding of the effect of geochemical parameters on potential oil and gas production from coal pyrolysis. The series of experiments were conducted on forty-five cubes of coal to determine source rock properties of each coal and to assess potential oil and gas production from each coal.

Organic petrology is the study, mostly under the microscope, of the organic constituents of coal and other rocks. The ultimate analysis refers to a series of defined methods that are used to determine the carbon, hydrogen, sulfur, nitrogen, ash, oxygen, and the heating value of a coal. Proximate analysis is the measurement of the moisture, ash, volatile matter, and fixed carbon content of a coal.

Rock-Eval pyrolysis is a petroleum exploration tool developed to assess the generative potential and thermal maturity of prospective source rocks. A ground sample may be pyrolyzed in a helium atmosphere. For example, the sample may be initially heated and held at a temperature of 300° C. for 5 minutes. The sample may be further heated at a rate of 25° C./min to a final temperature of 600° C. The final temperature may be maintained for 1 minute. The products of pyrolysis may be oxidized in a separate chamber at 580° C. to determine the total organic carbon content. All components generated may be split into two streams passing through a flame ionization detector, which measures hydrocarbons, and a thermal conductivity detector, which measures $CO_2$.

Leco Total Organic Carbon ("TOC") involves combustion of coal. For example, a small sample (about 1 gram) is heated to 1500° C. in a high-frequency electrical field under an oxygen atmosphere. Conversion of carbon to carbon dioxide is measured volumetrically. Pyrolysis-gas chromatography may be used for quantitative and qualitative analysis of pyrolysis gas.

Coal of different ranks and vitrinite reflectances were treated in a laboratory to simulate an in situ conversion process. The different coal samples were heated at a rate of about 2° C./day and at a pressure of 1 bar or 4.4 bars absolute. FIG. 228 shows weight percents of paraffins plotted against vitrinite reflectance. As shown in FIG. 228, weight percent of paraffins in the produced oil increases at vitrinite reflectances of the coal below about 0.9%. In addition, a weight percent of paraffins in the produced oil approaches a maximum at a vitrinite reflectance of about 0.9%. FIG. 229 depicts weight percentages of cycloalkanes in the produced oil plotted versus vitrinite reflectance. As shown in FIG. 229, a weight percent of cycloalkanes in the oil produced increased as vitrinite reflectance increased. Weight percentages of a sum of paraffins and cycloalkanes is plotted versus vitrinite reflectance in FIG. 230. In some embodiments, an in situ conversion process may be utilized to produce phenol. Phenol generation may increase when a fluid pressure within the formation is maintained at a low pressure. Phenol weight percent in the produced oil is depicted in FIG. 231. A weight percent of phenol in the produced oil decreases as the vitrinite reflectance increases. FIG. 232 illustrates a weight percentage of aromatics in the hydrocarbon fluids plotted against vitrinite reflectance. As shown in FIG. 232, a weight percent of aromatics in the produced oil decreases below a vitrinite reflectance of about 0.9%. A weight percent of aromatics in the produced oil increases above a vitrinite reflectance of about 0.9%. FIG. 233 depicts a ratio of paraffins to aromatics 1998 and a ratio of aliphatics to aromatics 2000 plotted versus vitrinite reflectance. Both ratios increase to a maximum at a vitrinite reflectance between about 0.7% and about 0.9%. Above a vitrinite reflectance of about 0.9%, both ratios decrease as vitrinite reflectance increases.

FIG. 234 depicts the condensable hydrocarbon compositions and condensable hydrocarbon API gravities that were produced when various ranks of coal were treated as is described above for FIGS. 228-233. In FIG. 234, "SubC" means a rank of sub-bituminous C coal, "SubB" means a rank of sub-bituminous B coal, "SubA" refers to a rank of sub-bituminous A coal, "HVC" refers to a rank of high volatile bituminous C coal, "HVB/A" refers to a rank of high volatile bituminous coal at the border between B and A rank coal, "MV" refers to a rank medium volatile bituminous coal, and "Ro" refers to vitrinite reflectance. As can be seen in FIG. 234, certain ranks of coal will produce different compositions when treated by different methods. For instance, in many circumstances it may be desirable to treat coal having a rank of HVB/A because such coal produces the highest API gravity, the highest weight percent of paraffins, and the highest weight percent of the sum of paraffins and cycloalkanes.

FIGS. 235-238 illustrate the yields of components in terms of $m^3$ of product per kg of hydrocarbon containing formation, when measured on a dry, ash free basis. As illustrated in FIG. 235 the yield of paraffins increased as the vitrinite reflectance of the coal increased. However, for coals with a vitrinite reflectance greater than about 0.7% to 0.8%, the yield of paraffins fell off dramatically. In addition, a yield of cycloalkanes followed similar trends as the paraffins, increasing as the vitrinite reflectance of coal increased and decreasing for coals with a vitrinite reflectance greater than about 0.7% or 0.8%, as illustrated in FIG. 236. FIG. 237 illustrates the increase of both paraffins and cycloalkanes as the vitrinite reflectance of coal increases to about 0.7% or 0.8%. As illustrated in FIG. 238, the yield of phenols may be relatively low for coal material with a vitrinite reflectance of less than about 0.3% and greater than about 1.25%. Production of phenols may be desired due to the value of phenol as a feedstock for chemical synthesis.

As demonstrated in FIG. 239, the API gravity appears to increase significantly when the vitrinite reflectance is greater than about 0.4%. FIG. 240 illustrates the relationship between coal rank, (i.e., vitrinite reflectance), and a yield of condensable hydrocarbons (in gallons per ton on a dry ash free basis) from a coal formation. The yield in this experiment appears to be in an optimal range when the coal has a vitrinite reflectance greater than about 0.4% to less than about 1.3%.

FIG. 241 illustrates a plot of $CO_2$ yield of coal having various vitrinite reflectances. In FIGS. 241 and 242, $CO_2$ yield is expressed in weight percent on a dry ash free basis. As shown in FIG. 241, at least some $CO_2$ was produced from all of the coal samples. The $CO_2$ production may correspond to various oxygenated functional groups present in the initial coal samples. A yield of $CO_2$ produced from low-rank coal samples was significantly higher than $CO_2$ production from high-rank coal samples. Low-rank coals may include lignite and sub-bituminous brown coals. High-rank coals may include semi-anthracite and anthracite coal. FIG. 242 illustrates a plot of $CO_2$ yield from a portion of a coal formation versus the atomic O/C ratio within a portion of a coal formation. As O/C atomic ratio increases, a $CO_2$ yield increases.

A slow heating process may produce condensed hydrocarbon fluids having API gravities in a range of 22° to 50°, and average molecular weights of about 150g/gmol to about 250g/gmol. These properties may be compared to properties of condensed hydrocarbon fluids produced by ex situ retorting of coal as reported in Great Britain Published Patent Application No. GB 2,068,014 A, which is incorporated by reference as if fully set forth herein. The ex situ process produced a lower quality product than an in situ conversion process. For example, properties of condensed hydrocarbon fluids produced by an ex situ retort process include API gravities of 1.9° to 7.9° produced at temperatures of 521° C. and 427° C., respectively.

TABLE 21 shows a comparison of gas compositions, in percent volume, obtained from in situ gasification of coal using air injection to heat the coal, in situ gasification of coal using oxygen injection to heat the coal, and in situ gasification of coal in a reducing atmosphere by thermal pyrolysis heating as described in embodiments herein.

TABLE 21

| | Gasification With Air | Gasification With Oxygen | Thermal Pyrolysis Heating |
|---|---|---|---|
| $H_2$ | 18.6% | 35.5% | 16.7% |
| Methane | 3.6% | 6.9% | 61.9% |
| Nitrogen and Argon | 47.5% | 0.0 | 0.0 |
| Carbon Monoxide | 16.5% | 31.5% | 0.9% |
| Carbon Dioxide | 13.1% | 25.0% | 5.3% |
| Ethane | 0.6% | 1.1% | 15.2% |

As shown in TABLE 21, gas produced according to an embodiment may be treated and sold through existing natural gas systems. In contrast, gas produced by typical in situ gasification processes may not be treated and sold through existing natural gas systems. For example, a heating value of the gas produced by gasification with air was 6000 kJ/$m^3$, and a heating value of gas produced by gasification with oxygen was 11,439 kJ/$m^3$. In contrast, a heating value of the gas produced by thermal conductive heating was 39,159 kJ/$m^3$.

Experiments were conducted to determine the difference between treating relatively large solid blocks of coal versus treating relatively small loosely packed particles of coal. As illustrated in FIG. 243, coal in cube 2002 was heated to pyrolyze the coal. Heat was provided to the coal from heat source 508A inserted into the center of the cube and also from heat sources 508B located on the sides of the cube. The cube was surrounded by insulation 2004. The temperature was raised simultaneously using heat sources 508A, 508B at a rate of about 2° C./day at atmospheric pressure. Measurements from temperature gauges 2006 were used to determine an average temperature of cube 2002. Pressure in cube 2002 was monitored with pressure gauge 1942. The fluids produced from the cube of coal were collected and routed through conduit 2008. Temperature of the product fluids was monitored with temperature gauge 2006 on conduit 2008. A pressure of the product fluids was monitored with pressure gauge 1942 on conduit 2008. A hydrocarbon condensate was separated from a non-condensable fluid in separator 2010. Pressure in separator 2010 was monitored with pressure gauge 1942. A portion of the non-condensable fluid was routed through conduit 2012 to gas analyzers 2014 for characterization. Grab samples were taken from grab sample port 2016. Temperature of the non-condensable fluids was monitored with temperature gauge 2006 on conduit 2012. A pressure of the non-condensable fluids was monitored with pressure gauge 1942 on conduit 2012. The remaining gas was routed through flow meter 2018, carbon bed 2020, and vented to the atmosphere. The produced hydrocarbon condensate was collected and analyzed to determine the composition of the hydrocarbon condensate.

FIG. 244 illustrates an experimental drum apparatus. The drum apparatus was used to test coal. Electric heater 1132 and bead heater 2022 were used to uniformly heat contents of drum 2024. Insulation 2004 surrounds drum 2024. Contents of drum 2024 were heated at a rate of about 2° C./day at various pressures. Measurements from temperature gauges 2006 were used to determine an average temperature in drum 2024. Pressure in the drum was monitored with pressure gauge 1942. Product fluids were removed from drum 2024 through conduit 2008. Temperature of the product fluids was monitored with temperature gauge 2006 on conduit 2008. A pressure of the product fluids was monitored with pressure gauge 1942 on conduit 2008. Product fluids were separated in separator 2010. Separator 2010 separated product fluids into condensable and non-condensable products. Pressure in separator 2010 was monitored with pressure gauge 1942. Non-condensable product fluids were removed through conduit 2012. A composition of a portion of non-condensable product fluids removed from separator 2010 was determined by gas analyzer 2014. A portion of condensable product fluids was removed from separator 2010. Compositions of the portion of condensable product fluids collected were determined by external analysis methods. Temperature of the non-condensable fluids was monitored with temperature gauge 2006 on conduit 2012. A pressure of the non-condensable fluids was monitored with pressure gauge 1942 on conduit 2012. Flow of non-condensable fluids from separator 2010 was determined by flow meter 2018. Fluids measured in flow meter 2018 were collected and neutralized in carbon bed 2020. Gas samples were collected in gas container 2026.

A large block of high volatile bituminous B Fruitland coal was separated into two portions. One portion (about 550 kg) was ground into small pieces and tested in a coal drum. The coal was ground to an approximate diameter of about 6.34×$10^{-4}$ m. The results of such testing are depicted with the circles in FIGS. 245 and 246. One portion (a cube having sides measuring 0.3048 m) was tested in a coal cube experiment. The results of such testing are depicted with the squares in FIGS. 245 and 246.

FIG. 245 is a plot of gas phase compositions from experiments on a coal cube and a coal drum for $H_2$ 2028, methane 2030, ethane 2032, propane 2034, n-butane 2036, and other hydrocarbons 2038 as a function of temperature. As can be seen for FIG. 245, the non-condensable fluids produced from pyrolysis of the cube and the drum had similar concentrations of the various hydrocarbons generated within the coal. In FIG. 245 these results were so similar that only one line was drawn for ethane 2032, propane 2034, n-butane 2036, and other hydrocarbons 2038 for both the cube and the drum results, and the two lines that were drawn for $H_2$(2028A and 2028B) and the two lines drawn for methane (2030A and 2030B) were in both instances very close to each other. Crushing the coal did not have an apparent effect on the pyrolysis of the coal. The peak in methane production 2030 occurred at about 450° C. At higher temperatures methane cracks to hydrogen, so the methane concentration decreases while hydrogen concentration increases.

FIG. 247 illustrates a plot of cumulative production of gas as a function of temperature from heating coal in the cube and coal in the drum. Line 2040 represents gas production from coal in the drum and line 2042 represents gas production from coal in the cube. As demonstrated by FIG. 247, the production of gas in both experiments yielded similar results, even though the particle sizes were dramatically different between the two experiments.

FIG. 246 illustrates cumulative condensable hydrocarbons produced in the cube and drum experiments. Line 2044 represents cumulative condensable hydrocarbons production from the cube experiment, and line 2046 represents cumulative condensable hydrocarbons production from the drum experiment. As demonstrated by FIG. 246, the production of condensable hydrocarbons in both experiments yielded similar results, even though the particle sizes were dramatically different between the two experiments. Production of condensable hydrocarbons was substantially complete when the temperature reached about 390° C. In both experiments, the condensable hydrocarbons had an API gravity of about 37°.

As shown in FIG. 245, methane started to be produced at temperatures at or above about 270° C. Since the experiments were conducted at atmospheric pressure, it is believed that the methane is produced from pyrolysis, and not from mere desorption. Between about 270° C. and about 400° C., condensable hydrocarbons, methane, and $H_2$ were produced, as shown in FIGS. 245, 247, and 246. FIG. 245 shows that above a temperature of about 400° C., methane and $H_2$ continue to be produced. Above about 450° C., however, methane concentration decreased in the produced gases whereas the produced gases contained increased amounts of $H_2$. If heating were continued, eventually all $H_2$ remaining in the coal would be depleted, and production of gas from the coal would cease. FIGS. 245-246 indicate that the ratio of a yield of gas to a yield of condensable hydrocarbons will increase as the temperature increases above about 390° C.

FIGS. 245-246 demonstrate that particle size did not substantially affect the quality of condensable hydrocarbons produced from the treated coal, the quantity of condensable hydrocarbons produced from the treated coal, the amount of gas produced from the treated coal, the composition of the gas produced from the treated coal, the time required to produce the condensable hydrocarbons and gas from the treated coal, or the temperatures required to produce the condensable hydrocarbons and gas from the treated coal. In essence, a block of coal yielded substantially the same results from treatment as small particles of coal. As such, it is believed that scale-up issues when treating coal will not substantially affect treatment results. In addition, the acid number for the treated coal was found to be 0.04 mg/gram KOH at atmospheric pressure.

An experiment was conducted to determine an effect of heating on thermal conductivity and thermal diffusivity of a portion of a coal formation. Thermal pulse tests performed in situ in a high volatile bituminous C coal at a field pilot site showed a thermal conductivity between $2.0\times10^{-3}$ and $2.39\times10^{-3}$ cal/cm sec ° C. (0.85 and 1.0 W/(m ° K)) at 20° C. Ranges in these values were due to different measurements between different wells. The thermal diffusivity was about $4.8\times10^{-3}$ $cm^2/s$ at 20° C. (the range was from about $4.1\times10^{-3}$ to about $5.7\times10^{-3}$ $cm^2/s$ at 20° C.). It is believed that these measured values for thermal conductivity and thermal diffusivity are substantially higher than would be expected based on literature sources (e.g., about three times higher in many instances).

An initial value for thermal conductivity from the in situ experiment is plotted versus temperature in FIG. 248 (this initial value is point 2048 in FIG. 248). Additional points for thermal conductivity (i.e., all of the other values for line 2050 shown in FIG. 248) were assessed by calculating thermal conductivities using temperature measurements in all of the wells shown in FIG. 249, total heat input from all heaters shown in FIG. 249, measured heat capacity and density for the coal being treated, gas and liquids production data (e.g., composition, quantity, etc.), etc. For comparison, these assessed thermal conductivity values (see line 2050) were plotted with data reported in two papers from S. Badzioch et al. (1964) and R. E. Glass (1984) (see line 2052). As illustrated in FIG. 248, the assessed thermal conductivities from the in situ experiment were higher than reported values for thermal conductivities. The difference may be at least partially accounted for if it is assumed that the reported values do not take into consideration the confined nature of the coal in an in situ application. Because the reported values for thermal conductivity of coal are relatively low, they discourage the use of in situ heating for coal.

FIG. 248 illustrates a decrease in assessed thermal conductivity values (line 2050) at about 100° C. It is believed that this decrease in thermal conductivity was caused by water vaporizing in the cracks and void spaces (water vapor has a lower thermal conductivity than liquid water). At about 350° C., the thermal conductivity began to increase, and it increased substantially as the temperature increased to 700° C. It is believed that the increases in thermal conductivity were the result of molecular changes in the carbon structure. As the carbon was heated it became more graphitic, which is illustrated in TABLE 22 by an increased vitrinite reflectance after pyrolysis. As void spaces increased due to fluid production, heat was increasingly transferred by radiation and/or convection. In addition, concentration of hydrogen in the void spaces was raised due to pyrolysis reactions. Generation of synthesis gas may also increase the concentration of hydrogen in void spaces if a synthesis gas generating fluid is present at elevated temperatures.

Three data points 2054 of thermal conductivities under high stress were derived from laboratory tests on the same high volatile bituminous C coal used for the in situ field pilot site (see FIG. 248). In the laboratory tests, a sample of such coal was stressed from all directions, and heated relatively quickly. The thermal conductivities were determined at higher stress (i.e., 27.6 bars absolute), as compared to the stress in the in situ field pilot (about 3 bars absolute). The three data points 2054 of thermal conductivity values demonstrate that the application of stress increased the thermal conductivity of the coal at temperatures of 150° C., 250° C., and 350° C. It is believed that higher thermal conductivity values were obtained from stressed coal because the stress closed at least some cracks/void spaces and/or prevented new cracks/void spaces from forming.

Using the reported values for thermal conductivity and thermal diffusivity of coal and a 12 m heat source spacing on an equilateral triangle pattern, calculations show that a heating period of about ten years would be needed to raise an average temperature of coal to about 350° C. Such a heating period may not be economically viable. Using experimental values for thermal conductivity and thermal diffusivity and the same 12 m heat source spacing, calculations show that the heating period to reach an average temperature of 350° C. would be about 3 years. The elimination of about 7 years of heating a formation may significantly improve the economic viability of an in situ conversion process for coal.

Molecular hydrogen has a relatively high thermal conductivity (e.g., the thermal conductivity of molecular hydrogen is about 6 times the thermal conductivity of nitrogen or air). Therefore, it is believed that as the amount of hydrogen in the formation void spaces increases, the thermal conductivity of the formation will also increase. The increase in thermal conductivity due to the presence of hydrogen in the void spaces somewhat offsets decrease in thermal conductivity caused by the void spaces themselves. It is believed that increase in thermal conductivity due to the presence of hydrogen will be larger for coal formations as compared to other hydrocarbon containing formations since the amount of void spaces created during pyrolysis will be larger (i.e., coal has a higher hydrocarbon density, so pyrolysis and removal of formation fluid from the formation may create more void spaces in coal).

Hydrocarbon fluids were produced from a portion of a coal formation by an in situ experiment conducted in a portion of a coal formation. The coal was high volatile bituminous C coal. The formation was heated with electric heaters. FIG. 250 depicts a cross-sectional representation of the in situ experimental field test system. As shown in FIG. 250, the experimental field test system included coal formation 2056 within the ground and grout wall 2058. Coal formation 2056 dipped at an angle of approximately 36° with a thickness of approximately 4.9 m. FIG. 249 illustrates a location of heater wells 520A, 520B, 520C, production wells 512A, 512B, and temperature observation wells 1976A, 1976B, 1976C, 1976D used for the experimental field test system. The three heat sources were disposed in a triangular configuration. Production well 512A was located proximate a center of the heat source pattern and equidistant from each of the heat sources. Second production well 512B was located outside the heat source pattern and spaced equidistant from the two closest heat sources. Grout wall 2058 was formed around the heat source pattern and the production wells. The grout wall was formed of 24 pillars. Grout wall 2058 inhibited an influx of water into the portion during the in situ experiment. In addition, grout wall 2058 inhibited loss of generated hydrocarbon fluids to an unheated portion of the formation.

Temperatures were measured at various times during the experiment at each of four temperature observation wells 1976A, 1976B, 1976C, 1976D located within and outside of the heat source pattern as shown in FIG. 249. The temperatures measured at each of the temperature observation wells are displayed in FIG. 251 as a function of time. Temperatures at observation wells 1976A, 1976B, and 1976C were relatively close to each other. A temperature at temperature observation well 1976D was significantly colder. This temperature observation well was located outside of the heater well triangle illustrated in FIG. 249. This data demonstrates that in zones where there was little superposition of heat, temperatures were significantly lower. FIG. 252 illustrates temperature profiles measured at heater wells 520A, 520B, and 520C. The temperature profiles were relatively uniform at the heat sources. Data points 2057 correspond to heater well 520A. Data points 2059 correspond to heater well 520B. Data points 2061 correspond to heater well 520C.

FIG. 253 illustrates a plot of cumulative volume ($m^3$) of liquid hydrocarbons produced 2060 as a function of time (days). FIG. 254 illustrates a plot of cumulative volume of gas produced 2062 in standard cubic feet, produced as a function of time (in days) for the same in situ experiment. Both FIG. 253 and FIG. 254 show the results during the pyrolysis stage only of the in situ experiment.

FIG. 255 illustrates the carbon number distribution of condensable hydrocarbons that were produced using a slow, low temperature retorting process. Relatively high quality products were produced during treatment. The results in FIG. 255 are consistent with the results set forth in FIG. 256, which show results from heating coal from the same formation in the laboratory for similar ranges of heating rates as were used in situ.

TABLE 22 tabulates analysis results of coal before and after being subjected to thermal treatment (including heating pyrolysis and production of synthesis gas). The coal was cored from formation about 11-11.3 m below the surface and midway into the coal bed, in both the "before treatment" and "after treatment" samples. Both cores were taken at about the same location. Both cores were taken about 0.66 m from well 520C (between the grout wall and well 520C) shown in FIG. 249. In the following TABLE 22 "FA" is the Fischer Assay, "as rec'd" means the sample was tested as it was received and without any further treatment, "Py-Water" is the water produced during pyrolysis, "H/C Atomic Ratio" is the atomic ratio of hydrogen to carbon, "daf" means "dry ash free," "dmmf" means "dry mineral matter free," and "mmf" means "mineral matter free." The specific gravity of the "after treatment" core sample was approximately 0.85 whereas the specific gravity of the "before treatment" core sample was approximately 1.35.

TABLE 22

| Analysis | Before Treatment | After Treatment |
|---|---|---|
| % Vitrinite Reflectance | 0.54 | 5.16 |
| FA (gal/ton, as-rec'd) | 11.81 | 0.17 |
| FA (wt %, as rec'd) | 6.10 | 0.61 |
| FA Py-Water (gal/ton, as-rec'd) | 10.54 | 2.22 |
| H/C Atomic Ratio | 0.85 | 0.06 |
| H (wt %, daf) | 5.31 | 0.44 |
| O (wt %, daf) | 17.08 | 3.06 |
| N (wt %, daf) | 1.43 | 1.35 |
| Ash (wt %, as rec'd) | 32.72 | 56.50 |
| Fixed Carbon (wt %, dmmf) | 54.45 | 94.43 |
| Volatile Matter (wt %, dmmf) | 45.55 | 5.57 |
| Heating Value (Btu/lb, moist, mmf) | 12048 | 14281 |

Even though the cores were taken outside the areas within the triangle formed by the three heaters in FIG. 249, the cores demonstrate that the coal remaining in the formation changed significantly during treatment. The vitrinite reflectance results shown in TABLE 22 demonstrate that the rank of the coal remaining in the formation increased substantially during treatment. The coal was a high volatile bituminous C coal before treatment. After treatment, however, the coal was essentially anthracite. The Fischer Assay results shown in TABLE 22 demonstrate that most of the hydrocarbons in the coal had been removed during treatment. The H/C Atomic Ratio demonstrates that most of the hydrogen in the coal had been removed during treatment. A significant amount of nitrogen and ash was left in the formation.

In sum, the results shown in TABLE 22 demonstrate that a significant amount of hydrocarbons and hydrogen were removed during treatment of the coal by pyrolysis and generation of synthesis gas. Significant amounts of undesirable products (ash and nitrogen) remain in the formation, while significant amounts of desirable products (e.g., condensable hydrocarbons and gas) were removed.

FIG. 257 illustrates a plot of weight percent of a hydrocarbon produced versus carbon number distribution for two laboratory experiments on coal from the field experiment site. The coal was a high volatile bituminous C coal. As shown in FIG. 257, a carbon number distribution of fluids produced from a formation varied depending on pressure. For example, first pressure 2064 was about 1 bar absolute and second pressure 2066 was about 8 bars absolute. The laboratory carbon number distribution shown in FIG. 257 was similar to that produced in the field experiment in FIG. 255 also at 1 bar absolute. As shown in FIG. 257, as pressure increased, a range of carbon numbers of the hydrocarbon fluids decreased. An increase in products having carbon numbers less than 20 was observed when operating at 8 bars absolute. Increasing the pressure from 1 bar absolute to 8 bars absolute also increased an API gravity of the condensed hydrocarbon fluids. The API gravities of condensed hydrocarbon fluids produced were approximately 23.1° and approximately 31.3°, respectively. The increase in API gravity may represent a corresponding increase in the value of the product.

FIG. 258 illustrates a bar graph of fractions from a boiling point separation of hydrocarbon liquids generated by a Fischer Assay (hatched bars) and a boiling point separation (solid bars) of hydrocarbon liquids from the coal cube experiment (see, e.g., the system shown in FIG. 243). The experiment was conducted at a much slower heating rate (2° C./day) and the oil produced at a lower final temperature than the Fischer Assay. FIG. 258 shows the weight percent of various boiling point cuts of hydrocarbon liquids produced from a Fruitland high volatile bituminous B coal. Different boiling point cuts may represent different hydrocarbon fluid compositions. The boiling point cuts illustrated include naphtha 2068 (initial boiling point to 166° C.), jet fuel 2070 (166° C. to 249° C.), diesel 2072 (249° C. to 370° C.), and bottoms 2074 (boiling point greater than 370° C.). The hydrocarbon liquids from the coal cube were products that are more valuable. The API gravity of such hydrocarbon liquids was significantly greater than the API gravity of the Fischer Assay liquid. The hydrocarbon liquids from the coal cube also included significantly less residual bottoms than were produced from the Fischer Assay hydrocarbon liquids.

FIG. 259 illustrates a plot of percentage ethene to ethane produced from a coal formation as a function of heating rate. Data points were derived from laboratory experimental data (see system shown in FIG. 202 and associated text) for slow heating of high volatile bituminous C coal at atmospheric pressure, and from Fischer Assay results. As illustrated in FIG. 259, the ratio of ethene to ethane increased as the heating rate increased. Decreasing the heating rate of a formation may decrease production of olefins. The heating rate of a formation may be determined in part by the spacings of heat sources within the formation, and by the amount of heat that is transferred from the heat sources to the formation.

Formation pressure may also have a significant effect on olefin production. A high formation pressure may result in the production of small quantities of olefins. High pressure within a formation may result in a high $H_2$ partial pressure within the formation. The high $H_2$ partial pressure may result in hydrogenation of the fluid within the formation. Hydrogenation may result in a reduction of olefins in a fluid produced from the formation. A high pressure and high $H_2$ partial pressure may also result in inhibition of aromatization of hydrocarbons within the formation. Aromatization may include formation of aromatic and cyclic compounds from alkanes and/or alkenes within a hydrocarbon mixture. If it is desirable to increase production of olefins from a formation, the olefin content of fluid produced from the formation may be increased by reducing pressure within the formation. The pressure may be reduced by drawing off a larger quantity of formation fluid from a portion of the formation that is being produced. In some in situ conversion process embodiments, pressure within a formation adjacent to production wells may be reduced below atmospheric pressure (i.e., a vacuum may be drawn on the formation).

The system depicted in FIG. 202, and the method of using the system was used to conduct experiments on high volatile bituminous C coal. The coal was heated at a rate of 5° C./day at atmospheric pressure. FIG. 260 depicts certain data points from the experiment (the line depicted in FIG. 260 was produced from a linear regression analysis of the data points). FIG. 260 illustrates the ethene to ethane molar ratio as a function of hydrogen molar concentration in non-condensable hydrocarbons produced from the coal during the experiment. The ethene to ethane ratio in the non-condensable hydrocarbons is reflective of olefin content in all hydrocarbons produced from the coal. As can be seen in FIG. 260, as the concentration of hydrogen autogenously increased during pyrolysis, the ratio of ethene to ethane decreased. It is believed that increases in the concentration (and partial pressure) of hydrogen during pyrolysis causes the olefin concentration to decrease in the fluids produced from pyrolysis.

FIG. 261 illustrates product quality, as measured by API gravity, as a function of rate of temperature increase of fluids produced from high volatile bituminous "C" coal. Data points were derived from Fischer Assay data and from laboratory experiments. For the Fischer Assay data, the rate of temperature increase was approximately 17,100° C./day and the resulting API gravity was less than 11°. For the relatively slow laboratory experiments, the rate of temperature increase ranged from about 2° C./day to about 10° C./day, and the resulting API gravities ranged from about 23° to about 26°. A substantially linear decrease in quality (decrease in API gravity) was exhibited as the logarithmic heating rate increased.

FIG. 256 illustrates weight percentages of various carbon numbers products removed from high volatile bituminous "C" coal when coal is heated at various heating rates. Data points were derived from laboratory experiments and a Fischer Assay. Curves for heating at a rate of 2° C./day 2076, 3° C./day 2078, 5° C./day 2080, and 10° C./day 2082 show similar carbon number distributions in the produced fluids. A coal sample was also heated in a Fischer Assay test at a rate of about 17,100° C./day. The data from the Fischer Assay test is indicated by reference numeral 2084. Slow heating rates resulted in less production of components having carbon numbers greater than 20 as compared to Fischer Assay results 2084. Lower heating rates also produced higher weight percentages of components with carbon numbers less than 20. The lower heating rates produced large amounts of components having carbon numbers near 12. A peak in carbon number distribution near 12 is typical of the in situ conversion process for coal and oil shale.

An experiment was conducted on the coal formation treated by an in situ conversion process to measure the permeability of the formation after pyrolysis. After heating a portion of the coal formation, a ten minute pulse of $CO_2$ was injected into the formation at first production well 512A and produced at wells 520A, 520B and 520C (shown in FIG. 249). Wells 520A, 520B, 520C were located substantially equidistant from the production well in a triangular pattern. The $CO_2$ was injected at a rate of 4.08 $m^3$/h (144 standard cubic feet per hour). As illustrated in FIG. 262, the $CO_2$ reached each of the three different heat sources at approximately the same time. Line 2086 illustrates production of $CO_2$ at heater well 520A, line 2088 illustrates production of $CO_2$ at heater well 520B, and line 2090 illustrates production of $CO_2$ at heater well 520C. As shown in FIG. 262, yield of $CO_2$ from each of the three different wells was also approximately equal over time. Such approximately equivalent transfer of a tracer pulse of $CO_2$ through the formation and yield of $CO_2$ from the formation indicated that the formation was substantially uniformly permeable. The fact that the first $CO_2$ arrival at wells 520A, 520B, 520C after approximately 18 minutes after start of the $CO_2$ pulse indicates that no preferential paths had been created between production well 512 and wells 520A, 520B, and 520C.

The in situ permeability was measured by injecting a gas between different wells after the pyrolysis and synthesis gas formation stages were complete. The measured permeability varied from about 4.5 darcy to 39 darcy (with an average of about 20 darcy), thereby indicating that the permeability was high and relatively uniform. The before-treatment permeability was only about 50 millidarcy.

Synthesis gas was also produced in an in situ experiment from the portion of the coal formation shown in FIG. 250 and FIG. 249. In this experiment, heater wells were used to inject fluids into the formation. FIG. 263 is a plot of weight of volatiles (condensable and uncondensable) in kilograms as a function of cumulative energy content of product in kilowatt hours from the in situ experimental field test. The figure illustrates the quantity and energy content of pyrolysis fluids and synthesis gas produced from the formation.

FIG. 264 is a plot of the volume of oil equivalent produced ($m^3$) as a function of energy input into the coal formation (kW·h) from the experimental field test. The volume of oil equivalent in cubic meters was determined by converting the energy content of the volume of produced oil plus gas to a volume of oil with the same energy content.

The start of synthesis gas production, indicated by arrow 2092, was at an energy input of approximately 77,000 kW·h. The average coal temperature in the pyrolysis region had been raised to 620° C. Because the average slope of the curve in FIG. 264 in the pyrolysis region is greater than the average slope of the curve in the synthesis gas region, FIG. 264 illustrates that the amount of useable energy contained in the produced synthesis gas is less than that contained in the pyrolysis fluids. Therefore, synthesis gas production is less energy efficient than pyrolysis. There are two reasons for this result. First, the two $H_2$ molecules produced in the synthesis gas reaction have a lower energy content than low carbon number hydrocarbons produced in pyrolysis. Second, endothermic synthesis gas reactions consume energy.

FIG. 265 is a plot of the total synthesis gas production ($m^3$/min) from the coal formation versus the total water inflow (kg/h) due to injection into the formation from the experimental field test results facility. Synthesis gas may be generated in a formation at a synthesis gas generating temperature before the injection of water or steam due to the presence of natural water inflow into hot coal formation. Natural water may come from below the formation.

From FIG. 265, the maximum natural water inflow is approximately 5 kg/h as indicated by arrow 2094. Arrows 2096, 2098, and 2100 represent injected water rates of about 2.7 kg/h, 5.4 kg/h, and 11 kg/h, respectively, into central well 512A of FIG. 249. Production of synthesis gas is at heater wells 520A, 520B, and 520C. FIG. 265 shows that the synthesis gas production per unit volume of water injected decreases at arrow 2096 at approximately 2.7 kg/h of injected water or 7.7 kg/h of total water inflow. The reason for the decrease may be that steam is flowing too fast through the coal seam to allow the reactions to approach equilibrium conditions.

FIG. 266 illustrates production rate of synthesis gas ($m^3$/min) as a function of steam injection rate (kg/h) in a coal formation. Data 2102 for a first run corresponds to injection at production well 512A in FIG. 249 and production of synthesis gas at heater wells 520A, 520B, and 520C. Data 2104 for a second run corresponds to injection of steam at heater well 520C and production of additional gas at production well 512A. Data 2102 for the first run corresponds to the data shown in FIG. 265. As shown in FIG. 266, the injected water is in reaction equilibrium with the formation to about 2.7 kg/h of injected water. The second run results in substantially the same amount of additional synthesis gas produced, shown by data 2104, as the first run to about 1.2 kg/h of injected steam. At about 1.2 kg/h, data 2102 starts to deviate from equilibrium conditions because the residence time is insufficient for the additional water to react with the coal. As temperature is increased, a greater amount of additional synthesis gas is produced for a given injected water rate. The reason is that at higher temperatures the reaction rate and conversion of water into synthesis gas increases.

FIG. 267 is a plot that illustrates the effect of methane injection into a heated coal formation in the experimental field test (all of the units in FIGS. 267-270 are in $m^3$ per hour). FIG. 267 demonstrates hydrocarbons added to the synthesis gas producing fluid are cracked within the formation. FIG. 249 illustrates the layout of the heater and production wells at the field test facility. Methane was injected into production wells 512A and 512B and fluid was produced from heater wells 520A, 520B, and 520C. The average temperatures at various wells were as follows: 520A (746° C.), 520B (746° C.), 520C (767° C.), 1976A (592° C.), 1976B (573° C.), 1976C (606° C.), and 512A (769° C.). When the methane contacted the formation, a portion of the methane cracked within the formation to produce $H_2$ and coke. FIG. 267 shows that as the methane injection rate increased, the production of $H_2$ 2028 increased. This indicated that methane was cracking to form $H_2$. Production of methane 2030 also increased, which indicates that not all of the injected methane is cracked. The measured compositions of ethane, ethene, propane, and butane were negligible.

FIG. 268 is a plot that illustrates the effect of ethane injection into a heated coal formation in the experimental field test. Ethane was injected into production wells 512A and 512B and fluid was produced from heater wells 520A, 520B, and 520C in FIG. 249. The average temperatures at various wells were as follows: 520A (742° C.), 520B (750° C.), 520C (744° C.), 1976A (611° C.), 1976B (595° C.), 1976C (626° C.), and 512A (818° C.). When ethane contacted the formation, it cracked to produce $H_2$, methane, ethene, and coke. FIG. 268 shows that as the ethane injection rate increased, the production of $H_2$ 2028, methane 2030, ethane 2032, and ethene 2106 increased. This indicates that ethane is cracking to form $H_2$ and low molecular weight hydrocarbons. The production rate of higher carbon number products (i.e., propane and propylene) were unaffected by the injection of ethane.

FIG. 269 is a plot that illustrates the effect of propane injection into a heated coal formation in the experimental field test. Propane was injected into production wells 512A and 512B and fluid was produced from heater wells 520A, 520B, and 520C. The average temperatures at various wells were as follows: 520A (737° C.), 520B (753° C.), 520C (726° C.), 1976A (589° C.), 1976B (573° C.), 1976C (606° C.), and 512A (769° C.). When propane contacted the formation, it cracked to produce $H_2$, methane, ethane, ethene, propylene, and coke. FIG. 269 shows that as the propane injection rate increased, the production of $H_2$ 2028, methane 2030, ethane 2032, ethene 2106, propane 2034, and propylene 2108 increased. This indicates that propane is cracking to form $H_2$ and lower molecular weight components.

FIG. 270 is a plot that illustrates the effect of butane injection into a heated coal formation in the experimental field test. Butane was injected into production wells 512A and 512B and fluid was produced from heater wells 520A, 520B, and 520C. The average temperature at various wells were as follows: 520A (772° C.), 520B (764° C.), 520C (753° C.), 1976A (650° C.), 1976B (591° C.), 1976C (624° C.), and 512A (830° C.). When butane contacted the formation, it cracked to produce $H_2$, methane, ethane, ethene, propane, propylene, and coke. FIG. 270 shows that as the butane injection rate increased, the production of $H_2$ 2028, methane 2030, ethane 2032, and ethene 2106 increased. The production of propane 2034 and propylene 2108 did not appear to increase. This indicates that butane is cracking to form $H_2$ and lower molecular weight components.

FIG. 271 is a plot of the composition of gas (in mole percent) produced from the heated coal formation versus time in days at the experimental field test. The species compositions included methane 2030, $H_2$ 2028, carbon dioxide 2110, hydrogen sulfide 2114, and carbon monoxide 2112. FIG. 271 shows a dramatic increase in $H_2$ concentration after about 150 days. The increase corresponds to the start of synthesis gas production.

FIG. 272 is a plot of synthesis gas conversion versus time for synthesis gas generation runs in the experimental field test performed on separate days. The temperature of the formation was about 600° C. The data demonstrates initial uncertainty in measurements in the oil/water separator. Synthesis gas conversion consistently approached a conversion of between about 40% and 50% after about 2 hours of synthesis gas producing fluid injection.

TABLE 23 shows a composition of synthesis gas produced during a run of the in situ coal field experiment.

TABLE 23

| Component | Mol % | Wt % |
|---|---|---|
| Methane | 12.263 | 12.197 |
| Ethane | 0.281 | 0.525 |
| Ethene | 0.184 | 0.320 |
| Acetylene | 0.000 | 0.000 |
| Propane | 0.017 | 0.046 |
| Propylene | 0.026 | 0.067 |
| Propadiene | 0.001 | 0.004 |
| Isobutane | 0.001 | 0.004 |
| N-Butane | 0.000 | 0.001 |
| 1-Butene | 0.001 | 0.003 |
| Isobutene | 0.000 | 0.000 |
| cis-2-Butene | 0.005 | 0.018 |
| trans-2-Butene | 0.001 | 0.003 |
| 1,3-Butadiene | 0.001 | 0.005 |
| Isopentane | 0.001 | 0.002 |
| N-Pentane | 0.000 | 0.002 |
| Pentene-1 | 0.000 | 0.000 |
| T-2-Pentene | 0.000 | 0.000 |
| 2-Methyl-2-Butene | 0.000 | 0.000 |
| C-2-Pentene | 0.000 | 0.000 |
| Hexanes | 0.081 | 0.433 |
| $H_2$ | 51.247 | 6.405 |
| Carbon monoxide | 11.556 | 20.067 |
| Carbon dioxide | 17.520 | 47.799 |
| Nitrogen | 5.782 | 10.041 |
| Oxygen | 0.955 | 1.895 |
| Hydrogen sulfide | 0.077 | 0.163 |
| Total | 100.000 | 100.000 |

The experiment was performed in batch oxidation mode at about 620° C. The presence of nitrogen and oxygen is due to contamination of the sample with air. The mole percent of $H_2$, carbon monoxide, and carbon dioxide, neglecting the composition of all other species, may be determined for the above data. For example, mole percent of $H_2$, carbon monoxide, and carbon dioxide may be increased proportionally such that the mole percentages of the three components equals approximately 100%. The mole percent of $H_2$, carbon monoxide, and carbon dioxide, neglecting the composition of all other species, were 63.8%, 14.4%, and 21.8%, respectively. The methane is believed to come primarily from the pyrolysis region outside the triangle of heaters. These values are in substantial agreement with the equilibrium values shown in FIG. 273.

FIG. 273 is a plot of calculated equilibrium gas dry mole fractions for a coal reaction with water. Methane reactions are not included. The fractions are representative of a synthesis gas produced from a hydrocarbon containing formation and has been passed through a condenser to remove water from the produced gas. Equilibrium gas dry mole fractions are shown in FIG. 273 for $H_2$ 2028, carbon monoxide 2112, and carbon dioxide 2110 as a function of temperature at a pressure of 2 bars absolute. Liquid production from a formation substantially stops at temperatures of about 390° C. Gas produced at about 390° C. includes about 67% $H_2$ and about 33% carbon dioxide. Carbon monoxide is present in negligible quantities below about 410° C. At temperatures of about 500° C., however, carbon monoxide is present in the produced gas in measurable quantities. For example, at 500° C., about 66.5% $H_2$, about 32% carbon dioxide, and about 2.5% carbon monoxide are present. At 700° C., the produced gas includes about 57.5% $H_2$, about 15.5% carbon dioxide, and about 27% carbon monoxide.

FIG. 274 is a plot of calculated equilibrium wet mole fractions for a coal reaction with water. Methane reactions are not included. Equilibrium wet mole fractions are shown for water 2116, $H_2$ 2028, carbon monoxide 2112, and carbon dioxide 2110 as a function of temperature at a pressure of 2 bars absolute. At 390° C., the produced gas includes about 89% water, about 7% $H_2$, and about 4% carbon dioxide. At 500° C., the produced gas includes about 66% water, about 22% $H_2$, about 11% carbon dioxide, and about 1% carbon monoxide. At 700° C., the produced gas includes about 18% water, about 47.5% $H_2$, about 12% carbon dioxide, and about 22.5% carbon monoxide.

FIG. 273 and FIG. 274 illustrate that at the lower end of the temperature range at which synthesis gas may be produced (i.e., about 400° C.), equilibrium gas phase fractions may not favor production of $H_2$ within and from a formation. As temperature increases, the equilibrium gas phase fractions increasingly favor the production of $H_2$. For example, as shown in FIG. 274, the gas phase equilibrium wet mole fraction of $H_2$ increases from about 9% at 400° C. to about 39% at 610° C. and reaches 50% at about 800° C. FIG. 273 and FIG. 274 further illustrate that at temperatures greater than about 660° C., equilibrium gas phase fractions tend to favor production of carbon monoxide over carbon dioxide.

FIG. 273 and FIG. 274 illustrate that as the temperature increases from between about 400° C. to about 1000° C., the $H_2$ to carbon monoxide ratio of produced synthesis gas may continuously decrease throughout this range. For example, as shown in FIG. 274, the equilibrium gas phase $H_2$ to carbon monoxide ratio at 500° C., 660° C., and 1000° C. is about 22:1, about 3:1, and about 1:1, respectively. FIG. 274 also indicates that produced synthesis gas at lower temperatures may have a larger quantity of water and carbon dioxide than at higher temperatures. As the temperature increases, the overall percentage of carbon monoxide and hydrogen within the synthesis gas may increase.

FIG. 275 is a flow chart of an example of pyrolysis stage 2118 and synthesis gas production stage 2120 for a high volatile type A or B bituminous coal. In pyrolysis stage 2118, heat 2122A is supplied to coal formation 2056. Liquid and gas products 2124 and water 1524 exit coal formation 2056. The portion of the formation subjected to pyrolysis is composed substantially of char after undergoing pyrolysis heating. Char refers to a solid carbonaceous residue that results from pyrolysis of organic material. In synthesis gas production stage 2120, steam 1392 and heat 2122B are supplied to formation 678 that has undergone pyrolysis, and synthesis gas 1502 is produced.

Heat and mass balances may be performed for the processes depicted in FIG. 275. The calculations set forth herein assume that char is only made of carbon and that there is an excess of carbon to steam. About 890 MW (megawatts) of energy is required to pyrolyze about 105,800 metric tons per day of coal. Pyrolysis products 2124 include liquids and gases with a production of 23,000 cubic meters per day. The pyrolysis process also produces about 7,160 metric tons per day of water 1524. In the synthesis gas stage about 57,800 metric tons per day of char with injection of 23,000 metric tons per day of steam 1392 and 2,000 MW of energy 2122B with a 20% conversion will produce 12,700 cubic meters equivalent oil per day of synthesis gas 1502. The energy balance above includes the methane reactions in EQNS. (57) and (58).

FIG. 276 is an example of a low temperature in situ synthesis gas production that occurs at a temperature of about 450° C. with heat and mass balances in a hydrocarbon containing formation that was previously pyrolyzed. A total of about 42,900 metric tons per day of water is injected into formation 678 which may be char. FIG. 276 illustrates that a portion of water 1524 at 25° C. is injected directly into formation 678. A portion of water 1524 is converted into steam 1392A at a temperature of about 130° C. and a pressure at about 3 bars absolute using about 1227 MW of energy 2126A and injected into formation 678. A portion of the remaining steam may be converted into steam 1392B at a temperature of about 450° C. and a pressure at about 3 bars absolute using about 318 MW of energy 2126B. The synthesis gas production involves about 23% conversion of 13,137 metric tons per day of char to produce 56.6 millions of cubic meters per day of synthesis gas with an energy content of 5,230 MW. About 238 MW of energy 2126C is supplied to formation 678 to account for the endothermic heat of reaction of the synthesis gas reaction. Product stream 1590 of the synthesis gas reaction includes 29,470 metric tons per day of water at 46 volume %, 501 metric tons per day carbon monoxide at 0.7 volume %, 540 tons per day $H_2$ at 10.7 volume %, 26,455 metric tons per day carbon dioxide at 23.8 volume %, and 7,610 metric tons per day methane at 18.8 volume %.

FIG. 277 is an example of a high temperature in situ synthesis gas production that occurs at a temperature of about 650° C. with heat and mass balances in a hydrocarbon containing formation that was previously pyrolyzed. A total of about 34,352 metric tons per day of water is injected into formation 678. FIG. 277 illustrates that a portion of water 1524 at 25° C. is injected directly into formation 678. A portion of water 1524 is converted into steam 1392A at a temperature of about 130° C. and a pressure at about 3 bars absolute using about 982 MW of energy 2126A, and injected into formation 678. A portion of the remaining steam is converted into steam 1392B at a temperature of about 650° C. and a pressure at about 3 bars absolute using about 413 MW of energy 2126B. The synthesis gas production involves about 22% conversion of 12,771 metric tons per day of char to produce 56.6 millions of cubic meters per day of synthesis gas with an energy content of 5,699 MW. About 898 MW of energy 2126C is supplied to formation 678 to account for the endothermic heat of reaction of the synthesis gas reaction. Product stream 1590 of the synthesis gas reaction includes 10,413 metric tons per day of water at 22.8 volume %, 9,988 metric tons per day carbon monoxide at 14.1 volume %, 1771 metric tons per day $H_2$ at 35 volume %, 21,410 metric tons per day carbon dioxide at 19.3 volume %, and 3535 metric tons per day methane at 8.7 volume %.

FIG. 278 is an example of an in situ synthesis gas production in a hydrocarbon containing formation with heat and mass balances. Synthesis gas generating fluid that includes water 1524 is supplied to formation 678. A total of about 22,000 metric tons per day of water is required for a low temperature process and about 24,000 metric tons per day is required for a high temperature process. A portion of the water may be introduced into the formation as steam. Steam may be produced by supplying heat from an external source to the water. About 7,119 metric tons per day of steam is provided for the low temperature process and about 6913 metric tons per day of steam is provided for the high temperature process.

At least a portion of aqueous fluid 2128 exiting formation 678 is recycled 2130 back into the formation for generation of synthesis gas. For a low temperature process about 21,000 metric tons per day of aqueous fluids is recycled and for a high temperature process about 10,000 metric tons per day of aqueous fluids is recycled. Produced synthesis gas 1502 includes carbon monoxide, $H_2$, and methane. The produced synthesis gas has a heat content of about 430,000 MMBtu (millions Btu) per day for a low temperature process and a heat content of about 470,000 MMBtu per day for a low temperature process. Carbon dioxide 2129 produced in the synthesis gas process includes about 26,500 metric tons per day in the low temperature process and about 21,500 metric tons per day in the high temperature process. At least a portion of produced synthesis gas 1502 is used for combustion to heat the formation. There is about 7,119 metric tons per day of carbon dioxide in steam for the low temperature process and about 6,913 metric tons per day of carbon dioxide in the steam for the high temperature process. There are about 2,551 metric tons per day of carbon dioxide in a heat reservoir for the low temperature process and about 9,628 metric tons per day of carbon dioxide in a heat reservoir for the high temperature process. There are about 14,571 metric tons per day of carbon dioxide in the combustion of synthesis gas for the low temperature process and about 18,503 metric tons per day of carbon dioxide in produced combustion synthesis gas for the high temperature process. The produced carbon dioxide has a heat content of about 60 gigajoules ("GJ") per metric ton for the low temperature process and about 6.3 GJ per metric ton for the high temperature process.

TABLE 24 is an overview of the potential production volume of applications of synthesis gas produced by wet oxidation. The estimates are based on 56.6 million standard cubic meters of synthesis gas produced per day at 700° C.

TABLE 24

| Application | Production (main product) | |
|---|---|---|
| Power | 2,720 | Megawatts |
| Hydrogen | 2,700 | metric tons/day |
| $NH_3$ | 13,800 | metric tons/day |
| $CH_4$ | 7,600 | metric tons/day |
| Methanol | 13,300 | metric tons/day |
| Shell Middle Distillates | 5,300 | metric tons/day |

Experimental adsorption data has demonstrated that carbon dioxide may be stored in coal that has been pyrolyzed. FIG. 279 is a plot of the cumulative sorbed methane and carbon dioxide in cubic meters per metric ton versus pressure in bars absolute at 25° C. on coal. The coal sample is subbituminous coal from Gillette, Wyo. Data sets 2132B, 2132C, 2132D, and 2132E are for carbon dioxide adsorption on a post treatment coal sample that has been pyrolyzed and has undergone synthesis gas generation. Data set 2132F is for adsorption on an unpyrolyzed coal sample from the same formation. Data set 2132A is adsorption of methane at 25° C. Data sets 2132B, 2132C, 2132D, and 2132E are adsorption of carbon dioxide at 25° C., 50° C., 100° C., and 150° C., respectively. Data set 2132F is adsorption of carbon dioxide at 25° C. on the unpyrolyzed coal sample. FIG. 279 shows that carbon dioxide at temperatures between 25° C. and 100° C. is more strongly adsorbed than methane at 25° C. in the pyrolyzed coal. FIG. 279 demonstrates that a carbon dioxide stream passed through post treatment coal tends to displace methane from the post treatment coal.

Computer simulations have demonstrated that carbon dioxide may be sequestered in both a deep coal formation and a post treatment coal formation. The Comet2™ Simulator (Advanced Resources International, Houston, Tex.) determined the amount of carbon dioxide that could be sequestered in a San Juan Basin type deep coal formation and a post treatment coal formation. The simulator also determined the amount of methane produced from the San Juan Basin type deep coal formation due to carbon dioxide injection. The model employed for both the deep coal formation and the post treatment coal formation was a 1.3 $km^2$ area, with a repeating 5 spot well pattern. The 5 spot well pattern included four injection wells arranged in a square and one production well at the center of the square. The properties of the San Juan Basin and the post treatment coal formations are shown in TABLE 25. Additional details of simulations of carbon dioxide sequestration in deep coal formations and comparisons with field test results may be found in *Pilot Test Demonstrates How Carbon Dioxide Enhances Coal Bed Methane Recovery*, Lanny Schoeling and Michael McGovern, Petroleum Technology Digest, September 2000, p. 14-15.

TABLE 25

| | Deep Coal Formation (San Juan Basin) | Post treatment coal formation (Post pyrolysis process) |
|---|---|---|
| Coal Thickness (m) | 9 | 9 |
| Coal Depth (m) | 990 | 460 |
| Initial Pressure (bars abs.) | 114 | 2 |
| Initial Temperature | 25° C. | 25° C. |
| Permeability (md) | 5.5 (horiz.), 0 (vertical) | 10,000 (horiz.), 0 (vertical) |
| Cleat porosity | 0.2% | 40% |

The simulation model accounts for the matrix and dual porosity nature of coal and post treatment coal. For example, coal and post treatment coal are composed of matrix blocks. The spaces between the blocks are called "cleats." Cleat porosity is a measure of available space for flow of fluids in the formation. The relative permeabilities of gases and water within the cleats required for the simulation were derived from field data from the San Juan coal. The same values for relative permeabilities were used in the post treatment coal formation simulations. Carbon dioxide and methane were assumed to have the same relative permeability.

The cleat system of the deep coal formation was modeled as initially saturated with water. Relative permeability data for carbon dioxide and water demonstrate that high water saturation inhibits absorption of carbon dioxide within cleats. Therefore, water is removed from the formation before injecting carbon dioxide into the formation.

In addition, the gases within the cleats may adsorb in the coal matrix. The matrix porosity is a measure of the space available for fluids to adsorb in the matrix. The matrix porosity and surface area were taken into account with experimental mass transfer and isotherm adsorption data for coal and post treatment coal. Therefore, it was not necessary to specify a value of the matrix porosity and surface area in the model. The pressure-volume-temperature (PVT) properties and viscosity required for the model were taken from literature data for the pure component gases.

The preferential adsorption of carbon dioxide over methane on post treatment coal was incorporated into the model based on experimental adsorption data. For example, FIG. 279 demonstrates that carbon dioxide has a significantly higher cumulative adsorption than methane over an entire range of pressures at a specified temperature. Once the carbon dioxide enters in the cleat system, methane diffuses out of and desorbs off the matrix. Similarly, carbon dioxide diffuses into and adsorbs onto the matrix. In addition, FIG. 279 also shows carbon dioxide may have a higher cumulative adsorption on a pyrolyzed coal sample than an unpyrolyzed coal sample.

The simulation modeled a sequestration process over a time period of about 3700 days for the deep coal formation model. Removal of the water in the coal formation was simulated by production from five wells. The production rate of water was about 40 $m^3$/day for about the first 370 days. The production rate of water decreased significantly after the first 370 days. It continued to decrease through the remainder of the simulation run to about zero at the end. Carbon dioxide injection was started at approximately 370 days at a flow rate of about 113,000 standard (in this context "standard" means 1 atmosphere pressure and 15.5° C.) $m^3$/day. The injection rate of carbon dioxide was doubled to about 226,000 standard $m^3$/day at approximately 1440 days. The injection rate remained at about 226,000 standard $m^3$/day until the end of the simulation run.

FIG. 280 illustrates the pressure at the wellhead of the injection wells as a function of time during the simulation. The pressure decreased from about 114 bars absolute to about 19 bars absolute over the first 370 days. The decrease in the pressure was due to removal of water from the coal formation. Pressure then started to increase substantially as carbon dioxide injection started at 370 days. The pressure reached a maximum of about 98 bars absolute. The pressure then began to gradually decrease after 480 days. At about 1440 days, the pressure increased again to about 98 bars absolute due to the increase in the carbon dioxide injection rate. The pressure gradually increased until about 3640 days. The pressure jumped at about 3640 days because the production well was closed off.

FIG. 281 illustrates the production rate of carbon dioxide 2110 and methane 2030 as a function of time in the simulation. FIG. 281 shows that carbon dioxide was produced at a rate between about 0-10,000 $m^3$/day during approximately the first 2400 days. The production rate of carbon dioxide was significantly below the injection rate. Therefore, the simulation predicts that most of the injected carbon dioxide is being sequestered in the coal formation. However, at about 2400 days, the production rate of carbon dioxide started to rise significantly due to onset of saturation of the coal formation.

In addition, FIG. 281 shows that methane was desorbing as carbon dioxide was adsorbing in the coal formation. Between about 370-2400 days, the production rate of methane 2030 increased from about 60,000 to about 115,000 standard $m^3$/day. The increase in the methane production rate between about 1440-2400 days was caused by the increase in carbon dioxide injection rate at about 1440 days. The production rate of methane started to decrease after about 2400 days. This was due to the saturation of the coal formation. The simulation predicted a 50% breakthrough at about 2700 days. "Breakthrough" is defined as the ratio of the flow rate of carbon dioxide to the total flow rate of the total produced gas times 100%. In addition, the simulation predicted about a 90% breakthrough at about 3600 days.

FIG. 282 illustrates cumulative methane produced 2134 and the cumulative net carbon dioxide injected 2136 as a function of time during the simulation. The cumulative net carbon dioxide injected is the total carbon dioxide produced subtracted from the total carbon dioxide injected. FIG. 282 shows that by the end of the simulated injection, about twice as much carbon dioxide was stored as methane produced. In addition, the methane production was about 0.24 billion standard $m^3$ at 50% carbon dioxide breakthrough. In addition, the carbon dioxide sequestration was about 0.39 billion standard $m^3$ at 50% carbon dioxide breakthrough. The methane production was about 0.26 billion standard $m^3$ at 90% carbon dioxide breakthrough. In addition, the carbon dioxide sequestration was about 0.46 billion standard $m^3$ at 90% carbon dioxide breakthrough.

TABLE 25 shows that the permeability and porosity of the simulation in the post treatment coal formation were both significantly higher than in the deep coal formation prior to treatment. In addition, the initial pressure was much lower. The depth of the post treatment coal formation was shallower than the deep coal bed methane formation. The same relative permeability data and PVT data used for the deep coal formation were used for the coal formation simulation. The initial water saturation for the post treatment coal formation was set at 70%. Water was present because it is used to cool the hot spent coal formation to 25° C. The amount of methane initially stored in the post treatment coal is very low.

The simulation modeled a sequestration process over a time period of about 3800 days for the post treatment coal formation model. The simulation modeled removal of water from the post treatment coal formation with production from five wells. During about the first 200 days, the production rate of water was about 680,000 standard $m^3$/day. From about 200-3300 days, the water production rate was between about 210,000 to about 480,000 standard $m^3$/day. Production rate of water was negligible after about 3300 days. Carbon dioxide injection was started at approximately 370 days at a flow rate of about 113,000 standard $m^3$/day. The injection rate of carbon dioxide was increased to about 226,000 standard $m^3$/day at approximately 1440 days. The injection rate remained at 226,000 standard $m^3$/day until the end of the simulated injection.

FIG. 283 illustrates the pressure at the wellhead of the injection wells as a function of time during the simulation of the post treatment coal formation model. The pressure was relatively constant up to about 370 days. The pressure increased through most of the rest of the simulation run up to about 36 bars absolute. The pressure rose steeply starting at about 3300 days because the production well was closed off.

FIG. 284 illustrates the production rate of carbon dioxide as a function of time in the simulation of the post treatment coal formation model. FIG. 284 shows that the production rate of carbon dioxide was almost negligible during approximately the first 2200 days. Therefore, the simulation predicts that nearly all of the injected carbon dioxide is being sequestered in the post treatment coal formation. However, at about 2240 days, the produced carbon dioxide began to increase. The production rate of carbon dioxide started to rise significantly due to onset of saturation of the post treatment coal formation.

FIG. 285 illustrates cumulative net carbon dioxide injected as a function of time during the simulation in the post treatment coal formation model. The cumulative net carbon dioxide injected is the total carbon dioxide produced subtracted from the total carbon dioxide injected. FIG. 285 shows that the simulation predicts a potential net sequestration of carbon dioxide of 0.56 $Bm^3$. This value is greater than the value of 0.46 $Bm^3$ at 90% carbon dioxide breakthrough in the deep coal formation. However, comparison of FIG. 280 with FIG. 283 shows that sequestration occurs at much lower pressures in the post treatment coal formation model. Therefore, less compression energy was required for sequestration in the post treatment coal formation.

The simulations show that large amounts of carbon dioxide may be sequestered in both deep coal formations and in post treatment coal formations that have been cooled. Carbon dioxide may be sequestered in the post treatment coal formation, in coal formations that have not been pyrolyzed, and/or in both types of formations.

FIG. 286 is a flow chart of an embodiment of in situ synthesis gas production process 2140 integrated with a SMDS Fischer-Tropsch and wax cracking process with heat and mass balances. The synthesis gas generating fluid injected into the formation includes about 24,000 metric tons per day of water 1524A, which includes about 5,500 metric tons per day of water 1524B recycled from the SMDS Fischer-Tropsch and wax cracking process 2142. A total of about 1700 MW of energy is supplied to the in situ synthesis gas production process 2140. About 1020 MW of energy 2126A of the approximately 1700 MW of energy is supplied by in situ reaction of an oxidizing fluid with the formation, and approximately 680 MW of energy 2126B is supplied by the SMDS Fischer-Tropsch and wax cracking process 2142 in the form of steam. About 12,700 cubic meters equivalent oil per day of synthesis gas 1502 is used as feed gas to the SMDS Fischer-Tropsch and wax cracking process 2142. The SMDS Fischer-Tropsch and wax cracking process 2142 produces about 4,770 cubic meters per day of products 1444 that may include naphtha, kerosene, diesel, and about 5,880 cubic meters equivalent oil per day of off gas 2144 for a power generation facility.

FIG. 287 is a comparison between numerical simulation and the in situ experimental coal field test composition of synthesis gas produced as a function of time. The plot excludes nitrogen and traces of oxygen that were contaminants during gas sampling. Symbols represent experimental data and curves represent simulation results. Hydrocarbons 2150 are methane since all other heavier hydrocarbons have decomposed at the existing formation temperatures. The simulation results are moving averages of raw results, which exhibit peaks and troughs of approximately ±10 percent of the averaged value. In the model, the peaks of $H_2$ occurred when fluids were injected into the coal seam, and coincided with lows in $CO_2$ and CO.

The simulation of $H_2$ 2146 provides a good fit to observed fraction of $H_2$ 2148. The simulation of methane 2152 provides a good fit to observed fraction of hydrocarbons 2150. The simulation of carbon dioxide 2155 provides a good fit to observed fraction of carbon dioxide 2153. The simulation of CO 2154 overestimated the fraction of CO 2156 by 4-5 percentage points. Carbon monoxide is the most difficult of the synthesis gas components to model. In addition, the carbon monoxide discrepancy may be due to fact that the pattern temperatures exceeded 550° C., the upper limit at which the numerical model was calibrated.

Other methods of producing synthesis gas were successfully demonstrated at the experimental field test. These included continuous injection of steam and air, steam and oxygen, water and air, water and oxygen, steam, air and carbon dioxide. All these injections successfully generated synthesis gas in the hot coke formation.

Low temperature pyrolysis experiments with tar sand were conducted to determine a pyrolysis temperature zone and effects of temperature in a heated portion on the quality of the produced pyrolyzation fluids. The tar sand was collected from the Athabasca tar sand region. FIG. 202 depicts a retort and collection system used to conduct the experiment.

Laboratory experiments were conducted on three tar samples contained in their natural sand matrix. The three tar samples were collected from the Athabasca tar sand region in western Canada. In each case, core material received from a well was mixed and then was split. One aliquot of the split core material was used in the retort, and the replicate aliquot was saved for comparative analyses. Materials sampled included a tar sample within a sandstone matrix.

The heating rate for the runs was varied at 1° C./day, 5° C./day, and 10° C./day. The pressure condition was varied for the runs at pressures of 1 bar, 7.9 bars, and 28.6 bars. Run #78 was operated with no backpressure (about 1 bar absolute) and a heating rate of 1° C./day. Run #79 was operated with no backpressure (about 1 bar absolute) and a heating rate of 5° C./day. Run #81 was operated with no backpressure (about 1 bar absolute) and a heating rate of 10° C./day. Run #86 was operated at a pressure of 7.9 bars absolute and a heating rate of 10° C./day. Run #96 was operated at a pressure of 28.6 bars absolute and a heating rate of 10° C./day. In general, 0.5 to 1.5 kg initial weight of the sample was required to fill the available retort cells.

The internal temperature for the runs was raised from ambient to 110° C., 200° C., 225° C. and 270° C., with 24 hours holding time between each temperature increase. Most of the moisture was removed from the samples during this heating. Beginning at 270° C., the temperature was increased by 1° C./day, 5° C./day, or 10° C./day until no further fluid was produced. The temperature was monitored and controlled during the heating of this stage.

Produced liquid was collected in graduated glass collection tubes. Produced gas was collected in graduated glass collection bottles. Fluid volumes were read and recorded daily. Accuracy of the oil and gas volume readings was within +/−0.6% and 2%, respectively. The experiments were stopped when fluid production ceased. Power was turned off and more than 12 hours was allowed for the retort to fall to room temperature. The pyrolyzed sample remains were unloaded, weighed, and stored in sealed plastic cups. Fluid production and remaining rock material were sent out for analytical experimentation.

In addition, Dean Stark toluene solvent extraction was used to assay the amount of tar contained in the sample. In such an extraction procedure, a solvent such as toluene or a toluene/xylene mixture is mixed with a sample and refluxed under a condenser using a receiver. As the refluxed sample condenses, two phases of the sample may separate as they flow into the receiver. For example, tar may remain in the receiver while the solvent returns to the flask. Detailed procedures for Dean Stark toluene solvent extraction are provided by the American Society for Testing and Materials. A 30g sample from each depth was sent for Dean Stark extraction analysis.

TABLE 26 illustrates the elemental analysis of initial tar and of the produced fluids for runs #81, #86, and #96. These data are all for a heating rate of 10° C./day. Only pressure was varied between the runs.

TABLE 26

| Run # | P (bar) | C (wt %) | H (wt %) | N (wt %) | O (wt %) | S (wt %) |
|---|---|---|---|---|---|---|
| Initial Tar | — | 82.43 | 10.20 | 0.45 | 1.74 | 5.18 |
| 81 | 1 | 84.61 | 12.35 | 0.06 | 0.51 | 2.46 |
| 86 | 7.9 | 85.09 | 12.47 | 0.05 | 0.50 | 1.89 |
| 96 | 28.6 | 85.42 | 12.86 | 0.05 | 0.42 | 1.25 |

| Run # | P (bar) | H/C | N/C | O/C | S/C |
|---|---|---|---|---|---|
| Initial Tar | | 1.475 | 0.0047 | 0.0158 | 0.0236 |
| 81 | 1 | 1.739 | 0.0006 | 0.0046 | 0.0109 |
| 86 | 7.9 | 1.746 | 0.0005 | 0.0044 | 0.0083 |
| 96 | 28.6 | 1.794 | 0.0005 | 0.0037 | 0.0055 |

As illustrated in TABLE 26, pyrolysis of the tar sand decreases nitrogen, sulfur, and oxygen weight percentages in a produced fluid. Increasing the pressure in the pyrolysis experiment appears to decrease the nitrogen, sulfur, and oxygen weight percentage in the produced fluids. In addition, the weight percentage of hydrogen and the hydrogen to carbon ratio increase with increasing pressure.

TABLE 27 illustrates NOISE (Nitric Oxide Ionization Spectrometry Evaluation) analysis data for runs #81, #86, and #96 and the initial tar. NOISE has been developed as a quantitative analysis of the weight percentages of the main constituents in oil. The remaining weight percentage (47.2%) in the initial tar may be found in the high molecular weight residue.

TABLE 27

| Run # | P (bar) | Paraffins (wt %) | Cycloalkanes (wt %) | Phenols (wt %) | Mono-aromatics (wt %) |
|---|---|---|---|---|---|
| Initial Tar | — | 7.08 | 29.15 | 0 | 6.73 |
| 81 | 1 | 15.36 | 46.7 | 0.34 | 21.04 |
| 86 | 7.9 | 27.16 | 45.8 | 0.54 | 16.88 |
| 96 | 28.6 | 26.45 | 36.56 | 0.47 | 28.0 |

| Run # | P (bar) | Di-aromatics (wt %) | Tri-aromatics (wt %) | Tetra-aromatics (wt %) |
|---|---|---|---|---|
| Initial Tar | — | 8.12 | 1.70 | 0.02 |
| 81 | 1 | 14.83 | 1.72 | 0.01 |
| 86 | 7.9 | 9.09 | 0.53 | 0 |
| 96 | 28.6 | 8.52 | 0 | 0 |

As illustrated in TABLE 27, pyrolyzation of tar sand produces a product fluid with a significantly higher weight percentage of paraffins, cycloalkanes, and mono-aromatics than found in the initial tar sand. Increasing the pressure up to 7.9 bars absolute appears to substantially eliminate the production of tetra-aromatics. Further increasing the pressure up to 28.6 bars absolute appears to substantially eliminate the production of tri-aromatics. An increase in the pressure also appears to decrease production of di-aromatics. Increasing the pressure up to 28.6 bars absolute also appears to significantly increase production of mono-aromatics. This may be due to an increased hydrogen partial pressure at the higher pressure. The increased hydrogen partial pressure may reduce the number of poly-aromatic compounds and increase the number of mono-aromatics, paraffins, and/or cycloalkanes.

FIG. 288 illustrates plots of weight percentages of carbon compounds versus carbon number for initial tar 2158 and runs at pressures of 1 bar absolute 2160, 7.9 bars absolute 2162, and 28.6 bars absolute 2164 with a heating rate of 10° C./day. From the plots of initial tar 2158 and a pressure of 1 bar absolute 2160, it can be seen that pyrolysis shifts an average carbon number distribution to relatively lower carbon numbers. For example, a mean carbon number in the carbon distribution of plot 2158 is about carbon number nineteen and a mean carbon number in the carbon distribution of plot 2160 is about carbon number seventeen. Increasing the pressure to 7.9 bars absolute 2162 further shifts the average carbon number distribution to even lower carbon numbers. Increasing the pressure to 7.9 bars absolute 2162 shifts the mean carbon number in the carbon distribution to a carbon number of about thirteen. Increasing the pressure to 28.6 bars absolute 2164 reduces the mean carbon number to about eleven. Increasing the pressure is believed to decrease the average carbon number distribution by increasing a hydrogen partial pressure in the product fluid. The increased hydrogen partial pressure in the product fluid allows hydrogenation, dearomatization, and/or pyrolysis of large molecules to form smaller molecules. Increasing the pressure also increases a quality of the produced fluid. For example, the API gravity of the fluid increased from about 6° for the initial tar, to about 31° for a pressure of 1 bar absolute, to about 39° for a pressure of 7.9 bars absolute, to about 45° for a pressure of 28.6 bars absolute.

FIG. 289 illustrates bar graphs of weight percentages of carbon compounds for various pyrolysis heating rates and pressures. Bar 2166 illustrates weight percentages for pyrolysis with a heating rate of 1° C./day at a pressure of 1 bar absolute. Bar 2168 illustrates weight percentages for pyrolysis with a heating rate of 5° C./day at a pressure of 1 bar absolute. Bar 2170 illustrates weight percentages for pyrolysis with a heating rate of 10° C./day at a pressure of 1 bar absolute. Bar 2172 illustrates weight percentages for pyrolysis with a heating rate of 10° C./day at a pressure of 7.9 bars absolute. Weight percentages of paraffins 2174, cycloalkanes 2176, mono-aromatics 2178, di-aromatics 2180, and tri-aromatics 2182 are illustrated in the bars. The bars demonstrate that a variation in the heating rate between 1° C./day to 10° C./day does not significantly affect the composition of the product fluid. Increasing the pressure from 1 bar absolute to 7.9 bars absolute, however, affects a composition of the product fluid. Such an effect may be characteristic of the effects described in FIG. 288 and TABLES 26 and 27 above.

FIG. 244 illustrates a drum experimental apparatus. This apparatus was used to test Athabasca tar sands. Electric heater 1132 and bead heater 2022 were used to uniformly heat contents of drum 2024. Insulation 2004 surrounds drum 2024. Contents of drum 2024 were heated at a rate of about 2° C./day at various pressures. Measurements from temperature gauges 2006 were used to determine an average temperature in drum 2024. Pressure in the drum was monitored with pressure gauge 1942. Product fluids were removed from drum 2024 through conduit 2008. Temperature of the product fluids was monitored with temperature gauge 2006 on conduit 2008. A pressure of the product fluids was monitored with pressure gauge 1942 on conduit 2008. Product fluids were separated in separator 2010. Separator 2010 separated product fluids into condensable and non-condensable products. Pressure in separator 2010 was monitored with pressure gauge 1942. Non-condensable product fluids were removed through conduit 2012. A composition of a portion of non-condensable product fluids removed from separator 2010 was determined by gas analyzer 2014. A portion of condensable product fluids was removed from separator 2010. Compositions of the portion of condensable product fluids collected were determined by external analysis methods. Temperature of the non-condensable fluids was monitored with temperature gauge 2006 on conduit 2012. A pressure of the non-condensable fluids was monitored with pressure gauge 1942 on conduit 2012. Flow of non-condensable fluids from separator 2010 was determined by flow meter 2018. Fluids measured in flow meter 2018 were collected and neutralized in carbon bed 2020. Gas samples were collected in gas container 2026.

Drum 2024 was filled with Athabasca tar sand and heated. All experiments were conducted using the system shown in FIG. 244. Vapors were produced from the drum, cooled, separated into liquids and gases, and then analyzed. Two separate experiments were conducted, each using tar sand from the same batch, but the drum pressure was maintained at 1 bar absolute in one experiment (the low pressure experiment), and the drum pressure was maintained at 6.9 bars absolute in the other experiment (the high pressure experiment). The drum pressures were allowed to autogenously increase to the maintained pressure as temperatures were increased. In the low pressure experiment, the acid number of the treated tar sands was found to be 0.02 mg/gram KOH.

FIG. 290 illustrates mole % of hydrogen in the gases during the experiment (i.e., when the drum temperature was increased at the rate of 2° C./day). Line 2184 illustrates results obtained when the drum pressure was maintained at 1 bar absolute. Line 2186 illustrates results obtained when the drum pressure was maintained at 6.9 bars absolute. FIG. 290 demonstrates that a higher mole percent of hydrogen was produced in the gas when the drum was maintained at lower pressures. It is believed that increasing the drum pressure forced additional hydrogen into the liquids in the drum. The hydrogen will tend to hydrogenate heavy hydrocarbons.

FIG. 291 illustrates API gravity of liquids produced from the drum as the temperature was increased in the drum. Plot 2188 depicts results from the high pressure experiment and plot 2190 depicts results from the low pressure experiment. As illustrated in FIG. 291, higher quality liquids were produced at the higher drum pressure. It is believed that higher quality liquids were produced at the higher drum pressure because more hydrogenation occurred in the drum during the high pressure experiment. Although the hydrogen concentration in the gas was lower in the high pressure experiment, the drum pressures were significantly greater. Therefore, the partial pressure of hydrogen in the drum was greater in the high pressure experiment.

Controlling a pressure and a temperature within a relatively permeable formation will, in most instances, affect properties of the produced formation fluids. For example, a composition or a quality of formation fluids produced from the formation may be altered by altering an average pressure and/or an average temperature in the selected section of the heated portion. The quality of the produced fluids may be defined by a property which may include, but is not limited to, API gravity, percent olefins in the produced formation fluids, ethene to ethane ratio, percent of hydrocarbons within produced formation fluids having carbon numbers greater than 25, total equivalent production (gas and liquid), and/or total liquids production. For example, controlling the quality of the produced formation fluids may include controlling average pressure and average temperature in the selected section such that the average assessed pressure in the selected section may be greater than the pressure (p) as set forth in the form of EQN. 70 for an assessed average temperature (T) in the selected section:

$$p = \exp\left[\frac{A}{T} + B\right] \tag{70}$$

where p is measured in psia (pounds per square inch absolute), T is measured in Kelvin, and A and B are parameters dependent on the value of the selected property.

EQN. 70 may be rewritten such that the natural log of pressure may be a linear function of an inverse of temperature. This form of EQN. 70 may be written as: $\ln(p) = A/T + B$. In a plot of the absolute pressure as a function of the reciprocal of the absolute temperature, A is the slope and B is the intercept. The intercept B is defined to be the natural logarithm of the pressure as the reciprocal of the temperature approaches zero. Therefore, the slope and intercept values (A and B) of the pressure-temperature relationship may be determined from two pressure-temperature data points for a given value of a selected property. The pressure-temperature data points may include an average pressure within a formation and an average temperature within the formation at which the particular value of the property was, or may be, produced from the formation. For example, the pressure-temperature data points may be obtained from an experiment such as a laboratory experiment or a field experiment.

A relationship between the slope parameter, A, and a value of a property of formation fluids may be determined. For example, values of A may be plotted as a function of values of a formation fluid property. A cubic polynomial may be fitted to these data. For example, a cubic polynomial relationship such as EQN. 71

$$A=a_1*(\text{property})^3+a_2*(\text{property})^2+a_3*(\text{property})+a_4 \quad (71)$$

may be fitted to the data, where $a_1$, $a_2$, $a_3$, and $a_4$ are empirical constants that describe a relationship between the first parameter, A, and a property of a formation fluid. Alternatively, relationships having other functional forms such as another order polynomial or a logarithmic function may be fitted to the data. Values of $a_1$, $a_2$, . . . , may be estimated from the results of the data fitting. Similarly, a relationship between the second parameter, B, and a value of a property of formation fluids may be determined. For example, values of B may be plotted as a function of values of a property of a formation fluid. A cubic polynomial may also be fitted to the data. For example, a cubic polynomial relationship such as EQN. 72

$$B=b_1*(\text{property})^3+b_2*(\text{property})^2+b_3*(\text{property})+b_4 \quad (72)$$

may be fitted to the data, where $b_1$, $b_2$, $b_3$, and $b_4$ are empirical constants that describe a relationship between the parameter B and the value of a property of a formation fluid. As such, $b_1$, $b_2$, $b_3$, and $b_4$ may be estimated from results of fitting the data. TABLES 28 and 29 list estimated empirical constants determined for several properties of the tar (or hydrocarbons) for production from Athabasca tar sands.

lyzed at various operating conditions. The quality of the produced fluids was described by a number of desired properties. Desired properties included API gravity, an ethene to ethane ratio, equivalent liquids produced (gas and liquid), and percent of fluids with carbon numbers greater than about 25. Based on data collected from these equilibrium experiments, families of curves for several values of each of the properties were constructed as shown in FIGS. 292-295. From these figures, EQNS. 75, 76, and 77 were used to describe the functional relationship of a given value of a property:

$$P=\exp[(A/T)+B], \quad (75)$$

$$A=a_1*(\text{property})^3+a_2*(\text{property})^2+a_3*(\text{property})+a_4 \quad (76)$$

$$B=b_1*(\text{property})^3+b_2*(\text{property})^2+b_3*(\text{property})+b_4. \quad (77)$$

The generated curves may be used to determine a preferred temperature and a preferred pressure that produce fluids with desired properties. Data illustrating the pressure-temperature relationship of a number of the desired properties for tar sands samples was plotted in a number of the following figures.

In FIG. 292, a plot of gauge pressure versus temperature is depicted. Lines representing the fraction of products with carbon numbers greater than about 25 were plotted. For example, when operating at a temperature of 375° C. and a pressure of 3.8 bars absolute, about 5% of the produced fluid hydrocarbons had a carbon number equal to or greater than 25. At low pyrolysis temperatures and high pressures, the

TABLE 28

| PROPERTY | $a_1$ | $a_2$ | $a_3$ | $a_4$ |
|---|---|---|---|---|
| API Gravity (°) | 1.241538 | −63.488 | 399.8138 | −2563.58 |
| Ethene/Ethane Ratio | 703115.4 | 595728.3 | −113788 | −6696.36 |
| Weight Percent of Hydrocarbons Having a Carbon Number Greater Than 25 | −9.98205639 | 280.8493405 | −2882.17 | −13199.4 |
| Equivalent Liquid Production (gal/ton) | −139.727 | 11019.07 | −287416 | 2438177.26 |

TABLE 29

| PROPERTY | $b_1$ | $b_2$ | $b_3$ | $b_4$ |
|---|---|---|---|---|
| API Gravity (°) | −.00969 | 0.913396 | −28.7662 | 328.0794 |
| Ethene/Ethane Ratio | −1502.05 | −759.361 | 131.31749 | 16.12737 |
| Weight Percent of Hydrocarbons Having a Carbon Number Greater Than 25 | 0.01393835 | −0.395164411 | 4.092876 | 25.23222 |
| Equivalent Liquid Production (gal/ton) | 0.010799 | −2.50854 | 192.3489 | −4804.5858 |

To determine an average pressure and an average temperature to produce a formation fluid having a selected property, the value of the selected property and the empirical constants as described above may be used to determine values for the first parameter A and the second parameter B according to EQNS. 73 and 74:

$$A=a_1*(\text{property})^3+a_2*(\text{property})^2+a_3*(\text{property})+a_4 \quad (73)$$

$$B=b_1*(\text{property})^3+b_2*(\text{property})^2+b_3*(\text{property})+b_4. \quad (74)$$

Experimental data from the experiment described above for FIG. 202 were used to determine a pressure-temperature relationship relating to the quality of the produced fluids. Varying the operating conditions included altering temperatures and pressures. Various samples of tar sands were pyrofraction of produced fluids with carbon numbers greater than about 25 decreases. Therefore, operating at a high pressure and a pyrolysis temperature at the lower end of the pyrolysis temperature zone tends to decrease the fraction of fluids with carbon numbers greater than 25 produced from tar sands.

FIG. 293 illustrates oil quality produced from tar sands as a function of pressure and temperature. Lines indicating different oil qualities, as defined by API gravity, are plotted. For example, the quality of the produced oil was about 35° API when pressure was maintained at about 5.5 bars absolute and a temperature was about 375° C. Low pyrolysis temperatures and relatively high pressures may produce a high API gravity oil.

FIG. 294 illustrates an ethene to ethane ratio produced from tar sands as a function of pressure and temperature. For example, at a pressure of 14.8 bars absolute and a temperature of 375° C., the ratio of ethene to ethane is approximately 0.01. The volume ratio of ethene to ethane may predict an olefin to alkane ratio of hydrocarbons produced during pyrolysis. To control olefin content, operating at lower pyrolysis temperatures and a higher pressure may be beneficial. Olefin content may be reduced by operating at a low pyrolysis temperature and a high pressure.

FIG. 295 depicts the yield of equivalent liquids produced from tar sands as a function of temperature and pressure. Line 2192 represents the pressure-temperature combination at which $8.38\times10^{-5}$ $m^3$ of fluid per kilogram of tar sands (20 gallons/ton) is produced. The pressure/temperature plot results in line 2194 for the production of total fluids per ton of tar sands equal to $1.05\times10^{-5}$ $m^3$//kg (25 gallons/ton). For example, at a temperature of about 325° C. and a pressure of about 4.5 bars absolute, the resulting equivalent liquids produced was about $8.38\times10^{-5}$ $m^3$/kg. As the temperature of the retort increased and the pressure decreased, the yield of the equivalent liquids produced increased. Equivalent liquids produced is defined as the amount of liquids equivalent to the energy value of the produced gas and liquids.

A three-dimensional (3-D) simulation model (STARS, Computer Modeling Group (CMG), Calgary, Canada) was used to simulate an in situ conversion process for a tar sands formation. A heat injection rate was calculated using a separate numerical code (CFX, AEA Technology, Oxfordshire, UK). The initial heat injection rate was calculated at 500 watts per foot (1640 watts per meter). The 3-D simulation was based on a dilation-recompaction model for tar sands. A target zone thickness of 50 m was used. Input data for the simulation were based on average reservoir properties of the Grosmont formation in northern Alberta, Canada as follows:

Depth of target zone=280 m;
Thickness=50 m;
Porosity=0.27;
Oil saturation=0.84;
Water saturation=0.16;
Permeability=1000 millidarcy;
Vertical permeability versus horizontal permeability=0.1;
Overburden=shale; and
Base rock=wet carbonate.

Six component fluids were used in the STARS simulation based on fluids found in Athabasca tar sands. The six component fluids were: heavy fluid, light fluid, gas, water, prechar, and char. The spacing between heater wells was set at 9.1 m on a triangular pattern. In one simulation, eleven horizontal heaters, each with a 91.4 m heater length were used with initial heat outputs set at the previously calculated value of 1640 watts per meter. A vertical production well was placed at a center of the formation.

FIG. 296 illustrates a plot of percentage oil recovery (percentage of initial volume of oil in place recovered) versus temperature (in degrees Celsius) for a laboratory experiment (data from the pyrolysis experiments of FIG. 202) and a simulation. The pressure in the laboratory experiment and in a production well in the simulation was atmospheric pressure (about 1 bar absolute bottomhole pressure). As can be seen from the plots, simulation recovery data 2196 was in relatively good agreement with the experimental recovery data 2198. FIG. 297 depicts temperature (in degrees Celsius) versus time (in days) for the laboratory experiment and the simulation. As is the case with oil recovery, simulation data 2200 was in relatively good agreement with experimental data 2202.

FIG. 298 illustrates a plot of cumulative oil production (in cubic meters) versus time (in days) for various bottomhole pressures at a producer well. Plot 2204 illustrates oil production for a pressure of 1.03 bars absolute. Plot 2206 illustrates oil production for a pressure of 6.9 bars absolute. FIG. 298 demonstrates that an increase in bottomhole pressure decreases oil production in a tar sands formation. Simulation data illustrated in FIGS. 299, 300, and 301-306 were determined for a bottomhole pressure of about 1 bar absolute.

FIG. 299 illustrates a plot of a ratio of energy content of produced fluids from a reservoir against energy input to heat the reservoir versus time (in days). Plot 2208 illustrates the ratio versus time for heating an entire reservoir to a pyrolysis temperature. Plot 2210 illustrates the ratio versus time for allowing partial drainage in the reservoir into a selected pyrolyzation section. FIG. 299 demonstrates that allowing partial drainage in the reservoir tends to increase the energy content of produced fluids versus heating the entire reservoir, for a given energy input into the reservoir.

FIG. 300 illustrates a plot of weight percentage versus carbon number distribution obtained from laboratory experiments and used in the simulation. Plot 2212 illustrates the carbon number distribution for the initial tar sand. The initial tar sand has an API gravity of 6°. Plot 2214 illustrates the carbon number distribution for in situ conversion of the tar sand up to a temperature of 350° C. Plot 2214 has an API gravity of 30°. From FIG. 300, it can be seen that the in situ conversion process increases the quality of oil found in the tar sands, as evidenced by the increased API gravity and the carbon number distribution shift to lower carbon numbers. The lower carbon number distribution was evidence that a large portion of the produced fluid was produced as a vapor.

FIG. 301 illustrates percentage cumulative oil recovery versus time (in days) for the simulation using horizontal heaters. As seen from plot 2216, a total mass recovery approached about 70% at about 1800 days. This is comparable to results obtained from the pyrolysis experiments of FIG. 202 (as shown in FIG. 296). FIG. 302 illustrates oil production rates ($m^3$/day) versus time (in days) for heavy hydrocarbons 2218 and light hydrocarbons 2220. Heavy hydrocarbon production 2218 reached a maximum of about 3 $m^3$/day at about 150 days. Light hydrocarbon production 2220 reached a maximum of about 9.6 $m^3$/day at about 950 days. In addition, almost all heavy hydrocarbon production 2218 was complete before the onset of light hydrocarbon production 2220. The early heavy hydrocarbon production was attributed to production of cold (relatively unheated and unpyrolyzed) heavy hydrocarbons.

It should be noted that oil production rates ($m^3$/day), cumulative oil production data ($m^3$), and other non-averaged number values determined using the simulations as described herein are calculated for symmetry elements within the simulation. Thus, absolute values of oil production rates, cumulative oil production data, and other non-averaged number values between simulations with different symmetry elements will differ based on the size or scope of the symmetry elements.

In some embodiments, early production of heavy hydrocarbons may be undesirable. FIG. 303 illustrates oil production rates ($m^3$/day) versus time (days) for heavy hydrocarbons 2218 and light hydrocarbons 2220 with production inhibited for the first 500 days of heating. Heavy hydrocarbon production 2218 in FIG. 303 was significantly lower than heavy hydrocarbon production 2218 in FIG. 302. Light hydrocarbon production 2220 in FIG. 303 was higher than light hydrocarbon production 2220 in FIG. 302, reaching a maximum of about 11.5 $m^3$/day at about 950 days. The percentage of light hydrocarbons to heavy hydrocarbons was increased by inhibiting production the first 500 days of heating.

Inhibiting production during heating can significantly increase the pressure in the formation. FIG. 304 depicts average pressure in the formation (bars absolute) versus time (days). Plot 2222 depicts the average pressure for inhibited production during the first 500 days of heating. The average pressure reached a maximum of about 320 bars absolute at 500 days. Plot 2224 depicts the average pressure for inhibited production until 500 days with four additional vertical producer wells placed proximate the heater wells. Production through the four additional vertical producer wells was limited such that small amounts of hydrocarbons were produced to relieve pressure in the formation. In this case, the average pressure decreased to about 185 bars absolute at 500 days. Thus, producing small amounts of hydrocarbons during early stages of production can be effective for controlling pressure within the formation.

FIG. 305 illustrates cumulative oil production ($m^3$) versus time (days) for vertical producer 2226 and horizontal producer 2228 for the simulation using horizontal heater wells. As shown in FIG. 305, there was relatively little difference in cumulative oil production between using a horizontal producer in the middle of the formation or a vertical producer in the simulation. Vertical or slanted wells may be easier and/or cheaper to install than horizontal wells. Using vertical or slanted production wells may improve an economic outlook for a proposed in situ system.

FIG. 306 illustrates percentage cumulative oil recovery versus time (days) for three different horizontal producer well locations: top 2230, middle 2232, and bottom 2234. The highest cumulative oil recovery was obtained using bottom producer 2234. There was relatively little difference in cumulative oil recovery between middle producer 2232 and top producer 2230. FIG. 307 illustrates production rates ($m^3$/day) versus time (days) for heavy hydrocarbons and light hydrocarbons for the middle and bottom producer locations. As seen in FIG. 307, heavy hydrocarbon production with bottom producer 2236 was more than heavy hydrocarbon production with middle producer 2238. There was relatively little difference between light hydrocarbon production with bottom producer 2240 and light hydrocarbon production with middle producer 2242. Higher cumulative oil recovery obtained with the bottom producer (shown in FIG. 306) may be due to increased heavy hydrocarbon production.

A second tar sands simulation for the Grosmont reservoir used six vertical heater wells and a vertical producer well in a seven spot pattern with a spacing of 9.1 m between wells. The bottomhole pressure in the vertical producer well was about 1 bar absolute. FIG. 308 illustrates percentage cumulative oil recovery versus time (in days) for the second Grosmont tar sands simulation. Plot 2244 shows a total mass recovery approached about 70% after 1800 days, which is comparable to results of the pyrolysis experiments of FIG. 202 (as shown in FIG. 296).

FIG. 309 illustrates oil production rates ($m^3$/day) versus time (in days) for heavy hydrocarbons 2218 and light hydrocarbons 2220 for the second Grosmont tar sands simulation. FIG. 309 shows that heavy hydrocarbon production 2218 reached a maximum of about 0.08 $m^3$/day at about 700 days. Light hydrocarbon production 2220 reached a maximum of about 0.22 $m^3$/day at about 800 days. The heavy hydrocarbon production (shown in FIG. 309) takes place at a later time than heavy hydrocarbon production for horizontal heater wells (shown in FIG. 302).

Simulations were performed using the 3-D simulation model (STARS) to simulate an in situ conversion process for a tar sands formation. A separate numerical code using finite difference simulation (CFX) was used to calculate heat input data for the formations and well patterns. The heat input data was used as boundary conditions in the 3-D simulation model.

FIG. 310 illustrates a pattern of heater/producer wells used to heat a tar sands formation in the simulation. In the simulation, six heater/producer wells 2246 were placed in formation 2248. FIG. 311 illustrates a pattern of heater/producer wells used in the simulation with three heater/producer wells 2246, one cold producer well 2250, and three heater wells 520. Cold producer well 2250 has no heating element placed within the well. FIG. 312 illustrates a pattern of six heater wells 520 and one cold producer well 2250 used in the simulation. The pattern of wells used in each simulation is similar to that for the embodiment described in reference to FIG. 141. Heater wells had a horizontal length (i.e., length perpendicular to the pattern in the drawings) of 91.4 m in the simulations.

Parameters for the simulations are based on formation properties of the Peace River basin in Alberta, Canada:

Formation thickness=28 m, in which the formation has three layers (estuarine, lower estuarine, and fluvial);
Estuarine thickness=10 m (upper portion of formation);
porosity=0.28;
permeability=150 millidarcy;
vertical permeability/horizontal permeability=0.07;
oil saturation=0.79;
Lower estuarine thickness=9 m (middle portion of formation);
porosity=0.28;
permeability=825 millidarcy;
vertical permeability/horizontal permeability=0.6;
oil saturation=0.81;
Fluvial thickness=9 m (lower portion of formation);
porosity=0.30;
permeability=1500 millidarcy;
vertical permeability/horizontal permeability=0.7;
oil saturation=0.81.

Simulation data illustrated in FIGS. 313-322 were determined for a bottomhole pressure of about 1 bar absolute. FIG. 313 illustrates cumulative oil production ($m^3$) versus time (days) for the simulation of FIG. 310. Plot 2252 illustrates cumulative heavy hydrocarbon production versus time. Plot 2254 illustrates cumulative light hydrocarbon production versus time. As shown in FIG. 313, light hydrocarbon production exceeds heavy hydrocarbon production for the case of six heater/producer wells. Light hydrocarbon production at about 2000 days was about 3650 $m^3$, while heavy hydrocarbon production at the same time was about 2700 $m^3$.

FIG. 314 illustrates cumulative oil production ($m^3$) versus time (days) for the simulation of FIG. 311. Plot 2256 illustrates cumulative heavy hydrocarbon production versus time. Plot 2258 illustrates cumulative light hydrocarbon production versus time. As shown in FIG. 314, light hydrocarbon production exceeds heavy hydrocarbon for the simulation. Light hydrocarbon production at about 2000 days was about 4930 $m^3$, while heavy hydrocarbon production at the same time was about 650 $m^3$. In this case, light hydrocarbon production was greater than heavy hydrocarbon production. A ratio of light hydrocarbon production to heavy hydrocarbon production for this simulation was greater than a ratio of light hydrocarbon production to heavy hydrocarbon production for the simulation in FIG. 310 (as shown in FIG. 313).

FIG. 315 illustrates cumulative oil production ($m^3$) versus time (days) for the simulation of FIG. 312. Plot 2260 illustrates cumulative heavy hydrocarbon production versus time. Plot 2262 illustrates cumulative light hydrocarbon production versus time. As shown in FIG. 315, heavy hydrocarbon production exceeds that of light hydrocarbon production using a cold producer well at the bottom of the formation. Light hydrocarbon production was about 3000 $m^3$ at about 2000 days, while heavy hydrocarbon production at the same time was about 4100 $m^3$. Light hydrocarbon production was lower than the previous simulations, while heavy hydrocarbon production (and total oil production) increased.

FIG. 316 illustrates cumulative gas production ($m^3$) and cumulative water production ($m^3$) versus time (days) for the simulation of FIG. 310. Plot 2264 illustrates cumulative water production versus time. Plot 2266 illustrates cumulative gas production versus time. FIG. 317 illustrates cumulative gas production ($m^3$) and cumulative water production ($m^3$) versus time (days) for the simulation of FIG. 311. Plot 2268 illustrates cumulative water production versus time. Plot 2270 illustrates cumulative gas production versus time. FIG. 318 illustrates cumulative gas production ($m^3$) and cumulative water production ($m^3$) versus time (days) for the simulation of FIG. 312. Plot 2272 illustrates cumulative water production versus time. Plot 2274 illustrates cumulative gas production versus time. As shown in FIGS. 316, 317, and 318, water production was relatively constant in the three simulations (about 2700 $m^3$ barrels after about 2000 days). Gas production was the highest in FIG. 317, with about $4.8\times10^5$ $m^3$ after about 2000 days. Gas production was the lowest in FIG. 318, at about $3.7\times10^5$ $m^3$ at about 3000 days.

FIG. 319 illustrates an energy ratio versus time for the simulation of FIG. 310. Plot 2276 illustrates the energy ratio (energy produced divided by energy injected) versus time (days). FIG. 320 illustrates an energy ratio versus time for the simulation of FIG. 311. Plot 2278 illustrates the energy ratio versus time (days). FIG. 321 illustrates an energy ratio versus time for the simulation of FIG. 312. Plot 2280 illustrates the energy ratio versus time (days). As shown in FIGS. 319 and 320, the energy ratio in these simulations are relatively similar. FIG. 321 shows a greater energy ratio due to the high energy content of the heavy hydrocarbons produced in the bottom cold producer. However, the heavy hydrocarbons produced in the bottom cold producer were of lower quality than oil produced with six heater/producer wells and/or production through an upper portion of the formation.

FIG. 322 illustrates an average API gravity of produced fluid versus time (days) for the simulations in FIGS. 310-312. Plot 2282 illustrates the average API gravity versus time for the simulation of FIG. 310 using six heater/producer wells. Plot 2284 illustrates the average API gravity versus time for the simulation of FIG. 311 using three heater/producer wells and a cold production well. Plot 2286 illustrates the average API gravity versus time for the simulation of FIG. 312 using six heater wells and a bottom cold producer. As shown in FIG. 322, higher quality oil (higher average API gravity) was produced for the simulation of FIG. 311. This may be attributed to more significant upgrading of the oil proximate the heater/producer wells and cold producer in the upper portion of the formation. Oil produced in the simulation of FIG. 311 appears to have a larger vapor phase component than oil produced in the simulations of FIGS. 310 and 312.

FIG. 323 depicts a heater well pattern used in the 3-D STARS simulation. Heater wells 520 were placed in a pattern similar to the heater wells of FIGS. 310-312. A horizontal spacing between heater wells was about 15 m, as shown in FIG. 323, and the heater wells had a horizontal length of 91.4 m. A location of the production well was varied between middle producer location 2288 and bottom producer location 2290 for the data shown in FIGS. 324, 325, and 326-329.

FIG. 324 illustrates an energy out/energy in ratio versus time (days) for production through a middle producer location with a bottomhole pressure of about 1 bar absolute. The reservoir was treated by heating the full reservoir uniformly (plot 2292) and by staged heating of the reservoir (plot 2294). Staged heating of the reservoir included turning off the top heaters at 690 days, the middle upper heater at 810 days, and the middle lower heater and bottom heaters at 1320 days. As shown in FIG. 324, staged heating (plot 2294) of the reservoir produced a higher energy out/energy in ratio than full reservoir heating (plot 2292). The amount of energy input into the formation is lower with the staged heating process, which may contribute to the higher energy out/energy in ratio.

FIG. 325 illustrates percentage cumulative oil recovery versus time (days) for production using a middle producer location and a bottom producer location with a bottomhole pressure of about 1 bar absolute. Plot 2296 illustrates production using middle producer location. Plot 2298 illustrates production using bottom producer location. As shown in FIG. 325, producing through the production well located at the bottom of the formation resulted in higher total oil recovery from the formation. However, most of the increased total oil recovery was due to production of heavy hydrocarbons rather than light hydrocarbons from the formation. Economic considerations may determine a desired ratio of heavy hydrocarbons to light hydrocarbons and locations of production wells to produce the desired ratio.

FIG. 330 illustrates cumulative oil produced ($cm^3/kg$) versus temperature (degrees Celsius) for lab pyrolysis experiments 2300 (as determined with the experimental apparatus of FIG. 202) and for simulation 2302 with a bottomhole pressure of about 7.9 bars absolute. As shown in FIG. 330, cumulative oil production versus temperature for the simulation was in good agreement with pyrolysis experimental data.

FIG. 326 illustrates cumulative oil production ($m^3$) versus time (days) using a middle producer location and a bottomhole pressure of about 7.9 bars absolute. Cumulative heavy hydrocarbon production 2304 was about 600 $m^3$ after about 800 days. Cumulative light hydrocarbon production 2306 was about 3975 $m^3$ after about 1500 days. Total cumulative production 2308 was about 4575 $m^3$ after complete light hydrocarbon production.

FIG. 327 illustrates API gravity of oil produced and oil production rates ($m^3$/day) for heavy hydrocarbons and light hydrocarbons for a middle producer location and a bottomhole pressure of about 7.9 bars absolute. As shown in FIG. 327, light hydrocarbon production 2310 takes place at a later time than heavy hydrocarbon production 2312. API gravity 2314 of the combined production increased to a maximum of about 40° at the same time the light hydrocarbon production rate 2310 maximized (about 900 days) and when heavy hydrocarbon production 2312 was substantially complete.

FIG. 328 illustrates cumulative oil production ($m^3$) versus time (days) for a bottom producer location and a bottomhole pressure of about 7.9 bars absolute. Cumulative heavy hydrocarbon production 2304 was about 3370 $m^3$ after about 1000 days. Cumulative light hydrocarbon production 2306 was about 2080 $m^3$ after about 1100 days. Total cumulative production 2308 was about 5450 $m^3$ after complete light hydrocarbon production. The earlier production time for the bottom producer location compared to production with the middle producer location (as shown in FIGS. 326 and 327) may be due to an increased production of cold (unpyrolyzed) hydrocarbons at the bottom producer location caused by gravity drainage of the fluids. The increased production of heavy (cold) hydrocarbons increased the total cumulative oil production (total mass recovery) from the formation.

FIG. 329 illustrates API gravity of oil produced and oil production rates ($m^3$/day) for heavy hydrocarbons and light hydrocarbons for a bottom producer location and a bottomhole pressure of about 7.9 bars absolute. As shown in FIG. 329, light hydrocarbon production 2310 takes place at a later time than heavy hydrocarbon production 2312, as shown in FIG. 327 for a middle producer location. API gravity 2314 of the combined production increased to a maximum of about 35° at about 1200 days, which is about the same time heavy hydrocarbon production was complete. The lower API gravity shown in FIG. 329 compared to the API gravity obtained using the middle producer location (shown in FIG. 327) was probably due to increased production of heavy (cold) hydrocarbons during the early stages of production.

FIG. 331 illustrates oil production rates ($m^3$/day) versus time (days) for heavy hydrocarbons 2316 and light hydrocarbons 2318 produced through a middle producer location and a bottomhole pressure of about 7.9 bars absolute. The heater well pattern for the simulation was identical to the heater well pattern in FIG. 323 with the horizontal heater spacing increased from 15 m to 18.3 m. As shown in FIG. 331, production rates of light hydrocarbons and heavy hydrocarbons for the wider spacing (18.3 m) was relatively similar to production rates for the narrower spacing (15 m), as shown in FIG. 327. Production started later in FIG. 331, however, which may be attributed to a slower heating rate caused by the wider spacing.

FIG. 332 illustrates cumulative oil production ($m^3$) versus time (days) for the wider horizontal heater spacing of 18.3 m with production through a middle producer location and a bottomhole pressure of about 7.9 bars absolute. Cumulative heavy hydrocarbon production 2304 was about 265 $m^3$ after about 800 days. Cumulative light hydrocarbon production 2306 was about 5432 $m^3$ after about 2000 days. A total cumulative production 2308 was about 5700 $m^3$ after completed light hydrocarbon production. Although the wider heater spacing increased the production time (as shown in FIG. 331), the total recovery of oil was greater for the wider heater spacing than for the narrower heater spacing. In addition, the wider heater spacing appeared to increase the percentage of light hydrocarbons in the total oil recovered (i.e., the light hydrocarbon versus heavy hydrocarbon ratio) compared to the narrower spacing (as shown in FIG. 326).

FIG. 333 depicts another heater well pattern used in the 3-D STARS simulation. Heater wells 520 were placed in a triangular pattern. Heater wells had a horizontal length of 91.4 m in the triangular pattern. Cold production well 2250 was located near the middle of the formation. FIG. 334 illustrates oil production rates ($m^3$/day) versus time (days) for heavy hydrocarbons 2316 and light hydrocarbons 2318 produced through cold production well 2250 located in the middle of the formation in FIG. 333 and a bottomhole pressure of about 7.9 bars absolute. As shown in FIG. 334, production rates of light hydrocarbons and heavy hydrocarbons for the triangular pattern were relatively similar to production rates for the hexagonal pattern of FIG. 323 (as shown in FIG. 327). The light hydrocarbon production rate in FIG. 334 for the triangular pattern was somewhat lower than the light hydrocarbon production rate in FIG. 327 for the hexagonal pattern. The lower production rate for the triangular pattern was probably caused by the increased spacing between heaters in the triangular pattern. The increased spacing appeared to cause a larger reduction in the heavy hydrocarbon production rate than in the light hydrocarbon production rate.

FIG. 335 illustrates cumulative oil production ($m^3$) versus time (days) for the triangular heater pattern shown in FIG. 333 and a bottomhole pressure of about 7.9 bars absolute. Cumulative heavy hydrocarbon production 2304 was about 90 $m^3$ after about 500 days. Cumulative light hydrocarbon production 2306 was about 3020 $m^3$ after about 1500 days. A total cumulative production 2308 was about 3100 $m^3$ after complete light hydrocarbon production. The triangular heater spacing appeared to decrease the production rate (as shown in FIG. 334) and the total cumulative production (as shown in FIG. 335). The triangular heater spacing increased the percentage of light hydrocarbons in the total oil recovered (i.e., the light hydrocarbon versus heavy hydrocarbon ratio) relative to the wider heater spacing (as shown in FIG. 332) and the narrower heater spacing (as shown in FIG. 326).

FIG. 336 illustrates a heater well and producer well pattern used for a 3-D STARS simulation. Heater wells 520A-520L were placed horizontally in formation 678 in an alternating triangular pattern as shown in FIG. 336. Heater wells had a horizontal length of 91.4 m in the alternating triangular pattern. A horizontal producer well was placed proximate a top of the formation (top production well 2320), in a middle of the formation (middle production well 2322), or proximate a bottom of the formation (bottom production well 2324).

FIG. 337 illustrates oil production rates ($m^3$/day) versus time (days) for heavy hydrocarbons 2316 and light hydrocarbons 2318 for production using bottom production well and a bottomhole pressure of about 7.9 bars absolute. As shown in FIG. 337, heavy hydrocarbon production 2316 was significant during early stages of production (before about 250 days). After about 200 days, oil production appeared to shift to light hydrocarbon production 2318. Plot 2326 illustrates average pressure in the formation versus time. The average pressure in the formation appeared to rise during the early stages of heavy hydrocarbon production. As light hydrocarbon production began, the average pressure began to decrease.

FIG. 338 illustrates cumulative oil production ($m^3$) versus time (days) for production through a bottom production well and a bottomhole pressure of about 7.9 bars absolute. Plot 2328 depicts cumulative heavy hydrocarbon production. Plot 2330 depicts cumulative light hydrocarbon production. Plot 2332 depicts total (heavy and light) cumulative oil production. As shown in FIG. 338, heavy hydrocarbon production (plot 2328) was about 1600 $m^3$ after about 240 days. Light hydrocarbon production was about 2900 $m^3$ after about 450 days. Total cumulative oil production was about 4500 $m^3$. As shown in FIGS. 337 and 338, heavy hydrocarbon production was significant, which is likely caused by gravity drainage of fluids towards the bottom production well. After temperatures in the formation reached pyrolysis temperatures, the cracking of heavy hydrocarbons to form light hydrocarbons in the formation increased and production shifted to light hydrocarbon production.

FIG. 339 illustrates oil production rates ($m^3$/day) versus time (days) for heavy hydrocarbons 2316 and light hydrocarbons 2318 for production using a middle production well and a bottomhole pressure of about 7.9 bars absolute. As shown in FIG. 339, some heavy hydrocarbon production occurred before light hydrocarbon production began. There is, however, less heavy hydrocarbon production than for the simulation using a bottom production well (shown in FIG. 337). A maximum production rate of heavy hydrocarbons in FIG. 339 was about 9 $m^3$/day while a maximum production rate of heavy hydrocarbons in FIG. 337 was about 23 $m^3$/day. Plot 2334 illustrates average pressure in the formation versus time. The average pressure in the formation appeared to rise slightly during the early stages of heavy hydrocarbon production and decrease slightly with the onset of light hydrocarbon production.

FIG. 340 illustrates cumulative oil production ($m^3$) versus time (days) for production through a middle production well and a bottomhole pressure of about 7.9 bars absolute. Plot 2336 depicts cumulative heavy hydrocarbon production. Plot 2338 depicts cumulative light hydrocarbon production. Plot 2340 depicts total (heavy and light) cumulative oil production. As shown in FIG. 340, heavy hydrocarbon production (plot 2336) was about 790 $m^3$ after about 225 days. Light hydrocarbon production was about 3200 $m^3$ after about 520 days. Total cumulative oil production was about 4190 $m^3$. There was slightly less total cumulative oil production for a middle production well than for a bottom production well. The decreased cumulative oil production in the middle production well is likely caused by increased heavy hydrocarbon production through the bottom production well. As shown in FIGS. 337-340, light hydrocarbon production was higher and heavy hydrocarbon production was lower for the middle production well than for the bottom production well.

FIG. 341 illustrates oil production rates ($m^3$/day) versus time (days) for heavy hydrocarbon production 2316 and light hydrocarbon production 2318 for production using a top production well and a bottomhole pressure of about 7.9 bars absolute. As shown in FIG. 341, light hydrocarbon production for the top production well was somewhat higher than light hydrocarbon production from the middle production well (as shown in FIG. 339). Heavy hydrocarbon production for the top production well was less than heavy hydrocarbon production for the bottom production well (as shown in FIG. 337). The production of heavy hydrocarbons decreased as the production well was placed closer to the top of the formation. The decreased production of heavy hydrocarbons may be caused by gravity drainage of the heavy hydrocarbons as the heavy hydrocarbons are mobilized as well as an increase in production of fluids in the vapor phase at the top of the formation. Plot 2342 illustrates average pressure in the formation versus time. The average pressure in the formation appeared to rise significantly until the onset of light hydrocarbon production.

FIG. 342 illustrates cumulative oil production ($m^3$) versus time (days) for production through a top production well and a bottomhole pressure of about 7.9 bars absolute. Plot 2344 depicts cumulative heavy hydrocarbon production. Plot 2346 depicts cumulative light hydrocarbon production. Plot 2348 depicts total (heavy and light) cumulative oil production. As shown in FIG. 342, heavy hydrocarbon production (plot 2344) was about 790 $m^3$ after about 225 days. Light hydrocarbon production was about 3200 $m^3$ after about 520 days. Total cumulative oil production was about 4190 $m^3$. Cumulative oil production through the top production well was substantially similar to cumulative oil production through the middle production well. As shown in FIGS. 339-342, heavy hydrocarbon production occurred earlier for production through the middle production well than for production through the top production well. In FIG. 340, for example, cumulative heavy hydrocarbon production 2336 was about 590 $m^3$ at 200 days. In FIG. 342, cumulative heavy hydrocarbon production (plot 2344) was about 320 $m^3$at 200 days. As shown in FIG. 341 for production through the top production well, heavy hydrocarbon production 2318 increased when light hydrocarbon production 2316 began. The increased heavy hydrocarbon production may be caused by vapor phase transport of heavy hydrocarbons towards the top production well.

FIG. 343 illustrates oil production rates ($m^3$/day) versus time for heavy hydrocarbons 2316 and light hydrocarbons 2318 for producing fluids through heater wells 520A-520L as shown in FIG. 336 and a bottomhole pressure of about 7.9 bars absolute. As shown in FIG. 343, overall heavy hydrocarbon production and most heavy hydrocarbon production were significantly reduced prior to light hydrocarbon production. Heating of the production wells within the formation most likely increased light hydrocarbon production. Cracking of hydrocarbons at a heated production well tends to increase vapor phase production at the heated production well.

FIG. 344 depicts another well pattern used in a simulation. The well pattern in FIG. 344 includes the heater pattern of FIG. 336 with three production wells 512 placed in an upper portion of the formation. Heater wells had a horizontal length of 91.4 m in the simulation. FIG. 345 illustrates oil production rates ($m^3$/day) versus time (days) for heavy hydrocarbons 2316 and light hydrocarbons 2318 for production wells 512 in FIG. 344 and a bottomhole pressure of about 7.9 bars absolute. As shown in FIG. 345, light hydrocarbon and heavy hydrocarbon production prior to 200 days was slightly higher than light hydrocarbon and heavy hydrocarbon production with top production well (as shown in FIG. 341). The early production of light and heavy hydrocarbons with production wells 512 may have been due to the placement of more production wells in the formation. Placement of more production wells in the formation tends to inhibit the buildup of pressure in the formation by producing at least some hydrocarbons at an earlier time. Therefore, pressure buildup was inhibited by producing at least some hydrocarbons at lower temperatures (i.e., temperatures below pyrolysis temperatures).

FIGS. 346 and 347 illustrate coke deposition near heater wells. FIGS. 346 and 347 show a solid phase concentration (in $m^3$of solid divided by $m^3$of liquid) at a heater well versus time (days). Plot 2350 in FIG. 346 depicts the solid phase concentration at heater wells 520A and 520B (FIG. 336) versus time. Plot 2352 in FIG. 347 depicts the solid phase concentration at heater wells 520K and 520L versus time. As shown in FIGS. 346 and 347, coke deposition was more significant at heater wells in a bottom portion of the formation. This may have been due to gravity drainage of liquid hydrocarbons towards the bottom of the formation, the residence time of liquid hydrocarbons in the bottom of the formation, and/or temperatures proximate heater wells in the bottom portion of the formation.

A large pattern simulation of an in situ process in a tar sands formation was performed using a 3-D simulation (STARS). FIG. 348 depicts a pattern of heat sources 508 and production wells 512A-512E placed in tar sands formation 2248 and used in the large pattern simulation. Heat sources 508 and production wells 512A-512E were placed horizontally within formation 2248 with a length of 1000 m. Formation 2248 had a horizontal width of 145 m and a vertical height of 28 m. Five production wells 512A-512E were placed within the pattern of heat sources 508 and with the spacings as shown in FIG. 348.

A first stage of heating included turning on heat sources 508 in first section 2354. Production during the first stage of heating was through production well 512A in first section 2354. A minimum pressure for production in production well 512A was set at 6.8 bars absolute. Fluids were produced through production well 512A as the fluids were mobilized and/or pyrolyzed within formation 2248. The first stage of heating occurred for the first 360 days of the simulation.

A second stage of heating included turning on heat sources 508 in second section 2356, third section 2358, fourth section 2360 and fifth section 2362. Heat sources 508 in second section 2356, third section 2358, fourth section 2360 and fifth section 2362 were turned on at 360 days. Minimum pressure for production in production wells 512B-512E was set at 6.8 bars absolute.

Heat sources 508 in first section 2354 were turned off at 1860 days. At 1860 days, production through production well 512A was also shut off. Heat sources 508 in other sections 2356, 2358, 2360, 2362 were similarly turned off after 2200 days. The simulation ended at 2580 days with production through production wells 512B-512E remaining on. Heat sources 508 were maintained at a relatively constant heat output of 1150 watts per meter. FIG. 349 depicts net heater output (J) versus time (days) for the simulation. Controlling the turning on and off of heat sources 508 produced the linear net heater output increase between about 360 days and about 2200 days.

Production after the first stage of heating was through any one of production wells 512A-512E. Because fluids were produced through production well 512A at earlier times, fluids in the formation tended to flow towards production well 512A as the fluids were mobilized and/or pyrolyzed in other sections of formation 2248. Fluid flow was largely due to vapor phase transport of fluids within formation 2248.

FIG. 350 depicts average temperature 2363 and average pressure 2364 in fifth section 2362. As shown in FIG. 350, pressure 2364 began to increase in fifth section 2362 after 360 days or when heat sources 508 in the fifth section were turned on. A maximum average pressure in fifth section remained below about 100 bars absolute around 800 days into the simulation. Pressure then began to decrease as fluids were mobilized within fifth section 2362 (i.e., the average temperature increased above about 100° C.). The average temperature increased at a relatively constant rate from about 360 days until the heat sources were turned off at 2200 days. The maximum average temperature in the fifth section was maintained below about 400° C.

FIG. 351 depicts oil production rate ($m^3$/day) versus time (days) as calculated in the simulation. As shown in FIG. 351, oil production slowly increases for approximately the first 1500 days and then increased rapidly after about 1500 days to a maximum of about 880 $m^3$/day at about 1785 days. After about 1785 days, production rate decreased as a majority of fluids are produced from formation 2248. The high production rate at about 1785 days may be due to a high rate of vapor phase transport in the formation following pyrolysis of hydrocarbons in the formation.

FIG. 352 depicts cumulative oil production ($m^3$) versus time (days) as calculated in the simulation. As shown in FIG. 352, a majority of cumulative oil production occurred between about 1000 days and about 2200 days.

FIG. 353 depicts gas production rate ($m^3$/day) versus time (days) as calculated in the simulation. As shown in FIG. 353, gas production slowly increases for approximately the first 1500 days and then increased rapidly after about 1500 days to a maximum of about 235000 $m^3$/day at about 1800 days. The maximum gas production rate occurred at a substantially similar time to the maximum oil production rate shown in FIG. 351. Thus, the maximum oil production rate may be primarily due to a high gas production rate.

FIG. 354 depicts cumulative gas production ($m^3$) versus time (days) as calculated in the simulation. As shown in FIG. 354, a majority of cumulative gas production occurred between about 1000 days and about 2200 days.

FIG. 355 depicts energy ratio (energy output in fluids versus energy input from heat sources) versus time (days) as calculated in the simulation. As shown in FIG. 355, the energy ratio increased during the first stage of heating as fluids are produced. After each successive stage of heating begins, there was an initial decrease in the energy ratio. The energy ratio, however, continued to increase overall as fluids were produced from the formation during later stages of heating.

FIG. 356 depicts average density (kg/$m^3$) of oil in the formation versus time (days). As shown in FIG. 356, the average density of oil in the formation begins to decrease as the formation is heated. The density most likely decreases due to increased generation of vapors as the formation is heated. After about 1800 days, most oil is in the vapor phase and the density remains relatively constant with time.

Formation fluid produced from a hydrocarbon containing formation during treatment may include a mixture of different components. To increase the economic value of products generated from the formation, formation fluid may be treated using a variety of treatment processes. Processes utilized to treat formation fluid may include distillation (e.g., atmospheric distillation, fractional distillation, and/or vacuum distillation), condensation (e.g., fractional), cracking (e.g., thermal cracking, catalytic cracking, fluid catalytic cracking, hydrocracking, residual hydrocracking, and/or steam cracking), reforming (e.g., thermal reforming, catalytic reforming, and/or hydrogen steam reforming), hydrogenation, coking, solvent extraction, solvent dewaxing, polymerization (e.g., catalytic polymerization and/or catalytic isomerization), visbreaking, alkylation, isomerization, deasphalting, hydrodesulfurization, catalytic dewaxing, desalting, extraction (e.g., of phenols, other aromatic compounds, etc.), and/or stripping.

Formation fluids may undergo treatment processes in a first in situ treatment area as the formation fluid is generated and produced, in a second in situ treatment area where a specific treatment process occurs, and/or in surface treatment units. A "surface treatment unit" is a unit used to treat at least a portion of formation fluid at the surface. Surface treatment units may include, but are not limited to, reactors (e.g., hydrotreating units, cracking units, ammonia generating units, fertilizer generating units, and/or oxidizing units), separation units (e.g., recovery units, air separation units, liquid-liquid extraction units, adsorption units, absorbers, ammonia recovery and/or generating units, vapor/liquid separation units, distillation columns, reactive distillation columns, and/or condensing units), reboiling units, heat exchange units, pumps, pipes, storage units, and/or energy producing units (e.g., fuel cells and/or gas turbines). Multiple surface treatment units used in series, in parallel, and/or in a combination of series and parallel are referred to as a treatment facility configuration. Treatment facility configurations may vary dramatically due to a composition of formation fluid as well as the products being generated.

Surface treatment configurations may be combined with treatment processes in various surface treatment systems to generate a multitude of products. Products generated at a site may vary with local and/or global market conditions, formation characteristics, proximity of formation to a purchaser, and/or available feedstocks. Generated products may be utilized on site, transferred to another site for use, and/or sold to a purchaser.

Feedstocks for surface treatment units may be generated in treatment areas and/or surface treatment units. A "feedstock" is a stream containing at least one component required for a treatment process. Feedstocks may include, but are not limited to, formation fluid, synthetic condensate, a gas stream, a water stream, a gas fraction, a light fraction, a middle fraction, a heavy fraction, bottoms, a naphtha fraction, a jet fuel fraction, a diesel fraction, and/or a fraction containing a specific component (e.g., heart fraction, phenols containing fraction, etc.). In some embodiments, feedstocks are hydrotreated prior to entering a surface treatment unit. For example, a hydrotreating unit used to hydrotreat a synthetic condensate may generate hydrogen sulfide to be utilized in the synthesis of a fertilizer such as ammonium sulfate. Alternatively, one or more components (e.g., heavy metals) may have been removed from formation fluids prior to entering the surface treatment unit.

In some embodiments, feedstocks for in situ treatment processes may be generated at the surface in surface treatment units. For example, a hydrogen stream may be separated from formation fluid in a surface treatment unit and then provided to an in situ treatment area to enhance generation of upgraded products. In addition, a feedstock may be injected into a treatment area to be stored for later use. Alternatively, storage of a feedstock may occur in storage units on the surface.

The composition of products generated may be altered by controlling conditions within a treatment area and/or within one or more surface treatment units. Conditions within the treatment area and/or one or more surface treatment units which affect product composition include, but are not limited to, average temperature, fluid pressure, partial pressure of $H_2$, temperature gradients, composition of formation material, heating rates, and composition of fluids entering the treatment area and/or the surface treatment unit. Many different treatment facility configurations exist for the synthesis and/or separation of specific components from formation fluid.

Formation fluid may be produced from a formation through a wellhead. As shown in FIG. 357, wellhead 1162 may separate formation fluid 2365 into gas stream 2366, liquid hydrocarbon condensate stream 1772, and water stream 1774. Alternatively, formation fluid may be produced from a formation through a wellhead and flow to a separation unit, where the formation fluid is separated into a gas stream, a liquid hydrocarbon condensate stream, and a water stream. A portion of the gas stream, the liquid hydrocarbon condensate stream, and/or the water stream may flow to one or more surface treatment units for use in a treatment process. Alternatively, a portion of the gas stream, the liquid hydrocarbon condensate stream, and/or the water stream may be provided to one or more treatment areas.

In some embodiments, formation fluid may flow directly from the formation to a surface treatment unit to be treated. An advantage of treating formation fluid before separation may be a reduction in the number of surface treatment units required. Reducing the number of surface treatment units may result in decreased capital and/or operating expenses for a treatment system for formations.

Formation fluid may exit the formation at a temperature in excess of about 300° C. Utilizing thermal energy within the formation fluid may reduce an amount of energy required by the treatment system. In certain embodiments, formation fluid produced at an elevated temperature may be provided to one or more surface treatment units. Formation fluid may enter the surface treatment unit at a temperature greater than about 250° C., 275° C., 300° C., 325° C., or 350° C. Alternatively, thermal energy from formation fluid may be transferred to other fluids utilized by the treatment facility configuration and/or the in situ treatment process.

As shown in FIG. 358, formation fluid 2365 produced from wellhead 1162 may flow to heat exchange unit 2368. Heat exchange fluid 2370 may flow into heat exchange unit 2368. Thermal energy from formation fluid 2365 may be transferred to heat exchange fluid 2370 in heat exchange unit 2368 to generate heated fluid 2372 and cooled formation fluid 2374. Heat exchange fluid 2370 may include any fluid stream produced from a formation (e.g., formation fluid, pyrolysis fluid, water, and/or synthesis gas), and/or any fluid stream generated and/or separated out within a surface treatment unit (e.g., water stream, light fraction, middle fraction, heavy fraction, hydrotreated liquid hydrocarbon condensate stream, jet fuel stream, etc.).

In some in situ conversion process embodiments, a heat exchange unit may be used to increase a temperature of the formation fluid and decrease a temperature of the heat exchange fluid to generate a cooled fluid and a heated formation fluid. For example, pyrolysis fluids may be produced from a first treatment area at a temperature of about 300° C. Synthesis gas may be produced from a second treatment area at a temperature of about 600° C. The pyrolysis fluids and synthesis gas may flow in separate conduits to distant surface treatment units. Heat loss may cause the pyrolysis fluids to condense before reaching a distant surface treatment unit for treatment. Various configurations of conduits, known in the art, may be used to form a heat exchange unit to transfer thermal energy from the synthesis gas to the pyrolysis fluids to decrease, or prevent, condensation of the pyrolysis fluids.

In conventional treatment processes, hydrocarbon fluids produced from a formation may be separated into at least two streams, including a gas stream and a synthetic condensate stream. The gas stream may contain one or more components and may be further separated into component streams using one or more surface treatment units. The liquid hydrocarbon condensate stream, or synthetic condensate stream, may contain one or more components that are separated using one or more surface treatment units. In some embodiments, formation fluid may be partially cooled to enhance separation of specific components. For example, formation fluid may flow to a heat exchange unit to reduce a temperature of the formation fluid. Then, the formation fluid may be provided to a separation unit such as a distillation column and/or a condensing unit.

Formation fluid may be hydrotreated prior to separation into a gas stream and a liquid hydrocarbon condensate stream. Alternatively, the gas stream and/or the liquid hydrocarbon condensate stream may be hydrotreated in separate hydrotreating units prior to further separation into component streams. "Synthetic condensate" is the liquid component of formation fluid that condenses.

In an embodiment, synthetic condensate 2377 flows to treatment facilities, as shown in FIG. 359. Synthetic condensate 2377 may be separated into several fractions in fractionator 2378. In some embodiments, synthetic condensate stream 2377 is separated into four fractions. Light fraction 2380, middle fraction 2382, and heavy fraction 2384 may flow to hydrotreating units 1830A, 1830B, 1830C. Hydrotreating units 1830A, 1830B, 1830C may upgrade hydrocarbons within fractions 2380, 2382, and 2384 to form light fraction 2386, middle fraction 2388, and/or heavy fraction 2390. In addition, bottoms fraction 2392 may be generated. Bottoms fraction 2392 may flow to an in situ treatment area or a treatment facility for further processing. In some embodiments, the use of a synthetic condensate stream from which sulfur containing compounds have been removed, for example, by hydrotreating or a liquid-liquid extraction process, may increase an effective life of the hydrotreating units.

In an in situ conversion process embodiment, a fractionation unit may separate a feedstock into a light fraction, a heart cut, a middle cut, and/or a heavy fraction. The composition of the heart cut may be controlled by removing fluid for the heart cut at a point in the fractionator having a given temperature. After the heart cut has been separated, the heart cut may flow to one or more surface treatment units including, but not limited to, a hydrotreater, a reformer, a cracking unit, and/or a component recovery unit. For example, when a naphthalene fraction is desired, a heart cut may be taken from a point in the fractionator resulting in production of a stream having an atmospheric pressure true boiling point temperature greater than about 210° C. to less than about 230° C. This may correspond to the boiling point range for naphthalene. Components that can be separated from a synthetic condensate in a "heart cut" may include, but are not limited to, mono-aromatic hydrocarbons (e.g., benzene, toluene, ethyl benzene, and/or xylene), naphthalene, anthracene, and/or phenols.

Temperatures at which components are separated from the formation fluid during distillation or condensation may be affected by the concentration of water (e.g., steam) in the formation fluid. Steam may be present in the formation fluid in varying concentrations, due to varying water contents of formations and variations in steam generation during treatment. In some embodiments, a steam content of formation fluid may be measured as the formation fluid is produced. The steam content may be used to adjust one or more operating conditions in separation units to enhance separation of fractions.

Formation fluid may flow to one or more distillation columns positioned in series to remove one or more fractions in succession. The one or more fractions from the fluids may be used in one or more surface treatment units. "Serial fractional separation" is the removal of two or more fractions from formation fluid in series. Some of the formation fluid flows to two or more separation units in series, and each separation unit may remove one or more components from the formation fluid. For example, formation fluid may be separated into a gas stream and a synthetic condensate. A "naphtha cut" may be separated from the synthetic condensate. The "naphtha cut" may be further separated into a "phenols cut." Separating successively smaller cuts from the formation fluid may allow the subsequent treatment units to be smaller and less costly, since only a portion of the formation fluid needs to be treated to produce a specific product. In addition, molecular hydrogen may be separated for use in one or more of the upstream or downstream processes.

FIG. 360 depicts a serial fractional system. Synthetic condensate 2377 may flow to separation unit 2394, where it is separated into two or more fractions: light fraction 2396 and heavy fraction 2398. Light fraction 2396 may flow to heat exchange unit 2400 to generate cooled light fraction 2402, which is separated into light fraction 2404 in separation unit 2406. Heat exchange unit 2408 may remove thermal energy from light fraction 2404 to cooled light fraction 2409, which then flows to separation unit 2410. Naphtha fraction 2414 may be separated from cooled light fraction 2409. Naphtha fraction 2414 may be further separated into olefin generating compound fraction 2416 in separation unit 2418 after being cooled in heat exchange unit 2420 to form cooled naphtha fraction 2422. Olefin generating compound fraction 2416 may flow to an olefin generating unit to be converted to olefins. Fractions 2398, 2424, 2426, 2428 may flow to one or more surface treatment units and/or in situ treatment areas for additional treatment. Extracting thermal energy from fractions 2396, 2404, 2414, and/or 2416 may increase an energy efficiency of the process by utilizing the heat in the fluids. In some embodiments, light fractions (e.g., light fraction 2396, light fraction 2404, and/or naphtha fraction 2414) may be heated in heat exchanging units 2400, 2408, 2420 prior to entering the one or more separation units.

FIG. 361 depicts a portion of a treatment facility embodiment used to treat bottoms 2462. Some of heavy fractions 2398, 2424, 2426, 2428 removed from separation units 2394, 2406, 2410, 2418 may flow to reboilers 2430, 2432, 2434, 2436. Recycle streams 2438, 2440, 2442, 2444 may flow from reboilers 2430, 2432, 2434, 2436 to separation units 2394, 2406, 2410, 2418 for further upgrading. In some embodiments, steam may be provided to heavy fractions 2398, 2424, 2426, 2428 to form recycle streams. In some embodiments, a separation system for treating formation fluid may include a combination of heat exchange units, reboilers, and/or the injection of steam.

In certain treatment facility embodiments, catalysts may be used in separation units to upgrade hydrocarbons in formation fluid as the hydrocarbons are being separated into the various fractions. In some embodiments, reactive separation units may contain catalysts that enhance hydrocarbon upgrading through hydrotreating. Molecular hydrogen present in the feedstock may be sufficient to hydrotreat hydrocarbons within the feedstock. In some embodiments, molecular hydrogen may be provided to a feedstock entering a reactive separation unit or to the reactive separation unit to enhance hydrogenation.

Reactive distillation columns may be used to treat a synthetic condensate such as synthetic condensate and/or hydrotreated synthetic condensate in some embodiments. A reactive distillation column may contain a catalyst to increase hydrotreating of hydrocarbons in fluids passing through the reactive distillation column. In certain embodiments, the catalyst may be a conventional catalyst such as metal on an alumina substrate.

As illustrated in FIG. 362, multiple distillation columns 2446, 2448, 2482, 2452 may be used to separate synthetic condensate 2377 into fractions. Distillation columns 2446, 2448, 2482, 2452 may contain catalyst 2454, which enables hydrocarbons within synthetic condensate 2377 to be upgraded within distillation columns 2446, 2448, 2482, 2452 through hydrotreating. Molecular hydrogen stream 1780 may be added to distillation columns 2446, 2448, 2482, 2452 to enhance hydrotreating of hydrocarbons within synthetic condensate stream 2377 in distillation columns 2446, 2448, 2482, 2452. Molecular hydrogen stream 1780 may come from surface treatment units and/or produced formation fluids. Fractions removed from distillation column 2446 may include light fraction 2456, middle fraction 2458, heavy fraction 2460, and bottoms 2462.

In an embodiment, light fraction 2456 flows to separation unit 2465 that separates light fraction 2456 into gaseous stream 2464, light fraction 2466, and recycle stream 2468. Light fraction 2466 may flow to reactive distillation column 2448 to be separated and upgraded. In distillation column 2448, light fraction 2466 may be converted into light fraction 2467. A portion of light fraction 2467 may flow to reboiler 2470 and then flow to distillation column 2448 as recycle stream 2472. Light stream 2534 may flow to a surface treatment unit such as a reforming unit, an olefin generating unit, a cracking unit, and/or a separation unit. The reforming unit may alter light stream 2534 to generate aromatics and hydrogen. Alternatively, light stream 2534 may be used to generate various types of fuel (e.g., gasoline). Light stream 2534 may, in certain embodiments, be blended with other hydrocarbon fluids to increase a value and/or a mobility of the hydrocarbon fluids. In some embodiments, light stream 2534 may be a naphtha stream.

In some embodiments, middle fraction 2458 flows into reactive distillation column 2482. Middle fraction 2458 may be converted into middle fraction 2476 and recycle stream 2478 in reactive distillation column 2482. Recycle stream 2478 may flow into distillation column 2446. A portion of middle fraction 2476 may flow into reboiler unit 2480 to be vaporized and enter distillation column 2482 as recycle stream 2484. Middle stream 2486 may be provided to a market and/or flow to a surface treatment unit for further treatment.

Heavy fraction 2460 may flow into distillation column 2452. Heavy fraction 2488 and recycle stream 2490 may be generated in reactive distillation column 2452. Recycle stream 2490 may flow into distillation column 2446. A portion of heavy fraction 2488 may flow into reboiler unit 2492 to be vaporized and enters distillation column 2452 as recycle stream 2494. Heavy stream 2496 may be provided to a market and/or flow to a surface treatment unit and/or in situ treatment area for further treatment.

Bottoms fraction 2462 may be removed from distillation column 2446. A portion of bottoms fraction 2462 may be vaporized in reboiler unit 2498 and enter distillation column 2446 as recycle stream 2500. Bottoms stream 2502 may be cooled in heat exchange units. In certain embodiments, a portion of a bottoms fraction may be used as a feedstock for an olefin plant and/or an in situ treatment area. In some embodiments, a portion of a bottoms fraction may flow to a hydrocracking unit to form a transportation fuel stream.

In some embodiments, formation fluid produced from the ground may be partially cooled to recover thermal energy from the fluid. In addition, formation fluid may be cooled to a temperature at which a desired component is removed from the formation fluid. Heat exchanging units may remove thermal energy from the formation fluid such that a temperature within the formation fluid is reduced to a temperature at which one or more components are separated from formation fluid. Formation fluid may be provided to a distillation column where the formation fluid is further separated into a liquid stream and a vapor stream. The vapor stream may be provided to a heat exchanging unit to remove thermal energy from the vapor stream. The vapor stream may be further separated in a distillation column. In some embodiments, multiple distillation columns may be arranged to separate the vapor stream into one or more fractions.

In some embodiments, formation fluid 2365 flows into condensing unit 2504 as shown in FIG. 363. Condensing unit 2504 may separate formation fluid 2365 into gas fraction 2506, light fraction 2508, heavy fraction 2510, and/or heart cut 2512. Gas fraction 2506, light fraction 2508, heavy fraction 2510, and/or heart cut 2512 may flow to a surface treatment unit for additional treatment.

An example of a treatment facility configuration for treating formation fluid is illustrated in FIG. 364. Formation fluid 2365 may be produced through wellhead 1162 and cooled in one or more heat exchange units 2514. Cooled formation fluid 2516 may be condensed in condensing unit 2504 to form condensed formation fluid 2518. Condensed formation fluid 2518 may be separated in processing unit 2520 into gas stream 2522 and synthetic condensate 2377. Gas stream 2522 may be compressed and separated in compressor 1408 into gas stream 2524 and hydrocarbon containing fluids 2526. Hydrocarbon containing fluids 2526 may be heated in heater 2528. Heated hydrocarbon containing fluids 2530 may be separated into gas stream 2532 and light stream 2534 in processing unit 2536. Gas stream 2524 and gas stream 2532 may flow into expander 2538. Expander 2538 allows fluids within gas stream 2524 and gas stream 2532 to expand into light off-gas 2540.

In an embodiment, synthetic condensate stream 2377 is pumped to hydrotreating unit 1830 to be hydrotreated. Hydrotreated synthetic condensate stream 2542 may flow through heat exchange units 2514 to be heated. Heated and hydrotreated synthetic condensate stream 2544 may be separated into a mixture of non-condensable hydrocarbons 2546 and hydrocarbon containing fluid 2548 in processing unit 2550. Hydrocarbon containing fluid 2548 may be pumped through heat exchange units 2514 to form heated hydrocarbon containing fluid 2552. Heated hydrocarbon containing fluid 2552 may be further heated in heating unit 2554 to form heated hydrocarbon containing fluid 2556. Heated hydrocarbon containing fluid 2556 and non-condensable hydrocarbons 2546 may be distilled in distillation column 2558 to form light fraction 2380, middle fraction 2382, heavy fraction 2384, and bottoms 2560. Light fraction 2380 may be cooled in heat exchange unit 2562. Cooled light fraction 2561 may be separated into heavy off-gas 2564, water stream 2566, and hydrocarbon condensate stream 2568 in process unit 2570. Hydrocarbon condensate stream 2568 may be split into at least two streams, including recycle stream 2572 and light fraction 2573. Light fraction 2573 may be added to light stream 2534. Olefins may be generated from light stream 2534 in a reforming unit. Alternatively, light stream 2534 may be used to generate various types of fuel. Light stream 2534, in certain embodiments, may be blended with other hydrocarbon fluids to increase a value and/or a mobility of the hydrocarbon fluids.

In some embodiments, middle fraction 2382 flows to distillation column 2574. Recycle stream 2576 and middle fraction 2580 may be generated in distillation column 2574. Recycle stream 2576 may flow to distillation column 2558. Reboiler 2578 may separate middle fraction 2580 into recycle stream 2582 and hot middle fraction 2584. Recycle stream 2582 flows to distillation column 2574. Hot middle fraction 2584 may be cooled in heat exchange unit 2586 to form cooled middle fraction 2588. In addition, cooled middle fraction 2588 may flow into a condensing unit to form a middle stream. Alternatively, hot middle fraction 2584 may flow directly from reboiler 2578 to a condensing unit to form a middle stream.

In an embodiment, distillation column 2590 separates heavy fraction 2384 into recycle stream 2592 and heavy fraction 2595. Recycle stream 2592 may flow to distillation column 2558. Heavy fraction 2595 may flow to reboiler 2594. Reboiler 2594 may separate heavy fraction 2595 into recycle stream 2596 and heated heavy fraction 2598. Heated heavy fraction 2598 may be cooled in heat exchange unit 2600 to form cooled heavy fraction 2602. In some embodiments, cooled heavy fraction 2602 may flow into a condensing unit. Alternatively, heavy fraction 2598 may flow from reboiler 2594 to a condensing unit to form a heavy stream.

In certain embodiments, bottoms fraction 2560 is removed from distillation column 2558 and is cooled in heat exchange unit 2604 to form cooled bottoms fraction 2606. In some embodiments, cooled bottoms fraction 2606 may flow into a condensing unit to form a condensate. Alternatively, bottoms fraction 2560 may flow directly from distillation column 2558 to a condensing unit.

In some embodiments, distillation columns 2558, 2574, and/or 2590 may contain catalysts to upgrade hydrocarbons. The catalysts may be hydrotreating and/or cracking catalysts. In some embodiments, an additional molecular hydrogen stream may be added to distillation columns 2558, 2574, and/or 2590 that contain such catalysts.

Formation fluid may contain substances that compromise surface treatment units by altering catalytic surfaces and/or by causing corrosion. Many surface treatment units may require the removal of these substances prior to treatment in the surface treatment unit. Components in formation fluid that may affect a life span and/or efficiency of the surface treatment unit include heteroatoms (e.g., nitrogen, sulfur, and water). For example, water decreases the catalytic ability of conventional hydrotreating catalysts. In some embodiments, use of a conventional hydrotreating unit may require separation of water from formation fluid prior to treatment. In addition, sulfur containing compounds may cause corrosion of a surface treatment unit and decrease the catalytic ability of certain catalysts used in the surface treatment unit. Removal of sulfur containing compounds from formation fluid may increase the value of produced fluid and permit processing of the lower sulfur material in process units not designed for untreated produced fluid.

Components that foul or corrode surface treatment units may be removed using a variety of methods including, but not limited to, hydrotreating, solvent extraction, a desalting process, and/or electrostatic precipitation. In some embodiments, a portion of the water present in formation fluid may be removed from formation fluid as the formation fluid is separated into a gas stream and a liquid hydrocarbon condensate stream.

In some embodiments, a desalting process may reduce salts in formation fluid and/or any water or fluid separated in a surface treatment unit. The desalting process may include, but is not limited to, chemical separation, electrostatic separation, and/or filtration of water/fluid through a porous structure (e.g., water or fluid may be filtered through diatomaceous earth).

Heteroatoms may also be removed from formation fluid using an extraction process. Solvents may include, but are not limited to, acetic acid, sulfuric acid, and/or formic acid. Heteroatoms in acidic form, such as phenols and some sulfur compounds, may be removed by extraction with basic solutions (e.g., caustic or aqueous ammonia). Extraction may vary with a temperature of formation fluid and/or solvent, a solvent to oil ratio, and/or an acid strength of the acidic solvents. An effective solvent may be characterized by features including, but not limited to, inhibition of emulsion formation, immiscibility with feedstock, rapid phase separation, and/or high capacity. Removal of nitrogen containing components by an extraction process may decrease hydrogen uptake and the hydrotreating severity required in subsequent hydrotreating units, thereby reducing operating and capital costs.

Enactment of more stringent regulatory standards for sulfur in hydrocarbon containing products may require a higher severity to remove sulfur from the products. In some circumstances, sulfur may be removed from formation fluid prior to separating the fluid into streams to facilitate removal of a maximum amount of sulfur. Similarly, formation fluid may be hydrotreated prior to separation into streams to decrease an overall cost of processing formation fluid. Subsequent sulfur removal and/or hydrotreating may further improve the quality of hydrocarbon fluids produced from the formation fluid.

Conventional refiners may not handle high concentrations of heteroatoms in fluid fractions (e.g., naphtha, jet, and diesel). Hydrotreating may produce a product that would be acceptable to a refiner. Another approach, or a complementary approach, may be to optimize the combination of the in situ conversion process conditions and surface hydrotreating processes to obtain the highest product value mix at the lowest total cost. For example, one in situ conversion process change that may improve properties of the liquid formation fluid is the use of backpressure on the formation during the heating process. Maintaining a fluid pressure by adjusting the backpressure may produce a much lighter and more hydrogen rich product.

Hydrotreating a fluid may alter many properties of the fluid. Hydrotreating may increase the hydrogen content of the hydrocarbons within the fluid and/or the volume of fluid. In addition, hydrotreating may reduce a content of heteroatoms such as oxygen, nitrogen, or sulfur in the fluid. For example, nitrogen removed from the fluid during hydrotreating may be converted into ammonia. Removed sulfur may be converted into hydrogen sulfide. Feedstocks for hydrotreating units may include, but are not limited to, formation fluid and/or any fluid generated or separated in a surface treatment unit (e.g., synthetic condensate, light fraction, middle fraction, heavy fraction, bottoms, heart cut, pyrolysis gasoline, and/or molecular hydrogen generated at an olefin generating plant).

Olefins may be present in formation fluid as a result of in situ treatment processes. In some embodiments, olefin generating compounds may be produced in formation fluid. "Olefin generating compounds" are hydrocarbons having a carbon number equal to and/or greater than 2 and less than 30 (e.g., carbon numbers from 2 to 7). These olefin generating compounds may be converted into olefins, such as ethylene and propylene. Process conditions during treatment within a treatment area of a formation may be controlled to increase, or even to maximize, production of olefins and/or olefin generating compounds within the formation fluid.

In an embodiment, olefins and/or olefin generating compounds produced in the formation fluid may be separated from the formation fluid using one or more treatment facility configurations. Separation of olefins and/or olefin generating compounds from formation fluid may occur in, but is not limited to, a gas treating unit, a distillation unit, and/or a condensing unit. Olefin generating compounds may be separated from formation fluid to form an olefin feedstock used to generate olefins.

Olefin feedstocks may include formation fluid, synthetic condensate, a naphtha stream, a heart cut (e.g., a stream containing hydrocarbons having carbon number from two to seven), a propane stream, and/or an ethane stream. For example, formation fluid may be separated into a liquid stream (e.g., synthetic condensate) and a gas stream. The gas stream may be further separated into four or more fractions. The fractions may include, but are not limited to, a methane fraction, a molecular hydrogen fraction, a gas fraction, and an olefin generating compound fraction. In some embodiments, olefin feedstocks may have been hydrotreated and/or have had one or more components (e.g., arsenic, lead, mercury, etc.) removed prior to entering the olefin generating unit.

Many different treatment facility configurations may produce olefins from an olefin feedstock. The particular configuration utilized for synthesis of olefins may depend on a type of formation treated, a composition of formation fluid, and/or treatment process conditions used in situ such as a temperature, a pressure, a partial pressure of $H_2$, and/or a rate of heating.

Conversion of formation fluid and/or olefin generating compounds to olefins occurs when hydrocarbons in formation fluid are heated rapidly to cracking temperatures and then quenched rapidly to inhibit secondary reactions (e.g., recombination of hydrogen with olefins). Prolonged heating may result in the production of coke and, thus, quenching the reaction is vital to enhancing olefin generation. A temperature required for olefin generation may be greater than about 800° C. Formation fluid may exit the formation at a temperature greater than about 200° C. In certain embodiments, formation fluid may be produced from wells containing a heat source such that a temperature of at least a portion of the formation fluid is about 700° C. Therefore, additional heating may be required for generation of olefins. Formation fluid may flow to an olefin generating unit where fluid is initially heated and then cooled to quench the reaction to enhance production of olefins.

FIG. 365 depicts an embodiment of treatment facility units used to generate olefins from an olefin feedstock that contains olefin generating compounds. The hydrogen content of hydrocarbons within formation fluid may be increased to greater than about 12 weight % by controlling one or more conditions within a treatment area from which formation fluid 2365 is produced. For example, maintaining a pressure greater than about 7 bars (100 psig) and a temperature less than about 375° C. within a treatment area may generate formation fluid having hydrocarbons with a hydrogen content greater than about 12 weight %. A hydrogen content of greater than 12 weight % in the hydrocarbons of formation fluid may decrease the content of heavy hydrocarbons and/or undesirable compounds in the formation fluid produced.

In an embodiment, formation fluid 2365 (e.g., formation fluid having hydrocarbons with a hydrogen content greater than about 12%) flows directly from wellhead 1162 into olefin generating unit 2608 to be converted to olefin stream 2610. In some embodiments, the olefin generating unit may be a steam cracker. Formation fluid 2365 may flow into olefin generating unit 2608 at a temperature greater than about 300° C. in certain embodiments. Thermal energy within the formation fluid may be utilized in the generation of olefins from the olefin generating compounds. In an embodiment, formation fluid may contain steam. Steam in formation fluid may be utilized in the generation of olefins. A portion of the steam required for the generation of olefins in an olefin generating unit may be provided by steam present in formation fluid.

Alternatively, formation fluid may flow to a component removal unit prior to an olefin generating unit. In certain embodiments, formation fluid may include components containing small amounts of heavy metals such as arsenic, lead, and/or mercury. As depicted in FIG. 366, treatment unit 2612 may separate formation fluid 2365 into two component streams (e.g., streams 2614, 2616) and hydrocarbon containing fluids 2618. Component streams 2614, 2616 may include a single component or a mixture of multiple components. For example, treatment unit 2612 may remove heavy metals in streams 2614, 2616. Hydrocarbon containing fluids 2618 may flow to olefin generating unit 2608 to be converted to olefin stream 2610. Olefin stream 2610 may include, but is not limited to, ethylene, propylene, and/or butylene.

Molecular hydrogen within an olefin feedstock may be removed from the olefin feedstock prior to the feedstock being provided to an olefin generating unit in some embodiments. In some embodiments, formation fluid may flow to a hydrotreating unit prior to flowing to an olefin generating unit to convert at least a portion of the olefin generating compounds into olefins.

In an olefin generating unit, a portion of the formation fluid may be converted into compounds which may include, but are not limited to, olefins, molecular hydrogen, pyrolysis gasoline that contains BTEX compounds (benzene, toluene, ethylbenzene and/or xylene), pyrolysis pitch, and/or butadiene. In some embodiments, the molecular hydrogen generated in the olefin generating unit may flow to a hydrotreating unit to hydrotreat fluids. For example, a portion of the generated molecular hydrogen may be used to hydrotreat pyrolysis gasoline and/or pyrolysis pitch generated in the olefin generating unit. Alternatively, a portion of the generated molecular hydrogen may be provided to an in situ treatment area.

In some embodiments, a portion of fluid generated in an olefin generating unit may flow to one or more extraction units to remove components such as butadiene and/or BTEX compounds. In some embodiments, pyrolysis gasoline generated in an olefin generating unit may have a high BTEX content. Pyrolysis gasoline may, in certain embodiments, be provided to a surface treatment unit to remove the BTEX compounds. In some embodiments, pyrolysis pitch may be used as a fuel. Alternatively, pyrolysis pitch may be provided to an in situ treatment area for additional processing.

A steam cracking unit may be utilized as an olefin generating unit as depicted in FIG. 367. Steam cracking unit 2620 may include heating unit 2622 and quenching unit 2624. Olefin feedstock 2626 entering heating unit 2622 may be heated to a temperature greater than about 800° C. Fluid 2628 may flow to quenching unit 2624 to rapidly quench and compress fluid 2628. Fluid 2630 exiting quenching unit 2624 may include one or more olefin compounds, molecular hydrogen, and/or BTEX compounds. The olefin compounds may include, but are not limited to, ethylene, propylene, and/or butylene. In certain embodiments, fluid 2630 may flow to a separation unit. The components within fluid 2630 may be separated into component streams in the separation unit. The component streams may be sold, transported to a different facility, stored for later use, and/or utilized on site in treatment areas or in surface treatment units.

Ammonia may be generated during an in situ conversion process. In situ ammonia may be generated during a pyrolysis stage from some of the nitrogen present in hydrocarbon material. Hydrogen sulfide may also be produced within the formation from some of the sulfur present in the hydrocarbon containing material. The ammonia and hydrogen sulfide generated in situ may be dissolved in water condensed from the formation fluids.

FIG. 368 depicts a configuration of surface treatment units that may separate ammonia and hydrogen sulfide from water produced in the formation. Formation fluid 2365 may be separated at wellhead 1162 into gas stream 2366, synthetic condensate 2377, and water stream 1774. Gas treating unit 1796 may separate gas stream 2366 into gas mixture 2632, light hydrocarbon mixture 2634, and/or hydrogen fraction 2636. Gas mixture 2632 may include, but is not limited to, hydrogen sulfide, carbon dioxide, and/or ammonia. Gas mixture 2632 may be blended with water stream 1774 to form aqueous mixture 2638. Aqueous mixture 2638 may flow to stripping unit 2640, where aqueous mixture 2638 is separated into ammonia stream 2642 and aqueous mixture 2644. Aqueous mixture 2644 may flow to stripping unit 2646 to be separated into hydrogen sulfide stream 1778 and water stream 2648. Ammonia stream 2642 may be stored as an aqueous solution or in anhydrous form. Alternately, ammonia stream 2642 may be provided to surface treatment units requiring ammonia, such as a urea synthesis unit or an ammonium sulfate synthesis unit.

In some embodiments, ammonia may be formed from nitrogen present in hydrocarbons when fluids are being hydrotreated. The generated ammonia may also be separated from other components, as illustrated in FIG. 369. Synthetic condensate 2377 may flow to hydrotreating unit 1830 to form ammonia containing stream 2650 and hydrotreated synthetic condensate 2652. Ammonia containing stream 2650 may be blended with water stream 1774 and gas mixture 2632 prior to entering stripping unit 2640 as aqueous mixture 2654.

Alternatively, fluid containing small amounts or concentrations of ammonia may flow to Claus treatment unit 2656 for treatment, as depicted in FIG. 370. Wellhead 1162 may separate formation fluid 2365 into gas stream 2366, synthetic condensate 2377, and water stream 1774. Gas treating unit 1796 may further separate gas stream 2366 into gas mixture 2632, light hydrocarbon mixture 2634, and/or hydrogen fraction 2636. Water stream 1774 and gas mixture 2632 may be blended to form aqueous mixture 2638. Claus treatment unit 2656 may reduce ammonia in aqueous mixture 2638 to form fluid stream 2658. Recovered sulfur may exit Claus treatment unit 2656 as sulfur stream 2660 and be utilized in any process that requires sulfur, either in treatment facilities or treatment areas. In some embodiments, Claus treatment unit 2656 may also generate a carbon dioxide stream. The carbon dioxide may be utilized in a urea synthesis unit. Alternatively, carbon dioxide may be provided to an in situ treatment area for sequestration.

If a hydrotreating unit is used, then at least a portion of the sulfur in the stream entering the hydrotreating unit may be converted to hydrogen sulfide. In some embodiments, hydrogen sulfide may be used to make fertilizer, sulfuric acid, and/or converted to sulfur in a Claus treatment unit. Similarly, some nitrogen in the stream entering the hydrotreating unit may be converted to ammonia, which may also be recovered for sale and/or use in processes.

In some embodiments, ammonia may be generated on site in surface treatment units using an ammonia synthesis process as shown in FIG. 371. Air stream 1620 may flow to air separation unit 2662 to separate nitrogen stream 1540 and stream 2664 from air stream 1620. Nitrogen stream 1540 may be heated with heat exchange unit 2514 to form heated nitrogen feedstock 2666 prior to flowing into ammonia generating unit 2668. Hydrogen feedstock 2670 may flow to ammonia generating unit 2668 to react with nitrogen stream 1540 to form ammonia stream 2642. Ammonia generated during in situ or surface treatment processes may be stored in an aqueous solution or as anhydrous ammonia. In some instances, ammonia in either form may be sold commercially. Alternatively, ammonia may be used on site to generate a number of different products that have commercial value (e.g., fertilizers such as ammonium sulfate and/or urea). Production of fertilizer may increase the economic viability of a treatment system used to treat a formation. Precursors for fertilizer production may be produced in situ or while treating formation fluid at treatment facilities.

Ammonia and carbon dioxide generated during treatment either in situ or at a surface treating unit may be used to generate urea for use as a fertilizer, as illustrated in FIG. 372. Ammonia stream 2642 and carbon dioxide stream 1776 may react in urea generating unit 2672 to form urea stream 2674.

As illustrated in FIG. 373, ammonium sulfate may be generated by treating formation fluid in a surface treatment unit. Wellhead 1162 may separate formation fluid 2365 into a mixture of non-condensable hydrocarbon fluids 2676 and synthetic condensate 2377. Separation unit 2680 may be used to separate non-condensable hydrocarbon fluids 2676 into hydrogen stream 1780, hydrogen sulfide stream 2682, methane stream 2684, carbon dioxide stream 1776, and non-condensable hydrocarbon fluids 2686.

Hydrogen sulfide stream 2682 may flow to oxidation unit 2688 to be converted to sulfuric acid stream 2690. Additional hydrogen sulfide may, in certain embodiments, be provided to oxidation unit 2688 from hydrogen sulfide stream 2692. In some embodiments, hydrogen sulfide stream 2692 may be provided from a hydrotreating unit. The hydrotreating unit may be a treatment facility in a different section of a treatment system or part of a different configuration of a treatment system.

Air separation unit 2662 may be used to separate nitrogen stream 1540 and stream 2664 from air stream 1620. Heat exchange unit 2514 may heat nitrogen stream 1540 to form heated nitrogen feedstock 2666. Hydrogen stream 1780 and heated nitrogen feedstock 2666 may flow to ammonia generating unit 2668 to form ammonia stream 2642. In some embodiments, additional hydrogen may be provided to ammonia generating unit 2668. In some embodiments, a portion of hydrogen stream 1780 may flow to an in situ treatment area and/or a surface treatment facility. In certain embodiments, process ammonia 2694, produced in formation fluid and/or generated in surface treatment units, is added to ammonia stream 2642 to form ammonia feedstock 2696.

Ammonia feedstock 2696 and sulfuric acid stream 2690 may flow into fertilizer synthesis unit 2698 to produce ammonium sulfate stream 2700. Alternatively, a portion of sulfuric acid produced in an oxidation unit may be sold commercially.

In some embodiments, ammonia produced during treatment of a formation may be used to generate ammonium carbonate, ammonium bicarbonate, ammonium carbamate, and/or urea. Separated ammonia may be provided to a stream containing carbon dioxide (e.g., synthesis gas and/or carbon dioxide separated from formation fluid) such that the separated ammonia reacts with carbon dioxide in the stream to generate ammonium carbonate, ammonium bicarbonate, ammonium carbamate, and/or urea. Utilization of separated ammonia in this manner may reduce carbon dioxide emissions from a treatment process. Ammonium carbonate, ammonium bicarbonate, ammonium carbamate, and/or urea may be commercially marketed to a local market for use (e.g., as a fertilizer or a material to make fertilizer). Ammonium carbonate, ammonium bicarbonate, ammonium carbamate, and/or urea may capture or sequester carbon dioxide in geologic formations.

In some embodiments, formation fluid may include a significant amount of phenols. The amount of phenols produced from a formation depends on the amount of oxygenated aromatic hydrocarbons in the kerogenous materials in the formation. "Phenols" refers to aromatic rings with an attached OH group, including substituted aromatic rings such as cresol, xylenol, etc. The amount of phenols in produced formation fluid may depend on operating conditions in the formation (e.g., formation heating rate, temperature gradients in the formation, fluid pressure in the formation, partial pressure of molecular hydrogen in the formation, and/or an average temperature within the formation). Controlling one or more of these conditions may affect the carbon distribution in the formation fluid. As an average carbon distribution is lowered, a fraction having a carbon number greater than or equal to 6 and a carbon number less than or equal to 8 may increase. This fraction may correlate to the phenols fraction in the formation fluid.

In an embodiment, a method for treating a hydrocarbon containing formation in situ may include controlling a pressure of a selected section of the formation and/or the hydrogen partial pressure in the selected section of the formation such that production of phenols from the selected section is increased. For example, the amount of phenols tends to decrease as the pressure of the formation is increased and vice versa. The partial pressure of hydrogen in the formation may be changed by adding hydrogen to the formation or by adding a compound such as steam to the formation.

In certain embodiments, when the pressure (or partial pressure of hydrogen) is increased, the production of phenol may also increase while the production of all phenols decreases. It is believed that some of the substituted groups from substituted aromatic rings (such as cresol, xylenol, etc.) may be replaced with hydrogen under higher pressures. In some embodiments, a temperature and/or a heating rate may be controlled to increase the production of phenols from a selected section of the formation. The production of phenols may be increased such that a weight percentage of phenols in a mixture produced from the selected section is greater than about 30 weight % in the produced condensable hydrocarbon liquids (in certain types of coal). In certain embodiments, the weight percentage of produced phenols from coal formations tends to be between about 10-40 weight % of the produced condensable hydrocarbon liquids as the vitrinite reflectance of the formation varies from about 1.1 to about 0.3. For example, in high volatile bituminous A coal the weight percentage of produced phenols tends to be about 10-15 weight % in the produced condensable hydrocarbon liquids, and for sub-bituminous C coal the weight percent of produced phenols tends to be about 35-40 weight % in the produced condensable hydrocarbon liquids. Although the weight percent of phenols varies between different types of coal, the total amount of phenols produced tends to remain relatively constant since the amount of liquids produced tends to increase as the weight percent of phenols in the liquids decreased.

Extraction of phenols from a hydrocarbon containing formation may increase the economic viability of an in situ treatment system. Separating phenols from formation fluid may increase the total value of generated products. Phenols in a relatively concentrated form may have a higher economic value than phenols as a component in formation fluid. In addition, removing phenols from formation fluid may reduce the cost of hydrotreating by reducing hydrogen consumption (i.e., transforming oxygen and hydrogen to water) in hydrotreating units and/or reactors, as well as reducing the volume of fluids being hydrotreated.

Formations may be selected for treatment due to the oxygen content of a portion of the formation. The oxygen content of the portion may be indicative of the phenols content producible from the portion. The formation or at least one portion thereof may be sampled to determine the oxygen content in the formation.

In some embodiments, formation fluid may be provided to a phenols extraction unit directly after production from a formation. Alternatively, formation fluid may be treated using one or more surface treatment units prior to flowing to a phenols extraction unit. Fluids provided to a phenols extraction unit may a "phenols rich" feedstock. The phenols rich feedstock may include, but is not limited to, formation fluid, synthetic condensate, a naphtha stream, and/or phenols rich fractions.

Conditions within a treatment area of a formation may be controlled to increase, or even maximize, production of phenols in formation fluid. FIG. 374 depicts surface treatment units used to separate phenols from formation fluid 2365. Formation fluid may be separated in phenols extraction unit 2702 into phenols fraction 2704 and fraction 2706. In some embodiments, phenols extraction unit 2702 may utilize water and/or methanol to extract phenols. In certain embodiments, phenols fraction 2704 may flow to purifying unit 2708. Purifying unit 2708 may generate phenols stream 2710. Phenols stream 2710 may be sold commercially, stored on site, transported offsite, and/or utilized in other treatment processes.

In some embodiments, the phenols extraction unit may separate a phenols rich feedstock into two or more streams. The two or more streams may include a hydrocarbon stream and/or a phenol stream. In addition, alternate streams which may be separated from the phenols rich feedstock in the phenols extraction unit may include, but are not limited to, a phenol stream, a cresol stream, a xylenol stream, a phenol-cresol stream, a cresol-xylenol stream, and/or any combination thereof. For example, the phenols rich feedstock may be separated into four streams including a hydrocarbon stream, a phenol stream, a cresol stream, and a xylenol stream.

In some embodiments, phenols may be recovered from a portion of formation fluid. Treating a portion of formation fluid may reduce capital and operating costs of a phenols extraction unit by reducing the volume of fluids being treated. The portion of formation fluid provided to the phenols extraction unit may be a phenols rich feedstock (e.g., synthetic condensate, light fraction, naphtha fraction, and/or phenols containing fraction). In the phenols extraction unit, the phenols rich fraction may be separated into a phenols fraction and a hydrocarbon fraction. The phenols fraction may, in certain embodiments, flow to a purifying unit to remove one or more components.

Alternatively, phenols may be separated from formation fluid by condensation and/or distillation of formation fluid to form a phenols containing fraction. The phenols containing fraction may include, but is not limited to, a naphtha fraction, a phenols fraction, a phenol fraction, a cresol fraction, a phenol-cresol fraction, a xylenol fraction, and/or a cresol-xylenol fraction.

Molecular hydrogen may, in certain embodiments, be utilized to selectively convert phenols (e.g., xylenols) other than phenol within the phenols containing stream to achieve a desired phenol content in the generated fluid. For example, xylenols and cresols may be cracked in the presence of molecular hydrogen to form phenol. Production of phenol from a mixture of xylenols is described in U.S. Pat. No. 2,998,457 issued to Paulsen, et al., which is incorporated by reference as if fully set forth herein. These reactions may occur using hydrocracking conditions in the presence of a catalyst containing approximately 10-15 weight % chromia on a high purity low sodium content gamma type alumina support. Feedstocks generated as a result of an in situ conversion process may be subjected to the above described treatment process to increase a content of phenol.

Formation fluid may include mono-aromatic components such as benzene, toluene, ethyl benzene, and xylene, (i.e., BTEX compounds). In some embodiments, separating BTEX compounds from formation fluid may increase an economic value of the generated products. Separated BTEX compounds may have a higher economic value than the same BTEX compounds in the mixture of component in the formation fluid. BTEX compounds may be separated from a synthetic condensate stream. "Synthetic condensate" may refer to a liquid hydrocarbon condensate stream and/or a hydrotreated liquid condensate stream.

A process embodiment may include separating synthetic condensate 2377 into BTEX compound stream 2712 and BTEX compound reduced synthetic condensate 2714 using separation unit 2716, as illustrated in FIG. 375. Mono-aromatic reduced synthetic condensate 2714 may flow to hydrotreating unit 1830, where BTEX compound reduced synthetic condensate 2714 is hydrotreated to form hydrotreated synthetic condensate 2718. Hydrotreated synthetic condensate 2718 may flow to any surface treatment unit for further treatment. Alternatively, mono-aromatic reduced synthetic condensate 2714 may, in certain embodiments, flow to a surface treatment unit for further treatment.

Mono-aromatic components, specifically BTEX compounds, may also be recovered after a synthetic condensate stream has been separated into one or more fractions (e.g., a naphtha fraction, a jet fraction, and/or a diesel fraction). The naphtha fraction may be separated from formation fluid using a surface treatment unit. In some embodiments, removal of BTEX compounds prior to hydrotreating the naphtha fraction may reduce capital and operating costs of a hydrotreating unit needed to treat the naphtha fraction. In certain embodiments, a naphtha fraction may be hydrotreated.

In some embodiments, formation fluid may contain BTEX generating compounds such as paraffins and/or naphthalene. BTEX generating compounds may flow to one or more surface treatment units to be converted into BTEX compounds.

In some embodiments, a synthetic condensate may be hydrotreated and then separated in separation units to form a naphtha stream. The naphtha stream may be provided to a reformer unit that converts BTEX generating compounds to BTEX compounds.

Naphtha stream 2720 may flow to reforming unit 2722, as illustrated in FIG. 376. Naphtha stream 2720 may be converted into reformate 2724 and hydrogen stream 1780. In certain embodiments, hydrogen stream 1780 flows to any surface treatment unit and/or treatment area requiring hydrogen. For example, a hydrotreating unit and/or a reactive distillation column may utilize hydrogen stream 1780. Reformate 2724 may flow to recovery unit 2726. Reformate 2724 may be separated into mono-aromatic stream 2728 and raffinate 2730 in recovery unit 2726. In some embodiments, raffinate 2730 may flow to a processing unit to be converted to a gasoline stream. The gasoline may be provided to a local market. In some embodiments, a mono-aromatic recovery unit may separate reformate 2724 into one or more streams, such as raffinate 2730, a benzene stream, a toluene stream, an ethyl benzene stream, and/or a xylene stream. In certain embodiments, naphtha stream 2720 may be replaced with a "heart cut" (i.e., products distilled in a relatively narrow selected temperature range) corresponding to mono-aromatic compounds.

Conversion of BTEX generating compounds into BTEX compounds in reforming unit 2722 may form molecular hydrogen. The molecular hydrogen may be used in one or more surface treatment units and/or in situ treatment areas where molecular hydrogen is needed. An advantage of utilizing a reforming unit may be the generation of molecular hydrogen for use on site. Generating molecular hydrogen on site may lower capital as well as operating costs for a given treatment system.

Formation fluid produced from hydrocarbon containing formations during an in situ conversion process may contain one or more components (e.g., naphthalene, anthracene, pyridine, pyrroles, and/or thiophene and its homologs). Various operating conditions within a treatment area may be controlled to increase the production of a component. Some of the components may be commercially viable products. Separating some components from formation fluid may increase the total value of generated products. A separated component in relatively concentrated form may have higher economic value than the same component in formation fluid. For example, formation fluid containing naphthalene may be sold at a lower price than a naphthalene stream separated from the formation fluid and the remaining formation fluid. In an embodiment, separation of naphthalenes may be accomplished using crystallization. In addition, removal of some components may reduce hydrogen consumption in subsequent hydrotreating units.

FIG. 377 depicts an embodiment of recovery unit 2732 used to separate a component from heart cut 2734. Heart cut 2734 may be obtained from a synthetic crude or formation fluid. Heart cut 2734 flows to recovery unit 2732, which may separate heart cut 2734 into component stream 2736 and hydrocarbon mixture 2738. In some embodiments, component stream 2736 may be sold and/or used on site in an in situ treatment area and/or a surface treatment unit. Hydrocarbon mixture 2738 may flow to one or more treatment units for additional treatment or, in some embodiments, to an in situ treatment area.

In some embodiments, the recovery unit, as shown in FIG. 377, separates the component from a feedstock stream (e.g., formation fluid, synthetic condensate, a gas stream, a light fraction, a middle fraction, a heavy fraction, bottoms, a naphtha stream, a jet fuel stream, a diesel stream, etc). Recovery units may separate more than one component from the feedstock stream in certain embodiments. For example, a recovery unit may separate a feedstock stream into a naphthalene stream, an anthracene stream, a naphthalene/anthracene stream, and/or a hydrocarbon mixture. Fluids generated during an in situ conversion process (e.g., of a coal formation) may contain naphthalene and/or anthracene.

When nitrogen containing components (e.g., pyridines and pyrroles) are to be separated from a feedstock, the recovery unit may be a nitrogen extraction unit. In some embodiments, a nitrogen extraction unit may separate the nitrogen containing components using a sulfuric acid process or a formic acid process. Nitrogen extraction units may include sulfuric acid extraction units and/or closed cycle formic acid extraction units. A sulfuric acid process may separate a portion of the formation fluid into a raffinate and an extract oil. The extract oil may contain pyridines and other nitrogen containing compounds, as well as spent acid. The extract oil may be separated into a nitrogen rich extract and an acid stream.

Shale oil produced from an in situ thermal conversion process may have major components in the desirable naphtha, jet, and diesel boiling range. The shale oil, however, may also contain a significant amount of nitrogen compounds. Methods to remove the nitrogen compounds include, but are not limited to, hydrotreating and/or solvent extraction. Studies of various solvent extraction configurations were completed to determine the optimal conditions and/or materials for removing nitrogen compounds from oil produced during the in situ conversion process in an oil shale formation.

A successful extraction process exhibits the following properties: inhibition of emulsion formation, immiscibility with the feedstock, rapid phase separation, and high capacity. An initial screening of the first three properties was used to direct later studies.

All the solvents tested during the initial screening developed a deep red color upon mixing with the shale oil, indicating that some components from the shale oil were partitioned into the solvent. A further indication of extraction efficiency was an increase in solvent volume. In a perfectly selective system (e.g., where only those molecules containing nitrogen were removed), the volume gain would be about 16%.

The initial screening studies were conducted using shale oil and four solvents. Solvents evaluated included sulfuric acid, formic acid, 1-methyl-2-pyrrolidinone (NMP), and acetic acid. Extraction severity was varied by changing the acid strength, the temperature, and the solvent to oil ratios. All experiments used 10 $cm^3$ of a solvent/water mixture and 10 $cm^3$ of oil mixed at room temperature for 1 minute in a 14 g vial (8 dram vial).

In the initial screening using acetic acid, only the experiment using 100% acetic acid resulted in an increase in volume with no emulsion formation and a reasonable separation time of approximately 15 minutes. Concentrations of acetic acid greater than 30 weight % increased the required extract volume, and no emulsions were formed. Phase separation times ranging from approximately 5 to 10 minutes were acceptable. Sulfuric acid was the next solvent tested. When concentrations of sulfuric acid were less than 70 weight %, an emulsion formed. At higher concentrations, however, the light color of the raffinate indicated that a large percentage of the polynuclear aromatic compounds, including nitrogen compounds, were extracted. The final solvent tested in the initial screening was 1-methyl-2-pyrrolidinone (NMP). Extractions using concentrations greater than 90 weight % NMP had an increase in extract volume as well as no emulsion formation. The phase separation time, however, ranged from 45 to 240 minutes.

The initial study determined a range of concentrations for each solvent for which there was an increase in extract volume, no emulsion formation, and reasonable phase separation times. The solvent concentrations included greater than 30 weight % formic acid, greater than 70 weight % sulfuric acid, greater than 30 weight % NMP, and 100% acetic acid.

Experiments were performed in a batch mode using 1 L or 2 L separatory funnel 2740, as shown in FIG. 378. Weighed amounts of solvent 2742 and water 1524 were mixed and added to separatory funnel 2740, followed by shale oil 2744. The total volumes were usually in the range of 500-800 mL for the 1 L experiments and about 1200-1600 mL for the 2 L experiments. For extractions performed at elevated temperatures, the solvent and oil were equilibrated for 40 minutes in a 19 L (5 gallon) metal can filled with water that was heated to the desired temperature. The mixture was vigorously shaken for 1 minute and then allowed to phase separate. In most cases, 30 minutes were allowed for separation into raffinate 2746 and solvent layer 2748, but in some cases (e.g., with sulfuric acid), the phase separation was much quicker.

Some experiments, called "crosscurrent contacting," involved a series of sequential contacting steps. For example, in a two-step crosscontacting, the raffinate phase from the first contact would be contacted with a second aliquot of fresh solvent. The overall solvent/oil ratio reported reflects the total volume of solvent used for all contacts.

To evaluate the suitability of the extracted oil as a feedstock for a refinery, a large sample was prepared and distilled into four product cuts. Based on initial 1 L studies, the optimum formic acid concentration was 85.3 weight %. Five crosscurrent extractions were carried out with an overall solvent to oil ratio of 0.65. The raffinate products were combined prior to distillation.

The first solvent tested was 1-methyl-2-pyrrolidinone (NMP). The raffinate fraction generated contained a higher weight percentage, and in some cases a significantly higher weight percentage, of nitrogen compounds than the feedstock. The solubility of the NMP in the oil phase was significant. Consequently, as the nitrogen compounds in shale oil were extracted into the NMP, some of the NMP was partitioned into the raffinate layer. With concentrations greater than 90 weight %, an increase in extract volume was observed as well as no emulsion formation, however, the phase separation time ranged from 45 to 240 minutes.

The acetic acid extraction using a 99.9 weight % acetic acid solution exhibited 88.4 weight % nitrogen compound removal and 88 weight % raffinate yield. A crosscurrent experiment indicated, however, that some acetic acid was partitioned into the raffinate layer.

Preliminary experiments with formic acid were carried out at 40° C. with a 1 L glass separatory funnel. A temperature of 40° C. was initially chosen as a value close to the highest temperature that could be used in an atmospheric extraction, since the initial boiling point of the oil was about 50° C. Higher extraction temperatures may have resulted in significant losses of oil in these simple extraction studies.

Acid concentrations were initially varied between 85-88 weight %, and both single step and crosscurrent extractions were investigated. The raffinate yields varied between 82-87 weight % and the level of nitrogen extraction varied between 90-92 weight %. The results exceeded the target of greater than 90 weight % nitrogen removal with an oil yield greater than 83 weight %.

Based on the initial studies, five extractions were conducted using a 2 L separatory funnel. The total amount of oil extracted was 4.0 L. The acid concentration was 85.4 weight %, and each extraction was carried out in crosscurrent fashion with three contacts of fresh acid with the oil. The average nitrogen compound removal was 92 weight % (880 ppm), and the overall raffinate oil yield was 83.7 weight %. The raffinate product was distilled into four fractions: naphtha (20.2 weight %), jet (37.1 weight %), diesel (26.3 weight %), and residue (15.2 weight %). In addition, there was approximately 1 weight % of light material that appeared to be primarily formic acid. While over 90 weight % of the nitrogen compounds were removed, some nitrogen compounds remained in each of the fractions. The naphtha fraction contained about 70 ppm nitrogen. The high jet smoke point of 20 mm and cetane index of 55 for the diesel indicated that commercial products could be made from these two fractions.

A simpler process with no acid recycle was also examined using sulfuric acid as the solvent. A series of experiments was carried out to examine extraction efficiency. With a solvent to oil ratio of 0.074 and an acid concentration of 93 weight %, the sulfuric acid removed 97 weight % of the nitrogen compounds (229 ppm product nitrogen), and the raffinate yield was 82 weight %. Higher sulfuric acid/oil ratios extracted more nitrogen compounds. A 90 weight % sulfuric acid concentration with an acid/oil ratio of 1.0 removed 99.8 weight % nitrogen compounds (27 ppm product nitrogen), with a yield of 76 weight %. Lower acid concentrations removed fewer nitrogen compounds.

Sulfuric acid extractions with a solvent to oil ratio of 0.074 and a single contacting of 93 weight % sulfuric acid removed 97 weight % of the nitrogen compounds. The raffinate oil yield was 82 weight %. The formic acid experiments required higher concentrations of acid to extract the nitrogen compounds compared to sulfuric acid. Contacting the oil at room temperature with a 94 weight % formic acid solvent using a solvent to oil ratio of 1.0 removed 92 weight % of the nitrogen compounds from the oil and resulted in an oil yield of 86 weight %.

Removal of greater than 90% of the nitrogen compounds and maintaining an oil yield greater than 83 weight % was achieved with two of the solvents tested, specifically sulfuric acid and formic acid. The sulfuric acid extractions required low solvent to oil ratios to achieve the desired nitrogen compound removal. Contacting the oil with 93 weight % sulfuric acid solvent using a solvent to oil ratio of 0.074, 97 weight % of the nitrogen compounds were removed and the raffinate oil yield was 82 weight %. With a single room temperature contacting of 94 weight % formic acid at a 1.0 solvent to oil ratio, 92 weight % of nitrogen compounds were removed.

FIG. 379 depicts an embodiment of treatment areas 2750 surrounded by perimeter barrier 2752. Each treatment area 2750 may be a volume of formation that is, or is to be, subjected to an in situ conversion process. Perimeter barrier 2752 may include installed portions and naturally occurring portions of the formation. Naturally occurring portions of the formation that form part of a perimeter barrier may include substantially impermeable layers of the formation. Examples of naturally occurring perimeter barriers include overburdens and underburdens. Installed portions of perimeter barrier 2752 may be formed as needed to define separate treatment areas 2750. In situ conversion process (ICP) wells 2754 may be placed within treatment areas 2750. ICP wells 2754 may include heat sources, production wells, treatment area dewatering wells, monitor wells, and other types of wells used during in situ conversion.

Different treatment areas 2750 may share common barrier sections to minimize the length of perimeter barrier 2752 that needs to be formed. Perimeter barrier 2752 may inhibit fluid migration into treatment area 2750 undergoing in situ conversion. Advantageously, perimeter barrier 2752 may inhibit formation water from migrating into treatment area 2750. Formation water typically includes water and dissolved material in the water (e.g., salts). If formation water were allowed to migrate into treatment area 2750 during an in situ conversion process, the formation water might increase operating costs for the process by adding additional energy costs associated with vaporizing the formation water and additional fluid treatment costs associated with removing, separating, and treating additional water in formation fluid produced from the formation. A large amount of formation water migrating into a treatment area may inhibit heat sources from raising temperatures within portions of treatment area 2750 to desired temperatures.

Perimeter barrier 2752 may inhibit undesired migration of formation fluids out of treatment area 2750 during an in situ conversion process. Perimeter barriers 2752 between adjacent treatment areas 2750 may allow adjacent treatment areas to undergo different in situ conversion processes. For example, a first treatment area may be undergoing pyrolysis, a second treatment area adjacent to the first treatment area may be undergoing synthesis gas generation, and a third treatment area adjacent to the first treatment area and/or the second treatment area may be subjected to an in situ solution mining process. Operating conditions within the different treatment areas may be at different temperatures, pressures, production rates, heat injection rates, etc.

Perimeter barrier 2752 may define a limited volume of formation that is to be treated by an in situ conversion process. The limited volume of formation is known as treatment area 2750. Defining a limited volume of formation that is to be treated may allow operating conditions within the limited volume to be more readily controlled. In some formations, a hydrocarbon containing layer that is to be subjected to in situ conversion is located in a portion of the formation that is permeable and/or fractured. Without perimeter barrier 2752, formation fluid produced during in situ conversion might migrate out of the volume of formation being treated. Flow of formation fluid out of the volume of formation being treated may inhibit the ability to maintain a desired pressure within the portion of the formation being treated. Thus, defining a limited volume of formation that is to be treated by using perimeter barrier 2752 may allow the pressure within the limited volume to be controlled. Controlling the amount of fluid removed from treatment area 2750 through pressure relief wells, production wells and/or heat sources may allow pressure within the treatment area to be controlled. In some embodiments, pressure relief wells are perforated casings placed within or adjacent to wellbores of heat sources that have sealed casings, such as flameless distributed combustors. The use of some types of perimeter barriers (e.g., frozen barriers and grout walls) may allow pressure control in individual treatment areas 2750.

Uncontrolled flow or migration of formation fluid out of treatment area 2750 may adversely affect the ability to efficiently maintain a desired temperature within treatment area 2750. Perimeter barrier 2752 may inhibit migration of hot formation fluid out of treatment area 2750. Inhibiting fluid migration through the perimeter of treatment area 2750 may limit convective heat losses to heat loss in fluid removed from the formation through production wells and/or fluid removed to control pressure within the treatment area.

During in situ conversion, heat applied to the formation may cause fractures to develop within treatment area 2750. Some of the fractures may propagate towards a perimeter of treatment area 2750. A propagating fracture may intersect an aquifer and allow formation water to enter treatment area 2750. Formation water entering treatment area 2750 may not permit heat sources in a portion of the treatment area to raise the temperature of the formation to temperatures significantly above the vaporization temperature of formation water entering the formation. Fractures may also allow formation fluid produced during in situ conversion to migrate away from treatment area 2750.

Perimeter barrier 2752 around treatment area 2750 may limit the effect of a propagating fracture on an in situ conversion process. In some embodiments, perimeter barriers 2752 are located far enough away from treatment areas 2750 so that fractures that develop in the formation do not influence perimeter barrier integrity. Perimeter barriers 2752 may be located over 10 m, 40 m, or 70 m away from ICP wells 2754. In some embodiments, perimeter barrier 2752 may be located adjacent to treatment area 2750. For example, a frozen barrier formed by freeze wells may be located close to heat sources, production wells, or other wells. ICP wells 2754 may be located less than 1 m away from freeze wells, although a larger spacing may advantageously limit influence of the frozen barrier on the ICP wells, and limit the influence of formation heating on the frozen barrier.

In some perimeter barrier embodiments, and especially for natural perimeter barriers, ICP wells 2754 may be placed in perimeter barrier 2752 or next to the perimeter barrier. For example, ICP wells 2754 may be used to treat hydrocarbon layer 522 that is a thin rich hydrocarbon layer. The ICP wells may be placed in overburden 524 and/or underburden 914 adjacent to hydrocarbon layer 522, as depicted in FIG. 380. ICP wells 2754 may include heater-production wells that heat the formation and remove fluid from the formation. Thin rich layer hydrocarbon layer 522 may have a thickness greater than about 0.2 m and less than about 8 m, and a richness of from about 205 liters of oil per metric ton to about 1670 liters of oil per metric ton. Overburden 524 and underburden 914 may be portions of perimeter barrier 2752 for the in situ conversion system used to treat rich thin layer 522. Heat losses to overburden 524 and/or underburden 914 may be acceptable to produce rich hydrocarbon layer 522. In other ICP well placement embodiments for treating thin rich hydrocarbon layers 522, ICP wells 2754 may be placed within the thin hydrocarbon layer or hydrocarbon layers, as depicted in FIG. 381.

In some in situ conversion process embodiments, a perimeter barrier may be self-sealing. For example, formation water adjacent to a frozen barrier formed by freeze wells may freeze and seal the frozen barrier should the frozen barrier be ruptured by a shift or fracture in the formation. In some in situ conversion process embodiments, progress of fractures in the formation may be monitored. If a fracture that is propagating towards the perimeter of the treatment area is detected, a controllable parameter (e.g., pressure or energy input) may be adjusted to inhibit propagation of the fracture to the surrounding perimeter barrier.

Perimeter barriers may be useful to address regulatory issues and/or to insure that areas proximate a treatment area (e.g., water tables or other environmentally sensitive areas) are not substantially affected by an in situ conversion process. The formation within the perimeter barrier may be treated using an in situ conversion process. The perimeter barrier may inhibit the formation on an outer side of the perimeter barrier from being affected by the in situ conversion process used on the formation within the perimeter barrier. Perimeter barriers may inhibit fluid migration from a treatment area. Perimeter barriers may inhibit rise in temperature to pyrolysis temperatures on outer sides of the perimeter barriers.

Different types of barriers may be used to form a perimeter barrier around an in situ conversion process treatment area. The perimeter barrier may be, but is not limited to, a frozen barrier surrounding the treatment area, dewatering wells, a grout wall formed in the formation, a sulfur cement barrier, a barrier formed by a gel produced in the formation, a barrier formed by precipitation of salts in the formation, a barrier formed by a polymerization reaction in the formation, sheets driven into the formation, or combinations thereof.

FIG. 382 depicts a side representation of a portion of an embodiment of treatment area 2750 having perimeter barrier 2752 formed by overburden 524, underburden 914, and freeze wells 2756 (only one freeze well is shown in FIG. 382). A portion of freeze well 2756 and perimeter barrier 2752 formed by the freeze well may extend into underburden 914. Portions of heat sources and portions of production wells may pass through a low temperature zone formed by the freeze wells. In some embodiments, perimeter barrier 2752 may not extend into underburden 914 (e.g., a perimeter barrier may extend into hydrocarbon layer 522 reasonably close to the underburden or some of the hydrocarbon layer may function as part of the perimeter barrier). Underburden 914 may be a rock layer that inhibits fluid flow into or out of treatment area 2750. In some embodiments, a portion of the underburden may be hydrocarbon containing material that is not to be subjected to in situ conversion.

Overburden 524 may extend over treatment area 2750. Overburden 524 may include a portion of hydrocarbon containing material that is not to be subjected to in situ conversion. Overburden 524 may inhibit fluid flow into or out of treatment area 2750.

Some formations may include underburden 914 that is permeable or includes fractures that would allow fluid flow into or out of treatment area 2750. A portion of perimeter barrier 2752 may be formed below treatment area 2750 to inhibit inflow of fluid into the treatment area and/or to inhibit outflow of formation fluid during in situ conversion. FIG. 383 depicts treatment area 2750 having a portion of perimeter barrier 2752 that is below the treatment area. The perimeter barrier may be a frozen barrier formed by freeze wells 2756. In some embodiments, a perimeter barrier below a treatment area may follow along a geological formation (e.g., along dip of a dipping coal formation).

Some formations may include overburden 524 that is permeable or includes fractures that allow fluid flow into or out of treatment area 2750. A portion of perimeter barrier 2752 may be formed above the treatment area to inhibit inflow of fluid into the treatment area and/or to inhibit outflow of formation fluid during in situ conversion. FIG. 383 depicts an embodiment of an in situ conversion process having a portion of perimeter barrier 2752 formed above treatment area 2750. In some embodiments, a perimeter barrier above a treatment area may follow along a geological formation (e.g., along dip of a dipping formation). In some embodiments, a perimeter barrier above a treatment area may be formed as a ground cover placed at or near the surface of the formation. Such a perimeter barrier may allow for treatment of a formation wherein a hydrocarbon layer to be processed is close to the surface.

In some formations, water may flow through a fracture system in a hydrocarbon containing formation. For example, a coal seam may be located between an impermeable overburden and an impermeable underburden. The coal seam may include a water saturated fracture system. Water may flow through the fracture system of the coal seam. Perimeter barriers may be inserted through the overburden, through the coal seam, and into the underburden to form a treatment area. The inserted perimeter barrier, the overburden, and the underburden may form perimeter barriers that define a treatment area.

As depicted in FIG. 379, several perimeter barriers 2752 may be formed to divide a formation into treatment areas 2750. If a large amount of water is present in the hydrocarbon containing material, dewatering wells may be used to remove water in the treatment area after a perimeter barrier is formed. If the hydrocarbon containing material does not contain a large amount of water, heat sources may be activated. The heat sources may vaporize water within the formation, and the water vapor may be removed from the treatment area through production wells.

A perimeter barrier may have any desired shape. In some embodiments, portions of perimeter barriers may follow along geological features and/or property lines. In some embodiments, portions of perimeter barriers may have circular, square, rectangular, or polygonal shapes. Portions of perimeter barriers may also have irregular shapes. A perimeter barrier having a circular shape may advantageously enclose a larger area than other regular polygonal shapes that have the same perimeter. For example, for equal perimeters, a circular barrier will enclose about 27% more area than a square barrier. Using a circular perimeter barrier may require fewer wells and/or less material to enclose a desired area with a perimeter barrier than would other regular perimeter barrier shapes. In some embodiments, square, rectangular or other polygonal perimeter barriers are used to conform to property lines and/or to accommodate a regular well pattern of heat sources and production wells.

A formation that is to be treated using an in situ conversion process may be separated into several treatment areas by perimeter barriers. FIG. 379 depicts an embodiment of a perimeter barrier arrangement for a portion of a formation that is to be processed using substantially rectangular treatment areas 2750. A perimeter barrier for treatment area 2750 may be formed when needed. The complete pattern of perimeter barriers for all of the formation to be subjected to in situ conversion does not need to be formed prior to treating individual treatment areas.

Perimeter barriers having circular or arced portions may be placed in a formation in a regular pattern. Centers of the circular or arced portions may be positioned at apices of imaginary polygon patterns. For example, FIG. 384 depicts a pattern of perimeter barriers wherein a unit of the pattern is based on an equilateral triangle. FIG. 385 depicts a pattern of perimeter barriers wherein a unit of the pattern is based on a square. Perimeter barrier patterns may also be based on higher order polygons.

FIG. 384 depicts a plan view representation of a perimeter barrier embodiment that forms treatment areas 2750 in a formation. Centers of arced portions of perimeter barriers 2752 are positioned at apices of imaginary equilateral triangles. The imaginary equilateral triangles are depicted as dashed lines. First circular barrier 2752A may be formed in the formation to define first treatment area 2750A.

Second barrier 2752B may be formed. Second barrier 2752B and portions of first barrier 2750A may define second treatment area 2750B. Second barrier 2752B may have an arced portion with a radius that is substantially equal to the radius of first circular barrier 2752A. The center of second barrier 2752B may be located such that if the second barrier were formed as a complete circle, the second barrier would contact the first barrier substantially at a tangent point. Second barrier 2752B may include linear sections 2758 that allow for a larger area to be enclosed for the same or a lesser length of perimeter barrier than would be needed to complete the second barrier as a circle. In some embodiments, second barrier 2752B may not include linear sections and the second barrier may contact the first barrier at a tangent point or at a tangent region. Second treatment area 2750B may be defined by portions of first circular barrier 2752A and second barrier 2752B. The area of second treatment area 2750B may be larger than the area of first treatment area 2750A.

Third barrier 2752C may be formed adjacent to first barrier 2752A and second barrier 2752B. Third barrier 2752C may be connected to first barrier 2752A and second barrier 2752B to define third treatment area 2750C. Additional barriers may be formed to form treatment areas for processing desired portions of a formation.

FIG. 385 depicts a plan view representation of a perimeter barrier embodiment that forms treatment areas 2750 in a formation. Centers of arced portions of perimeter barriers 2752 are positioned at apices of imaginary squares. The imaginary squares are depicted as dashed lines. First circular barrier 2752A may be formed in the formation to define first treatment area 2750A. Second barrier 2752B may be formed around a portion of second treatment area 2750B. Second barrier 2752B may have an arced portion with a radius that is substantially equal to the radius of first circular barrier 2752A. The center of second barrier 2752B may be located such that if the second barrier were formed as a complete circle, the second barrier would contact the first barrier at a tangent point. Second barrier 2752B may include linear sections 2758 that allow for a larger area to be enclosed for the same or a lesser length of perimeter barrier than would be needed to complete the second barrier as a circle. Two additional perimeter barriers may be formed to complete a unit of four treatment areas.

In some embodiments, central area 2760 may be isolated by perimeter barrier 2752. For perimeter barriers based on a square pattern, such as the perimeter barriers depicted in FIG. 385, central area 2760 may be a square. A length of a side of the square may be up to about 0.586 times a radius of an arc section of a perimeter barrier. Treatment facilities, or a portion of the treatment facilities, used to treat fluid removed from the formation may be located in central area 2760. In other embodiments, perimeter barrier segments that form a central area may not be installed.

FIG. 386 depicts an embodiment of a barrier configuration in which perimeter barriers 2752 are formed radially about a central point. In an embodiment, treatment facilities for processing production fluid removed from the formation are located within central area 2760 defined by first barrier 2752A. Locating the treatment facilities in the center may reduce the total length of piping needed to transport formation fluid to the treatment facilities. In some embodiments, ICP wells are installed in the central area and treatment facilities are located outside of the pattern of barriers.

A ring of formation between second barrier 2752B and first barrier 2752A may be treatment area 2750A. Third barrier 2752C may be formed around second barrier 2752B. The pattern of barriers may be extended as needed. A ring of formation between an inner barrier and an outer barrier may be a treatment area. If the area of a ring is too large to be treated as a whole, linear sections 2758 extending from the inner barrier to the outer barrier may be formed to divide the ring into a number of treatment areas. In some embodiments, distances between barrier rings may be substantially the same. In other embodiments, a distance between barrier rings may be varied to adjust the area enclosed by the barriers.

In some embodiments of in situ conversion processes, formation water may be removed from a treatment area before, during, and/or after formation of a barrier around the formation. Heat sources, production wells, and other ICP wells may be installed in the formation before, during, or after formation of the barrier. Some of the production wells may be coupled to pumps that remove formation water from the treatment area. In other embodiments, dewatering wells may be formed within the treatment area to remove formation water from the treatment area. Removing formation water from the treatment area prior to heating to pyrolysis temperatures for in situ conversion may reduce the energy needed to raise portions of the formation within the treatment area to pyrolysis temperatures by eliminating the need to vaporize all formation water initially within the treatment area.

In some embodiments of in situ conversion processes, freeze wells may be used to form a low temperature zone around a portion of a treatment area. "Freeze well" refers to a well or opening in a formation used to cool a portion of the formation. In some embodiments, the cooling may be sufficient to cause freezing of materials (e.g., formation water) that may be present in the formation. In other embodiments, the cooling may not cause freezing to occur; however, the cooling may serve to inhibit the flow of fluid into or out of a treatment area by filling a portion of the pore space with liquid fluid.

In some embodiments, freeze wells may be used to form a side perimeter barrier, or a portion of a side perimeter barrier, in a formation. In some embodiments, freeze wells may be used to form a bottom perimeter barrier, or a portion of a bottom perimeter barrier, underneath a formation. In some embodiments, freeze wells may be used to form a top perimeter barrier, or a portion of a top perimeter barrier, above a formation.

In some embodiments, freeze wells may be maintained at temperatures significantly colder than a freezing temperature of formation water. Heat may transfer from the formation to the freeze wells so that a low temperature zone is formed around the freeze wells. A portion of formation water that is in, or flows into, the low temperature zone may freeze to form a barrier to fluid flow. Freeze wells may be spaced and operated so that the low temperature zone formed by each freeze well overlaps and connects with a low temperature zone formed by at least one adjacent freeze well.

Sections of freeze wells that are able to form low temperature zones may be only a portion of the overall length of the freeze wells. For example, a portion of each freeze well may be insulated adjacent to an overburden so that heat transfer between the freeze wells and the overburden is inhibited. The freeze wells may form a low temperature zone along sides of a hydrocarbon containing portion of the formation. The low temperature zone may extend above and/or below a portion of the hydrocarbon containing layer to be treated by in situ conversion. The ability to use only portions of freeze wells to form a low temperature zone may allow for economic use of freeze wells when forming barriers for treatment areas that are relatively deep within the formation.

A perimeter barrier formed by freeze wells may have several advantages over perimeter barriers formed by other methods. A perimeter barrier formed by freeze wells may be formed deep within the ground. A perimeter barrier formed by freeze wells may not require an interconnected opening around the perimeter of a treatment area. An interconnected opening is typically needed for grout walls and some other types of perimeter barriers. A perimeter barrier formed by freeze wells develops due to heat transfer, not by mass transfer. Gel, polymer, and some other types of perimeter barriers depend on mass transfer within the formation to form the perimeter barrier. Heat transfer in a formation may vary throughout a formation by a relatively small amount (e.g., typically by less than a factor of 2 within a formation layer). Mass transfer in a formation may vary by a much greater amount throughout a formation (e.g., by a factor of $10^8$ or more within a formation layer). A perimeter barrier formed by freeze wells may have greater integrity and be easier to form and maintain than a perimeter barrier that needs mass transfer to form.

A perimeter barrier formed by freeze wells may provide a thermal barrier between different treatment areas and between surrounding portions of the formation that are to remain untreated. The thermal barrier may allow adjacent treatment areas to be subjected to different processes. The treatment areas may be operated at different pressures, temperatures, heating rates, and/or formation fluid removal rates. The thermal barrier may inhibit hydrocarbon material on an outer side of the barrier from being pyrolyzed when the treatment area is heated.

Forming a frozen perimeter barrier around a treatment area with freeze wells may be more economical and beneficial over the life of an in situ conversion process than operating dewatering wells around the treatment area. Freeze wells may be less expensive to install, operate, and maintain than dewatering wells. Casings for dewatering wells may need to be formed of corrosion resistant metals to withstand corrosion from formation water over the life of an in situ conversion process. Freeze wells may be made of carbon steel. Dewatering wells may enhance the spread of formation fluid from a treatment area. Water produced from dewatering wells may contain a portion of formation fluid. Such water may need to be treated to remove hydrocarbons and other material before the water can be released. Dewatering wells may inhibit the ability to raise pressure within a treatment area to a desired value since dewatering wells are constantly removing fluid from the formation.

Water presence in a low temperature zone may allow for the formation of a frozen barrier. The frozen barrier may be a monolithic, impermeable structure. After the frozen barrier is established, the energy requirements needed to maintain the frozen barrier may be significantly reduced, as compared to the energy costs needed to establish the frozen barrier. In some embodiments, the reduction in cost may be a factor of 10 or more. In other embodiments, the reduction in cost may be less dramatic, such as a reduction by a factor of about 3 or 4.

In many formations, hydrocarbon containing portions of the formation are saturated or contain sufficient amounts of formation water to allow for formation of a frozen barrier. In some formations, water may be added to the formation adjacent to freeze wells after and/or during formation of a low temperature zone so that a frozen barrier will be formed.

In some in situ conversion embodiments, a low temperature zone may be formed around a treatment area. During heating of the treatment area, water may be released from the treatment area as steam and/or entrained water in formation fluids. In general, when a treatment area is initially heated, water present in the formation is mobilized before substantial quantities of hydrocarbons are produced. The water may be free water and/or released water that was attached or bound to clays or minerals ("bound water"). Mobilized water may flow into the low temperature zone. The water may condense and subsequently solidify in the low temperature zone to form a frozen barrier.

Pyrolyzing hydrocarbons and/or oxidizing hydrocarbons may form water vapor during in situ conversion. A significant portion of the generated water vapor may be removed from the formation through production wells. A small portion of the generated water vapor may migrate towards the perimeter of the treatment area. As the water approaches the low temperature zone formed by the freeze wells, a portion of the water may condense to liquid water in the low temperature zone. If the low temperature zone is cold enough, or if the liquid water moves into a cold enough portion of the low temperature zone, the water may solidify.

In some embodiments, freeze wells may form a low temperature zone that does not result in solidification of formation fluid. For example, if there is insufficient water or other fluid with a relatively high freezing point in the formation around the freeze wells, then the freeze wells may not form a frozen barrier. Instead, a low temperature zone may be formed. During an in situ conversion process, formation fluid may migrate into the low temperature zone. A portion of formation fluid (e.g., low freezing point hydrocarbons) may condense in the low temperature zone. The condensed fluid may fill pore space within the low temperature zone. The condensed fluid may form a barrier to additional fluid flow into or out of the low temperature zone. A portion of the formation fluid (e.g., water vapor) may condense and freeze within the low temperature zone to form a frozen barrier. Condensed formation fluid and/or solidified formation fluid may form a barrier to further fluid flow into or out of the low temperature zone.

Freeze wells may be initiated a significant time in advance of initiation of heat sources that will heat a treatment area. Initiating freeze wells in advance of heat source initiation may allow for the formation of a thick interconnected frozen perimeter barrier before formation temperature in a treatment area is raised. In some embodiments, heat sources that are located a large distance away from a perimeter of a treatment area may be initiated before, simultaneously with, or shortly after initiation of freeze wells.

Heat sources may not be able to break through a frozen perimeter barrier during thermal treatment of a treatment area. In some embodiments, a frozen perimeter barrier may continue to expand for a significant time after heating is initiated. Thermal diffusivity of a hot, dry formation may be significantly smaller than thermal diffusivity of a frozen formation. The difference in thermal diffusivities between hot, dry formation and frozen formation implies that a cold zone will expand at a faster rate than a hot zone. Even if heat sources are placed relatively close to freeze wells that have formed a frozen barrier (e.g., about 1 m away from freeze wells that have established a frozen barrier), the heat sources will typically not be able to break through the frozen barrier if coolant is supplied to the freeze wells. In certain ICP system embodiments, freeze wells are positioned a significant distance away from the heat sources and other ICP wells. The distance may be about 3 m, 5 m, 10 m, 15 m, or greater.

The frozen barrier formed by the freeze wells may expand on an outward side of the perimeter barrier even when heat sources heat the formation on an inward side of the perimeter barrier.

FIG. 379 depicts a representation of freeze wells 2756 installed in a formation to form low temperature zones 2762 around treatment areas 2750. Fluid in low temperature zones 2762 with a freezing point above a temperature of the low temperature zones may solidify in the low temperature zones to form perimeter barrier 2752. Typically, the fluid that solidifies to form perimeter barrier 2752 will be a portion of formation water. Two or more rows of freeze wells may be installed around treatment area 2750 to form a thicker low temperature zone 2762 than can be formed using a single row of freeze wells. FIG. 387 depicts two rows of freeze wells 2756 around treatment area 2750. Freeze wells 2756 may be placed around all of treatment area 2750, or freeze wells may be placed around a portion of the treatment area. In some embodiments, natural fluid flow barriers (such as unfractured, substantially impermeable formation material) and/or artificial barriers (e.g., grout walls or interconnected sheet barriers) surround remaining portions of the treatment area when freeze wells do not surround all of the treatment area.

If more than one row of freeze wells surrounds a treatment area, the wells in a first row may be staggered relative to wells in a second row. In the freeze well arrangement embodiment depicted in FIG. 387, first separation distance 2764 exists between freeze wells 2756 in a row of freeze wells. Second separation distance 2766 exists between freeze wells 2756 in a first row and a second row. Second separation distance 2766 may be about 10-75% (e.g., 30-60% or 50%) of first separation distance 2764. Other separation distances and freeze well patterns may also be used.

FIG. 383 depicts an embodiment of an ICP system with freeze wells 2756 that form low temperature zone 2762 below a portion of a formation, a low temperature zone above a portion of a formation, and a low temperature zone along a perimeter of a portion of the formation. Portions of heat sources 508 and portions of production wells 512 may pass through low temperature zone 2762 formed by freeze wells 2756. The portions of heat sources 508 and production wells 512 that pass through low temperature zone 2762 may be insulated to inhibit heat transfer to the low temperature zone. The insulation may include, but is not limited to, foamed cement, an air gap between an insulated liner placed in the production well, or a combination thereof.

A portion of a freeze well that is to form a low temperature zone in a formation may be placed in the formation in desired spaced relation to an adjacent freeze well or freeze wells so that low temperature zones formed by the individual freeze wells interconnect to form a continuous low temperature zone. In some freeze well embodiments, each freeze well may have two or more sections that allow for heat transfer with an adjacent formation. Other sections of the freeze wells may be insulated to inhibit heat transfer with the adjacent formation.

Freeze wells may be placed in the formation so that there is minimal deviation in orientation of one freeze well relative to an adjacent freeze well. Excessive deviation may create a large separation distance between adjacent freeze wells that may not permit formation of an interconnected low temperature zone between the adjacent freeze wells. Factors that may influence the manner in which freeze wells are inserted into the ground include, but are not limited to, freeze well insertion time, depth that the freeze wells are to be inserted, formation properties, desired well orientation, and economics. Relatively low depth freeze wells may be impacted and/or vibrationally inserted into some formations. Freeze wells may be impacted and/or vibrationally inserted into formations to depths from about 1 m to about 100 m without excessive deviation in orientation of freeze wells relative to adjacent freeze wells in some types of formations. Freeze wells placed deep in a formation or in formations with layers that are difficult to drill through may be placed in the formation by directional drilling and/or geosteering. Directional drilling with steerable motors uses an inclinometer to guide the drilling assembly. Periodic gyro logs are obtained to correct the path. An example of a directional drilling system is VertiTrak™ available from Baker Hughes Inteq (Houston, Tex.). Geosteering uses analysis of geological and survey data from an actively drilling well to estimate stratigraphic and structural position needed to keep the wellbore advancing in a desired direction. Electrical, magnetic, and/or other signals produced in an adjacent freeze well may also be used to guide directionally drilled wells so that a desired spacing between adjacent wells is maintained. Relatively tight control of the spacing between freeze wells is an important factor in minimizing the time for completion of a low temperature zone.

FIG. 388 depicts a representation of an embodiment of freeze well 2756 that is directionally drilled into a formation. Freeze well 2756 may enter the formation at a first location and exit the formation at a second location so that both ends of the freeze well are above the ground surface. Refrigerant flow through freeze well 2756 may reduce the temperature of the formation adjacent to the freeze well to form low temperature zone 2762. Refrigerant passing through freeze well 2756 may be passed through an adjacent freeze well or freeze wells. Temperature of the refrigerant may be monitored. When the refrigerant temperature exceeds a desired value, the refrigerant may be directed to a refrigeration unit or units to reduce the temperature of the refrigerant before recycling the refrigerant back into the freeze wells. The use of freeze wells that both enter and exit the formation may eliminate the need to accommodate an inlet refrigerant passage and an outlet refrigerant passage in each freeze well.

Freeze well 2756 depicted in the embodiment of FIG. 388 forms part of frozen barrier 2768 below water body 2769. Water body 2769 may be any type of water body such as a pond, lake, stream, or river. In some embodiments, the water body may be a subsurface water body such as an underground stream or river. Freeze well 2756 is one of many freeze wells that may inhibit downward migration of water from water body 2769 to hydrocarbon containing layer 522.

FIG. 389 depicts a representation of freeze wells 2756 used to form a low temperature zone on a side of hydrocarbon containing layer 522. In some embodiments, freeze wells 2756 may be placed in a non-hydrocarbon containing layer that is adjacent to hydrocarbon containing layer 522. In the depicted embodiment, freeze wells 2756 are oriented along dip of hydrocarbon containing layer 522. In some embodiments, freeze wells may be inserted into the formation from two different directions or substantially perpendicular to the ground surface to limit the length of the freeze wells. Freeze well 2756A and other freeze wells may be inserted into hydrocarbon containing layer 522 to form a perimeter barrier that inhibits fluid flow along the hydrocarbon containing layer. If needed, additional freeze wells may be installed to form perimeter barriers to inhibit fluid flow into or from overburden 524 or underburden 914.

As depicted in FIG. 382, freeze wells 2756 may be positioned within a portion of a formation. Freeze wells 2756 and ICP wells may extend through overburden 524, through hydrocarbon layer 522, and into underburden 914. In some embodiments, portions of freeze wells and ICP wells extending through the overburden 524 may be insulated to inhibit heat transfer to or from the surrounding formation.

In some embodiments, dewatering wells 1978 may extend into formation 522. Dewatering wells 1978 may be used to remove formation water from hydrocarbon containing layer 522 after freeze wells 2756 form perimeter barrier 2752. Water may flow through hydrocarbon containing layer 522 in an existing fracture system and channels. Only a small number of dewatering wells 1978 may be needed to dewater treatment area 2750 because the formation may have a large permeability due to the existing fracture system and channels. Dewatering wells 1978 may be placed relatively close to freeze wells 2756. In some embodiments, dewatering wells may be temporarily sealed after dewatering. If dewatering wells are placed close to freeze wells or to a low temperature zone formed by freeze wells, the dewatering wells may be filled with water. Expanding low temperature zone 2762 may freeze the water placed in the dewatering wells to seal the dewatering wells. Dewatering wells 1978 may be re-opened after completion of in situ conversion. After in situ conversion, dewatering wells 1978 may be used during clean-up procedures for injection or removal of fluids.

In some embodiments, selected production wells, heat sources, or other types of ICP wells may be temporarily converted to dewatering wells by attaching pumps to the selected wells. The converted wells may supplement dewatering wells or eliminate the need for separate dewatering wells. Converting other wells to dewatering wells may eliminate costs associated with drilling wellbores for dewatering wells.

FIG. 390 depicts a representation of an embodiment of a well system for treating a formation. Hydrocarbon containing layer 522 may include leached/fractured portion 2771 and non-leached/non-fractured portion 2770. Formation water may flow through leached/fractured portion 2771. Non-leached/non-fractured portion 2770 may be unsaturated and relatively dry. In some formations, leached/fractured portion 2771 may be beneath 100 m or more of overburden 524, and the leached/fractured portion may extend 200 m or more into the formation. Non-leached/non-fractured portion 2770 may extend 400 m or more deeper into the formation.

Heat source 508 may extend to underburden 914 below non-leached/non-fractured portion 2770. Production wells may extend into the non-leached/non-fractured portion of the formation. The production wells may have perforations, or be open wellbores, along the portions extending into the leached/fractured portion and non-leached/non-fractured portions of the hydrocarbon containing layer. Freeze wells 2756 may extend close to, or a short distance into, non-leached/non-fractured portion 2770. Freeze wells 2756 may be offset from heat sources 508 and production wells a distance sufficient to allow hydrocarbon material below the freeze wells to remain unpyrolyzed during treatment of the formation (e.g., about 30 m). Freeze wells 2756 may inhibit formation water from flowing into hydrocarbon containing layer 522. Advantageously, freeze wells 2756 do not need to extend along the full length of hydrocarbon material that is to be subjected to in situ conversion, because non-leached/non-fractured portion 2770 beneath freeze wells 2756 may remain untreated. If treatment of the formation generates thermal fractures in the non-leached/non-fractured portion 2770 that propagate towards and/or past freeze wells 2756, the fractures may remain substantially horizontally oriented. Horizontally oriented fractures will not intersect the leached/fractured portion 2771 to allow formation water to enter into treatment area 2750.

Various types of refrigeration systems may be used to form a low temperature zone. Determination of an appropriate refrigeration system may be based on many factors, including, but not limited to: type of freeze well; a distance between adjacent freeze wells; refrigerant; time frame in which to form a low temperature zone; depth of the low temperature zone; temperature differential to which the refrigerant will be subjected; chemical and physical properties of the refrigerant; environmental concerns related to potential refrigerant releases, leaks, or spills; economics; formation water flow in the formation; composition and properties of formation water; and various properties of the formation such as thermal conductivity, thermal diffusivity, and heat capacity.

Several different types of freeze wells may be used to form a low temperature zone. The type of freeze well used may depend on the type of refrigeration system used to form a low temperature zone. The type of refrigeration system may be, but is not limited to, a batch operated refrigeration system, a circulated fluid refrigeration system, a refrigeration system that utilizes a vaporization cycle, a refrigeration system that utilizes an adsorption-desorption refrigeration cycle, or a refrigeration system that uses an absorption-desorption refrigeration cycle. Different types of refrigeration systems may be used at different times during formation and/or maintenance of a low temperature zone. In some embodiments, freeze wells may include casings. In some embodiments, freeze wells may include perforated casings or casings with other types of openings. In some embodiments, a portion of a freeze well may be an open wellbore.

A batch operated refrigeration system may utilize a plurality of freeze wells. A refrigerant is placed in the freeze wells. Heat transfers from the formation to the freeze wells. The refrigerant may be replenished or replaced to maintain the freeze wells at desired temperatures.

FIG. 391 depicts an embodiment of batch operated freeze well 2756. Freeze well 2756 may include casing 550, inlet conduit 2772, vent conduit 2774, and packing 2776. Packing 2776 may be formed near a top of where a low temperature zone is to be formed in a formation. In some embodiments, packing is not utilized. Inlet conduit 2772 and/or vent conduit 2774 may extend through packing 2776. Refrigerant 2778 may be inserted into freeze well 2756 through inlet conduit 2772. Inlet conduit 2772 may be insulated, or formed of an insulating material, to inhibit heat transfer to refrigerant 2778 as the refrigerant is transported through the inlet conduit. In an embodiment, inlet conduit 2772 is formed of high density polyethylene. Vapor generated by heat transfer between the formation and refrigerant 2778 may exit freeze well 2756 through vent conduit 2774. In some embodiments, a vent conduit may not be needed.

In some freeze well embodiments, a low temperature zone may be formed by batch operated freeze wells that do not include sealed casings. Portions of freeze wells may be open wellbores, and/or portions of the wellbores may include casings that have perforations or other types of openings. FIG. 392 depicts an embodiment of freeze well 2756 that includes an open wellbore portion. To use freeze wells that include open wellbore portions and/or perforations or other types of openings, water may be introduced into the freeze wells to fill fractures and/or pore space within the formation adjacent to the wellbore. A pump may be used to remove excess water from the wellbore. In some embodiments, addition of water into the wellbore may not be necessary. Cryogenic refrigerant 2778, such as liquid nitrogen, may be introduced into the wellbores to freeze material in the formation adjacent to the wellbores and seal any fractures or pore spaces of the formation that are adjacent to the freeze wells. Cryogenic refrigerant 2778 may be periodically replenished so that a frozen barrier is formed and maintained. Alternately, a less cold, less expensive fluid, (such as a dry ice and low freezing point liquid bath) may be substituted for the cryogenic refrigerant after evaporation or removal of the cryogenic refrigerant from the wellbores. The less cold fluid may be used to form and/or maintain the frozen barrier.

A need to replenish refrigerant may make the use of batch operated freeze wells economical only for forming a low temperature zone around a relatively small treatment area. The need to replenish refrigerant may allow for economical operation of batch operated freeze wells only for relatively short periods of time. Batch operated freeze wells may advantageously be able to form a frozen barrier in a short period of time, especially if a close freeze well spacing and a cryogenic fluid is used. Batch operated freeze wells may be able to form a frozen barrier even when there is a large fluid flow rate adjacent to the freeze wells. Batch operated freeze wells that use liquid nitrogen may be able to form a frozen barrier when formation fluid flows at a rate of up to about 20 m/day.

A circulated refrigeration system may utilize a plurality of freeze wells. A refrigerant may be circulated through the freeze wells and through a refrigeration unit. The refrigeration unit may cool the refrigerant to an initial refrigerant temperature. The freeze wells may be coupled together in series, parallel, or series and parallel combinations. The circulated refrigeration system may be a high volume system. When the system is initially started, the temperature difference between refrigerant entering a refrigeration unit and leaving a refrigeration unit may be relatively large (e.g., from about 10° C. to about 30° C.) and may quickly diminish. After formation of a frozen barrier, the temperature difference may be 1° C. or less. It may be desirable for the temperature of the circulated refrigerant to be very low after the refrigerant passes through a refrigeration unit so that the refrigerant will be able to form a thick low temperature zone adjacent to the freeze wells. An initial working temperature of the refrigerant may be −25° C., −40° C., −50° C., or lower.

FIG. 393 depicts an embodiment of a circulated refrigerant type of refrigeration system that may be used to form low temperature zone 2762 around treatment area 2750. The refrigeration system may include refrigeration units 2780, cold side conduit 2782, warm side conduit 2784, and freeze wells 2756. Cold side conduits 2782 and warm side conduits 2784 (as shown in FIG. 390) may be made of insulated polymer piping such as HDPE (high-density polyethylene). Cold side conduits 2782 and warm side conduits 2784 may couple refrigeration units 2780 to freeze wells 2756 in series, parallel, or series and parallel arrangements. The type of piping arrangement used to connect freeze wells 2756 to refrigeration units 2780 may depend on the type of refrigeration system, the number of refrigeration units, and the heat load required to be removed from the formation by the refrigerant.

In some embodiments, freeze wells 2756 may be connected to refrigeration conduits 2782, 2784 in a parallel configuration as depicted in FIG. 393. Cold side conduit 2782 may transport refrigerant from a first storage tank of refrigeration unit 2780 to freeze wells 2756. The refrigerant may travel through freeze wells 2756 to warm side conduit 2784. Warm side conduit 2784 may transport the refrigerant to a second storage tank of refrigeration unit 2780. Parallel configurations for refrigeration systems may be utilized when a low temperature zone extends for a long length (e.g., 50 m or longer). Several refrigeration systems may be needed to form a perimeter barrier around a treatment area.

In some embodiments, freeze wells may be connected to refrigeration conduits in parallel and series configurations. Two or more freeze wells may be coupled together in a series piping arrangement to form a group. Each group may be coupled in a parallel piping arrangement to the cold side conduit and the warm side conduit.

A circulated fluid refrigeration system may utilize a liquid refrigerant that is circulated through freeze wells. A liquid circulation system utilizes heat transfer between a circulated liquid and the formation without a significant portion of the refrigerant undergoing a phase change. The liquid may be any type of heat transfer fluid able to function at cold temperatures. Some of the desired properties for a liquid refrigerant are: a low working temperature, low viscosity, high specific heat capacity, high thermal conductivity, low corrosiveness, and low toxicity. A low working temperature of the refrigerant allows for formation of a large low temperature zone around a freeze well. A low working temperature of the liquid should be about −20° C. or lower. Fluids having low working temperatures at or below −20° C. may include certain salt solutions (e.g., solutions containing calcium chloride or lithium chloride). Other salt solutions may include salts of certain organic acids (e.g., potassium formate, potassium acetate, potassium citrate, ammonium formate, ammonium acetate, ammonium citrate, sodium citrate, sodium formate, sodium acetate). One liquid that may be used as a refrigerant below −50° C. is Freezium®, available from Kemira Chemicals (Helsinki, Finland). Another liquid refrigerant is a solution of ammonia and water with a weight percent of ammonia between about 20% and about 40%.

A refrigerant that is capable of being chilled below a freezing temperature of formation water may be used to form a low temperature zone. The following equation (the Sanger equation) may be used to model the time to needed to form a frozen barrier of radius R around a freeze well having a surface temperature of $T_s$:

$$t_1 = \frac{R^2 L_1}{4 k_f v_s}\left(2\ln\frac{R}{r_o} - 1 + \frac{c_{vf} v_s}{L_1}\right) \quad (78)$$

in which:

$$L_1 = L\frac{a_r^2 - 1}{2\ln a_r} c_{vu} v_o$$

$$a_r = \frac{R_A}{R}.$$

In these equations, $k_f$ is the thermal conductivity of the frozen material; $c_{vf}$ and $C_{vu}$ are the volumetric heat capacity of the frozen and unfrozen material, respectively; $r_o$ is the radius of the freeze well; $v_s$ is the temperature difference between the freeze well surface temperature $T_s$ and the freezing point of water $T_o$; $v_o$ is the temperature difference between the ambient ground temperature $T_g$ and the freezing point of water $T_o$; L is the volumetric latent heat of freezing of the formation; R is the radius at the frozen-unfrozen interface; and $R_A$ is a radius at which there is no influence from the refrigeration pipe. The temperature of the refrigerant is an adjustable variable that may significantly affect the spacing between refrigeration pipes.

FIG. 394 shows simulation results as a plot of time to reduce a temperature midway between two freeze wells to 0° C. versus well spacing using refrigerant at an initial temperature of −50° C. and using refrigerant at an initial temperature of −25° C. The formation being cooled in the simulation was 83.3 liters of liquid oil/metric ton Green River oil shale. The results for the −50° C. temperature refrigerant are denoted by reference numeral 2786. The results for the −25° C. temperature refrigerant are denoted by reference numeral 2788. This figure shows that reducing refrigerant temperature will reduce the time needed to form an interconnected low temperature zone sufficiently cold to freeze formation water. For example, reducing the initial refrigerant temperature from −25° C. to −50° C. may halve the time needed to form an interconnected low temperature zone for a given spacing between freeze wells.

In certain circumstances (e.g., where hydrocarbon containing portions of a formation are deeper than about 300 m), it may be desirable to minimize the number of freeze wells (i.e., increase freeze well spacing) to improve project economics.

Using a refrigerant that can go to low temperatures allows for the use of a large freeze well spacing.

EQN. 78 implies that a large low temperature zone may be formed by using a refrigerant having an initial temperature that is very low. To form a low temperature zone for in situ conversion processes for formations, the use of a refrigerant having an initial cold temperature of about −50° C. or lower may be desirable. Refrigerants having initial temperatures warmer than about −50° C. may also be used, but such refrigerants may require longer times for the low temperature zones produced by individual freeze wells to connect. In addition, such refrigerants may require the use of closer freeze well spacings and/or more freeze wells.

A refrigeration unit may be used to reduce the temperature of a refrigerant liquid to a low working temperature. In some embodiments, the refrigeration unit may utilize an ammonia vaporization cycle. Refrigeration units are available from Cool Man Inc. (Milwaukee, Wis.), Gartner Refrigeration & Manufacturing (Minneapolis, Minn.), and other suppliers. In some embodiments, a cascading refrigeration system may be utilized with a first stage of ammonia and a second stage of carbon dioxide. The circulating refrigerant through the freeze wells may be 30 weight % ammonia in water (aqua ammonia).

In some embodiments, refrigeration units for chilling refrigerant may utilize an absorption-desorption cycle. An absorption refrigeration unit may produce temperatures down to about −60° C. using thermal energy. Thermal energy sources used in the desorption unit of the absorption refrigeration unit may include, but are not limited to, hot water, steam, formation fluid, and/or exhaust gas. In some embodiments, ammonia is used as the refrigerant and water as the absorbent in the absorption refrigeration unit. Absorption refrigeration units are available from Stork Thermeq B.V. (Hengelo, The Netherlands).

A vaporization cycle refrigeration system may be used to form and/or maintain a low temperature zone. A liquid refrigerant may be introduced into a plurality of wells. The refrigerant may absorb heat from the formation and vaporize. The vaporized refrigerant may be circulated to a refrigeration unit that compresses the refrigerant to a liquid and reintroduces the refrigerant into the freeze wells. The refrigerant may be, but is not limited to, ammonia, carbon dioxide, or a low molecular weight hydrocarbon (e.g., propane). After vaporization, the fluid may be recompressed to a liquid in a refrigeration unit or refrigeration units and circulated back into the freeze wells. The use of a circulated refrigerant system may allow economical formation and/or maintenance of a long low temperature zone that surrounds a large treatment area. The use of a vaporization cycle refrigeration system may require a high pressure piping system.

FIG. 395 depicts an embodiment of freeze well 2756. Freeze well 2756 may include casing 550, inlet conduit 2772, spacers 2790, and wellcap 2792. Spacers 2790 may position inlet conduit 2772 within casing 550 so that an annular space is formed between the casing and the conduit. Spacers 2790 may promote turbulent flow of refrigerant in the annular space between inlet conduit 2772 and casing 550, but the spacers may also cause a significant fluid pressure drop. Turbulent fluid flow in the annular space may be promoted by roughening the inner surface of casing 550, by roughening the outer surface of inlet conduit 2772, and/or by having a small cross-sectional area annular space that allows for high refrigerant velocity in the annular space. In some embodiments, spacers are not used.

Refrigerant may flow through cold side conduit 2782 from a refrigeration unit to inlet conduit 2772 of freeze well 2756. The refrigerant may flow through an annular space between inlet conduit 2772 and casing 550 to warm side conduit 2784. Heat may transfer from the formation to casing 550 and from the casing to the refrigerant in the annular space. Inlet conduit 2772 may be insulated to inhibit heat transfer to the refrigerant during passage of the refrigerant into freeze well 2756. In an embodiment, inlet conduit 2772 is a high density polyethylene tube. In other embodiments, inlet conduit 2772 is an insulated metal tube.

FIG. 396 depicts an embodiment of circulated refrigerant freeze well 2756. Refrigerant may flow through U-shaped conduit 2794 that is suspended or packed in casing 550. Suspending conduit 2794 in casing 550 may advantageously provide thermal contraction and expansion room for the conduit. In some embodiments, spacers may be positioned at selected locations along the length of the conduit to inhibit conduit 2794 from contacting casing 550. Typically, preventing conduit 2794 from contacting casing 550 is not needed, so spacers are not used. Casing 550 may be filled with a low freezing point heat transfer fluid to enhance thermal contact and promote heat transfer between the formation, casing, and conduit 2794. In some embodiments, water or other fluid that will solidify when refrigerant flows through conduit 2794 may be placed in casing 550. The solid formed in casing 550 may enhance heat transfer between the formation, casing, and refrigerant within conduit 2794. Portions of conduit 2794 adjacent to the formation that are not to be cooled may be formed of an insulating material (e.g., high density polyethylene) and/or the conduit portions may be insulated. Portions of conduit 2794 adjacent to the formation that are to be cooled may be formed of a thermally conductive metal (e.g., copper or a copper alloy) to enhance heat transfer between the formation and refrigerant within the conduit portion.

In some freeze well embodiments, U-shaped conduits may be suspended or packed in open wellbores or in perforated casings instead of in sealed casings. FIG. 397 depicts an embodiment of freeze well 2756 having an open wellbore portion. Open wellbores and/or perforated casings may be used when water or other fluid is to be introduced into the formation from the freeze wells. Water may be introduced into the formation to promote formation of a frozen barrier. Water may be introduced into the formation through freeze wells during cleanup procedures after completion of an in situ conversion process (e.g., the freeze wells may be thawed and perforated for introduction of water). In some embodiments, open wellbores and/or perforated casings may be used when the freeze wells will later be converted to heat sources, production wells, and/or injection wells.

As depicted in FIG. 397, outlet leg 2796 of U-shaped conduit 2794 may be wrapped around inlet leg 2798 adjacent to a portion of the formation that is to be cooled. Wrapping outlet leg 2796 around inlet leg 2798 may significantly increase the heat transfer surface area of conduit 2794. Inlet leg and outlet leg adjacent to portions of the formation that are not to be cooled may be insulated and/or made of an insulating material. Conduits with an outlet leg wrapped around an inlet leg are available from Packless Hose, Inc. (Waco, Tex.).

A time needed to form a low temperature zone may be dependent on a number of factors and variables. Such factors and variables may include, but are not limited to, freeze well spacing, refrigerant temperature, length of the low temperature zone, fluid flow rate into the treatment area, salinity of the fluid flowing into the treatment area, and the refrigeration system type, or refrigerant used to form the barrier. The time needed to form the low temperature zone may range from about two days to more than a year depending on the extent and spacing of the freeze wells. In some embodiments, a time needed to form a low temperature zone may be about 6 to 8 months.

Spacing between adjacent freeze wells may be a function of a number of different factors. The factors may include, but are not limited to, physical properties of formation material, type of refrigeration system, type of refrigerant, flow rate of material into or out of a treatment area defined by the freeze wells, time for forming the low temperature zone, and economic considerations. Consolidated or partially consolidated formation material may allow for a large separation distance between freeze wells. A separation distance between freeze wells in consolidated or partially consolidated formation material may be from about 3 m to 10 m or larger. In an embodiment, the spacing between adjacent freeze wells is about 5 m. Spacing between freeze wells in unconsolidated or substantially unconsolidated formation material may need to be smaller than spacing in consolidated formation material. A separation distance between freeze wells in unconsolidated material may be 1 m or more.

Numerical simulations may be used to determine spacing for freeze wells based on known physical properties of the formation. A general purpose simulator, such as the Steam, Thermal and Advanced Processes Reservoir Simulator (STARS), may be used for numerical simulation work. Also, a simulator for freeze wells, such as TEMP W available from Geoslope (Calgary, Alberta), may be used for numerical simulations. The numerical simulations may include the effect of heat sources operating within a treatment area defined by the freeze wells.

A time needed to form a frozen barrier may be determined by completing a thermal analysis using a finite element model. FIG. 398 depicts results of a simulation using TEMP W for 83.3 liters of liquid oil/metric ton of Green River oil shale presented as temperature versus time for a formation cooled with a refrigerant that has an initial working temperature of −50° C. Curve 2800 depicts a representation of a temperature of an outer wall of a freeze well casing. Curve 2802 depicts a temperature midway between two freeze wells that are separated by about 7.6 m. Curve 2804 depicts temperature midway between two freeze wells that are separated by about 6.1 m. Curve 2806 depicts temperature midway between two freeze wells that are separated by about 4.6 m.

FIG. 398 illustrates that closer freeze well spacing decreases an amount of time required to form an interconnected low temperature zone capable of freezing formation water. The freeze well casing temperature decreased from about 14° C. to less than −40° C. in less than 200 days. In the same time frame, a temperature at a midpoint between two freeze wells with a 4.6 m spacing decreased from about 14° C. to −5° C. As the spacing between the freeze wells increased, the time needed to reduce a temperature at a midpoint between two freeze wells also increased. The plot indicates that shorter distances between adjacent freeze wells may decrease the time necessary to form an interconnected low temperature zone. The freeze wells in the simulation are similar to the freeze wells depicted in FIG. 395.

The use of a specific type of refrigerant may be made based on a number of different factors. Such factors may include, but are not limited to, the type of refrigeration system employed, the chemical properties of the refrigerant, and the physical properties of the refrigerant.

Refrigerants may have different equipment requirements. For example, cryogenic refrigerants (e.g., liquid nitrogen) may induce greater temperature differentials than a brine solution. A required flow rate for a circulated cryogenic refrigerant system may be substantially lower than a required flow rate for a brine solution refrigerant to achieve a desired temperature in a formation. A required volume of cryogenic refrigerant for a batch refrigeration system may be large. The use of a cryogenic refrigerant may result in significant equipment savings, but the cost of reducing refrigerant to cryogenic temperatures may make the use of a cryogenic refrigeration system uneconomical.

Fluid flow into a treatment area may inhibit formation of a frozen barrier. Formations having high permeability may have high fluid flow rates that inhibit formation of a frozen barrier. Fluid flow rate may limit a residence time of a fluid in a low temperature zone around a freeze well. If fluid is flowing rapidly adjacent to a freeze well, a residence time of the fluid proximate the freeze well may be insufficient to allow the fluid to freeze in a cylindrical pattern around the freeze well. Fluid flow rate may influence the shape of a barrier formed around freeze wells. A high flow rate may result in irregular low temperature zones around freeze wells. FIG. 399 depicts shapes of low temperature zones 2762 around freeze wells 2756 when formation water flows by the freeze wells at a rate that allows for formation of frozen barrier 2768. Direction of formation water flow is indicated by arrows 2808. As time passes, the frozen barrier may expand outwards from the freeze wells. If the formation water flow rate is high enough, the fluid may inhibit overlap of low temperature zones 2762 between adjacent wells, as depicted in FIG. 400. In such a situation, formation fluid would continue to flow into a treatment area and formation of a frozen barrier would be inhibited. To alleviate the problem of non-closure of the low temperature zone, additional freeze wells may be installed between the existing freeze wells, dewatering wells may be used to reduce formation fluid flow rate by the freeze wells to allow for formation of an interconnected low temperature zone, or other techniques may be used to reduce formation fluid flow to a rate that will allow low temperature zones from adjacent wells to interconnect so that a frozen barrier forms.

In some embodiments, fluid flow into a treatment area may be inhibited to allow formation of a frozen barrier by freeze wells. In an embodiment, dewatering wells may be placed in the formation to inhibit fluid flow past freeze wells during formation of a frozen barrier. The dewatering wells may be placed far enough away from the freeze wells so that the dewatering wells do not create a flow rate past the freeze wells that inhibits formation of a frozen barrier. In some embodiments, injection wells may be used to inject fluid into the formation so that fluid flow by the freeze wells is reduced to a level that will allow for formation of interconnected frozen barriers between adjacent freeze wells.

In an embodiment, freeze wells may be positioned between an inner row and an outer row of dewatering wells. The inner row of dewatering wells and the outer row of dewatering wells may be operated to have a minimal pressure differential so that fluid flow between the inner row of dewatering wells and the outer row of dewatering wells is minimized. The dewatering wells may remove formation water between the outer dewatering row and the inner dewatering row. The freeze wells may be initialized after removal of formation water by the dewatering wells. The freeze wells may cool the formation between the inner row and the outer row to form a low temperature zone. The power supplied to the dewatering wells may be reduced stepwise after the freeze wells form an interconnected low temperature zone that is able to solidify formation water. Reduction of power to the dewatering wells may allow some water to enter the low temperature zone. The water may freeze to form a frozen barrier. Operation of the dewatering wells may be ended when the frozen barrier is fully formed.

In some formations, a combination batch refrigeration system and circulated fluid refrigeration system may be used to form a frozen barrier when fluid flow into the formation is too high to allow formation of the frozen barrier using only the circulated refrigeration system. Batch freeze wells may be placed in the formation and operated with cryogenic refrigerant to form an initial frozen barrier that inhibits or stops fluid flow towards freeze wells of a circulated fluid refrigeration system. Circulation freeze wells may be placed on a side of the batch freeze wells towards a treatment area. The batch freeze wells may be operated to form a perimeter barrier that stops or reduces fluid flow to the circulation freeze wells. The circulation freeze wells may be operated to form a primary perimeter barrier. After formation of the primary frozen barrier, use of the batch freeze wells may be discontinued. Alternately, some or all of the batch operated freeze wells may be converted to circulation freeze wells that maintain and/or expand the initial barrier formed by the batch freeze wells. Converting some or all of the batch freeze wells to circulation freeze wells may allow a thick frozen barrier to be formed and maintained around a treatment area. In some embodiments, a combination of dewatering wells and batch operated freeze wells may be used to reduce fluid flow past circulation freeze wells so that the circulation freeze wells form a frozen barrier.

Open wellbore freeze wells may be utilized in some formations that have very low permeability. Freeze well wellbores may be formed in such formations. A frozen barrier may initially be formed using a very cold fluid, such as liquid nitrogen, that is placed in casings of the freeze wells. After the very cold fluid forms an interconnected frozen barrier around the treatment area, the very cold cryogenic fluid may be replaced with a circulated refrigerant that will maintain the frozen barrier during in situ processing of the formation. For example, liquid nitrogen at a temperature of about −196° C. may be used to form an interconnected frozen barrier around a treatment area by placing the liquid nitrogen within the freeze wells and replenishing the liquid nitrogen when necessary. The liquid nitrogen may be placed in an annular space between an inlet line and a casing in each freeze well. After the liquid nitrogen forms an interconnected frozen barrier between adjacent freeze wells, the liquid nitrogen may be removed from the freeze wells. A fluid, such as a low freezing point alcohol, may be circulated into and out of the freeze wells to raise the temperature adjacent to the freeze wells. When the temperature of the well casing is sufficiently high to inhibit refrigerant, such as a brine solution, from solidifying in the freeze wells, the fluid may be replaced with the refrigerant. The refrigerant may be used to maintain the frozen barrier.

FIG. 379 depicts freeze wells 2756 installed around treatment areas 2750. ICP wells 2754 may be installed in treatment areas 2750 prior to, simultaneously with, or after insertion of freeze wells 2756. In some embodiments, wellbores for ICP wells 2754 and/or freeze wells 2756 may be drilled into a formation. In other embodiments, wellbores may be formed when the wells are vibrationally inserted and/or driven into the formation. In some embodiments, well casings are formed of pipe segments. Connections between lengths of pipe may be self-sealing tapered threaded connections, and/or welded joints. In other embodiments, well casings may be inserted using coiled tubing installation. Integrity of coiled tubing may be tested before installation by hydrotesting at pressure.

Coiled tubing installation may reduce a number of welded and/or threaded connections in a length of casing. Welds and/or threaded connections in coiled tubing may be pretested for integrity (e.g., by hydraulic pressure testing). Coiled tubing may be installed more easily and faster than installation of pipe segments joined together by threaded and/or welded connections.

Embodiments of heat sources, production wells, and/or freeze wells may be installed in a formation using coiled tubing installation. Some embodiments of heat sources, production wells, and freeze wells include an element placed within an outer casing. For example, a conductor-in-conduit heater may include an outer casing with a conduit disposed in the casing. A production well may include a heater element or heater elements disposed within a casing. A freeze well may include a refrigerant inlet conduit disposed within a casing, or a U-shaped conduit disposed in a casing. Spacers may be spaced along a length of an element, or elements, positioned within a casing to inhibit the element, or elements, from contacting the casing walls.

In some embodiments of heat sources, production wells, and freeze wells, casings may be installed using coiled tube installation. Elements may be placed within the casing after the casing is placed in the formation for heat sources or wells that include elements within the casings. In some embodiments, sections of casings may be threaded and/or welded and inserted into a wellbore using a drilling rig. In some embodiments, elements may be placed within the casing before the casing is wound onto a reel. The elements within a casing are installed in a formation when the casing is installed in the formation. For example, a coiled tubing reel for forming a freeze well such as the freeze well depicted in FIG. 395 may include 8.9 cm (3.5 in.) outer diameter carbon steel coiled tubing with 5.1 cm (2 in.) outer diameter high density polyethylene tubing positioned inside the carbon steel tubing. During installation, a portion of the polyethylene tubing may be cut so that the polyethylene tubing will be recessed within the steel casing. A wellcap may be threaded and/or welded to the steel tubing to seal the end of the tubing. The coiled tubing may be inserted by a coiled tubing unit into the formation.

Care may be taken during design and installation of freeze well casing strings to allow for thermal contraction of the casing string when refrigerant passes through the casing. Allowance for thermal contraction may inhibit the development of stress fractures and leaks in the casing. If a freeze well casing were to leak, leaking refrigerant may inhibit formation of a frozen barrier or degrade an existing frozen barrier. Water or other diluent may be used to flush the formation to diffuse released refrigerant if a leak occurs.

Diameters of freeze well casings installed in a formation may be oversized as compared to a minimum diameter needed to allow for formation of a low temperature zone. For example, if design calculations indicate that 10.2 cm (4 in.) piping is needed to provide sufficient heat transfer area between the formation and the freeze wells, 15.2 cm (6 in.) piping may be placed in the formation. The oversized casing may allow a sleeve or other type of seal to be placed into the casing should a leak develop in the freeze well casing.

In some embodiments, flow meters may be used to monitor for leaks of refrigerant within freeze wells. A first flow meter may measure an amount of refrigerant flow into a freeze well or a group of wells. A second flow meter may measure an amount of flow out of a freeze well or a group of freeze wells. A significant difference between the measurements taken by the first flow meter and the second flow meter may indicate a leak in the freeze well or in a freeze well of the group of freeze wells. A significant difference between the measurements may result in the activation of a solenoid valve that inhibits refrigerant flow to the freeze well or group of freeze wells.

Freeze well placement may vary depending on a number of factors. The factors may include, but are not limited to, predominant direction of fluid flow within the formation; type of refrigeration system used; spacing of freeze wells; and characteristics of the formation such as depth, length, thickness, and dip. Placement of freeze wells may also vary across a formation to account for variations in geological strata. In some embodiments, freeze wells may be inserted into hydrocarbon containing portions of a formation. In some embodiments, freeze wells may be placed near hydrocarbon containing portions of a formation. In some embodiments, some freeze wells may be positioned in hydrocarbon containing portions while other freeze wells are placed proximate the hydrocarbon containing portions. Placement of heat sources, dewatering wells, and/or production wells may also vary depending on the factors affecting freeze well placement.

ICP wells may be placed a large distance away from freeze wells used to form a low temperature zone around a treatment area. In some embodiments, ICP wells may be positioned far enough away from freeze wells so that a temperature of a portion of formation between the freeze wells and the ICP wells is not influenced by the freeze wells or the ICP wells when the freeze wells have formed an interconnected frozen barrier and ICP wells have raised temperatures throughout a treatment area to pyrolysis temperatures. In some embodiments, ICP wells may be placed 20 m, 30 m, or farther away from freeze wells used to form a low temperature zone.

In some embodiments, ICP wells may be placed in a relatively close proximity to freeze wells. During in situ conversion, a hot zone established by heat sources and a cold zone established by freeze wells may reach an equilibrium condition where the hot zone and the cold zone do not expand towards each other. FIG. 401 depicts thermal simulation results after 1000 days when heat source 508 at about 650° C. is placed at a center of a ring of freeze wells 2756 that are about 9.1 m away from the heat source and spaced at about 2.4 m intervals. The freeze wells are able to maintain frozen barrier 2768 that extends over 1 m inwards towards the heat source. On an outer side of the freeze wells, the freeze barrier is much thicker, and the freeze wells influence portions (e.g., low temperature zone 2762) of the formation up to about 15 m away from the freeze wells.

Thermal diffusivities and other properties of both saturated frozen formation material and hot, dry formation material may allow operation of heat sources close to freeze wells. These properties may inhibit the heat provided by the heat sources from breaking through a frozen barrier established by the freeze wells. Frozen saturated formation material may have a significantly higher thermal diffusivity than hot, dry formation material. The difference in the thermal diffusivity of hot, dry formation material and cold, saturated formation material predicts that a cold zone will propagate faster than a hot zone. Fast propagation of a cold zone established and maintained by freeze wells may inhibit a hot zone formed by heat sources from melting through the cold zone during thermal treatment of a treatment area.

In some embodiments, a heat source may be placed relatively close to a frozen barrier formed and maintained by freeze wells without the heat source being able to break through the frozen barrier. Although a heat source may be placed close to a frozen barrier, heat sources are typically placed 5 m or farther away from a frozen barrier formed and maintained by freeze wells. In an embodiment, heat sources are placed about 30 m away from freeze wells. Since the heat sources may be placed relatively close to the frozen barrier, a relatively large section of a formation may be treated without an excessive number of freeze wells. A number of freeze wells needed to surround an area increases at a significantly lower rate than the number of ICP wells needed to thermally treat the surrounded area as the size of the surrounded area increases. This is because the surface-to-volume ratio decreases with the radius of a treated volume.

Measurable properties and/or testing procedures may indicate formation of a frozen barrier. For example, if dewatering is taking place on an inner side of freeze wells, the amount of water removed from the formation through dewatering wells may significantly decrease as a frozen barrier forms and blocks recharge of water into a treatment area.

A treatment area may be saturated with formation water. When a frozen perimeter barrier is formed around the treatment area, water recharge and removal from the treatment area is stopped. The frozen perimeter barrier may continue to expand. Expansion of the perimeter barrier may cause the hydrostatic head (i.e., piezometric head) in the treatment area to rise as compared to the hydrostatic head of formation outside of the frozen barrier. The hydrostatic head in the barrier may rise because the water in the formation is confined in an increasingly smaller volume as the frozen barrier expands inwards. The hydrostatic change may be relatively small, but still measurable. Piezometers placed inside and outside of a ring of freeze wells may be used to determine when a frozen barrier is formed based on hydrostatic head measurements.

In addition, transient pressure testing (e.g., drawdown tests or injection tests) in the treatment area may indicate formation of a frozen barrier. Such transient pressure tests may also indicate the permeability at the barrier. Pressure testing is described in *Pressure Buildup and Flow Tests in Wells* by C. S. Matthews & D. G. Russell (SPE Monograph, 1967).

A transient fluid pulse test may be used to determine or confirm formation of a perimeter barrier. A treatment area may be saturated with formation water after formation of a perimeter barrier. A pulse may be instigated inside a treatment area surrounded by the perimeter barrier. The pulse may be a pressure pulse that is produced by pumping fluid (e.g., water) into or out of a wellbore. In some embodiments, the pressure pulse may be applied in incremental steps, and responses may be monitored after each step. After the pressure pulse is applied, the transient response to the pulse may be measured by, for example, measuring pressures at monitor wells and/or in the well in which the pressure pulse was applied. Monitoring wells used to detect pressure pulses may be located outside and/or inside of the treatment area.

In some embodiments, a pressure pulse may be applied by drawing a vacuum on the formation through a wellbore. If a frozen barrier is formed, a portion of the pulse will be reflected by the frozen barrier back towards the source of the pulse. Sensors may be used to measure response to the pulse. In some embodiments, a pulse or pulses are instigated before freeze wells are initialized. Response to the pulses is measured to provide a base line for future responses. After formation of a perimeter barrier, a pressure pulse initiated inside of the perimeter barrier should not be detected by monitor wells outside of the perimeter barrier. Reflections of the pressure pulse measured within the treatment area may be analyzed to provide information on the establishment, thickness, depth, and other characteristics of the frozen barrier.

In certain embodiments, hydrostatic pressures will tend to change due to natural forces (e.g., tides, water recharge, etc.). A sensitive piezometer (e.g., a quartz crystal sensor) may be able to accurately monitor natural hydrostatic pressure changes. Fluctuations in natural hydrostatic pressure changes may indicate formation of a frozen barrier around a treatment area. For example, if areas surrounding the treatment area undergo natural hydrostatic pressure changes but the area enclosed by the frozen barrier does not, this is an indication of formation of the frozen barrier.

In some embodiments, a tracer test may be used to determine or confirm formation of a frozen barrier. A tracer fluid may be injected on a first side of a perimeter barrier. Monitor wells on a second side of the perimeter barrier may be operated to detect the tracer fluid. No detection of the tracer fluid by the monitor wells may indicate that the perimeter barrier is formed. The tracer fluid may be, but is not limited to, carbon dioxide, argon, nitrogen, and isotope labeled water or combinations thereof. A gas tracer test may have limited use in saturated formations because the tracer fluid may not be able to travel easily from an injection well to a monitor well through a saturated formation. In a water saturated formation, an isotope labeled water (e.g., deuterated or tritiated water) or a specific ion dissolved in water (e.g., thiocyanate ion) may be used as a tracer fluid.

If tests indicate that a frozen perimeter barrier has not been formed by the freeze wells, the location of incomplete sections of the perimeter barrier may be determined. Pulse tests may indicate the location of unformed portions of a perimeter barrier. Tracer tests may indicate the general direction in which there is an incomplete section of perimeter barrier.

Temperatures of freeze wells may be monitored to determine the location of an incomplete portion of a perimeter barrier around a treatment area. In some freeze well embodiments, such as in the embodiment depicted in FIG. 395 and FIG. 390, freeze well 2756 may include port 2810. Temperature probes, such as resistance temperature devices, may be inserted into port 2810. Refrigerant flow to the freeze wells may be stopped. Dewatering wells may be operated to draw fluid past the perimeter barrier. The temperature probes may be moved within ports 2810 to monitor temperature changes along lengths of the freeze wells. The temperature may rise quickly adjacent to areas where a frozen barrier has not formed. After the location of the portion of perimeter barrier that is unformed is located, refrigerant flow through freeze wells adjacent to the area may be increased and/or an additional freeze well may be installed near the area to allow for completion of a frozen barrier around the treatment area.

A typical hydrocarbon containing formation treated by a thermal treatment process may have a thick overburden. Average thickness of an overburden may be greater than about 20 m, 50 m, or 500 m. The overburden may provide a substantially impermeable barrier that inhibits vapor release to the atmosphere. ICP wells passing into the formation may include well completions that cement or otherwise seal well casings from surrounding formation material so that formation fluid cannot pass to the atmosphere adjacent to the wells.

In some embodiments of an in situ conversion process, heat sources may be placed in a hydrocarbon containing portion of the formation such that the heat sources do not heat sections of the hydrocarbon containing portion nearest to the ground surface to pyrolysis temperatures. The heat sources may heat a section of the hydrocarbon containing portion that is below the untreated section to pyrolysis temperatures. The untreated section of hydrocarbon containing material may be considered to be part of the overburden.

Some formations may have relatively thin overburdens over a portion of the formation. Some formations may have an outcrop that approaches or extends to ground surface. In some formations, an overburden may have fractures or develop fractures during thermal processing that connect or approach the ground surface. Some formations may have permeable portions that allow formation fluid to escape to the atmosphere when the formation is heated. A ground cover may be provided for a portion of a formation that will allow, or potentially allow, formation fluid to escape to the atmosphere during thermal processing.

A ground cover may include several layers. FIG. 402 depicts an embodiment of ground cover 2812. Ground cover 2812 may include fill material 2814 used to level a surface on which the ground cover is placed, first impermeable layer 2816, insulation 2818, framework 2820, and second impermeable layer 2822. Other embodiments of ground covers may include a different number of layers. For example, a ground cover may only include a first impermeable layer. In some embodiments, first impermeable layer 2816 may be formed of concrete, metal, plastic, clay, or other types of material that inhibit formation fluid from passing from the ground to the atmosphere.

Ground cover 2812 may be sealed to the ground, to ICP wells, to freeze wells, and to other equipment that passes through the ground cover. Ground cover 2812 may inhibit release of formation fluid to the atmosphere. Ground cover 2812 may also inhibit rain and run-off water seepage into a treatment area from the ground surface. The choice of ground cover material may be based on temperatures and chemicals to which ground cover 2812 is subjected. In embodiments in which overburden 524 is sufficiently thick so that temperatures at the ground surface are not influenced, or are only slightly elevated, by heating of the formation, ground cover 2812 may be a polymer sheet. For thinner overburdens 524, where heating the formation may significantly influence the temperature at ground surface, ground cover 2812 may be formed of metal sheet placed over the treatment area. Ground cover 2812 may be placed on a graded surface, and wellbores for ICP wells and freeze wells may be placed into the formation through the ground cover. Ground cover 2812 may be welded or otherwise sealed to well casings and/or other structures extending through the ground cover. If needed, insulation 2818 may be placed above or below ground cover 2812 to inhibit heat loss to the atmosphere.

Ground cover 2812 may include framework 2820. In certain embodiments, framework 2820 supports a portion of ground cover 2812. For example, framework 2820 may support second impermeable layer 2822, which may be a rain cover that extends over a portion or all of the treatment area. In other embodiments, framework 2820 supports well casings, walkways, and/or other structures that provide access to wells within the treatment area, so that personnel do not have to contact ground cover 2812 when accessing a well or equipment within the treatment area.

Perforated piping of a piping system may be placed in the ground or adjacent to the ground surface below a ground cover. The perforated piping may provide a path for transporting formation fluid passing through the formation towards the surface to treatment facilities. In other embodiments, a piping system may be connected to openings that pass through the ground cover. Blowers or other types of drive systems may draw formation fluid adjacent to the ground cover into the piping. Monitor wells may be placed through a ground cover at the ground surface. If the monitor wells detect formation fluid, the drive system may be activated to transport the fluid to a treatment facility.

Ground cover 2812 may be sealed to the ground. In an embodiment of an in situ conversion process, freeze wells 2756 are used to form a low temperature zone around the treatment area. A portion of the refrigerant capacity utilized in freeze wells 2756 may be used to freeze a portion of the formation adjacent to the ground surface. Ground cover 2812 may include a lip that is pushed into wet ground prior to formation of the low temperature zone. When the low temperature zone is formed, the freeze wells may freeze the ground and the ground cover together. Insulation may be placed over the frozen ground to inhibit heat absorption from the atmosphere. In other embodiments, a ground cover may be welded or otherwise sealed to a sheet barrier or a grout wall formed in the formation around the treatment area.

In some embodiments, an upper layer of a formation (e.g., an outcrop) that allows, or potentially allows, formation fluid to escape to the atmosphere during thermal treatment is excavated. The depth of the excavation opening created may be about ⅓ m, 1 m, 5 m, 10 m, or greater. Perforated piping of a piping system may be placed in the excavation and covered with a permeable layer such as sand and/or gravel. A concrete, clay, or other impermeable layer may be formed as a cover over the excavation opening. Alternately, a similar structure may be built on top of the ground to form an impermeable cover over a portion of a formation. The concrete, clay, or other impermeable layer may function as an artificial overburden.

A treatment area may be subjected to various processes sequentially. Treatment areas may undergo many different processes including, but not limited to, initial heating, production of hydrocarbons, pyrolysis, synthesis gas generation, storage of fluids, sequestration, remediation, use as a filtration unit, solution mining, and/or upgrading of hydrocarbon containing feed streams. Fluids may be stored in a formation as long term storage and/or as temporary storage during unusual situations such as a power failure or treatment facilities shutdown. Various factors may be used to determine which processes will be used in particular treatment areas. Factors determining the use of a formation may include, but are not limited to, formation characteristics such as type, size, hydrology, and location; economic viability of a process; available market for products produced from the formation; available treatment facilities to process fluid removed from the formation; and/or feedstocks for introduction into a formation to produce desired products.

For some processes, a low temperature zone may be used to isolate a treatment area. A treatment area surrounded by a low temperature zone may be used, in certain embodiments, as a storage area for fluids produced or needed on site. Fluids may be diverted from other areas of the formation in the event of an emergency. Alternatively, fluids may be stored in a treatment area for later use. A low temperature zone may inhibit flow of stored fluids from a treatment area depending on characteristics of the stored fluids. A frozen barrier zone may be necessary to inhibit flow of certain stored fluids from a treatment area. Other processes which may benefit from an isolated treatment zone may include, but are not limited to, synthesis gas generation, upgrading of hydrocarbon containing feed streams, filtration of feed stocks, and/or solution mining.

In some in situ conversion process embodiments, three or more sets of wells may surround a treatment area. FIG. 404B depicts a well pattern embodiment for an in situ conversion process. Treatment area 2750 may include a plurality of heat sources, production wells, and/or other types of ICP wells 2754. Treatment area 2750 may be surrounded by a first set of freeze wells 2756. The first set of freeze wells 2756 may establish a frozen barrier that inhibits migration of fluid out of treatment area 2750 during the in situ conversion process.

The first set of freeze wells 2756 may be surrounded by a set of monitor and/or injection wells 606. Monitor and/or injection wells 606 may be used during the in situ conversion process to monitor temperature and monitor for the presence of formation fluid (e.g., for water, steam, hydrocarbons, etc.). If hydrocarbons or steam are detected, a breach of the frozen barrier established by the first set of freeze wells 2756 may be indicated. Measures may be taken to determine the location of the breach in the frozen barrier. After determining the location of the breach, measures may be taken to stop the breach. In an embodiment, an additional freeze well or freeze wells may be inserted into the formation between the first set of freeze wells and the set of monitor and/or injection wells 606 to seal the breach.

The set of monitor and/or injection wells 606 may be surrounded by a second set of freeze wells 2756A. The second set of freeze wells 2756A may form a frozen barrier that inhibits migration of fluid (e.g., water) from outside the second set of freeze wells into treatment area 2750. The second set of freeze wells 2756A may also form a barrier that inhibits migration of fluid past the second set of freeze wells should the frozen barrier formed by the first set of freeze wells 2756 develop a breach. A frozen barrier formed by the second set of freeze wells 2756A may stop migration of formation fluid and allow sufficient time for the breach in the frozen barrier formed by the first set of freeze wells 2756 to be fixed. Should a breach form in the frozen barrier formed by the first set of freeze wells 2756, the frozen barrier formed by the second set of freeze wells 2756A may limit the area that formation fluid from the treatment area can flow into, and thus the area that needs to be cleaned after the in situ conversion process is complete.

If the set of monitor and/or injection wells 606 detect the presence of formation water, a breach of the second set of freeze wells 2756A may be indicated. Measures may be taken to determine the location of the breach in the second set of freeze wells 2756A. After determining the location of the breach, measures may be taken to stop the breach. In an embodiment, an additional freeze well or freeze wells may be inserted into the formation between the second set of freeze wells 2756A and the set of monitor and/or injection wells 606 to seal the breach.

In many embodiments, monitor and/or injection wells 606 may not detect a breach in the frozen barrier formed by the first set of freeze wells 2756 during the in situ conversion process. To clean the treatment area after completion of the in situ conversion processes, the first set of freeze wells 2756 may be deactivated. Fluid may be introduced through monitor and/or injection wells 606 to raise the temperature of the frozen barrier and force fluid back towards treatment area 2750. The fluid forced into treatment area 2750 may be produced from production wells in the treatment area. If a breach of the frozen barrier formed by the first set of freeze wells 2756 is detected during the in situ conversion process, monitor and/or injection wells 606 may be used to remediate the area between the first set of freeze wells 2756 and the second set of freeze wells 2756A before, or simultaneously with, deactivating the first set of freeze wells. The ability to maintain the frozen barrier formed by the second set of freeze wells 2756A after in situ conversion of hydrocarbons in treatment area 2750 is complete may allow for cleansing of the treatment area with little or no possibility of spreading contaminants beyond the second set of freeze wells 2756A.

The set of monitor and/or injection wells 606 may be positioned at a distance between the first set of freeze wells 2756 and the second set of freeze wells 2756A to inhibit the monitor and/or injection wells from becoming frozen. In some embodiments, some or all of the monitor and/or injection wells 606 may include a heat source or heat sources (e.g., an electric heater, circulated fluid line, etc.) sufficient to inhibit the monitor and/or injection wells from freezing due to the low temperature zones created by freeze wells 2756 and freeze wells 2756A.

In some in situ conversion process embodiments, a treatment area may be treated sequentially. An example of sequentially treating a treatment area with different processes includes installing a plurality of freeze wells within a formation around a treatment area. Pumping wells are placed proximate the freeze wells within the treatment area. After a low temperature zone is formed, the pumping wells are engaged to reduce water content in the treatment area. After the pumping wells have reduced the water content, the low temperature zone expands to encompass some of the pumping wells. Heat is applied to the treatment area using heat sources. A mixture is produced from the formation. After a majority of recoverable liquid hydrocarbons is recovered from the formation, synthesis gas generation is initiated. Following synthesis gas generation, the treatment area is used as a storage unit for fluids diverted from other treatment areas within the formation. The diverted fluids are produced from the treatment area. Before the low temperature zone is allowed to thaw, the treatment area is remediated. A first portion of a low temperature zone surrounding the pumping wells is allowed to thaw, exposing an unaltered portion of the formation. Water is provided to a second portion of a low temperature zone to form a frozen barrier zone. A drive fluid is provided to the treatment area through the pumping wells. The drive fluid may move some fluids remaining in the formation towards wells through which the fluids are produced. This movement may be the result of steam distillation of organic compounds, leaching of inorganic compounds into the drive fluid solution, and/or the force of the drive fluid "pushing" fluids from the pores. Drive fluid is injected into the treatment area until the removed drive fluid contains concentrations of the remaining fluids that fall below acceptable levels. After remediation of a treatment area, carbon dioxide is injected into the treatment area for sequestration.

An alternate example of formation use includes a plurality of freeze wells placed within a formation surrounding a treatment area. A low temperature zone may be formed around the treatment area. Pumping wells, heat sources, and production wells are disposed within the treatment area. Hot water, or water heated in situ by heat sources, may be introduced into the treatment area to solution mine portions of the formation adjacent to selected wells. After solution mining, the treatment area may be dewatered. The temperature of the treatment area may be raised to pyrolysis temperatures, and pyrolysis products may be produced from the treatment area.

After pyrolysis, the treatment area may be subjected to a synthesis gas generation process. After synthesis gas generation, the treatment area may be cleaned. A drive fluid (e.g., water and/or steam) may be introduced into the treatment area to remove (e.g., by steam distillation) hydrocarbons out of the treatment area. The drive fluid may be introduced into the treatment area from an outer perimeter of the treatment area. The drive fluid and any materials in front of, or entrained in, the drive fluid may be produced from production wells in the interior of the treatment area. After cleaning, the treatment area may be used as storage for selected products, as an emergency storage facility, as a carbon dioxide sequestration bed, or for other uses.

In certain embodiments, adjacent treatment areas may be undergoing different processes concurrently within separate low temperature zones. These differing processes may have varied requirements, for example, temperature and/or required constituents, which may be added to the section. In an embodiment, a low temperature zone may be sufficient to isolate a first treatment area from a second treatment area. An example of differing conditions required by two processes includes a first treatment area undergoing production of hydrocarbons at an average temperature of about 310° C. A second treatment area adjacent to the first may undergo sequestration, a process, which depending on the component being sequestered, may be optimized at a temperature less than about 100° C. Alternatively, providing a barrier to both mass and heat transfer may be necessary in some embodiments. A frozen barrier zone may be utilized to isolate a treatment area from the surrounding formation both thermally and hydraulically. For example, a first treatment area undergoing pyrolysis should be isolated both thermally and hydraulically from a second treatment area in which fluids are being stored.

As depicted in FIG. 403 and FIG. 404A, dewatering wells 1978 may surround treatment area 2750. Dewatering wells 1978 that surround treatment area 2750 may be used to provide a barrier to fluid flow into the treatment area or migration of fluid out of the treatment area into surrounding formation. In an embodiment, a single ring of dewatering wells 1978 surrounds treatment area 2750. In other embodiments, two or more rings of dewatering wells surround a treatment area. In some embodiments that use multiple rings of dewatering wells 1978, a pressure differential between adjacent dewatering well rings may be minimized to inhibit fluid flow between the rings of dewatering wells. During processing of treatment area 2750, formation water removed by dewatering wells 1978 in outer rings of wells may be substantially the same as formation water in areas of the formation not subjected to in situ conversion. Such water may be released with no treatment or minimal treatment. If removed water needs treatment before being released, the water may be passed through carbon beds or otherwise treated before being released. Water removed by dewatering wells 1978 in inner rings of wells may contain some hydrocarbons. Water with significant amounts of hydrocarbon may be used for synthesis gas generation. In some embodiments, water with significant amounts of hydrocarbons may be passed through a portion of formation that has been subjected to in situ conversion. Remaining carbon within the portion of the formation may purify the water by adsorbing the hydrocarbons from the water.

In some embodiments, an outer ring of wells may be used to provide a fluid to the formation. In some embodiments, the provided fluids may entrain some formation fluids (e.g., vapors). An inner ring of dewatering wells may be used to recover the provided fluids and inhibit the migration of vapors. Recovered fluids may be separated into fluids to be recycled into the formation and formation fluids. Recycled fluids may then be provided to the formation. In some embodiments, a pressure gradient within a portion of the formation may increase recovery of the provided fluids.

Alternatively, an inner ring of wells may be used for dewatering while an outer ring is used to reduce an inflow of groundwater. In certain embodiments, an inner ring of wells is used to dewater the formation and fluid is pumped into the outer ring to confine vapors to the inner area.

Water within treatment area 2750 may be pumped out of the treatment area prior to or during heating of the formation to pyrolysis temperatures. Removing water prior to or during heating may limit the water that needs to be vaporized by heat sources so that the heat sources are able to raise formation temperatures to pyrolysis temperatures more efficiently.

In some embodiments, well spacing between dewatering wells 1978 may be arranged in convenient multiples of heater and/or production well spacing. Some dewatering wells may be converted to heater wells and/or production wells during in situ processing of a hydrocarbon containing formation. Spacing between dewatering wells may depend on a number of factors, including the hydrology of the formation. In some embodiments, spacing between dewatering wells may be 2 m, 5 m, 10 m, 20 m, or greater.

A spacing between dewatering wells and ICP wells, such as heat sources or production wells, may need to be large. The spacing may need to be large so that the dewatering wells and the in situ process wells are not significantly influenced by each other. In an embodiment, a spacing between dewatering wells and in situ process wells may need to be 30 m or more. Greater or lesser spacings may be used depending on formation properties. Also, a spacing between a property line and dewatering wells may need to be large so that dewatering does not influence water levels on adjacent property.

In some embodiments, a perimeter barrier or a portion of a perimeter barrier may be a grout wall, a cement barrier, and/or a sulfur barrier. For shallow formations, a trench may be formed in the formation where the perimeter barrier is to be formed. The trench may be filled with grout, cement, and/or molten sulfur. The material in the trench may be allowed to set to form a perimeter barrier or a portion of a perimeter barrier.

Some grout, cement, or sulfur barriers may be formed in drilled columns along a perimeter or portion of a perimeter of a treatment area. A first opening may be formed in the formation. A second opening may be formed in the formation adjacent to the first opening. The second opening may be formed so that the second opening intersects a portion of the first opening along a portion of the formation where a barrier is to be formed. Additional intersecting openings may be formed so that an interconnected opening is formed along a desired length of treatment area perimeter. After the interconnected openings are formed, a portion of the interconnected opening adjacent to where a barrier is to be formed may be filled with material such as grout, cement, and/or sulfur. The material may be allowed to set to form a barrier.

In situ treatment of formations may significantly alter formation characteristics such as permeability and structural strength. Production of hydrocarbons from a formation corresponds to removal of hydrocarbon containing material from the formation. Heat added to the formation may, in some embodiments, fracture the formation. Removal of hydrocarbon containing material and formation of fractures may influence the structural integrity of the formation. Selected areas of a treatment area may remain untreated to promote structural integrity of the formation, to inhibit subsidence, and/or to inhibit fracture propagation.

FIG. 379 depicts a formation separated into a number of treatment areas 2750. Freeze wells 2756 surrounding treatment areas 2750 may form low temperature zones around the treatment areas. Formation material within the low temperature zones may be untreated formation material that is not exposed to high temperatures during an in situ conversion process. Formation water may be frozen in the low temperature zone. The frozen water may provide additional structural strength to the formation during the in situ conversion process. After completion of processing and use of a treatment area, maintenance of the low temperature zone may be ended and temperature of material within the low temperature zone may return to ambient conditions. The untreated formation material that was in the low temperature zone may provide structural strength to the formation. The regions of untreated formation may inhibit subsidence of the formation.

In some embodiments of in situ conversion processes, portions of a formation within a treatment area may not be subjected to temperatures high enough to pyrolyze or otherwise significantly change properties of the formation. Untreated portions of the formation may stabilize the formation and inhibit subsidence of the formation or overburden. In a treatment area, heat sources are generally placed in patterns with regular spacings between adjacent wells. The spacings may be small enough to allow superposition of heat between adjacent heat sources. The superposition of heat allows the formation to reach high temperatures. A regular pattern of heat sources may promote relatively uniform heating of the treatment area.

In some embodiments, a disruption of a regular heat source pattern may leave sections of formation within a treatment area unprocessed. A large distance may separate heat sources from sections of the formation that are to remain untreated. The distance should allow the untreated section to be minimally influenced by adjacent heat sources. The distance may be 20 m, 25 m, or greater. In an embodiment of an in situ treatment process that uses a triangular pattern of heat sources, a well unit (e.g., three heat sources) may be periodically omitted from the pattern to leave an untreated portion of formation when the formation is subjected to in situ conversion. In other embodiments, more wells than a single unit of wells may be omitted from the pattern (e.g., 4, 5, 6, or more heat source wells may be periodically omitted from an equilateral triangle heat source pattern).

In some embodiments, selected wellbores of a regular heat source pattern may be utilized to maintain untreated sections of formation within the pattern. A heat transfer fluid may be placed or circulated within casings placed in the selected wellbores. The heat transfer fluid may maintain adjacent portions of the formation at low enough temperatures that allow the portions to be uninfluenced or minimally influenced by heat provided to the formation from adjacent heat sources. The use of selected wellbores to maintain untreated portions of the formation within a treatment area may advantageously eliminate the need to make wellbore pattern alterations during well installation.

In some embodiments, water may be used as a heat transfer fluid placed or circulated in selected casings to maintain untreated portions of a formation. In some embodiments, the heat transfer fluid circulated in selected casings to maintain untreated portions of formation may include refrigerant utilized to form a low temperature zone around a treatment area. The refrigerant may be circulated in the selected wells prior to initiation of formation heating so that low temperature zones are formed around the selected freeze wells. Water in the formation may freeze in columns around the selected wells. Heating of the formation may reduce the size of the columns around the freeze wells, but the freeze wells should maintain frozen, untreated portions of the formation within a heated portion of the formation. The untreated portions may provide structural strength to the formation during an in situ conversion process and after the in situ conversion process is completed.

Vapor processing facilities that treat production fluid from a formation may include facilities for treating generated hydrogen sulfide and other sulfur containing compounds. The sulfur treatment facilities may utilize a modified Claus process or other process that produces elemental sulfur. Sulfur may be produced in large quantities at an in situ conversion process site.

Some of the sulfur produced may be liquefied and placed (e.g., injected) in a spent formation. Stabilizers and other additives may be introduced into the sulfur to adjust the properties of the sulfur. For example, aggregate such as sand, corrosion inhibitors, and/or plasticizers may be added to the molten sulfur. U.S. Pat. No. 4,518,548 and U.S. Pat. No.

4,428,700, which are both incorporated by reference as if fully set forth herein, describe sulfur cements.

A spent formation may be highly porous and highly permeable. Liquefied sulfur may diffuse into pore space within the formation formed by thermally processing hydrocarbons within the formation. The sulfur may solidify in the formation when the sulfur cools below the melting temperature of sulfur (approximately 115° C.). Solidified sulfur may provide structural strength to the formation and inhibit subsidence of the formation. Solidified sulfur in pore spaces within the formation may provide a barrier to fluid flow. If needed at a future time, sulfur may be produced from the formation by heating the formation and removing the sulfur from the formation.

In some in situ conversion process embodiments, molten sulfur may be placed in a formation to form a perimeter barrier around a portion of the formation to be subjected to pyrolysis. The perimeter barrier formed by solidified sulfur may provide structural strength to the formation. The perimeter barrier may need to be located a large distance away from ICP wells used during in situ conversion so that heat applied to the treatment area does not affect the sulfur barrier. In some embodiments, the perimeter barrier may be 20 m, 30 m, or farther away from heat sources of an in situ conversion process system.

Sulfur barriers may be used in conjunction with a low temperature zone formed by freeze wells. A low temperature zone, or freeze wall, may be formed to provide a barrier to fluid flow into or out of a treatment area that is subjected to an in situ conversion process. The low temperature zone may also provide structural strength to the formation being treated. After the treatment area is processed, water or other fluid may be introduced into the formation to remediate any contaminants within the treatment area. Heat may be recovered from the formation by removing the water or other fluid from the formation and utilizing the heat transferred to the water or fluid for other purposes. Recovering heat from the formation may reduce the temperature of the formation to a temperature in the vicinity of the melting temperature of sulfur adjacent to the low temperature zone.

After a temperature of the treatment area is reduced to about the temperature of molten sulfur, molten sulfur may be introduced into the formation adjacent to the low temperature zone formed by freeze wells, and the molten sulfur may be allowed to diffuse into the formation. In the embodiment depicted in FIG. 382, the molten sulfur may be introduced into the formation through dewatering well 1978. The molten sulfur may solidify against the frozen barrier formed by freeze well 2756. After solidification of the sulfur, maintenance of the low temperature zone may be reduced or stopped.

Solid sulfur within pore spaces may inhibit fluid from migrating through the sulfur barrier. For example, carbon dioxide may be adsorbed onto carbon remaining in a formation that has been processed using an in situ conversion process. If water migrates into the formation, the water may desorb the stored carbon dioxide from the formation. Sulfur injected into wells may solidify in pore spaces within the formation to form a sulfur cement barrier. The sulfur cement barrier may inhibit water migration into the formation. The barrier formed by the sulfur may inhibit removal of stored carbon dioxide from the formation. In some embodiments, sulfur may be introduced throughout a formation instead of just as a perimeter barrier. Sulfur may be stored or used to inhibit subsidence of the formation.

In some instances, shut-in management of the in situ treatment of a formation may become necessary. "Shut-in" may be a reduction or complete termination of production from a formation undergoing in situ treatment. Adverse events of any kind and/or scheduled maintenance may require shut-in of an in situ treatment process. For example, adverse events may include malfunctioning or nonfunctioning treatment facilities, lack of transport facilities to move products away from the project, breakthrough to the surface or an aquifer, and/or sociopolitical events not directly related to a project.

Generally, thermal conduction and conversion of hydrocarbons during in situ treatment are relatively slow processes. Therefore, shut-in of production may require a relatively long period of time. For example, at least some hydrocarbons in the formation may continue to be converted for months or years after heating from the heat sources is terminated. Consequently, hydrocarbons and other vapors may continue to be generated, accompanied by a build up of fluid pressure in the formation. Fluid pressure in the formation may exceed the fracturing strength of the formation and create fractures. As a result, hydrocarbons and other vapors, which may include hydrogen sulfide, may migrate through the fractures to the surrounding formation, potentially reaching groundwater or the surface.

Shut-in management of an in situ treatment process may include a variety of steps that alleviate problems associated with shut-in of the process. In one embodiment, substantially all heating from heat sources, including heater wells and thermal injection, may be terminated. Termination of heating is particularly important if the adverse event or shut down may be of long duration. In addition, substantially all hydrocarbon vapors generated may be produced from the formation. The produced hydrocarbon vapors may be flared. "Flaring" is oxidation or burning of fluids produced from a formation. It is particularly advantageous for complete combustion of $H_2S$ to take place. Furthermore, it is desirable to flare methane since methane may be a much stronger greenhouse gas than $CO_2$.

In certain embodiments, the fluid pressure in the formation may be maintained below a safe level. The safe fluid pressure level may be below an established threshold at which fracturing and breakthrough occur in the formation. The fluid pressure in the formation may be monitored by several methods, for example, by passive acoustic monitoring to detect fracturing. "Passive acoustic monitoring" detects and analyzes microseismic events to determine fracturing in a formation. In an embodiment, a short term response to excessive pressure build up may be to release formation fluids to other storage (e.g., a spent, cool portion of the formation). Alternatively, formation fluids may be flared.

In some embodiments, produced formation fluid may be injected and stored in spent formations. A spent formation may be retained specifically for receiving produced fluids should a shut-in situation arise. Fluid communication between the spent formation and the surrounding formation may be limited by a barrier (e.g., a frozen barrier, a sulfur barrier, etc.). The barrier may inhibit flow of the produced formation fluid from the spent formation. In an embodiment, the temperature of the spent formation may be low enough to condense a substantial portion of condensable fluids. There may be a corresponding decrease in fluid pressure as formation fluid condenses in the spent formation. The decrease in fluid pressure and volume reduction may increase storage capacity of the spent formation. In an embodiment, subsequent heating of the spent formation may allow substantially complete recovery of stored hydrocarbons.

In certain embodiments, produced formation fluid may be injected into relatively high temperature formations. The formation may have portions with an average temperature high enough to convert a substantial portion of the injected formation fluid to coke and $H_2$. $H_2$ may be flared to produce water vapor in some embodiments.

In an embodiment, produced formation fluid may be injected into partially produced or depleted formations. The depleted formations may include oil fields, gas fields, or water zones with established seal and trap integrity. The trapped formation fluid may be recovered at a later time. In other embodiments, formation fluid may be stored in surface storage units.

FIG. 418 is a flow chart illustrating options for produced fluids from a shut-in formation. Stream 2824 may be produced from shut-in formation 2826. Stream 2824 may be injected into cooled spent formation 2828. Formation 2828 may be reheated at a later time to produce the stored formation fluid, as shown by stream 2830. In addition, stream 2824 may be injected into hot formation 2832. A substantial portion of the fluids injected into formation 2832 may be converted to coke and $H_2$. The $H_2$ may be produced from formation 2832 as stream 2834 and flared. Alternatively, stream 2824 may be injected into depleted oil or gas field or water zone 2836. Injected formation fluid may be produced at a later time, as stream 2838 illustrates. Furthermore, stream 2824 may be stored in surface storage facilities 2840.

After completion of an in situ conversion process, formations may be subjected to additional treatment processes in preparation for abandonment. Processes which may be performed in a formation may include, but are not limited to, recovery of thermal energy from the formation, removal of fluids generated during the in situ conversion process through injection of a fluid (water, carbon dioxide, drive fluid), and/or recovery of thermal energy from a frozen barrier or freeze well.

Thermal energy may be recovered from formations through the injection of fluids into the formation. Fluids may be injected and/or removed through existing heater wells, dewatering wells, and/or production wells. In some embodiments, a portion of a formation subjected to an in situ conversion process may be at an average temperature greater than about 300° C. The portion of the formation may have a relatively high porosity (e.g., greater than about 20%) and a permeability greater than about 0.3 darcy (e.g., 0.4 darcy, 0.6 darcy, 0.9 darcy, 1 darcy, or greater) due to the removal of hydrocarbons from the formation and thermal fracturing of the formation. The increased porosity and permeability of the section may reduce the number of wells needed to inject and recover fluid. For example, water may be provided to or be removed from the formation using heater wells that allow, or have been reworked to allow, fluid communication between the well and the surrounding formation.

In some embodiments, fresh water may be injected into the formation. Alternatively, non-potable water, hydrocarbon containing water, brine, acidic water, alkaline water, or combinations thereof may be injected into the formation. Compounds in the water may be left within the formation after the water is vaporized by heat within the formation. Some compounds within the water may be absorbed and/or adsorbed onto remaining material within the formation. Introduction of several pore volumes of water may be needed to lower the average temperature in the formation below the boiling point of water. In an embodiment, water injection may include geothermal well and other technologies developed for utilizing the steam production from high temperature subterranean formations.

In certain embodiments, applications of steam recovered from the formation may include direct use for power generation and/or use as sensible energy in heat exchange mechanisms. In particular, thermal energy from recovered steam may be used in project treatment facilities (e.g., in heat exchange units, in the desalinization process, or in the distillation of produced water). The thermal energy from recovered steam may be used for solution mining of nearby mineral resources (e.g., nahcolite, sulfur, phosphates, etc). Thermal energy from recovered steam may also be used in external industrial applications, such as applications that require the use of large volumes of steam. In addition, thermal energy from recovered steam may be used for municipal purposes (e.g., heating buildings) and for agricultural purposes (e.g., heating hothouses or processing products).

In an in situ conversion process embodiment during a time prior to abandonment, substantially non-reactive gas (e.g., carbon dioxide) may be used as a heat recovery fluid. The substantially non-reactive gas may be injected into the formation and heat within the formation may be transferred to the substantially non-reactive gas. In some embodiments, the substantially non-reactive gas may recover a substantial portion of residual treatment fluids (e.g., low molecular weight hydrocarbons). The treatment fluids may be separated from the substantially non-reactive gas at the surface of the formation. For example, some carbon dioxide may be adsorbed onto the surface of the formation, displacing low molecular weight hydrocarbons. In an embodiment, carbon dioxide adsorbed onto formation surfaces during use as a heat recovery fluid may be sequestered within the formation. After completion of heat recovery, additional carbon dioxide may be provided to the formation and adsorbed in formation pore spaces for sequestration.

In an in situ conversion process embodiment, recovery of stored heat in a formation with injected substantially non-reactive gas may require more pore volumes of gas than would have been required had water been used as the heat recovery fluid. This may be due to gases generally having lower sensible heats than liquids. In addition, substantially non-reactive gas injection may require initial compression of the injected gas stream. However, injection and recovery in the gas phase may be easier than in the liquid phase. In certain embodiments, recovery of heat from the formation may combine injection of water and substantially non-reactive gas. For example, substantially non-reactive gas injection may be performed first, followed by water injection.

In some embodiments, the formation may be cooled such that an average temperature of the formation is at least below the ambient boiling temperature of water. Injection and recovery of fluid may be repeated until the average temperature of the formation is below the ambient boiling point at the fluid pressure in the formation.

FIG. 405 illustrates a schematic of an embodiment of heat recovery from a formation previously subjected to an in situ conversion process. FIG. 405 includes formation 2842 with heat recovery fluid injection wellbore 2844 and production wellbore 2846. The wellbores may be members of a larger pattern of wellbores placed throughout a portion of the formation. The temperature in heated portions of the formation that are to be cooled may be between about 300° C. and about 1000° C. Thermal energy may be recovered from the heated portions of the formation by injecting a heat recovery fluid. Heat recovery fluid 2848, such as water and/or carbon dioxide, may be injected into wellbore 2844. A portion of injected water may be vaporized to form steam. A portion of injected carbon dioxide may adsorb on the surface of the carbon in the formation. Gas mixture 2850 may exit continuously from wellbore 2846. Gas mixture 2850 may include the heat recovery fluid (e.g., steam or carbon dioxide), hydrocarbons, and/or components. Components and hydrocarbons may be separated from the gas mixture in a treatment facility. The heat recovery fluid may be recycled back into the formation.

In an in situ conversion process embodiment, heat recovery from the formation may be performed in a batch mode. Injection of the heat recovery fluid may continue for a period of time (e.g., until the pore volume of the portion of the formation is substantially filled). After a selected period of time subsequent to ceasing injection of heat recovery fluid, gas mixture 2850 may be produced from the formation through wellbore 2846. In an embodiment, the gas mixture may also exit through wellbore 2844. The selected period of time may be, in some embodiments, about one month.

In one embodiment, gas mixture 2850 may be fed to surface separation unit 2852. Separation unit 2852 may separate gas mixture 2850 into heat recovery fluid 2854 and hydrocarbons and components 2856. The heat recovery fluid may be used in power generation units 1798 or heat exchange mechanisms 2858. In another embodiment, gas mixture 2850 may be fed directly from the formation to power generation units or heat exchange mechanisms. Injection of the heat recovery fluid may be continued until a portion of the formation reaches a desired temperature. For example, if water is used as the heat recovery fluid, water injection may continue until the formation cools to, or is at a temperature below, the boiling point of water at formation pressure.

Thermal processing and increasing the permeability of a formation may allow some components (e.g., hydrocarbons, metals and/or residual formation fluids) in the formation to migrate from a treatment area to areas adjacent to the formation. Such components may be created during thermal processing of the formation. Such components may be present in higher quantities if the formation is not subjected to a synthesis gas generation cycle after pyrolysis. In one embodiment, a recovery fluid may be introduced into the formation to remove some of the components. The recovery fluid may be provided to the formation prior to and/or after cooling of the formation has begun. The recovery fluid may include, but is not limited to, water, steam, hydrogen, carbon dioxide, air, hydrocarbons (e.g., methane, ethane, and/or propane), and/or a combustible gas. The provided recovery fluid may be recycled from another portion of the formation, another formation, and/or the portion of the formation being treated.

In some embodiments, a portion of the recovery fluid may react with one or more materials in the formation to volatize and/or neutralize at least some of the material. In some embodiments, the recovery fluid may force components in the formation to be produced. After production the recovery fluid may be provided to an energy producing unit (e.g. turbine or combustor). For example, methane may be provided to a portion of the formation. Heat within the formation may transfer to the methane. The methane may cause production of a mixture including heavier hydrocarbons (e.g., BTEX compounds). The mixture may be provided to a turbine, where some of the mixture is combusted to produce electricity. In some embodiments, water may be provided to the formation as a recovery fluid. Steam produced from the water may entrain, distill, and/or drive components within the formation to production wells. In an embodiment, organic components may be produced from the formation either by steam distillation and/or entrainment in steam. In some embodiments, inorganic components may be entrained and produced in condensed water in the formation. Water injection and steam recovery may be continued until safe and permissible levels of components are achieved. Removal of these components may occur after an in situ conversion process is complete.

Remediation within a treatment area surrounded by a barrier (e.g., a frozen barrier) may inhibit the migration of components from the treatment area to the surrounding formation. A plurality of freeze wells 2756 may be used to form frozen barrier 2768 and define a volume to be treated within hydrocarbon containing material 2860, as illustrated in FIG. 406. Frozen barrier 2768 may inhibit fluid flow into or out of treatment area 2862. In an in situ conversion process embodiment, a recovery fluid may be introduced into the formation near freeze wells 2756 after treatment is complete. Injection wells 606 used for injection of the recovery fluid may include, but are not limited to, pumping wells, heat sources, freeze wells, dewatering wells, and/or production wells that have been converted into injection wells. In certain embodiments, wells used previously may have a sealed casing. The sealed casing may be perforated to permit fluid communication between the well and the surrounding formation. Recovery fluid may move some of the components in the formation towards one or more removal wells 2864. Removal wells 2864 may include wells that were converted from heat sources and/or production wells. In some embodiments, a recovery fluid may be introduced into a treatment area through an innermost production well, or a production well ring, that is converted into an injection well.

In some embodiments, the recovery fluid may be introduced into the formation after the frozen barrier zone has been partially thawed. When thawing the frozen barrier, thermal energy may be removed from the frozen barrier by circulating various fluids through the freeze well. For example, a warm refrigerant may be injected into the freeze well system to be cooled and used in a surface treatment unit, a freeze well system, and/or other treatment area. As the temperature within the freeze well increases, various other fluids (e.g., water, substantially non-reactive gas, etc.) may be utilized to raise the temperature of the freeze well. Thawed freeze wells that are exposed may be converted for use as injection wells 606 to introduce recovery fluid into the formation. Introduction of the recovery fluid may heat the region adjacent to the inner row of freeze wells to an average temperature of less than a pyrolysis temperature of hydrocarbon material in the formation. The heat from the recovery fluid may move mobilized hydrocarbon and inorganic components. Movement of the hydrocarbon and inorganic components may be due in part to steam distillation of the fluids and/or entrainment. Introducing the recovery fluid at a point where the formation was previously frozen ensures that the hydrocarbon material at the injection well is unaltered. The unaltered hydrocarbon material may be essentially in its original natural state. As such, the injected fluid may move from a natural zone to the previously treated area and be produced. Thus, fluids formed during the treatment are removed without spreading such fluids to other areas outside of the treatment area. Alternatively, any well previously frozen in a frozen barrier zone, such as a pumping well, may be thawed and used as an injection well.

A volume of recovery fluid required to remediate a treatment area may be greater than about one pore volume of the treatment area. Two pore volumes or more of recovery fluid may be introduced to remediate the treatment area. In certain embodiments, injection of a recovery fluid to remediate a treatment area may continue until concentrations of components in the removed recovery fluid are at acceptable levels deemed appropriate for a site. These acceptable levels may be based on base line surveys, regulatory requirements, future potential uses of the site, geology of the site, and accessibility. After one or more components within a treatment area are removed or reduced to acceptable levels, the treatment system for the formation, including the freeze wells, may be deactivated. If a new barrier zone around a new treatment area is to be formed, heat may be transferred between hydrocarbon containing material, in which a new barrier zone is to be formed, and the initial freeze wells using a circulated heat transfer fluid. Using deactivated freeze wells to cool hydrocarbon containing material in which a low temperature zone is to be formed may allow for recovery of some of the energy expended to form and maintain the initial barrier. In addition, using thermal energy extracted from the initial barrier to cool hydrocarbon material in which a new barrier zone is to be formed may significantly decrease a cost of forming the new barrier. In some treatment system embodiments, a low temperature zone may be allowed to reach thermal equilibrium with a surrounding formation naturally.

In some in situ conversion process embodiments, the frozen barrier may include an inner ring of freeze wells directly adjacent to the treatment area and an outer ring of freeze wells directly adjacent to the untreated area. A region of the formation near the freeze wells may remain at a temperature below the freezing point of water during pyrolysis and synthesis gas generation. In an embodiment, organic components from pyrolysis may migrate through thermal fractures to a region adjacent to the inner row of freeze wells. The contaminants may become immobilized in fractures and pores in the region due to the relatively low temperatures of the region.

Migration of contaminants from the treatment area may be reduced or prevented by inhibiting groundwater flow through the treatment area. For example, groundwater flow may be inhibited using a barrier such as a freeze wall and/or sulfur barriers. As a result, migration of contaminants may be reduced or eliminated even if contaminants were dissolved in formation pore water. In addition, it may be advantageous to inhibit groundwater flow to maintain a reduced state within the formation. Oxidized metals introduced into the formation from groundwater flow tend to have greater mobility and may be more likely to be released.

An embodiment for inhibiting migration of contaminants may also include sealing off the mineral matrix and residual carbon by precipitation or evaporation of a sealing mineral phase. The sealing mineral phase may inhibit dissolution of contaminants of fluids in the formation into groundwater.

Carbon dioxide may be produced during an in situ conversion process or during processing of the products produced by the in situ conversion process (e.g., combustion). Control and/or reduction of carbon dioxide production from an in situ conversion process may be desirable. "Carbon dioxide life cycle emissions," as used herein, is defined as the amount of $CO_2$ emissions from a product as it is produced, transported, and used.

A base line $CO_2$ life cycle emission level may be selected for products produced from an in situ conversion process. The formation conditions and/or process conditions may be altered to produce products to meet the selected $CO_2$ base line life cycle emission level. In some embodiments, in situ conversion products may be blended to meet a selected $CO_2$ base line life cycle emission level. The $CO_2$ life cycle emission level of a selected product is defined as a number of kilograms of $CO_2$ per joule of energy (kg $CO_2$/J).

A hydrogen cycle, a half-way cycle, and a methane cycle are examples of processes that may be used to produce products with selected $CO_2$ emission levels less than the total $CO_2$ emission level that would be produced by direct production of natural gas from a gas reservoir. In certain embodiments, products may be combined to produce a product with a selected $CO_2$ emission level less than the total $CO_2$ emission from direct production of natural gas. In other embodiments, cycles may be blended to produce products with a $CO_2$ emission level less than the total $CO_2$ emission from direct production of natural gas. For example, in an embodiment, a methane cycle may be used in one part of a production field and a half-way cycle may be used in another part of the production field. The products produced from these two processes may be blended to produce a product with a selected $CO_2$ emission level. In other embodiments, other combinations of products from the hydrogen cycle, the half-way cycle, and the methane cycle may be used to produce a product with a selected $CO_2$ emission level.

In an in situ conversion process embodiment, a formation may be treated such that hydrocarbons in the formation are converted to a desired product. The product may be produced from the formation. In some in situ conversion process embodiments, the in situ conversion process may be operated to produce a limited amount of carbon dioxide.

In an in situ conversion process embodiment, the in situ conversion process may be operated so that a substantial portion of the product is molecular hydrogen. There may be little or no hydrocarbon fluid recovery. An in situ conversion process that operates at a high temperature to produce a substantial portion of hydrogen may be a "hydrogen cycle process." A portion of the hydrogen produced during the hydrogen cycle process may be used to fuel heat sources that raise and/or maintain a temperature within the formation to a high temperature.

During a hydrogen cycle process, a production well and formation adjacent to the production well may be heated to temperatures greater than about 525° C. At such temperatures, a substantial portion of hydrocarbons present or that flow into the production well and formation adjacent to the production well may be reduced to hydrogen and coke. There may be minimal or no production of carbon dioxide or hydrocarbons. Hydrocarbons in formation fluid produced from the formation may be recycled back into the formation through injection wells to produce hydrogen and coke. Hydrogen produced from a hydrogen cycle process may be produced through heated production wells in the formation. A portion of the produced hydrogen may be used as a fuel for heat sources in the formation. A portion of the hydrogen may be sold or used in fuel cells. In some embodiments, coke produced during a hydrogen cycle process may slowly fill pore space within the formation adjacent to the production well. The coke may provide structural strength to the formation. In some embodiments, the production wells may be treated (e.g., by introducing steam to generate synthesis gas) to remove a portion of formed coke and allow for production of formation fluid. In some embodiments, a coked production well may be blocked, and formation fluid may be produced from other production wells.

A hydrogen cycle may allow for very low $CO_2$ life cycle emission levels. In some embodiments, a hydrogen cycle process may have a $CO_2$ life cycle emission level of about $3.3\times10^{-9}$ kg $CO_2$/J. In other embodiments, a $CO_2$ life cycle emission level of the hydrogen cycle process may be less than about $1.6\times10^{-10}$ kg $CO_2$/J.

In an in situ conversion process embodiment, a portion of formation may be treated to produce a product that is substantially a mixture of molecular hydrogen and methane. There may be little or no other hydrocarbons (i.e., ethane, propane, etc.). A process of converting hydrocarbons in a formation to a product that is substantially molecular hydrogen and methane may be referred to as a "half-way cycle process." A portion of the product may be used as a fuel for heat sources that heat the formation to maintain and/or increase the formation temperature.

During a half-way cycle, production wells and formation adjacent to the production wells may be heated to temperatures from about 400° C. to about 525° C. A substantial portion of hydrocarbons present or that flow into the production wells or formation adjacent to the production wells may be reduced to molecular hydrogen and methane. The hydrogen and methane may be produced as a mixture from the production wells. Produced hydrocarbons having carbon numbers greater than one may be recycled back into the formation through injection wells to generate hydrogen and methane. Formation adjacent to the production wells may slowly coke up during a half-way cycle. When production through a production well falls below a certain level, the production well may be blocked in. In some embodiments, the production well may be treated (e.g., by introducing steam to generate synthesis gas) to remove a portion of the coke and allow for increased production through the well.

In an embodiment of a half-way cycle process, produced hydrogen and methane may be separated from other produced fluid. A portion of the hydrogen and methane may be used as a fuel for heat sources. Further, hydrogen may be separated from the methane of a portion not used as fuel. In some embodiments, a portion of the hydrogen may be used for hydrogenation in another portion of the formation and/or in treatment facilities. In some embodiments, hydrogen may be sold. In some embodiments, some or all produced methane may be used to fuel heat sources.

A mixture produced using a half-way cycle may have a $CO_2$ life cycle emission level that is greater than a $CO_2$ life cycle emission level of a hydrogen cycle. A mixture produced using a half-way cycle may have a $CO_2$ life cycle emission level of less than about $3.3\times10^{-8}$ kg $CO_2$/J.

In an in situ conversion process embodiment, a portion of formation may be treated to produce a product that is substantially methane. A process of converting a substantial portion of hydrocarbons within a portion of formation to methane may be referred to as a "methane cycle."

The producing wellbore and the formation proximate the producing wellbore may, in some embodiments, be heated to temperatures from about 300° C. to about 500° C. For example, the producing wellbore may be heated to about 400° C. Pyrolysis in this temperature range may allow a substantial portion of hydrocarbons in the formation to be converted to methane. Hydrocarbons with carbon numbers greater than one produced from the formation may be recycled back into the formation through injection wells to generate methane. The methane may be produced in a mixture from the heated wellbores. In an embodiment, the methane content may be greater than about 80 volume % of the produced fluids.

A mixture produced from a methane cycle may have a $CO_2$ life cycle emission level that is larger than the $CO_2$ life cycle emission level for a half-way cycle. In some embodiments of methane cycles, the $CO_2$ life cycle emission levels are less than about $7.4\times10^{-8}$ kg $CO_2$/J.

In an in situ conversion process embodiment, molecular hydrogen may be produced on site using processes such as, but not limited to, Modular and Intensified Steam Reforming (MISR) and/or Steam Methane Reforming (SMR). The produced molecular hydrogen may be blended with other products to produce a product below a selected $CO_2$ emission level. The $CO_2$ produced using MISR or other processes may be sequestered in a formation.

After completion of pyrolysis and/or synthesis gas generation during an in situ conversion process, at least a portion of the formation may be converted into a hot spent reservoir. The hot spent reservoir may have a temperature of greater than about 350° C. The porosity may have increased by 20 volume % or more. In addition, a permeability in a hot spent reservoir may be greater than about 1 darcy, or in certain embodiments, greater than about 20 darcy. A hot spent reservoir may have a large open volume. The surface area within the volume may have increased significantly due to the in situ conversion process. Utilization of the in situ conversion process may have required the installation and use of production wells and heat sources spaced at a range between about 10 m and about 30 m. A barrier (e.g., freeze wells) may also be present to inhibit migration of fluids to or from a treatment area in the formation.

In an in situ conversion process embodiment, a heated formation (e.g., a formation that has undergone substantial pyrolysis and/or synthesis gas generation) may be used to produce olefins and/or other desired products. Hydrocarbons may be provided to (e.g., injected into) a heated portion of a formation. An in situ conversion process in a separate portion of the formation may provide the source of the hydrocarbons. The formation temperature and/or pressure may be controlled to produce hydrocarbons of a desired composition (e.g., hydrocarbons with a $C_2$-$C_7$ carbon chain length). Temperature may be controlled by controlling energy input into heat sources. Pressure may be controlled by controlling the temperature in the formation and/or by controlling a rate of production of formation fluid from the formation. Pressure within a portion of a formation enclosed by a perimeter barrier (e.g., a frozen barrier and an impermeable overburden and underburden) may be controlled so that the pressure is substantially uniform throughout the enclosed portion of formation.

Many different types of hydrocarbons may be provided to the heated formation as a feed stream. Examples of hydrocarbons include, but are not limited to, pitch, heavy hydrocarbons, asphaltenes, crude oil, naphtha, and/or condensable hydrocarbons (e.g., methane, ethane, propane, and butane). A portion of heavy and/or condensable hydrocarbons introduced into a heated portion of the formation may pyrolyze to form shorter chain compounds. The shorter chain compounds may have greater value than the longer chain compounds introduced into the portion of formation.

A portion of the hydrocarbons introduced into the formation may react to form olefins. An overall efficiency for producing olefins may be relatively low (as compared to reactors designed to produce olefins), but the volume of heated formation and/or the availability of feed from portions of the formation undergoing an in situ conversion process may make production of olefins from a heated formation economically viable.

In certain embodiments, the temperature of a selected portion of the formation (e.g., near production wells) may be controlled so that hydrocarbon fluid flowing into the selected portion has an increased chance of forming olefins. In certain embodiments, process conditions may be controlled such that the time period in which the compounds are subjected to relatively higher temperatures is controlled. In certain embodiments, only a small portion of the formation (e.g., near the production wells) is at a high enough temperature to promote olefin formation. Olefins may be formed subsurface in the small portion, but the olefins are produced quickly (e.g., before the olefins can cross-link in the formation and/or further react to form coke).

In an embodiment, olefins are produced from saturated hydrocarbons. Formation of the olefins from saturated hydrocarbons also results in the production of molecular hydrogen. In an embodiment, olefin production may include cracking saturated hydrocarbons in the formation and allowing the cracked hydrocarbons to further react in the formation (e.g., via alkylation or dimerization). The formation of olefins may involve different reaction mechanisms. Any number of the olefin formation mechanisms may be present in the in situ conversion process. Water may be added to the formation for steam generation and/or temperature control.

Examples of olefins produced by providing hydrocarbons to a heated formation may include, but are not limited to, ethene, propene, 1-butene, 2-butene, higher molecular weight olefins, and/or mixtures thereof. The produced mixture may include from slightly over about 0 weight % to about 80 weight % (e.g., from about 10-50 weight %) olefins in a hydrocarbon portion of a produced mixture.

In an in situ conversion process embodiment, crude oil may be provided to a heated portion of a formation. The crude oil may crack in the heated portion to form a lighter, higher quality oil and an olefin portion. In an in situ conversion process embodiment, pitch and/or asphaltenes may be provided to a heated portion of a formation. The pitch and/or asphaltenes may be in solution and/or entrained in a solvent. The solvent may be a hydrocarbon portion of a fluid produced from a portion of a formation subjected to an in situ conversion process. A portion of the pitch and/or asphaltenes and the solvent may be converted in the formation to high quality hydrocarbons and/or olefins. Similarly, emulsions, bottoms, and/or undesired hydrocarbon compounds that are flowable, entrained in a flowable solution, or dissolved in a solvent may be introduced into a heated portion of a formation to upgrade the introduced fluids and/or produce olefins.

In some embodiments, a temperature in selected portions of a production well wellbore may be controlled to promote production of olefins. A portion of the wellbore adjacent to a heated portion of the formation may include a heater that maintains the temperature at an elevated temperature. A portion of the wellbore above the heated portion of the wellbore may include a heat transfer line that reduces the temperature of fluid being removed through the wellbore to a temperature below reaction temperatures of desired components within the wellbore (e.g., olefins). In some embodiments, transfer of heat from the fluids in the wellbore to the overburden may reduce the temperature of fluids in the wellbore quickly enough to obviate the need for a heat transfer line in the wellbore.

In some in situ conversion process embodiments, hydrocarbon feedstock introduced into a hot portion of a portion may have an API gravity of less than about 20°. The hydrocarbon feedstock may be cracked in the heated portion to produce a plurality of products. The products may include olefins. Molecular hydrogen may also be produced along with a mixture of products. A temperature and/or a pressure of the heated portion of the formation may be controlled such that a substantial portion of the produced product includes olefins. A hydrocarbon portion of the produced mixture may include from about 1 weight % to about 80 weight % (e.g., from about 10-50 weight %) olefins.

In some in situ conversion process embodiments, a hydrocarbon mixture produced from a formation may be suitable for use as an olefin plant feedstock. Process conditions in a portion of a formation may be adjusted to produce a hydrocarbon mixture that is suitable for use as an olefin plant feedstock. The mixture should contain relatively short chain saturated hydrocarbons (e.g., methane, ethane, propane, and/or butane). To change formation conditions to produce a hydrocarbon mixture suitable for use as an olefin plant feedstock, backpressure within the formation may be maintained at an increased level (i.e., production from production wells may be low enough to result in an increase in pressure in the formation).

In some in situ conversion process embodiments, low molecular weight olefins (e.g., ethene and propene) may be produced during the in situ conversion process. Fluid produced may be routed through a relatively hot (e.g., greater than about 500° C.) subsurface zone before the fluid is allowed to cool. The fluid may crack at a high temperature to produce low molecular weight olefins. The fluid should be subjected to high temperature for only a short period of time to inhibit formation of methane, hydrogen, and/or coke from the low molecular weight olefins.

In some in situ conversion process embodiments, olefin production yield may be facilitated from a formation. Continued processing or recycling of the non-olefinic $C_2$+ products in the in situ conversion process may maximize ethene and/or propene yield. Control of the temperature and residence time within a portion of the formation may be used to maximize non-olefinic $C_2$+ hydrocarbons and hydrogen content. Some olefins may be produced in this cycle and separated from the produced fluid. The non-olefinic portion may be recycled to a second section of the formation that includes production wells that are heated. A portion of the introduced hydrocarbons may be converted into olefins by the heated production wells to increase the yield of olefins obtained from the formation.

In some in situ conversion process embodiments, linear alpha olefins in the $C_4$-$C_{30}$ range may be produced from shale oil. Formation conditions may be controlled to facilitate formation and production of olefins in a desired range (e.g., $C_6$-$C_{16}$ alpha olefins). Shale oil may produce paraffinic (i.e., waxy) and linear compounds during the in situ conversion process. Linear alpha olefins may be produced from the in situ conversion process by varying the temperature, residence time, and/or pressure in the formation being treated. Some other types of hydrocarbon containing formations may promote the production of shorter chain olefins. For example, kerogen containing formations may produce lower molecular weight olefins (e.g., ethene, propene, butene, and/or isomers thereof) instead of longer chain olefins (e.g., chains having greater than 5 carbon atoms).

Some in situ conversion processes may be run at sufficient pressure to generate a desirable steam cracker feed. A desirable steam cracker feed may be a feed with relatively high hydrocarbon content (e.g., a relatively high alkane content) and relatively low oxygen, sulfur, and/or nitrogen content. A desirable steam cracker feed may reduce the need to treat the stream before processing in a steam cracker unit. Therefore, the desirable feed may be run directly from the in situ conversion process to a steam cracker unit. The steam cracker unit may produce olefins from the feed stream.

In an in situ conversion process embodiment, a heated formation may be used to upgrade materials. Materials to be upgraded may be produced from the same portion of the formation and recycled, produced from other formations, or produced from other portions of the same formation.

During some in situ conversion process embodiments in selected formations (e.g., in tar sands formations), only a selected portion of a formation may be heated to relatively high temperatures (e.g., a temperature sufficient to cause pyrolysis). Other portions of the formation may still produce heavy hydrocarbons but may not be heated, or may only be partially heated (e.g., by steam, heat sources, or other mechanisms). The heavy hydrocarbons produced from the other less heated or unheated portions of the formation may be introduced into the portion of the formation that is heated to a relatively high temperature. The high temperature portion of the formation may upgrade the introduced heavy hydrocarbons. Energy savings may be achieved since only a portion of the formation is heated to a relatively high temperature.

In an embodiment, surface mined tar (e.g., from tar sands) may be upgraded in a heated formation. The tar sands may be processed to produce separated hydrocarbons (e.g., tar). A portion of the tar may be heated, entrained, and/or dissolved in a solvent to produce a flowable fluid. The solvent may be a portion of hydrocarbon fluid produced from the formation. The flowable fluid may be introduced into the heated portion of the formation.

Emulsions may be produced during some metal processing and/or hydrocarbon processing procedures. Some emulsions may be flowable. Other emulsions may be made flowable by the introduction of heat and/or a carrier fluid. The carrier fluid may be water and/or hydrocarbon fluid. The hydrocarbon fluid may be a fluid produced during an in situ process. A flowable emulsion may be introduced into a heated portion of a formation being subjected to in situ processing. In some embodiments, the heated portion may break the emulsion. The components of the emulsion may pyrolyze or react (e.g., undergo synthesis gas reactions) in the heated formation to produce desired products from production wells. In some embodiments, the emulsion or components of the emulsion may remain in the formation.

Upgrading may include, but is not limited to, changing a product composition, a boiling point, or a freezing point. Examples of materials that may be upgraded include, but are not limited to, heavy hydrocarbons, tar, emulsions (e.g., emulsions from surface separation of tar from sand), naphtha, asphaltenes, and/or crude oil. In certain embodiments, surface mined tar may be injected into a formation for upgrading. Such surface mined tar may be partially treated, heated, or emulsified before being provided to a formation for upgrading. The material to be upgraded may be provided to the heated portion of the formation. The material may be upgraded in the formation. For example, upgrading may include providing heavy hydrocarbons having an API gravity of less than about 20°, 15°, 10°, or 5° into a heated portion of the formation. The heavy hydrocarbons may be cracked or distilled in the heated portion. The upgraded heavy hydrocarbons may have an API gravity of greater than about 20° (or above about 25° or above 30°). The upgraded heavy hydrocarbons may also have a reduced amount of sulfur and/or nitrogen. A property of the upgraded hydrocarbons (e.g., API gravity or sulfur content) may be measured to determine the relative upgrading of the hydrocarbons.

In some in situ conversion process embodiments, fluid produced from a formation may be fractionated in an above ground facility to produce selected components. The relatively heavier molecular weight components (e.g., bottom fractions from distillation columns) may be recycled into a formation. The heated formation may upgrade the relatively heavier molecular weight components.

In some in situ conversion process embodiments, heavy hydrocarbons may be produced at a first location. The heavy hydrocarbons may be diluted with a diluent to enable the heavy hydrocarbons to be pumped or otherwise transported to a different location. The mixture of heavy hydrocarbons and diluent may be separated at the heated formation prior to providing the heavy hydrocarbons mixture to the heated formation for upgrading. Alternately, the mixture of heavy hydrocarbons and diluent may be directly injected into a heated formation for upgrading and separation in the heated formation. In certain embodiments, a hot fluid (e.g., steam) may be added to the heavy hydrocarbons mixture to allow fluid cracking in the heated formation. Steam may inhibit coking in the formation, lessen the partial pressure of hydrocarbons in the formation, and/or provide a mechanism to sweep the formation. Controlling the flow of steam may provide a mechanism to control the residence time of the hydrocarbons in the heated formation. The residence time of the hydrocarbons in the heated formation may be used to control or adjust the molecular weight and/or API gravity of a product produced from the heated formation.

In an in situ conversion process embodiment, heavy hydrocarbons may be produced from a heated formation. The heavy hydrocarbons may be recycled back into the same formation to be upgraded. The upgraded products may be produced from the formation. In another embodiment, the heavy hydrocarbon may be produced from one formation and upgraded in another formation at a different temperature. The residence time and temperature of the formation may be controlled to produce a desirable product. For example, a portion of fluid initially produced from a tar sands formation undergoing an in situ conversion process may be heavy hydrocarbons, especially if the hydrocarbons are produced from a relatively deep depth within a hydrocarbon containing layer of the tar sands formation. The produced heavy hydrocarbons may be reintroduced into the formation through or adjacent to a heat source to facilitate upgrading of the heavy hydrocarbons.

In an in situ conversion process embodiment, crude oil produced from a formation by conventional methods may be upgraded in a heated formation of the in situ conversion process system. The crude oil may be provided to a heated portion of the formation to upgrade the oil. In some embodiments, only a heavy fraction of the crude oil may be introduced into the heated formation. The heated portion of the formation may upgrade the quality of the introduced portion of the oil and/or remove some of the undesired components within the introduced portion of the crude oil (e.g., sulfur and/or nitrogen).

In some embodiments, hydrogen or any other hydrogen donor fluid may be added to heavy hydrocarbons injected into a heated formation. The hydrogen or hydrogen donor may increase cracking and upgrading of the heavy hydrocarbons in the heated formation. In certain embodiments, heavy hydrocarbons may be injected with a gas (e.g., hydrogen or carbon dioxide) to increase and/or control the pressure within the heated formation.

In an in situ conversion process embodiment, a heated portion of a formation may be used as a hydrotreating zone. A temperature and pressure of a portion of the formation may be controlled so that molecular hydrogen is present in the hydrotreating zone. For example, a heat source or selected heat sources may be operated at high temperatures to produce hydrogen and coke. The hydrogen produced by the heat source or selected heat sources may diffuse or be drawn by a pressure gradient created by production wells towards the hydrotreating zone. The amount of molecular hydrogen may be controlled by controlling the temperature of the heat source or selected heat sources. In some embodiments, hydrogen or hydrogen generating fluid (e.g., hydrocarbons introduced through or adjacent to a hot zone) may be introduced into the formation to provide hydrogen for the hydrotreating zone.

In an in situ conversion process embodiment, a compound or compounds may be provided to a hydrotreating zone to hydrotreat the compound or compounds. In some embodiments, the compound or compounds may be generated in the formation by pyrolysis reactions of native hydrocarbons. In other embodiments, the compound or compounds may be introduced into the hydrotreating zone. Examples of compounds that may be hydrotreated include, but are not limited to, oxygenates, olefins, nitrogen containing carbon compounds, sulfur containing carbon compounds, crude oil, synthetic crude oil, pitch, hydrocarbon mixtures, and/or combinations thereof.

Hydrotreating in a heated formation may provide advantages over conventional hydrotreating. The heated reservoir may function as a large hydrotreating unit, thereby providing a large reactor volume in which to hydrotreat materials. The hydrotreating conditions may allow the reaction to be run at low hydrogen partial pressures and/or at low temperatures (e.g., less than about 0.007 to about 1.4 bars or about 0.14 to about 0.7 bars partial pressure hydrogen and/or about 200° C. to about 450° C. or about 200° C. to about 250° C.). Coking within the formation generates hydrogen, which may be used for hydrotreating. Even though coke may be produced, coking may not cause a decrease in the throughput of the formation because of the large pore volume of the reservoir.

The heated formation may have lower catalytic activity for hydrotreating compared to commercially available hydrotreating catalysts. The formation provides a long residence time, large volume, and large surface area, such that the process may be economical even with lower catalytic activity. In some formations, metals may be present. These naturally present metals may be incorporated into the coke and provide some catalytic activity during hydrotreating. Advantageously, a stream generated or introduced into a hydrotreating zone does not need to be monitored for the presence of catalyst deactivators or destroyers.

In an embodiment, the hydrotreated products produced from an in situ hydrotreating zone may include a hydrocarbon mixture and an inorganic mixture. The produced products may vary depending upon, for example, the compound provided. Examples of products that may be produced from an in situ hydrotreating process include, but are not limited to, hydrocarbons, ammonia, hydrogen sulfide, water, or mixtures thereof. In some embodiments, ammonia, hydrogen sulfide, and/or oxygenated compounds may be less than about 40 weight % of the produced products.

In an in situ conversion process embodiment, a heated formation may be used for separation processes. FIG. 407 illustrates an embodiment of a temperature gradient formed in a selected section of heated formation 2866. Formation temperatures may decrease radially from heat source 508 through the selected section. A fluid (either products from various surface processes and/or products from other sources such as crude oil) may be provided through injection well 606. The fluid may pass through heated formation 2866. Some production wells 512 may be located at various positions along the temperature gradient. For vapor phase production wells, different products may be produced from production wells that are at different temperatures. The ability to produce different compositions from production wells depending on the temperature of the production well may allow for production of a desired composition from selected wells based on boiling points of fluids within the formation. Some compounds with boiling points that are below the temperature of a production well may be entrained in vapor and produced from the production well.

FIG. 408 illustrates an embodiment for separating hydrocarbon mixtures in a heated portion of formation 2868. Temperature and/or pressure of the heated portion may be controlled by heat source 508. A hydrocarbon mixture may be provided through injection well 606 into a portion of the formation that is cooler than a portion of the formation closer to heat sources or production wells. In a cooler portion of formation 2868, relatively heavy molecular weight products may condense and remain in the formation. After separation of a desired quantity of hydrocarbon mixture, the cooler portion of the formation may be heated to result in pyrolysis of a portion of the heavy hydrocarbons to desired products and/or mobilization of a portion of the heavy hydrocarbons to production well 512.

In an embodiment, a portion of a formation may be shut in at selected times to provide control of residence time of the products in the subsurface formation. Shutting in a portion of the formation by not producing fluid from production wells may result in an increase in pressure in the formation. The increased pressure may result in production of a lighter fluid from the formation when production is resumed. Different products may be produced based on the residence time of fluids in the formation.

Once a formation has undergone an in situ conversion process, heat from the process may remain within the formation. Heat may be recovered from the formation using a heat transfer fluid. Heat transfer fluids used to recover energy from a hydrocarbon containing formation may include, but are not limited to, formation fluids, product streams (e.g., a hydrocarbon stream produced from crude oil introduced into the formation), inert gases, hydrocarbons, liquid water, and/or steam. FIG. 409 illustrates an embodiment for recovering heat remaining in formation 2870 by providing a product stream through injection well 606. Heat remaining in the formation may transfer to the product stream. The formation heat may be controlled with heat source 508. The heated product stream may be produced from the formation through production well 512. The heat of the product stream may be transferred to any number of surface treatment units 2872 or to other formations.

In an in situ conversion process embodiment, heat recovered from the formation by a heat transfer fluid may be directed to surface treatment units to utilize the heat. For example, a heat transfer fluid may flow to a steam-cracking unit. The heat transfer fluid may pass through a heat exchange mechanism of the steam-cracking unit to transfer heat from the heat transfer fluid to the steam-cracking unit. The transferred heat may be used to vaporize water or as a source of heat for the steam-cracking unit.

In some in situ conversion process embodiments, heat transfer fluid may be used to transfer heat to a hydrotreating unit. The heat transfer fluid may pass through a heat exchange mechanism of the hydrotreating unit. Heat from the product stream may be transferred from the heat transfer fluid to the hydrotreating unit. Alternatively, a temperature of the heat transfer fluid may be increased with a heating unit prior to processing the heat transfer fluid in a steam cracking unit or hydrotreating unit. In addition, heat of a heat transfer fluid may be transferred to any other type of unit (e.g., distillation column, separator, regeneration unit for an activated carbon bed, etc.).

Heat from a heated formation may be recovered for use in heating another formation. FIG. 410 illustrates an embodiment of a heat transfer fluid provided through injection well 606A into heated formation 2866. Heat may transfer from the heated formation to the heat transfer fluid. Heat source 508 may be used to control formation heat. The heat transfer fluid may be produced from production well 512A. The heat transfer fluid may be directed through injection well 606B to transfer heat from the heat transfer fluid to formation 2874. Formation conditions subsequent to an in situ conversion process may determine the heat transfer fluid temperature. The heat transfer fluid may be produced from production well 512B. In some embodiments, formation 2874 may include U-tube wells or closed casings with fluid insertion ports and fluid removal ports so that heat transfer fluid does not enter into the rock of the formation.

Movement of the heat transfer fluid (e.g., product streams, inert gas, steam, and/or hydrocarbons) through the formation may be controlled such that any associated hydrocarbons in the formation are directed towards the production wells. The formation heat and mass transfer of the heat transfer fluid may be controlled such that fluids within the formation are swept towards the production wells. During remediation of a formation, the formation heat and mass transfer of the heat transfer fluid may be controlled such that transfer of heat from the formation to the heat transfer fluid is accomplished simultaneously with clean up of the formation.

FIG. 411 illustrates an in situ conversion process embodiment in which a heat transfer fluid is provided to formation 2876 through injection well 606. Heat within formation 2876 may be controlled by heat source 508. The heat of the heat transfer fluid may be transferred to cooler formation 2878. The heat transfer fluid may be produced through production well 512. In other embodiments, a heat transfer fluid may be directed to a plurality of formations to heat the plurality of formations.

FIG. 412 illustrates an embodiment for controlling formation 2880 to produce region of reaction 2882 in the formation. A region of reaction may be any section of the formation having a temperature sufficient for a reaction to occur. A region of reaction may be hotter or cooler than a portion of a formation proximate the region of reaction. Material may be directed to the region of reaction through injection well 606. The material may be reacted within the region of reaction. Any number and any type of heat source 508 may heat the formation and the region of reaction.

Appropriate heat sources include, but are not limited to, electric heaters, surface burners, flameless distributed combustors, and/or natural distributed combustors. The product may be produced through production well 512.

In some in situ conversion process embodiments, a region of reaction may be heated by transference of heat from a heated product to the region of reaction. In some embodiments, regions of reaction may be in series. A material may flow through the regions of reaction in a serial manner. The regions of reaction may have substantially the same properties. As such, flowing a material through such regions of reaction may increase a residence time of the material in the regions of reaction. Alternatively, the regions of reaction may have different properties (e.g., temperature, pressure, and hydrogen content). Flowing a material through such regions of reaction may include performing several different reactions with the material. Various materials may be reacted in a region of reaction. Examples of such materials include, but are not limited to, materials produced by an in situ conversion process and hydrocarbons produced from petroleum crude (e.g., tar, pitch, asphaltenes, heavy hydrocarbons, naphtha, methane, ethane, propane, and/or butane).

In some in situ conversion process embodiments, a region of reaction may be formed by placing conduit 2884 in a heated portion of formation 2886. FIG. 413 depicts such an embodiment of an in situ conversion process. A portion of conduit 2884 may be heated by the formation to form a region of reaction within the conduit. The conduit may inhibit contact between the material and the formation. The formation temperature and conduit temperature may be controlled by heat source 508. Material may be provided through injection well 606. The material may be produced through production well 512.

A shape of a conduit may be variable. For example, the conduit may be curved, straight, or U-shaped (as shown in FIG. 414). U-shaped conduit 2888 may be placed within a heater well in a heated formation. Any number of materials may be reacted within the conduit. For example, water may be passed through a conduit such that the water is heated to a temperature higher than the initial water temperature. In other embodiments, water may be heated in a conduit to produce steam. Material may be provided through injection site 2890 and produced through production site 2892. The formation temperature may be controlled by heat source 508.

In some in situ conversion process embodiments, formations may be used to store materials. A first portion of a formation may be subjected to in situ conversion. After in situ conversion, the first portion may be permeable and have a large pore volume. Formation fluid (e.g., pyrolysis fluid or synthesis gas) produced from another portion of the formation may be stored in the first portion. Alternately, the first portion may be used to store a separated component of formation fluid produced from the formation, a compressed gas (e.g., air), crude oil, water, or other fluid. Alternately, the first portion may be used to store carbon dioxide or other fluid that is to be sequestered.

Materials may be stored in a portion of the formation temporarily or for long periods of time. The materials may include inorganic and/or organic compounds and may be in solid, liquid, and/or gaseous form. If the materials are solids, the solid products may be stored as a liquid by dissolving the materials in a suitable solvent. If the materials are liquids or gases, they may be stored in such form. The materials may be produced from the formation when needed. In some storage embodiments, the stored material may be removed from the formation by heating the formation using heat sources inserted in wellbores in the formation and producing the stored material from production wells. The heat sources may be heat sources used during a pyrolysis and/or synthesis gas generation phase of the in situ conversion process. The production wells may be production wells used during the pyrolysis and/or synthesis gas generation phase of the in situ conversion process. In other embodiments, the heat source and/or production wells may be wells that were originally used for a different purpose and converted to a new purpose. In some embodiments, some or all heat source and/or production wells may be newly formed wells in the storage portion of the formation.

In a storage process embodiment, oil may be stored in a portion of a formation that has been subjected to an in situ conversion process. In some embodiments, natural gas may be stored in a portion of a formation that has been subjected to an in situ conversion process. If the formation is close to the surface, the shallow depth of the formation may limit gas pressure. In certain embodiments, close spacing of wells may provide for rapid recovery of oil and/or natural gas with high efficiency.

In a storage process embodiment, compressed air may be stored in a portion of a formation that has been subjected to an in situ conversion process. The stored compressed air may be used for peak power generation, load leveling, and/or to even out and compensate for the variability of renewable power sources (e.g., solar and/or wind power). A portion of the stored compressed air may be used as an oxygen source for a natural distributed combustor, flameless distributed combustor, and/or a surface burner.

In an in situ conversion process embodiment, water may be provided to a hot formation to produce steam. The water may be applied during pyrolysis to help remove coke adjacent to or on heat sources and/or production wells. Water may also be introduced into the formation after pyrolysis and/or synthesis gas generation is complete. The produced steam may sweep hydrocarbons towards production wells. The formation heat transfer and mass transfer may be controlled to clean the formation during recovery of heat from the formation. The introduced water may absorb heat from the formation as the water is transformed to steam, resulting in cooling of the formation. The steam may be produced from the formation. Organic or other components in the steam may be separated from the steam and/or water condensed from the steam. The steam may be used as a heat transfer fluid in a separation unit or in another portion of the formation that is being heated. Cleaned or filtered water may be produced along with subsequent cooling of the formation.

In an in situ conversion process embodiment, a hot formation may treat water to remove dissolved cations (e.g., calcium and/or magnesium ions). The untreated water may be converted to steam in the formation. The steam may be produced and condensed to provide softened water (e.g., water from which calcium and magnesium salts have been removed). If additional water is provided to the formation, the retained salts in the formation may dissolve in the water and "hard" water may be produced. Therefore, order of treatment may be a factor in water purification within a formation. A hot formation may sterilize introduced water by destroying microbes.

In certain embodiments, a cooled formation may be used as a large activated carbon bed. After pyrolysis and/or synthesis gas generation a treated, cooled formation may be permeable and may include a significant weight percentage of char/coke. The formation may be substantially uniformly permeable without significant fluid passage fractures from wellbore to wellbore within the formation. Contaminated water may be provided to the cooled formation. The water may pass through the cooled formation to a production well. Material (e.g., hydrocarbons or metal cations) may be adsorbed onto carbon in the cooled formation, thereby cleaning the water. In some embodiments, the formation may be used as a filter to remove microbes from the provided water. The filtration capability of the formation may depend upon the pore size distribution of the formation.

A treated portion of formation may be used to trap and filter out particulates. Water with particulates may be introduced into a first wellbore. Water may be produced from production wells. When the particulate matter clogs the pore space adjacent to the first wellbore sufficiently to inhibit further introduction of water with particulates, the water with particulates may be introduced into a different wellbore. A large number of wellbores in a formation subject to in situ treatment may provide an opportunity to purify a large volume of water and/or store a large amount of particulate matter in a formation.

Water quality may be improved using a heated formation. For example, after pyrolysis (and/or synthesis gas generation) is completed, formation water that was inhibited from passing into the formation during conversion by freeze wells or other types of barriers may be allowed to pass through the spent formation. The formation water may be passed through a hot formation to form steam and soften the water (i.e., ionic compounds are not present in significant amounts in the produced steam). The steam produced from the formation may be condensed to form formation water. The formation water may be passed through a carbon bed (in a treatment facility or in a cooled, spent portion of the formation) to treat the formation water by adsorption, absorption, and/or filtering.

FIG. 415 illustrates an embodiment for sequestering carbon dioxide as carbonate compounds in a portion of a formation. The carbon dioxide may be sequestered in the formation by forming carbonate compounds from the carbon dioxide through carbonation reactions with pore water. Energy input into heat sources 508 may be used to control a temperature of the heated portion of formation 2894. Valves may be used to control a pressure of the heated portion of the formation. In other embodiments, carbon dioxide may be sequestered in a cooled formation by adsorbing the carbon dioxide on carbon that remains in the formation.

In the embodiment depicted in FIG. 415, solution 2896 is provided to the lower portion of the formation through well 2898 into formation 2894. The solution may be obtained, for example, from natural groundwater flow or from an aquifer in a deeper formation. In an embodiment, the solution may be seawater. In some embodiments, the salt content of the water may be concentrated by evaporation. In certain embodiments, the solution may be obtained from man-made industrial solutions (e.g., slaked lime solution) or agricultural runoff. The solution may include sodium, magnesium, calcium, iron, manganese, and/or other dissolved ions. Furthermore, the solution may contact the ash from the spent formation as it is provided to the post treatment formation. Contact of the solution with the formation ash may produce a buffered, basic solution.

In some sequestration embodiments, carbon dioxide 1506 may be provided to the upper portion of the formation through well 2900 simultaneously with providing solution 2896 to the formation. The solution may be provided to the lower portion of the formation, such that the solution rises through a portion of the provided carbon dioxide. Carbonate compounds may form in a dissolution zone at the interface of the solution and the carbon dioxide. In certain embodiments, the carbonate compounds may form by the reaction of the basic solution with the carbonic acid produced when the carbon dioxide dissolves in the solution. Other mechanisms, however, may also cause the formation and precipitation of the carbonate compounds.

The type of carbonate compounds formed may be determined by the dissolved ions in the solution. Examples of carbonate compounds include, but are not limited to, calcite ($CaCO_3$), magnesite ($MgCO_3$), siderite ($FeCO_3$), rhodochrosite ($MnCO_3$), ankerite ($CaFe(CO_3)_2$), dolomite ($CaMg(CO_3)_2$), ferroan dolomite, magnesium ankerite, nahcolite ($NaHCO_3$), dawsonite ($NaAl(OH)_2CO_3$), and/or mixtures thereof. Other carbonate compounds that may be precipitated include, but are not limited to, cerussite ($PbCO_3$), malachite ($Cu_2(OH)_2CO_3$, azurite ($Cu_3(OH)_2(CO_3)_2$), smithsonite ($ZnCO_3$), witherite ($BaCO_3$), strontianite ($SrCO_3$), and/or mixtures thereof.

A portion of the solution may be slowly withdrawn from the formation to deposit carbonate compounds within the formation. After withdrawal, the solution may be reinserted into the formation to continue precipitation of carbonate compounds in the formation. The solution may rise again through the provided carbon dioxide and additional carbonates may be formed and precipitated. The solution may be cycled up and down within the formation to maximize the precipitation of carbonates within the formation. The carbonate compounds may remain within the formation.

In an embodiment, chemical compounds (e.g., CaO) may be added to the solution if the amount of ash remaining in the formation is insufficient to provide adequate buffering. In some embodiments, chemical compounds may be added to surface water to produce a solution.

Altering the pH of a solution in which carbon dioxide is dissolved may allow carbonate formation. Compounds that hydrolyze in different temperature ranges to produce basic compounds may be included in the solution. Therefore, altering the solution temperature may alter the solution pH, thus allowing carbonate formation. Compounds that hydrolyze to produce basic compounds may include cyanates and nitrites.

Examples of cyanates and nitrites may include, but are not limited to, potassium cyanate, sodium cyanate, sodium nitrite, potassium nitrite, and/or calcium nitrite. In some embodiments, urea may also hydrolyze to produce a basic compound.

In a sequestration embodiment, carbon dioxide may be allowed to diffuse throughout a solution within a formation. The solution may include at least one of the compounds that hydrolyze. The formation may be heated such that the compound(s) included in the solution hydrolyzes and produces a basic solution. The carbonate compounds may precipitate when appropriate ions (e.g., calcium and/or magnesium) are present. Altering the solution temperature may provide an ability to alter the occurrence and rate of carbonate precipitation in the formation. Heat may be provided from heat sources in the formation.

In a sequestration embodiment, carbon dioxide may be provided to a dipping formation. A solution may be provided to the dipping formation so that the solution contacts carbon dioxide to allow for precipitation of carbonate in the formation. Carbon dioxide and/or solution addition may be cycled to increase the amount of carbonate formed in the formation.

Formation of carbonate compounds may inhibit movement of mobile or released hydrocarbon compounds to groundwater. Formation of carbonate compounds may decrease the permeability of the formation and inhibit water or other fluid from migrating into or out of a portion of the formation in which carbonates have been formed. Formation of carbonates may decrease leaching of metals in the formation to groundwater, decrease formation deformation, and/or decrease well damage by providing support for the remaining formation overburden. In certain in situ conversion process embodiments, the formation of carbonate compounds may be a part of the abandonment and reclamation process for the formation.

In an embodiment, heating during in situ conversion processes may cause decomposition of calcite (limestone) or dolomite to lime and magnesite. Upon carbonation, the calcite and dolomite may be reconstituted. The reconstitution may result in sequestration of a significant volume of carbon dioxide.

In a sequestration embodiment, existing wellbores may be used during formation of carbonates in the formation. A solution may be provided to the formation and recovery of the solution may be provided from adjacent or closely spaced wells to create small circulation cells. In some embodiments with a dipping or thick formation, a counterflow of carbon dioxide and water may be applied. The carbon dioxide may be provided downdip (e.g., a point lower in the formation) and the solution provided updip (e.g., a point higher in the formation). The carbon dioxide and the solution may migrate past each other in a counterflow manner. In other embodiments, the carbon dioxide may be bubbled up through a solution-filled formation.

In a sequestration embodiment, precipitation of mineral phases (e.g., carbonates) may cement together the friable and unconsolidated formation matrix remaining after an in situ conversion process. In certain embodiments, the formation of minerals in an in situ formation may be similar to natural mineral formation and cementation, though significantly accelerated.

In an embodiment, vertical and/or horizontal mineral formation near a well may provide at least some well integrity. Mineral precipitation may provide the formation around the well with higher cohesiveness and strength. The increased cohesiveness and strength may inhibit compaction and deformation of the formation around the wellbore.

In some in situ conversion process embodiments, non-hydrocarbon materials such as minerals, metals, and other economically viable materials contained within the formation may be economically produced from the formation. In some embodiments, the non-hydrocarbon materials may be mined or extracted from the formation following an in situ conversion process. However, mining or extracting material following an in situ conversion process may not be economically or environmentally favorable. In certain embodiments, non-hydrocarbon materials may be recovered and/or produced prior to, during, and/or after the in situ conversion process for treating hydrocarbons using an additional in situ process of treating the formation for producing the non-hydrocarbon materials.

In an embodiment for producing non-hydrocarbon material, a portion of the formation may be subjected to in situ conversion process to produce hydrocarbons and/or synthesis gas from the formation. The temperature of the portion may be reduced below the boiling point of water at formation conditions. A first fluid (e.g., extraction fluid) may be injected into the portion. The first fluid may be injected through a production well, heater well, or injection well. The first fluid may include an agent that reduces, mixes, combines, or forms a solution with non-hydrocarbon materials to be recovered. The first fluid may be water, a basic solution, an acid solution, and/or a hydrocarbon fluid. In some embodiments, the first fluid may be introduced into the formation as a hot or warm liquid. The first fluid may be heated using heat generated in another portion of the formation and/or using excess heat from another portion of the formation.

A second fluid may be produced in the formation from formation material and the first fluid. The second fluid may be produced from the formation through production wells. The second fluid may include desired non-hydrocarbon materials from the formation. The non-hydrocarbon materials may include valuable metals such as, but not limited to, aluminum, nickel, vanadium, and gold. The non-hydrocarbon materials may also include minerals that contain phosphorus, sodium, or magnesium. In certain embodiments, the second fluid may include metals combined with minerals. For example, the second fluid may contain phosphates, carbonates, etc. Metals, minerals, or other non-hydrocarbon materials contained within the second fluid may be produced or extracted from the second fluid.

Producing the non-hydrocarbon materials may include separating the materials from the solution mixture. Producing the non-hydrocarbon materials may include processing the second fluid in a treatment facility or refinery. In some embodiments, the first fluid may be circulated through the formation from an injection well to a removal site of the second fluid. Any portion of the first fluid remaining in the second fluid may be recirculated (or re-injected) into the formation as a portion of the first fluid. In other embodiments, the second fluid may be treated at the surface to remove non-hydrocarbon materials from the second fluid. This may reconstitute the first fluid from the second fluid. The reconstituted first fluid may be re-injected into the formation for further material recovery.

In certain embodiments (e.g., in a coal formation), a first fluid may be injected into a portion of the formation that has been treated using an in situ conversion process. The first fluid may include water. The first fluid may break and/or fragment the formation into relatively small pieces of mineral matrix containing hydrocarbons. The relatively small pieces may combine with the first fluid to form a slurry. The slurry may be removed or produced from the formation. The slurry may be treated in a treatment facility to separate the first fluid from the relatively small pieces of hydrocarbons. The mineral matrix containing hydrocarbon pieces may be treated in a refining or extraction process in a treatment facility. The mineral matrix containing hydrocarbon pieces may be an anthracite form of coal.

In some embodiments, non-hydrocarbon materials may be produced from a formation prior to treating the formation in situ. Heat may be provided to the formation from heat sources. The formation may reach an average temperature approaching below pyrolysis temperatures (e.g., about 260° C. or less). A first fluid may be injected into the formation. The first fluid may dissolve and or entrain formation material to form a second fluid. The second fluid may be produced from the formation.

Some hydrocarbon containing formations (such as oil shale) may include nahcolite, trona, and/or dawsonite within the formation. For example, nahcolite may be contained in unleached portions of a formation. Unleached portions of a formation are parts of the formation where groundwater has not leached out minerals within the formation. For example, in the Piceance basin in Colorado, unleached oil shale is found below a depth of about 500 m below grade. Deep unleached oil shale formations in the Piceance basin center tend to be rich in hydrocarbons. For example, about 0.10 liters of oil per kilogram (L/kg) of oil shale to about 0.15 L/kg of oil shale may be producible from an unleached oil shale formation.

Nahcolite is a mineral that includes sodium bicarbonate ($NaHCO_3$). Nahcolite may be found in formations in the Green River lakebeds in Colorado, USA. Greater than about 5 weight %, and in some embodiments even greater than about 10 weight %, or greater than about 20 weight % nahcolite may be present in a formation. Dawsonite is a mineral that includes sodium aluminum carbonate ($NaAl(CO_3)(OH)_2$). Dawsonite may be present in a formation at weight percents greater than about 2 weight % or, in some embodiments, greater than about 5 weight %. The nahcolite and/or dawsonite may dissociate at temperatures used in an in situ conversion process of treating a formation. The dissociation is strongly endothermic and may produce large amounts of carbon dioxide. The nahcolite and/or dawsonite may be solution mined prior to, during, and/or following treating a formation in situ to avoid the dissociation reactions. For example, hot water may be used to form a solution with nahcolite. Nahcolite may form sodium ions ($Na^+$) and bicarbonate ions ($HCO_3^{31}$ ) in aqueous solution. The solution may be produced from the formation through production wells.

A formation that includes nahcolite and/or dawsonite may be treated using an in situ conversion process. A perimeter barrier may be formed around the portion of the formation to be treated. The perimeter barrier may inhibit migration of water into the treatment area. During an in situ conversion process, the perimeter barrier may inhibit migration of dissolved minerals and formation fluid from the treatment area. During initial heating, a portion of the formation to be treated may be raised to a temperature below the disassociation temperature of the nahcolite. The first temperature may be less than about 90° C., or in some embodiments, less than about 80° C. The first temperature may be, however, any temperature that increases a reaction of a solution with nahcolite, but is also below a temperature at which nahcolite may dissociate (above about 95° C. at atmospheric pressure). A first fluid may be injected into the heated portion. The first fluid may include water, steam, or other fluids that may form a solution with nahcolite and/or dawsonite. The first fluid may be at an increased temperature (e.g., about 90° C. or about 100° C.). The increased temperature may be substantially similar to the first temperature of the portion of the formation.

In some embodiments, the portion of the formation may be at ambient temperature and the first fluid may be injected at an increased temperature. The increased temperature may be a temperature below a boiling point of the first fluid (e.g., about 90° C. for water). Providing the first fluid at an increased temperature may increase a temperature of a portion of the formation. Additional heat may be provided from one or more heat sources (e.g., a heater in a heater well) placed in the formation.

In other embodiments, steam is included in the first fluid. Heat from the injection of steam into the formation may be used to provide heat to the formation. The steam may be produced from recovered heat from the formation (e.g., from steam recovered during remediation of a portion) or from heat exchange with formation fluids and/or with treatment facilities.

A second fluid may be produced from the formation following injection of the first fluid into the formation. The second fluid may include products of injection of the first fluid into the formation. For example, the second fluid may include carbonic acid or other hydrated carbonate compounds formed from the dissolution of nahcolite in the first fluid. The second fluid may also include minerals and/or metals. The minerals and/or metals may include sodium, aluminum, phosphorus, and other elements. Producing the second fluid from the formation may reduce an amount of carbon dioxide produced from the formation during an in situ conversion process. Reducing the amount of carbon dioxide may be advantageous because the production of carbon dioxide from nahcolite is endothermic and uses significant amounts of energy. For example, nahcolite has a heat of decomposition of about 0.66 joules per kilogram (J/kg). The energy required to pyrolyze hydrocarbons in a formation using an in situ process may generally be about 0.35 J/kg. Thus, to decompose nahcolite from a formation having about 20 weight % nahcolite, about 0.13 J/kg additional energy would be needed. Removing nahcolite from a formation using a solution mining process prior to treating the formation using an in situ conversion process may significantly reduce carbon dioxide emissions from the formation as well as energy required to heat the formation.

Some minerals (e.g., trona, pirssonite, or gaylussite) may include associated water. Solution mining, or removing, such minerals before heating the formation may reduce costs of heating the formation to pyrolysis temperatures since associated water is removed prior to heating of the formation. Thus, the heat for dissociation of water from the mineral does not have to be provided to the formation.

FIG. 416 depicts an embodiment for solution mining a formation. Barrier 2902 (e.g., a frozen barrier) may be formed around a circumference of treatment area 2862 of the formation. Barrier 2902 may be any barrier formed to inhibit a flow of water into or out of treatment area 2862. For example, barrier 2902 may include one or more freeze wells that inhibit a flow of water through the barrier. In some embodiments, barrier 2902 has a diameter of about 18 m. Barrier 2902 may be formed using one or more barrier wells 518. Barrier wells 518 may have a spacing of about 2.4 m. Formation of barrier 2902 may be monitored using monitor wells 616 and/or by monitoring devices placed in barrier wells 518.

Water inside treatment area 2862 may be pumped out of the treatment area through production well 512. Water may be pumped until a production rate of water is low. Heat may be provided to treatment area 2862 through heater wells 520. The provided heat may heat treatment area 2862 to a temperature of about 90° C. or, in some embodiments, to a temperature of about 100° C., 110° C., or 120° C. A temperature of treatment area 2862 may be monitored using temperature measurement devices placed in temperature wells 2904.

A first fluid (e.g., water) may be injected through one or more injection wells 606. The first fluid may also be injected through a heater or production well located in the formation. The first fluid may mix and/or combine with non-hydrocarbon materials (e.g., minerals, metals, nahcolite, and dawsonite) that are soluble in the first fluid to produce a second fluid. The second fluid, containing the non-hydrocarbon materials, may be removed from the treatment area through production well 512 and/or heater wells 520. Production well 512 and heater wells 520 may be heated during removal of the second fluid. After producing a majority of the non-hydrocarbon materials from treatment area 2862, solution remaining within the treatment area may be removed (e.g., by pumping) from the treatment area through production well 512 and/or heater wells 520. A relatively high permeability treatment area 2862 may be produced following removal of the non-hydrocarbon materials from the treatment area.

Hydrocarbons within treatment area 2862 may be pyrolyzed and/or produced using an in situ conversion process of treating a formation following removal of the non-hydrocarbon materials. Heat may be provided to treatment area 2862 through heater wells 520. A mixture of hydrocarbons may be produced from the formation through production well 512 and/or heater wells 520.

In certain embodiments, during an initial heating up to a temperature near a boiling temperature of water, unleached soluble minerals within the formation may be disaggregated and dissolved in water condensing within the formation. The water may be condensing in cooler portions of the formation. Some of these minerals may flow in the condensed water to production wells. The water and minerals are produced through the production wells.

Following an in situ conversion process, treatment area 2862 may be cooled during heat recovery by introduction of water to produce steam from a hot portion of the formation. Introduction of water to produce steam may vaporize some hydrocarbons remaining in the formation. Water may be injected through injection wells 606. The injected water may cool the formation. The remaining hydrocarbons and generated steam may be produced through production wells 512 and/or heater wells 520. Treatment area 2862 may be cooled to a temperature near the boiling point of water.

Treatment area 2862 may be further cooled to a temperature at which water will begin to condense within the formation (i.e., a temperature below a boiling temperature of water). Removing the water or other solvents from treatment area 2862 may also remove any materials remaining in the treatment area that are soluble in water. The water may be pumped out of treatment area 2862 through production well 512 and/or heater wells 520. Additional water and/or other solvents may be injected into treatment area 2862. This injection and removal of water may be repeated until a sufficient water quality within treatment area 2862 is reached. Water quality may be measured at injection wells 606, heater wells 520, and/or production wells 512. The sufficient water quality may be a water quality that substantially matches a water quality of treatment area 2862 prior to treatment.

In some embodiments, treatment area 2862 may include a leached zone located above an unleached zone. The leached zone may have been leached naturally and/or by a separate leaching process. In certain embodiments, the unleached zone may be at a depth of about 500 m. A thickness of the unleached zone may be about 100 m to about 500 m. However, the depth and thickness of the unleached zone may vary depending on, for example, a location of treatment area 2862 and a type of formation. A first fluid may be injected into the unleached zone below the leached zone. Heat may also be provided into the unleached zone.

In certain embodiments, a section of a formation may be left unleached or without injection of a solution. The unleached section may be proximate a selected section of the formation that has been leached by providing a first fluid as described above. The unleached section may inhibit the flow of water into the selected section. In some embodiments, more than one unleached section may be proximate a selected section.

In an embodiment, a formation may contain both nahcolite and/or dawsonite. For example, oil shale formations within the Green River lakebeds in the U.S. Piceance Basin contain nahcolite and dawsonite in addition to kerogen. Nahcolite, hydrocarbons, and alumina (from dawsonite) may be produced from these types of formations.

Water may be injected into the formation through a heater well or an injection well. The water may be heated and/or injected as steam. The water may be injected at a temperature at or near the decomposition temperature of nahcolite. For example, the water may be at a temperature of about 70° C., 90° C., 100° C., or 110° C. Nahcolite within the formation may form an aqueous solution following the injection of water. The aqueous solution may be removed from the formation through a heater well, injection well, or production well. Removing the nahcolite removes material that would otherwise form carbon dioxide during heating of the formation to pyrolysis temperatures. Removing the nahcolite may also inhibit the endothermic dissociation of nahcolite during an in situ conversion process. Removing the nahcolite may reduce mass within the formation and increase a permeability of the formation. Reducing the mass within the formation may reduce the heat required to heat to temperatures needed for the in situ conversion process. Reducing the mass within the formation may also increase a speed at which a heat front within the formation moves. Increasing the speed of the heat front may reduce a time needed for production to begin. In some embodiments, slightly higher temperatures may be used in the formation (e.g., above about 120° C.) and the nahcolite may begin to decompose. In such a case, nahcolite may be removed from the formation as a soda ash ($Na_2CO_3$).

Nahcolite removed from the formation may be heated in a treatment facility to form sodium carbonate and/or sodium carbonate brine. Heating nahcolite will form sodium carbonate according to the equation:

$$2NaHCO_3 \rightarrow Na_2CO_3 + CO_2 + H_2O. \qquad (79)$$

The sodium carbonate brine may be used to solution mine alumina. The carbon dioxide produced may be used to precipitate alumina. If soda ash is produced from solution mining of nahcolite, the soda ash may be transported to a separate facility for treatment. The soda ash may be transported through a pipeline to the separate facility.

Following removal of nahcolite from the formation, the formation may be treated using an in situ conversion process to produce hydrocarbon fluids from the formation. Remaining water is drained from the solution mining area through dewatering wells prior to heating to in situ conversion process temperatures. During the in situ conversion process, a portion of the dawsonite within the formation may decompose. Dawsonite will typically decompose at temperatures above about 270° C. according to the reaction:

$$2NaAl(OH)_2CO_3 \rightarrow Na_2CO_3 + Al_2O_3 + 2H_2O + CO_2. \qquad (80)$$

The alumina formed from EQN. 80 will tend to be in the form of chi alumina. Chi alumina is relatively soluble in basic fluids.

Alumina within the formation may be solution mined using a relatively basic fluid following reaching pyrolysis temperatures of hydrocarbons within the formation. For example, a dilute sodium carbonate brine, such as 0.5 Normal $Na_2CO_3$, may be used to solution mine alumina. The sodium carbonate brine may be obtained from solution mining the nahcolite. Obtaining the basic fluid by solution mining the nahcolite may significantly reduce costs associated with obtaining the basic fluid. The basic fluid may be injected into the formation through a heater well and/or an injection well. The basic fluid may form an alumina solution that may be removed from the formation. The alumina solution may be removed through a heater well, injection well, or production well. An excess of basic fluid may have to be maintained throughout an alumina solution mining process.

Alumina may be extracted from the alumina solution in a treatment facility. In an embodiment, carbon dioxide may be bubbled through the alumina solution to precipitate the alumina from the basic fluid. Carbon dioxide may be obtained from the in situ conversion process or from decomposition of the dawsonite during the in situ conversion process.

In certain embodiments, a formation may include portions that are significantly rich in either nahcolite or dawsonite only. For example, a formation may contain significant amounts of nahcolite (e.g., greater than about 20 weight %) in a depocenter of the formation. The depocenter may contain only about 5 weight % or less dawsonite on average. However, in bottom layers of the formation, a weight percent of dawsonite may be about 10 weight % or even as high as about 25 weight %. In such formations, it may be advantageous to solution mine for nahcolite only in nahcolite-rich areas, such as the depocenter, and solution mine for dawsonite only in the dawsonite-rich areas, such as the bottom layers. This selective solution mining may significantly reduce a fluid cost, heating cost, and/or equipment cost associated with operating a solution mining process.

Nordstrandite ($Al(OH)_3$) is another aluminum bearing mineral that may be found in a formation. Nordstrandite decomposes at about the same temperatures (about 300° C.) as dawsonite and will produce alumina according to the equation:

$$2Al(OH)_3 \rightarrow Al_2O_3 + 3H_2O. \quad (81)$$

Nordstrandite is typically found in formations that also contain dawsonite and may be solution mined simultaneously with the dawsonite.

Solution mining dawsonite and nahcolite may be a simple process that produces only aluminum and soda ash from a formation. It may be possible to use some or all hydrocarbons produced from an in situ conversion process to produce direct current (DC) electricity on a site of the formation. The produced DC electricity may be used on the site to produce aluminum metal from the alumina using the Hall process. Aluminum metal may be produced from the alumina by melting the alumina in a treatment facility on the site. Generating the DC electricity at the site may save on costs associated with using hydrotreaters, pipelines, or other treatment facilities associated with transporting and/or treating hydrocarbons produced from the formation using the in situ conversion process.

Some formations may also contain amounts of trona. Trona is a sodium sesquicarbonate ($Na_2CO_3.NaHCO_3.2H_2O$) that has properties and undergoes reactions (including decomposition) very similar to those of nahcolite. Treatments for solution mining of trona may be substantially similar to treatments used for solution mining of nahcolite. Trona may typically be found in kerogen formations such as oil shale formations in Wyoming.

For certain types of formations, solution mining may be used to recover non-hydrocarbon materials prior to heating the formation to hydrocarbon pyrolysis temperatures. Examples of such materials and formations may include nahcolite and dawsonite in Green River oil shale, trona in Wyoming oil shale, or ammonia from buddingtonite in the Condor deposit in Queensland, Australia. Other non-hydrocarbon materials that may be solution mined include carbonates (e.g., trona, eitelite, burbankite, shortite, pirssonite, gaylussite, norsethite, thermonatrite), phosphates, carbonate-phosphates (e.g., bradleyite), carbonate chlorides (e.g., northupite), silicates (e.g., albite, analcite, sepiolite, loughlinite, labuntsovite, acmite, elpidite, magnesioriebeckite, feldspar), borosilicates (e.g., reedmergnerite, searlesite, leucosphenite), and halides (e.g., neighborite, cryolite, halite). Solution mining prior to hydrocarbon pyrolysis may increase a permeability of the formation and/or improve other features (e.g., porosity) of the formation for the in situ process. Solution mining may also remove significant portions of compounds that will tend to endothermically dissociate at increased temperatures. Removing these endothermically dissociating compounds from the formation tends to decrease an amount of heat input required to heat the formation.

For some types of formations, it may be advantageous to solution mine a formation after pyrolysis and/or synthesis gas production. Many different types of non-hydrocarbon materials may be removed from a formation following an in situ conversion process.

For example, phosphate may be removed from marine oil shale formations such as the Phosphoria formation in Idaho. Phosphate may have a weight percentage up to about 20 weight % or about 30 weight % in these formations. Recovered phosphate may be used in combination with ammonia and/or sulfur produced during the in situ conversion process to produce useable materials such as fertilizer.

Metals may also be recoverable from marine oil shale deposits. Metals such as uranium, chromium, cobalt, nickel, gold, zinc, etc. may be recovered from marine oil shale formations. Metals may also be found in certain bitumen deposits. For example, bitumen deposits may contain amounts of vanadium, nickel, uranium, platinum, or gold.

A simulation was used to predict the effects of solution mining nahcolite and dawsonite from an oil shale formation. The simulation predicts the effect on oil production and energy requirements for producing hydrocarbons from the oil shale formation using an in situ conversion process. The kinetics of decomposition of nahcolite and dawsonite were used in the simulation.

Nahcolite decomposed into soda ash, carbon dioxide, and water. The frequency factor for the decomposition was $7.83\times10^{15}$ (L/days). The activation energy was $1.015\times10^5$ joules per gram mole (J/gmol). The heat of reaction was −62,072 J/gmol.

Dawsonite decomposed into soda ash plus alumina ($Al_2O_3$), carbon dioxide, and water. The frequency factor for the decomposition was $1.0\times10^{20}$ (L/days). The activation energy was $2.039\times10^5$ J/gmol. The heat of reaction was −151,084 J/gmol.

The simulation assumed a 12.2 m well spacing in a triangular pattern. An injector well to producer well ratio was 12 to 1. FIG. 417 illustrates cumulative oil production ($m^3$) and cumulative heat input (kilojoules) versus time (years) using an in situ conversion process for solution mined oil shale and for non-solution mined oil shale. Curve 2906 illustrates cumulative oil production for non-solution mined oil shale. Curve 2908 illustrates cumulative heat input for non-solution mined oil shale. Curve 2910 illustrates cumulative oil shale production for solution mined oil shale. Curve 2912 illustrates cumulative heat input for solution mined oil shale.

The non-solution mined oil shale was assumed to have a 0.125 liters per kilogram (L/kg) Fischer Assay with 5% dawsonite and 20% nahcolite, a 1.9% fracture porosity, and a 65% water saturation. The solution mined oil shale was found to have a 0.125 L/kg Fischer Assay with 5% dawsonite and 0% nahcolite, a 29% porosity (created from removal of the nahcolite), and a 1.5% water saturation. The solution mined oil shale was assumed to have a relatively high permeability, which reduces the water saturation to 1.5%.

As shown in FIG. 417, the simulation predicts that oil production in solution mined oil shale (curve 2910) begins sooner and is faster than oil production in the non-solution mined oil shale (curve 2906). For example, after about 9 years, solution mined oil shale has produced about 9500 $m^3$ of oil, while non-solution mined oil shale has only produced about 1500 $m^3$ of oil. Non-solution mined oil shale will produce about 9500 $m^3$ of oil in about 12 years, 3 years later than solution mined oil shale.

Also, the simulation predicts that less heat is needed to produce oil from solution mined oil shale (curve 2912) than from non-solution mined oil shale (curve 2908). For example, after about 9 years, solution mined oil shale has required about $9\times10^{10}$ kJ of heat input, while non-solution mined oil shale has required about $1.1\times10^{11}$ kJ of heat input.

In certain embodiments a soluble compound (e.g., phosphates, bicarbonates, alumina, metals, minerals, etc.) may be produced from a soluble compound containing formation (e.g., a formation that contains nahcolite, dawsonite, nordstrandite, trona, carbonates, carbonate-phosphates, carbonate chlorides, silicates, borosililcates, etc.) that is different from a hydrocarbon containing formation. For example, the soluble compound containing formation may be adjacent (e.g., lower or higher than) the hydrocarbon containing formation, or at different non-adjacent depths than the hydrocarbon containing formation. In other embodiments, the soluble compound containing formation may be located at a different geographic location than the hydrocarbon containing formation.

In an embodiment, heat is provided from one or more heat sources to at least a portion of a hydrocarbon containing formation. A mixture, at some point, may be produced from the formation. The mixture may include hydrocarbons from the formation as well as other compounds such as $CO_2$, $H_2$, etc. Heat from the formation, or heat from the mixture produced from the formation, may be used to adjust or change a quality of a first fluid that is provided to the soluble compound containing formation. Heat may be provided in the form of hot water or steam produced from the formation. In other embodiments, heat may be transferred by heat exchange units to the first fluid. In other embodiments, a heated portion or component from the mixture may be mixed with the first fluid to heat the fluid.

Alternately, or in addition, a component from the mixture produced from the hydrocarbon containing formation may be used to adjust a quality of a first fluid. For example, acidic compounds (e.g., carbonic acid, organic acids) or basic compounds (e.g., ammonium, carbonate, or hydroxide compounds) from the mixture produced from the hydrocarbon containing formation may be used to adjust the pH of the first fluid. For example, $CO_2$ from the hydrocarbon containing formation may be used with water to acidify the first fluid. In certain embodiments, components added to the first fluid (e.g., divalent cations, pyridines, or organic acids such as carboxylic acids or naphthenic acids) may increase the solubility of the soluble compound in the first fluid.

Once adjusted (e.g., heated and/or changed by having at least one component added to the first fluid), the first fluid may be injected into the soluble compound containing formation. The first fluid may, in some embodiments, include hot water or steam. The first fluid may interact with the soluble compound. The soluble compound may at least partially dissolve. A second fluid including the soluble compound may be produced from the soluble compound containing formation. The soluble compound may be separated from the second fluid stream and treated or processed. Portions of the second fluid may be recycled into the formation.

In certain embodiments, heat from the hydrocarbon containing formation may migrate and heat at least a portion of the soluble compound containing formation. In some embodiments, the soluble compound containing formation may be substantially near, adjacent to, or intermixed with the hydrocarbon containing formation. The heat that migrates may be useful to enhance the solubility of the soluble compound when the first fluid is applied to the soluble compound containing formation. Heat that migrates from the hydrocarbon containing formation may be recovered instead of being lost.

Reusing openings (wellbores) for different applications may be cost effective in certain embodiments. In some embodiments, openings used for providing the heat sources (or from producing from the hydrocarbon containing formation) may be used to provide the first fluid to the soluble compound containing formation or to produce the second fluid from the soluble compound containing formation.

In certain embodiments, a solution may be first provided to, or produced from, a formation in a solution mining operation. The solution may be provided or produced through openings. One or more of the same openings may later be used as heater wells or producer wells for an in situ conversion process. Additionally, one or more of the same openings may be used again for providing a first fluid to the same formation layer or to a different formation layer. For example, the openings may be used to solution mine components such as nahcolite. These openings may further be used as heater wells or producer wells in the hydrocarbon containing formation. Then the openings may be used to provide the first fluid to either the hydrocarbon containing layer or a different layer at a different depth than the hydrocarbon containing layer. These openings may also be used when producing a second fluid from the soluble compound containing formation.

Hydrocarbon containing formations may have varied geometries and shapes. Conventional extraction techniques may not be appropriate for all formations. In some formations, rich hydrocarbon containing material may be positioned in layers that are too thin to be economically extracted using conventional methods. The rich hydrocarbon containing formations typically occur in beds having thicknesses between about 0.2 m and about 8 m. These rich hydrocarbon containing formations may include, but are not limited to, sapropelic coals (boghead, cannel coals, and/or torbanites), as well as kukersites, tasmanites, and similar high quality oil shales. The hydrocarbon layers may yield from about 205 liters of oil per metric ton to about 1670 liters of oil per metric ton upon pyrolysis.

FIGS. 380 and 381 depict representations of embodiments of in situ conversion process systems that may be used to produce a thin rich hydrocarbon layer. To produce such layers, directionally drilled wells may be used to heat the thin hydrocarbon layer within the formation, plus a minimum amount of rock above and/or below. In some embodiments, the heat source wells may be placed in the rock above and/or below the thin hydrocarbon layer. The wells may be closely spaced to reduce heat losses and speed the heating process. In addition, drilling technologies such as geosteering, slim well, coiled tubing, and other techniques may be utilized to accurately and economically place the wells. Conductive heat losses to the surrounding formation may be offset by a high oil content of the thin hydrocarbon layer, rapid heating of the thin hydrocarbon layer (e.g., a heating rate in the range of about 1° C./day to about 15° C./day), and/or close spacing (meter scale) of heaters. Subsidence may be reduced, or even minimized, by positioning heater wells in a non-hydrocarbon and/or lean section of the formation immediately beneath and/or at the base of the thin hydrocarbon layer. A non-hydrocarbon and/or lean section of the formation may lose less material than the thin hydrocarbon layer. Therefore, the structural integrity of formation may be maintained.

In some in situ conversion process embodiments, formations may be treated in situ by heating with a heat transfer fluid. A method for treating a formation may include injecting a heat transfer fluid into the formation. In some embodiments, steam may be used as the heat transfer fluid. The heat from the heat transfer fluid may transfer to a selected section of the formation. In conjunction with heat from heat sources, the heat may pyrolyze at least some of the hydrocarbons within the selected section of the formation. A vapor mixture that includes pyrolysis products may be produced from the formation. The pyrolysis products may include hydrocarbons having an average API gravity of at least about 25°. The vapor mixture may also include steam.

In one embodiment, hydrocarbons may be distilled from the formation. For example, hydrocarbons may be separated from the formation by steam distillation. The heat from the heat transfer fluid (e.g., steam), and/or heat from heat sources, may vaporize some of the hydrocarbons within the selected section of the formation. The vaporized hydrocarbons may include hydrocarbons having a carbon number greater than about 1 and a carbon number less than about 8. The vapor mixture may include the vaporized hydrocarbons. For example, in a heavy hydrocarbon containing formation, pyrolyzation fluids and steam may distill a substantial portion of unconverted heavy hydrocarbons. In addition, coke, sulfur, nitrogen, oxygen, and/or metals may be separated from formation fluid in the formation.

It may be advantageous to use steam injection for in situ treatment of heavy hydrocarbon or bitumen containing formations. In an embodiment, steam injection and soaking with steam may be applied to oil shale formations, coal formations, and hydrocarbon containing formations that have sufficiently high permeability and homogeneity. Substantially uniform heating of a substantial portion of the hydrocarbons in a formation to pyrolysis temperatures with heat transfer from steam and heat sources (e.g., electric heaters, gas burners, natural distributed combustors, etc.) may be enhanced if the formation has relatively high permeability and homogeneity. Relatively high permeability and homogeneity may allow the injected steam to contact a large surface area within the formation.

In certain embodiments, in situ treatment of hydrocarbons may be accomplished with a suitable combination of steam pressure, temperature, and residence time of injected steam, together with a selected amount of heat from heat sources, at a selected depth in the formation. For example, at a temperature of about 350° C., at hydrostatic pressure, and at a depth of about 700 m to about 1000 m, a residence time of at least approximately one month may be required for in situ steam treatment of hydrocarbons with steam and heat sources.

In some embodiments, relatively deep formations may be particularly suitable for in situ treatment with heat sources and steam injection. Higher steam pressures and temperatures may be readily maintained in relatively deep formations. Furthermore, steam may be at or approaching supercritical conditions below a particular depth. Supercritical steam or near supercritical steam may facilitate pyrolyzation of hydrocarbons. In other embodiments, in situ treatment of a relatively shallow formation may be performed with a sufficient amount of overpressure (e.g., an overpressure above a hydrostatic pressure). The amount of overpressure may depend on the strength of the formation or the overburden of the formation.

In an embodiment, in situ treatment of a formation may include heating a selected section of the formation with one or more heat sources, and one or more cycles of steam injection. The cycles of steam may soak the formation with steam for a selected time period. The selected time period may be about one month. In other embodiments, the selected time period may be about one month to about six months. The selected section may be heated to a temperature between about 275° C. and about 350° C. In another embodiment, the formation may be heated to a temperature of about 350° C. to about 400° C. A vapor mixture, which may include pyrolyzation fluids, may be produced from the formation through one or more production wells placed in the formation.

In certain embodiments, in situ treatment of a formation may include continuous steam injection into the formation, together with addition of heat from heat sources. Pyrolyzation fluids may be produced from different portions of the formation during such treatment.

FIG. 419 illustrates a schematic of an embodiment of continuous production of a vapor mixture from a formation. FIG. 419 includes formation 2914 with heat transfer fluid injection well 606 and well 2915. The wells may be members of a larger pattern of wells placed throughout the formation. A portion of a formation may be heated to pyrolyzation temperatures by heating the formation with heat sources and an injected heat transfer fluid. Heat transfer fluid 2916, such as steam, may be injected through injection well 606. Other wells may be used to provide the steam. Injected heat transfer fluid may be at a temperature between about 300° C. and about 500° C. In an embodiment, heat transfer fluid 2916 is steam.

Heat transfer fluid 2916, and heating from the heat sources, may heat region 2918 of the formation between wells 606 and 2915. Such heating may heat region 2918 into a selected temperature range (e.g., between about 275° C. and about 400° C.). An advantage of a continuous production method may be that the temperature across region 2918 may be substantially uniform and substantially constant with time once the formation has reached substantial thermal equilibrium. Vapor mixture 2920 may exit continuously through well 2915. Vapor mixture 2920 may include pyrolysis fluids and/or steam. In one embodiment, vapor mixture 2920 may be fed to surface separation unit 2922. Separation unit 2922 may separate vapor mixture 2920 into stream 2924 and hydrocarbons 594. Stream 2924 may be composed primarily of steam or water. Stream 2924 may be re-injected into the formation. Hydrocarbons may include pyrolysis fluids and hydrocarbons distilled from the formation.

In an embodiment, production of a vapor mixture from a formation may be performed in a batch mode. Injection of the heat transfer fluid may continue for a period of time, together with heat from one or more heat sources. In an embodiment, heat from the heat sources may combine with heat from transfer fluid until the temperature of a portion of the formation is at a desired temperature (e.g., between about 275° C. and about 400° C.). Higher or lower temperatures may also be used. Alternatively, injection may continue until a pore volume of the portion of the formation is substantially filled. After a selected period of time subsequent to ceasing injection of the heat transfer fluid, vapor mixture 2920 may be produced from the formation through wellbore 2915. The vapor mixture may include pyrolysis fluids and/or steam. In some embodiments, the vapor mixture may exit through injection well 606. In an embodiment, the selected period of time may be about one month.

Injected steam may contact a substantial portion of a volume of the formation to be treated. The heat transfer fluid may be injected through one or more injection wells. Similarly, the heat sources may be placed in one or more heater wells. The injection wells may be located substantially horizontally in the formation. Alternatively, the injection wells may be disposed substantially vertically or at any desired angle (e.g., along dip of the formation). The heat transfer fluid may be injected into regions of relatively high water saturation. Relatively high water saturation may include water concentrations greater than about 50 volume percent. In some embodiments, the average spacing between injection wells may be between about 40 m and about 50 m. In other embodiments, the average spacing may be between about 50 m and about 60 m.

In an embodiment, the heat from injection of a heat transfer fluid, together with heat from one or more heat sources, may pyrolyze at least some of the hydrocarbons in the selected first section. In certain embodiments, the heat may mobilize at least some of the hydrocarbons within the selected first section. Injection of a heat transfer fluid, and/or heat from the heat sources, may decrease a viscosity of hydrocarbons in the formation. Decreasing the viscosity of the hydrocarbons may allow the hydrocarbons to be more mobile. In addition, some of the heat may partially upgrade a portion of the hydrocarbons. Partial upgrading may reduce the viscosity and/or mobilize the hydrocarbons. Some of the mobilized hydrocarbons may flow (e.g., due to gravity) from the selected first section of the formation to a selected second section of the formation. Heat from the heat transfer fluid and the heat sources may pyrolyze at least some of the mobilized fluids in the selected second section.

In some embodiments, heat may be provided from one or more heat sources to at least one portion of the formation. The one or more heat sources may include electric heaters, flameless distributed combustors, or natural distributed combustors. Heat from the heat sources may transfer to the selected first section and the selected second section of the formation. The heat may heat or superheat steam injected into the formation. The heat may also vaporize water in the formation to generate steam. In addition, the heat from the heat sources may mobilize and/or pyrolyze hydrocarbons in the selected first section and/or the selected second section of the formation.

In an embodiment, the selected first section and the selected second section may be located in a relatively deep portion of the formation. For example, a relatively deep portion of a formation may be between about 100 m and about 300 m below the surface. Heat from the heat sources and the heat transfer fluid may pyrolyze at least some of the hydrocarbons within the selected second section of the formation. In some embodiments, at least about 20 percent of the hydrocarbons in the formation may be pyrolyzed. The pyrolyzed hydrocarbons may have an average API gravity of at least about 25°.

In an embodiment, a vapor mixture may be produced from the formation. The vapor mixture may contain pyrolyzed fluids. In other embodiments, the vapor mixture may contain pyrolyzed fluids and/or heat transfer fluid. The vapor mixture may include hydrocarbons distilled from the formation. The heat transfer fluid may be separated from the pyrolyzed fluids and distilled hydrocarbons at the surface of the formation. For example, heat transfer fluid may be separated using a membrane separation method. Alternatively, heat transfer fluid may be separated from pyrolyzed fluids and distilled hydrocarbons in the formation. The pyrolyzed fluids and distilled hydrocarbons may then be produced from the formation.

In an embodiment, the vapor mixture may be produced from the selected second section of the formation. Alternatively, the vapor mixture may be produced from the selected first section.

In one embodiment, the mobilized fluids may be partially upgraded in the selected second section. The partially upgraded fluids may be produced from the formation and re-injected back into the formation.

In certain embodiments, the vapor mixture may be produced through one or more production wells. In some embodiments, at least some of the vapor mixture may be produced through a heat source wellbore.

In one embodiment, a liquid mixture composed primarily of condensed heat transfer fluid may accumulate in a portion of the formation. The liquid mixture may be produced from the formation. The liquid mixture may include liquid hydrocarbons. The condensed heat transfer fluid may be separated from the liquid hydrocarbons in the formation and the condensed heat transfer fluid may be produced from the formation. Alternatively, the liquid mixture may be produced from the formation and fed to a separation unit. The separation unit may separate the condensed heat transfer fluid from the liquid hydrocarbons. The liquid hydrocarbons may then be re-injected into the formation.

FIG. 420 illustrates a cross-sectional representation of an embodiment of an in situ treatment process with steam injection. Portion 2926 of the formation may be treated with steam injection. Portion 2928 may be untreated. Horizontal injection and/or heat source wells 2930 may be located in an upper or selected first section of portion 2926. Horizontal production wells 2932 may be located in a lower or selected second section of portion 2926. The wells may be members of a larger pattern of wells placed throughout a portion of the formation.

Steam may be injected into the formation through wells 2930, and/or heat sources may be placed in such wells 2930 and provide heat to the formation and/or to the steam. The heat from the steam and the heat sources may heat the selected first and second sections to pyrolyzation temperatures and pyrolyze some of the hydrocarbons in the sections. In addition, heat from the steam injection and the heat sources may mobilize some hydrocarbons in the sections. The mobilized hydrocarbons in the selected first section may flow (e.g., by gravity and or flow towards low pressure of a pressure gradient established by production wells) to the selected second section as indicated by arrows 2934. Some of the mobilized hydrocarbons may be pyrolyzed in the selected second section. Pyrolyzed fluids and/or mobilized fluids may be produced through production wells 2932. In an embodiment, condensed fluids (e.g., condensed steam) may be produced through production wells in the selected second section.

FIG. 421 illustrates a cross-sectional representation of an embodiment of an in situ treatment process with steam injection and heat sources. Portion 2936 of the formation may be treated with heat from heat sources and steam injection. Portion 2938 may be untreated. Portion 2936 may include a horizontal heat source and/or injection well 606 located in an upper or selected first section. Horizontal production well 2932 may be located above the injection well in the selected first section of portion 2936. The production well and/or the injection well may include a heat source. Water and oil production well 2940 may be placed in the selected second section of the formation. The wells may be members of a larger pattern of wells placed throughout a portion of the formation.

Heat and/or steam may be provided to the formation through well 606. Such heat and steam may heat the selected first and second sections to pyrolyzation temperatures. Hydrocarbons may be pyrolyzed in the selected first section between well 2932 and well 606. In addition, the heat may mobilize some hydrocarbons in the sections. The mobilized hydrocarbons in the selected first section may flow through region 2942 to the selected second section as indicated by arrows 2944. Some of the mobilized hydrocarbons may be pyrolyzed in the selected second section. Pyrolyzed fluids and/or mobilized fluids may be produced through production well 2932. In addition, condensed fluids (e.g., steam) may be produced through production well 2940 in the selected second section.

In one embodiment, a method of treating a hydrocarbon containing formation in situ may include heating the formation with heat sources, and also injecting a heat transfer fluid into a formation and allowing the heat transfer fluid to flow through the formation. Heat transfer fluid may be injected into the formation through one or more injection wells. The injection wells may be located substantially horizontally in the formation. Alternatively, the injection wells may be disposed substantially vertically in the formation or at a desired angle. The size of a selected section of the formation may increase as a heat transfer fluid front migrates through the formation. "Heat transfer fluid front" is a moving boundary between the portion of the formation treated by heat transfer fluid and the portion untreated by heat transfer fluid. The selected section may be a portion of the formation treated or contacted by the heat transfer fluid. Heat from the heat transfer fluid, together with heat from one or more heat sources, may pyrolyze at least some of the hydrocarbons within the selected section of the formation. In an embodiment, the average temperature of the selected section may be about 300° C., which corresponds to a heat transfer fluid pressure of about 90 bars.

In some embodiments, heat from the heat transfer fluid and/or one or more heat sources may mobilize at least some of the hydrocarbons at the heat transfer fluid front. The mobilized hydrocarbons may flow substantially parallel to the heat transfer fluid front. Heat from the heat transfer fluid, in conjunction with heat from the heat sources, may pyrolyze at least some of the hydrocarbons in the mobilized fluid.

In an embodiment, a vapor mixture may migrate to an upper portion of the formation. The vapor mixture may include pyrolysis fluids. The vapor mixture may also include heat transfer fluid and/or distilled hydrocarbons. In an embodiment, the vapor mixture may be produced from an upper portion of the formation. The vapor mixture may be produced through one or more production wells located substantially horizontally in the formation.

In one embodiment, a portion of the heat transfer fluid may condense and flow to a lower portion of the selected section. A portion of the condensed heat transfer fluid may be produced from a lower portion of the selected section. The condensed heat transfer fluid may be produced through one or more production wells. Production wells may be located substantially horizontally in the formation.

FIG. 422 illustrates a cross-sectional representation of an embodiment of an in situ treatment process with heat sources and steam injection. Portion 2946 of the formation may be treated with heat sources and steam injection. Portion 2948 may be untreated. Portion 2946 may include horizontal heat source and/or injection well 606B. Alternatively or in addition, portion 2946 may include vertical heat source and/or injection well 606A. Horizontal production well 2932 may be located in an upper portion of the formation. Portion 2946 may also include condensed fluid production well 512 (production well 512 may contain one or more heat sources). The wells may be members of a larger pattern of wells placed throughout a portion of the formation.

Heat and/or steam may be provided into the formation through wells 606B or 606A. The heat and/or steam may flow through the formation in the direction indicated by arrows 2950. A size of a section treated by the heat and/or steam (i.e., a selected section) increases as the heat and/or steam flows through the untreated portion of the formation. The formation may include migrating heat and/or steam front 2952 at a boundary between portion 2946 and portion 2948.

Mobilized fluids may flow in the direction of arrows 2954 toward production well 2932. Fluids may be pyrolyzed and produced through production well 2932. Steam and distilled hydrocarbons may also be produced through well 2932. In addition, condensed fluids may flow downward in the direction of arrows 2956. The condensed fluids may be produced through production well 512. The heat source in production well 512 may pyrolyze some of the produced hydrocarbons.

Heat form the heat sources and/or steam may mobilize some hydrocarbons at the migrating steam front. The mobilized hydrocarbons may flow downward in a direction substantially parallel to the front as indicated by arrow 2958. A portion of the mobilized hydrocarbons may be pyrolyzed. At least some of the mobilized hydrocarbons may be produced through production well 2932 or production well 512.

In certain embodiments, existing steam treatment processes/systems may be enhanced by the addition of one or more heat sources to the process/system. Heat sources may be placed in locations such that heat from the heat source openings will heat areas of the formation that are not heated (or that are less heated) by the steam. For example, if the steam is preferentially flowing in certain pathways through the formation, the heat sources may be placed in locations that heat areas of the formation that are less heated by steam in these pathways. In some embodiments, hydrocarbon fluids may be produced through a heel portion of a wellbore of a heat source. The heel portion of the heat source may be at a lower temperature than the toe portion of the heat source. Efficiency and production of hydrocarbons from a steam flood may be enhanced.

Some hydrocarbon containing formations may contain a significant portion of adsorbed and/or absorbed methane. For example, some coal beds contain a significant amount of adsorbed methane. Often such methane is present in coal formations with a cleat system saturated with formation water. The formation may be in a water recharge zone. Only a small portion of the methane may be produced from hydrocarbon containing formations without removing the formation water. In some cases the inflow of water is so large that the hydrocarbon containing material cannot be dewatered effectively. The removal of the formation water may reduce pressure in the hydrocarbon containing formation and cause the release of some adsorbed methane. The removal of formation water may reduce pressure in the hydrocarbon containing formation and cause the release of some adsorbed methane. In some embodiments, the dewatering process may result in recovery of up to about 30% of adsorbed methane from a portion of the formation. In some embodiments, carbon dioxide may be injected into a formation to further enhance recovery of methane. In certain embodiments, heating an oil shale formation may cause thermal desorption of gas from a portion of the oil shale formation.

Increasing the average temperature of a formation with entrained methane may increase the yield of methane from the formation. Substantial recovery of entrained methane may be achieved at a temperature at or above approximately the boiling point of water in the formation. During heating, substantially all free moisture may be removed from a portion of the formation after the portion has reached an average temperature of about the ambient boiling point of water.

In certain embodiments, substantially complete recovery of methane from a coal formation may yield between about 1 $m^3$/ton and about 30 $m^3$/ton. Methane recovered from thermal desorption during heating may be used as fuel for an in situ treatment process. For example, methane may be used for power generation to run electric heater wells. In addition, methane may be used as fuel for gas fired heater wells or combustion heaters.

All or almost all methane that is entrained in a hydrocarbon containing formation may be produced during an in situ conversion process. In an embodiment, freeze wells may be installed around a portion of a formation that includes adsorbed methane to define a treatment area. Heat sources, production wells, and/or dewatering wells may be installed in the treatment area prior to, simultaneously with, or after installation of the freeze wells. The freeze wells may be activated to form a frozen barrier that inhibits water inflow into the treatment area. After formation of the frozen barrier, dewatering wells and/or selected production wells may be used to remove formation water from the treatment area. Some of the methane entrained within the formation may be released from the formation and recovered as the water is removed. Heat sources may be activated to begin heating the formation. Heat from the heat sources may release methane entrained in the formation. The methane may be produced from production wells in the treatment area. Early production of adsorbed methane may significantly improve the economics of an in situ conversion process.

Freeze wells may be used to isolate deep coal beds (e.g., coal in the Powder River Basin). Isolating the coal bed allows dewatering to remove coal bed methane gas. The coal beds often include aquifers with flow rates that would otherwise inhibit production of coal bed methane. The use of freeze wells may enable the dewatering of these coal beds and production of coal bed methane.

An in situ conversion process may alter hydrocarbon containing material in a treatment area of a formation. Upon application of heat, hydrocarbon material such as coal may be converted and/or upgraded, thereby accelerating a process that would occur naturally over geological time. Various properties of coal within a treatment area may be altered including, but not limited to, a heating value, a vitrinite reflectance, a moisture content, a volatile matter percentage, permeability, porosity, concentrations of various components in the coal such as sulfur, and/or a carbon percentage. For example, coal within a treatment area may be considered a bituminous coal prior to treatment. Application of heat may alter the bituminous coal to form an anthracite coal. An anthracite coal has a lower moisture content, a higher heating value, and a higher carbon weight percent. In certain embodiments, anthracite coal may be used in metallurgical processing. Typically, anthracite coal is found in thin coal seams of a few meters thickness. The in situ conversion process may generate an anthracite seam from a thick bituminous coal that is thicker than would be produced naturally.

In addition, the altered coal may have a high permeability and porosity. At least some of the coal heated using the in situ conversion process may, in certain embodiments, contain several fractures. In some instances, at least a portion of the coal may be friable or in a powdered form. In some embodiments, coal treated with an in situ conversion process may be easily mined using an underground automated or robotic system to mine coal as a powder or as a slurry. For example, water jetting may be used to remove at least some coal in a slurry. In some embodiments, an overburden may be removed by earth moving equipment after sufficient time has passed to allow the treated formation to cool to a temperature that allows for safe operation. In some embodiments, tunnels may be formed to coal that has been treated using an in situ process. Traditional mining equipment may be used to reach and remove the coal.

Coal produced as a powder or in a slurry may be used in various processes including, but not limited to, directly combusting coal at the surface for use as an energy source and/or slurrying the coal and transporting the coal for sale as an energy fuel. Such coal may be used as an activated carbon filter to remove components from various water and/or air streams within an in situ conversion process site and/or at external sites. The coal may alternately be used as an adsorbent (which may further upgrade the coal as a fuel) followed by combustion of the coal for power, as an intermediate in dyes (e.g., anthraquinone), and/or in metallurgical processes. Treating coal with an in situ conversion process may alter the coal such that an economic value of the coal increases and/or the costs associated with mining the coal decrease.

Water, in the form of saline or a solution with high levels of dissolved solids, may be provided to a hot spent reservoir. Water to be desalinated in a hot spent reservoir may originate from the ocean and/or from deep non-potable reservoirs. As water flows into the hot spent reservoir, the water may be evaporated and produced from the formation as steam. This water may be condensed into potable water having a low total dissolved solids content. Condensation of the produced water may occur in treatment facilities or in subsurface conduits. Salts and other dissolved solids may remain in the reservoir. The salts and dissolved solids may be stored in the reservoir. Alternatively, effluent from treatment facilities may be provided to a hot spent formation for desalinization and/or disposal.

Utilizing a hot spent formation to desalinate fluids may recover some heat from the formation. After a temperature within the formation falls below a boiling point of a fluid, desalinization may cease. Alternatively, a section of a formation may be continually heated to maintain conditions appropriate for desalinization. Desalinization may continue until a permeability and/or a porosity of a section is significantly reduced from the precipitation of solids. In some embodiments, heat from treatment facilities may be used to run a surface desalinization plant, with produced salts and solids being injected into a portion of the formation, or to preheat fluids being injected into the formation to minimize temperature change within the formation.

Water generated from a desalination process may be sold to a local market for use as potable and/or agricultural water. The desalinated water may provide additional resources to geographical areas that have severe water supply limitations.

Combustion of gaseous by-products from an in situ conversion process as well as fluids generated in treatment facilities may be utilized to generate heat and/or energy for use in the in situ conversion process. For example, a low heating value stream (LHV stream), such as tail gas from the treating/recovery operations, may be catalytically combusted to generate heat and increase temperatures to a range needed for the in situ conversion process. A monolithic substrate (i.e., honeycomb such as Torvex (Du Pont) and/or Cordierite (Corning)) with good flow geometry and/or minimal pressure drops may be used in the combustor. In a conventional process, a gaseous by-product stream may be flared, since the heating value is considered too low to sustain stable thermal combustion. Utilizing energy in these streams may increase an overall efficiency of the treatment system for formations.

A "kerogen and liquid hydrocarbon containing formation" is a formation that contains at least 5 volume % kerogen and at least 5 volume % liquid hydrocarbons. The liquid hydrocarbons may include oil with a grade that ranges between heavy hydrocarbons and light hydrocarbons. The presence of liquid hydrocarbons in the formation may be due to the maturation of a portion of the kerogen. Alternatively, liquid hydrocarbons in the formation may have migrated into the formation from outside sources and become trapped. Liquid hydrocarbons may be present in the formation due to both maturation and migration. The Natih B formation in Oman is an example of a formation formed by maturation and/or migration. The Natih B formation contains a substantial amount of light hydrocarbons with kerogen.

The lithology of kerogen and liquid hydrocarbon containing formations may be shale, fine-grained carbonate such as chalk or limestone, or some mixture of the two. The formations may contain siliceous materials such as diatomite and silicilyte. Kerogen and liquid hydrocarbon containing formations may include kerogenous shale, kerogenous chalk, siliceous kerogenous phosphatic shale, and/or kerogenous argillaceous limestone.

Kerogen and liquid hydrocarbon containing formations may have a relatively low permeability that ranges between about 0.1 millidarcy and about 10 millidarcy. The relatively low permeability of kerogen and liquid hydrocarbon containing formations may be due to both the very fine grain size in the formation matrix and to occlusion of the pores by the kerogen. Relatively deep formations (i.e., at a depth greater than about 1500 m) may have overpressure (a pressure between hydrostatic and lithostatic) and natural fracturing. Relatively shallow formations, due to later uplift and burial, may not preserve overpressures, but may still be fractured.

Formation thicknesses may range from about 5 m to about 100 m. Most kerogen and liquid hydrocarbon containing formations were deposited during the late Devonian, early Mississippian, Permian, Jurassic, or Cretaceous periods.

An in situ process for treating a kerogen and liquid hydrocarbon containing formation may include providing heat from one or more heat sources to at least a portion of the formation. The heat sources may transfer heat to a selected section of the formation. The heat from the heat sources may mobilize at least a portion of the liquid hydrocarbons in the selected section of the formation due to thermal expansion. Thermal expansion of the liquid hydrocarbons may create a pressure differential that drives the liquid hydrocarbons through the formation. The heat sources may transfer heat to the selected section such that a temperature of the selected section is sufficient to mobilize liquid hydrocarbons in the formation. A temperature sufficient to mobilize liquid hydrocarbons in a kerogen and liquid hydrocarbon containing formation may be within a range from about 100° C. to about 270° C. At least a portion of the mobilized liquid hydrocarbons may be produced from the formation. Liquid hydrocarbons may be produced through production wells placed in the formation.

Heat from the heat sources may pyrolyze a portion of the kerogen in the selected section of the formation. A temperature sufficient to pyrolyze kerogen in a kerogen and liquid hydrocarbon containing formation may be within a range from about 270° C. to about 400° C. Production wells may produce a mixture from the formation that includes pyrolyzation fluids and/or liquid hydrocarbons present in the formation prior to pyrolyzation. The mixture produced from the formation may also include some $CO_2$. In one embodiment, some of the $CO_2$ produced from the formation may separated from the produced fluid. The $CO_2$ may be used for enhanced oil recovery in a nearby oil field. Pyrolyzation and removal of pyrolyzation products may increase the permeability of the selected section of the formation. The increased permeability may facilitate flow of liquid hydrocarbons originally in the formation towards the production wells. The liquid hydrocarbons originally present may be in a liquid phase and/or in a vapor phase due to the heating of the formation. The liquid hydrocarbons originally present in the formation may be subject to pyrolyzation reactions within the formation.

In some embodiments, liquid hydrocarbons in the formation may be low grade hydrocarbons such as heavy hydrocarbons. Heat from heat sources may mobilize and/or pyrolyze the low grade hydrocarbons. A temperature sufficient to pyrolyze low grade hydrocarbons may be within a range from about 300° C. to about 375° C.

An average distance between heat sources in the formation may be between about 2 m and about 10 m. In some embodiments, an average distance between heat sources may be greater than about 10 m. In another embodiment, the average distance may be about 60 m. The pyrolyzation fluids may be produced through one or more production wells placed in the formation. In certain embodiments, an average spacing between production wells may be greater than about 80 m. Smaller production well spacings may be utilized. For example, a production well spacing of about 20 m may be used in some embodiments.

In certain embodiments, heat from the heat sources may vaporize aqueous fluids in the formation. Vaporization of the aqueous fluids may increase the permeability of the selected section. Thermal expansion of the aqueous fluids during vaporization may create a pressure differential that drives fluids through the formation towards low pressure zones (e.g., regions at and surrounding production wells). In certain embodiments, heat from the heat sources creates thermal fractures in the formation that increase the permeability of the formation and allow the light hydrocarbons to be produced.

In certain embodiments of treating a kerogen and liquid hydrocarbon containing formation, heat sources may be disposed horizontally within the formation. In an embodiment, an average length of the heat sources in the formation may be between about 800 m and about 1000 m. In other embodiments, the average length may be between about 1000 m and about 1200 m. In addition, one or more production wells may also be disposed horizontally within the formation. Alternatively, one or more production wells may be disposed vertically or at any desired angle within the formation.

FIG. 423 illustrates a schematic of a portion of a kerogen and liquid hydrocarbon containing formation. Heat source 508 may provide heat to a portion of formation 2960. Heat from heat source 508 may be transferred to selected section 2962. FIG. 424 illustrates an expanded view of selected section 2962. As shown in FIG. 424, selected section 2962 may contain liquid hydrocarbons 2964 trapped within portions of kerogen 2966. Selected section 2962 may also contain liquid hydrocarbons 2968 that are not trapped within kerogen.

Heat from heat source 508 may mobilize a portion of liquid hydrocarbons 2968 due to thermal expansion. Liquid hydrocarbons 2968 may migrate through the selected section due to increased pressure from thermal expansion. Liquid hydrocarbons 2968 may be produced through production well 512 shown in FIG. 423. Thermal fractures 2970 may free some trapped kerogen and increase the permeability of the selected section to enhance the migration of the liquid hydrocarbons to production wells.

Heat from heat source 508 may pyrolyze a portion of kerogen 2966 in selected section 2962. Pyrolyzation fluids from selected section 2962 may be produced through production well 512. Liquid hydrocarbons 2964 trapped within kerogen 2966 may be mobilized due to pyrolyzation of the kerogen and thermal expansion of the liquid hydrocarbons. Some liquid hydrocarbons 2964 may be produced through production well 512.

In certain embodiments, liquid hydrocarbons 2964 and 2968 may be low grade hydrocarbons such as heavy hydrocarbons. Heat from heat source 508 may mobilize and/or pyrolyze liquid hydrocarbons 2964 and 2968. The pyrolyzation fluids may be produced through production well 512.

FIG. 425 is a schematic illustration of one embodiment of production versus time or temperature from production well 512 shown in FIG. 423. The initial production up to and including the time period or temperature range in the region of peak 2972 may correspond primarily to production of liquid hydrocarbons not trapped within kerogen. The temperature in the region of peak 2972 may be close to a mobilization temperature for liquid hydrocarbons. Liquid hydrocarbons 2968 shown in FIG. 424 may be an example of such liquid hydrocarbons. Fluids produced in the region near peak 2974 may include, for example, liquid hydrocarbons trapped within kerogen and pyrolyzation fluids from kerogen. The temperature in the region of peak 2974 may be close to a pyrolyzation temperature for kerogen.

Rock-Eval pyrolysis is a petroleum exploration tool developed to assess the generative potential and thermal maturity of prospective source rocks. In particular, Rock-Eval pyrolysis may be used to determine the amount of hydrocarbons present in the form of kerogen and in the form of liquid hydrocarbons in a sample of a kerogen and liquid hydrocarbon containing formation. A ground sample may be pyrolyzed in a helium atmosphere. FIG. 426 illustrates a schematic of a typical temperature profile of the Rock-Eval pyrolysis process. The sample is initially heated and held at a temperature of about 300° C. for 5 minutes, as shown by line 2976. The sample is further heated at a rate of 25° C./min to a final temperature of about 600° C. The final temperature is maintained for 1 minute. The products of pyrolysis are oxidized in a separate chamber at about 580° C. to determine the total organic carbon content. All components generated are split into two streams passing through a flame ionization detector, which measures hydrocarbons, and a thermal conductivity detector, which measures $CO_2$.

FIG. 426 schematically illustrates the signal data obtained by the Rock-Eval analysis. Line 2978 illustrates a typical signal output from the flame ionization detector. Peak 2980 represents the free thermally liberated hydrocarbon present in the sample calculated as milligrams of hydrocarbon per gram of the sample. Peak 2980 includes hydrocarbons that are vaporized up to about 330° C. Hydrocarbons represented by peak 2980 are primarily composed of liquid hydrocarbons that are present in the source sample due to maturation or migration from outside the formation. Peak 2982 represents the hydrocarbons that result from cracking of kerogen and any high molecular weight hydrocarbon such as heavy hydrocarbons that did not vaporize near peak 2980. Similarly, line 2984 illustrates a typical signal output from the thermal conductivity detector. Peak 2986 represents the carbon dioxide evolved during low temperature pyrolysis of 390° C. or less. Rock-Eval also provides the amount of residual carbon that has no potential to generate hydrocarbon.

FIGS. 427, 428, 429, and 430 illustrate embodiments of heater well and production well patterns used in simulations of an in situ conversion process for a kerogen and liquid hydrocarbon containing formation similar to that found in the Natih B field in Oman. FIG. 427 illustrates an aerial view of horizontal heater wells and horizontal production wells. In FIG. 427, triangles 2988 indicate heater wells and circles 2990 indicate production wells. Lines 2992 represent the horizontal extent of the heater wells and production wells in the formation. Horizontal length 2994 of the wells was 1000 m. Distance 2996 between heater wells was 20 m. Distance 2998 between production wells was 60 m. FIG. 428 illustrates a cross-sectional representation of the pattern with horizontal heater wells and horizontal production wells. Depth 3000 of the pattern was 66 m. The ratio of heater wells to production wells for the pattern was 4:1.

FIG. 429 illustrates an aerial view of horizontal heater wells and vertical production wells. In FIG. 429 and FIG. 430, triangles indicate heater wells and circles indicate production wells. Distance 3002 between heater wells was 20 m. Length 3004 of the heater wells was 1000 m. Distance 3006 between the vertical production wells was 80 m. A total of 12 production wells per pattern was used. FIG. 430 illustrates a cross-sectional representation of the pattern with horizontal heater wells and vertical production wells. Depth 3008 of the pattern was 66 m. The ratio of heater wells to production wells was 4:3.

A summary of the parameters and results of the reservoir simulation are given in TABLE 30. Inputs into the simulator included the oil and kerogen in place for the formation and geologic data for the formation. The oil and kerogen in place represent the total amount of condensables that would be produced from the formation given 100% recovery. The recovery was estimated to be 70%. The richness and oil:kerogen ratio were determined from Rock-Eval analysis of a sample of the formation. The richness is the amount of condensables that may be produced per ton of the formation. The oil:kerogen ratio represents the ratio of liquid hydrocarbons to kerogen in the formation prior to treatment. The condensable production was determined by the simulator. The total production of non-condensables was determined from the kerogen and oil in place, the recovery, and the non-condensable:condensable volumetric production ratio.

TABLE 30

SUMMARY OF THE PARAMETERS AND RESULTS OF SIMULATION.

| | |
|---|---|
| Pattern Size | 20 m × 20 m |
| Depth | 66 m |
| Heater - Production Well Ratio: Horizontal heater wells and Horizontal production wells | 4/1 |
| Heater - Production Well Ratio: Horizontal heater wells and Vertical production wells | 4/3 |
| Patterns/Year | 82 |
| Total Patterns | 1732 |
| Drilling Time | 21 years |
| Production Life | 28 years |

TABLE 30-continued

| SUMMARY OF THE PARAMETERS AND RESULTS OF SIMULATION. | |
|---|---|
| Pattern Life | 9 years |
| Recovery | 70% |
| Richness | 0.114 $m^3$/ton |
| Pretreatment Oil:Kerogen Ratio | 0.53 |
| Oil and Kerogen in Place | 171.1 MM $m^3$ |
| Condensable Production | 15,900 $m^3$/day |
| Non-condensable:Condensable Volumetric Production Ratio | 356 |
| Non-condensable Total Production | 42,657 $m^3$ |

FIG. 431 illustrates the production of condensables and non-condensables per pattern as a function of time in years from an in situ conversion process as calculated by the simulator. Line 3010 represents the production of condensables in thousands of cubic meters as a function of time in years. Line 3012 represents the production of non-condensables in millions of cubic meters as a function of time in years. The production of both condensables and non-condensables decreases from about 7 years to about 9 years, which is the projected end of the pattern life.

FIG. 432 illustrates the total production of condensables and non-condensables as a function of time in years from an in situ conversion process as calculated by the simulator. Line 3014 is the total production of condensables as a function of time in years. Line 3016 is the total production of non-condensables as a function of time in years. FIG. 432 shows that the productions of condensables and non-condensables are at steady state between about 12 years and about 23 years.

FIG. 433 shows the annual heat injection rate per pattern versus time calculated by the simulator. The heat injection rate calculation assumes a value of the density of the formation multiplied by the heat capacity ($\rho C_p$) of $2.5\times10^6$J/$m^3$K. The heat injection rate calculation was based on heat-transfer calculations performed for oil shale in North America. This assumption gives a conservative estimate of the heat injection rate that may be achieved in the Natih B kerogen and liquid hydrocarbon containing formation.

U.S. Pat. No. 4,640,352 to Van Meurs et al., which is incorporated by reference as if fully set forth herein, describes a method for recovering hydrocarbons (e.g., heavy hydrocarbons) from a low permeability subterranean reservoir of the type comprised primarily of diatomite. At least two wells may be completed into a treatment interval having a thickness of at least about 30 m within an oil and water-containing zone. The zone may be both undesirably impermeable and non-productive in response to injections of oil-displacing fluids. The wells may be arranged to provide at least one each of heat-injecting and fluid-producing wells having boreholes. The wells may, substantially throughout the treatment interval, be substantially parallel and separated by substantially equal distances of at least about 6 m. In each heat-injecting well, substantially throughout the treatment interval, the face of the reservoir formation may be sealed with a solid material or cement which is relatively heat conductive and substantially fluid impermeable. Sealing of each heat-injecting well may inhibit fluid from flowing between the interior of the borehole and the reservoir. In each fluid-producing well, substantially throughout the treatment interval, fluid communication may be established between the well borehole and the reservoir formation and the well is arranged for producing fluid from that formation.

Heavy hydrocarbons may be contained in diatomite formations. The term "diatomite formation" is defined as a formation of a siliceous sedimentary rock composed of the siliceous skeletal remains of single-celled aquatic plants called "diatoms."

Heavy hydrocarbons containing diatomite formations may have a relatively high porosity, high internal surface area, high absorptive capacity, relatively low permeability, and relatively high oil saturation. "Relatively high porosity" is, with respect to diatomite or portions thereof, an average porosity of greater than about 50%. The low permeability of diatomite formations may be due to the scarcity of flow channels or fractures through which oil may flow and, ultimately, be recovered. Such deposits, in addition to the oil saturated diatomaceous particles, may also contain some fine clay, silt, and water.

An "oil containing formation" is a rock formation that includes microscopic pores in coarser sediments of rock. The rock may be composed of shales, limestone, and carbonates. Oil may be present in interstices between rocks and within the pores. An oil containing formation generally has a relatively high porosity and relatively high oil saturation. The average porosity may be greater than about 15%. The average oil saturation may be greater than about 40%. Oil containing formations may have sections greater than about 10 m in thickness.

In an embodiment, heat sources may be initiated in stages to control the volumetric production rate. Staging may allow substantially constant production throughout production from the formation (e.g., ignoring initial heating time of the first stage).

In certain embodiments, a portion of the formation fluids in relatively deep sections of a formation may reach a supercritical state. Condensable and non-condensable formation fluids in a supercritical state may become miscible, which may allow single-phase flow through the deep sections of the formation.

Fractures may be created by expansion of the heated portion of the formation matrix. In addition, fractures may also be created by increased pressure from expanding formation fluids and products generated from pyrolysis. In some embodiments, hydrocarbons such as kerogen, pyrobitumen, and/or bitumen may block pores in a portion of the formation. Such hydrocarbons may dissolve or pyrolyze during heating, resulting in an increase in the permeability of the portion of the formation.

In one embodiment, vaporization of the aqueous fluids in pores of the formation may result in separation of hydrocarbons from water. The vaporizing water may cause some local fracturing of the rock matrix. Hydrocarbons may migrate by film drainage, which may further increase the effective permeability of the formation. The relatively low viscosity of the hydrocarbons may increase the possibility of migration of hydrocarbons by film drainage. The relatively low viscosity may be due to the relatively high temperature in the formation.

In certain embodiments, heat from the heat sources may shrink clays present in a portion of the formation. Shrinkage of the clay may increase permeability of the portion.

In an embodiment, a method of treating an oil containing formation in situ may include injecting a recovery fluid into a formation. The recovery fluid may be water. Heat from one or more heat sources may provide heat to the formation. At least one of the heat sources may be an electric heater. In one embodiment, at least one of the heat sources may be located in a heater well. A heater well may include a conduit through which flows a hot fluid that transfers heat to the formation. At least some of the recovery fluid in a selected section of the formation may be vaporized by heat from the heat sources.

For example, water may be vaporized into steam. Heat from the heat sources and the vaporized recovery fluid may pyrolyze at least some hydrocarbons within the selected section. A temperature for pyrolysis may be from about 270° C. to about 400° C.

A gas mixture that includes pyrolyzation fluids and steam may be produced from the formation. In one embodiment, fluids may be produced through a production well. The pressure at or near the heat sources may increase due to thermal expansion of the formation and vaporization of the recovery fluid. The pressure differential between the heat sources and production wells may force steam and/or pyrolyzation fluids toward the production wells. In one embodiment, the gas mixture may include hydrocarbons having an average API gravity greater than about 25°.

FIG. 434 illustrates a schematic of an embodiment of in situ treatment of an oil containing formation. FIG. 434 includes formation 3018 with heat source well 3020 and production well 512. The wells may be members of a larger pattern of wells placed throughout a portion of the formation. Recovery fluid 3022 may be injected into the formation through heat source well 3020. Water may be used as a heat recovery fluid. Heat from heat source well 3020 may vaporize some of the water in the formation to produce steam. Heat from the heat sources and/or the steam may pyrolyze hydrocarbons in the formation.

In an embodiment, a pressure differential may be created in region 3024 between heat source well 3020 and production well 512 due to thermal expansion of the formation and vaporization of the steam. Steam and pyrolyzation fluids may be forced by the pressure gradient from heat source well 3020 towards production well 512. Steam and pyrolyzation fluids stream 3026 may be produced from production well 512.

Stream 3026 may be fed to surface separation unit 3028. Separation unit 3028 may separate stream 3026 into stream 3030 and hydrocarbons 594. Stream 3030 may be composed primarily of steam or water. Steam may be used in power generation units 1798 or heat exchange mechanisms 2858 or injected back into the formation.

Further Improvements

In certain embodiments, acoustic waves and their reflections may be used to determine the approximate location of a wellbore within a hydrocarbon layer (e.g., a coal layer). In some embodiments, logging while drilling (LWD), seismic while drilling (SWD), and/or measurement while drilling (MWD) techniques may be used to determine a location of a wellbore while the wellbore is being drilled. Examples of these techniques are disclosed in U.S. Pat. Nos. 5,899,958 to Dowell et al.; 6,078,868 to Dubinsky; 6,084,826 to Leggett, III; 6,088,294 to Leggett, III et al.; and 6,427,124 to Dubinsky et al., each of which is incorporated by reference as if fully set forth herein.

In an embodiment, an acoustic source may be placed in a wellbore being formed in a hydrocarbon layer (e.g., the acoustic source may be placed at, near, or behind the drill bit being used to form the wellbore). The location of the acoustic source may be determined relative to one or more geological discontinuities (e.g., boundaries) of the formation (e.g., relative to the overburden and/or the underburden of the hydrocarbon layer). The approximate location of the acoustic source (i.e., the drilling string being used to form the wellbore) may be assessed while the wellbore is being formed in the formation. Monitoring of the location of the acoustic source, or drill bit, may be used to guide the forming of the wellbore so that the wellbore is formed at a desired distance from, for example, the overburden and/or the underburden of the formation. For example, if the location of the acoustic source drifts from a desired distance from the overburden or the underburden, then the forming of the wellbore may be adjusted to place the acoustic source at a selected distance from a geological discontinuity. In some embodiments, a wellbore may be formed at approximately a midpoint in the hydrocarbon layer between the overburden and the underburden of the formation (i.e., the wellbore may be placed along a midline between the overburden and the underburden of the formation).

FIG. 435 depicts an embodiment for using acoustic reflections to determine a location of a wellbore in a formation. Drill bit 3031 may be used to form opening 544 in hydrocarbon layer 522. Drill bit 3031 may be coupled to drill string 3032. Acoustic source 3034 may be placed at or near drill bit 3031. Acoustic source 3034 may be any source capable of producing an acoustic wave in hydrocarbon layer 522 (e.g., acoustic source 3034 may be a monopole source or a dipole source that produces an acoustic wave with a frequency between about 2 kHz and about 10 kHz). Acoustic waves 3036 produced by acoustic source 3034 may be measured by one or more acoustic sensors 3038. Acoustic sensors 3038 may be placed in drill string 3032. In an embodiment, 3 to 10 (e.g., 8) acoustic sensors 3038 are placed in drill string 3032. Acoustic sensors 3038 may be spaced between about 5 cm and about 30 cm apart (e.g., about 15.2 cm apart). The spacing between acoustic sensors 3038 and acoustic source 3034 is typically between about 5 meters and about 30 meters (e.g., between about 9 meters and about 15 meters).

In an embodiment, acoustic sensors 3038 may include one or more hydrophones (e.g., piezoelectric hydrophones) or other suitable acoustic sensing device. Hydrophones may be oriented at 90° intervals symmetrically around the axis of drill string 3032. In certain embodiments, the hydrophones may be oriented such that respective hydrophones in each acoustic sensor 3038 are aligned in similar directions. Drill string 3032 may also include a magnetometer, an accelerometer, an inclinometer, and/or a natural gamma ray detector. Data at each acoustic sensor 3038 may be recorded separately using, for example, computational software for acoustic reflection recording (e.g., BARS acquisition hardware/software available from Schlumberger Technology Co. (Houston, Tex.)). Data may be recorded at acoustic sensors 3038 at an interval between about every 1 μsec and about every 50 μsec (e.g., about every 15 μsec).

Acoustic waves 3036 produced by acoustic source 3034 may reflect off of overburden 524, underburden 914, and/or other unconformities or geological discontinuities (e.g., fractures). The reflections of acoustic waves 3036 may be measured by acoustic sensors 3038. The intensities of the reflections of acoustic waves 3036 may be used to assess or determine an approximate location of acoustic source 3034 relative to overburden 524 and/or underburden 914. For example, the intensity of a signal from a boundary that is closer to the acoustic source may be somewhat greater than the intensity of a signal from a boundary further away from the acoustic source. In addition, the signal from a boundary that is closer to the acoustic source may be detected at an acoustic sensor at an earlier time than the signal from a boundary further away from the acoustic source.

Data acquired from acoustic sensors 3038 may be processed to determine the approximate location of acoustic source 3034 in hydrocarbon layer 522. In certain embodiments, data from acoustic sensors 3038 may be processed using a computational system or other suitable system for analyzing the data. The data from acoustic sensors 3038 may be processed by one or more methods to produce suitable results.

In one embodiment, acoustic waves 3036 that are reflected from geological discontinuities (e.g., boundaries of the formation) are detected at two or more acoustic sensors 3038. The reflected acoustic waves may arrive at the acoustic sensors later than refracted acoustic waves and/or with a different moveout across the array of acoustic sensors. The local wave velocity in the formation may be assessed, or known, from analysis of the arrival times of the refracted acoustic waves. Using the local wave velocity, the distance of a selected reflecting interface (i.e., geological discontinuity) may be assessed (e.g., computed) by assessing the appropriate arrival time for the reflection from the selected reflecting interface when the acoustic source and the acoustic sensor are not separated (i.e., zero offset), multiplying the assessed appropriate arrival time by the local wave velocity, and dividing the product by two. The zero offset arrival time may be assessed by applying normal moveout corrections for the assessed local wave velocity to the recorded waveforms of the acoustic waves at each acoustic sensor and stacking the corrected waveforms in a common reflection point gather. This process is generally known and commonly used in surface exploration reflection seismology.

The direction from which a particular acoustic wave originates (e.g., above or below opening 544) may be assessed with a knowledge of the angle of the opening, which may be provided by a wellbore survey, and an estimate of the dip of hydrocarbon layer 522, which may be made by a surface seismic section. If the opening dips with respect to the formation itself, an upcoming wave (i.e., a wave coming from below the opening) may be separated from a downgoing wave (i.e., a wave coming from above the opening) by the sign of the apparent velocities of the waves in a common acoustic sensor panel composed over a substantial length of the opening. For a formation with a uniform thickness and an opening with a distance from the top and bottom of the formation that does not substantially vary along a length of the opening being monitored, polarized detectors may be used to assess the direction from which an acoustic wave arrives at an acoustic sensor.

In certain embodiments, filtering of the data may enhance the quality of the data (e.g., removing external noises such as noise from drill bit 3031). Frequency and/or apparent velocity filtering may be used to suppress coherent noises in the data collected from acoustic sensors. Coherent noises may include unwanted and intense noise from events such as earlier refracted arrivals, direct fluid waves, waves that may propagate in the drill sting or logging tool, and/or Stoneley waves. Data filtering may also include bandpass filtering, f-k dip filtering, wavelet-processing Wiener filtering, and/or wave separation filtering. Filtering may be used to reduce the effects of wellbore wave signal modes (e.g., compressional headwaves) in common shot, common receiver, and/or common offset modes. In some embodiments, filtering of the data may include accounting for the velocity of acoustic waves in the formation. The velocity of acoustic waves in the formation may be calculated or assessed by, for example, acoustic well logging and/or acoustic measurements on a core sample from the formation. The data may also be processed by binning, normal moveout, and/or stacking (e.g., prestack migration). In some embodiments, the data may be processed by binning, normal moveout, and/or stacking followed by a second stacking technique (e.g., poststack migration). Prestack migration and poststack migration may be based on the generalized Radon transform. In certain embodiments, results from processing the data may be displayed and/or analyzed following any method of processing the data so that the data may be monitored (e.g., for quality control purposes).

In an embodiment, processed data may be analyzed to provide feedback control to drill bit 3031. Direction of drill bit 3031 may be modified or adjusted if the location of acoustic source 3034 varies from a desired spacing relative to geological discontinuities (e.g., overburden 524 and/or underburden 914) so that opening 544 may be formed at a desired location (e.g., at a desired spacing between the overburden and the underburden). For example, drill string 3032 may include an inclinometer that is used to direct the forming (i.e., drilling) of opening 544. The direction of the inclinometer may be adjusted to compensate for variance of the location of acoustic source 3034 from the desired location between overburden 524 and/or underburden 914. An advantage of using data from acoustic sensors 3038 while drilling an opening in the formation may be the real-time monitoring of the location of drill bit 3031 and/or adjusting the direction of drilling in real time. In some embodiments, opening 544 formed using acoustic data to control the location of the opening may be used as a guide opening for forming one or more additional openings in a formation (e.g., magnetic tracking of opening 544 may be used to form one or more additional openings).

In an embodiment, a hydrocarbon containing formation may be pre-surveyed before drilling to determine the lithology of the formation and/or the optimum geometry of acoustic sources and sensors. Pre-surveying the formation may include simulating refraction signals for compressional and/or shear waves, various reflection mode signals in a wellbore, mud wave signals, Stoneley wave signals (i.e., seam vibration), and other reflective or refractive wave signals in the formation. In one embodiment, reflected signals may be determined by three-dimensional (3-D) ray tracing (an example of 3-D ray tracing is available from Schlumberger Technology Co. (Houston, Tex.)). Simulating these signals may provide an estimate of the optimum parameters for operating sensors and analyzing sensor data. In addition, pre-surveying may include determining if acoustic waves can be measured and analyzed efficiently within a formation.

FIG. 436 depicts an embodiment for using acoustic reflections and magnetic tracking to determine a location of a wellbore in a formation. Measurements of acoustic waves 3036 may be used to assess an approximate location of opening 544 relative to geological discontinuities (e.g., overburden 524 and/or underburden 914). Magnetic tracking may be used to assess an approximate location of opening 544 relative to one or more additional wellbores in the formation. The combination of measurements of acoustic waves and magnetic tracking in a wellbore (e.g., opening 544) may increase the accuracy of placing the wellbore (e.g., the accuracy of drilling of the wellbore) in hydrocarbon layer 522 or any other subsurface formation or subsurface layer. Drill bit 3031 may be used to form opening 544 in hydrocarbon layer 522. Drill bit 3031 may be coupled to a turbine (e.g., a mud turbine) to turn the drill bit. The turbine may be located at or behind drill bit 3031 in drill string 3032. Non-magnetic section 3033 may be located behind drill bit 3031 in drill string 3032. Non-magnetic section 3033 may inhibit magnetic fields generated by drill bit 3031 from being conducted along a length of drill string 3032. In an embodiment, non-magnetic section 3033 includes Monel®. In certain embodiments, acoustic source 3034 may be placed in non-magnetic section 3033. In other embodiments, acoustic source 3034 may be placed in sections of drill string 3032 behind non-magnetic section 3033 (e.g., in probe section 3035).

In an embodiment, drill string 3032 may include probe section 3035. Probe section 3035 may include inclinometer 3039 (e.g., a 3-axis inclinometer) and/or magnetometer 3037 (e.g., a 3-axis fluxgate magnetometer.). In an embodiment, magnetometer 3037 may be used to determine a location of opening 544 relative to one or more additional openings in hydrocarbon layer 522. Inclinometer 3039 may be used to assess the orientation and/or control the drilling angle of drill bit 3031.

Acoustic sensors 3038 may be located in drill string 3032 behind probe section 3035. In some embodiments, acoustic sensors 3038 may be located in probe section 3035. In some embodiments, acoustic sensors 3038, probe section 3035 (including inclinometer 3039 and/or magnetometer 3037), and acoustic source 3034 may be located at other positions along a length of drill string 3032.

FIG. 437 depicts signal intensity (I) versus time (t) for raw data obtained from an acoustic sensor in a formation. The raw data was taken for a single shot of an acoustic source in a horizontal wellbore in a coal seam. The coal seam had a thickness of about 30 feet (9.1 m). The acoustic source was separated from eight evenly spaced acoustic sensors by distances from 15 feet (4.6 m) to 18.5 feet (5.6 m). Four separate planar piezoelectric hydrophones were included in each acoustic sensor. The four hydrophones were oriented at 90° intervals symmetrically around the axis of the drilling string. The data shown in FIG. 437 is for a single hydrophone. The drilling string included a magnetometer and accelerometers, for determining the orientation of the drilling string and drill bit, and a natural gamma ray detector. The four hydrophones at each acoustic sensor were recorded separately using BARS acquisition hardware/software from Schlumberger Technology Co. (Houston, Tex.). A total of 32 512-sample traces were recorded at a 15 μsec sampling rate after firing the source.

The arrival times of the P-wave refraction (3041) and the P-wave reflection (3043) are indicated in FIG. 437. The P-wave reflection had a later arrival time than the P-wave refraction. The P-wave reflection was assessed as a reflection event because the P-wave reflection arrived with a higher velocity than the refracted P-wave, which has the highest velocity possible for a direct arrival. Modeling of the P-wave velocity in the coal derived from the P-wave refraction arrival and the geometry of the acoustic devices indicated that the distance from the horizontal wellbore to the reflector producing the P-wave reflection was about 16 feet (4.9 m). This result indicated that the wellbore was within ±1 foot (0.3 m) of the center of the coal seam. Magnetic sensing of magnetic fields produced by a wireline placed in a second wellbore indicated that distance between the wellbores was approximately the desired distance of 20 feet (6.1 m).

Rotating magnet ranging may be used to monitor the distance between wellbores. Vector Magnetics LLC (Ithaca, N.Y.) uses one example of a rotating magnet ranging system. In rotating magnet ranging, a magnet rotates with a drill bit in one wellbore to generate a magnetic field. A magnetometer in another wellbore is used to sense the magnetic field produced by the rotating magnet. Data from the magnetometer can be used to measure the coordinates (x, y, and z) of the drill bit in relation to the magnetometer.

In some embodiments, magnetostatic steering may be used to form openings adjacent to a first opening. U.S. Pat. No. 5,541,517 issued to Hartmann et al. describes a method for drilling a wellbore relative to a second wellbore that has magnetized casing portions.

When drilling a wellbore (opening), a magnet or magnets may be inserted into a first opening to provide a magnetic field used to guide a drilling mechanism that forms an adjacent opening or adjacent openings. The magnetic field may be detected by a 3-axis fluxgate magnetometer in the opening being drilled. A control system may use information detected by the magnetometer to determine and implement operation parameters needed to form an opening that is a selected distance away (e.g., parallel) from the first opening (within desired tolerances).

Various types of wellbores may be formed using magnetic tracking. For example, wellbores formed by magnetic tracking may be used for in situ conversion processes (i.e., heat source wellbores, production wellbores, injection wellbores, etc.) for steam assisted gravity drainage processes, the formation of perimeter barriers or frozen barriers (i.e., barrier wells or freeze wells), and/or for soil remediation processes. Magnetic tracking may be used to form wellbores for processes that require relatively small tolerances or variations in distances between adjacent wellbores. For example, freeze wells may need to be positioned parallel to each other with relatively little or no variance in parallel alignment to allow for formation of a continuous frozen barrier around a treatment area. In addition, vertical and/or horizontally positioned heater wells and/or production wells may need to be positioned parallel to each other with relatively little or no variance in parallel alignment to allow for substantially uniform heating and/or production from a treatment area in a formation. In an embodiment, a magnetic string may be placed in a vertical well (e.g., a vertical observation well). The magnetic string in the vertical well may be used to guide the drilling of a horizontal well such that the horizontal well passes the vertical well at a selected distance relative to the vertical well and/or at a selected depth in the formation.

In an embodiment, analytical equations may be used to determine the spacing between adjacent wellbores using measurements of magnetic field strengths. The magnetic field from a first wellbore may be measured by a magnetometer in a second wellbore. Analysis of the magnetic field strengths using derivations of analytical equations may determine the coordinates of the second wellbore relative to the first wellbore.

North and south poles may be placed along the z axis with a north pole placed at the origin and north and south poles placed alternately at constant separation L/2 out to $z=\pm\infty$, where z is the location along the z-axis and L is the distance between consecutive north and consecutive south poles. Let all the poles be of equal strength P. The magnetic potential at position (r, z) is given by:

$$\Phi(r, z) = \frac{P}{4\pi} \sum_{n=-\infty}^{\infty} (-1)^n \{r^2 + (z - nL/2)^2\}^{1/2}. \tag{82}$$

The radial and axial components of the magnetic field are given by:

$$B_r = -\frac{\partial \Phi}{\partial r} \text{ and} \tag{83}$$

$$B_z = -\frac{\partial \Phi}{\partial z}. \tag{84}$$

EQN. 82 can be written in the form:

$$\Phi(r, z) = \frac{P}{2\pi L} f(2\pi/L, 2z/L) \text{ with} \tag{85}$$

$$f(\alpha, \beta) = \sum_{n=-\infty}^{\infty} (-1)^n \{\alpha^2 + (\beta - n)^2\}^{1/2}. \tag{86}$$

For values of α and β in the ranges $\alpha \in [\mathbf{0}, \infty]$, $\beta \in [-\infty, \infty]$, replacing n by -n in EQN. 86 yields the result:

$$f(\alpha, -\beta) = f(\alpha, \beta). \tag{87}$$

Therefore only positive β may be used to evaluated accurately. Furthermore:

$$f(\alpha, m+\beta) = (-1)^m f(\alpha, \beta),\ m = 0, \pm 1, \ldots \tag{88}$$

$$\text{and } f(\alpha, 1-\beta) = -f(\alpha, \beta). \tag{89}$$

EQNS. 88 and 89 suggest the limit of $\beta \in [0, \frac{1}{2}]$. The summation on the right-hand side of EQN. 86 converges to a finite answer for all α and β except when $\beta = \mathbf{0}$ and β is an integer. However, unless α is small, it converges too slowly for practical use in evaluating f(α,β). Thus, α is transformed to obtain a much more rapidly convergent expression. The transformation:

$$\{\alpha^2 + (\beta - n)^2\}^{1/2} = \frac{2}{\pi} \int_0^\infty dk (k^2 + \alpha^2 + (\beta - n)^2\}^{-1}, \tag{90}$$

can be used.

Substituting EQN. 90 into EQN. 89 and interchanging the summation and integration results in:

$$f(\alpha, \beta) = \int_0^\infty dk g(k, \alpha, \beta), \text{ with} \tag{91}$$

$$g(k, \alpha, \beta) = \sum_{n=-\infty}^{\infty} (-1)^n \{k^2 + \alpha^2 + (\beta - n)^2\}^{-1}. \tag{92}$$

Further, it can be shown that g can be expressed in terms of hyperbolic and trigonometric functions. A simple special case is:

$$g(k, \alpha, 0) = \sum_{n=-\infty}^{\infty} (-1)^n \{k^2 + \alpha^2 + n^2\}^{-1} = \frac{\pi}{\sqrt{k^2 + \alpha^2} \sinh(\pi \sqrt{k^2 + \alpha^2})}. \tag{93}$$

Substituting EQN. 93 into EQN. 91, making the change of variable k=αμ, expanding out the sin h function, and using the fact that:

$$K_0(z) = \int_0^\infty dt \exp(-z \cosh t) = \int_0^\infty du (1 + u^2)^{-1/2} \exp\{-z(1 + u^2)^{1/2}\}, \tag{94}$$

results in:

$$f(\alpha, 0) = 4 \sum_{m=0}^{\infty} K_0\{(2m + 1)\pi\alpha\}. \tag{95}$$

To treat the general case, let:

$$\gamma^2 = k^2 + \alpha^2 \tag{96}$$

and use the identity:

$$\sum_{n=-\infty}^{\infty} (-1)^n \{\gamma^2 + (\beta - n)^2\}^{-1} = \frac{1}{2\gamma} \sum_{n=-\infty}^{\infty} (-1)^n \left\{ \frac{\gamma + i\beta}{n^2 + (\gamma + i\beta)^2} + \frac{\gamma - i\beta}{n^2 + (\gamma - i\beta)^2} \right\}. \tag{97}$$

EQN. 93 therefore may be generalized to:

$$g(k, \alpha, \beta) = \frac{\pi}{2\gamma} \left\{ \frac{1}{\sinh\{\pi(\gamma + i\beta)} + \frac{1}{\sinh\{\pi(\gamma - i\beta)} \right\}, \tag{98}$$

and expanding out the hyperbolic sines as before results in:

$$f(\alpha, \beta) = 4 \sum_{m=0}^{\infty} K_0\{(2m + 1)\pi\alpha\} \cos\{(2m + 1)\pi\beta\}. \tag{99}$$

Substituting EQN. 99 back into EQN. 85 then yields:

$$\Phi(r, z) = \frac{2P}{\pi L} \sum_{m=0}^{\infty} K_0\{(2m + 1)2\pi r/L\} \cos\{(2m + 1)2\pi z/L\}. \tag{100}$$

The differentiations in EQNS. 83 and 84 may then be performed to give the following expressions for the field components:

$$B_r = \frac{4P}{L^2} \sum_{m=0}^{\infty} (2m + 1) K_1\{(2m + 1)2\pi r/L\} \cos\{(2m + 1)2\pi z/L\} \tag{101}$$

and $$B_z = \frac{4P}{L^2} \sum_{m=0}^{\infty} (2m + 1) K_0\{(2m + 1)2\pi r/L\} \sin\{(2m + 1)2\pi z/L\}. \tag{102}$$

For large arguments, the analytical functions have the following asymptotic form:

$$K_0(z), K_1(z) \sim \sqrt{\frac{\pi}{2z}} \exp(-z). \tag{103}$$

For sufficiently large r, then, EQNS. 101 and 102 may be approximated by:

$$B_r \sim \frac{2P}{L^2}\sqrt{\frac{L}{r}}\exp(-2\pi r/L)\cos(2\pi z/L) \quad (104)$$

and $$B_z \sim \frac{2P}{L^2}\sqrt{\frac{L}{r}}\exp(-2\pi r/L)\sin(2\pi z/L). \quad (105)$$

Thus, the magnetic field strengths $B_r$ and $B_z$ may be used to estimate the position of the second wellbore relative to the first wellbore by solving EQNS. 104 and 105 for r and z. FIG. 452 depicts magnetic field strength versus radial distance calculated using the above analytical equations. As shown in FIG. 452, the magnetic field strength drops off exponentially as the radial distance from the magnetic field source increases. The exponential functionality of magnetic field strengths, $B_r$ and $B_z$ with respect to r enables more accurate determinations of radial distances. Such improved accuracy may be a significant advantage when attempting to drill wellbores with substantially uniform spacings.

The magnets may be moved (e.g., by moving a magnetic string) with the magnetometer sensors stationary and multiple measurements may be taken to remove fixed magnetic fields (e.g., earth's magnetic field, other wells, other equipment, etc.) from affecting the measurement of the relative position of the wellbores. In an embodiment, two or more measurements may be used to eliminate the effects of fixed magnetic fields such as the Earth's magnetic field and the fields from other casings. A first measurement may be taken at a first location. A second measurement may be taken at a second location L/4 from the first location. A third measurement may be taken at a third location L/2 from the first location. Because of sinusoidal variations along the z-axis, measurements at L/2 apart may be about 180° out of phase. At least two of the measurements (e.g., the first and third measurements) may be vectorially subtracted and divided by two to remove/reduce fixed magnetic field effects. Specifically, when this subtraction is done, the components attributable to fixed magnetic field effects, being constant, are removed. At the same time, the 180° out of phase components attributable to the magnets, being equal in strength but differing in sign, will add together when the subtraction is performed. Therefore the 180° out of phase components, after being subtracted from each other, are divided by two. Removing or reducing fixed magnetic field effects is a significant advantage in that it improves system accuracy.

At least two of the measurements may be used to determine the Earth's magnetic field strength, BE. The Earth's magnetic field strength along with measurements of inclination and azimuthal angle may be used to give a "normal" directional survey. Use of all three measurements may determine the azimuthal angle between the wellbores, the radial distance between wellbores, and the initial distance along the z-axis of the first measurement location.

Simulations may be used to show the effects of spacing, L, on the magnetic field components produced from a wellbore with magnets and measured in a neighboring wellbore. FIGS. 438, 439, and 440 show the magnetic field components as a function of hole depth of neighboring observation wellbores. $B_z$ is the magnetic field component parallel to the lengths of the wellbores, $B_r$ is the magnetic field component in a perpendicular direction between the wellbores, and $B_{Hst}$ is the angular magnetic field component between the wellbores. In FIGS. 438, 439, and 440, $B_{Hsr}$ is zero because there was no angular offset between the two wellbores. FIG. 438 shows the magnetic field components with a horizontal wellbore at 100 m depth and a neighboring observation wellbore at 90 m depth (i.e., 10 m wellbore spacing). The poles had a magnetic field strength of 1500 Gauss with a spacing, L, between the poles of 10 m. The poles were placed from 0 meters to 250 m along the wellbore with a positive pole at 80 m. FIG. 439 shows the magnetic field components with a horizontal wellbore at 100 m depth and a neighboring observation wellbore at 95 m depth (i.e., 5 m wellbore spacing). The $B_z$ component begins to flatten as the wellbore spacing decreases. FIG. 440 shows the magnetic field components with a horizontal wellbore at 100 m depth and a neighboring observation wellbore at 97.5 m depth (i.e., 2.5 m wellbore spacing). The $B_z$ component deviates more from the $B_r$ component as the spacing between wellbores is further decreased. FIGS. 438, 439, and 440 show that to be able to use the analytical solution to monitor the magnetic field components, the spacing between poles, L, should typically be less than or about equal to the spacing between wellbores.

Further simulations determined the effect of build-up on the magnetic components (with a maximum turning of the wellbore of about 10° for every 30 m). Two wellbores both followed each other at a constant distance. The wellbore with the magnets started at a set depth and magnet location, and built angle (no turning) as the wellbore was formed. The observation wellbore started at a depth 10 m from the wellbore with the magnets and offset 2 m from the magnet location, and also built angle but at a slightly faster rate to keep the separation distance about equal.

FIG. 441 shows the magnetic field components with the wellbore with magnets built at 4° per every 30 m and the observation wellbore built at 4.0950 per every 30 m to maintain the well spacing. FIG. 441 shows that the sine functions are only slightly skewed. The component maxima are no longer opposite the pole position (as shown in FIG. 438) because the wellbores are slightly offset and maintained at a constant distance.

FIG. 442 depicts the ratio of $B_r/B_{Hsr}$ from FIG. 441. In an ideal situation, the ratio should be 5, since the observation wellbore has a separation in a perpendicular direction of 10 m from the wellbore with the magnets and an offset of 2 m (Hsr direction). The excessive points are due to the fact that the data for the excessive points are taken at midpoints between the poles where both $B_r$ and $B_{Hsr}$ are zero.

FIG. 443 depicts the ratio of $B_r/B_{Hst}$ with a build-up of 10° per every 30 m. The distance between wellbores was the same as in FIG. 442. FIG. 443 shows that the accuracy is still good for the high build-up rate. FIGS. 441-443 show that the accuracy of magnetic steering is still relatively good for build-up sections of wellbores.

FIG. 444 depicts comparisons of actual calculated magnetic field components versus magnetic field components modeled using analytical equations for two parallel wellbores with L=20 m separation between poles. FIG. 444 depicts the $B_z$ component as a function of distance between the wellbores where a perfect fit (i.e., the difference between modeling distance and actual distance is set at zero) is set at 7 m by adjusting the pole strengths, P. FIG. 445 depicts the difference between the two curves in FIG. 444. As shown in FIGS. 444 and 445, the variation between the modeled and actual distance is relatively small and may be predictable. FIG. 446 depicts the $B_r$ component as a function of distance between the wellbores with the fit used for the perfect fit of $B_z$ set at 7 m. FIG. 447 depicts the difference between the two curves in FIG. 446. FIGS. 444-447 show that the same accuracy exists using $B_z$ or $B_r$ to determine distance.

FIG. 448 depicts a schematic representation of an embodiment of a magnetostatic drilling operation to form an opening that is an approximate desired distance away from (e.g., substantially parallel to) a drilled opening. Opening 544 may be formed in hydrocarbon layer 522. In some embodiments, opening 544 may be formed in any hydrocarbon containing formation, other types of subsurface formations, or for any subsurface application (e.g., soil remediation, solution mining, steam-assisted gravity drainage (SAGD), etc.). Opening 544 may be formed substantially horizontally within hydrocarbon layer 522. For example, opening 544 may be formed substantially parallel to a boundary (e.g., the surface) of hydrocarbon layer 522. Opening 544 may be formed in other orientations within hydrocarbon layer 522 depending on, for example, a desired use of the opening, formation depth, a formation type, etc. Opening 544 may include casing 3040. In certain embodiments, opening 544 may be an open (or uncased) wellbore. In some embodiments, magnetic string 3042 may be inserted into opening 544. Magnetic string 3042 may be unwound from a reel into opening 544. In an embodiment, magnetic string 3042 includes one or more magnet segments 3044. In other embodiments, magnetic string 3042 may include one or more movable permanent longitudinal magnets. A movable permanent longitudinal magnet may have a north and a south pole. Magnetic string 3042 may have a longitudinal axis that is substantially parallel (e.g., within about 5% of parallel) or coaxial with a longitudinal axis of opening 544.

Magnetic strings may be moved (e.g., pushed and/or pulled) through an opening using a variety of methods. In an embodiment, a magnetic string may be coupled to a drill string and moved through the opening as the drill string moves through the opening. Alternatively, magnetic strings may be installed using coiled tubing. Some embodiments may include coupling a magnetic string to a tractor system that moves through the opening. For example, commercially available tractor systems from Welltec Well Technologies (Denmark) or Schlumberger Technology Co. (Houston, Tex.) may be used. In certain embodiments, magnetic strings may be pulled by cable or wireline from either end of an opening. In an embodiment, magnetic strings may be pumped through an opening using air and/or water. For example, a pig may be moved through an opening by pumping air and/or water through the opening and the magnetic string may be coupled to the pig.

In some embodiments, casing 3040 may be a conduit. Casing 3040 may be made of a material that is not significantly influenced by a magnetic field (e.g., non-magnetic alloy such as non-magnetic stainless steel (e.g., 304, 310, 316 stainless steel), reinforced polymer pipe, or brass tubing). The casing may be a conduit of a conductor-in-conduit heater, or it may be perforated liner or casing. If the casing is not significantly influenced by a magnetic field, then the magnetic flux will not be shielded.

In other embodiments, the casing may be made of a ferromagnetic material (e.g., carbon steel). A ferromagnetic material may have a magnetic permeability greater than about 1. The use of a ferromagnetic material may weaken the strength of the magnetic field to be detected by drilling apparatus 3046 in adjacent opening 3048. For example, carbon steel may weaken the magnetic field strength outside of the casing (e.g., by a factor of 3 depending on the diameter, wall thickness, and/or magnetic permeability of the casing). Measurements may be made with the magnetic string inside the carbon steel casing (or other magnetically shielding casing) at the surface to determine the effective pole strengths of the magnetic string when shielded by the carbon steel casing. In certain embodiments, casing 3040 may not be used (e.g., for an open wellbore). Casing 3040 may not be magnetized, which allows the Earth's magnetic field to be used for other purposes (e.g., using a compass). Measurements of the magnetic field produced by magnetic string 3042 in adjacent opening 3048 may be used to determine the relative coordinates of adjacent opening 3048 to opening 544.

In some embodiments, drilling apparatus 3046 may include a magnetic guidance sensor probe. The magnetic guidance sensor probe may contain a 3-axis fluxgate magnetometer and a 3-axis inclinometer. The inclinometer is typically used to determine the rotation of the sensor probe relative to the Earth's gravitational field (i.e., the "toolface angle"). A general magnetic guidance sensor probe may be obtained from Tensor Energy Products (Round Rock, Tex.). The magnetic guidance sensor may be placed inside the drilling string coupled to a drill bit. In certain embodiments, the magnetic guidance sensor probe may be located inside the drilling string of a river crossing rig.

Magnet segments 3044 may be placed within conduit 3050. Conduit 3050 may be a threaded or seamless coiled tubular. Conduit 3050 may be formed by coupling one or more sections 3052. Sections 3052 may include non-magnetic materials such as, but not limited to, stainless steel. In certain embodiments, conduit 3050 is formed by coupling several threaded tubular sections. Sections 3052 may have any length desired (e.g., the sections may have a standard length for threaded tubulars). Sections 3052 may have a length chosen to produce magnetic fields with selected distances between junctions of opposing poles in magnetic string 3042. The distance between junctions of opposing poles may determine the sensitivity of a magnetic steering method (i.e., the accuracy in determining the distance between adjacent wellbores). Typically, the distance between junctions of opposing poles is chosen to be on the same scale as the distance between adjacent wellbores (e.g., the distance between junctions may in a range of about 1 m to about 500 m or, in some cases, in a range of about 1 m to about 200 m).

In an embodiment, conduit 3050 is a threaded stainless steel tubular (e.g., a Schedule 40, 304 stainless steel tubular with an outside diameter of about 7.3 cm (2.875 in.) formed from approximately 6 m (20 ft.) long sections 3052). With approximately 6 m long sections 3052, the distance between opposing poles will be about 6 m. In some embodiments, sections 3052 may be coupled as the conduit is formed and/or inserted into opening 544. Conduit 3050 may have a length between about 125 m and about 175 m. Other lengths of conduit 3050 (e.g., less than about 125 m or greater than 175 m) may be used depending on a desired application of the magnetic string.

In an embodiment, sections 3052 of conduit 3050 may include two magnet segments 3044. More or less than two segments may also be used in sections 3052. Magnet segments 3044 may be arranged within sections 3052 such that adjacent magnet segments have opposing polarities (i.e., the segments are repelled by each other due to opposing poles (e.g., N-N) at the junction of the segments), as shown in FIG. 448. In an embodiment, one section 3052 includes two magnet segments 3044 of opposing polarities. The polarity between adjacent sections 3052 may be arranged such that the sections have attracting polarities (i.e., the sections are attracted to each other due to attracting poles (e.g., S-N) at the junction of the sections), as shown in FIG. 448. Arranging the opposing poles approximate the center of each section may make assembly of the magnet segments within each section relatively easy. In an embodiment, the approximate centers of adjacent sections 3052 have opposite poles. For example, the approximate center of one section may have north poles and the adjacent section (or sections on each end of the one section) may have south poles as shown in FIG. 448.

Fasteners 3054 may be placed at the ends of sections 3052 to hold magnet segments 3044 within the sections. Fasteners 3054 may include, but are not limited to, pins, bolts, or screws. Fasteners 3054 may be made of non-magnetic materials. In some embodiments, ends of sections 3052 may be closed off (e.g., end caps placed on the ends) to enclose magnet segments 3044 within the sections. In certain embodiments, fasteners 3054 may also be placed at junctions of opposing poles of adjacent magnet segments 3044 to inhibit the adjacent segments from moving apart.

FIG. 449 depicts an embodiment of section 3052 with two magnet segments 3044 with opposing poles. Magnet segments 3044 may include one or more magnets 3056 coupled to form a single magnet segment. Magnet segments 3044 and/or magnets 3056 may be positioned in a linear array. Magnets 3056 may be Alnico magnets or other types of magnets with sufficient magnetic strength to produce a magnetic field that can be sensed in a nearby wellbore. Alnico magnets are made primarily from alloys of aluminum, nickel and cobalt and may be obtained, for example, from Adams Magnetic Products Co. (Elmhurst, Ill.). Using permanent magnets in magnet segments 3044 may reduce the infrastructure associated with magnetic tracking compared to using inductive coils or magnetic field producing wires (e.g., there is no need to provide a current and the infrastructure for providing current using permanent magnets). In an embodiment, magnets 3056 are Alnico magnets about 6 cm in diameter and about 15 cm in length. Assembling a magnet segment from several individual magnets increases the strength of the magnetic field produced by the magnet segment. Increasing the strength of the magnetic field(s) produced by magnet segments may advantageously increase the maximum distance for sensing the magnetic field(s). In certain embodiments, the pole strength of a magnet segment may be between about 100 Gauss and about 2000 Gauss (e.g., about 1500 Gauss). In some embodiments, the pole strength of a magnet segment may be between about 1000 Gauss and about 2000 Gauss. Magnets 3056 may be coupled with attracting poles coupled such that magnet segment 3044 is formed with a south pole at one end and a north pole at a second end. In one embodiment, 40 magnets 3056 of about 15 cm in length are coupled to form magnet segment 3044 of about 6 m in length. Opposing poles of magnet segments 3044 may be aligned proximate the center of section 3052 as shown in FIGS. 448 and 449. Magnet segments may be placed within section 3052 and held within the section with fasteners 3054. One or more sections 3052 may be coupled as shown in FIG. 448, to form a magnetic string.

FIG. 450 depicts a schematic of an embodiment of a portion of magnetic string 3042. Magnet segments 3044 may be positioned such that adjacent segments have opposing poles. In some embodiments, force may be applied to minimize distance 3058 between magnet segments 3044. Additional segments may be added to increase a length of magnetic string 3042. In certain embodiments, magnet segments 3044 may be located within sections 3052, as shown in FIG. 448. Magnetic strings may be coiled after assembling. Installation of the magnetic string may include uncoiling the magnetic string. Coiling and uncoiling of the magnetic string may also be used to change position of the magnetic string relative to a sensor in a nearby wellbore (e.g., drilling apparatus 3046 in opening 3048 as shown in FIG. 448).

Magnetic strings may include multiple south-south and north-north opposing pole junctions. As shown in FIG. 450, the multiple opposing pole junctions may induce a series of magnetic fields 3060. Alternating the polarity of portions within a magnetic string may provide a sinusoidal variation of the magnetic field along the length of the magnetic string. The magnetic field variations may allow for control of the desired spacing between drilled wellbores. In certain embodiments, a series of magnetic fields 3060 may be sensed at greater distances than individual magnetic fields. Increasing the distance between opposing pole junctions within the magnetic string may increase the radial distance at which a magnetometer may detect a magnetic field. In some embodiments, the distance between opposing pole junctions within the magnetic string may be varied. For example, more magnets may be used in portions proximate the Earth's surface than in portions positioned deeper in the formation.

In certain embodiments, the distance between junctions of opposing poles of the magnetic strings may be increased or decreased when the separation distance between two wellbores increases or decreases, respectively. Shorter distances between junctions of opposing poles increases the frequency of variations in the magnetic field, which may provide more guidance (i.e., better accuracy) to the drilling operation for smaller wellbore separation distances. Longer distances between junctions of opposing poles may be used to increase the overall magnetic field strength for larger wellbore separation distances. For example, a distance between junctions of opposing poles of about 6 m may induce a magnetic field sufficient to allow drilling of adjacent wellbores at distances of less than about 16 m. In certain embodiments, the spacing between junctions of opposing poles may be varied between about 3 m and about 24 m. In some embodiments, the spacing between junctions of opposing poles may be varied between about 0.6 m and about 60 m. The spacing between junctions of opposing poles may be varied to adjust the sensitivity of the drilling system (e.g., the allowed tolerance in spacing between adjacent wellbores).

In an embodiment, a magnetic string may be moved forward in a first opening while forming an adjacent second opening using magnetic tracking of the magnetic string. Moving the magnetic string forward while forming the adjacent second opening may allow shorter lengths of the magnetic string to be used. Using shorter lengths of magnetic string may be more economically favorable by reducing material costs.

In one embodiment, a junction of opposing poles in the magnetic string (e.g., the junction of opposing poles at the center of the magnetic string) in the first opening may be aligned with the magnetic sensor on a drilling string in the second opening. The second opening may be drilled forward using magnetic tracking of the magnetic string. The second opening may be drilled forward a distance of about L/2, where L is the spacing between junctions of opposing poles in the magnetic string. The magnetic string may then be moved forward a distance of about L/2. This process may be repeated until the second opening is formed at the desired length. The magnetic sensor may remained aligned with the center of the magnetic string during the drilling process. In some embodiments, the forward drilling and movement of the magnetic string may be done in increments of L/4.

In some embodiments, the strength of the magnets used may affect the strength of the magnetic field induced. In certain embodiments, a distance between junctions of opposing poles of about 6 m may induce a magnetic field sufficient to drill adjacent wellbores at distances of less than about 6 m. In other embodiments, a distance between junctions of opposing poles of about 6 m may induce a magnetic field sufficient to drill adjacent wellbores at distances of less than about 10 m.

A length of the magnetic string may be based on an economic balance between cost of the string and the cost of having to reposition the string during drilling. A string length may range from about 20 m to about 500 m. In an embodiment, a magnetic string may have a length of about 50 m. Thus, in some embodiments, the magnetic string may need to be repositioned if the openings being drilled are longer than the length of the string.

In some embodiments, a magnet may be formed by one or more inductive coils, solenoids, and/or electromagnets. FIG. 451 depicts an embodiment of a magnetic string. Magnetic string 3042 may include core 3062. Core 3062 may be formed of ferromagnetic material (e.g., iron). Core 3062 may be surrounded by one or more coils 3064. Coils 3064 may be made of conductive material (e.g., copper). Coils 3064 may include one continuous coil or several coils coupled together. In an embodiment, coils 3064 are wound in one direction (e.g., clockwise) for a specific length and then the next specific length of coil is wound in a reverse direction (e.g., counter-clockwise). The specific length of coil wound in one direction may be equal to L/2, where L is the spacing between opposing poles as described above. Winding sections of coil in different directions may produce magnetic fields 3066, when an electrical current is provided to coils 3064, that are oriented in opposite directions, thereby producing effective magnetic poles between the sections of coil. Alternating the directions of winding may also produce effective magnetic poles that are alternating between effective north poles and effective south poles along a length of core 3062. Coupling section 3068 may couple one or more sections of core 3062 together. Coupling section 3068 may include non-ferromagnetic material (e.g., fiberglass or polymer). Coupling section 3068 may be used to separate the opposing magnetic poles.

An electrical current may be provided to coils 3064 to produce one or more magnetic fields (e.g., a series of magnetic fields) along a length of core 3062. The amount of electrical current provided to coils 3064 may be adjusted to alter the strength of the produced magnetic fields. The strength of the produced magnetic fields may be altered to adjust for the desired distance between wellbores (i.e., a stronger magnetic field for larger distances between wellbores, etc.). In certain embodiments, a direct current (DC) may be provided to coils 3064 in one direction for a specified time (e.g., about 5 seconds to about 10 seconds) and in a reverse direction for a specified time (e.g., about 5 seconds to about 10 seconds). Measurements of the produced magnetic field with electrical current flowing in each direction may be taken. These measurements may be used to subtract or remove fixed magnetic fields from the measurement of distance between wellbores.

When multiple wellbores are to be drilled around a center wellbore, the center wellbore may be drilled and magnetic strings may be placed in the center wellbore to guide the drilling of the other wellbores substantially surrounding the center wellbore. Cumulative errors in drilling may be limited by drilling neighboring wellbores guided by the magnetic string. Additionally, only wellbores using the magnetic string may include a nonmagnetic liner, which may be more expensive than typical liners.

As an example, in a seven spot pattern, a first wellbore may be formed at the center of the well pattern. A magnetic string may be placed in the first wellbore. The neighboring (or surrounding) six wellbores may be formed using the magnetic string in the first wellbore for guidance. After the seven spot pattern has been formed, additional wellbores may be formed by placing the magnetic string in one of the six surrounding wellbores and forming the nearest neighboring wellbores to the wellbore with the magnetic string. The process of forming nearest neighboring wellbores and moving the magnetic string to form successive neighboring wellbores may be repeated until a wellbore pattern has been formed for a hydrocarbon containing formation. Drilling as many nearest neighbor wellbores as possible from a single wellbore may reduce the cost and time associated with moving the magnetic string from wellbore to wellbore and/or installing multiple magnetic strings.

In an embodiment, the nearest neighboring wellbores to a previously formed wellbore are formed using magnetic steering with a magnetic string placed in the previously formed wellbore. The previously formed wellbore may have been formed by any standard drilling method (e.g., gyroscope, inclinometer, earth's field magnetometer, etc.) or by magnetic steering from another previously formed wellbore. Forming nearest neighbor wellbores with magnetic steering may reduce the overall deviation between wellbores in a well pattern formed for a hydrocarbon containing formation. For example, the deviation between wellbores may be kept below about ±1 m. In some embodiments of formed heater wellbores, heat may be varied along the lengths of wellbores to compensate for any variations in spacing between heater wellbores.

In certain embodiments, a magnetic guidance sensor probe may be located inside a drilling string of a river crossing rig. River crossing rigs may be used to drill horizontal wellbores or substantially horizontal wellbores through a hydrocarbon layer. In certain embodiments, river crossing rigs are used to drill angled wellbores through an overburden of a formation with a substantially horizontal wellbore in the hydrocarbon layer. River crossing rigs may also be used to form wellbores in any subsurface formation or layer. FIG. 453 depicts an embodiment of an opening in a hydrocarbon containing formation that has been formed with a river crossing rig. A wellbore (opening 544) may be formed in hydrocarbon layer 522. Opening 544 may have first opening 3070 at a first position on the surface and second opening 3072 at a second position on the surface at the other end of opening 544. Hydrocarbon layer 522 may have overburden 524. Portions of opening 544 in overburden 524 may be enclosed in reinforcing material 3074. Reinforcing material 3074 may be cement or other suitable materials. Reinforcing material 3074 may inhibit heat or fluid losses to overburden 524. Machinery 3076 may be located and used at first opening 3070 and machinery 3078 may be located and used at second opening 3072.

Opening 544 may be formed in one or more steps. FIGS. 454-460 depict an embodiment for forming opening 544 in a hydrocarbon containing formation. FIG. 454 depicts an embodiment for forming a portion of opening 544 in overburden 524 at end of first opening 3070. Opening 544 may be formed using machinery 3076. Machinery 3076 may include drilling equipment such as drill bits, drilling string, directional drilling equipment (e.g., a 3-axis fluxgate magnetometer and a 3-axis inclinometer), mud motor, etc. In some embodiments, drilling equipment may include a steerable cone, which can be pushed forward through the wellbore by a tubing injector and/or propel itself by vibration such that no drilling cuttings are generated in the wellbore. In forming a wellbore with a river crossing rig, the drill bit of the river crossing rig may drill the wellbore at an angle as the drill bit enters overburden 524 of the formation, as shown in FIG. 454.

Drilling entry angles for river crossing rigs may vary between about 5° and about 20° with a typical angle of about 10° or about 12°.

FIG. 455 depicts an embodiment of reinforcing material 3074 placed in the portion of opening 544 in overburden 524 at end of first opening 3070. After the portion of opening 544 in overburden 524 at end of first opening 3070 has been formed, opening 544 may be reamed out and reinforcing material 3074 may be placed in the opening. In an embodiment, reinforcing material 3074 may be cement poured into opening 544 and allowed to cure or harden. Reinforcing material 3074 may have a thickness between about 0.5 cm and about 15 cm, between about 1 cm and about 10 cm, or between about 2 cm and about 5 cm.

FIG. 456 depicts an embodiment for forming opening 544 in hydrocarbon layer 522 and overburden 524. After reinforcing material 3074 is in place, opening 544 may be formed using machinery 3076. Drill bit 3080 may be used to form opening 544. Directional drilling may be used to guide the formation of opening 544. Directional drilling may include the use of a 3-axis fluxgate magnetometer and a 3-axis inclinometer. Opening 544 may be formed between first opening 3070 at a first position on the surface and second opening 3072 at a second position on the surface. Opening 544 may be drilled at the entry angle until a specified depth is reached (generally at some location in hydrocarbon layer 522 of the formation), at which depth the direction of drilling is changed to drill in a substantially horizontal direction through the formation. The substantially horizontal section of opening 544 is drilled until the opening reaches a predetermined horizontal length. After the predetermined horizontal length is reached, the direction of drilling is turned to an exit angle, which may be substantially the same as the entry angle, to meet with machinery at the second end of the wellbore.

FIG. 457 depicts an embodiment of a reamed out portion of opening 544 in overburden 524 at end of second opening 3072. A portion of opening 544 in overburden 524 at end of second opening 3072 may be reamed out after forming opening 544. Reaming may be accomplished using an attachment to drill bit 3080 or another device coupled to the drilling string coupled to machinery 3076.

FIG. 458 depicts an embodiment of reinforcing material 3074 placed in the reamed out portion of opening 544 in overburden 524 at end of second opening 3072. Reinforcing material 3074 may be placed in the reamed out portion of opening 544 in overburden 524 at end of second opening 3072. Packer 3082 may be placed in the reamed out portion to inhibit reinforcing material from flowing into portions of opening 544 in hydrocarbon layer 522.

After placement of reinforcing material 3074 in the reamed out portion, drill bit 3080 may reform opening 544 through the reinforcing material and the packer, as shown in FIG. 459. After opening 544 has been reformed, machinery at the first end and/or the second end of the opening may be used to pull equipment into the wellbore. FIG. 460 depicts an embodiment for installing equipment (e.g., heat sources, production conduits, etc.) into opening 544. In certain embodiments, machinery 3078 may be located at second opening 3072. Machinery 3078 may include machinery for providing (i.e., insertion, unspooling, coupling, etc.) equipment 3084 to be installed in the wellbore. In one embodiment, machinery 3078 may include a coiled tubing rig for providing equipment 3084 into opening 544. In an embodiment, equipment such as heaters or conduits may be fully assembled before being installed in opening 544 (i.e., the equipment may be fully laid along the surface before being installed). In certain embodiments, equipment 3084 may be pulled into opening 544 with drill bit 3080 coupled to machinery 3076 at first opening 3070. Pulling equipment (e.g., heaters or heat sources) into a long horizontal wellbore may be more efficient than pushing the equipment into the wellbore.

In some embodiments, drill bit 3080 may be used to ream out the wellbore or increase the diameter of the wellbore as the drill bit is pulled into the opening. The wellbore may be reamed out either before equipment is pulled into the wellbore or, in some embodiments, as equipment is pulled into the wellbore. In certain embodiments, after forming opening 544, a logging tool (e.g., a gyrolog) may be pulled back by coupling the logging tool to drill bit 3080 or to a pig coupled to machinery 3076. The logging tool may be used to determine the accuracy in the formed location of opening 544. In other embodiments, magnetic tracking may be used to determine the accuracy in the formed location of opening 544.

River crossing rigs may provide an inexpensive and efficient method for forming a horizontal wellbore in a hydrocarbon layer. The horizontal wellbore may have a first opening at a first position on the surface and a second opening at a second position on the surface. River crossing rigs are operated by companies such as The Crossing Company Inc. (Nisku, Alberta) or A&L Underground, Inc. (Lenexa, Kans.).

In some embodiments, a second wellbore with a first opening at a first position on the surface and a second opening at a second position on the surface may be formed using magnetic tracking of a first wellbore with a first opening at a first position and a second opening at a second position. The first wellbore and/or the second wellbore may be formed using a river crossing rig or other equipment able to form a wellbore with two entrances at the surface into a formation. The first and second wellbores may be formed in any hydrocarbon containing formation, other types of subsurface formations, or for any subsurface application (e.g., soil remediation, solution mining, steam-assisted gravity drainage (SAGD), etc.).

A conduit may be installed in the wellbore (e.g., using the river crossing rig). The conduit may be a metal conduit that produces a magnetic field when a DC current is applied to the conduit. The magnetic field produced by the conduit may be used to guide the formation of the second wellbore at a desired spacing from the first wellbore. A magnetometer, or other magnetic tracking device, in the second wellbore may be used to detect the magnetic field produced by the conduit. An inclinometer may also be used to guide the forming of the second wellbore relative to the first wellbore and/or the formation. A magnetometer and/or an inclinometer may be placed at or near a drill string used for forming the second wellbore. The conduit may be a casing placed in the wellbore. For example, the conduit may be a heater casing. The conduit may also be a barrier conduit or conduit for propagating or conducting fluids to or out of the wellbore and/or formation.

FIG. 461 depicts an embodiment of an opening (wellbore) with a conduit that can be energized to produce a magnetic field. Opening 544 may have first end 3070 at a first position on the surface and second end 3072 at a second position on the surface. Conduit 3086 may be installed in opening 544. Conduit 3086 may include or be an electrical conductor. Conduit 3086 may be coated with insulated coating 3088. In some embodiments, insulated coating 3088 may be placed on portions of conduit 3086 in overburden 524 and/or in hydrocarbon layer 522. Insulated coating 3088 may be an epoxy, polymeric coating, asphalt coating, materials used for cathodic protection of pipelines, or any other suitable electro-insulating material. The insulated coating may be sprayed on conduit 3086 or applied by any other suitable method. Insulated coating 3088 may reduce electrical losses to the formation. Reducing electrical losses tends to increase the accuracy of determining the position of the second wellbore. In addition, reducing electrical losses to the formation may increase the magnetic field strength and, thus, increase the range of sensing the magnetic field produced by conduit 3086 in hydrocarbon layer 522. In certain embodiments, insulated coating 3088 may melt, vaporize, and/or oxidize when heated to an elevated temperature during treatment of the formation.

Conduit 3086 may be electrically coupled to current source 3090 at each end 3070, 3072 of opening 544. Each end of conduit 3086 may be electrically coupled to current source 3090 with one or more electrical conductors 3092. Electrical conductors 3092 may be, for example, copper cables. Current source 3090 may provide current in a path from first end 3070 towards second end 3072 and vice versa (e.g., by switching the leads of the current source or changing the polarity of the terminals on the current source). In certain embodiments, current source 3090 is an arc welder power supply. Current source 3090 may be able to provide a high amperage DC current (e.g., a DC current of about 50 A or more).

In an embodiment, current source 3090 (e.g., an arc welder) may be used to provide current to conduit 3086 to produce a magnetic field in hydrocarbon layer 522. The current may be measured during the energizing cycles of the casing. The produced magnetic field may be tracked to guide the forming (e.g., drilling) of a second wellbore in the formation. In certain embodiments, current is provided from current source 3090 in one direction for a length of time (e.g., 5-10 seconds). The current is then provided in a reverse direction for a length of time (e.g., 5-10 seconds). The magnetic fields produced by both directions of current may be subtracted from each other to reduce the effects of Earth's magnetic field on the measurement of the second wellbore location.

In some embodiments, an insulated wire may be placed in the opening. The insulated wire may be coupled to a current source to produce a magnetic field that is tracked for forming one or more additional openings. The results with the insulated wire may be compared to the results using current flow through the casing to determine current losses in the subsurface. For example, if the insulated wire indicates that the second wellbore is 6.1 meters away, and the current flow through the casing indicates that the second wellbore is 6.7 meters feet away, then subsequent measurements with the casing may be multiplied by a calibration factor of 6.1/6.7.

In some embodiments, placing a cable in the opening may be avoided by making DC resistance measurements of the casing prior to and/or during installation into the ground. The DC resistance measurements of the casing can be compared to actual measurements of the DC resistance for the given length of casing. This comparison may yield a calibration factor that can be used in subsequent measurements.

One equation that may be used to determine the distance between wellbores is:

$$r=\tfrac{1}{500}\times I/H; \tag{106}$$

where r is the radial distance between wellbores in meters; I is the current in amperes; and H is the total magnetic field in Gauss. EQN. 106 is true for a long length of wire (or casing) where the radial distance from the wire is small in comparison to the length of the wire. EQN. 106 also assumes the that surface wires are sufficiently distant from the wire as compared to the distance between the two wellbores so that surface wires negligibly affect the magnetic field between the two wellbores.

A more accurate calculation of the distances between wellbores may be obtained by starting with the following equations:

$$B_x = \frac{2I}{c}\left\{\frac{y_1}{R_1^2} + \frac{D - y_1}{R_2^2}\right\}; \tag{107}$$

$$B_y = \frac{2I}{c}\left\{\frac{x_1}{R_2^2} + \frac{x_1}{R_1^2}\right\}; \tag{108}$$

$$R_1^2 = x_1^2 + y_1^2; \text{ and} \tag{109}$$

$$R_2^2 = x_1^2 + (D - y_1)^2. \tag{110}$$

In EQNS. 107-110, $B_x$ and $B_y$ are the magnetic fields in the x- and y-directions; I is the current in A; and c is the speed of light. The variables: $x_1$; $y_1$; $R_1$; $R_2$; and D, are distances as shown in FIG. 464. FIG. 464 depicts sensing wellbore 3094, surface magnetic field source 3096, and tracked wellbore 3098. Tracked wellbore 3098 may have a source of a magnetic field inside the wellbore (e.g., a wireline or energized casing). To determine $x_1$ and $y_1$, these equations are introduced:

$$C_x=B_x cD/2I; \text{ and} \tag{111}$$

$$C_y=B_y cD/2. \tag{112}$$

Then the following simplifications are used:

$$u=\tfrac{1}{2}(C_x^2+C_y^2)+\{\tfrac{1}{4}(C_x^2+C_y^2)^2-2(C_x-2)(C_x^2+C_y^2)\}^{1/2}; \text{ and} \tag{113}$$

$$v=(C_x^2+C_y^2)^{1/2}(u-2C_x)^{1/2}. \tag{114}$$

Solving for $x_1$ and $y_1$ using EQNS. 107-114 results in:

$$x_1 = -DC_y/v; \text{ and} \tag{115}$$

$$y_1 = D\left\{C_x - \frac{1}{2}(u - v)\right\}\Big/ v. \tag{116}$$

EQNS. 115 and 116 may be used to solve for the distances between two wellbores as shown in FIG. 464.

FIG. 462 depicts a plan view of an embodiment of forming one or more wellbores using magnetic tracking of a previously formed wellbore. Opening 544 may have been previously formed in the formation with first end 3070 and second end 3072. Magnetic tracking of opening 544 may be used to form nearest neighbor openings 3100 and 3102. Opening 3100 may have first end 3104 at a first position on the surface and second end 3108 at a second position on the surface. Opening 3102 may have first end 3106 at a first position on the surface and second end 3110 at a second position on the surface. Openings 3100 and 3102 may be formed using one or more river crossing rigs. The river crossing rigs may have a drilling string that includes sensors for detecting the magnetic field produced in opening 544. Openings 3100 and 3102 may be spaced at approximate desired distances from opening 544. In certain embodiments, openings 3100 and 3102 may be formed at a substantially similar distance from opening 544 and/or substantially parallel to opening 544. The spacing between opening 3100 and opening 544 (and the spacing between opening 3102 and opening 544) may be about 6 m in one embodiment. In some embodiments, the spacing between opening 3100 and opening 544 may be varied between about 1 m and about 35 m, or between about 3 m and about 20 m.

In some embodiments, magnetic tracking of opening 544 may be used to form openings 3112 and 3114 in the formation. Opening 3112 may have first end 3116 at a first position on the surface and second end 3118 at a second position on the surface. Opening 3114 may have first end 3120 at a first position on the surface and second end 3122 at a second position on the surface. Openings 3112 and 3114 may be spaced at a substantially similar distance from opening 544 and/or substantially parallel to opening 544. In an embodiment, openings 3112 and 3114 are spaced about 2 times the distance from opening 544 as openings 3100 and 3102, respectively. In other embodiments, openings 3112 and 3114 may be spaced about 1.5 times, about 3 times, or about 4 times the distance from opening 544 as openings 3100 and 3102, respectively. In some embodiments, up to about 3, 4, or even 5 additional wellbores may be formed in one direction from a single wellbore using magnetic tracking of the single wellbore (e.g., opening 544). The number of wellbores that may be formed using magnetic tracking of a single wellbore may be determined by the produced magnetic field strength, the amount of the magnetic flux through the formation (which may be determined by the magnetic permeability of the formation), and/or the desired sensitivity in the placement and/or alignment of additional wellbores. In other embodiments, conduits in one or more of openings 3100, 3102, 3112, and 3114 may be used to produce a magnetic field that can be tracked to form additional openings in the formation.

FIG. 463 depicts an embodiment of a wellbore with a conduit that can be energized to produce a magnetic field. Opening 544 may have one opening at the surface of the formation. Conduit 3086 may be placed in opening 544. A portion of conduit 3086 may be coated with insulation layer 3088. Insulation layer 3088 may inhibit electrical losses to the formation along the insulated length of conduit 3086. Current source 3090 may be used to provide current to conduit 3086, as in the embodiment of FIGS. 461 and 462. The end of conduit 3086 that does not extend to the surface may be uninsulated, as shown in FIG. 463. The uninsulated end may allow electrical current from conduit 3086 to propagate through the formation and return to current source 3090, as shown by the dashed current lines in FIG. 463. Magnetic fields produced by providing current to conduit 3086 may be tracked to form one or more additional openings in the formation.

In some embodiments, lead-in and lead-out conductors may be used to couple conductors and/or conduits to a power source. Using lead-in and lead-out conductors may be less expensive than using coating and/or cladding of conductors or conduits in the overburden. Especially for relatively large overburden depths (e.g., overburdens greater than about 300 m in depth), using lead-in and lead-out conductors may be more economically viable than using coating or cladding to reduce heat losses in the overburden. FIG. 466 depicts an embodiment of a heat source with a conductor in a container. Conductor 1112 may be coupled to heater support 3126 with transition conductor 3128 at or near the junction of overburden 524 and hydrocarbon layer 522. Seal 3130 may be placed on container 3132 at the junction of overburden 524 and hydrocarbon layer 522 to enclose conductor 1112 in the conduit. Seal 3130 may include electrically insulating material to inhibit electrical conduction between container 3132 and conductor 1112 through the seal. Container 3132 may be a conduit, a canister, or any other suitable vessel. Container 3132 may be made of corrosion resistant, electrically conductive materials (e.g., stainless steel). In an embodiment, container 3132 is a 304 stainless steel container. Container 3132 may be sealed and pressurized to withstand pressures in opening 544.

Lead-in conductor 3134 may be electrically coupled to conductor 1112. Lead-in conductor 3134 may be used to supply electrical power to conductor 1112 from wellhead 3136. In an embodiment, lead-in conductor 3134 may be coupled to conductor 1112 in container 3132. In one embodiment, lead-in conductor 3134 is an insulated copper cable. Insulation for the copper cable may be a polymer such as neoprene rubber, nitrile rubber, silicone rubber, or fiberglass reinforced silicone, rubber, or glass fiber, etc. Feedthrough 3138 may allow lead-in conductor 3134 to pass through seal 3130. Feedthrough 3138 may be any feedthrough that maintains a pressure seal around lead-in conductor 3134 (e.g., an o-ring seal, Swagelok® seal, etc.).

Lead-out conductor 3140 may be electrically coupled to container 3132. Lead-out conductor 3140 may return electrical power from conductor 1112 and container 3132 to wellhead 3136. In an embodiment, lead-out conductor 3140 is an insulated copper cable. Insulation for the copper cable may be a polymer such as neoprene rubber, nitrile rubber, silicone rubber, or fiberglass reinforced silicone, rubber, or glass fiber, etc. The electrical resistances of lead-in conductor 3134 and lead-out conductor 3140 may be relatively low to minimize heat losses in the overburden.

In an embodiment, a sliding connector may be used to electrically couple conduit 1176 to lead-out conductor 3140. FIG. 465 depicts an embodiment of a conductor-in-conduit heat source with a lead-out conductor coupled to a sliding connector. A second sliding connector 3142 may be placed on (e.g., coupled to) conductor 1112 at or near the junction of overburden 524 and hydrocarbon layer 522. Insulators 3144 may be at contact points of second sliding connector 3142 with conductor 1112 to inhibit electrical contact between the second sliding connector and the conductor. Insulators 3144 may be ceramic insulators or any suitable electrically insulating, thermally conductive material.

In an embodiment, lead-out conductor 3140 may be electrically coupled to second sliding connector 3142 at or near the junction of overburden 524 and hydrocarbon layer 522. This sliding connector 3142 may be electrically coupled to conduit 1176. Thus, electrical current may propagate from conduit 1176 through second sliding connector 3142 and to lead-out conductor 3140. Transition conductor 3128 may couple low resistance section 3146 to conductor 1112. Transition conductor 3128 may, in some embodiments, include electrically insulating materials to electrically isolate low resistance section 3146 from conductor 1112. Lead-in conductor 3134 may be coupled to conductor 1112 at or near the junction of overburden 524 and hydrocarbon layer 522, as shown in FIG. 465.

In some hydrocarbon containing formations (e.g., oil shale formations), there may be one or more hydrocarbon layers characterized by a significantly higher richness than other layers in the formation. These rich layers tend to be relatively thin (typically about 0.2 m to about 0.5 m thick) and may be spaced throughout the formation. The rich layers generally have a richness of about 0.150 L/kg or greater. Some rich layers may have a richness greater than about 0.170 L/kg, greater than about 0.190 L/kg, or greater then about 0.210 L/kg. Other layers (i.e., relatively lean layers) of the formation may have a richness of about 0.100 L/kg or less and are generally thicker than rich layers. The richness and locations of layers may be determined, for example, by coring and subsequent Fischer assay of the core, density or neutron logging, or other logging methods.

FIG. 467 depicts an embodiment of a heater in an open wellbore of a hydrocarbon containing formation with a rich layer. Opening 544 may be located in hydrocarbon layer 522. Hydrocarbon layer 522 may include one or more rich layers 3148. Relatively lean layers 3150 in hydrocarbon layer 522 may have a lower richness than rich layers 3148. Heater 3152 may be placed in opening 544. In certain embodiments, opening 544 may be an open or uncased wellbore.

Rich layers 3148 may have a lower initial thermal conductivity than other layers of the formation. Typically, rich layers 3148 have a thermal conductivity 1.5 times to 3 times lower than the thermal conductivity of lean layers 3150. For example, a rich layer may have a thermal conductivity of about $1.5\times10^{-3}$ cal/cm·sec·° C. while a lean layer of the formation may have a thermal conductivity of about $3.5\times10^{-3}$ cal/cm·sec·° C. In addition, rich layers 3148 may have a higher thermal expansion coefficient than lean layers of the formation. For example, a rich layer of 57 gal/ton (0.24 L/kg) oil shale may have a thermal expansion coefficient of about $2.2\times10^{-2}$%/° C. while a lean layer of the formation of about 13 gal/ton (0.05 L/kg) oil shale may have a thermal expansion coefficient of about $0.63\times10^{-2}$%/° C.

Because of the lower thermal conductivity in rich layers 3148, rich layers may become "hot spots" during heating of the formation around opening 544. The "hot spots" may be generated because heat provided from the heater in opening 544 does not transfer into hydrocarbon layer 522 as readily as through rich layers 3148 due to the lower thermal conductivity of the rich layers. Thus, the heat tends to stay at or near the wall of opening 544 during early stages of heating.

Material that expands from rich layers 3148 into the wellbore may be significantly less stressed than material in the formation. Thermal expansion and pyrolysis may cause additional fracturing and exfoliation of hydrocarbon material that expands into the wellbore. Thus, after pyrolysis of expanded material in the wellbore, the expanded material may have an even lower thermal conductivity than pyrolyzed material in the formation. Under low stress, pyrolysis may cause additional fracturing and/or exfoliation of material, thus causing a decrease in thermal conductivity. The lower thermal conductivity may be caused by the lower stress placed on pyrolyzed materials that have expanded into the wellbore (i.e., pyrolyzed material that has expanded into the wellbore is no longer as stressed as the pyrolyzed material would be if the pyrolyzed material were still in the formation). This release of stress tends to lower the thermal conductivity of the expanded, pyrolyzed material.

After the formation of "hot spots" at rich layers 3148, hydrocarbons in the rich layers will tend to expand at a much faster rate than other layers of the formation due to increased heat at the wall of the wellbore and the higher thermal expansion coefficient of the rich layers. Expansion of the formation into the wellbore may reduce radiant heat transfer to the formation. The radiant heat transfer may be reduced for a number of reasons, including, but not limited to, material contacting the heater, thus stopping radiant heat transfer; and reduction of wellbore radius which limits the surface area that radiant heat is able to transfer to. Reduction of radiant heat transfer may result in higher heater temperature adjacent to areas with reduced radiant heat transfer acceptance capability.

Rich layers 3148 may expand at a much faster rate than lean layers because of the significantly lower thermal conductivity of rich layers and/or the higher thermal expansion coefficient of the rich layers. The expansion may apply significant pressure to a heater when the wellbore closes off against the heater. The wellbore closing off, or substantially closing off against the heater may also inhibit flow of fluids between layers of the formation. In some embodiments, fluids may become trapped in the wellbore because of the closing off or substantial closing off of the wellbore against the heater.

FIG. 468 depicts an embodiment of heater 3152 in opening 544 with expanded rich layer 3148. In some embodiments, opening 544 may be closed off by the expansion of rich layer 3148, as shown in FIG. 468, (i.e., an annular space between the heater and wall of the opening may be closed off by expanded material). Closing off of the annulus of the opening may trap fluids between expanded rich layers in the opening. The trapping of fluids can increase pressures in the opening beyond desirable limits. In some circumstances, the increased pressure could cause fracturing of the formation or in the heater well that would allow fluid to unexpectedly be in communication with an opening from the formation. In some circumstances, the increased pressure may exceed a deformation pressure of the heater. Deformation of the heater may also be caused by the expansion of material from the rich layers against the heater. Deformation of the heater may cause the heater to shut down or fail. Thus, the expansion of material in rich layers may need to be reduced and/or deformation of a heater in the opening may need to be inhibited so that the heater operates properly.

A significant amount of the expansion of rich layers tends to occur during early stages of heating (e.g., often within the first 15 days or 30 days of heating at a heat injection rate of about 820 watts/meter). Typically, a majority of the expansion occurs below about 200° C. in the near wellbore region. For example, a 0.189 L/kg oil shale layer will expand about 5 cm up to about 200° C. depending on factors such as, but not limited to, heating rate, formation stresses, and wellbore diameter. Methods for compensating for the expansion of rich layers of a formation may be focused on in the early stages of an in situ process. The amount of expansion during or after heating of the formation may be estimated or determined before heating of the formation begins. Thus, allowances may be made to compensate for the thermal expansion of rich layers and/or lean layers in the formation. The amount of expansion caused by heating of the formation may be estimated based on factors such as, but not limited to, measured or estimated richness of layers in the formation, thermal conductivity of layers in the formation, thermal expansion coefficients (e.g., linear thermal expansion coefficient) of layers in the formation, formation stresses, and expected temperature of layers in the formation.

FIG. 469 depicts simulations (using a reservoir simulator (STARS) and a mechanical simulator (ABAQUS)) of wellbore radius change versus time for heating of a 20 gal/ton oil shale (0.084 L/kg oil shale) in an open wellbore for a heat output of 820 watts/meter (plot 3149) and a heat output of 1150 watts/meter (plot 3151). As shown in FIG. 469, the maximum expansion of a 20 gal/ton oil shale increases from about 0.38 cm to about 0.48 cm for increased heat output from 820 watts/meter to 1150 watts/meter. FIG. 470 depicts calculations of wellbore radius change versus time for heating of a 50 gal/ton oil shale (0.21 L/kg oil shale) in an open wellbore for a heat output of 820 watts/meter (plot 3153) and a heat output of 1150 watts/meter (plot 3155). As shown in FIG. 470, the maximum expansion of a 50 gal/ton oil shale increases from about 8.2 cm to about 10 cm for increased heat output from 820 watts/meter to 1150 watts/meter. Thus, the expansion of the formation depends on the richness of the formation, or layers of the formation, and the heat output to the formation.

In one embodiment, opening 544 may have a larger diameter to inhibit closing off of the annulus after expansion of rich layers 3148. A typical opening may have a diameter of about 16.5 cm. In certain embodiments, heater 3152 may have a diameter of about 7.3 cm. Thus, about 4.6 cm of expansion of rich layers 3148 will close off the annulus. If the diameter of opening 544 is increased to about 30 cm, then about 11.3 cm of expansion would be needed to close off the annulus. The diameter of opening 544 may be chosen to allow for a certain amount of expansion of rich layers 3148. In some embodiments, a diameter of opening 544 may be greater than about 20 cm, greater than about 30 cm, or greater than about 40 cm. Larger openings or wellbores also may increase the amount of heat transferred from the heater to the formation by radiation. Radiative heat transfer may be more efficient for transfer of heat within the opening. The amount of expansion expected from rich layers 3148 may be estimated based on richness of the layers. The diameter of opening 544 may be selected to allow for the maximum expansion expected from a rich layer so that a minimum space between a heater and the formation is maintained after expansion. Maintaining a minimum space between a heater and the formation may inhibit deformation of the heater caused by the expansion of material into the opening. In an embodiment, a desired minimum space between a heater and the formation after expansion may be at least about 0.25 cm, 0.5 cm, or 1 cm. In some embodiments, a minimum space may be at least about 1.25 cm or at least about 1.5 cm, and may range up to about 3 cm, about 4 cm, or about 5 cm.

In some embodiments, opening 544 may be expanded proximate rich layers 3148, as depicted in FIG. 471, to maintain a minimum space between a heater and the formation after expansion of the rich layers. Opening 544 may be expanded proximate rich layers by underreaming of the opening. For example, an eccentric drill bit, an expanding drill bit, or high-pressure water jet abrasion may be used to expand an opening proximate rich layers. Opening 544 may be expanded beyond the edges of rich layers 3148 so that some material from lean layers 3150 is also removed. Expanding opening 544 with overlap into lean layers 3150 may further allow for expansion and/or any possible indeterminations in the depth or size of a rich layer.

In another embodiment, heater 3152 may include sections 3154 that provide less heat output proximate rich layers 3148 than sections 3156 that provide heat to lean layers 3150, as shown in FIG. 471. Section 3154 may provide less heat output to rich layers 3148 so that the rich layers are heated at a lower rate than lean layers 3150. Providing less heat to rich layers 3148 will reduce the wellbore temperature proximate the rich layers, thus reducing the total expansion of the rich layers. In an embodiment, heat output of sections 3154 may be about one half of heat output from sections 3156. In some embodiments, heat output of sections 3154 may be less than about three quarters, less than about one half, or less than about one third of heat output of sections 3156. Generally, a heating rate of rich layers 3148 may be lowered to a heat output that limits the expansion of rich layers 3148 so that a minimum space between heater 3152 and rich layers 3148 in opening 544 is maintained after expansion. Heat output from heater 3152 may be controlled to provide lower heat output proximate rich layers. In some embodiments, heater 3152 may be constructed or modified to provide lower heat output proximate rich layers. Examples of such heaters include heaters with temperature limiting characteristics, such as Curie temperature heaters, tailored heaters with less resistive sections proximate rich layers, etc.

In some embodiments, opening 544 may be reopened after expansion of rich layers 3148 (e.g., after about 15 to 30 days of heating at 820 Watts/m). Material from rich layers 3148 may be allowed to expand into opening 544 during heating of the formation with heater 3152, as shown in FIG. 468. After expansion of material into opening 544, an annulus of the opening may be reopened, as shown in FIG. 467. Reopening the annulus of opening 544 may include over washing the opening after expansion with a drill bit or any other method used to remove material that has expanded into the opening.

In certain embodiments, pressure tubes (e.g., capillary pressure tubes) may be coupled to the heater at varying depths to assess if and/or when material from the formation has expanded and sealed the annulus. In some embodiments, comparisons of the pressures at varying depths may be used to determine when an opening should be reopened.

In certain embodiments, rich layers 3148 and/or lean layers 3150 may be perforated. Perforating rich layers 3148 and/or lean layers 3150 may allow expansion of material within these layers and inhibit or reduce expansion into opening 544. Small holes may be formed into rich layers 3148 and/or lean layers 3150 using perforation equipment (e.g., bullet or jet perforation). Such holes may be formed in both cased wellbores and open wellbores. These small holes may have diameters less than about 1 cm, less than about 2 cm, or less than about 3 cm. In some embodiments, larger holes may also be formed. These holes may be designed to provide, or allow, space for the formation to expand. The holes may also weaken the rock matrix of a formation so that if the formation does expand, the formation will exert less force. In some embodiments, the formation may be fractured instead of using a perforation gun.

In certain embodiments, a liner or casing may be placed in an open wellbore to inhibit collapse of the wellbore during heating of the formation. FIG. 472 depicts an embodiment of a heater in an open wellbore with a liner placed in the opening. Liner 3158 may be placed in opening 544 in hydrocarbon layer 522. Liner 3158 may include first sections 3160 and second sections 3162. First sections 3160 may be located proximate lean layers 3150. Second sections 3162 may be located proximate rich layers 3148. Second sections 3162 may be thicker than first sections 3160. Additionally, second sections 3162 may be made of a stronger material than first sections 3160.

In one embodiment, first sections 3160 are carbon steel with a thickness of about 2 cm and second sections 3162 are Haynes® HR-120° (available from Haynes International Inc. (Kokomo, Ind.)) with a thickness of about 4 cm. The thicknesses of first sections 3160 and second sections 3162 may be varied between about 0.5 cm and about 10 cm. The thicknesses of first sections 3160 and second sections 3162 may be selected based upon factors such as, but not limited to, a diameter of opening 544, a desired thermal transfer rate from heater 3152 to hydrocarbon layer 522, and/or a mechanical strength required to inhibit collapse of liner 3158. Other materials may also be used for first sections 3160 and second sections 3162. For example, first sections 3160 may include, but may not be limited to, carbon steel, stainless steel, aluminum, etc. Second sections 3162 may include, but may not be limited to, 304H stainless steel, 316H stainless steel, 347H stainless steel, Incoloy® alloy 800H or Incoloy® alloy 800HT (both available from Special Metals Co. (New Hartford, N.Y.)), etc.

FIG. 473 depicts an embodiment of a heater in an open wellbore with a liner placed in the opening and the formation expanded against the liner. Second sections 3162 may inhibit material from rich layers 3148 from closing off an annulus of opening 544 (between liner 3158 and heater 3152) during heating of the formation. Second sections 3162 may have a sufficient strength to inhibit or slow down the expansion of material from rich layers 3148. One or more openings 3164 may be placed in liner 3158 to allow fluids to flow from the annulus between liner 3158 and the walls of opening 544 into the annulus between the liner and heater 3152. Thus, liner 3158 may maintain an open annulus between the liner and heater 3152 during expansion of rich layers 3148 so that fluids can continue to flow through the annulus. Maintaining a fluid path in opening 544 may inhibit a buildup of pressure in the opening. Second sections 3162 may also inhibit closing off of the annulus between liner 3158 and heater 3152 so that hot spot formation is inhibited, thus allowing the heater to operate properly.

In some embodiments, conduit 3166 may be placed inside opening 544 as shown in FIGS. 472 and 473. Conduit 3166 may include one or more openings for providing a fluid to opening 544. In an embodiment, steam may be provided to opening 544. The steam may inhibit coking in openings 3164 along a length of liner 3158, such that openings are not clogged and fluid flow through the openings is maintained. In certain embodiments, conduit 3166 may be placed inside liner 3158. In other embodiments, conduit 3166 may be placed outside liner 3158. Conduit 3166 may also be permanently placed in opening 544 or may be temporarily placed in the opening (e.g., the conduit may be spooled and unspooled into an opening). Conduit 3166 may be spooled and unspooled into an opening so that the conduit can be used in more than one opening in a formation.

FIG. 474 depicts maximum radial stress 3163, maximum circumferential stress 3165, and hole size 3167 after 300 days versus richness for calculations of heating in an open wellbore. The calculations were done with a reservoir simulator (STARS) and a mechanical simulator (ABAQUS) for a 16.5 cm wellbore with a 14.0 cm liner placed in the wellbore and a heat output from the heater of 820 watts/meter. As shown in FIG. 474, the maximum radial stress and maximum circumferential stress decrease with richness. Layers with a richness above about 22.5 gal/ton (0.95 L/kg) may expand to contact the liner. As the richness increases above about 32 gal/ton (0.13 L/kg), the maximum stresses begin to somewhat level out at a value of about 270 bars absolute or below. The liner may have sufficient strength to inhibit deformation at the stresses above richnesses of about 32 gal/ton. Between about 22.5 gal/ton richness and about 32 gal/ton richness, the stresses may be significant enough to deform the liner. Thus, the diameter of the wellbore, the diameter of the liner, the wall thickness and strength of the liner, the heat output, etc. may have to be adjusted so that deformation of the liner is inhibited and an open annulus is maintained in the wellbore for all richnesses of a formation.

During early periods of heating a hydrocarbon containing formation, the formation may be susceptible to geomechanical motion. Geomechanical motion in the formation may cause deformation of existing wellbores in a formation. If significant deformation of wellbores occurs in a formation, equipment (e.g., heaters, conduits, etc.) in the wellbores may be deformed and/or damaged.

Geomechanical motion is typically caused by heat provided from one or more heaters placed in a volume in the formation that results in thermal expansion of the volume. The thermal expansion of a volume may be defined by the equation:

$$\Delta r = r \times \Delta T \times \alpha; \qquad (117)$$

where r is the radius of the volume (i.e., r is the length of the longest straight line in a footprint of the volume that has continuous heating, as shown in FIGS. 475 and 476), $\Delta T$ is the change in temperature, and $\alpha$ is the linear thermal expansion coefficient.

The amount of geomechanical motion generally increases as more heat is input into the formation. Geomechanical motion in the formation and wellbore deformation tend to increase as larger volumes of the formation are heated at a particular time. Therefore, if the volume heated at a particular time is maintained in selected size limits, the amount of geomechanical motion and wellbore deformation may be maintained below acceptable levels. Also, geomechanical motion in a first treatment area may be limited by heating a second treatment area and a third treatment area on opposite sides of the first treatment area. Geomechanical motion caused by heating the second treatment area may be offset by geomechanical motion caused by heating the third treatment area.

FIG. 475 depicts an embodiment of an aerial view of a pattern of heaters for heating a hydrocarbon containing formation. Heat sources 3168 may be placed in formation 3170. Heat sources 3168 may be placed in a triangular pattern, as depicted in FIG. 475, or any other pattern as desired. Formation 3170 may include one or more volumes 3172, 3174 to be heated. Volumes 3172, 3174 may be alternating volumes of formation 3170 as depicted in FIG. 475. In some embodiments, heat sources 3168 in volumes 3172, 3174 may be turned on, or begin heating, substantially simultaneously (i.e., heat sources 3168 may be turned on within days or, in some cases, within 1 or 2 months of each other). Turning on all heat sources 3168 in volumes 3172, 3174 may, however, cause significant amounts of geomechanical motion in formation 3170. This geomechanical motion may deform the wellbores of one or more heat sources 3168 and/or other wellbores in the formation. The outermost wellbores in formation 3170 may be most susceptible to deformation. These wellbores may be more susceptible to deformation because geomechanical motion tends to be a cumulative effect, increasing from the center of a heated volume towards the perimeter of the heated volume.

FIG. 476 depicts an embodiment of an aerial view of another pattern of heaters for heating a hydrocarbon containing formation. Volumes 3172, 3174 may be concentric rings of volumes, as shown in FIG. 476. Heat sources 3168 may be placed in a desired pattern or patterns in volumes 3172, 3174. In a concentric ring pattern of volumes 3172, 3174, the geomechanical motion may be reduced in the outer rings of volumes because of the increased circumference of the volumes as the rings move outward.

In other embodiments, volumes 3172, 3174 may have other footprint shapes and/or be placed in other shaped patterns. For example, volumes 3172, 3174 may have linear, curved, or irregularly shaped strip footprints. In some embodiments, volumes 3174 may separate volumes 3172 and thus be used to inhibit geomechanical motion in volumes 3172 (i.e., volumes 3174 may function as a barrier (e.g., a wall) to reduce the effect of geomechanical motion of one volume 3172 on another volume 3172).

In certain embodiments, heat sources 3168 in volumes 3172, 3174, as shown in FIGS. 475 and 476, may be turned on at different times to avoid heating large volumes of the formation at one time and/or to reduce the effects of geomechanical motion. In one embodiment, heat sources 3168 in volumes 3172 may be turned on, or begin heating, at substantially the same time (i.e., within 1 or 2 months of each other). Heat sources 3168 in volumes 3174 may be turned off while volumes 3172 are being heated. Heat sources 3168 in volumes 3174 may be turned on, or begin heating, a selected time after heat sources 3168 in volumes 3172 are turned on or begin heating. Providing heat to only volumes 3172 for a selected period of time may reduce the effects of geomechanical motion in the formation during a selected period of time. During the selected period of time, some geomechanical motion may take place in volumes 3172. The size, as well as shape and/or location, of volumes 3172 may be selected to maintain the geomechanical expansion of the formation in these volumes below a maximum value. The maximum value of geomechanical expansion of the formation may be a value selected to inhibit deformation of one or more wellbores beyond a critical value of deformation (i.e., a point at which the wellbores are damaged or equipment in the wellbores is no longer useable).

The size, shape, and/or location of volumes 3172 may be determined by simulation, calculation, or any suitable method for estimating the extent of geomechanical motion during heating of the formation. In one embodiment, simulations may be used to determine the amount of geomechanical motion that may take place in heating a volume of a formation to a predetermined temperature. The size of the volume of the formation that is heated to the predetermined temperature may be varied in the simulation until a size of the volume is found that maintains any deformation of a wellbore below the critical value.

Sizes of volumes 3172, 3174 may be represented by a footprint area on the surface of a volume and the depth of the portion of the formation contained in the volume. The sizes of volumes 3172, 3174 may be varied by varying footprint areas of the volumes. In an embodiment, the footprints of volumes 3172, 3174 may be less than about 10,000 square meters, less than about 6000 square meters, less than about 4000 square meters, or less than about 3000 square meters.

Expansion in a formation may be zone, or layer, specific. In some formations, layers or zones of the formation may have different thermal conductivities and/or different thermal expansion coefficients. For example, an oil shale formation may have certain thin layers (e.g., layers having a richness above about 0.15 L/kg) that have lower thermal conductivities and higher thermal expansion coefficients than adjacent layers of the formation. The thin layers with low thermal conductivities and high thermal conductivities may lie within different horizontal planes of the formation. The differences in the expansion of thin layers may have to be accounted for in determining the sizes of volumes of the formation that are to be heated. Generally, the largest expansion may be from zones or layers with low thermal conductivities and/or high thermal expansion coefficients. In some embodiments, the size, shape, and/or location of volumes 3172, 3174 may be determined to accommodate expansion characteristics of low thermal conductivity and/or high thermal expansion layers.

In some embodiments, the size, shape, and/or location of volumes 3174 may be selected to inhibit cumulative geomechanical motion from occurring in the formation. In certain embodiments, volumes 3174 may have a volume sufficient to inhibit cumulative geomechanical motion from affecting spaced apart volumes 3172. In one embodiment, volumes 3174 may have a footprint area substantially similar to the footprint area of volumes 3172. Having volumes 3172, 3174 of substantially similar size may establish a uniform heating profile in the formation.

In certain embodiments, heat sources 3168 in volumes 3174 may be turned on at a selected time after heat sources 3168 in volumes 3172 have been turned on. Heat sources 3168 in volumes 3174 may be turned on, or begin heating, within about 6 months (or within about 1 year or about 2 years) from the time heat sources 3168 in volumes 3172 begin heating. Heat sources 3168 in volumes 3174 may be turned on after a selected amount of expansion has occurred in volumes 3172. In one embodiment, heat sources 3168 in volumes 3174 are turned on after volumes 3172 have geomechanically expanded to or nearly to their maximum possible expansion. For example, heat sources 3168 in volumes 3174 may be turned on after volumes 3172 have geomechanically expanded to greater than about 70%, greater than about 80%, or greater than about 90% of their maximum estimated expansion. The estimated possible expansion of a volume may be determined by a simulation, or other suitable method, as the expansion that will occur in a volume when the volume is heated to a selected average temperature. Simulations may also take into effect strength characteristics of a rock matrix. Strong expansion in a formation occurs up to typically about 200° C. Expansion in the formation is generally much slower from about 200° C. to about 350° C. At temperatures above retorting temperatures, there may be little or no expansion in the formation. In some formations, there may be compaction of the formation above retorting temperatures. The average temperature used to determine estimated expansion may be, for example, a maximum temperature that the volume of the formation is heated to during in situ treatment of the formation (e.g., about 325° C., about 350° C., etc.). Heating volumes 3174 after significant expansion of volumes 3172 occurs may reduce, inhibit, and/or accommodate the effects of cumulative geomechanical motion in the formation.

In some embodiments, heat sources 3168 in volumes 3174 may be turned on after heat sources 3168 in volumes 3172 at a time selected to maintain a relatively constant production rate from the formation. Maintaining a relatively constant production rate from the formation may reduce costs associated with equipment used for producing fluids and/or treating fluids produced from the formation (e.g., purchasing equipment, operating equipment, purchasing raw materials, etc.). In certain embodiments, heat sources 3168 in volumes 3174 may be turned on after heat sources 3168 in volumes 3172 at a time selected to enhance a production rate from the formation. Simulations, or other suitable methods, may be used to determine the relative time at which heat sources 3168 in volumes 3172 and heat sources 3168 in volumes 3174 are turned on to maintain a production rate, or enhance a production rate, from the formation.

In certain embodiments, a "temperature limited heater" may be used to provide heat to a hydrocarbon containing formation. A temperature limited heater generally refers to a heater that regulates heat output (e.g., reduces heat output) above a specified temperature without the use of external controls such as temperature controllers, power regulators, etc. Temperature limited heaters may be AC (alternating current) electrical resistance heaters. Temperature limited heaters may be more reliable than other heaters. Temperature limited heaters may be less apt to break down or fail due to hot spots in the formation. In some embodiments, temperature limited heaters may allow for substantially uniform heating of a formation. In some embodiments, temperature limited heaters may be able to heat a formation more efficiently by operating at a higher temperature along the entire length of the heater. The temperature limited heater may be operated at the higher temperature along the entire length of the heater because power to the heater does not have to be reduced to the entire heater (e.g., along the entire length of the heater), as is the case with typical heaters, if a temperature along any point of the heater exceeds, or is about to exceed, a maximum operating temperature of the heater. Portions of a temperature limited heater approaching a maximum operating temperature of the heater may self-regulate to reduce the heat output only in those portions when a limiting temperature of the heater is reached. Thus, a constant power (e.g., a constant current) may be supplied to the temperature limited heater during a larger portion of a heating process.

In some embodiments, a temperature limited heater may include switches (e.g., fuses, thermostats, etc.) that turn off power to a heater or portions of the heater when a temperature limit in the heater is reached. Other temperature limited heaters may use certain materials in the heater that are inherently temperature limited at certain temperatures. For example, ferromagnetic materials may be used in temperature limited heater embodiments. Ferromagnetic materials may self-regulate at or near the Curie temperature of the material to provide a reduced heat output at or near the Curie temperature. Using ferromagnetic materials in temperature limited heaters may be less expensive and more reliable than using switches in temperature limited heaters.

The Curie temperature is the temperature above which a magnetic material (e.g., ferromagnetic material) loses its magnetic properties. A heater may include a conductor that operates as a skin effect heater when alternating current is applied to the conductor. The skin effect limits the depth of current penetration into the interior of the conductor. For ferromagnetic materials, the skin effect is dominated by the magnetic permeability of the conductor. The magnetic permeability of ferromagnetic materials is typically greater than 1, and may be greater than 10, 100, or even 1000. As the temperature of the ferromagnetic material is raised above the Curie temperature, the magnetic permeability of the ferromagnetic material decreases substantially and the skin depth expands rapidly (e.g., as the inverse square root of the magnetic permeability). This reduction in magnetic permeability results in a decrease in the AC resistance of the conductor above the Curie temperature. When the heater is powered by a substantially constant current source, portions of the heater that reach the Curie temperature will have reduced power dissipation. Sections of the heater that are not at or near the Curie temperature may be dominated by skin effect heating that allows the heater to maintain a substantially constant heat dissipation rate.

Heating apparatus that utilize Curie temperature have been used in equipment for soldering, used in medical applications, and used in heating of ovens (e.g., pizza ovens). Some of these uses are disclosed in U.S. Pat. No. 5,579,575 to Lamome et al.; U.S. Pat. No. 5,065,501 to Henschen et al.; and U.S. Pat. No. 5,512,732 to Yagnik et al., all of which are incorporated by reference as if fully set forth herein. U.S. Pat. No. 4,849,611 to Whitney et al., which is incorporated by reference as if fully set forth herein, describes a plurality of discrete, spaced-apart heating units including a reactive component, a resistive heating component, and a temperature responsive component.

An advantage of a Curie temperature heater for heating a hydrocarbon containing formation may be that the conductor can be chosen to have a Curie temperature within a desired range of temperature operation. The desired operating range may allow for substantial heat injection into the formation while maintaining the temperature of the heater and other equipment below design temperatures (i.e., below temperatures that will adversely affect properties such as corrosion, creep, deformation, etc.). In certain embodiments, formation temperature may be increased to within 15%, within 10%, or within 5% of a failure temperature of a heater. The self-regulating properties of the heater may inhibit overheating of low thermal conductivity "hot spots" in the formation.

A Curie temperature heater may allow for more heat injection into a formation than non-self regulating heaters because the energy input into the heater does not have to be limited to accommodate thermal expansion considerations for thin low thermal conductivity regions adjacent to the heater. For example, in an oil shale formation in the Piceance basin of western Colorado there is a difference of at least 50% in the thermal conductivity of the lowest richness oil shale layers (less than about 0.04 L/kg) and the highest richness oil shale layers (greater than about 0.20 L/kg). When heating such a formation, substantially more heat may be injected with a temperature limited heater than with a heater that is limited by the temperature at the richest lowest thermal conductivity layer, which may be only about 0.3 m thick. Because heaters for heating hydrocarbon formations typically have long lengths (e.g., greater than 10 m, 50 m, or 100 m), the majority of the length of the heater may be operating substantially below the Curie temperature while only a few portions are self-regulating substantially near the Curie temperature.

The use of Curie temperature heaters may allow for efficient transfer of heat to a formation. The efficient transfer of heat may allow for reduction in time needed to heat a formation to a desired temperature. For example, in the Piceance basin oil shale, pyrolysis may require about 9.5 to about 10 years of heating when using about a 12 m heater well spacing with conventional constant wattage heaters. Using the same spacing, Curie temperature heaters may permit greater average heat output without heating above equipment design temperatures, thereby allowing pyrolysis in, for example, about 5 years.

The use of temperature limited heaters may eliminate or reduce the need to perform temperature logging and/or use fixed thermocouples on the heaters to inhibit overheating at hot spots. The temperature limited heater also may eliminate or reduce the need for expensive temperature control circuitry.

A temperature limited heater may be deformation tolerant if localized movement of a wellbore results in lateral stresses on the heater that could deform its shape. Locations at which the wellbore has closed on the heater and deformed the heater also tend to be hot spots where a standard heater may overheat. The temperature limited heater may be formed with S curves (or other non-linear shapes) that accommodate deformation of the temperature limited heater without causing failure of the heater.

In some embodiments, temperature limited heaters may be more economical to manufacture or make than standard heaters. Typical ferromagnetic materials include iron or carbon steel, which are inexpensive compared to nickel-based heating alloys typically used in insulated conductor heaters such as nichrome, Kanthal, etc. In one embodiment of a temperature limited heater, the heater may be manufactured in continuous lengths as an insulated conductor heater, thereby lowering costs and improving reliability.

Temperature limited heaters may be used for heating hydrocarbon formations such as, but not limited to, oil shale formations, coal formations, tar sands formations, etc. Temperature limited heaters may also be used in the field of environmental remediation to vaporize or destroy soil contaminants. Embodiments of temperature limited heaters may be used to heat a wellbore or sub-sea pipeline to prevent paraffin deposition. In some embodiments, temperature limited heaters may be used to heat a near wellbore region to reduce near wellbore oil viscosity during production of high viscosity crude oils.

Certain embodiments of temperature limited heaters may be used in chemical or refinery processes at elevated temperatures that require control in a narrow temperature range to inhibit additional chemical reactions or damage from locally elevated temperatures. Temperature limited heaters may also be used in pollution control devices (e.g. catalytic converters, oxidizers, etc.) to allow rapid heating to a control temperature without complex temperature control circuitry. Additionally, temperature limited heaters may be used in food processing to avoid damaging food with excessive temperatures. Temperature limited heaters may also be used in the heat treatment of metals (e.g., annealing of weld joints).

The Curie temperature of a conductor may be varied by choice of ferromagnetic alloy. Curie temperature data for various metals is listed in "American Institute of Physics Handbook," Second Edition, McGraw-Hill, pages 5-170 through 5-176. A ferromagnetic conductor may include one or more of the ferromagnetic elements (iron, cobalt, and nickel) and/or alloys of these elements. Iron has a Curie temperature of 770° C.; cobalt has a Curie temperature of 1131° C.; and nickel has a Curie temperature of 358° C. Alloying iron with smaller amounts of cobalt raises the Curie temperature. For example, an iron alloy with 2% cobalt raises the Curie temperature from 770° C. to 800° C.; a cobalt content of 12% raises the Curie temperature to 900° C.; and a cobalt content of 20% raises the Curie temperature to 950° C. Conversely, alloying iron with smaller amounts of nickel lowers the Curie temperature. For example, an iron alloy with 20% nickel lowers the Curie temperature to 720° C., and a nickel content of 60% lowers the Curie temperature to 560° C. Other non-ferromagnetic elements (e.g., carbon, aluminum, silicon, and/or chromium) may also be alloyed with iron or other ferromagnetic materials to lower the Curie temperature. Some other non-ferromagnetic elements such as vanadium may raise the Curie temperature. For example, an iron alloy with 5.9% vanadium has a Curie temperature of 815° C. In some embodiments, the Curie temperature material may be a ferrite such as $NiFe_2O_4$. In other embodiments, the Curie temperature material may be a binary compound such as $FeNi_3$ or $Fe_3Al$.

There is generally some decay in magnetic properties as the Curie temperature is approached. The "Handbook of Electrical Heating for Industry" by C. James Erickson (IEEE Press, 1995) shows a typical curve for 1% carbon steel (i.e., steel with 1% by weight carbon). The loss of magnetic permeability starts at temperatures above about 650° C. and tends to be complete when temperatures exceed about 730° C. Thus, the temperature of self-regulation may be somewhat below an actual Curie temperature of a ferromagnetic conductor. The skin depth for current flow in 1% carbon steel is about 0.132 cm at room temperature and increases to about 0.445 cm at about 720° C. The skin depth sharply increases to over 2.5 cm from 720° C. to 730° C. Thus, a temperature limited heater embodiment using 1% carbon steel may self-regulate between about 650° C. and about 730° C.

Skin depth generally defines an effective penetration depth of alternating current into a conductive material. In general, current density decreases exponentially with distance from an outer surface to a center along a radius of a conductor. The depth at which the current density is approximately 37% of the surface current density is called the skin depth. For a solid cylindrical work piece with a diameter much greater than the penetration depth, or for hollow cylinders with a wall thickness exceeding the penetration depth, the skin depth dδ is:

$$\delta=1981.5*((\rho/(\mu*f))^{1/2}; \quad (118)$$

in which:

δ=skin depth in inches;

ρ=resistivity at operating temperature (ohm-cm);

μ=relative permeability; and f=frequency (Hz).

EQN. 118 is obtained from the "Handbook of Electrical Heating for Industry" by C. James Erickson (IEEE Press, 1995). For most metals the resistivity (ρ) increases with temperature.

FIGS. 477-481 depict estimated properties of Curie temperature heaters based on analytical equations. FIG. 477 shows DC resistivity versus temperature for a 1% carbon steel Curie temperature heater. The resistivity increases with temperature from about 20 microohm-cm at about 0° C. to about 120 microohm-cm at about 725° C.

FIG. 478 shows magnetic permeability versus temperature for a 1% carbon steel Curie temperature heater. The magnetic permeability decreases rapidly at temperatures over about 650° C. and the metal is virtually non-magnetic above about 750° C.

FIG. 479 shows skin depth versus temperature for a 1% carbon steel Curie temperature heater at 60 Hz. The skin depth increases from about 0.13 cm at about 0° C. to about 0.445 cm at about 720° C. due to the increase in DC resistivity. The sharp increase in skin depth above 720° C. (greater than 2.5 cm) may be due to a decrease in magnetic permeability near the Curie temperature.

FIG. 480 shows AC resistance for a 244 m long, 2.5 cm diameter carbon steel pipe, Schedule XXS, versus temperature at 60 Hz. AC resistance increases by about a factor of two from room temperature to about 650° C. due to the competing changes in resistivity and skin depth with temperature. Above about 720° C., the sharp decrease in AC resistance is due to a decrease in magnetic permeability near the Curie temperature.

FIG. 481 shows heater power for a 244 m long, 2.5 cm diameter carbon steel pipe, Schedule XXS, at 600 A (constant) and 60 Hz. The power increases by about a factor of two from room temperature to about 650° C., but then decreases sharply above about 650° C. due to a decrease in magnetic permeability near the Curie temperature. This decrease in power near the Curie temperature results in self-regulation of the heater such that elevated temperatures are not exceeded.

In some embodiments, AC frequency may be adjusted to change the skin depth of a ferromagnetic material. For example, in 1% carbon steel at room temperature, the skin depth is about 0.132 cm at 60 Hz; at 440 Hz the skin depth is about 0.046 cm. Since the heater diameter is typically larger than twice the skin depth, increasing the frequency may allow for a smaller heater diameter. When the heater is cold, the heater may be operated at a lower frequency, and when the heater is hot, the heater may be operated at a higher frequency in order to keep the skin depth nearly constant until the Curie temperature is reached. Line frequency heating is generally favorable, however, because there is less need for expensive components (e.g., expensive power supplies that change the frequency).

In an embodiment, a temperature limited heater may include an inner conductor inside an outer conductor. The inner and outer conductors may be separated by an insulation layer. In certain embodiments, the inner and outer conductors may be coupled at the bottom of the heater. Electrical current may flow into the heater through the inner conductor and return through the outer conductor. Conversely, in some embodiments, electrical current may flow into the heater through the outer conductor and return through the inner conductor. One or both conductors may include ferromagnetic material.

An insulation layer may comprise an electrically insulating but high thermal conductivity ceramic such as magnesium oxide, aluminum oxide, silicon dioxide, beryllium oxide, boron nitride, etc. The insulating layer may be a compacted powder (e.g., compacted ceramic powder) with compaction improving thermal conductivity and providing better insulation resistance. For lower temperature applications, polymer insulations such as fluoropolymers, polyimides, polyamides, polyethylenes, etc. may be used. The insulating layer may be chosen to be infrared transparent to aid heat transfer from the inner conductor to the outer conductor. In an embodiment, the insulating layer may be transparent quartz sand. The insulation layer may be air or a non-reactive gas such as helium, nitrogen, sulfur hexafluoride, etc. if deformation tolerance is not required. If the insulation layer is air or a non-reactive gas, there may be insulating spacers that maintain a spacing between the inner conductor and the outer conductor to inhibit electrical contact between the inner conductor and the outer conductor. The insulating spacers may be made of, for example, high purity aluminum oxide or another thermally conducting, electrically insulating material.

The insulation layer may be flexible and/or substantially deformation tolerant. For example, if the insulation layer is a solid or compacted material that substantially fills the space between the inner and outer conductors, the heater may be flexible and/or substantially deformation tolerant. Forces on the outer conductor can be transmitted through the insulation layer to the solid inner conductor, which may resist crushing. Such a heater may be bent, dog-legged, and spiraled without causing the outer conductor and the inner conductor to electrically short to each other. Deformation tolerance may be important if a wellbore is likely to undergo substantial deformation during heating of the formation.

In certain embodiments, the outer conductor may be chosen for corrosion and/or creep resistance. In one embodiment, austentitic (non-ferromagnetic) stainless steels such as 304H, 347H, 316 H or 310H stainless steels may be used in the outer conductor. The outer conductor may also include a clad conductor. A corrosion resistant alloy such as 304H stainless steel, for example, may be clad for corrosion protection over a ferromagnetic carbon steel tubular. If high temperature strength is not required, the outer conductor may also be constructed from a ferromagnetic metal with good corrosion resistance (e.g., one of the ferritic stainless steels). In one embodiment, a ferritic alloy of 82.3% iron with 17.7% chromium (Curie temperature 678° C.) may be used with the chromium providing good corrosion resistance. A graph of dependence of Curie temperature on the amount of chromium alloyed with iron can be found in *The Metals Handbook*, vol. 8, page 291 (American Society of Materials (ASM)). However, some designs such as the iron/chromium alloy may require a separate support rod or tubular (e.g., 347H stainless steel) to which the heater is coupled for strength and/or creep resistance.

In an embodiment with an inner ferromagnetic conductor and an outer ferromagnetic conductor, the skin effect current path occurs on the outside of the inner conductor and on the inside of the outer conductor. Thus, the outside of the outer conductor may be clad with a corrosion resistant alloy, such as stainless steel, without affecting the skin effect current path on the inside of the outer conductor.

The thickness of a conductor should generally be greater than the skin depth at the self-regulating temperature so there is a substantial decrease in AC resistance of the ferromagnetic material when the skin depth increases sharply near the Curie temperature. In certain embodiments, the thickness of the conductor may be about 1.5 times the skin depth near the Curie temperature, about 3 times the skin depth near the Curie temperature, or even about 10 or more times the skin depth near the Curie temperature.

In one embodiment, a temperature limited heater may include a composite conductor of a ferromagnetic tubular with a non-ferromagnetic high electrical conductivity core. The non-ferromagnetic high electrical conductivity core may allow the conductor to be smaller in diameter. For example, the conductor may be a composite 1.14 cm diameter conductor with a core of 0.25 cm diameter copper clad with a 0.445 cm thickness of carbon steel surrounding the core. Having a composite conductor may allow the electrical resistance of the temperature limited heater to decrease more steeply near the Curie temperature. When the skin depth begins to increase near the Curie temperature, the skin depth may include the copper core so that the electrical resistance decreases more steeply. The composite conductor may also allow the temperature limited heater to be more conductive and/or operate at lower voltages. The composite conductor may also allow a relatively flat resistivity versus temperature profile. In certain embodiments, the relative thickness of each material in a composite conductor may be selected to produce a selected resistivity versus temperature profile for a temperature limited heater. In an embodiment, the composite conductor may be an inner conductor surrounded with 0.127 cm thick magnesium powder as an insulator. The outer conductor may be 304H stainless steel with a wall thickness of 0.127 cm. The outside diameter of the heater may be about 1.65 cm.

A composite conductor (e.g., a composite inner conductor or a composite outer conductor) may be manufactured by many different methods, such as roll forming, tight fit tubing (e.g., cooling the inner member and heating the outer member, then inserting the inner member followed by a drawing operation), explosive or electromagnetic cladding, arc overlay welding, plasma powder welding, billet coextrusion, electroplating, drawing, sputtering, plasma deposition, coextrusion casting, molten cylinder casting (of inner core material inside the outer or vice versa), insertion followed by welding or high temperature braising, SAG (shielded active gas welding), insertion of an inner pipe followed by mechanical expansion of the inner pipe by hydroforming or use of a pig to expand and swage the inner pipe, etc. In some embodiments, the ferromagnetic conductor may also be braided over the non-ferromagnetic conductor. In certain embodiments, composite conductors may be formed using methods similar to those used for cladding (e.g., cladding copper to steel).

In an embodiment, two or more conductors may be drawn together to form a composite conductor. In certain embodiments, a relatively soft ferromagnetic conductor (e.g., soft iron such as 1018 steel) may be used to form a composite conductor. A relatively soft ferromagnetic conductor typically has a low carbon content. A relatively soft ferromagnetic conductor may be useful in drawing processes for forming composite conductors and/or other processes that require stretching or bending of the ferromagnetic conductor. In a drawing process, the ferromagnetic conductor may be annealed after one or more steps of the drawing process. The ferromagnetic conductor may be annealed in an inert gas atmosphere to inhibit oxidation of the conductor. In some embodiments, an oil may be placed on the ferromagnetic conductor to inhibit oxidation of the conductor during processing.

FIG. 482 depicts one embodiment for forming a composite conductor. Ingot 3176 may be a ferromagnetic conductor (e.g., iron or carbon steel). Ingot 3176 maybe placed in chamber 3178. Chamber 3178 maybe made of materials that are electrically insulating, non-reactive, and able to withstand temperatures up to about 800° C. In one embodiment, chamber 3178 is a quartz chamber. In some embodiments, an inert, or non-reactive, gas (e.g., argon, nitrogen, etc.) may be placed in chamber 3178. In certain embodiments, a flow of inert gas may be provided to chamber 3178 to maintain a pressure in the chamber. Induction coil 3180 may be placed around chamber 3178. An alternating current may be supplied to induction coil 3180 to inductively heat ingot 3176. Having the inert gas inside chamber 3178 may inhibit oxidation or corrosion of ingot 3176.

Inner conductor 3182 may be placed inside ingot 3176. Inner conductor 3182 may be a non-ferromagnetic conductor (e.g., copper or aluminum) that melts at a lower temperature than ingot 3176. In an embodiment, ingot 3176 may be heated to a temperature above the melting point of inner conductor 3182 and below the melting point of the ingot. Inner conductor 3182 may then melt and substantially fill the space inside ingot 3176 (i.e., the inner annulus of the ingot). A cap may be placed at the bottom of ingot 3176 to inhibit inner conductor 3182 from flowing or leaking out of the inner annulus of the ingot. After inner conductor 3182 has sufficiently melted to substantially fill the inner annulus of ingot 3176, the inner conductor and the ingot may be allowed to cool back to room temperature. The cooling of ingot 3176 and inner conductor 3182 may be maintained at a relatively slow rate to allow inner conductor 3182 to form a good soldering bond with ingot 3176. The rate of cooling may depend on, for example, the types of materials used for the ingot and the inner conductor.

In some embodiments, a tube-in-tube milling process from dual metal strips, such as that available from Precision Tube Technology (Houston, Tex.), may be employed to form a composite conductor. The tube-in-tube milling process may also be used to form cladding on conductors (e.g., copper cladding inside carbon steel) or form any two materials into a tight fit tube within a tube configuration.

FIG. 483 depicts an embodiment of an inner conductor and an outer conductor formed by a tube-in-tube milling process. Outer conductor 3184 is coupled to inner conductor 3186. Outer conductor 3184 may be weldable material such as steel. Inner conductor 3186 may have a higher electrical conductivity than outer conductor 3184. In an embodiment, inner conductor 3186 is copper or aluminum. Weld bead 3188 may be formed on outer conductor 3184.

In a tube-in-tube milling process, flat strips of material for the outer conductor have a thickness substantially equal to the desired wall thickness of the outer conductor. The width of the strips may allow for formation of a tube of a desired inner diameter. The flat strips are welded end-to-end so that a desired length of outer conductor can be formed. Flat strips of material for an inner conductor may be cut to size so that strips will have a diameter that fits inside the outer conductor. The flat strips of material may be welded together end-to-end to achieve a length that is substantially the same as the length of the welded together flat strips of outer conductor material. The flat strips for the outer conductor and the flat strips for the inner conductor may be fed into separate accumulators. Both accumulators may be coupled to a tube mill. The two flat strips may be sandwiched together at the beginning of the tube mill.

The tube mill may form the flat strips into a tube-in-tube shape. After the tube-in-tube shape has been formed, a non-contact high frequency induction welder may heat the ends of the strips of the outer conductor to a forging temperature of the outer conductor. The ends of the strips then may be brought together to forge weld the ends of the outer conductor into a weld bead. Excess weld bead material may be cut off. In some embodiments, the tube-in-tube produced by the tube mill may be further processed (e.g., annealed, pressed, etc.) to place the tube-in-tube into proper size and/or shape. The result of the tube-in-tube process may be an inner conductor placed inside an outer conductor, as shown in FIG. 483.

FIG. 484 depicts an embodiment of a Curie temperature heater with a ferromagnetic inner conductor. Inner conductor 3190 may be a carbon steel pipe, Schedule XXS, with a diameter of about 2.5 cm. In some embodiments, inner conductor 3190 may be iron or another ferromagnetic material. Electrical insulator 3192 may be magnesium powder. Outer conductor 3194 may be copper or any other non-ferromagnetic material (e.g., aluminum). Outer conductor 3194 may be coupled to jacket 3196. Jacket 3196 may be 304 stainless steel. When used as a heater, the majority of power in this embodiment may be dissipated in inner conductor 3190.

FIG. 485 depicts an embodiment of a Curie temperature heater with a ferromagnetic inner conductor and a non-ferromagnetic core. Inner conductor 3190 may be carbon steel or iron. Core 3198 may be tightly bonded inside inner conductor 3190. Core 3198 may be a copper rod or another rod of non-ferromagnetic material (e.g., aluminum). Core 3198 may be inserted as a tight fit inside inner conductor 3190 before a drawing operation. Electrical insulator 3192 may be magnesium powder. Outer conductor 3194 may be 304 stainless steel. A drawing operation to compact electrical insulator 3192 may ensure good electrical contact between inner conductor 3190 and core 3198 in the inner conductor. In this embodiment, power may be dissipated during heating mainly in inner conductor 3190 until near the Curie temperature. Resistance may then decrease sharply as alternating current penetrates core 3198.

FIGS. 486, 487, and 488 depict AC resistance versus temperature for various conductors as calculated using analytical equations set forth herein. Generally, the AC resistance of a conductor in a heater is indicative of the heat output (power) of the heater for a constant voltage (power=$(\text{current})^2\times(\text{resistance})$). FIG. 486 depicts AC resistance versus temperature for a 1.5 cm diameter iron conductor. Curve 3200 shows that the AC resistance steadily increases with temperature (which is typical for most metals) and begins to decrease as the temperature nears the Curie temperature. The AC resistance decreases sharply above the Curie temperature (above about 740° C.).

FIG. 487 depicts AC resistance versus temperature for a 1.5 cm diameter composite conductor of iron and copper. Curve 3202 depicts AC resistance versus temperature for a 0.25 cm diameter copper core inside an iron conductor with an outside diameter of 1.5 cm. Curve 3204 depicts AC resistance versus temperature for a 0.5 cm diameter copper core inside an iron conductor with an outside diameter of 1.5 cm. The alternating current at about room temperature travels through the skin of the iron conductor. As shown in FIG. 487, increasing the diameter of the copper core, which decreases the thickness of the iron conductor for the same outside diameter, reduces the temperature at which the AC resistance begins to decrease. The alternating current may begin to flow through the larger copper core at lower temperatures because of the smaller thickness of the iron conductor.

FIG. 488 depicts AC resistance versus temperature for a 1.3 cm diameter composite conductor of iron and copper and AC resistance versus temperature for the 1.5 cm diameter composite conductor of iron and copper (curve 3204) from FIG. 487. Curve 3206 depicts AC resistance versus temperature for a 0.3 cm diameter copper core inside a 0.5 cm thick iron conductor. As shown in FIG. 488, the 1.3 cm diameter composite conductor with a 0.3 cm (curve 3206) has a relatively flat resistance profile from about 200° C. to about 600° C. This relatively flat resistance profile may provide a desired heat output profile for use in heating a hydrocarbon containing formation, or any other subsurface formation. A desired heater for heating a hydrocarbon containing formation may increase the heat output to a relatively constant level at low temperature and then maintain the relatively constant heat output level over a large temperature range. Such a heater may more quickly and more uniformly heat a hydrocarbon containing formation.

A heater with the resistance profile of curve 3204 (i.e., the resistance slowly decreases with temperature above a certain temperature) may be used in certain embodiments for heating subsurface formations. For example, a heater may be needed to provide more power output at lower temperatures to heat a formation with significant amounts of water. A heater, which provides more power output at lower temperatures, may be useful in removing the water without providing excess heat to other portions of the formation that do not contain significant amounts of water.

FIG. 489 depicts an embodiment of a Curie temperature heater with a ferromagnetic outer conductor. Inner conductor 3190 may be copper. Electrical insulator 3192 may be magnesium powder. Outer conductor 3194 may be carbon steel pipe, Schedule XXS, with a diameter of about 2.5 cm. In this embodiment, the power may be dissipated mainly in outer conductor 3194, resulting in a small temperature differential across electrical insulator 3192.

FIG. 490 depicts an embodiment of a Curie temperature heater with a ferromagnetic outer conductor that is clad with a corrosion resistant alloy. Inner conductor 3190 may be copper. Electrical insulator 3192 may be magnesium powder. Outer conductor 3194 may be a carbon steel pipe, Schedule XXS, with a diameter of about 2.5 cm. Outer conductor 3194 may be coupled to jacket 3196. Jacket 3196 may be 304 stainless steel. In this embodiment, the power may be dissipated mainly in outer conductor 3194, resulting in a small temperature differential across electrical insulator 3192. Jacket 3196 may provide corrosion resistance against corrosive fluids in the borehole (e.g., sulfidizing and carburizing gases).

FIG. 491 depicts an embodiment of a Curie temperature heater with a ferromagnetic outer conductor that is clad with a conductive layer and a corrosion resistant alloy. Inner conductor 3190 may be copper. Electrical insulator 3192 may be magnesium powder. Outer conductor 3194 may be a carbon steel pipe, Schedule XXS, with a diameter of about 2.5 cm. Outer conductor 3194 may be coupled to jacket 3196. Jacket 3196 may be 304 stainless steel. In an embodiment, conductive layer 3208 may be placed between outer conductor 3194 and jacket 3196. Conductive layer 3208 may be a copper layer. In this embodiment, the power may be dissipated mainly in outer conductor 3194, resulting in a small temperature differential across electrical insulator 3192. Conductive layer 3208 may provide for a sharper decrease in the resistance of outer conductor 3194 as the outer conductor approaches the Curie temperature. Jacket 3196 may provide corrosion resistance against corrosive fluids in the borehole (e.g., sulfidizing and carburizing gases).

In some embodiments, an inner conductor may include two or more different materials. For example, the composite inner conductor may include iron clad over nickel clad over a copper core. Two or more materials may be used to obtain a flatter electrical resistivity versus temperature profile in a temperature region below the Curie temperature.

In one heater embodiment, an inner conductor may be a 1.9 cm diameter iron rod, an insulating layer may be 0.25 cm thick magnesium powder, and an outer conductor may be 0.635 cm thick 347H stainless steel. The heater may be energized at line frequency (e.g., 60 Hz) from a substantially constant current source. Stainless steel may be chosen for its corrosion resistance in the gaseous subsurface environment and/or for superior creep resistance at elevated temperatures. Below the Curie temperature, a majority of the heat may be dissipated in the iron inner conductor. With a heat injection rate of about 820 watts/meter, the temperature differential across the insulating layer will be approximately 40° C., so that the temperature of the outer conductor will be about 40° C. cooler than the temperature of the inner ferromagnetic conductor.

In another heater embodiment, an inner conductor may be a 1.9 cm diameter rod of copper or copper alloy such as LOHM (about 94% copper, 6% nickel by weight), an insulating layer may be transparent quartz sand, and an outer conductor may be 0.635 cm thick 1% carbon steel clad with 0.25 cm thick 310 stainless steel. The carbon steel in the outer conductor may be clad with copper between the carbon steel and the stainless steel jacket to reduce a thickness of the carbon steel needed to get substantial resistance changes near the Curie temperature. An advantage of a ferromagnetic outer conductor is that the heat dissipates primarily on the outer conductor, resulting in a small temperature differential across the insulating layer. A lower thermal conductivity material may therefore be chosen for the insulation because the main heat dissipation occurs in the outer conductor. Copper or copper alloy may be chosen for the inner conductor to reduce the heat dissipation in the inner conductor. Other metals, however, may also be used for the inner conductor (e.g., aluminum and aluminum alloys, phosphor bronze, beryllium copper, brass, etc.). These metals may be chosen for their low electrical resistivity and magnetic permeabilities near 1 (i.e., substantially non-ferromagnetic).

In another embodiment, a Curie temperature heater may be a conductor-in-conduit heater. Ceramic insulators may be positioned on the inner conductor. The inner conductor may make sliding electrical contact with the outer conduit in a sliding contactor section located at or near the bottom of the heater.

FIG. 492 depicts an embodiment of a conductor-in-conduit temperature limited heater. Conductor 1112 may be coupled (e.g., cladded, press fit, drawn inside, etc.) to ferromagnetic conductor 3212. Ferromagnetic conductor 3212 may be coupled to the outside of conductor 1112 so that alternating current propagates through the skin depth of the ferromagnetic conductor at room temperature. Conductor 1112 may provide mechanical support for ferromagnetic conductor 3212 at elevated temperatures. Ferromagnetic conductor 3212 may be iron, an iron alloy (e.g., iron with about 18% by weight chromium for corrosion resistance (445 steel)), or any other ferromagnetic material. In one embodiment, conductor 1112 is 304 stainless steel and ferromagnetic conductor 3212 is 445 steel. Conductor 1112 and ferromagnetic conductor 3212 may be electrically coupled to conduit 1176 with sliding connector 1202. Conduit 1176 may be a non-ferromagnetic material such as stainless steel.

FIG. 493 depicts another embodiment of a conductor-in-conduit temperature limited heater. Conduit 1176 may be coupled (e.g., cladded, press fit, drawn inside, etc.) to ferromagnetic conductor 3212. Ferromagnetic conductor 3212 may be coupled to the inside of conduit 1176 so that alternating current propagates through the skin depth of the ferromagnetic conductor at room temperature. Conduit 1176 may provide mechanical support for ferromagnetic conductor 3212 at elevated temperatures. Conduit 1176 and ferromagnetic conductor 3212 may be electrically coupled to conductor 1112 with sliding connector 1202.

FIG. 494 depicts an embodiment of a conductor-in-conduit temperature limited heater with an insulated conductor as the conductor. Insulated conductor 1124 may include core 3198, electrical insulator 3192 and jacket 3196. Jacket 3196 may be stainless steel for corrosion resistance. Endcap 3218 may be placed at an end of insulated conductor 1124 to couple core 3198 to sliding connector 1202. Endcap 3218 may be made of non-corrosive, electrically conducting materials such as nickel or stainless steel. Endcap 3218 may be coupled to the end of insulated conductor 1124 by any suitable method (e.g., welding, soldering, braising, etc.). Sliding connector 1202 may electrically couple core 3198 and endcap 3218 to ferromagnetic conductor 3212. Conduit 1176 may provide support for ferromagnetic conductor 3212 at elevated temperatures.

FIG. 495 depicts an embodiment of an insulated conductor-in-conduit temperature limited heater. Insulated conductor 1124 may include core 3198, electrical insulator 3192 and jacket 3196. Insulated conductor 1124 may be coupled to ferromagnetic conductor 3212 with connector 3220. Connector 3220 may be made of non-corrosive, electrically conducting materials such as nickel or stainless steel. Connector 3220 may be coupled using suitable methods for electrically coupling (e.g. welding, soldering, braising, etc.). Insulated conductor 1124 may be placed along a wall of ferromagnetic conductor 3212. Insulated conductor 1124 may provide mechanical support for ferromagnetic conductor 3212 at elevated temperatures. In some embodiments, other structures (e.g., a conduit) may be used to provide mechanical support for ferromagnetic conductor 3212.

FIG. 496 depicts an embodiment of an insulated conductor-in-conduit temperature limited heater. Insulated conductor 1124 may be coupled to endcap 3218. Endcap 3218 may be coupled to coupling 3222. Coupling 3222 may electrically couple insulated conductor 1124 to ferromagnetic conductor 3212. Coupling 3222 may be a flexible coupling. For example, coupling 3222 may be braided wire or include flexible materials. Coupling 3222 may be made of non-corrosive materials such as nickel, stainless steel, and/or copper.

In another embodiment, a Curie temperature heater may include a substantially U-shaped heater with a ferromagnetic cladding over a non-ferromagnetic core (in this context, the "U" may have a curved or, alternatively, orthogonal shape). A U-shaped, or hairpinned, heater may have insulating support mechanisms (e.g., polymer or ceramic spacers) that inhibit the two legs of the hairpin from electrically shorting to each other. In some embodiments, a hairpin heater may be installed in a casing (e.g., an environmental protection casing). The insulators may inhibit electrical shorting to the casing and may facilitate installation of the heater in the casing. The cross section of the hairpin heater may be, but is not limited to, circular, square, or rectangular.

FIG. 497 depicts an embodiment of a Curie temperature heater with a hairpin inner conductor. Inner conductor 3190 may be placed in a hairpin configuration with two legs coupled by a substantially U-shaped section at or near the bottom of the heater. Current may enter inner conductor 3190 through one leg and exit through the other leg. Inner conductor 3190 may be carbon steel or iron. Core 3198 may be placed inside inner conductor 3190. In certain embodiments, inner conductor 3190 may be cladded to core 3198. Core 3198 may be a copper rod. The legs of the heater may be insulated from each other and from casing 3224 by spacers 3226. Spacers 3226 may be alumina spacers. Spacers 3226 may be about 90% to about 99.8% alumina. Weld beads or other protrusions may be placed on inner conductor 3190 to maintain a location of spacers 3226 on the inner conductor. In some embodiments, spacers 3226 may include two sections that are fastened together around inner conductor 3190. Casing 3224 may be an environmentally protective casing made of, for example, stainless steel.

In certain embodiments, a Curie temperature heater may incorporate curves, bends or waves in a relatively straight heater to allow thermal expansion and contraction of the heater without overstressing materials in the heater. When a cool heater is heated or a hot heater is cooled, the heater expands or contracts in proportion to the change in temperature and the coefficient of thermal expansion of materials in the heater. For long straight heaters that undergo wide variations in temperature during use and are fixed at more than one point (e.g., due to mechanical deformation of the wellbore), the expansion or contraction may cause the heater to bend, kink, and/or pull apart. Use of an "S" bend, or other curves, bends or waves in the heater at intervals in the heated length may provide a spring effect and allow the heater to expand or contract more gently so that the heater does not bend, kink, or pull apart.

A 310 stainless steel heater subjected to about 500° C. temperature change may shrink/grow approximately 0.85% of the length of the heater with this temperature change. Thus, a length of about 3 m of a heater would contract about 2.6 cm when it cools through 500° C. If this heater were affixed at about 3 m intervals, such a change in length could stretch and, possibly, break the heater. FIG. 498 depicts an embodiment of an "S" bend in a heater. The additional material in the "S" bend may allow for thermal contraction or expansion of heater 3227 without damage to the heater.

In some embodiments, a temperature limited heater may include a sandwich construction with both current supply and current return paths separated by an insulator. The sandwich heater may include two outer layers of conductor, two inner layers of ferromagnetic material, and a layer of insulator between the ferromagnetic layers. The cross-sectional dimensions of the heater may be optimized for mechanical flexibility and spoolability. The sandwich heater may be formed as a bimetallic strip that is bent back upon itself. The sandwich heater may be inserted in a casing, such as an environmental protection casing, and may be separated from the casing with an electrical insulator.

A heater may include a section that passes through an overburden. The section of the heater positioned in the overburden may be designed to have limited heat dissipation. In some embodiments, the overburden section of the heater may include a copper or copper alloy inner conductor. The overburden section may also include a copper outer conductor clad with a corrosion resistant alloy.

A temperature limited heater may be constructed in sections (e.g., about 10 m long) that are coupled (e.g., welded) together to form the entire heater. A splice section may be formed between the sections, for example, by welding the inner conductors, filling the splice section with an insulator, and then welding the outer conductor. Alternatively, the heater may be formed from larger diameter tubulars and drawn down to a final length and diameter. If the insulation layer is magnesium powder, the insulation layer may be added by weld-fill-draw (starting from metal strip) or fill-draw (starting from tubulars) methods well known in the industry in the manufacture of mineral insulated heater cables. The assembly and filling can be done in either a vertical or horizontal orientation. The final heater assembly may be spooled onto a large diameter spool (e.g., about 6 m in diameter) and transported to a site of a formation for subsurface deployment. Alternatively, the heater may be assembled on site in sections as the heater is lowered vertically into a wellbore.

A Curie temperature heater may be a single-phase heater or a three-phase heater. In a three-phase heater embodiment, a heater may be a three-phase heater in either a delta or Wye configuration. Each of the three ferromagnetic conductors may be inside a separate sheath. A connection between conductors may be made at the bottom of the heater inside a splice section. The three conductors may remain insulated from the sheath inside the splice section.

FIG. 499 depicts an embodiment of a three-phase Curie temperature heater with ferromagnetic inner conductors. Each leg 3228 may have inner conductor 3190, core 3198, and jacket 3196. Inner conductors 3190 maybe iron 1% carbon steel. Inner conductors 3190 may have core 3198. Core 3198 may be copper. Each inner conductor 3190 may be coupled to its own jacket 3196. Jacket 3196 may be a 304H stainless steel sheath for corrosion resistance. Electrical insulator 3192 may be placed between inner conductor 3190 and jacket 3196. Inner conductor 3190 may be iron carbon steel with an outside diameter of about 1.14 cm and a thickness of about 0.445 cm. Core 3198 maybe a copper core with a 0.25 cm diameter. Each leg 3228 of the heater may be coupled to terminal block 3230. Terminal block 3230 may be filled with insulation material 3232 and have an outer surface of stainless steel. Insulation material 3232 may, in some embodiments, be magnesium oxide or other suitable electrically insulating material. Inner conductors 3190 of legs 3228 maybe coupled (e.g., welded) in terminal block 3230. Jackets 3196 of legs 3228 maybe coupled (e.g., welded) to an outer surface of terminal block 3230. Terminal block 3230 may include two halves coupled together around the coupled portions of legs 3228.

The heated section of the heater may be about 245 m long. The three-phase heater may be Wye connected and operated at about 150 A. The resistance of one leg of the heater may increase from about 1.1 ohms at room temperature to about 3.1 ohms at about 650° C. The resistance of one leg may decrease rapidly above about 720° C. to about 1.5 ohms. The voltage may increase from about 165 V at room temperature to about 465 V at 650° C. The voltage may decrease rapidly above about 720° C. to about 225 V. The power dissipation per leg may increase from about 102 watts/meter at room temperature to about 285 watts/meter at 650° C. The power dissipation per leg may decrease rapidly above about 720° C. to about 1.4 watts/meter. Other embodiments of inner conductor 3190, core 3198, jacket 3196, and/or electrical insulator 3192 may be used in the three-phase Curie temperature heater shown in FIG. 499. Any embodiment of a single-phase Curie temperature heater may be used as a leg of a three-phase Curie temperature heater.

In some three-phase heater embodiments, three ferromagnetic conductors may be separated by an insulation layer inside a common outer metal sheath. The three conductors may be insulated from the sheath or the three conductors may be connected to the sheath at the bottom of the heater assembly. In another embodiment, the single outer sheath or three outer sheaths may be ferromagnetic conductors and the inner conductors may be non-ferromagnetic (e.g., aluminum, copper or an alloy thereof). Alternatively, each of the three non-ferromagnetic conductors may be inside a separate ferromagnetic sheath, and a connection between the conductors may be made at the bottom of the heater inside a splice section. The three conductors may remain insulated from the sheath inside the splice section.

FIG. 500 depicts another embodiment of a three-phase Curie temperature heater with ferromagnetic inner conductors in a common jacket. Inner conductors 3190 may be placed in electrical insulation 3192. Inner conductors 3190 and electrical insulation 3192 may be placed in a single jacket 3196. Jacket 3196 may be a stainless steel sheath for corrosion resistance. Jacket 3196 may have an outside diameter of between about 2.5 cm and about 5 cm (e.g., about 3.1 cm (1.25 inches) or about 3.8 cm (1.5 inches)). Inner conductors 3190 may be coupled at or near the bottom of the heater at termination 3234. Termination 3234 may be a welded termination of inner conductors 3190. Inner conductors 3190 may be coupled in a Wye configuration.

In some embodiments, a Curie temperature heater may include a single ferromagnetic conductor with current returning through the formation. The heating element may be a ferromagnetic tubular (e.g., 446 stainless steel (with 25% chromium and a Curie temperature above about 620° C.) clad over 304H stainless steel) that extends through the heated target section and makes electrical contact to the formation in an electrical contacting section. The electrical contacting section may be located below a heated target section (e.g., in an underburden of the formation). In an embodiment, the electrical contacting section may be a section about 60 m deep with a larger diameter wellbore. The tubular in the electrical contacting section may be a high electrical conductivity metal. The annulus in the electrical contacting section may be filled with a contact material/solution such as salty brine or other materials that enhance electrical contact with the formation (e.g., metal beads, hematite, etc.). The electrical contacting section may be located in a brine saturated zone to maintain electrical contact through the brine. In this electrical contacting section, the tubular diameter may also be increased to allow maximum current flow into the formation with the lowest heat dissipation. Current flows through the ferromagnetic tubular in the heated section and heats the tubular.

FIG. 501 depicts an embodiment of a Curie temperature heater with current return through the formation. Heating element 3236 may be placed in opening 544 in hydrocarbon layer 522. Heating element 3236 may be a 446 stainless steel clad over 304H stainless steel tubular that extends through hydrocarbon layer 522. Heating element 3236 may be coupled to contacting element 3238. Contacting element 3238 may have a higher electrical conductivity than heating element 3236. Contacting element 3238 may be placed in electrical contacting section 3240, which is located below hydrocarbon layer 522. Contacting element 3238 may make electrical contact with the earth in electrical contacting section 3240. Contacting element 3238 may be placed in contacting wellbore 3242. Contacting element 3238 may have a diameter between about 10 cm and about 20 cm (e.g., about 15 cm). The diameter of contacting element 3238 may be sized to increase contact area between contacting element 3238 and contact solution 3244. The diameter of contacting element 3238 may be increased to a size to increase the contact area without excessively increasing the costs of installing and using contacting element 3238, contacting wellbore 3242, and/or contact solution 3244 as well as maintaining sufficient electrical contact between contacting element 3238 and electrical contacting section 3240. Increasing the contact area may inhibit evaporation or boiling off of contact solution 3244.

Contacting wellbore 3242 may be, for example, a section about 60 m deep with a larger diameter wellbore than opening 544. The annulus of contacting wellbore 3242 may be filled with contact solution 3244. Contact solution 3244 may be salty brine or other material that enhances electrical contact with electrical contacting section 3240. In some embodiments, electrical contacting section 3240 is a water-saturated zone that maintains electrical contact through the brine. Contacting wellbore 3242 may be under-reamed to a larger diameter (e.g., a diameter between about 25 cm and about 50 cm) to allow maximum current flow into electrical contacting section 3240 with low heat dissipation. Current may flow through heating element 3236, boiling moisture from the wellbore, and heating until the element self-regulates at the Curie temperature.

In an embodiment, three-phase Curie temperature heaters may be made with current connection through the earth formation. Each heater may include a single Curie temperature heating element with an electrical contacting section in a brine saturated zone below a heated target section. In an embodiment, three such heaters may be connected electrically at the surface in a three-phase Wye configuration. The heaters may be deployed in a triangular pattern from the surface. In certain embodiments, the current returns through the earth to a neutral point between the three heaters. The three-phase Curie heaters may be replicated in a pattern that covers the entire formation.

FIG. 502 depicts an embodiment of a three-phase Curie temperature heater with current connection through the earth formation. Three legs 3246, 3248, and 3250 may be placed in a formation. Each leg 3246, 3248, and 3250 may have heating element 3236 placed in each opening 544 in hydrocarbon layer 522. Each leg may also have contacting element 3238 placed in contact solution 3244 in contacting wellbore 3242. Each contacting element 3238 may be electrically coupled to electrical contacting section 3240 through contact solution 3244. Legs 3246, 3248, and 3250 may be connected in a Wye configuration that results in a neutral point in electrical contacting section 3240 between the three legs. FIG. 503 depicts a plan view of the embodiment of FIG. 502 with neutral point 3252 shown positioned centrally between legs 3246, 3248, and 3250.

In addition to the micro-scale Curie temperature self-regulation characteristics, an embodiment of a temperature limited heater may also be tailored to achieve power control on a more global scale. Power control on a more global scale may enable more of the heated length to self-regulate near the Curie temperature and thereby achieve more total heat injectivity. For example, a long section of heater through a high thermal conductivity zone may be tailored to deliver more heat injectivity through that zone. Tailoring of the heater can be achieved by changing cross-sectional areas of the heating elements (e.g., by changing the ratios of copper to iron), as well as using different metals in the heating elements. Thermal conductance of the insulation layer may also be modified in certain sections to control the thermal output to raise or lower the apparent Curie temperature self-regulation zone.

Simulations have been performed to compare the use of Curie temperature heaters and non-Curie temperature heaters in an oil shale formation. Simulation data was produced for conductor-in-conduit heaters placed in 16.5 cm (6.5 inch) diameter wellbores with 12.2 m (40 feet) spacing between heaters using one or more of the analytical equations set forth herein, a formation simulator (e.g., STARS), and a near wellbore simulator (e.g., ABAQUS). Standard conductor-in-conduit heaters included stainless steel conductors and conduits. Temperature limited conductor-in-conduit heaters included 1% carbon steel conductors and conduits. Results from the simulations are depicted in FIGS. 504-506.

FIG. 504 depicts heater temperature at the conductor of a conductor-in-conduit heater versus depth of the heater in the formation for a simulation after 20,000 hours of operation. Heater power was set at about 820 watts/meter. Curve 3254 depicts the conductor temperature for standard conductor-in-conduit heaters. Curve 3254 shows that a large variance in conductor temperature and a significant number of hot spots developed along the length of the conductor. The temperature of the conductor had a minimum value of about 490° C. Curve 3256 depicts conductor temperature for temperature limited conductor-in-conduit heaters. As shown in FIG. 504, temperature distribution along the length of the conductor was more controlled for the temperature limited heaters. In addition, the operating temperature of the conductor was about 730° C. for the temperature limited heaters. Thus, more heat input would be provided to the formation for a similar heater power using temperature limited heaters.

FIG. 505 depicts heater heat flux versus time for the heaters used in the simulation for heating oil shale. Curve 3258 depicts heat flux for standard conductor-in-conduit heaters. Curve 3260 depicts heat flux for temperature limited conductor-in-conduit heaters. As shown in FIG. 505, heat flux for the temperature limited heaters is maintained at a higher value for a longer period of time than heat flux for standard heaters. The higher heat flux may provide more uniform and faster heating of the formation.

FIG. 506 depicts accumulated heat input versus time for the heaters used in the simulation for heating oil shale. Curve 3262 depicts accumulated heat input for standard conductor-in-conduit heaters. Curve 3264 depicts accumulated heat input for temperature limited conductor-in-conduit heaters. As shown in FIG. 506, accumulated heat input for the temperature limited heaters increases faster than accumulated heat input for standard heaters. The faster accumulation of heat in the formation using temperature limited heaters may decrease the time needed for retorting the formation. Retorting for an oil shale formation typically begins around an accumulated heat input of $1.1\times10^8$ KJ/meter. This value of accumulated heat input is reached in about 5 years for temperature limited heaters and between 9 and 10 years for standard heaters.

Analytical solutions for the AC conductance of ferromagnetic materials may be useful to predict the behavior of ferromagnetic material and/or other materials during heating of a formation. In one embodiment, the AC conductance of a wire of uniform circular cross section made of ferromagnetic materials may be solved for analytically. For a wire of radius b, the magnetic permeability, electric permittivity, and electrical conductivity of the wire may be denoted by $\mu$, $\in$, and $\sigma$, respectively.

Maxwell's Equations are:

$$\underline{\nabla}\cdot\underline{B}=0; \tag{119}$$

$$\underline{\nabla}\times\underline{E}+\partial\underline{B}/\partial t=0; \tag{120}$$

$$\underline{\nabla}\cdot\underline{D}=\rho \tag{121}$$

$$\text{and } \underline{\nabla}\times\underline{H}-\partial\underline{D}/\partial t=\underline{J}. \tag{122}$$

The constitutive equations for the wire are:

$$\underline{D}=\in\underline{E}, \underline{B}=\mu\underline{H}, \underline{J}=\sigma\underline{E}. \tag{123}$$

Substituting EQN. 123 into EQNS. 119-122, setting $\rho=0$, and writing:

$$\underline{E}(r,t)=\underline{E}_S(\underline{r})e^{j\omega t} \quad (124)$$

$$\text{and } \underline{H}(r,t)=\underline{H}_S(\underline{r})e^{j\omega t}, \quad (125)$$

the following equations are obtained:

$$\underline{\nabla}\cdot\underline{H}_S=0; \quad (126)$$

$$\underline{\nabla}\times\underline{E}_S+j\mu\omega\underline{H}_S=0; \quad (127)$$

$$\underline{\nabla}\cdot\underline{E}_S=0; \quad (128)$$

$$\text{and } \underline{\nabla}\times\underline{H}_S-j\omega\in\underline{E}_S=\sigma\underline{E}_S. \quad (129)$$

Note that EQN. 128 follows on taking the divergence of EQN. 129. Taking the curl of EQN. 127, using the fact that for any vector function F:

$$\underline{\nabla}\times\underline{\nabla}\times\underline{F}=\underline{\nabla}(\underline{\nabla}\cdot\underline{F})-\nabla^2\underline{F}, \quad (130)$$

and applying EQN. 126, it is deduced that:

$$\nabla^2\underline{E}_S-C^2\underline{E}_S=0, \quad (131)$$

$$\text{where } C^2=j\omega\mu\sigma_{eff}, \quad (132)$$

$$\text{with } \sigma_{eff}=\sigma+j\omega\in. \quad (133)$$

For a cylindrical wire, it is assumed that:

$$\underline{E}_S=E_S(r)\hat{k}, \quad (134)$$

which means that $E_S(r)$ satisfies the equation:

$$\frac{1}{r}\frac{\partial}{\partial r}\left(r\frac{\partial E_S}{\partial r}\right)-C^2E_S=0. \quad (135)$$

The general solution of EQN. 135 is:

$$E_S(r)=AI_0(Cr)+BK_0(Cr). \quad (136)$$

B must vanish as $K_0$ is singular at r=0, and so it is deduced that:

$$E_S(r)=E_S(b)\frac{I_0(Cr)}{I_0(Cb)}=|E_S(r)|e^{i\phi(r)}. \quad (137)$$

The power dissipation in the wire per unit length (P) is given by:

$$P=\frac{1}{2}\int_0^b dr2\pi r\sigma|E_S|^2, \quad (138)$$

and the mean current squared ($<I^2>$) is given by:

$$<I^2>=\frac{1}{2}\left|\int_0^b dr2\pi rJ_S\right|^2=\frac{1}{2}\left|\int_0^b dr2\pi r\sigma E_S\right|^2. \quad (139)$$

EQNS. 138 and 139 may be used to obtain an expression for the effective resistance per unit length (R) of the wire. This gives:

$$R\equiv P/<I^2>=\frac{\int_0^b drr\sigma|E_S|^2}{2\pi\left|\int_0^b drr\sigma E_S\right|^2}=\frac{\int_0^b drr|E_S|^2}{2\pi\sigma\left|\int_0^b drrE_S\right|^2}, \quad (140)$$

with the second term on the right-hand side of EQN. 140 holding for constant σ.

C may be expressed in terms of its real part ($C_R$) its imaginary part ($C_I$) so that:

$$C=C_R+iC_I. \quad (141)$$

An approximate solution for $C_R$ may be obtained. $C_R$ may be chosen to be positive. The quantities below may also be needed:

$$|C|=\{C_R^2+C_1^2\}^{1/2} \quad (142)$$

$$\text{and } \gamma\equiv C/|C|=\gamma_R+i\gamma_I. \quad (143)$$

A large value of Re(z) gives:

$$I_0(z)=\frac{e^z}{\sqrt{2\pi z}}\{1+O[z^{-1}]\}. \quad (144)$$

This means that:

$$E_S(r)\cong E_S(b)e^{-\gamma\xi}, \quad (145)$$

$$\text{with } \xi=|C|(b-r) \quad (146)$$

Substituting EQN. 145 into EQN. 140 yields the approximate result:

$$R=\frac{|C|/2}{2\pi a\sigma\gamma_R}=\frac{|C|^2/\{2C_R\}}{2\pi b\sigma}. \quad (147)$$

EQN. 147 may be written in the form:

$$R=1/(2\pi b\delta\sigma), \quad (148)$$

$$\text{with } \delta=2C_R/|C|^2\cong\sqrt{2/(\omega\mu\sigma)}. \quad (149)$$

δ is known as the skin depth, and the approximate form in EQN. 149 arises on replacing $\sigma_{eff}$ by σ.

The expression in EQN. 145 may be obtained directly from EQN. 135. Transforming to the variable ξ gives:

$$\frac{1}{1-\varepsilon\xi}\frac{\partial}{\partial\xi}\left((1-\varepsilon\xi)\frac{\partial E_S}{\partial\xi}\right)-\gamma^2E_S=0, \quad (150)$$

$$\text{with } \in=1/(a|C|) \quad (151)$$

The solution of EQN. 150 can be written as:

$$E_S=\sum_{k=0}^{\infty}E_S^{(k)}\xi^k,\text{ with} \tag{152}$$

$$\frac{\partial^2 E_S^{(0)}}{\partial\xi^2}-\gamma^2E_S^{(0)}=0\text{ and} \tag{153}$$

$$\frac{\partial^2 E_S^{(m)}}{\partial\xi^2}-\gamma^2E_S^{(m)}=\sum_{k=1}^{m}\xi^{k-1}\frac{\partial E_S^{m-k}}{\partial\xi};\ m=1,2,\ldots \tag{154}$$

The solution of EQN. 153 is:

$$E_S^{(0)}=E_S(a)e^{-\gamma\xi}, \tag{155}$$

and solutions of EQN. 154 for successive m may also be readily written down. For instance:

$$E_S^{(1)}=\frac{1}{2}E_S(a)\xi e^{-\gamma\xi}. \tag{156}$$

The AC conductance of a composite wire having ferromagnetic materials may also be solved for analytically. In this case, the region 0≦r<a may be composed of material 1 and the region a<r≦b be composed of material 2. $E_{S1}(r)$ and $E_{S2}(r)$ may denote the electrical fields in the two regions, respectively. This gives:

$$\frac{1}{r}\frac{\partial}{\partial r}\left(r\frac{\partial E_{S1}}{\partial r}\right)-C_1^2E_{S1}=0;\ 0\le r<a\text{ and} \tag{157}$$

$$\frac{1}{r}\frac{\partial}{\partial r}\left(r\frac{\partial E_{S2}}{\partial r}\right)-C_2^2E_{S2}=0;\ a<r\le b,\text{ with} \tag{158}$$

$$C_k=j\omega\mu_k\sigma_{effk};\ k=1,2\text{ and} \tag{159}$$

$$\sigma_{effk}=\sigma_k+j\omega\varepsilon_k;\ k=1,2. \tag{160}$$

The solutions of EQNS. 157 and 158 satisfy the boundary conditions:

$$E_{S1}(a)=E_{S2}(a) \tag{161}$$

$$\text{and } H_{S1}(a)=H_{S2}(a) \tag{162}$$

and take the form:

$$E_{S1}(r)=A_1I_0(C_1r) \tag{163}$$

$$\text{and } E_{S2}(r)=A_2I_0(C_2r)+B_2K_0(C_2r). \tag{164}$$

Using EQN. 127, the boundary condition in EQN. 162 may be expressed in terms of the electric field as:

$$\frac{1}{\mu_1}\frac{\partial E_{S1}}{\partial r}\bigg|_{r=a}=\frac{1}{\mu_2}\frac{\partial E_{S2}}{\partial r}\bigg|_{r=a}. \tag{165}$$

Applying the two boundary conditions in EQNS. 161 and 165 allows $E_{S1}(r)$ and $E_{S2}(r)$ to be expressed in terms of the electric field at the surface of the wire $E_{S2}(b)$. EQN. 161 yields:

$$A_1I_0(C_1a)=A_2I_0(C_2a)+B_2K_0(C_2a), \tag{166}$$

while EQN. 165 gives:

$$A_1\tilde{C}_1I_1(C_1a)=\tilde{C}_2\{A_2I_1(C_2a)-B_2K_1(C_2a)\}. \tag{167}$$

Writing EQN. 167 uses the fact that:

$$I_1(z)=\frac{d}{dz}I_0(z);\ K_1(z)=-\frac{d}{dz}K_0(z) \tag{168}$$

and introduces the quantities:

$$\tilde{C}_1\equiv C_1/\mu_1;\ \tilde{C}_2\equiv C_2/\mu_2. \tag{169}$$

Solving EQN. 166 for $A_2$ and $B_2$ in terms of A obtains:

$$A_2=A_1\frac{\tilde{C}_2I_0(C_1a)K_1(C_2a)+\tilde{C}_1I_1(C_1a)K_0(C_2a)}{\tilde{C}_2\{I_0(C_2a)K_1(C_2a)+I_1(C_2a)K_0(C_2a)\}}; \tag{170}$$

and $$B_2=A_1\frac{\tilde{C}_2I_0(C_1a)I_1(C_2a)-\tilde{C}_1I_1(C_1a)I_0(C_2a)}{\tilde{C}_2\{I_0(C_2a)K_1(C_2a)+I_1(C_2a)K_0(C_2a)\}}. \tag{171}$$

Power dissipation per unit length and AC resistance of a composite wire may be solved for similarly to the method used for the uniform wire. In some cases, if the skin depth of the conductor is small in comparison to the radius of the wire, the functions containing $C_2$ may become large and may be replaced by exponentials. However, as the temperature nears the Curie temperature, a full solution may be required.

FIG. 507 depicts AC resistance versus temperature using the analytical equations solved for above. The AC resistance has been calculated for a 244 m long composite wire (outside diameter of 1.52 cm) with a copper core (outside diameter of 0.25 cm) and a carbon steel outer layer (thickness of 0.635 cm). FIG. 507 shows that the AC resistance for this composite wire begins to decrease above about 647° C. and then decreases sharply above about 716° C.

FIG. 508 depicts an embodiment of freeze well 2756. Freeze well 2756 may have first end 3266 at a first location on the surface and second end 3268 at a second location on the surface. Freeze well 2756 may include first conduit 3270 and second conduit 3272. In certain embodiments, first conduit 3270 and second conduit 3272 may be concentric, or coaxial, conduits. In one embodiment, as shown in FIG. 508, second conduit 3272 is located coaxially within first conduit 3270. First conduit 3270 and second conduit 3272 may be made from stainless steel or other suitable materials chemically resistant to refrigerant. In some embodiments, first conduit 3270 and second conduit 3272 may include insulated portions in overburden 524. Portions of first conduit 3270 and/or portions of second conduit 3272 that are adjacent to un-cooled portions of the formation may include an insulating material (e.g., high density polyethylene) and/or the conduit portions may be insulated with an insulating material. Portions of first conduit 3270 and/or portions of second conduit 3272 that are adjacent to cooled portions of the formation may be formed of a thermally conductive material (e.g., copper or a copper alloy). A thermally conductive material may enhance heat transfer between the formation and refrigerant in the conduit.

Refrigerant may be provided to first conduit 3270 at second end 3268 of freeze well 2756. Refrigerant may be provided to second conduit 3272 at first end 3266 of freeze well 2756. In an embodiment, refrigerant in first conduit 3270 (which flows from second end 3268 towards first end 3266) may flow countercurrently to refrigerant in second conduit 3272 (which flows from first end 3266 towards second end 3268). In some embodiments, refrigerant may flow co-currently through freeze well 2756 (i.e., refrigerant is provided to first conduit 3270 and second conduit 3272 at the same end of the freeze well). Flowing refrigerant countercurrently in coaxial conduits may more uniformly cool hydrocarbon layer 522 and produce more uniform temperatures in the treatment area. In addition, a lower pressure in a refrigerant may be maintained by flowing the refrigerant through a conduit with openings at both ends of the conduit compared to flowing the refrigerant through a conduit with only one open end. Conduits with only one open end generally have a bend or return within the freeze well that may increase a pressure of the refrigerant.

In some embodiments, refrigerant exiting first conduit 3270 and/or second conduit 3272 may be recycled or reused in another freeze well or returned to the same freeze well. For example, refrigerant exiting first conduit 3270 may be provided to second conduit 3272. In certain embodiments, refrigerant may be compressed before being recycled or reused. In some embodiments, spacers may be positioned at selected locations along the length of first conduit 3270 and second conduit 3272 to inhibit the conduits from physically contacting each other.

In certain embodiments, freeze well 2756 may extend into hydrocarbon layer 522 as depicted in FIG. 509. Freeze well 2756 may include a conduit positioned in hydrocarbon layer 522. Refrigerant may be provided to the conduit of freeze well 2756. One or more baffles 3274 may be positioned in annulus 3276 between a wall of freeze well 2756 and hydrocarbon layer 522. Baffles 3274 may include rubberized metal, plastic, etc. In some embodiments, baffles 3274 may be cement catchers, which may be purchased from Weatherford (Houston, Tex.). Fluids (e.g., water) may flow through hydrocarbon containing layer 522 through leached/fractured portion 3278 into annulus 3276 to overburden 524. Baffles 3274 may inhibit or slow the flow of the fluids in annulus 3276. Slowing the flow rate of water in annulus 3276 may increase the rate of cooling of the fluids in the annulus by increasing the contact time between the fluids and freeze well 2756. Cooling of the fluids may form a low temperature subsurface barrier in hydrocarbon layer 522. In some embodiments, a frozen subsurface barrier may be formed in hydrocarbon layer 522.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims. In addition, it is to be understood that features described herein independently may, in certain embodiments, be combined.

What is claimed is:

1. An in situ method for heating a hydrocarbon containing formation, comprising:

applying an electrical current to a conductor to provide heat to at least a portion of the formation, wherein the conductor is placed in a conduit, wherein the conduit is placed in an opening in the formation, and wherein a majority of the length of the conductor in an overburden of the formation is clad to an electrically conductive material; and allowing the heat to transfer from the conductor to a section of the formation.

2. The method of claim 1, wherein the electrically conductive material comprises copper.

3. The method of claim 1, further comprising coupling an electrically conductive material to an inside surface of the conduit.

4. The method of claim 1, wherein the electrically conductive material comprises metal tubing clad to the conductor.

5. The method of claim 1, wherein the electrically conductive material reduces an electrical resistance of a portion of the conductor adjacent to an overburden of the formation.

6. The method of claim 1, further comprising pyrolyzing at least some hydrocarbons in the formation.

7. An in situ method for heating a hydrocarbon containing formation, comprising:

applying an electrical current to a conductor to provide heat to at least a portion of the formation, wherein the conductor is configurable to be placed in an opening in the formation, wherein a majority of the length of the conductor in an overburden of the formation is clad to a first electrically conductive material to lower a resistance of the part of the conductor in the overburden; and allowing the heat to transfer from the conductor to at least a part of the formation.

8. The method of claim 7, further comprising placing the conductor in a conduit, wherein the conduit is configurable to be placed in the opening in the formation.

9. The method of claim 8, further comprising coupling a second electrically conductive material to at least a portion of an inside surface of the conduit.

10. The method of claim 7, further comprising reducing the electrical resistance of the conductor in the overburden by a factor of greater than about 3 with the electrically conductive material.

11. The method of claim 7, further comprising reducing the electrical resistance of the conductor in the overburden by a factor of greater than about 10 with the electrically conductive material.

12. The method of claim 7, further comprising reducing the electrical resistance of the conductor in the overburden by a factor of greater than about 15 with the electrically conductive material.

13. The method of claim 7, further comprising pyrolyzing at least some hydrocarbons in the formation.

14. An in situ method for heating a hydrocarbon containing formation, comprising:

applying an electrical current to a conductor to provide heat to at least a portion of the formation, wherein the conductor is configurable to be placed in a conduit, wherein the conduit is configurable to be placed in an opening in the formation, wherein a majority of the length of the conductor in a formation overburden is coupled to a first electrically conductive material so that a majority of the electrical current provided to the conductor flows through the first electrically conductive material in the formation overburden; and allowing the heat to transfer from the conductor to at least a part of the formation.

15. The method of claim 14, further comprising coupling a second electrically conductive material to at least a portion of an inside surface of the conduit.

16. The method of claim 14, further comprising reducing the electrical resistance of the conductor in the overburden by a factor of greater than about 3 with the electrically conductive material.

17. The method of claim 14, further comprising reducing the electrical resistance of the conductor in the overburden by a factor of greater than about 10 with the electrically conductive material.

18. The method of claim 14, further comprising reducing the electrical resistance of the conductor in the overburden by a factor of greater than about 15 with the electrically conductive material.

19. The method of claim 14, further comprising pyrolyzing at least some hydrocarbons in the formation.

* * * * *